United States Patent [19]

Long et al.

[11] Patent Number: 4,926,315

[45] Date of Patent: May 15, 1990

[54] DIGITAL DATA PROCESSOR WITH FAULT TOLERANT PERIPHERAL BUS COMMUNICATIONS

[75] Inventors: William L. Long, Pembroke; Robert F. Wambach, Attleboro; Kurt F. Baty, Medway; Joseph M. Lamb, Hopedale; John E. McNamara, Maynard, all of Mass.

[73] Assignee: Stratus Computer, Inc., Marlboro, Mass.

[21] Appl. No.: 79,297

[22] Filed: Jul. 29, 1987

Related U.S. Application Data

[63] Continuation-in-part of Ser. No. 904,827, Sep. 8, 1986, Pat. No. 4,750,177, which is a continuation of Ser. No. 307,436, Oct. 1, 1981, abandoned, and a continuation-in-part of Ser. No. 18,629, Feb. 25, 1987.

[51] Int. Cl.[5] .......... G06F 13/00; G06F 13/42

[52] U.S. Cl. .......... 364/200; 364/240.2; 364/271.0; 364/271.8

[58] Field of Search ... 364/900 MS File, 200 MS File

[56] References Cited

U.S. PATENT DOCUMENTS

| | | | |
|---|---|---|---|
| 3,548,382 | 12/1970 | Lichty et al. | 340/172 |
| 3,688,274 | 8/1972 | Cormier et al. | 340/172 |
| 3,710,324 | 1/1973 | Cohen et al. | 364/200 |
| 3,805,039 | 4/1974 | Stiffler | 235/153 |
| 3,820,079 | 6/1974 | Bergh et al. | 340/172 |
| 3,879,712 | 4/1975 | Edge et al. | 340/172 |
| 3,984,814 | 10/1976 | Bailey, Jr. et al. | 340/172 |
| 3,991,407 | 11/1976 | Jordan, Jr. et al. | 340/172 |
| 4,015,246 | 3/1977 | Hopkins, Jr. et al. | 340/172 |
| 4,059,736 | 11/1977 | Perucca et al. | 179/175 |
| 4,099,234 | 7/1978 | Woods et al. | 364/200 |
| 4,245,344 | 1/1981 | Richter | 371/68 |
| 4,365,295 | 12/1982 | Katzman et al. | 364/200 |
| 4,428,044 | 1/1984 | Livon | 364/200 |
| 4,484,275 | 11/1984 | Katzman et al. | 364/200 |
| 4,486,826 | 12/1984 | Wolff et al. | 364/200 |

FOREIGN PATENT DOCUMENTS

WO81/00925 4/1981 PCT Int'l Appl. .

OTHER PUBLICATIONS

"Standard Specification for S-100 Bus Interface Devices", K. A. Elmquist et al, Computer, Jul. 1979, vol. 12, No. 7, pp. 28–52.

"Fault Tolerant Systems" and Error Detection, T. Anderson et al, Fault Tolerance Principles and Practice, Prentice-Hall, 1981, pp. 93–145.

"Multiprocessor Organization—A Survey", P. H. Enslow, Jr., Computing Surveys, vol. 9, No. 1, Mar. 1977, pp. 103–129.

"Pluribus—An Operational Fault-Tolerant Multiprocessor," D. Katsuki et al, Proceedings of the IEEE, vol. 66, No. 10, Oct. 1978, pp. 1146–1159.

"Fault-Tolerant Computers—A Hardware Solution to Part Failures Totally Insulates . . .", G. Hendrie, Electronics, Jan. 27, 1983, pp. 103–105.

*Primary Examiner*—Eddie P. Chan
*Attorney, Agent, or Firm*—Lahive & Cockfield

[57] ABSTRACT

A fault-tolerant digital data processing system comprises at least a first input/output controller communicating with at least one peripheral device over a peripheral device bus. The peripheral bus includes first and second input/output buses, each having means for carrying data, address, control, and timing signals. The input/output controller includes an element for applying duplicate information signals synchronously and simultaneously to the first and second input/output buses for transfer to the peripheral device. The input/output controller further includes a bus interface element for receiving, in the absence of fault, duplicative information signals synchronously and simultaneously from the first and second input/output buses.

15 Claims, 32 Drawing Sheets

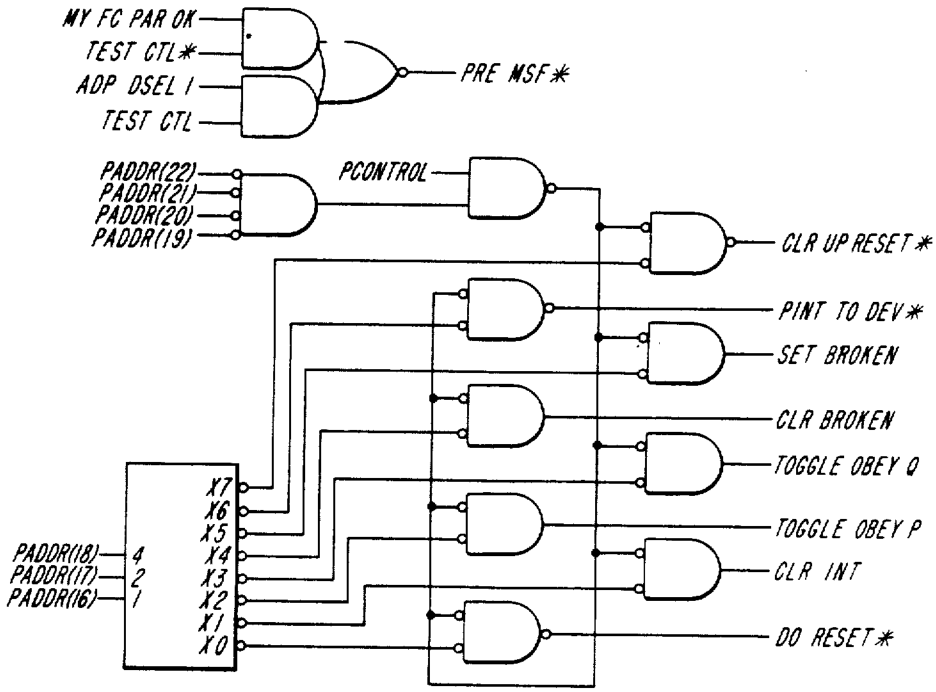
FIG. 25
FIG. 26
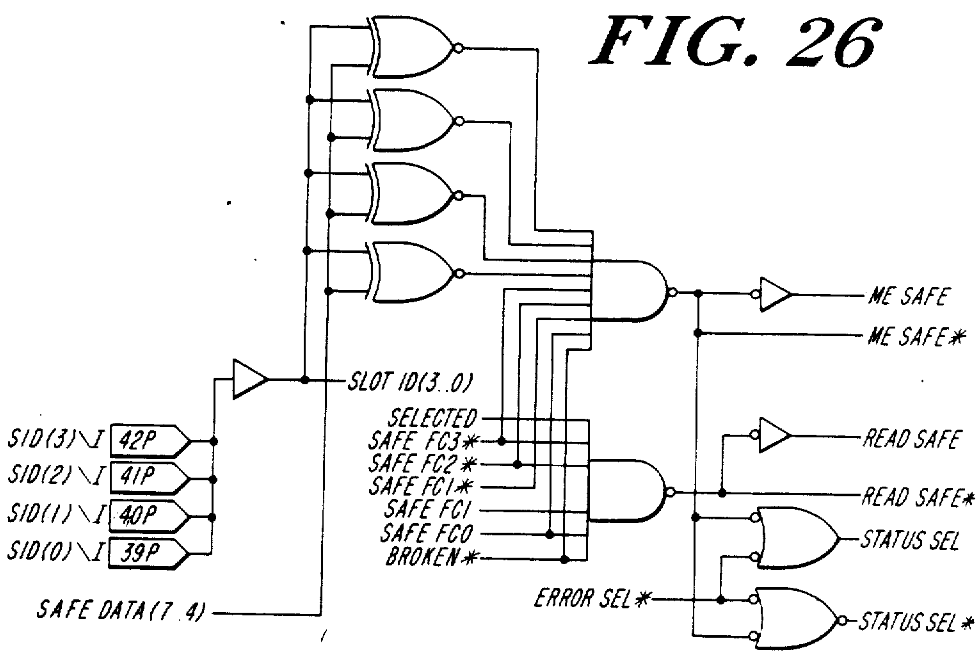

DIGITAL DATA PROCESSOR WITH FAULT TOLERANT PERIPHERAL BUS COMMUNICATIONS

REFERENCE TO RELATED APPLICATIONS

This application is a continuation-in-part of U.S. patent application Ser. No. 904,827, filed Sept. 8, 1986 now U.S. Pat. No. 4,750,177, issued June 7, 1988, which is a continuation of U.S. patent application No. 307,436, filed Oct. 1, 1981. This application is, further, a continuation-in-paert of U.S. patent application Ser. No. 018,629, filed Feb. 25, 1987.

The application is related to the following commonly-assigned United States patents and patent applications:

| Title | Ser. or Pat. No. |
|---|---|
| "Digital Data Processor With High Reliability" | U.S. Pat. No. 4,654,857 |
| "Digital Data Processor With Fault Tolerant Bus Protocol" | Ser. No. 904,827, filed September 8, 1986 (A Cont. of USSN 307,436, filed October 1, 1981), now U.S. Pat. No. 4,750,177 |
| "Central Processing Apparatus" | U.S. Pat. No. 4,453,215 |
| "Computer Memory Apparatus" | U.S. Pat. No. 4,597,084 |
| "Computer Peripheral Control Apparatus" | U.S. Pat. No. 4,486,826 |
| "Digital Data Processing Apparatus with Pipelined Memory Cycles" | Ser. No. 896,667, filed August 14, 1986, abandoned in favor of continuation application Ser. No. 227,471, filed August 1, 1988 now U. S. Pat. No. 4,866,604 |
| "Method and Apparatus for Fault Tolerant Computer System Having Expandable Processor Section" | Ser. No. 927,746, filed November 5, 1986, now U.S. Pat. No. 4,816,990 |
| "Method and Apparatus for Digital Logic Synchronism Monitoring" | Ser. No. 003,732, filed January 16, 1987 |
| "Fault-Tolerant Digital Timing Apparatus and Method" | Ser. No. 018,629, filed February 25, 1987 |
| "Fault Tolerant Digital Data Processor with Improved Input/Output Controller" | Ser. No. 079,295, filed July 29, 1987, abandoned in favor of USSN 368,125, filed June 16, 1989, |
| "Fault Tolerant Digital Data Processor with Improved Peripheral Device Interface" | Ser. No. 079,225, filed July 29, 1987, now abandoned |
| "Fault Tolerant Digital Data Processor with Improved Communications Monitoring" | Ser. No. 079,218, filed July 29, 1987 |
| "Fault Tolerant Digital Data Processor with Improved Bus Protocol" | Ser. No. 079,223, filed July 29, 1987 |

The aforementioned patents and patent applications are incorporated herein by reference.

BACKGROUND OF THE INVENTION

The invention relates to fault tolerant digital data processing and, particularly, to apparatus and methods for providing fault tolerant communications with peripheral devices.

Faults in digital computer systems are inevitable and are due, at least in part, to the complexity of the circuits, the associated electromechanical devices, and the process control software. To permit system operation even after the occurrence of a fault, the art has developed a number of fault-tolerant designs. Among these is Rennels, "Architecture for Fault-Tolerant Spacecraft Computers," Proceedings of the I.E.E.E., Vol. 66, No. 10, pp. 1255–1268 (1975), disclosing a computer system having independent self-checking computer modules (SCCM's). In the event of failure of a module, the SCCM is taken off-line.

An improved fault-tolerant digital data processing system is currently available from the assignee hereof, Stratus Computer Company, of Marlboro, Mass. This system employs redundant functional unit pairs, e.g., duplicative central processing units, duplicative memory units, and duplicative peripheral control units, interconnected for information transfer by a common system bus.

The aforementioned system bus includes two duplicative buses, the A Bus and the B Bus, as well as a control bus, the X Bus. During normal operation, signals transferred along the A Bus are duplicated through simultaneous transmission along the B Bus. Signals transferred along the X Bus, including timing, status, diagnostics and fault-responsive signals, and are not duplicated.

Within the Stratus System, control of and communications with peripheral devices are effected by peripheral control units. One such unit, the communication control unit, routes control and data signals to attached peripheral devices by way of a communication bus.

With this background, an object of this invention is to provide an improved digital data processing system. More particularly, an object of this invention is to provide a system for improved fault-tolerant communication with, and control of, peripheral devices.

A further object of this invention is to provide an improved fault-tolerant bus structure for use in digital data processing apparatus and, particularly, for use in communications with data processor peripheral units.

Yet another object of this invention is to provide an input/output controller for controlling and communicating with plural peripheral devices over a common peripheral bus structure.

Other objects of the invention are evident in the description which follows.

SUMMARY OF THE INVENTION

The aforementioned objects are attained by the invention which provides, in one aspect, an improved fault-tolerant digital data processing system having a first input/output controller which communicates with at least one peripheral device over a peripheral device bus. The peripheral bus means includes first and second input/output buses, each including means for carrying data, address, control, and timing signals.

The input/output controller includes an element for applying duplicate information signals synchronously and simultaneously to the first and second input/output buses for transfer to the peripheral device. That is, upon applying information signals to the first input/output bus, the input/output controller simultaneously applies those same signals to the second input/output bus.

In a further aspect, the invention provides a fault-tolerant digital data processing system of the type described above in which the input/output controller includes a bus interface element for receiving, in the absence of fault, duplicative information signal synchronously and simultaneously from the first and second input/output buses.

Still further, the invention provides a digital data processor of the type describe above in which the input/output controller includes clocking elements for generating and transferring on the first and second input/output buses strobe signals indicative of the timing of associated information transfers along those buses.

The aforementioned input/output controller can also include a scanner element for polling the peripheral devices which are connected along the peripheral device bus. By this polling, the scanner can determine the current operational status of each peripheral device. Using this scanning element, the input/output controller can determine, for example, whether a peripheral is active and awaiting instruction, whether it requires interrupt processing, or whether it has become unexpectedly inactive.

According to another aspect of the invention, a digital data processor having a first input/output controller communicates with one or more peripheral devices over a peripheral device bus having first and second input/output buses for carrying, respectively, first and second input signals. In the absence of fault, these first and second signals are identical and are transmitted synchronously and simultaneously along those buses.

The aforementioned input/output controller can include first and second processing sections, each for processing signals received on the peripheral device bus. During the course of normal operation, the first and second processing sections receive identical input signals from the peripheral bus and produce identical output signals.

Further, a first bus interface element can be coupled with the processing sections and with said peripheral bus for receiving the first and second input signals and for applying at least one of those input signals identically, i.e., synchronously and simultaneously, to said first and second processing sections.

A digital data processor of the type described above can also include a second peripheral controller which is coupled with the peripheral device bus for receiving the first and second input signals identically with the first peripheral controller. In this aspect, a second device interface element serves to apply at least one of those input signals to said second input/output controller.

In order to coordinate operations of the first and second processing sections, the data processor can include a flash circuitry element that is coupled to the first and second bus interface. This circuitry is responsive to operational states of the bus interface elements for generating a signal indicative of the synchronous receipt of identical copies at least one of the first and second input signals by each of said first and second bus interface elements.

Thus, the flash circuitry provides a mechanism by which the digital data processor can insure that the first and second bus interface sections are simultaneously applying duplicative and synchronous information signals to the first and second processing sections of the first peripheral controller, as well as to the second peripheral controller.

In still another aspect, a digital data processor as described above can utilize bus interface elements for applying duplicative output signals synchronously and simultaneously to the first and second input/output buses. Within such a processor, flash circuitry can be advantageously employed to monitor those transmissions.

According to this aspect of the invention, the flash circuitry can generate a timing signal, which itself is transmitted along the first and second input/output buses, indicative of the timing of information transfer cycles along the bus. Consequently, for example, a peripheral device attached to the bus can employ an interface for inputting transferred signals only at the time of receipt of the transmitted strobe signal. Through this mechanism, the peripheral avoids the processing of non-duplicative or asynchronous information signals.

The flash circuitry of a digital data processor as described above can include, further, a strobe delay element which responds to differing operational states of the first and second bus interface elements for delaying generating of the aforementioned STROBE signal. This delay element can be employed to facilitate continuous operation notwithstanding a slight delay in the receipt of either of the first and second information signals along the peripheral bus structure.

The flash circuitry can also employ an element for periodically and repeatedly comparing the operational states of the first and second bus interface elements in order to detect the concurrence of the first and second information signals. In the event those signals do not agree after a specified time period, the processing sections can initiate an error detection sequence to determine the source of fault.

Another aspect of the invention provides a fault-tolerant digital data processing system having a first input/output controller which communicates with at least one peripheral device over a peripheral device bus, which includes first and second input/output buses. As above, each of these buses can carry data, address, control, and timing signals from the input/output controller to the peripheral device.

According to this aspect of the invention, a device interface is coupled to said first and second input/output buses means and to an associated peripheral device for transferring information between said the buses and the associated peripheral device. In normal operation, the device interface applies duplicate information signals synchronously and simultaneously to the input/output buses for transfer to said input/output controller.

In a related aspect of the invention, the device interface includes a bus interface section for receiving, in the absence of fault, duplicative information signal synchronously and simultaneously from the first and second input/output buses.

The interface can include a fault detection element that is coupled to said bus interface for detection faulty information transmission and for responding thereto to generate a fault signal. According to this aspect of the invention, the device interface can respond to a first selected type of transmission error, e.g., a single-bit error, occurring on one of the buses for accepting data only from the other bus. Similarly, the device interface can respond to a second selected error type, e.g., a multi-bit error, occurring on either bus for initiating a diagnostic testing sequence.

The aforementioned testing sequence can include the timed generation of various diagnostic testing signals, which are intended to facilitate the identification of the source of error. By way of example, subsequent to the detection of a multi-bit error, a transmitter portion of the device interface can apply "assert" signals—i.e., all one's or zero's—to the peripheral bus data and function code conductors for a specified time interval. Concurrently, a receiver portion of the interface can monitor the bus to determine whether all the incoming signals retain their asserted values.

In another aspect, the invention is directed to a protocol for communications over the peripheral device bus of a digital data processor. The apparatus includes a peripheral device controller for communicating with one or more peripheral devices over a peripheral device bus which includes first and second input/output buses, each carrying data, address, control, and timing information. Each peripheral device can include a device interface element for transferring information signals between the associated peripheral device and the peripheral bus.

According to the aforementioned aspect of the invention, the peripheral device controller includes a strobe element connected with the first and second input/output buses for transmitting thereon duplicative, synchronous and simultaneous strobe signals. These strobe signals define the successive timing intervals for information transfers along the peripheral buses.

Further, the peripheral device controller can include an element for executing an information transfer cycle which normally, i.e., in the absence of fault, involves the transmission of duplicate information signals synchronously and simultaneously on said first and second input/output buses. This transfer cycle element can include a scanner cycle element to determine an operational state of at least one of the peripheral devices connected to said peripheral bus; a command cycle element for executing a command cycle for controlling operation of an attached peripheral device; a read cycle element for effecting the transfer of data signals from the peripheral device to the input/output controller; and a write cycle element for transferring data signals from the input/output controller an attached peripheral device.

Each of the aforementioned scanner cycle, command cycle, read cycle, and write cycle elements can include, further, a cycle initiation section for initiating an information transfer cycle. In this aspect, the cycle initiation section includes an element for transmitting, during a first timing interval, a SELECT signal indicative of cycle initiation. This SELECT signal is transferred duplicatively and synchronously on said first and second input/output buses. Concurrently, the cycle initiation section transmits on both buses a SLOT-ID signal indicative of at least one said peripheral device to be addressed during the information transfer cycle.

In an apparatus constructed according to this aspect of the invention, an addressed peripheral device responds to a selected SLOT-ID signal to transmit a signal representative of the operational status of the peripheral device (including its associated bus interface element). This status signal is transmitted in a second, subsequent timing interval. During that time interval, a receiving element within the cycle initiation section receives, in absence of error, the status signal on both the first and the second buses.

In related aspects, the invention is directed to a digital data processor of the type described above in which the command cycle element transmits duplicative command signals along the first and second buses in a third timing interval.

Alternatively, the processor can utilize either of the read or write cycle elements to transmit addressing information during the third, fourth, and fifth timing intervals. According to these aspects of the invention, a write cycle element can thereafter transmit duplicative WRITE signals, along with duplicative write data, to an addressed peripheral device. Similarly, a read cycle element can transmit duplicative READ signals to invoke the duplication transfer of read data from the addressed peripheral device.

In yet further aspects, the invention is directed to a peripheral device interface for responding to and participating in the bus protocol defined by the actions of the peripheral device controller discussed above.

In still further aspects, the invention is directed to methods of operating a digital data processor in accord with the functioning of the apparatus described above.

These and other aspects of the invention are evident in the drawings and the detailed description below.

BRIEF DESCRIPTION OF THE DRAWINGS

A more complete understanding of the invention may be obtained by reference to the drawings, in which:

FIG. 25 illustrates preferred circuitry for extracting peripheral device adaptor command signals in a device interface constructed according to the invention;

FIG. 26 illustrates preferred circuitry for evaluating slot-id signals received from the i/o controller;

DESCRIPTION OF THE ILLUSTRATED EMBODIMENT

Figure 1:
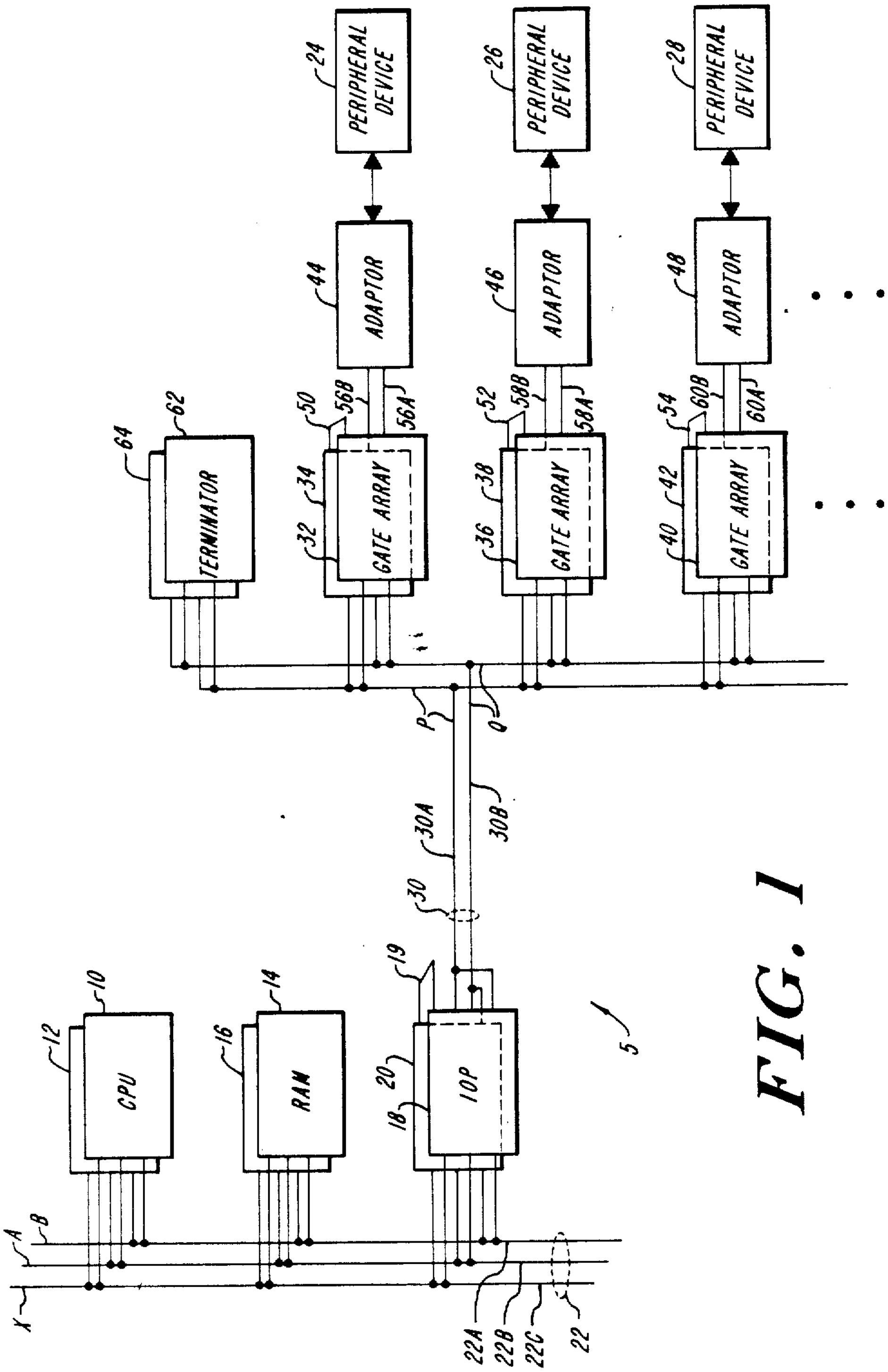
FIG. 1 illustrates a digital data processing system including a fault tolerant peripheral i/o system constructed according to a preferred practice of the invention.

FIG. 1 depicts a digital data processing system 5 having a fault tolerant peripheral input/output system constructed according to a preferred practice of the invention. The system 5 includes partnered central processing units 10, 12, partnered random access memory unites 14, 16, and partnered input/output controllers 18, 20, connected for communications over system bus 22.

The i/o controllers 18, 20, which are coupled via flash bus 19, control the transfer of information and control signals between the system backplane, represented by system bus 22, and one or more peripheral devices 24, 26, 28. These peripheral devices can include permanent storage media, e.g., disk and tape drives, communications controllers, network interfaces, and the like.

Peripheral device control and information signal transfers occur over peripheral bus 30, which includes dual input/output buses 30A, 30B. Signals carried over these buses are routed to the periperal devices 24, 26, 28 via gate arrays 32, 34, 36, 38, 40, 42 and adaptors 44, 46, 48. As shown in the illustration, each peripheral device, e.g., device 24, is associated with a gate array pair, e.g., arrays 32, 34, and an adaptor, e.g., adaptor 44. The paired gate arrays, e.g., arrays 32, 34, are interconnected by a communications line, as illustrated; e.g., see line 50. Moreover, each gate array is connected to its associated adaptor by an adaptor bus; see lines 56A, 56B, 58A, 58B, 60A, 60B. In turn, the adaptors 44, 46, 48 are coupled to their respective associated peripheral devices 24, 26, 28 via local peripheral lines, as illustrated.

The peripheral bus 30 and, particularly, first and second i/o buses 30A, 30B, are terminated by terminators 62, 64.

The illustrated central processing units 10, 12, the random access memory units, and the system bus 22 are constructed according to the teachings of the aforementioned U.S. patents and patent applications, to wit, U.S. Pat. Nos. 4,453,215; 4,486,826; 4,597,084; 4,654,857; 4,750,177; 4,816,990; and 4,866,604.

According to a preferred practice, i/o buses 30A and 30B serve as redundant signal carriers. That is, the buses 30A, 30B carry duplicative information signals synchronously and simultaneously. This arrangement facilitates the detection of transmission faults and permits the system to provide continuous, uninterrupted, processing and communication over the non-faulty bus.

According to a preferred practice, each bus 30A, 30B, includes data, control, parity, strobe, and "wait" signal conductors. Physically, the bus 30 can be implemented using two cables of 30 twisted pairs each. Such an implementation permits redundant 8-bit transfers at 4 megahertz using one cable or, alternatively, redundant 16-bit transfers at 4 megahertz using both cables. Information transfers along bus 30 occur at a cycle rate of 250 nanoseconds, thus providing 8-bit transfers at four megabytes per second and 16-bit transfers at eight megabytes per second.

The data, control, parity and wait signal lines of each i/o bus 30A, 30B are open collector conductors and are driven, for example, by Motorola 26S10 transceivers. Two strobe lines are provided in each bus 30A, 30B. These paired lines serve as a differential signal carriers driven at the i/o controller 14, 20 and received at terminators 62, 64.

The gate array pairs, which may reside on a single board, are inserted in slots of an adaptor chassis (not shown). Each slot is associated with a slot-id which defines the address of the associated peripheral device. In one embodiment, the chassis maintains sixteen such addressable slots, with the far end terminators 62, 64 occupying the final two slots.

Figure 2:
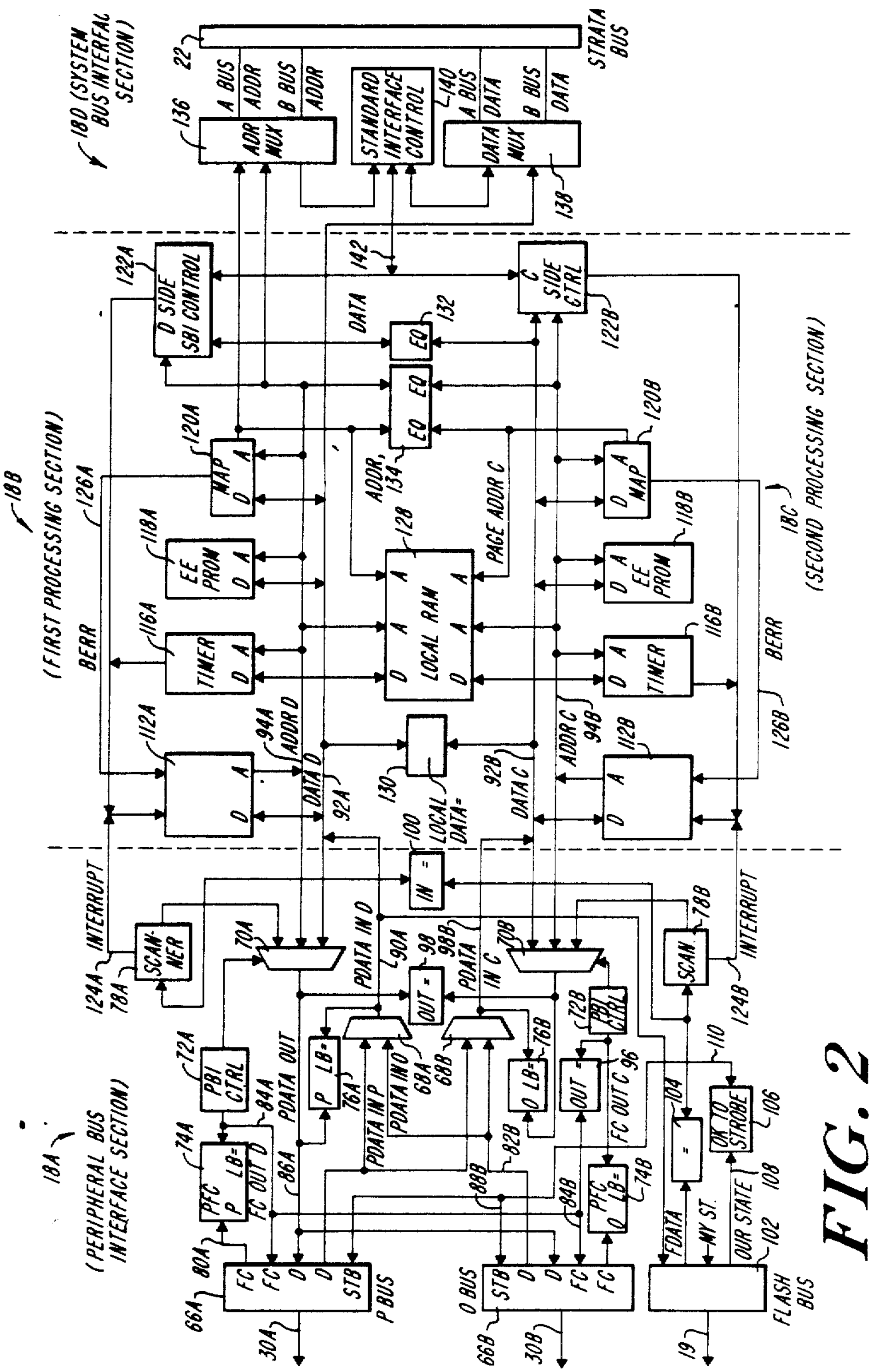
FIG. 2 illustrates an i/o controller constructed in accord with a preferred practice of the invention.

FIG. 2 depicts an i/o controller 18 constructed in accord with a preferred practice of the invention. The i/o controller 18 includes a peripheral bus interface section 18A, a first processing sections 18B, a second processing section 18C, and a system bus interface section 18D. The peripheral bus interface section 18A provides an interface for receiving, transmitting, and checking information transfers between the i/o controller 18 and devices attached to first and second i/o buses 30A, 30B. The system bus interface section 18D provides interface for receiving, transmitting, and checking information transfers between the i/o controller 18 and those functional units (e.g., central processing units 10, 12 and random access memory units 14, 16) attached along the system bus 22. The first and second processing sections 18B, 18C serve as redundant processing for signals received by the i/o controller from system and peripheral buses.

The peripheral bus control section 18A is composed of two duplicative interface sections: the "drive" section shown in the upper-left portion of FIG. 2; and the "check" section shown in the lower-left portion of FIG. 2. The drive section is primarily associated with both the first i/o bus 30A (hereinafter referred to as the "P bus") and the first processing section 18B. That is, in the absence of fault, the drive section couples the P Bus 30A with the first processing section 18B. Similarly, the check section is primarily associated with the second i/o bus 30B (hereinafter referred to as the "Q bus") and the second processing section 18C.

With particular reference to FIG. 2, it is seen that the drive section of the peripheral bus interface 18A includes transceiver 66A, input data multiplexor 68A, output data multiplexor 70A, peripheral bus interface control 72A, function code loop-back comparator 74A, data loop-back comparator 76A, and peripheral scanner 78A.

Transceiver 66A receives incoming data from the P bus and makes this data available to the controller 18 on line 82A. The transceiver also monitors function code signals on the P bus, via line 80A, for loopback comparison. Data generated for output by the controller 18 is passed to the transceiver via line 86A for transmission along the P bus, while function codes generated for output by the controller 18 are passed to 66A via line 84A for transmission along the P bus.

Incoming drive section data signals are routed to multiplexor 68A, along with data signals received from the check section transceiver 66B, as shown. Data selected by multiplexor 68A is routed along line 90A to the first processing section data bus 92A.

In the absence of fault, as where duplicate data signals are received from P bus and Q bus synchronously and simultaneously, the multiplexor 68A will select P bus data signals, received along line 82A, for routing to first processing section data bus 92A. However, if the P bus data is detected as faulty, the multiplexor will select Q bus data signals, received along line 82B, for routing to the first processing section data bus 92A.

Outgoing data signals generated by the scanner 78A, the first processing data bus 92A, and the first processing address bus 94A, are routed through output multiplexor 70A, which acts under the control of controller 72A. Signals from the multiplexor 70A are transmitted to the P bus via line 86A, while simultaneously being routed to loop-back comparator 76A.

The bus interface control 72A generates a function code signal along line 84A for output by the transceiver 66A. This function code signal is also routed to the check section for output along the Q bus via line 84B and transceiver 66B. Function code signals generated by control 72A are compared with incoming function code signals, routed on line 80A, by loop-back comparator 74A.

As shown in FIG. 2, the check side of the peripheral bus interface section 18A is of similar construction to the drive side of that section. Accordingly, operation of the check side of the peripheral bus interface section 18A will be understood by reference to the discussion above.

With further reference to FIG. 2, the peripheral bus interface 18A is seen to include function code comparator 96. This comparator compares function code signals produced by both the drive side interface control 72A and the check side interface control 72B to produce a signal indicating whether these match. The interface 18A further includes output data comparator 98 and input data comparator 100. The output data comparator 98 is arranged for comparing data signals selected by the drive side multiplexor 70A with those selected by check side multiplexor 70B, while the input data comparator is arranged for comparing data selected by multiplexor 68A with that selected by check side multiplexor 68B.

In addition to the drive and check sides, discussed above, the peripheral bus interface section 18A includes circuitry for transmitting local data and operational status signals to partner controller 20. This circuitry, termed "flash" circuitry, also compares data and status signals received from the partner controller 20.

According to the illustrated embodiment, the flash circuitry includes transceiver 102, comparator 104, and strobe generator 106. The transceiver 102 transmits data signals from the drive side of the interface 18A to the flash bus 19. The transceiver also transmits operational status signals to the flash bus 19, as indicated by the signal line denoted MY STATE. Data received from the flash bus is transferred from the transceiver 102 to the comparator 104, as shown. There, the data is compared with check side data routed on line 90B. State information received from the flash bus is passed along line 108 to strobe generator 106. If this information compares favorably with local operational status signals, or if it is determined that strobe signals must otherwise be generated, e.g., during an error detection sequence, the strobe generator 106 generates strobe information for routing to the P and Q buses via lines 110, 88A, and 88B.

With further reference to FIG. 2, the first processing section 18B includes processor 112A, timer 116A, EEPROM 118A, map section 120A, and control 122A. As indicated in the illustration, each of these elements is coupled to the data bus 92A for transmitting and receiving data signals, while the later four of the elements are coupled to the address bus 94A for receiving addressing signals. The processor 112A is arranged for driving addressing signals onto the address bus 94A.

Interrupt signals generated by the scanner 78A, the timer 116A, and the control 122A are transferred via line 124A to the processor. Similarly, an error signal designated BERR generated by the map section is transferred via line 126A to the processor 112A.

The second processing section 18C is constructed similarly to the first processing section 18B, as shown in the drawing.

The controller 18 also includes circuitry which is shared by the first and second processing sections 18B, 18C. To wit, a random access memory module 128 accepts addressing information from both address buses 94A, 94B, as illustrated. The module is also connected for receiving and transmitting data to and from the local data buses 92A, 92B, as shown in the illustration. The illustration also depicts the transfer of paging information to the memory module 128 from map sections 120A, 120B.

According to a preferred embodiment, data comparators 130, 132 monitor signals received from the local data buses 92A, 92B to identify discrepancies between them. A further comparator 134 monitors signals received from the local address buses 94A, 94B, as well as signals generated by map sections 120A, 120B, to identify differences therebetween.

The system bus interface section 18D includes address multiplexor 136, data multiplexor 138, as well as standard interface control 140. The address multiplexor 136 transfers output address signals from the map section 120A and the address bus 94A to the system bus 22 and, more particularly, to the duplicative buses 22A and 22B. The data muliplexor 138 transfers output data signals from the local data bus 92A to the duplicative buses 22A and 22B, as shown in the illustration. As further depicted in FIG. 2, address and control information received by the address and data multiplexors 136, 138 is routed to the standard interface control 140. From there, this incoming information may be routed via line 142 to controls 122A and 122B. A preferred construction of bus interface section 18D is provided in the aforementioned related U.S. Patents and Patent Applications.

I/O Controller Peripheral Bus Interface

According to one preferred practice, i/o controller 18 can be connected with the peripheral bus 30, via transceivers 66A, 66B, to send and/or receive the signals identified below. Hereinafter, the i/o controller is referred to as the "IOP", while a gate array/adaptor combination, e.g., gate arrays 32, 34 and adaptor 44, is referred to as an "interface" or "IOA".

| Signal Name | Description | Signal Direction |
|---|---|---|
| Data 0 P | Bus P Data Bit 0 | IOP to/from IOA |
| Data 1 P | Bus P Data Bit 1 | IOP to/from IOA |
| Data 2 P | Bus P Data Bit 2 | IOP to/from IOA |
| Data 3 P | Bus P Data Bit 3 | IOP to/from IOA |
| Data 4 P | Bus P Data Bit 4 | IOP to/from IOA |
| Data 5 P | Bus P Data Bit 5 | IOP to/from IOA |
| Data 6 P | Bus P Data Bit 6 | IOP to/from IOA |
| Data 7 P | Bus P Data Bit 7 | IOP to/from IOA |
| Data Parity P | Bus P Data Parity | IOP to/from IOA |
| Data 0 Q | Bus Q Data Bit 0 | IOP to/from IOA |
| Data 1 Q | Bus Q Data Bit 1 | IOP to/from IOA |
| Data 2 Q | Bus Q Data Bit 2 | IOP to/from IOA |
| Data 3 Q | Bus Q Data Bit 3 | IOP to/from IOA |
| Data 4 Q | Bus Q Data Bit 4 | IOP to/from IOA |
| Data 5 Q | Bus Q Data Bit 5 | IOP to/from IOA |
| Data 6 Q | Bus Q Data Bit 6 | IOP to/from IOA |
| Data 7 Q | Bus Q Data Bit 7 | IOP to/from IOA |
| Data Parity Q | Bus Q Data Parity | IOP to/from IOA |
| Func 0 P | Bus P Function Code Bit 0 | IOP to IOA |
| Func 1 P | Bus P Function Code Bit 1 | IOP to IOA |
| Func 2 P | Bus P Function Code Bit 2 | IOP to IOA |
| Func Parity P | Bus P Function Code Parity | IOP to IOA |
| Func 0 Q | Bus Q Function Code Bit 0 | IOP to IOA |
| Func 1 Q | Bus Q Function Code Bit 1 | IOP to IOA |
| Func 2 Q | Bus Q Function Code Bit 2 | IOP to IOA |
| Func Parity Q | Bus A Function Code Parity | IOP to IOA |
| Strobe P | Bus P Strobe positive conductor of differential pair | IOP to IOA |
| Strobe P* | Bus P Strobe negative conductor of differential pair | IOP to IOA |
| Strobe Q | Bus Q Strobe positive conductor of differential pair | IOP to IOA |
| Strobe Q* | Bus Q Strobe negative conductor of differential pair | IOP to IOA |
| Wait P | Bus P Wait | IOA to IOP |
| Wait Q | Bus Q Wait | IOA to IOP |

According to a preferred practice, i/o controller 18 transmits and receives on the flash bus 19 the signals listed below, wherein the first i/o controller, e.g., controller 18, is referred to as "IOP 1", and the second i/o controller, e.g., controller 20, is referred to as "IOP 2". An "*" in the signal name indicates that the signal is inverted. The flash bus 19 is a wire OR'ed open-collector. The controllers IOP 1 and IOP 2 concurrently present a signal level on the bus 19, with the "low" level prevailing and being received by both controllers.

| Signal Name | Description | Signal Direction |
|---|---|---|
| FDATA 0* | Flash Bus Data Bit 0 | IOP 1 to/from IOP 2 |
| FDATA 1* | Flash Bus Data Bit 1 | IOP 1 to/from IOP 2 |
| FDATA 2* | Flash Bus Data Bit 2 | IOP 1 to/from IOP 2 |
| FDATA 3* | Flash Bus Data Bit 3 | IOP 1 to/from IOP 2 |
| FDATA 4* | Flash Bus Data Bit 4 | IOP 1 to/from IOP 2 |
| FDATA 5* | Flash Bus Data Bit 5 | IOP 1 to/from IOP 2 |
| FDATA 6* | Flash Bus Data Bit 6 | IOP 1 to/from IOP 2 |
| FDATA 7* | Flash Bus Data Bit 7 | IOP 1 to/from IOP 2 |
| WE STRB* | IOP to issue STROBE | IOP 1 to/from IOP 2 |
| WE HOLD STRB* | IOP to hold STROBE because of WAIT | IOP 1 to/from IOP 2 |
| CF NEQ* | Check side data does not equal flash data | IOP 1 to/from IOP 2 |
| CD NEQ* | Check side data does not equal drive side data | IOP 1 to/from IOP 2 |
| P NOK* | Failure detected in Bus P | IOP 1 to/from IOP 2 |
| Q NOK* | Failure detected in Bus Q | IOP 1 to/from IOP 2 |

Memory Allocation

The i/o controller 18 and its circuitry is allocated in a virtual memory configuration as follows:

| Address | Content |
|---|---|
| 000000x - BDFFFFx | User mapped virtual memory |
| BE0000x - BEFFFFx | PROM (elements 118A, 118B), also residing at 000000x - 00ffffx when PROM is not high |
| BF0000x - BF7FFFx | Not used |
| BF8000x - BF8FFFx | Sync page |
| BF9000x - BF9FFFx | P Bus DMA (direct memory access) select/P Bus command page |
| BFA000x - BFAFFFx | Supervisor control (incl., control registers for P bus, timer elements 116A, 116B), scanner (elements 78A, 78B, and scanner list) |
| BFB000x - BFBFFFx | Privileged control |
| BFC000x - BFFFFFx | Map (elements 120A, 120B) |
| C00000x - FFFFFFx | P Bus programmed i/o space, providing a 4 MByte window into the selected adaptor |

-continued

| Within the DMA select/interface command page, address space is arranged as follows: | | |
|---|---|---|
| Address | Access | Content |
| BF9002X | write word | Select Adaptor for PI0 command<br>Bits 15-08 Slot/subchannel<br>07 "1"<br>06-00 Command number |
| BF9004-006 | write long | Select peripheral adaptor for DMA write<br>Bits 31-24 Slot/subchannel<br>23-22 "00"<br>21-16 Upper six adaptor address bits<br>15-00 Lower sixteen adaptor address bits |
| BF9008-BF900A | write long | Select peripheral adaptor for DMA read<br>Bits 31-24 Slot/subchannel<br>23-22 "00"<br>21-16 Upper six adaptor address bits<br>15-00 Lower sixteen adaptor address bits |
| BF900C | write long | Select Adaptor for DMA Verify<br>Bits 31-24 slot/subchannel<br>23-22 "00"<br>21-16 up 6 peripheral adaptor address bits<br>15-00 lower 16 adaptor address bits |

Supervisory Control Page

Supervisory control page accesses are made at virtual page BFA000x. The timer, peripheral bus and scanner control, including the scanner list, are addressed in this page. USER and CODE accesses to this page cause the generation of BERR* along line 126A. The page also maintains selected interrupt, privilege, and scanner interrupt status information.

All control accesses to the supervisory control page, except for accesses to timer 116A require no wait states. Unlatched control pulses are initiated by the rising edge of a first timing signal and terminated by the falling edge of a subsequent timing signal. Control bits for the standard bus interface and P bus are synchronized to a 4 MHz clock signal.

Within the supervisory control command page, i/o address space is allocated as follows:

| Address | Access | Content |
|---|---|---|
| BFA000 | Read | Timer Data Word |
| BFA002 | | Timer Status Word<br>Bits 15-00 |
| BFA000 | Write | Timer Data Word |
| BFA002 | | Timer Command/Data Pointer Words<br>Bits 15-00 |
| BFA400 | Read | Checksum Word<br>Bits 15-00 |
| BFA400 | Write | PUBS/SCANNER/DEV CONTROL WORD<br>Bit 15 (1 to set/0 to clear)<br>Bits 02-01-00<br>1 1 1 PBUS Enable Bit<br>(active hi)<br>1 1 0 Set PBUS-BERR Enable Bit<br>(active hi)<br>1 0 1 Scanner on<br>(active hi)<br>1 0 0 Run Scanner<br>(active hi)<br>0 1 1 Timer Interrupt Mask/Clear<br>(masked off lo)<br>0 1 0 Level 1 Interrupt<br>(active hi)<br>0 0 1 Privileged Bit<br>(active low)<br>0 0 0 PBUS Lock<br>(active low) |
| BFA800 | Read | Scanner Interrupt Status Word (to be read only if a scanner interrupt is pending)<br>Bits 15-00<br>Bit 15 Adaptor Alive<br>(active hi)<br>Bit 14 Adaptor Interrupt<br>(active hi)<br>Bit 13 Adaptor Obeying P<br>Bit 12 Adaptor Obeying Q<br>Bits 11-8 Adaptor Interrupt Code or Subchannel<br>Bits 7-4 Slot number<br>Bits 3-0 TBD (subchannel) |
| BFA801 | write | PTO Slot Select Address Byte<br>Bits 7-4 Slot number<br>Bits 3-0 TBD (subchannel) |
| BFAC01-BFADFF | Read (Odd Addresses) | Scanner Slot Select Address Byte<br>Bits 7-4 Slot number<br>Bits 3-0 TBD (subchannel |
| BFAC01-BFADFF | write (Odd Addresses) | Scanner Slot Select Address Byte<br>Bits 7-4 Slot number<br>Bits 3-0 TBD (subchannel) |

Privilege Control Page

Privilege control page accesses are made at virtual address BFB000x. The controller 18 privileged-only status and control registers are stored in this virtual page. Additionally, the standard bus interface 122A control resides in this page. Accesses to the privilege control page require no wait states.

Within the privileged control page, i/o address space is arranged as follows:

| Address | Access | Content |
|---|---|---|
| BFB000 | Read | Board Status Word (note: if one, a mask bit allows the interrupt for the specified condition)<br>Bit 15 BROKEN<br>Bit 14 BROKEN TWO<br>Bit 13 MEMORY BROKEN -- Parity/Data<br>Bit 12 MEMORY BROKEN -- Compare<br>Bit 11 TIMER INTERRUPT MASK (enabled if 1)<br>Bit 10 PK COMPARE (Hi = OK)<br>Bit 09 COMMAND PENDING<br>Bit 08 STATUS CHANGE<br>Bit 07 Side C = 1, D = PROM HI -- read only |

-continued

| Address | Access | Content |
|---|---|---|
| | | Bit 06 INTERRUPT PENDING (from IOP on Strata-BUS) |
| | | Bit 05 PARTNERED bit |
| | | Bit 04 ZOUT GT |
| | | Bit 03 LEVEL1 INT |
| | | Bit 02 PROM HI -- when this bit is cleared, PROM addresses start at 0 and RAM addresses below 8000 are not available. When prom is high, Side D is also high. When prom is not high, Side is low. |
| | | Bit 01 INTERRUPT MASK for Bit 09 (CMD PENDING) being 1 (Level 4) |
| | | Bit 00 INTERRUPT MASK for all conditions and levels (Bits 00-05 are 0 after a RESET.) |
| BFB000 | Write | Board Status Word |
| | | Bit 15 (1 to set/0 to clear) |
| | | Bits 02-01-00 |
| | | 1 1 1 P PBUS Enabled |
| | | 1 1 0 Q PBUS Enabled |
| | | 1 0 1 PARTNERED bit |
| | | 1 0 0 OUTPUT GRANT bit |
| | | 0 1 1 PBUS OBEY FORCE bit |
| | | 0 1 0 PROM HI bit |
| | | 0 0 1 INTERRUPT MASK for (CMD PENDING) Level 4 |
| | | 0 0 0 INTERRUPT MASK for all conditions and levels |
| BFB401 | Read | Standard Interface Command Register Bytes |
| BFB403 | | Bits 07-00 for all |
| BFB405 | | |
| BFB407 | | |
| BFB400 | write | Board Control Word |
| | | Bits 15-02-01-00 |
| | | 0 1 1 1 CLEAR BROKEN (only used by PROM code) |
| | | 0 1 1 0 CLEAR BROKEN TWO, CLEAR MEMORY, PARITY ERROR, CLEAR MEMORY COMPARE ERROR, CLEAR INTERRUPT LEVELS 2-3, CLEAR PK COMPARE ERROR, CLEAR WAIT-TIMEOUT ERROR, CLEAR PBUS OBEY ERROR |
| | | 0 1 0 1 CLEAR CHECKSUM |
| | | 0 1 0 0 SYNC JIFFY TIMER |
| | | 0 0 1 1 SET INTERRUPT REQUEST |
| | | 0 0 1 0 CLEAR DMA ENABLE |
| | | 0 0 0 1 CLEAR COMMAND PENDING |
| | | 0 0 0 0 CLEAR STATUS CHANGE |
| BFB801 | Read | Standard Interface Pointer Register Bytes |
| BFB803 | | Bits 07-00 for all |
| BFB805 | | |
| BFB807 | | |
| BFB801 | Write | Standard Interface VOS Vector Byte |
| | | Bits 07-00 Vector Number |
| BFBC00 | Read | Pbus Status Word |
| | | Bit 15 VERIFY OK |
| | | Bit 14 DMA WRITE |
| | | Bit 13 DMA READ |
| | | Bit 12 SCANNER INTERRUPT (active low) |
| | | Bit 11 SCANNER SET TO RUN (active low) |
| | | Bit 10 PBUS OBEY FORCED |
| | | Bit 9 P PBUS ENABLED Sync |
| | | Bit 8 Q PBUS ENABLED Sync |
| | | Bit 7 PBUS WAIT-TIMEOUT ERROR (active low) |
| | | Bit 6 PBUS OBEY ERROR (active low |
| | | Bit 5 PBUS SELECT ERROR (active low) |
| | | Bit 4 PBUS SELECT BERR ENABLED (active hi) |
| | | Bit 3 PBUS ENABLED Sync |
| | | Bit 2 PBUS LOCK (locked if low) |
| | | Bit 1 OBEY P |
| | | Bit 0 OBEY Q |
| BFBC00 | Write | CHECKSUM TEST WORD/BYTE |
| | | Bits 15-8 Add byte (if asserted) to checksum for test |
| | | Bits 7-0 Add byte (if asserted) to checksum for test |

The Map Element

In a preferred embodiment, the map 120A includes four pages of 24 bit map entries, each having sixteen physical address translation bits, one i/o bit, one interlock bit, three access control bits, one local/main memory bit, one DMA thread bit, and one spare bit. The translation address bits are aligned on even word boundaries, while the control bits occupy a bytes aligned on odd word boundaries. The access control bits are allocated to define the following access types:

no access;
any access—write only memory;
any access—read data/execute;
any access—read data/write data;
privileged access—no access;
privileged access—write only memory;
privileged access—read data/execute; and
privileged access—read data/write data.

According to one preferred embodiment, the following memory access control violations will cause assertion of BERR* on line 126A:

(1) an unprivileged access to a privileged page;
(2) an execute access to a write accessible page;
(3) a write access to a non-write accessible page; and
(4) a read access to a non-read accessible page.

Moreover, the following local virtual access violations can also cause assertion of BERR, as above:

(1) a code access to the local virtual pages, except prom 118A;
(2) an unprivileged write access to the privileged control page;
(3) a user access to the supervisor control page;
(4) a write to prom 118A;
(5) an overrange during local memory access;
(6) a read to the sync selection page;
(7) a peripheral bus time-out error occurring during a peripheral bus access;
(8) a peripheral bus obey error occurring during a non-DMA peripheral bus access, except when bus obey is forced;

(9) a peripheral bus obey error occurring during a DMA cycle; and

(10) a CPU (112A) write during a DMA cycle.

In the illustrated embodiment, a peripheral bus select error will be generated under the following circumstances:

(1) a peripheral bus access to an empty or broken peripheral bus device adaptor slot in the adaptor chassis, except when peripheral bus select errors are disables;

(2) a peripheral bus DMA with either addressing bit 1 or data bit 7 asserted;

(3) a peripheral bus command with address bit 1 deasserted;

(4) a peripheral bus select when the peripheral bus is defined as locked;

(5) a peripheral bus access when the peripheral bus is turned off.

Local Memory Access

The illustrated controller 18 utilizes a 12 MHz Motorola 68010 processor 112A which executes instructions out of local memory 128 with no wait states, unless a memory refresh is demanded.

With regard to operation of the memory 128, a row strobe signal RRAS* is issued on every cycle of the local processor 112A. If the cycle is a local memory access, and (i) a refresh is not demanded, and (ii) a LOCAL VIRTUAL or an IACK cycle is not decoded, strobe signal RCAS* will be issued; otherwise, RRAS* ABORT will be issued, thereby terminating RRAS*.

Terminating RRAS* allows a free refresh to occur, so long as a refresh is requested after the signal AS* is asserted during a CPU bus cycle having 3 or more wait states. It is necessary to be able to perform a refresh while AS* is asserted so that during synchronization of partnered i/o controllers 18, 20, memory refresh times are not violated while the local CPU 112A is waiting, with AS* asserted, for the other board to catch up.

Most refresh cycles occur by demand, i.e., the refresh cycle begins before AS* is asserted, regardless of the type of the next cycle. If the next cycle is a local memory access, the refresh cycle will add 3 wait states; otherwise, no wait states will be added.

A signal RAS PRECHARGE* is clocked by the rising edge of RRAS* to prevent any reassertion of RRAS*. Assertion of RAS PRECHARGE* also prevents a refresh cycle from occurring before the RAM has had time to recover from a RAM access abort or a late negation of AS*.

Addresses to the RAMs are selected by a signal SELCOL*, which follows RRAS* by 15 nsec. Row addresses to the RAMs are the low order address bits of the CPU 112A and do not have a map translation delay. Some of the column addresses are part of the mapped address area and have map translation delay. The first processing section 18B employs a Motorola 74F521 to determine whether the local memory access being made is within the range of the local memory space. If not, the signal OVERRANGE is asserted.

A refresh cycle occurs synchronously with the 12 MHz clock signal. A refresh request is generated as a result of the falling edge of timer clock, which is synchronized to the rising edge of the 12 MHz CLK, every 15.25 microseconds.

Map Access

Access to map unit 120 occurs with no wait states. The map 120A, when used for address translation, is 4K long by 24 bits wide, including 16 physical address bits and eight control bits. Map entries residue on word or long word boundaries, with byte accesses being unallowable. Even addressed words store the 16 bits of translation information. The upper eight bits of the odd addressed word are the control bits, including read access, write access, privileged access, local memory, interlock, i/o, dma, and spare bit signals. The lower eight bits of the odd-address words are not use.

The map 120A virtual page access are privileged only/data only access; an unprivileged or code access will cause BERR* to be asserted. These pages are also write protected from the unprivileged access.

Timer

The timer 116A, including its associated jiffy counters, is synchronized with the 12 MHz clock signal. The timer has a period of 15.25 microseconds which is asserted for 1.3 microseconds and unasserted for 13.9 microseconds. Timer signals are re-synchronized to the 12 MHz CLK after the counters reach a selected value. A signal, TIMER STABLE*, is negated 1.3 microseconds before the rising edge of the timer clock signal, while being asserted 1.3 microseconds after that rising edge to prevent accessing the TIMER too close to its clock edge. The timer 116A addresses are stored within the supervisory control virtual page as noted above. The timer 116A may only be accessed at word boundaries. Such accesses add from 1 to 31 wait states to the CPU 112A bus cycle depending on the state of a signal TIMER* STABLE when the access is made. For the timer 116A to interrupt the processor 112A, the interrupt mask TIMER IMSK must be set to one. Upon servicing a TIMER INTERRUPT, TIMER IMSK must be set to zero to clear the condition, and then set to one to re-enable interrupts from the TIMER.

Interrupt Acknowledge

The processor 118A provides an interrupt acknowledge cycle, IACK, requiring no wait states. On any interrupt acknowledge, the lower three address bits on local address buses 92A, 92B indicate which level interrupt the process is servicing. These three bits are returned to the processor in an interrupt vector byte, with the high order bit of the byte as asserted. The interrupt levels are as follows.

| Interrupt Level | Device |
|---|---|
| LEVEL 7 | DEBUGGER |
| LEVEL 6 | TIMER |
| LEVEL 5 | SCANNER |
| LEVEL 4 | CMD PENDING |
| LEVEL 3 | PBUS TIME OUT or OBEY ERROR |
| LEVEL 2 | PBUS OBEY TOGGLE CLOCK |
| LEVEL 1 | SOFTWARE INTERRUPT |

Scanner

The illustrated scanner 78A runs as a parallel processor to the main board CPU. If enabled and set to run, it will scan the adaptors in the adaptor chassis in a software assignable order for interrupts and lack of alive status. The scanner takes advantage of the select mechanism of the adaptors by using an aborted select to retrieve adaptor status. This allows a 750 nanosecond scan cycle for each entry in the scan list.

A scanner table entry is one byte long, including four bits designating a peripheral slot number and four bits designating a subchannel number.

The software controlled scan list forces the scanner 78A to check only those slots which are occupied. The scanner may be utilized to compensate for different interrupt service requirements of different adaptors by including selected adaptor slots more than once in the scan list. The scan list consists of 256 entries. All entries must be contiguous, starting at the first entry. However, the entire scan list does not have to be filled. A "return to zero" entry is employed by the scanner 78A to scan the active terminators in the adaptor chassis. An interrupt from such a scan to the terminator indicates a bulk power supply failure, fan failure, power synchronization failure, or a terminator failure.

The scanner 78A, upon finding a slot with the interrupt bit set or the alive bit cleared, will stop at that entry and interrupt the processor 112A. When reading back the scanner interrupt status word, the processor 112A reads the adaptor status in one byte and the contents of the scan list entry in the other. The scanner interrupt status is not read unless there is an interrupt or the scanner is not set to run.

The scanner 78A runs when it is enabled and there are no processor 112A pending on the peripheral bus 30. The processor 112A cycles have priority; accordingly, the scanner 74A will stop while during those cycles and restart only after the first idle cycle during which the processor 112A does not access the bus. The scanner 78A stops completely when an adaptor is selected for DMA and restarts when DMA enable is cleared.

Flash Circuitry

Figure 3:
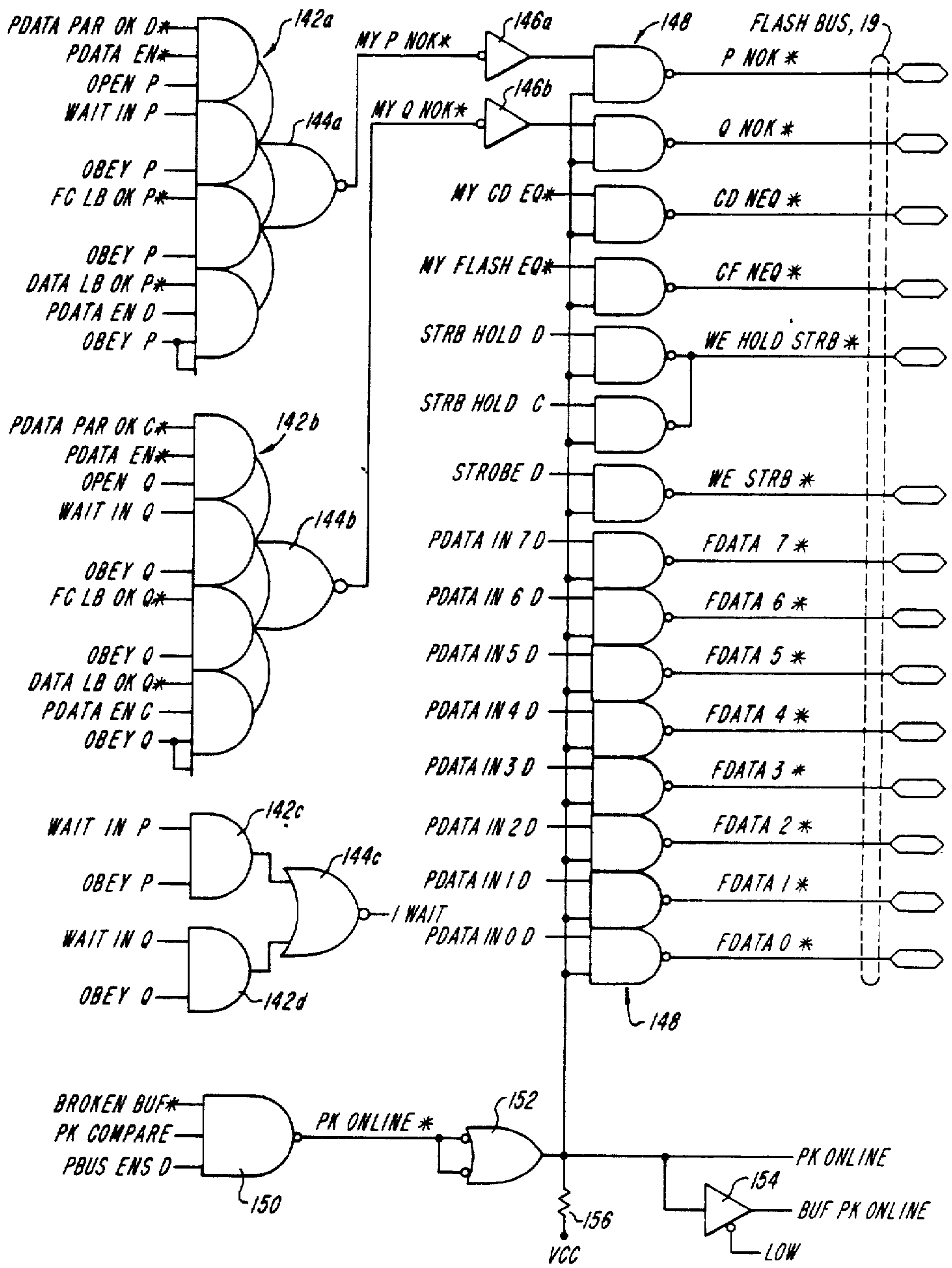
FIG. 3 illustrates a flash circuitry element constructed in accord with a preferred practice of the invention.

FIG. 3 depicts a preferred construction for the flash circuitry of an i/o controller 18. The circuitry includes AND gates 142A, 142B, 142C, 142D, NOR gates 144A, 144B, 144C, inverters 146A, 146B, NAND gates 148, NAND gate 150, OR gate 152, and buffer 154. The flash circuitry provides, as output from NAND gates 148, controller operational state signals which are OR'ed onto the open collector flash bus 19.

The AND gates 142A accepts the following input signals:

| Signal | Description |
|---|---|
| PDATA PAR OK D* | validity of data signal parity at transceiver 66A |
| PDATA EN* | i/o controller enabled to drive data onto the peripheral bus 30 |
| OBEY P | i/o controller enabled to send/receive on the P bus 30A |
| WAIT IN P | i/o controller receiving WAIT signal on the P bus 30A |
| FC LB OK P* | function code loopback comparator 74A output |
| DATA LB OK P* | data loopback comparator 76A output |
| PDATA EN D | i/o controller drive side 18B enabled to drive data onto peripheral bus 30 |

Logical AND's of the above signals are generated by AND gates 142A in the manner indicated in the illustration. Outputs of the array 142*a* are passed to NOR gate 144*a* to produce a binary signal, MY P NOK*, representative of the validity of information transfer signals received from the P bus 30A. In particular, MY P NOK* has an assertive state indicating that signals received from the P bus by the i/o controller, e.g., controller 18, contain errors. While, MY P NOK* has a non-assertive state indicating that no obvious fault has occurred in the signals received from the P bus. The signal MY P NOK* is routed through inverter 146*a*.

In a similar manner, the AND gates 142*b* and NOR gate 144*b* produce a binary signal, MY Q NOK*, representative of the validity of information transfer signals received from the Q bus 30B. The signal MY Q NOK* is routed through inverter 146*b*.

The AND gates 142C, 142D and NOR GATE 144C are arranged to generate an I WAIT* signal, having an assertive state indicating that the controller is to delay generation of the strobe signal.

The NAND gate 150 is arranged to generate a binary signal, PK ONLINE*, as a boolean NAND of the following input signals:

| Signal | Description |
|---|---|
| BROKEN BUF* | |
| PK COMARE | |
| PBUS ENS D | |

The PK ONLINE* signal, which has an assertive state indicating that the associated i/o controller is online, is negated by negated-input OR gate 152, as shown. The resulting signal PK ONLINE is tied through resistor 156 to potential +VCC and, further, is coupled to an input of each of the NAND gates in array 148. The output of gate 152 is also retained in buffer 154 to provide the buffered signal BUF PK ONLINE.

With further reference to FIG. 3, outputs of each of inverters 146*a* and 146*b*, as well as each of the signals listed below, is provided as a second input to individual NAND gates in array 148.

| Signal | Description |
|---|---|
| MY CD EQ* | output of comparator 100 |
| MY FLASH EQ* | output of comparator 104 |
| STRB HOLD D | drive side of i/o controller delaying strobe signal generation |
| STRB HOLD C | check side of i/o controller delaying strobe signal generation |
| STROBE D | drive side regenerate of strobe |
| STROBE C | check side regenerate of strobe |

The output of the NAND gates of array 148 are passed to the open collector conductors of flash bus 19 as shown in the illustration.

Strobe Signal Generation

Figure 4:
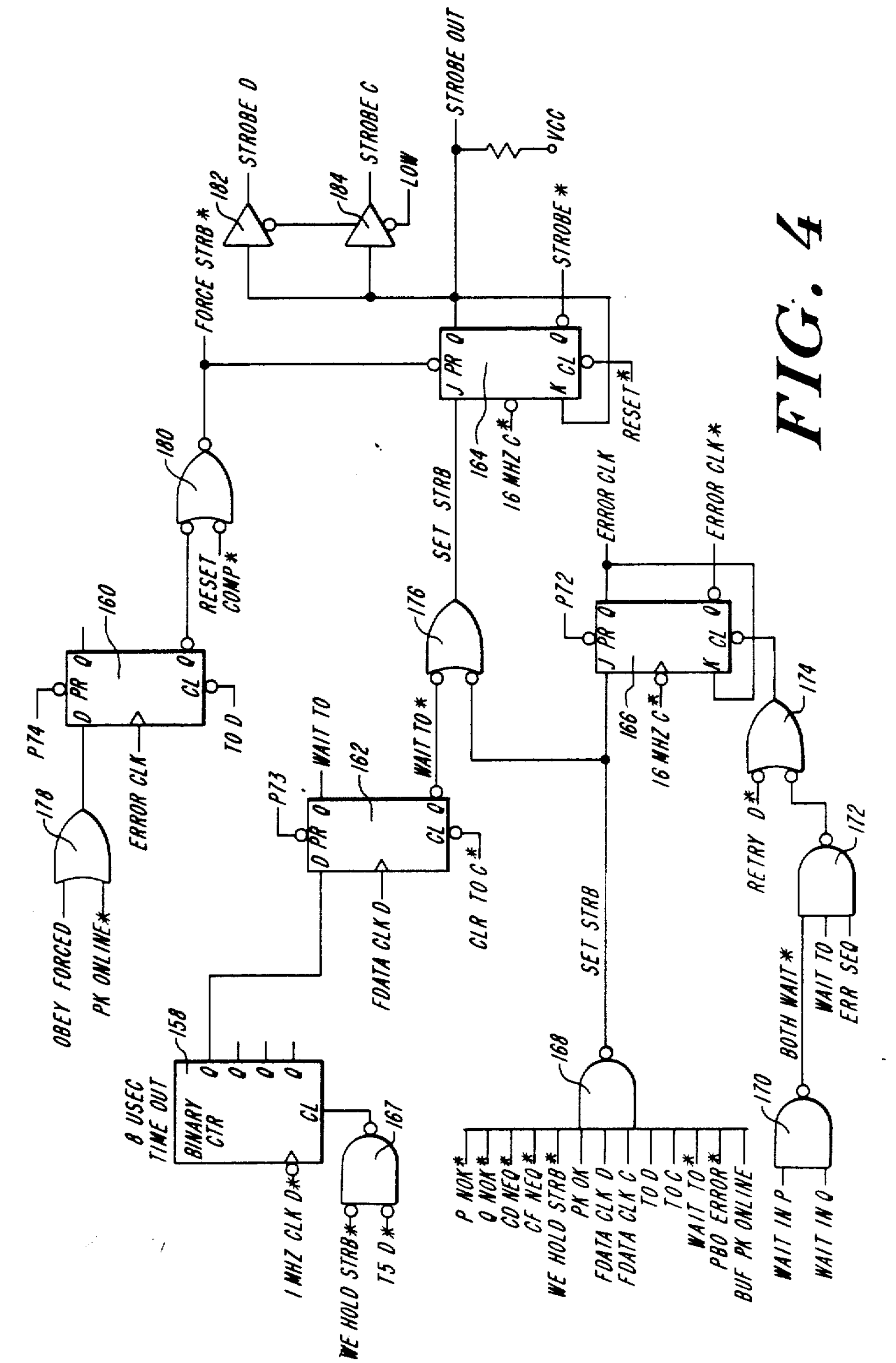
FIG. 4 illustrates a preferred configuration of circuitry used to generate pre-strobe signals.

FIG. 4 depicts one preferred configuration of circuitry used to generate pre-STROBE signals in i/o controller 18, 20. The illustrated circuitry includes counter 158, flip-flops 160, 162, 164, 166, NAND gates 167, 168, 170, 172, OR gates 174, 176, 178, NOR gate 180, and buffers 182, 184.

The counter 158 is driven by a 1 MHz clock signal provided in the drive side of the i/o controller. A clear input to the counter 158 is provided by the output of NAND gate 167, having at its negated inputs, a WE HOLD STROBE* signals and a timing signal, designated T5 D*. The fourth output bit of the timer 158 is coupled to "D" input of flip-flop 162, as shown.

The flip-flop 162 is arranged for generating a WAIT TO signal, reflecting that a time out is required in order to permit error checking. As shown in the illustrated embodiment a delay of eight microseconds, resulting from assertion by one or more peripherals of a WAIT signal on the peripheral bus, causes the aforementioned time out. The negated output the flip-flop 162 is routed to provide an input to OR gate 176.

A second input to OR gate 176 is provided by the SET STROBE output of NAND gate 168. Inputs to gate 168 include PNOK*, QNOK, CDNEQ*, We HOLD STRB*, PK OK, FDATA CLK D (an output of the drive side flash data clock), FDATA CLK C (an output of the check side flash data clock), T0 D (the drive side primary timing signal for the peripheral bus transfer cycle), T0 C (the corresponding signal generated on the check side), WAIT TO*, PBO error (indicating a bus obey error), and BUF PK ONLINE.

The SET STRB* output of NAND gate 168 is also provided as the "j" input to flip-flop 166. A clear input to that flip-flop is provided as an output of the gates 170, 172, and 174, as shown in the illustration. The flip-flop 166 provides as output the ERROR CLK and ERROR CLK* signals, which provide timing signals for the error sequence initiated by the i/o processor during the time out.

As shown at the top of FIG. 4, a FORCE STRB* signal is generated by the combined actions of flip-flop 160 and NOR gate 180. This FORCE STRB* serves as a preset to flip-flop 164, which serves to generate a STROBE OUT signal at its "Q" output. The clear input to that flip-flop is provided by a STROBE CLR* signal. A 16 MHz clock signals generated by the check side drives the flip-flop 164.

As further shown in the illustration, the STROBE OUT output of flip-flop 164 is retained in buffers 182 and 184, providing STROBE D and STROBE C signals, respectively.

Figure 5A:
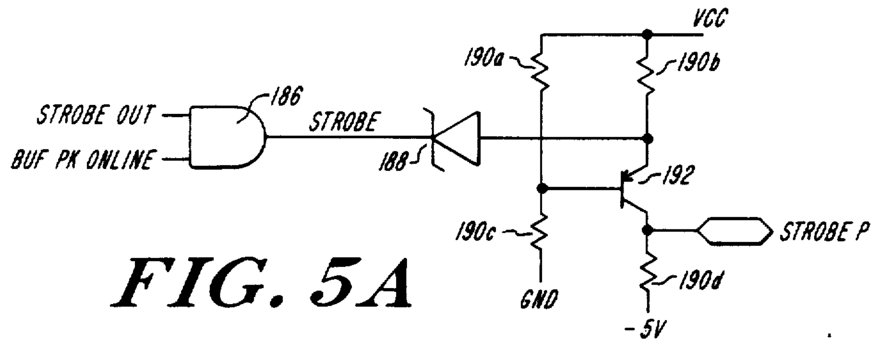
FIGS. 5A and 5B illustrate preferred circuitry for generating strobe signals.

FIG. 5A depicts a preferred circuit for generating a STROBE P signal for transmission along P bus 30A. The circuit includes a AND gate, having as its inputs the STROBE OUT signal (see FIG. 4) and a BUF PK ONLINE signal (see FIG. 3). The output of the AND gate 186 is output to the STROBE P pin of the bus 30A via diode 188, resistors 190*a*, 190*b*, 190*c*, 190*d*, and transistor 192, as shown.

Figure 5B:
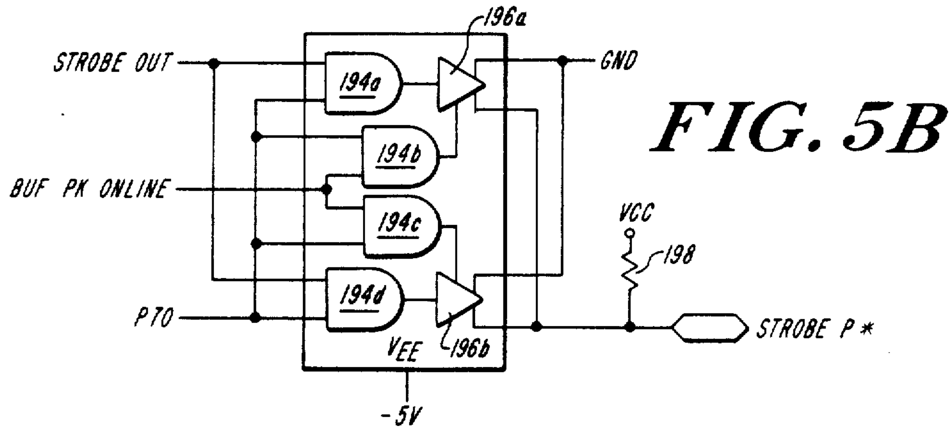

FIG. 5B depicts a preferred circuit for generating a STROBE P* signal for output along P bus 30A. The circuit includes an AND gate array 194*a*, 194*b*, 194*c*, 194*d*, and inverters 196*a*, 196*b* implemented in combination with resistor 198 as shown in the illustration.

Figure 6A:
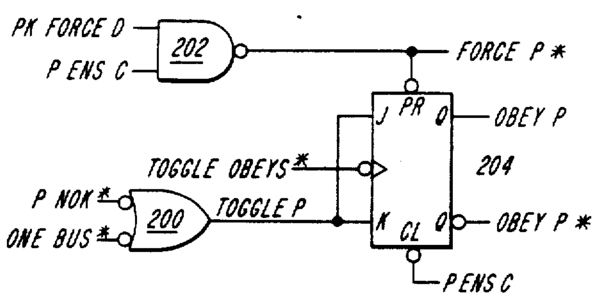
FIGS. 6A and 6B illustrate preferred circuitry for generating bus obey signals.

FIG. 6A depicts one preferred configuration of circuitry utilized in i/o controller 18, 20 for generating an OBEY P signal, conditioning the controller is to respond only to those peripheral bus signals received on the first i/o bus 30A. The illustrated circuitry includes OR gate 200, NAND gate 202, and flip-flop 204.

The OR gate 200 produces a TOGGLE P signal representative of a boolean logic OR of the P NOK* signal and the ONE BUS* signal (indicating that the i/o controller is currently conditioned to receive signals on only one of the i/o buses 30A, 30B). The TOGGLE P signal is routed to provide the "j" and "k" inputs to flip-flop 204.

The negated preset signal for flip-flop 204 is provided by the FORCE P* signal output of NAND gate 202. The FORCE P* signal results from the boolean NAND function of the PK FORCE D signal (indicating that the i/o controller is conditioned to respond on the drive side) and the P ENS D signal (indicating that the P bus is enabled).

Figure 7:
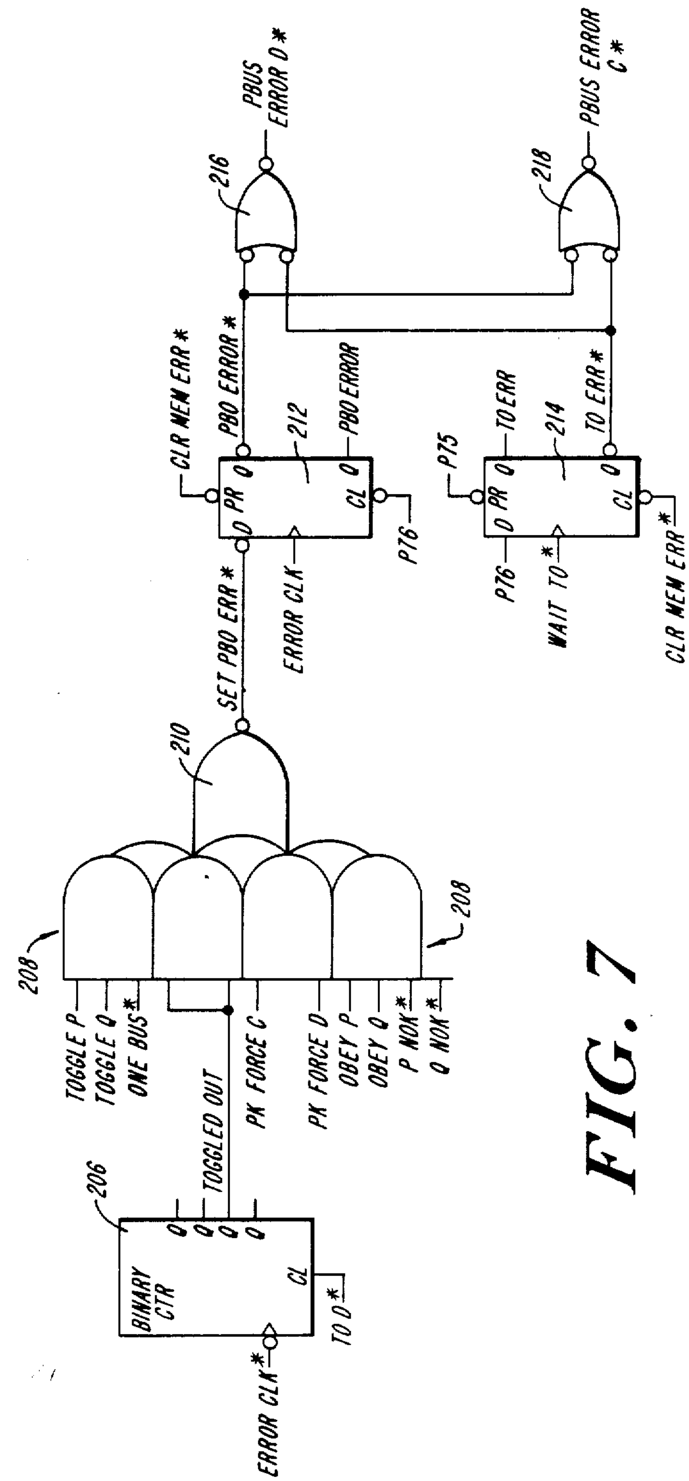
FIG. 7 illustrates one preferred circuitry for generating bus and time-out error signals.

A clock input to flip-flop 204 is provided by a TOOGLE OBEYS* signal, resulting from a boolean NAND of the ERROR CLK signal (see FIG. 4) and a PBO ERROR* signal (see FIG. 7).

The flip-flop 204 provides the aforementioned OBEY P signal at its "q" output, while providing the inverse signal, OBEY P*, as the negated output.

Figure 6B:
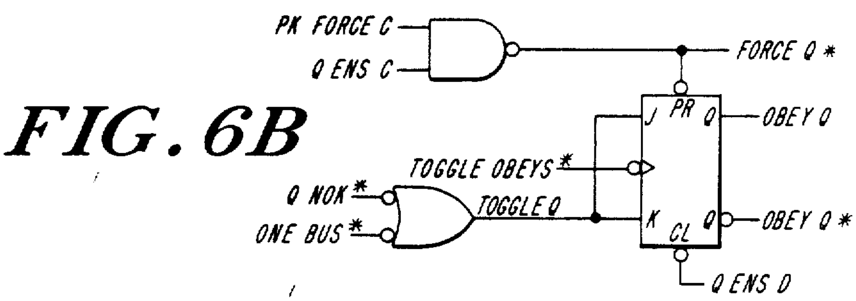

FIG. 6B depicts one preferred configuration of circuitry utilized in i/o controller 18, 20 for generating an OBEY Q signal, conditioning the controller is to respond only to those peripheral bus signals received on the second i/o bus 30B. The circuit is constructed similarly to that shown above in FIG. 6A.

FIG. 7 depicts one preferred configuration of circuitry utilized in i/o controller 18, 20 for generating bus and time-out error signals. The circuitry includes counter 206, AND gate array 208, NOR gate 210, flip-flops 212, 214, and NOR gates 216, 218.

As shown at the left of the illustration, the clear input of the counter is provided by the T0 D*, the inverse of the drive side 18B T0 clock signal. A clock input to the counter 206 is provided by the ERROR CLK* signal (see FIG. 4). The second output bit of counter 206 drives a TOGGLED OUT signal, which serves as an input to AND gate array 208. The AND gate array 208 also accepts as input TOGGLE P (FIG. 6A), TOGGLE Q (FIG. 6B), ONE BUS* (the inverse of a boolean exclusive OR of the OBEY P and OBEY Q signals), PK FORCE D, PK FORCE D, OBEY P (FIG. 6A), OBEY Q (FIG. 6B), P NOK*, and Q NOK* signals.

Output of AND gate array 208 is routed to NOR gate 210, as shown in the illustration. This gate produces a SET PBO ERR* signal, which provides an input to NOR gate 211. As illustrated, a second input to gate 211 is provided by the non-inverting output of flip-flop 212. The output of NOR gate 211 drives the "D" input of flip flop 212, as shown. In operation, once PRO ERROR* is set, it is held by the NOR gate 211 until cleared by the CLR MEM ERR* signal. The clock input for that flip-flop is provided by the ERROR CLK signal, while the preset is driven by the CLK MEM ERR* signal (indicating that the error signal is to be cleared). At its non-inverting output, the flip-flop 212 drives a PBO ERROR signal, indicating that a peripheral bus error has occurred.

As further shown in FIG. 7, the flip-flop 214 has a clock input which is driven by the WAIT TO* signal (FIG. 4), and a clear input driven by the CLR MEM ERR* signal. At its inverting output, the flip-flop 214 drives a TO ERR* signal, indicating that a time-out error has occurred.

The PBO ERROR* and TO ERR* signal are routed to inverting inputs of NOR gates 216 and 218, as shown. Output of these gates provide PBUS ERROR D* and PBUS ERROR C* signals, indicating a peripheral bus error has been detected in each of the drive and check sections of the i/o controller.

Figure 8:
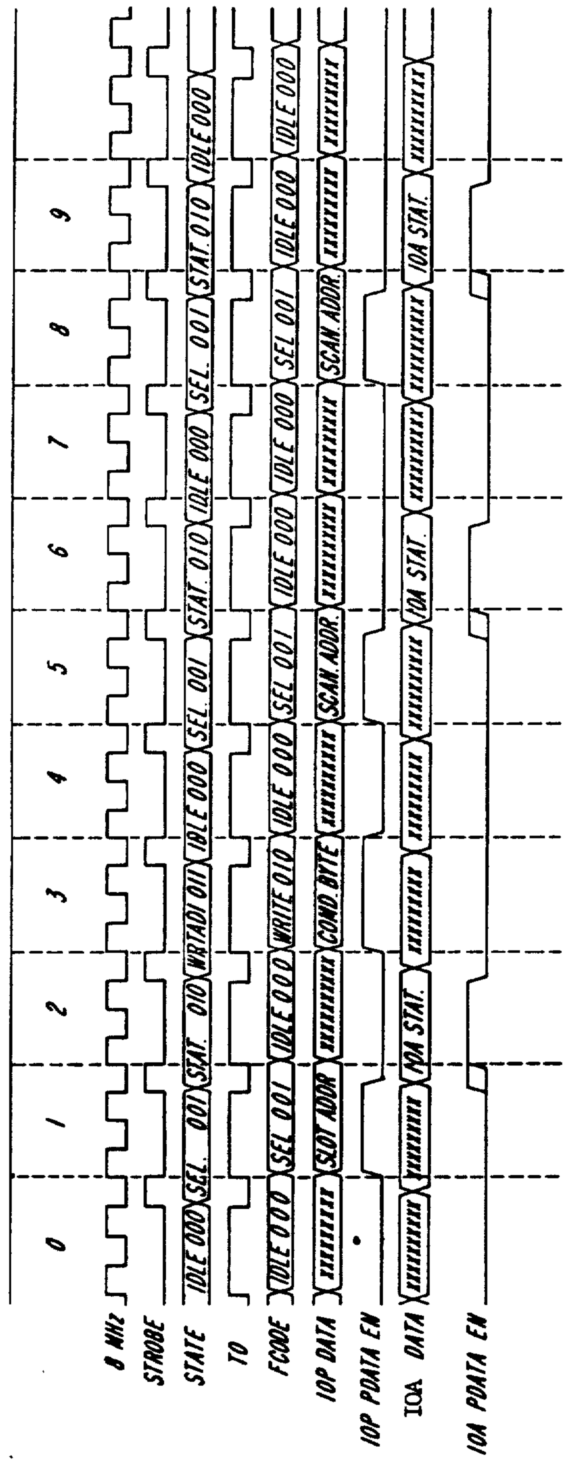
FIG. 8 illustrates a timing sequence for preferred command and scanner cycles.

FIG. 8 depicts a timing sequence for two information transfer cycle types—a command cycle and a scanner cycle—executed by an i/o controller acting according to a preferred embodiment of the invention. During a scanner cycle, the i/o controller, under control of its scanner units (FIG. 2, elements 124A, 124B), interrogates peripheral units and their respective interfaces, i.e., gate arrays and peripheral adaptors, to determine the operational state thereof. In a command cycle, on the other hand, the i/o controller sends a one-byte command to a selected peripheral device.

Referring to FIG. 8, wave forms transmitted on the strobe conductors of each of the first and second i/o buses, i.e., the STROBE signal, are shown on wave form line 220. Falling edges of the STROBE signal define information transfer timing intervals, as shown by consecutively numbered time intervals at the top of the illustration. Line 222 represents the content of signals transferred on the function code conductors of each of the first and second i/o buses, while line 224 represents the content of signals transferred on the data conductors of those buses.

As indicated by line 222 in Timing Interval 0, the system is in an idle state, with an IDLE function code being asserted on the i/o bus function code conductors. Concurrently, as shown by line 224, all one's are asserted on the data conductors.

In Timing Interval 1, the i/o controller commences a command cycle. Particularly, the SELECT function code is asserted on the function code conductors—see line 222—while a peripheral selection addressing byte is transmitted on the data conductors—see line 224. This peripheral selection addressing byte can include, as in the preferred embodiment, four SLOT ID bits and four "subchannel" bits. Gate arrays (FIG. 1, elements 32, 34 . . . 42) can be conditioned to respond to selected channel/subchannel bit patterns to determine whether the command cycle is directed to the gate array, its associated adaptor, and/or its associated peripheral device.

In Timing Interval 2, the i/o controller asserts IDLE on the function code conductors of the i/o buses while monitoring the data conductors of those buses to receive a response from the addressed peripheral device or interface. In absence of fault, the i/o controller will expect to receive an ALIVE signal—e.g., an asserted seventh bit in an otherwise non-asserted transmission byte—on the data conductors, indicating that the addressed peripheral is operational. The addressed peripheral and interface can also respond, during the Timing Interval 2, with a signal indicating that an interrupt is pending, or with signals indicating which i/o buses are being obeyed. Absent error, the command cycle continues in Timing Interval 3 with the transmission of a peripheral/interface command signal. In one embodiment, that signal can represent one of six commands and have the following format;

| Command | Bit Pattern* |
|---|---|
| Reset | "100XX000" |
| Clear Interrupt | "100XX001" |
| Toggle Obey P* | "100XX010" |
| Toggle Obey Q* | "100XX011" |
| Clear Broken | "100XX100" |
| Set Broken | "100XX101" |
| Set Interrupt | "100XX110" |
| CLR CPU Reset | "100XX111" |

*the designation "X" represents an unused bit

Following transmission of the peripheral/adaptor command signal, the illustrated system re-enters the idle state, with the transmission of an IDLE signal on the function code conductors of the i/o buses; see Timing Interval 4.

With further reference to FIG. 4, Timing Intervals 5-6, and 7-8 illustrate the execution of two scanner cycles. More particularly, as shown in Timing Interval 5, the i/o controller 18 initiates a scanner cycle by transmission, on the function code conductors of the i/o buses, a SELECT signal (e.g., having a unique bit pattern "001"). Concurrently, the i/o controller transmits on the data conductors a peripheral selection addressing byte directed to the peripheral/adapter being polled.

In the subsequent interval, i.e., Timing Interval 6, the i/o controller transmits an IDLE signal on the function code conductors, while monitoring the data conductors for a peripheral/adaptor response. According to one preferred embodiment, a response signal constitutes a one byte transmission having the following format:

| Bit | Content |
|---|---|
| 07 | ALIVE - peripheral is operation or "alive" |
| 06 | INTERRUPT - peripheral/interface signalling an interrupt |
| 05 | Obey P* - interface not receiving signals on the P bus |
| 06 | Obey Q* - interface not receiving signals on the Q bus |
| 03-10 | interrupt code |

As indicated by line 222, the i/o controller enters the idle state in Timing Interval 7, following receipt of the peripheral/interface response.

A further scanner cycle is shown in timing intervals 8-9, proceeding in the same manner as the cycle discussed above.

Figure 9:
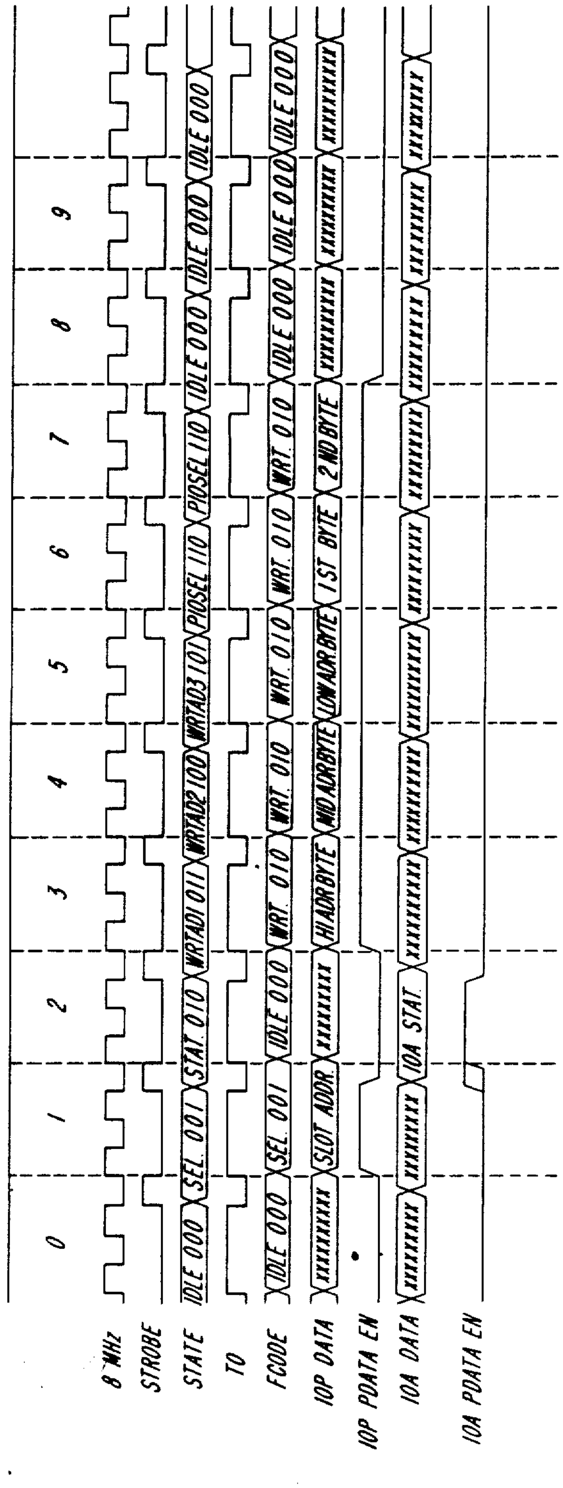
FIG. 9 depicts a timing sequence for a preferred peripheral i/o write cycle.

FIG. 9 depicts a timing sequence for a peripheral i/o (PIO) write cycle. As noted above, this information transfer cycle provides a mechanism through which the i/o controller can transfer a data word to an attached peripheral device.

As above, the timing sequence for the PIO write cycle is shown by way of a strobe line 226, a function code phase line 228,, and a data phase line 230. Moreover, the falling edges of the strobe line 226—representing the STROBE signal—define the PIO write cycle timing intervals. Numbering for these intervals is given at the top of the illustration.

In accord with function code phase line, the i/o controller is in its idle state in time interval 0. At time interval 1, the controller commences the PIO write cycle. Particularly, during that timing interval, the controller transmits a SELECT signal, accompanied by a peripheral selection address byte, on the function code and data conductors of the i/o buses; see function code phase line 228, data phase line 230. As above, the controller awaits a response from the addressed unit in time interval 2.

Assuming no error or interrupt signal is received during the response interval, the i/o controller transmits the data write address the next three timing intervals. Particularly, during time interval 3, the controller asserts a WRITE signal on the function code conductors, while asserting the high-order byte of the write address on the data conductors. During time interval 4, the controller continues assertion of the WRITE signal, while asserting the middle-order byte of the write address on the data conductors. Further, during time interval 5, the controller transmits the low-order byte of the write address on the data conducts, while continuing assertion of the WRITE signal on the function code conductor.

As shown by function code phase line 228, the i/o controller sends write data on the peripheral bus subsequent to transmission of the write data address. Specifically, the controller transmits the high-order byte of write data on the data conductors during time interval 6 and transmits the low-order byte of write data on the data conductors during time interval 7. The controller maintains assertion of the WRITE signal of the function code controllers during these intervals.

Subsequent to transmission of the write data, the i/o controller re-enters the idle state, with transmission of the IDLE signal of the function code conductors; see function code phase line 228.

Figure 10:
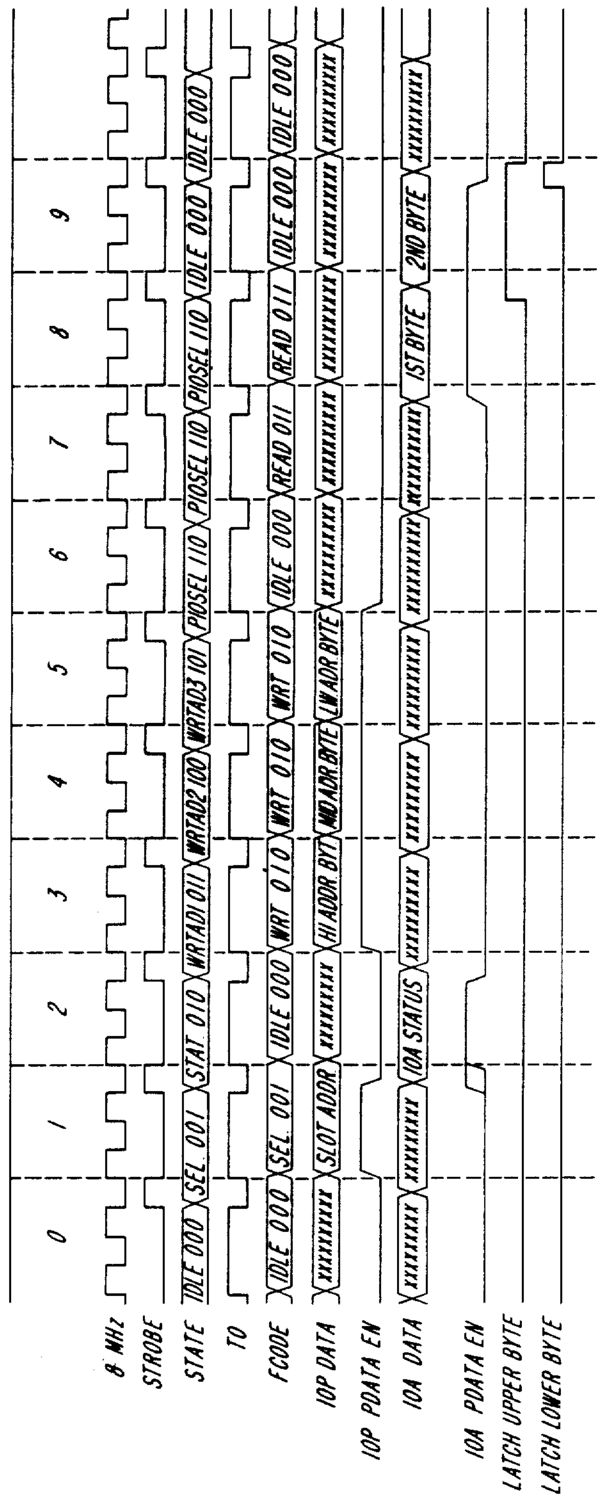
FIG. 10 depicts a timing sequence for a preferred peripheral i/o read cycle.

FIG. 10 depicts a timing sequence for a peripheral i/o (PIO) read cycle. This information transfer cycle provides a mechanism through which the i/o controller 18 requests the transfer of a read data word from an attached peripheral device. As above, timing for the cycle is indicated through strobe line 232, function code phase line 234, and data phase line 236. Timing intervals, defined by the falling edge of the strobe line 232, are shown across the top of the illustration.

The i/o controller 18 initiates a PIO read cycle in a manner similar to that of the PIO write cycle, to wit, the controller selects a peripheral unit and transmits three bytes of address information. In this instance, however, that address information indicates the location from which data is to be read). See function code and data phase lines 234, 238.

Following transmission of the read data address information, the controller 18 asserts IDLE on the function code conductors. This signals the addressed unit that a read cycle—as opposed to a write cycle—has commenced. The unit accordingly reads the addressed data locations and begins data transmission. More particularly, in Time Interval 7, the addressed unit sends a first byte of read data, while in Time Interval 8, the unit sends the remaining byte of data.

Apart from the first data byte, the i/o controller signals the addressed unit to continue read data transmission through successive assertions of the READ signal on the function code conductors. Thus, for example, the controller asserts the READ signal during Time Interval 7 in order to effect the transmission of a byte of read data in Time Interval 8. The controller's assertion of IDLE, e.g., during Time Interval 9, effects completion of the cycle. That is, no further data is transmitted by the addressed unit subsequent to assertion of the IDLE signal.

Peripheral Bus Selection and Control Logic

As noted above, the i/o controller 18 and, more particularly, processor 112A is arranged for two types of data access son the peripheral bus: direct memory access (DMA) and programmed i/o access (PIO). The PIO access moves only a single word on the bus 30, treating the peripherals as bank selected memory. The DMA, on the other hand, is designed for moving a continuous stream of bytes to a selected peripheral. In executing a DMA access, the controller 18 utilizes hardware assist which permits the processor 112A to move each read or write word of data in a single cycle. This hardware also calculates a checksum for every transferred word, in addition to permitting data verification (a verify cycle) for data written to the peripherals.

Peripheral Bus Timing

Figure 11:
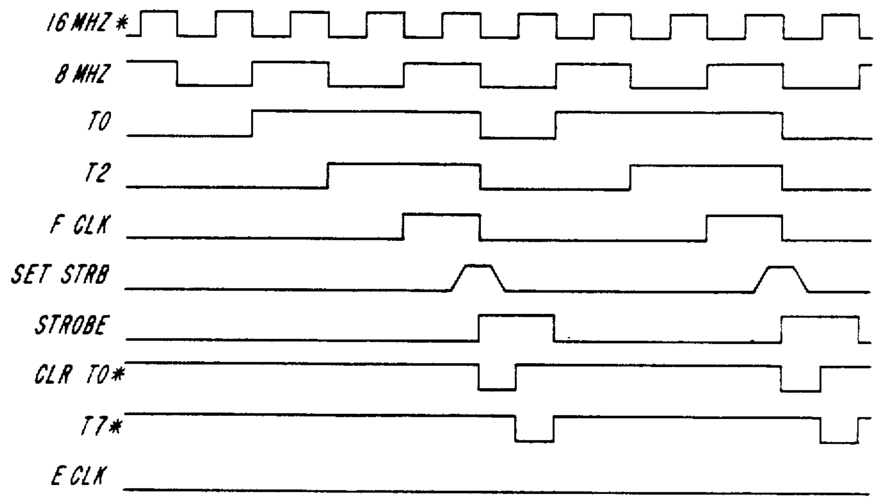
FIG. 11 illustrates a timing sequence for two normal peripheral bus interface cycles.

The peripheral bus timing, as shown in FIG. 11, is based on the falling edge of the 16 MHz* system backplane clock, provided along line 22C by a clock element (not shown). To maintain a substantially synchronous relationship between the 12 MHz processor 112A and the peripheral bus timing, controller 18 cycles only start on the leading edge of the interval 8 MHz clock.

The first 8 MHz edge after cycle commencement clocks T0. The next falling edge of 16 MHz* clocks interval T2, which would clock out data onto the peripheral bus during a write. The next falling edge of 16 MHz* clocks FDATA CLK, capturing data signals from the peripheral bus. The next rising edge of 16 MHz* clocks interval T5.

Figure 12:
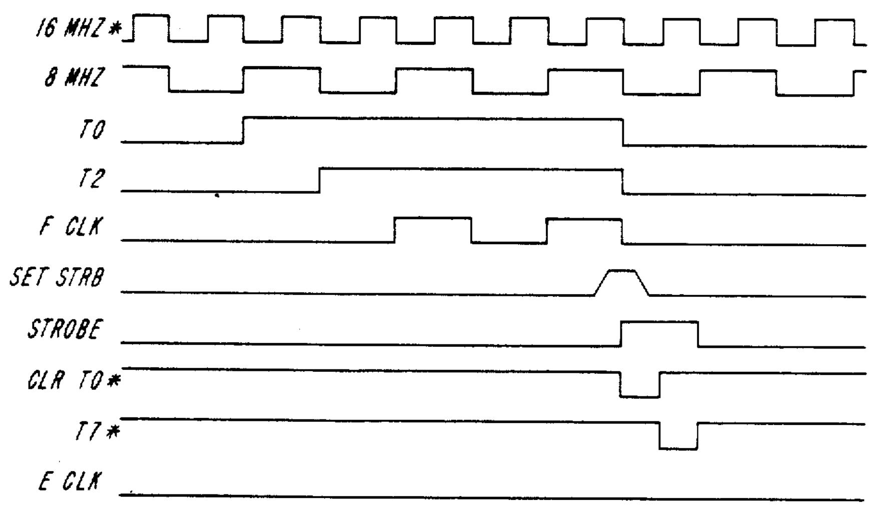
FIG. 12 illustrates a timing sequence for a peripheral bus interface cycle including two peripheral-bus/flash-bus comparisons.

If the proper conditions are met as a result of comparisons of the captured data, the signal SET STROBE* is asserted, and the next falling edge of the 16 MHz* clock signal will cause STROBE. If SET STROBE* is not asserted, as shown in FIG. 12, then that edge will only clear FDATA CLK. The next falling edge of 16 MHz* signal will clock FDATA CLK again, which will clock RETRY if the PBUS is not waiting.

The new data is then run through the comparisons and if SET STROBE* is asserted, STROBE will occur on the next falling edge of the 16 MHz* clock signal. If SET STROBE* is not asserted, then ERROR CLK will occur on the next falling edge of the 16 MHz* clock signal.

If STROBE does occur, the CLR T0 will be asserted until T7 at the next rising edge of the 16 MHz* clock signal. The deassertion of T0 clears T2 and T5. STROBE deasserting on the next falling edge of 16 MHz* clears T7. T0 can be reasserted by this same edge, starting a new cycle.

Peripheral Bus Accesses

Processor 112A accesses to the peripheral bus are initiated by the signal S4 SYNC which is the result of the first 8 MHz clock signal edge following S4 SYNC. S4 SYNC will be taken on the next STROBE into the peripheral bus interface select path and the cycle will begin.

A PIO cycle (address C00000x-FFFFFFx) is initiated as follows. In the list, the designation "^" indicates assertion of the corresponding signal

| | | |
|---|---|---|
| STATE | → | SELECT (0-0-1) on STROBE (If previous state was IDLE) |
| FCODE | → | SELECT (0-0-1) on T0 |
| DATA SOURCE | → | PIO SLOT ADDR (1-0-0) on T0 |
| PDATA EN | → | ASSERTED on T0 |
| STATE | → | STATUS (0-1-0) on STROBE |
| FCODE | → | IDLE (0-0-0) on T0 |
| DATA SOURCE | → | XXX on T0 |
| PDATA EN | → | DE-ASSERTED on T0 |
| STATE | → | WRADR1 (0-1-1) on STROBE |
| FCODE | → | WRITE (0-1-0) on T0 |
| DATA SOURCE | → | PIO ADR BYTE 1 (1-0-1) on T0 |
| PDATA EN | → | ASSERTED on T0 |
| STATE | → | WRADR2 (1-0-0) on STROBE |
| FCODE | → | WRITE (0-1-0) on T0 |
| DATA SOURCE | → | PIO ADR BYTE 2 (1-1-0) on T0 |
| PDATA EN | → | ASSERTED |
| STATE | → | WRADR3 (1-0-1) on STROBE |
| FCODE | → | WRITE (0-1-0) on T0 |
| DATA SOURCE | → | PIO ADR BYTE 3 (1-1-1) on T0 |
| PDATA EN | → | ASSERTED |

-continued

| | | |
|---|---|---|
| STATE | → | SELECT OK for PIO (1-1-0) on STROBE |
| | A PIO WRITE cycle proceeds from initiation as follows: | |
| FCODE | → | WRITE (0-1-0) on T0 |
| DATA SOURCE | → | UPPER DATA BYTE 1 (0-1-0) on T0 (if UDS asserted) |
| PDATA EN | → | ASSERTED |
| STATE | → | SELECT OK for PIO (1-1-0) on STROBE |
| FCODE | → | WRITE (0-1-0) on T0 |
| DATA SOURCE | → | LOWER DATA BYTE 1 (0-1-1) on T0 (if LDS asserted) |
| PDATA EN | → | ASSERTED |
| STATE | → | IDLE (0-0-0) on STROBE |
| FCODE | → | IDLE (0-0-0) on T0 |
| DATA SOURCE | → | ALL ASSERTED (0-0-0) on T0 |
| PDATA EN | → | DE-ASSERTED on T0 |
| STATE | → | IDLE (0-0-0) or SELECT (0-0-1) on STROBE |
| | A PIO READ cycle proceeds from initiation as follows: | |
| FCODE | → | IDLE (0-0-0) on T0 |
| DATA SOURCE | → | UPPER DATA BYTE 1 (0-1-0) on T0 (if UDS asserted) |
| PDATA EN | → | DE-ASSERTED |
| STATE | → | SELECT OK for PIO (1-1-0) on STROBE |
| FCODE | → | READ (0-1-1) on T0 |
| DATA SOURCE | → | UPPER DATA BYTE 1 (0-1-0) on T0 |
| PDATA EN | → | DE-ASSERTED |
| STATE | → | SELECT OK for PIO (1-1-0) on STROBE |
| FCODE | → | READ (0-1-1) on T0 |
| DATA SOURCE | → | UPPER DATA BYTE 1 (0-1-0) on T0 (if UDS asserted) |
| PDATA EN | → | DE-ASSERTED |
| STATE | → | IDLE (0-0-0) on STROBE (first data byte latched) |
| FCODE | → | IDLE (0-0-0) on T0 |
| DATA SOURCE | → | LOWER DATA BYTE (0-1-1) on T0 (if LDS asserted) |
| PDATA EN | → | DE-ASSERTED |
| STATE | → | IDLE (0-0-0) on STROBE (second data byte latched) |
| FCODE | → | IDLE (0-0-0) on T0 |
| DATA SOURCE | → | ALL ASSERTED (0-0-0) on T0 |
| PDATA EN | → | DE-ASSERTED |
| STATE | → | IDLE (0-0-0) or SELECT (0-0-1) on STROBE |

If processor makes a word access (with the upper data select signal, UDS, and the lower data select signal, LDS, asserted), then the control logic will access two consecutive bytes from the peripheral bus 30 during the one select. If the processor makes a long word operation, which is actually two word operations, then the control logic will make two peripheral bus selects, each time moving two bytes prior to de-selecting.

If the processor 112A makes a long word write to address BF9004x, BF9008x, or BF900Cx, then the cycle will be a DMA SELECT as follows:

| | | |
|---|---|---|
| STATE | → | SELECT (0-0-1) on STROBE (If previous state was IDLE) |
| FCODE | → | SELECT (0-0-1) on T0 |
| DATA SOURCE | → | UPPER DATA BYTE (0-1-0) on T0 |
| PDATA EN | → | ASSERTED on T0 |
| STATE | → | STATUS (0-1-0) on STROBE |
| FCODE | → | IDLE (0-0-0) on T0 |
| DATA SOURCE | → | XXX on T0 |
| PDATA EN | → | DE-ASSERTED on T0 |
| STATE | → | WRADR1 (0-1-1) on STROBE |
| FCODE | → | WRITE (0-1-0) on T0 |
| DATA SOURCE | → | LOWER DATA BYTE (0-1-1) on T0 |
| PDATA EN | → | ASSERTED on T0 |
| STATE | → | WRADR2 (1-0-0) on STROBE |
| FCODE | → | WRITE (0-1-0) on T0 |
| DATA SOURCE | → | UPPER DATA BYTE (0-1-0) on T0 |

-continued

| | | |
|---|---|---|
| PDATA EN | → | ASSERTED |
| STATE | → | WRADR3 (1-0-1) on STROBE |
| FCODE | → | WRITE (0-1-0) on T0 |
| DATA SOURCE | → | LOWER DATA BYTE (0-1-1) on T0 |
| PDATA EN | → | ASSERTED |
| STATE | → | SELECT OK for DMA (1-1-1) on STROBE |

The adaptor is now SELECTED for READ or WRITE or VERIFY. If the SELECT was for WRITE, then the select is complete and no more STROBE signals will be asserted until the processor actually wants to move DMA data. If the SELECT was for either READ or VERIFY, then two more cycles will occur as follows:

| | | |
|---|---|---|
| FCODE | → | IDLE (0-0-0) on T0 |
| DATA SOURCE | → | UPPER DATA BYTE 1 (0-1-0) on T0 (if UDS asserted) |
| PDATA EN | → | DE-ASSERTED |
| STATE | → | SELECT OK for DMA (1-1-1) on STROBE |
| FCODE | → | READ (0-1-1) on T0 |
| DATA SOURCE | → | UPPER DATA BYTE 1 (0-1-0) on T0 |
| PDATA EN | → | DE-ASSERTED |
| STATE | → | SELECT OK for DMA (1-1-1) on STROBE |

At this point, the first data byte will be on the peripheral bus 30 waiting to be latched in. It cannot be latched until the processor 112A makes its first DMA CYCLE access so that the first byte can be properly placed in either the upper or lower latch, depending on the states of UDS and LDS.

It will be appreciated that during a DMA cycle the processor 112A performs a cycle for each data transfer to or from the buffers; however, it does not move the data itself. The direction of the transfer is considered to have previously been set by the address of the selection. Accordingly, the processor 112A merely provides the virtual memory address of a page marked for the DMA access.

That is, where processor 112A performs a read to a virtual page marked DMA while the controller 18 has selected a peripheral for DMA, then data will be transferred in the direction set by the selection address, to or from the physical page as mapped. A write to a DMA marked page while the controller 18 has selected a peripheral for DMA will cause a processor exception, BERR.

The illustrated controller 18 advantageously employs a programmable array logic chip, the BUFFER MANAGER PAL, to control the peripheral bus cycles once a peripheral has been selected. If selected for DMA write, then the BUFFER MANAGER PAL fills the outbound data buffers asynchronously when they are empty and the processor 112A has data ready for them during a DMA CYCLE. Once filled, the BUFFER MANAGER PAL starts peripheral bus cycles and empties the buffers synchronously with T2, as each byte is presented on the peripheral bus. When the buffer is empty, then the BUFFER MANAGER PAL stops requesting cycles until the processor 112A returns with more data.

When the processor 112A starts the next DMA cycle and S4 SYNC is asserted, then the BUFFER MANAGER PAL will return a buffer load signal PBUF RDY when the buffers needed for this cycle are empty.

After PBUF RDY is asserted, the processor 112A cycle can complete when the data is valid and ready to latch into the outbound buffers.

If selected for a DMA read, then the BUFFER MANAGER PAL requests cycles to fill the inbound data buffers when empty. This data is latched in the buffers synchronous with STROBE. When the buffers are full, and the processor 112A performs a DMA cycle, then the BUFFER MANAGER PAL will issue a PBUF RDY, resulting in the signal DTACK being asserted and either a local memory or a standard bus interface write commencing.

The illustrated controller 18 is also capable of performing a "verify" operation to insure that data written to the permanent storage media, e.g., disk drives, is valid. Selecting for a verify cycle is a hybrid operation of the read and write cycle. The logic on the controller 112A, except for the function code, is performing a write without the data enable signal PDATA EN being asserted. Here, peripheral bus interface logic selects a peripheral for a read, ending the select phase as in a normal read cycle, with the first data byte waiting on the bus for the processor 112 to return with the first DMA cycle.

Subsequently, when the first DMA cycle occurs, data is read out of either main or local memory, depending on the DMA mapped page, and written into the outbound data buffers as in a DMA write cycle. The BUFFER MANAGER PAL, detecting a full buffer, commences a peripheral bus cycle with the assertion of T0. At timing interval T2, a data byte out of the buffer is latched into the output register, which would otherwise result in the placement of data on the peripheral bus, where, for example, PDATA EN was asserted. Since it is not, however, when FDATA CLK is asserted, data from the peripheral is latched into input registers. The result of the loopback comparator 76A is used to determine if the data otherwise being written is the same as the data byte being read back. If it is the same, the verify data is deemed valid; otherwise, the verify data is invalid.

FIGS. 11-14 illustrate the internal operation of a preferred i/o controller 18, 20 constructed in accord with the invention. More particularly, the illustrations depict a controller's peripheral bus interface cycle, i.e, the cycle during which the i/o controller takes data from the peripheral bus.

FIG. 11 illustrates a timing sequence for two normal peripheral interface cycles. That is, the illustration depicts the wave forms occurring during two cycles in which error-free, duplicated signals are received on the first and second i/o buses 30A, 30B by the partnered i/o controllers 18, 20.

In the illustration, the waveforms are defined as follows:

| Signal | Definition |
|---|---|
| 16 MHz* | Inverse of the sixteen megahertz clock signal |
| 8 MHz | Eight megahertz timing signal derived from 16 MHz clock signal |
| T0 | Timing signal having a leading edge which defines the start of a peripheral interface cycle |
| T2 | Timing signal derived from T0 having a leading edge which rises 125 nanoseconds after T0 and having a trailing edge which falls with T0 |

-continued

| Signal | Definition |
|---|---|
| F CLK | Flash clock signal defining instants at which the flash circuitry compares operational states of the first i/o controller 18 and its partner, i/o controller 20; the signal is generated at the non-inverting output of a flip-flop having its "J" input driven by SET STRB*, its "K" input tied to its non-inverting output, its clock input driven by 16 MHz*, its clear input driven by T2. |
| SET STRB | Timing signal for setting the strobe flip-flop; see FIG. 4, element 176 |
| STROBE* | Timing signal defining peripheral bus interface cycles |
| CLR T0* | Signal for clearing T0 |
| T7* | Timing signal for seventh interval |
| E CLK | Error clock signal; see FIG. 4, element 166 |

In FIG. 11, the first of the illustrated peripheral interface cycles begins with the first rise of wave form T0 and ends with the first fall of wave form STROBE. The second of the cycles begins with the second rise of wave form T0 and ends with the fall of wave form STROBE.

Peripheral Bus Error Handling

Peripheral bus data signals are captured by the i/o controller 18 at F CLK and compared by drive and check sides, as well as between partner controllers 18, 20. The results of these comparisons are shared between partners to that all peripheral bus obey/error decisions are made identically between boards even if only one board saw an error.

If the results of the comparisons indicate that the data captured by both boards agrees and is of good parity, then the bus inerface cycle continues with the issuing of STROBE on the next falling edge of 16 MHz*. If the data captured at F CLK does not agree between boards (as indicated by the WE signals), then a RETRY F CLK is issued capturing data on the bus again. The same comparisons are made with the cycle continuing if the boards agree.

FIG. 12 illustrates a timing sequence for a peripheral bus interface cycle in which the peripheral performs two peripheral bus/flash bus comparisons (hereinafter, referred to as "bus comparisons") to determine that duplicative data is received synchronously and simultaneously by the first and second processing sections 18A, 18B of the first and second peripheral controller 18, 20.

In the illustration, the peripheral bus interface cycle commences with the rise of the leading edge of wave form T0. A bus comparison is performed during the first interval in which the wave form F CLK is high; see corresponding FDATA CLK D and FDATA CLK C signals providing inputs to element 168 of FIG. 4.

As a result of the flash circuitry's detection of an improper condition during the first bus comparison—indicated by the failure of SET STRB to become asserted—the i/o controller performs a second bus comparison. This second comparison occurs during the second interval in which F CLK is shown to be asserted. As indicated by the illustration, this second interval begins 125 nanoseconds after the first interval ends.

As indicated by the rise of SET STRB, the second bus comparison results in a finding that the first and second processing sections 18A, 18B of the first and second i/o controller 18, 20 received duplicative information signals from the peripheral bus. Following the rise of SET STRB, the STROBE signal is asserted. With the fall of that signal, the illustrated cycle ends.

Figure 13:
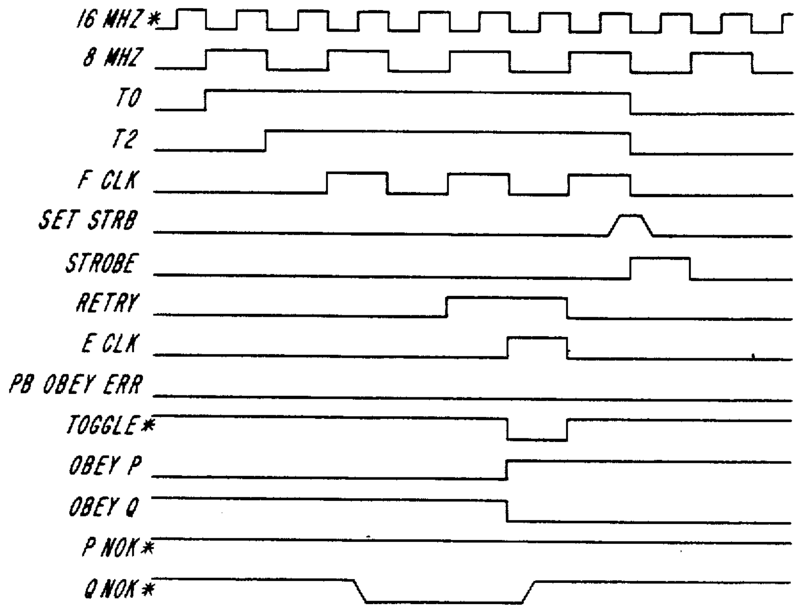
FIG. 13 depicts a timing sequence for a preferred bus interface in which the i/o controller switches bus obey modes.

FIG. 13 depicts a timing sequence for a preferred bus interface cycle where, in consequence to detecting an error, the i/o controller switches from a mode in which it obeys one of the i/o buses to a mode in which it obeys the other i/o bus. When this occurs, an ERROR CLK signal will be asserted instead of STROBE. The assertion of ERROR CLK will change the state of the obey signals as follows:

| CURRENT STATE | | | | | NEXT STATE | | |
|---|---|---|---|---|---|---|---|
| OBEY P | OBEY Q | P OK | Q OK | ERROR CLK | OBEY P | OBEY Q | P BERR |
| T | T | T | T | asserted | T | T | T |
| T | T | T | F | asserted | T | F | F |
| T | T | F | T | asserted | F | T | F |
| T | T | F | F | asserted | F | F | T |
| T | F | F | T | asserted | F | T | F |
| F | T | T | F | asserted | T | F | F |

In addition to the signals defined above, the illustration presents the following wave forms:

| Signal | Definition |
|---|---|
| RETRY | Signal defining onset of retry interval for rechecking signals received from the i/o buses |
| PB OBEY ERR | Peripheral bus obey error; see FIG. 7, element 212 |
| TOGGLE* | indicates upon assertion that the each side of the i/o controller (e.g., the drive and check sides) is enabled to toggle from its current obey state (e.g, obeying the P bus) to a new obey state (e.g., obeying the Q bus) depending upon the status of P NOK*, Q NOK*, OBEY P*, and OBEY Q* |
| OBEY P | Signal indicating that the i/o controller is processing signals received on the P bus |
| OBEY Q | Signal indicating that the i/o controller is processing signals received on the Q bus |
| P NOK* | Signal indicating that the P bus is not fault |
| Q NOK* | Signal indicating that the Q bus is not faulty |

With particular reference to FIG. 13, the illustrated bus interface cycle begins with the rise of the T0 signal. At the outset, the i/o controller is obeying the Q bus, but not the P bus. That is, the controller is processing signals receivd on the Q bus, while ignoring those signals received on the P bus. This is indicated by the OBEY Q signal, which is in its assertive state at the beginning of the cycle, while the OBEY P signal is initially in its non-assertive state.

As indicated by the F CLK wave form, upon the first tick of the flash clock, signals received by the i/o controller(s) 18, 20 from the Q bus are detected as faulty; see the deassertion of Q NOK*.

With the second tick of F CLK, the RETRY signal is asserted. This signal can be generated at the non-inverted output of a flip-flop having F CLK as it clocked input, having its non-inverting output coupled to its "K" input, and having its clear input driven by the NOR of T2 C* and WE HOLD STRB.

As shown earlier (see FIG. 4, elements 166 and 174), the ERROR CLK signal is generated in lieu of STROBE after RETRY is set and while SET STRB is not asserted. The ERROR CLK signal provides an input to a NAND gate, along with the PB OBEY ERR* signal (see FIG. 7, element 212) to cause TOGGLE to become asserted. This assertion enables the OBEY P and OBEY Q signals to change state.

At the time of the third illustrated flash clock—see the F CLK wave form—the i/o controller has switched from obeying the Q bus to obeying the P bus. The third illustrated flash clock forces a bus comparison (i.e., a comparison of the flash and peripheral bus signals) which reveals no error (see FIG. 14). Accordingly, SET STRB and STROBE are asserted, completing the bus interface cycle.

Figure 14:
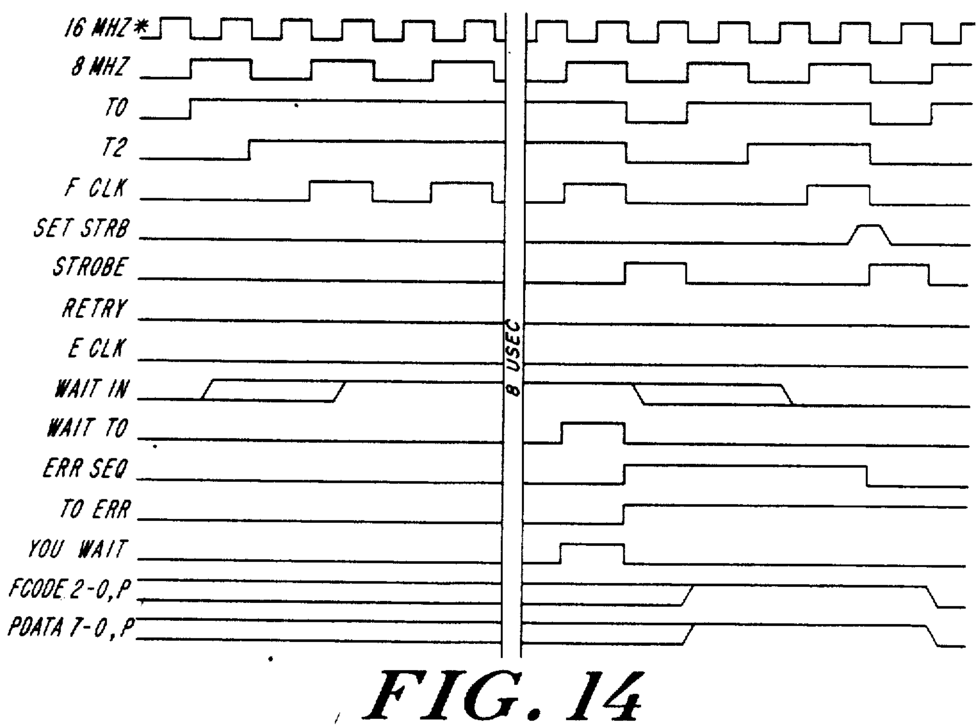
FIG. 14 illustrates a time-out sequence in a preferred i/o controller constructed according to the invention.

FIG. 14 illustrates a time out sequence in a preferred i/o controller constructed according to the invention. As noted above, those active peripheral devices which are attached to the peripheral bus constantly monitor and compare signals received on the first and second i/o buses. Whenever one of the peripherals detects an erroneous bus transmission, e.g., data signals received on the first i/o bus which do not match data signals received on the second i/o bus, the peripheral asserts WAIT on the corresponding conductors of the peripheral bus.

The i/o controller responds to brief assertions of WAIT by delaying until WAIT is deasserted any subsequent assertions of STROBE on the peripheral bus. In other terms, brief assertions of WAIT delay completion of a current bus interface cycle. This proves advantageous insofar as the delay permits the peripheral which was asserting WAIT to recheck incoming signals, which may have merely required extra time to settle or to rid themselves of interference.

However, in the event the i/o controller detects excessively lengthy assertions of WAIT, it enters an error checking sequence which allow it, as well as the peripheral devices, to locate the source of error. According to one embodiment of the inventions, the i/o controller will enter this error checking sequence if WAIT is asserted for more than eight microseconds.

In addition to those waveforms define above, FIG. 14 includes the following:

| Signal | Definition |
|---|---|
| WAIT TO | Wait time out signal; see FIG. 4, element 162 |
| ERR SEQ | Signal defining onset of i/o controller sequence for identifying a source of error |
| TO ERR | Signal defining a time out error |
| YOU WAIT | wait-related signal defined as a boolean AND of the WAIT TO and ERR SEQ* signals |

With particular reference to FIG. 14, if an attached peripheral detects an erroneous transmission on the peripheral bus, it asserts WAIT, which inhibits the i/o controller from asserting STROBE or RETRY. The assertion of WAIT simultaneously presets WE HLD STRB, so that the timing logic (FIG. 4) strobes only F CLK.

In addition to asserting WAIT, the fault-detecting peripheral can back-drive signals on the function code and data conducts of the first and second i/o buses. The function code loopback comparator (FIG. 2, element 74A, 74B) will, thus, indicate errors on both i/o buses. The data loopback comparators (FIG. 2, elements 76A, 76B) may also indicate errors if the i/o controller is driving data.

More particularly, if WE HLD STRB remains set for eight microseconds, the i/o controller 18 enters its time-out error sequence on the next strobe of F CLK.

The signal WAIT TIME-OUT is set by FDATA CLK and causes assertion of STROBE on the next falling edge of the timing signal 16 MHz*. The assertion of WAIT-TIME OUT also causes the controller 18 to assert WAIT back to the adaptors to insure that all adaptors enter the ERROR T2 sequence. This assertion of STROBE also clears the states of the peripheral bus selection logic, as well as clocking the adaptor asserting WAIT to deassert the WAIT conductor, the function code conductors and data conductors.

The rising edge of STROBE clears WAIT TIME-OUT, whose falling edge then sets the error signal TIME-OUT ERROR. With the function code states at IDLE, the BUFFER MANAGER PAL asserts the cycle initiation signal BCYC START regardless of the type of cycle the board was performing at the time of the assertion of WAIT TIME-OUT. The next rising edge of the 8 MHz starts the next part of the time-out cycle by asserting T0.

The assertion of T0 clocks the peripheral bus control logic into its time-out error sequence. Particularly, following the first assertion of T0 after the error signal TIME-OUT ERROR is asserted causes the controller 18 to assert all function codes conductors as well as selecting the data multiplexors 70A, 70B to assert all data conductors. Simultaneously, the controller 18 asserts the opposite data parity on the parity conductors. A STROBE for this cycle will normally occur if WAIT has been deasserted; however, if WAIT has not been deasserted and another WAIT TIME-OUT occurs, then another FORCED STROBE occurs along with an ERROR CLK. This ERROR CLK will change the buses as follows:

| WAIT P | WAIT Q | OBEY P | OBEY Q | OBEY P | OBEY Q |
|---|---|---|---|---|---|
| T | F | T | T | T | F |
| F | T | T | T | F | T |
| T | F | F | T | — | — |
| F | T | T | T | T | F |
| T | F | T | F | F | T |
| F | T | T | F | — | — |

While the description above relates generally to the first i/o controller 18 and, more particularly, to the first processing section 18B, it will be appreciated that the second i/o controller 20, as well as the second processing section 18C, are constructed and operate similarly to the apparatus described above.

Peripheral Device Interface

The i/o controllers 18, 20 communicate with the peripheral devices 24, 26, 28 via the peripheral bus 30. As noted above, the controllers 18, 20 address each peripheral device using the chassis slot number of the associated interface card, which includes the gate arrays and adaptors for the peripheral.

Figure 15:
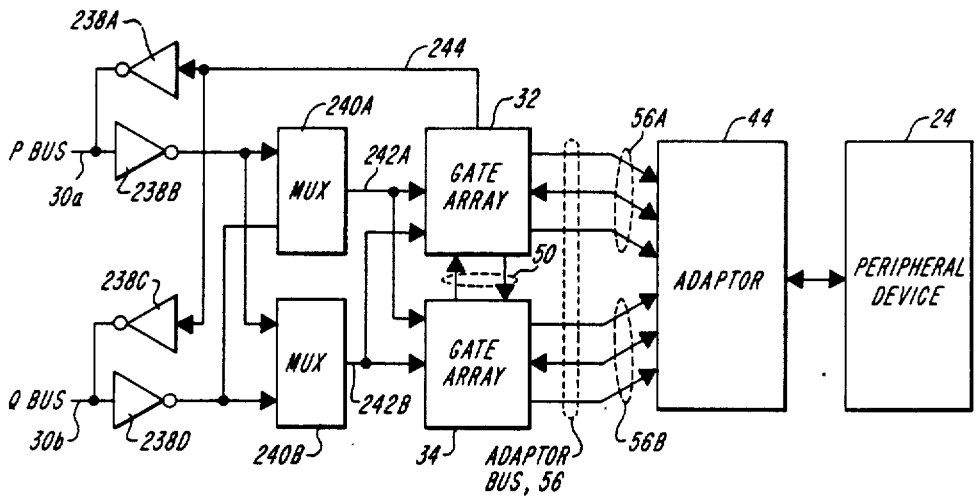
FIG. 15 depicts preferred circuitry for interfacing a peripheral device with the peripheral bus.

Referring to the drawings, FIG. 15 depicts preferred circuitry for interfacing a peripheral device 24 with the peripheral bus 30 and, more particularly, the first and second i/o buses 30A, 30B. The interface includes gate arrays 32, 34, adaptor 44, adaptor bus 56, inverters 238A, 238B, 238C, 238D, and registered multiplexors 240A, 240B.

As shown in the illustration, input signals received on the P bus 30A are routed through inverter 238B to both registered multiplexors 240A, 240B, while input signals received on the Q bus 30B are routed through inverter 238D to the multiplexors. From the registered multiplexors 240A, 240B, the input signals are routed on lines 242A, 242B to both gate arrays 32, 34, where the signals are checked and processed. Output signals produced by gate array 32 are routed via line 244 to the P bus and the Q bus via inverters 238A, 238C, respectively.

Figure 16:
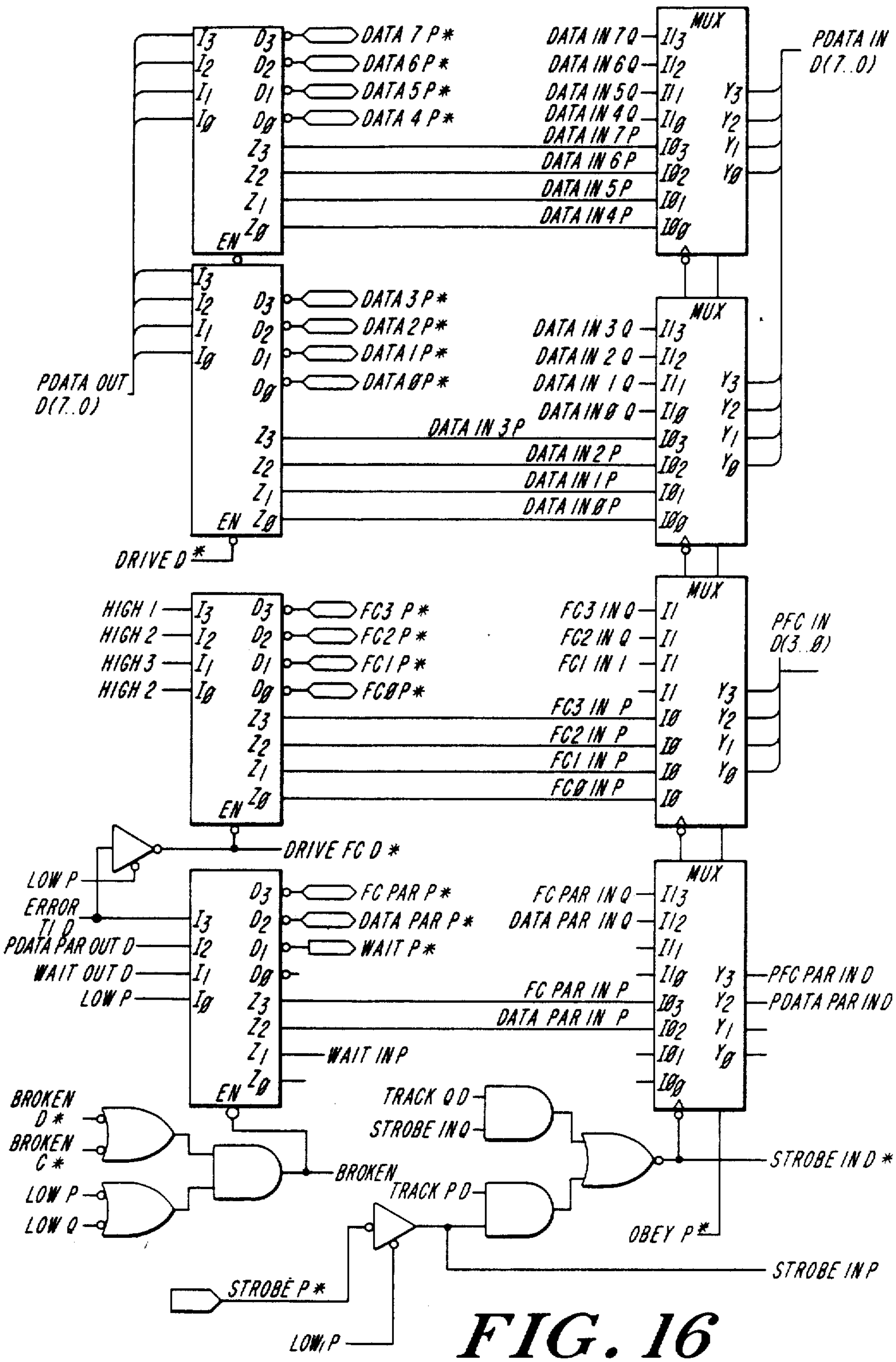
FIGS. 16 and 17 illustrate preferred bus interface circuitry for preferred gate arrays constructed in accord with the invention.
Figure 17:
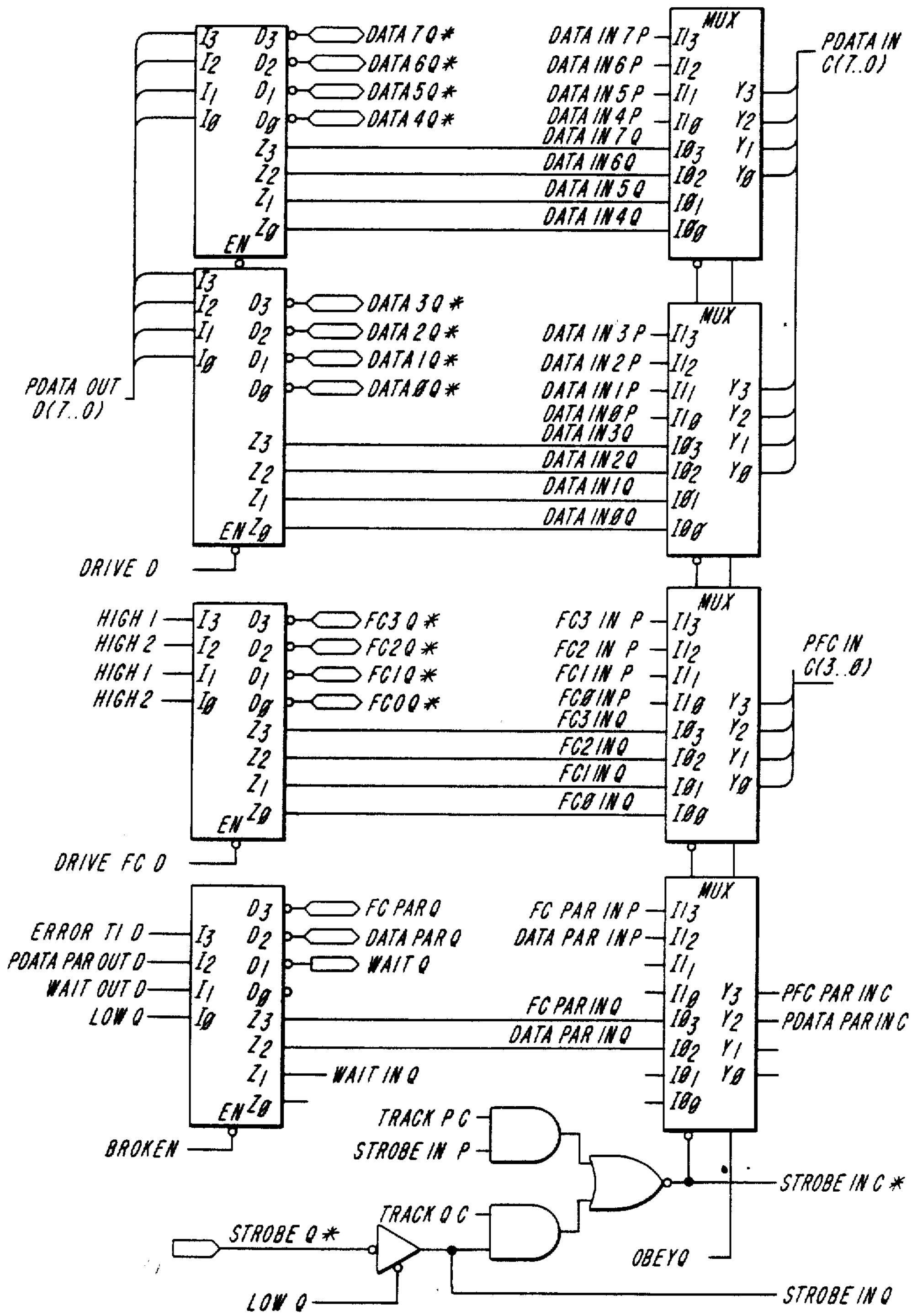

The bus interface logic is presented in greater detail in FIGS. 16 and 17. More particularly, FIG. 16 illustrates the circuitry interconnecting the peripheral bus 30 and the gate arrays 32, 34. Specifically, that illustration depicts circuitry which makes up inverters 238A, 238B, and multiplexor 240A (FIG. 15). On input, this circuitry routes data, function, and strobe signals from the P bus 30A to its principle associated gate array 32, i.e., the "drive" side array, as well as to the partner array 34. On output, this circuitry routes data, function, and WAIT signals from the gate array 32, 34 to both i/o buses, i.e., P bus 30A and Q bus 30B.

Similarly, FIG. 17 illustrates circuitry interconnecting the peripheral bus 30 and the gate arrays 32, 34. Specifically, the illustration depicts circuitry making up inverters 238C, 238D, and multiplexor 240B (FIG. 15). The illustrated circuit routes data between the Q bus (30B) and its principle associated gate array 34, i.e., the "check" side array, as well as to its partner gate array 32.

Figure 18:
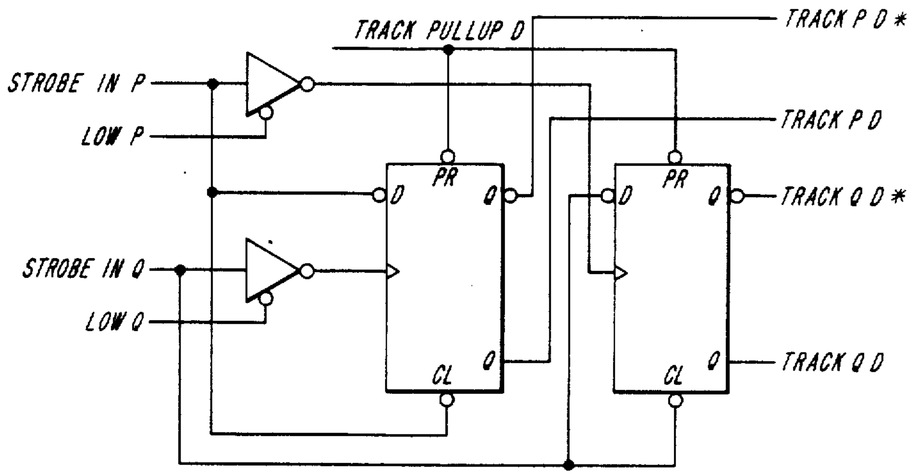
FIG. 18 depicts preferred circuitry for generating strobe tracking signals in a device interface constructed according to the invention.

FIG. 18 depicts circuitry for generating strobe tracking signals TRACK P D and TRACK Q D, as well as inverted forms theereof. This circuitry is used in combination with the circuitry depicted in FIG. 16 (at bottom) for generating the STROBE IN D* signal, representative of the timing of information signal transfers received by the drive side gate array 32. A similar circuit, not illustrated, is provided for generating the tracking signals used in combination with the circuitry depicted in FIG. 17 for generating the STROBE IN C* signal, representative of the timing of information signal transfers at the check side array 34.

A full appreciation of the operation of the circuit shown in FIG. 18 may be obtained by reference to aforementioned U.S. patent application Ser. No. 018,629, filed Feb. 25, 1987, and incorporated herein by reference.

With particular reference to the interface circuitry of FIG. 16, four Motorola 26S10 transceivers provide access to eight bits of data and four bits of function code on the P bus 30A, along with their associated parity bits and with the WAIT line. The transceivers function in receive mode to produce DATA IN P and FC IN P signals. The Q BUS counterparts functioning similarly to receive and produce DATA IN Q signals.

The DATA IN P and FC IN P signals, and their associated parity bits, are routed to a set of latched multiplexers. The outputs of these latched multiplexors are the PDATA IN D and PFC IN C signals. An OBEY P* signal determines whether those outputs drive signals received from the P Bus 30A or from the Q Bus 30B. Latching occurs on the first falling edge of STROBE IN D*.

The OBEY P and OBEY Q lines are conditioned so that the latches associated with the drive side array 32 normally provide data obtained from the P Bus, while the latches associated with the check side array 34 normally provide data obtained from the Q bus.

Figure 19:
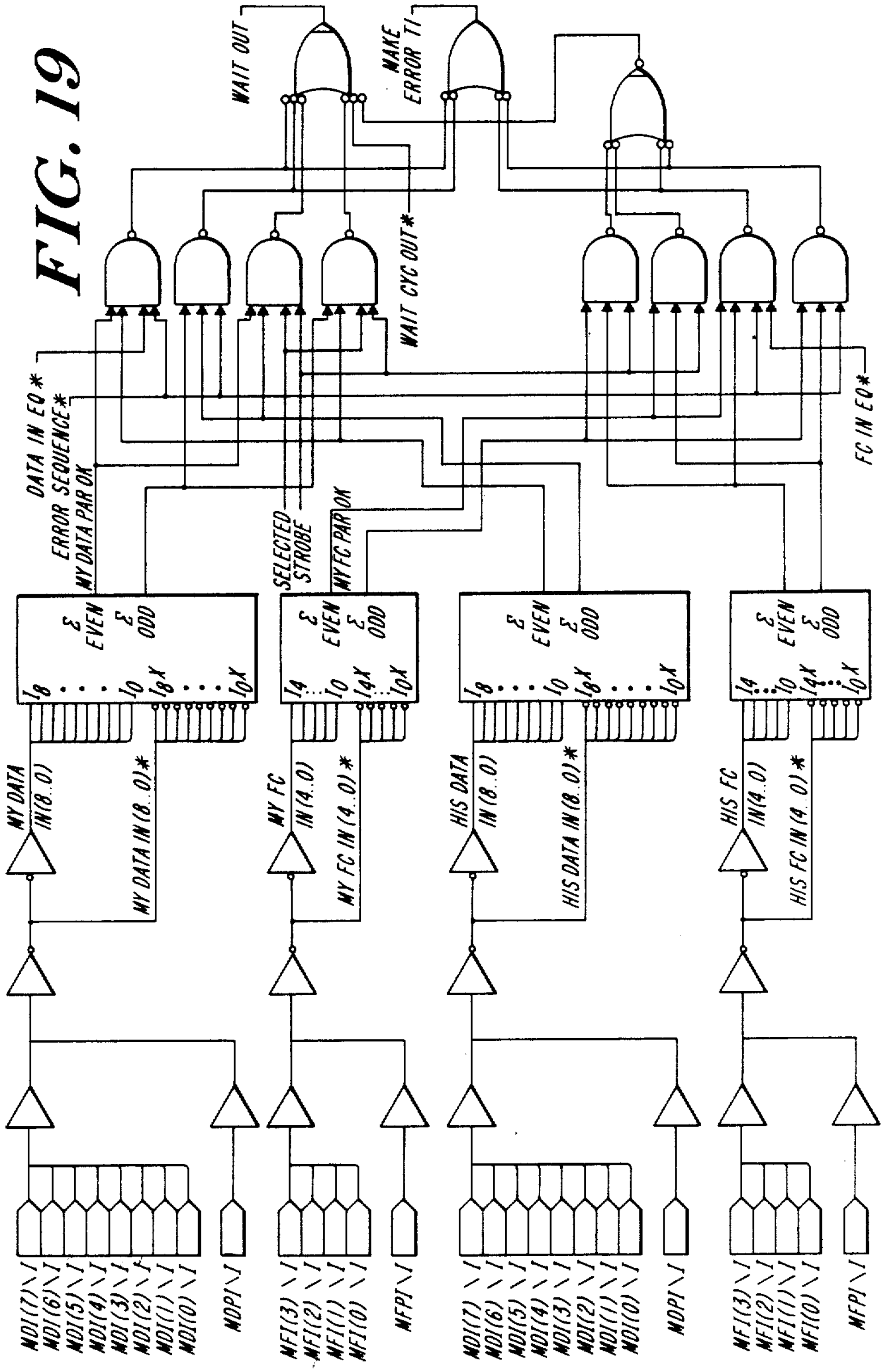
FIG. 19 illustrates a preferred circuit for detecting faults in incoming data signals in a device interface constructed according to the invention.
Figure 20:
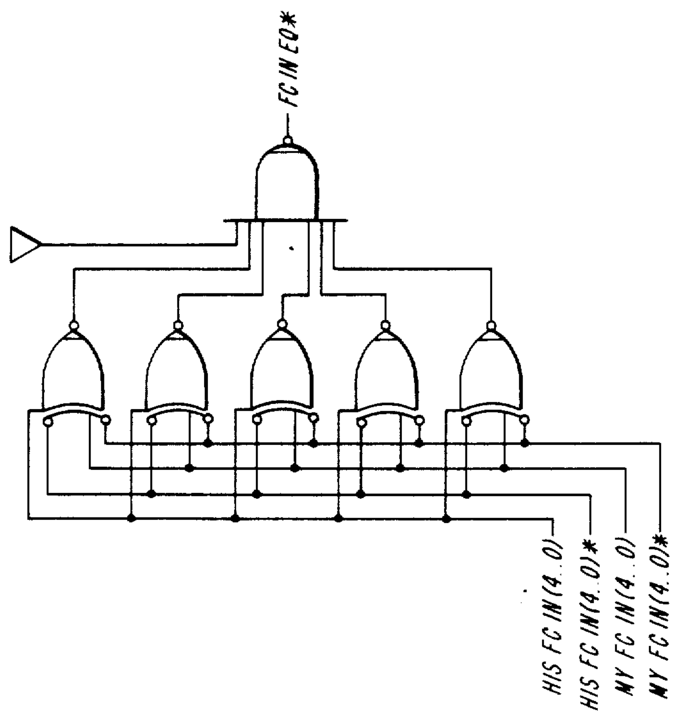
FIG. 20 illustrates a preferred circuit for comparing function code signals received by partnered gate arrays.

FIGS. 19–20 illustrate circuitry for checking data and function code signals received by the drive side array 32. More particularly, FIG. 19 illustrates a preferred circuit for detecting faults in incoming data and for generating in response thereto WAIT and MAKE ERROR T1 signals. The figure provides circuitry for checking the parity of data and function code signals (i.e., MY DATA IN and MY FC IN) received by the gate arrays 32, as well as that of similar signals (i.e., HIS DATA IN and HIS FC IN) received in the partner gate array 34.

FIG. 20 illustrates a preferred circuit for comparing function code signals (MY FC IN) received in a gate array 32 with those (HIS FC IN) received by the partner gate array 34. The circuit generates resultant signal FC IN EQ* having an assertive value indicating that the function code signals are equal.

Figure 21:
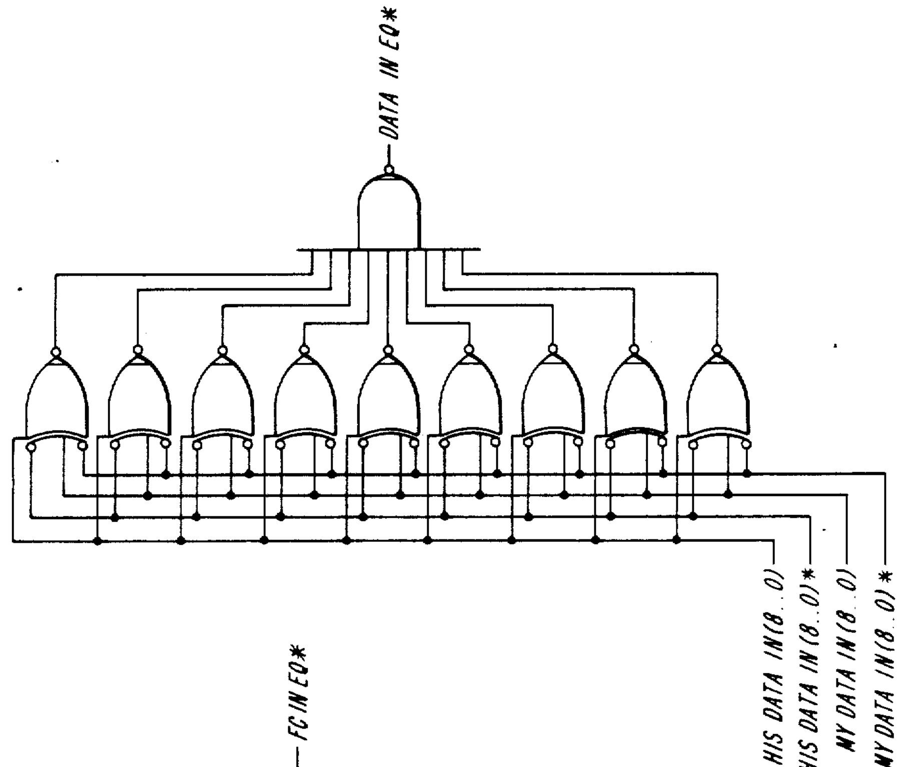
FIG. 21 illustrates a preferred circuit for comparing data signals received by partnered gate arrays.

FIG. 21 illustrates a preferred circuit for comparing data signal (MY DATA IN) received by a gate array 32 with those (HIS DATA IN) received by the partner gate array 34. The circuit generates resultant signal DATA IN EQ* having an assertive value indicating that the compared signals are equal.

Figure 22:
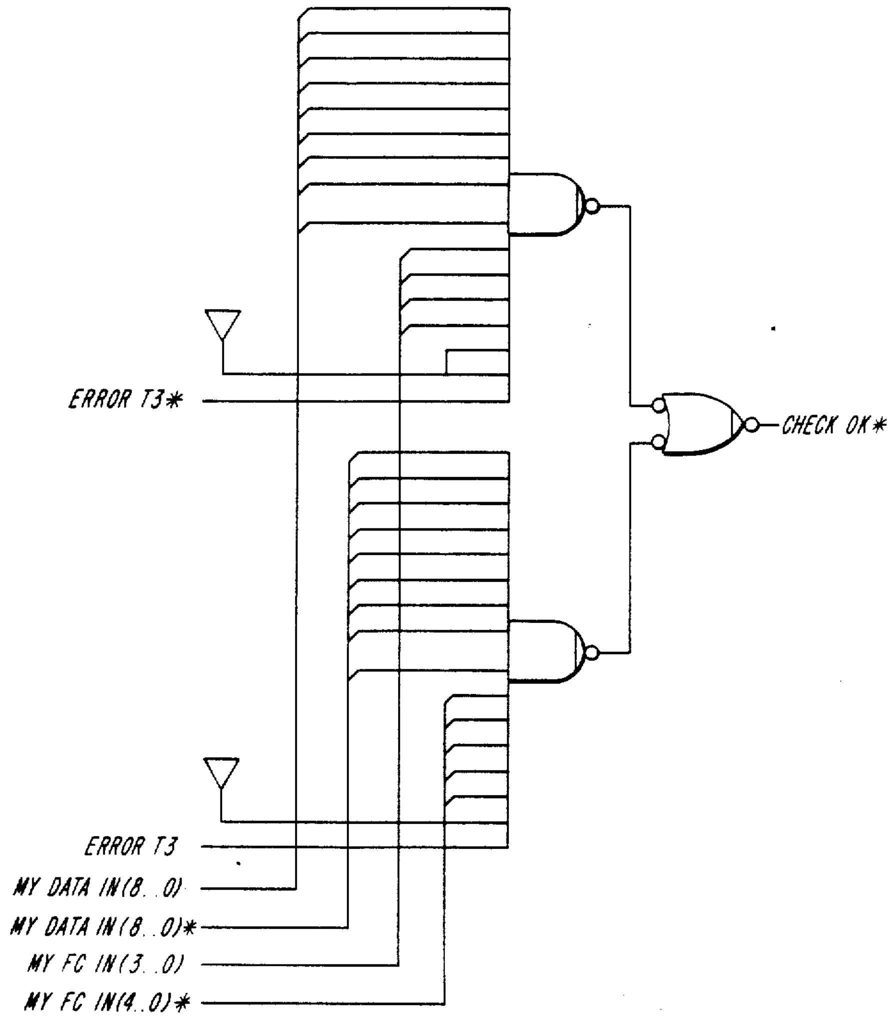
FIG. 22 illustrates preferred circuitry for checking data and function code signals received during the stages of the gate error checking sequence.

FIG. 22 illustrates preferred circuitry for checking data and function code signals received during all stages of the peripheral bus 30 error checking sequence, discussed below.

Figure 23:
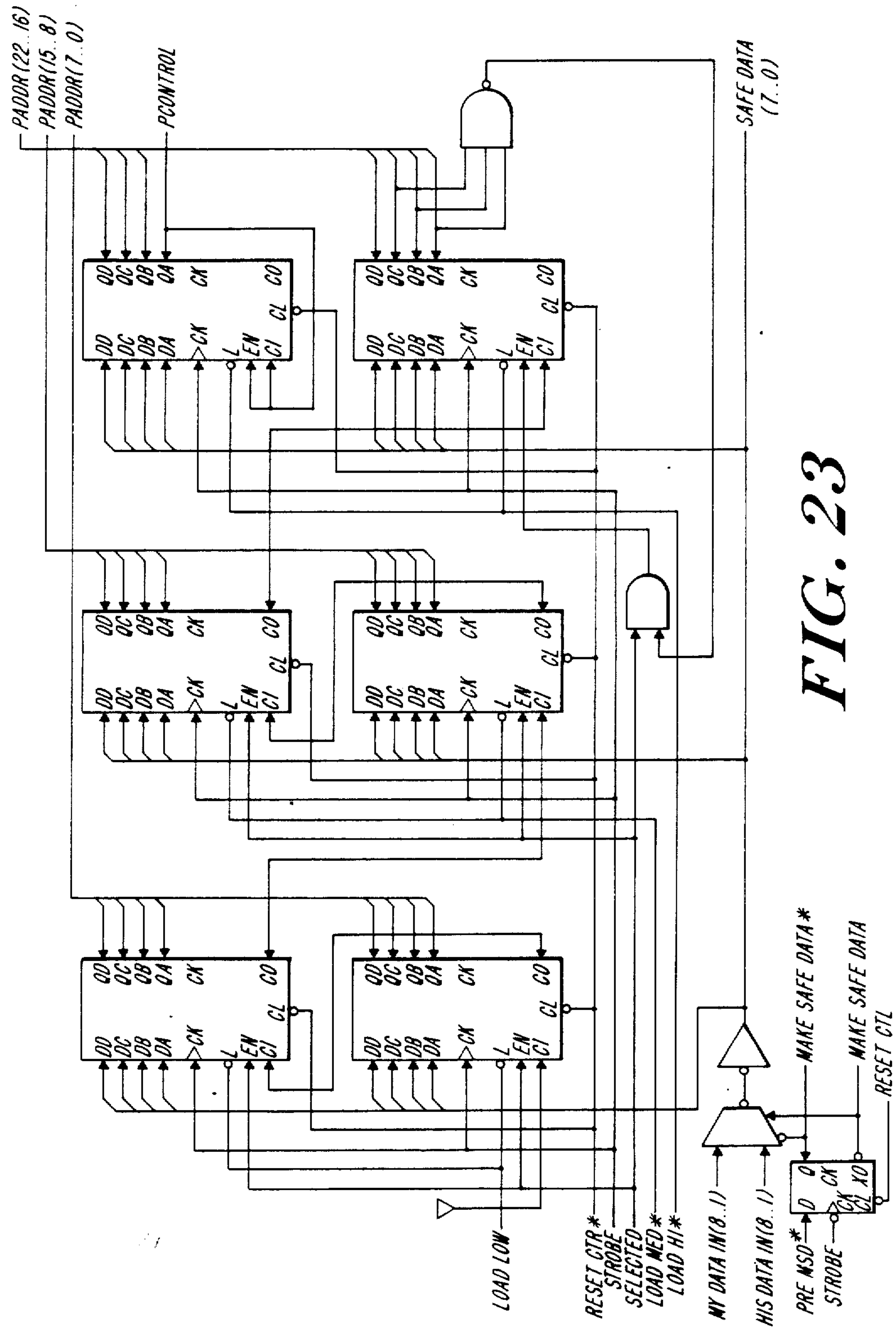
FIG. 23 illustrates preferred circuitry for extracting peripheral device address information from the peripheral bus data signals in a device interface constructed according to the invention.

FIG. 23 illustrates preferred circuitry for extracting peripheral device address information from input data signals. The circuit accepts input data signals from both gate arrays, i.e., signals MY DATA IN and HIS DATA IN to produce addressing output signals, PADDR. The circuit also selects, from those incoming data signals, data signals (SAFE DATA) which will be utilized during further processing by the gate array.

Figure 24:
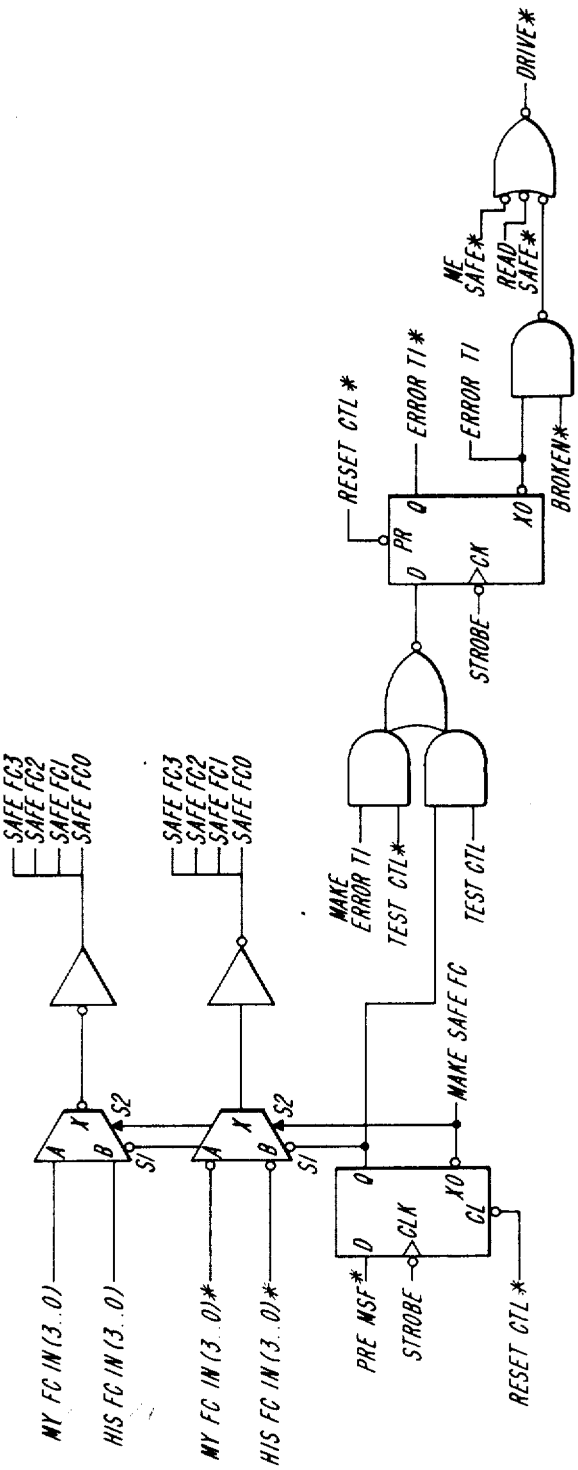
FIG. 24 depicts preferred circuitry for generating signals for initiating an error sequence in a device interface constructed according to the invention.

FIG. 24 depicts preferred circuitry for generating error sequence initiating signal ERROR T1 and for generating a DRIVE* signal for controlling operation of the attached peripheral device adaptor 44. The circuitry also includes elements for selecting, from the incoming function code signals (MY FC IN and HIS FC IN), those function code signals (SAFE FC0, SAFW FC1, . . . SAGE FC3) which will be used for further processing by the gate array 32.

With respect to FIG. 23, the trailing edge of STROBE* effects the storage of the data signal parity in the drive side latch. If that parity is ok, the MAKE SAFE DATA signal is asserted, causing the multiplexor shown at bottom left of FIG. 23 to select the PDATA IN D leads as the source of SAFE DATA for the drive side of the interface. On the other hand, if the parity stored in the drive latch proved unacceptable, the MAKE SAFE DATA signal would not be generated, thereby causing the selection of the check side latch data signals, PDATA IN C.

FIG. 24 presents logic utilized in determining whether to assert MAKE SAFE FC and thereby effect selection of drive side function code signal, as opposed to check side function code signal. That logic is used similarly to the MAKE SAFE DATA is determining function code signal selection.

The circuitry of FIG. 19 compares the function code parity check signals, PFC PAR OK, generated by the drive and check sides to determine whether both side received valid function code signals. This check is important insofar as a fault could result where one side of the interface, i.e., check side array 34, interprets the incoming signals as defining a read or select operation, while the other array, e.g., array 32, interprets those signals as defining an idle or write operation.

Particularly, in the event the arrays 32, 34 disagree whether the requested function is a read or select operation, they may not simultaneously place data or status signals on the bus. If one side is late in so doing, the i/o controllers 18, 20 might receive erroneous data. Alternatively, in the event the the arrays disagree whether the requested function is a write operation, the transmission of read or status signal may interfere with the receipt of valid write data.

To circumvent these possible sources of error, the gate array 32, 34 generates and transmits to the i/o controllers 18, 20 a WAIT signal which delays the generation of subsequent STROBE signals on the peripheral bus. Logic for generating the WAIT signal in response to a disagreement of parity signals—i.e., single bit errors perceived within the received signals—is presented in FIG. 19. Specifically, attention is directed to the logic for generating the WAIT OUT signal.

FIG. 19 also presents circuitry for generating the MAKE ERROR T1 signal in the event a multibit error is detected. Specifically, the illustrated logic generates that signal where both the drive and check side latches have incorrect data parity; where both the drive and check side latches have correct datw parity, but differing data signals; where both the drive and check latches have incorrect function code parity; and where the drive and check latches have correct function code parity, but differing function code signals.

The generation of MAKE ERROR T1 causes the gate array logic to enter an error handling sequence, beginning with the assertion of WAIT.

FIGS. 25 through 36 present further circuitry of preferred gate array 32. In particular, FIG. 25 illustrates preferred circuitry for extracting, from the high order bits of the peripheral address signal PADDR, peripheral device adaptor 44 command signals CLR UP RESET, PINT TO DEV*, SET BROKEN, CLR BROKEN, TOGGLE OBEY Q, TOGGLE OBEY P, CLR INT, and DO RESET*.

FIG. 26 illustrates preferred circuitry for comparing slot-id signals (SAFE DATA bits 4–7) received from the i/o controller with the slot-id signals (SID) assigned to the gate array 32 to determine whether the gate array has been addressed (ME SAFE) and selected (STATUS SEL). The circuitry also provides elements for interpreting the function code signals (SAFE FC0, SAFE FC1, SAFE FC2, and SAFE FC3, and the respective inverted forms) to determine whether a read operation has been requested.

Figure 27:
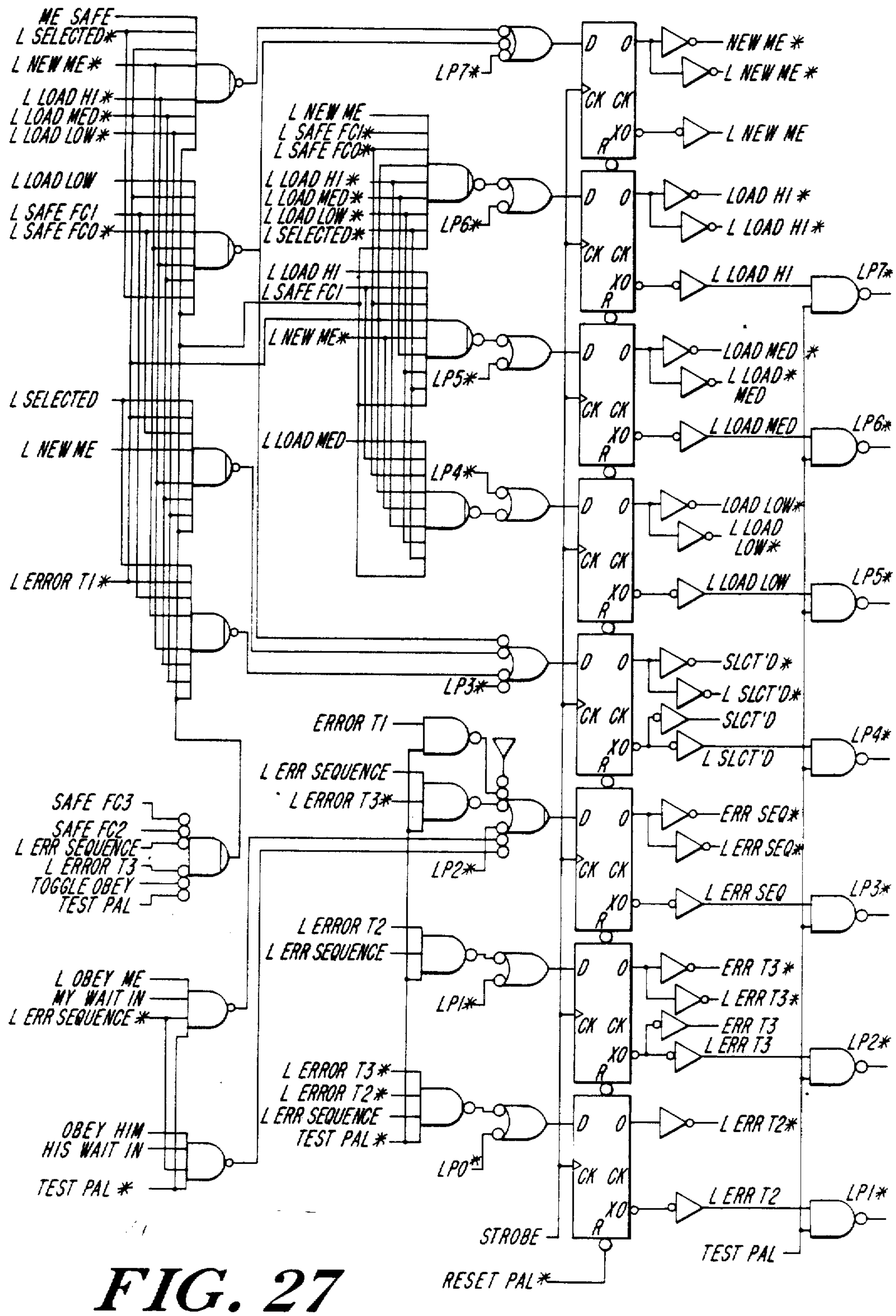
FIGS. 27 and 28 illustrate preferred circuitry for generating gate array state signals in a device interface constructed according to the invention.
Figure 28:
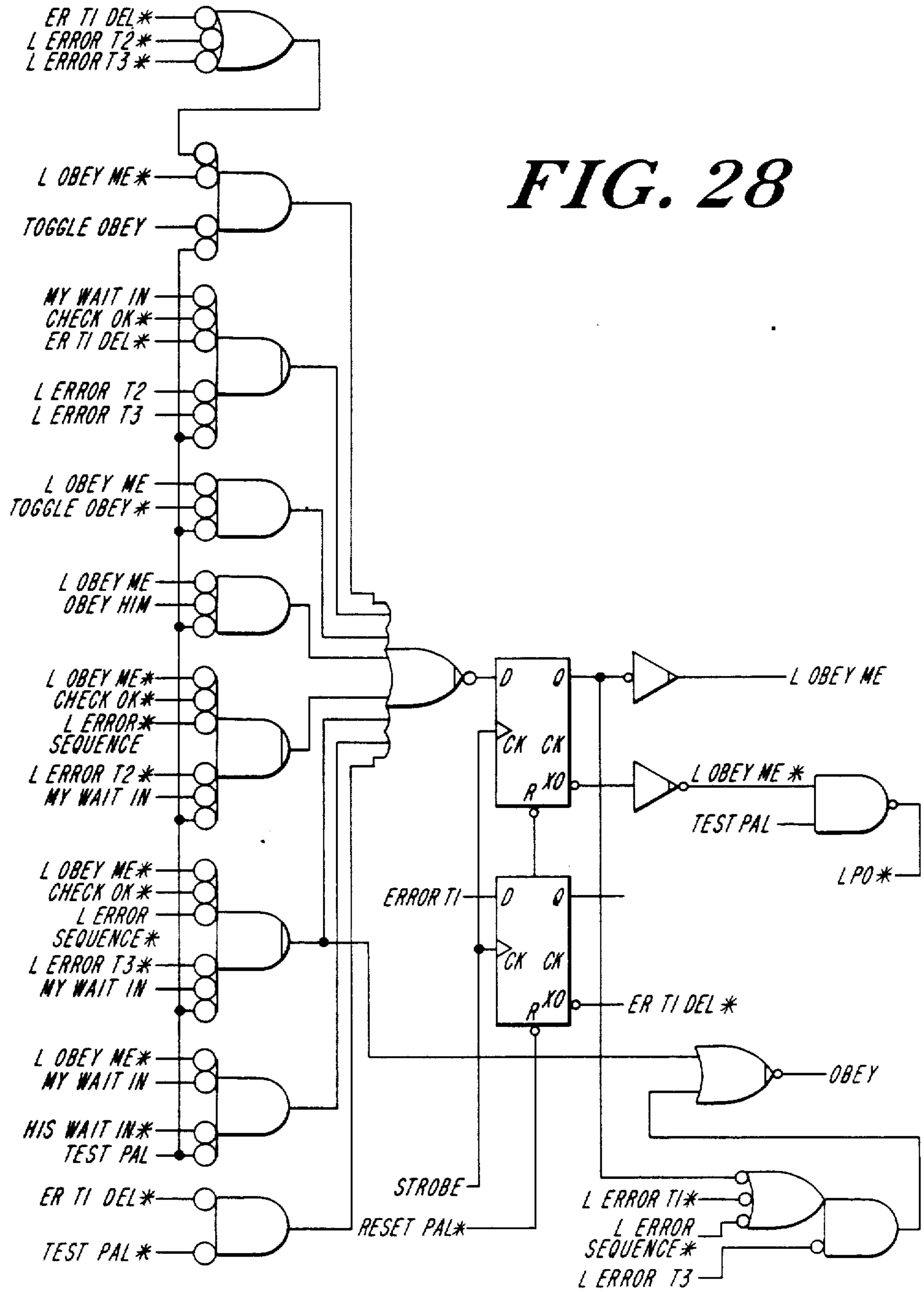

FIGS. 27 and 28 illustrate preferred circuitry for generating state signals NEW ME, LOAD HI, LOAD MED, LOAD LW, SELECTED, ERROR SEQUENCE, ERROR T3, ERROR T2, OBEY ME, and LP0 . . . LP7, as well as inverted and latched forms thereof.

Figure 29:
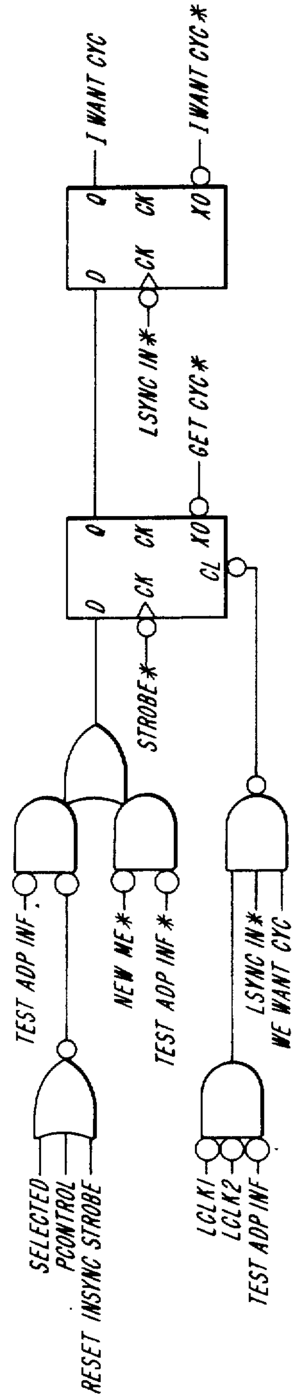
FIG. 29 illustrates a preferred circuit for generating peripheral adaptor control signals in a device interface constructed according to the invention.

FIG. 29 illustrated a preferred circuit for generating peripheral adaptor 44 control signals GET CYC* and I WANT CYC, as well as inverted forms thereof.

Figure 30:
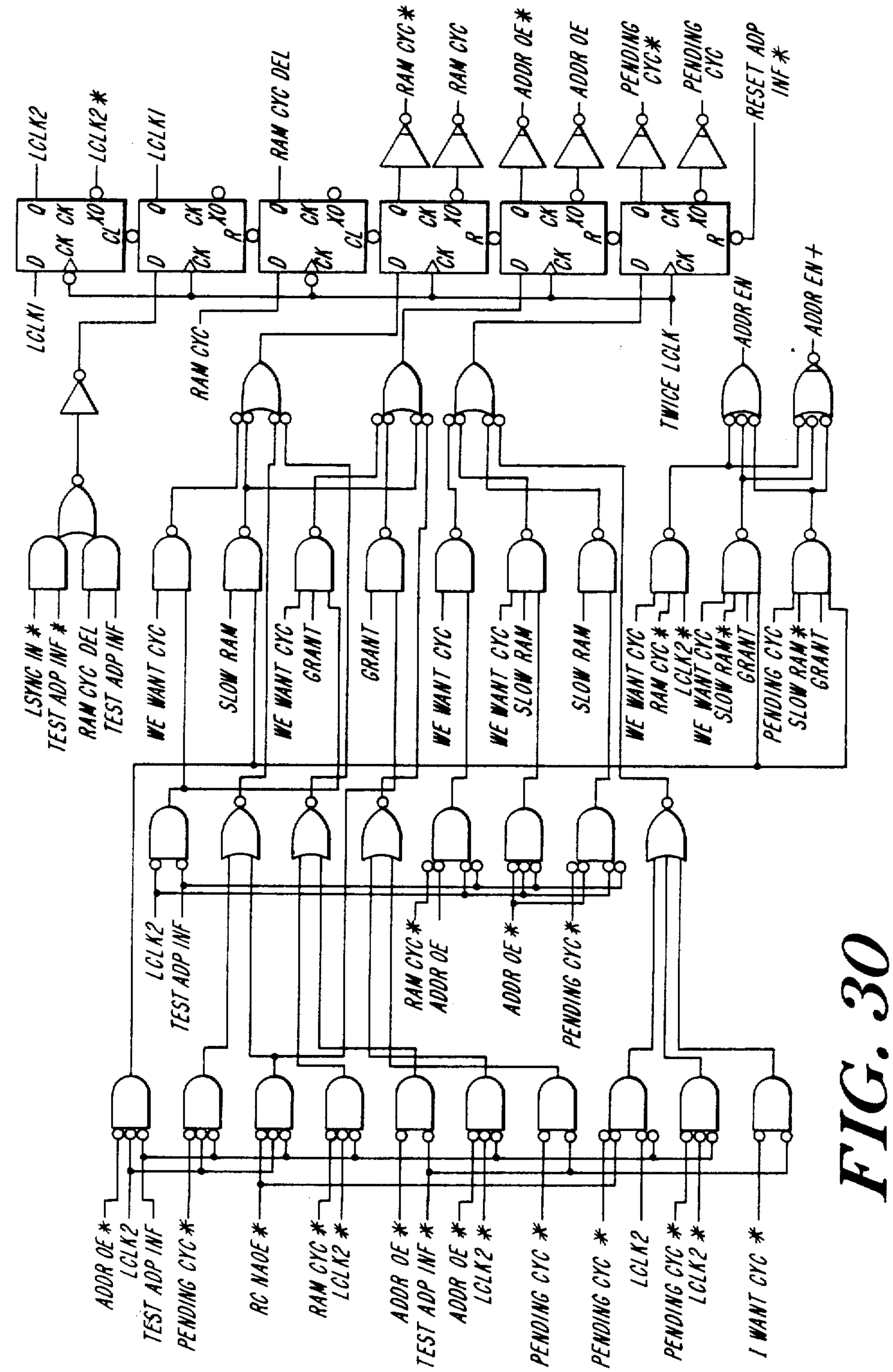
FIG. 30 illustrates preferred circuitry for generating timing signals in a device interface constructed according to the invention.

FIG. 30 illustrates preferred circuitry for generating timing signals LCLK1, LCLK2, as well as state signals RAM CYC DEL, RAM CYC, ADDR OE, ADDR EN, and PENDING CYC, as well as inverted forms thereof.

Figure 31:
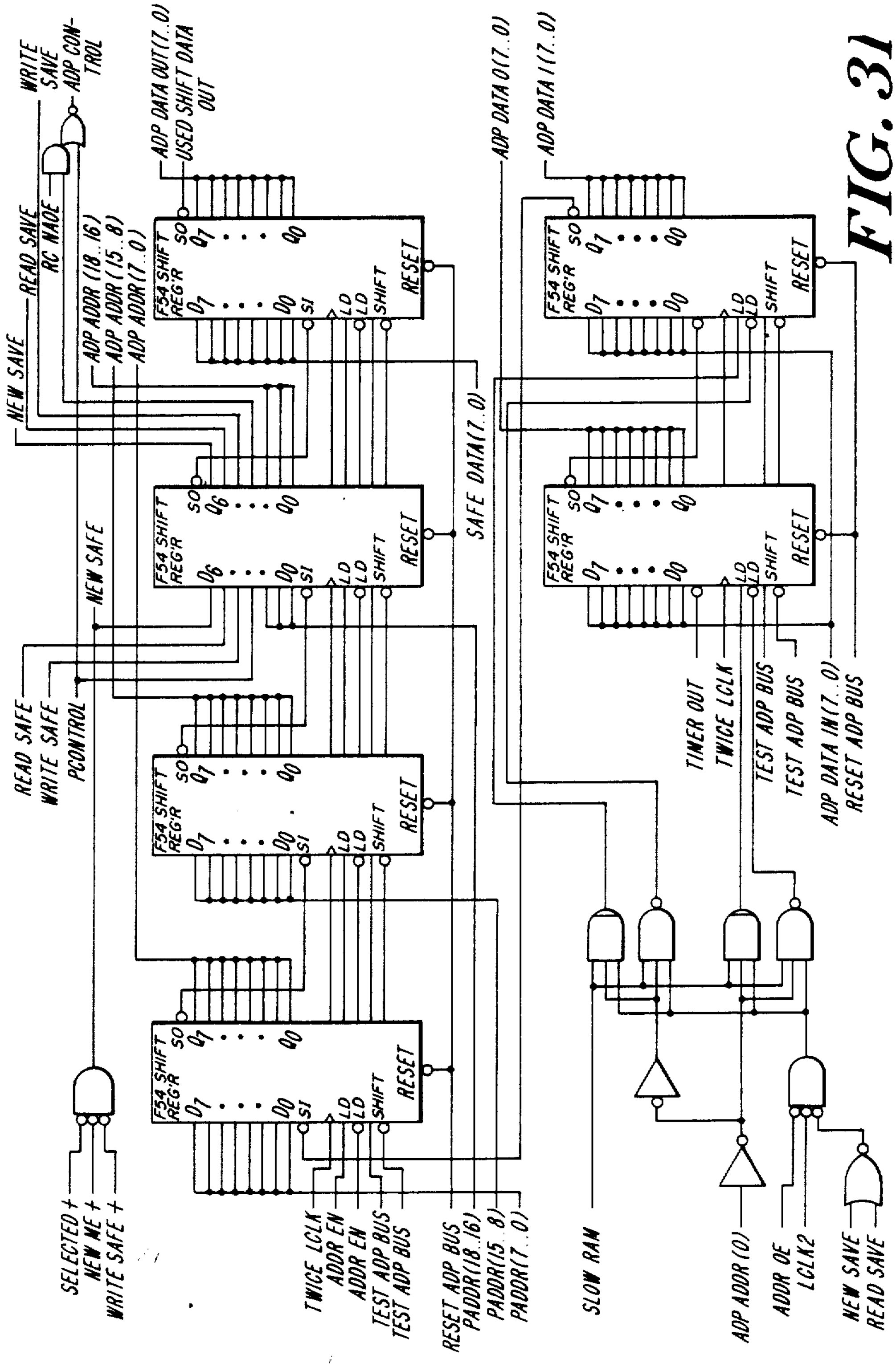
FIG. 31 illustrates a preferred circuit for generating adaptor address and data signals in a device interface constructed according to the invention.

FIG. 31 illustrates a preferred circuit for generating address (ADP ADDR) and data (ADP DATA OUT) signals for output to the adaptor 44. The circuit also includes elements for generating internal data signals (ADP DATA 0) and (ADP DATA 1) from data signals (ADP DATA IN) received from the adaptor.

Figure 32:
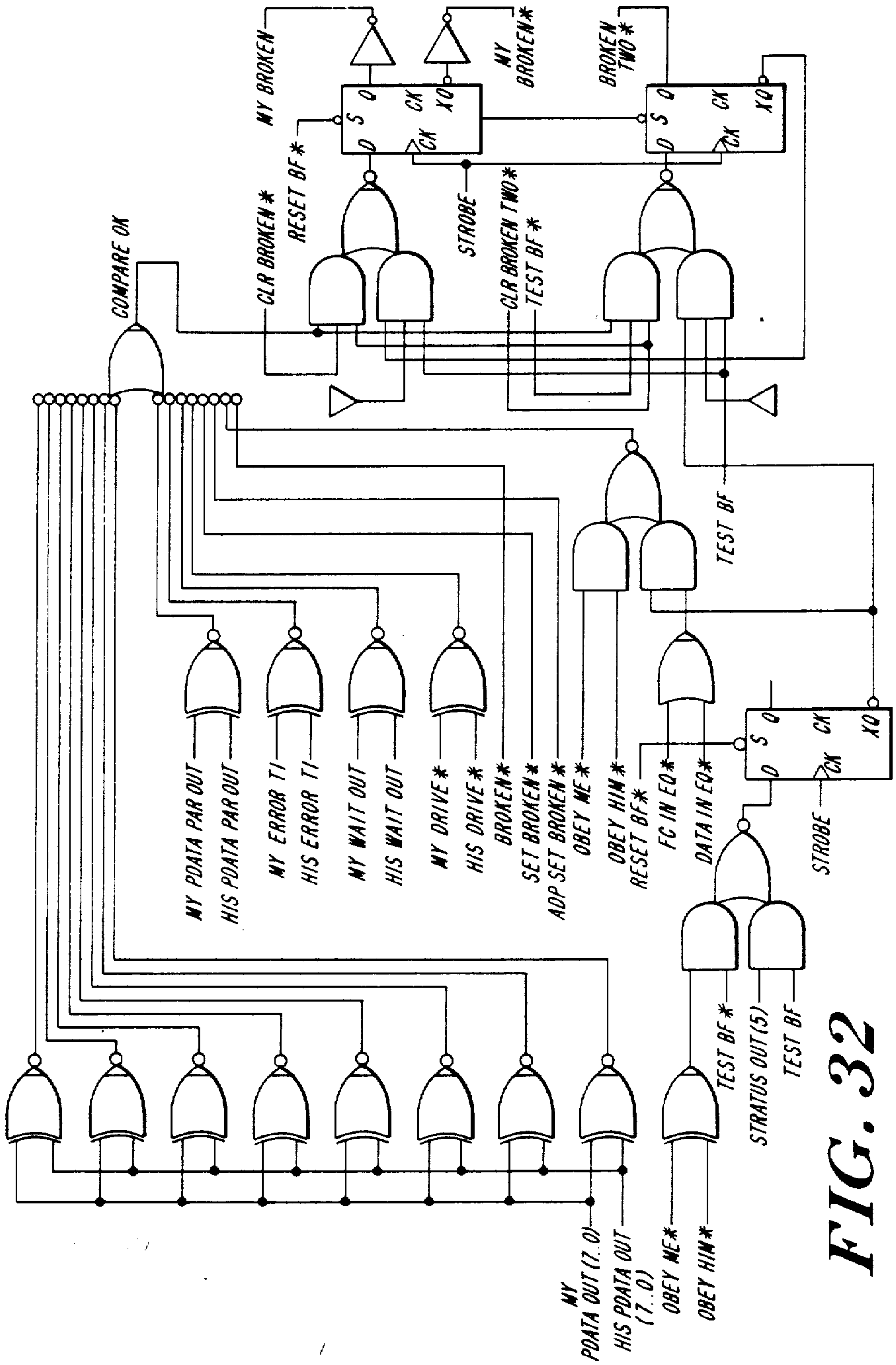
FIG. 32 illustrates preferred circuitry for comparing peripheral bus data signals generated by partnered gate arrays.

FIG. 32 illustrates preferred circuitry for comparing peripheral bus data signals (MY PDATA OUT) output by the gate array 32 with those signals (HIS PDATA OUT) output by the partner gate array 34 to generate the COMPARE OK* signal. The figure also illustrates circuitry for generating the signals MY BROKEN and BROKEN TWO, as well as inverted forms thereof.

Figure 33:
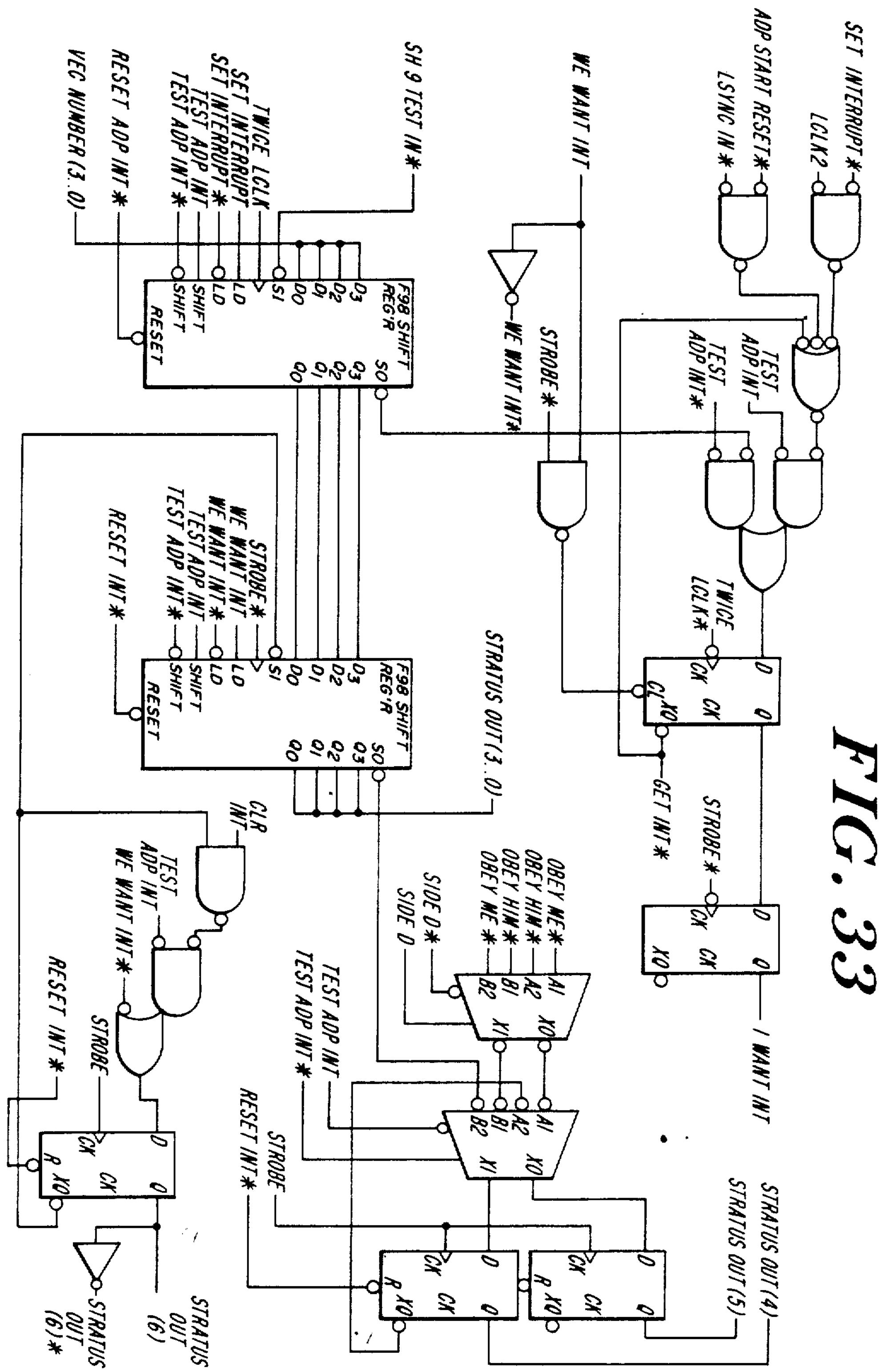
FIGS. 33 and 34 illustrate preferred circuitry for generating interrupt-related and obey signals in a device interface constructed according to the invention.

FIG. 33 illustrates preferred circuitry for generating interrupt-related signals GET INT* and I WANT INT, as well as gate array 32 status signals (STATUS OUT).

Figure 34:
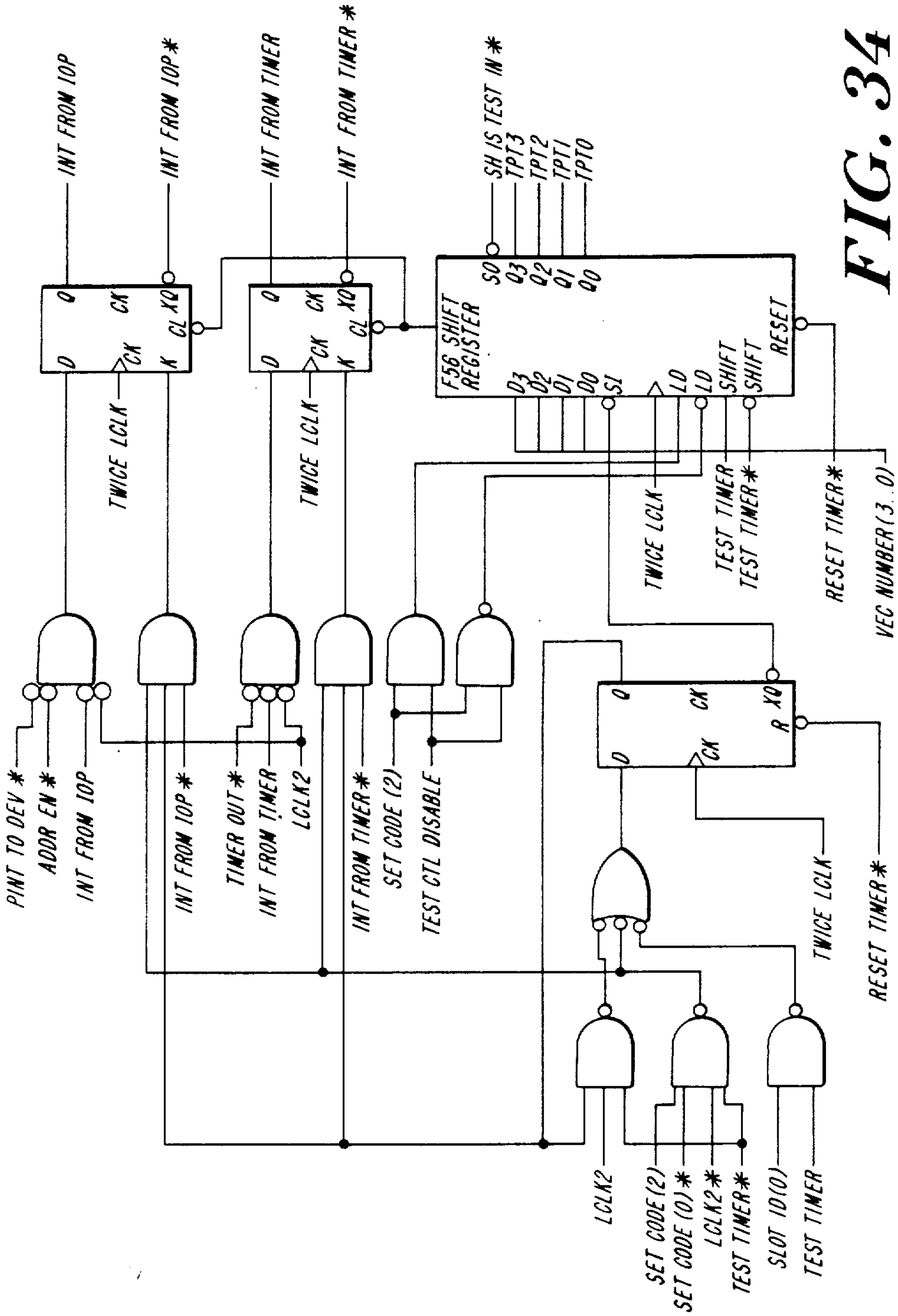

FIG. 34 illustrates a preferred circuit for generating further interrupt related signals INT FROM IOP, INT FROM TIMER.

Figure 35:
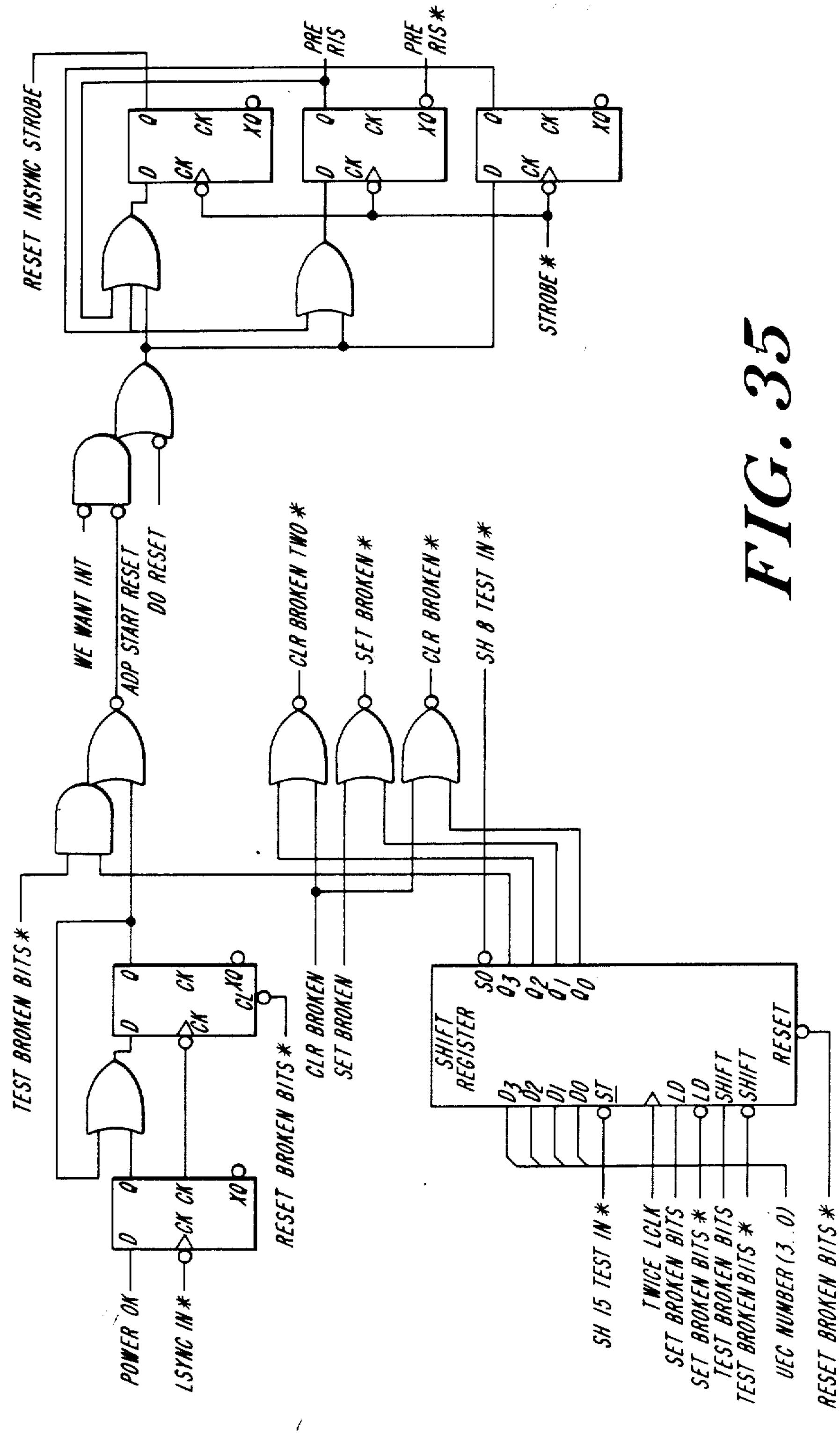
FIG. 35 illustrates preferred circuitry for generating start-up signals in a device interface constructed according to the invention.

FIG. 35 illustrates preferred circuitry for generating error-related signals CLR BROKEN TWO, SET BROKEN and synchronizing signals RESET INSYN STROBE and PRE RIS, as well as inverted forms thereof.

Figure 36:
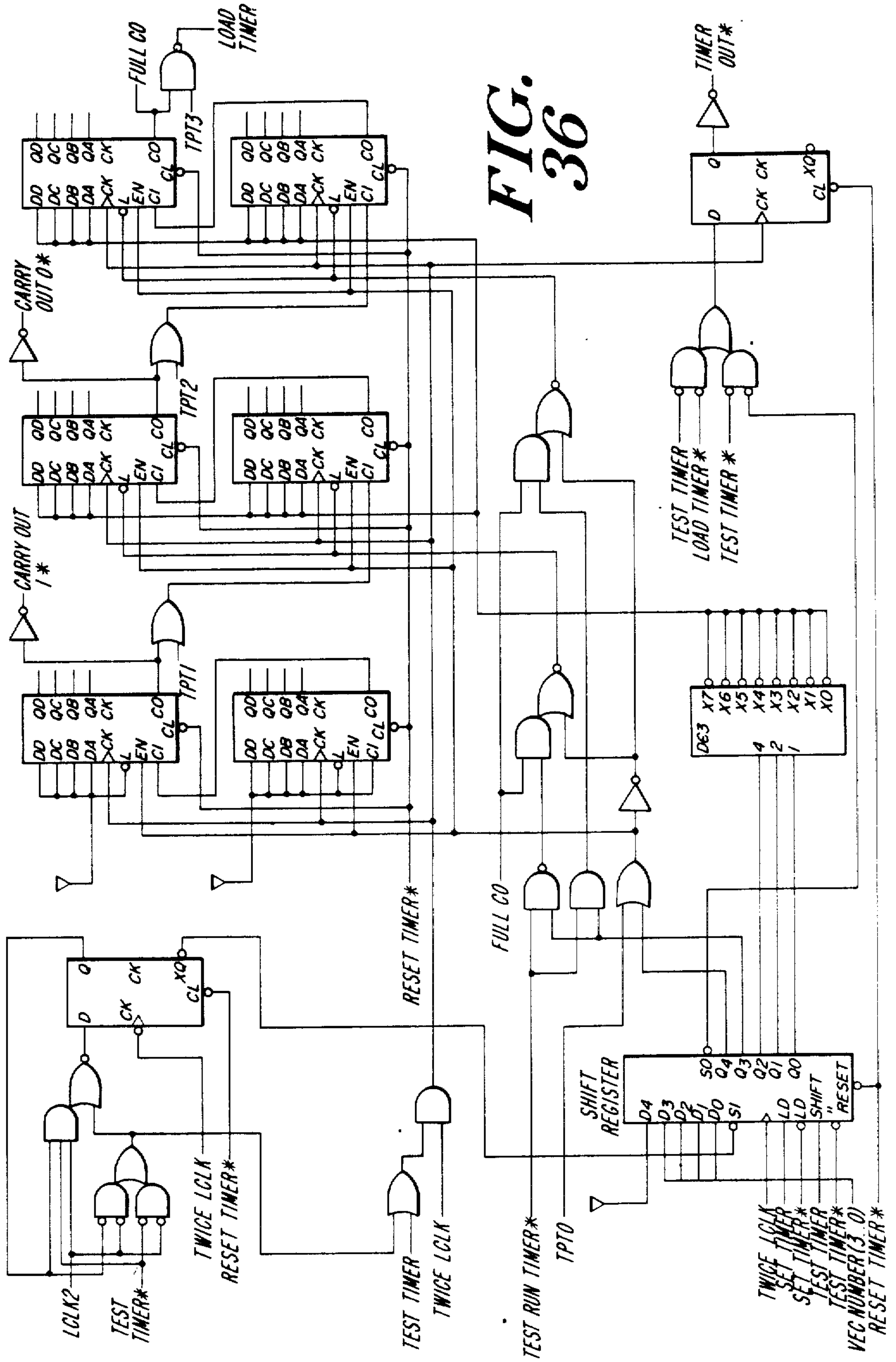
FIG. 36 illustrates a perferred circuit for generating timer signals.

FIG. 36 illustrates a preferred circuit for generating timer signals LOAD TIMER* and TIMER OUT.

Figure 37:
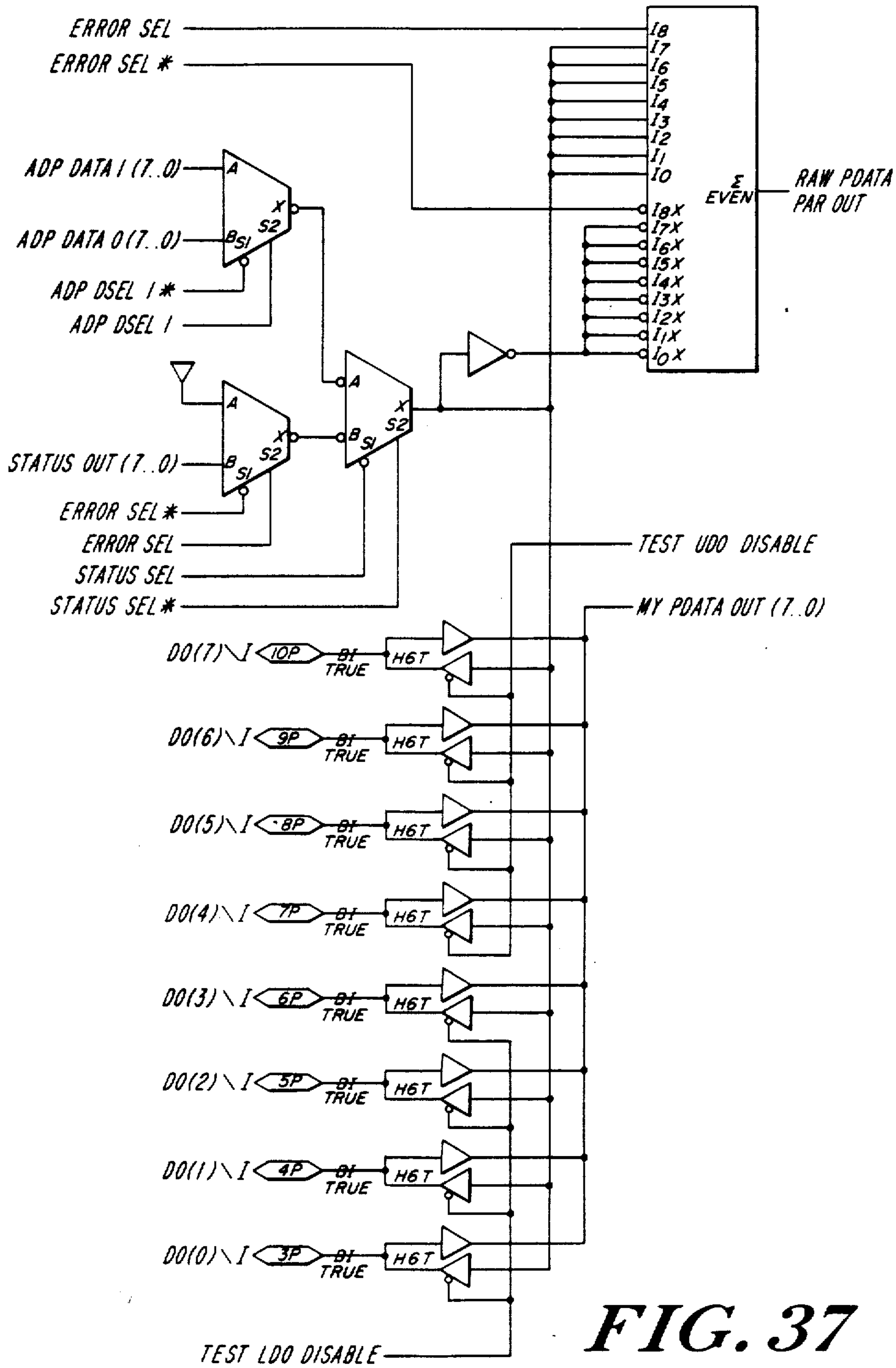
FIG. 37 illustrates preferred circuitry for driving data and status signals onto the adaptor bus in a device interface constructed according to the invention.
Figure 38:
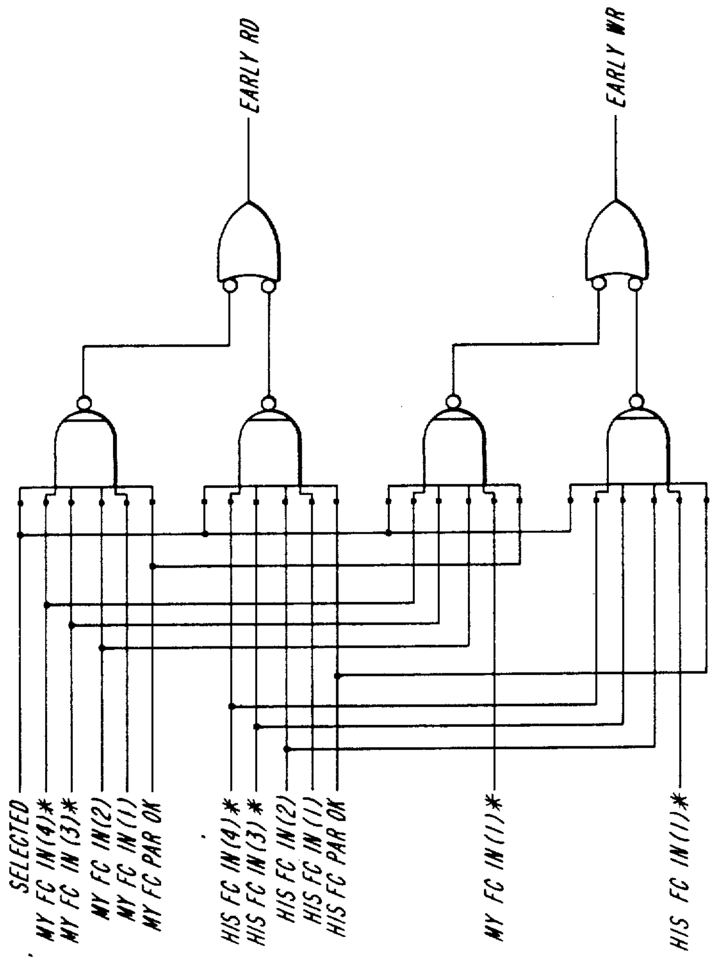
FIG. 38 illustrates preferred circuitry for generating early read and write signals.

FIG. 37 illustrates preferred circuitry for driving data and status signals (ADP DATA and STATUS OUT) onto the adaptor bus 56, as well as circuitry for receiving data signals (MY PDATA OUT) from that bus.

Bus Protocol

The peripheral device interface and, particularly, the gate arrays 32, 34 and adaptor 44 receive signals from the peripheral bus 30 according to the protocol defined above. Unlike the i/o controller 18, 20 which ends each bus interface cycle with the generation of a strobe signal, the gate arrays 32, 34 begin each cycle upon receipt of the strobe signal. This aspect, among others, of the operation of the interface is described below. It will be appreciated that this description generally applies to all of the illustrated gate arrays 32, 34, . . . 42.

Generally, each gate array 32, 34, 36, 38, 40, 42 monitors both the first and second i/o buses and compares information received from both of them. Normally, of course, the comparisons reveal that the signals are ok—i.e., that duplicate signals have been received synchronously and simultaneously on the buses. Accordingly, the the gate array passes signal received on the assigned, or obeyed, bus.

As described above, an information transfer cycle begins with the transmission along the peripheral bus 30 of a select command and slot id. The interface associated with the peripheral to which this select command is directed normally responds with an ALIVE signal, as described above. The next three cycles involve the transfer of the address to be read or written to the adaptor. The final cycles are the reads or writes, and the i/o controller 18, 20 may continue with additional reads or writes if it wishes a sequence of transfers.

As shown in FIG. 26, four XOR gates compare a hard-wired slot ID associated with the chassis slot with bits 4–7 of the SAFE DATA to create a signal called ME SAFE. While this signal may be asserted immediately after receipt of unsafe data, only after assertion of MAKESAFE DATA will ME SAFE be used by the drive side array 32. The signal arrives slightly after the safe function code, but sufficiently before the rising edge of STROBE.

The SAFE FC signals are used as inputs to programmable array logic of the drive side array 32 which controls all of the data transfers on the D-side of the interface. The SAFE FC signals include the following function codes:

0000 Idle
0001 Select
0010 Write
0011 Read

Responding to these function codes, the drive side array 32 acts as a finite state machine having states described below. It will be appreciated that the check side array 34 is normally acting identically to the drive side array 32 and, therefore, is expected to enter the states simultaneously with its partner array. In the description of states, the designation "PAL" is used in reference to those elements which provide the finite state logic function.

Entering Selection State

SAFE FUNCTION CODE: SELECTION
SAFE DATA: SLOT NUMBER (first part of cycle)
DATA PLACED ON BUS: STATUS (last part of cycle)
PAL STATE BEFORE STROBE: Nothing
PAL STATE AFTER STROBE: NEW ME All data transfers begin with a safe function code for Selection (0001), while the device address is present on safe address leads 4–7. The ME SAFE signal is decoded and presented to the drive side array 32 logic.

The PAL logic implements a state machine which decodes the fact that ME SAFE has been asserted, the fact that a Select function code is present, and the fact that the logic itself is not asserting any of its outputs, to create a state called NEW ME, which it enter on the rising edge of the next STROBE.

Accepting the High Byte of Address

SAFE FUNCTION CODE: IDLE
SAFE DATA: Status that devices was driving (stored in multiplexors 240A and 240B)
PAL STATE BEFORE STROBE: NEW ME
PAL STATE AFTER STROBE: LD HI With reference to FIG. 24, when the rising edge of STROBE occurs, the PAL enters the LD HI state, asserting a signal called LOAD HI*. This signal causes SAFE DATA 0–7 to be recorded on the rising edge of the next STROBE, i.e., the one that terminates the LD HI state.

The lower four bits of the binary counter have outputs A16–A19 and are part of the 23-bit address for data transfers, although bits A16–A18 have another purpose which will be described shortly.

The upper four bits of the counter are called A20–A22 and P CONTROL. If outputs A19, A20, A21, A22, and P CONTROL contain the code 001, a decoder shown in FIG. 25 is enabled. This decoder decodes address bits A16–A18 to create SET BROKEN*, CLR BROKEN*, TOGGLE OBEY Q*, TOGGLE OBEY P*, CLEAR INTERRUPT*, and DO RESET*. The set and clear of BROKEN go to the BROKEN flip-flop (see FIG. 32).

If the device 24 associated with this interface has set the Interrupt Request bit (by asserting SET INT), a processor 10, 12 can clear that by sending a "P CONTROL COMMAND" that will assert CLEAR INTERRUPT*. When CLEAR INTERRUPT* has been asserted (low), the next rising edge of STROBE will clear the STATUS OUT 6 (Interrupt Request) flip-flop. The flip-flop is arranged so that it will not be cleared unless it is already set. This prevents a race condition in which issuance of CLEAR INTERRUPT* might clear the flip-flop as it was in the process of being set.

The DO RESET* signal clears a binary shifter, as illustrated in FIG. 35. RESET* will be asserted (low) until three more STROBE assertions have been received. The shifter is then disabled until the next occurrence of DO RESET*.

Accepting the Middle Byte of Address

SAFE FUNCTION CODE: WRITE
SAFE DATA: High Address Byte
PAL STATE BEFORE STROBE: LD HI
PAL STATE AFTER STROBE: LD MID Assuming that a P CONTROL operation did not occur, the PAL state machine of FIG. 27 will continue processing the data transfer. (In the cases of RESET and SET BROKEN, the hardware will not step to LD MID. In the other cases, the function codes normally used in those cases are inappropriate for LD MID.

The PAL determines that it is in the LD HI state, not in any other state, and that a WRITE function code (0010) is present. From these conditions it will enter the LD MID state on the rising edge of STROBE.

When the rising edge of STROBE occurs, the logic records the high address information in latches that were conditioned during ID HI state. The logic enters the LD MID state, asserting a signal called LD MID*. This signal prepares two binary counters to record SAFE DATA 0–7 on the rising edge of the next STROBE, i.e., the one that terminates the LD MID state.

Accepting the Low Byte of Address

SAFE FUNCTION CODE: WRITE
SAFE DATA: Middle Address Byte
PAL STATE BEFORE STROBE: LD MID
PAL STATE AFTER STROBE: LD LOW The logic determines that it is in the LD MID state, and that a WRITE function code (0010) is present. From these conditions, it will enter the LD LOW state on the rising edge of STROBE.

When the rising edge of STROBE occurs, this records the middle address information in the aforementioned latches, which were conditioned during LD MID state. The logic enters the LD LOW state, asserting a signal called LD LOW*. This signal prepares two binary counters to record SAFE DATA 0–7 on the rising edge of the next STROBE, i.e., the one that terminates the LD LOW state.

Achieving the "SELECTED" State

SAFE FUNCTION CODE: WRITE
SAFE DATA: Low Address Byte
PAL STATE BEFORE STROBE: LD LOW
PAL STATE AFTER STROBE: NEW ME AND SELECTED The logic determines that it is in the LD LOW state, and that a WRITE function code (0010) is present. From these conditions, it will enter the NEW ME and SELECTED state on the rising edge of STROBE.

The function code and data sequence common to all data transfers is now complete. The STROBE that causes the logic to enter the NEW ME and SELECTED states also records the low byte of address information into the latches, which were conditioned during the LD LOW state.

Preparation for Data Reads and Writes

SAFE FUNCTION CODE: WRITE (Write operation) or IDLE (Read operation)
SAFE DATA: Data to be written (Write operation) or Nothing (Read operation)
PAL STATE BEFORE STROBE: NEW ME AND SELECTED
PAL STATE AFTER STROBE: SELECTED The PAL to remain in the SELECTED state as long as it is in the NEW ME and SELECTED state (only), MAKE ERROR T1 is not asserted, and a IDLE or WRITE function code is present.

The STROBE that causes the PAL to change from the NEW ME and SELECTED state to only the SELECTED state increments the address counter indicating that the supplied data has been recorded (WRITE cycle) or that the desired data has been obtained (READ cycle). In the case of the READ cycle, the desired data will be placed on the bus during the next cycle.

Data Reads and Writes

SAFE FUNCTION CODE: WRITE (Write operation) or READ (Read operation)
SAFE DATA* Data to be written into device (Write operation, or
DATA PLACED ONTO BUS: Data obtained from device on previous cycle (Read operation)
PAL STATE BEFORE STROBE: SELECTED
PAL STATE AFTER STROBE: SELECTED Once the PAL is no longer in the joint NEW ME/SELECTED state, an additional term in the PAL equation for SELECTED permits the device to stay in the SELECTED state so long as READ (0011) or WRITE (0010) function codes occur and no error states are entered.

STROBE records the SAFE DATA received from the P BUS or Q BUS during writes and changes the data gated out to the P BUS and Q BUS during reads.

Entering the Error State

If upon the assertion of STROBE, the latched P and Q data and/or function codes are of correct parity, but differing values, or if neither P nor Q produced correct parity, logic which detects this on the drive side array 32 or check side array 34 will assert MAKE ERROR T1* or MAKE ERROR T1 C* respectively. The assertion of MAKE ERROR T1* will cause a WAIT request to be asserted on the bus. The WAIT request allows the STROBE pulse to complete at the normal time, but the next rising edge of STROBE is delayed for 16 microseconds.

The following table shows the conditions that can lead to the assertion of MAKE ERROR T1* and MAKE ERROR T1 C*:

| D-Latch Parity Status | C-Latch Parity Status | D-Latch C-Latch Compare | ACTION |
|---|---|---|---|
| Fail | Fail | — | MAKE ERROR T1* |
| Pass | Pass | Fail | MAKE ERROR T1* |

(— = don't care)

If BROKER* is not asserted, the trailing edge of the STROBE will record the assertion of MAKE ERROR T1* to create a "sub-state" that will last until the next trailing edge of STROBE. This sub-state is called ERROR T1, and will be fairly long because of the assertion of WAIT.

ERROR T1 places an all-1's pattern on both the P bus data and the P bus function code lines. It accomplishes this as follows:

1. ERROR T1 and NOT BROKEN create DRIVE* enabling PDATA OUT 0–7 D to the P bus 30A.
2. ERROR T1 causes SEND DATA* to be high, causing DATA OUT 0–7 to be connected to PDATA OUT 0–7.
3. ERROR T1 brings DATA OUT 0–7 to the all-1's state.
4. ERROR T1, combined with the all-1's data will cause the "EVEN" output of the parity generator to be LOW, causing the associated 74F02 output to be HIGH when DRIVE* is asserted, causing an assertion of the DATA PARITY bit on the P Bus 30A as long as the interface is not BROKEN.
5. ERROR T1 enables a transceiver on FIG. 16 to directly place an all-1's condition onto the P bus function code leads.
6. ERROR T1 is used as a direct input into the transceiver which will place a 1 on the Function Code Parity line of the P bus 30A as long as the interface isn't BROKEN.

The next assertion of STROBE will latch new data (all 1's) into the drive and check latches of FIG. 16, and will place the drive side array 32 PAL in the ERROR SEQUENCE state, since MAKE ERROR T1* is still asserted based on the data stored in the Drive and Check latches at the time of the STROBE. The ERROR T1 sub-state still exists because it is clocked on the trailing edge of STROBE.

During the transistion to the ERROR SEQUENCE/ERROR T3 state, the controller 18, 20 continues to place an all 1's pattern on the P bus. This will continue until part way through the ERROR SEQUENCE/EROR T3 state.

The next assertion of STROBE will place the drive side array 32 PAL in a null state, with only OBEY P* possibly asserted.

Normal Operation (Including Bad Parity on One Side

PAL equation: OBEY_P—OBEY_P * /MAKE ERROR T1 * /ERR_SEQ * /RESET (See Appendix B—Differences between PAL notation and text notation).

The D-Side of the interface is arranged to prefer to get its data from the P BUS. The C-Side of the interface is arranged to prefer to get its data from the Q BUS. Continuing to use the drive side array 32 as an example, the control PAL on the drive side array 32 usually asserts OBEY P*, a signal which keeps the Drive Latch connected to the P BUS. In normal operation, the drive side array 32 control PAL will continue to assert OBEY P as long as MAKE ERROR T1, ERROR SEQUENCE, and RESET* are not asserted.

The following table outlines normal operation and the cases where the D-latch or the C-latch have bad parity:

| OBEY P* | D-Latch Source | D-Latch Parity Status | OBEY Q* | C-Latch Source | C-Latch Parity Status | ACTION |
|---|---|---|---|---|---|---|
| Assert | P BUS | OK | Assert | QBUS | OK | MAKESAFE D = D C = C |
| Assert | P BUS | Fail | Assert | QBUS | OK | MAKESAFE D = C C = C |
| Assert | P BUS | OK | Assert | QBUS | Fail | MAKESAFE D = D C = D |

(The table does not mention data and function code separately, but the MAKESAFE determination is made separately, as was discussed previously.)

Data Integrity Checks During the Error-Handling Sequence

As was indicated previously, circumstances beyond a simple parity error on one side of the interface will cause the assertion of MAKE ERROR T1*, MAKE ERROR T1 C* signals, which will cause the interface to step through the error-handling sequence described.

On three occasions during the error-handling sequence, test pattern data will be placed on the bus:

1. In preparation of the STROBE that occurs at the beginning of ERROR SEQUENCE (i.e., during ERROR T1)
2. In preparation for the STROBE that occurs at the beginning of ERROR T3.
3. In preparation for the STROBE that occurs at the end of ERROR T3.

In the first case, the interface is placing all-1's on the bus. In the second case, the i/o controllers 18, 20 is placing all-1's on the bus. In the last case, no one is placing anything on the bus, and it should be all-0's.

When an assertion of STROBE occurs, the PAL may enter an new "OBEY" condition, based on the results of the test.

Checking for the All-Ones Condition During ERROR T1 Sequence

| | |
|---|---|
| PAL: | OBEY_P = ERR_T1_DEL D * CHK_OK P * WAIT IN P * /RESET<br>OBEY_Q = ERR_T1_DEL C * CHK_OK Q * WAIT_IN Q * /RESET |

The illustrated circuitry checks for an all 1's condition when the interface is not in the ERROR T3 state.

If both OBEY P* and OBEY Q* were asserted, both buses were in use and an error occurred. If the P bus fails its check, the first equation above will not allow continued operation of OBEY P*. If the Q bus fails its check, the second equation above will not allow continued operation of OBEY Q*.

If only OBEY P* was asserted, only the P bus was in use. Therefore, the first equation will fail because OBEY Q* was not asserted. The second equation will check the Q bus to see if OBEY Q* should be asserted such that data transfer now uses the Q bus.

If only OBEY Q* was asserted, only the Q bus was in use. Therefore, the second equation will fail because OBEY P* was not asserted. The first equation will check the P BUS to see if OBEY P* should be asserted such that data transfer now uses the P BUS.

In each of the above equations, the CHECK OK test is performed during the ERROR T1 time (MAKE ERROR T1 and NOT ERROR SEQUENCE) for the side of the interface appropriate to the bus being checked.

If neither bus passes its test, neither OBEY will be asserted on the next assertion of STROBE, and the interface will then go BROKEN.

Checking for the All-Ones Condition During the Error T2 Sequence

| | |
|---|---|
| PAL equations: | OBEY_P = OBEY_P * CHK_OK P * ERR_SEQ D * /WAIT_P * /RESET * ERR_T2 D<br>OBEY_Q = OBEY_Q * CHK_OK Q * ERR_SEQ C * /WAIT_Q * /RESET * ERR_T2 C |

There are two data checks performed during ERROR SEQUENCE. An all-1's check at the midpoint (which is the beginning of ERROR SEQUENCE / ERROR T3) and an all-0's check at the end.

Each data check is performed by the check circuitry located in the illustration. The 1's check takes place at the time of the STROBE which will take the interface into ERROR T3 state.

Checking for the All-Zeros Condition During the Error T3 Sequence

| | |
|---|---|
| PAL Equations: | OBEY_P = OBEY_P * CHECK_OK P * ERR_SEQ D * WAIT_P * /RESET * ERR_T3 D<br>OBEY_Q = OBEY_Q * CHECK_OK Q * ERR_SEQ C * /WAIT_Q * /RESET * ERR_T3 D |

The 0's check takes place at the time of the STROBE which will take the interface out of the ERROR T3 state. In each case, if the check is OK, and the WAIT signal is negated (it was supposed to be turned off at the end of ERROR T1, the OBEY output assertions of the PALS remains unchanged when the next assertion of STROBE occurs.

Other Ways in Which "Bus Obedience" Get Changed

| | |
|---|---|
| PAL Equations: | OBEY_P = /OBEY_P * TOGGLE * /RESET<br>OBEY_P = /OBEY_P * /OBEY Q * /RESET<br>OBEY_Q = /OBEY_Q * TOGGLE * /RESET<br>OBEY_Q = /OBEY_Q * /OBEY P * /RESET |

The drive side array 32 control PAL monitors the OBEY P*, OBEY Q* and TOGGLE OBEY P* for the following additional conditions (assuming no RESET):

1. If the OBEY P* signal is not presently asserted, and a toggle request occurs, OBEY P* gets asserted on the next assertion of STROBE.
2. If the OBEY P* signal is not presently asserted, and OBEY Q* isn't asserted either, OBEY P* gets asserted on the next assertion of STROBE.

Driving Data onto the P BUX and QBUS

Data is driven onto the bus when DRIVE* is low. The DRIVE* signal is low when the following conditions are true:

Error T1 AND Not Broken or: Function Code 0011 (Read) AND Selected AND Not Broken or: Function Code 0001 (Select) AND Me The first term is used to place all 1's on the bus during ERROR T1 state. The second term is the normal data reading case. The third term is the status reporting case immediately after transfer begins.

Broken

The BROKEN signal is generated by latching COMPARE OK* on the leading (falling) edge of STROBE*. The signal COMPARE OK* is asserted if any of the following conditions becomes true:

| | | |
|---|---|---|
| 1 | | The XOR of Data Out 0-7 with Data Out 0-7 C |
| 2 | or: | the XOR of Drive D* with Drive C* |
| 3 | or: | the XOR of Error T1 D* with Error T1 C* |
| 4 | or: | the XOR of Error T1 D with Error T1 C |
| 5 | or: | the XOR of PDATA PAR OUT D with PDATA PA OUT C |
| 6 | or: | the XOR of WAITOUT D with WAITOUT C |
| 7 | or: | (the XOR of OBEY P* with OBEY Q*) AND (PFC IN EQ* or PDATA IN EQ*) |
| 8 | or: | OBEY P* AND OBEY Q* |
| 9 | or: | GIOC (controller 18, 20) SET BROKEN |
| 10 | or: | DEVICE GO BROKEN |

Term 1: If the data that the drive side array 32 of the interface would like to put on the bus and the data which the check side array 34 would like to put on the bus do not agree, the interface is BROKEN.

Term 2: If one side of the interface would like to drive data onto the bus, but the other side would not, the interface is BROKEN.

Terms 3 and 4: If the two sides of the interface disagree as to whether or not they are in the ERROR T1 sub-state, the interface is BROKEN.

Term 5: If the parity of the data that the drive side array 32 of the interface would like to put on the bus and the parity of the data which the check side array 34 would like to put on the bus do not agree, the interface is BROKEN.

Term 6: If one side of the interface is requesting a bus WAIT, but the other is not, the interface is BROKEN.

Term 7: If only one of the OBEY signals is asserted, the data is all being received from one bus. If the data or function code information received from that bus is inconsistent on the two sides of the interface, the interface must be BROKEN.

Term 8: If neither OBEY signal is asserted, the interface is BROKEN. This situation is usually the result of complete test failure during an ERROR SEQUENCE.

Term 9: If the controller 18, 20 to which the interface connects desires to take the interface off-line, it can do so by asserting this signal.

Term 10: If the device to which the interface connects desires to take the interface off-line, it can do so by asserting this signal.

Appendices A and B, filed herewith, provide further hardware and software specifications for the fault-tolerant peripheral control system described above and, particularly, for the i/o controllers 18, 20, the gate arrays 32, 34, and the adaptors 44.

It will thus be seen that the objects set forth above, among those made apparent from the preceding description, are efficiently attained. It will be understood that changes may be made in the above constructions and in the foregoing sequences of operation without departing from the scope of the invention. It is accordingly intended that all matter contained in the above description or shown in the accompanying drawing be interpreted as illustrative rather than limiting in sense.

APPENDIX A

Hardware Schematics

| REV | CHANGE NUMBER | DATE | ORIG | CHK |
|---|---|---|---|---|
| 00 | ECO 2428 | 1/07/87 | JV | |
| 01 | ECO 2802 | 2/24/87 | JV | |
| 02 | ECO 2873 | 3/31/87 | JV | |

IOP K10000

| PAGE | FUNCTION | PAGE | FUNCTION |
|---|---|---|---|
| 2,3 | CPU/BUFFERS/TIMING | 26 | BUS COMPARATORS/BROKEN |
| 4,5 | DRAM CONTROL LOGIC | 27 | PARITY/ID PROM/OBEY |
| 6,7 | TIMER/PROM/INTERRUPT | 28 | N/A |
| 8,9 | MAP | 29,30 | PBUS TRANSCEIVERS/PARITY |
| 10,11 | CONTROL/STATUS | 31,32 | PBUS TIMING/CONTROL PALS |
| 12,13 | DTACK/BERR | 33,34 | PBUS DATA MUX'S/LATCHES |
| 14 | DRAM MEMORY | 35 | PBUS COMPARATORS/FLASH/VERIFY |
| 15 | LOCAL BUS ERROR CHECKERS | 36 | PBUS STROBE/OBEY/TIME-OUT |
| 16,17 | STRATABUS/IOP INTERFACE | 37,38 | PBUS CHECKSUM GENERATORS |
| 18 | LOCAL CLOCKS | 39 | PULLUPS/PULLDOWNS |
| 19 | N/A | 40-43 | POWER SUPPLY |
| 20,21 | STRATABUS TRANSCEIVERS | 44 | BYPASS-CAPACITOR |
| 22,23 | STRATABUS CYCLE LOGIC | 45 | CONNECTOR DEFINITION/PWR SYNC/DUMB |
| 24,25 | STRATABUS TIMING/CONTROL | | |

_DRAWING_

TITLE=DS-K10000-01_A002

ABBREV=IOP
LAST_MODIFIED=Wed Apr 22 17:08:07 1987

_DEFINE_

X_FIRST=0

X_STEP=SIZE

NOTICE: STRATUS CONFIDENTIAL INFORMATION CLASS 2. THIS DOCUMENT CONTAINS CONFIDENTIAL AND PROPRIETARY INFORMATION OF STRATUS COMPUTER

The information contained in this document is for internal Stratus use only. This document may not be reproduced or copied, in whole or part, or the information used by any party other than Stratus for any purpose except as may be expressly authorized in writing by an authorized Stratus representative.

Stratus

| TITLE: IOP | DATE: 2/21/88 | | |
|---|---|---|---|
| ENGINEER: JMI | NUMBER: DS K10000-01 | REV. 02 | PAGE: 1 of 45 |

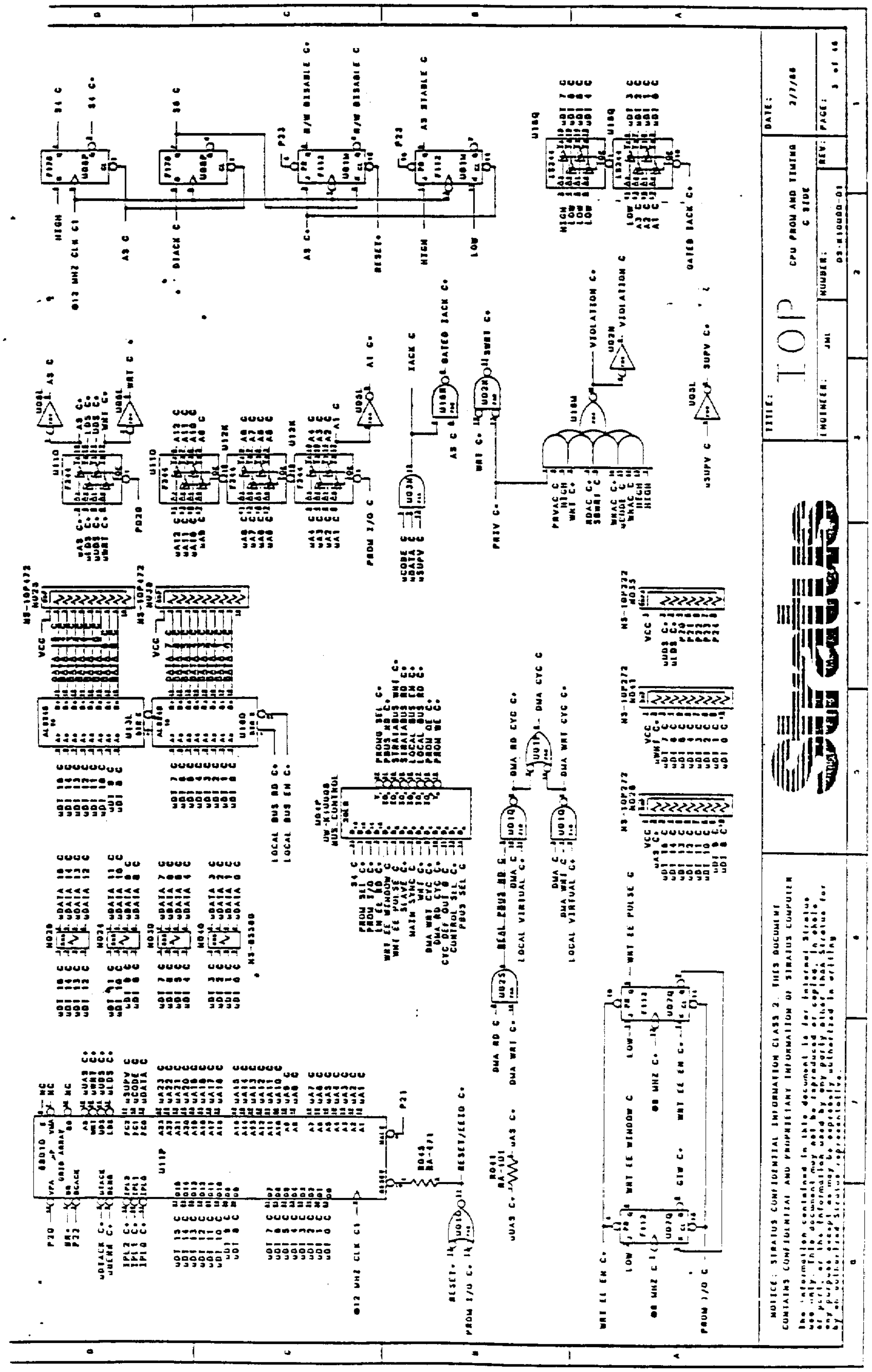

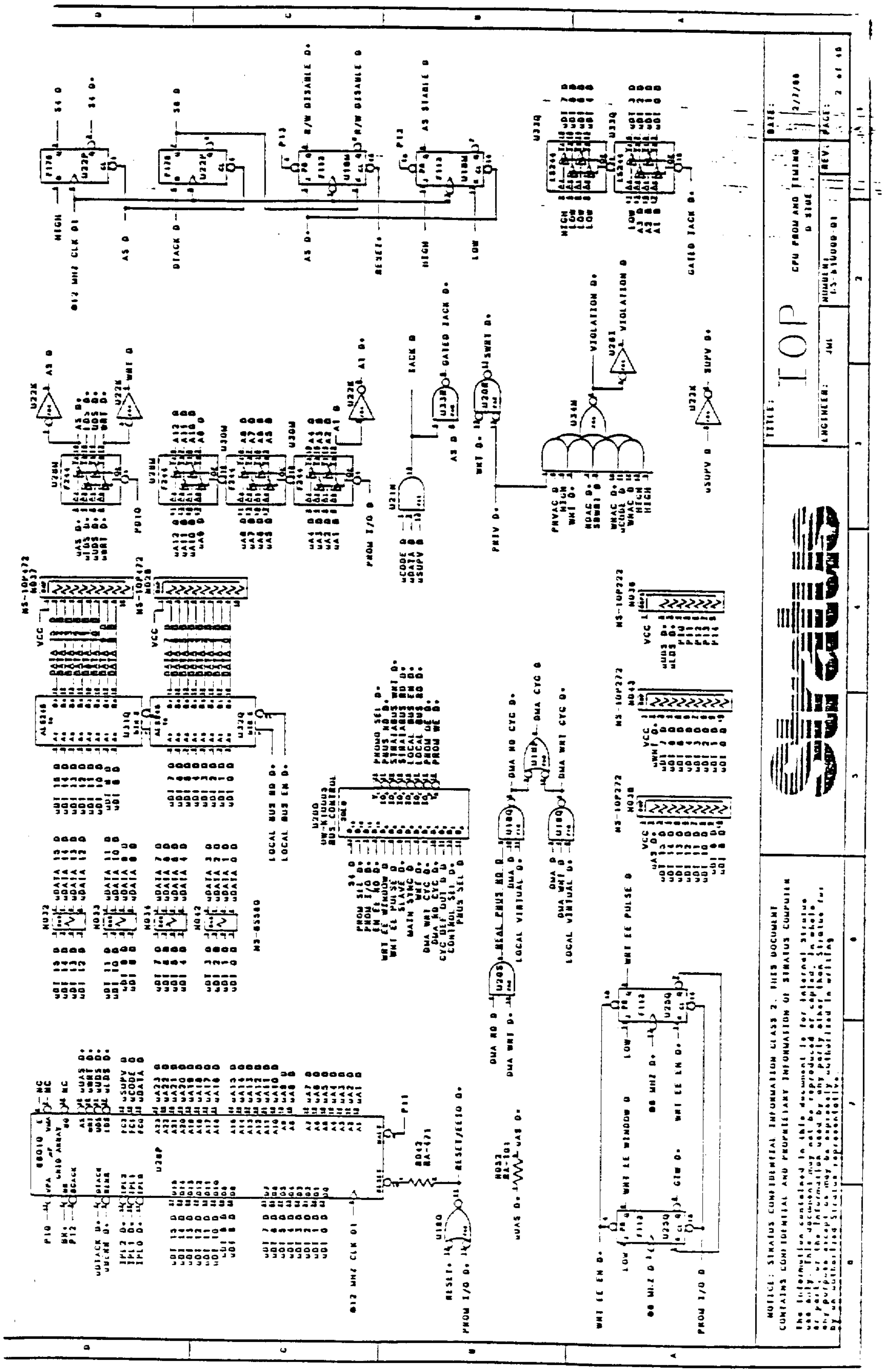

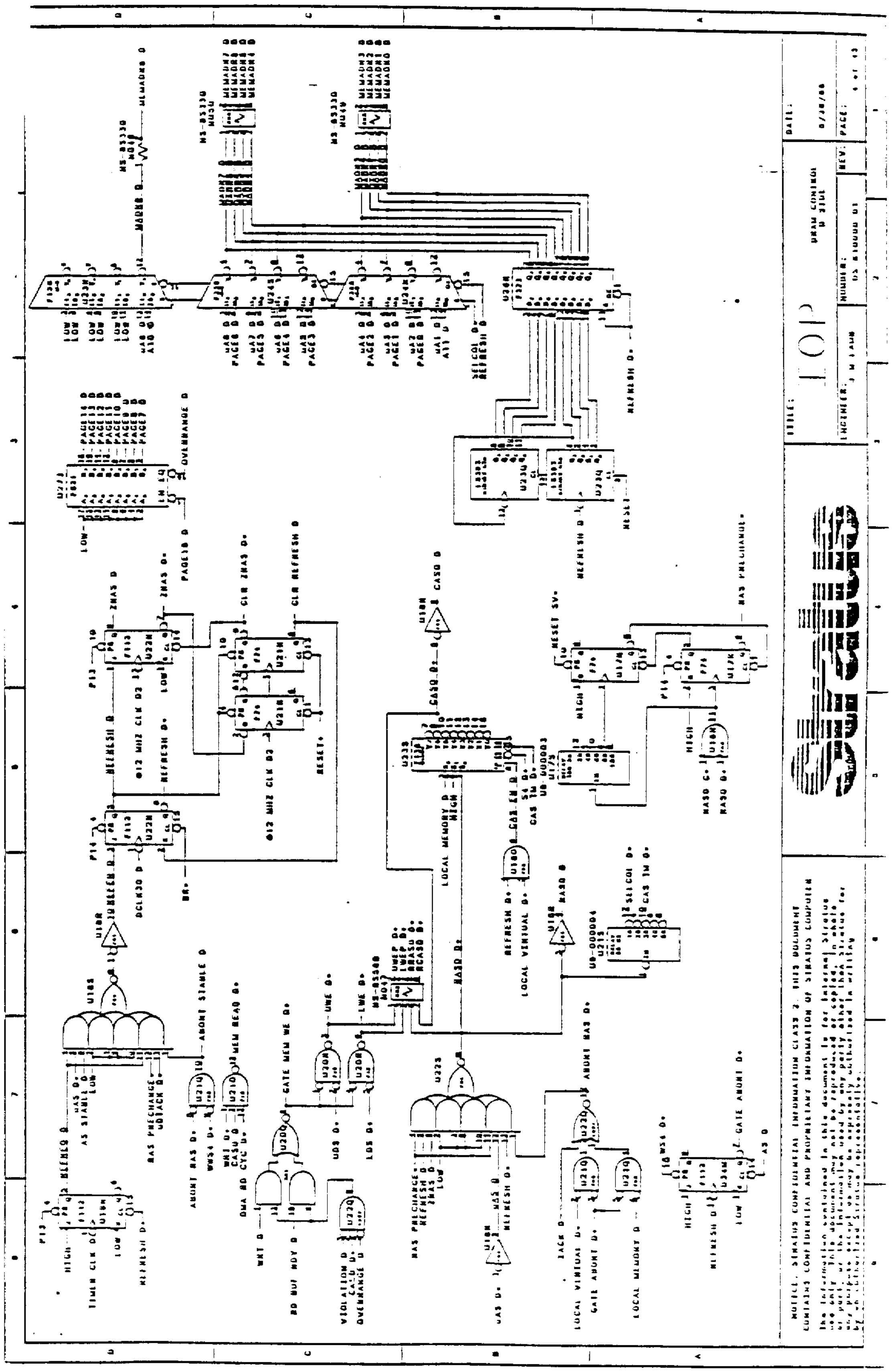

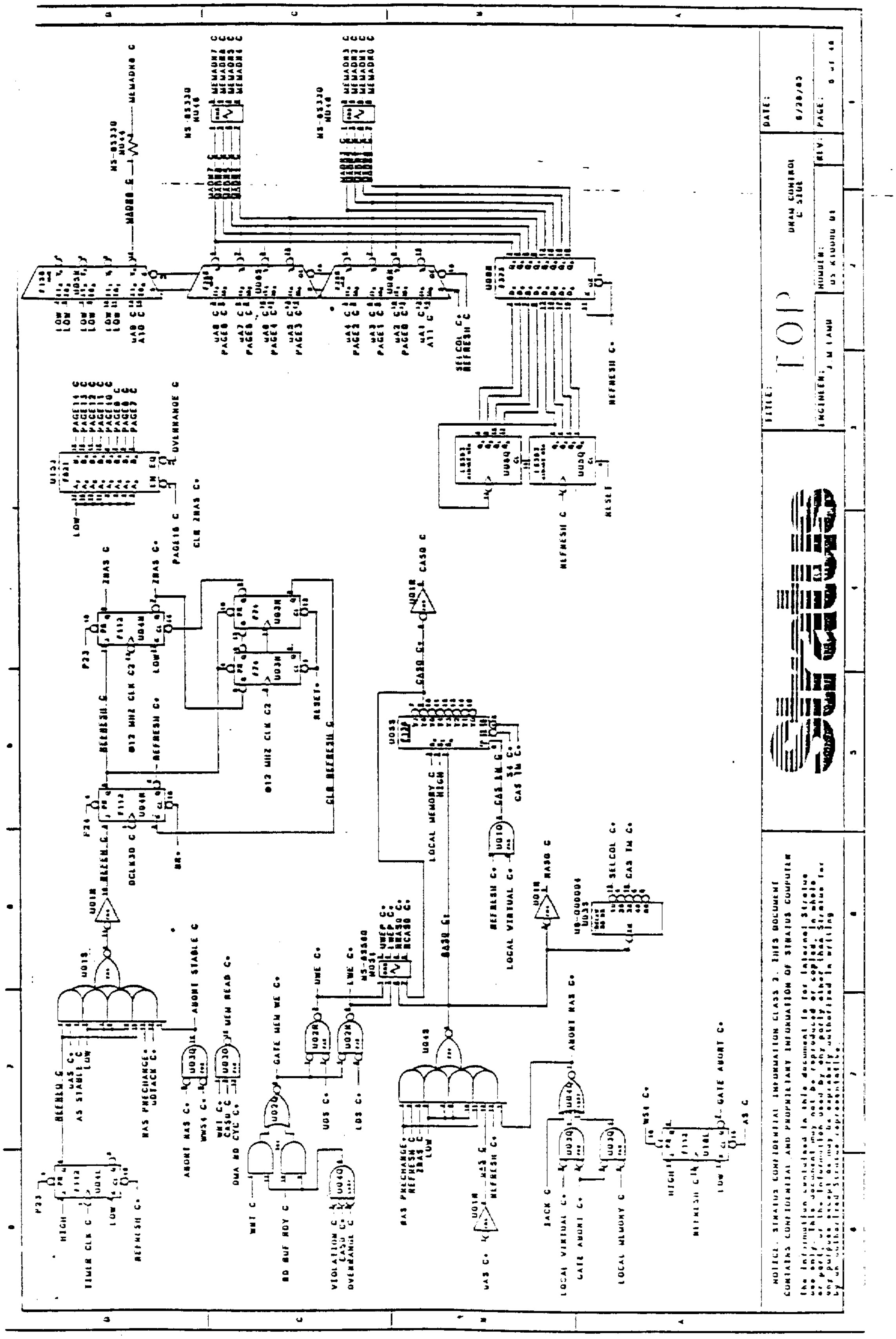

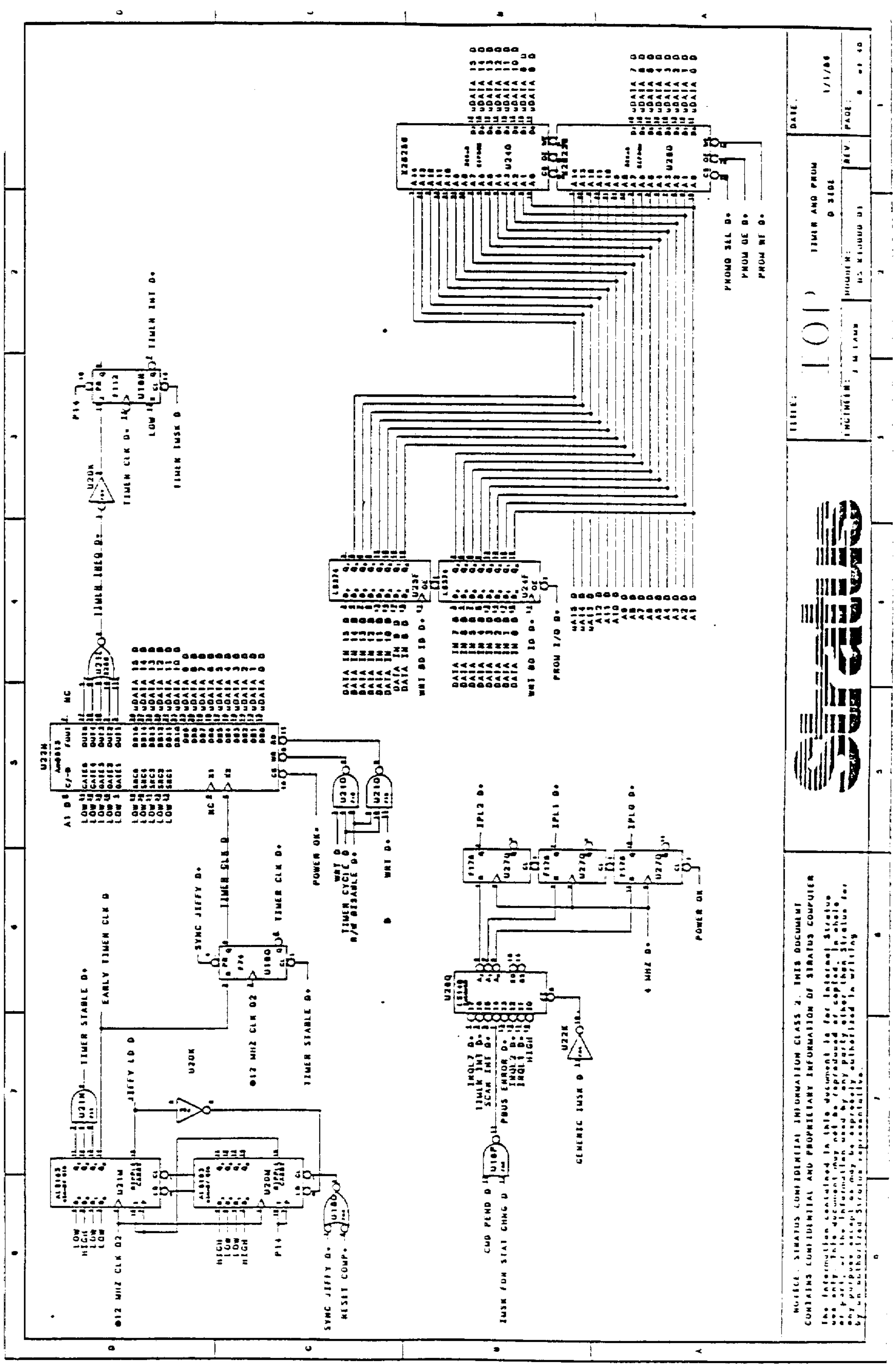

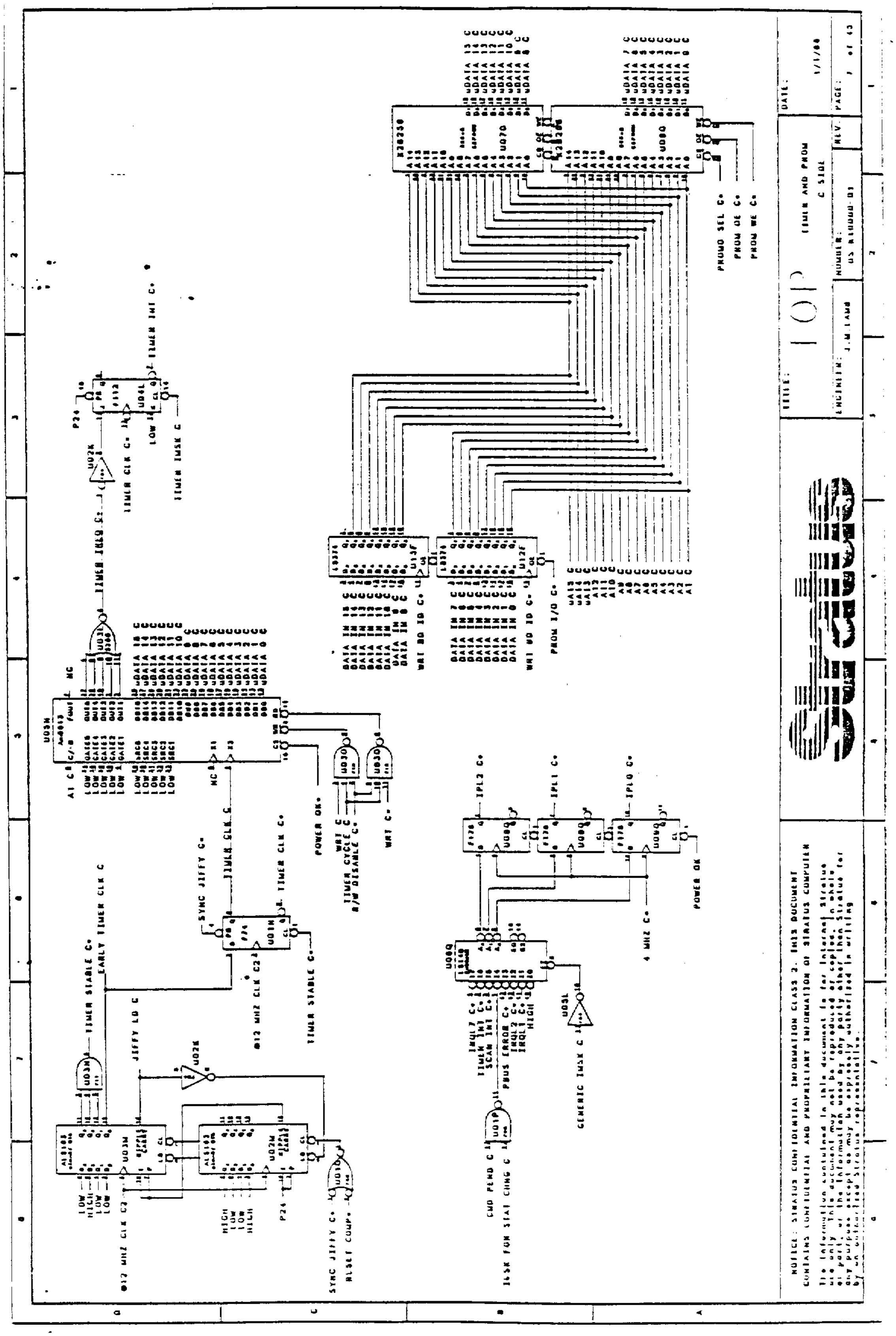

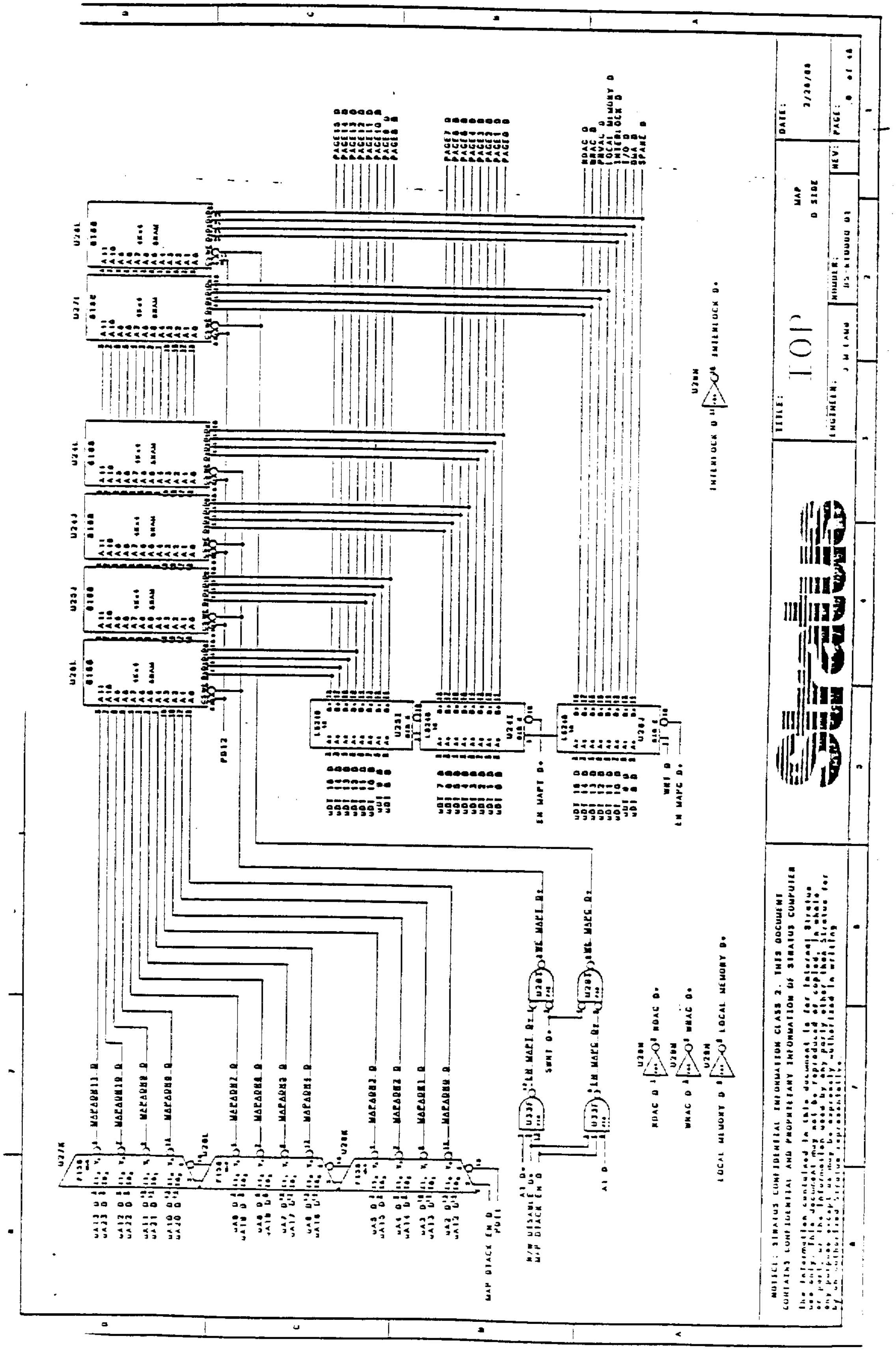

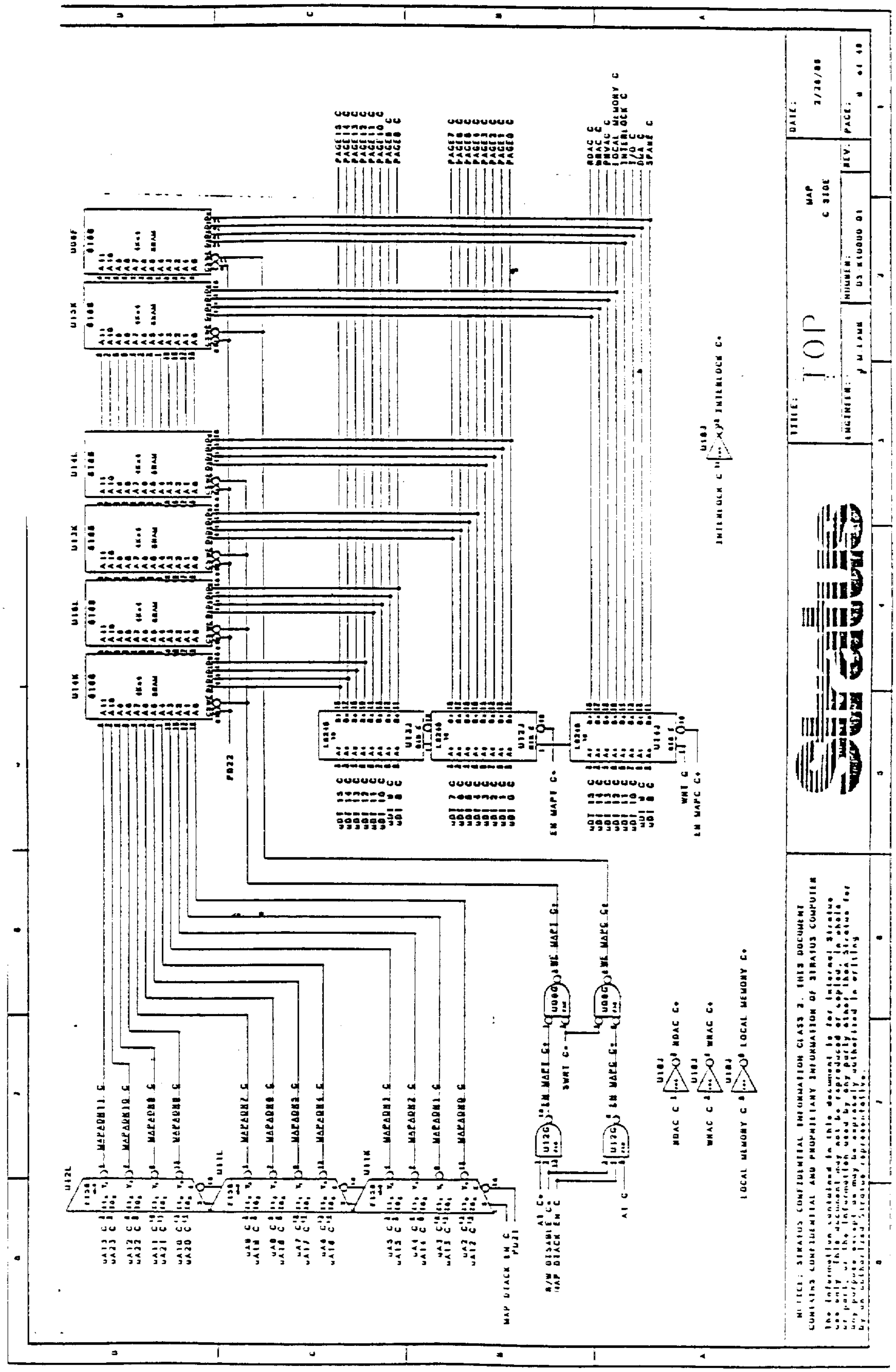

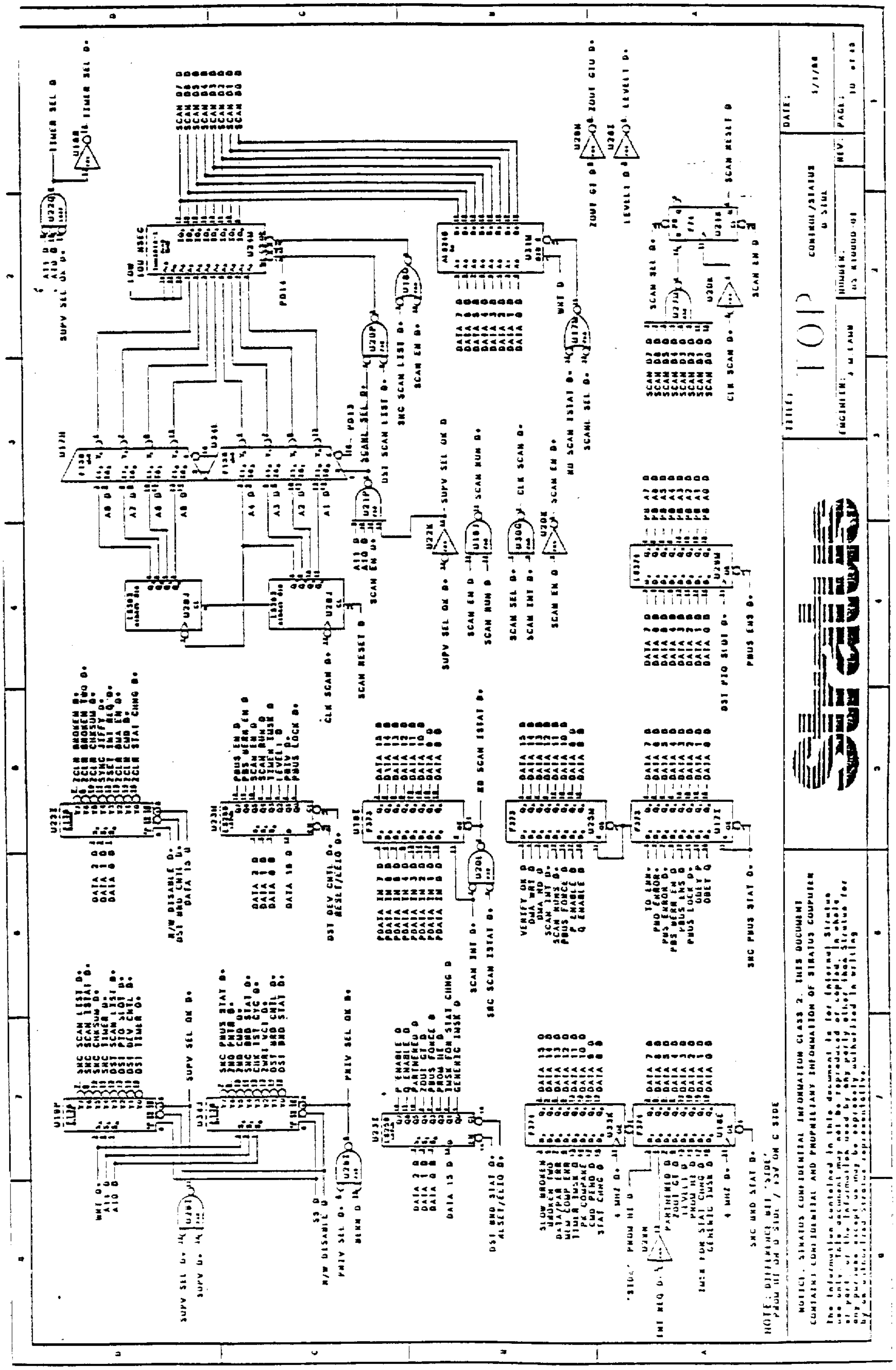

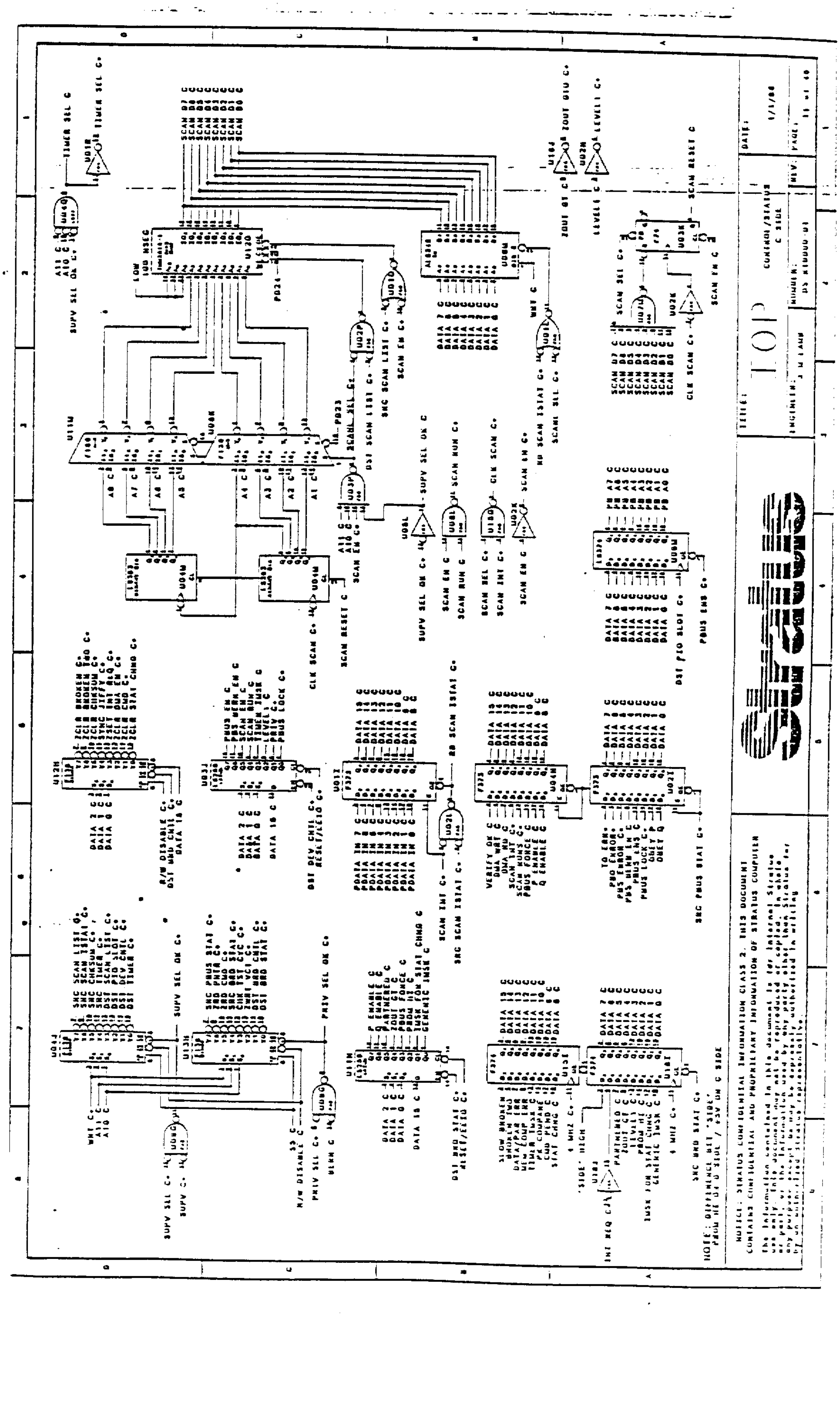

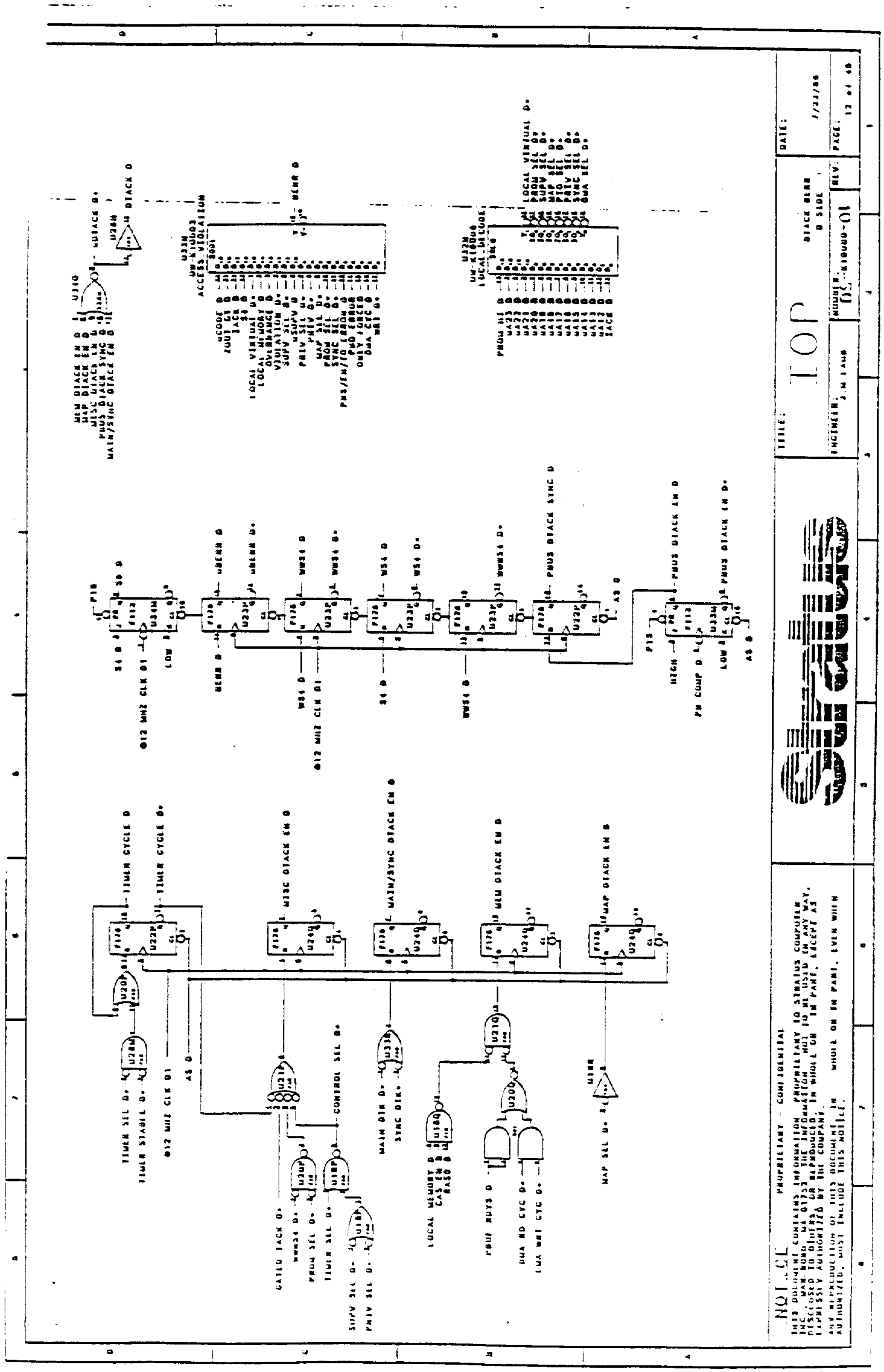

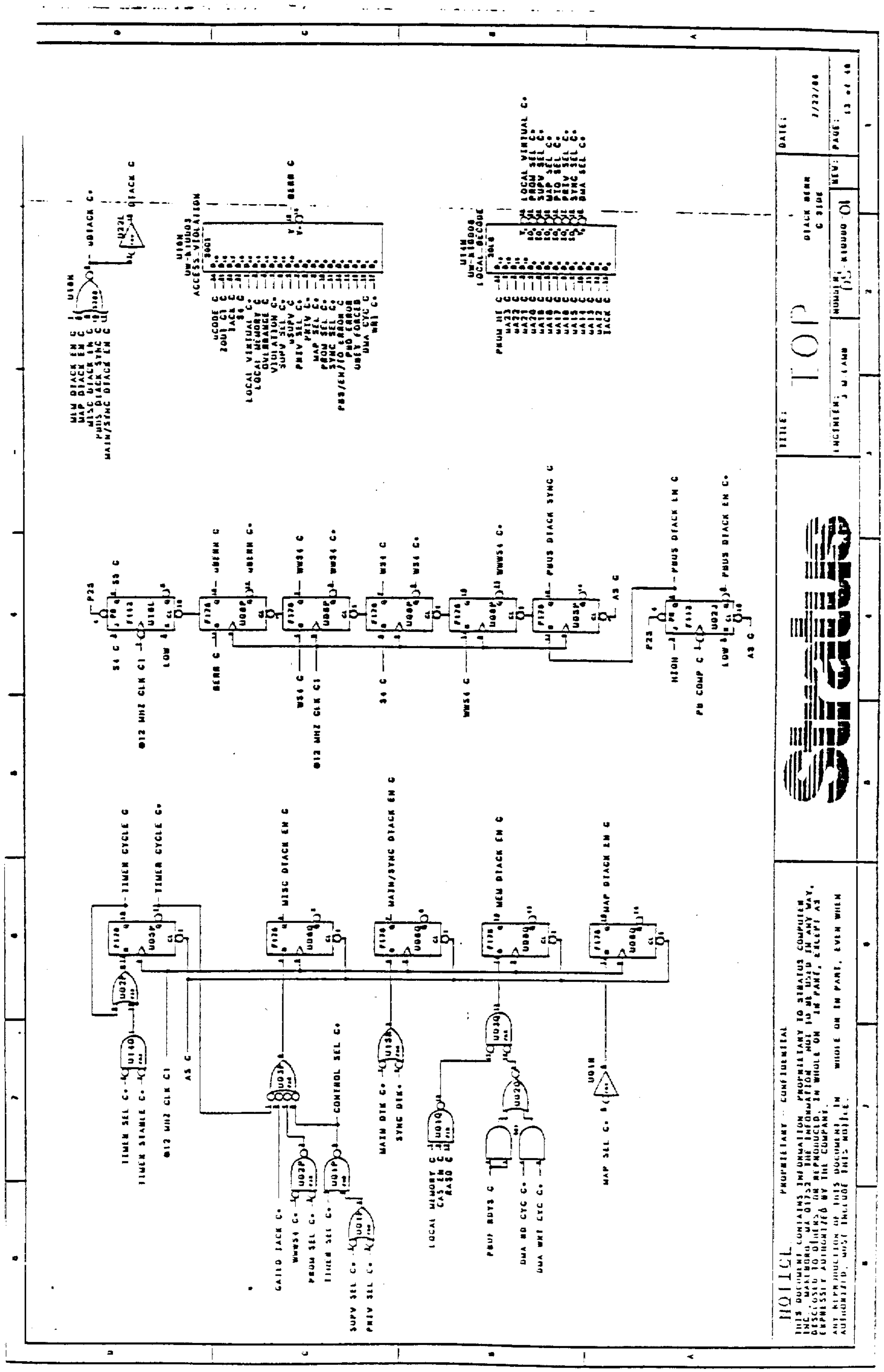

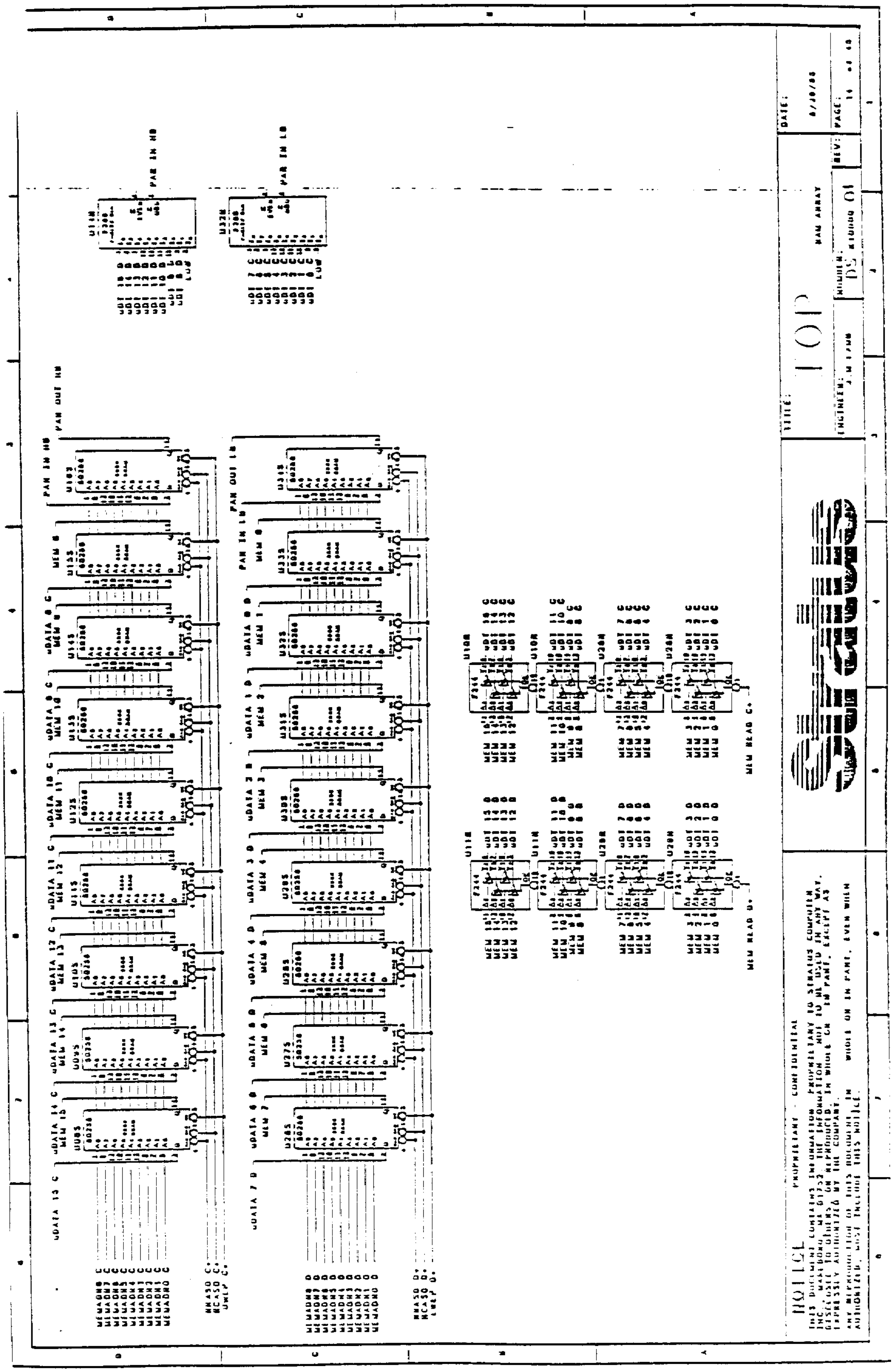

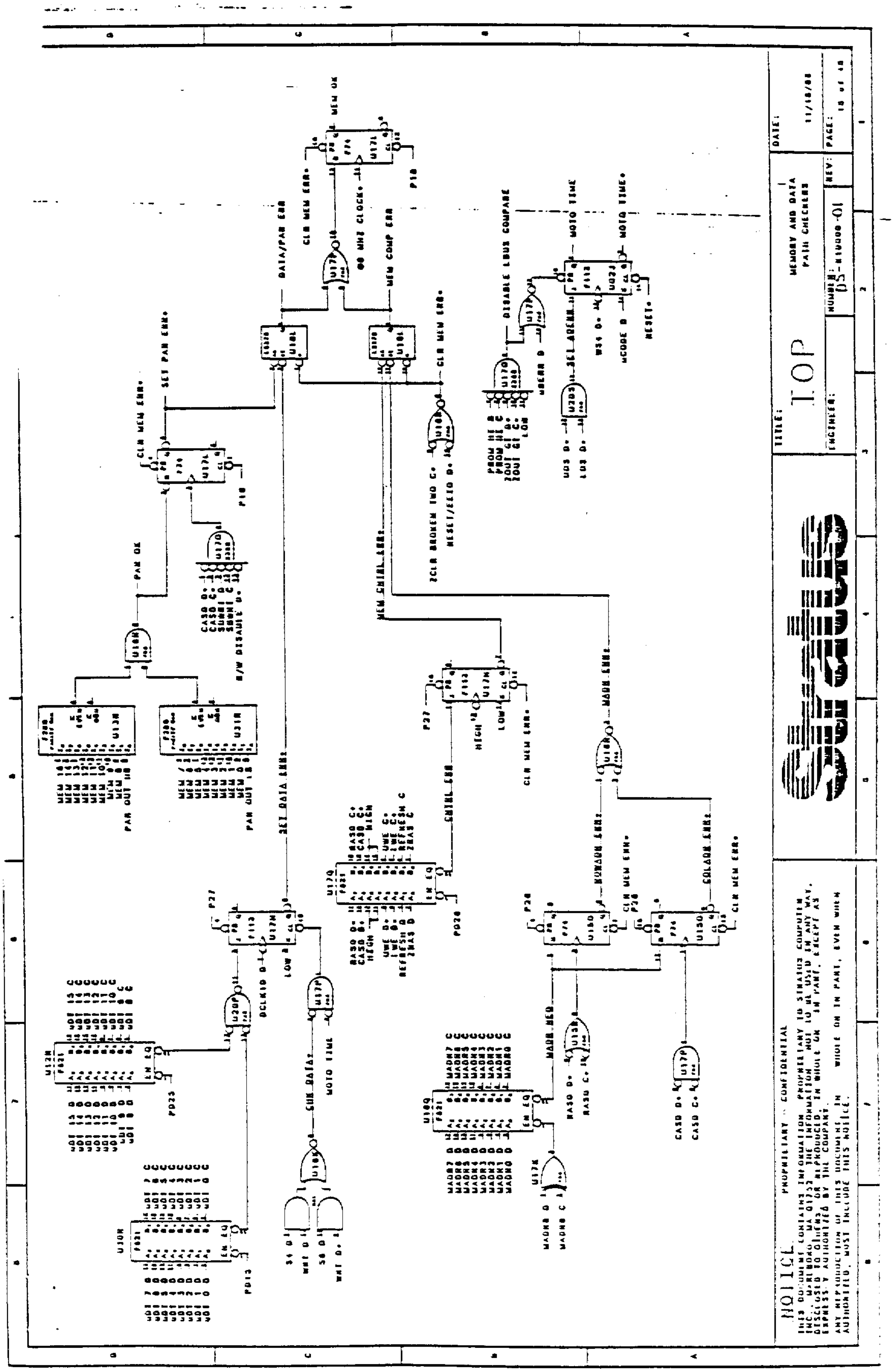
MEMORY AND DATA PATH CHECKERS
TOP

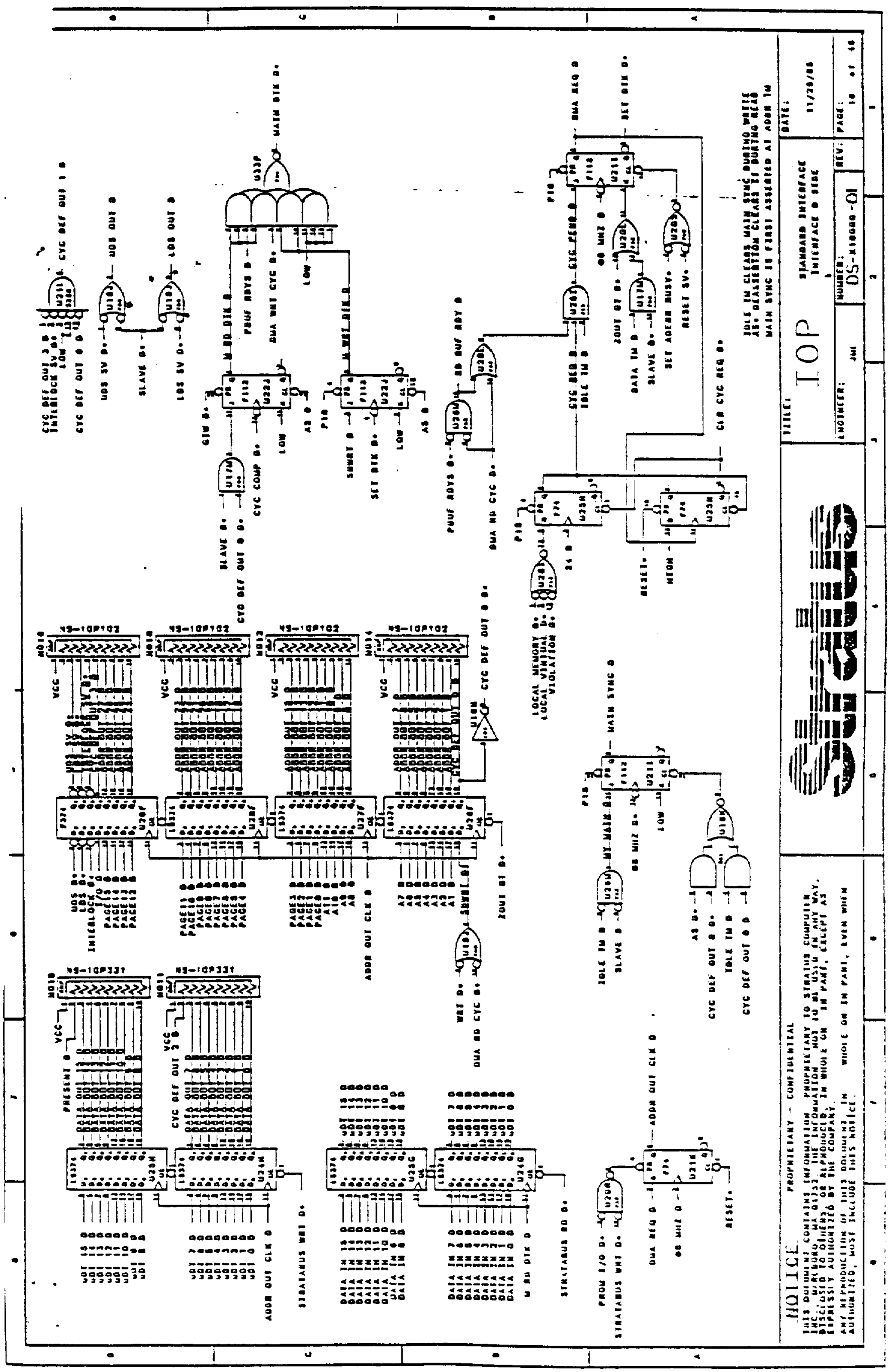

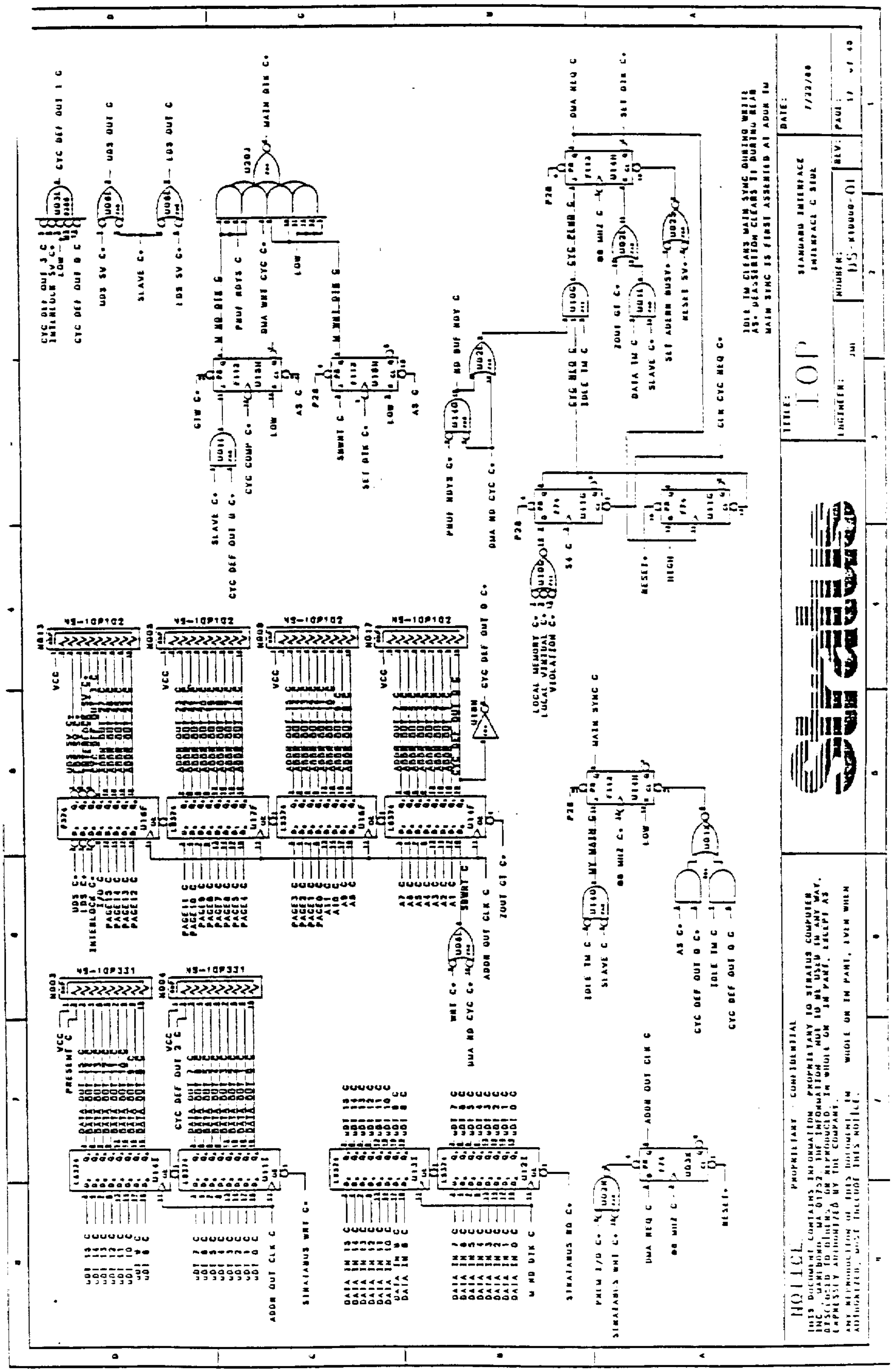

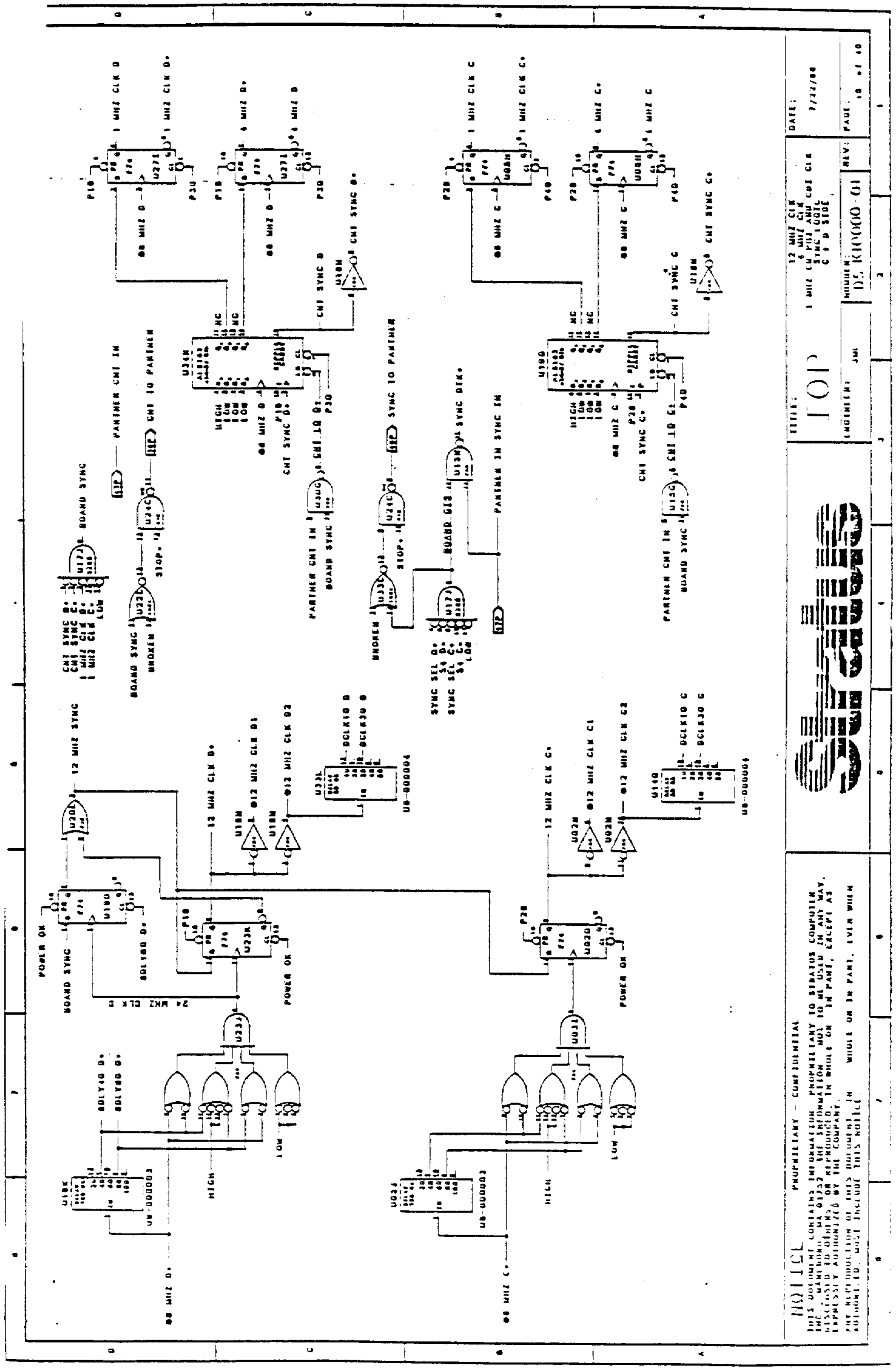

THIS PAGE INTENTIONALLY LEFT BLANK

NOTICE PROPRIETARY - CONFIDENTIAL
THIS DOCUMENT CONTAINS INFORMATION PROPRIETARY TO STRATUS COMPUTER INC., MARLBORO, MA 01752. THE INFORMATION NOT TO BE USED IN ANY WAY, DISCLOSED TO OTHERS, OR REPRODUCED, IN WHOLE OR IN PART, EXCEPT AS EXPRESSLY AUTHORIZED BY THE COMPANY.
ANY REPRODUCTION OF THIS DOCUMENT, IN WHOLE OR IN PART, EVEN WHEN AUTHORIZED, MUST INCLUDE THIS NOTICE.

Stratus

| TITLE: IOP | | | DATE: 6/20/85 |
|---|---|---|---|
| ENGINEER: JML | NUMBER: DS-H10000-01 | REV: | PAGE: 10 of 48 |

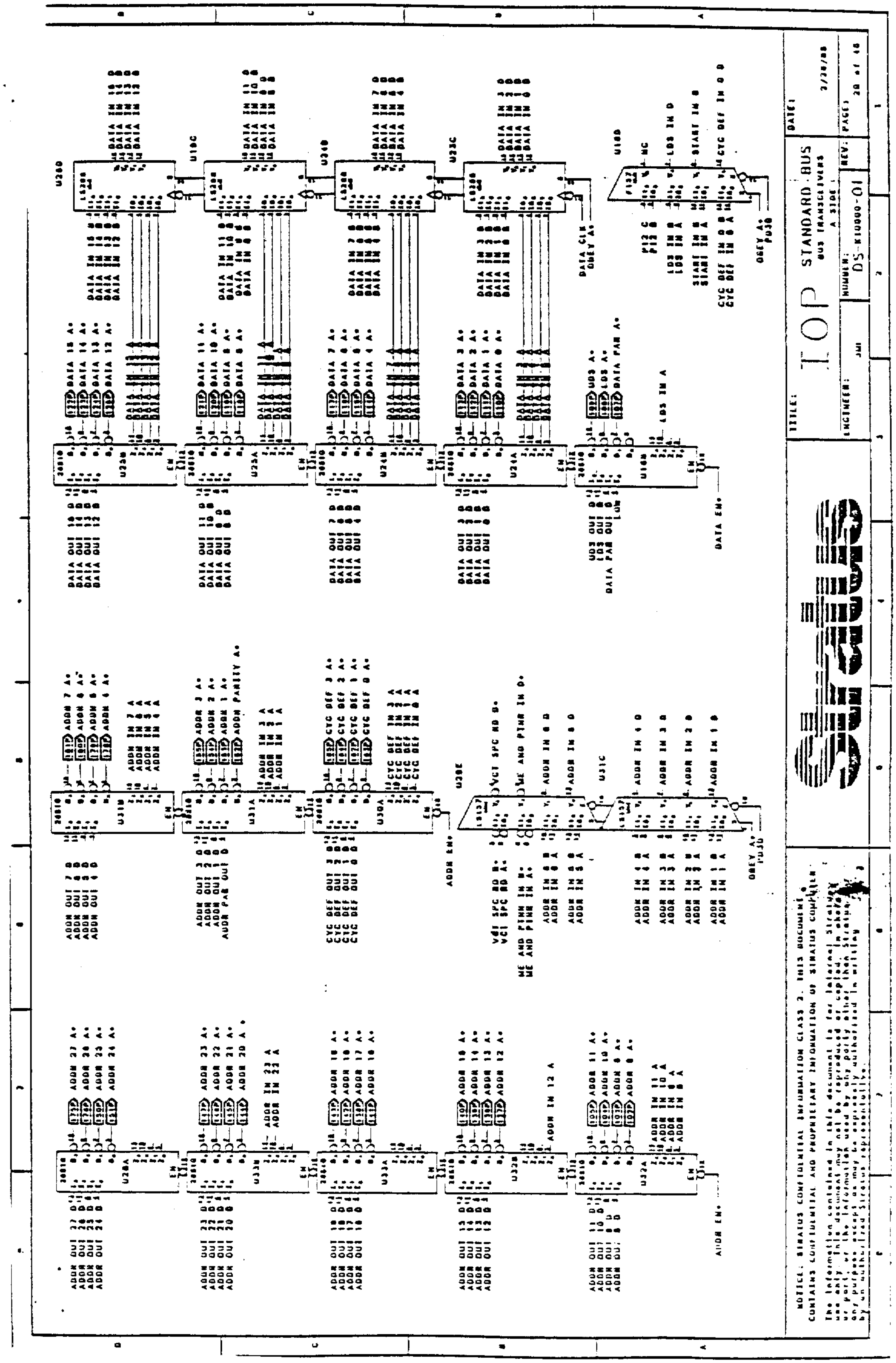
STANDARD BUS

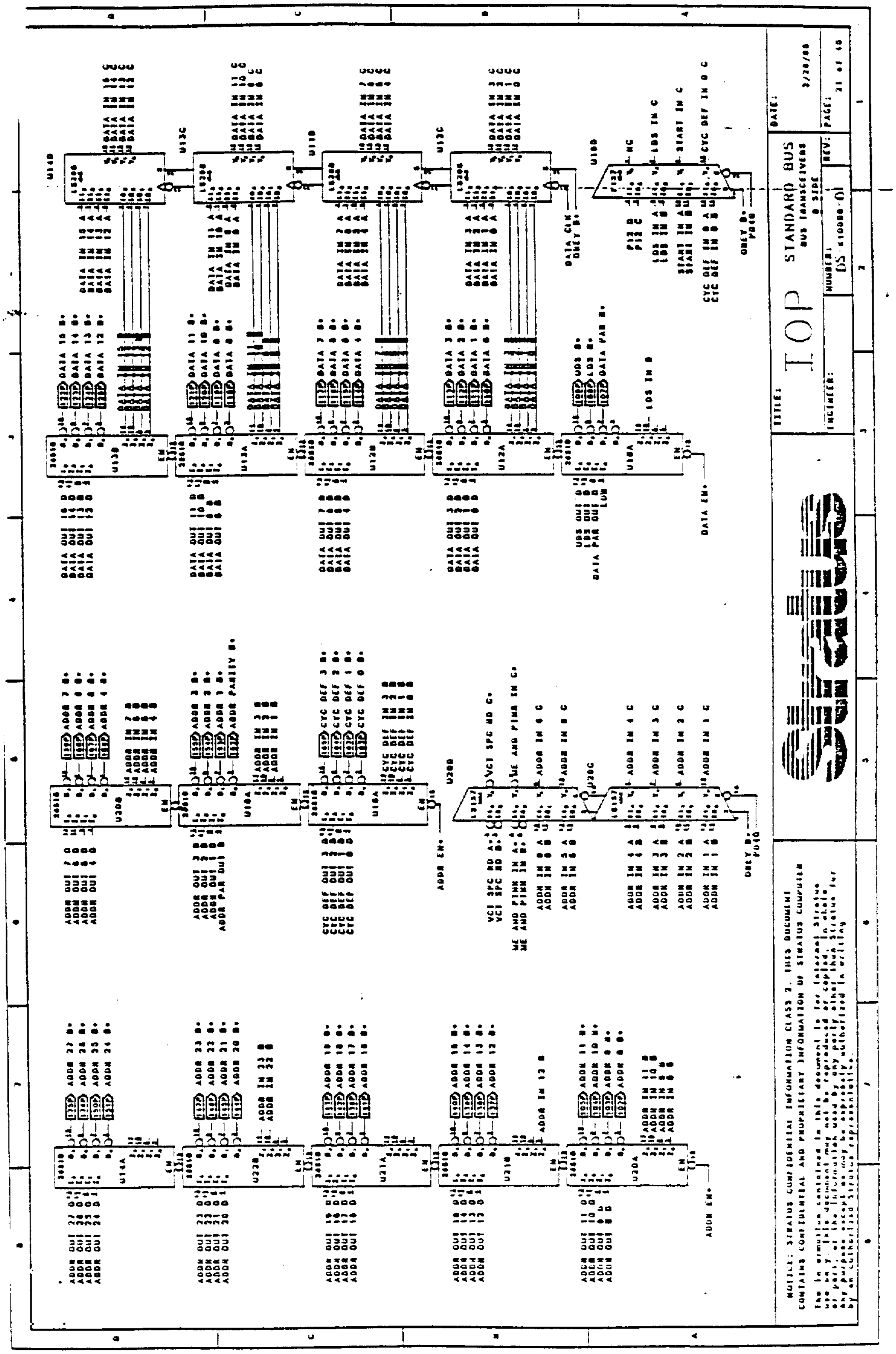
IOP
STANDARD BUS

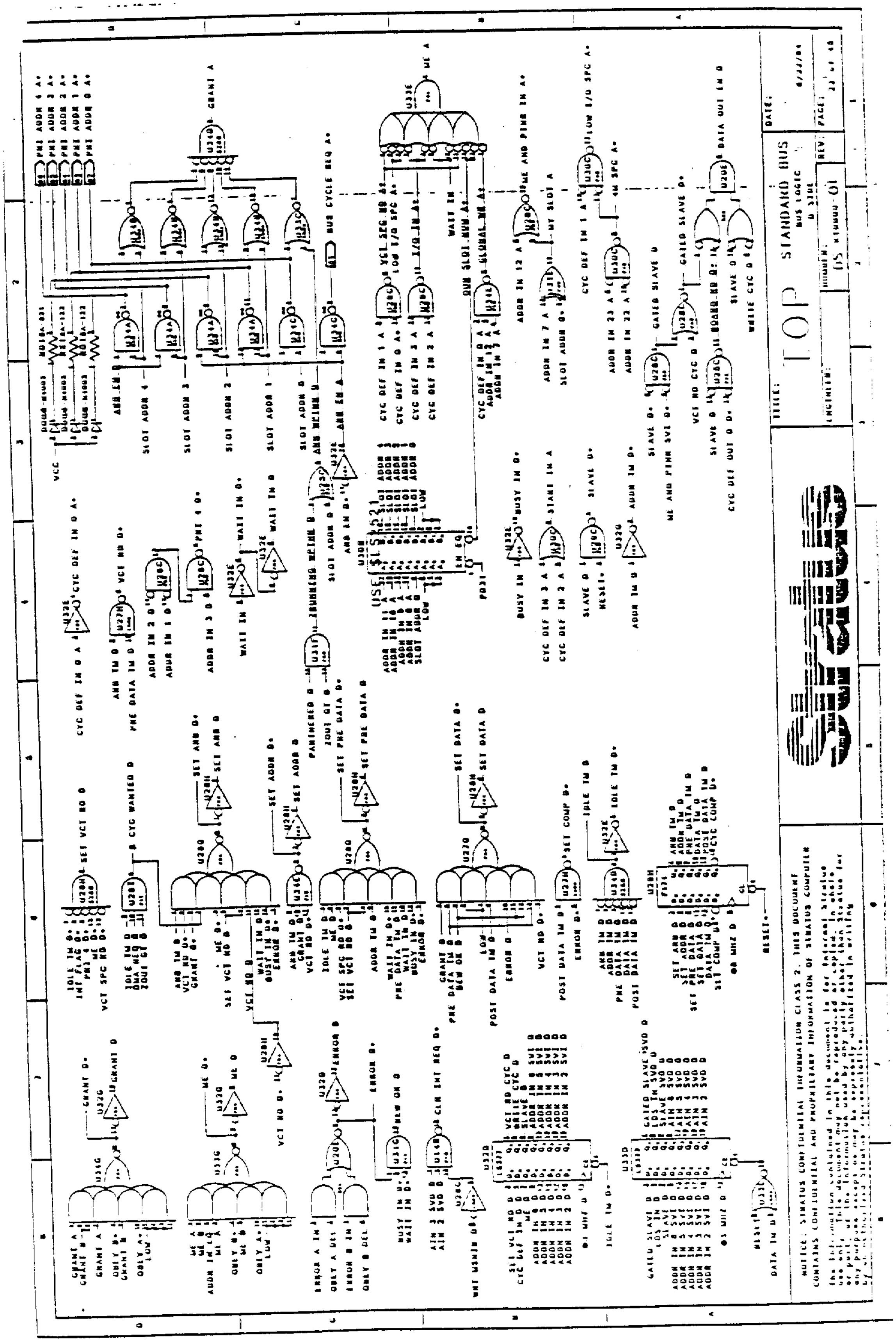

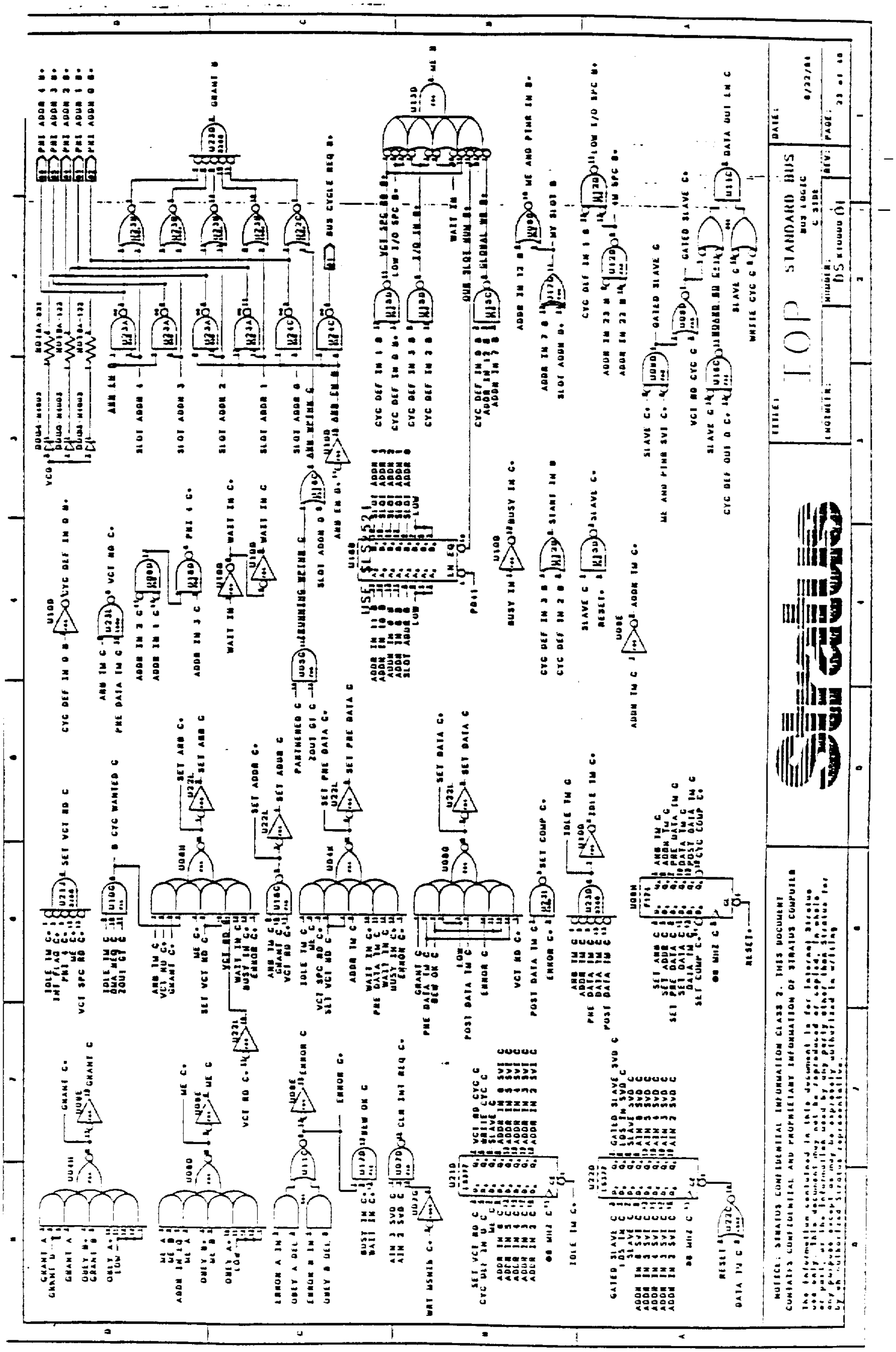

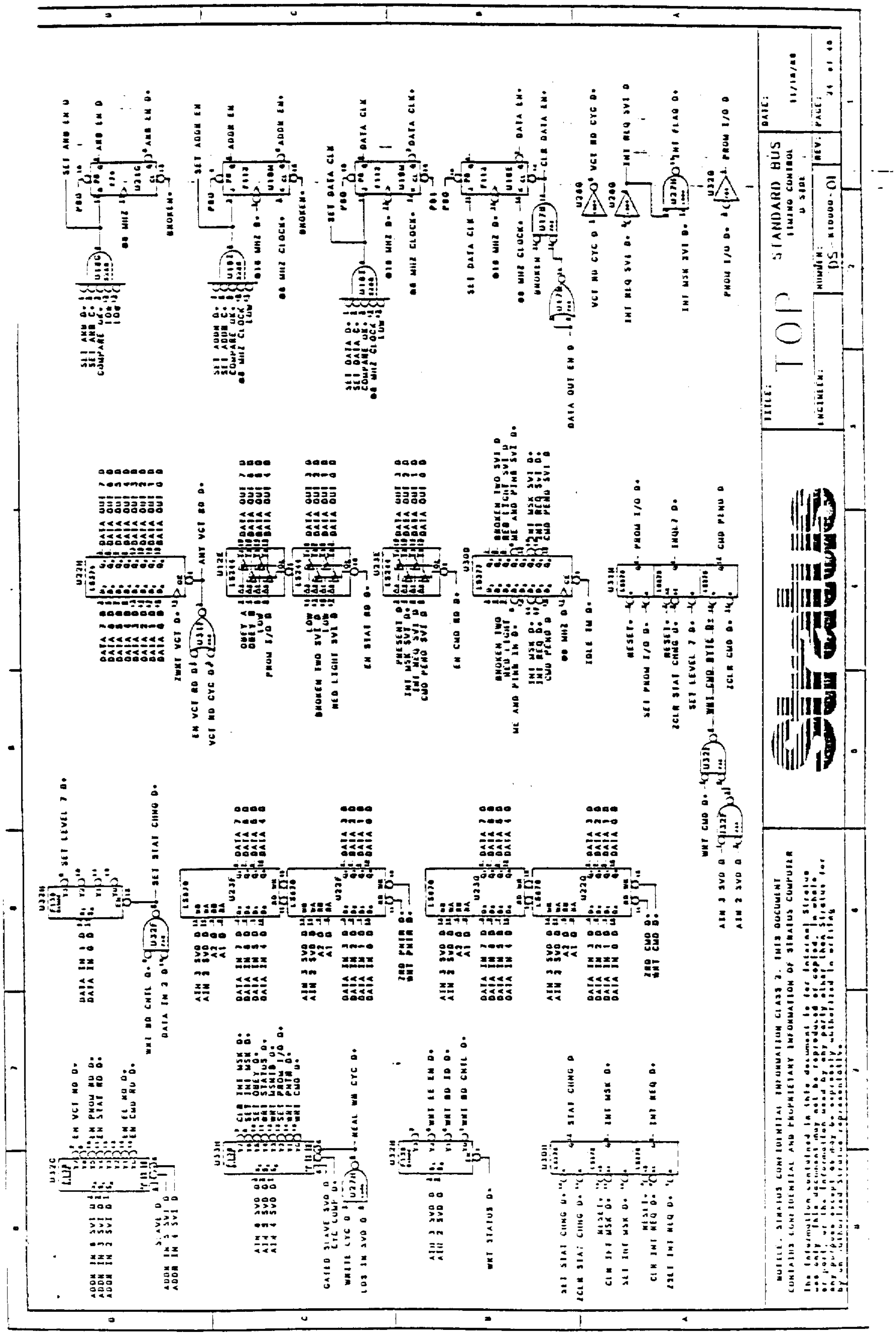

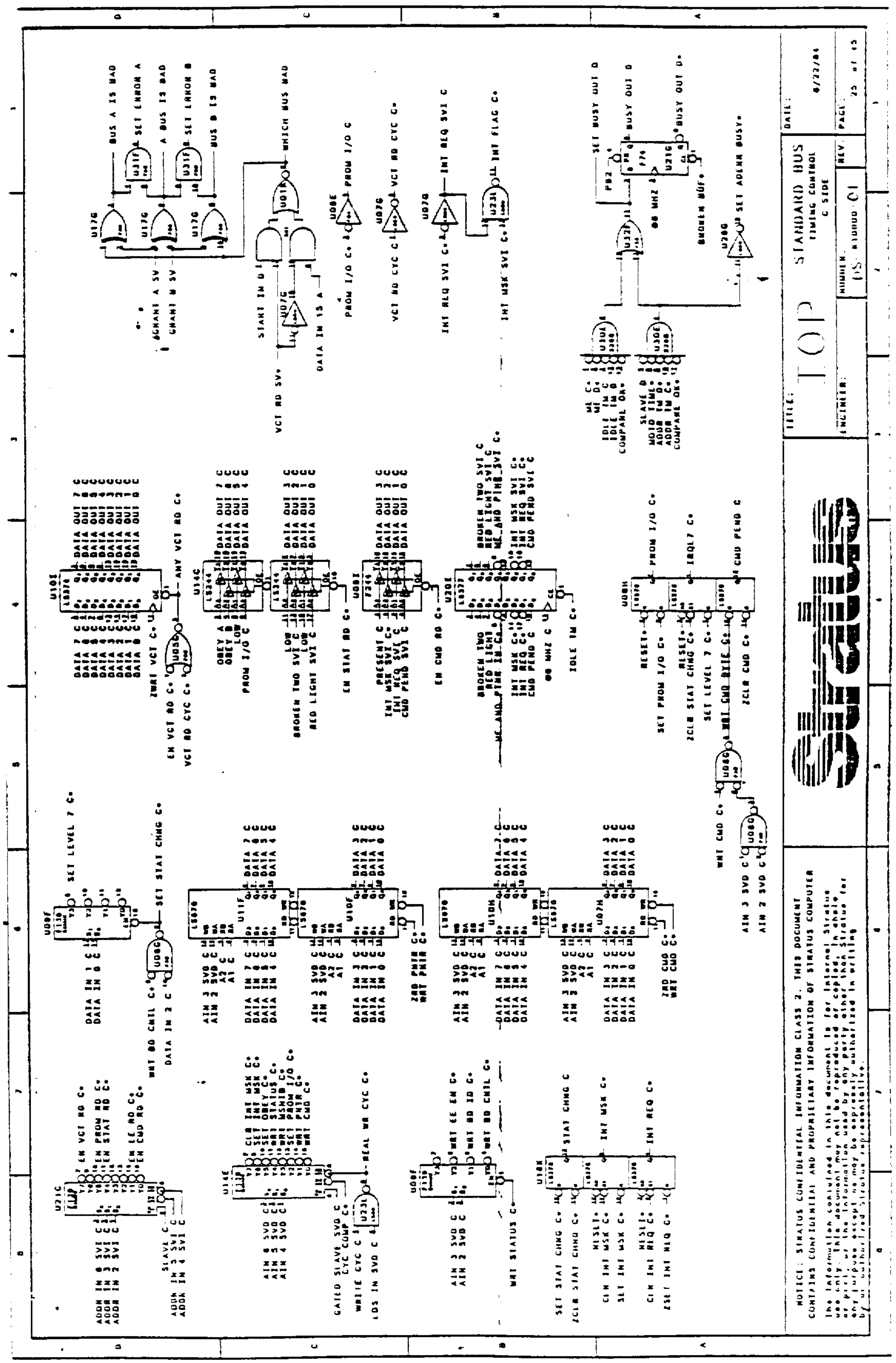
TOP
STANDARD BUS
TIMING CONTROL
C SIDE
DATE:
PAGE:
REV.
NUMBER:
ENGINEER:
TITLE:

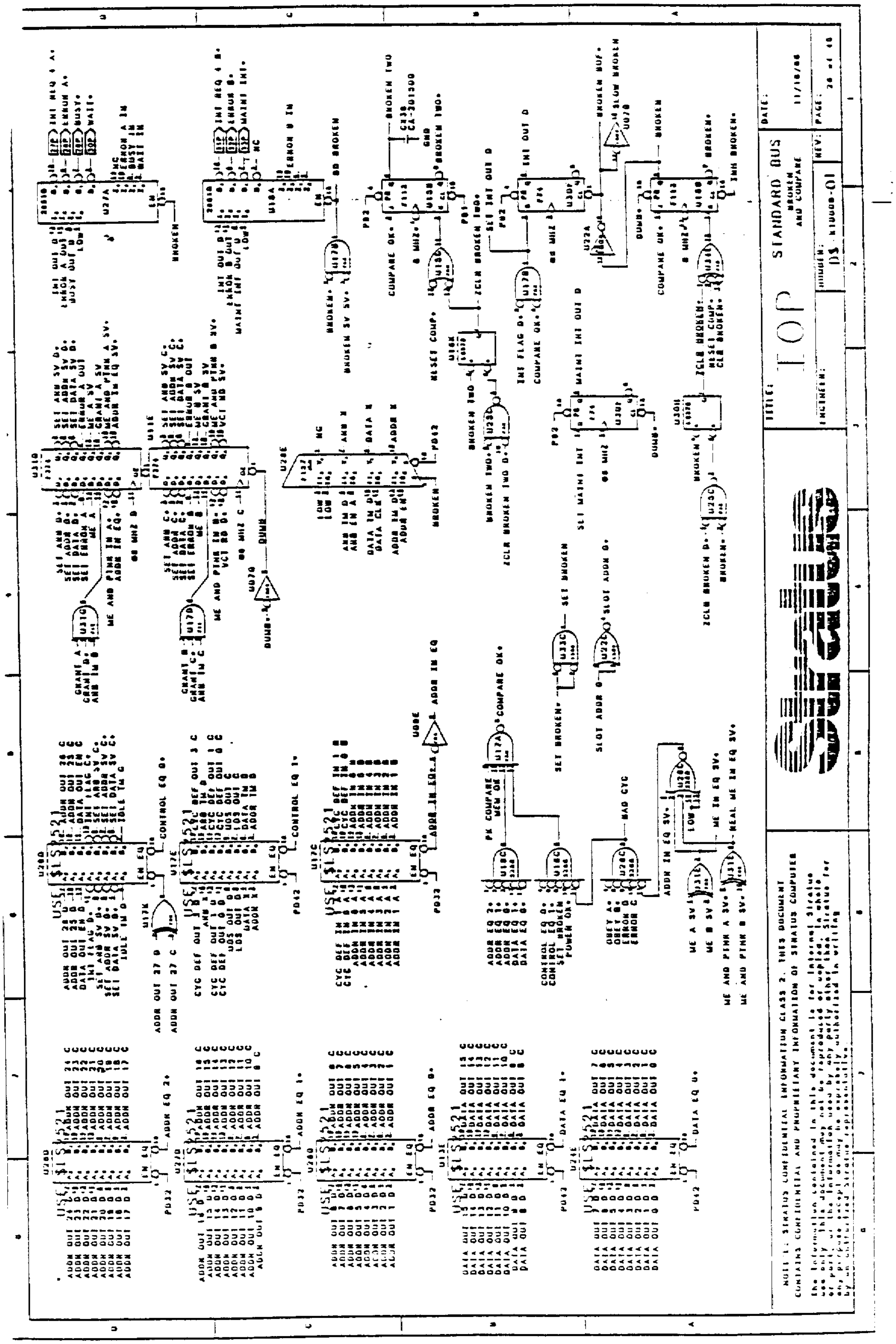
TOP
STANDARD BUS
BROKEN AND COMPARE

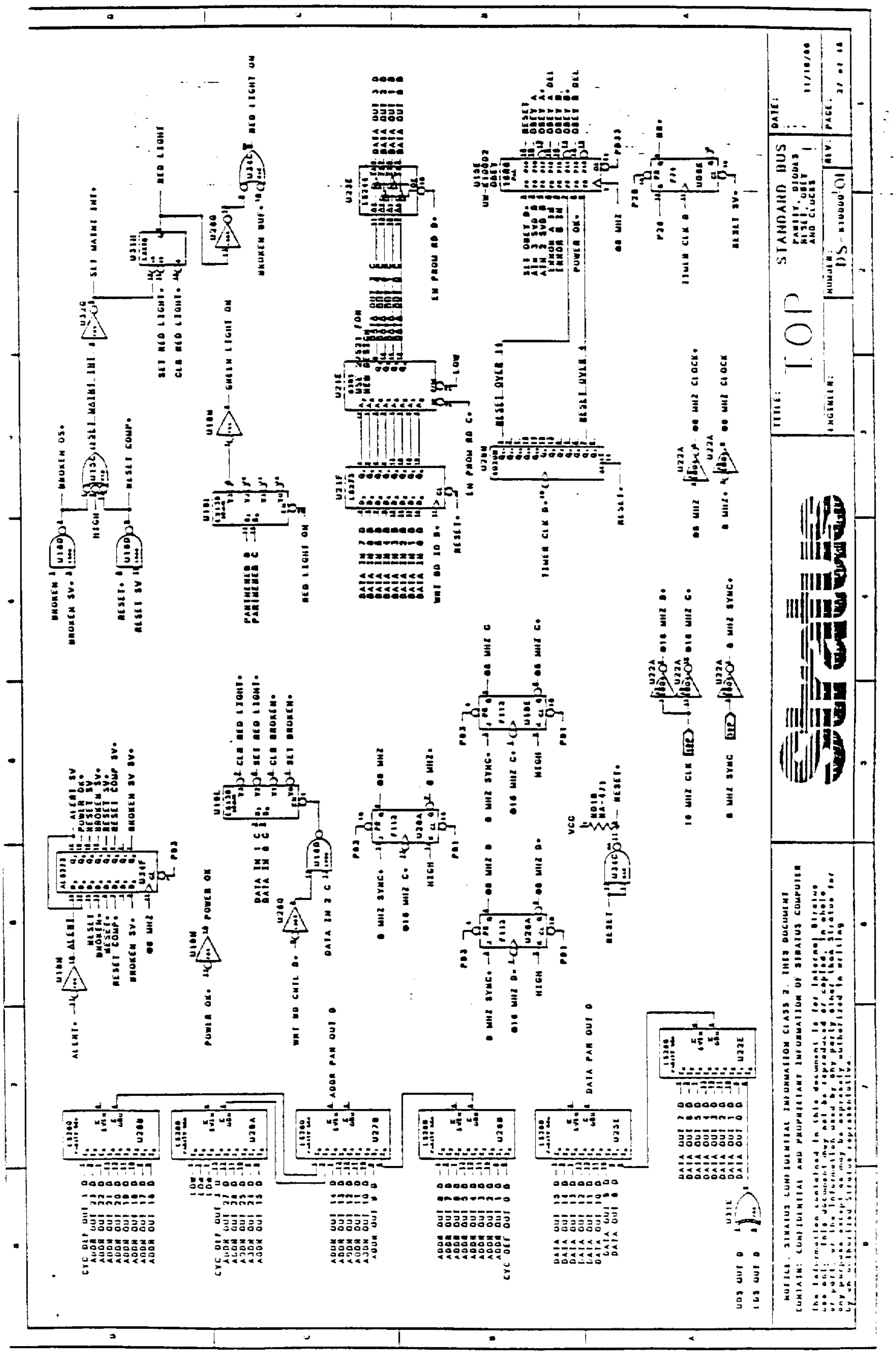

THIS PAGE INTENTIONALLY LEFT BLANK

NOTICE PROPRIETARY - CONFIDENTIAL

THIS DOCUMENT CONTAINS INFORMATION PROPRIETARY TO STRATUS COMPUTER INC., MARLBORO, MA 01752. THE INFORMATION NOT TO BE USED IN ANY WAY, DISCLOSED TO OTHERS, OR REPRODUCED, IN WHOLE OR IN PART, EXCEPT AS EXPRESSLY AUTHORIZED BY THE COMPANY.

ANY REPRODUCTION OF THIS DOCUMENT, IN WHOLE OR IN PART, EVEN WHEN AUTHORIZED, MUST INCLUDE THIS NOTICE.

Stratus

TITLE: IOP

ENGINEER: JML

NUMBER: DS 610000 01

REV:

DATE: 6/20/85

PAGE: 28 of 45

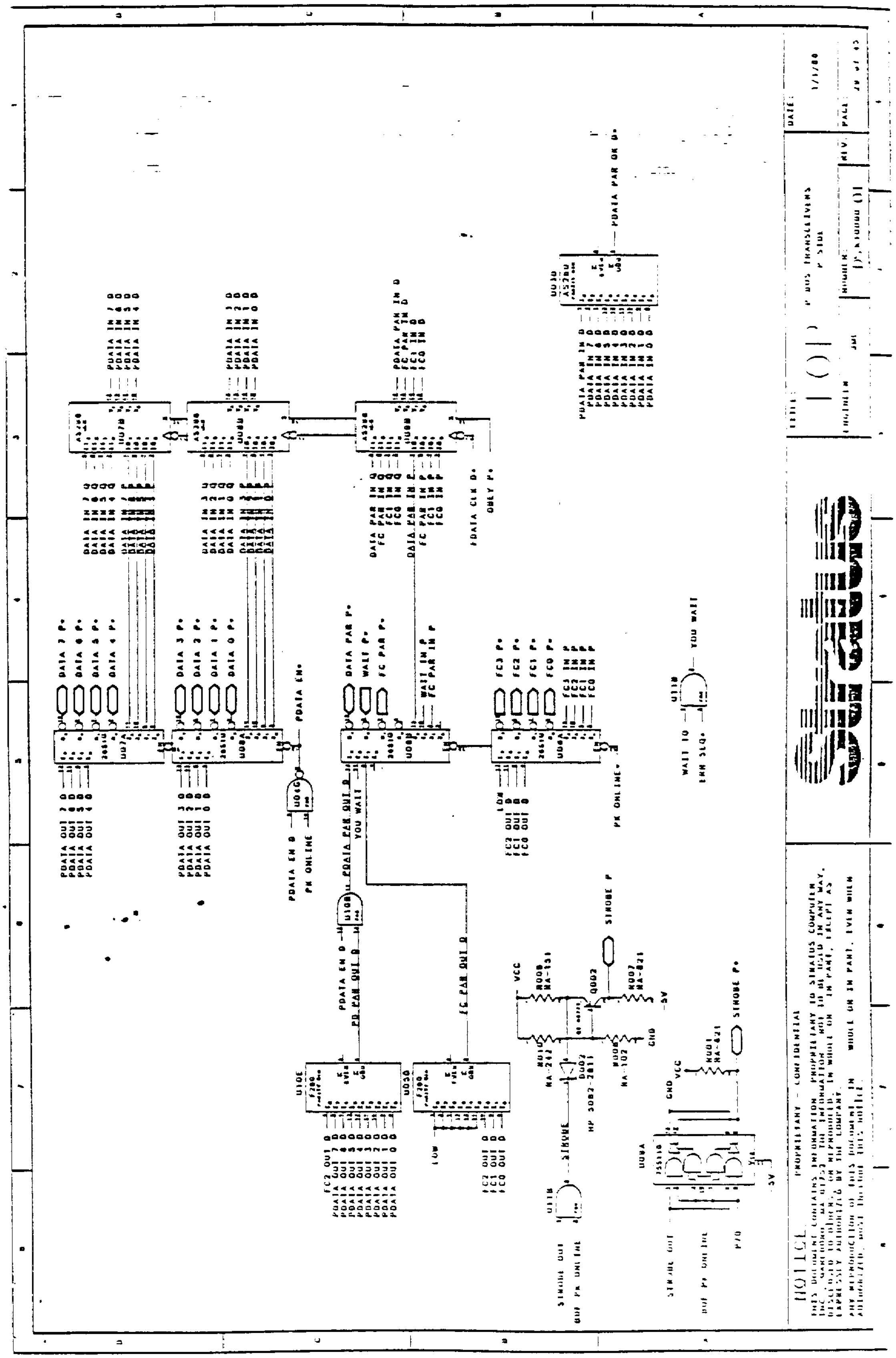

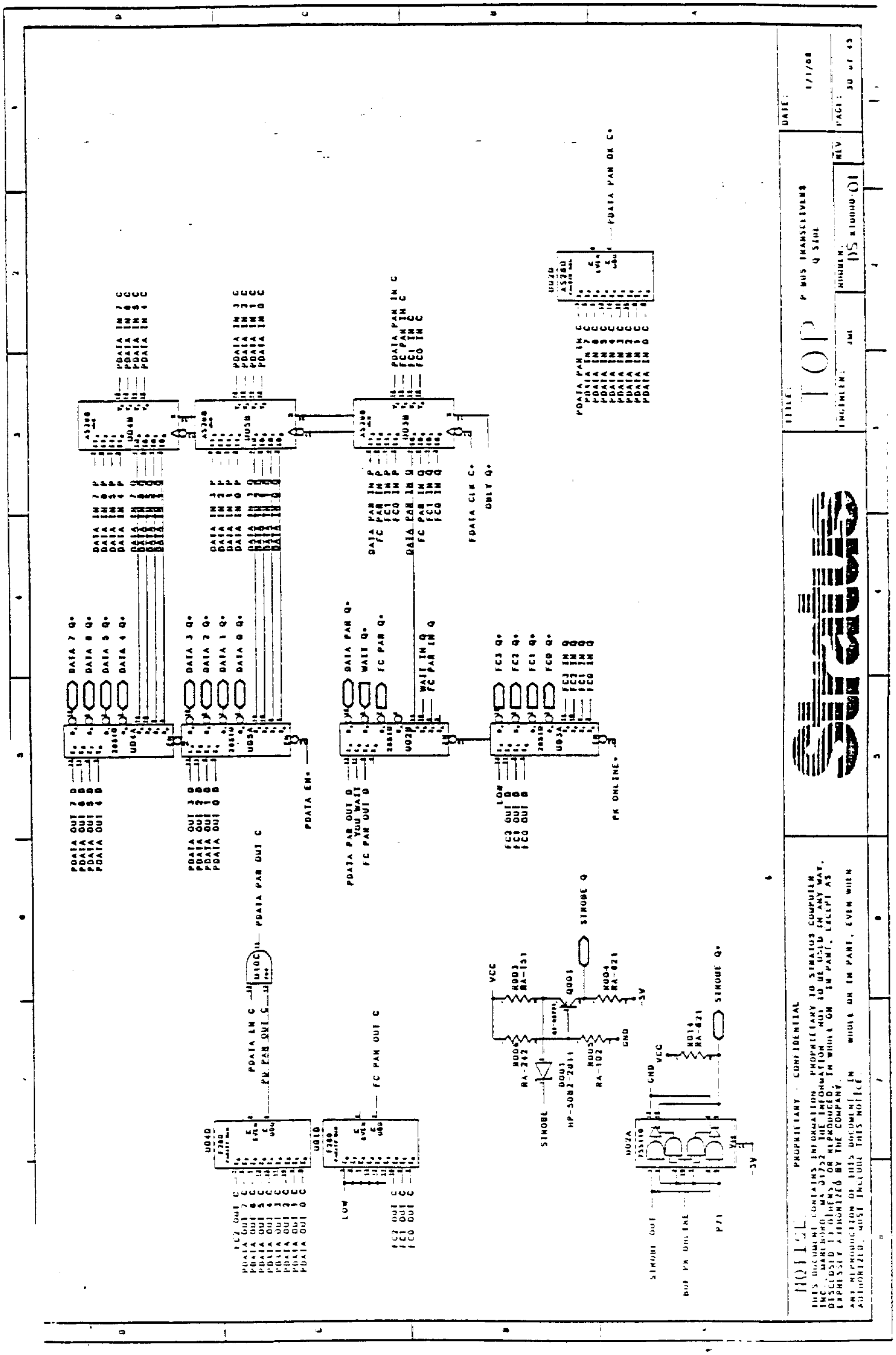

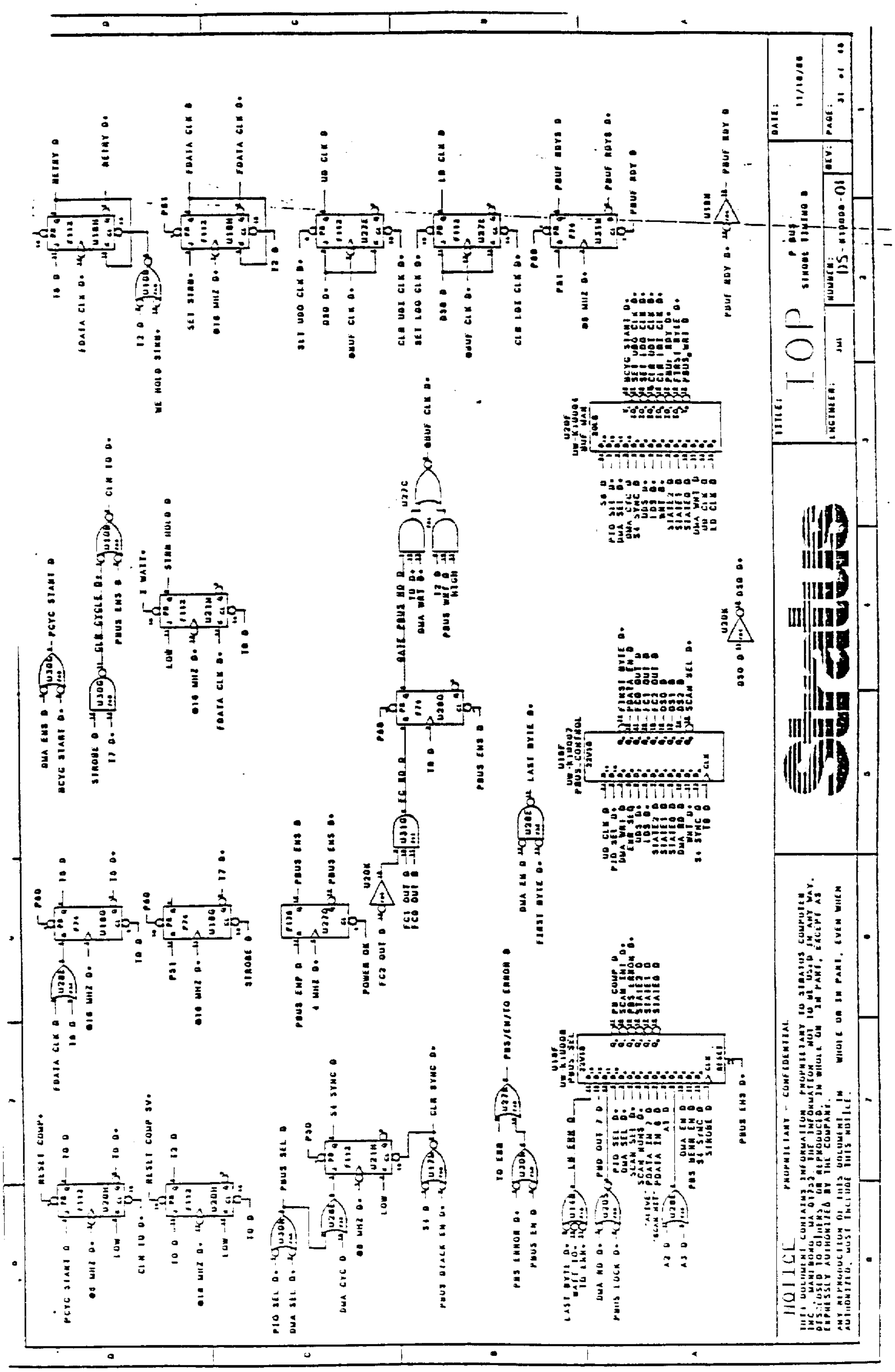

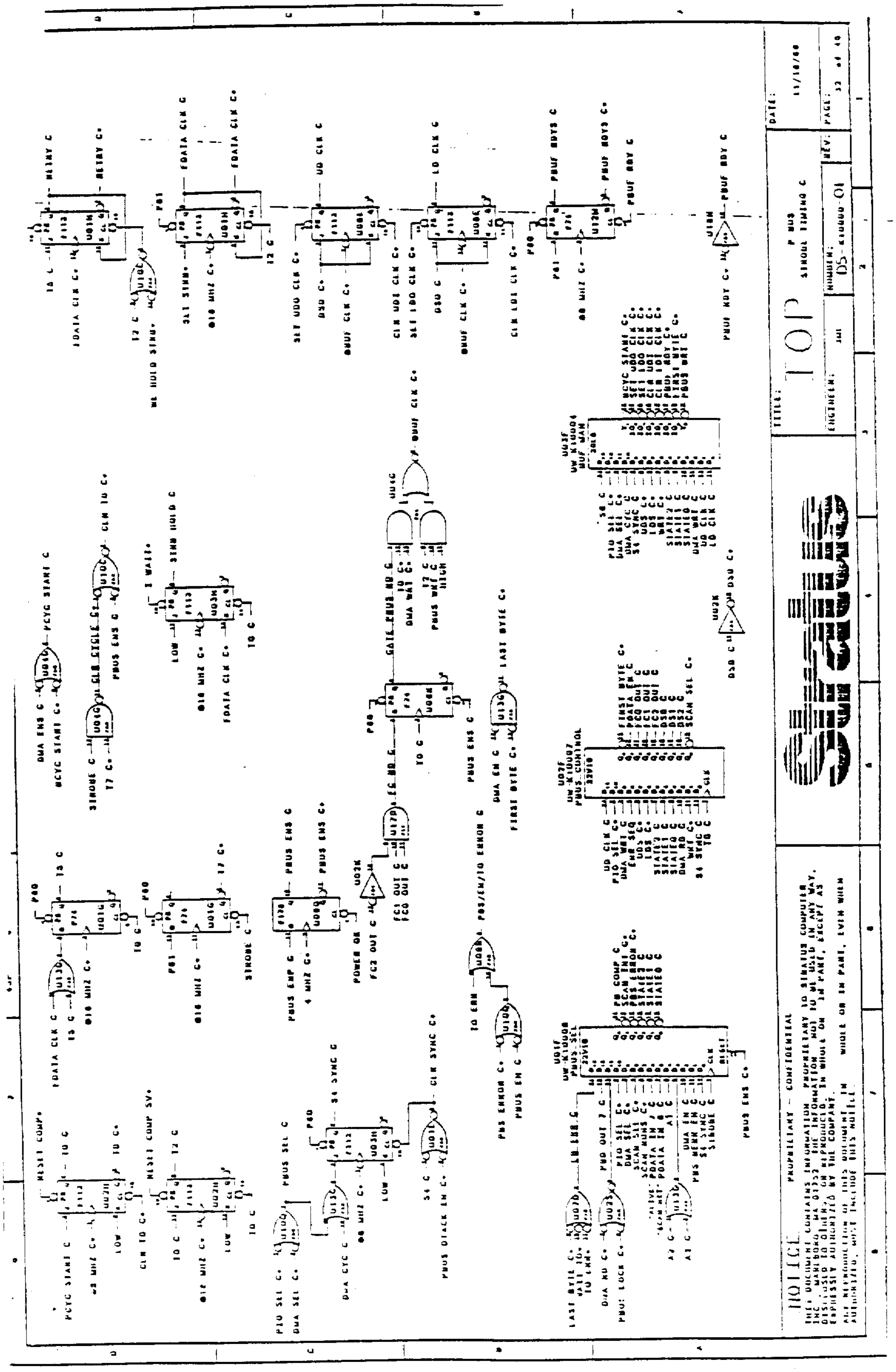

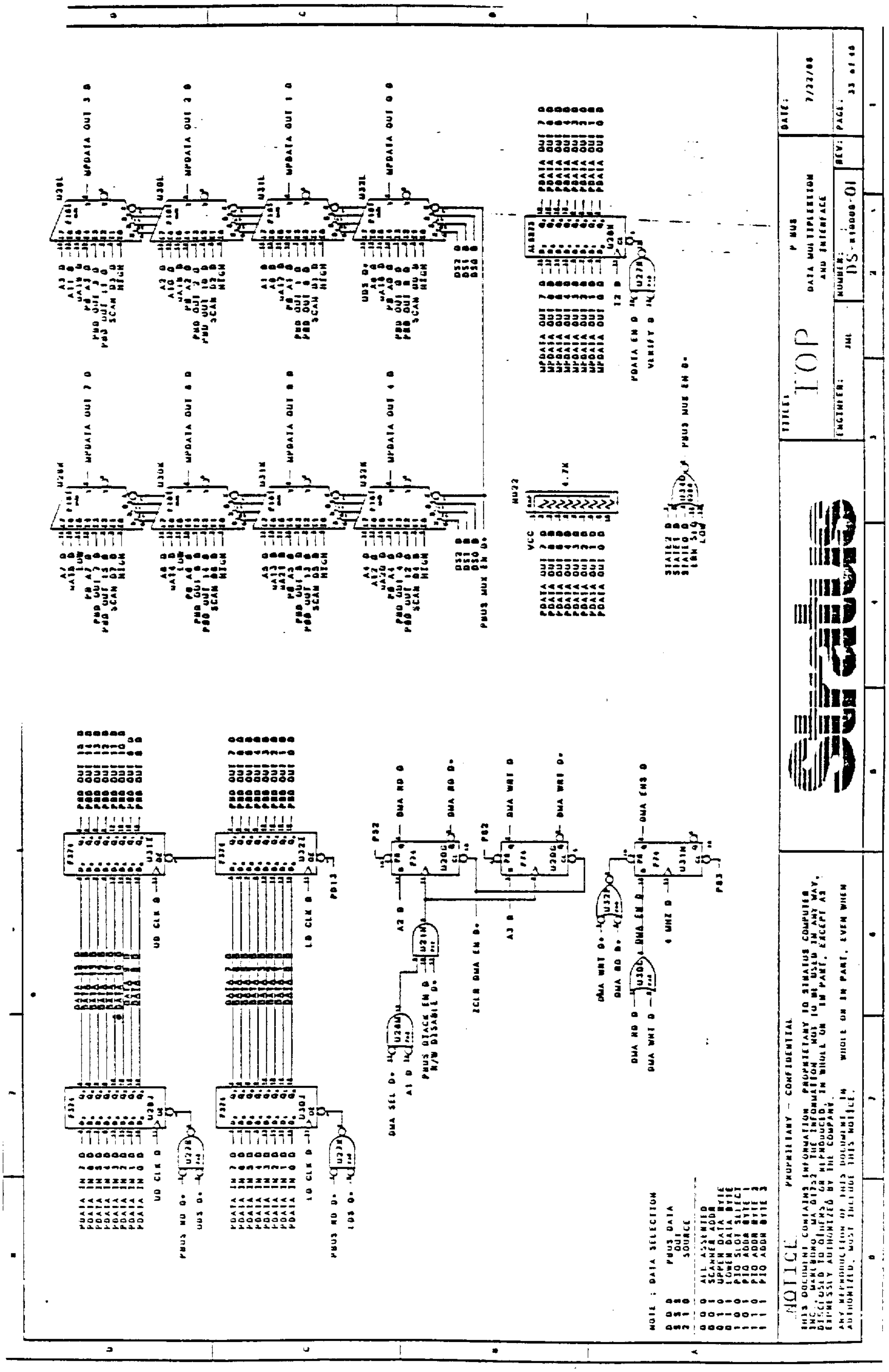

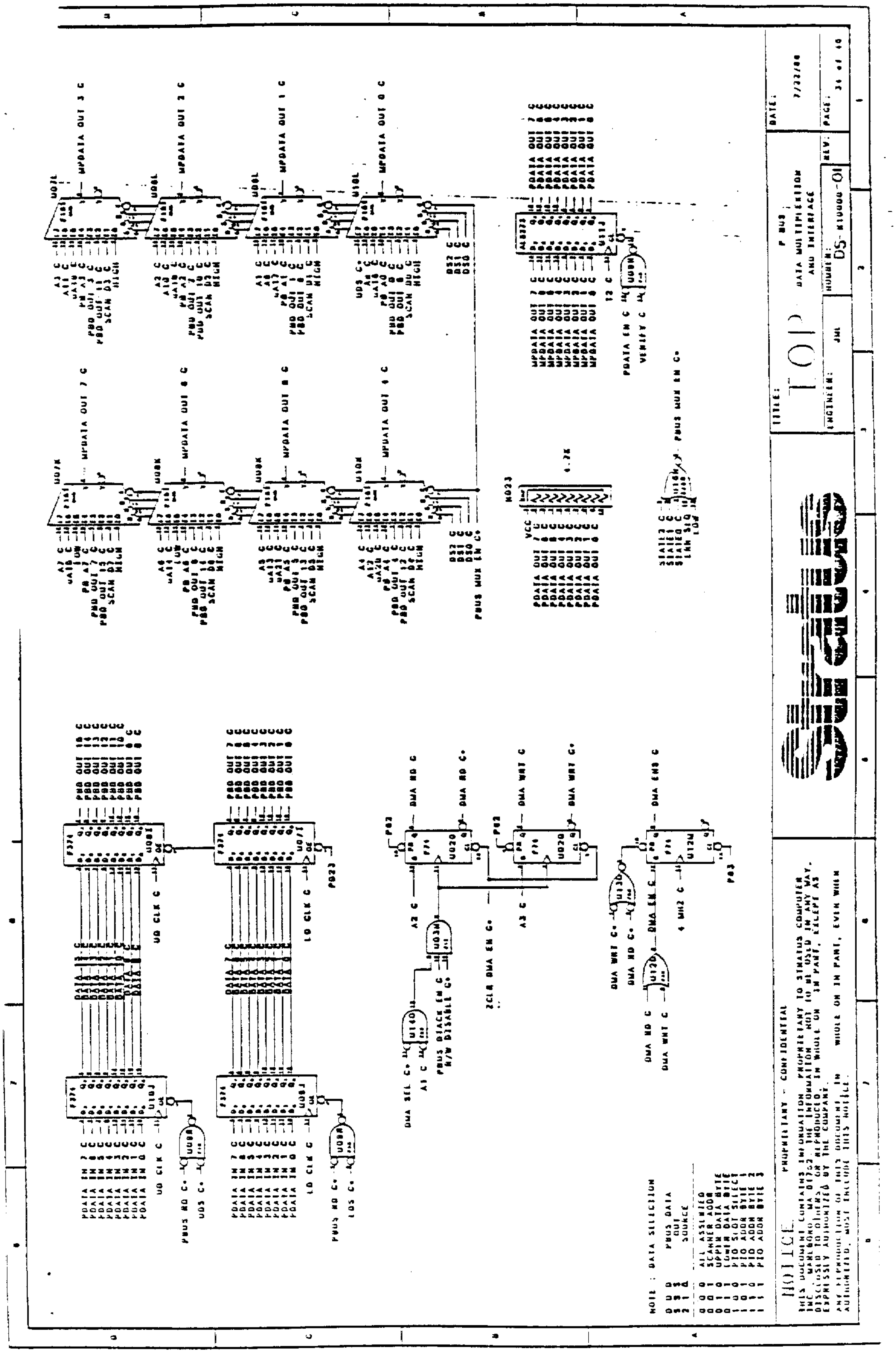

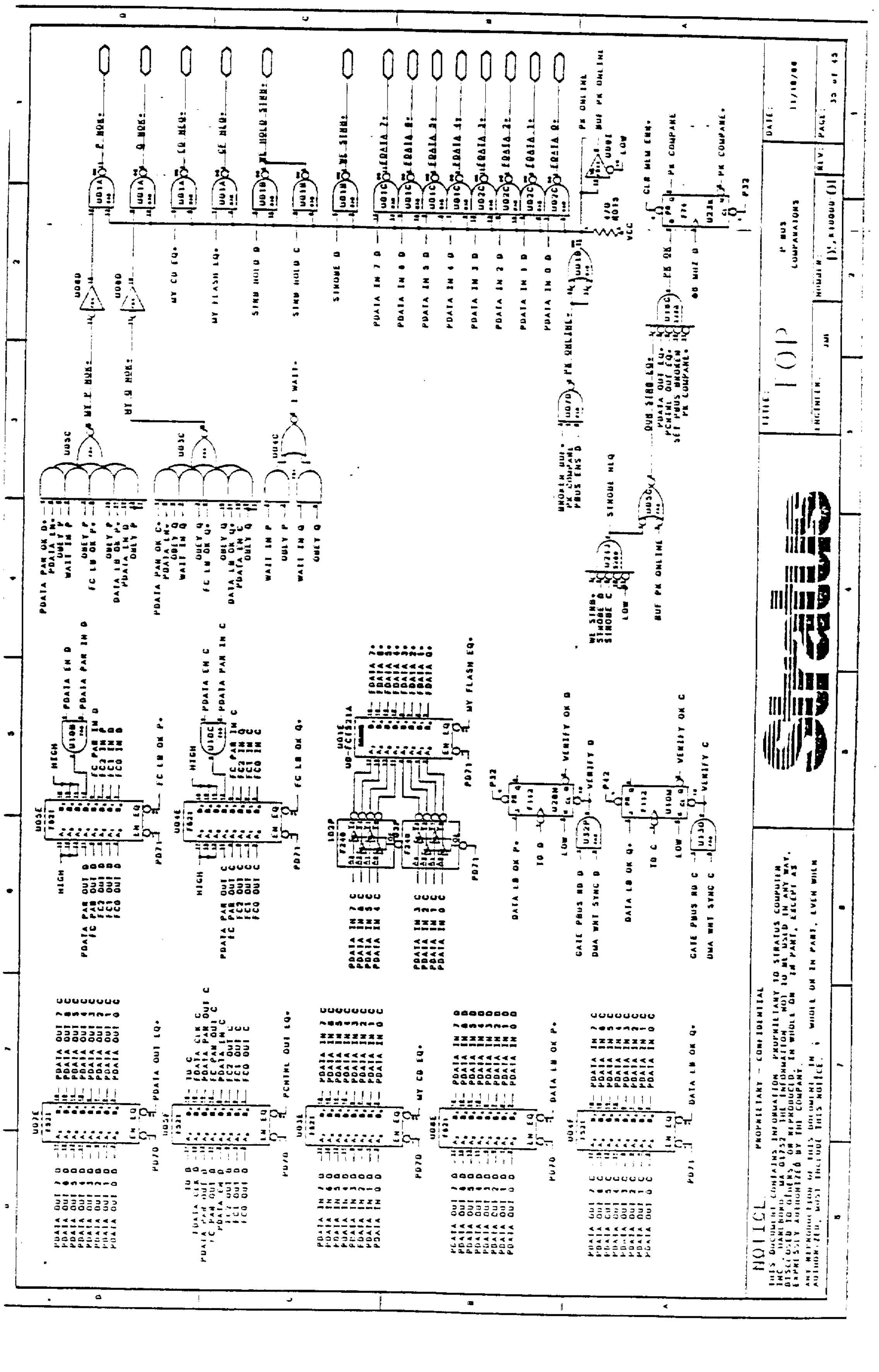

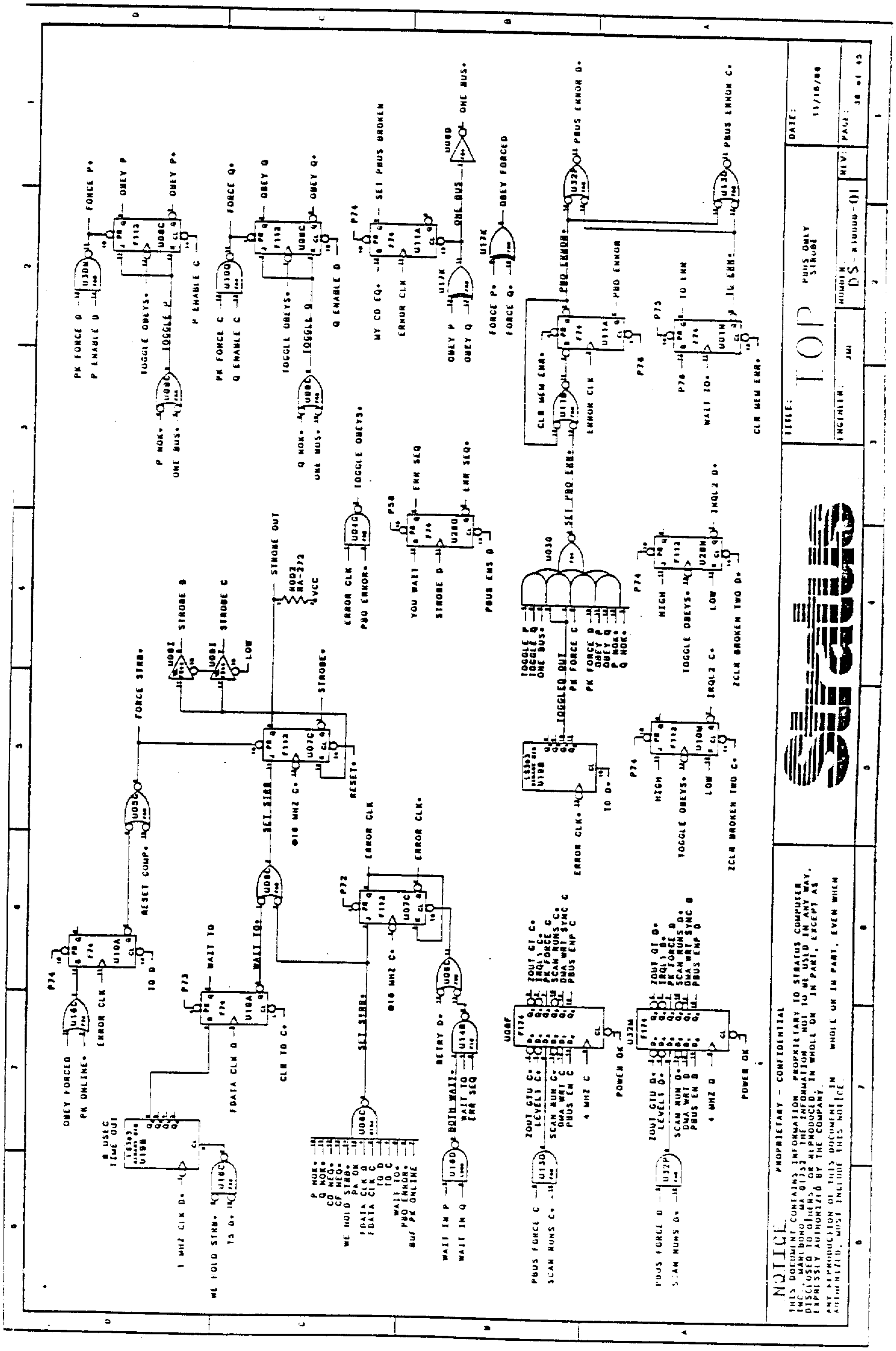

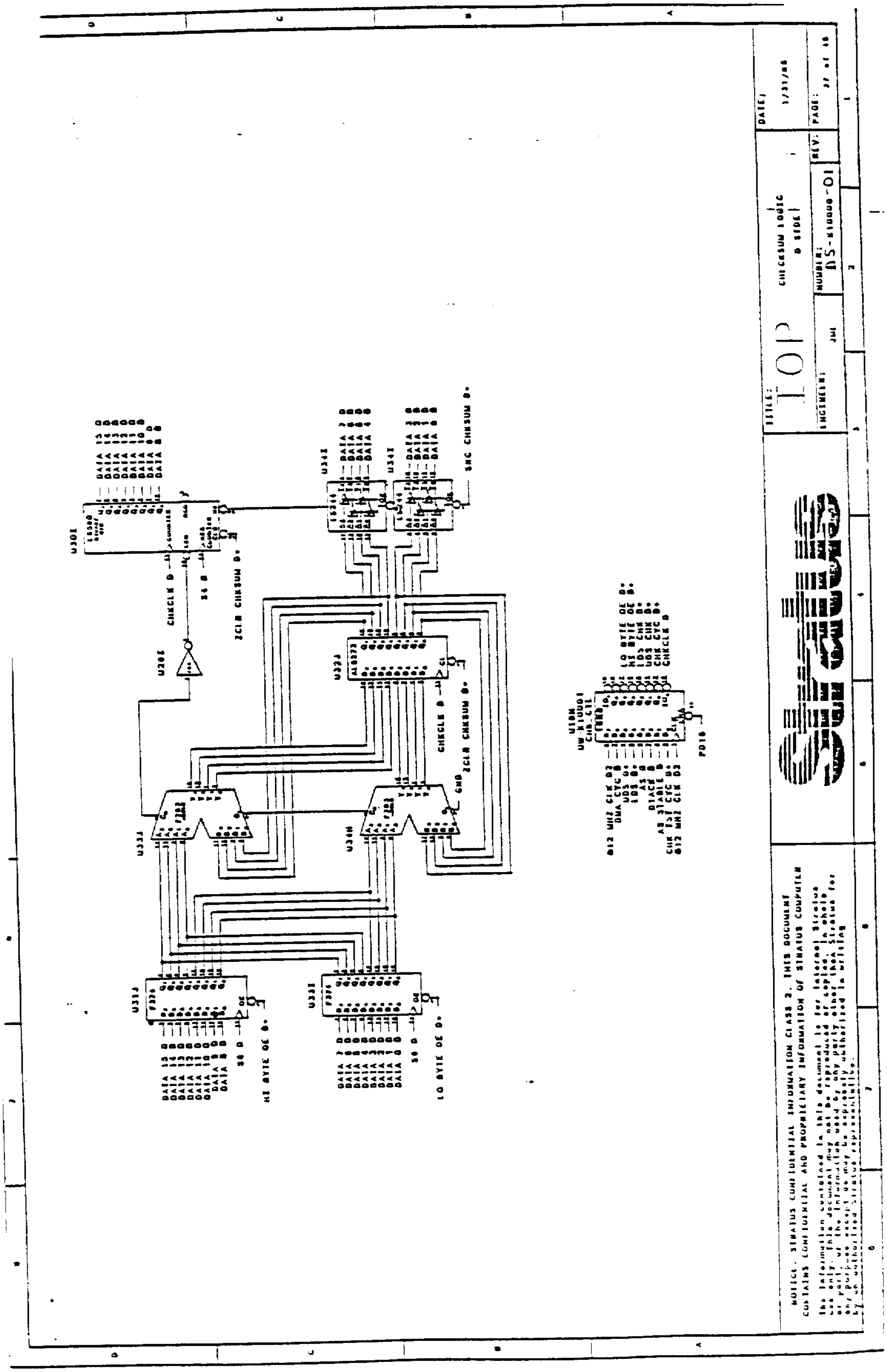

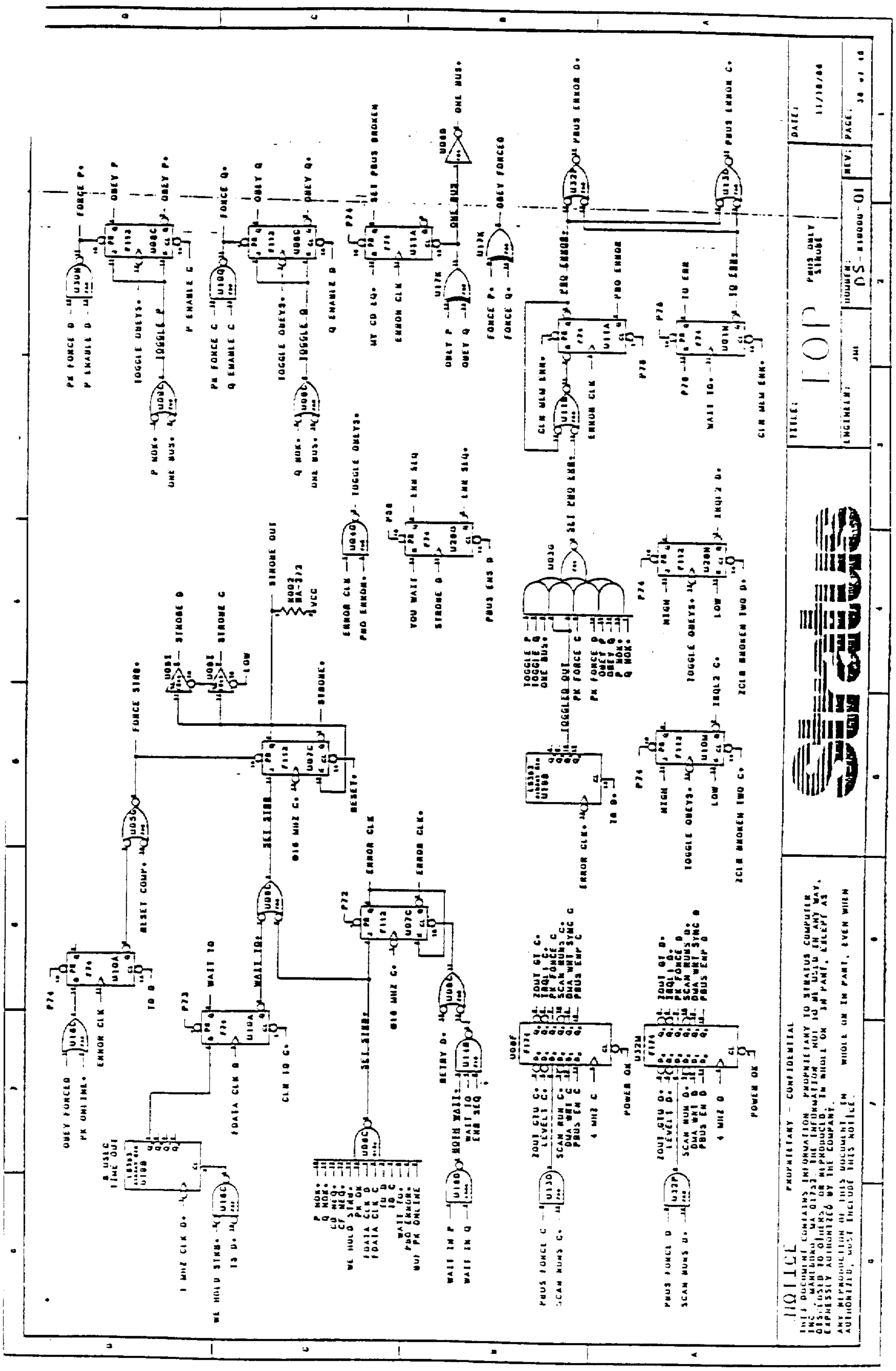

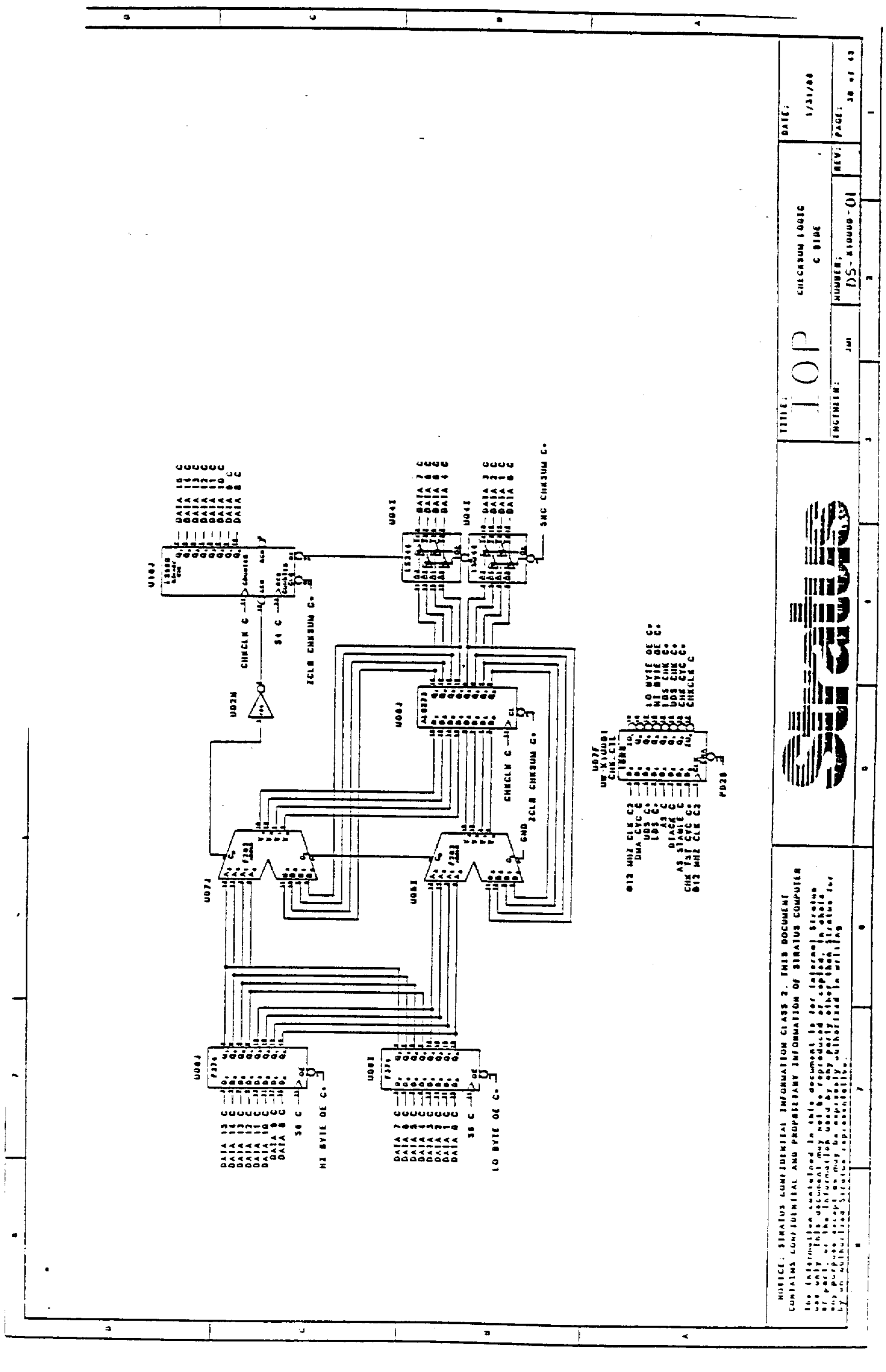

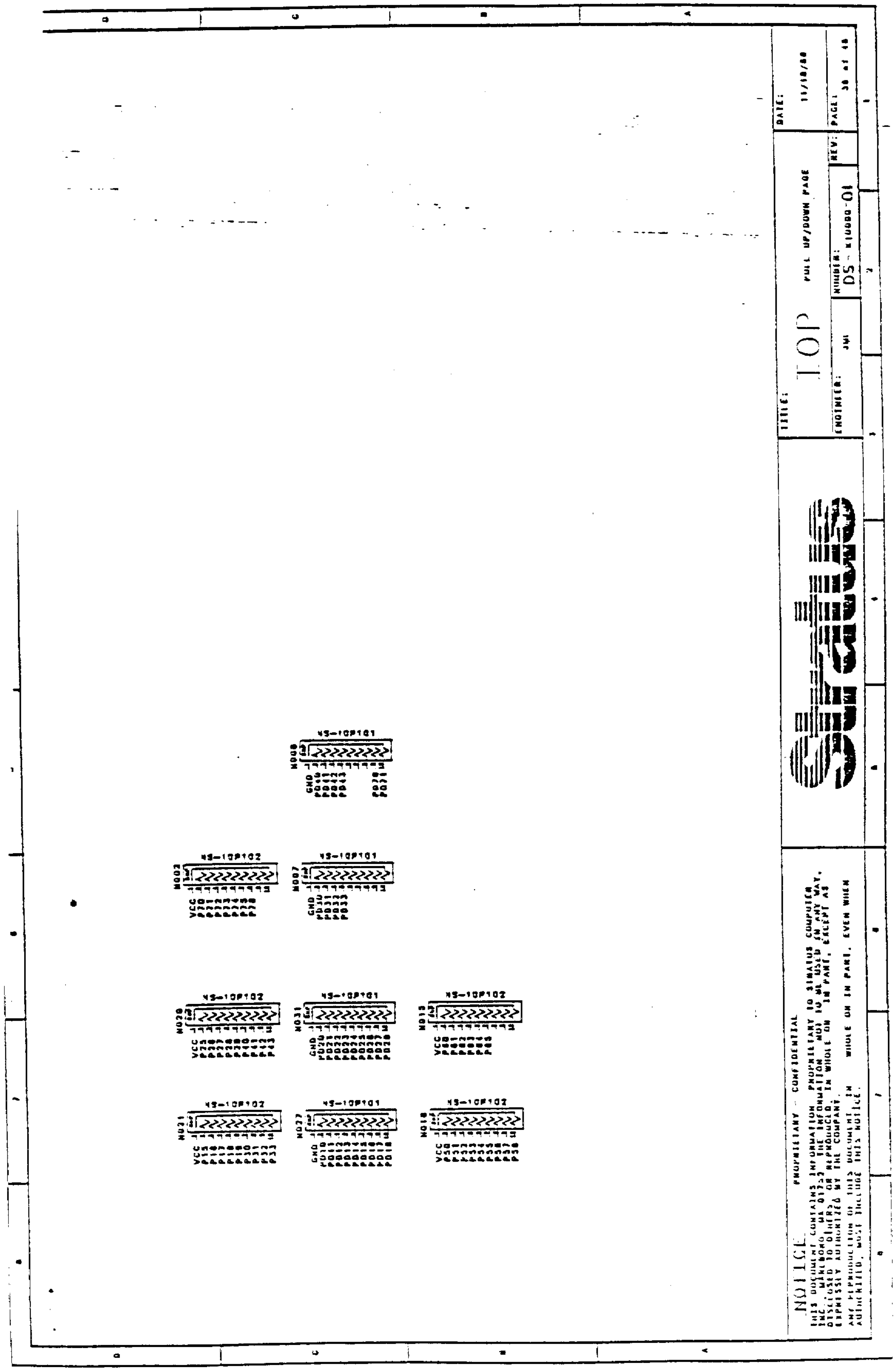
NOTICE
PROPRIETARY - CONFIDENTIAL
TITLE:
TOP
PULL UP/DOWN PAGE
ENGINEER:
NUMBER:
REV:
DATE:
PAGE:

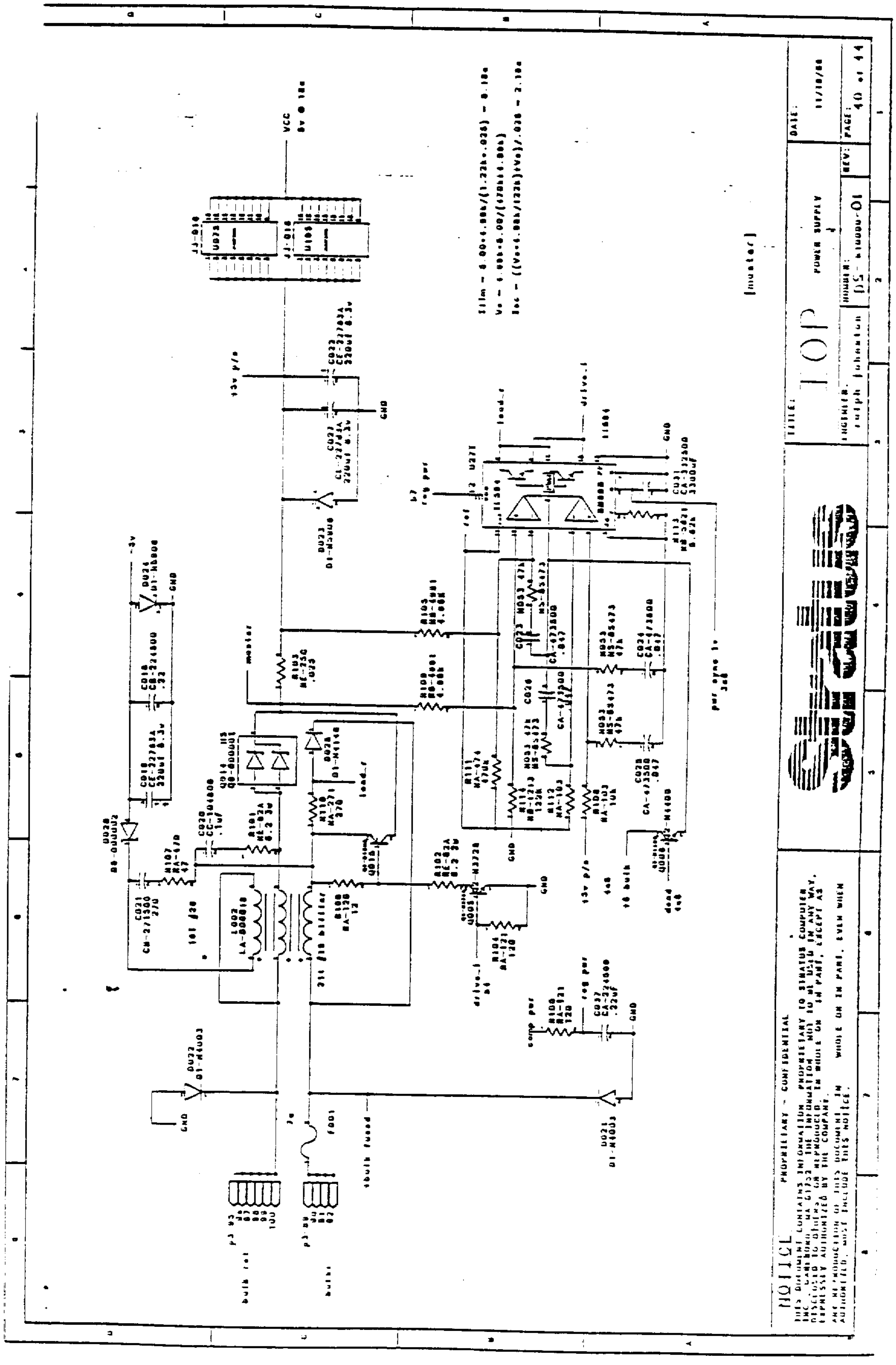

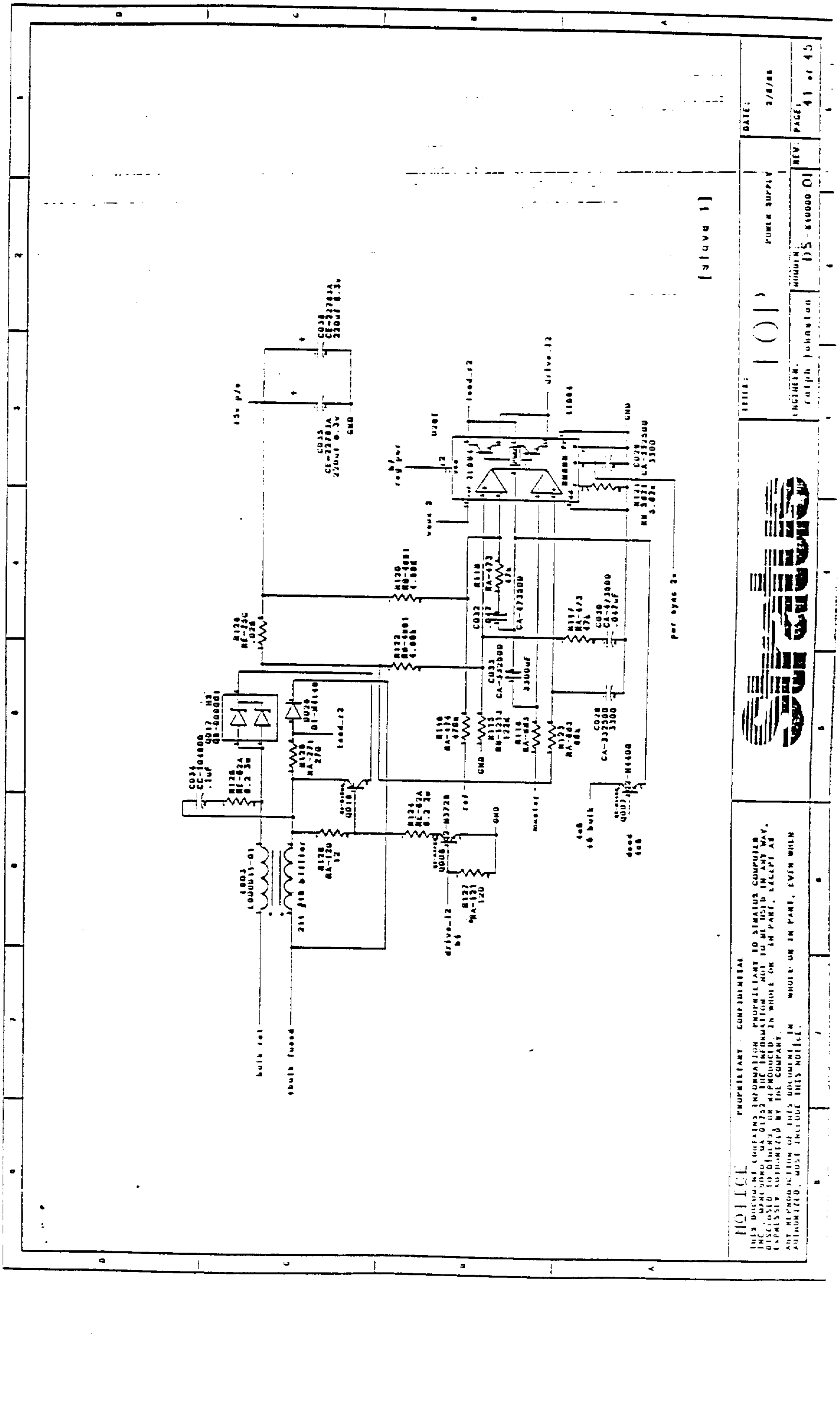
[slave 1]
POWER SUPPLY
41 of 45

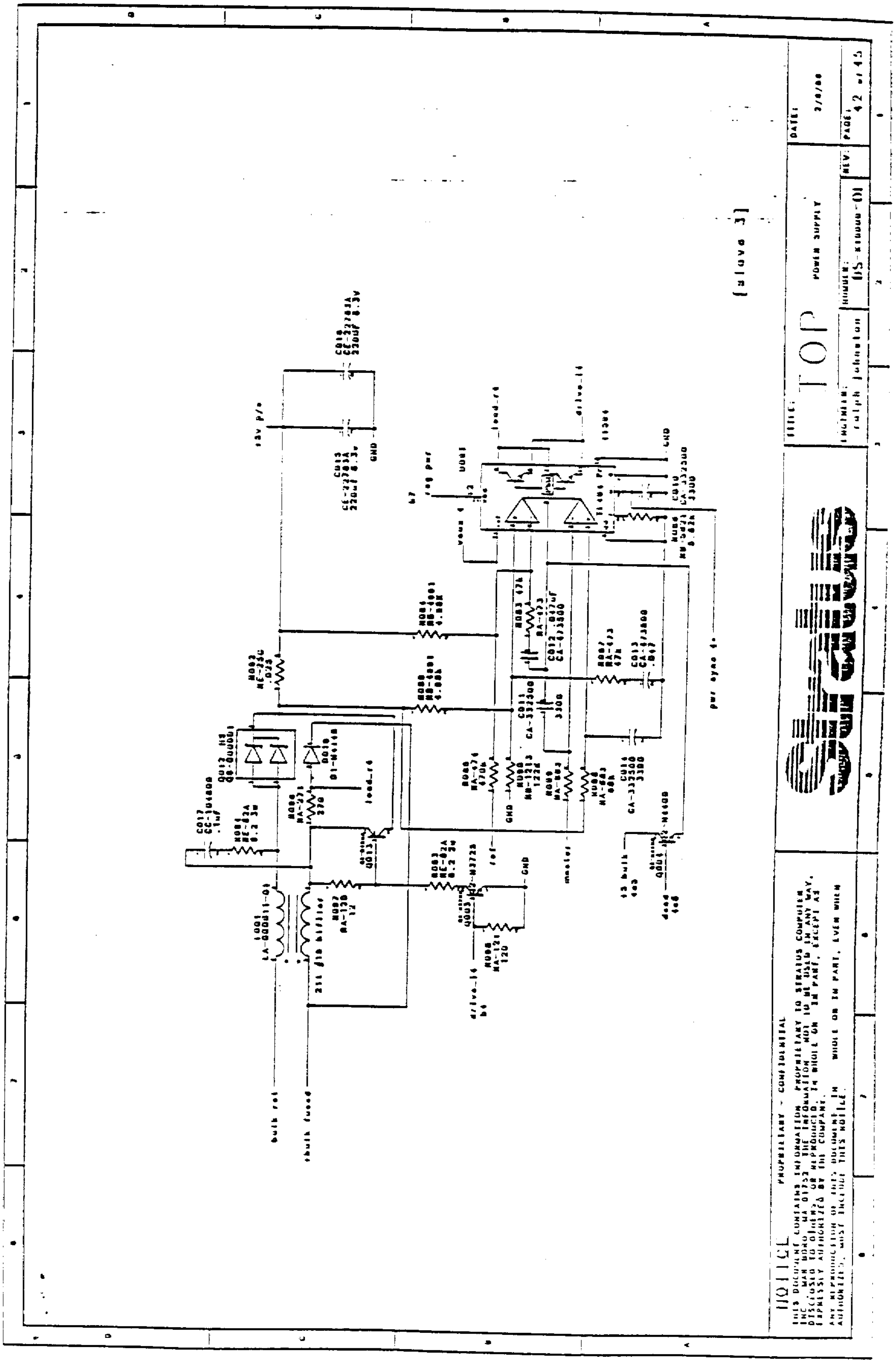
TOP
POWER SUPPLY
PROPRIETARY - CONFIDENTIAL

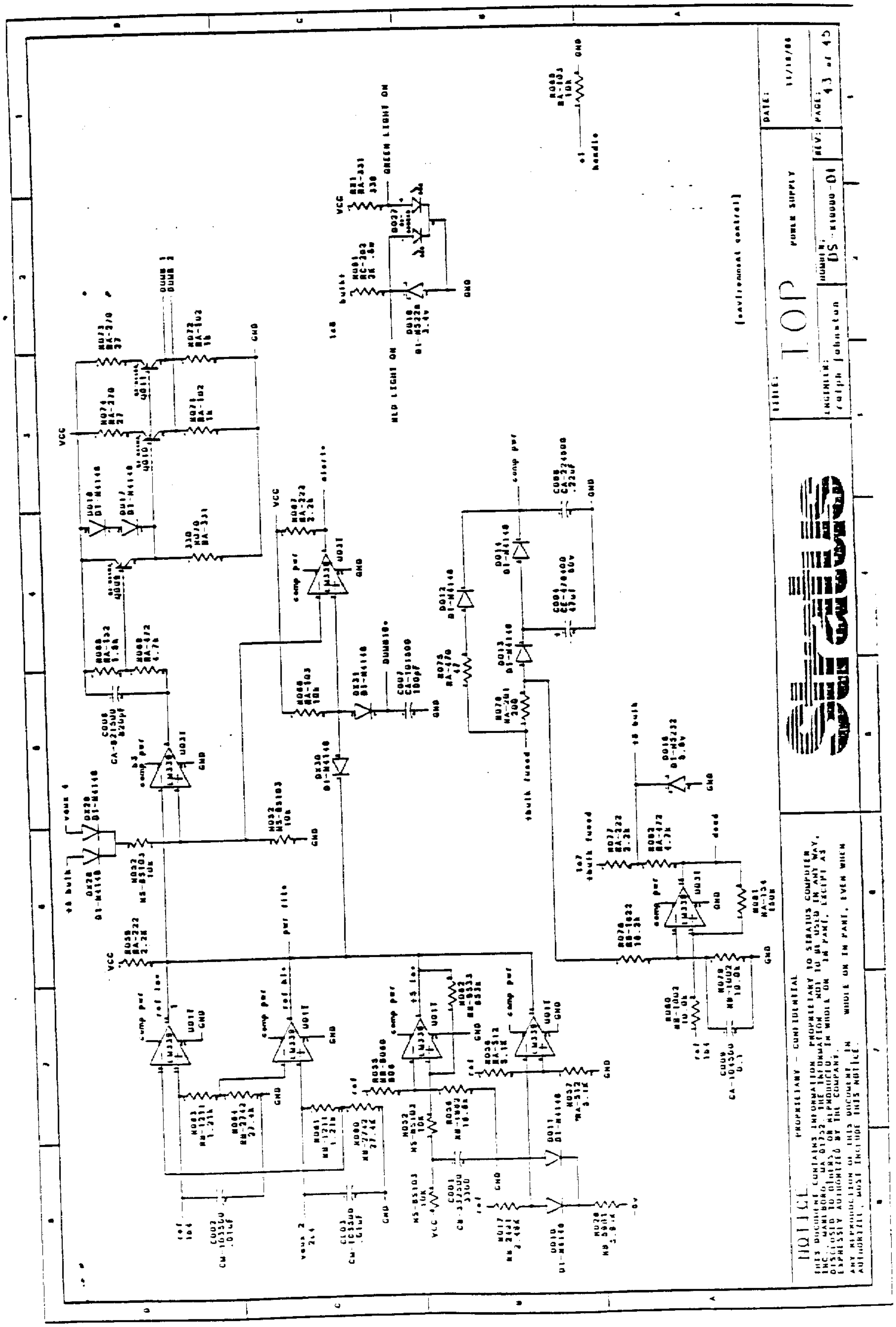

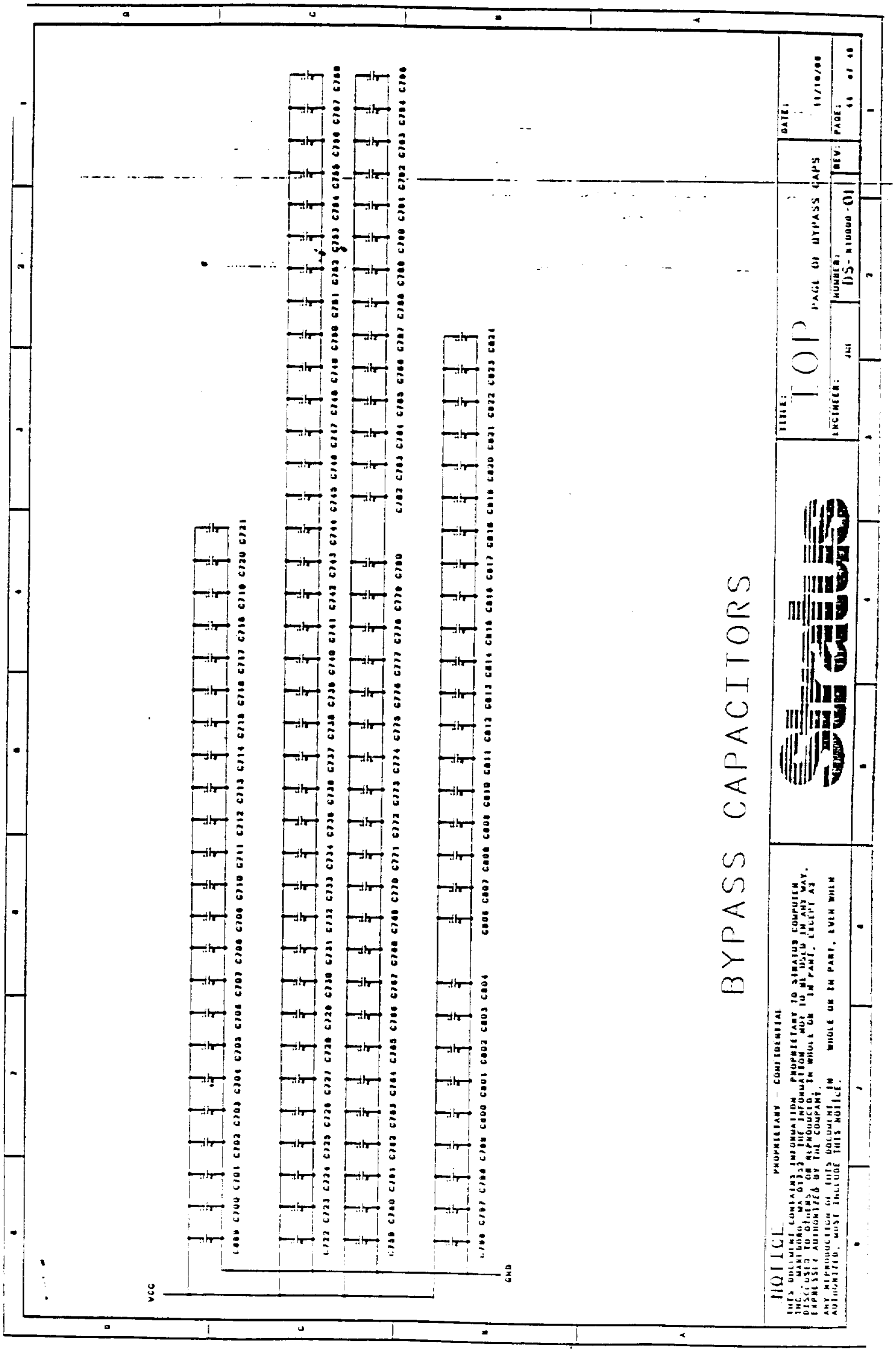
BYPASS CAPACITORS
VCC
GND
TOP
PAGE OF BYPASS CAPS

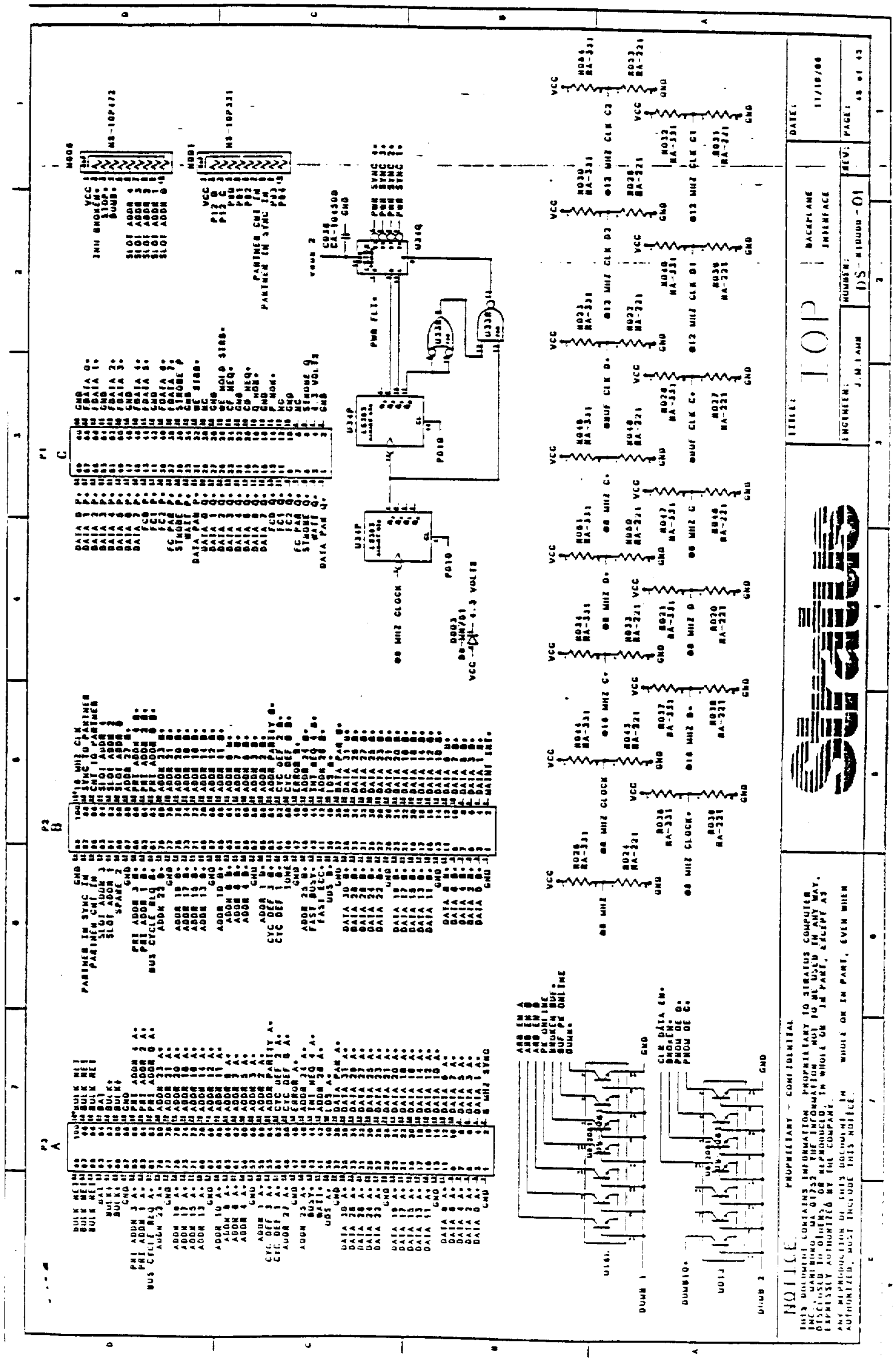

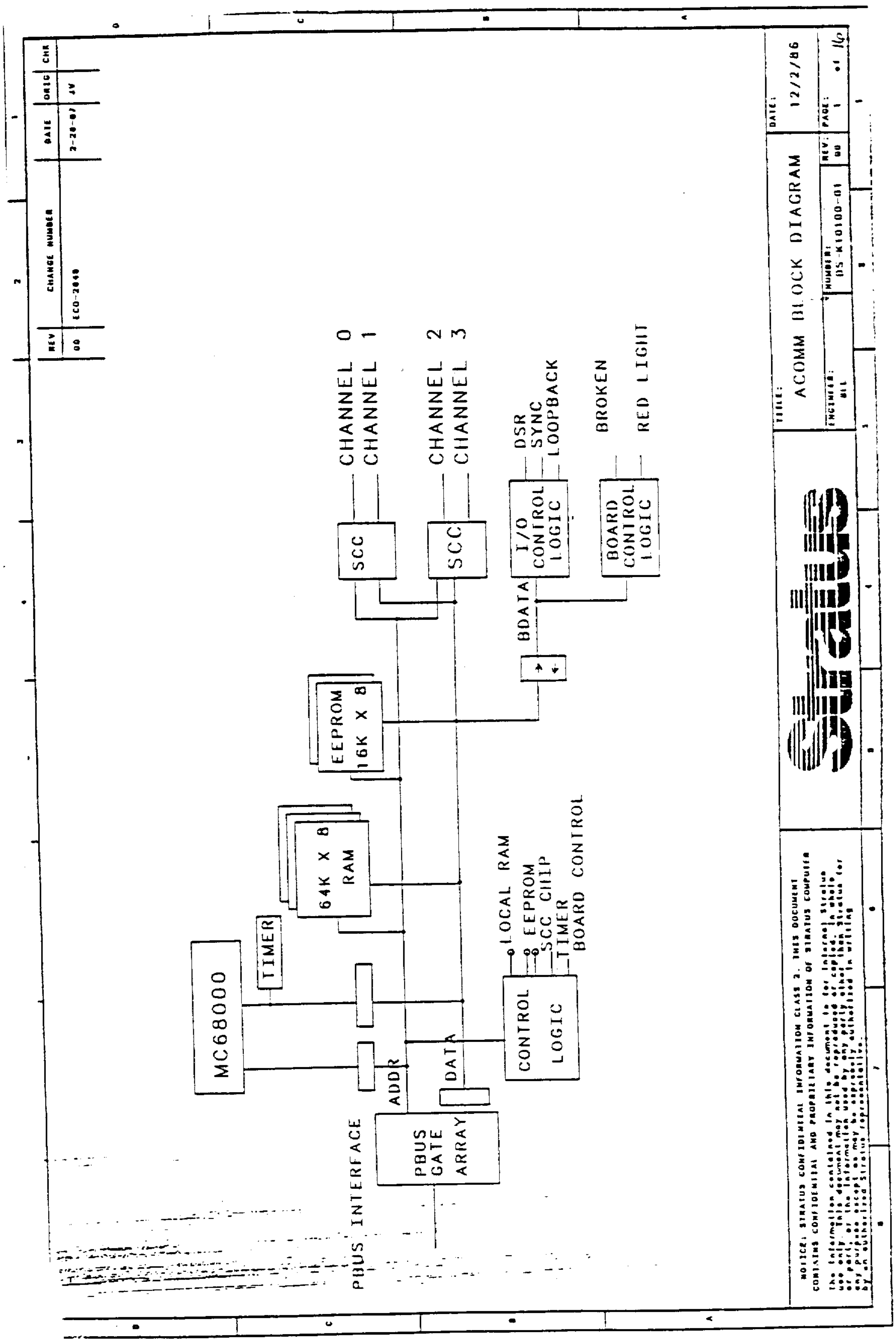
REV
CHANGE NUMBER
DATE
ORIG
CHK
00
ECO-2040
2-20-87
JV
PBUS INTERFACE
PBUS
GATE
ARRAY
ADDR
DATA
MC68000
TIMER
64K X 8
RAM
EEPROM
16K X 8
CONTROL
LOGIC
LOCAL RAM
EEPROM
SCC CHIP
TIMER
BOARD CONTROL
BDATA
SCC
SCC
CHANNEL 0
CHANNEL 1
CHANNEL 2
CHANNEL 3
I/O
CONTROL
LOGIC
DSR
SYNC
LOOPBACK
BOARD
CONTROL
LOGIC
BROKEN
RED LIGHT
TITLE:
ACOMM BLOCK DIAGRAM
DATE:
12/2/86
NUMBER:
05-K10100-01
REV:
00
PAGE:
1 of 16
Stratus
NOTICE: STRATUS CONFIDENTIAL INFORMATION CLASS 2. THIS DOCUMENT CONTAINS CONFIDENTIAL AND PROPRIETARY INFORMATION OF STRATUS COMPUTER

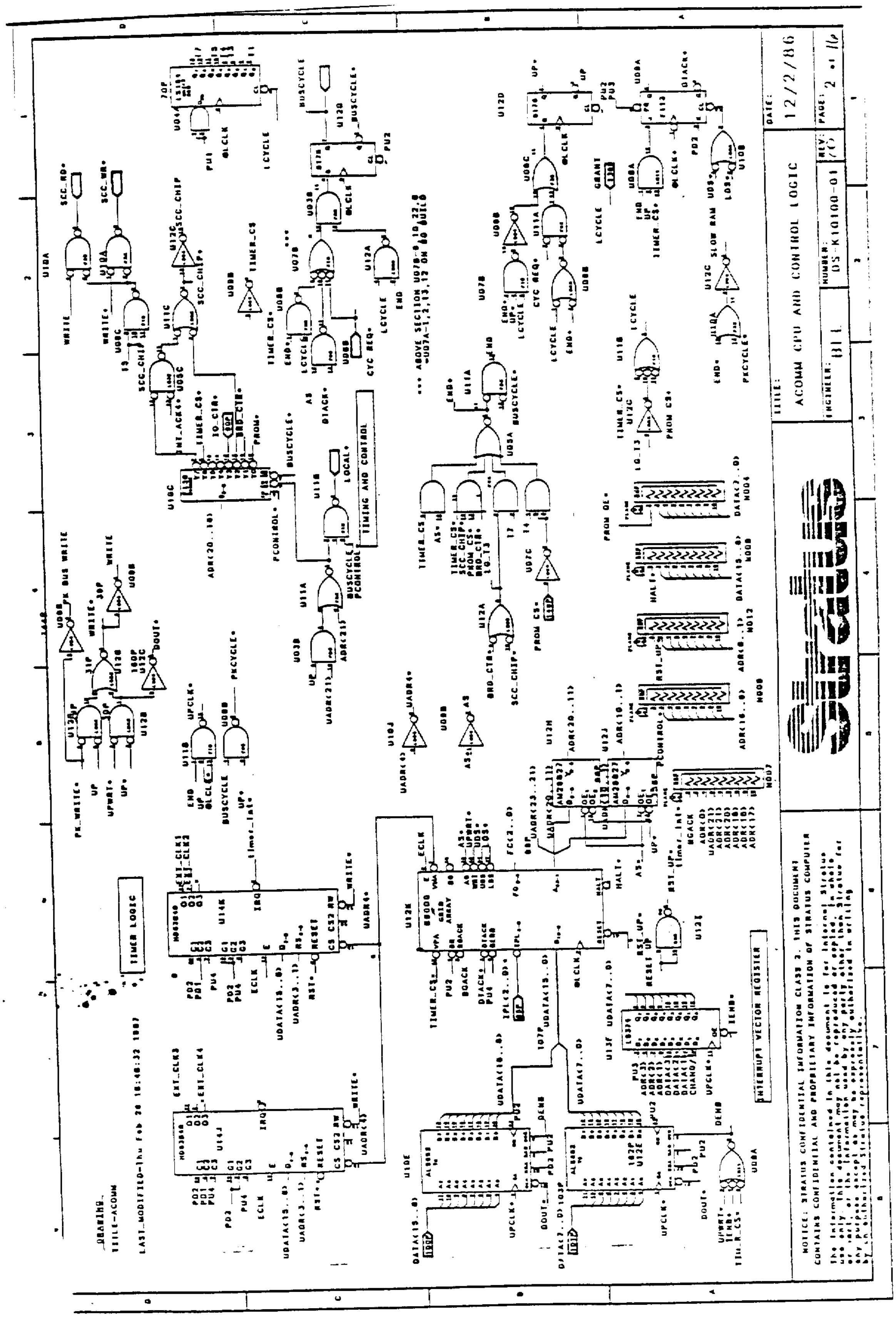
ACOMM CPU AND CONTROL LOGIC
12/2/86
DS-K10100-01
TIMER LOGIC
TIMING AND CONTROL
INTERRUPT VECTOR REGISTER

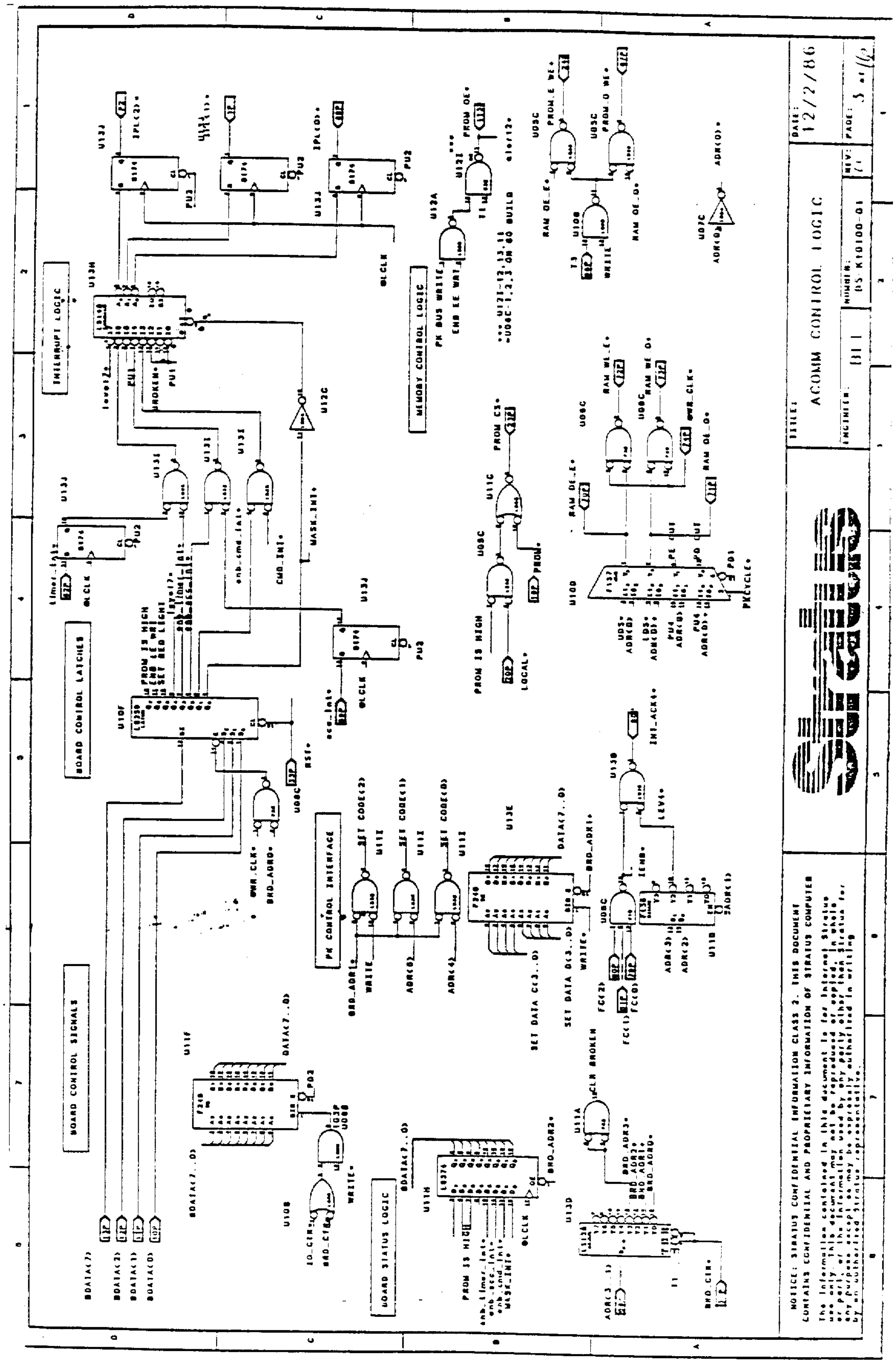
ACOMM CONTROL LOGIC
INTERRUPT LOGIC
MEMORY CONTROL LOGIC
BOARD CONTROL LATCHES
BOARD CONTROL SIGNALS
PK CONTROL INTERFACE
BOARD STATUS LOGIC
12/2/86

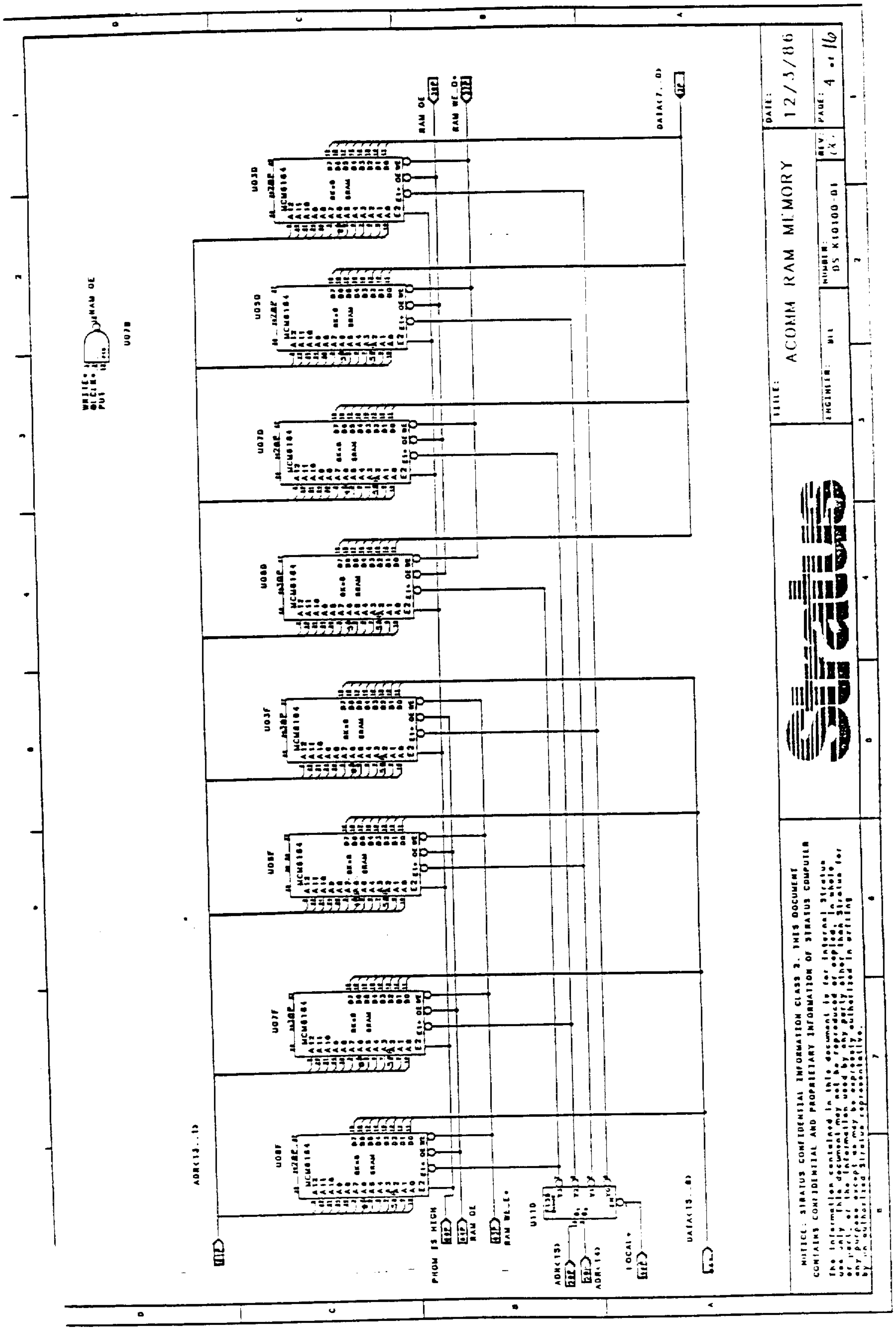
ACOMM RAM MEMORY
12/3/86
DS K10100-01
4 of 16
MCM6164
8K×8 SRAM
U03D
U05D
U07D
U08D
U03F
U05F
U07F
U08F
U07B
U11D
RAM OE
RAM WE
ADR(13..1)
DATA(7..0)
PROM IS HIGH
LOCAL
ADR(15)
ADR(14)

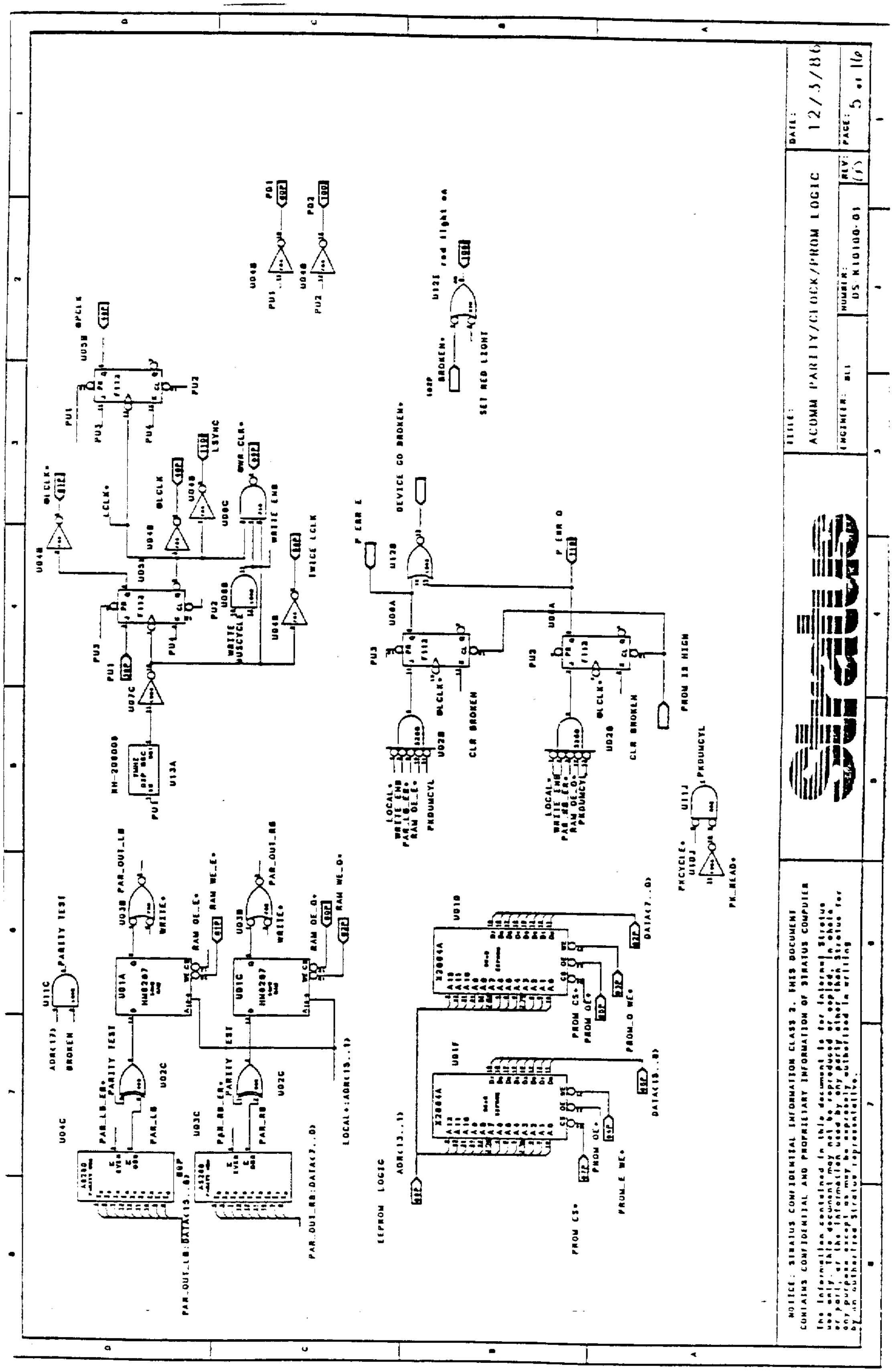
ACOMM PARITY/CLOCK/PROM LOGIC

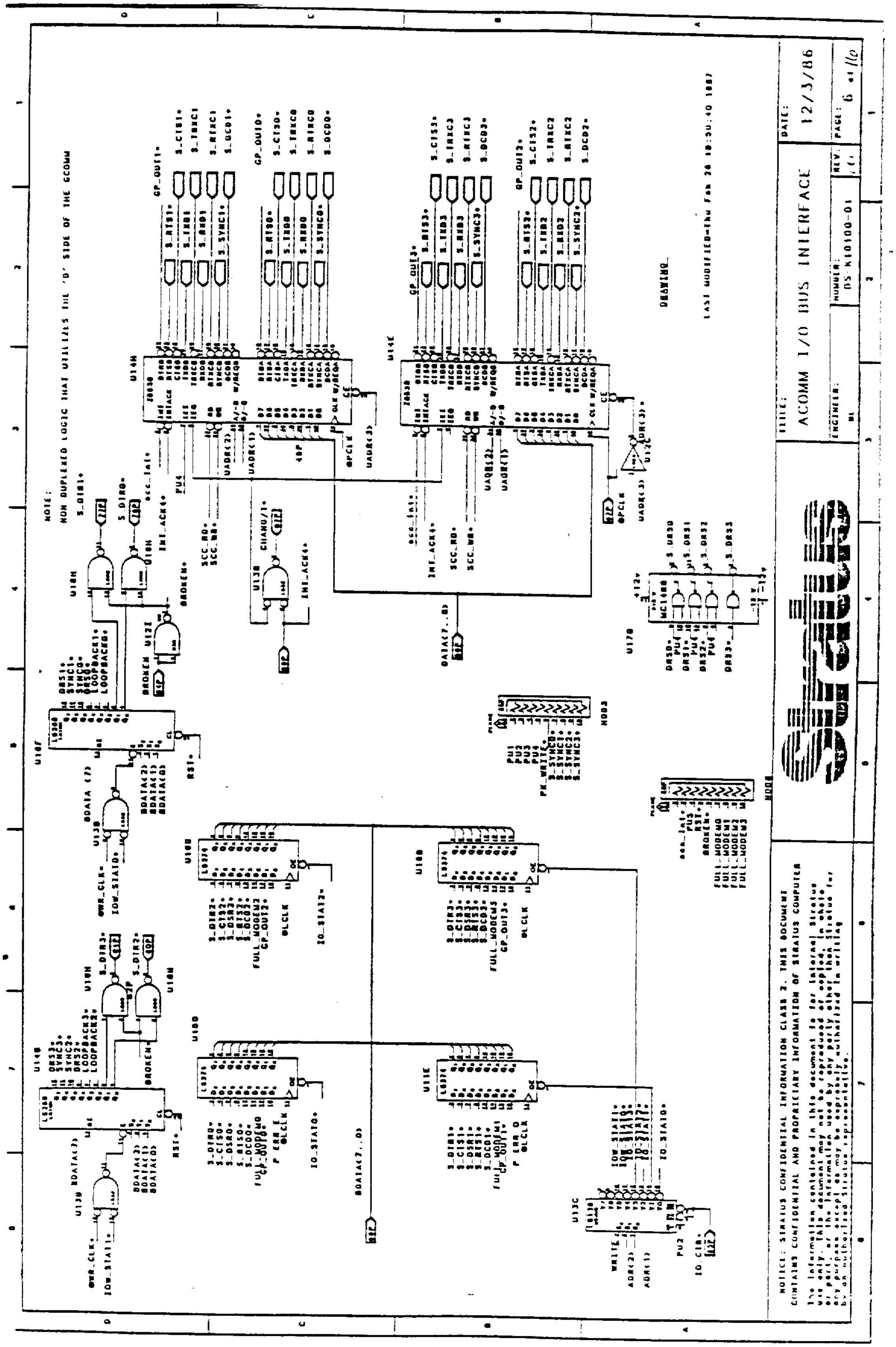
ACOMM I/O BUS INTERFACE
12/3/86
DRAWING

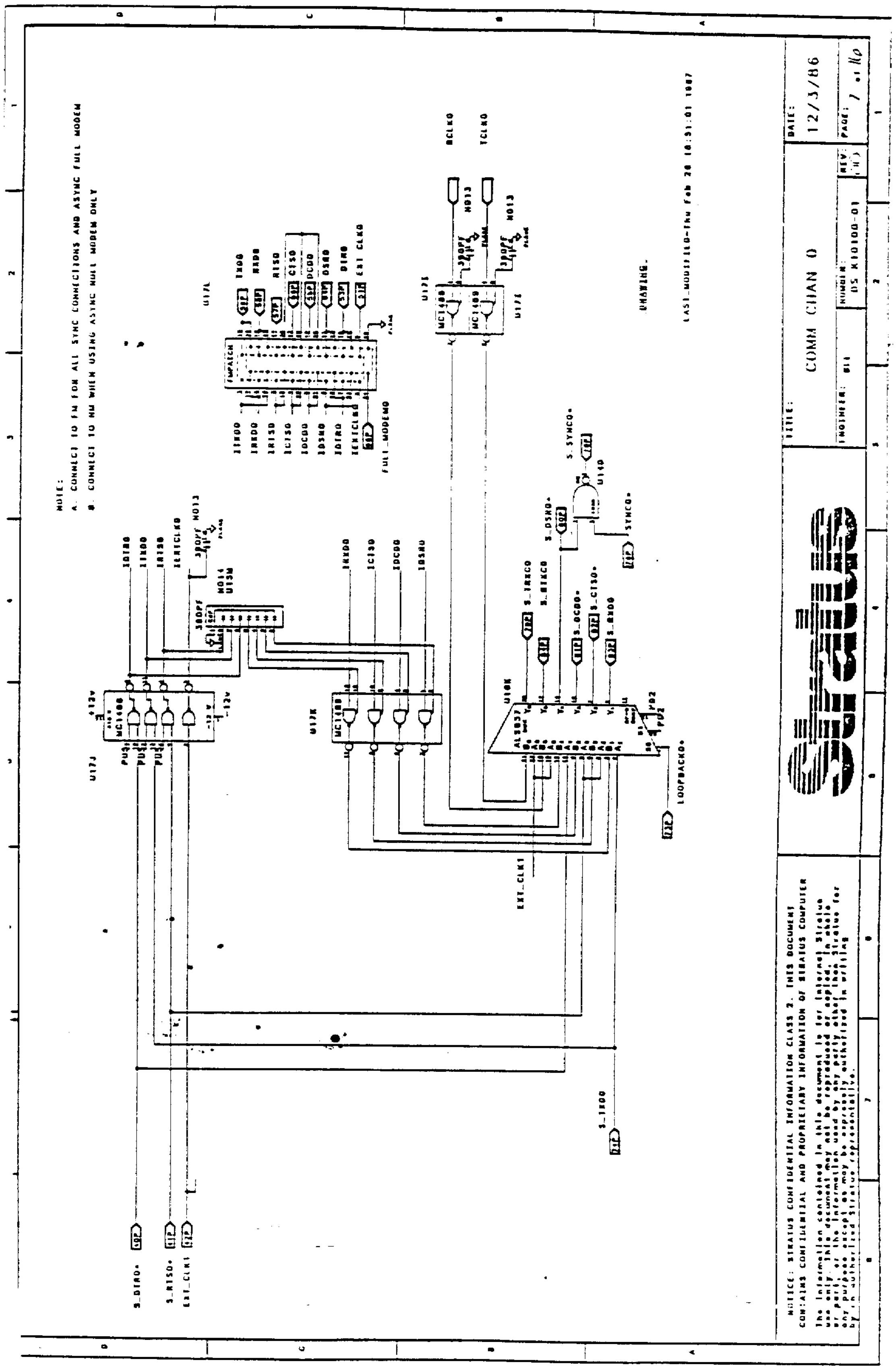
COMM CHAN 0
12/3/86
MC1488
MC1489
LOOPBACKO
EXT_CLK1
S_DTRO
S_RTSO
S_TXDO
S_SYNCO
RCLKO
TCLKO
FULL_MODEMO

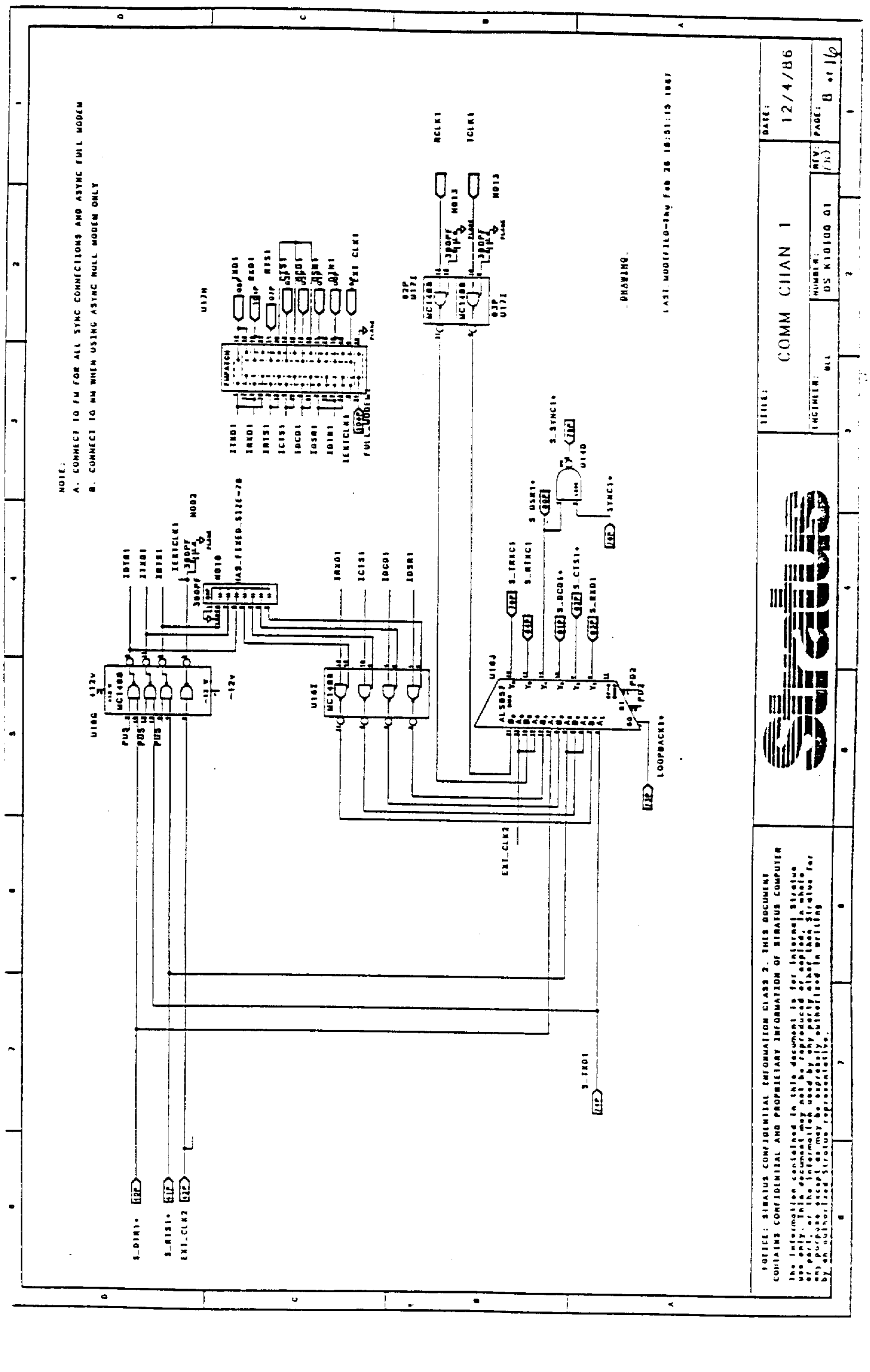
COMM CHAN 1
12/4/86
DS K10100 01

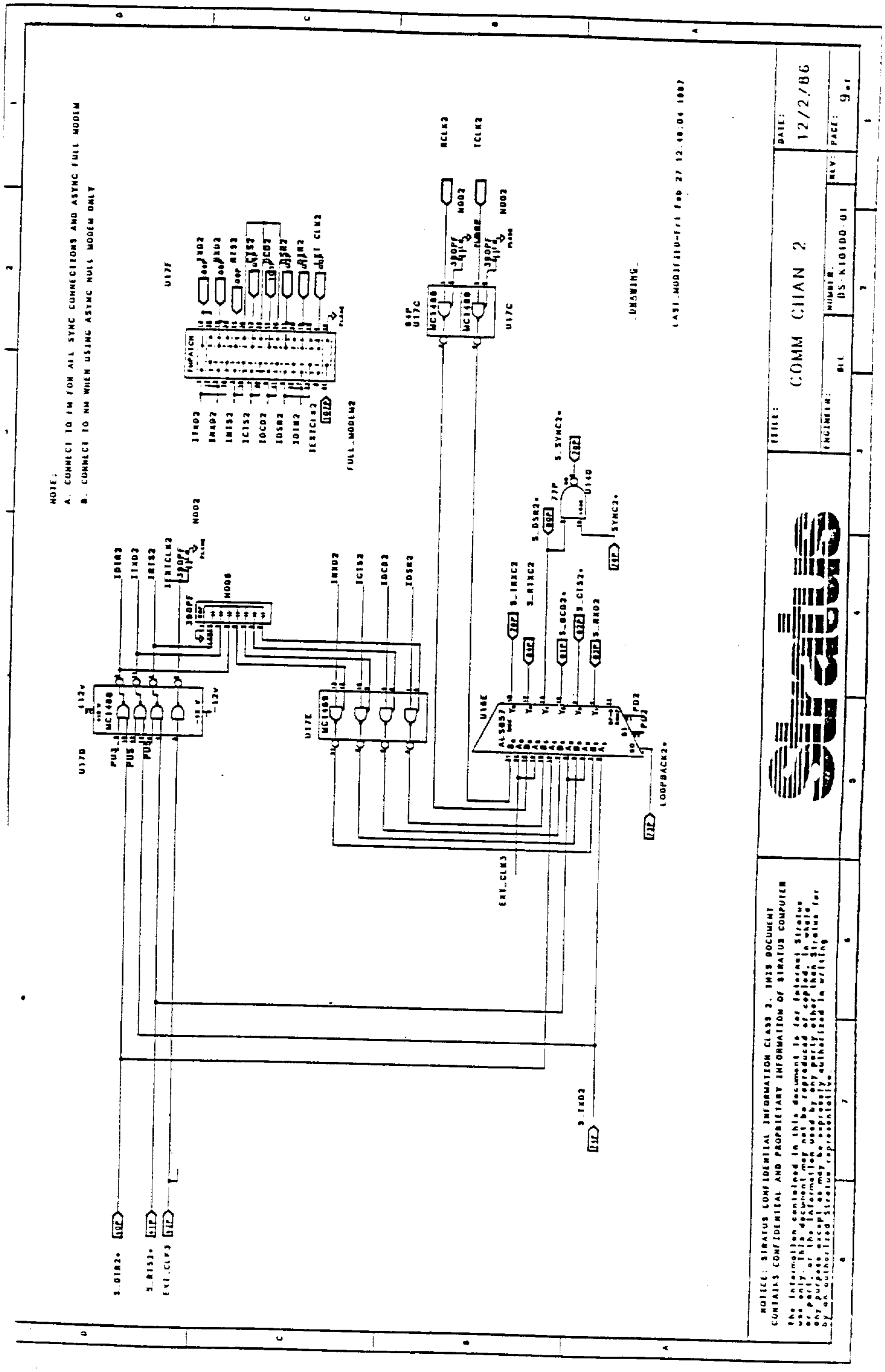
COMM CHAN 2
12/2/86
NOTE:
A. CONNECT TO FM FOR ALL SYNC CONNECTIONS AND ASYNC FULL MODEM
B. CONNECT TO NM WHEN USING ASYNC NULL MODEM ONLY
FULL_MODEM2
U17D
U17E
U17C
U16E
U17F
MC1488
AL S057
LOOPBACK2*
EXT_CLK3
S_TXD2
RCLK2
TCLK2

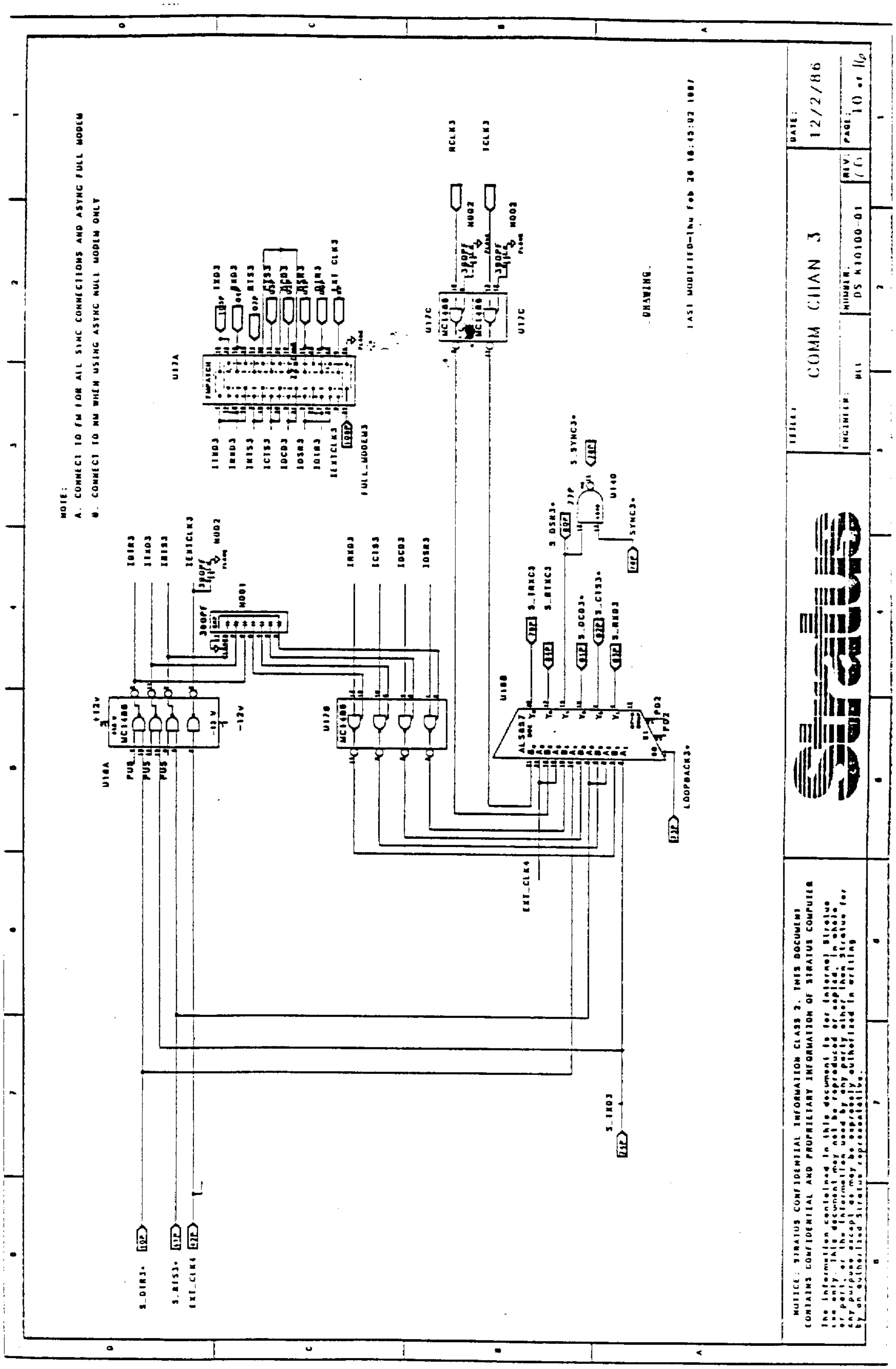
COMM CHAN 3
12/2/86
DS K10100-01
10 of 16

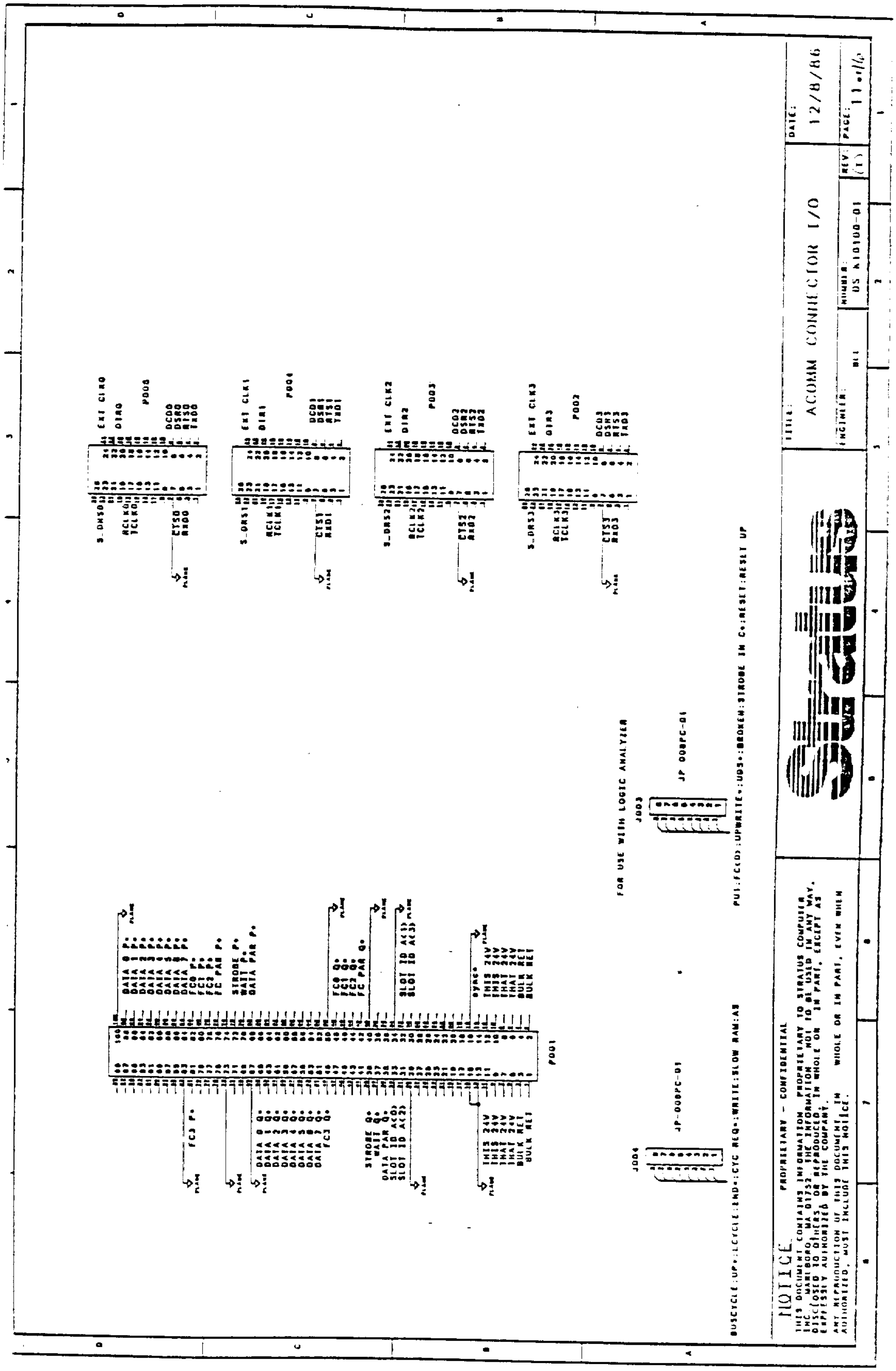
ACORN CONNECTOR I/O
12/8/86
FOR USE WITH LOGIC ANALYZER
P001
NOTICE
PROPRIETARY - CONFIDENTIAL

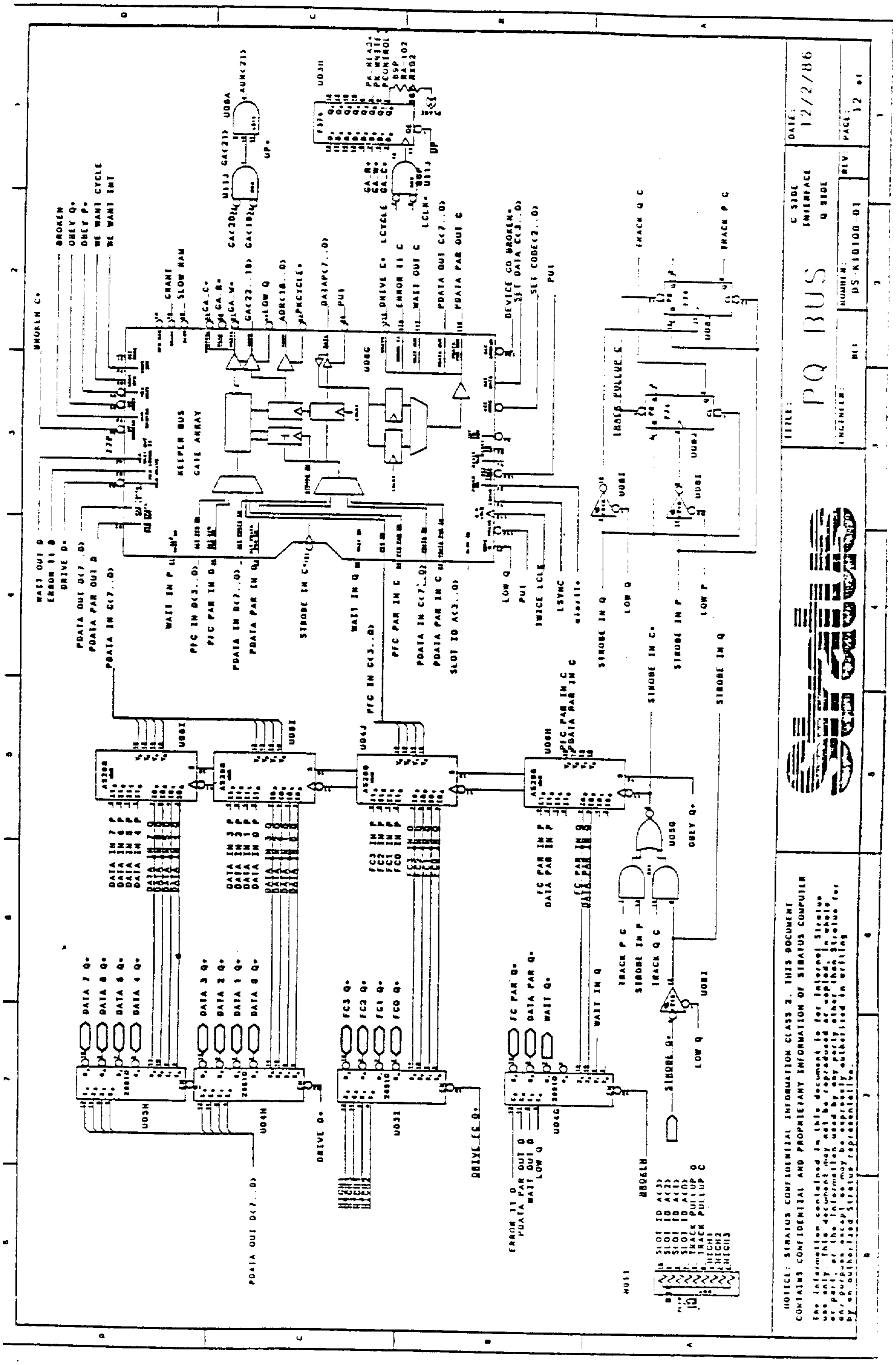
PQ BUS
12/2/86

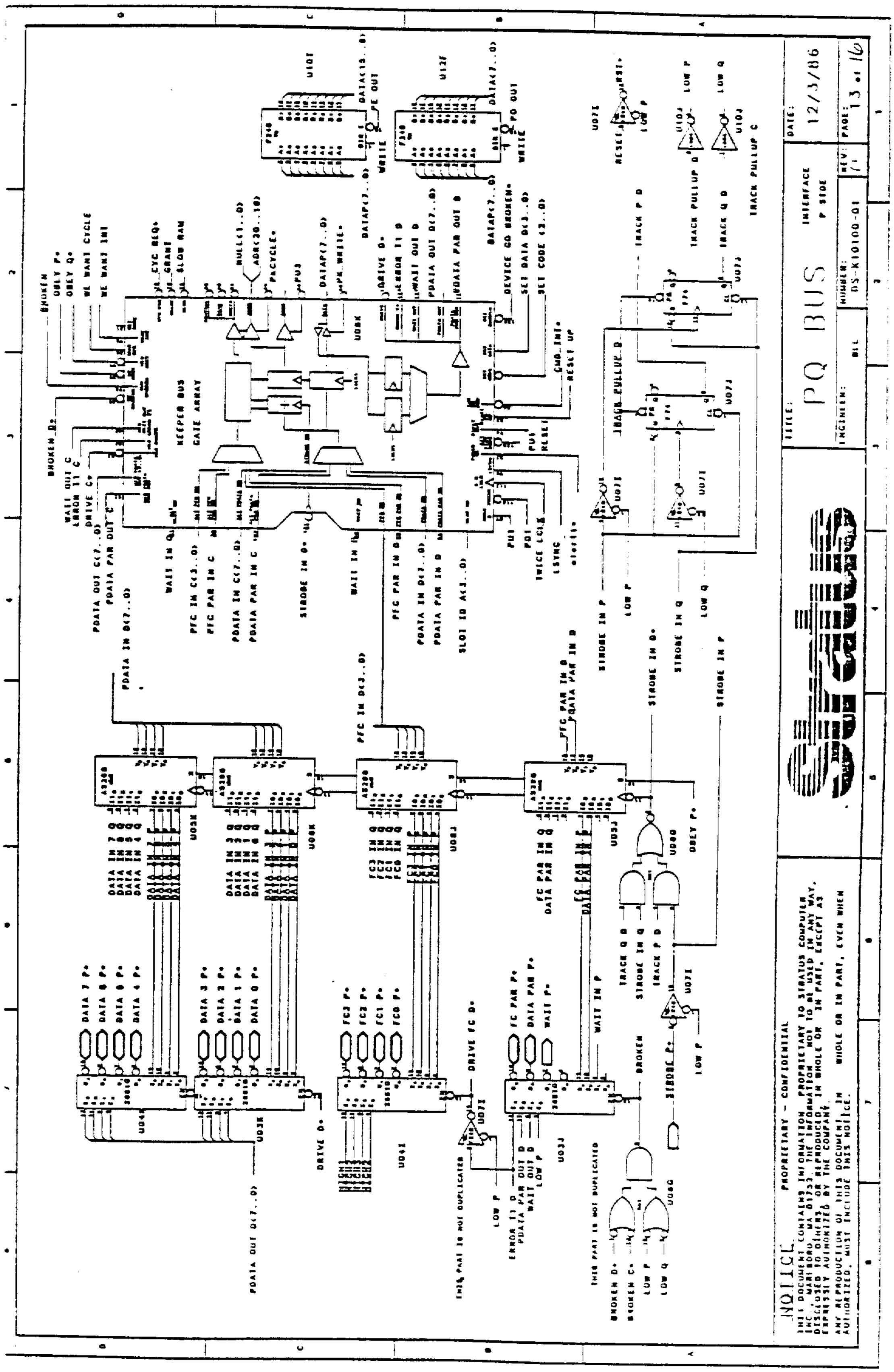
PQ BUS
INTERFACE P SIDE
12/3/86
13 of 16

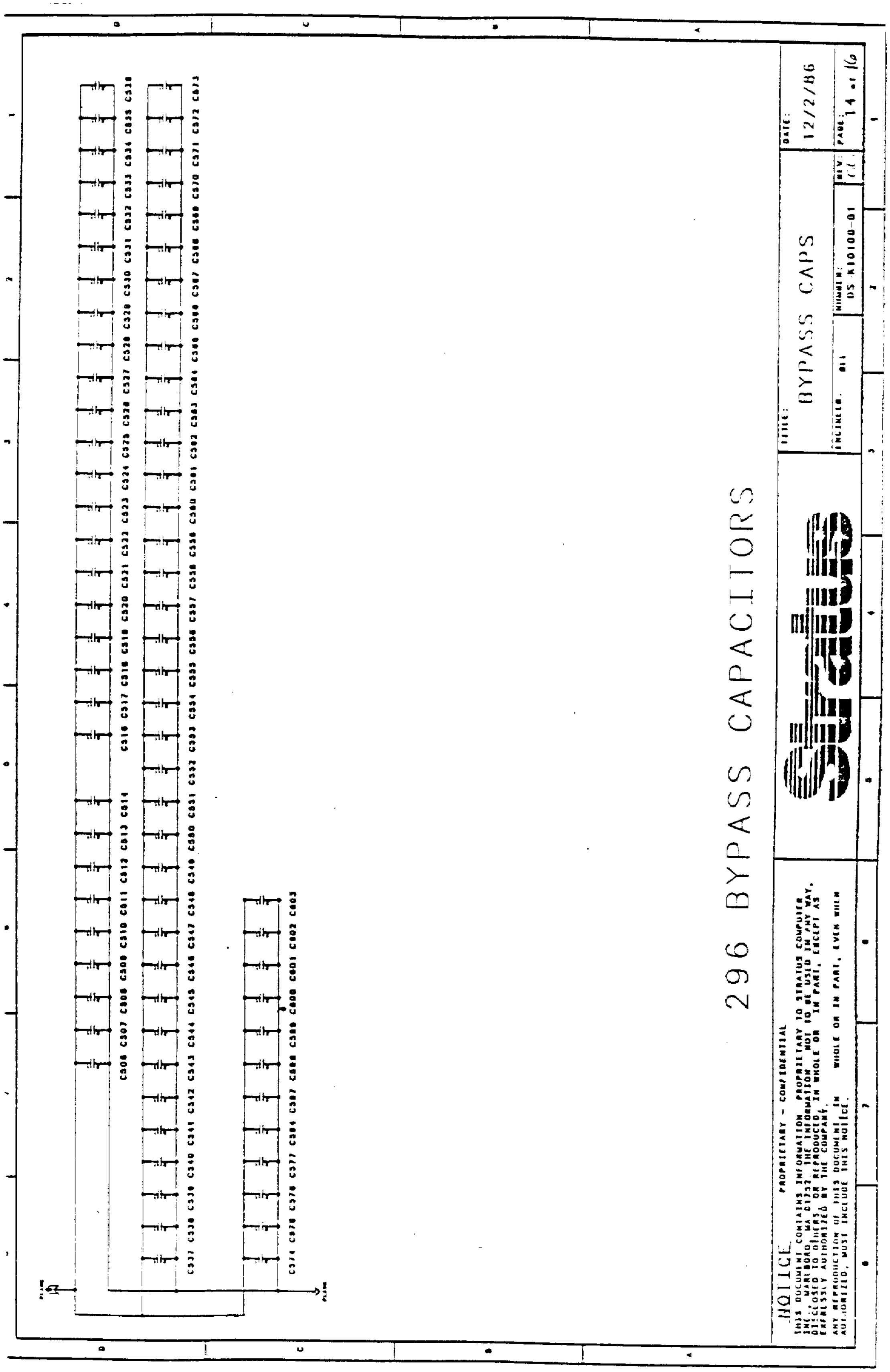
296 BYPASS CAPACITORS
BYPASS CAPS
12/2/86
DS K10100-01
14 of 16
NOTICE
PROPRIETARY - CONFIDENTIAL

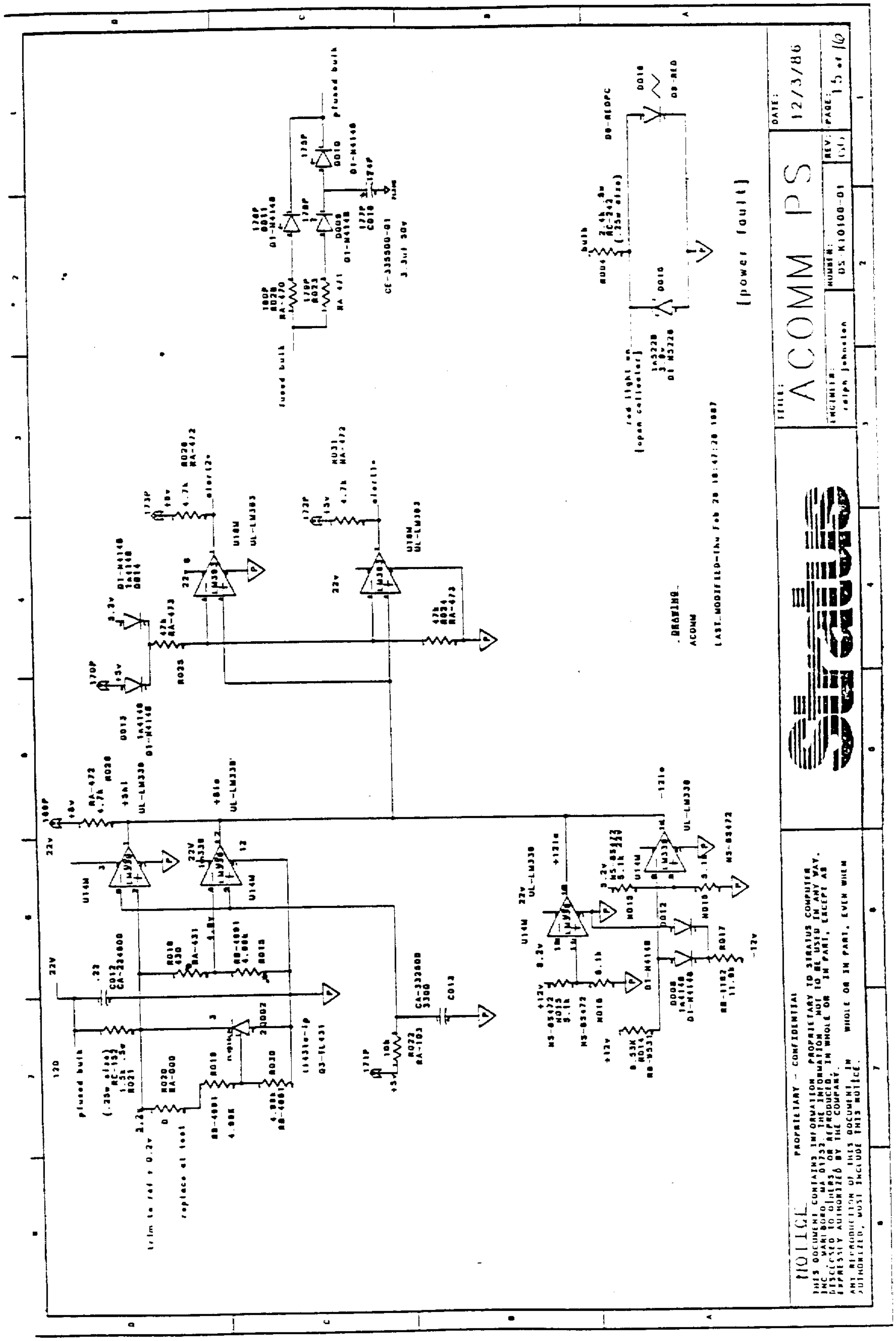
ACOMM PS
12/3/86
(power fault)
ralph johnston
PROPRIETARY - CONFIDENTIAL

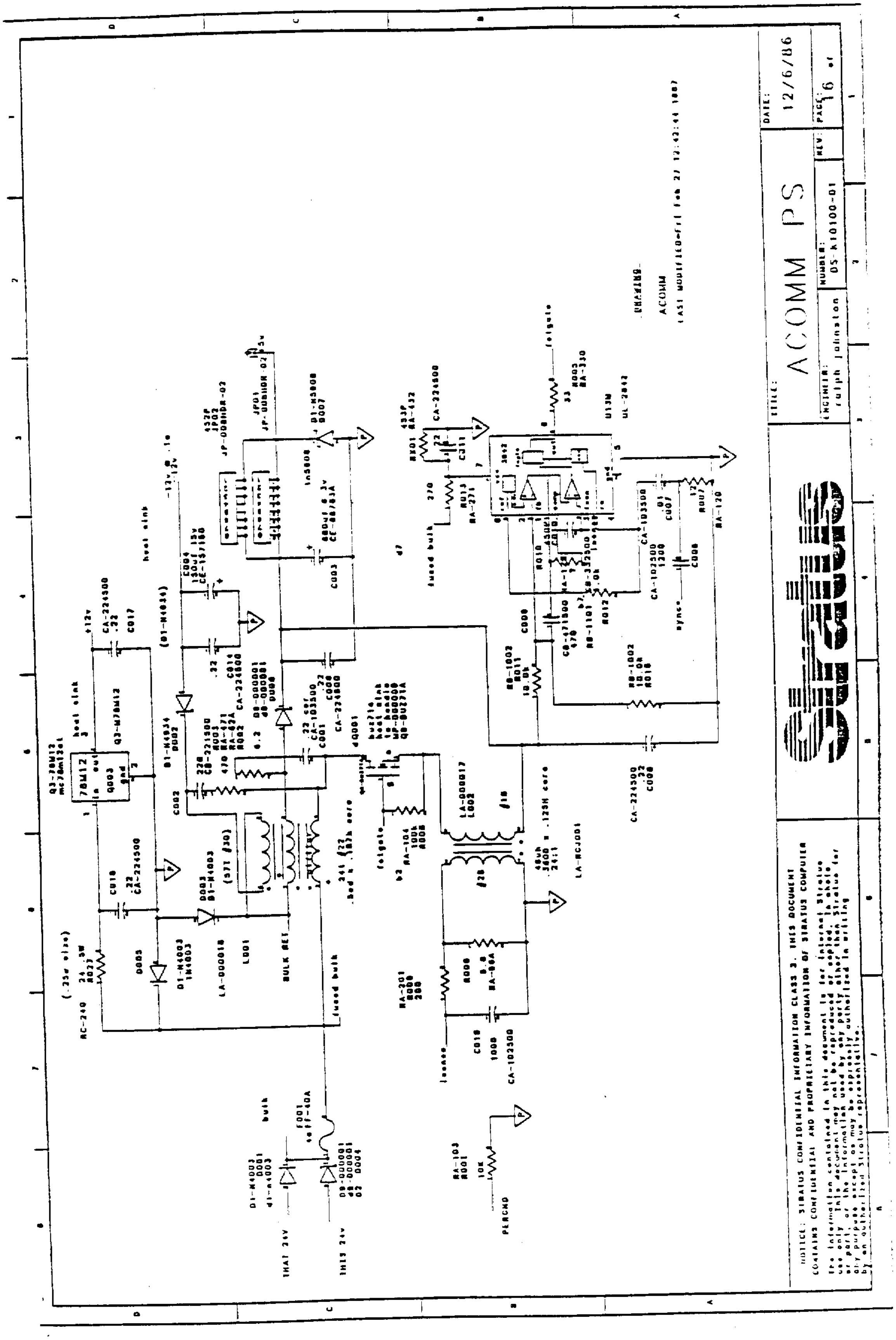
ACOMM PS
DATE: 12/6/86
PAGE: 16
NUMBER: DS-K10100-01
ENGINEER: ralph johnston
NOTICE: STRATUS CONFIDENTIAL INFORMATION CLASS 3. THIS DOCUMENT CONTAINS CONFIDENTIAL AND PROPRIETARY INFORMATION OF STRATUS COMPUTER

APPENDIX B

Software Listing

U.S. Patent Application for DIGITAL DATA PROCESSOR WITH FAULT TOLERANT PERIPHERAL BUS COMMUNICATIONS William L. Long et al

```
User:          Marty_Frongillo.SysAdmin

Request:       %es#m49>iop_source>iop_source_files

**************************************************************************
**************************************************************************
Destination:   Marty_Frongillo

Title:         iop_source_files

**************************************************************************
**************************************************************************

**************************************************************************
**************************************************************************

Started:       23-Jun-87 20:00:07
Submitted:     23-Jun-87 08:31:37
Options:       -copies   01 -indent   01 -wrap
**************************************************************************
**************************************************************************
Destination:   Marty_Frongillo

Title:         iop_source_files

**************************************************************************
**************************************************************************
```

```
*****************************************************************************
*****************************************************************************

Started:        23-Jun-87 20:00:07
Submitted:      23-Jun-87 08:31:37
Options:        -copies   01 -indent    01 -wrap
/*   ***begin copyright*** ***********************************   */
/*                                                                */
/*   STRATUS CONFIDENTIAL INFORMATION: CLASS II                   */
/*   COPYRIGHT (c) Stratus Computer, Inc. 1986                    */
/*                                                                */
/*   This  program  contains  confidential and proprietary        */
/*   information  of  Stratus Computer, Inc.,  and   any          */
/*   reproduction, disclosure, or use in whole or in part         */
/*   is   expressly   prohibited,   except   as   may   be        */
/*   specifically authorized by prior written agreement or        */
/*   permission of Stratus.                                       */
/*                                                                */
/*   ***end copyright*** *************************************   */

/* Beginning of modification history */
/* Written from ioc_condition_handler 87-5-5 by Tom Moser */
/* End of modification history */

ioa_condition_handler:
     procedure (a_mcp) recursive options (fault_handler, support);

/* parameters */

dcl  a_mcp                 ptr;

/* automatic */

dcl  fx                    fixed bin (15);
dcl  oncode                fixed bin (15);
dcl  code                  fixed bin (15);

/* external */

dcl  ioa_debug$fault       entry (ptr);
dcl  signal_fault entry (bin (15), ptr, char (32) var, bin (15),
          char (256) var);
dcl  s$signal_condition entry (bin (15), ptr, char (32) var, bin (15),
          char (256) var);

/* include */

%nolist;
/* %include 'condition_numbers'; */
/* Begin include file condition_numbers.incl.pl1   84-11-15 */

/* Modified for UNIX by RAS 84-06-26 */
/* Modified for Ada by RIE 86-11-03 */

/* This include file contains the numbers used for standard conditions */

%replace  ERROR_CONDITION_NO                by 1;
%replace  UNDEFINEDFILE_CONDITION_NO        by 2;
%replace  BREAK_CONDITION_NO                by 3;
%replace  ENDPAGE_CONDITION_NO              by 4;
%replace  ENDFILE_CONDITION_NO              by 5;
%replace  KEY_CONDITION_NO                  by 6;
```

```
%replace  FALSE_CONDITION_NO                    by  7;
%replace  UNDERFLOW_CONDITION_NO                by  8;
%replace  OVERFLOW_CONDITION_NO                 by  9;
%replace  ZERODIVIDE_CONDITION_NO               by  10;
%replace  FIXEDOVERFLOW_CONDITION_NO            by  11;
%replace  USER_DEFINED_CONDITION_NO             by  12;
%replace  WARNING_CONDITION_NO                  by  13;
%replace  ANYOTHER_CONDITION_NO                 by  14;
%replace  HANGUP_CONDITION_NO                   by  15;
%replace  ALARMTIMER_CONDITION_NO               by  16;
%replace  CPUTIMER_CONDITION_NO                 by  17;
%replace  REENTER_CONDITION_NO                  by  18;
%replace  PROCESSINTERRUPT_CONDITION_NO         by  19;
%replace  PROCESSPAUSE_CONDITION_NO             by  20;
%replace  KERNELERROR_CONDITION_NO              by  21;
%replace  SUBPROCESSDONE_CONDITION_NO           by  22;
%replace  USRSIGNAL_CONDITION_NO                by  23;
%replace  CLEANUP_CONDITION_NO                  by  24;
%replace  TASKTIMER_CONDITION_NO                by  25;
%replace  CONSTRAINT_ERROR_CONDITION_NO         by  26;
%replace  NUMERIC_ERROR_CONDITION_NO            by  27;
%replace  PROGRAM_ERROR_CONDITION_NO            by  28;
%replace  STORAGE_ERROR_CONDITION_NO            by  29;
%replace  TASKING_ERROR_CONDITION_NO            by  30;
%replace  ADA_OTHERS_CONDITION_NO               by  31;
%replace  MAX_CONDITION_NO                      by  31;

/* End include file condition_numbers.incl.pl1 */

/* %include 'error_codes'; */
/* %include 'io_68000_mc'; */
/* Begin include file ... ioa_68000_mc.incl.pl1  87-4-28 */

dcl  mcp ptr;

dcl 1 mc based (mcp),           /* machine conditions */
    2 identifier                char(4),                  /* *MC* */
    2 usp                       fixed bin (31),
    2 d                         (0:7) fixed bin (31),
    2 a                         (0:6) fixed bin (31),
    2 int_sr                    bit (16),
    2 faultno                   fixed bin (31),           /* computed faultno */
    2 status                    bit (16) aligned,
    2 pc                        fixed bin (31);

dcl 1 berr_mc based (mcp),              /* machine conditions for addr/bus error */
    2 identifier                char(4),                  /* *MC* */
    2 usp                       fixed bin (31),
    2 d                         (0:7) fixed bin (31),
    2 a                         (0:6) fixed bin (31),
    2 int_sr                    bit (16),
    2 faultno                   fixed bin (31),           /* computed faultno */
    2 reason,
      3 pad2                    bit (11),
      3 read                    bit (1),
      3 inst                    bit (1),
      3 fc                      bit (3),
    2 access_address            fixed bin (31),
    2 instruction_reg           bit (16),
    2 status                    bit (16) aligned,
    2 pc                        fixed bin (31);

/* End include file ... ioa_68000_mc.incl.pl1 */
/* %include 'fault_codes'; */
/* Begin include file . . . . . fault_codes.incl.pl1 */

%replace UNASSIGNED_VECTOR_0          by 0;
%replace RESET                        by 1;
%replace PAGE_FAULT                   by 2;
%replace ADDRESS_ERROR                by 3;
%replace ILLEGAL_INSTRUCTION          by 4;
%replace ZERO_DIVIDE                  by 5;
%replace CHK_INSTRUCTION              by 6;
%replace TRAPV_INSTRUCTION            by 7;
```

```
%replace PRIVILEGE_VIOLATION          by 8;
%replace TRACE                        by 9;
%replace LINE_1010_EMULATOR           by 10;
%replace LINE_1111_EMULATOR           by 11;
%replace UNASSIGNED_VECTOR_12         by 12;
%replace COPROC_PROTOCOL_VIOLATION    by 13;
%replace FORMAT_ERROR                 by 14;
%replace UNINITIALIZED_INTERRUPT_VECTOR by 15;
%replace UNASSIGNED_VECTOR_16         by 16;
%replace UNASSIGNED_VECTOR_17         by 17;
%replace UNASSIGNED_VECTOR_18         by 18;
%replace UNASSIGNED_VECTOR_19         by 19;
%replace UNASSIGNED_VECTOR_20         by 20;
%replace UNASSIGNED_VECTOR_21         by 21;
%replace UNASSIGNED_VECTOR_22         by 22;
%replace UNASSIGNED_VECTOR_23         by 23;
%replace SPURIOUS_INTERRUPT           by 24;
%replace LEVEL_1_AUTOVECTOR           by 25;
%replace LEVEL_2_AUTOVECTOR           by 26;
%replace LEVEL_3_AUTOVECTOR           by 27;
%replace LEVEL_4_AUTOVECTOR           by 28;
%replace LEVEL_5_AUTOVECTOR           by 29;
%replace LEVEL_6_AUTOVECTOR           by 30;
%replace LEVEL_7_AUTOVECTOR           by 31;
%replace TRAP_0_INSTRUCTION           by 32;
%replace TRAP_1_INSTRUCTION           by 33;
%replace TRAP_2_INSTRUCTION           by 34;
%replace TRAP_3_INSTRUCTION           by 35;
%replace TRAP_4_INSTRUCTION           by 36;
%replace TRAP_5_INSTRUCTION           by 37;
%replace TRAP_6_INSTRUCTION           by 38;
%replace TRAP_7_INSTRUCTION           by 39;
%replace TRAP_8_INSTRUCTION           by 40;
%replace TRAP_9_INSTRUCTION           by 41;
%replace TRAP_10_INSTRUCTION          by 42;
%replace TRAP_11_INSTRUCTION          by 43;
%replace TRAP_12_INSTRUCTION          by 44;
%replace TRAP_13_INSTRUCTION          by 45;
%replace TRAP_14_INSTRUCTION          by 46;
%replace TRAP_15_INSTRUCTION          by 47;
%replace BRANCH_SET_ON_UNORDERED      by 48;
%replace INEXACT_RESULT               by 49;
%replace FP_DIVIDE_BY_ZERO            by 50;
%replace UNDERFLOW                    by 51;
%replace OPERAND_ERROR                by 52;
%replace OVERFLOW                     by 53;
%replace SIGNALLING_NAN               by 54;
%replace UNASSIGNED_VECTOR_55         by 55;
%replace UNASSIGNED_VECTOR_56         by 56;
%replace UNASSIGNED_VECTOR_57         by 57;
%replace UNASSIGNED_VECTOR_58           by 58;
%replace UNASSIGNED_VECTOR_59           by 59;
%replace UNASSIGNED_VECTOR_60           by 60;
%replace UNASSIGNED_VECTOR_61           by 61;
%replace UNASSIGNED_VECTOR_62           by 62;
%replace UNASSIGNED_VECTOR_63           by 63;
%replace OUT_OF_KERNEL_CALL             by 64;
%replace PRIVILEGED_CALL                by 65;
%replace PROGRAM_INTERRUPT              by 66;
%replace CAP_EXCEPTION                  by 67;

/* End include file . . . . . fault_codes.incl.pl1 */
%list;

%page;
/* program */

      mcd = a_mcd;

      opcode = 0;

      if fx = ADDRESS_ERROR &
         merr_mc.a (4) = 1 &                       /* null pc in call */
         merr_mc.access_address = 1 &              /* fault address = null */
         merr_mc.reason.inst                       /* should be a bad jsr */
           then opcode = e$call_to_missing_module;
```

```
trace;
/* For kernel faults, it is transfered to by fault_handler above */

/* Check for faults that can reasonably occur in kernel/super user mode
   and need to be signalled */

      goto fault_code (mc.faultno);

fault_code (ZERO_DIVIDE):
      call signal_fault (ZERODIVIDE_CONDITION_NO, mcp, '', e$zerodivide, '');
      goto cant_restart;

fault_code (TRAPV_INSTRUCTION):
      call signal_fault (FIXEDOVERFLOW_CONDITION_NO, mcp, '',
                         e$fixedoverflow, '');
      return;

fault_code (CHK_INSTRUCTION):
      call signal_fault (ERROR_CONDITION_NO, mcp, '', e$subscriptrange, '');
      goto cant_restart;

fault_code (BRANCH_SET_ON_UNORDERED):
      call signal_fault (ERROR_CONDITION_NO, mcp, '',
                         e$branch_or_set_on_unordered, '');
      goto cant_restart;
      return;

fault_code (INEXACT_RESULT):
      call signal_fault (ERROR_CONDITION_NO, mcp, '', e$inexact_result, '');
      return;

fault_code (UNDERFLOW):
      call signal_fault (UNDERFLOW_CONDITION_NO, mcp, '', e$underflow, '');
      return;

fault_code (OVERFLOW):
      call signal_fault (OVERFLOW_CONDITION_NO, mcp, '', e$overflow, '');
      return;

fault_code (SIGNALLING_NAN):
      call signal_fault (ERROR_CONDITION_NO, mcp, '',
                         e$trapping_not_a_number, '');
      return;

/* These vectors are handled elsewhere */

fault_code(*):;

/* signal faults that not checked above which require signalling */

      if oncode = 0
           then oncode = e$cpu_exception;
      call signal_fault (ERROR_CONDITION_NO, mcp, '', oncode,
                '');

cant_restart:
      do while ('1'b);
           call s$signal_condition (ERROR_CONDITION_NO, null(), '',
                e$invalid_return, '');
      end;

end ioa_condition_handler;
/*   ***begin copyright*** ******************************   */
/*                                                         */
/*   STRATUS CONFIDENTIAL INFORMATION: CLASS II            */
/*   COPYRIGHT (c) Stratus Computer, Inc. 19[illegible]    */
/*                                                         */
/*   This program contains confidential and proprietary    */
/*   information of Stratus Computer, Inc., and any        */
/*   reproduction, disclosure, or use in whole or in part  */
/*   is expressly prohibited, except as may be             */
/*   specifically authorized by prior written agreement or */
/*   permission of Stratus.                                */
```

```
/*                                                                     */
/*  ***end copyright*** ************************************  */

/* ICA_DEBUG: This module implements a crude debugger */

/* Beginning of modification history */
/* written November 1982 by Larry Johnson */
/* modified 14 Mar 86 by R Crockett for ICA */
/* Modified 86-07-02 by Tom Moser to not expect 'ICA #' command prefix */
/* Modified 86-07-17 by Tom Moser to ease ICA debugging, compress code */
/* Modified 87-01-14 by Tom Moser to use different mc incl file for ICA */
/* Modified 87-04-29 by Tom Moser to do massive cleanup support UCOMM */
/* End of modification history */

ica_debug:
     proc;

/* parameters */

dcl  a_mcp                      ptr;
dcl  a_msg                      char (*) var;
dcl  a_entry_var                entry variable;

/* automatic */

dcl  bnc                        fixed bin;
dcl  pc_ptr                     ptr;
dcl  entry_sw                   fixed bin (15);
dcl  input                      char (80) var;
dcl  saved_input                char (80) var;
dcl  n_args                     fixed bin (15);
dcl  args (0:5)                 char (32) var;
dcl  debug_sp                   ptr;
dcl  i                          fixed bin (15);
dcl  p                          ptr;
dcl  n_bytes                    fixed bin (15);
dcl  val                        fixed bin (31);
dcl  element_size               fixed bin (15);

dcl  1  entry_var,
        2  display              ptr,
        2  code                 ptr,
        2  static               ptr;
dcl  defined_entry_var          entry variable defined (entry_var);

dcl  1  label_var,
        2  code                 ptr,
        2  stack                ptr;
dcl  defined_label_var          label variable defined (label_var);

/* constants */

%replace CALL_ENTRY          by 0;
%replace FAULT_ENTRY         by 1;
%replace CRASH_ENTRY         by 2;
%replace LEVEL7_ENTRY        by 3;
%replace MCS_ENTRY           by 4;
%replace BREAK_ENTRY         by 5;
%replace TRACE_ENTRY         by 6;

%replace TRAP_0_INSTRUCTION_CODE
                             by '4E40'b4;
%replace TRACE_BIT           by '8000'b4;         /* in 68000 status reg */

dcl  help_text (11)             char (32) var int static init (
     'break (addr)',
     'call (routine) [static_ptr]',
     'clear (addr)',
     'continue',
     'dump (addr) [n_bytes]',
     'go [addr [stack_frame_addr]]',
     'help',
     'list',
```

```
      'regs',
      'set[.b | .w | .l] (addr) {value}',
      'why');

dcl  cmd_names (14)               char (8) var int static init (
                                         'break',            /* 1 */
                                         'call',             /* 2 */
                                         'clear',            /* 3 */
                                         'continue',         /* 4 */
                                         'dump',             /* 5 */
                                         'go',               /* 6 */
                                         'help',             /* 7 */
                                         'list',             /* 8 */
                                         'regs',             /* 9 */
                                         'set',              /* 10 */
                                         'set.b',            /* 11 */
                                         'set.l',            /* 12 */
                                         'set.w',            /* 13 */
                                         'why');             /* 14 */


/* static */

dcl  1 pcp_brks$                    static external,
/* %include 'pcp_breaks_inner' */;
/* Begin include file ... pcp_breaks_inner.incl.pl1  83-01-31 */

          2 n_brks fixed bin (15) init (0),
          2 break (16),
            3 brk_addr fixed bin (31),
            3 brk_inst fixed bin (15);

/* End include file ... pcp_breaks_inner.incl.pl1 */

declare  1  s                      static,
            2  continue_index fixed bin initial (-1),
            2  break_info,
               3  pcp_brks_added   bit (1) aligned,
               3  n_breaks     fixed bin initial (0),
               3  each (16),
                  4  break_pc pointer,
                  4  former_contents
                               bit (16) aligned,
                  4  adjacent_stuff
                               bit (48);       /* for disassembler */

dcl  user_commands_available  bit (1) aligned int static init ('0'b);
dcl  user_commands_entry      entry (fixed bin (15), (0:5) char (32) var)
                              variable int static;

dcl  star_addr                fixed bin (31) static initial (1);

/* based */

declare  1  based_image        based,
            2  contents        bit (16),
            2  adjacent_stuff  bit (48);

dcl  based_ptr                 ptr based;
dcl  based_char                char (1) based;
dcl  based_fb15                fixed bin (15) based;
dcl  based_fb31                fixed bin (31) based;

/* external */

dcl  hex                       entry (bin (31), bin (15)) returns (char (8)
                               var);
dcl  hexd                      entry (ptr, bin (15)) returns (char (8)
                               var);
dcl  stackframeptr             entry returns (ptr);
dcl  unhex                     entry (char (*) var, bin (31), bin (15));

/* based */
```

```
/* %include 'stack_frame'; */
/* Begin include file -- stack_frame.incl.pl1  80-12-30 */

declare (sp, b_sp) ptr;

declare 1 stack_frame based (b_sp),
          2 display_ptr ptr,              /* -20 */
          2 entry_ptr ptr,                /* -16 */
          2 static_ptr ptr,               /* -12 */
          2 orig_frame_end ptr,           /*  -8 */
          2 on_ptr ptr,                   /*  -4 */
          2 prev_sp ptr,                  /*   0 */
          2 return_ptr ptr;               /*  +4 */

/*        2 args (N) ptr                  /*  +8... */

/* End include file -- stack_frame.incl.pl1 */
/* %include 'stack_frame_constants'; */
/* BEGIN INCLUDE FILE ... stack_frame_constants.incl.pl1 */

%replace backup_sp             by -20;
 /* END INCLUDE FILE ... stack_frame_constants.incl.pl1 */
 /* %include 'fault_codes'; */
 /* Begin include file . . . . . fault_codes.incl.pl1 */

 %replace UNASSIGNED_VECTOR_0        by 0;
 %replace RESET                      by 1;
 %replace PAGE_FAULT                 by 2;
 %replace ADDRESS_ERROR              by 3;
 %replace ILLEGAL_INSTRUCTION        by 4;
 %replace ZERO_DIVIDE                by 5;
 %replace CHK_INSTRUCTION            by 6;
 %replace TRAPV_INSTRUCTION          by 7;
 %replace PRIVILEGE_VIOLATION        by 8;
 %replace TRACE                      by 9;
 %replace LINE_1010_EMULATOR         by 10;
 %replace LINE_1111_EMULATOR         by 11;
 %replace UNASSIGNED_VECTOR_12       by 12;
 %replace COPROC_PROTOCOL_VIOLATION  by 13;
 %replace FORMAT_ERROR               by 14;
 %replace UNINITIALIZED_INTERRUPT_VECTOR by 15;
 %replace UNASSIGNED_VECTOR_16       by 16;
 %replace UNASSIGNED_VECTOR_17       by 17;
 %replace UNASSIGNED_VECTOR_18       by 18;
 %replace UNASSIGNED_VECTOR_19       by 19;
 %replace UNASSIGNED_VECTOR_20       by 20;
 %replace UNASSIGNED_VECTOR_21       by 21;
 %replace UNASSIGNED_VECTOR_22       by 22;
 %replace UNASSIGNED_VECTOR_23       by 23;
 %replace SPURIOUS_INTERRUPT         by 24;
 %replace LEVEL_1_AUTOVECTOR         by 25;
 %replace LEVEL_2_AUTOVECTOR         by 26;
 %replace LEVEL_3_AUTOVECTOR         by 27;
 %replace LEVEL_4_AUTOVECTOR         by 28;
 %replace LEVEL_5_AUTOVECTOR         by 29;
 %replace LEVEL_6_AUTOVECTOR         by 30;
 %replace LEVEL_7_AUTOVECTOR         by 31;
 %replace TRAP_0_INSTRUCTION         by 32;
 %replace TRAP_1_INSTRUCTION         by 33;
 %replace TRAP_2_INSTRUCTION         by 34;
 %replace TRAP_3_INSTRUCTION         by 35;
 %replace TRAP_4_INSTRUCTION         by 36;
 %replace TRAP_5_INSTRUCTION         by 37;
 %replace TRAP_6_INSTRUCTION         by 38;
 %replace TRAP_7_INSTRUCTION         by 39;
 %replace TRAP_8_INSTRUCTION         by 40;
 %replace TRAP_9_INSTRUCTION         by 41;
 %replace TRAP_10_INSTRUCTION        by 42;
 %replace TRAP_11_INSTRUCTION        by 43;
 %replace TRAP_12_INSTRUCTION        by 44;
 %replace TRAP_13_INSTRUCTION        by 45;
 %replace TRAP_14_INSTRUCTION        by 46;
 %replace TRAP_15_INSTRUCTION        by 47;
```

```
%replace BRANCH_SET_ON_UNORDERED    by 48;
%replace INEXACT_RESULT             by 49;
%replace FP_DIVIDE_BY_ZERO          by 50;
%replace UNDERFLOW                  by 51;
%replace OPERAND_ERROR              by 52;
%replace OVERFLOW                   by 53;
%replace SIGNALLING_NAN             by 54;
%replace UNASSIGNED_VECTOR_55       by 55;
%replace UNASSIGNED_VECTOR_56       by 56;
%replace UNASSIGNED_VECTOR_57       by 57;
%replace UNASSIGNED_VECTOR_58       by 58;
%replace UNASSIGNED_VECTOR_59       by 59;
%replace UNASSIGNED_VECTOR_60       by 60;
%replace UNASSIGNED_VECTOR_61       by 61;
%replace UNASSIGNED_VECTOR_62       by 62;
%replace UNASSIGNED_VECTOR_63       by 63;
%replace BAD_KERNEL_CALL            by 64;
%replace PRIVILEGED_CALL            by 65;
%replace PROGRAM_INTERRUPT          by 66;
%replace SAP_EXCEPTION              by 67;

/* End include file . . . . . fault_codes.incl.pl1 */
/* %include 'ioa_mailbox'; */
/*                        ioa_mailbox.incl.pl1
                          --------------------

     This  include file contains the mailbox used to communicate
     between an IOA and the ICP.  Several  overlaid  definitions
     exist,  which  are used under different circumstances, such
     as dumping or IOA program debugging.

*/

/* Define typical IOA mailbox pointer.                                     */
dcl  ioa_mbxp              ptr; /* ioa_mbxp = contents of 200404x in ioa */

/* Original mbx template */
dcl  1 ioa_mbx    like ioa_mbx_template  based( ioa_mbxp );

dcl  1 ioa_mbx_template   based,
       2 command          fixed bin(15),
       2 buffer_addr      fixed bin(31),
       2 status           bit(32) aligned,
       2 f,
         3 ownership      bit(1),    /* = '0' = iop;  = '1' = ioa */
         3 mbz            bit(7),
         3 id_tag         char(1),
       2 msg_in           char(80) var,
       2 msg_out          char(80) var,
       2 more_info        bit(1) aligned,
       2 xtra_ptr         fixed bin(31);

/* Dump mailbox template */
dcl  1 ioa_mbx_dump   like ioa_mbx_dump_tpl based( ioa_mbxp );

dcl  1 ioa_mbx_dump_tpl  based,
       2 outbox_offset    char(92) var,       /* Not used for dumping          */
       2 mbz              fixed bin(15),      /* Must be zero for dump         */
       2 page_num         fixed bin(15),      /* Current adapter dump page     */
       2 data_type        fixed bin(15),      /* Dump data type                */
       2 absolute_addr    fixed bin(31),      /* Real IOA addr of dump data    */
       2 buf_byte_cnt     fixed bin(15),      /* Num bytes xfer'd this time    */
       2 page_seq_num     fixed bin(15),      /* Adapter's seq # for page      */
       2 remaining_cnt    fixed bin(15);      /* Num bytes still to be xfer'd */
/*     2 unused_str_o     char(70) var;       /* Not used for dumping          */

/* Command info mailbox template */
dcl  1 ioa_mbx_cmdinfo   like ioa_mbx_c_i_tpl based( ioa_mbxp );

dcl  1 ioa_mbx_c_i_tpl   based,
       2 outbox_offset    char(92) var,       /* Not used for command info     */
       2 sw_rev           fixed bin(15);      /* Board's software revision     */
/*     2 unused_str_o     char(84) var;       /* Not used for dumping          */
```

```
%replace ICA_MAILBOX_PTR_ADDR by   2096190;
%replace ICP_OWNER by '0'b;
%replace ICA_OWNER by '1'b;

/*   Brief description of protocol for diagnostic usage.
     ----------------------------------------------------

     The  mailbox begins life with the ICP having ownership ( ownership =
     '0' ) and when the ICP has placed all the pertinent  information  in
     the box it will change ownership over to the ICA.  The ICP will then
     set the int_to_device bit in the ICA's Gate Array, which the adapter
     should  be  polling in order to know when a command has arrived.  It
     is not advised for the adapters to have their interrupts enabled  at
     this  point  in  time,  and  this  is  the  reason  for  polling the
     int_to_device bit.

     The  ownership  bit works in conjunction with the int_to_device bit.
     This should cover  the  case  where  an  adapter  detects  a  faulty
     int_to_device  bit.  Therefore  the  adapter  should  only process a
     command if the int_to_device bit and the ownership bit are both set.

     Structure definitions.
     ----------------------
     ioa_mbx.command ( input/output )
          - This is the command for the ICA to execute. On output it
            indicates the command executed by the ICA.

     ioa_mbx.buffer_addr ( input/output )
          - Universal buffer longword address. The address of the
            primary buffer for an operation is placed here.

     ioa_mbx.status ( output )
          - This will be filled in by the adapter indicating the
            status of the board, commands, etc...

     ioa_mbx.ownership ( input/output )
          - This bit defines who the current owner of the mailbox is.  If
            this bit = '0'b then the ICP currently owns the mailbox, otherwise
            the adapter has ownership.

     ioa_mbx.f.id_tag ( mailbox owner )
          - Id tag used by ICP-side processes only (not used by ICA)
            to encode owner of current mailbox id in order to prevent
            one ICP process from using another process's returned mbx.

     ioa_mbx.msg_in ( input )
          - This is defined as a char(80) varying buffer.  It will be command
            dependent and can therefore have different meanings with overlays
            describing it.  However, the first two bytes will always specify
            the number of bytes in the buffer.  Whether the commands choose to
            use them is up to the individual command.

     ioa_mbx.msg_out ( output )
           - This buffer is for the ioa to send data to the icp.  Again, the
             same applies to this buffer as to the .msg_in described above.

      ioa_mbx.more_info ( input/output )
           - On output this signifies that there is more information than
             will fit into the msg_out buffer. Input meaning is command
             dependent.

      ioa_mbx.xtra_ptr ( input/output )
           - The meaning of this pointer is command dependent, though
             generally it is used as a pointer to extra data that would
             not fit in the primary buffer, or as the secondary pointer
             for a command.

*/
/* %include 'ioa_68000_mc'; */
/* Begin include file ... ioa_68000_mc.incl.pl1  87-4-02 */

dcl  mcp ptr;

dcl 1 mc based (mcp),     /* machine conditions */
```

```
    2 identifier          char(4),                    /* *MC* */
    2 usp                 fixed bin (31),
    2 d                   (0:7) fixed bin (31),
    2 a                   (0:6) fixed bin (31),
    2 int_sr              bit (16),
    2 faultno             fixed bin (31),             /* computed faultno */
    2 status              bit (16) aligned,
    2 pc                  fixed bin (31);

dcl 1 berr_mc based (mcp),          /* machine conditions for addr/bus error */
    2 identifier          char(4),                    /* *MC* */
    2 usp                 fixed bin (31),
    2 d                   (0:7) fixed bin (31),
    2 a                   (0:6) fixed bin (31),
    2 int_sr              bit (16),
    2 faultno             fixed bin (31),             /* computed faultno */
    2 reason,
      3 pad2              bit (11),
      3 read              bit (1),
      3 inst              bit (1),
      3 fc                bit (3),
    2 access_address      fixed bin (31),
    2 instruction_reg     bit (16),
    2 status              bit (16) aligned,
    2 pc                  fixed bin (31);

/* End include file ... ioa_68000_mc.incl.pl1 */
%page;
/* ============================================================ */
/* call entry is here */

     mcp = null ();
     entry_sw = CALL_ENTRY;
     go to join;

ioa_debug$fault:                                    /* unexpected fault */
     entry (a_mcp);

     mcp = a_mcp;
     entry_sw = FAULT_ENTRY;
     go to join;

ioa_debug$break:                                    /* breakpoint */
     entry (a_mcp);

     mcp = a_mcp;
     entry_sw = BREAK_ENTRY;
     mc.pc = mc.pc - 2;

     go to join;

ioa_debug$trace_fault:                              /* part of continuing a breakpt */
     entry (a_mcp);

     mcp = a_mcp;
     entry_sw = TRACE_ENTRY;
     go to join;

ioa_debug$crash:                                    /* stop everything */
     entry (a_msg);

     mcp = null ();
     entry_sw = CRASH_ENTRY;
     go to join;

ioa_debug$level7:                                   /* manual "break" */
     entry (a_mcp);

     mcp = a_mcp;
     entry_sw = LEVEL7_ENTRY;
     go to join;

ioa_debug$msg:                                      /* blab and return */
     entry (a_msg);
```

```
     mcp = null ();
     entry_sw = MSG_ENTRY;
     go to join;

ica_debug$define_user_commands:
     entry (a_entry_var);

     user_commands_entry = a_entry_var;
     user_commands_available = '1'b;
     return;
%page;
/* ========================================================= */
join:

     if ^s.pcp_brks_added
     then
          do i = 1 to pcp_brks$.n_brks;
               bno = s.break_info.n_breaks + 1;
               if bno > hbound (s.break_info.each, 1)
                    then call write_vos_msg ('No room for predefined breaks.');
               else do;
                    pc_ptr = ptr (pcp_brks$.break (i).brk_addr);
                    s.break_info.break_pc (bno) = pc_ptr;
                    s.break_info.former_contents (bno) =
                         unspec (pcp_brks$.break (i).brk_inst);
                    s.break_info.adjacent_stuff (bno) = pc_ptr ->
                         based_image.adjacent_stuff;
                    s.break_info.n_breaks = bno;
               end;
          end;

     s.pcp_brks_added = '1'b;

     debug_sp = stackframeptr ();

     call print_why;

     n_args = 0;
     if entry_sw = MSG_ENTRY
        then return;

     if entry_sw = TRACE_ENTRY
     then do;
          if s.continue_index = -1       /* no remembered breakpoint? */
          then do;
               call write_vos_msg ('Unexpected trace fault.');
               call ica_debug$fault (mcp);
               return;
               end;
          call write_vos_msg ('Continuing...');    /* lets us know we won */
          bno = s.continue_index;
          s.continue_index = -1;
          p = s.break_info.break_pc (bno);
          p -> based_image.contents = TRAP_3_INSTRUCTION_CODE;
          mcp -> mc.status = mcp -> mc.status & ^TRACE_BIT;
          return;
          end;

     if mcp ^= null()                              /* set default frame */
     then p = ptr(mc.a(6));
     else p = debug_sp;

/* basic command loop */

loop:
     call write_vos_msg ('ICA DEBUGGER Ready: ');
     call read_vos_msg (input);
     saved_input = input;
     n_args = -1;
     args (1) = '*';                         /* good default if missing */
     do while (input ^= '');
          if n_args >= hbound (args, 1)
             then go to too_many_args;
          i = index (input, ' ');
```

```
          if i = 1
             then input = substr (input, 2);
          else if i = 0
             then do;                                  /* rest of line is arg */
                  n_args = n_args + 1;
                  args (n_args) = input;
                  input = '';
                  end;
          else do;
                n_args = n_args + 1;
                 if n_args >= 0
                       then  args (n_args) = substr (input, 1, i - 1);
                 input = substr (input, i + 1);
                 end;
     end;
     if n_args < 0
        then go to loop;

     do i = 1 to hbound (cmd_names, 1);
          if cmd_names (i) = args (0)
             then go to cmd (i);
     end;

     if user_commands_available
        then do;
             call user_commands_entry (n_args, args);
             go to loop;
             end;

     call write_vos_msg ('Invalid command: ' || saved_input);
     go to loop;
%page;
/* ============================================================ */
/* common error handling */

too_many_args:
     call write_vos_msg ('Too many args.');
     go to loop;
missing_arg:
     call write_vos_msg ('Missing arg.');
     go to loop;
bad_byte_count:
     call write_vos_msg ('Invalid byte count.' || hex((n_bytes),6));
     go to loop;

/* commands */

cmd (1):                                         /* break */
     p = ptr (cv_hex (args (1)));
     if find_break (p) ^= -1
        then do;
             call write_vos_msg ('Already a break there.');
             go to loop;
             end;

     bno = s.break_info.n_breaks + 1;
     if bno > hbound (s.break_info.each, 1)
        then do;
             call write_vos_msg ('Too many breaks.');
             go to loop;
             end;

     s.break_info.break_pc (bno) = p;
     s.break_info.former_contents (bno) = p -> based_image.contents;
     s.break_info.adjacent_stuff (bno) = p ->
              based_image.adjacent_stuff;

     s.break_info.n_breaks = bno;

     p -> based_image.contents = TRAP_3_INSTRUCTION_CODE;
     go to loop;

cmd (2):                                         /* call */
```

```
     if n_args = 0
        then go to missing_arg;

     entry_var.display = null ();
     if n_args >= 2
        then do;
             p = ptr (cv_hex (args (2)));
             entry_var.static = p;
             end;
        else entry_var.static = null ();

     p = ptr (cv_hex (args (1)));
     entry_var.code = p;

     call defined_entry_var;
     go to loop;

cmd (3):                                          /* clear */
     if args(1) = '-all'
     then do;
          if s.break_info.n_breaks = 0
              then goto loop;
          p = s.break_info.each(s.break_info.n_breaks).break_pc;
          end;
          else p = ptr (cv_hex (args (1)));

     bno = find_break (p);

     if bno = -1
        then do;
             call write_vcs_msg ('No break there.');
             goto loop;
             end;

     p -> based_image.contents = s.break_info.former_contents (bno);

     do bno = bno to s.break_info.n_breaks - 1;
          s.break_info.each (bno) = s.break_info.each (bno + 1);
     end;

     s.break_info.n_breaks = s.break_info.n_breaks - 1;

     if args(1) = '-all'
          then goto cmd(3);    /* continue clearing if -all */

     go to loop;

cmd (4):                                          /* continue */
     if entry_sw ^= BREAK_ENTRY
        then do;
             call write_vcs_msg (
                       'Can''t continue without a breakpoint -- only go.')
                       ;
             goto loop;
             end;
     pc_ptr = ptr (mcp -> mc.pc);
     bno = find_break (pc_ptr);
     if bno = -1
        then return;                                /* Break previously cleared. */

     pc_ptr -> based_image.contents = s.break_info.former_contents (bno);

     /* Now turn on the trace bit in the status register.  This will cause
        a trace fault to occur after this intruction has been executed.
        Then TRACE_ENTRY will put BACK the breakpoint
        instruction for next time.  */

     mcp -> mc.status = mcp -> mc.status | TRACE_BIT;

     s.continue_index = bno;                       /* remember current bkpt */
     return;

cmd (5):                                          /* dump */
     if n_args >= 2
```

```
           then n_bytes = cv_hex (args (2));
           else n_bytes = 16;

        if n_bytes < 1 | n_bytes > 4096
           then go to bad_byte_count;

        p = ptr (cv_hex (args (1)));

        call dump (p, n_bytes);
        go to loop;

cmd (6):                                              /* go */
        if entry_sw = BREAK_ENTRY
           then do;
                call write_vos_msg (
                        'Can''t ''go'' from a break-- only continue.');
                goto loop;
                end;
        if n_args > 0
           then if mcp = null ()
                   then do;
                        if n_args < 2
                           then goto missing_arg;
                                                      /* MUST have stack here */
                        label_var.code  = ptr (cv_hex (args (1)));
                        label_var.stack = ptr (cv_hex (args (2)));
                        goto defined_label_var;
                        end;
                   else do;
                        val = rel (ptr(cv_hex(args(1)) ));
                        if mc.faultno = ADDRESS_ERROR |
                           mc.faultno = PAGE_FAULT
                             then berr_mc.pc = val;
                             else mc.pc = val;
                        if n_args > 1
                             then mc.a (6) = cv_hex (args (2));
                                                      /* stack ptr */
                        end;
        return;

cmd (7):                                              /* help */
        do i = 1 to hbound (help_text, 1);
             call write_vos_msg (help_text (i));
        end;
        if user_commands_available                    /* (user-supplied help) */
           then do;
                call write_vos_msg (' ');
                call write_vos_msg ('User commands defined.');

                call user_commands_entry (n_args, args);
                end;
        go to loop;

cmd (8):                                              /* list */
        if s.break_info.n_breaks = 0
           then call write_vos_msg ('No breaks.');

           else do bno = 1 to s.break_info.n_breaks;
                call write_vos_msg ('Break set at ' ||
                          hexp (s.break_info.
                          break_pc (bno), 6));
                end;

        goto loop;

cmd (9):                                              /* regs */
        call ios_debug$regs (mcp);
        go to loop;

cmd (11):                                             /* set.c */
        element_size = 1;
        go to set_join;

cmd (12):                                             /* set.l */
```

```
     element_size = 4;
     go to set_join;

cmd (12):;                                          /* set */
cmd (13):                                           /* set.w */
     element_size = 2;
     go to set_join;

set_join:
     if n_args < 2
        then go to missing_arg;

     p = ptr (cv_hex (args (1)));

     do i = 2 to n_args;
          val = cv_hex (args (i));             /* just to validate */
     end;

     do i = 2 to n_args;
          val = cv_hex (args (i));
          go to set_action (element_size);

set_action (1):
          p -> based_char1 = byte (val);
          go to end_set_action;

set_action (2):
          p -> based_fb15 = val;
          go to end_set_action;

set_action (4):
          p -> based_fb31 = val;

end_set_action:
          p = addrel (p, element_size);
     end;

     go to loop;

cmd (14):                                           /* why */
     call print_why;
     go to loop;
%page;
/* ======================================================== */
ioa_debug$regs:
      entry (a_mcp);

dcl  1  reg_line,
        2  name1                  char (3),
        2  pad1                   char (1),
        2  data1                  char (8),
        2  pad2                   char (4),
        2  name2                  char (3),
        2  pad3                   char (1),
        2  data2                  char (8);

dcl  line_out                     char (28) varying;

     mcp = a_mcp;

     if mcp = null ()
        then do;
             call write_vos_msg ('No regs.');
             return;
             end;
        else call write_vos_msg ('Machine conditions at ' || hexp (mcp,
                  8));

     string (reg_line) = '';
     substr (reg_line.name1, 1, 1) = 'd';
     substr (reg_line.name2, 1, 1) = 'a';
     do i = 0 to 7;
          substr (reg_line.name1, 3, 1) = substr ('01234567', i + 1, 1);
         .substr (reg_line.name2, 3, 1) = substr (reg_line.name1, 3, 1);
```

```
            reg_line.data1 = hex (mc.c (i), 8);
            if i = 7
               then do;
                    reg_line.name2 = 'usp';
                    reg_line.data2 = hex (mc.usp, 8);
                    end;
               else reg_line.data2 = hex (mc.a (i), 8);
            call write_vos_msg (string (reg_line));
      end;

      reg_line.name1 = ' sr';
      reg_line.name2 = ' pc';
      if mc.faultno = ADDRESS_ERROR |
         mc.faultno = PAGE_FAULT
      then do;
            reg_line.data1 = hex (bin (berr_mc.status), 4);
            reg_line.data2 = hex (berr_mc.pc, 8);
            end;
      else do;
            reg_line.data1 = hex (bin (mc.status), 4);
            reg_line.data2 = hex (mc.pc, 8);
            end;
      call write_vos_msg (string (reg_line));

      if mc.faultno ^= ADDRESS_ERROR &
         mc.faultno ^= PAGE_FAULT
            then return;

      line_out = ' inst:      ' || hex(bin(berr_mc.instruction_reg), 4);
      call write_vos_msg (line_out);

      line_out = ' flt addr: ' || hex (berr_mc.access_address, 8);
      call write_vos_msg (line_out);

      line_out = ' fcn code: ' || hex(bin(berr_mc.reason.fc),1);

      if berr_mc.reason.read
            then line_out = ' RD ' || line_out;

      if berr_mc.reason.inst
            then line_out = ' INST ' || line_out;
      call write_vos_msg (line_out);

      return;
%page;
/* ========================================================== */
print_why:
      proc;

dcl  pc                         fixed bin (31);
dcl  msg                        char (64) var;
dcl  mem_ptr                    pointer;

dcl  core_image (0:261123)      char (1) based (mem_ptr);

dcl  bit16                      bit (16) based;

      go to print (entry_sw);

print (CALL_ENTRY):
      pc = rel (addrel (debug_sp, backup_sp) -> stack_frame.return_ptr);
      call write_vos_msg ('Called from ');
      go to pc_print;

print (CRASH_ENTRY):
      ;
print (MSG_ENTRY):
      call write_vos_msg (a_msg);
      return;

print (LEVEL7_ENTRY):
      msg = 'Level 7';
      go to pc_join;
```

```
print (BREAK_ENTRY):
     msg = 'Breakpoint';
     goto pc_join;

print (TRACE_ENTRY):
     return;

print (FAULT_ENTRY):

     msg = ('Fault type ' || hex ((mc.faultno), 2));

pc_join:
     if mc.faultno = ADDRESS_ERROR |
        mc.faultno = PAGE_FAULT
        then pc = berr_mc.pc;
        else pc = mc.pc;

pc_print:
     call write_vos_msg (msg || ' at ' ||
                hex( pc, 6));

     return;

end print_why;
%page;
/* ========================================================== */
/* dump a piece of memory */

dump:
     proc (a_p, a_n);

dcl  a_p                          ptr;
dcl  a_n                          fixed bin (15);

dcl  p                            ptr;
dcl  n                            fixed bin (15);
dcl  n_on_line                    fixed bin (15);
dcl  char1                        char (1);
dcl  dump_temp                    char (32);
dcl  i                            fixed bin (15);

dcl  1  dump_line,
        2  addr                   char (6),
        2  pad1                   char (2),
        2  part1                  char (8),
        2  pad2                   char (1),
        2  part2                  char (8),
        2  pad3                   char (1),
        2  part3                  char (8),
        2  pad4                   char (1),
        2  part4                  char (8),
        2  pad5                   char (2),
        2  bar1                   char (1),
        2  graphics               char (16),
        2  bar2                   char (1);

     p = a_p;
     n = a_n;
     do while (n > 0);
          n_on_line = min (16, n);
          string (dump_line) = '';
          dump_temp = '';
          dump_line.addr = hexp (p, 6);
          do i = 1 to n_on_line;
               char1 = p -> based_char1;
               substr (dump_temp, 2 * (i - 1) + 1, 2) = hex (rank (char1),
                         2);
               if rank (char1) < 32 | rank (char1) > 126
                  then char1 = '.';
               substr (dump_line.graphics, i, 1) = char1;
               p = addrel (p, 1);
          end;
          dump_line.part1 = substr (dump_temp, 1, 8);
```

```
        dump_line.part2 = substr (dump_temp, 9, 8);
        dump_line.part3 = substr (dump_temp, 17, 8);
        dump_line.part4 = substr (dump_temp, 25, 8);
        dump_line.bar1 = '|';
        dump_line.bar2 = '|';
        call write_vos_msg (string (dump_line));
        n = n - n_on_line;
    end;
    return;
end dump;
%page;
/* ========================================================== */
cv_hex:
    proc (a_text) returns (fixed bin (31));

dcl  a_text                    char (*) var;

dcl  val                       fixed bin (31);
dcl  code                      fixed bin (15);

    call unhex (a_text, val, code);
    if code ^= 0
    then do;
        call write_vos_msg ('Bad hex number ' || a_text);
        go to loop;
        end;
    return (val);
end cv_hex;
/* ========================================================== */
find_break:
    proc (p_pc_ptr) returns (fixed bin);

declare  p_pc_ptr               pointer;

declare  bno                    fixed bin;

    do bno = 1 to s.break_info.n_breaks
          while (s.break_info.break_pc (bno) ^= p_pc_ptr);
    end;

    if bno > s.break_info.n_breaks
       then return (-1);
       else return (bno);

end find_break;
/* ========================================================== */
copy_bytes: proc (a_src, a_dst, a_n);

dcl (a_src, a_dst)  ptr;
dcl a_n             fixed bin;

dcl schars (a_n) char based (a_src);
dcl dchars (a_n) char based (a_dst);

    dchars = schars;
    return;

end copy_bytes;
%page;
/* ========================================================== */
write_vos_msg:
    proc (a_msg);

dcl  a_msg                     char (*) var;

dcl  output_addr               ptr;
dcl  msg                       char (256) varying;
dcl  output_msg                char (80) var;

    msg = a_msg;
    if msg = ''
       then msg = ' ';

    ioa_mbxp = ptr(IOA_MAILBOX_PTR_ADDR) -> based_ptr;
```

```
     output_addr = addr(ioa_mbx.msg_out);

     do while (length (msg) > 0);

/* loop til previous msg picked up */

          output_msg = 'x';
          do while (length (output_msg) ^= 0);
               call copy_bytes (output_addr, addr (output_msg), 82);
               end;

/* write text of new message */

          if length (msg) <= maxlength (output_msg)
             then do;
                  output_msg = msg;
                  msg = '';
                  end;
             else do;
                  output_msg = substr (msg, 1,
                         maxlength (output_msg) - 1) || '\';
                  msg = substr (msg,
                         maxlength (output_msg));
                  end;

          call copy_bytes (addrel (addr (output_msg), 2),
                      addrel(output_addr, 2), length (output_msg));

/* write length of new message */

          call copy_bytes (addr (output_msg), output_addr, 2);

          end;
     return;
end write_vos_msg;
%page;
/* ============================================================= */
read_vos_msg:
     proc (a_msg);

dcl  a_msg                    char (*) var;

dcl  pl1bs                    fixed bin;     /* remove when addr(0) works */
dcl  input_addr               ptr;

     ioa_mbxp = ptr(IOA_MAILBOX_PTR_ADDR) -> based_ptr;
     input_addr = addr(ioa_mbx.msg_in);

     a_msg = '';
     do while (length (a_msg) = 0);
          call copy_bytes (input_addr, addr (a_msg), 82);
          end;

     pl1bs = 0;
     call copy_bytes (addr (pl1bs), input_addr, 2);

     return;
end read_vos_msg;

end ioa_debug;
```

```
/*   +++begin copyright+++ ******************************  */
/*                                                          */
/*   STRATUS CONFIDENTIAL INFORMATION: CLASS II            */
/*   COPYRIGHT (c) Stratus Computer, Inc. 1987              */
/*                                                          */
/*   This program contains confidential and proprietary    */
/*   information of Stratus Computer, Inc., and any        */
/*   reproduction, disclosure, or use in whole or in part  */
/*   is expressly prohibited, except as may be              */
/*   specifically authorized by prior written agreement or */
/*   permission of Stratus.                                 */
/*                                                          */
/*   +++end copyright+++ ********************************  */
```

```
/* Beginning of modification history */
/* Written by Tom Moser */
/* End of modification history */

s$invoke_deh: procedure (p_cond_no, p_fcb_ptr, p_name_ptr,
                    p_oncode, p_continue) options (support);


declare   p_cond_no        bin (15),       /* for deh */
          p_fcb_ptr        ptr,            /* for deh */
          p_name_ptr       ptr,            /* for deh */
          p_oncode         bin (15),       /* for deh */
          p_continue       bin (15);       /* for deh */

dcl  ioa_debug$crash            entry (char (*) varying);
dcl  hex                        entry (bin (31), bin (15)) returns (char (8)
                                var);

     do while ('1'b);
          call ioa_debug$crash('Default error handler invoked for condition '
               || hex((p_cond_no),4) || ' oncode = ' || hex((p_oncode), 4));
          end;

end;
/* ***begin copyright*** ********************************/
/*                                                     */
/* STRATUS CONFIDENTIAL INFORMATION                    */
/* COPYRIGHT (c) Stratus Computer, Inc. 1987           */
/*                                                     */
/* This  program  contains  confidential and proprietary */
/* information  of  Stratus Computer,  Inc.,   and   any */
/* reproduction,  disclosure, or use in whole or in part */
/* is    expressly    prohibited,    except    as   may   be */
/* specifically authorized by prior written agreement or */
/* permission of Stratus.                              */
/*                                                     */
/* ***end copyright*** **********************************/

/* This module contains device dependent code for the various adapter types */

/* Beginning of modification history */
/* Written 87-04-01 by Tom Moser */
/* Modified 87-04-30 by Tom Moser to support UCOMM level7 and add board type
     arg to set_prom write call */
/* End of modification history */

iop$ioa_enter_debug: proc (a_slot, a_code);

dcl  a_slot                     fixed bin (15);
dcl  a_type                     fixed bin (15);
dcl  a_code                     fixed bin (15);

dcl  based_char1                char(1) based;
dcl  begin                      fixed bin (31);
dcl  dummy1                     fixed bin (31);
dcl  dummy2                     fixed bin (15);
dcl  entry_type                 fixed bin (15);
dcl  bctr                       fixed bin (15);

/* %nolist:  %include 'product_names';      %l */ist;
/* Begin include file product_names.incl.pl1 */

/* Note:  To add a product name and index, certain rules should be      */
/*        observed.                                                     */
/*                                                                      */
/*   1) The disks are first, and should be left somewhat open-ended     */
/*      to grow, perhaps up to 64.  This is not a firm rule.            */
/*                                                                      */
/*   2) Comm has reserved several ranges of numbers based on a          */
/*      certain hex value as a base.  These are 60-6F (96-111)          */
/*      and A0-AF (160-175).  This rule was broken during the           */
/*      assignment of tape drive values.                                */
/*                                                                      */
```

```
/*   3) A range of numbers for IOP adapters has also been reserved.     */
/*      These may not match the hardware types presented by the cards.  */
/*      This range starts at 64 (40x).                                   */
/*                                                                       */
/*   4) Main boards (CPUs, MEMs, etc) are currently in the range        */
/*      240 (E0x) to 254 (FEx), and 192 (C0x) to 222 (DEx).              */
/*                                                                       */

%replace  D102_MODELX       by   1;  /* 60MB Disk Drive */
%replace  D101_MODELX       by   2;  /* 30MB Disk Drive */
%replace  D103_MODELX       by   3;  /* 143MB Disk Drive */
%replace  D105_MODELX       by   4;  /* 287 MB Disk Drive */
%replace  UNKN_MODELX       by   5;  /* Unknown Disk Model */
%replace  D900_MODELX       by   6;  /* 85MB Disk Drive */
%replace  D901_MODELX       by   7;  /* 165MB Disk Drive */
%replace  D902_MODELX       by   8;  /* 200MB Disk Drive */
%replace  D108_MODELX       by   9;  /* 448MB Disk Drive */
%replace  D202_MODELX       by  10;  /* 320MB IOP Disk Drive */
%replace  D118_MODELX       by  11;  /* 448MB Disk Drive - TUV */
%replace  D201_MODELX       by  12;  /* 151MB Disk Drive */
%replace  D203_MODELX       by  13;  /* 654MB IOP Disk Drive */
%replace  D205_MODELX       by  14;  /* 151MB IOP Disk Drive */
%replace  K101_MODELX       by  64;  /* ACOMM Async full modem Card */
%replace  K102_MODELX       by  65;  /* UCOMM Async/Sync Card */
%replace  K103_MODELX       by  66;  /* CCOMM Async/Clock Card */
%replace  K104_MODELX       by  67;  /* ENET LAN Card */
%replace  K105_MODELX       by  68;  /* IOP Disk Adapter */
%replace  K106_MODELX       by  69;  /* IOP SCSI Tape Adapter */
%replace  K107_MODELX       by  70;  /* IOP Pertec Tape Adapter */
%replace  K108_MODELX       by  71;  /* PK Terminator */
%replace  K109_MODELX       by  72;  /* UCOMM 423 Async/Sync Card */
%replace  K110_MODELX       by  73;  /* ACOMMP IBM printer card */
%replace  K111_MODELX       by  74;  /* ACOMM async/sync null modem Card */
%replace  C110N_MODELX      by  96;  /* HS Async Null Modem */
%replace  C110F_MODELX      by  97;  /* HS Async Full Modem */
%replace  IBM_1203_MODELX   by  98;  /* IBM Printer Interface */
%replace  T103_OBS_MODELX   by 100;  /* Tape Drive 1600 bpi */
%replace  T103_MODELX       by 101;  /* Tape Drive 1600/3200 */
%replace  T201_MODELX       by 102;  /* Tape Drive 1600/6250 */
%replace  T251_MODELX       by 103;  /* Tape Drive 1600/3200/6250 */
%replace  C103_MODELX       by 126;  /* Null Modem Channel */
%replace  C102_MODELX       by 127;  /* Full Modem Channel */
%replace  C101_MODELX       by 128;  /* Comm Controller */
%replace  C106_MODELX       by 129;  /* Modem Non Dial-Up */
%replace  C108_MODELX       by 130;  /* Modem Dial-Up */
%replace  C111_MODELX       by 131;  /* Remote Support Modem */
%replace  C107_MODELX       by 160;  /* HS Sync I */
%replace  C109_MODELX       by 161;  /* HS Sync II */
%replace  C104_MODELX       by 190;  /* Sync Line Adapter */
%replace  C104A_MODELX      by 191;  /* Alt Sync Line Adapter */
%replace  G200_MODELX       by 192;  /* Fresco CPU */
%replace  K100_MODELX       by 193;  /* IOP */
%replace  G424_MODELX       by 194;  /* Spitfire CPU */
%replace  M408_MODELX       by 195;  /* Wallaby/8mb Memory Ctrlr/array Board */
%replace  M432_MODELX       by 196;  /* Wallaby/32mb Memory Ctrlr/array Board */
%replace  D214_MODELX       by 221;  /* Removable Disk Adapter */
%replace  D116_MODELX       by 222;  /* 448MB Disk Director (TUV) */
%replace  C105_MODELX       by 223;  /* Calendar Clock */
%replace  P106_MODELX       by 224;  /* CPU Board */
%replace  M100_MODELX       by 225;  /* Memory Controller Board */
%replace  M102_MODELX       by 226;  /* 2MB Memory Array Board */
%replace  C100_MODELX       by 227;  /* Comm Controller */
%replace  D100_MODELX       by 228;  /* Disk Controller */
%replace  T100_MODELX       by 229;  /* Tape Controller */
%replace  I100_MODELX       by 230;  /* Link Controller */
%replace  U100_MODELX       by 231;  /* PSI Board */
%replace  D104_MODELX       by 232;  /* Disk Controller */
%replace  D004_MODELX       by 233;  /* Disk SMD Adapter */
%replace  G601_MODELX       by 234;  /* Processor Controller */
%replace  G602_MODELX       by 235;  /* CPU/SAP Board */
%replace  G400_MODELX       by 236;  /* Zink Central Processor */
%replace  T102_MODELX       by 237;  /* 1600/3200 Tape Controller */
%replace  D107_MODELX       by 238;  /* 448MB Disk Controller */
```

```
%replace  D106_MODELX        by 239;  /* 448MB Disk Director */
%replace  C200_MODELX        by 240;  /* Comm Controller */
%replace  T200_MODELX        by 241;  /* 6250 Tape Controller */
%replace  M200_MODELX        by 242;  /* Bandit 16-bit Controller */
%replace  M210_MODELX        by 243;  /* Bandit 8MB Memory Array Board */
%replace  M300_MODELX        by 244;  /* Dinkum 64-bit Controller */
%replace  T301_MODELX        by 245;  /* Quarter inch SCSI  tape drive */
%replace  M310_MODELX        by 246;  /* 16MB Memory Array Board */
%replace  M320_MODELX        by 247;  /* 32MB Memory Array Board */
%replace  M316_MODELX        by 248;  /* 8MB Memory Array Board */
%replace  D110_MODELX        by 249;  /* Disk Controller */
%replace  D114_MODELX        by 250;  /* Disk Controller */
%replace  D117_MODELX        by 251;  /* Disk Controller */
%replace  M214_MODELX        by 252;  /* Bandit 4MB Memory Array Board */
%replace  G610_MODELX        by 253;  /* Hydra Controller/CPU/SAP Board */
%replace  T250_MODELX        by 254;  /* 1600/3200/6250 Tape Controller */
%replace  NONE_MODELX        by 255;  /* No Configured Channel */

%replace  MAX_DEV            by 255;

%replace  MIN_IOA_MODELX   by  64;
%replace  MAX_IOA_MODELX   by  74;

declare   s$hardware_names (0:255) char (6) var ext static;
declare   s$product_models (0:255) char (6) var ext static;
declare   s$product_names (0:255) char (32) var ext static;

/* End include file products_names.incl.pl1 */
/* %nolist;  %include 'iop_utility_calls'; %list; */
/* Begin include file . . . . . iop_utility_calls.incl.pl1 */

dcl  iop$allocate entry (fixed bin (31), char (2) aligned) returns (ptr);
dcl  iop$free entry (ptr, char (2) aligned);

dcl  iop$get_level entry  returns (fixed bin (15));
dcl  iop$set_level entry (fixed bin (15));

dcl  iop$syserr_code entry (char (80) varying, fixed bin (15), fixed bin(15));
dcl  iop$panic_syserr entry (char (80) varying);

dcl  iop$read_time  entry returns (fixed bin (31));
dcl  iop$delta_time entry (fixed bin (31)) returns (fixed bin (31));

dcl  bin_to_char     entry (fixed bin (31)) returns (character (13) varying);
dcl  char_to_bin     entry (character (13) varying) returns (fixed bin (31));

dcl  iop$set_slot_priority entry (fixed bin (15), fixed bin (15),
                                  fixed bin (15));

/* End include file . . . . . iop_utility_calls.incl.pl1 */
/* %nolist;  %include 'iop_error_codes';   %list; */
/* %nolist;  %include 'iop_addr_routines'; %list; */
/* Begin include file ... iop_addr_routines ... */

iop$ioa_addr: procedure (a_ioa_no, a_local_ptr) returns (ptr) inline;

dcl a_ioa_no         fixed bin (15);
dcl a_local_ptr      ptr;

dcl iop$base_vectors (0:13) fixed bin (31) external static;
dcl addrel builtin;


/* DEBUG ...

dcl  iop$debug_crash entry (char(80) var);

     if a_ioa_no < lbound(iop$base_vectors,1) |
        a_ioa_no < hbound(iop$base_vectors,1)
         then call iop$debug_crash('ILLEGAL slot no in call to iop$ioa_addr.');

   ... END DEBUG */

     return (addrel(a_local_ptr, iop$base_vectors(a_ioa_no)));
```

```
end iop$ioa_addr;
iop$ioa_abs_addr: procedure (a_local_ptr) returns (ptr) inline;

dcl a_local_ptr      ptr;

/* %include 'iop_constants'; */
/* Begin include file . . . . . iop_constants.incl.pl1 */

%replace IOA_CLOCK_CHANNEL_NO by 2;
%replace TERM_SLOT_1          by 14;
%replace TERM_SLOT_2          by 15;

%replace MAX_IOP_INTERRUPT_LEVEL by 8;
%replace MAX_IOP_BACKGROUND_PRIORITY by 8;

%replace MASK_ALL_INTS by 7;
%replace ALLOW_TIMER_INTERRUPTS by 5;
%replace ALLOW_IOA_INTERRUPTS by 4;

%replace JIFFIES_PER_SECOND by 65536;

%replace ES_ENTITY by 0;
%replace ES_CHANNEL by 0;
%replace NON_ENTITY by -1;
%replace NONE by -1;

%replace START_ADAPT_MEM by 12582912;   /* 12M or C00000x */

/* End include file . . . . . iop_constants.incl.pl1 */


dcl addrel builtin;

     return (addrel(a_local_ptr, START_ADAPT_MEM));

end iop$ioa_abs_addr;

/* End include file ... iop_addr_routines ... */

dcl  iop$select_adapter       entry (fixed bin (15), fixed bin (15));
dcl  iop$get_board_type       entry returns (fixed bin (15));
%replace  DEBUGGER_TYPE       by 1;
%replace  PROM_WRITE_TYPE     by 2;

%replace  UCOMM_LEVEL7_BYTE by 3670021;
%replace  UCOMM_ENTER_DEBUG_VALUE by 4;
%replace  UCOMM_ENTER_DEBUG_VALUE_CLEAR by 132;

%replace  ENETPC_LEVEL7_BYTE by 3670017;
%replace  ENETPC_ENTER_DEBUG_VALUE by 131;
%replace  ENETPC_ENTER_DEBUG_VALUE_CLEAR by 3;

     entry_type = DEBUGGER_TYPE;
     goto join;

iop$set_prom_write: entry (a_slot, a_type, a_code);

     entry_type = PROM_WRITE_TYPE;
     bdtp = a_type;
     goto ENTRY_SELECT(entry_type);

join:

     on error
     begin;
          a_code = oncode();
          goto dev_dep_error;
          end;

     call iop$select_adapter( a_slot, a_code);
     if a_code ^= 0
          then return;

     bdtp = iop$get_board_type();
```

```
     goto ENTRY_SELECT(entry_type);

ENTRY_SELECT(DEBUGGER_TYPE):
     goto ENTER_DEBUGGER(bdtp);

ENTER_DEBUGGER(*):
     a_code = e$iop_unsupported_ioa;
     return;

ENTER_DEBUGGER(K102_MODELX):: /* UCOMM 422 */
ENTER_DEBUGGER(K109_MODELX):  /* UCOMM 423 */

     iop$ioa_abs_addr(ptr(UCOMM_LEVEL7_BYTE)) -> based_char1 =
          byte(UCOMM_ENTER_DEBUG_VALUE);

     begin = iop$read_time ();
     do while (iop$delta_time (begin) < 3000);
       dummy1 = 0;
       do dummy2 = 1 to 100;
            dummy1 = dummy1 + dummy2;
            end;
       end;

     iop$ioa_abs_addr(ptr(UCOMM_LEVEL7_BYTE)) -> based_char1 =
          byte(UCOMM_ENTER_DEBUG_VALUE_CLEAR);
     a_code = 0;
     return;

ENTER_DEBUGGER(K104_MODELX):  /* ENET PC */

     iop$ioa_abs_addr(ptr(ENETPC_LEVEL7_BYTE)) -> based_char1 =
          byte(ENETPC_ENTER_DEBUG_VALUE);

     begin = iop$read_time ();
     do while (iop$delta_time (begin) < 3000);
       dummy1 = 0;
       do dummy2 = 1 to 100;
            dummy1 = dummy1 + dummy2;
            end;
       end;

     iop$ioa_abs_addr(ptr(ENETPC_LEVEL7_BYTE)) -> based_char1 =
          byte(ENETPC_ENTER_DEBUG_VALUE_CLEAR);

     a_code = 0;
     return;

%page;
ENTRY_TYPE(PROM_WRITE_TYPE):

     goto SET_PROM_WRITE(bdtp);

SET_PROM_WRITE(1):: /* pl1 does not handle this otherwise */
SET_PROM_WRITE(*):
     a_code = e$iop_unsupported_ioa;

dev_dep_error:
     return;

end iop$ioa_enter_debug;
%page;
/*  ***begin copyright*** ********************************
/*
/*  STRATUS CONFIDENTIAL INFORMATION: CLASS II
/*  COPYRIGHT (c) Stratus Computer, Inc. 1987
/*
/*  This  program  contains  confidential and proprietary
/*  information  of  Stratus Computer,  Inc.,   and   any
/*  reproduction,  disclosure, or use in whole or in part
/*  is   expressly   prohibited,   except   as   may   be
/*  specifically authorized by prior written agreement or
/*  permission of Stratus.
/*
/*  ***end copyright*** **********************************
```

```
/*

     title     'GSMDA (GIOC Storage Module Disk Adapter) Boot Rom'

equ  board_promware_revision, 3              /* Promware revision number
/*
/* CREATED: 11-Feb-86 13:58
/*
/*   This is the rom code for the GIOC Storage Module Disk
/*   adapter/controller (SMAC), which runs in conjunction with
/*   the General Purpose I/O Controller (GIOC). The intent of
/*   this rom and code is five-fold: First, it provides
/*   initialization/setup of the board in preparation for
/*   logical connection to the GIOC; Second, it provides a
/*   library of test routines already present on the board for
/*   exercising and verifying the basic operation of all major
/*   components; Third, it provides the software complement to
/*   the hardware facility for down- loading and starting the
/*   main, operational disk management code for the board;
/*   Fourth, it provides the bootstrap utility for loading VOS
/*   or RPM from a disk prior to commencement of system
/*   activities; and Fifth, it provices for standard
/*   identification of the board by use of a reserved 'ID Prom'
/*   area located at the highest address range of the EEPROM.
/*
/*  Do a Ctrl/Z here to set comment margins  >
/*..................col-46..................>
/*   Edit history:
/*
/* Beginning of modification history
/*
/* Modified 87-06-01 by Dick Richelo to allow soft vector to panic dump list.
/*
/*   x04
/*   27-Feb-86 rvr  x04:  Corrected startup sequence to initialize stack
/*                        and static areas BEFORE running the disk tests
/*                        which use them...
/*
/*
/*   x03
/*   25-Feb-86 rvr  x03:  Added sector search routine to exercise disk
/*                        control lines.
/*
/*   x02
/*   21-Feb-86 rvr  x02:  Added disk seek routine to exercise disk
/*                        control lines. Added disk seek routine to
/*                        exercise disk control lines.
/*
/*   x01
/*   11-Feb-86 rvr  x01:  Added static & stack memory test from GLAN
/*                        rom.
/*
/*   End of modification history
/*   Started : 11-Feb-86
/*   by :  Dick Richelo
/*

extdef     gioc_disk_rom_code /* Entry point stuff.
main       gioc_disk_rom_code
model      mc68000            /* No vector base register, etc.

     /* Define symbolic constants:
     incl      'adapter_bit_defs',  nolist   /* File #2
     incl      'ioa_disk_hw_defs'           /* File #3
     incl      'ioa_disk_sw_defs'           /* File #4
     incl      'iop_adapter_types'           /* File #5

     equ       microcode_rev, 0
     equ       sp, a7          /* Assign mnemonic for our stack pointer

     use       'code'
     org       0               /* Start program counter at zero for binder...

gioc_disk_rom_code:     priv      on   /* *** Program entry point ***
```

```
/* The following gets us a label at the beginning of the
/* static region, for determining the size of that region later.

     use        'static'
static_origin:
     ds.l       0
     use        'code'
     eject                                  /* File #1 is this current file

     equ        decimal_prom_base, 2097152
     equ        eb, eprom_base

          title     'GIOC Adapter Vector and ID PROM definitions'

start_up_vectors:   /* Following are the boot-time vector area contents
start:              /* (this is also the start of rom code space)
     bra.w      jump_0_catcher              /* Catch inadvertent jumps through 0
     dc.l       reset                       /* Start here, while rom is still low.
                                            /* This sets PC past vector area.
     incl       'ioa_disk_vector_table'     /* File #5

     incl       'board_id_structure'        /* Get the ID block structure and size

id_prom_vector:
     dc.l       eb+gioc_disk_prom_size-board_id.length /* --> ID PROM section
commailbox_vector:
     dc.l       gioc_commailbox             /* --> GIOC<-->adapter comm mailbox
eeprom_reserved_ram_vector:
     dc.l       scratch_area_top            /* EEPROM needs safe mem from here up
pbus_visible_memory_base:
     dc.l       local_mem_base              /* Beginning of P-bus visible ram
eeprom_actual_size:
     dc.l       gioc_disk_prom_size         /* Size of entire EEPROM in bytes
board_sw_rev_num:
     dc.l       board_promware_revision     /* Promware revision number
firmware_entry_vector:
     dc.l       firmware_call_entry         /* Call here to enter prom from ram prg
firmware_mbx_call_vector:
     dc.l       firmware_mbx_call_entry     /* Call here to execute MBX command
ioa$_panic_dump_list_vector:
     dc.l       ioa$_panic_dump_list        /* Up to 16 page #s for crash dumping
ioa$_panic_dump_call_vector:
     dc.l       ioa$_panic_dump_call_ptr /* Pointer for crash dump register grab


          title     'SMAC Init Code'

     /*   Start EEPROM code

equ  m68k_no_interrupts,        m68k_sr.supv!m68k_intlvl_7
equ  board_id_version,                  1           /* Dummy value for now     (w)
equ  board_type,                     DISK           /* Disk adapter board      (w)
equ  board_id_flags,                    0           /* Board has NO self test  (w)
equ  board_id_model,                    0           /* Dummy value for now     (l)
equ  board_id_serial_number,            0           /* Dummy value for now     (l)
equ  board_id_revision,                 2           /* Dummy value for now     (w)
equ  board_id_art_work_rev,             0           /* Dummy value for now     (w)
equ  board_id_min_gioc_rev,             0           /* Dummy value for now     (w)
equ  board_id_num_serviced,             0           /* Dummy value for now     (w)
equ  board_id_history_service_date,     0           /* Dummy value for now     (l)
equ  board_id_history_service_code,     0           /* Dummy value for now     (w)
equ  board_id_checksum,                 0           /* Dummy value for now     (w)

          use       'code'
reset:
     /*   Ensure Supervisor mode and no interrupts
     ori        =m68k_no_interrupts, sr
     /* Init registers at boot time
     move.l     =error,                 d0   /* Address of callable error hdlr
     move.l     =error_end,             d1   /* Address of post-error-hdlr code
     move.l     =error_regsave_area,    d2   /* Address of register save area
     move.l     =gioc_commailbox,       d3   /* Address of IOP<-->IOA mailbox
     move.l     =static_area_base,      d4   /* Address of static data storage
```

```
     move.l     =scratch_area_top,          d5    /* Address of stack low limit
     move.l     #bdcsr,                     d7    /* Copy the init time CSRs for
     movea.l    d3,                         a4    /*  later analysis
     movea.l    d4,                         a5    /* Start static area in low mem
     movea.l    =rom_stack_base,            a6    /* Init the frame pointer
     move.l     a6, usp
     movea.l    a6, sp                            /* Init the stack

     jmp        #high_start                 /* Change PC to high rom addresses

     title      'SMAC preliminary static memory test'

     /* Test the static area before storing data in it...

static_test_pattern_list:     /* NOTE: These patterns are read last-to-first
     dc.l       '01010101010101010101010101010101'b /* Alternating 1's & 0's
     dc.l       '10101010101010101010101010101010'b /* Alternate of above pat
     dc.l       '11111111111111111111111111111111'b /* All 1's pattern
     dc.l       '00000000000000000000000000000000'b /* All 0's pattern
static_test_pattern_list_end:

     use        'static'
prom_saved_bad_mem_addr:
     dc.l       0                       /* Store failing addr here if write enabled
equ  stpls, static_test_pattern_list_end-static_test_pattern_list
equ  static_test_pattern_list_size, stpls
     use        'code'

     /*   We'll be running from high memory now...
high_start:
     move.b     =bdcsr0.ctl.set_prom_high, bdcsr0  /* Make the prom go high
                                            /* and allow ram to answer to low mem

equ  reserved_stack_space, 64*4             /* Reserve 64 longwords for the stack
equ  reserved_stack_low_addr, ram_stack_top-reserved_stack_space
equ  adj_reserved_stack_low_addr, reserved_stack_low_addr&0FFFFFFFCx

     /* Test all patterns
     movea.l    =adj_reserved_stack_low_addr, a0   /* Point into work area
     lea        static_test_pattern_list, a2       /* --> to first pattern word
     move.l     =(static_test_pattern_list_size/4)-1, d5 /* # patterns to try
$L01:
     asl.l      =2, d5                      /* Make a word offset
     move.l     0(a2,d5.L), d4              /* Get next pattern word
     asr.l      =2, d5                      /* Now back to pattern count
     /* # longwords to check
     move.l     =(working_ram_top-adj_reserved_stack_low_addr)/4, d2
     bra.b      $j01                        /* Pre-decrement the loop
$L02:     /* Write zeroes into each static location
     move.l     d2, d3                      /* Make a longword index
     asl.l      =2, d3                      /*  into the static memory area
$loop_on_error:
     move.l     d4, 0(a0, d3.L)             /* Write the pattern to next location
     move.l     0(a0, d3.L), d1             /* Get it back
     cmp.l      d4, d1                      /*  -- was it what we wrote?
     beq.b      $j01                        /* Yes, so try another one...
     move.l     0(a0, d3.L), d1             /* Get it back again
     cmp.l      d4, d1                      /*  -- was it what we wrote this time?
     beq.b      $j01                        /* Yes, so try another one...
     bra.b      $loop_on_error              /* So just loop on failing addr for now
$j01:
     dbra       d2, $L02                    /* Else check the next word
     dbra       d5, $L01                    /* Try next pattern until done...

equ  reserved_work_bytes, region_size-adj_reserved_stack_low_addr

     /* Straight data patterns worked -- now try addrs=data, byte-wise
static_data_eq_addr_test:
     movea.l    =adj_reserved_stack_low_addr, a0   /* Point into work area
$L01:
     move.l     =reserved_work_bytes, d2 /* # bytes to check
     bra.b      $j01                        /* Pre-decrement the loop
$L02:     /* Write data=addrs into each static or stack byte
```

```
     move.l     a0, d0                    /* Get addr for comparison
     move.b     d0, (a0)                  /* Low byte of addr becomes test data
     sub.b      (a0)+, d0                 /* Get data back now -- did it match?
     beq.b      $j01                      /* Yes, so try another one...
     move.b     -(a0), d0                 /* Reset failing addr pointer
     bra.b      $L02                      /* Just loop on failing addr for now
$j01:
     dbra       d2, $L02                  /* Else check the next byte


     title      'SMAC further INIT code'

     use  'static'
local_misc_bits:    ds.l      1
     use  'code'

     /* Static area tested -- now set it up...
     move.l     =static_area, d0          /* Use local memory for static stuff
     movea.l    d0, static_area_base_reg  /* Static area references are now valid
     movea.l    =ram_stack_top, sp        /* Start stack right below static area
     move.l     sp, usp                   /* Do the user stack pointer, also
     movea.l    sp, a6                    /* Frame pointer -- now we can
                                          /*  do framed calls ('C' too!)
     movea.l    =boot_time_saved_bdcsr, a4 /* Board csr gets saved here...
     move.l     d7, (a4)                  /* Board CSR1 saved at boot time
                                          /* (Also saves CSR2 from boot time)
     move.l     =dram_vector_base, pseudo_vbr /* Load fake VBR if using MC6800x

     move.b     =bdcsr0.ctl.set_prom_high, bdcsr0

     jsr        setup_vectors             /* Write the vector area in low sram
     jsr        zero_main_mem             /* Clear out M68K working ram
     bra.b      $skip_mailbox_init
     jsr        init_GIOC_mailbox         /* Load up initial mailbox for GIOC
$skip_mailbox_init:
     move.b     =0, bdcsr_clr_red_light   /* Clear the light for debugging
     bra.b      $skip_functional_tests
     jsr        functional_tests          /* Test what we can in time left
$skip_functional_tests:
/*    bra.b      $skip_start_disk_driver
     jsr        start_disk_driver         /* Now just go start the onboard driver
$skip_start_disk_driver:

wait_for_intr_loop:       /*   Remainder of rom code is just service stuff...
     nop
     jsr        wait_for_interrupt        /* Somebody will call us for service
     bra        wait_for_intr_loop        /* Just service everything until the
                                          /*  ram has been loaded and jammed


     /* Reset logic which should be quiesced at test completion
reset_IO:
/*    jsr        reset_IO_stop_disk        /* Stop disk from accessing the bus
     rts                                  /* That's all for now

     /* Call here to execute command already in the MBX, then return to caller
firmware_mbx_call_entry:
     rts                                  /* we don't do this thing yet...

     /* Call here to enter prom from ram prg
firmware_call_entry:
     move.l     sp, =junk_long+static_area_base /* Save caller's stack pointer
     movea.l    =ram_stack_top, sp        /* Start stack right below static area
     /*   Ensure Supervisor mode and no interrupts
     ori        =m68k_no_interrupts, sr   /* Force supervisor and no interrupts
     push.l     =junk_long+static_area_base /* Save caller's stack ptr on stack
     push.l     d0-d7;a0-a6;              /* Save all of caller's stuff

     /* Init registers at boot time
     move.l     =error,                d0   /* Move this value for 'scoping
     move.l     =error_end,            d1   /* Move this value for 'scoping
     move.l     =error_regsave_area,   d2   /* Move this value for 'scoping
     move.l     =gioc_commailbox,      d3   /* Move this value for 'scoping
```

```
        move.l     =static_area_base,       d4    /* Move this value for 'scoping
        move.l     =scratch_area_top,       d5    /* Move this value for 'scoping
        move.l     #bdcsr1&-2,              d7    /* Copy the init time CSRs for
        movea.l    d5,                      a4    /*  later analysis
        movea.l    d4,                      a5    /* Start static area in low mem

        move.l     sp, usp                  /* Do the user stack pointer now
        movea.l    sp, a6                   /* Frame pointer -- now we can
                                            /*  do framed calls ('C' too!)

        move.l     =static_area, d0         /* Use RAM
        movea.l    d0, static_area_base_reg /* Static area references are now valid

        movea.l    =boot_time_saved_bdcsr, a4 /* Board csr gets saved here...
        move.l     d7, (a4)                 /* Board CSR1 saved at boot time
                                            /* (Also saves CSR2 from boot time)
        move.l     =dram_vector_base, pseudo_vbr /* Load fake VBR if using MC6800x

        /* Now we're ready to execute ROM code -- For now, though, just return...

        pop.l      d0-d7;a0-a6;             /* Restore all of caller except stack
        pop.l      sp                       /* Restore caller's stack pointer
        rts                                 /* And then just go back to caller


        title      'SMAC Main -- New Dispatcher Test Dispatch Table (TDT)'

             dc.w      tdt.f.sb!tdt.f.us!tdt.f.rp!tdt.f.ro!tdt.f.le!tdt.f.nl

        /* Command list processor entry control flags
equ     tdt.ctl_f.null,            0      /* No special cmd list handling req'd
equ     tdt.ctl_f.internal,      word_bit_00    /* Internal command only

adapter_unique_cmd_table:

             /* Test control register bits
             dc.w      SMAC_control_reg_test_0  /* Command value for this test
             dc.w      tdt.ctl_f.null           /* No special command list ops
             dc.l      1                        /* Estimated test runtime in mSec
             dc.w      tdt.f.us!tdt.f.nl        /* Flags: not loopable
             dc.w      0                        /* Required previous test: none
             dc.l      control_reg_test_0           /* Test entry point
             dc.l      SMAC_control_reg_test_0.textptr /* --> Textual description

adapter_cmd_tbl_entry_offset:

              /* Test status register bits
             dc.w      SMAC_status_reg_test_0   /* Command value for this test
             dc.w      tdt.ctl_f.null           /* No special command list ops
             dc.l      1                        /* Estimated test runtime in mSec
             dc.w      tdt.f.us!tdt.f.nl        /* Flags: not loopable
             dc.w      0                        /* Required previous test: none
             dc.l      status_reg_test_0        /* Test entry point
             dc.l      SMAC_status_reg_test_0.textptr /* --> Textual description

             /* Test TIMER counters and zero timer
             dc.w      SMAC_timer_test_0        /* Command value for this test
             dc.w      tdt.ctl_f.null           /* No special command list ops
             dc.l      1                        /* Estimated test runtime in mSec
             dc.w      tdt.f.us!tdt.f.nl        /* Flags: not loopable
             dc.w      0                        /* Required previous test: none
             dc.l      Gate_Array_timer_test_0  /* Test entry point
             dc.l      SMAC_timer_test_0.textptr /* --> Text description of above

             /* Test TIMER interrupt logic & ctrs
             dc.w      SMAC_timer_test_1        /* Command value for this test
             dc.w      tdt.ctl_f.null           /* No special command list ops
             dc.l      1                        /* Estimated test runtime in mSec
             dc.w      tdt.f.us!tdt.f.nl        /* Flags: not loopable
             dc.w      0                        /* Required previous test: none
             dc.l      Gate_Array_timer_test_1  /* Test entry point
             dc.l      SMAC_timer_test_1.textptr /* --> Text description of above
```

```
/* Test TIMER interrupt mask logic
dc.w      SMAC_timer_test_2           /* Command value for this test
dc.w      tdt.ctl_f.null              /* No special command list ops
dc.l      1                           /* Estimated test runtime in mSec
dc.w      tdt.f.us!tdt.f.nl           /* Flags: not loopable
dc.w      0                           /* Required previous test: none
dc.l      Gate_Array_timer_test_2     /* Test entry point
dc.l      SMAC_timer_test_2.textptr /* --> Text description of above

/* Test all 0's pattern on main mem
dc.w      SMAC_memory_test_0          /* Command value for this test
dc.w      tdt.ctl_f.null              /* No special command list ops
dc.l      1                           /* Estimated test runtime in mSec
dc.w      tdt.f.us!tdt.f.nl           /* Flags: not loopable
dc.w      0                           /* Required previous test: none
dc.l      memory_test_0               /* Test entry point
dc.l      SMAC_memory_test_0.textptr /* --> Text description of above

/* Test all 1's pattern on main mem
dc.w      SMAC_memory_test_1          /* Command value for this test
dc.w      tdt.ctl_f.null              /* No special command list ops
dc.l      1                           /* Estimated test runtime in mSec
dc.w      tdt.f.us!tdt.f.nl           /* Flags: not loopable
dc.w      0                           /* Required previous test: none
dc.l      memory_test_1               /* Test entry point
dc.l      SMAC_memory_test_1.textptr /* --> Text description of above

/* Test rotating bit pat on main mem
dc.w      SMAC_memory_test_2          /* Command value for this test
dc.w      tdt.ctl_f.null              /* No special command list ops
dc.l      1                           /* Estimated test runtime in mSec
dc.w      tdt.f.us!tdt.f.nl           /* Flags: not loopable
dc.w      0                           /* Required previous test: none
dc.l      memory_test_2               /* Test entry point
dc.l      SMAC_memory_test_2.textptr /* --> Text description of above
/* Test main mem data=addr
dc.w      SMAC_memory_test_3          /* Command value for this test
dc.w      tdt.ctl_f.null              /* No special command list ops
dc.l      1                           /* Estimated test runtime in mSec
dc.w      tdt.f.us!tdt.f.nl           /* Flags: not loopable
dc.w      0                           /* Required previous test: none
dc.l      memory_test_3               /* Test entry point
dc.l      SMAC_memory_test_3.textptr /* --> Text description of above

/* Try to catch interrupts
dc.w      SMAC_restore_rom_vectors /* Command value for this test
dc.w      tdt.ctl_f.internal          /* Internal command only!!
dc.l      1                           /* Estimated test runtime in mSec
dc.w      tdt.f.nl                    /* Flags: not loopable
dc.w      0                           /* Required previous test: none
dc.l      restore_rom_vectors         /* Test entry point
dc.l      0                           /* No Text Required for this test

/* Stop the DISK
dc.w      SMAC_disk_test_0           /* Command value for this test
dc.w      tdt.ctl_f.null              /* No special command list ops
dc.l      1                           /* Estimated test runtime in mSec
dc.w      tdt.f.nl                    /* Flags: not loopable
dc.w      0                           /* Required previous test: none
dc.l      disk_test_0                /* Test entry point
dc.l      SMAC_disk_test_0.textptr /* --> Text description of above

/* Init the DISK
dc.w      SMAC_disk_test_1           /* Command value for this test
dc.w      tdt.ctl_f.null              /* No special command list ops
dc.l      1                           /* Estimated test runtime in mSec
dc.w      tdt.f.rr!tdt.f.nl           /* Flags: not loopable, needs prev
dc.w      SMAC_disk_test_0           /* Required previous test
dc.l      disk_test_1                /* Test entry point
dc.l      SMAC_disk_test_1.textptr /* --> Text description of above

adapter_unique_cmd_table_end:
        ds.l      0
```

```
disk_test_0:          /* Test entry point
disk_test_1:          /* Test entry point
     rts

     /* Adapter-Unique Command Table general constants
/*equ  ntdt_entry_size,    ntdt_entry_offset-new_test_dispatch_table
/*equ  ntdt_size, new_test_dispatch_table_end-new_test_dispatch_table
/*equ  new_test_dispatch_table_size, ntdt_size
/*equ  ntdt_ent_cnt, new_test_dispatch_table_size/new_IOA_cmd_tbl_ent_size
/*equ  new_test_dispatch_tbl_ent_cnt, ntdt_ent_cnt

     /* Test Command Number values -- assigned arbitrarily, in ascending order
equ  SMAC_control_reg_test_0,        1 /* Command value for this test
equ  SMAC_status_reg_test_0,         2 /* Command value for this test
equ  SMAC_memory_test_0,             3 /* Command value for this test
equ  SMAC_memory_test_1,             4 /* Command value for this test
equ  SMAC_memory_test_2,             5 /* Command value for this test
equ  SMAC_memory_test_3,             6 /* Command value for this test
equ  SMAC_restore_rom_vectors,       7 /* Command value for this test
equ  SMAC_timer_test_0,              8 /* Command value for this test
equ  SMAC_timer_test_1,              9 /* Command value for this test
equ  SMAC_timer_test_2,             10 /* Command value for this test
equ  SMAC_disk_setup,               11 /* Command value for this test
equ  SMAC_disk_test_0,              12 /* Command value for this test
equ  SMAC_disk_test_1,              13 /* Command value for this test

SMAC_control_reg_test_0.textptr:   charv   'Control register bits & function'
SMAC_status_reg_test_0.textptr:    charv   'Status register bits & function'
SMAC_timer_test_0.textptr:         charv   'TIMER zero timer & test counters'
SMAC_timer_test_1.textptr:         charv   'TIMER interrupt logic & counters'
SMAC_timer_test_2.textptr:         charv   'TIMER interrupt mask logic'
SMAC_memory_test_0.textptr:        charv   'All 0''s pattern on main mem'
SMAC_memory_test_1.textptr:        charv   'Test all 1''s pattern on main mem'
SMAC_memory_test_2.textptr:        charv   'Rotating bit pat on main mem'
SMAC_memory_test_3.textptr:        charv   'Main memory data=addrs'
SMAC_disk_setup.textptr:           charv   'Setup DISK for transmit/receive'
SMAC_disk_test_0.textptr:          charv   'Stop the DISK'
SMAC_disk_test_1.textptr:          charv   'Init the DISK'

     use       'test_dispatch_table', dummy  /* Define some offsets from A1, so
     using     'test_dispatch_table', a1     /*  they can be easily referenced.

tdt.cmd_num:        ds.w      1     /* Command number for this test
tdt.flags:          ds.w      1     /* Test info flags as follows:

equ  tdt.flags.sets_brk,      word_bit_00      /* 1 = This test sets BROKEN
equ  tdt.flags.upd_sts,       word_bit_01      /* 1 = This test can update
                                               /*  status while running
equ  tdt.flags.req_prev,      word_bit_02      /* 1 = This test requires
                                               /*  setup by a previous
                                               /*  test or tests
equ  tdt.flags.req_opr,       word_bit_03      /* 1 = This test requires
                                               /*  intervention by an
                                               /*  operator to execute
equ  tdt.flags.loop_errs,     word_bit_04      /* 1 = This test loops
                                               /*  forever if an error occurs
equ  tdt.flags.not_loopable, word_bit_05       /* 1 = This test cannot loop
                                               /*  on error even if requested

equ  tdt.f.sb, tdt.flags.sets_brk              /* Shorthand version of same
equ  tdt.f.us, tdt.flags.upd_sts               /* Shorthand version of same
equ  tdt.f.rp, tdt.flags.req_prev              /* Shorthand version of same
equ  tdt.f.ro, tdt.flags.req_opr               /* Shorthand version of same
equ  tdt.f.le, tdt.flags.loop_errs             /* Shorthand version of same
equ  tdt.f.nl, tdt.flags.not_loopable          /* Shorthand version of same

tdt.req_prev_tnum:  ds.w      1     /* Test number of test which must
                                    /*  be run before this test is
                                    /*  executed

     drop      'test_dispatch_table'    /* Stop building offsets now
     use       'code'
```

```
     title      'Disk Main -- Olc test dispatch table'

test_dispatch_table:
     dc.l       control_reg_test_0         /* Test control register bits
     dc.l       memory_test_0              /* Test all 0's pattern on main mem
     dc.l       memory_test_1              /* Test all 1's pattern on main mem
     dc.l       memory_test_2              /* Test rotating bit pat on main mem
     dc.l       Gate_Array_timer_test_0    /* Test the gate array timer function
     dc.l       Gate_Array_timer_test_1    /* Test gate array timer interrupts


     /* Test what we can in the little time we have left before GIOC kicks in.
functional_tests:
     jsr        memory_test_0              /* Test all 0's pattern on main mem
     jsr        memory_test_1              /* Test all 1's pattern on main mem
     jsr        memory_test_2              /* Test rotating bit pat on main mem
     jsr        Gate_Array_timer_test_0    /* Test the gate array timer function
     jsr        Gate_Array_timer_test_1    /* Test gate array timer interrupts
/*     jsr        disk_debug_test_1          /* Do the disk seek test
/*     jsr        disk_debug_test_2          /* Do the disk write test (no return)
/*     rts
     bra.b      functional_tests           /** DEBUGGING ** keep running memory

     /* Initialize parity memory so that inadvertent errors don't occur
ioa$_do_initialize_memory:
     push.l     d0-d7;a0-a6;               /* we trash 'em all, so save 'em all
     jsr        zero_main_mem
     pop.l      d0-d7;a0-a6;               /* Get 'em all back
     rts

     /* Run a suite of short tests
ioa$_run_short_tests:    /* We haven't enough time to start serious tests
     /* Nothing serious can be done in this short a time...
     rts

/*     incl       'ioa_disk_dumphdlr.code' /*

     title      'ROM Interrupt service'

     /* Just wait for somebody to call us for service
wait_for_interrupt:
     jsr        check_GIOC_mailbox         /* See if a command needs service...
     rts

iop_interrupt_catcher:   /* Catch commands from the GIOC
     jsr        check_GIOC_mailbox         /* See if a command needs service...
     rte                                   /* Command already serviced if given

     title      'SMAC root Static area definitions'
     use        'static'       /* These locations are actually impure data...
unknown_device_interrupted_flag:   dc.l 0    /* <>0 if unknown device interrupt
error_loop_exit_flag:          dc.w 0     /* -1 = Exit error hdlr if scoping done
error_enter_via_jsr:           dc.w 0     /* -1 = Error handler entered via JSR
error_enter_via_unexp_intr:    dc.w 0     /* -1 = Error was unexpected interrupt
error_enter_via_trap:          dc.w 0     /* -1 = Error handler entered via TRAP
local_saved_A0:                dc.l 0     /* A0 saved here temporarily
pseudo_vbr:                    dc.l 0     /* Vector area pointer for MC6800x's

junk_long:                     dc.l 0     /* Junk longword, aligned
local_junk:                    dc.l 0     /* Junk longword for error handler
     use        'code'

     title      'PROM error handlers for attached tests'

/*     incl       'ioa_error_handler.code'
     title      'Common EEPROM Fault (Group 0) Handlers for Attached Tests'
/* These handlers service errors which stack additional info besides PC/SR
bus_error_hdlr:     /* Bus error
     push.l     #MEX_ERR__BUS_ERROR        /* Save error code on stack
     bra.w      common_fault_handler       /* Join handler of stacked info...

     /* Handle 68000/68008 faults which stack info in addition to SR & PC
common_fault_handler:
     push.l     d0;a0                      /* Save for exchange with save_area ptr
```

```
     move.b     #bdcsr2, d0                  /* Save interrupt flags, among others
     push.w     d0                           /* Save it on the stack
     jsr        ioa_lcl$_hw_inhibit_all      /* Inhibit all interrupts
     movea.l    #error_regsave_area, a0      /* Point to start of reg. save area
     pop.w      saved_error.bdcsr2           /* Save board status word
     movem.l    d0-d7;a0-a7, saved_error.d0  /* Save all registers
     pop.l      d0;a1                        /* Get these back from storage
     move.l     d0, saved_error.d0           /* Save it where it belongs
     move.l     a1, saved_error.a0           /* Ditto this one
     pop.l      saved_error.call_code        /* Save handler code
     pop.w      saved_error.fault_func_code  /* Save R/W, I/D, and func code bits
     pop.l      saved_error.fault_addr       /* Save erring address
     pop.w      saved_error.fault_instr      /* Save instruction register contents
     pop.w      saved_error.sr               /* Save status reg from time of fault
     pop.l      saved_error.pc               /* Save failing pc from the stack
     move.l     sp, saved_error.a7           /* Save adjusted supervisor SP
     jmp        common_saved_error_hdlr      /* Join common now that all is saved

     title      'EEPROM Error/Trap (Group 1 & 2)  Handlers for Attached Tests'

bad_instr_hdlr:      /* Illegal instruction
     push.l     #MBX_ERR__INSTR_ERROR        /* Save error code on stack

trap_instr_hdlr:     /* TRAPV instruction
     push.l     #MBX_ERR__TRAP               /* Save error code on stack
     bra.b      common_unsaved_error_hdlr /* Enter common code

instr_trace_hdlr:    /* Trace
     push.l     #MBX_ERR__INSTR_TRACE        /* Save error code on stack
     bra.b      common_unsaved_error_hdlr /* Enter common code

resvd_instr_hdlr:    /* Line 1010 ('A'x) emulator
     push.l     #MBX_ERR__RESVD_INSTR_ERROR /* Save error code on stack
     bra.b      common_unsaved_error_hdlr /* Enter common code

bad_hardware_hdlr:   /* 68010 Format error
     push.l     #MBX_ERR__BAD_HARDWARE_ERROR /* Save error code on stack
     bra.b      common_unsaved_error_hdlr /* Enter common code

     title      'EEPROM Software-Detected Error Handlers for Attached Tests'

jump_0_catcher:                      /* This machine typically gets no jmp 0s
     push.w     sr                   /* Save current processor status
     push.l     #MBX_ERR__JUMP_0_ERROR       /* Save error code on stack
     bra.b      common_unsaved_error_hdlr /* Enter common code

unexp_intr_error:
     push.l     #MBX_ERR__UNEXP_INTR_ERROR /* Save error code on stack
     bra        common_unsaved_error_hdlr /* Enter common code

     /* This   trap  handler  enters  the  error  routine  after
     /* flagging entry via a trap  instruction  and  saving  the
     /* stacked  status  register.  Trap #0 is the generic error
     /* call for saving SR at time of failure.
error_trap_0:
     push.l     #MBX_ERR__ERROR_TRAP_0_ERROR /* Save error code on stack
     bra        common_unsaved_error_hdlr /* Enter common code


     /* Process all other errors which require saving context
     /* Expects to be entered with word of error code as last word on stack
common_unsaved_error_hdlr:
     push.l     d0;a0                        /* Save for exchange with save_area ptr
     move.b     #bdcsr2, d0                  /* Save interrupt flags, among others
     push.w     d0                           /* Save it on the stack
     jsr        ioa_lcl$_hw_inhibit_all      /* Inhibit all interrupts
     movea.l    #error_regsave_area, a0      /* Point to start of reg. save area
     movem.l    d0-d7;a0-a7, saved_error.d0 /* Save all registers
     pop.w      saved_error.bdcsr2           /* Save board status word
     pop.l      d0;a1                        /* Get these back from storage
     move.l     d0, saved_error.d0           /* Save it where it belongs
     move.l     a1, saved_error.a0           /* Ditto this one
     pop.l      saved_error.call_code        /* Save handler code
     pop.w      saved_error.sr               /* Save status reg from time of fault
```

```
     pop.l      saved_error.pc             /* Save failing pc from the stack
     move.l     sp, saved_error.a7         /* Save adjusted supervisor SP
     jmp        common_saved_error_hdlr    /* Join common now that all is saved

     title      'Common EEPROM Generic Test Error Handler for Attached Tests'

     /*   This is the generic test error handler.

     /*   It is called via JSR ERROR, which puts the pc nearest the
     /*   error call on the stack for purposes of traceback. This
     /*   error handler can return to its caller if that option is
     /*   specified, but the default is to remain in a loop which
     /*   allows a logic analyzer to display the error call address so
     /*   that the error may be traced back on a listing to the routine
     /*   which reported it.
     /*
     /*   This error handler is meant as a last-ditch effort to save
     /*   error information before forcing the board to go broken. The
     /*   stack pc will be read and then written in a loop to
     /*   facilitate data-scoping on the pc. Note that the call offset
     /*   for the JSR ERROR will usually be four bytes, but could be
     /*   six if code is relocated into the ram for execution....
error:
     push.w     sr                         /* Save current processor status
     push.l     =MBX_ERR__ERROR_CALL_ERROR /* Save error code on stack
     bra.b      common_unsaved_error_hdlr  /* Enter common code

     /* NOTE: All regs have been saved, and A0 points to reg save area.
common_saved_error_hdlr:
     move.w     saved_error.continue_flags, d5 /* Get return action flags
     move.w     =^all_trap_continue_flags, d6  /* Get normal proceed flags
     and.w      d6, d5                     /* Clear all those flags now
     addi.w     =secf__continue_from_ERROR_CALL_ERROR, d5 /* Allow LOE option
     move.w     d5, saved_error.continue_flags /* Save cleared rtn action flags
     move.l     saved_error.pc, d5         /* Get pc back for adjustments
     /* See if pc was from JSR or TRAP
     move.l     saved_error.call_code, d2
     cmp.l      =MBX_ERR__ERROR_CALL_ERROR, d2 /* Match?
     beq.b      $error_via_jsr             /* Yes, so handle JSR format PC
     cmp.l      =MBX_ERR__JUMP_0_ERROR, d2 /* Match?
     beq.b      $error_via_jsr             /* Yes, so handle JMP format PC
     addq.l     =2, d5                     /* Else adjust saved PC for TRAP instr
$error_via_jsr:
     subq.l     =4, d5                     /* Assume call was JSR ERROR(pc)
     move.l     d5, saved_error.adj_pc     /* Save it for later
     jsr        ioa_lcl$_clear_broken_2    /* Tell local test to clear BROKEN 2
     jsr        ioa_lcl$_board_go_broken   /* Try to make board go BROKEN now

     /* Try to tell the IOP that we had an error...
     jsr        ioa_mbx$post_failure_to_GIOC

     title      'EEPROM Error Handler - Allow Local Handler to Evaluate Error'

     /* Now call local error hdlr to determine the remainder of error handling
     push.l     saved_error.adj_pc         /* Put this thing in working storage
     jsr        local_error_handler        /* Now let program handle error locally

     title      'EEPROM Error Handler - Do Final Continue Action'

     /* If we return here it means we intend to return to calling program
     pop.l      a3                         /* Forget about saved error PC

     /* See if continue action is allowed for the handled error
     move.l     saved_error.call_code, d0

     /* Check error code list for continue action (allowed or disallowed)
     move.w     =secf_cf_table_ent_size, d2 /* Get size in bytes of flag tbl ent
     lea        secf_cf_table, a3          /* Get flag table for dispatch
     move.w     =secf_cf_table_cnt, d3     /* Get # error codes in table for loop
     clr.w      d4                         /* Start check with first entry in list
     bra.b      $j01                       /* Pre-decrement the loop

     /* Look for this error code in the list
```

```
$l01:
    move.l    0(a3,d4.w), d5              /* Get the next error code in the list
    cmp.w     d5, d0                      /* Does this entry match given code?
    beq.b     got_error_code              /* Yes -- go process it, then
    add.w     d2, d4                      /* Else point to next entry in list
$j01:
    dbra      d3, $l01                    /* Search entire error code list
    bra.w     error_return_inhibited_loop /** FATAL ** Unknown error code!!!
    /* This error is fatal but cannot be reasonably handled, so just loop

    /* See if the handled error is allowed to return
got_error_code:
    move.w    saved_error.continue_flags, d5 /* Get return action flags
    move.l    continue_bit_offset(a3,d4.w), d0 /* Get this error's cont bit
    and.w     d0, d5                      /* Is this error allowed to continue?
    beq.w     error_return_inhibited_loop /* No, so handle permanent error
    move.w    saved_error.test_ctl_flags, d0 /* Get saved test control flags
    andi.w    =tdt.f.le!tdt.f.nl, d0      /* Does this test want to loop?
    beq.w     error_return_inhibited_loop /* No, so handle error in a loop
    andi.w    =tdt.f.nl, d0               /* Is this test allowed to loop?
    bne.w     error_return_inhibited_loop /* No, so handle error in a loop

    /* Return to error handler caller now with previous stats...
error_jsr_return:
    movea.l   saved_error.a7, sp          /* Make sure stack addr remains correct
    push.l    saved_error.pc              /* Setup to return from called hdlr
    push.w    saved_error.sr              /* Works for either intr or jsr now
    push.l    saved_error.a0              /* Save for later
    move.l    a0, saved_error.a0          /* Make sure base addr remains correct
    movem.l   saved_error.d0, d0-d7;a0-a6 /* Restore all of 'em except stack
    pop.l     a0                          /* Finally, get back a0, then...

error_trap_exit:            /* Return from call with all regs intact
    rte

    /* Loop here if local handler returned but error not allowed to return
error_return_inhibited_loop:
    push.l    saved_error.adj_pc          /* Put this thing in working storage
$l01:
    move.l    (sp), d5                    /* Get adjusted pc for bus scoping
    bra.b     $l01                        /* Tight loop here...

secf_cf_table:              /* Error code table for continue action
    dc.l      MBX_ERR__BUS_ERROR
secf_cf_table_cont_bit_offset:
    dc.l      secf_cf_BUS_ERROR
secf_cf_table_2nd_entry:
    dc.l      MBX_ERR__INSTR_ERROR,          secf_cf_INSTR_ERROR
    dc.l      MBX_ERR__TRAP,                 secf_cf_TRAP
    dc.l      MBX_ERR__INSTR_TRACE,          secf_cf_INSTR_TRACE
    dc.l      MBX_ERR__RESVD_INSTR_ERROR,    secf_cf_RESVD_INSTR_ERROR
    dc.l      MBX_ERR__BAD_HARDWARE_ERROR,   secf_cf_BAD_HARDWARE_ERROR
    dc.l      MBX_ERR__JUMP_0_ERROR,         secf_cf_JUMP_0_ERROR
    dc.l      MBX_ERR__UNEXP_INTR_ERROR,     secf_cf_UNEXP_INTR_ERROR
    dc.l      MBX_ERR__ERROR_TRAP_0_ERROR,   secf_cf_ERROR_TRAP_0_ERROR
    dc.l      MBX_ERR__ERROR_CALL_ERROR,     secf_cf_ERROR_CALL_ERROR
secf_cf_table_end:          /* End of Error Code table

equ   secf_cf_table_ent_size, secf_cf_table_2nd_entry-secf_cf_table
equ   continue_bit_offset, secf_cf_table_cont_bit_offset-secf_cf_table

      /* # Error code/continue pairs in table
equ   secf_cf_table_cnt, (secf_cf_table_end-secf_cf_table)/(4*2)


      title     'Error Handler -- Local error handling routines'

      /*   This is the local error handler for the DISK rom.  On
      /*   error it checks the saved test control flags word to
      /*   determine whether looping on error is required or not.
      /*   If not, then the handler simply enters a 'scope loop'
      /*   which allows for a logic analyzer or scope to display
      /*   the address of the failing test -- this option will
      /*   not currently return to the caller of the error
```

```
/*   handler, and so it takes liberties with the stack  and
/*   other storage locations.  If, however, 'loop on error'
/*   is  selected for the erring test, the error address is
/*   scanned only once and  then  the  calling  process  is
/*   returned  to.  In this way, the caller can implement a
/*   jmp to continuation code, or terminate as it chooses.

local_error_handler:
     pop.l      a1                       /* Get return address from stack
     pop.l      a2                       /* Get adj. error address from stack
     push.l     a1                       /* Put return address on now
     push.l     a2                       /* Put error address into working store
     lea        error, a4                /* Get starting addr of error routine
     move.l     a4, local_junk           /* Just move it on bus for analyzer
     lea        error_end, a4            /* Get ending addr of error routine
     move.l     a4, local_junk           /* Just move it on bus for analyzer

     move.w     =0, local_junk           /* Assume error handler will loop
     move.w     saved_error.test_ctl_flags, d0 /* Get saved test control flags
     andi.w     =tdt.f.le!tdt.f.nl, d0   /* Does this test want to loop?
     beq.b      $j01                     /* No, so handle error in a loop
     andi.w     =tdt.f.nl, d0            /* Is this test allowed to loop?
     bne.b      $j01                     /* No, so handle error in a loop
     move.w     =-1, local_junk          /* Indicate error handler will return
$j01:

error_halt_loop:    /* This scope loop toggles the Diag Loop Bit #4
                    /*  for frame sync

     move.l     =*F1234567*b4, d5        /* Something easy for logic analyzers..
     move.l     (sp), d5                 /* Get adjusted pc for bus scoping
     move.w     local_junk, d0           /* Should we return to our caller?
     beq.b      error_halt_loop          /* No, stay in local error report loop

     pop.l      d0                       /* Just pop error address off stack
     rts                                 /* Return to main error handler now

     /* Clear 'BROKEN2' flag now in both Gate Arrays
ioa_lcl$_clear_broken_2:
     move.b     =clr_BK2, G_A_wreg0
     rts

     /* Make this board go BROKEN
ioa_lcl$_board_go_broken:
make_board_go_broken:
     move.b     =G_A_wreg0.ctl_p.set_broken, G_A_wreg0 /* G-A set BROKEN latch
     rts

     /* Inhibit all interrupts
ioa_lcl$_hw_inhibit_all:
     ori        =m68k_no_interrupts, sr  /* There is no hardware interrupt mask
     rts

error_end:      /* First loc after error handler
/*
control_reg_test_0:
Gate_Array_timer_test_2:
exec_multi_test_cmd:
     move.l     =12345678x, junk_long
     rts

/* ************************************************************************

     /* Adapter-Unique Command Table general constants
equ  actes, adapter_cmd_tbl_entry_offset-adapter_unique_cmd_table
equ  adapter_cmd_table_ent_size, actes
equ  acts, adapter_unique_cmd_table_end-adapter_unique_cmd_table
equ  adapter_cmd_table_size, acts
equ  adapter_cmd_table_cnt, adapter_cmd_table_size/adapter_cmd_table_ent_size
/** DEBUGGING ** This test is for board debugging only!!
cc_cc_disk_write_blindly:
/*      jsr         dct_write_blindly
     jsr        init_GIOC_mailbox        /* Zap mbx to indicate op done
     rts
```

```
/** DEBUGGING ** This test is for board debugging only!!
gc_do_disk_read_blindly:
/*      jsr       ddt_read_blindly
     jsr       init_GIOC_mailbox        /* Zap mbx to indicate op done
     rts

/** DEBUGGING ** This test is for board debugging only!!
gc_do_disk_write_multiple:
/*      jsr       ddt_write_multiple
     rts

/** DEBUGGING ** This test is for board debugging only!!
gc_do_disk_read_multiple:
/*      jsr       ddt_read_multiple
     rts

     /* Tell the GIOC to look at the mailbox
post_mbx_intr_to_gioc:
     move.b    #0, #bdcsr_set_cmd_intr       /* Set GIOC Command Intr PULSE
     rts       /* Hey, that's all!

     /* Disable local interrupts using local hardware (masks) if available
disable_local_interrupts:
     move.w    #m68k_no_interrupts, sr               /* Ensure no interrupts
     rts

/* ***********************************************************************

/* Files #6, 7, 8, 9, 10, & 11:
     incl      'ioa_disk_mem_tests.code' /* Bring in some memory test code
     incl      'ioa_disk_int_hdlrs.code' /* Get remaining interrupt hdlrs
     incl      'ioa_disk_utilities.code' /* Get the common utility routines
/*   incl      'ioa_disk_dbg_pt_1.code'  /* Now try debugging the disk
/*   incl      'ioa_disk_dbg_pt_2.code'  /* Try debugging the disk some more
/*   incl      'ioa_disk_mbx_ops.code'   /* Drag in mailbox decoder stuff
     incl      'ioa_disk_ga_tests.code'  /* Bring in the gate array stuff
     incl      'ioa_disk_timr_test.code' /* Bring in the gate array timer tests
     incl      'adapter_test_equates'   /* Bring in the common test codes
     incl      'adapter_error_equates'  /* Bring in the common error codes

     incl      'ioa_mbx_handler.code'   /* Get the GIOC<-->adapter mailbox code
     incl      'ioa_dump_handler.code'  /* Get the adapter-->GIOC dumper code

     /* Call the onboard disk driver or, for debugging, call the returning stub
start_disk_driver:
     push.l    a4;a5;                     /* Save our current registers
     link      a6, #0                     /* Save stack and link for return
     movea.l   #adj_reserved_stack_low_addr, sp   /* Point into user's stack
     move.l    sp, usp                    /* Do the user stack pointer, also
     push.l    a6                         /* Save old stack pointer
     movea.l   sp, a6                     /* Setup frame pointer -- now we can...
     movem.l   ioa_disk_driver_startup_link, a4-a5; /* Get linkage info
     jsr       (a4)                       /* ...Go start the program!!
     /* If the called routine returns, try to restore previous context...
     pop.l     a6                         /* Get back old frame/stack pointer
     unlk      a6                         /* Restore stack and a6 too
     pop.l     a4;a5;                     /* Restore static and scratch pointers
     rts                                  /* And now we should be runnable again

ioa_disk_driver_startup_link:
     elink     start_here

/* Now setup an external pointer for Joe Croman's companion disk driver code
     use       'static'
     extdat    ioa_mailboxp
ioa_mailboxp:
     dc.l      gioc_commailbox            /* --> GIOC<-->adapter comm mailbox
     use       'code'

extdef    id_prom_vector                  /* --> ID PROM section
extdef    commailbox_vector               /* --> GIOC<-->adapter comm mailbox
extdef    eeprom_reserved_ram_vector      /* EEPROM needs safe mem from here up
extdef    pbus_visible_memory_base        /* Beginning of P-bus visible ram
extdef    eeprom_actual_size              /* Size of entire EEPROM in bytes
```

```
extdef     board_sw_rev_num               /* Promware revision number
extdef     firmware_entry_vector          /* Call here to enter prom from ram prg
extdef     firmware_mbx_call_vector       /* Call here to execute MBX command
extdef     ioa$_panic_dump_list_vector    /* Up to 16 page #s for crash dumping
extdef     ioa$_panic_dump_call_vector    /* Pointer for crash dump register grab

     use       'code'

     title     'Section equates'

     join      'code',   'local_constants'

/* NOTE!! These static allocations MUST BE THE LAST ONES joined to the
/* 'static' area, as they contain the boundary marker info for the
/* end of the static area. Since the static area is relocated
/* to ram before use, this value is critical in determining
/* how much space to allocate in ram for the static area...
     use       'static'
     dc.l      0    /* Ensure static area is long-aligned
static_end:
     dc.l      0    /* Boundary marker of static area
equ  static_area_size,   static_end-static_origin
     use       'code'

end
/*  ***begin copyright*** ************************************** */
/*                                                              */
/*  STRATUS CONFIDENTIAL INFORMATION: CLASS II                  */
/*  COPYRIGHT (c) Stratus Computer, Inc. 1985                   */
/*                                                              */
/*  This  program  contains  confidential and proprietary       */
/*  information  of  Stratus Computer,  Inc.,  and  any         */
/*  reproduction, disclosure, or use in whole or in part        */
/*  is   expressly   prohibited,   except   as   may   be       */
/*  specifically authorized by prior written agreement or       */
/*  permission of Stratus.                                      */
/*                                                              */
/*  ***end copyright*** **************************************** */

/* Beginning of modification history */
/* Written 86-03-04 by Joe Croman */
/* Modified 87-06-01 by Joe Croman to add mailbox support */
/* End of modification history */

ioa_disk_prom: procedure;

/* includes */
/* %include   'thread_entries.incl.pl1 */';
/* BEGIN thread_entries.incl, TNH, 85-7-1 */

/*      %include 'links_template'; */
/* Begin links_template.incl, 85-10-09, Tim Hill */

/* NOTE: For a list header, nextp is the list head and
        prevp is the list tail! */

     dcl 1 links_template based,
          2 nextp                 ptr,
          2 next_linksp           ptr,
          2 prevp                 ptr,
          2 prev_linksp           ptr;

/* End links_template.incl */

     dcl s$init_list_header builtin;
     dcl s$init_list_node   builtin;
     dcl s$thread_after     builtin;
     dcl s$thread_at_back   builtin;
     dcl s$thread_at_front  builtin;
     dcl s$thread_before    builtin;
     dcl s$unthread         builtin;

     dcl s$thread_list_after entry (
          /* prev_node.links */ 1 like links_template,
```

```
          /* from_header */ 1 like links_template);
     dcl $$thread_list_at_back entry (/* to_header */ 1 like links_template,
          /* from_header */ 1 like links_template);
     dcl $$thread_list_at_front entry (
          /* to_header */ 1 like links_template,
          /* from_header */ 1 like links_template);
     dcl $$thread_list_before entry (
          /* next_node.links */ 1 like links_template,
          /* from_header */ 1 like links_template);
     dcl $$thread_sublist_after entry (
          /* prev_node.links */ 1 like links_template,
          /* first_node.links */ 1 like links_template,
          /* last_node.links */ 1 like links_template);
     dcl $$thread_sublist_at_back entry (
          /* to_header */ 1 like links_template,
          /* first_node.links */ 1 like links_template,
          /* last_node.links */ 1 like links_template);
     dcl $$thread_sublist_at_front entry (
          /* to_header */ 1 like links_template,
          /* first_node.links */ 1 like links_template,
          /* last_node.links */ 1 like links_template);
     dcl $$thread_sublist_before entry (
          /* next_node.links */ 1 like links_template,
          /* first_node.links */ 1 like links_template,
          /* last_node.links */ 1 like links_template);

/* END thread_entries.incl */
%page;
/* %include  'ioa_disk_constants.incl.pl1 */';
/* Begin include file ... ioa_disk_constants.incl.pl1  86-06-04 */

%replace  MSK_INT                    by    01;
%replace  MAX_STATE_CHANGE           by    100;

%replace  IOA_DISK_ROM_SIZE          by    32768;
%replace  IOA_DISK_RAM_SIZE          by    8192;
%replace  IOA_DISK_ROM_OFFSET        by    32768;

%replace  MIN_PROM_IO_REQ            by    0;    /* Primitive io */
%replace  MIN_IO_REQUEST             by    2;  /* 2:27 */
%replace  MAX_REQUESTS               by    27;  /* 2:27 */

%replace  MAX_SEEK_RETRY             by    5;
%replace  DISK_COMMAND               by    500;
%replace  RANGE_SIZE                 by    150;

/* sequencer commands */
%replace  MIN_IOA_SEQ_CMD           by 16;
%replace  MAX_IOA_SEQ_CMD           by 26;


%replace  IOA_READ_BLINDLY           by 16;
%replace  IOA_VERIFY_LOCALLY         by 17;
%replace  IOA_READ_HEADER            by 18;
%replace  IOA_FORMAT_NORMAL          by 19;
%replace  IOA_READ_NORMAL            by 20;
%replace  IOA_WRITE_NORMAL           by 21;
%replace  IOA_READ_DATA              by 22;
%replace  IOA_WRITE_BIG              by 23;
%replace  IOA_FORMAT_HEADER          by 24;
%replace  IOA_SALAD_PLATE_WRITE      by 25;
%replace  IOA_SALAD_PLATE_READ       by 26;

/* smd control - 8006 */
%replace  OFFSET_PLUS            by '01'b4;
%replace  OFFSET_MINUS           by '02'b4;
%replace  CLEAR_FAULT            by '04'b4;

%replace  RECALIBRATE            by '10'b4;
%replace  DATA_EARLY             by '20'b4;
%replace  DATA_LATE              by '40'b4;

/* Changed by WDS 10/2 */
%replace DRIVE_POWER            by '04'b4; /* MUST STAY ON!!! */
```

```
%replace DRIVE_SELECT          by '20'b4;
%replace TAG4                  by '08'b4;
%replace TAG5                  by '10'b4;
%replace PROM_HIGH             by '01'b4;

%replace ON_CYLINDER           by '02'b4;
%replace DIDY_READY            by '01'b4;


/* internal prom error codes */
%replace        SEC_TIMEOUT_ERR             by    -1;
%replace        IOP_INTERRUPT               by    -2;
%replace        SEEK_TIMEOUT_ERR            by    -3;
%replace        RESTORE_FAILURE             by    -4;

/* time constants based on 6.5 msec interval */

%replace        SEC_TIMEOUT                 by    20;
%replace        SEEK_TIMEOUT                by    20;
%replace        ONE_SECTOR_TIME             by    3;

/* End include file ... ioa_disk_constants.incl.pl1 */
%page;
/* %include   'disk_status.incl.pl1 */';
/* Begin include file ... disk_status.incl.pl1   80-08-07 */

declare statp ptr;

declare 1 status based (statp),
          2 flags,
            3 completed             bit (1),
            3 drive_exists          bit (1),
            3 error                 bit (1),
            3 halted                bit (1),
            3 ready                 bit (1),
            3 pad1                  bit (2),
            3 internal_read_failed  bit (1),
          2 controller,
            3 disagree              bit (1),
            3 dma_error             bit (1),
            3 terminal_count        bit (1),
            3 record_not_found      bit (1),
            3 forced_nmi            bit (1),
            3 drive_not_busy        bit (1),
            3 verify_error          bit (1),
            3 crc_error             bit (1),
          2 sector_info,
            3 pad2                  bit (7),
            3 bad_sector            bit (1),
          2 drive,                  /* Valid ONLY for Priam drives */
            3 command_reject        bit (1),
            3 write_fault           bit (1),
            3 drive_fault           bit (1),
            3 drive_busy            bit (1),
            3 at_cyl_0              bit (1),
            3 seek_fault            bit (1),
            3 seek_complete         bit (1),
            3 drive_ready           bit (1);

dcl  1 status_chars              based(statp) ,
       2 flags                   char(1) ,
       2 controller              char(1) ,
       2 sector_info             char(1) ,
       2 drive                   char(1) ;

dcl  1 drive_smd defined(status_chars.drive). /* valid ONLY for Smd drives */
       2 pad3                   bit (3),
       2 write_protected        bit (1),
       2 fault                  bit (1),
       2 seek_fault             bit (1),
       2 seek_complete          bit (1),
       2 drive_ready            bit (1);

dcl  1 iop_status               defined( status_chars.sector_info ),
```

```
        2 prom_error             bit(1),   /* IOP Prom detected error */
        2 entity_error           bit(1),   /* IOP entity detected error */
        2 checksum_error         bit(1),   /* Data checksum error */
        2 mbx_timeout            bit(1),   /* IOA mailbox timeout */
        2 req_timeout            bit(1),   /* IOA disk request timeout */
        2 dead_ioa               bit(1),   /* Either dead or non-existent ioa */
        2 verify_error           bit(1),   /* IOP dma verify error */
        2 mbz                    bit(1);

/* End include file ... disk_status.incl.pl1 */
%page;
/* %include  'disk_cmds.incl.pl1 */';
/* Begin include file ... disk_cmds.in  80-08-10 */

/* Controller commands */

%replace START_DRIVE_CMD        by  128;  /* 80x */
%replace KILL_CUR_LIST_CMD      by  144;  /* 90x */
%replace RESTART_DRIVE_CMD      by    0;  /* Restart same list addr */
%replace BOOT_FROM_DRIVE_CMD    by    1;
%replace RUN_SELF_TEST_CMD      by    2;
%replace ADD_MAILBOX            by  160;  /* a0x for D114's */
%replace DELETE_MAILBOX         by  161;  /* a1x for D114's */

/* List commands */

/* ***** WARNING:  You MUST change init_disk_data if you add new commands
                   to this list.                              ************* */

%replace READ_DEFECT            by  32;   /* Data Xfer */
%replace VERIFY_CMD             by  33;
%replace READ_HDR_CMD           by  34;
%replace FORMAT_CMD             by  35;

%replace READ_CMD               by  36;
%replace WRITE_CMD              by  37;
%replace READ_BIG_CMD           by  38;
%replace WRITE_BIG_CMD          by  39;


%replace WRITE_VERIFY_CMD       by  50;    /* IOP write verify */
%replace ADD_GEOMETRY_CMD       by  51;    /* IOP add disk geometry */

%replace SEEK_CMD               by 132;   /* Seek */

/* Control commands set "ready" bit in summary status byte */

%replace JUMP_CMD               by  64;   /* Control */
%replace SET_INT_NO_CMD         by  65;
%replace HALT_CMD               by  66;
%replace WAIT_CMD               by  67;
%replace RESET_DRIVE_CMD        by  68;
%replace RESET_INT_NO_CMD       by  69;
%replace FIND_PRESENT_DRIVE     by  70;   /* also sets "drive_exists" */
%replace DIAG_SEEK_1_CMD        by  71;

%replace SOFT_RESET_CMD         by 128;
%replace SEQ_UP_CMD             by 129;   /* Control */
%replace SEQ_DOWN_CMD           by 130;
%replace RESTORE_CMD            by 131;
%replace RESET_FAULT_CMD        by 133;
%replace SET_CYL_CMD            by 134;
%replace DIAG_SEEK_2_CMD        by 135;

                                          /* Following only on D107/D106 */
%replace SET_RED_LIGHT_CMD      by 16;
%replace CLR_RED_LIGHT_CMD      by 17;
%replace SET_BLB_CMD            by 18;    /* Buffer Loop Back */
%replace GET_EXT_STATUS_CMD     by 19;
%replace RESET_BLB_CMD          by 20;    /* Buffer Loop Back */
%replace SET_PWHM_CMD           by 21;    /* Post-write Header Match */
%replace RESET_PWHM_CMD         by 22;
%replace RELOAD_ADAPTER_CMD     by 23;
%replace READ_ADAPTER_PROM_CMD    by 43;  /* read id prom in disk director */
```

```
/* End include file ... disk_cmds.in */
%page;
/* %include  'disk_mailbox_template.incl.pl1 */';
/* Begin include file ... disk_mailbox_template.incl.pl1  87-05-30 */


declare   1 disk_mailbox_template  based,    /* for disks in a drawer */
            2 align_flag        bit(0) aligned,/* use by hardware so must be */
            2 fan_error         bit(1),/* aligned  !!!!!! */
            2 drawer_present  bit(1),
            2 drive_select_error bit(1),
            2 unused(13) bit(1);


/* End include file ... disk_mailbox_template.incl.pl1 */
%page;
/* %include  'adapter_error_equates.incl.pl1 */';
/* FILE: Adapter Error Codes -- Error code registry for IOP adapter boards   */

/* MBX Ownership byte definitions */
%replace MBX_OWNER__ADAPTER_OWNS_MBX     by   '80'b4; /* Adapter/GIOC          */
                                                       /* ownership flag:       */
                                                       /*  80x = adapter owns   */
                                                       /*  mailbox              */
%replace MBX_OWNER__GIOC_OWNS_MBX        by   '00'b4; /* Adapter/GIOC          */
                                                       /* ownership flag:       */
                                                       /*  00x = IOP owns       */
                                                       /*  mailbox              */

/* Success and failure status prefix codes */
%replace MBX_STS__GT_SUCCESS      by  'FF000001'b4; /* Status for successful   */
                                                    /*  GENERIC TEST           */

%replace MBX_STS_SP               by  'FF000001'b4; /* Same success prefix as  */
                                                    /*  above                  */

%replace MBX_STS__GT_FAILURE_PREFIX by 'FE000001'b4; /* Prefix for errors      */
                                                    /*  encountered during a   */
                                                    /*  GENERIC TEST           */

%replace MBX_STS_FP               by  'FE000001'b4; /* Same error prefix as    */
                                                    /*  above                  */

/* Success status codes */
%replace MBX_STS__ADAPTER_OK              by  'FF000002'b4; /* OK Status msg    */
%replace MBX_STS__START_FUNC_TEST         by  'FF000003'b4; /* Response to a    */
                                                            /*  Test_All        */
%replace MBX_STS__ADAPTER_RESETTING       by  'FF000004'b4; /* Resetting        */
%replace MBX_STS__ADAPTER_HALTING         by  'FF000005'b4; /* Halt             */
%replace MBX_STS__NULL_CMD_RESPONSE       by  'FF000006'b4; /* Response to a    */
                                                            /*  null command    */
%replace MBX_STS__NEXT_BUFFER_READY       by  'FF000007'b4; /* Response to a    */
                                                            /*  dump buffer     */
%replace MBX_STS__OPERATION_IN_PROGRESS by  'FE000007'b4; /* Mark this          */
                                                            /*  operation in progress  */

/* ERROR CODES */
%replace MBX_ERR__UNIMPLEMENTED_FEATURE by  'FE00006C'b4; /* Some Non-Feature*/
                                                          /*  was requested    */
%replace MBX_ERR__ILLEGAL_CMD        by  'FE000070'b4; /* Illegal/unknown      */
                                                       /*  adapter command     */
                                                       /*  received            */
%replace MBX_ERR__OP_IN_PROGRESS     by  'FE000071'b4; /* Operation was        */
                                                       /*  requested before    */
                                                       /*  previous finished   */
%replace MBX_ERR__NO_CMD_GIVEN       by  'FE000072'b4; /* Mailbox recv'd       */
                                                       /*  but no command given */
%replace MBX_ERR__BAD_ACK_RESPONSE   by  'FE000073'b4; /* Response to          */
                                                       /*  send was not an ACK */
%replace MBX_ERR__INVALID_TEST_NUMBER by 'FE000075'b4; /* Requested test       */
                                                       /*  does not exist      */
%replace MBX_ERR__UNKNOWN_COMMAND    by  'FE000076'b4; /* Requested            */
                                                       /*  command is unknown  */
%replace MBX_ERR__COMMAND_NOT_FOUND by  'FE000077'b4; /* Requested            */
```

```
                                                    /*  command is unknown      */

%replace MBX_ERR__BUS_ERROR                by 'FE000100'b4; /* Bus Error              */
%replace MBX_ERR__INSTR_ERROR              by 'FE000101'b4; /* Instruction Error      */
%replace MBX_ERR__TRAP                     by 'FE000102'b4; /* Trap Instruction       */
%replace MBX_ERR__UNEXP_INTR_ERROR         by 'FE000103'b4; /* Bogus Interrupt        */
%replace MBX_ERR__JUMP_0_ERROR             by 'FE000104'b4; /* PC jumped to zero      */
%replace MBX_ERR__ERROR_CALL_ERROR         by 'FE000105'b4; /* USR ERROR call         */
%replace MBX_ERR__ERROR_TRAP_0_ERROR       by 'FE000106'b4; /* TRAP 0 error call      */
%replace MBX_ERR__BAD_HARDWARE_ERROR       by 'FE000107'b4; /* Bad Hardware error     */
%replace MBX_ERR__RESVD_INSTR_ERROR        by 'FE000108'b4; /* Reserved Instruction*/
%replace MBX_ERR__INSTR_TRACE              by 'FE000109'b4; /* Trace Trap             */
/* NOTE: The following status codes will DISAPPEAR at first release!!!              */
/* %replace MBX_STS__SUCCESS     by  '0000F000'b4; /* Status for successful          */
                                                    /*  Cmd Done                     */

/* %replace MBX_STS__ADAPTER_FAILURE_PREFIX by '0000F000'b4; /* Status word */
                                                    /*  prefix value for             */
                                                    /*  adapter failures             */

%replace MBX_STS__SUCCESS          by  MBX_STS__GT_SUCCESS; /* Success status         */
%replace MBX_STS__ADAPTER_FAILURE_PREFIX by MBX_STS__GT_FAILURE_PREFIX;
                                                    /* Prefix for errors             */

%page;
/* %include   'ioa_mailbox.incl.pl1 */';
/*                          ioa_mailbox.incl.pl1
                            --------------------

      This  include file contains the mailbox used to communicate
      between an IOA and the IOP.  Several  overlaid  definitions
      exist,  which  are used under different circumstances, such
      as dumping or IOA program debugging.

*/

/* Define typical IOA mailbox pointer.                                              */
dcl  ioa_mbxp               ptr; /* ioa_mbxp = contents of 200404x in ioa */

/* Original mbx template */
dcl  1 ioa_mbx    like ioa_mbx_template  based( ioa_mbxp );

dcl  1 ioa_mbx_template    based,
       2 command            fixed bin(15),
       2 buffer_addr        fixed bin(31),
       2 status             bit(32) aligned,
       2 t,
         3 ownership        bit(1),    /* = '0' = iop;  = '1' = ioa */
         3 mbz              bit(7),
         3 in_tag           char(1),
       2 msg_in             char(80) var,
       2 msg_out            char(80) var,
       2 more_info          bit(1) aligned,
       2 xtra_ptr           fixed bin(31);

/* Dump mailbox template */
dcl  1 ioa_mbx_dump   like ioa_mbx_dump_tpl based( ioa_mbxp );

dcl  1 ioa_mbx_dump_tpl  based,
       2 outbox_offset     char(90) var,        /* Not used for dumping          */
       2 mbz               fixed bin(15),       /* Must be zero for dump         */
       2 page_num          fixed bin(15),       /* Current adapter dump page     */
       2 data_type         fixed bin(15),       /* Dump data type                */
       2 absolute_addr     fixed bin(31),       /* Real IOA addr of dump data    */
       2 buf_byte_cnt      fixed bin(15),       /* Num bytes xfer'd this time    */
       2 page_seq_num      fixed bin(15),       /* Adapter's seq # for page      */
       2 remaining_cnt     fixed bin(15);       /* Num bytes still to be xfer'd */
/*     2 unused_str_c      char(70) var;        /* Not used for dumping          */

/* Command info mailbox template */
dcl  1 ioa_mbx_cmdinfo   like ioa_mbx_c_i_tpl based( ioa_mbxp );
dcl  1 ioa_mbx_c_i_tpl   based,
       2 outbox_offset     char(90) var,        /* Not used for command info     */
       2 sw_rev            fixed bin(15);       /* Board's software revision     */
/*     2 unused_str_c      char(84) var;        /* Not used for dumping          */
```

```
%replace IOA_MAILBOX_PTR_ADDR by   2098180;
%replace IOP_OWNER by '0'b;
%replace IOA_OWNER by '1'b;

/*   Brief description of protocol for diagnostic usage.
     -----------------------------------------------

     The  mailbox begins life with the IOP having ownership ( ownership =
     '0' ) and when the IOP has placed all the pertinent  information  in
     the box it will change ownership over to the IOA.  The IOP will then
     set the int_to_device bit in the IOA's Gate Array, which the adapter
     should  be  polling in order to know when a command has arrived.  It
     is not advised for the adapters to have their interrupts enabled  at
     this  point  in  time,  and  this  is  the  reason  for  polling the
     int_to_device bit.

     The  ownership  bit works in conjunction with the int_to_device bit.
     This should cover  the  case  where  an  adapter  detects  a  faulty
     int_to_device  bit.  Therefore  the  adapter  should  only process a
     command if the int_to_device bit and the ownership bit are both set.

     Structure definitions.
     ---------------------
     ioa_mbx.command ( input/output )
          - This is the command for the IOA to execute. On output it
            indicates the command executed by the IOA.

     ioa_mbx.buffer_addr ( input/output )
          - Universal buffer longword address. The address of the
            primary buffer for an operation is placed here.

     ioa_mbx.status ( output )
          - This will be filled in by the adapter indicating the
            status of the board, commands, etc...

     ioa_mbx.ownership ( input/output )
          - This bit defines who the current owner of the mailbox is.  If
            this bit = '0'b then the IOP currently owns the mailbox, otherwise
            the adapter has ownership.

     ioa_mbx.f.id_tag ( mailbox owner )
          - Id tag used by IOP-side processes only (not used by IOA)
            to encode owner of current mailbox op in order to prevent
            one IOP process from using another process's returned mbx.

     ioa_mbx.msg_in ( input )
          - This is defined as a char(80) varying buffer.  It will be command
            dependent and can therefore have different meanings with overlays
            describing it.  However, the first two bytes will always specify
            the number of bytes in the buffer.  Whether the commands choose to
            use them is up to the individual command.

     ioa_mbx.msg_out ( output )
          - This buffer is for the ioa to send data to the iop.  Again, the
            same applies to this buffer as to the .msg_in described above.

     ioa_mbx.more_info ( input/output )
          - On output this signifies that there is more information than
            will fit into the msg_out buffer. Input meaning is command
            dependent.

     ioa_mbx.xtra_ptr ( input/output )
          - The meaning of this pointer is command dependent, though
            generally it is used as a pointer to extra data that would
            not fit in the primary buffer, or as the secondary pointer
            for a command.

*/
%page;
/* %include    'ioa_disk_ram.incl.pl1 */';
/* Begin include file ... ioa_disk_ram.incl.pl1  86-05-27 */

/* this include file is a memory map for the disk IOA */
```

```
declare ioa_disk_ramp              ptr;

declare 1 ioa_disk_ram based (ioa_disk_ramp),
          2 interrupt_vectors (256)      ptr,
          2 prom_id                      fixed bin(31),
          2 prom_version                 fixed bin(15),
          2 microcode_version            fixed bin(15),
          2 mailbox_ptr                  ptr,
          2 request_area_ptr             ptr,
          2 free_list_header             like links_template,
          2 pending_list_header          like links_template,
          2 active_list_header           like links_template,
          2 buffer_alloc_map             bit (32) aligned,
          2 disk_state_mailbox           like disk_mailbox_template,
          2 pad (61)                     fixed bin(15),
          2 request_array (0:MAX_REQUESTS)
                                         like ioa_disk_request_template;

%page;
/* %include   'ioa_disk_io.incl.pl1 */';
/* Begin include file ... disk_ioa_io.incl.pl1  */

declare static_control        bit(8) aligned defined (static_control_flags);
declare 1 static_control_flags,
          2 bit7               bit(1),
          2 bit6               bit(1),
          2 drive_select       bit(1),
          2 tag5               bit(1),
          2 tag4               bit(1),
          2 drive_pwr          bit(1),    /* NEW */
          2 bit1               bit(1),
          2 prom_high          bit(1);


declare smd_control        bit(8) aligned defined (smd_control_flags);
declare 1 smd_control_flags,
          2 bit7               bit(1),
          2 data_late          bit(1),
          2 data_early         bit(1),
          2 recalibrate        bit(1),
          2 bit3               bit(1),
          2 clear_fault        bit(1),
          2 offset_minus       bit(1),
          2 offset_plus        bit(1);


declare smd_status             char(1);

declare 1 smd_status_flags     defined(smd_status),
          2 sector             bit(1),
          2 index              bit(1),
          2 bit5               bit(1),
          2 file_protect       bit(1),
          2 drive_fault        bit(1),
          2 seek_error         bit(1),
          2 on_cylinder        bit(1),
          2 disk_ready         bit(1);


declare misc_status            char(1);

declare 1 misc_status_flags    defined(misc_status),
          2 sequencer_active   bit(1),
          2 rec_light_on       bit(1),
          2 broken             bit(1),
          2 unit_selected      bit(1),    /* OLD: broken_two */
          2 not_ioc_interrupt  bit(1),    /* inverted status bit */
          2 sector_interrupt   bit(1),
          2 not_fan_error      bit(1),    /* inverted status bit */
          2 drawer_present     bit(1);

declare io_status              char(1);

declare 1 io_status_flags      defined(io_status),
```

```
          2 pad              bit(8),
          2 drive_died       bit(1),
          2 sector_match     bit(1),
          2 bit5             bit(1),
          2 bit4             bit(1),
          2 bit3             bit(1),
          2 bit2             bit(1),
          2 verify_error     bit(1),
          2 crc_error        bit(1);


declare pd_status            char(1);

declare 1 pd_status_flags    defined(pd_status),
          2 pad              bit(8),
          2 int_to_iop       bit(1),
          2 broken_two       bit(1),
          2 tmr_1            bit(1),
          2 tmr2             bit(1),
          2 int_from_iop     bit(1),
          2 timer_int        bit(1),
          2 make_safe_data   bit(1),
          2 make_safe_func   bit(1);

/* End include file disk_ioa_io.incl.pl1 */
%page;
/* %include   'ioa_disk_int_vectors.incl.pl1 */';
declare interrupt_vector_ptr                  ptr;

declare interrupt_vector (255) ptr based (interrupt_vector_ptr);
%page;
/* %include   'ioa_disk_request.incl.pl1 */';
/* Begin include file ... ioa_disk_request.incl.pl1  */


declare   disk_requestp        ptr;
declare 1 disk_request like ioa_disk_request_template based (disk_requestp);

declare   disk_request_arrayp ptr;
declare 1 disk_request_array (0:MAX_REQUESTS) like ioa_disk_request_template
                                                  based (disk_request_arrayp);

declare 1 ioa_disk_request_template    based,
          2 command                   fixed bin(15),
          2 flags,
            3 dma_required            bit (1),
            3 retry                   bit (1),
            3 interrupt               bit (1),
            3 padf                    bit (13),
          2 links                     like links_template,
          2 state                     fixed bin(15),
          2 request_priority          fixed bin(15),
          2 list_priority             fixed bin(15),
          2 retry_count               fixed bin(15),
          2 vos_id                    fixed bin(31),
          2 disk_addr                 like disk_address_template,
          2 index                     fixed bin(15),
          2 pad0                      bit(8),
          2 status                    bit (32) aligned,
          2 pad1 (9)                  fixed bin(15);

/* ioa_disk_request states */

%replace  FREE                 by   0;
%replace  PENDING              by   1;
%replace  ACTIVE               by   2;
%replace  POST                 by   3;

/* End include file ioa_disk_request.incl.pl1 */
%page;
/* %include   'disk_address.incl.pl1 */';
/* Begin include file ... disk_address.incl.pl1  86-06-04 */

/* This include file defines the IOP disk queue structures */
```

```
declare disk_addressp     ptr;
declare 1 disk_address like disk_address_template based (disk_addressp);

declare 1 disk_address_template based,
          2 cylinder                fixed bin (15),    /* As above, decomposed */
          2 head                   fixed bin(15),
          2 sector                  fixed bin (15);

/* End include file ... disk_address.incl.pl1 */
%page;
/* static */

declare         start_of_disk_rams  ptr external static;
declare         ioa_mailboxp        ptr external static;

/* requests that are currently being processed by adapter */
declare active_request_headerp          ptr;
declare 1 active_request_header  like links_template
                                              based (active_request_headerp);

/* requests to be processed by the adapter */
declare pending_request_headerp          ptr;
declare 1 pending_request_header  like links_template
                                              based (pending_request_headerp);

/* requests under the ioc's control for posting or just free */
declare free_request_headerp        ptr;
declare 1 free_request_header  like links_template
                                                 based (free_request_headerp);

/* disk mailbox for select errors, drawer present, and fan errors */
declare   disk_mailboxp                ptr;
declare 1 disk_mailbox   like disk_mailbox_template      based (disk_mailboxp);

declare 1 state_change_template    based,
          2 current_state          bit (1) aligned,
          2 count                  fixed bin(15);

declare 1 fan_state       like state_change_template;
declare 1 drawer_state    like state_change_template;
declare 1 select_state    like state_change_template;



/* automatic */
declare g_current_cylinder                 fixed bin(15);
declare g_new_cylinder                     fixed bin(15);
declare g_request_no                       fixed bin(15);
declare g_static_control                   fixed bin(15);
declare g_code                             fixed bin(15);
declare g_int_from_ioc                     bit(1) aligned;
declare g_timer_count                        fixed bin(15);
declare mbx_data_in (41)                  fixed bin(15) defined (ioa_mbx.msg_in);
declare mbx_data_out (41)                 fixed bin(15) defined (ioa_mbx.msg_out);
declare ioc_mailbox_active                 bit(1) aligned;

/* entries */
declare   continue_io              entry (ptr);
declare   get_io_status            entry (char(1));
declare   get_misc_status          entry (char(1));
declare   get_smd_status           entry (char(1));
declare   clear_broken             entry ();
declare   reset_tag3               entry ();
declare   abort_sequencer          entry ();
declare   set_interrupt            entry (fixed bin(15));
declare   ioa_disk_startup         entry ();
declare   read_io_status           entry (char(1));
declare   read_misc_status         entry (char(1));
declare   read_smd_status          entry (char(1));
declare   set_timer_interval       entry (fixed bin(15));
declare   seek_to                  entry (fixed bin(15), fixed bin(15));
declare   write_sequencer_cmd      entry (fixed bin(15));
```

```
declare   select_buffer              entry (fixed bin(15));
declare   select_head                entry (char(1));
declare   select_sector              entry (char(1));
declare   [illegible]_bus_control    entry (bit(8) aligned);
declare   start_io                   entry (ptr);
declare   wait_for_sequencer_int     entry (fixed bin(15));
declare   write_static_control       entry (bit(8) aligned);
declare   turn_power_on              entry ();
declare   turn_power_off             entry ();

/* */

call initialize_ioa;

do while ('1'b);

     call process_mailbox;

     call check_states;

     if io_pending()
     then do;
          call process_io;
          end;
     end;
%page;
check_states: proc;

declare   state_changed       bit(1) aligned;

     state_changed = '0'b;

     call get_misc_status(misc_status);

     if misc_status_flags.unit_selected ^= select_state.current_state
     then do;
          select_state.count = select_state.count + 1;
          if select_state.count > MAX_STATE_CHANGE
          then do;
               disk_mailbox.drive_select_error =
                                        ^misc_status_flags.unit_selected;
               select_state.current_state = misc_status_flags.unit_selected;
               select_state.count = 0;
               state_changed = '1'b;
               end;
          end;

     if misc_status_flags.drawer_present ^= drawer_state.current_state
     then do;
          drawer_state.count = drawer_state.count + 1;
          if drawer_state.count > MAX_STATE_CHANGE
          then do;
               disk_mailbox.drawer_present =
                                   misc_status_flags.drawer_present;
               drawer_state.current_state = misc_status_flags.drawer_present;
               drawer_state.count = 0;
               state_changed = '1'b;
               end;
          end;

     if misc_status_flags.not_fan_error ^= fan_state.current_state
     then do;
          fan_state.count = fan_state.count + 1;
          if fan_state.count > MAX_STATE_CHANGE
          then do;
               disk_mailbox.fan_error = ^misc_status_flags.not_fan_error;
               fan_state.current_state = misc_status_flags.not_fan_error;
               fan_state.count = 0;
               state_changed = '1'b;
               end;
          end;


     if state_changed
```

```
      then do;
           call set_interrupt(MBX_INT);
           end;

end check_states;
%page;
process_mailbox: proc;

      call read_pc_status (pc_status);

      if pc_status_flags.int_from_iop  | g_int_from_iop
      then do;

           g_int_from_iop = '0'b;

           if ioa_mbx.ownership = IOA_OWNER
           then do;
                if (ioa_mbx.command < DISK_COMMAND) |
                   (ioa_mbx.command > (DISK_COMMAND + RANGE_SIZE))
                then do;
                     call diagnostic_entry; /* this is stub for real entry */
                     goto no_stat;
                     end;

                goto dsk_cmd(ioa_mbx.command - DISK_COMMAND);

                dsk_cmd(KILL_CUR_LIST_CMD):
                     call initialize_lists;
                     goto cmd_proccessed;

                dsk_cmd(SEEK_CMD):
                     call seek_to(mbx_data_in(1),g_code);
                     if g_code ^= 0
                     then do;
                          g_current_cylinder = mbx_data_in(1);
                          end;
                     goto cmd_proccessed;

                dsk_cmd(JUMP_CMD):;
                dsk_cmd(HALT_CMD):;
                dsk_cmd(FIND_PRESENT_DRIVE):
                     goto cmd_proccessed;
                dsk_cmd(SEQ_UP_CMD):
                     call sequence_up;
                     goto cmd_proccessed;

                dsk_cmd(SEQ_DOWN_CMD):
                     call sequence_down;
                     goto cmd_proccessed;

                dsk_cmd(RESTORE_CMD):
                     call restore;
                     goto cmd_proccessed;

                dsk_cmd(*)::
                     /* goto cmd_proccessed */

           cmd_proccessed:
                statp = addr(mbx_data_out(1));
                call get_status;
           no_stat:
                ioa_mbx.status = MBX_STS__GT_SUCCESS;
                ioa_mbx.ownership = IOP_OWNER;
                end;
           end;
end process_mailbox;
%page;
fq_pending: proc returns (bit(1) aligned);

/* automatic */

declare  freep        ptr;
declare  pendp          ptr;
declare  newp          ptr;
```

```
/* */
     /* get any new requests from the IOP */
     freep = free_request_header.nextp;
     do while (freep ^= null());

          if (freep-> disk_request.state = PENDING)
          then do;
               newp = freep;
               freep = freep-> disk_request.nextp;

               call s$unthread (newp-> disk_request.links);

               do pendp = pending_request_header.nextp
                    repeat pendp->disk_request.links.nextp
                    while (pendp ^= null());

                    if pendp->disk_request.cylinder >
                                             newp->disk_request.cylinder
                    then do;
                         call s$thread_before (pendp->disk_request.links, newp,
                                             newp-> disk_request.links);
                         goto pending_threaded;
                         end;
                    end;

               /* at end of list */
               call s$thread_at_back (pending_request_header,
                                   newp, newp->disk_request.links);
pending_threaded:
               end;
          else do;
               freep = freep-> disk_request.nextp;
               end;
          end;

     /* check to see if pending list is empty */

     if (pending_request_header.prev_linksp =
                              pending_request_header.next_linksp) &
        (pending_request_header.prev_linksp =
                              pending_request_headerp)
     then do;
          return ('0'b);            /* empty */
          end;
     else do;
          return ('1'b);            /* not empty */
          end;

end io_pending;
%page;
process_io: proc;


     call build_active_list;
     call do_io;
     if e_code ^= 0
     then do;
          call salvage_active_list;
          end;

end process_io;
%page;
build_active_list:  proc;

/* build active list builds a list of IO operations to be performed by
   the disk.  The list is optimized for latency and head selection */

/* automatic */

declare  pendp          ptr;
declare  activep        ptr;
declare  newp           ptr;
declare  tempp          ptr;
declare 1 temp_header like links_template;
```

```
/* */
     call find_new_cylinder;

     call s$init_list_header(temp_header);


     /* get any new requests from the ICP */
     pendp = pending_request_header.nextp;
     do while (pendp ^= null());

          if (pendp-> disk_request.cylinder = g_new_cylinder)
          then.do;
          newp = pendp;
          pendp = pendp-> disk_request.nextp;

          /* unthread from pending list */
          call s$unthread (newp-> disk_request.links);

          if (newp->disk_request.command < MIN_IOA_SEG_CMD) |
             (newp->disk_request.command > MAX_IOA_SEG_CMD)
          then do;

               goto  request_cmd(newp->disk_request.command);

               request_cmd (READ_CMD):;
               request_cmd (VERIFY_CMD):
                    newp->disk_request.command = IOA_READ_NORMAL;
                    goto thread_active;

               request_cmd (WRITE_CMD):
                    newp->disk_request.command = IOA_WRITE_NORMAL;
                    goto thread_active;

               request_cmd (FORMAT_CMD):
                    newp->disk_request.command = IOA_FORMAT_NORMAL;
                    goto thread_active;

               request_cmd (READ_DEFECT):
                    newp->disk_request.command = IOA_READ_BLINDLY;
                    goto thread_active;

               request_cmd (READ_BIG_CMD):
                    newp->disk_request.command = IOA_READ_DATA;
                    goto thread_active;

               request_cmd (WRITE_BIG_CMD):
                    newp->disk_request.command = IOA_WRITE_BIG;
                    goto thread_active;

               request_cmd (READ_HDR_CMD):
                    newp->disk_request.command = IOA_READ_HEADER;
                    goto thread_active;

               request_cmd (*):
                    statp = addr(newp->disk_request.status);
                    call get_status;
                    call post_request(newp);
                    goto pal_posted;
               end;

     thread_active:
          newp->disk_request.state = ACTIVE;

          newp->disk_request.retry_count = 0;
          string(newp->disk_request.status) = '0000000'b4;

          /* assure two list priorities 0 and ^0 */
          if newp->disk_request.list_priority = 0
          then do;
               call latency_sort ( newp, active_request_header);
               end;
          else do;
```

```
                    call latency_sort ( newr, temp_header);
                    end;
               end;
          else do;
     bal_posted:
               pendp = pendp->disk_request.nextp;
               end;
          end;

     /* combine the lists */
     call sfthread_list_at_back(active_request_header, temp_header);

end build_active_list;
%page;
do_io: proc;

declare current_requestp      ptr;
declare previous_requestp     ptr;

/* */
     g_code = 0;

     if select_state.current_state ^= '1'b
     then do;
          call select_disk;
          end;

     current_requestp = active_request_header.nextp;

     if (current_requestp->disk_request.cylinder ^= g_current_cylinder)
     then do;
          call seek (current_requestp->disk_request.cylinder);
          if g_code ^= 0
          then do;
               return;
               end;
          end;

     /* wait for iop to complete dma's to buffers */
     do while (dma_required(active_request_header));
          end;

     /* start io */
     call start_io(current_requestp);

     /* first interrupt indicates sequencer has started and its ok
        to load parameters for next sector */

     call wait_for_sequencer_int (g_code);
     if g_code ^= 0
     then do;
          call sequencer_timeout(current_requestp);
          return;
          end;

     previous_requestp = current_requestp;

     /* begin loop for stuffing pipeline */
     do current_requestp = current_requestp->disk_request.nextp
          repeat (current_requestp->disk_request.nextp)
          while (current_requestp ^= null());

          call continue_io(current_requestp);

          /* wait till finished with previous sector */
          call wait_for_sequencer_int (g_code);
          if g_code ^= 0
          then do;
               call sequencer_timeout(previous_requestp);
               return;
               end;

          /* READ status and post */
          statp = addr(previous_requestp->disk_request.status);
```

```
            call read_status;
            call post_request(previous_requestp);

            previous_requestp = current_requestp;
            end;

      /* waiting for last sector to complete */
      call wait_for_sequencer_int (g_code);
      if g_code ^= 0
      then do;
            call sequencer_timeout(previous_requestp);
            return;
            end;

      /* GET status */
      statp = addr(previous_requestp->disk_request.status);
      call get_status;
      call post_request(previous_requestp);

      call reset_tag3 ();

end do_io;
%page;
post_request:  proc (a_requestp);

declare a_requestp         ptr;

      call s$unthread (a_requestp->disk_request.links);
      a_requestp->disk_request.state = POST;

      call s$thread_at_back (free_request_header,
                                  a_requestp, a_requestp->disk_request.links);

      if a_requestp->disk_request.interrupt
      then do;
            call set_interrupt(0);
            end;

end post_request;
%page;
latency_sort: proc (a_newp, a_header);

declare          a_newp                      ptr;
declare        1 a_header                    like links_template;

declare        1 listp                       ptr;
declare          tempp                       ptr;

          /* find where it goes in the active list.  It is ordered by
                sectors and by track so we take minimum latency */
        do listp = a_header.nextp
           repeat listp->disk_request.links.nextp
           while (listp ^= null());

           if a_newp->disk_request.sector <= listp->disk_request.sector
           then do;
                if a_newp->disk_request.sector = listp->disk_request.sector
                then do;
                     /* don't want to put two equal sectors adjacent
                        to one another unless we have to. see if the
                        is another place in the list where we can
                        start from.  */
                        do listp = listp
                           repeat listp->disk_request.links.nextp
                           while (listp->disk_request.links.nextp ^= null());

                           tempp = listp->disk_request.links.nextp;
                           if listp->disk_request.sector ^<
                                             tempp->disk_request.sector
                           then do;
                                goto next_list;
                                end;
                           end;
```

```
                    call s$thread_after(listp->disk_request.links,
                                        a_newp, a_newp-> disk_request.links);
                    return;
                    end;
               else do;
                     call s$thread_before(listp->disk_request.links, a_newp,
                                          a_newp-> disk_request.links);
                    return;
                    end;
               end;
          next_list:
           end;

           call s$thread_at_back ( a_header, a_newp,
                                          a_newp->disk_request.links);
end latency_sort;
%page;
dma_required: proc (a_header) returns (bit(1) aligned);

declare      1 a_header                    like links_template;

declare        listp                       ptr;
declare        required                    bit(1) aligned;

     required = '0'b;

     do listp = a_header.nextp  repeat listp->disk_request.links.nextp
                                   while (listp ^= null());

          required = required | listp->disk_request.flags.dma_required;
          end;
     return (required);

end dma_required;
%page;
find_new_cylinder: proc;

declare pendp         ptr;

      do pendp = pending_request_header.nextp
           repeat pendp->disk_request.links.nextp
           while (pendp ^= null());

           if (pendp-> disk_request.cylinder >= g_current_cylinder)
           then do;
                g_new_cylinder = pendp->disk_request.cylinder;
                return;
                end;
           end;

     g_new_cylinder = pending_request_header.nextp->disk_request.cylinder;

end find_new_cylinder;
%page;
initialize_ioa: proc;

/* automatic */
declare    i                 fixed bin(15);
declare    int_level         fixed bin(15);

/* */

     call clear_broken;

     ioa_disk_ramp = start_of_disk_ram;

     ioa_mbxp = ioa_mailboxp;
     ioa_disk_ram.mailbox_ptr = ioa_mailboxp;
     ioa_mbx.command = 0;
     string(ioa_mbx.status) = '00000000'b4;
     ioa_mbx.ownership = IOP_OWNER;

     disk_mailboxp = addr(ioa_disk_ram.disk_state_mailbox);
     disk_request_arrayp = addr(ioa_disk_ram.request_array);
```

```
     /* clear request array */
     do i = 0 to MAX_REQUESTS;
          string(disk_request_array(i).flags) = '00'b4;
          disk_request_array(i).index = i;
          disk_request_array(i).state = FREE;
          end;

     call initialize_lists;

     /* timer interval = (2 ** (9+n)) * clock interval */
     /* n = 7; clock interval = 1 / 10 Mhz */
     call set_timer_interval (7);

     call select_disk;

     g_int_from_iop = '0'b;
     g_current_cylinder = -1;

     /* setup pointer to request area at the magic addresses */

     ioa_disk_ram.request_area_ptr = addr(ioa_disk_ram.request_array);

     ioa_disk_ram.buffer_alloc_map = '00000000'b4;

     /* setup initial values for drive states */

     fan_state.current_state = '1'b;  /* negative logic */
     fan_state.count = 0;
     disk_mailbox.fan_error = '0'b;

     drawer_state.current_state = '1'b;     /* assume drawer is present */
     drawer_state.count = 0;
     disk_mailbox.drawer_present = '1'b;

     select_state.current_state = '1'b;      /* selected */
     select_state.count = 0;
     disk_mailbox.drive_select_error = '0'b; /* no error */

     return;

%page;
initialize_lists:   entry;

     active_request_headerp = addr(ioa_disk_ram.active_list_header);
     call s$init_list_header(active_request_header);

     pending_request_headerp = addr(ioa_disk_ram.pending_list_header);

     call s$init_list_header(pending_request_header);

     free_request_headerp = addr(ioa_disk_ram.free_list_header);
     call s$init_list_header(free_request_header);

     do i = 0 to MAX_REQUESTS;
          call s$thread_at_back (free_request_header,
               addr(disk_request_array(i)), disk_request_array(i).links);

          disk_request_array(i).state = FREE;
          disk_request_array(i).index = i; /* assign request a buffer */
          end;
     return;
end initialize_ioa;
%page;
get_status: proc;

declare status_clear           fixed bin(31) defined status;

          /* get status */
     call get_io_status(io_status);
     call get_smc_status(smc_status);
     goto status_common;

read_status:    entry;
```

```
      call read_ic_status(ic_status);
      call read_smd_status(smd_status);
      /* goto status_common */

status_common:
      call get_misc_status(misc_status);

      status_clear = 0;

      status_chars.drive = smd_status;
      status.flags.completed = '1'b;
      status.flags.ready = smd_status_flags.disk_ready &
                           misc_status_flags.unit_selected &
                           misc_status_flags.drawer_present;
      status.controller.crc_error = ic_status_flags.crc_error;
      status.flags.drive_exists = misc_status_flags.drawer_present;
      status.flags.error = (ic_status_flags.crc_error |
                            ic_status_flags.drive_diec |
                            smd_status_flags.drive_fault |
                            smd_status_flags.seek_error |
                            ^smd_status_flags.disk_ready |
                            ^misc_status_flags.drawer_present |
                            ^misc_status_flags.unit_selected);
end get_status;
%page;
sequencer_timeout:  proc(a_requestp);

declare a_requestp        ptr;

      if g_code = IOP_INTERRUPT
      then do;
            g_int_from_iop = '1'b;
            end;

      /* tell sequencer to stop */
      call stop_sequencer;

      statp = addr(a_requestp->disk_request.status);

      call read_status;
      status.controller.record_not_found = '1'b;
      status.controller.forced_nmi = '1'b;
      status.flags.error = '1'b;

      call post_request(a_requestp);

end sequencer_timeout;
%page;
diagnostic_entry:  proc;

      string(ioa_mbx.status) = 'f0000000'b4;

end diagnostic_entry;
%page;
restore: proc;

declare    retry_count           fixed bin(15);

      g_code = 0;
      retry_count = 0;
      do while( retry_count < 10);

           call clear_drive_fault;

           /* recalibrate disk */
           smd_control = RECALIBRATE;
           call smd_bus_control(smd_control);

           smd_status = byte(0);

           do while (^smd_status_flags.on_cylinder |
                                          ^smd_status_flags.disk_ready);

                call get_smd_status(smd_status);
```

```
                if smc_status_flags.drive_fault | smc_status_flags.seek_error
                then do;
                     retry_count = retry_count +1;
                     goto retry_recal;
                     end;
                end;
            return;
      retry_recal:
          end;
      g_code = RESTORE_FAILURE;
end restore;
%page;
clear_drive_fault:  proc;

      /* clear faults */
      smc_control = CLEAR_FAULT;
      call smc_bus_control(smc_control);

      call wait_for ((1000 / 65)); /* 100 ms */

end clear_drive_fault;
%page;
sequence_up: proc;

      call turn_power_on;
      string(static_control_flags) = '05'b4;
      call write_static_control(static_control);

      call wait_for ((15000 / 65)); /* 1 sec */


      /* select disk */
      string(static_control_flags) = '25'b4;
      call write_static_control(static_control);

      return;

end sequence_up;
%page;
sequence_down: proc;

      call turn_power_off;

      return;

end sequence_down;
%page;
seek:proc (p_cylinder);

declare   p_cylinder            fixed bin(15);

declare   retry_count           fixed bin(15);

      g_code = 0;
      retry_count = 0;

      do while (retry_count < MAX_SEEK_RETRY);

           call seek_to(p_cylinder, g_code);

           if g_code = 0
           then do;
                g_current_cylinder = p_cylinder;
                return;
                end;
           else do;
                if g_code = SEEK_TIMEOUT
                then do;
                     call restore;
                     if g_code ^= 0
                     then do;
                          return;
                          end;
                     retry_count = retry_count + 1;
```

```
                    end;
                else do;
                    g_int_from_iop = '1'b;
                    end;
                end;
            end;

        seek_error:
            if iop_mailbox_active
            then do;
                call get_status;
                call signal_fault;
                end;
end seek;
%page;
signal_fault:proc;

end signal_fault;
%page;
salvage_active_list:  proc;

declare         activep    ptr;
declare         pendingp      ptr;

        activep = active_request_header.nextp;

        do while ( activep ^= null());
            pendingp = activep;
            activep = activep->disk_request.nextp;

            pendingp->disk_request.state = PENDING;
            call $unthread (pendingp->disk_request.links);
            call $thread_at_back (pending_request_header,
                                 pendingp, pendingp->disk_request.links);
            end;
end salvage_active_list;
%page;
select_disk: proc;

        /* select disk */
        string(static_control_flags) = '28'b4;
        call write_static_control(static_control);
        call wait_for ((2500 / 65)); /* 250 ms */

end select_disk;
%page;
wait_for: proc (p_count);

declare    p_count                fixed bin(15);

        g_timer_count = 0;

        do while (g_timer_count < p_count);

            call read_pc_status(pc_status);
            if pc_status_flags.timer_int
            then do;
                g_timer_count = g_timer_count + 1;
                end;
            if pc_status_flags.int_from_iop
            then do;
                g_int_from_iop = '1'b;
                end;
            end;

end wait_for;
%page;
stop_sequencer: proc;

        call abort_sequencer;

        /* wait for 1 sector time */
        call wait_for ( 3 );
```

```
     call write_sequencer_cmd ((0));

     call reset_tag3;

     /* select disk */
     string(static_control_flags) = '25'b4;
     call write_static_control(static_control);

     call clear_drive_fault;

end stop_sequencer;
end ioa_disk_prom;
/*   ***begin copyright*** ******************************
/*
/*   STRATUS CONFIDENTIAL INFORMATION: CLASS II
/*   COPYRIGHT (c) Stratus Computer, Inc. 1985
/*
/*   This  program  contains  confidential and proprietary
/*   information  of  Stratus Computer,  Inc.,   and   any
/*   reproduction,  disclosure, or use in whole or in part
/*   is   expressly   prohibited,    except    as    may    be
/*   specifically authorized by prior written agreement or
/*   permission of Stratus.
/*
/*   ***end copyright*** *********************************
/*

     priv       on
     model      mc68000
     extent     top_of_stack$, direct

/* incl 'ioa_disk_constants.incl.asm'
/* Begin include file ...ioa_disk_constants.incl.asm
/* Generated at 87-02-25 15:21:14 EST by cv_incl Release 6.alpha.g from
/*      %es#m6>Stratus>Joe_Croman>iop>new_seq>incl>ioa_disk_constants.incl.pl1.

     equ        IOA_DISK_ROM_SIZE,32768
     equ        IOA_DISK_RAM_SIZE,8192
     equ        IOA_DISK_ROM_OFFSET,32768
     equ        MAX_PROM_REQUESTS,1
     equ        MAX_IO_REQUESTS,25
     equ        MAX_REQUESTS,27
     equ        MAX_SEEK_RETRY,5
     equ        DISK_COMMAND,500
     equ        RANGE_SIZE,150
     equ        IOA_READ_BLINDLY,16
     equ        IOA_VERIFY_LOCALLY,17
     equ        IOA_READ_HEADER,18
     equ        IOA_FORMAT_NORMAL,19
     equ        IOA_READ_NORMAL,20
     equ        IOA_WRITE_NORMAL,21
     equ        IOA_READ_DATA,22
     equ        IOA_WRITE_BIG,23
     equ        IOA_FORMAT_HEADER,24
     equ        IOA_SALAD_PLATE_WRITE,25
     equ        IOA_SALAD_PLATE_READ,26
     equ        OFFSET_PLUS,'01'b4
     equ        OFFSET_MINUS,'02'b4
     equ        CLEAR_FAULT,'04'b4
     equ        RECALIBRATE,'10'b4
     equ        DATA_EARLY,'20'b4
     equ        DATA_LATE,'40'b4
     equ        DRIVE_POWER,'04'b4
     equ        DRIVE_SELECT,'20'b4
     equ        TAG4,'08'b4
     equ        TAG5,'10'b4
     equ        PROM_HIGH,'01'b4
     equ        ON_CYLINDER,'02'b4
     equ        DISK_READY,'01'b4
     equ        SEQ_TIMEOUT_ERR,-1
     equ        IOP_INTERRUPT,-2
     equ        SEEK_TIMEOUT_ERR,-3
     equ        RESTORE_FAILURE,-4
```

```
     equ        SEG_TIMEOUT,20
     equ        SEEK_TIMEOUT,20
     equ        ONE_SECTOR_TIME,3

/* End include file ...ioa_disk_constants.incl.asm
/* incl 'ioa_mailbox.incl.asm'
/* Begin include file ...ioa_mailbox.incl.asm
/* Generated at 87-04-01 11:51:13 EST by cv_incl Release 6.alpha.g from
/*      %esam??>Hardware_Test>Dick_Pichelo>gioc_adapter_common>ioa_mailbox.incl.cl

     equ        IOA_MAILBOX_PTR_ADDR,2098180
/*   equ        IOP_OWNER,'0'b
/*   equ        IOA_OWNER,'1'b
     use        'ioa_mbx',dummy
ioa_mbx:
ioa_mbx.command:                                          ds.b 2
ioa_mbx.buffer_addr:                                      ds.b 4
ioa_mbx.status:
                                                          ds.b 4
ioa_mbx.f:
ioa_mbx.f.ownership.byte:
     equ        ioa_mbx.f.ownership.bit,15
     equ        ioa_mbx.f.ownership.mask,'8000'b4
ioa_mbx.f.mbz:
     equ        ioa_mbx.f.mbz.bit,8
     equ        ioa_mbx.f.mbz.mask,'7F00'b4
                                                          ds.b 1
ioa_mbx.f.io_tag:                                         ds.b 1
     equ        ioa_mbx.f.length,2
ioa_mbx.msg_in:                                           ds.b 82
ioa_mbx.msg_out:                                          ds.b 82
ioa_mbx.more_info.byte:
                                                          ds.b 2
ioa_mbx.xtra_ptr:                                         ds.b 4
     equ        ioa_mbx.length,182
     use        'code'

     use        'ioa_mbx_template',dummy
ioa_mbx_template:
ioa_mbx_template.command:                                 ds.b 2
ioa_mbx_template.buffer_addr:                             ds.b 4
ioa_mbx_template.status:
                                                          ds.b 4
ioa_mbx_template.f:
ioa_mbx_template.f.ownership.byte:
     equ        ioa_mbx_template.f.ownership.bit,15
     equ        ioa_mbx_template.f.ownership.mask,'8000'b4
ioa_mbx_template.f.mbz:
     equ        ioa_mbx_template.f.mbz.bit,8
     equ        ioa_mbx_template.f.mbz.mask,'7F00'b4
                                                          ds.b 1
ioa_mbx_template.f.io_tag:                                ds.b 1
     equ        ioa_mbx_template.f.length,2
ioa_mbx_template.msg_in:                                  ds.b 82
ioa_mbx_template.msg_out:                                 ds.b 82
ioa_mbx_template.more_info.byte:
                                                          ds.b 2
ioa_mbx_template.xtra_ptr:                                ds.b 4
     equ        ioa_mbx_template.length,182
     use        'code'

     use        'ioa_mbx_dump',dummy
ioa_mbx_dump:
ioa_mbx_dump.outbox_offset:                               ds.b 94
ioa_mbx_dump.mbz:                                         ds.b 2
ioa_mbx_dump.page_num:                                    ds.b 2
ioa_mbx_dump.data_type:                                   ds.b 2
ioa_mbx_dump.absolute_addr:                               ds.b 4
ioa_mbx_dump.buf_byte_cnt:                                ds.b 2
ioa_mbx_dump.page_seq_num:                                ds.b 2
ioa_mbx_dump.remaining_cnt:                               ds.b 2
     equ        ioa_mbx_dump.length,110
     use        'code'
```

```
     use        'ioa_mbx_dump_tbl',dummy
ioa_mbx_dump_tbl:
ioa_mbx_dump_tbl.outbox_offset:                              ds.b 94
ioa_mbx_dump_tbl.mbz:                                        ds.b 2
ioa_mbx_dump_tbl.page_num:                                   ds.b 2
ioa_mbx_dump_tbl.data_type:                                  ds.b 2
ioa_mbx_dump_tbl.absolute_addr:                              ds.b 4
ioa_mbx_dump_tbl.buf_byte_cnt:                               ds.b 2
ioa_mbx_dump_tbl.page_seq_num:                               ds.b 2
ioa_mbx_dump_tbl.remaining_cnt:                              ds.b 2
     equ        ioa_mbx_dump_tbl.length,110
     use        'code'

     use        'ioa_mbx_cmdinfo',dummy
ioa_mbx_cmdinfo:
ioa_mbx_cmdinfo.outbox_offset:                               ds.b 94
ioa_mbx_cmdinfo.sw_rev:                                      ds.b 2
     equ        ioa_mbx_cmdinfo.length,96
     use        'code'

     use        'ioa_mbx_c_i_tbl',dummy
ioa_mbx_c_i_tbl:
ioa_mbx_c_i_tbl.outbox_offset:                               ds.b 94
ioa_mbx_c_i_tbl.sw_rev:                                      ds.b 2
     equ        ioa_mbx_c_i_tbl.length,96
     use        'code'


/* End include file ...ioa_mailbox.incl.asm
/* incl 'ioa_disk_ioaddr.incl.asm'
equ  hardware_control_base,          10000x

equ  static_control_port,            hardware_control_base+0
equ  sequencer_control_port,         hardware_control_base+1
equ  sector_no_port,                 hardware_control_base+2
equ  buffer_no_port,                 hardware_control_base+3
equ  smd_lsb_port,                   hardware_control_base+4
equ  smd_msb_port,                   hardware_control_base+5
equ  smd_control_port,               hardware_control_base+6
equ  smm_relauncr_port,              haruware_control_base+7


equ  harowarc_status,           10000x
equ  smd_status_port,                harowware_status+0
equ  io_status_port,                 hardware_status+1
equ  misc_status_port,               hardware_status+2


equ pal_control_base,                01A008x

equ pulse_tag3_port,                 pal_control_base+0
equ set_tag3_port,                   pal_control_base+1
equ reset_tag3_port,                 pal_control_base+2
equ start_sequencer_port,            pal_control_base+3
equ get_status_port,                 pal_control_base+4
equ launch_sequencer_port,           pal_control_base+5
equ pulse_tag2_port,                 pal_control_base+6
equ abort_sequencer_port,             pal_control_base+8


equ slow_strobes_base,               01A000x

equ clear_sec_interrupt_port,        slow_strobes_base+0
equ power_on_port,                   slow_strobes_base+1*8
equ power_off_port,                  slow_strobes_base+2*8
equ set_red_light_port,              slow_strobes_base+3*8
equ clear_red_light_port,            slow_strobes_base+4*8
equ abort_launch_port,               slow_strobes_base+6*8
equ pulse_tag1_port,                 slow_strobes_base+7*8

/*equ set_interrupt_port,              slow_strobes_base+2


equ pd_nibble_base,             019000x
```

```
equ  set_broken_port,                  pc_nibble_base+00x
equ  set_timer_port,                   pc_nibble_base+01x /* pc timer
equ  set_interrupt_port,               pc_nibble_base+02x /* Interrupt to iop...

equ  pc_status0_port,                  pc_nibble_base+01x
equ  pc_status1_port,                  pc_nibble_base+00x
/* incl 'board_id_structure.incl.asm'
/* Begin include file ...board_id_structure.incl.asm
/* Generated at 86-10-04 12:33:54 EDT by cv_incl Release 5an from
/*      %es#m6>Stratus>Bill_Snapper>install>board_id_structure.incl.pl1.

     equ       MAX,5
     equ       ID_VERSION,2
     use       'board_id',dummy
board_id:
board_id.version:                                          ds.b 2
board_id.board_type:                                       ds.b 2
board_id.flags:
board_id.flags.bootable.byte:
     equ       board_id.flags.bootable.bit,15
     equ       board_id.flags.bootable.mask,'8000'b4
board_id.flags.self_test.byte:
     equ       board_id.flags.self_test.bit,14
     equ       board_id.flags.self_test.mask,'4000'b4
board_id.flags.pad:
     equ       board_id.flags.pad.bit,0
     equ       board_id.flags.pad.mask,'3FFF'b4
                                                           ds.b 2
     equ       board_id.flags.length,2
board_id.model:                                            ds.b 4
board_id.serial_number:                                    ds.b 4
board_id.revision:                                         ds.b 2
board_id.art_work_rev:                                     ds.b 2
board_id.min_gioc_rev:                                     ds.b 2
board_id.num_serviced:                                     ds.b 2
board_id.history:
board_id.history.service_date:                             ds.b 4
board_id.history.service_code:                             ds.b 2
     equ       board_id.history.length,6
                                                           ds.b 24
     equ       board_id.history.dim,5
board_id.[illegible]:                                      ds.b 2
board_id.[illegible]:                                      ds.b 2
     equ       board_id.length,[illegible]
     use       'code'

/* End include file ...board_id_structure.incl.asm
eject
/* These pointers are removed since rom no longer begins with this module
/*      dc.l [illegible] - iop_mox.length
/*      dc.l start_here
/*
/*      org 400x
/*      dc.l 200000x + [illegible] - board_id.length
/*      dc.l [illegible] - iop_mox.length
/*
/*      [illegible]
/*      [illegible]
/*[illegible]:
/*      dc.l      [illegible]_cornailbox
/*      use  'code'
/*
/*      dc.l 05x

extdef     start_here           /* Call here to start the disk handling code

start_here:
     move.l    d0, d0           /* clear all regs
     move.l    d0, d1
     move.l    d0, d2
     move.l    d0, d3
     move.l    d0, d4
```

```
        move.l      d0, d5
        move.l      d0, d6
        move.l      d0, d7
        movea.l     d0, a0
        movea.l     d0, a1
        movea.l     d0, a2
        movea.l     d0, a3
        movea.l     d0, a4
        movea.l     d0, a5
        movea.l     d0, a6

        move.b      #PROM_HIGH_DRIVE_POWER,#static_control_port
        move.l      #0, clear_red_light_port

/*      movea.l     #(ICA_DISK_RAM_SIZE - 'ica_mbx.length),a7
/* NOTE: Stack will already be setup for called program by diag prom...
/*      movea.l     #top_of_stack1, a7        /* Start with user-avail stack
        move        a7, usp                   /* Ditto for user mode accesses
        move.w      #0700>, sr                /* Innibit most interrupts
        movea.l     ica_disk_link,a4; a5      /* Get link to PL1 disk handler
        jsr         (a4)                      /* enter pl1 processing environment

ica_disk_link:
        elink       ica_disk_proc             /* Entry link to PL1 disk handler

        end
/*   ***begin copyright*** ***************************************   */
/*                                                                   */
/*   STRATUS CONFIDENTIAL INFORMATION: CLASS II                      */
/*   COPYRIGHT (c) Stratus Computer, Inc. 1985                       */
/*                                                                   */
/*   This  program  contains  confidential and proprietary           */
/*   information  of  Stratus Computer,  Inc.,   and   any           */
/*   reproduction, disclosure, or use in whole or in part            */
/*   is   expressly   prohibited,   except   as   may   be           */
/*   specifically authorized by prior written agreement or           */
/*   permission of Stratus.                                          */
/*                                                                   */
/*   ***end copyright*** *****************************************   */

/* Beginning of modification history */
/* Written 86-07-24 by Joe Croman */
/* Modified 87-06-01 by Joe Croman to add subchannel to set_interrupt
/* End of modification history */

/* incl 'ica_disk_constants.incl.asm'
/* Begin include file ...ica_disk_constants.incl.asm
/* Generated at 87-02-02 15:01:14 EST by cv_incl Release 6.alpha.g from
/*      %esmme>Stratus>Joe_Croman>ios>new_sed>incl>ica_disk_constants.incl.pl1.

        equ         ICA_DISK_ROM_SIZE,32768
        equ         ICA_DISK_RAM_SIZE,8192
        equ         ICA_DISK_ROM_OFFSET,32768
        equ         MAX_PROM_REQUESTS,1
        equ         MAX_IO_REQUESTS,25
        equ         MAX_REQUESTS,27
        equ         MAX_SEEK_RETRY,5
        equ         DISK_COMMAND,500
        equ         RANGE_SIZE,150
        equ         ICA_READ_BLINDLY,16
        equ         ICA_VERIFY_LOCALLY,17
        equ         ICA_READ_HEADER,18
        equ         ICA_FORMAT_NORMAL,19
        equ         ICA_READ_NORMAL,20
        equ         ICA_WRITE_NORMAL,21
        equ         ICA_READ_DATA,22
        equ         ICA_WRITE_ECC,23
        equ         ICA_FORMAT_HEADER,24
        equ         ICA_GALAC_PLATE_WRITE,25
        equ         ICA_GALAC_PLATE_READ,26
        equ         OFFSET_PLUS,'01'b4
        equ         OFFSET_MINUS,'02'b4
        equ         CLEAR_FAULT,'04'b4
```

```
     equ        RECALIBRATE,'10'b4
     equ        DATA_EARLY,'20'b4
     equ        DATA_LATE,'40'b4
     equ        DRIVE_POWER,'04'b4
     equ        DRIVE_SELECT,'20'b4
     equ        TAG4,'08'b4
     equ        TAG5,'10'b4
     equ        PROM_HIGH,'01'b4
     equ        ON_CYLINDER,'02'b4
     equ        DISK_READY,'01'b4
     equ        SEQ_TIMEOUT_ERR,-1
     equ        IOP_INTERRUPT,-2
     equ        SEEK_TIMEOUT_ERR,-3
     equ        RESTORE_FAILURE,-4
     equ        SEQ_TIMEOUT,20
     equ        SEEK_TIMEOUT,20
     equ        ONE_SECTOR_TIME,3

/* End include file ...ioa_disk_constants.incl.asm
eject
/* incl 'ioa_disk_ioador.incl.asm'
equ  hardware_control_base,         10000x

equ  static_control_port,           hardware_control_base+0
equ  sequencer_control_port,        hardware_control_base+1
equ  sector_no_port,                hardware_control_base+2
equ  buffer_no_port,                hardware_control_base+3
equ  smd_lsb_port,                  hardware_control_base+4
equ  smd_msb_port,                  hardware_control_base+5
equ  smd_control_port,              hardware_control_base+6
equ  arm_relaunch_port,             hardware_control_base+7


equ  hardware_status,          10000x

equ  smd_status_port,               hardware_status+0
equ  io_status_port,                hardware_status+1
equ  misc_status_port,              hardware_status+2


equ pal_control_base,               01A028x

equ pulse_tag3_port,                pal_control_base+0
equ set_tag3_port,                  pal_control_base+1
equ reset_tag3_port,                pal_control_base+2
equ start_sequencer_port,           pal_control_base+3
equ get_status_port,                pal_control_base+4
equ launch_sequencer_port,          pal_control_base+5
equ pulse_tag2_port,                pal_control_base+6
equ abort_sequencer_port,            pal_control_base+8


equ slow_strobes_base,              01A000x

equ clear_seq_interrupt_port,       slow_strobes_base+0
equ power_on_port,                  slow_strobes_base+1*8
equ power_off_port,                 slow_strobes_base+2*8
equ set_red_light_port,             slow_strobes_base+3*8
equ clear_red_light_port,           slow_strobes_base+4*8
equ abort_launch_port,              slow_strobes_base+6*8
equ pulse_tag1_port,                slow_strobes_base+7*8

/*equ set_interrupt_port,             slow_strobes_base+2


equ pc_nibble_base,               018000x

equ  set_broken_port,             pc_nibble_base+00x
equ  set_timer_port,              pc_nibble_base+01x /* pc timer
equ  set_interrupt_port,          pc_nibble_base+02x /* Interrupt to iop...

equ  pc_status0_port,             pc_nibble_base+01x
```

```
equ  pc_status1_port,              pc_nibble_base+00x
eject
/* incl 'ioa_disk_request.incl.asm'
/* Begin include file ...ioa_disk_request.incl.asm
/* Generated at 87-02-16 15:09:11 EST by cv_incl Release 6.alpha.g from
/*      %es#m6>Stratus>Joe_Croman>iop>new_seq>incl>ioa_disk_request.incl.pl1,
/*      %es#m6>ldc>incl>links_template.incl.pl1,
/*      %es#m6>Stratus>Joe_Croman>iop>iop>disk_address.incl.pl1, and
/*      %es#m6>Stratus>Joe_Croman>iop>new_seq>incl>ioa_disk_constants.incl.pl1.

     equ       FREE,0
     equ       PENDING,1
     equ       ACTIVE,2
     equ       POST,3
     use       'disk_request',dummy
disk_request:
disk_request.command:                                  ds.b 2
disk_request.flags:
disk_request.flags.dma_required.byte:
     equ       disk_request.flags.dma_required.bit,15
     equ       disk_request.flags.dma_required.mask,'8000'b4
disk_request.flags.retry.byte:
     equ       disk_request.flags.retry.bit,14
     equ       disk_request.flags.retry.mask,'4000'b4
disk_request.flags.interrupt.byte:
     equ       disk_request.flags.interrupt.bit,13
     equ       disk_request.flags.interrupt.mask,'2000'b4
disk_request.flags.padf:
     equ       disk_request.flags.padf.bit,0
     equ       disk_request.flags.padf.mask,'1FFF'b4
                                                       ds.b 2
     equ       disk_request.flags.length,2
disk_request.links:
disk_request.links.nextp:                              ds.b 4
disk_request.links.next_linksp:                        ds.b 4
disk_request.links.prevp:                              ds.b 4
disk_request.links.prev_linksp:                        ds.b 4
     equ       disk_request.links.length,16
disk_request.state:                                    ds.b 2
disk_request.request_priority:                         ds.b 2
disk_request.list_priority:                            ds.b 2
disk_request.retry_count:                              ds.b 2
disk_request.vos_id:                                   ds.b 4
disk_request.disk_addr:
disk_request.disk_addr.cylinder:                       ds.b 2
disk_request.disk_addr.head:                           ds.b 2
disk_request.disk_addr.sector:                         ds.b 2
     equ       disk_request.disk_addr.length,6
disk_request.index:                                    ds.b 2
disk_request.pad0:
                                                       ds.b 1
                                                       ds.b 1
disk_request.status:
                                                       ds.b 4
disk_request.pad1:                                     ds.b 2
     equ       disk_request.pad1.length,2
                                                       ds.b 14
     equ       disk_request.pad1.dim,8
     equ       disk_request.length,62
     use       'code'
     use       'ioa_request_array',dummy
ioa_request_array:
ioa_request_array.command:                             ds.b 2
ioa_request_array.flags:
ioa_request_array.flags.dma_required.byte:
     equ       ioa_request_array.flags.dma_required.bit,15
     equ       ioa_request_array.flags.dma_required.mask,'8000'b4
ioa_request_array.flags.retry.byte:
     equ       ioa_request_array.flags.retry.bit,14
     equ       ioa_request_array.flags.retry.mask,'4000'b4
ioa_request_array.flags.interrupt.byte:
     equ       ioa_request_array.flags.interrupt.bit,13
     equ       ioa_request_array.flags.interrupt.mask,'2000'b4
```

```
ioa_request_array.flags.padf:
     equ       ioa_request_array.flags.padf.bit,0
     equ       ioa_request_array.flags.padf.mask,'1FFF'b4
                                                        ds.b 2
     equ       ioa_request_array.flags.length,2
ioa_request_array.links:
ioa_request_array.links.nextp:                          ds.b 4
ioa_request_array.links.next_linksp:                    ds.b 4
ioa_request_array.links.prevp:                          ds.b 4
ioa_request_array.links.prev_linksp:                    ds.b 4
     equ       ioa_request_array.links.length,16
ioa_request_array.state:                                ds.b 2
ioa_request_array.request_priority:                     ds.b 2
ioa_request_array.list_priority:                        ds.b 2
ioa_request_array.retry_count:                          ds.b 2
ioa_request_array.vos_id:                               ds.b 4
ioa_request_array.disk_addr:
ioa_request_array.disk_addr.cylinder:                   ds.b 2
ioa_request_array.disk_addr.head:                       ds.b 2
ioa_request_array.disk_addr.sector:                     ds.b 2
     equ       ioa_request_array.disk_addr.length,6
ioa_request_array.index:                                ds.b 2
ioa_request_array.pad0:
                                                        ds.b 1
                                                        ds.b 1
ioa_request_array.status:
                                                        ds.b 4
ioa_request_array.pad1:                                 ds.b 2
     equ       ioa_request_array.pad1.length,2
                                                        ds.b 14
     equ       ioa_request_array.pad1.dim,8
     equ       ioa_request_array.length,62
     use       'code'

     use       'disk_request_array',dummy
disk_request_array:
disk_request_array.command:                             ds.b 2
disk_request_array.flags:
disk_request_array.flags.dma_required.byte:
     equ       disk_request_array.flags.dma_required.bit,15
     equ       disk_request_array.flags.dma_required.mask,'8000'b4
disk_request_array.flags.retry.byte:
     equ       disk_request_array.flags.retry.bit,14
     equ       disk_request_array.flags.retry.mask,'4000'b4
disk_request_array.flags.interrupt.byte:
     equ       disk_request_array.flags.interrupt.bit,13
     equ       disk_request_array.flags.interrupt.mask,'2000'b4
disk_request_array.flags.padf:
     equ       disk_request_array.flags.padf.bit,0
     equ       disk_request_array.flags.padf.mask,'1FFF'b4
                                                        ds.b 2
     equ       disk_request_array.flags.length,2
disk_request_array.links:
disk_request_array.links.nextp:                         ds.b 4
disk_request_array.links.next_linksp:                   ds.b 4
disk_request_array.links.prevp:                         ds.b 4
disk_request_array.links.prev_linksp:                   ds.b 4
     equ       disk_request_array.links.length,16
disk_request_array.state:                               ds.b 2
disk_request_array.request_priority:                    ds.b 2
disk_request_array.list_priority:                       ds.b 2
disk_request_array.retry_count:                         ds.b 2
disk_request_array.vos_id:                              ds.b 4
disk_request_array.disk_addr:
disk_request_array.disk_addr.cylinder:                  ds.b 2
disk_request_array.disk_addr.head:                      ds.b 2
disk_request_array.disk_addr.sector:                    ds.b 2
     equ       disk_request_array.disk_addr.length,6
disk_request_array.index:                               ds.b 2
disk_request_array.pad0:
                                                        ds.b 1
                                                        ds.b 1
disk_request_array.status:
                                                        ds.b 4
```

```
disk_request_array.pad1:                                ds.b 2
     equ        disk_request_array.pad1.length,2
                                                        ds.b 14
     equ        disk_request_array.pad1.dim,8
     equ        disk_request_array.length,62
     use        'code'

     use        'ioa_disk_request_template',dummy
ioa_disk_request_template:
ioa_disk_request_template.command:                      ds.b 2
ioa_disk_request_template.flags:
ioa_disk_request_template.flags.dma_required.byte:
     equ        ioa_disk_request_template.flags.dma_required.bit,15
     equ        ioa_disk_request_template.flags.dma_required.mask,'8000'b4
ioa_disk_request_template.flags.retry.byte:
     equ        ioa_disk_request_template.flags.retry.bit,14
     equ        ioa_disk_request_template.flags.retry.mask,'4000'b4
ioa_disk_request_template.flags.interrupt.byte:
     equ        ioa_disk_request_template.flags.interrupt.bit,13
     equ        ioa_disk_request_template.flags.interrupt.mask,'2000'b4
ioa_disk_request_template.flags.padf:
     equ        ioa_disk_request_template.flags.padf.bit,0
     equ        ioa_disk_request_template.flags.padf.mask,'1FFF'b4
                                                        ds.b 2
     equ        ioa_disk_request_template.flags.length,2
ioa_disk_request_template.links:
ioa_disk_request_template.links.nextp:                  ds.b 4
ioa_disk_request_template.links.next_linksp:            ds.b 4
ioa_disk_request_template.links.prevp:                  ds.b 4
ioa_disk_request_template.links.prev_linksp:            ds.b 4
     equ        ioa_disk_request_template.links.length,16
ioa_disk_request_template.state:                        ds.b 2
ioa_disk_request_template.request_priority:             ds.b 2
ioa_disk_request_template.list_priority:                ds.b 2
ioa_disk_request_template.retry_count:                  ds.b 2
ioa_disk_request_template.vos_id:                       ds.b 4
ioa_disk_request_template.disk_addr:
ioa_disk_request_template.disk_addr.cylinder:           ds.b 2
ioa_disk_request_template.disk_addr.head:               ds.b 2
ioa_disk_request_template.disk_addr.sector:             ds.b 2
     equ        ioa_disk_request_template.disk_addr.length,6
ioa_disk_request_template.index:                        ds.b 2
ioa_disk_request_template.pad0:
                                                        ds.b 1
                                                        ds.b 1
ioa_disk_request_template.status:
                                                        ds.b 4
ioa_disk_request_template.pad1:                         ds.b 2
     equ        ioa_disk_request_template.pad1.length,2
                                                        ds.b 14
     equ        ioa_disk_request_template.pad1.dim,8
     equ        ioa_disk_request_template.length,62
     use        'code'


/* End include file ...ioa_disk_request.incl.asm
eject


extdef    wait_for_sequencer_int
wait_for_sequencer_int:

     movea.l    4(a7),a0                /* get code
     move.w     =0,(a0)

     move.b     =SEQ_TIMEOUT,d1                  /* set timeout

wait_1:

     move.b     =pq_status0_port,d2
     btst.l     =03,d2                  /* iop_interrupt
     beq.b      wait_2

     move.w     =IOP_INTERRUPT,(a0)     /* iop interrupt code
     rts
```

```
wait_2:
     btst.l     #02,d2
     beq.b      wait_3
     subq.b     #1,d1
     bne.b      wait_3

     move.w     #SEQ_TIMEOUT,(a0)                        /* timeout code
     rts

wait_3:
     move.b     #misc_status_port,d0                   /* read status */
     andi.b     #04x,d0                            /* see if its seq int */
     cmpi.b     #04x,d0
     bne        wait_1

     move.b     #0, #clear_seq_interrupt_port
     rts

extdef     get_misc_status
get_misc_status:

     movea.l    4(a7),a0                 /* address of status variable */
     move.b     #misc_status_port,(a0)                 /* read status */
     rts


extdef     get_io_status
get_io_status:

     movea.l    4(a7),a0                 /* address of status variable */
     move.l     #0,(a0)                  /* zero status word */
     move.b     #0,#get_status_port      /* latch the status */
     move.b     #io_status_port,(a0)     /* read status */
     rts


extdef     read_io_status
read_io_status:

     movea.l    4(a7),a0                 /* address of status variable */
     move.l     #0,(a0)                  /* zero status word */
     move.b     #io_status_port,(a0)     /* read status */
     rts


extdef     get_smd_status
get_smd_status:

     movea.l    4(a7),a0                 /* address of status variable */

     move.l     #0,(a0)                  /* zero status word */

     move.b     #0,#get_status_port      /* latch the status */
     move.b     #smd_status_port,(a0)    /* read status */
     rts


extdef     read_smd_status
read_smd_status:

     movea.l    4(a7),a0                 /* address of status variable */

     move.l     #0,(a0)                  /* zero status word */

     move.b     #smd_status_port,(a0)    /* read status */
     rts
eject

extdef     get_ext_smd_status
get_ext_smd_status:

     movea.l    #get_status_port,a0
     movea.l    #smd_status_port,a1
     movea.l    #static_control_port,a2
     movea.l    4(a7),a3                 /* address of status variable */
```

```
	move.b	#DRIVE_SELECT!TAG4!TAG5!PROM_HIGH!DRIVE_POWER,(a2)
	move.b	#0,(a0)			/* latch the status */
	move.b	(a1),(a3)+		/* read status */

	move.b	#DRIVE_SELECT!TAG5!PROM_HIGH!DRIVE_POWER,(a2)
	move.b	#0,(a0)			/* latch the status */
	move.b	(a1),(a3)+		/* read status */

	move.b	#DRIVE_SELECT!TAG4!PROM_HIGH!DRIVE_POWER,(a2)
	move.b	#0,(a0)			/* latch the status */
	move.b	(a1),(a3)+		/* read status */

	move.b	#DRIVE_SELECT!PROM_HIGH!DRIVE_POWER,(a2)
	move.b	#0,(a0)			/* latch the status */
	move.b	(a1),(a3)		/* read status */

	rts

extdef	clear_broken
clear_broken:

/*	move.b	#0,#clear_broken_port
	rts



extdef	set_tag3
set_tag3:

	move.b	#0,#smd_control_port  /* clear any residual
	move.b	#0,#set_tag3_port

	rts

extdef	reset_tag3
reset_tag3:

	move.b	#0,#reset_tag3_port
	rts

extdef	abort_sequencer
abort_sequencer:

	move.b	#0,#abort_sequencer_port
	rts

extdef	set_interrupt
set_interrupt:

	movea.l	4(a7),a0
	move.b	1(a0),#set_interrupt_port
	rts

extdef	turn_power_on
turn_power_on:

	move.b	#0,#power_on_port
	rts

extdef	turn_power_off
turn_power_off:

	move.b	#0,#power_off_port
	rts

extdef	write_static_control
write_static_control:

	movea.l	4(a7),a0
	move.b	(a0),#static_control_port
	rts
eject
extdef	set_timer_interval
set_timer_interval:
```

```
     movea.l   4(a7),a0
     move.b    1(a0),#set_timer_port
     rts

extdef    read_pq_status
read_pq_status:

     movea.l   4(a7),a0                  /* address of status variable */

     move.w    #0,(a0)                   /* zero status word */

     move.b    #pq_status0_port,d0
     andi.w    #000fx,d0

     move.b    #pq_status1_port,d1    /* read status */
     andi.w    #000fx,d1
     asl.w     #4,d1
     or.w      d1,d0

     move.w    d0,(a0)

     rts
eject

extdef    smd_bus_control
smd_bus_control:

     movea.l   4(a7),a0
     move.b    (a0),#smd_control_port
     move.b    #0,#pulse_tag3_port
     rts


extdef seek_to
seek_to:

     movea.l   4(a7),a0                  /* get cylinder address */
     movea.l   8(a7),a1                  /* get code address */

     move.w    #0,(a1)                   /* zero code */

     move.w    (a0),d0
     move.b    d0,#smd_lsb_port          /* write lsb */
     lsr.w     #8,d0
     move.b    d0,#smd_msb_port          /* write msb */

     move.b    #0,#pulse_tag1_port       /* pulse tag1 to seek */

     move.b    #SEEK_TIMEOUT,d1                    /* set timeout

seek_to_1:

     move.b    #pq_status0_port,d2
     btst.l    #03,d2                         /* iop_interrupt
     beq.b     seek_to_2

     move.w    #IOP_INTERRUPT,(a1)                          /* iop interrupt code
     rts

seek_to_2:
     btst.l    #02,d2
     beq.b     seek_to_3
     subq.b    #1,d1
     bne.b     seek_to_3

     move.w    #SEEK_TIMEOUT,(a1)                          /* time out code
     rts

seek_to_3:
     move.b    #0,#get_status_port       /* latch the status */
     move.b    #smd_status_port,d0       /* read status */

     cmp.b     #ON_CYLINDER!DISK_READY,d0
     bne.b     seek_to_1
```

```
	rts
eject
extdef select_head
select_head:

	movea.l	4(a7),a0
	move.b	(a0),#smd_lsb_port
	move.b	=0,#smd_msb_port
	move.b	=0,#pulse_tag2_port

	rts

extdef select_sector
select_sector:

	movea.l	4(a7),a0
	move.b	(a0),#sector_no_port

	rts



extdef select_buffer
select_buffer:

	movea.l	4(a7),a0
	move.b	(a0),#buffer_no_port

	rts


extdef write_sequencer_cmd
write_sequencer_cmd:

	movea.l	4(a7),a0
	move.b	(a0),#sequencer_control_port

	rts



extdef start_io
start_io:

	movea.l	4(a7),a0		/* base for request block */
	movea.l	(a0),a5
	using	'disk_request',a5

	move.b	disk_request.disk_addr.head+1,#smd_lsb_port
	move.b	=0,#smd_msb_port
	move.b	=0,#pulse_tag2_port

	move.b	disk_request.disk_addr.sector+1,#sector_no_port

	move.w	disk_request.index,d0
	mulu.w	=9,d0
	move.b	d0,#buffer_no_port

	move.b	disk_request.command+1,#sequencer_control_port

/* must be turned on for duration of contiguous IO
	move.b	=0,#smd_control_port	/* clear any residual
	move.b	=0,#set_tag3_port

	move.b	=0,#start_sequencer_port
	drop	'disk_request'
	rts


extdef continue_io
continue_io:

	movea.l	4(a7),a0		/* base for request block */
	movea.l	(a0),a5
	using	'disk_request',a5
```

```
       move.b     disk_request.disk_addr.head+1,#smc_lsb_port
       move.b     =0,#smd_msb_port

       move.b     disk_request.disk_addr.sector+1,#sector_no_port

       move.w     disk_request.index,d0
       mulu.w     =9,d0
       move.b     d0,#buffer_no_port

       move.b     disk_request.command+1,#sequencer_control_port
       move.b     =0,#arm_relaunch_port
       drop       'disk_request'
       rts

end


/*   ***begin copyright*** ********************************
/*
/*   STRATUS CONFIDENTIAL INFORMATION: CLASS II
/*   COPYRIGHT (c) Stratus Computer, Inc. 1985
/*
/*   This program contains confidential and proprietary
/*   information of Stratus Computer, Inc., and any
/*   reproduction, disclosure, or use in whole or in part
/*   is expressly prohibited, except as may be
/*   specifically authorized by prior written agreement or
/*   permission of Stratus.
/*
/*   ***end copyright*** **********************************
/*

       title      'Gnet (GIOC Local Area Network Board, Prototype PC) Boot Rom'

equ   board_promware_revision, 3    /* Promware revision number
/*
/*    CREATED:  19-Aug-85  14:30
/*
/*    This is the rom code for the LANCE Ethernet communications
/*    controller/adapter, which runs in conjunction with the General
/*    Purpose I/O Controller (GIOC). The intent of this code is threefold:
/*    First, it provides initialization / setup of the board in preparation
/*    for logical connection to the GIOC; Second, it provides a library of
/*    test routines already present on the board for exercising and
/*    verifying the basic operation of all major components; and Third, it
/*    provides the software complement to the hardware facility for down-
/*    loading and starting the main, operational code (including the
/*    communications software) for the board.
/*
/*    Edit history:
/*
/* Beginning of modification history
/*
/* Modified 87-05-29 by Dick Richelo to allow soft vector to panic dump list.
/*
/* End of modification history
/*
/* Started : 19-Aug-85
/*      by : Dick Richelo
/*

extdef     gioc_lance_rom_code /* Entry point stuff.
main       gioc_lance_rom_code
model      mc68000              /* No vector base register, etc.

     /* Define symbolic constants:
     incl       'adapter_bit_defs', nolist     /* File #2
     incl       'ioa_enet_hw_defs'            /* File #3
     incl       'ioa_enet_sw_defs'            /* File #4
     incl       'iop_adapter_types'            /* File #5
```

```
     equ        microcode_rev, 1    /* New rev. of ucode for WW2
     equ        sp, a7          /* Assign mnemonic for our stack pointer

     use      . 'code'
/*   org        eprom_base          /* Start program counter where ROM will be
     org        0               /* Start program counter at zero for binder...

gioc_lance_rom_code:     priv      on    /* *** Program entry point ***

/* The following gets us a label at the beginning of the
/* static region, for determining the size of that region later.

     use        'static'
static_origin:
     ds.l       0
     use        'code'
     eject                           /* File #1 is this current file

     equ        decimal_prom_base, 2097152
     equ        eb, eprom_base

          title     'GIOC Adapter Vector and ID PROM definitions'

start_up_vectors:   /* Following are the boot-time vector area contents
start:              /* (this is also the start of rom code space)
     bra.w      jump_0_catcher           /* Catch inadvertent jumps through 0
     dc.l       reset                    /* Start here, while rom is still low.
                                         /* This sets PC past vector area.
     incl       'ioa_enet_vector_table'  /* File #6

     incl       'board_id_structure'     /* Get the ID block structure and size
                                         /* File #7

id_prom_vector:
     dc.l       eb+gioc_lance_prom_size-board_id.length /* --> ID PROM section
commmailbox_vector:
     dc.l       gioc_commailbox          /* --> GIOC<-->adapter comm mailbox
eeprom_reserved_ram_vector:
     dc.l       scratch_area_top         /* EEPROM needs safe mem from here up
pbus_visible_memory_base:
     dc.l       fast_ram_0               /* Beginning of P-bus visible ram
eeprom_actual_size:
     dc.l       gioc_lance_prom_size     /* Size of entire EEPROM in bytes
board_sw_rev_num:
     dc.l       board_promware_revision  /* Promware revision number
firmware_entry_vector:
     dc.l       firmware_call_entry+eb   /* Call here to enter prom from ram prg
firmware_mbx_call_vector:
     dc.l       firmware_mbx_call_entry+eb /* Call here to execute MBX command
ioa$_panic_dump_list_vector:
     dc.l       ioa$_panic_dump_list     /* Up to 16 page #s for crash dumping
ioa$_panic_dump_call_vector:
     dc.l       ioa$_panic_dump_call_ptr /* Pointer for crash dump register grab
ioa$_panic_dump_default_list:
     move.w     =0,(a0)+                 /* Say first dump starts at page #0
     move.w     =128,(a0)+               /* And it's 128 pages long (512Kbytes)
     move.w     =300,(a0)+               /* Next dump starts in FRAM (page #300)
     move.w     =32,(a0)+                /* It's 128 Kbytes (32 pages)
     move.w     =-1,(a0)+                /* Terminate list with negative page #
     move.w     =0,(a0)+                 /* Terminate list with zero page count


/* Hardcoded size of Enet EEPROM in bytes (can be reset by blaster, though...)
equ  gioc_lance_prom_size, 2*8*1024      /* Size of entire EEPROM in bytes

          title     'Gnet Init Code'

     /*   Start EEPROM code

equ  m68k_no_interrupts,       m68k_sr.supv!m68k_intlvl_7
equ  board_id_version,                   1         /* Dummy value for now    (w)
equ  board_type,                      ENET         /* Proto Ethernet board   (w)
```

```
ecu  boarc_ic_flags,  boarc_ic.flags.self_test.mask  /* Board has self test (w)
ecu  board_id_model,                    0          /* Dummy value for now    (L)
ecu  boarc_ic_serial_number,            2          /* Dummy value for now    (L)
ecu  boarc_ic_revision,                 1          /* Dummy value for now    (w)
ecu  board_ic_art_work_rev,             0          /* Dummy value for now    (w)
ecu  boarc_ic_min_gioc_rev,             0          /* Dummy value for now    (w)
ecu  boarc_ic_num_servicec,             0          /* Dummy value for now    (w)
ecu  board_ic_history_service_cate,     0          /* Dummy value for now    (L)
ecu  boarc_id_history_service_code,     0          /* Dummy value for now    (w)
ecu  boarc_id_checksum,                 0          /* Dummy value for now    (w)

         use       'code'
reset:
     /*   Ensure Supervisor mode and no interrupts
     ori        =m68k_no_interrupts, sr
     /* Init registers at boot time
     move.l     =error+eb,                d0   /* Move this value for 'scoping
     move.l     =error_end+ec,            d1   /* Move this value for 'scoping
     move.l     =error_regsave_area,      d2   /* Move this value for 'scoping
     move.l     =gioc_commailbox,         d3   /* Move this value for 'scoping
     move.l     =static_area_base,        d4   /* Move this value for 'scoping
     move.l     =scratch_area_top,        d5   /* Move this value for 'scoping
/*     move.l     =timer_ctl_base,          d0   /* Move this value for 'scoping
     move.l     =lance_csr_base,          d0   /* Move this value for 'scoping
     move.l     #bdcsr1-1,                  d7   /* Copy the init time CSRs for
     movea.l    d3,                       a4   /*  later analysis
     movea.l    d4,                       a5   /* Start static area in low mem
     movea.l    =boot_time_supv_stack,    a6   /* Init the frame pointer
     move.l     a6, usp
     movea.l    a6, sp                    /* Init the stack

     jmp        #high_start+eprom_base         /* Change PC to high rom addresses


     title      'GLAN Init -- Static Memory tests'

     /* Test the static area before storing data in it...
          title      'GLAN Static and Stack memory tests'

static_test_pattern_list:     /* NOTE: These patterns are read last-to-first
     dc.l       '01010101010101010101010101010101'b /* Alt 1's and 0's pattern
     dc.l       '11111111111111111111111111111111'b /* All 1's pattern
     dc.l       '10101010101010101010101010101010'b /* Alternate of 1st pat
     dc.l       '00000000000000000000000000000000'b /* All 0's pattern
static_test_pattern_list_end:

     use        'static'
prom_savec_bad_mem_addr:
     dc.l       0                        /* Store failing addr here if write enabled
ecu  stpls, static_test_pattern_list_end-static_test_pattern_list
ecu  static_test_pattern_list_size, stpls
     use        'code'
ecu  num_fram_test_pats, (static_test_pattern_list_size/4)
ecu  reserved_work_bytes, (fast_ram_top-adj_reserved_stack_low_addr)

     /*   We'll  be running with high memory now, using relocated
     /*   rom addresses, but low memory will not yet  be  enabled
     /*   or visible from the 68000...
high_start:

     /*  Test  all  patterns  throughout the stack and static areas,
     /*  without using any stack directives.  This is the first test
     /*  of fast ram...

     movea.l    =adj_reserved_stack_low_addr, a0   /* Point into work area
     lea        static_test_pattern_list, a2       /* Point to 1st pattern word
     move.l     =num_fram_test_pats-1, d5          /* Get # patterns to try
sl01:
     asl.l      =2, d5                    /* Make a word offset
     move.l     0(a2,d5.l), d4            /* Get next pattern word
     asr.l      =2, d5                    /* Now back to pattern count
     move.l     =reserved_work_bytes/4, d2 /* # longwords to check
     bra.b      $j01                      /* Pre-decrement the loop
```

```
$L02:    /* Write next pattern into each static location
     move.l    d2, d3                  /* Make a longword index
     asl.l     #2, d3                  /*  into the static memory area
$loop_on_error:

     move.l    d4, 0(a0, d3.l)         /* Write pattern to next location
     move.l    0(a0, d3.l), d1         /* Get it back
     cmp.l     d4, d1                  /*  -- was it what we wrote?
     beq.b     $j01                    /* Yes, so try another one...
     move.b    #bdcsr1.ctl.set_diag_loop_bit_4, #bdcsr1 /* Set scope marker bit
     move.b    #bdcsr1.ctl.clr_diag_loop_bit_4, #bdcsr1 /* Clear diag bit
     move.l    0(a0, d3.l), d1         /* Get it back again
     cmp.l     d4, d1                  /*  -- was it what we wrote this time?
     beq.b     $j01                    /* Yes, so try another one...
     bra.b     $loop_on_error          /* Else loop on failing addr for now
$j01:
     dbra      d2, $L02                /* Check the next word
     dbra      d5, $L01                /* Try next pattern until done...

     title     'GLAN Init -- Static Memory data=addrs tests'

     /* Straight data patterns worked -- now try addrs=data, byte-wise
static_data_eq_addr_test:
     movea.l   #adj_reserved_stack_low_addr, a0   /* Point into work area
$L01:
     move.l    #reserved_work_bytes, d2 /* # bytes to check
     bra.b     $j01                    /* Pre-decrement the loop
$L02:    /* Write data=addrs into each static location
     move.l    a0, d0                  /* Get addr for comparison
     move.b    d0, (a0)                /* Low byte of addr becomes test data
     sub.b     (a0)+, d0               /* Get data back now -- did it match?
     beq.b     $j01                    /* Yes, so try another one...
     move.b    #bdcsr1.ctl.set_diag_loop_bit_4, #bdcsr1 /* Set scope marker bit
     move.b    #bdcsr1.ctl.clr_diag_loop_bit_4, #bdcsr1 /* Clear diag bit
     move.b    -(a0), d0               /* Reset failing addr pointer
     bra.b     $L02                    /* Just loop on failing addr for now
$j01:
     dbra      d2, $L02                /* Else check the next byte


          title     'GLAN Init -- Error Save Area init code'
init_error_save_area:
     movea.l   #save_area_reqd_clear_area, a6 /* Point to area to clear out
     move.w    #save_area_reqd_clear_size, d0 /* Clear this many bytes
$L01:
     move.b    #0, (a6)+               /* Clear this byte next
$j01:
     dbra      d0, $L01

          title     'GLAN Init -- Static and Stack init code'

init_static_area:
     /* Static area tested -- now set it up...
     move.l    #fram_static_area, d0    /* Use FRAM until DRAM available
     movea.l   d0, static_area_base_reg /* Static area references are now valid
     movea.l   #fram_stack_top, sp      /* Start stack right below static area
     move.l    sp, usp                  /* Do the user stack pointer, also
     movea.l   sp, a6                   /* Frame pointer -- now we can
                                        /*  do framed calls ('C' too!)
     movea.l   #boot_time_saved_bdcsr, a4 /* Board csr gets saved here...
     move.l    d7, (a4)                 /* Board CSR1 saved at boot time
                                        /* (Also saves CSR2 from boot time)
     move.l    #dram_vector_base, pseudo_vbr /* Load fake VBR if using MC6800x

     move.b    #bdcsr2.ctl.set_prom_high, bdcsr2  /* Now DRAM is available

          title     'GLAN Main setup loop'

     jsr       setup_vectors            /* Write the vector area in low sram
     jsr       init_GICC_mailbox        /* Load up initial commailbox for GICC
     jsr       zero_main_mem            /* Clear out M68K working ram
     jsr       restore_rom_vectors      /* Try to catch interrupts
     jsr       zero_fast_ram            /* Clear out LANCE ram
     jsr       restore_rom_vectors      /* Try to catch interrupts
```

```
     /* Populate the default dump descriptor list for emergency dumps
     movea.l    =ioa$_panic_dump_list, a0 /* Point to our default dump table

     /* Point ram dump table vector to our new default dump list
     move.l     a0, #ioa_dump_list_ptr

     /* WARNING! This setup describes the entire Enet memory space...
     /* Some systems may not support dumps this large!!
     move.w     =0,(a0)+                    /* Say first dump starts at page #0
     move.w     =128,(a0)+                  /* And it's 128 pages long (512Kbytes)
     move.w     =300,(a0)+                  /* Next dump starts in FRAM (page #300)
     move.w     =32,(a0)+                   /* It's 128 Kbytes (32 pages)
     move.w     =-1,(a0)+                   /* Terminate list with negative page #
     move.w     =0,(a0)+                    /* Terminate list with zero page count

/* Patch the following to 4E71x to enable functional tests
     bra.b      skip_functional_tests       /** PATCH ** No-op for full tests
loop_functional_tests:
     nop                                    /* Get op-code for no-op instruction
     jsr        functional_tests            /* Test what we can in little time left
/* Patch the following to 4E71x to disable functional test loop
     bra.b      loop_functional_tests       /** PATCH ** Patch no-op for one pass
skip_functional_tests:                      /* Jump here to skip full tests
     reset                                  /* Reset bus without initing 68000
     jsr        reset_IO                    /* Reset logic which should be quiesced
     jmp        #$L01+eprom_base            /* Change PC to high rom addrs
     nop                                    /* Give it some room...

$L01:
     move.b     =bdcsr2.ctl.set_prom_high, bdcsr2  /* Make hi addrs legal
     move.w     heat_test_blinker_count, d0   /* See if we're in heat test
     bpl.b      $dont_relocate_work_mem   /* we're not, so proceed as normal
     bra.b      $dont_relocate_work_mem   /** PATCH ** Patch to no-op for switch
     jsr        move_working_mem_to_bram /* Get out of fast ram for test reasons
$dont_relocate_work_mem:
     bra.b      init_red_light_toggle_vars          /* Init red light for passes

     use        'static'
current_red_light_state:        ds.b       1 /* Get current red light state
                                ds.b       1 /* For FDPCS assembler
current_red_light_counter:      ds.w       1 /* Setup to count down red light
current_red_light_pat_cnt:      ds.w       1 /* Pattern index count
heat_test_blink_pass_count:     ds.w       1 /* # times light should blink
     use        'code'

heat_test_blinker_count:        dc.w      -1     /* Blink light this many times
                                                 /*  per pass for heat testing
                                                 /* (-1 means NO heat test Looping)
red_light_clear_count:          dc.w    5000x    /* Run this many red light
                                                 /*  clear loops per pass
red_light_set_count:            dc.w     800x    /* Run this many red light set
                                                 /*  loops per pass

     /* Initialize the red light toggle variables
init_red_light_toggle_vars:
     move.w     heat_test_blinker_count, d0    /* Assume we're in heat test
     move.w     d0, heat_test_blink_pass_count /* Setup heat test blink count
     move.b     =bdcsr2.ctl.clr_red_light, d0 /* Assume clearing
     move.b     d0, current_red_light_state    /* Setup current red light state
     move.w     red_light_clear_count, d0      /* Set red light clr loops
     move.w     d0, current_red_light_counter /* Setup to count down red light
     move.w     =0, current_red_light_pat_cnt /* Setup for first pattern

     move.b     =bdcsr1.ctl.clr_force_go_broken, bdcsr1 /* Clear 'Cause Broken'
     move.b     =bdcsr1.ctl.clr_forced_par_err, bdcsr1  /* Clear Forced Parity
     move.b     =bdcsr1.ctl.clr_diag_loop_bit_4, bdcsr1 /* Clear diagnostic bit
     move.b     =bdcsr2.ctl.clr_par_err, bdcsr2         /* Reset parity latches

     /* Clear G_A BROKEN if we're running a heat test loop
     move.w     heat_test_blinker_count, d0    /* See if we're in heat test
     bmi.b      $skip_gate_array_clear_broken /* Neg. loop count means we're not
     move.b     =clr_BK, G_A_wreg0             /* Else clear G-A BROKEN
$still_broken:
     move.b     bdcsr1, d0                     /* Get G-A BROKEN to check it
```

```
     andi.b    =bdcsr1.stat.broken, d0       /* Did G-A BROKEN clear yet?
     bne.b     $still_broken                 /* No, so wait for that to happen
     move.b    =0, G_A_wreg0                 /* Allow BROKEN again
$skip_gate_array_clear_broken:

     /* Always clear BROKEN2
     move.b    =clr_BK2, G_A_wreg0           /* Clear G-A BROKEN 2
$still_broken2:
     move.b    G_A_rreg0, d0                 /* Get G-A BROKEN2 to check it
     andi.b    =G_A_rreg0.stat_p.broken_two, d0 /* Did G-A BROKEN2 clear yet?
     bne.b     $still_broken2                /* No, so wait for that to happen
     move.b    =0, G_A_wreg0                 /* Allow BROKEN2 again

wait_for_intr_loop:      /*   Remainder of rom code is just service stuff...
     move.b    current_red_light_state, d0   /* Get current red light state
     move.b    d0, bdcsr2                    /* Do the Red Light thing
     bra.b     $dont_skip_blinker            /* NO-OP this to skip blinker loop
     bra.w     $skip_blinker                 /* Skip blinker loop, for customer
$dont_skip_blinker:
     move.w    current_red_light_counter, d0 /* Setup to count down red light
     dbra      d0, $l01                      /* Did the counter expire?
     move.b    current_red_light_state, d0   /* Yes, so get current light state
     cmpi.b    =bdcsr2.ctl.clr_red_light, d0 /* Are we clearing it now?
     beq.b     $set_light_for_wait           /* Yes, so start setting it

/* See if we should do heat test funnies (limited loop, then run functional...)
     move.w    heat_test_blinker_count, d0   /* See if we're in heat test
     bmi.b     $clr_light_for_wait      /* we're not, so proceed as normal
     move.w    heat_test_blink_pass_count, d1 /* # times to blink light
     dbra      d1, $dont_rerun_functional /* Should we blink it one more time?
     move.w    d0, heat_test_blink_pass_count /* No, but reset count for
                                        /*  next time
     bra.w     loop_functional_tests    /* Now go run the functional tests
                                        /* (After which we'll be re-init'd)
$dont_rerun_functional:
     move.w    d1, heat_test_blink_pass_count /* Set new count for blink loop

$clr_light_for_wait:      /* Start clearing red light now...
     move.b    =bdcsr2.ctl.clr_red_light, d0 /* Else start clearing it now...
     move.b    d0, current_red_light_state   /* Make it real
     move.w    red_light_set_count, d0       /* Assume set counter val for clr
     move.w    current_red_light_pat_cnt, d1 /* Get current pattern count
     andi.w    =03x, d1                      /* Was it a multiple of 4?
     bne.b     $l01                          /* No, so use short pattern
     move.w    red_light_clear_count, d0     /* Setup new clear counter
     bra.b     $l01                          /* Make it happen!

$set_light_for_wait:      /* Start setting red light now...
     move.w    current_red_light_pat_cnt, d0 /* Get current pattern count
     addi.w    =1, d0                        /* Bump to next one
     move.w    d0, current_red_light_pat_cnt /* Set new pattern count
     move.b    =bdcsr2.ctl.set_red_light, d0 /* Start setting it now...
     move.b    d0, current_red_light_state   /* Make it real
     move.w    red_light_set_count, d0       /* Setup new set counter

$l01:
     move.w    d0, current_red_light_counter /* Either way, update counter now

$skip_blinker:
     jsr       wait_for_interrupt       /* Somebody will call us for service
     bra.w     wait_for_intr_loop       /* Just service everything until the
                                        /*  ram has been loaded and jammed

     /* Reset logic which should be quiesced at test completion
reset_IO:
     jsr       reset_IO_stop_lance      /* Stop lance from accessing the bus
     rts                                /* That's all for now

     /* Initialize parity memory so that inadvertent errors don't occur
ioa$_cc_initialize_memory:

     push.l    d0-d7;a0-a6;             /* we trash 'em all, so save 'em all
     jsr       zero_main_mem
     jsr       zero_fast_ram
     pop.l     d0-d7;a0-a6;             /* Get 'em all back
     rts
```

```
     /* Run a suite of short tests
ioas_run_short_tests:    /* we only have enough time to start-check the LANCE
     jsr        setup_lance_structures   /* Setup LANCE for transmit/receive
     jsr        lance_test_0             /* Stop the LANCE
     jsr        lance_test_1             /* Init the LANCE
     jsr        lance_test_2             /* Start the LANCE
     rts

     /* Call here to execute command already in the MBX, then return to caller
firmware_mbx_call_entry:
     rts

     /* Call here to enter prom from ram prg
firmware_call_entry:
     move.l     sp, #junk_long+static_area_base /* Save caller's stack pointer
     movea.l    =fram_stack_top, sp      /* Start stack right below static area

     /*   Ensure Supervisor mode and no interrupts
     ori        =m68k_no_interrupts, sr  /* Force supervisor and no interrupts
     push.l     #junk_long+static_area_base /* Save caller's stack ptr on stack
     push.l     d0-d7;a0-a6;             /* Save all of caller's stuff

     /* Init registers at boot time
     move.l     =error+eb,               d0   /* Move this value for 'scoping
     move.l     =error_end+eb,           d1   /* Move this value for 'scoping
     move.l     =error_regsave_area,     d2   /* Move this value for 'scoping
     move.l     =gioc_commailbox,        d3   /* Move this value for 'scoping
     move.l     =static_area_base,       d4   /* Move this value for 'scoping
     move.l     =scratch_area_top,       d5   /* Move this value for 'scoping
     move.l     =lance_csr_base,         d0   /* Move this value for 'scoping
     move.l     #bdcsr1&-2,              d7   /* Copy the init time CSRs for
     movea.l    d3,                      a4   /*  later analysis
     movea.l    d4,                      a5   /* Start static area in low mem

     move.l     sp, usp                  /* Do the user stack pointer now
     movea.l    sp, a6                   /* Frame pointer -- now we can
                                         /*  do framed calls ('C' too!)

     move.l     =fram_static_area, d0    /* Use FRAM until DRAM available
     movea.l    d0, static_area_base_reg /* Static area references are now valid

     movea.l    =boot_time_saved_bdcsr, a4 /* Board csr gets saved here...
     move.l     d7, (a4)                 /* Board CSR1 saved at boot time
                                         /* (Also saves CSR2 from boot time)
     move.l     =dram_vector_base, pseudo_vbr /* Load fake VBR if using MC6800x

     /* Now we're ready to execute ROM code -- For now, though, just return...

     pop.l      d0-d7;a0-a6;             /* Restore all of caller except stack
     pop.l      sp                       /* Restore caller's stack pointer
     rts                                 /* And then just go back to caller
     title      'GLAN Main -- Test dispatches'

     /* Test what we can in the little time we have left before GIOC kicks in.
/*functional_tests:
     jsr        control_reg_test_0       /* Test control register bits
     jsr        status_reg_test_0        /* Test status register bits
     jsr        memory_test_0            /* Test all 0's pattern on main mem
     jsr        memory_test_1            /* Test all 1's pattern on main mem
     jsr        memory_test_2            /* Test rotating bit pat on main mem
     jsr        memory_test_3            /* Test main memory parity
     jsr        memory_test_4            /* Test main memory data=addrs
     jsr        memory_test_5            /* Write rotating pat to fast ram
     jsr        memory_test_6            /* Verify fast ram parity logic
     jsr        memory_test_7            /* Data=Addrs to all fast ram bytes
     jsr        restore_rom_vectors      /* Try to catch interrupts
     jsr        Gate_Array_timer_test_0  /* Test TIMER counters and zero timer
     jsr        Gate_Array_timer_test_1  /* Test TIMER interrupt logic & ctrs
/*   jsr         Gate_Array_timer_test_2  /* Test TIMER interrupt mask logic
     jsr        setup_lance_structures   /* Setup LANCE for transmit/receive
     jsr        lance_test_0             /* Stop the LANCE
     jsr        lance_test_1             /* Init the LANCE
     jsr        lance_test_2             /* Start the LANCE
     jsr        lance_test_3             /* Xmit a packet and check flags
```

```
    jsr       lance_test_4             /* Receive xmit'd packet & check flags
    jsr       lance_test_5             /* Test LANCE interrupt logic
    jsr       lance_test_6             /* Test LANCE interrupt mask logic
    rts

    title     'Enet/GLAN Main -- New Dispatcher Test Dispatch Table (TDT)'

        dc.w      tdt.f.sb!tdt.f.us!tdt.f.rp!tdt.f.ro!tdt.f.le!tdt.f.nl

    /* Command list processor entry control flags
equ tdt.ctl_f.null,               0    /* No special cmd list handling req'd
equ tdt.ctl_f.internal,      word_bit_00   /* Internal command only

/*     use  'enet_test_table'

/* new_test_dispatch_table:
adapter_unique_cmd_table:

        /* Test control register bits
        dc.w      ENET_CMD__CONTROL_REG_TEST_0 /* Command value for this test
        dc.w      tdt.ctl_f.null              /* No special command list ops
        dc.l      1                           /* Estimated test runtime in mSec
        dc.w      tdt.f.us!tdt.f.nl           /* Flags: not loopable
        dc.w      0                           /* Required previous test: none
        dc.l      control_reg_test_0              /* Test entry point
        dc.l      Enet_control_reg_test_0.textptr /* --> Textual description

/* ntdt_entry_offset:
adapter_cmd_tbl_entry_offset:

         /* Test status register bits
        dc.w      ENET_CMD__STATUS_REG_TEST_0 /* Command value for this test
        dc.w      tdt.ctl_f.null              /* No special command list ops
        dc.l      1                           /* Estimated test runtime in mSec
        dc.w      tdt.f.us!tdt.f.nl           /* Flags: not loopable
        dc.w      0                           /* Required previous test: none
        dc.l      status_reg_test_0           /* Test entry point
dc.l      Enet_status_reg_test_0.textptr /* --> Textual description

/* Test TIMER counters and zero timer
dc.w      ENET_CMD__TIMER_TEST_0    /* Command value for this test
dc.w      tdt.ctl_f.null           /* No special command list ops
dc.l      1                        /* Estimated test runtime in mSec
dc.w      tdt.f.us!tdt.f.nl        /* Flags: not loopable
dc.w      0                        /* Required previous test: none
dc.l      Gate_Array_timer_test_0  /* Test entry point
dc.l      Enet_timer_test_0.textptr /* --> Text description of above

/* Test TIMER interrupt logic & ctrs
dc.w      ENET_CMD__TIMER_TEST_1    /* Command value for this test
dc.w      tdt.ctl_f.null           /* No special command list ops
dc.l      1                        /* Estimated test runtime in mSec
dc.w      tdt.f.us!tdt.f.nl        /* Flags: not loopable
dc.w      0                        /* Required previous test: none
dc.l      Gate_Array_timer_test_1  /* Test entry point
dc.l      Enet_timer_test_1.textptr /* --> Text description of above

/* Test TIMER interrupt mask logic
dc.w      ENET_CMD__TIMER_TEST_2    /* Command value for this test
dc.w      tdt.ctl_f.null           /* No special command list ops
dc.l      1                        /* Estimated test runtime in mSec
dc.w      tdt.f.us!tdt.f.nl        /* Flags: not loopable
dc.w      0                        /* Required previous test: none
dc.l      Gate_Array_timer_test_2  /* Test entry point
dc.l      Enet_timer_test_2.textptr /* --> Text description of above

/* Test all 0's pattern on main mem
dc.w      ENET_CMD__MEMORY_TEST_0   /* Command value for this test
dc.w      tdt.ctl_f.null           /* No special command list ops
dc.l      1                        /* Estimated test runtime in mSec
dc.w      tdt.f.us!tdt.f.nl        /* Flags: not loopable
dc.w      0                        /* Required previous test: none
dc.l      memory_test_0            /* Test entry point
dc.l      Enet_memory_test_0.textptr /* --> Text description of above
```

```
/* Test all 1's pattern on main mem
dc.w      ENET_CMD__MEMORY_TEST_1   /* Command value for this test
dc.w      tdt.ctl_f.null            /* No special command list ops
dc.l      1                         /* Estimated test runtime in mSec
dc.w      tdt.f.us!tdt.f.nl         /* Flags: not loopable
dc.w      0                         /* Required previous test: none
dc.l      memory_test_1             /* Test entry point
dc.l      Enet_memory_test_1.textptr /* --> Text description of above

/* Test rotating bit pat on main mem
dc.w      ENET_CMD__MEMORY_TEST_2   /* Command value for this test
dc.w      tdt.ctl_f.null            /* No special command list ops
dc.l      1                         /* Estimated test runtime in mSec
dc.w      tdt.f.us!tdt.f.nl         /* Flags: not loopable
dc.w      0                         /* Required previous test: none
dc.l      memory_test_2             /* Test entry point
dc.l      Enet_memory_test_2.textptr /* --> Text description of above

/* Test main memory parity
dc.w      ENET_CMD__MEMORY_TEST_3   /* Command value for this test
dc.w      tdt.ctl_f.null            /* No special command list ops
dc.l      1                         /* Estimated test runtime in mSec
dc.w      tdt.f.us!tdt.f.nl         /* Flags: not loopable
dc.w      0                         /* Required previous test: none
dc.l      memory_test_3             /* Test entry point
dc.l      Enet_memory_test_3.textptr /* --> Text description of above

/* Test main memory data=addrs
dc.w      ENET_CMD__MEMORY_TEST_4   /* Command value for this test
dc.w      tdt.ctl_f.null            /* No special command list ops
dc.l      1                         /* Estimated test runtime in mSec
dc.w      tdt.f.us!tdt.f.nl         /* Flags: not loopable
dc.w      0                         /* Required previous test: none
dc.l      memory_test_4             /* Test entry point
dc.l      Enet_memory_test_4.textptr /* --> Text description of above

/* Write rotating pat to fast ram
dc.w      ENET_CMD__MEMORY_TEST_5   /* Command value for this test
dc.w      tdt.ctl_f.null            /* No special command list ops
dc.l      1                         /* Estimated test runtime in mSec
dc.w      tdt.f.us!tdt.f.nl         /* Flags: not loopable
dc.w      0                         /* Required previous test: none
dc.l      memory_test_5             /* Test entry point
dc.l      Enet_memory_test_5.textptr /* --> Text description of above

/* Verify fast ram parity logic
dc.w      ENET_CMD__MEMORY_TEST_6   /* Command value for this test
dc.w      tdt.ctl_f.null            /* No special command list ops
dc.l      1                         /* Estimated test runtime in mSec
dc.w      tdt.f.us!tdt.f.nl         /* Flags: not loopable
dc.w      0                         /* Required previous test: none
dc.l      memory_test_6             /* Test entry point
dc.l      Enet_memory_test_6.textptr /* --> Text description of above

/* Data=Addrs to all fast ram bytes
dc.w      ENET_CMD__MEMORY_TEST_7   /* Command value for this test
dc.w      tdt.ctl_f.null            /* No special command list ops
dc.l      1                         /* Estimated test runtime in mSec
dc.w      tdt.f.us!tdt.f.nl         /* Flags: not loopable
dc.w      0                         /* Required previous test: none
dc.l      memory_test_7             /* Test entry point
dc.l      Enet_memory_test_7.textptr /* --> Text description of above

/* Try to catch interrupts
dc.w      ENET_CMD__RESTORE_ROM_VECTORS /* Command value for this test
dc.w      tdt.ctl_f.internal        /* Internal command only!!
dc.l      1                         /* Estimated test runtime in mSec
dc.w      tdt.f.nl                  /* Flags: not loopable
dc.w      0                         /* Required previous test: none
dc.l      restore_rom_vectors       /* Test entry point
dc.l      0                         /* No Text Required for this test

/* Setup LANCE for transmit/receive
dc.w      ENET_CMD__LANCE_SETUP     /* Command value for this test
```

```
dc.w      tdt.ctl_f.null              /* No special command list ops
dc.l      1                           /* Estimated test runtime in mSec
dc.w      tdt.f.nl                    /* Flags: not loopable
dc.w      0                           /* Required previous test: none
dc.l      setup_lance_structures      /* Test entry point
dc.l      Enet_lance_setup.textptr    /* --> Text description of above

/* Stop the LANCE
dc.w      ENET_CMD__LANCE_TEST_0      /* Command value for this test
dc.w      tdt.ctl_f.null              /* No special command list ops
dc.l      1                           /* Estimated test runtime in mSec
dc.w      tdt.f.nl                    /* Flags: not loopable
dc.w      0                           /* Required previous test: none
dc.l      lance_test_0                /* Test entry point
dc.l      Enet_lance_test_0.textptr   /* --> Text description of above

/* Init the LANCE
dc.w      ENET_CMD__LANCE_TEST_1      /* Command value for this test
dc.w      tdt.ctl_f.null              /* No special command list ops
dc.l      1                           /* Estimated test runtime in mSec
dc.w      tdt.f.rp!tdt.f.nl           /* Flags: not loopable, needs prev
dc.w      ENET_CMD__LANCE_TEST_0      /* Required previous test
dc.l      lance_test_1                /* Test entry point
dc.l      Enet_lance_test_1.textptr   /* --> Text description of above

/* Start the LANCE
dc.w      ENET_CMD__LANCE_TEST_2      /* Command value for this test
dc.w      tdt.ctl_f.null              /* No special command list ops
dc.l      1                           /* Estimated test runtime in mSec
dc.w      tdt.f.rp!tdt.f.nl           /* Flags: not loopable, needs prev
dc.w      ENET_CMD__LANCE_TEST_1      /* Required previous test
dc.l      lance_test_2                /* Test entry point
dc.l      Enet_lance_test_2.textptr   /* --> Text description of above

/* Xmit a packet and check flags
dc.w      ENET_CMD__LANCE_TEST_3      /* Command value for this test
dc.w      tdt.ctl_f.null              /* No special command list ops
dc.l      1                           /* Estimated test runtime in mSec
dc.w      tdt.f.rp!tdt.f.nl           /* Flags: not loopable, needs prev
dc.w      ENET_CMD__LANCE_TEST_2      /* Required previous test
dc.l      lance_test_3                /* Test entry point
dc.l      Enet_lance_test_3.textptr   /* --> Text description of above

/* Receive xmit'd packet & check flags
dc.w      ENET_CMD__LANCE_TEST_4      /* Command value for this test
dc.w      tdt.ctl_f.null              /* No special command list ops
dc.l      1                           /* Estimated test runtime in mSec
dc.w      tdt.f.rp!tdt.f.nl           /* Flags: not loopable, needs prev
dc.w      ENET_CMD__LANCE_TEST_3      /* Required previous test
dc.l      lance_test_4                /* Test entry point
dc.l      Enet_lance_test_4.textptr   /* --> Text description of above

/* Test LANCE interrupt logic
dc.w      ENET_CMD__LANCE_TEST_5      /* Command value for this test
dc.w      tdt.ctl_f.null              /* No special command list ops
dc.l      1                           /* Estimated test runtime in mSec
dc.w      tdt.f.rp!tdt.f.nl           /* Flags: not loopable, needs prev
dc.w      ENET_CMD__LANCE_TEST_4      /* Required previous test
dc.l      lance_test_5                /* Test entry point
dc.l      Enet_lance_test_5.textptr   /* --> Text description of above

/* Test LANCE interrupt mask logic
dc.w      ENET_CMD__LANCE_TEST_6      /* Command value for this test
dc.w      tdt.ctl_f.null              /* No special command list ops
dc.l      1                           /* Estimated test runtime in mSec
dc.w      tdt.f.rp!tdt.f.nl           /* Flags: not loopable, needs prev
dc.w      ENET_CMD__LANCE_TEST_5      /* Required previous test
dc.l      lance_test_6                /* Test entry point

dc.l      Enet_lance_test_6.textptr   /* --> Text description of above

/* Test LANCE External Loopback facility
dc.w      ENET_CMD__LANCE_TEST_7      /* Command value for this test
dc.w      tdt.ctl_f.null              /* No special command list ops
```

```
        dc.l      5                           /* Estimated test runtime in mSec
        dc.w      tdt.f.nl                    /* Flags: not loopable
        dc.w      0                           /* No required previous test
        dc.l      lance_test_7                /* Test entry point
        dc.l      Enet_lance_test_7.textptr /* --> Text description of above

/* new_test_dispatch_table_end:
adapter_unique_cmd_table_end:
        ds.l      0

    use  'code'

    /* Adapter-Unique Command Table general constants
/* equ  ntdt_entry_size,    ntdt_entry_offset-new_test_dispatch_table
/* equ  ntdt_size, new_test_dispatch_table_end-new_test_dispatch_table
/* equ  new_test_dispatch_table_size, ntdt_size
/* equ  ntdt_ent_cnt, new_test_dispatch_table_size/new_IOA_cmd_tbl_ent_size
/* equ  new_test_dispatch_tbl_ent_cnt, ntdt_ent_cnt

    use  'enet_test_tbl_text'

Enet_control_reg_test_0.textptr:   charv  'Control register bits & function'
Enet_status_reg_test_0.textptr:    charv  'Status register bits & function'
Enet_timer_test_0.textptr:         charv  'TIMER zero timer & test counters'
Enet_timer_test_1.textptr:         charv  'TIMER interrupt logic & counters'
Enet_timer_test_2.textptr:         charv  'TIMER interrupt mask logic'
Enet_timer_test_3.textptr:         charv  'G_A TIMER intervals'
Enet_timer_test_4.textptr:         charv  'G_A TIMER interrupts '
Enet_timer_test_5.textptr:         charv  'G_A TIMER interrupt mask logic'
Enet_memory_test_0.textptr:        charv  'All 0''s pattern on main mem'
Enet_memory_test_1.textptr:        charv  'Test all 1''s pattern on main mem'
Enet_memory_test_2.textptr:        charv  'Rotating bit pat on main mem'
Enet_memory_test_3.textptr:        charv  'Main memory parity'
Enet_memory_test_4.textptr:        charv  'Main memory data=addrs'
Enet_memory_test_5.textptr:        charv  'Rotating pat to fast ram'
Enet_memory_test_6.textptr:        charv  'Verify fast ram parity logic'
Enet_memory_test_7.textptr:        charv  'Data=Addrs to all fast ram bytes'
Enet_lance_setup.textptr:          charv  'Setup LANCE for transmit/receive'
Enet_lance_test_0.textptr:         charv  'Stop the LANCE'
Enet_lance_test_1.textptr:         charv  'Init the LANCE'
Enet_lance_test_2.textptr:         charv  'Start the LANCE'
Enet_lance_test_3.textptr:         charv  'Xmit a packet and check flags'
Enet_lance_test_4.textptr:         charv 'Receive xmit''d packet & check flags'
Enet_lance_test_5.textptr:         charv  'LANCE interrupt logic'
Enet_lance_test_6.textptr:         charv  'LANCE interrupt mask logic'
Enet_lance_test_7.textptr:         charv  'LANCE external loopback'

    use  'code'

equ  tdt.flags.sets_brk,     word_bit_00     /* 1 = This test sets BROKEN
equ  tdt.flags.upd_sts,      word_bit_01     /* 1 = This test can update
                                             /*  status while running
equ  tdt.flags.req_prev,     word_bit_02     /* 1 = This test requires
equ  tdt.flags.req_opr,      word_bit_03     /* 1 = This test requires
                                             /*  intervention by an
                                             /*  operator to execute
equ  tdt.flags.loop_errs,    word_bit_04     /* 1 = This test loops
                                             /*  forever if an error occurs
equ  tdt.flags.not_loopable, word_bit_05     /* 1 = This test cannot loop
                                             /*  on error even if requested

equ  tdt.f.sb, tdt.flags.sets_brk            /* Shorthand version of same
equ  tdt.f.us, tdt.flags.upd_sts             /* Shorthand version of same
equ  tdt.f.rp, tdt.flags.req_prev            /* Shorthand version of same
equ  tdt.f.ro, tdt.flags.req_opr             /* Shorthand version of same
equ  tdt.f.le, tdt.flags.loop_errs           /* Shorthand version of same
equ  tdt.f.nl, tdt.flags.not_loopable        /* Shorthand version of same

    use      'code'

    title    'Enet/GLAN Main -- Old test dispatch table'

test_dispatch_table:
/*   dc.l     control_reg_test_0        /* Test control register bits
```

```
/*      dc.l        status_reg_test_0            /* Test status register bits
        dc.l        memory_test_0                /* Test all 0's pattern on main mem
        dc.l        memory_test_1                /* Test all 1's pattern on main mem
        dc.l        memory_test_2                /* Test rotating bit pat on main mem
        dc.l        memory_test_3                /* Test main memory parity
        dc.l        memory_test_4                /* Test main memory data=addrs
        dc.l        memory_test_5                /* Test fram parity
        dc.l        memory_test_6                /* Test fram
        dc.l        memory_test_7                /* Test fram
        dc.l        restore_rom_vectors          /* Try to catch interrupts
        dc.l        Gate_Array_timer_test_0      /* Test TIMER counters and zero timer
        dc.l        Gate_Array_timer_test_1      /* Test TIMER interrupt logic & ctrs
/*      dc.l        Gate_Array_timer_test_2      /* Test TIMER interrupt mask logic
/*      dc.l        timer_test_0                 /* Test TIMER counters and zero timer
/*      dc.l        timer_test_1                 /* Test TIMER interrupt logic & ctrs
/*      dc.l        timer_test_2                 /* Test TIMER interrupt mask logic
        dc.l        setup_lance_structures       /* Setup LANCE for transmit/receive
        dc.l        lance_test_0                 /* Stop the LANCE
        dc.l        lance_test_1                 /* Init the LANCE
        dc.l        lance_test_2                 /* Start the LANCE
        dc.l        lance_test_3                 /* Xmit a packet and check flags
        dc.l        lance_test_4                 /* Receive xmit'd packet & check flags
        dc.l        lance_test_5                 /* Test LANCE interrupt logic
        dc.l        lance_test_6                 /* Test LANCE interrupt mask logic
test_dispatch_last_test_addr:
        dc.l        lance_test_7                 /* Test LANCE external loopback
test_dispatch_table_end:
        dc.w        0

equ   dispatch_table_count, (test_dispatch_table_end-test_dispatch_table)/4
equ   max_test_offset, test_dispatch_last_test_addr-test_dispatch_table
equ   dispatch_table_max_test, max_test_offset/4

        title       'Enet Main -- Test dispatches'

        /* Run every test in the sequence, then return (assuming no errors)
functional_tests:
        move.w      =dispatch_table_max_test, d1       /* Get zero-based test count
$next_test:
        move.w      =dispatch_table_max_test, d0       /* Get new test base
        sub.w       d1, d0                       /* Find next test number
        movea.l     =error_regsave_area, a0      /* Point to start of reg. save area
        move.w      d0, saved_error.test_number(a0) /* Save test number for errors
        push.w      d1                           /* Save test count for later
        jsr         dispatcher                   /* Now dispatch to the desired test
        pop.w       d1                           /* Get back old test number
        dbra        d1, $next_test               /* Go on to next test if any are left
        rts

        title       'UCOMM Main -- Test dispatcher'
dispatcher:
        /* Run the test specified in D0
        cmp.w       =dispatch_table_count, d0          /* was test number too high?
        blt.b       valid_test_number                  /* Nope, so call the test

        /* Test too high -- handle an error
invalid_test_number:
        stop        =m68k_no_interrupts                /*** Gawd! *** This is fatal!!!

        /* Get the EEPROM offset to the selected test specified by D0
valid_test_number:
        asl.w       =2, d0                       /* Mul by 4 for indexed table pointer
        lea         test_dispatch_table, a0      /* Get pointer to start of table
        movea.l     0(a0,d0.w), a0               /* Get test ptr in an addr reg for JSR
        move.l      =eprom_base, d6              /* Compensate for relocated prom
        jmp         0(a0, d6.l)                  /* Call test -- should return to caller

        title       'GLAN Main -- GIOC mailbox Interrupt service'

        /*   Just wait for somebody to call us for service -- For
        /*   the time being, interrupts are no longer used, but
        /*   rather the mailbox is simply examined by polling.
```

```
wait_for_interrupt:
wait_for_GIOC_command:
     move.b    =bdcsr2.ctl.inhibit_all_intr, bdcsr2 /* Inhibit all interrupts
     move.b    =bdcsr2.ctl.dsabl_lance_intr, bdcsr2 /* No LANCE chip interrupts
     move.b    =bdcsr2.ctl.dsabl_g_a_intr, bdcsr2   /* Disable GIOC commands
     jsr       check_GIOC_mailbox        /* See if a command needs service...
     rts

iop_interrupt_catcher:   /* Catch commands from the GIOC
     jsr       check_GIOC_mailbox        /* See if a command needs service...
     rte                                 /* Command already serviced if given

     title     'GLAN Main -- Local (Enet) command dispatch and service'
/* *************************************************************************
     /* Equates for short lines
equ  auct,     adapter_unique_cmd_table
equ  aucte,    adapter_unique_cmd_table_end
equ  acteo,    adapter_cmd_tbl_entry_offset
     /* Size in bytes of a command entry
equ  adapter_cmd_table_ent_size,   acteo - auct
     /* Size of entire table in bytes
equ  adapter_cmd_table_size,       aucte - auct
     /* # commands in table
equ  adapter_cmd_table_cnt, adapter_cmd_table_size/adapter_cmd_table_ent_size

     /* Post mailbox interrupt to GIOC -- adapter-specific mailbox operation
     /* (Tell the GIOC to look at the mailbox...)
post_mbx_intr_to_gioc:
     move.b    =mbx_to_iop_intr_code, G_A_wreg2 /* Set GIOC Command Intr PULSE
     rts       /* Hey, that's all!

     /* Disable local interrupts using local hardware (masks) if available
disable_local_interrupts:
     move.w    =m68k_no_interrupts, sr              /* Ensure no interrupts
     move.b    =bdcsr2.ctl.inhibit_all_intr, bdcsr2 /* Inhibit all interrupts
     move.b    =bdcsr2.ctl.dsabl_lance_intr, bdcsr2 /* No LANCE chip interrupts
     move.b    =bdcsr2.ctl.dsabl_g_a_intr, bdcsr2   /* Disable GIOC commands
     rts

/* *************************************************************************

     use       'static'
unknown_device_interrupted_flag:   dc.l 0    /* <>0 if unknown device interrupt
error_loop_exit_flag:          dc.w 0    /* -1 = Exit error hdlr if scoping done
pseudo_vbr:                    dc.l 0    /* Vector area pointer for MC6800x's
junk_long:                     dc.l 0    /* Junk longword, aligned
local_junk:                    dc.l 0    /* Junk longword for error handler
     use       'code'

     incl      'ioa_error_handler.code' /* Bring in generic error handler
                                        /* File #9

     title     'Error Handler -- Local error handling routines'

equ  diag_bit_4_on, bdcsr1.ctl.set_diag_loop_bit_4     /* Set scope marker bit
equ  diag_bit_4_off, bdcsr1.ctl.clr_diag_loop_bit_4    /* Clear diag bit

     /*   This is the local error handler for the LANCE rom.  On
     /*   error  it  checks the saved test control flags word to
     /*   determine whether looping on error is required or not.
     /*   If not, then the handler simply enters a 'scope  loop'
     /*   which  allows for a logic analyzer or scope to display
     /*   the address of the failing test --  this  option  will
     /*   not  currently  return  to  the  caller  of  the error
     /*   handler, and so it takes liberties with the stack  and
     /*   other storage locations.  If, however, 'loop on error'
     /*   is  selected for the erring test, the error address is
     /*   scanned only once and  then  the  calling  process  is
     /*   returned  to.  In this way, the caller can implement a
     /*   jmp to continuation code, or terminate as it chooses.

local_error_handler:
     pop.l     a1                       /* Get return address from stack
     pop.l     a2                       /* Get adj. error address from stack
```

```
        push.l    a1                          /* Put return address on now
        push.l    a2                          /* Put error address into working store
        lea       error, a4                   /* Get starting addr of error routine
        move.l    a4, local_junk              /* Just move it on bus for analyzer
        lea       error_end, a4               /* Get ending addr of error routine
        move.l    a4, local_junk              /* Just move it on bus for analyzer

        move.w    =0, local_junk              /* Assume error handler will loop
        move.w    saved_error.test_ctl_flags, d0 /* Get saved test control flags
        andi.w    =tdt.f.le!tdt.f.nl, d0      /* Does this test want to loop?
        beq.b     $j01                        /* No, so handle error in a loop
        andi.w    =tdt.f.nl, d0               /* Is this test allowed to loop?
        bne.b     $j01                        /* No, so handle error in a loop
        move.w    =-1, local_junk             /* Indicate error handler will return
$j01:

error_halt_loop:    /* This scope loop toggles the Diag Loop Bit #4
                    /*  for frame sync

        move.l    ='F1234567'b4, d5           /* Something easy for logic analyzers..
        move.b    =diag_bit_4_off, #bdcsr1    /* Clear diag bit
        move.l    (sp), d5                    /* Get adjusted pc for bus scoping
        move.b    =diag_bit_4_on, #bdcsr1     /* Set scope marker bit
        move.w    local_junk, d0              /* Should we return to our caller?
        beq.b     error_halt_loop             /* No, stay in local error report loop

        pop.l     d0                          /* Just pop error address off stack
        rts                                   /* Return to main error handler now

        /* Clear 'BROKEN2' flag now in both Gate Arrays
ioa_tcls_clear_broken_2:
        move.b    =clr_BN2, G_A_wreg0
        rts

        /* Make this board go BROKEN
ioa_tcls_board_go_broken:
make_board_go_broken:
        move.b    =bdcsr1.ctl.force_go_broken, bdcsr1 /* Break board manually
        rts

        /* Inhibit all interrupts
ioa_tcli_hw_inhibit_all:
        move.b    =bdcsr2.ctl.inhibit_all_intr, bdcsr2
        rts

error_end:      /* For logic analyzer.


/* Files #x-y:
        incl      'ioa_enet_mem_tsts.code' /* Bring in some memory test code
        incl      'ioa_enet_7990tsts.code' /* Bring in the LANCE chip test code
        incl      'ioa_enet_tmr_tsts.code' /* Bring in the Gate Array timer tests
        incl      'ioa_enet_csr_tsts.code' /* Bring in the GLAN board CSR tests
        incl      'ioa_enet_inthdlrs.code' /* Bring in remaining interrupt hdlrs
        incl      'ioa_enet_utils.code'    /* Bring in the common utility routines
        incl      'ioa_dump_handler.code'  /* Bring in the common dump handler
        incl      'adapter_test_equates'   /* Bring in the common test codes
        incl      'adapter_error_equates'  /* Bring in the common error codes
        incl      'ioa_mbx_handler.code'   /* Get the GIOC<-->adapter mailbox defs

        title     'Section equates'

        join      'code','enet_test_table'
        join      'code','enet_test_tbl_text'

/*      NOTE!!  These static allocations MUST BE THE LAST ONES
/*      joined  to  the  'static'  area,  as  they contain the
/*      boundary marker info for the end of the  static  area.
/*      Since  the static area is relocated to ram before use,
/*      this value is critical in determining how  much  space
/*      to allocate in ram for the static area...
```

```
     use        'static'
     dc.l       0    /* Ensure static area is long-aligned
static_end:
     dc.l       0    /* Boundary marker of static area
equ  static_area_size,   static_end-static_origin
     use        'code'
end


/*   ***begin copyright*** ******************************   */
/*                                                          */
/*   STRATUS CONFIDENTIAL INFORMATION: CLASS II             */
/*   COPYRIGHT (c) Stratus Computer, Inc. 1986              */
/*                                                          */
/*   This program contains confidential and proprietary     */
/*   information of Stratus Computer, Inc., and any         */
/*   reproduction, disclosure, or use in whole or in part   */
/*   is expressly prohibited, except as may be              */
/*   specifically authorized by prior written agreement or  */
/*   permission of Stratus.                                 */
/*                                                          */
/*   ***end copyright*** ********************************   */

/* IOP_INTERRUPT_HANDLER: This module sits at virtual
/* address 0, to handle faults and interrupts
/* Beginning of modification history
/* End of modification history


     eject
/*      incl       'ioa _mc'
/* Begin include file ...iop_mc.incl.asm
/* Generated at 86-04-02 11:48:02 EST by cv_incl Release 5an from
/*      %es#m8>Stratus>Tom_Moser>iop>iop_mc.incl.pl1.

     use        'mc',dummy
mc:
mc.identifier:                                      ds.b 4
mc.ioa_slot:                                        ds.b 4
mc.usp:                                             ds.b 4
mc.d:                                               ds.b 4
     equ        mc.d.length,4
                                                    ds.b 28
     equ        mc.d.dim,8
mc.a:                                               ds.b 4
     equ        mc.a.length,4
                                                    ds.b 24
     equ        mc.a.dim,7
mc.int_sr:
                                                    ds.b 2
mc.status:
                                                    ds.b 2
mc.pc:                                              ds.b 4
mc.info:
mc.info.extended_fmt.byte:
     equ        mc.info.extended_fmt.bit,15
     equ        mc.info.extended_fmt.mask,'8000'b4
mc.info.mbz:
     equ        mc.info.mbz.bit,12
     equ        mc.info.mbz.mask,'7000'b4
mc.info.vector:
     equ        mc.info.vector.bit,0
     equ        mc.info.vector.mask,'0FFF'b4
                                                    ds.b 2
     equ        mc.info.length,2
     equ        mc.length,80
     use        'code'
     use        'berr_mc',dummy
berr_mc:
berr_mc.identifier:                                 ds.b 4
berr_mc.ioa_slot:                                   ds.b 4
berr_mc.usp:                                        ds.b 4
berr_mc.d:                                          ds.b 4
     equ        berr_mc.d.length,4
                                                    ds.b 28
```

```
     equ        berr_mc.d.dim,8
berr_mc.a:                                            ds.b 4
     equ        berr_mc.a.length,4
                                                      ds.b 24
     equ        berr_mc.a.dim,7
berr_mc.int_sr:
                                                      ds.b 2
berr_mc.status:
                                                      ds.b 2
berr_mc.pc:                                           ds.b 4
berr_mc.info:
berr_mc.info.extended_fmt.byte:
     equ        berr_mc.info.extended_fmt.bit,15
     equ        berr_mc.info.extended_fmt.mask,'8000'b4
berr_mc.info.mbz:
     equ        berr_mc.info.mbz.bit,12
     equ        berr_mc.info.mbz.mask,'7000'b4
berr_mc.info.vector:
     equ        berr_mc.info.vector.bit,0
     equ        berr_mc.info.vector.mask,'0FFF'b4
                                                      ds.b 2
     equ        berr_mc.info.length,2
berr_mc.special_status:
berr_mc.special_status.rerun.byte:
     equ        berr_mc.special_status.rerun.bit,15
     equ        berr_mc.special_status.rerun.mask,'8000'b4
berr_mc.special_status.pad1.byte:
     equ        berr_mc.special_status.pad1.bit,14
     equ        berr_mc.special_status.pad1.mask,'4000'b4
berr_mc.special_status.inst_fetch.byte:
     equ        berr_mc.special_status.inst_fetch.bit,13
     equ        berr_mc.special_status.inst_fetch.mask,'2000'b4
berr_mc.special_status.data_fetch.byte:
     equ        berr_mc.special_status.data_fetch.bit,12
     equ        berr_mc.special_status.data_fetch.mask,'1000'b4
berr_mc.special_status.r_m_w_cycle.byte:
     equ        berr_mc.special_status.r_m_w_cycle.bit,11
     equ        berr_mc.special_status.r_m_w_cycle.mask,'0800'b4
berr_mc.special_status.high_byte.byte:
     equ        berr_mc.special_status.high_byte.bit,10
     equ        berr_mc.special_status.high_byte.mask,'0400'b4
berr_mc.special_status.byte_xfer.byte:
     equ        berr_mc.special_status.byte_xfer.bit,9
     equ        berr_mc.special_status.byte_xfer.mask,'0200'b4
berr_mc.special_status.read.byte:
     equ        berr_mc.special_status.read.bit,8
     equ        berr_mc.special_status.read.mask,'0100'b4
                                                      ds.b 1
berr_mc.special_status.pad2:
     equ        berr_mc.special_status.pad2.bit,3
     equ        berr_mc.special_status.pad2.mask,'00F8'b4
berr_mc.special_status.function_code:
     equ        berr_mc.special_status.function_code.bit,0
     equ        berr_mc.special_status.function_code.mask,'0007'b4
                                                      ds.b 1
     equ        berr_mc.special_status.length,2
berr_mc.fault_addr:                                   ds.b 4
berr_mc.resv_data_out:
                                                      ds.b 2
berr_mc.data_out:
                                                      ds.b 2
berr_mc.resv_data_in:
                                                      ds.b 2
berr_mc.data_in:
                                                      ds.b 2
berr_mc.resv_inst:
                                                      ds.b 2
berr_mc.instruction_reg:
                                                      ds.b 2
berr_mc.internal_info:                                ds.b 2
     equ        berr_mc.internal_info.length,2
                                                      ds.b 30
     equ        berr_mc.internal_info.dim,16
     equ        berr_mc.length,132
     use        'code'
```

```
/* End include file ...iop_mc.incl.asm
   eject
/*      incl      'status_register_ma sks'
/* BEGIN INCLUDE FILE ... status_register_masks.incl.asm
/*
/* Written 810324 by PG
/*
/* This include file exists because the BTST, BSET,
/* and BCLR instructions do not work on the status
/* or condition code register...only the ANDI, ORI,
/* EORI, and MOVE instructions do.

/* OBSOLETE -- see below

/* The new cv_incl tool produces masks, so use of this file
/* is discouraged in favor of status_register.incl.asm
/* which is updated for new cpu types

   equ       sr.trace,             8000x
   equ       sr.kernel,            2000x
   equ       sr.interrupt_mask,    0700x
   equ       sr.extend,            0010x
   equ       sr.negative,          0008x
   equ       sr.zero,              0004x
   equ       sr.overflow,          0002x
   equ       sr.carry,             0001x

   equ       sr.unused_bits_mask,58E0x

/* END INCLUDE FILE ... status_register_masks.incl.asm
   eject
/*      incl      'fault_co ces'
/* Begin include file ...fault_codes.incl.asm
/* Generated at 86-07-14 16:38:28 EDT by cv_incl Release 5ah from
/*      %es#m6>Stratus>Tom_Clark>fresco>68881>incl>fault_codes.incl.pl1.

   equ       UNASSIGNED_VECTOR_0,0
   equ       RESET,1
   equ       PAGE_FAULT,2
   equ       ADDRESS_ERROR,3
   equ       ILLEGAL_INSTRUCTION,4
   equ       ZERO_DIVIDE,5
   equ       CHK_INSTRUCTION,6
   equ       TRAPV_INSTRUCTION,7
   equ       PRIVILEGE_VIOLATION,8
   equ       TRACE,9
   equ       LINE_1010_EMULATOR,10
   equ       LINE_1111_EMULATOR,11
   equ       UNASSIGNED_VECTOR_12,12
   equ       COPROC_PROTOCOL_VIOLATION,13
   equ       FORMAT_ERROR,14
   equ       UNINITIALIZED_INTERRUPT_VECTOR,15
   equ       UNASSIGNED_VECTOR_16,16
   equ       UNASSIGNED_VECTOR_17,17
   equ       UNASSIGNED_VECTOR_18,18
   equ       UNASSIGNED_VECTOR_19,19
   equ       UNASSIGNED_VECTOR_20,20
   equ       UNASSIGNED_VECTOR_21,21
   equ       UNASSIGNED_VECTOR_22,22
   equ       UNASSIGNED_VECTOR_23,23
   equ       SPURIOUS_INTERRUPT,24
   equ       LEVEL_1_AUTOVECTOR,25
   equ       LEVEL_2_AUTOVECTOR,26
   equ       LEVEL_3_AUTOVECTOR,27
   equ       LEVEL_4_AUTOVECTOR,28
   equ       LEVEL_5_AUTOVECTOR,29
   equ       LEVEL_6_AUTOVECTOR,30
   equ       LEVEL_7_AUTOVECTOR,31
   equ       TRAP_0_INSTRUCTION,32
   equ       TRAP_1_INSTRUCTION,33
   equ       TRAP_2_INSTRUCTION,34
   equ       TRAP_3_INSTRUCTION,35
   equ       TRAP_4_INSTRUCTION,36
   equ       TRAP_5_INSTRUCTION,37
```

```
      equ        TRAP_6_INSTRUCTION,38
      equ        TRAP_7_INSTRUCTION,39
      equ        TRAP_8_INSTRUCTION,40
      equ        TRAP_9_INSTRUCTION,41
      equ        TRAP_10_INSTRUCTION,42
      equ        TRAP_11_INSTRUCTION,43
      equ        TRAP_12_INSTRUCTION,44
      equ        TRAP_13_INSTRUCTION,45
      equ        TRAP_14_INSTRUCTION,46
      equ        TRAP_15_INSTRUCTION,47
      equ        BRANCH_SET_ON_UNORDERED,48
      equ        INEXACT_RESULT,49
      equ        FP_DIVIDE_BY_ZERO,50
      equ        UNDERFLOW,51
      equ        OPERAND_ERROR,52
      equ        OVERFLOW,53
      equ        SIGNALLING_NAN,54
      equ        UNASSIGNED_VECTOR_55,55
      equ        UNASSIGNED_VECTOR_56,56
      equ        UNASSIGNED_VECTOR_57,57
      equ        UNASSIGNED_VECTOR_58,58
      equ        UNASSIGNED_VECTOR_59,59
      equ        UNASSIGNED_VECTOR_60,60
      equ        UNASSIGNED_VECTOR_61,61
      equ        UNASSIGNED_VECTOR_62,62
      equ        UNASSIGNED_VECTOR_63,63
      equ        BAD_KERNEL_CALL,64
      equ        PRIVILEGED_CALL,65
      equ        PROGRAM_INTERRUPT,66
      equ        SAP_EXCEPTION,67

/* End include file ...fault_codes.incl.asm
      eject
/*      incl       'ioa_hardware_defs'
/*    ***begin copyright*** ******************************    */
/*                                                            */
/*    STRATUS CONFIDENTIAL INFORMATION: CLASS II              */
/*    COPYRIGHT (c) Stratus Computer, Inc. 1985               */
/*                                                            */
/*    This  program  contains  confidential and proprietary   */
/*    information  of  Stratus Computer,  Inc.,   and   any   */
/*    reproduction,  disclosure, or use in whole or in part   */
/*    is   expressly   prohibited,   except   as   may   be   */
/*    specifically authorized by prior written agreement or   */
/*    permission of Stratus.                                  */
/*                                                            */
/*    ***end copyright*** ********************************    */
/*      title      'IOP hardware definitions'

equ  ioa_map_table_start,      00EFC000x
equ  offset_user_start,  00000700x        /* '00EFC700'b4
equ  offset_user_end,    00002F9Cx        /* '00EFEF9C'b4
equ  offset_table_end,   00002FECx        /* '00EFEFEC'b4

equ  readable,  '00008000'b4  /* readable page
equ  writeable, '00004000'b4  /* writeable page
equ  priv,      '00002000'b4  /* privileged
equ  local,     '00001000'b4  /* local memory
equ  interlock, '00000800'b4  /* interlock
equ  io_access, '00000400'b4  /* access to vos
equ  dma,       '00000200'b4  /* dma access
equ  spr,       '00000100'b4  /* spare

equ  ioa_map_lower_address,    0007FFFFx
equ  ioa_map_higher_address,   00000000x

equ  OS_BASE,    00000000x  /* offset of OS image in memory
equ  VM_STACK,   00EE8000x  /* top virtual stack address

equ  ram,        00000000x  /* ram start address
equ  page,       4096
equ  ram_size,   0007FFFFx  /* size of ram is 512 Kbytes

equ  prom_lo,    00000000x  /* rom start address  when low
equ  prom_hi,    00EE8000x  /* rom start address  when high
```

```
equ   set., 'C00080000'b4        /* for setting control bits
equ   clr., '00000000'b4         /* for clearing control bits
equ   mask.,    clr.             /* for masking interrupts
equ   unmask.,  set.             /* for unmasking interrupts
equ   ioa$sync_sel,  00FF9000x  /* page used for board syncing

equ   ioa$adapt_cmd,  00BF9002x /* adapter local command
equ   set_cmd., 80x                /* for sending cmd to adapter
      equ  cmd_reset, 00           /* do reset
      equ  cmd_clear_int, 01       /* clear interrupt
      equ  cmd_toggle_obey_p, 02   /* toggle obey p
      equ  cmd_toggle_obey_q, 03   /* toggle obey q
      equ  cmd_clear_broken, 04    /* clear broken
      equ  cmd_set_broken, 05      /* set broken
      equ  cmd_int_device, 06      /* interrupt device

equ   ioa$dma_read,  00BF9004x  /* select adapter for dma read

equ   ioa$dma_write, 00BF9008x  /* select adapter for dma write

equ   ioa$dma_verify, 00BF900Cx /* select adapter for dma verify

equ   ioa$timer_data,00BFA000x   /* timer data register --- read/write
                                /*   never access as a long word

equ   ioa$timer_cont,00BFA002x   /* timer control register ---

equ   checksum, 00BFA400x      /* read checksum word

      /* P BUS CONTROL WORD */
equ   ioa$pbus_ctrl,     00BFA400x    /* p bus control write

      equ p_bus_enable,   07     /* P bus enable
      equ p_berr_enable, 06     /* p bus berr enable
      equ scan_enable,    05     /* enable scanner
      equ scan_run,       04     /* start scanner
      equ timer_mask,     03     /* timer mask/clear
      equ set_level1,     02     /* generate level 1 interrupt
      equ privL,          01     /* priv
      equ p_bus_lockL,    00     /* Pbus lock

      /* SCANNER INTERFACE */
equ   ioa$scan_listw,     00BFAC00x   /* space for write, word access.
equ   ioa$scan_listb,     00BFAC01x   /* through 00BFADFF, odd bytes only!
                                          /* bits 7-4 slot number
                                          /* bits 3-0 TBD
      equ SCAN_RAM_SIZE,  255             /* 0-255 entries in scan_list

equ   ioa$scan_int_status,  00BFA800x   /* read scanner status register
      equ adap_alive,       15              /* slot alive
      equ adap_interrupt, 14              /* adapter interrupt
      equ adap_obey_p,      13              /* bus obey
      equ adap_obey_q,      12              /* bus obey
                                            /* bits 11-8 tbd
                                            /* bits 7-4 slot num
                                            /* bits 3-0 tbd

      /* PIC SELECT INTERFACE */
equ   ioa$pic_select, 00BFA801x     /* PIC select address

equ   ioa$bdcs,       00BF9000x  /* control / status x --- read
      equ  bdcs_broken,    15    /* read only
      equ  bdcs_broken2,   14    /* read only
      equ  bdcs_merpar,    13    /* read only, write broken2 to clear
      equ  bdcs_memcomp,   12    /* read only, write broken2 to clear
      equ  bdcs_timask,    11    /* read timer mask
      equ  bdcs_pkcomp,    10    /* self test bit
      equ  bdcs_cmdpend,   09    /* command pending
      equ  bdcs_statchg,   08    /* status change bit
      equ  bdcs_side,      07    /* side 0 if one, 0 if zero, read only
      equ  bdcs_ipend,     06    /* an interrupt req. on sc is pending,
      equ  bdcs_partner,   05    /* board can be partnered,
      equ  bdcs_zout_gt,   04    /* read bus protect/enable
      equ  bdcs_level1,    03    /* level1 interrupt
```

```
     equ  bdcs_romhigh,  02   /* rom is high, read, set, clear
     equ  bdcs_cmd_mask, 01   /* int mask for commands (spi)
     equ  bdcs_imask,    00   /* int mask for all conditions and levels

     /* write equates for bdcs */

     equ  bdcs_pbusenb,  07   /* Pbus enable
     equ  bdcs_qbusenb,  06   /* Qbus enable
     equ  partnered,     05   /* used to pair boards
     equ  zout_gt,       04   /* bus enable bit
     equ  set_pbus_force,03   /* set PBUS_force bit
     equ  prom_is_high,  02   /* set prom to high address
     equ  imask_istat,   01   /* interrupt mask for cmd pending
     equ  imask_all,     00   /* mask for all conditions

     /* STRATUS BUS COMMAND INTERFACE */
equ  ioa$read_cmd,  00BFB401x   /* start of eight bytes of data for
                                /*   command specification --- read only

equ  ioa$read_pntr, 00BFB801x  /* read pointer associated with cmd

equ  inum,       00BFB801x   /* interrupt number for external
                               /*  interrupt  write

     /* BOARD CONTROL WORD */
equ  ioa$brd_ctrl,  00BFB400x   /*  board control location

     equ  clr_broken ,   07   /* clear broken flag
     equ  clr_broken2,   06   /* clears broken2 flag,
                              /* mem parity, mem compare err
     equ  clr_chksum,    05   /* TBD
     equ  sync_jiffy,    04   /* sync the clocks
     equ  set_int_req,   03   /* generate external request
     equ  clr_dma_enb,   02   /* clear self test bit
     equ  clr_cmd,       01   /* clear command pending
     equ  clr_stat_chng,00    /* clear status change bit

     /* P BUS STATUS WORD */
equ  ioa$p_status,    00BFBC00x

     equ pbus_online,    15   /* ioa/pbus online
     equ dma_wrt,        14
     equ dma_rd,         13
     equ scan_int,       12   /* scanner interrupt (activelow)
     equ scan_up,       11   /* scanner active (enable*running)
     equ pbus_force,     10
     equ pside_enb,      9    /* P bus enabled
     equ qside_enb,      8    /* Q bus enabled
     equ pbus_diag,      7    /* P bus diag force bus
     equ pbus_obey_er,   6    /* Pbus obey error
     equ pbus_sel_er,    5    /* Pbus select error
     equ pbus_berr_en,   4    /* Pbus select berr enabled
     equ pbus_enb,       3    /* Pbus enabled
     equ pbus_lock,      2    /* pbus lock lock= low
     equ obey_p,         1    /* obey q bus
     equ obey_q,         0    /* obey p bus

     /* adapter memory location */
equ  start_adapt_mem,        00C00000x

     /* board id ptr location, offset */
equ  board_id_loc, 1024


     equ       null,1
     priv      on

     equ       ioa_debugger_stack_start, 0FE00x

ioa$begin_interrupt_handler:

     org       000000
```

```
        dc.l    ioa_debugger_stack_start
        dc.l    reset_fault


        dc.l    page_fault_fault
        dc.l    address_error_fault
        dc.l    illegal_instruction_fault
        dc.l    zero_divide_fault
        dc.l    chk_instruction_fault
        dc.l    trapv_instruction_fault
        dc.l    privilege_violation_fault
        dc.l    trace_fault
        dc.l    line_1010_emulator_fault
        dc.l    line_1111_emulator_fault
        dc.l    unassigned_vector_12_fault
        dc.l    unassigned_vector_13_fault
        dc.l    unassigned_vector_14_fault
        dc.l    unassigned_vector_15_fault
        dc.l    unassigned_vector_16_fault
        dc.l    unassigned_vector_17_fault
        dc.l    unassigned_vector_18_fault
        dc.l    unassigned_vector_19_fault
        dc.l    unassigned_vector_20_fault
        dc.l    unassigned_vector_21_fault
        dc.l    unassigned_vector_22_fault
        dc.l    unassigned_vector_23_fault
        dc.l    spurious_interrupt_fault
        dc.l    level_1_autovector_fault
        dc.l    level_2_autovector_fault
        dc.l    level_3_autovector_fault
        dc.l    level_4_autovector_fault
        dc.l    level_5_autovector_fault
        dc.l    level_6_autovector_fault
        dc.l    level_7_autovector_fault
        dc.l    trap_0_instruction_fault
        dc.l    trap_1_instruction_fault
        dc.l    trap_2_instruction_fault
        dc.l    trap_3_instruction_fault
        dc.l    trap_4_instruction_fault
        dc.l    trap_5_instruction_fault
        dc.l    trap_6_instruction_fault
        dc.l    trap_7_instruction_fault
        dc.l    trap_8_instruction_fault
        dc.l    trap_9_instruction_fault
        dc.l    trap_10_instruction_fault
        dc.l    trap_11_instruction_fault
        dc.l    trap_12_instruction_fault
        dc.l    trap_13_instruction_fault
        dc.l    trap_14_instruction_fault
        dc.l    trap_15_instruction_fault
        dc.l    unassigned_vector_48_fault
        dc.l    unassigned_vector_49_fault
        dc.l    unassigned_vector_50_fault
        dc.l    unassigned_vector_51_fault
        dc.l    unassigned_vector_52_fault
        dc.l    unassigned_vector_53_fault
        dc.l    unassigned_vector_54_fault
        dc.l    unassigned_vector_55_fault
        dc.l    unassigned_vector_56_fault
        dc.l    unassigned_vector_57_fault
        dc.l    unassigned_vector_58_fault
        dc.l    unassigned_vector_59_fault
        dc.l    unassigned_vector_60_fault
        dc.l    unassigned_vector_61_fault
        dc.l    unassigned_vector_62_fault
        dc.l    unassigned_vector_63_fault

/* interrupt vectors

        dc.l    bad_interrupt           /* vector  64
        dc.l    bad_interrupt           /* vector  65
        dc.l    bad_interrupt           /* vector  66
        dc.l    bad_interrupt           /* vector  67
        dc.l    bad_interrupt           /* vector  68
```

```
dc.l    bad_interrupt    /* vector  69
dc.l    bad_interrupt    /* vector  70
dc.l    bad_interrupt    /* vector  71
dc.l    bad_interrupt    /* vector  72
dc.l    bad_interrupt    /* vector  73
dc.l    bad_interrupt    /* vector  74
dc.l    bad_interrupt    /* vector  75
dc.l    bad_interrupt    /* vector  76
dc.l    bad_interrupt    /* vector  77
dc.l    bad_interrupt    /* vector  78
dc.l    bad_interrupt    /* vector  79
dc.l    bad_interrupt    /* vector  80
dc.l    bad_interrupt    /* vector  81
dc.l    bad_interrupt    /* vector  82
dc.l    bad_interrupt    /* vector  83
dc.l    bad_interrupt    /* vector  84
dc.l    bad_interrupt    /* vector  85
dc.l    bad_interrupt    /* vector  86
dc.l    bad_interrupt    /* vector  87
dc.l    bad_interrupt    /* vector  88
dc.l    bad_interrupt    /* vector  89
dc.l    bad_interrupt    /* vector  90
dc.l    bad_interrupt    /* vector  91
dc.l    bad_interrupt    /* vector  92
dc.l    bad_interrupt    /* vector  93
dc.l    bad_interrupt    /* vector  94
dc.l    bad_interrupt    /* vector  95
dc.l    bad_interrupt    /* vector  96
dc.l    bad_interrupt    /* vector  97
dc.l    bad_interrupt    /* vector  98
dc.l    bad_interrupt    /* vector  99
dc.l    bad_interrupt    /* vector 100
dc.l    bad_interrupt    /* vector 101
dc.l    bad_interrupt    /* vector 102
dc.l    bad_interrupt    /* vector 103
dc.l    bad_interrupt    /* vector 104
dc.l    bad_interrupt    /* vector 105
dc.l    bad_interrupt    /* vector 106
dc.l    bad_interrupt    /* vector 107
dc.l    bad_interrupt    /* vector 108
dc.l    bad_interrupt    /* vector 109
dc.l    bad_interrupt    /* vector 110
dc.l    bad_interrupt    /* vector 111
dc.l    bad_interrupt    /* vector 112
dc.l    bad_interrupt    /* vector 113
dc.l    bad_interrupt    /* vector 114
dc.l    bad_interrupt    /* vector 115
dc.l    bad_interrupt    /* vector 116
dc.l    bad_interrupt    /* vector 117
dc.l    bad_interrupt    /* vector 118
dc.l    bad_interrupt    /* vector 119
dc.l    bad_interrupt    /* vector 120
dc.l    bad_interrupt    /* vector 121
dc.l    bad_interrupt    /* vector 122
dc.l    bad_interrupt    /* vector 123
dc.l    bad_interrupt    /* vector 124
dc.l    bad_interrupt    /* vector 125
dc.l    bad_interrupt    /* vector 126
dc.l    bad_interrupt    /* vector 127
dc.l    bad_interrupt    /* vector 128

dc.l    bad_interrupt    /* vector 129
dc.l    bad_interrupt    /* vector 130
dc.l    bad_interrupt    /* vector 131
dc.l    bad_interrupt    /* vector 132
dc.l    bad_interrupt    /* vector 133
dc.l    bad_interrupt    /* vector 134
dc.l    bad_interrupt    /* vector 135


dc.l    bad_interrupt    /* vector 136
dc.l    bad_interrupt    /* vector 137
dc.l    bad_interrupt    /* vector 138
dc.l    bad_interrupt    /* vector 139
```

```
dc.l        bad_interrupt        /* vector 140
dc.l        bad_interrupt        /* vector 141
dc.l        bad_interrupt        /* vector 142
dc.l        bad_interrupt        /* vector 143
dc.l        bad_interrupt        /* vector 144
dc.l        bad_interrupt        /* vector 145
dc.l        bad_interrupt        /* vector 146
dc.l        bad_interrupt        /* vector 147
dc.l        bad_interrupt        /* vector 148
dc.l        bad_interrupt        /* vector 149
dc.l        bad_interrupt        /* vector 150
dc.l        bad_interrupt        /* vector 151
dc.l        bad_interrupt        /* vector 152
dc.l        bad_interrupt        /* vector 153
dc.l        bad_interrupt        /* vector 154
dc.l        bad_interrupt        /* vector 155
dc.l        bad_interrupt        /* vector 156
dc.l        bad_interrupt        /* vector 157
dc.l        bad_interrupt        /* vector 158
dc.l        bad_interrupt        /* vector 159
dc.l        bad_interrupt        /* vector 160
dc.l        bad_interrupt        /* vector 161
dc.l        bad_interrupt        /* vector 162
dc.l        bad_interrupt        /* vector 163
dc.l        bad_interrupt        /* vector 164
dc.l        bad_interrupt        /* vector 165
dc.l        bad_interrupt        /* vector 166
dc.l        bad_interrupt        /* vector 167
dc.l        bad_interrupt        /* vector 168
dc.l        bad_interrupt        /* vector 169
dc.l        bad_interrupt        /* vector 170
dc.l        bad_interrupt        /* vector 171
dc.l        bad_interrupt        /* vector 172
dc.l        bad_interrupt        /* vector 173
dc.l        bad_interrupt        /* vector 174
dc.l        bad_interrupt        /* vector 175
dc.l        bad_interrupt        /* vector 176
dc.l        bad_interrupt        /* vector 177
dc.l        bad_interrupt        /* vector 178
dc.l        bad_interrupt        /* vector 179
dc.l        bad_interrupt        /* vector 180
dc.l        bad_interrupt        /* vector 181
dc.l        bad_interrupt        /* vector 182
dc.l        bad_interrupt        /* vector 183
dc.l        bad_interrupt        /* vector 184
dc.l        bad_interrupt        /* vector 185
dc.l        bad_interrupt        /* vector 186
dc.l        bad_interrupt        /* vector 187
dc.l        bad_interrupt        /* vector 188
dc.l        bad_interrupt        /* vector 189
dc.l        bad_interrupt        /* vector 190
dc.l        bad_interrupt        /* vector 191
dc.l        bad_interrupt        /* vector 192
dc.l        bad_interrupt        /* vector 193
dc.l        bad_interrupt        /* vector 194
dc.l        bad_interrupt        /* vector 195
dc.l        bad_interrupt        /* vector 196
dc.l        bad_interrupt        /* vector 197
dc.l        bad_interrupt        /* vector 198
dc.l        bad_interrupt        /* vector 199
dc.l        bad_interrupt        /* vector 200
dc.l        bad_interrupt        /* vector 201
dc.l        bad_interrupt        /* vector 202
dc.l        bad_interrupt        /* vector 203
dc.l        bad_interrupt        /* vector 204
dc.l        bad_interrupt        /* vector 205
dc.l        bad_interrupt        /* vector 206
dc.l        bad_interrupt        /* vector 207
dc.l        bad_interrupt        /* vector 208
dc.l        bad_interrupt        /* vector 209
dc.l        bad_interrupt        /* vector 210
dc.l        bad_interrupt        /* vector 211
dc.l        bad_interrupt        /* vector 212
dc.l        bad_interrupt        /* vector 213
```

```
        dc.l        bad_interrupt         /* vector 214
        dc.l        bad_interrupt         /* vector 215
        dc.l        bad_interrupt         /* vector 216
        dc.l        bad_interrupt         /* vector 217
        dc.l        bad_interrupt         /* vector 218
        dc.l        bad_interrupt         /* vector 219
        dc.l        bad_interrupt         /* vector 220
        dc.l        bad_interrupt         /* vector 221
        dc.l        bad_interrupt         /* vector 222
        dc.l        bad_interrupt         /* vector 223
        dc.l        bad_interrupt         /* vector 224
        dc.l        bad_interrupt         /* vector 225
        dc.l        bad_interrupt         /* vector 226
        dc.l        bad_interrupt         /* vector 227
        dc.l        bad_interrupt         /* vector 228
        dc.l        bad_interrupt         /* vector 229
        dc.l        bad_interrupt         /* vector 230
        dc.l        bad_interrupt         /* vector 231
        dc.l        bad_interrupt         /* vector 232
        dc.l        bad_interrupt         /* vector 233
        dc.l        bad_interrupt         /* vector 234
        dc.l        bad_interrupt         /* vector 235
        dc.l        bad_interrupt         /* vector 236
        dc.l        bad_interrupt         /* vector 237
        dc.l        bad_interrupt         /* vector 238
        dc.l        bad_interrupt         /* vector 239
        dc.l        bad_interrupt         /* vector 240
        dc.l        bad_interrupt         /* vector 241
        dc.l        bad_interrupt         /* vector 242
        dc.l        bad_interrupt         /* vector 243
        dc.l        bad_interrupt         /* vector 244
        dc.l        bad_interrupt         /* vector 245
        dc.l        bad_interrupt         /* vector 246
        dc.l        bad_interrupt         /* vector 247
        dc.l        bad_interrupt         /* vector 248
        dc.l        bad_interrupt         /* vector 249
        dc.l        bad_interrupt         /* vector 250
        dc.l        bad_interrupt         /* vector 251
        dc.l        bad_interrupt         /* vector 252
        dc.l        bad_interrupt         /* vector 253
        dc.l        bad_interrupt         /* vector 254
        dc.l        bad_interrupt         /* vector 255

/* ==================================================
        eject

        equ         fw_stack_start, 07000x
        priv        on

/*
        extent      async_firmware


        extdef      acomm_interrupt
/*        extdef      async_fw
        main        async_fw
/*

        org   00400x
/*
        bra   async_fw
/*
async_fw:
        /* initialize the stack

        movea.l     =fw_stack_start,a6
        movea.l     =fw_stack_start,a7

        /* jump to the "C" routine

        jmp   async_firmware

/* now the interrupt handler array of jsrs
```

```
acomm_interrupt:

     jsr        interrupt       /* vector 192
     jsr        interrupt       /* vector 193
     jsr        interrupt       /* vector 194
     jsr        interrupt       /* vector 195
     jsr        interrupt       /* vector 196
     jsr        interrupt       /* vector 197
     jsr        interrupt       /* vector 198
     jsr        interrupt       /* vector 199
     jsr        interrupt       /* vector 200
     jsr        interrupt       /* vector 201
     jsr        interrupt       /* vector 202
     jsr        interrupt       /* vector 203
     jsr        interrupt       /* vector 204
     jsr        interrupt       /* vector 205
     jsr        interrupt       /* vector 206
     jsr        interrupt       /* vector 207

     eject

/* common interrupt handler for all interrupts
/* this code is jsr'ed to by the preceeding jsr array
/* the vector number can be calcultec from the return
/* addresses pushed by the jsr


interrupt:

/* mask, and save registers

     push.w     sr                 /* save new status register
     ori.w      =sr.interrupt_mask,sr    /* mask interupts
     push.l     d0-d7;a0-a6      /* push rest of registers
     move.l     usp,a0
     push.l     a0
     move.l     ='*MC*',d0        /* leave flag for debugger in
     push.l     .d0               /* place where start_time will
                                  /* be stored

/* Full machine conditions structure now pushed

     using      'mc',a7

/* Now, get code number for this interrupt

/* Since, we now use a7 associated to the structure 'mc',
/* currently, mc.flags has the program counter pushed onto
/* the stack as the result of the 'jsr' instruction in
/* acomm_interrupt:

     subi.l     =acomm_interrupt,mc.flags

/* As the result of the subtract.long instruction, 0 is
/* stored in mc.flags and (4 * offset from acomm_interrupt:)
/* is stored in mc.faultno
/* So, using mc.faultno helps us branch to the right interrupt handler

     move.w     mc.faultno,d0
     jmp        branch-4(,d0.w)

branch:

     jmp        chan_1_tbe
     jmp        chan_3_tbe
     jmp        chan_1_ext_stat
     jmp        chan_3_ext_stat
     jmp        chan_1_rcv_char
     jmp        chan_3_rcv_char
     jmp        chan_1_spc_rcv_cond
     jmp        chan_3_spc_rcv_cond
     jmp        chan_0_tbe
```

```
     jmp        chan_2_tbe
     jmp        chan_0_ext_stat
     jmp        chan_2_ext_stat
     jmp        chan_0_rcv_char
     jmp        chan_2_rcv_char
     jmp        chan_0_spc_rcv_cond
     jmp        chan_2_spc_rcv_cond

     eject

chan_1_tbe:
     move.l     #1,-(a7)            /* push channel number
                                    /* (must push long word,
                                    /* that's what "C" expects)
     movem.l    tbe_int_handler_link,a4;a5
     jsr        (a4)                /* call the function serving
                                    /* the interrupt
     adda.w     #4,a7               /* pop channel number off stack

     bra        exit_interrupt

chan_3_tbe:
     move.l     #3,-(a7)            /* push channel number
     movem.l    tbe_int_handler_link,a4;a5
     jsr        (a4)                /* call the function serving
                                    /* the interrupt
     adda.w     #4,a7               /* pop channel number off stack

     bra        exit_interrupt

chan_1_ext_stat:
     move.l     #1,-(a7)            /* push channel number
     movem.l    ext_status_int_handler_link,a4;a5
     jsr        (a4)                /* call the function serving
                                    /* the interrupt
     adda.w     #4,a7               /* pop channel number off stack

     bra        exit_interrupt

chan_3_ext_stat:
     move.l     #3,-(a7)            /* push channel number
     movem.l    ext_status_int_handler_link,a4;a5
     jsr        (a4)                /* call the function serving
                                    /* the interrupt
     adda.w     #4,a7               /* pop channel number off stack

     bra        exit_interrupt

chan_1_rcv_char:
     move.l     #1,-(a7)            /* push channel number
     movem.l    rcv_char_int_handler_link,a4;a5
     jsr        (a4)                /* call the function serving
                                    /* the interrupt
     adda.w     #4,a7               /* pop channel number off stack

     bra        exit_interrupt

chan_3_rcv_char:
     move.l     #3,-(a7)            /* push channel number
     movem.l    rcv_char_int_handler_link,a4;a5
     jsr        (a4)                /* call the function serving
                                    /* the interrupt
     adda.w     #4,a7               /* pop channel number off stack

     bra        exit_interrupt

chan_1_spc_rcv_cond:
     move.l     #1,-(a7)            /* push channel number
     movem.l    spc_rcv_cond_int_handler_link,a4;a5
     jsr        (a4)                /* call the function serving
                                    /* the interrupt
     adda.w     #4,a7               /* pop channel number off stack

     bra        exit_interrupt
```

```
chan_3_spc_rcv_cond:
     move.l     =3,-(a7)        /* push channel number
     movem.l    spc_rcv_cond_int_handler_link,a4;a5
     jsr        (a4)            /* call the function serving
                                /* the interrupt
     adda.w     =4,a7           /* pop channel number off stack

     bra        exit_interrupt

chan_0_tbe:
     move.l     =0,-(a7)        /* push channel number
     movem.l    tbe_int_handler_link,a4;a5
     jsr        (a4)            /* call the function serving
                                /* the interrupt
     adda.w     =4,a7           /* pop channel number off stack

exit_interrupt:
     clr.l      (a7)+           /* clobber and pop '*MC*'
     pop.l      a0              /* usp
     move.l     a0,usp
     pop.l      d0-d7;a0-a6
     addq.l     =6,a7           /* pop int_sr, flags, & faultno
     rte


chan_2_tbe:
     move.l     =2,-(a7)        /* push channel number
     movem.l    tbe_int_handler_link,a4;a5
     jsr        (a4)            /* call the function serving
                                /* the interrupt
     adda.w     =4,a7           /* pop channel number off stack

     bra        exit_interrupt

chan_0_ext_stat:
     move.l     =0,-(a7)        /* push channel number
     movem.l    ext_status_int_handler_link,a4;a5
     jsr        (a4)            /* call the function serving
                                /* the interrupt
     adda.w     =4,a7           /* pop channel number off stack

     bra        exit_interrupt

chan_2_ext_stat:
     move.l     =2,-(a7)        /* push channel number
     movem.l    ext_status_int_handler_link,a4;a5
     jsr        (a4)            /* call the function serving
                                /* the interrupt
     adda.w     =4,a7           /* pop channel number off stack

     bra        exit_interrupt

chan_0_rcv_char:
     move.l     =0,-(a7)        /* push channel number
     movem.l    rcv_char_int_handler_link,a4;a5
     jsr        (a4)            /* call the function serving
                                /* the interrupt
     adda.w     =4,a7           /* pop channel number off stack

     bra        exit_interrupt

chan_2_rcv_char:
     move.l     =2,-(a7)        /* push channel number
     movem.l    rcv_char_int_handler_link,a4;a5
     jsr        (a4)            /* call the function serving
                                /* the interrupt
     adda.w     =4,a7           /* pop channel number off stack

     bra        exit_interrupt

chan_0_spc_rcv_cond:
     move.l     =0,-(a7)        /* push channel number
```

```
     movem.l    spc_rcv_cond_int_handler_link,a4:a5
     jsr        (a4)            /* call the function serving
                                /* the interrupt
     adda.w     =4,a7           /* pop channel number off stack

     bra        exit_interrupt

chan_2_spc_rcv_cond:
     move.l     =2,-(a7)        /* push channel number
     movem.l    spc_rcv_cond_int_handler_link,a4:a5
     jsr        (a4)            /* call the function serving
                                /* the interrupt
     adda.w     =4,a7           /* pop channel number off stack

     bra        exit_interrupt
     eject


     title      'link entries'
tbe_int_handler_link:
     elink      tbe_int_handler
rcv_char_int_handler_link:
     elink      rcv_int_handler
ext_status_int_handler_link:
     elink      ext_stat_int_handler
spc_rcv_cond_int_handler_link:
     elink      spc_rcv_cond_int_handler

     drop       'mc'
     eject

/* restart interrupted code

restart_interrupt:
     clr.l      (a7)+           /* clobber and pop '*MC*'
     clr.l      (a7)+           /* clobber and pop slot number
     pop.l      a0              /* usp
     move.l     a0,usp
     pop.l      d0-d7;a0-a6
     adda.l     =6,a7           /* pop int_sr, flags, and faultno
     rte

bad_interrupt: /* bad vector, this should be impossible
     trap       =15

ida_debug$level7_link:
     elink      ida_debug$level7

     drop       'mc'
     eject
/* common fault handling code

fault_jsr:
     jsr        fault
page_fault_fault:
     jsr        fault
address_error_fault:
     jsr        fault
illegal_instruction_fault:
     jsr        fault
zero_divide_fault:
     jsr        fault
chk_instruction_fault:
     jsr        fault
trapv_instruction_fault:
     jsr        fault
privilege_violation_fault:
     jsr        fault
trace_fault:
     jsr        fault
line_1010_emulator_fault:
     jsr        fault
line_1111_emulator_fault:
     jsr        fault
```

```
unassigned_vector_12_fault:
        jsr         fault
unassigned_vector_13_fault:
        jsr         fault
unassigned_vector_14_fault:
        jsr         fault
unassigned_vector_15_fault:
        jsr         fault
unassigned_vector_16_fault:
        jsr         fault
unassigned_vector_17_fault:
        jsr         fault
unassigned_vector_18_fault:
        jsr         fault
unassigned_vector_19_fault:
        jsr         fault
unassigned_vector_20_fault:
        jsr         fault
unassigned_vector_21_fault:
        jsr         fault
unassigned_vector_22_fault:
        jsr         fault
unassigned_vector_23_fault:
        jsr         fault
spurious_interrupt_fault:
        jsr         fault
level_1_autovector_fault:
        jsr         fault
level_2_autovector_fault:
        jsr         fault
level_3_autovector_fault:
        jsr         fault
level_4_autovector_fault:
        jsr         fault
level_5_autovector_fault:
        jsr         fault
level_6_autovector_fault:
        jsr         fault
level_7_autovector_fault:
        jsr         fault
trap_0_instruction_fault:
        jsr         fault
trap_1_instruction_fault:
        jsr         fault
trap_2_instruction_fault:
        jsr         fault
trap_3_instruction_fault:
        jsr         fault
trap_4_instruction_fault:
        jsr         fault
trap_5_instruction_fault:
        jsr         fault
trap_6_instruction_fault:
        jsr         fault
trap_7_instruction_fault:
        jsr         fault
trap_8_instruction_fault:
        jsr         fault
trap_9_instruction_fault:
        jsr         fault
trap_10_instruction_fault:
        jsr         fault
trap_11_instruction_fault:
        jsr         fault
trap_12_instruction_fault:
        jsr         fault
trap_13_instruction_fault:
        jsr         fault
trap_14_instruction_fault:
        jsr         fault
trap_15_instruction_fault:
        jsr         fault
unassigned_vector_48_fault:
        jsr         fault
```

```
unassigned_vector_49_fault:
     jsr        fault
unassigned_vector_50_fault:
     jsr        fault
unassigned_vector_51_fault:
     jsr        fault
unassigned_vector_52_fault:
     jsr        fault
unassigned_vector_53_fault:
     jsr        fault
unassigned_vector_54_fault:
     jsr        fault
unassigned_vector_55_fault:
     jsr        fault
unassigned_vector_56_fault:
     jsr        fault
unassigned_vector_57_fault:
     jsr        fault
unassigned_vector_58_fault:
     jsr        fault
unassigned_vector_59_fault:
     jsr        fault
unassigned_vector_60_fault:
     jsr        fault
unassigned_vector_61_fault:
     jsr        fault
unassigned_vector_62_fault:
     jsr        fault
unassigned_vector_63_fault:
     jsr        fault
end_fault_jsr:

/* all faults handled here

fault:
     push.w     sr                 /* push sr to keep same format
                                   /* as interrupt
     push.l     d0-d7;a0-a6
     move       usp,a3
     push.l     a3

/* NOTE:
     push.l     d0                 /* save currently selected slot on stack

     move.l     ='*MC*',d0         /* leave flag for debugger in
     push.l     d0                 /* place where time should go
     using      'mc',a7
     subi.l     =fault_jsr,mc.flags  /* compute fault number
     move.w     mc.faultno,d1        /* pickup fault number
     lsr.w      =2,d1                /* divide by 4
     move.w     d1,mc.faultno
     moveq.l    =0,d0
     bset.l     =mc.flags.fault.bit,d0  /* set bit indicating fault
     cmp.w      =PAGE_FAULT,d1       /* bus error?
     beq.b      $set_ext             /* yes, go set extended format
     cmp.w      =ADDRESS_ERROR,d1    /* addr error?
     bne.b      $skip_ext            /* yes, drop through and set extended fmt
$set_ext:
     bset.l     =mc.flags.extended_fmt.bit,d0
                                     /* indicate extended fault data
$skip_ext:
     move.w     d0,mc.flags

process_fault:
     cmp.w      =TRAP_3_INSTRUCTION,d1    /* breakpoint?
     beq.b      process_breakpoint
     cmp.w      =TRAP_2_INSTRUCTION,d1    /* av/pcp breakpoint?
     beq.b      process_breakpoint
     cmp.w      =TRACE,d1                 /* trace (breakpoint restart)?
     beq.b      process_trace

     movem.l    ioa_debug$fault_link,a4;a5
     push.l     a7              /* mcp, = addr (mc)
     push.l     a7              /* addr (mcp), the parameter
```

```
     jsr        (a4)
     addq.l     =8,a7
     move.w     mc.flags,d0
     btst.l     =mc.flags.extended_fmt.bit,d0
     beq.w      restart_interrupt  /* use short format code

/* restart extended format fault

     clr.l      (a7)+              /* clobber and pop '*MC*'
     pop.l      a0                 /* current slot
     pop.l      a0                 /* usp
     move.l     a0,usp
     pop.l      d0-d7;a0-a6
     addq.l     =6,a7              /* pop int_sr, flags, and faultno
     addq.l     =8,a7              /* pop reason, address, and inst
     rte

process_breakpoint:
     movem.l    ioa_debug$breakpoint_link,a4;a5
     bra.b      benign_fault

process_trace:
     movem.l    ioa_debug$trace_link,a4;a5
benign_fault:
     push.l     a7                 /* mcp, = addr (mc)
     push.l     a7                 /* addr (mcp), the parameter
     jsr        (a4)
     addq.l     =8,a7
     bra.w      restart_interrupt

     drop       'mc'

     eject
/* code in the prom does a simulated reset fault
/* when starting the loaded code. This causes
/* us to start executing here

     extdef     reset_fault


reset_fault:
     move.w     =2700x,sr


/* mask, and save registers

     push.w     sr                 /* save new status register
     ori.w      =sr.interrupt_mask,sr    /* first, mask interupts
     push.l     d0-d7;a0-a6        /* push rest of registers
     move.l     usp,a0
     push.l     a0
     move.l     ='*MC*',d0         /* leave flag for debugger in
     push.l     d0                 /* place where time should go

/* full machine conditions structure now pushed

    using       'mc',a7


/* call debugger

     movem.l    ioa_debug$level7_link,a4;a5

     push.l     a7                 /* mcp, = addr (mc)
     push.l     a7                 /* addr (mcp), the parameter
     jsr        (a4)
     addq.l     =8,a7
     bra.w      restart_interrupt

     drop       'mc'
```

```
ioa_debug$fault_link:

     elink      ioa_debug$fault

ioa_debug$breakpoint_link:
     elink      ioa_debug$break

ioa_debug$trace_link:
     elink      ioa_debug$trace_fault


     extdat     ioa$end_interrupt_handler
ioa$end_interrupt_handler:
     ds.w       0

init_was_last_static_addr:
     dc.l       init_was_last

     use        'static'

init_was_last:
     dc.b       0

     end

/*  ***begin copyright*** ******************************  */
/*                                                         */
/*  STRATUS CONFIDENTIAL INFORMATION: CLASS II             */
/*  COPYRIGHT (c) Stratus Computer, Inc. 1986              */
/*                                                         */
/*  This program contains confidential and proprietary     */
/*  information of Stratus Computer, Inc., and any         */
/*  reproduction, disclosure, or use in whole or in part   */
/*  is expressly prohibited, except as may be              */
/*  specifically authorized by prior written agreement or  */
/*  permission of Stratus.                                 */
/*                                                         */
/*  ***end copyright*** ******************************      */

/* IOP_INTERRUPT_HANDLER: This module sits at virtual
/* address 0, to handle faults and interrupts
/* Beginning of modification history
/* Modified 86-07-18 by Tom Moser
/* End of modification history

     eject
/*      incl      'ioa _mc'
/* Begin include file ...iop_mc.incl.asm
/* Generated at 86-04-02 11:48:02 EST by cv_incl Release 5ah from
/*     %es#m6>Stratus>Tom_Moser>iop>iop_mc.incl.pl1.

     use        'mc',dummy
mc:
mc.identifier:                                       ds.b 4
mc.ioa_slot:                                         ds.b 4
mc.usp:                                              ds.b 4
mc.d:                                                ds.b 4
     equ        mc.d.length,4
                                                     ds.b 28
     equ        mc.d.dim,8
mc.a:                                                ds.b 4
     equ        mc.a.length,4
                                                     ds.b 24
     equ        mc.a.dim,7
mc.int_sr:
                                                     ds.b 2
mc.status:
                                                     ds.b 2
mc.pc:                                               ds.b 4
mc.info:
mc.info.extended_fmt.byte:
     equ        mc.info.extended_fmt.bit,15
     equ        mc.info.extended_fmt.mask,'8000'b4
```

```
mc.info.mbz:
     equ        mc.info.mbz.bit,12
     equ        mc.info.mbz.mask,'7000'b4
mc.info.vector:
     equ        mc.info.vector.bit,0
     equ        mc.info.vector.mask,'0FFF'b4
                                                      ds.b 2
     equ        mc.info.length,2
     equ        mc.length,82
     use        'code'
     use        'berr_mc',dummy
berr_mc:
berr_mc.identifier:                                   ds.b 4
berr_mc.ioa_slot:                                     ds.b 4
berr_mc.usp:                                          ds.b 4
berr_mc.d:                                            ds.b 4
     equ        berr_mc.d.length,4
                                                      ds.b 28
     equ        berr_mc.d.dim,8
berr_mc.a:                                            ds.b 4
     equ        berr_mc.a.length,4
                                                      ds.b 24
     equ        berr_mc.a.dim,7
berr_mc.int_sr:
                                                      ds.b 2
berr_mc.status:
                                                      ds.b 2
berr_mc.pc:                                           ds.b 4
berr_mc.info:
berr_mc.info.extended_fmt.byte:
     equ        berr_mc.info.extended_fmt.bit,15
     equ        berr_mc.info.extended_fmt.mask,'8000'b4
berr_mc.info.mbz:
     equ        berr_mc.info.mbz.bit,12
     equ        berr_mc.info.mbz.mask,'7000'b4
berr_mc.info.vector:
     equ        berr_mc.info.vector.bit,0
     equ        berr_mc.info.vector.mask,'0FFF'b4
                                                      ds.b 2
     equ        berr_mc.info.length,2
berr_mc.special_status:
berr_mc.special_status.rerun.byte:
     equ        berr_mc.special_status.rerun.bit,15
     equ        berr_mc.special_status.rerun.mask,'8000'b4
berr_mc.special_status.pad1.byte:
     equ        berr_mc.special_status.pad1.bit,14
     equ        berr_mc.special_status.pad1.mask,'4000'b4
berr_mc.special_status.inst_fetch.byte:
     equ        berr_mc.special_status.inst_fetch.bit,13
     equ        berr_mc.special_status.inst_fetch.mask,'2000'b4
berr_mc.special_status.data_fetch.byte:
     equ        berr_mc.special_status.data_fetch.bit,12
     equ        berr_mc.special_status.data_fetch.mask,'1000'b4
berr_mc.special_status.r_m_w_cycle.byte:
     equ        berr_mc.special_status.r_m_w_cycle.bit,11
     equ        berr_mc.special_status.r_m_w_cycle.mask,'0800'b4
berr_mc.special_status.high_byte.byte:
     equ        berr_mc.special_status.high_byte.bit,10
     equ        berr_mc.special_status.high_byte.mask,'0400'b4
berr_mc.special_status.byte_xfer.byte:
     equ        berr_mc.special_status.byte_xfer.bit,9
     equ        berr_mc.special_status.byte_xfer.mask,'0200'b4
berr_mc.special_status.read.byte:
     equ        berr_mc.special_status.read.bit,8
     equ        berr_mc.special_status.read.mask,'0100'b4
                                                      ds.b 1
berr_mc.special_status.pad2:
     equ        berr_mc.special_status.pad2.bit,3
     equ        berr_mc.special_status.pad2.mask,'00F8'b4
berr_mc.special_status.function_code:
```

```
     equ        berr_mc.special_status.function_code.bit,0
     equ        berr_mc.special_status.function_code.mask,'0007'b4
                                                   ds.b 1
     equ        berr_mc.special_status.length,2
berr_mc.fault_addr:                                ds.b 4
berr_mc.resv_data_out:
                                                   ds.b 2
berr_mc.data_out:
                                                   ds.b 2
berr_mc.resv_data_in:
                                                   ds.b 2
berr_mc.data_in:
                                                   ds.b 2
berr_mc.resv_inst:
                                                   ds.b 2
berr_mc.instruction_reg:
                                                   ds.b 2
berr_mc.internal_info:                             ds.b 2
     equ        berr_mc.internal_info.length,2
                                                   ds.b 30
     equ        berr_mc.internal_info.dim,16
     equ        berr_mc.length,132
     use        'code'


/* End include file ...iop_mc.incl.asm
     eject
/*      incl       'status_register_ma sks'
/* BEGIN INCLUDE FILE ... status_register_masks.incl.asm
/*
/* written 810324 by FG
/*
/* This include file exists because the BTST, BSET,
/* and BCLR instructions do not work on the status
/* or condition code register...only the ANDI, ORI,
/* EORI, and MOVE instructions do.

/* OBSOLETE -- see below

/* The new cv_incl tool produces masks, so use of this file
/* is discouraged in favor of status_register.incl.asm
/* which is updated for new cpu types

     equ        sr.trace,            8000x
     equ        sr.kernel,           2000x
     equ        sr.interrupt_mask,   0700x
     equ        sr.extend,           0010x
     equ        sr.negative,         0008x
     equ        sr.zero,             0004x
     equ        sr.overflow,         0002x
     equ        sr.carry,            0001x

     equ        sr.unused_bits_mask,58E0x

/* END INCLUDE FILE ... status_register_masks.incl.asm
     eject
/*      incl       'fault_co des'
/* Begin include file ...fault_codes.incl.asm
/* Generated at 86-07-14 16:38:28 EDT by cv_incl Release 5ah from
/*      %es#m6>Stratus>Tom_Clark>fresco>68881>incl>fault_codes.incl.pl1.

     equ        UNASSIGNED_VECTOR_0,0
     equ        RESET,1
     equ        PAGE_FAULT,2
     equ        ADDRESS_ERROR,3
     equ        ILLEGAL_INSTRUCTION,4
     equ        ZERO_DIVIDE,5
     equ        CHK_INSTRUCTION,6
     equ        TRAPV_INSTRUCTION,7
     equ        PRIVILEGE_VIOLATION,8
     equ        TRACE,9
     equ        LINE_1010_EMULATOR,10
     equ        LINE_1111_EMULATOR,11
     equ        UNASSIGNED_VECTOR_12,12
```

```
        equ     COPROC_PROTOCOL_VIOLATION,13
        equ     FORMAT_ERROR,14
        equ     UNINITIALIZED_INTERRUPT_VECTOR,15
        equ     UNASSIGNED_VECTOR_16,16
        equ     UNASSIGNED_VECTOR_17,17
        equ     UNASSIGNED_VECTOR_18,18
        equ     UNASSIGNED_VECTOR_19,19
        equ     UNASSIGNED_VECTOR_20,20
        equ     UNASSIGNED_VECTOR_21,21
        equ     UNASSIGNED_VECTOR_22,22
        equ     UNASSIGNED_VECTOR_23,23
        equ     SPURIOUS_INTERRUPT,24
        equ     LEVEL_1_AUTOVECTOR,25
        equ     LEVEL_2_AUTOVECTOR,26
        equ     LEVEL_3_AUTOVECTOR,27
        equ     LEVEL_4_AUTOVECTOR,28
        equ     LEVEL_5_AUTOVECTOR,29
        equ     LEVEL_6_AUTOVECTOR,30
        equ     LEVEL_7_AUTOVECTOR,31
        equ     TRAP_0_INSTRUCTION,32
        equ     TRAP_1_INSTRUCTION,33
        equ     TRAP_2_INSTRUCTION,34
        equ     TRAP_3_INSTRUCTION,35
        equ     TRAP_4_INSTRUCTION,36
        equ     TRAP_5_INSTRUCTION,37
        equ     TRAP_6_INSTRUCTION,38
        equ     TRAP_7_INSTRUCTION,39
        equ     TRAP_8_INSTRUCTION,40
        equ     TRAP_9_INSTRUCTION,41
        equ     TRAP_10_INSTRUCTION,42
        equ     TRAP_11_INSTRUCTION,43
        equ     TRAP_12_INSTRUCTION,44
        equ     TRAP_13_INSTRUCTION,45
        equ     TRAP_14_INSTRUCTION,46
        equ     TRAP_15_INSTRUCTION,47
        equ     BRANCH_SET_ON_UNORDERED,48
        equ     INEXACT_RESULT,49
        equ     FP_DIVIDE_BY_ZERO,50
        equ     UNDERFLOW,51
        equ     OPERAND_ERROR,52
        equ     OVERFLOW,53
        equ     SIGNALLING_NAN,54
        equ     UNASSIGNED_VECTOR_55,55
        equ     UNASSIGNED_VECTOR_56,56
        equ     UNASSIGNED_VECTOR_57,57
        equ     UNASSIGNED_VECTOR_58,58
        equ     UNASSIGNED_VECTOR_59,59
        equ     UNASSIGNED_VECTOR_60,60
        equ     UNASSIGNED_VECTOR_61,61
        equ     UNASSIGNED_VECTOR_62,62
        equ     UNASSIGNED_VECTOR_63,63
        equ     BAD_KERNEL_CALL,64
        equ     PRIVILEGED_CALL,65
        equ     PROGRAM_INTERRUPT,66
        equ     SAP_EXCEPTION,67

/* End include file ...fault_codes.incl.asm
     eject
/*      incl       'ioa_hardware_d efs'
/*   ***begin copyright*** ******************************   */
/*                                                           */
/*   STRATUS CONFIDENTIAL INFORMATION: CLASS II              */
/*   COPYRIGHT (c) Stratus Computer, Inc. 1985               */
/*                                                           */
/*   This program contains confidential and proprietary     */
/*   information of Stratus Computer, Inc., and any         */
/*   reproduction, disclosure, or use in whole or in part   */
/*   is expressly prohibited, except as may be              */
/*   specifically authorized by prior written agreement or  */
/*   permission of Stratus.                                  */
/*                                                           */
/*   ***end copyright*** ********************************   */
/*      title      'IOP hardware definitions'
```

```
equ   ioa_map_table_start,     005FC000x
equ   offset_user_start,  000007D0x        /* '00BFC7D0'b4
equ   offset_user_end,    00002F9Cx        /* '00BFEF9C'b4
equ   offset_table_end,   00002FECx        /* '00BFEFEC'b4

equ   readable,  '00008000'b4  /* readable page
equ   writeable, '00004000'b4  /* writeable page
equ   priv,      '00002000'b4  /* privileged
equ   local,     '00001000'b4  /* local memory
equ   interlock, '00000800'b4  /* interlock
equ   io_access, '00000400'b4  /* access to vos
equ   dma,       '00000200'b4  /* dma access
equ   spr,       '00000100'b4  /* spare

equ   ioa_map_lower_address,   0007FFFFx
equ   ioa_map_higher_address,  00C00000x

equ   OS_BASE,   00200000x  /* offset of OS image in memory
equ   VM_STACK,  00BE8000x  /* top virtual stack address

equ   ram,       00000000x  /* ram start address
equ   page,      4096
equ   ram_size,  0007FFFFx  /* size of ram is 512 Kbytes

equ   prom_lo,   00000000x  /* rom start address  when low
equ   prom_hi,   00BE8000x  /* rom start address  when high

equ   set.,  '00008000'b4       /* for setting control bits
equ   clr.,  '00000000'b4       /* for clearing control bits
equ   mask.,    clr.            /* for masking interrupts
equ   unmask.,  set.            /* for unmasking interrupts
equ   ioa$sync_sel,  00BF8000x  /* page used for board syncing

equ   ioa$adapt_cmd,  00BF9002x /* adapter local command
equ   set_cmd.,  80x               /* for sending cmd to adapter
      equ  cmd_reset, 00           /* do reset
      equ  cmd_clear_int, 01       /* clear interrupt
      equ  cmd_toggle_obey_p, 02   /* toggle obey p
      equ  cmd_toggle_obey_q, 03   /* toggle obey q
      equ  cmd_clear_broken, 04    /* clear broken
      equ  cmd_set_broken, 05      /* set broken
      equ  cmd_int_device, 06      /* interrupt device

equ   ioa$dma_read,   00BF9004x  /* select adapter for dma read

equ   ioa$dma_write, 00BF9008x  /* select adapter for dma write

equ   ioa$dma_verify, 00BF900Cx /* select adapter for dma verify

equ   ioa$timer_data,00BFA000x   /* timer data register --- read/write
                                /*   never access as a long word

equ   ioa$timer_cont,00BFA002x   /* timer control register ---

equ   checksum, 00BFA400x    /* read checksum word

      /* P BUS CONTROL WORD */
equ   ioa$pbus_ctrl,     00BFA400x    /* p bus control write

      equ p_bus_enable,  07    /* P bus enable
      equ p_berr_enable, 06    /* p bus berr enable
      equ scan_enable,   05    /* enable scanner
      equ scan_run,      04    /* start scanner
      equ timer_mask,    03    /* timer mask/clear
      equ set_level1,    02    /* generate level 1 interrupt
      equ privL,         01    /* priv
      equ p_bus_lockL,   00    /* Pbus lock

      /* SCANNER INTERFACE */
equ   ioa$scan_listw,     00BFAC00x   /* spare for write, word access.
equ   ioa$scan_listb,     00BFAC01x   /* through 00BFADFF, odd bytes only!
                                        /* bits 7-4 slot number
                                        /* bits 3-0 TBD
      equ SCAN_RAM_SIZE,  255           /* 0-255 entries in scan_list
```

```
equ  ioa$scan_int_status,  00BFA800x   /* read scanner status register
     equ adap_alive,       15              /* slot alive
     equ adap_interrupt,   14              /* adapter interrupt
     equ adap_obey_p,      13              /* bus obey
     equ adap_obey_q,      12              /* bus obey
                                           /* bits 11-8 tbd
                                           /* bits 7-4 slot num
                                           /* bits 3-0 tbd

     /* PIO SELECT INTERFACE */
equ  ioa$pio_select, 00BFA801x      /* PIO select address

equ  ioa$bdcs,       00BFB000x  /* control / status x --- read
     equ  bdcs_broken,    15   /* read only
     equ  bdcs_broken2,   14   /* read only
     equ  bdcs_mempar,    13   /* read only, write broken2 to clear
     equ  bdcs_memcomp,   12   /* read only, write broken2 to clear
     equ  bdcs_timask,    11   /* read timer mask
     equ  bdcs_pkcomp,    10   /* self test bit
     equ  bdcs_cmdpend,   09   /* command pending
     equ  bdcs_statcng,   08   /* status change bit
     equ  bdcs_side,      07   /* side C if one, C if zero, read only
     equ  bdcs_ipend,     06   /* an interrupt req. on sb is pending,
     equ  bdcs_partner,   05   /* board can be partnered,
     equ  bdcs_zout_gt,   04   /* read bus protect/enable
     equ  bdcs_level1,    03   /* level1 interrupt
     equ  bdcs_romhigh,   02   /* rom is high, read, set, clear
     equ  bdcs_cmd_mask,  01   /* int mask for commands (sbi)
     equ  bdcs_imask,     00   /* int mask for all conditions and levels

     /* write equates for bdcs */

     equ  bdcs_pbusenb,   07   /* Pbus enable
     equ  bdcs_qbusenb,   06   /* Gbus enable
     equ  partnered,      05   /* used to pair boards
     equ  zout_gt,        04   /* bus enable bit
     equ  set_pbus_force,03    /* set PBUS_force bit
     equ  prom_is_high,   02   /* set prom to high address
     equ  imask_istat,    01   /* interrupt mask for cmd pending
     equ  imask_all,      00   /* mask for all conditions

     /* STRATUS BUS COMMAND INTERFACE */
equ  ioa$read_cmd,   00BFB401x   /* start of eight bytes of data for
                                 /*   command specification --- read only

equ  ioa$read_pntr, 00BFB801x  /* read pointer associated with cmd

equ  inum,       00BFB601x   /* interrupt number for external
                               /*  interrupt  write

     /* BOARD CONTROL WORD */
equ  ioa$brd_ctrl,  00BFB400x   /*  board control location

     equ  clr_broken ,   07   /* clear broken flag
     equ  clr_broken2,   06   /* clears broken2 flag,
                              /* mem parity, mem compare err
     equ  clr_chksum,    05   /* TBD
     equ  sync_jiffy,    04   /* sync the clocks
     equ  set_int_req,   03   /* generate external request
     equ  clr_dma_enb,   02   /* clear self test bit
     equ  clr_cmd,       01   /* clear command pending
     equ  clr_stat_chng,00    /* clear status change bit

     /* P BUS STATUS WORD */
equ  ioa$p_status,    00BFBC00x

     equ pbus_online,    15   /* ioa/pbus online
     equ dma_wrt,        14
     equ dma_rd,         13
     equ scan_int,       12   /* scanner interrupt (activelow)
     equ scan_up,       11   /* scanner active (enable*running)
     equ pbus_force,     10
     equ pside_enb,      9    /* P bus enabled
     equ qside_enb,      8    /* C bus enabled
     equ pbus_diag,      7    /* P bus diag force bus
     equ pbus_obey_er,   6    /* Pbus obey error
```

```
     equ pbus_sel_er,     5     /* Pbus select error
     equ pbus_berr_en,    4     /* Pbus select berr enabled
     equ pbus_enb,        3     /* Pbus enabled
     equ pbus_lock,       2     /* pbus lock lock= low
     equ obey_p,          1     /* obey c bus
     equ obey_c,          0     /* obey p bus

     /* adapter memory location */
equ  start_adapt_mem,          00000000x

     /* board id ptr location, offset */
equ  board_id_loc, 1024


     equ        null,1
     priv       on

     equ        ioa_debugger_stack_start, 0AFFEx

ioa$begin_interrupt_handler:

     org        000000

     dc.l       ioa_debugger_stack_start
     dc.l       reset_fault

     dc.l       page_fault_fault
     dc.l       address_error_fault
     dc.l       illegal_instruction_fault
     dc.l       zero_divide_fault
     dc.l       chk_instruction_fault
     dc.l       trapv_instruction_fault
     dc.l       privilege_violation_fault
     dc.l       trace_fault
     dc.l       line_1010_emulator_fault
     dc.l       line_1111_emulator_fault
     dc.l       unassigned_vector_12_fault
     dc.l       unassigned_vector_13_fault
     dc.l       unassigned_vector_14_fault
     dc.l       unassigned_vector_15_fault
     dc.l       unassigned_vector_16_fault
     dc.l       unassigned_vector_17_fault
     dc.l       unassigned_vector_18_fault
     dc.l       unassigned_vector_19_fault
     dc.l       unassigned_vector_20_fault
     dc.l       unassigned_vector_21_fault
     dc.l       unassigned_vector_22_fault
     dc.l       unassigned_vector_23_fault
     dc.l       spurious_interrupt_fault
     dc.l       level_1_autovector_fault
     dc.l       level_2_autovector_fault
     dc.l       level_3_autovector_fault
     dc.l       level_4_autovector_fault
     dc.l       level_5_autovector_fault
     dc.l       level_6_autovector_fault
     dc.l       level_7_autovector_fault
     dc.l       trap_0_instruction_fault
     dc.l       trap_1_instruction_fault
     dc.l       trap_2_instruction_fault
     dc.l       trap_3_instruction_fault
     dc.l       trap_4_instruction_fault
     dc.l       trap_5_instruction_fault
     dc.l       trap_6_instruction_fault
     dc.l       trap_7_instruction_fault
     dc.l       trap_8_instruction_fault
     dc.l       trap_9_instruction_fault
     dc.l       trap_10_instruction_fault
     dc.l       trap_11_instruction_fault
     dc.l       trap_12_instruction_fault
     dc.l       trap_13_instruction_fault
     dc.l       trap_14_instruction_fault
     dc.l       trap_15_instruction_fault
     dc.l       unassigned_vector_48_fault
     dc.l       unassigned_vector_49_fault
```

```
	dc.l	unassigned_vector_50_fault
	dc.l	unassigned_vector_51_fault
	dc.l	unassigned_vector_52_fault
	dc.l	unassigned_vector_53_fault
	dc.l	unassigned_vector_54_fault
	dc.l	unassigned_vector_55_fault
	dc.l	unassigned_vector_56_fault
	dc.l	unassigned_vector_57_fault
	dc.l	unassigned_vector_58_fault
	dc.l	unassigned_vector_59_fault
	dc.l	unassigned_vector_60_fault
	dc.l	unassigned_vector_61_fault
	dc.l	unassigned_vector_62_fault
	dc.l	unassigned_vector_63_fault

/* interrupt vectors

	dc.l	bad_interrupt		/* vector  64
	dc.l	bad_interrupt		/* vector  65
	dc.l	bad_interrupt		/* vector  66
	dc.l	bad_interrupt		/* vector  67
	dc.l	bad_interrupt		/* vector  68
	dc.l	bad_interrupt		/* vector  69
	dc.l	bad_interrupt		/* vector  70
	dc.l	bad_interrupt		/* vector  71
	dc.l	bad_interrupt		/* vector  72
	dc.l	bad_interrupt		/* vector  73
	dc.l	bad_interrupt		/* vector  74
	dc.l	bad_interrupt		/* vector  75
	dc.l	bad_interrupt		/* vector  76
	dc.l	bad_interrupt		/* vector  77
	dc.l	bad_interrupt		/* vector  78
	dc.l	bad_interrupt		/* vector  79
	dc.l	bad_interrupt		/* vector  80
	dc.l	bad_interrupt		/* vector  81
	dc.l	bad_interrupt		/* vector  82
	dc.l	bad_interrupt		/* vector  83
	dc.l	bad_interrupt		/* vector  84
	dc.l	bad_interrupt		/* vector  85
	dc.l	bad_interrupt		/* vector  86
	dc.l	bad_interrupt		/* vector  87
	dc.l	bad_interrupt		/* vector  88
	dc.l	bad_interrupt		/* vector  89
	dc.l	bad_interrupt		/* vector  90
	dc.l	bad_interrupt		/* vector  91
	dc.l	bad_interrupt		/* vector  92
	dc.l	bad_interrupt		/* vector  93
	dc.l	bad_interrupt		/* vector  94
	dc.l	bad_interrupt		/* vector  95
	dc.l	bad_interrupt		/* vector  96
	dc.l	bad_interrupt		/* vector  97
	dc.l	bad_interrupt		/* vector  98
	dc.l	bad_interrupt		/* vector  99
	dc.l	bad_interrupt		/* vector 100
	dc.l	bad_interrupt		/* vector 101
	dc.l	bad_interrupt		/* vector 102
	dc.l	bad_interrupt		/* vector 103
	dc.l	bad_interrupt		/* vector 104
	dc.l	bad_interrupt		/* vector 105
	dc.l	bad_interrupt		/* vector 106
	dc.l	bad_interrupt		/* vector 107
	dc.l	bad_interrupt		/* vector 108
	dc.l	bad_interrupt		/* vector 109
	dc.l	bad_interrupt		/* vector 110
	dc.l	bad_interrupt		/* vector 111
	dc.l	bad_interrupt		/* vector 112
	dc.l	bad_interrupt		/* vector 113
	dc.l	bad_interrupt		/* vector 114
	dc.l	bad_interrupt		/* vector 115
	dc.l	bad_interrupt		/* vector 116
	dc.l	bad_interrupt		/* vector 117
	dc.l	bad_interrupt		/* vector 118
	dc.l	bad_interrupt		/* vector 119
	dc.l	bad_interrupt		/* vector 120
```

```
dc.l        bad_interrupt        /* vector 121
dc.l        bad_interrupt        /* vector 122
dc.l        bad_interrupt        /* vector 123
dc.l        bad_interrupt        /* vector 124
dc.l        bad_interrupt        /* vector 125
dc.l        bad_interrupt        /* vector 126
dc.l        bad_interrupt        /* vector 127
dc.l        bad_interrupt        /* vector 128
dc.l        bad_interrupt        /* vector 129
dc.l        bad_interrupt        /* vector 130
dc.l        bad_interrupt        /* vector 131
dc.l        bad_interrupt        /* vector 132
dc.l        bad_interrupt        /* vector 133
dc.l        bad_interrupt        /* vector 134
dc.l        bad_interrupt        /* vector 135
dc.l        bad_interrupt        /* vector 136
dc.l        bad_interrupt        /* vector 137
dc.l        bad_interrupt        /* vector 138
dc.l        bad_interrupt        /* vector 139
dc.l        bad_interrupt        /* vector 140
dc.l        bad_interrupt        /* vector 141
dc.l        bad_interrupt        /* vector 142
dc.l        bad_interrupt        /* vector 143
dc.l        bad_interrupt        /* vector 144
dc.l        bad_interrupt        /* vector 145
dc.l        bad_interrupt        /* vector 146
dc.l        bad_interrupt        /* vector 147
dc.l        bad_interrupt        /* vector 148
dc.l        bad_interrupt        /* vector 149
dc.l        bad_interrupt        /* vector 150
dc.l        bad_interrupt        /* vector 151
dc.l        bad_interrupt        /* vector 152
dc.l        bad_interrupt        /* vector 153
dc.l        bad_interrupt        /* vector 154
dc.l        bad_interrupt        /* vector 155
dc.l        bad_interrupt        /* vector 156
dc.l        bad_interrupt        /* vector 157
dc.l        bad_interrupt        /* vector 158
dc.l        bad_interrupt        /* vector 159
dc.l        bad_interrupt        /* vector 160
dc.l        bad_interrupt        /* vector 161
dc.l        bad_interrupt        /* vector 162
dc.l        bad_interrupt        /* vector 163
dc.l        bad_interrupt        /* vector 164
dc.l        bad_interrupt        /* vector 165
dc.l        bad_interrupt        /* vector 166
dc.l        bad_interrupt        /* vector 167
dc.l        bad_interrupt        /* vector 168
dc.l        bad_interrupt        /* vector 169
dc.l        bad_interrupt        /* vector 170
dc.l        bad_interrupt        /* vector 171
dc.l        bad_interrupt        /* vector 172
dc.l        bad_interrupt        /* vector 173
dc.l        bad_interrupt        /* vector 174
dc.l        bad_interrupt        /* vector 175
dc.l        bad_interrupt        /* vector 176
dc.l        bad_interrupt        /* vector 177
dc.l        bad_interrupt        /* vector 178
dc.l        bad_interrupt        /* vector 179
dc.l        bad_interrupt        /* vector 180
dc.l        bad_interrupt        /* vector 181
dc.l        bad_interrupt        /* vector 182
dc.l        bad_interrupt        /* vector 183
dc.l        bad_interrupt        /* vector 184
dc.l        bad_interrupt        /* vector 185
dc.l        bad_interrupt        /* vector 186
dc.l        bad_interrupt        /* vector 187
dc.l        bad_interrupt        /* vector 188
dc.l        bad_interrupt        /* vector 189
dc.l        bad_interrupt        /* vector 190
dc.l        bad_interrupt        /* vector 191
dc.l        bad_interrupt        /* vector 192
dc.l        bad_interrupt        /* vector 193
dc.l        bad_interrupt        /* vector 194
```

```
	dc.l	bad_interrupt		/* vector 195
	dc.l	bad_interrupt		/* vector 196
	dc.l	bad_interrupt		/* vector 197
	dc.l	bad_interrupt		/* vector 198
	dc.l	bad_interrupt		/* vector 199
	dc.l	bad_interrupt		/* vector 200
	dc.l	bad_interrupt		/* vector 201
	dc.l	bad_interrupt		/* vector 202
	dc.l	bad_interrupt		/* vector 203
	dc.l	bad_interrupt		/* vector 204
	dc.l	bad_interrupt		/* vector 205
	dc.l	bad_interrupt		/* vector 206
	dc.l	bad_interrupt		/* vector 207
	dc.l	bad_interrupt		/* vector 208
	dc.l	bad_interrupt		/* vector 209
	dc.l	bad_interrupt		/* vector 210
	dc.l	bad_interrupt		/* vector 211
	dc.l	bad_interrupt		/* vector 212
	dc.l	bad_interrupt		/* vector 213
	dc.l	bad_interrupt		/* vector 214
	dc.l	bad_interrupt		/* vector 215
	dc.l	bad_interrupt		/* vector 216
	dc.l	bad_interrupt		/* vector 217
	dc.l	bad_interrupt		/* vector 218
	dc.l	bad_interrupt		/* vector 219
	dc.l	bad_interrupt		/* vector 220
	dc.l	bad_interrupt		/* vector 221
	dc.l	bad_interrupt		/* vector 222
	dc.l	bad_interrupt		/* vector 223
	dc.l	bad_interrupt		/* vector 224
	dc.l	bad_interrupt		/* vector 225
	dc.l	bad_interrupt		/* vector 226
	dc.l	bad_interrupt		/* vector 227
	dc.l	bad_interrupt		/* vector 228
	dc.l	bad_interrupt		/* vector 229
	dc.l	bad_interrupt		/* vector 230
	dc.l	bad_interrupt		/* vector 231
	dc.l	bad_interrupt		/* vector 232
	dc.l	bad_interrupt		/* vector 233
	dc.l	bad_interrupt		/* vector 234
	dc.l	bad_interrupt		/* vector 235
	dc.l	bad_interrupt		/* vector 236
	dc.l	bad_interrupt		/* vector 237
	dc.l	bad_interrupt		/* vector 238
	dc.l	bad_interrupt		/* vector 239
	dc.l	bad_interrupt		/* vector 240
	dc.l	bad_interrupt		/* vector 241
	dc.l	bad_interrupt		/* vector 242
	dc.l	bad_interrupt		/* vector 243
	dc.l	bad_interrupt		/* vector 244
	dc.l	bad_interrupt		/* vector 245
	dc.l	bad_interrupt		/* vector 246
	dc.l	bad_interrupt		/* vector 247
	dc.l	bad_interrupt		/* vector 248
	dc.l	bad_interrupt		/* vector 249
	dc.l	bad_interrupt		/* vector 250
	dc.l	bad_interrupt		/* vector 251
	dc.l	bad_interrupt		/* vector 252
	dc.l	bad_interrupt		/* vector 253
	dc.l	bad_interrupt		/* vector 254
	dc.l	bad_interrupt		/* vector 255

	eject
/* ===============================================

/* The following must be at this known address, since
/* s$$add_ioa_controller looks for it here.  If the
/* interrupt vector ever somehow grows bigger, the
/* org statement will cause a phase error and prevent
/* assembly, eventually forcing someone to read this
/* comment and modify s$$add_ioa_controller to match.

	org	0400x
```

```
/* restart interrupted code

restart_interrupt:
     clr.l      (a7)+            /* clobber and pop '*MC*'
     clr.l      (a7)+            /* clobber and pop slot number
     pop.l      a0               /* usp
     move.l     a0,usp
     pop.l      d0-d7;a0-a6
     addq.l     =6,a7            /* pop int_sr, flags, and faultno
     rte

bad_interrupt: /* bad vector, this should be impossible
     trap       =15

     drop       'mc'
     eject
/* common fault handling code

fault_jsr:
     jsr        fault
page_fault_fault:
     jsr        fault
access_error_fault:
     jsr        fault
illegal_instruction_fault:
     jsr        fault
zero_divide_fault:
     jsr        fault
chk_instruction_fault:
     jsr        fault
trapv_instruction_fault:
     jsr        fault
privilege_violation_fault:
     jsr        fault
trace_fault:
     jsr        fault
line_1010_emulator_fault:
     jsr        fault
line_1111_emulator_fault:
     jsr        fault
unassigned_vector_12_fault:
     jsr        fault
unassigned_vector_13_fault:
     jsr        fault
unassigned_vector_14_fault:
     jsr        fault
unassigned_vector_15_fault:
     jsr        fault
unassigned_vector_16_fault:
     jsr        fault
unassigned_vector_17_fault:
     jsr        fault
unassigned_vector_18_fault:
     jsr        fault
unassigned_vector_19_fault:
     jsr        fault
unassigned_vector_20_fault:
     jsr        fault
unassigned_vector_21_fault:
     jsr        fault
unassigned_vector_22_fault:
     jsr        fault
unassigned_vector_23_fault:
     jsr        fault
spurious_interrupt_fault:
     jsr        fault
level_1_autovector_fault:
     jsr        fault
level_2_autovector_fault:
     jsr        fault
level_3_autovector_fault:
     jsr        fault
```

```
level_4_autovector_fault:
     jsr         fault
level_5_autovector_fault:
     jsr         fault
level_6_autovector_fault:
     jsr         fault
level_7_autovector_fault:
     jsr         fault
trap_0_instruction_fault:
     jsr         fault
trap_1_instruction_fault:
     jsr         fault
trap_2_instruction_fault:
     jsr         fault
trap_3_instruction_fault:
     jsr         fault
trap_4_instruction_fault:
     jsr         fault
trap_5_instruction_fault:
     jsr         fault
trap_6_instruction_fault:
     jsr         fault
trap_7_instruction_fault:
     jsr         fault
trap_8_instruction_fault:
     jsr         fault
trap_9_instruction_fault:
     jsr         fault
trap_10_instruction_fault:
     jsr         fault
trap_11_instruction_fault:
     jsr         fault
trap_12_instruction_fault:
     jsr         fault
trap_13_instruction_fault:
     jsr         fault
trap_14_instruction_fault:
     jsr         fault
trap_15_instruction_fault:
     jsr         fault
unassigned_vector_48_fault:
     jsr         fault
unassigned_vector_49_fault:
     jsr         fault
unassigned_vector_50_fault:
     jsr         fault
unassigned_vector_51_fault:
     jsr         fault
unassigned_vector_52_fault:
     jsr         fault
unassigned_vector_53_fault:
     jsr         fault
unassigned_vector_54_fault:
     jsr         fault
unassigned_vector_55_fault:
     jsr         fault
unassigned_vector_56_fault:
     jsr         fault
unassigned_vector_57_fault:
     jsr         fault
unassigned_vector_58_fault:
     jsr         fault
unassigned_vector_59_fault:
     jsr         fault
unassigned_vector_60_fault:
     jsr         fault
unassigned_vector_61_fault:
     jsr         fault
unassigned_vector_62_fault:
     jsr         fault
unassigned_vector_63_fault:
     jsr         fault
end_fault_jsr:
```

```
/* all faults handled here

fault:
     push.w    sr              /* push sr to keep same format
                               /* as interrupt
     push.l    d0-d7;a0-a6
     move      usp,a3
     push.l    a3

/* NOTE:
     push.l    d0              /* save currently selected slot on stack

     move.l    ='*MC*',d0      /* leave flag for debugger in
     push.l    d0              /* place where time should go
     using     'mc',a7
     subi.l    =fault_jsr,mc.flags  /* compute fault number
     move.w    mc.faultno,d1        /* pickup fault number
     lsr.w     =2,d1                /* divide by 4
     move.w    d1,mc.faultno
     movec.l   =0,d0
     bset.l    =mc.flags.fault.bit,d0  /* set bit indicating fault
     cmp.w     =PAGE_FAULT,d1       /* bus error?
     beq.b     $set_ext             /* yes, go set extended format
     cmp.w     =ADDRESS_ERROR,d1    /* addr error?
     bne.b     $skip_ext            /* yes, drop through and set extended fmt
$set_ext:
     bset.l    =mc.flags.extended_fmt.bit,d0
                                    /* indicate extended fault data
$skip_ext:
     move.w    d0,mc.flags

process_fault:
     cmp.w     =TRAP_3_INSTRUCTION,d1   /* breakpoint?
     beq.b     process_breakpoint
     cmp.w     =TRAP_2_INSTRUCTION,d1   /* av/pcp breakpoint?
     beq.b     process_breakpoint
     cmp.w     =TRACE,d1                /* trace (breakpoint restart)?
     beq.b     process_trace
     movem.l   ioa_debug$fault_link,a4;a5
     push.l    a7              /* mcp, = addr (mc)
     push.l    a7              /* addr (mcp), the parameter
     jsr       (a4)
     addq.l    =8,a7
     move.w    mc.flags,d0
     btst.l    =mc.flags.extended_fmt.bit,d0
     beq.w     restart_interrupt  /* use short format code

/* restart extended format fault

     clr.l     (a7)+           /* clobber and pop '*MC*'
     pop.l     a0              /* current slot
     pop.l     a0              /* usp
     move.l    a0,usp
     pop.l     d0-d7;a0-a6
     addq.l    =6,a7           /* pop int_sr, flags, and faultno
     addq.l    =6,a7           /* pop reason, address, and inst
     rte

process_breakpoint:
     movem.l   ioa_debug$breakpoint_link,a4;a5
     bra.b     benign_fault

process_trace:
     movem.l   ioa_debug$trace_link,a4;a5
benign_fault:
     push.l    a7              /* mcp, = addr (mc)
     push.l    a7              /* addr (mcp), the parameter
     jsr       (a4)
     addq.l    =8,a7
     bra.w     restart_interrupt

     drop      'mc'

     eject
```

```
/* code in the prom does a simulated reset fault
/* when starting the loaded code. This causes
/* us to start executing here

     extdef     reset_fault

reset_fault:
     move.w     =2700x,sr

/* mask, and save registers

     push.w     sr                /* save new status register
     ori.w      =sr.interrupt_mask,sr    /* first, mask interupts
     push.l     d0-d7;a0-a6       /* push rest of registers
     move.l     usp,a0
     push.l     a0
     move.l     ='*MC*',d0        /* leave flag for debugger in
     push.l     d0                /* place where time should go

/* full machine conditions structure now pushed

    using      'mc',a7

/* call debugger

     movem.l    ioa_debug$level7_link,a4;a5

     push.l     a7                /* mcp, = addr (mc)
     push.l     a7                /* addr (mcp), the parameter
     jsr        (a4)
     addq.l     =8,a7
     bra.w      restart_interrupt

     drop       'mc'

ioa_debug$level7_link:
     elink      ioa_debug$level7

ioa_debug$fault_link:
     elink      ioa_debug$fault

ioa_debug$breakpoint_link:
     elink      ioa_debug$break

ioa_debug$trace_link:
     elink      ioa_debug$trace_fault

     extdat     ioa$end_interrupt_handler
ioa$end_interrupt_handler:
     ds.w       0

init_was_last_static_addr:
     dc.l       init_was_last

     use        'static'

init_was_last:
     dc.b       0

     end
```

```
/*   ***begin copyright*** ********************************   */
/*                                                           */
/*   STRATUS CONFIDENTIAL INFORMATION: CLASS II              */
/*   COPYRIGHT (c) Stratus Computer, Inc. 1986               */
/*                                                           */
/*   This  program  contains  confidential and proprietary   */
/*   information  of  Stratus Computer,  Inc.,   and   any   */
/*   reproduction,  disclosure, or use in whole or in part   */
/*   is   expressly   prohibited,   except   as   may   be   */
/*   specifically authorized by prior written agreement or   */
/*   permission of Stratus.                                  */
/*                                                           */
/*   ***end copyright*** **********************************   */
```

```
/* IOA_POP_SUPPORT: Entrypoints that are needed to resolve references
     from pops. All current entries are dummies and must be replaced if
     actually used. */
/* Beginning of modification history */
/* Written July 1986 by Tom Moser */
/* Modified 86-10-22 by Kevin Paetzold to add stub for s$unwinder */
/* End of modification history */

/* entries */

dcl  ioa_debug$crash          entry (char (*) var);
dcl  hex                      entry (bin (31), bin (15)) returns (char (8)
                              var);

/* ============================================================ */
pl1_date:
     proc returns (char (6));
     return ('YYMMDD');
     end pl1_date;

/* ============================================================ */
pl1_time:
     proc returns (char (6));
     return ('HHMMSS');
     end pl1_time;

/* ============================================================ */
s$stop_program:
     proc (a_str, a_code);

dcl  a_str                    char (256) var;
dcl  a_code                   fixed bin (15);

     call ioa_debug$crash ('s$stop_program; code = ' || hex ((a_code), 4)
            || 'x.');

end s$stop_program;

/* ============================================================ */
s$allocate:
     proc (a_size, a_ptr);

dcl  a_size                   fixed bin (31);
dcl  a_ptr                    ptr;

     call ioa_debug$crash ('s$allocate - unexpected call.');

s$free:
     entry (a_ptr);

     call ioa_debug$crash ('s$free - unexpected call.');

end s$allocate;

/* ============================================================ */
s$signal_condition:
     proc (a_cond, a_fcbp, a_name, a_oncode, a_msg);

dcl  a_cond                   fixed bin (15);
dcl  a_fcbp                   ptr;
dcl  a_name                   char (32) var;
dcl  a_oncode                 fixed bin (15);
dcl  a_msg                    char (256) var;

     call ioa_debug$crash ('Condition #' || hex ((a_cond), 2) ||
            'x signalled; oncode = ' || hex ((a_oncode), 4) || 'x.');

end s$signal_condition;

/* ============================================================ */
s$find_condition_info:
     proc (a_infop, a_code);
```

```
dcl  a_infop                     ptr;
dcl  a_code                      fixed bin (15);

     a_infop = null ();
     a_code = 0;

s$unwinder: entry;

end s$find_condition_info;

/*   ***begin copyright*** ********************************
/*
/*   STRATUS CONFIDENTIAL INFORMATION: CLASS II
/*   COPYRIGHT (c) Stratus Computer, Inc. 1985
/*
/*   This program contains confidential and proprietary
/*   information of Stratus Computer, Inc., and any
/*   reproduction, disclosure, or use in whole or in part
/*   is expressly prohibited, except as may be
/*   specifically authorized by prior written agreement or
/*   permission of Stratus.
/*
/*   ***end copyright*** **********************************
/*

     title     'UCOMM (Universal DMA Communications Adapter PC #1) Boot Rom'

equ  board_promware_revision, 3             /* Promware revision number
/*
/* CREATED: 17-Nov-86 16:39
/*
/*     This is the rom code for the Universal DMA communications
/*  controller/adapter, which runs in conjunction with the General
/*  Purpose I/O Controller (GIOC). The intent of this code is
/*  threefold: First, it provides initialization / setup of the
/*  board in preparation for logical connection to the GIOC; Second,
/*  it provides a library of test routines already present on the
/*  board for exercising and verifying the basic operation of all
/*  major components; and Third, it provides the software complement
/*  to the hardware facility for down- loading and starting the main,
/*  operational code (including the communications software) for the
/*  board. Note that no provision is made for pre-VOS console I/O,
/*  as this board is not meant to replace the ACOMM or Comm/Calendar.
/*
/*   Edit history:
/*
/* Beginning of modification history
/*
/* Modified 87-06-01 by Dick Richelo to allow soft vector to panic dump list.
/*
/* End of modification history
/*

extdef     gioc_ucomm_rom_code /* Entry point stuff.
main       gioc_ucomm_rom_code
model      mc68000             /* No vector base register, etc.

     /* Define symbolic constants:
     incl      'adapter_bit_defs'       /* File #2
     incl      'ioa_ucom_hw_defs'       /* File #3
     incl      'ioa_ucom_sw_defs'       /* File #4
     incl      'iop_adapter_types'      /* File #5

     equ       microcode_rev, 0
     equ       sp, a7           /* Assign mnemonic for our stack pointer

     use       'code'
     org       0                /* Start program counter at zero for binder...

gioc_ucomm_rom_code:     priv      on    /* *** Program entry point ***

/* The following gets us a label at the beginning of the
/* static region, for determining the size of that region later.
```

```
    use       'static'
static_origin:
    ds.l      0
    use       'code'
    eject                                   /* File #1 is this current file

    equ       decimal_prom_base, 2097152
    equ       eb, eprom_base

        title     'GIOC Adapter Vector and ID PROM definitions'

start_up_vectors:   /* Following are the boot-time vector area contents
start:              /* (this is also the start of rom code space)
    bra.w     jump_0_catcher           /* Catch inadvertent jumps through 0
    dc.l      reset                    /* Start here, while rom is still low.
                                       /* This sets PC past vector area.
    incl      'ioa_ucom_vector_table'  /* File #5

    incl      'board_id_structure'     /* Get the ID block structure and size

id_prom_vector:
    dc.l      eb+gioc_ucomm_prom_size-board_id.length /* --> ID PROM section
commailbox_vector:
    dc.l      gioc_commailbox          /* --> GIOC<-->adapter comm mailbox
eeprom_reserved_ram_vector:
    dc.l      scratch_area_top         /* EEPROM needs safe mem from here up
pbus_visible_memory_base:
    dc.l      local_mem_base           /* Beginning of P-bus visible ram
eeprom_actual_size:
    dc.l      gioc_ucomm_prom_size     /* Size of entire EEPROM in bytes
board_sw_rev_num:
    dc.l      board_promware_revision  /* Promware revision number
firmware_entry_vector:
    dc.l      firmware_call_entry+eb   /* Call here to enter prom from ram prg
firmware_mbx_call_vector:
    dc.l      firmware_mbx_call_entry+eb /* Call here to execute MBX command
ioa$_panic_dump_list_vector:
    dc.l      ioa$_panic_dump_list     /* Up to 16 page #s for crash dumping
ioa$_panic_dump_call_vector:
    dc.l      ioa$_panic_dump_call_ptr /* Pointer for crash dump register grab

        title     'UCOMM Init Code'

    /*   Start EEPROM code

equ  m68k_no_interrupts,      m68k_sr.supv!m68k_intlvl_7
equ  board_id_version,                 0          /* Dummy value for now    (w)
equ  board_type,                  UCOMM_422       /* UCOMM /w RS422 interface
equ  board_id_flags,  board_id.flags.self_test.mask  /* Board has self test (w)
equ  board_id_model,                   0          /* Dummy value for now    (l)
equ  board_id_serial_number,           0          /* Dummy value for now    (l)
equ  board_id_revision,                0          /* Dummy value for now    (w)
equ  board_id_art_work_rev,            0          /* Dummy value for now    (w)
equ  board_id_min_gioc_rev,            0          /* Dummy value for now    (w)
equ  board_id_num_serviced,            0          /* Dummy value for now    (w)
equ  board_id_history_service_date,    0          /* Dummy value for now    (l)
equ  board_id_history_service_code,    0          /* Dummy value for now    (w)
equ  board_id_checksum,                0          /* Calc'd at prom build time

        use       'code'
reset:
    /*   Ensure Supervisor mode and no interrupts
    ori       =m68k_sr.supv!m68k_intlvl_7, sr
    /* Init registers at boot time
    move.l    =error+eb,               d0   /* Move this value for 'scoping
    move.l    =error_end+eb,           d1   /* Move this value for 'scoping
    move.l    =error_regsave_area,     d2   /* Move this value for 'scoping
    move.l    =gioc_commailbox,        d3   /* Move this value for 'scoping
    move.l    =static_area_base,       d4   /* Move this value for 'scoping
    move.l    =scratch_area_top,       d5   /* Move this value for 'scoping
    move.l    =timer_ctl_base,         d3   /* Move this value for 'scoping
    move.l    =scc_csr_base,           d3   /* Move this value for 'scoping
    move.l    =io_ctr_base,            d6   /* Move this value for 'scoping
    move.l    =dma_ctl_base,           d3   /* Move this value for 'scoping
    move.l    =gpio_base,              d3   /* Move this value for 'scoping
```

```
/*      move.l     #bdcsr,d7                         /* Copy the init time CSRs for
      movea.l   d3,                          a4   /*  later analysis
      movea.l   d4,                          a5   /* Start static area in low mem
      movea.l   =boot_time_supv_stack,       a6   /* Init the frame pointer
      move.l    a5,                          usp
      movea.l   a6,                          sp   /* Init the stack

      jmp       #high_start+eprom_base            /* Change PC to high rom addresses

      title     'UCOMM Init -- Static Memory tests'

high_start:
      move.b    =bdcsr1.ctl.set_prom_high, bdcsr1  /* Enable low ram addr decode
      bra.b     init_static_tests                 /* Start the static tests
      nop                                         /* Needed for immediate branch

      incl      'ioa_ucom_statsts.code'           /* Call in the common static tests

      title     'UCOMM Init -- Static and Stack init code'

init_static_area:
      /* Static area tested -- now set it up...
      move.l    =static_area, d0           /* Use FRAM until DRAM available
      movea.l   d0, static_area_base_reg   /* Static area references are now valid
      movea.l   =ram_stack_top, sp         /* Start stack right below static area
      move.l    sp, usp                    /* Do the user stack pointer, also
      movea.l   sp, a6                     /* Frame pointer -- now we can
                                           /*  do framed calls ('C' too!)
      movea.l   =boot_time_saved_bdcsr, a4 /* Board csr gets saved here...
      move.l    d7, (a4)                   /* Board CSR1 saved at boot time
                                           /* (Also saves CSR2 from boot time)
      move.l    =ram_vector_base, pseudo_vbr /* Load fake VBR if using MC6800x

      move.b    =bdcsr1.ctl.set_prom_high, bdcsr1  /* Ensure high address range
      jmp       #ucomm_main_setup+eprom_base  /* Skip the hack kludge startup

           title     'UCOMM Main setup loop'

ucomm_main_setup:
      jsr       setup_vectors              /* write the vector area in low sram
      jsr       init_GIOC_mailbox          /* Load up initial commailbox for GIOC
      jsr       restore_rom_vectors        /* Try to catch interrupts
      bra.b     $skip_functional_tests     /** PATCH ** No-op for full tests
$loop_functional_tests:
      nop                                  /* Get op-code for no-op instruction
      jsr       functional_tests           /* Test what we can in little time left
      bra.b     $loop_functional_tests     /** PATCH ** Patch no-op for one pass
$skip_functional_tests:                    /* Jump here to skip full tests
      reset                                /* Reset bus without initing 68000

      move.b    =bdcsr1.ctl.clr_red_light, bdcsr1  /* Clear the Little Red Light

      /* Tests (if any) have completed, so assume we should blink the red light
      incl      'ioa_ucom_blinker.code'    /* Bring in the blinking light code

      /* Reset logic which should be quiesced at test completion
reset_IO:
      jsr       reset_IO_stop_dmac         /* Stop DMAC from accessing the bus
      rts                                  /* That's all for now

      /* Call here to execute command already in the MBX, then return to caller
firmware_mbx_call_entry:
      rts

      /* Call here to enter prom from ram prg
firmware_call_entry:
      move.l    sp, #junk_long+static_area_base /* Save caller's stack pointer
      movea.l   =ram_stack_top, sp         /* Start stack right below static area

      /*   Ensure Supervisor mode and no interrupts
      ori       =m68k_no_interrupts, sr  /* Force supervisor and no interrupts
      push.l    #junk_long+static_area_base /* Save caller's stack ptr on stack
      push.l    d0-d7;a0-a6;               /* Save all of caller's stuff
```

```
     /* Init registers at boot time
     move.l    =error+eb,                 d0    /* Move this value for 'scoping
     move.l    =error_end+eb,             d1    /* Move this value for 'scoping
     move.l    =error_regsave_area,       d2    /* Move this value for 'scoping
     move.l    =gioc_commailbox,          d3    /* Move this value for 'scoping
     move.l    =static_area_base,         d4    /* Move this value for 'scoping
     move.l    =scratch_area_top,         d5    /* Move this value for 'scoping
     move.l    #bdcsr16-2,                d7    /* Copy the init time CSRs for
     movea.l   d3,                        a4    /*  later analysis
     movea.l   d4,                        a5    /* Start static area in low mem

     move.l    sp, usp                  /* Do the user stack pointer now
     movea.l   sp, a6                   /* Frame pointer -- now we can
                                        /*  do framed calls ('C' too!)

     move.l    =static_area, d0         /* Use FRAM until DRAM available
     movea.l   d0, static_area_base_reg /* Static area references are now valid

     movea.l   =boot_time_saved_bdcsr, a4 /* Board csr gets saved here...
     move.l    d7, (a4)                 /* Board CSR1 saved at boot time
                                        /* (Also saves CSR2 from boot time)
     move.l    =ram_vector_base, pseudo_vbr /* Load fake VBR if using MC6800x

     /* Now we're ready to execute ROM code -- For now, though, just return...

     pop.l     d0-d7;a0-a6;             /* Restore all of caller except stack
     pop.l     sp                       /* Restore caller's stack pointer
     rts                                /* And then just go back to caller


     title     'UCOMM Main -- Test dispatches'

     /* Run every test in the sequence, then return (assuming no errors)
functional_tests:
     move.w    =dispatch_table_max_test, d1     /* Get zero-based test count
$next_test:
     move.w    =dispatch_table_max_test, d0     /* Get new test base
     sub.w     d1, d0                   /* Find next test number
     movea.l   =error_regsave_area, a0  /* Point to start of reg. save area
     move.w    d0, saved_error.test_number(a0) /* Save test number for errors
     push.w    d1                       /* Save test count for later
     jsr       dispatcher               /* Now dispatch to the desired test
     pop.w     d1                       /* Get back old test number
     dbra      d1, $next_test           /* Go on to next test if any are left
     rts

     title     'UCOMM Main -- Test dispatcher'
dispatcher:
     /* Run the test specified in D0
     cmp.w     =dispatch_table_count, d0      /* Was test number too high?
     blt.b     valid_test_number              /* Nope, so call the test

     /* Test too high -- handle an error
invalid_test_number:
     stop      =m68k_sr.supv!m68k_intlvl_7 /* Gawd! This is fatal!!!

     /* Get the EEPROM offset to the selected test specified by D0
valid_test_number:
     asl.w     =2, d0                   /* Mul by 4 for indexed table pointer
     lea       test_dispatch_table, a0  /* Get pointer to start of table
     movea.l   0(a0,d0.w), a0           /* Get test ptr in an addr reg for JSR
     move.l    =eprom_base, d6          /* Compensate for relocated prom
     jmp       0(a0, d6.l)              /* Call test -- should return to caller

     title     'UCOMM Main -- GIOC mailbox Interrupt service'

     /* Just wait for somebody to call us for service
wait_for_interrupt:
     move.b    =bdcsr1.ctl.inhibit_all_intr, bdcsr1 /* Inhibit all interrupts
/*     bra.b     $L01                       /* X01: Debuggery -- no interrupt hdlr!
/*     movea.l   pseudo_vbr, a3                       /* Get vector base
/*     lea       iop_interrupt_catcher, a0 /* Addrs of GIOC interrupt handler
/*     move.l    a0, gioc_cmd_vector(a3)  /* Catch commands
/*     move.b    =bdcsr1.ctl.csabl_timer_intr, bdcsr1 /* No timer chip interrupts
```

```
/*      move.b    =bdcsr1.ctl.dsabl_scc_intr, bdcsr1   /* No SCC chip interrupts
/*      move.b    =bdcsr1.ctl.enabl_cmd_intr, bdcsr1   /* Enable GIOC commands
     jsr        check_GIOC_mailbox         /* See if a command needs service...
$L01:
     rts

ioa$_do_initialize_memory:
     jsr        zero_main_mem         /* Just zap out memory
     rts

ioa$_run_short_tests:
     rts                                   /* Nothing we run takes a short time
     incl       'ioa_ucom_lcl_cmd_table' /* File #x

     use        'code'

     title      'UCOMM Main -- Old test dispatch table'

control_reg_test_0:
status_reg_test_0:
/*memory_test_0:
/*memory_test_1:
/*memory_test_2:
/*memory_test_3:

     /* For now, these tests are just no-ops...
     rts

test_dispatch_table:
     dc.l       control_reg_test_0         /* Test control register bits
     dc.l       status_reg_test_0          /* Test status register bits
     dc.l       memory_test_0              /* Test all 0's pattern on main mem
     dc.l       memory_test_1              /* Test all 1's pattern on main mem
     dc.l       memory_test_2              /* Test rotating bit pat on main mem
     dc.l       memory_test_3              /* Test main memory parity
     dc.l       memory_test_4              /* Test main memory data=addrs
     dc.l       restore_rom_vectors        /* Try to catch interrupts
     dc.l       timer_test_0               /* Test TIMER counters and zero timer
     dc.l       timer_test_1               /* Test TIMER interrupt logic & ctrs
     dc.l       timer_test_2               /* Test TIMER interrupt mask logic
     dc.l       scc_test_0                 /* Write/Read SCC registers
     dc.l       scc_test_1                 /* SCC non-interrupt loopback test
     dc.l       scc_test_2                 /* SCC interrupt and loopback test
     dc.l       dmac_test_0                /* Test DMA registers with reads only
     dc.l       dmac_test_1                /* Test DMA read/write registers
test_dispatch_last_test_addr:
     dc.l       dmac_test_2                /* Test DMAC/SCC read/write operations
/*      dc.l       dmac_test_3               /* Test DMAC/SCC array operations
/*      dc.l       dmac_test_4               /* Test DMAC/SCC linked array ops
/*test_dispatch_last_test_addr:
/*      dc.l       dmac_test_5               /* Test DMAC interrupts
test_dispatch_table_end:
     dc.w       0

equ  dispatch_table_count, (test_dispatch_table_end-test_dispatch_table)/4
equ  max_test_offset, test_dispatch_last_test_addr-test_dispatch_table
equ  dispatch_table_max_test, max_test_offset/4

     use        'static'
unknown_device_interrupted_flag:   dc.l 0    /* <>0 if unknown device interrupt
error_loop_exit_flag:             dc.w 0    /* -1 = Exit error halt if scoping done
pseudo_vbr:                       dc.l 0    /* Vector area pointer for MC6800x's
junk_long:                        dc.l 0    /* Junk longword, aligned
local_junk:                       dc.l 0    /* Junk longword for error handler
     use        'code'

     /* File #x
     incl       'ioa_error_handler.code'      /* Bring in generic error handler
     incl       'ioa_ucom_err_hdlr.code'      /* Bring in local error handler

     /* Clear 'BROKEN' flag now in both Gate Arrays
ioa_lcl$_clear_broken:
     move.b     =clr_BK, G_A_wreg0            /* Clear G-A BROKEN
     rts
```

```
     /* Clear 'BROKEN2' flag now in both Gate Arrays
ioa_lcl$_clear_broken_2:
     move.b    =clr_BK2, G_A_wreg0
     rts

     /* Allow 'BROKEN' after a forced clear
ioa_lcl$_allow_broken:
     move.b    =0, G_A_wreg0                  /* Allow BROKEN again
     rts

     /* Make this board go BROKEN
ioa_lcl$_board_go_broken:
make_board_go_broken:
     move.b    =bdcsr3.ctl.set_broken, bdcsr3 /* Break board manually
     rts

     /* Inhibit all interrupts
ioa_lcl$_hw_inhibit_all:
     move.b    =bdcsr1.ctl.inhibit_all_intr, bdcsr1
     rts

error_end:     /* For logic analyzer.

     /* Stop DMAC from accessing the bus
reset_IO_stop_dmac:
     rts       /* Not yet, we don't...

     /* Post mailbox interrupt to GIOC -- adapter-specific mailbox operation
     /* (Tell the GIOC to look at the mailbox...)
post_mbx_intr_to_gioc:
     move.b    =mbx_to_iop_intr_code, G_A_wreg2 /* Set GIOC Command Intr PULSE
     rts       /* Hey, that's all!

     /* Disable local interrupts using local hardware (masks) if available
disable_local_interrupts:
     move.w    =m68k_no_interrupts, sr              /* Ensure no interrupts
     move.b    =bdcsr1.ctl.inhibit_all_intr, bdcsr1 /* Inhibit all interrupts
     move.b    =bdcsr1.ctl.dsabl_cmd_intr, bdcsr1   /* 1 = Inhib GIOC cmd intr
     move.b    =bdcsr1.ctl.dsabl_scc_intr, bdcsr1   /* 1 = Inhib SCC chip intr
     move.b    =bdcsr1.ctl.dsabl_timer_intr, bdcsr1 /* 1 = Inhibit timer intr
     move.b    =bdcsr1.ctl.clr_level_7_intr, bdcsr1 /* 1 = Inhibit the debugger
     rts

/* *********************************************************************

/* Files #m thru n:
     incl      'ioa_ucom_mem_tsts.code' /* Bring in some memory test code
     incl      'ioa_ucom_scc_tsts.code' /* Bring in the SCC chip test code
     incl      'ioa_ucom_tmr_tsts.code' /* Bring in the timer tests
/*     incl      'gate_array_tmr_tsts' /* Bring in the timer tests
     incl      'ioa_ucom_dma_tst1.code' /* Bring in the DMA controller tests
/*     incl      'ioa_ucom_dma_tst2.code' /* Bring in the DMA controller tests
     incl      'ioa_ucom_inthdlrs.code' /* Bring in remaining interrupt hdlrs
     incl      'ioa_ucom_utils.code'    /* Bring in the common utility routines
/*     incl      'ioa_ucom_dumphdlr.code' /* Bring in the dump handler
     incl      'adapter_test_equates'   /* Bring in the common test codes
     incl      'adapter_error_equates'  /* Bring in the common error codes
     incl      'ioa_mbx_handler.code'   /* Get the GIOC<-->adapter mailbox code
     incl      'ioa_dump_handler.code'  /* Get the adapter-->GIOC dumper code

     title     'Section equates'

     join      'code',   'local_constants'

/* NOTE!! These static allocations MUST BE THE LAST ONES joined to the
/* 'static' area, as they contain the boundary marker info for the
/* end of the static area. Since the static area is relocated
/* to ram before use, this value is critical in determining
/* how much space to allocate in ram for the static area...
     use       'static'
     dc.l      0    /* Ensure static area is long-aligned
static_end:
     dc.l      0    /* Boundary marker of static area
equ  static_area_size,   static_end-static_origin
     use       'code'
end
```

```
/*  ***begin copyright*** ******************************  */
/*                                                        */
/*  STRATUS CONFIDENTIAL INFORMATION: CLASS II            */
/*  COPYRIGHT (c) Stratus Computer, Inc. 1986             */
/*                                                        */
/*  This program contains confidential and proprietary    */
/*  information of Stratus Computer, Inc., and any        */
/*  reproduction, disclosure, or use in whole or in part  */
/*  is expressly prohibited, except as may be             */
/*  specifically authorized by prior written agreement or */
/*  permission of Stratus.                                */
/*                                                        */
/*  ***end copyright*** ********************************   */

bin_to_char:
     proc (a_num) returns (char (13) varying);

/* The following code is certainly not as efficient as PL/I type
   conversion -- but it doesn't use any_to_any, and therefore it works in
   the IOP.  */

declare  a_num                    fixed bin (31);

declare  buf                      char (12),
         digit                    fixed bin,
         idx                      fixed bin,
         neg_sw                   bit (1) aligned,
         num                      fixed bin (31);

     if a_num = 0
        then return ('0');

     num = a_num;
     neg_sw = (num < 0);
     if neg_sw
        then num = -num;

     do idx = 12 by -1 to 1 while (num ^= 0);
          digit = mod (num, 10);
          substr (buf, idx, 1) = substr ('0123456789', digit + 1, 1);
          num = divide (num, 10, 31);
     end;

     if neg_sw
        then return ('-' || substr (buf, idx + 1));
        else return (substr (buf, idx + 1));

%page;

char_to_bin:
     entry (a_str) returns (fixed bin (31));

declare  a_str                    char (*) varying;

     num = 0;

     if a_str = ''
        then return (0);
     idx = 2;
     neg_sw = '0'b;

     if substr (a_str, 1, 1) = '-'
        then neg_sw = '1'b;
     else if substr (a_str, 1, 1) ^= '+'
        then idx = 1;

     do idx = idx to length (a_str);
          digit = index ('0123456789', substr (a_str, idx, 1)) - 1;
          if digit < 0
             then return (-1);
          num = num * 10 + digit;
     end;
```

```
      if neg_sw
         then return (-num);
         else return (num);

end bin_to_char;

/*   ***begin copyright*** ******************************  */
/*                                                          */
/*   STRATUS CONFIDENTIAL INFORMATION: CLASS II             */
/*   COPYRIGHT (c) Stratus Computer, Inc. 1987              */
/*                                                          */
/*   This program contains confidential and proprietary     */
/*   information of Stratus Computer, Inc., and any         */
/*   reproduction, disclosure, or use in whole or in part   */
/*   is expressly prohibited, except as may be              */
/*   specifically authorized by prior written agreement or  */
/*   permission of Stratus.                                 */
/*                                                          */
/*   ***end copyright*** ********************************    */

/*                          IOP_BOOT
                            --------
     This module gets called when the iop gets a boot command.  It determines
     the device to boot from and transfers control to the appropriate module.
*/
iop_boot: proc;
/* Beginning of modification history */
/*   written September 1896 by Bill Snapper */
/* End of modification history */

/* Include */
/* %include  'board_id_structure' */;
/*   ***begin copyright*** ******************************  */
/*                                                          */
/*   STRATUS CONFIDENTIAL INFORMATION: CLASS II             */
/*   COPYRIGHT (c) Stratus Computer, Inc. 1985              */
/*                                                          */
/*   This program contains confidential and proprietary     */
/*   information of Stratus Computer, Inc., and any         */
/*   reproduction, disclosure, or use in whole or in part   */
/*   is expressly prohibited, except as may be              */
/*   specifically authorized by prior written agreement or  */
/*   permission of Stratus.                                 */
/*                                                          */
/*   ***end copyright*** ********************************    */
/*   Begin include file board_id_structure.incl.pl1         */

/*   Board Id pointer is in location 1024 of any adapter board
     and it points the board id structure in EEPROM.  Use utility
     function to get this pointer after selecting the adapter.

*/

%replace  MAX            by    5;          /*allow last five board services*/
%replace  ID_VERSION     by    2;          /* Version of the structure. */

dcl  board_id_ptr         ptr;

dcl  1 board_id           based (board_id_ptr),
       2 version          fixed bin (15),     /* Structure revision number */
       2 board_type       fixed bin (15),
       2 flags,
         3 bootable       bit (1),            /* adapter is bootable */
         3 self_test      bit (1),            /* adapter has self test */
         3 pad            bit (14),           /* unused */
         2 model            char (4),           /* alphanumeric model */
         2 serial_number    fixed bin (31),     /* board serial num */
         2 revision         fixed bin (15),     /* board revision level */
         2 art_work_rev     fixed bin (15),     /* board artwork level */
         2 min_gioc_rev     fixed bin (15),     /* gioc compatibility */
         2 num_serviced     fixed bin (15),     /* # of times serviced */
         2 history (MAX),                       /* board history */
           3 service_date   fixed bin (31),     /* repair info */
           3 service_code   fixed bin (15),
```

```
        2 code_checksum    fixed bin (15),     /* Calculated checksum. */
        2 checksum         fixed bin (15);     /* structure safety check */

/*  End include file board_ic_structure.incl.pl1                 */

/* %include  'ioa_commands' */;
/*   ***begin copyright*** ****************************** */
/*                                                       */
/*   STRATUS CONFIDENTIAL INFORMATION: CLASS II          */
/*   COPYRIGHT (c) Stratus Computer, Inc. 1986           */
/*                                                       */
/*   This program contains confidential and proprietary  */
/*   information of Stratus Computer, Inc., and any      */
/*   reproduction, disclosure, or use in whole or in part */
/*   is expressly prohibited, except as may be           */
/*   specifically authorized by prior written agreement or */
/*   permission of Stratus.                              */
/*                                                       */
/*   ***end copyright*** ******************************** */
/*   Begin include file ioa_commands.incl.pl1  */

%replace  MIN_IOA_CMD_NO       by    0;

%replace  CMD_RESET            by    0;
%replace  CMD_CLEAR_INT        by    1;
%replace  CMD_TOGGLE_OBEY_P    by    2;
%replace  CMD_TOGGLE_OBEY_G    by    3;
%replace  CMD_CLEAR_BROKEN     by    4;
%replace  CMD_SET_BROKEN       by    5;
%replace  CMD_INT_DEVICE       by    6;
%replace  CMD_CLEAR_CPU_RESET  by    7;

%replace  MAX_IOA_CMD_NO       by    7;

/*  End include file ioa_commands.incl.pl1  */
/* %include  'iop_prom_cfg' */;
/*        Initial boot configuration table.
          --------------------------------
     This structure will remain in the iop just above the iop's stack.
*/

/*   sys_conp = sys_conp$   */
dcl  sys_conp              ptr;

dcl  1 sys_mon             based( sys_conp ),
       2 slot              fixed bin(15), /* IOA chassis slot */
       2 flags,
         3 mbz             bit(14),
         3 rd_in_prog      bit(1),         /* START_READ in progress */
         3 cfg             bit(1),         /* Console configured */
       2 com_mbxp          ptr,            /* Pointer to vos comm mailbox */
       2 ioa_mbxp          ptr,            /* Pointer to ioa's mailbox */
       2 f_char            fixed bin(15), /* f_char in data; OLD:Channel state */
       2 count             fixed bin(15), /* number of characters being output */
       2 ucode_rev         fixed bin(15), /* From code revision level */
       2 model             char(4),        /* Board ic. */
       2 io_lock           ptr,            /* Board interlock pointer. */
       2 io_blockp         ptr;            /* Pointer to vos-bound io_block */

/*   bdp = bdp$; */
/*   bdcbp = boot disk control block pointer   */
dcl  bdcbp                 ptr;
dcl  1 boot_disk           based( bdcbp ),
       2 slot              fixed bin(15),
       2 flags,
         3 mbz             bit(14),
         3 io_in_prog      bit(1),
         3 cfg             bit(1),
       2 disk_mbxp         ptr,
       2 virt_ptr          ptr,
       2 io_lock           fixed bin(31),
       2 state             fixed bin(15),
       2 ucode_rev         fixed bin(15),
       2 model             char(4);
```

```
/* IOP ES to PROM interface info. */
dcl  esip                   ptr;       /* Ptr to es interface structure. */

%replace  MIN_INT          by 1;
%replace  MAX_INT          by 16;
%replace  ES_VECX          by 16;

dcl  1 es                  based( esip ),
       2 running           bit(1) aligned,
       2 callback          entry( entry, fixed bin(31), fixed bin(31),
                                  fixed bin(15), fixed bin(31),
                                  fixed bin(15) ) variable,
       2 revoke_call       entry( fixed bin(31), fixed bin(15) ) variable,
       2 reset_list(0:15)       bit(1),
       2 vec(MAX_INT),
         3 number          fixed bin(15),
         3 pending         bit(1) aligned,
       2 next_vec          fixed bin(15),
       2 prom_mbxp         ptr,              /* Pointer to iop_prom_mbx */
       2 dump_listp        ptr,              /* Pointer to iop dump table */
       2 dump_list_ix      fixed bin(15), /* Next dump list entry index */
       2 dump_page_cnt     fixed bin(15), /* Index for multiple dump pages */
       2 last_used         fixed bin(15), /* Last dump list entry used. */
       2 dump_checksum     fixed bin(15), /* Dump list checksum. */
       2 syserr_wrt        entry( fixed bin(31) ),
       2 syserr_rd         entry( fixed bin(31) );
/* %include  'iop_adapter_types' */;
/* Begin include file adapter_types.incl.pl1 */

%replace  MIN_ADAP_TYPE            by  1;

%replace  TERMINATOR           by  1;
%replace  ACOMM                by  2;
%replace  UCOMM_422            by  3;
%replace  ENET                 by  4;
%replace  DISK                 by  5;
%replace  CTAPE                by  6;
%replace  MTAPE                by  7;
%replace  CLKCOMM              by  8;
%replace  UCOMM_232            by  9;
%replace  UCOMM_423            by  10;

%replace  MAX_ADAP_TYPE            by 10;

/* End include file adapter_types.incl.pl1 */
/* %include  'product_names' */;
/* Begin include file product_names.incl.pl1 */

/* Note:  To add a product name and index, certain rules should be     */
/*        observed.                                                      */
/*                                                                       */
/*    1) The disks are first, and should be left somewhat open-ended    */
/*       to grow, perhaps up to 64.  This is not a firm rule.            */
/*                                                                       */
/*    2) Comm has reserved several ranges of numbers based on a         */
/*       certain hex value as a base.  These are 60-6F (96-111)         */
/*       and A0-AF (160-175).  This rule was broken during the           */
/*       assignment of tape drive values.                                */
/*                                                                       */
/*    3) A range of numbers for IOP adapters has also been reserved.    */
/*       These may not match the hardware types presented by the cards. */
/*       This range starts at 64 (40x).                                  */
/*                                                                       */
/*    4) Main boards (CPUs, MEMs, etc) are currently in the range       */
/*       240 (E0x) to 254 (FEx), and 192 (C0x) to 222 (DEx).            */
/*                                                                       */

%replace  D102_MODELX       by    1;  /* 60MB Disk Drive */
%replace  D101_MODELX       by    2;  /* 30MB Disk Drive */
%replace  D103_MODELX       by    3;  /* 143MB Disk Drive */
%replace  D105_MODELX       by    4;  /* 297 MB Disk Drive */
%replace  UNKN_MODELX       by    5;  /* Unknown Disk Model */
%replace  D900_MODELX       by    6;  /* 85MB Disk Drive */
%replace  D901_MODELX       by    7;  /* 165MB Disk Drive */
%replace  D902_MODELX       by    8;  /* 200MB Disk Drive */
```

```
%replace  D108_MODELX        by   9;   /* 448MB Disk Drive */
%replace  D202_MODELX        by  10;   /* 320MB IOP Disk Drive */
%replace  D118_MODELX        by  11;   /* 448MB Disk Drive - TUV */
%replace  D201_MODELX        by  12;   /* 151MB Disk Drive */
%replace  D203_MODELX        by  13;   /* 654MB IOP Disk Drive */
%replace  D205_MODELX        by  14;   /* 151MB IOP Disk Drive */
%replace  K101_MODELX        by  64;   /* ACOMM Async full modem Card */
%replace  K102_MODELX        by  65;   /* UCOMM Async/Sync Card */
%replace  K103_MODELX        by  66;   /* CCOMM Async/Clock Card */
%replace  K104_MODELX        by  67;   /* ENET LAN Card */
%replace  K105_MODELX        by  68;   /* IOP Disk Adapter */
%replace  K106_MODELX        by  69;   /* IOP SCSI Tape Adapter */
%replace  K107_MODELX        by  70;   /* IOP Pertec Tape Adapter */
%replace  K108_MODELX        by  71;   /* PK Terminator */
%replace  K109_MODELX        by  72;   /* UCOMM 423 Async/Sync Card */
%replace  K110_MODELX        by  73;   /* ACOMMP IBM printer card */
%replace  K111_MODELX        by  74;   /* ACOMM async/sync null modem Card */
%replace  C110N_MODELX       by  96;   /* HS Async Null Modem */
%replace  C110F_MODELX       by  97;   /* HS Async Full Modem */
%replace  IBM_1203_MODELX    by  98;   /* IBM Printer Interface */
%replace  T103_GBS_MODELX    by 100;   /* Tape Drive 1600 bpi */
%replace  T103_MODELX        by 101;   /* Tape Drive 1600/3200 */
%replace  T201_MODELX        by 102;   /* Tape Drive 1600/6250 */
%replace  T251_MODELX        by 103;   /* Tape Drive 1600/3200/6250 */
%replace  C103_MODELX        by 126;   /* Null Modem Channel */
%replace  C102_MODELX        by 127;   /* Full Modem Channel */
%replace  C101_MODELX        by 128;   /* Comm Controller */
%replace  C106_MODELX        by 129;   /* Modem Non Dial-Up */
%replace  C108_MODELX        by 130;   /* Modem Dial-Up */
%replace  C111_MODELX        by 131;   /* Remote Support Modem */
%replace  C107_MODELX        by 160;   /* HS Sync I */
%replace  C109_MODELX        by 161;   /* HS Sync II */
%replace  C104_MODELX        by 190;   /* Sync Line Adapter */
%replace  C104A_MODELX       by 191;   /* Alt Sync Line Adapter */
%replace  G200_MODELX        by 192;   /* Fresco CPU */
%replace  K100_MODELX        by 193;   /* IOP */
%replace  G424_MODELX        by 194;   /* Spitfire CPU */
%replace  M408_MODELX        by 195;   /* Wallaby/8mb Memory Ctrlr/array Board */
%replace  M432_MODELX        by 196;   /* Wallaby/32mb Memory Ctrlr/array Board */
%replace  D214_MODELX        by 221;   /* Removable Disk Adapter */
%replace  D116_MODELX        by 222;   /* 448MB Disk Director (TUV) */
%replace  C105_MODELX        by 223;   /* Calendar Clock */
%replace  P106_MODELX        by 224;   /* CPU Board */
%replace  M100_MODELX        by 225;   /* Memory Controller Board */
%replace  M102_MODELX        by 226;   /* 2MB Memory Array Board */
%replace  C100_MODELX        by 227;   /* Comm Controller */
%replace  D100_MODELX        by 228;   /* Disk Controller */
%replace  T100_MODELX        by 229;   /* Tape Controller */
%replace  I100_MODELX        by 230;   /* Link Controller */
%replace  U100_MODELX        by 231;   /* PSI Board */
%replace  D104_MODELX        by 232;   /* Disk Controller */
%replace  D004_MODELX        by 233;   /* Disk SMD Adapter */
%replace  G601_MODELX        by 234;   /* Processor Controller */
%replace  G602_MODELX        by 235;   /* CPU/SAP Board */
%replace  G400_MODELX        by 236;   /* Zink Central Processor */
%replace  T102_MODELX        by 237;   /* 1600/3200 Tape Controller */
%replace  D107_MODELX        by 238;   /* 448MB Disk Controller */
%replace  D106_MODELX        by 239;   /* 448MB Disk Director */
%replace  C200_MODELX        by 240;   /* Comm Controller */
%replace  T200_MODELX        by 241;   /* 6250 Tape Controller */
%replace  M200_MODELX        by 242;   /* Bandit 16-bit Controller */
%replace  M210_MODELX        by 243;   /* Bandit 8MB Memory Array Board */
%replace  M300_MODELX        by 244;   /* Dinkum 64-bit Controller */
%replace  T301_MODELX        by 245;   /* Quarter inch SCSI  tape drive */
%replace  M310_MODELX        by 246;   /* 16MB Memory Array Board */
%replace  M320_MODELX        by 247;   /* 32MB Memory Array Board */
%replace  M318_MODELX        by 248;   /* 8MB Memory Array Board */
%replace  D110_MODELX        by 249;   /* Disk Controller */
%replace  D114_MODELX        by 250;   /* Disk Controller */
%replace  D117_MODELX        by 251;   /* Disk Controller */
%replace  M214_MODELX        by 252;   /* Bandit 4MB Memory Array Board */
%replace  G610_MODELX        by 253;   /* Hydra Controller/CPU/SAP Board */
%replace  T250_MODELX        by 254;   /* 1600/3200/6250 Tape Controller */
%replace  NONE_MODELX        by 255;   /* No Configured Channel */
```

```
%replace  MAX_DEV            by 255;

%replace  MIN_IOA_MODELX   by  64;
%replace  MAX_IOA_MODELX   by  74;

declare   s$hardware_names (0:255) char (6) var ext static;
declare   s$product_models (0:255) char (6) var ext static;
declare   s$product_names (0:255) char (32) var ext static;

/* End include file products_names.incl.pl1 */

/* Automatic */
dcl  ix              fixed bin(15);

/* Entries */
dcl  iop_disk_boot             entry(fixed bin(15));

dcl  iop_ctape_boot            entry(fixed bin(15));

dcl  p$set_boot_fail           entry();

dcl  p$get_ioa_slot            entry() returns( fixed bin(15) );

dcl  p$get_boot_ptr            entry() returns( ptr );

dcl  p$get_brd_id_ptr          entry() returns( ptr );

dcl  p$pio_adapt_select        entry (fixed bin);

dcl  p$send_ioa_cmd            entry( fixed bin(15), fixed bin(15) );

/* Execution */

     ix = p$get_ioa_slot();
     bdcbp = p$get_boot_ptr();
     boot_disk.slot = -1;
     if ix = 255    /* Boot from first disk found. */
     then do ix = 0 to 13 while( boot_disk.slot = -1 );
               call p$pio_adapt_select( ix );
               call p$send_ioa_cmd( ix, CMD_CLEAR_BROKEN );
               board_id_ptr = p$get_brd_id_ptr();
               if board_id.board_type = K105_MODELX    /* DISK */
               then do;
                    boot_disk.slot = ix;
                    call iop_disk_boot(ix);
                    end;
          end;
     else do;  /* Boot from slot. */
          if ( ix >= 0 & ix <= 13 )
          then do;
               call p$pio_adapt_select( ix );
               call p$send_ioa_cmd( ix, CMD_CLEAR_BROKEN );
               board_id_ptr = p$get_brd_id_ptr();

               if board_id.board_type = K105_MODELX
               then do;
                    boot_disk.slot = ix;
                    call iop_disk_boot(ix);
                    return;
                    end;

               if board_id.board_type = K106_MODELX
               then do;
                    boot_disk.slot = ix;
                    call iop_ctape_boot(ix);
                    return;
                    end;
               end;
          end;

     if boot_disk.slot = -1
     then call p$set_boot_fail();

     return;

end iop_boot;
```

```
/*  ***begin copyright*** ******************************  */
/*                                                         */
/*  STRATUS CONFIDENTIAL INFORMATION: CLASS II             */
/*  COPYRIGHT (c) Stratus Computer, Inc. 1986              */
/*                                                         */
/*  This program contains confidential and proprietary     */
/*  information of Stratus Computer, Inc., and any         */
/*  reproduction, disclosure, or use in whole or in part   */
/*  is expressly prohibited, except as may be              */
/*  specifically authorized by prior written agreement or  */
/*  permission of Stratus.                                 */
/*                                                         */
/*  ***end copyright*** ********************************   */

/* Beginning of modification history */
/* Written 86-04-18 by Martin Stokoe for IOP */
/* Modified 87-03-13 by Doug Steinfeld to change calling sequence to
     iop_calls_broken to use device id */
/* End of modification history */

/* Supports all maintenence channel commands from the IOP */

iop_calls_interrupt:      proc (a_iop_no, a_fb_15);

/* arguments */
dcl a_iop_no          fixed  bin(15);
dcl a_fb_15           fixed  bin(15);
dcl a_code            fixed  bin(15);
dcl a_device_id       bit(64) aligned;

/* automatics */
dcl command           fixed bin(15);
dcl iop_no            fixed bin(15);
dcl ioa_info          char(2);
dcl ioa_slot          fixed bin(15);
dcl slot              fixed bin(15);
dcl entity_id         fixed bin(15);
dcl i                 fixed bin(15);
dcl p                 ptr;

/* entries */
dcl disconnect_iop_driver entry (fixed bin(15), fixed bin(15), fixed bin(15),
                              fixed bin(31), fixed bin(15));
dcl get_iop_cat       entry (fixed bin(15), ptr, fixed bin(15));
dcl get_iop_no        entry (fixed bin(15), fixed bin(15), fixed bin(15));
dcl free_channel      entry (fixed bin(15), fixed bin(15), fixed bin(15));
dcl max_level         entry( bit(64) aligned )
                      returns( fixed bin(15) );
dcl interpret_device_id entry( bit(64) aligned, fixed bin(15) )
                        returns( fixed bin(15) );

/* static *

/* based */
dcl 1 ovly based,
      2 mbz           bit(48),
      2 fb15          fixed bin(15);

/* include */ .
/* %nolist;  %include 'device_id';     %list */st;
/* Begin include file       device_id.incl.pl1          87-02-19 */

%replace  NULL_DEVICE_ID    by       'FFFFFFFFFFFFFFFF'b4;
%replace  NULL_VALUE        by       255;

%replace  MIN_LEVEL         by       1;

%replace  SLOT_LEVEL        by       1;
%replace  DEVICE_LEVEL      by       2;
%replace  CHANNEL_LEVEL     by       3;

%replace  MAX_LEVEL         by       8;

/* End include file      device_id.incl.pl1  */
/* %include 'iop_cvt_cat'; */
```

```
/* Defines the Channel Vector Table and Channel Assignment Tables
   for the IOP support by VOS */

%replace MAX_IOP_VECTORS      by 5;
%replace MAX_IOA_TYPES        by 10;
%replace MAX_IOP_CHANNELS     by 256;

dcl cvtp              ptr;
dcl 1 cvt(0:MAX_IOP_VECTORS) based (cvtp) like cvt_type;

dcl 1 cvt_type        based,
      2   driver_id        char(32) var,
      2   user(MAX_IOA_TYPES) fixed bin(15),
      2   interrupt        entry (fixed bin (15), fixed bin (15)),
      2   add              entry (bit(64) aligned, fixed bin (15)),
      2   broken           entry (bit(64) aligned, fixed bin (15)),
      2   idle             entry (fixed bin (15), fixed bin (15),
                                 fixed bin (15), fixed bin (15)),
      2   restart          entry (fixed bin (15), fixed bin (15),
                                 fixed bin (15), fixed bin (15)),
      2   pwr_fail         entry (fixed bin (15), fixed bin (15),
                                 fixed bin (15), fixed bin (15)),
      2   exception        entry (fixed bin (15), ptr, fixed bin(15));

dcl catp        ptr;
dcl 1 cat(0:MAX_IOP_CHANNELS-1) based(catp),
      2 status,
          3 active      bit(1),
          3 connected   bit(1),
          3 configured  bit(1),
          3 undefined   bit(13),
      2 ioa_slot        fixed bin (15),       /* IOA slot number 0-13 */
      2 subchan         fixed bin (15),       /* Card subchannel */
      2 vector          ptr,                  /* Vector pointer */
      2 ioa_type        fixed bin (15),       /* IOA Type */
      2 data            bit(64) aligned;      /* Sratch Area - Optional */
/* %include 'iop_calls_reply_box'; */
/* Beginning of  iop_calls_reply_box.incl.pl1 */

dcl iop_calls_reply_boxp$      ptr ext static;

dcl reply_boxp                 ptr;
dcl 1 reply_box                based(reply_boxp),
     2     busy                bit(1) aligned,
     2     channel             fixed bin(15),
     2     command             fixed bin(15),
     2     data_16_1           fixed bin(15),
     2     data_32_1           fixed bin(31),
     2     data_32_2           fixed bin(31);

/* End of iop_calls_reply_box.incl.pl1 */
/* %include 'iop_ring_command'; */
/* Begin include file . . . . . iop_ring_command.incl.pl1 */

dcl ring_cmdp               ptr;
dcl 1 ring_cmd              based(ring_cmdp),
          2 free                 bit (1),
          2 pac                  bit (7),
          2 channel              fixed bin (15),
          2 command              fixed bin (15),
          2 data_16_1            fixed bin (15),
          2 data_32_1            fixed bin (31),
          2 data_32_2            fixed bin (31);

/* End include file . . . . . iop_ring_command.incl.pl1 */

     /* execution */

     reply_boxp = iop_calls_reply_boxp$;

     ring_cmdp = addr(a_fb_15);

     reply_box.channel    = ring_cmd.channel;
     reply_box.command    = ring_cmd.command;
```

```
     reply_box.data_16_1 = ring_cmd.data_16_1;
     reply_box.data_32_1 = ring_cmd.data_32_1;   /* error field   */
     reply_box.data_32_2 = ring_cmd.data_32_2;   /* returned data */

     reply_box.busy = '0'b;

     return;

iop_calls_broken:   entry( a_device_id, a_code);

     slot = interpret_device_id( a_device_id, SLOT_LEVEL );
     if max_level( a_device_id ) = SLOT_LEVEL
     then ioa_slot = -1;
     else ioa_slot = interpret_device_id( a_device_id, DEVICE_LEVEL );

     call get_iop_no( slot, iop_no, a_code );
     if a_code ^= 0
     then return;

     call get_iop_cat (iop_no, catp, (0));

     /* IOP has gone broken */
     if ioa_slot < 0
     then do i = 1 to hbound( cat, 1);
          if own_ioa(i)
          then do;
               call disconnect_iop_driver ( iop_no, i, (0), (0), (0) );
               call free_channel ( iop_no, i, (0));
               end;
          end;

     /* Only the IOA has been removed */
     else do i = 1 to hbound( cat, 1);
          p = addr( cat.data(i) );
          entity_id = p->ovly.fb15;
          if cat.connected(i) & cat.ioa_slot(i) = ioa_slot
          then do;
               call disconnect_iop_driver (iop_no, i, entity_id, (0), (0) );
               call free_channel ( iop_no, i, (0));
               end;
          end;

     a_code = 0;

     return;

own_ioa:  proc (a_indx) returns (bit(1) aligned);

dcl a_indx       fixed bin(15);

dcl i            fixed bin(15);
dcl p            ptr;
dcl configured bit(1) aligned;

     i = a_indx;

     if ^cat.connected(i)
     then return ('0'b);

     p = cat.vector(i);

     if p->cvt_type.driver_id = 'iop_calls'
     then configured = '1'b;
     else configured = '0'b;

     return (configured);

     end own_ioa;

     end iop_calls_interrupt;
 /*  ***begin copyright*** ******************************  */
 /*                                                        */
 /*  STRATUS CONFIDENTIAL INFORMATION: CLASS II            */
```

```
/*  COPYRIGHT (c) Stratus Computer, Inc. 1986              */
/*                                                         */
/*  This program contains confidential and proprietary     */
/*  information of Stratus Computer, Inc., and any         */
/*  reproduction, disclosure, or use in whole or in part   */
/*  is expressly prohibited, except as may be              */
/*  specifically authorized by prior written agreement or  */
/*  permission of Stratus.                                 */
/*                                                         */
/*  ***end copyright*** ********************************    */

/* Beginning of modification history */
/* Modified 86-04-07 by Martin Stokoe to implement channel utilities */
/* Modified 86-07-07 by Martin Stokoe to use 'iop_adapter_types' include
    & implement configure bit for verification of channel configuration. */
/* Modified 86-08-15 by Martin Stokoe to fix get_iop_no */
/* Modified 86-10-22 by Tom Moser to not bind slot if slotno = -1 */
/* Modified 87-01-18 by Martin Stokoe to support modelx naming for IOAs */
/* Modified 87-02-12 by Martin Stokoe to implement acquire/return partner
     slot */
/* Modified 87-03-03 by Martin Stokoe to fix iop-29 */
/* Modified 87-03-10 by Martin Stokoe to utilize the maintenance lock */
/* Modified 87-03-13 by Martin Stokoe to implement iop_reset_ioa  */
/* Modified 87-03-23 by Bart Polhemus to fix iop-42 */
/* Modified 87-03-30 by Martin Stokoe to implement iop_maint_io for
     reading IOP/IOA PROM revs */
/* Modified 87-03-31 by Joe Croman to pump iop ring during busy_wait and
     to move busy_wait into waf */
/* Modified 87-04-27 by Joe Croman to add iop_interrupt_handler_check
     proc so we switch to interrupt stack before calling
     iop_interrupt_handler; iop-73 */
/* End of modification history */

iop_channel_utils:  proc;

/* %nolist; %include 'error_codes'; %list; */

/* %include 'iop_cvt_cat'; */
/* Defines the Channel Vector Table and Channel Assignment Tables
   for the IOP support by VOS */

%replace MAX_IOP_VECTORS       by 5;
%replace MAX_IOA_TYPES         by 10;
%replace MAX_IOP_CHANNELS      by 256;

dcl cvtp              ptr;
dcl 1 cvt(0:MAX_IOP_VECTORS) based (cvtp) like cvt_type;

dcl 1 cvt_type        based,
      2   driver_id         char(32) var,
      2   user(MAX_IOA_TYPES) fixed bin(15),
      2   interrupt         entry (fixed bin (15), fixed bin (15)),
      2   add               entry (bit(64) aligned, fixed bin (15)),
      2   broken            entry (bit(64) aligned, fixed bin (15)),
      2   idle              entry (fixed bin (15), fixed bin (15),
                                   fixed bin (15), fixed bin (15)),
      2   restart           entry (fixed bin (15), fixed bin (15),
                                   fixed bin (15), fixed bin (15)),
      2   pwr_fail          entry (fixed bin (15), fixed bin (15),
                                   fixed bin (15), fixed bin (15)),
      2   exception         entry (fixed bin (15), ptr, fixed bin(15));

dcl catp        ptr;
dcl 1 cat(0:MAX_IOP_CHANNELS-1) based(catp),
      2 status,
          3 active      bit(1),
          3 connected   bit(1),
          3 configured  bit(1),
          3 undefined   bit(13),
      2 ioa_slot         fixed bin (15),        /* IOA slot number 0-13 */
      2 subchan          fixed bin (15),        /* Card subchannel */
      2 vector           ptr,                   /* Vector pointer */
      2 ioa_type         fixed bin (15),        /* IOA Type */
      2 data             bit(64) aligned;       /* Sratch Area - Optional */
```

```
/* %include 'iop_data'; */
/* Begin include file . . . . . iop_data.incl.pl1 */

/* Describes various permanent IOP data bases */

dcl  iop_datap$ ptr ext static;

dcl  iop_datap ptr;

dcl  iop_data_max_controllers fixed bin (15);

dcl 1 iop_data              based (iop_datap),
    2 max_controllers       fixed bin (15),
    2 group_lockp           ptr,
    2 config_lockp          ptr,
    2 cvtp                  ptr,
    2 info                  (iop_data_max_controllers),
      3 slot                fixed bin (15),
      3 vector              fixed bin (15),

      3 slot_lockp          ptr,
      3 iop_lockp           ptr,
      3 vos_lockp           ptr,
      3 cat_lockp           ptr,
      3 csq_lockp           ptr,
      3 maint_lockp         ptr,

      3 flags,
        4 paired            bit (1),
        4 idled             bit (1),
        4 configured        bit (1),
        4 testing           bit (1),
        4 should_be_paired bit (1),
        4 monitor_in_use bit(1),
        4 acquired          bit(1),
        4 ioa_reset_issued bit(1),
        4 pad               bit (7),

      3 mbxp                ptr,
      3 catp                ptr,
      3 maintp              ptr,
      3 statementp          ptr,
      3 fw_pathsp           ptr,

      3 register,
        4 a                 fixed bin(31),
        4 b                 fixed bin(31),
        4 c                 fixed bin(31),

      3 csq_head            ptr,
      3 csq_tail            ptr,
      3 csq_n_nercs         fixed bin (15),

      3 max_memory          fixed bin (15),
      3 n_pages_mem         fixed bin (15),
      3 iop_memp            ptr,
      3 iop_absp            ptr,
      3 iop_abs_vpn         fixed bin (15),
      3 iop_abs_ppn         fixed bin (15);

/* this structure defines the array of memory used by the iop */

dcl  iop_memp               ptr;

dcl  iop_mem_max_pages      fixed bin (15);

dcl 1 iop_mem               based (iop_memp),
    2 max_pages             fixed bin (15),
    2 n_pages               fixed bin (15),
    2 page_nos              (iop_mem_max_pages) fixed bin (15);

dcl iopcsqep              ptr;
dcl 1 iopcsqe             based (iopcsqep),
```

```
     2 next               ptr,
     2 chan               fixed bin (15),
     2 func               fixed bin (15),
     2 data_16_1          fixed bin (15),
     2 data_32_1          fixed bin (31),
     2 data_32_2          fixed bin (31);

dcl iopcsqp              ptr;
dcl 1 iopcsq             based (iopcsqp),
     2 head               ptr,
     2 tail               ptr,
     2 n_herds            fixed bin (15);

dcl maintp               ptr;
dcl 1 maint              based (maintp),
     2 busy               bit (1) aligned,
     2 data_16_1          fixed bin (15),
     2 data_32_1          fixed bin (31),
     2 data_32_2          fixed bin (31);

/* End include file . . . . . iop_data.incl.pl1 */
/* %include 'iop_mailbox'; */
/* Begin include file . . . . . iop_mailbox.incl.pl1 */

dcl  iop$mailbox_addr     ptr external static;
dcl  iop$vos_ringp        ptr external static;
dcl  iop$iop_ringp        ptr external static;
dcl  iop$syserr_ringp     ptr external static;
dcl  iop_mbxp             ptr;
dcl  syserr_ringp         ptr;
dcl  ring_cmdp            ptr;
dcl  vos_ringp            ptr;
dcl  iop_ringp            ptr;

%replace IOP_RING_SIZE   by   32;
%replace IOP_SYSERR_SIZE by   16;

%replace IOP_ON_LINE            by   0;
%replace IOP_INITIALIZING       by  -1;
%replace IOP_FAILED_TO_INIT     by  -2;
%replace IOP_EXEC_OUT_OF_PROM   by  -3;

%replace IOP_MBX_ID          by '*IOPMBX*';

dcl 1 iop_mbx                based (iop_mbxp),
    2 id                     char (8),
    2 status,                                   /* set by IOP */
      3 ring_syserr          bit(1),
      3 pad                  bit(7),

    2 vector                 fixed bin (15),
    2 idle_status            fixed bin (15),
    2 save_time              fixed dec (15),

    2 lock_address           fixed bin (31),    /* Board loop-lock addr */
    2 syserr_msg             char (80) var,

    2 flags,                                    /* Set by VOS for VOS */
      3 vos_seen_syserr         bit (1),
      3 dumping_syserr_ring     bit (1),
      3 pad                     bit(14),

    2 syserr_ringp           ptr,               /* ptr to syserr ring */
    2 syserr_ring_addr       bit (32) aligned,  /* abs addr of syerr ring */
    2 syserr_size            fixed bin (15),    /* number of syserr ring */

    2 input_msg              char (80) var,
    2 output_msg             char (80) var,

    2 iop_head               fixed bin (15),    /* to iop ring head */
    2 iop_tail               fixed bin (15),    /* to iop ring tail */
    2 iop_ringp              ptr,               /* ptr to to iop ring */
    2 iop_ring_addr          bit (32) aligned,  /* abs addr of to iop ring */
```

```
    2 iop_ring_size         fixed bin(15),

    2 vos_head              fixed bin (15),     /* iop to vos ring */
    2 vos_tail              fixed bin (15),
    2 vos_ringp             ptr,
    2 vos_ring_addr         bit (32) aligned,
    2 vos_ring_size         fixed bin(15),
    2 global_state          fixed bin (31),     /* state -1 uninit, 0 - normal
                                                   ^= 0/-1 error code (2) */
    2 pbus_status           like berr_mc.p_status,
    2 terminator_status,
      3 no_fan_fault bit (1),
      3 no_sync_fault bit (1),
      3 no_bulk_fault bit (1),
      3 no_volt_fault bit (1),
      3 other_enema_good bit (1),
      3 power_state bit (3),
      3 pad          bit (7);


dcl 1 iop_syserr_ring (IOP_SYSERR_SIZE) based(syserr_ringp),
     2 free bit(1) aligned,
     2 syserr_code fixed bin (15),
     2 msg char (80) varying;

dcl 1 ring_cmd              based(ring_cmdp),
        2 free                  bit (1),
        2 pad                   bit (7),
        2 channel               fixed bin (15),
        2 command               fixed bin (15),
        2 data_16_1             fixed bin (15),
        2 data_32_1             fixed bin (31),
        2 data_32_2             fixed bin (31);

dcl 1 iop_ring (0:IOP_RING_SIZE-1) based (iop_ringp) like ring_cmd;

dcl 1 vos_ring (0:IOP_RING_SIZE-1) based (vos_ringp) like ring_cmd;

/* values for iop_mbx.idle_status */

%replace IDLE_STATUS_INIT          by 0;
%replace IDLE_STATUS_COMPLETE      by 1;
%replace IDLE_STATUS_REJECT        by 2;
%replace IDLE_STATUS_WAIT          by 3;


/* End include file . . . . . iop_mailbox.incl.pl1 */

/* %include 'iop_command_codes'; */
/* Begin include file . . . . . iop_command_codes.incl.pl1 */

/* Basic io command to a iop */

%replace  IOP_COMMAND_NOP              by 240;
%replace  IOP_COMMAND_OLD_NOP          by 0;
%replace  IOP_COMMAND_SYNC_ALONE       by 241;
%replace  IOP_COMMAND_SYNC_PART        by 242;
%replace  IOP_COMMAND_LOAD_PAGE        by 243;
%replace  IOP_COMMAND_DUMP_PAGE        by 244;
%replace  IOP_COMMAND_EXEC_RAM         by 245;
%replace  IOP_COMMAND_EXEC_SET_MEXP    by 246;
%replace  IOP_COMMAND_GOTO_ADDR        by 247;
%replace  IOP_COMMAND_RUN_ALONE        by 248;

%replace  IOP_COMMAND_SET_MEXP         by 235;       /* Obsolete */
%replace  IOP_COMMAND_IDLE             by 236;
%replace  IOP_COMMAND_PREPARE_SYNC     by 237;
%replace  IOP_COMMAND_CANCEL_SYNC      by 238;
%replace  IOP_COMMAND_RESTART          by 239;

%replace  IOP_COMMAND_DIAG_MIN         by 32;
%replace  IOP_COMMAND_DIAG_MAX         by 63;

/* codes used by generic iop driver */
```

```
%replace  FIRST_IOP_DRIVER_COMMAND       by 64;

%replace  IOP_COMMAND_OPEN               by 64;
%replace  IOP_COMMAND_CLOSE              by 65;
%replace  IOP_COMMAND_CONTROL            by 66;
%replace  IOP_COMMAND_READ               by 67;
%replace  IOP_COMMAND_WRITE              by 68;
%replace  IOP_COMMAND_READ_BUFFER_FREE   by 69;
%replace  IOP_COMMAND_NEED_WRITE_BUFFER  by 70;

%replace  LAST_IOP_DRIVER_COMMAND        by 70;

%replace  IOP_PROCESS_COMMAND_RING       by 71;

/* Codes used for adding iop's */
/* The first two must match the same constants in comm_command_codes! */

%replace  ADDING_LONER         by 1;
%replace  ADDING_PARTNER       by 2;

/* End include file . . . . . iop_command_codes.incl.pl1 */
/* %include 'iop_equip_table'; */
/*  ***begin copyright*** *****************************  */
/*                                                      */
/*  STRATUS CONFIDENTIAL INFORMATION: CLASS II          */
/*  COPYRIGHT (c) Stratus Computer, Inc. 1985           */
/*                                                      */
/*  This program contains confidential and proprietary  */
/*  information of Stratus Computer, Inc., and any      */
/*  reproduction, disclosure, or use in whole or in part */
/*  is expressly prohibited, except as may be           */
/*  specifically authorized by prior written agreement or */
/*  permission of Stratus.                              */
/*                                                      */
/*  ***end copyright*** ********************************  */
/*  Begin include file iop_equip_table.incl.pl1         */

dcl  equip_tablep$            ptr external static;
dcl  equip_tablep             ptr;

%replace  MAX_ENTITIES        by   8;
%replace  NUM_OF_SLOTS        by   13;  /* 0-13 */
%replace  MAX_CHANNELS        by   512;

dcl 1 stat_tbl based,
          4 alive               bit (1),          /* 1 = alive, 0 = broken */
          4 initialized         bit (1),
          4 testing             bit (1),          /* 1 = yes, 0 = no */
          4 loading             bit (1),
          4 running             bit (1),
          4 prom_start          bit (1),
          4 exception           bit (1),
          4 burning_prom        bit (1),
          4 broken              bit (1),          /* cannot be made alive */
          4 pad                 bit (23);

dcl 1 entity_tbl based,
          4 e_ptr               ptr,
          4 e_fb15              fixed bin (15);

dcl  1 equip_table            based (equip_tablep),
       2 slot (0:NUM_OF_SLOTS),
         3 entity             fixed bin (15),     /* associated entity or -1 */
         3 adapt_type         fixed bin (15),     /* 1-255, see below */
         3 priority           fixed bin (15),     /* 1-25, see below */
         3 status like stat_tbl,
         3 entity_data like entity_tbl,
       2 entity (1:MAX_ENTITIES),
         3 type               fixed bin (15),
         3 status like stat_tbl,
         3 entity_data like entity_tbl,
         3 cmd_entry          entry (fixed bin (15), fixed bin (15),
                                     fixed bin (15), fixed bin (31),
                                     fixed bin (31)),
```

```
    3 config_entry       entry (fixed bin (15), bit (16) aligned,
                                fixed bin (31),
                                fixed bin (31), fixed bin (31)),
    3 slot_entry         entry (fixed bin (15), fixed bin (15)),
  2 channel (1:MAX_CHANNELS),
    3 entity             fixed bin (15),
    3 owner              fixed bin (15),
    3 limit              fixed bin (15),
    3 status like stat_tpl,
    3 entity_data like entity_tpl,
  2 slot_prom_rev(0:NUM_OF_SLOTS) fixed bin (15);

/*  range constants for the field 'priority'                  */

%replace  MIN_PRIORITY          by    1;
%replace  DEFAULT_PRIORITY      by    256;
%replace  MAX_PRIORITY          by    256;

/* standard entity IDs */

%replace IOP_DISK_ENTITY_ID by 1;
%replace IOP_COMM_ENTITY_ID by 2;
%replace IOP_CTAPE_ENTITY_ID by 3;

%replace IOP_TEST_ENTITY_ID by 8;


/*  End include file iop_equip_table.incl.pl1                 */

/* %include 'iop_es_ecc'; */
/* Begin include file . . . . . iop_common_ecc.pl1 */

/* Generic command ranges for iop entities */

/* command 0 is unused */

/* commands 01 to 1Fx (31) are for commands that are part of the normal
     entity operation */

%replace MIN_CMD_CODE                by    1;
%replace FIRST_NORMAL_CMD            by    1;
/* regular command codes 01 - 1Fx */

%replace BIND_CHAN_ENT          by    1;
%replace UNBIND_CHAN_ENT        by    2;
%replace BIND_SLOT_ENT          by    3;
%replace UNBIND_SLOT_ENT        by    4;
%replace SET_GLOBAL_METER_CMD        by    5;
%replace READ_GLOBAL_METER_CMD       by    6;
%replace READ_SYNC_INFO_CMD     by 7;

%replace LAST_NORMAL_CMD             by    31;

/* commands 20x (32) - 5F (95) are for maintenance operations */
%replace FIRST_MAINT_CMD             by    32;

/* Maintenance commands 20x (32) - 2Fx (47) are for maintenance of entity */

%replace FIRST_ENTITY_MAINT_CMD      by    32;
%replace INIT_ENTITY_CMD             by    32;
%replace STOP_ENTITY_CMD             by    33;
%replace SET_ENTITY_STATUS_CMD       by    34;
%replace READ_ENTITY_STATUS_CMD      by    35;
%replace SET_ENTITY_PARAM_CMD        by    36;
%replace READ_ENTITY_PARAM_CMD       by    37;
     %replace PROTOCOL_VER_PARAM     by     1;
     %replace LIMIT_PARAM            by     2;

%replace SET_ENTITY_METER_CMD        by    40;
%replace READ_ENTITY_METER_CMD       by    41;
     %replace CMD_ERROR_MTR          by     1;
     %replace SEND_MTR               by     2;
     %replace SEND_FAILED_MTR        by     3;
```

```
/* more entity maintenance commands */

%replace LAST_ENTITY_MAINT_CMD       by   47;

/* Maintenance commands 30x (48) - 3Fx (63) are for maintenance of channels */

%replace FIRST_CHAN_MAINT_CMD        by   48;
%replace INIT_CHAN_CMD               by   48;
%replace STOP_CHAN_CMD               by   49;
%replace SET_CHAN_STATUS_CMD         by   50;
%replace READ_CHAN_STATUS_CMD        by   51;
%replace SET_CHAN_PARAM_CMD          by   52;
%replace READ_CHAN_PARAM_CMD         by   53;
%replace SET_CHAN_METER_CMD          by   54;
%replace READ_CHAN_METER_CMD         by   55;

/* more channel maintenance commands */

%replace LAST_CHAN_MAINT_CMD         by   63;

/* Maintenance commands 40x (64) - 4Fx (79) are for maintenance of slots */

%replace FIRST_SLOT_MAINT_CMD        by   64;
%replace INIT_SLOT_CMD               by   64;
%replace STOP_SLOT_CMD               by   65;
%replace SET_SLOT_STATUS_CMD         by   66;
%replace READ_SLOT_STATUS_CMD        by   67;
%replace SET_SLOT_PARAM_CMD          by   68;
%replace READ_SLOT_PARAM_CMD         by   69;
%replace SET_SLOT_METER_CMD          by   70;
%replace READ_SLOT_METER_CMD         by   71;
%replace LOAD_SLOT_PRGM_CMD          by   72;
%replace START_SLOT_PRGM_CMD         by   73;
%replace BURN_SLOT_PROM_CMD          by   74;
%replace DUMP_SLOT_MEM_CMD           by   75;
%replace TEST_SLOT_CMD               by   76;

/* more slot maintenance commands */

%replace LAST_SLOT_MAINT_CMD         by   79;

/* Maintenance commands 50x (80) - 5Fx (95) are for testing functions */
%replace FIRST_TEST_MAINT_CMD        by   80;
%replace ALWAYS_ERROR_CMD            by   80;
%replace LAST_TEST_MAINT_CMD         by   95;

%replace LAST_MAINT_CMD              by   95;

%replace  MAX_CMD_CODE               by   95;

/* Command codes in the range 80x (128) - FFx (255) are error codes which
     correspond to command code which is 128 (ERROR_ID) less. ie. 131 is
     error code for function 3 (131 - ERROR_ID) = 3 */

%replace  ERROR_ID                   by   128;
%replace  FIRST_ERROR_CODE           by   128;
%replace  LAST_ERROR_CODE            by   255;

/* Command codes in the range of 100x - 17Fx are unsolicited commands -
     commands sent from iop to host as attention commands */

%replace  FIRST_UNSOLIC_CMD          by   256;
%replace  BROKEN_SLOT_CMD            by   256;
%replace  ADDED_SLOT_CMD             by   257;
%replace  EXCEPTION_SLOT_CMD         by   258;
%replace  EXCEPTION_CHAN_CMD         by   259;
%replace  EXCEPTION_ENTITY_CMD       by   260;
%replace  EXCEPTION_SLOT_ONLY_CMD    by   261;
%replace  HARI_KIRI_CMD              by   262;
%replace  LAST_UNSOLIC_CMD           by   383;

/* values for channel - slot - entity status commands */
```

```
    %replace GET_TYPE           by  1;
    %replace GET_STATUS         by  2;
    %replace GET_BIND           by  3;

    %replace SET_RESET          by  4;
    %replace GET_FULL_IOA_ID    by  5;
    %replace GET_PROM_REV       by  6;
    %replace SET_MISC_PARAM1    by  7;

%replace INITIAL_ES_LIMIT       by  0;    /* ring limit for host sends */
%replace MIN_ES_STATUS          by  GET_TYPE;
%replace MAX_ES_STATUS          by  SET_MISC_PARAM1;
%replace MIN_ES_PARAM           by  PROTOCOL_VER_PARAM;
%replace MAX_ES_PARAM           by  LIMIT_PARAM;
%replace MIN_ES_METER           by  1;
%replace MAX_ES_METER           by  MAX_IOP_MTR;

%replace MIN_ES_CHAN_METER      by  1;
%replace MAX_ES_CHAN_METER      by  1;
%replace MIN_ES_CHAN_STATUS     by  GET_STATUS;
%replace MAX_ES_CHAN_STATUS     by  GET_BIND;

%replace MIN_ES_SLOT_METER      by  1;
%replace MAX_ES_SLOT_METER      by  1;
%replace MIN_ES_SLOT_STATUS     by  GET_TYPE;
%replace MAX_ES_SLOT_STATUS     by  GET_FULL_IOA_ID;

/* "testing" commands for ES */

%replace LOOPBACK_CMD           by  81;
%replace LOOPBACK_BGND_CMD      by  82;
%replace LOOPBACK_TIMED_CMD     by  83;
/* End include file . . . . . iop_common_ecc.pl1 */

/* %nolist; %include 'product_names'; %list; */
/* Begin include file product_names.incl.pl1 */

/* Note:  To add a product name and index, certain rules should be     */
/*        observed.                                                     */
/*                                                                      */
/*   1) The disks are first, and should be left somewhat open-ended    */
/*      to grow, perhaps up to 64.  This is not a firm rule.            */
/*                                                                      */
/*   2) Comm has reserved several ranges of numbers based on a         */
/*      certain hex value as a base.  These are 60-6F (96-111)          */
/*      and A0-AF (160-175).  This rule was broken during the           */
/*      assignment of tape drive values.                                */
/*                                                                      */
/*   3) A range of numbers for IOP adapters has also been reserved.    */
/*      These may not match the hardware types presented by the cards. */
/*      This range starts at 64 (40x).                                  */
/*                                                                      */
/*   4) Main boards (CPUs, MEMs, etc) are currently in the range       */
/*      240 (E0x) to 254 (FEx), and 192 (C0x) to 222 (DEx).            */
/*                                                                      */

%replace  D102_MODELX      by   1;  /* 60MB Disk Drive */
%replace  D101_MODELX      by   2;  /* 30MB Disk Drive */
%replace  D103_MODELX      by   3;  /* 143MB Disk Drive */
%replace  D105_MODELX      by   4;  /* 287 MB Disk Drive */
%replace  UNKN_MODELX      by   5;  /* Unknown Disk Model */
%replace  D900_MODELX      by   6;  /* 85MB Disk Drive */
%replace  D901_MODELX      by   7;  /* 165MB Disk Drive */
%replace  D902_MODELX      by   8;  /* 200MB Disk Drive */
%replace  D108_MODELX      by   9;  /* 448MB Disk Drive */
%replace  D200_MODELX      by  10;  /* 320MB IOP Disk Drive */
%replace  D118_MODELX      by  11;  /* 448MB Disk Drive - TUV */
%replace  D201_MODELX      by  12;  /* 151MB Disk Drive */
%replace  D203_MODELX      by  13;  /* 654MB IOP Disk Drive */
%replace  D205_MODELX      by  14;  /* 151MB IOP Disk Drive */
%replace  K101_MODELX      by  64;  /* ACOMM Async full modem Card */
%replace  K102_MODELX      by  65;  /* UCOMM Async/Sync Card */
%replace  K103_MODELX      by  66;  /* CCOMM Async/Clock Card */
```

```
%replace  K104_MODELX        by  67;  /* ENET LAN Card */
%replace  K105_MODELX        by  68;  /* IOP Disk Adapter */
%replace  K106_MODELX        by  69;  /* IOP SCSI Tape Adapter */
%replace  K107_MODELX        by  70;  /* IOP Pertec Tape Adapter */
%replace  K108_MODELX        by  71;  /* PK Terminator */
%replace  K109_MODELX        by  72;  /* UCOMM 423 Async/Sync Card */
%replace  K110_MODELX        by  73;  /* ACOMMP IBM printer card */
%replace  K111_MODELX        by  74;  /* ACOMM async/sync null modem Card */
%replace  C110N_MODELX       by  96;  /* HS Async Null Modem */
%replace  C110F_MODELX       by  97;  /* HS Async Full Modem */
%replace  IBM_1203_MODELX    by  98;  /* IBM Printer Interface */
%replace  T103_CBS_MODELX    by 100;  /* Tape Drive 1600 bpi */
%replace  T103_MODELX        by 101;  /* Tape Drive 1600/3200 */
%replace  T201_MODELX        by 102;  /* Tape Drive 1600/6250 */
%replace  T251_MODELX        by 103;  /* Tape Drive 1600/3200/6250 */
%replace  C103_MODELX        by 126;  /* Null Modem Channel */
%replace  C102_MODELX        by 127;  /* Full Modem Channel */
%replace  C101_MODELX        by 128;  /* Comm Controller */
%replace  C106_MODELX        by 129;  /* Modem Non Dial-Up */
%replace  C108_MODELX        by 130;  /* Modem Dial-Up */
%replace  C111_MODELX        by 131;  /* Remote Support Modem */
%replace  C107_MODELX        by 160;  /* HS Sync I */
%replace  C109_MODELX        by 161;  /* HS Sync II */
%replace  C104_MODELX        by 190;  /* Sync Line Adapter */
%replace  C104A_MODELX       by 191;  /* Alt Sync Line Adapter */
%replace  G200_MODELX        by 192;  /* Fresco CPU */
%replace  K100_MODELX        by 193;  /* IOP */
%replace  G424_MODELX        by 194;  /* Spitfire CPU */
%replace  M408_MODELX        by 195;  /* Wallaby/8mb Memory Ctrlr/array Board */
%replace  M432_MODELX        by 196;  /* Wallaby/32mb Memory Ctrlr/array Board */
%replace  D214_MODELX        by 221;  /* Removable Disk Adapter */
%replace  D116_MODELX        by 222;  /* 448MB Disk Director (TUV) */
%replace  C105_MODELX        by 223;  /* Calendar Clock */
%replace  P106_MODELX        by 224;  /* CPU Board */
%replace  M100_MODELX        by 225;  /* Memory Controller Board */
%replace  M102_MODELX        by 226;  /* 2MB Memory Array Board */
%replace  C100_MODELX        by 227;  /* Comm Controller */
%replace  D100_MODELX        by 228;  /* Disk Controller */
%replace  T100_MODELX        by 229;  /* Tape Controller */
%replace  I100_MODELX        by 230;  /* Link Controller */
%replace  U100_MODELX        by 231;  /* PSI Board */
%replace  D104_MODELX        by 232;  /* Disk Controller */
%replace  D004_MODELX        by 233;  /* Disk SMD Adapter */
%replace  G601_MODELX        by 234;  /* Processor Controller */
%replace  G602_MODELX        by 235;  /* CPU/SAP Board */
%replace  G400_MODELX        by 236;  /* Zink Central Processor */
%replace  T102_MODELX        by 237;  /* 1600/3200 Tape Controller */
%replace  D107_MODELX        by 238;  /* 448MB Disk Controller */
%replace  D106_MODELX        by 239;  /* 448MB Disk Director */
%replace  C200_MODELX        by 240;  /* Comm Controller */
%replace  T200_MODELX        by 241;  /* 6250 Tape Controller */
%replace  M200_MODELX        by 242;  /* Bandit 16-bit Controller */
%replace  M210_MODELX        by 243;  /* Bandit 8MB Memory Array Board */
%replace  M300_MODELX        by 244;  /* Dinkum 64-bit Controller */
%replace  T301_MODELX        by 245;  /* Quarter inch SCSI  tape drive */
%replace  M310_MODELX        by 246;  /* 16MB Memory Array Board */
%replace  M320_MODELX        by 247;  /* 32MB Memory Array Board */
%replace  M316_MODELX        by 248;  /* 8MB Memory Array Board */
%replace  D110_MODELX        by 249;  /* Disk Controller */
%replace  D114_MODELX        by 250;  /* Disk Controller */
%replace  D117_MODELX        by 251;  /* Disk Controller */
%replace  M214_MODELX        by 252;  /* Bandit 4MB Memory Array Board */
%replace  G610_MODELX        by 253;  /* Hydra Controller/CPU/SAP Board */
%replace  T250_MODELX        by 254;  /* 1600/3200/6250 Tape Controller */
%replace  NONE_MODELX        by 255;  /* No Configured Channel */
%replace  MAX_DEV            by 255;

%replace  MIN_IOA_MODELX   by  64;
%replace  MAX_IOA_MODELX   by  74;

declare   s$hardware_names (0:255) char (6) var ext static;
declare   s$product_models (0:255) char (6) var ext static;
declare   s$product_names (0:255) char (32) var ext static;
```

```
/* End include file products_names.incl.pl1 */
/* %nolist; %include 'lock_calls'; %list; */
/* Begin of include file lock_calls.incl.pl1, 85-06-28 JK */

declare   attach_lock           entry (char (32) var in,
                                       bit (1) aligned in,
                                       fixed bin (31) in,
                                       pointer);
declare   attach_group_lock     entry (char (32) var in,
                                       bit (1) aligned in,
                                       fixed bin (31) in,
                                       fixed bin (31) in,
                                       pointer);
declare   attach_low_use_lock   entry (char (32) var in,
                                       bit (1) aligned in,
                                       pointer);
declare   attach_member_lock    entry (pointer in,
                                       pointer in,
                                       pointer,
                                       fixed bin (15));
declare   attach_member_lock_name
                                entry (char (32) var in,
                                       pointer in,
                                       pointer,
                                       fixed bin (15));
declare   detach_member_lock    entry (pointer);
declare   get_n_locks           entry (pointer in)
                                    returns (fixed bin (31)) options (c);
declare   lock                  entry (pointer in) options (c);
declare   mylock                entry (pointer in)
                                    returns (bit (1) aligned) options (c);
declare   read_lock             entry (pointer in) options (c);
declare   try_lock              entry (pointer in)
                                    returns (bit (1) aligned) options (c);
declare   unlock                entry (pointer in) options (c);

/* End of include file lock_calls.incl.pl1 */

%replace MAINT_CHAN       by 0;
%replace TIMEOUT          by 65535;

/* arguments */
dcl a_iop_no          fixed bin(15);
dcl a_ioa_slot        fixed bin(15);
dcl a_ioa_type        fixed bin(15);
dcl a_ioa_chan        fixed bin(15);
dcl a_status          fixed bin(15);
dcl a_data            bit(64) aligned;
dcl a_data_in_out     fixed bin(31);
dcl a_code            fixed bin(15);
dcl a_slot            fixed bin(15);
dcl a_entity_id       fixed bin(15);
dcl a_chan_in         fixed bin(15);
dcl a_chan_out        fixed bin(15);
dcl a_start_ioa       bit(1) aligned;
dcl a_catp            ptr;
dcl a_func_in         fixed bin(15);
dcl a_d16_in          fixed bin(15);
dcl a_d32_1_in        fixed bin(31);
dcl a_d32_2_in        fixed bin(31);
dcl a_out1            fixed bin(31);
dcl a_out2            fixed bin(31);

/* automatics */
dcl fb15              fixed bin(15);
dcl fb31              fixed bin(31);
dcl i                 fixed bin(15);
dcl iop_no            fixed bin(15);
dcl ioa_slot          fixed bin(15);
dcl bind_slot         bit(1) aligned;
dcl bound_slot        bit(1) aligned;
dcl unbind_slot       bit(1) aligned;
dcl start_ioa         bit(1) aligned;
dcl entity_id         fixed bin(15);
```

```
dcl data_in_out      fixed bin(31);
dcl dev_mbx          fixed bin(31);
dcl slot             fixed bin(15);
dcl need_to_wait     bit(1) aligned;
dcl chan             fixed bin(15);
dcl locked           bit(1) aligned;
dcl partner_slot     fixed bin(15);
dcl p                ptr;
dcl out1             fixed bin(31);
dcl out2             fixed bin(31);
dcl configured       bit(1) aligned;

/* based */
dcl 1 data_31  based,
      2 high    fixed bin(15),
      2 low     fixed bin(15);

/* entries */

dcl busy_wait              entry (fixed bin(15), fixed bin(15));
dcl start_time             entry returns(fixed bin(31));
dcl delta_time             entry (fixed bin(31)) returns(fixed bin(31));
dcl  syserr_edit_ii entry (fixed bin (15), char (*) var,
                          fixed bin (15), fixed bin (15));
dcl iop_io_command_full  entry (fixed bin(15), fixed bin(15), fixed bin(15),
                                fixed bin(15), fixed bin(31), fixed bin(31),
                                fixed bin(15));


%page;
assign_channel: entry (a_iop_no, a_chan_out, a_code);

      call setup;
      if a_code ^= 0
      then return;

      a_chan_out = -1;
      if ^iop_data.configured(iop_no)
      then do;
           a_code = e$device_not_configured;
           return;
           end;

      call lock (iop_data.cat_lockp( iop_no) );

      do fb15 = 0 to hbound(cat,1) while(cat(fb15).active);
           end;

      if fb15 > hbound(cat,1)
      then do;
           a_code = e$too_many_devices;
           call unlock (iop_data.cat_lockp( iop_no) );
           return;
           end;

      /* Cleanup entry */

      string(cat(fb15).status) = '0'b;
      cat.active(fb15) = '1'b;
      cat.ioa_slot(fb15) = 0;
      cat.vector(fb15) = addr( cvt(hbound(cvt,1)) );
      cat.subchan(fb15) = 0;
      cat.data(fb15) = '0'b;

      a_chan_out = fb15;

      call unlock (iop_data.cat_lockp( iop_no) );

      return;
%page;
connect_iop_driver: entry(a_iop_no, a_chan_in, a_entity_id,
                          a_start_ioa, a_data_in_out, a_code);

      call setup;
```

```
if a_code ^= 0
then return;

if a_chan_in < 1 ! a_chan_in > hbound(cat,1)
then do;
      a_code = e$invalid_channel_no;
      return;
      end;

if ^iop_data.configured(iop_no)
then do;
      a_code = e$device_not_configured;
      return;
      end;

chan = a_chan_in;
entity_id = a_entity_id;
data_in_out = a_data_in_out;
start_ioa = a_start_ioa;

if ^cat.configured(chan)
then do;
      a_code = e$device_not_configured;
      return;
      end;

if cat.connected(chan)
then do;
      a_code = e$inconsistent_device_state;
      return;
      end;

call send_maint_cmd (BIND_CHAN_ENT, entity_id, (chan), (data_in_out),
                     out1, out2,  a_code);
if a_code ^= 0
then do;
      a_data_in_out = out1;
      return;
      end;

a_data_in_out = out2;

/* Configure the interrupt vector for this channel */

configured = '0'b;

if cat.ioa_type(chan) < lbound (s$hardware_names, 1) |
   cat.ioa_type(chan) > hbound (s$hardware_names,1)
then do;
      a_code = e$invalid_slot_number;
      goto connect_error;
      end;

do i = lbound(cvt,1) to hbound(cvt,1) while (^configured);
      p = addr(cvt(i));
      do fb15 = 1 to hbound(p->cvt_type.user,1);
            if p->cvt_type.user(fb15) = cat.ioa_type(chan)
            then configured = '1'b;
            end;
      end;

if ^configured
then do;
      a_code = e$invalid_slot_number;
      goto connect_error;
      end;

cat.vector(chan) = addr( cvt(i-1) );

/* Determine if the adapter has been bound to the entity. We
   only need to do this once per card */

bind_slot = (slot ^= -1);
bound_slot = '0'b;
```

```
     slot = cat.ioa_slot(chan);
     do i = 1 to hbound(cat,1) while(bind_slot);
          if cat.connected(i) & cat.ioa_slot(i) = slot
          then bind_slot = '0'b;
          end;

     if ^bind_slot
     then goto connect_done;

     call send_maint_cmd ( BIND_SLOT_ENT, entity_id, (slot), (0),
                           out1, out2, a_code);
     if a_code ^= 0
     then goto connect_error;

     a_data_in_out = out1;

     bound_slot = '1'b;

connect_done:

     if start_ioa
     then do;
          call send_maint_cmd ( START_SLOT_PRGM_CMD, slot, (0), (0),
                                out1, out2, a_code);

          if a_code ^= 0
          then goto connect_error;
          end;

     cat.connected(chan) = '1'b;

     return;

connect_error:

     /* Deconfigure the interrupt handler, set to default */
     cat.vector(chan) = addr(cvt(hbound(cvt,1)));

     call send_maint_cmd ( UNBIND_CHAN_ENT, entity_id, (chan), (0),
                           (0), (0), (0));

     if bound_slot
     then call send_maint_cmd ( UNBIND_SLOT_ENT, entity_id, (slot), (0),
                           (0), (0), (0));
     return;
%page;
disconnect_iop_driver: entry (a_iop_no, a_chan_in, a_entity_id,
                              a_data_in_out, a_code);

     call setup;

     if a_code ^= 0
     then return;

     if a_chan_in < 1 ! a_chan_in > hbound(cat,1)
     then do;
          a_code = e$invalid_channel_no;
          return;
          end;

     chan = a_chan_in;

     if ^cat.connected(chan)
     then do;
          a_code = e$inconsistent_device_state;
          return;
          end;

     /* Disconnect and Null the interrupt vector */
     cat.connected(chan) = '0'b;
     cat.vector(chan) = addr(cvt(hbound(cvt,1)));

     if ^iop_data.configured(iop_no)
     then return;
```

```
     slot = cat.ioa_slot(chan);
     entity_id = a_entity_id;
     data_in_out = a_data_in_out;

     unbind_slot = '1'b;
     do i = 1 to hbound(cat,1) while(unbind_slot);
          if cat.connected(i) & cat.ioa_slot(i) = slot
          then unbind_slot = '0'b;
          end;

     if ^unbind_slot
     then goto disconnect_join;

     call send_maint_cmd ( UNBIND_SLOT_ENT, entity_id, (slot), (0),
                           out1, out2, a_code);

     if a_code ^= 0
     then do;
          a_data_in_out = out1;
          return;
          end;

disconnect_join:

     call send_maint_cmd ( UNBIND_CHAN_ENT, entity_id, (chan), data_in_out,
                           out1, out2, a_code);
     if a_code ^= 0
     then a_data_in_out = out1;

     return;
%page;
free_channel:  entry (a_iop_no, a_chan_in, a_code);

     call setup;

     if a_code ^= 0
     then return;

     if a_chan_in < 1 ! a_chan_in > hbound(cat,1)
     then do;
          a_code = e$invalid_channel_no;
          return;
          end;

     if cat.connected(a_chan_in)
     then do;
          a_code = e$inconsistent_device_state;
          return;
          end;

     call lock (iop_data.cat_lockp( iop_no) );
     /* Leave remaining data for audit reasons */
     cat.active(a_chan_in) = '0'b;
     cat.configured(a_chan_in) = '0'b;

     call unlock (iop_data.cat_lockp( iop_no) );

     return;

%page;
get_cat_data: entry (a_iop_no, a_chan_in, a_ioa_slot,
                     a_ioa_chan, a_ioa_type, a_data, a_code);

     call setup;
     if a_code ^= 0
     then return;

     chan = a_chan_in;

     if chan < 1 ! chan > hbound(cat,1)
     then do;
          a_code = e$invalid_channel_no;
          return;
          end;
```

```
     a_ioa_slot = cat.ioa_slot(chan);
     a_ioa_chan = cat.subchan(cnan);
     a_ioa_type = cat.ioa_type(chan);
     a_data     = cat.data(cnan);

     return;

get_iop_cat: entry (a_iop_no, a_catp, a_code);

     call setup;

     a_catp = catp;

     return;

get_iop_slot: entry (a_iop_no, a_slot, a_code);

     a_code = 0;
     a_slot = -1;

     iop_no = a_iop_no;

     iop_datap = iop_datap$;
     iop_data_max_controllers = iop_data.max_controllers;

     if iop_no < lbound(iop_data.info, 1) ! iop_no > hbound(iop_data.info, 1)
     then do;
          a_code = e$invalid_slot_number;
          return;
          end;

     a_slot = iop_data.slot(iop_no);

     if a_slot < 0
     then a_code = e$device_not_configured;
     return;

get_iop_no: entry (a_slot, a_iop_no, a_code );

     a_code = 0;
     a_iop_no = 0;

     iop_datap = iop_datap$;
     iop_data_max_controllers = iop_data.max_controllers;

     do fb15 = 1 to iop_data_max_controllers;

          if iop_data.slot(fb15) = a_slot
          then do;
               a_iop_no = fb15;
               return;
               end;

          if iop_data.should_be_paired(fb15)
          then do;
               if mod (iop_data.slot(fb15), 2) = 0
               then partner_slot = iop_data.slot(fb15) + 1 ;
               else partner_slot = iop_data.slot(fb15) - 1;
               if partner_slot = a_slot
               then do;
                    a_iop_no = fb15;
                    return;
                    end;
               end;
          end;

     a_code = e$invalid_slot_number;

     return;

%page;
store_cat_data: entry (a_iop_no, a_chan_in, a_ioa_slot, a_ioa_chan,
                       a_ioa_type, a_data, a_code);
```

```
call setup;
if a_code ^= 0
then return;

chan = a_chan_in;

if chan < 1 ! chan > hbound(cat,1)
then do;
     a_code = e$invalid_channel_no;
     return;
     end;

if ^cat.active(chan) ! cat.connected(chan)
then do;
     a_code = e$inconsistent_device_state;
     return;
     end;

/* Find the configured interrupt handler etc.  The vector is
   not setup until the channel is actually connected.  This is
   to prevent bad interrupts from the IOP */

configured = '0'b;

if a_ioa_type < lbound (s$hardware_names, 1) |
   a_ioa_type > hbound (s$hardware_names,1)
then do;
     a_code = e$invalid_slot_number;
     return;
     end;

do i = lbound(cvt,1) to hbound(cvt,1) while (^configured);
     p = addr(cvt(i));
     do fb15 = 1 to hbound(p->cvt_type.user,1);
          if p->cvt_type.user(fb15) = a_ioa_type
          then configured = '1'b;
          end;
     end;

if ^configured
then do;
     a_code = e$invalid_slot_number;
     return;
     end;

cat.ioa_slot(chan) = a_ioa_slot;
cat.subchan(chan)  = a_ioa_chan;
cat.ioa_type(chan) = a_ioa_type;
cat.data(chan)     = a_data;

cat.configured(chan) = '1'b;

return;

%page;
iop_acquire_partner_slot: entry (a_iop_no, a_code);

call setup;
if a_code ^= 0 then return;

need_to_wait = '0'b;

call lock (iop_data.config_lockp);
if iop_data.acquired(iop_no)
then need_to_wait = '1'b;
else iop_data.acquired(iop_no) = '1'b;
call unlock (iop_data.config_lockp);

if ^need_to_wait
then return;

fb31 = start_time();

do while (iop_data.acquired(iop_no) & delta_time(fb31) < TIMEOUT*10);
     end;
```

```
     call lock (iop_data.config_lockp);
     if iop_data.acquired(iop_no)
     then a_code = e$timeout;
     else iop_data.acquired(iop_no) = '1'b;
     call unlock (iop_data.config_lockp);
     return;

iop_return_partner_slot: entry (a_iop_no);

     iop_no = a_iop_no;

     iop_datap = iop_datap$;
     iop_data_max_controllers = iop_data.max_controllers;

     call lock (iop_data.config_lockp);
     iop_data.acquired(iop_no) = '0'b;
     call unlock (iop_data.config_lockp);

     return;

%page;
reset_ioa: entry (a_iop_no, a_ioa_slot, a_code);

     call setup;
     if a_code ^= 0
     then return;

     ioa_slot = a_ioa_slot;

     call syserr_edit_ii (0,
                    'iop_reset_ioa: Resetting IOA in slot ^i on IOP(^i)',
                    ioa_slot, iop_no);

     iop_data.ioa_reset_issued(iop_no) = '1'b;
     iop_data.register.a(iop_no) = ioa_slot;

     call send_maint_cmd (SET_SLOT_STATUS_CMD, SET_RESET, (ioa_slot),
                         (0), out1, out2, a_code);

     iop_data.ioa_reset_issued(iop_no) = '0'b;

     return;

read_ioa_status: entry (a_iop_no, a_ioa_slot, a_status, a_code);

     call setup;
     if a_code ^= 0
     then return;

     a_status = 0;
     ioa_slot = a_ioa_slot;

     call send_maint_cmd (READ_SLOT_STATUS_CMD, GET_STATUS, (ioa_slot),
                         (0), out1, out2, a_code);
     if a_code ^= 0
     then return;

     if addr(out2)->stat_tpl.running
     then a_status = 1;

     return;
%page;
iop_maint_io: entry (a_iop_no, a_func_in, a_d16_in, a_d32_1_in, a_d32_2_in,
                    a_out1, a_out2, a_code);

call setup;

if a_code ^= 0
then return;

if a_func_in < FIRST_MAINT_CMD | a_func_in > LAST_MAINT_CMD
then do;
     a_code = e$unknown_cmd_func;
     return;
     end;
```

```
     call send_maint_cmd (a_func_in, a_d16_in, a_d32_1_in, a_d32_2_in,
                          a_out1, a_out2, a_code);

     return;

%page;
send_maint_cmd: proc (a_func, a_d16, a_d32_1, a_d32_2, a_out1, a_out2, a_code);

dcl  a_func     fixed bin(15);
dcl  a_d16      fixed bin(15);
dcl  a_d32_1    fixed bin(31);
dcl  a_d32_2    fixed bin(31);
dcl  a_out1     fixed bin(31);
dcl  a_out2     fixed bin(31);
dcl  a_code     fixed bin(15);

     call lock (iop_data.maint_lockp(iop_no));
     maint.busy = '1'b;

     call iop_io_command_full (iop_no, MAINT_CHAN, a_func,
                               a_d16, a_d32_1, a_d32_2, a_code);

     if a_code ^= 0
     then goto send_maint_exit;

     call busy_wait(iop_no, a_code);

     if a_code ^= 0
     then goto send_maint_exit;

     a_code = maint.data_16_1;
     a_out1 = maint.data_32_1;
     a_out2 = maint.data_32_2;

send_maint_exit:

     call unlock (iop_data.maint_lockp(iop_no));

     end send_maint_cmd;
%page;
setup:    proc;

     a_code = 0;

     iop_no = a_iop_no;

     iop_datap = iop_data$;
     iop_data_max_controllers = iop_data.max_controllers;
     if iop_no < lbound(iop_data.info, 1) ! iop_no > hbound(iop_data.info, 1)
     then do;
          a_code = e$invalid_slot_number;
          return;
          end;

     if iop_data.slot(iop_no) < 0
     then do;
          a_code = e$invalid_slot_number;
          return;
          end;

     cvtp = iop_data.cvtp;
     catp = iop_data.catp(iop_no);
     maintp = iop_data.maintp(iop_no);

     end setup;

     end iop_channel_utils;
%page;
busy_wait_real: proc (a_iop_no, a_code) options (kernel);

/* %include 'iop_data'; */
/* Begin include file . . . . . iop_data.incl.pl1 */

/* Describes various permanent IOP data bases */
```

```
dcl  iop_datap$ ptr ext static;

dcl  iop_datap ptr;

dcl  iop_data_max_controllers fixed bin (15);

dcl 1 iop_data              based (iop_datap),
    2 max_controllers       fixed bin (15),
    2 group_lockp           ptr,
    2 config_lockp          ptr,
    2 cvtp                  ptr,
    2 info                  (iop_data_max_controllers),
      3 slot                fixed bin (15),
      3 vector              fixed bin (15),

      3 slot_lockp          ptr,
      3 iop_lockp           ptr,
      3 vos_lockp           ptr,
      3 cat_lockp           ptr,
      3 csc_lockp           ptr,
      3 maint_lockp         ptr,

      3 flags,
        4 paired            bit (1),
        4 idled             bit (1),
        4 configured        bit (1),
        4 testing           bit (1),
        4 should_be_paired bit (1),
        4 monitor_in_use bit(1),
        4 acquired          bit(1),
        4 ioa_reset_issued bit(1),
        4 pad               bit (7),
      3 mbxp                ptr,
      3 catp                ptr,
      3 maintp              ptr,
      3 statementp          ptr,
      3 fw_pathsp           ptr,

      3 register,
        4 a                 fixed bin(31),
        4 b                 fixed bin(31),
        4 c                 fixed bin(31),

      3 csc_head            ptr,
      3 csc_tail            ptr,
      3 csc_n_heads         fixed bin (15),

      3 max_memory          fixed bin (15),
      3 n_pages_mem         fixed bin (15),
      3 iop_memp            ptr,
      3 iop_absp            ptr,
      3 iop_abs_vpn         fixed bin (15),
      3 iop_abs_ppn         fixed bin (15);

/* this structure defines the array of memory used by the iop */

dcl  iop_memp               ptr;

dcl  iop_mem_max_pages      fixed bin (15);

dcl 1 iop_mem               based (iop_memp),
    2 max_pages             fixed bin (15),
    2 n_pages               fixed bin (15),
    2 page_nos              (iop_mem_max_pages) fixed bin (15);

dcl iopcsqep               ptr;
dcl 1 iopcsqe              based (iopcsqep),
      2 next                ptr,
      2 chan                fixed bin (15),
      2 func                fixed bin (15),
      2 data_16_1           fixed bin (15),
      2 data_32_1           fixed bin (31),
      2 data_32_2           fixed bin (31);
```

```
dcl iopcscp                  ptr;
dcl 1 iopcsc                 based (iopcscp),
     2 head                   ptr,
     2 tail                   ptr,
     2 n_heros                fixed bin (15);

dcl maintp                    ptr;
dcl 1 maint                   based (maintp),
     2 busy                   bit (1) aligned,
     2 data_16_1              fixed bin (15),
     2 data_32_1              fixed bin (31),
     2 data_32_2              fixed bin (31);

/* End include file . . . . . iop_data.incl.pl1 */

dcl start_time                entry returns(fixed bin(31));
dcl delta_time                entry (fixed bin(31)) returns(fixed bin(31));
dcl iop_interrupt_handler_check entry (fixed bin (31), ptr);

dcl  a_iop_no   fixed bin(15);
dcl  a_code     fixed bin(15);

dcl  iop_no     fixed bin(31);
dcl  fb31       fixed bin(31);

     a_code = 0;

     iop_no = a_iop_no;
     iop_datap = iop_datap$;

     maintp = iop_data.maintp(iop_no);

     if ^maint.busy
     then return;

     fb31 = start_time();

     do while (maint.busy & delta_time(fb31) < TIMEOUT*10);
          call iop_interrupt_handler_check((iop_no),null());
          end;

     if maint.busy
     then a_code = e$io_busy_timeout;

     end busy_wait_real;
%page;
iop_interrupt_handler_check_real: proc( a_iop_no, a_ptr) options (kernel);

/* this entry is to put the call to iop_interrupt_handler on
   the interrupt stack, so it doesn't blow the wired stack away */

declare   a_iop_no             fixed bin(31);
declare   a_ptr                ptr;

dcl iop_interrupt_handler entry (fixed bin (31), ptr);


     call iop_interrupt_handler (a_iop_no, a_ptr);

end iop_interrupt_handler_check_real;
```

```
/*  ***begin copyright*** *******************************  */
/*                                                          */
/*  STRATUS CONFIDENTIAL INFORMATION: CLASS II              */
/*  COPYRIGHT (c) Stratus Computer, Inc. 1987               */
/*                                                          */
/*  This program contains confidential and proprietary      */
/*  information of Stratus Computer, Inc., and any          */
/*  reproduction, disclosure, or use in whole or in part    */
/*  is expressly prohibited, except as may be               */
/*  specifically authorized by prior written agreement or   */
/*  permission of Stratus.                                  */
/*                                                          */
/*  ***end copyright*** *********************************  */
```

```
/*    Checksum logic tests.
/*    ---------------------
/*    These routines take advantage of the diagnostic path to the cheksum
/*    logic. This should simplify debug.
/*
/*    written:  6/12/86
/*         by:  Bill Snapper
/*
      extdef    checksum_test

/*       incl      'iop_prom_hdw_d efs', nolist
/*    IOP include file              by  Bill Snapper
/*
      title     'IOP hardware definitions'

/*    Vector equates

equ   addr_err_vector, 0000000Cx /* RAM address 0Cx = address error vector

equ   berr_vector, 00000008x   /* address 8 = berr_vector

equ   soft_int_vector, 00000204x

equ   pbs_err_vector, 00000208x

equ   pbo_err_vector, 0000020Cx

equ   cmd_int_vector, 00000210x

equ   scan_vector, 00000214x /* address 214x = pbus_scan_int_vector

equ   timer_vector, 00000218x

equ   vos_vector,  0000021Cx

equ   MAP_PAGE_BASE, 0BFCx      /* First map page number.
equ   NUM_MAP_PGS, 4            /* Total number of map pages.

equ   MAP,        00BFC000x     /* MAP start address for writing and reading
                                /* TOTAL_MAP = BFC-xxx thru BFF-xxx with the
                                /* top 1048 accresses reserved for board control

equ   NUM_RAM_PGS, 127          /* Number of ram pages - 1.
equ   NUM_INIT_RAM_PGS, 2       /* Number of initial ram pages to be initialized.
equ   FIRST_INIT_RAM_PG, 007Ex  /* First initial ram page number.
equ   SSP_ENTRY,  007F0000x     /* Map entry for supervisor stack page. (test)
equ   USP_ENTRY,  007E0000x     /* Map entry fur user stack page.       (test)


/*    Map equates.
/*    ------------
/*    These locations are not usable as virtual map entries.  There are 1048
/*    such available tri-byte words.
equ   berr_id,    00BFFFFCx     /* ID word used in func self test for bus errors.
equ   addr_id,    00BFFFF8x     /* ID word used in func self test for adr errors.
equ   save_mask, 00BFFFF4x      /* Word used to save mask info for timer test.
equ   timer_entry, 00BFFFF0x    /* Holds entry point for tim_int_handler to call
equ   current_slot, 00BFFFECx  /* Current slot selected.
equ   current_slot_stat, 00BFFFE8x
equ   scan_hits, 00BFFFE4x      /* Number of scanner interrupts.
equ   berr_cause, 00BFFFE0x     /* ID number used to identify manually induced
                                /* bus errors.
equ   halt_test, 00BFFFDCx      /* Used to signal halts from vos test drivers.
equ   temp_checksum, 00BFFFD8x /* Used to hold temporary checksum for dma tests.
equ   level1_id, 00BFFFD4x      /* ID word used in func self test for level1.

/*    Pointers to structures needed for all primitive io.
equ   disk_listp, 00BFFFD0x     /* Holds the pointer to the disk list info.
equ   boot_devp, 00BFFFCCx      /* Holds the pointer to the boot_device structure
equ   sys_conp, 00BFFFC8x       /* Holds the pointer to the system_console "
equ   map_esip, 00BFFFC4x       /* Holds the pointer to es interface structure.

equ   pbus_stat_cpy, 00BFFFC0x /* Holds a copy of the pbus status latch.
equ   old_level, 00BFFFBCx      /* Holds old processor interrupt mask level
```

```
equ  prom_pgtblp, 0BFFFB8x     /* Holds the pointer to the prom page table.

equ  def_dump_listp, 0BFFFB4x /* Default dump list pointer

equ  map_save, 0BFFFB0x       /* Save register for using map.

equ  tape_infop, 0BFFFACx     /* Tape info structure pointer.

                /* OLD = 00BFEF9C */
equ  MAP_TOP,  00BFEF7Cx      /* Highest usable map entry for virtual mapping.
                              /* All entries above this are free for generic
                              /* tri-byte storage needed by the eeprom.

/*   Stack address equates.
/*equ  ssp_loc,    00BFEF9Cx     /* Top usable location of map will point to SSP
/*equ  usp_loc,    00BFEF98x     /* Next location down will point to USP
/*
/*   NEW...
equ  ssp_loc,  00BFC1FCx      /* Virtual page 127 (7fx)
equ  usp_loc,  00BFC1F8x      /* Virtual page 126 (7ex)


/* Bus error identifiers.  Used by prom bus_error_test.
/* POSSIBLE BUS ERROR CONDITIONS.
equ   MIN_BERR_ID, 0
equ   MAX_BERR_ID, 5

equ   WRT_TO_CODE_PG, 0       /* write to a read only page.
equ   RD_FROM_NULL_PG, 1      /* read from a page with a 0 access code
equ   DMA_RSEL_PB_LOCK, 2     /* DMA_READ select w/pbus locked
equ   DMA_WSEL_PB_LOCK, 3     /* DMA_WRITE select w/pbus_locked
equ   DMA_VSEL_PB_LOCK, 4     /* DMA_VERIFY select w/pbus locked
equ   PBERR_EN_MT_SLOT, 5     /* Select empty pbus slot w/PBERR_EN on.


equ  sync_sel,  00BF6000x     /* Sync select page

equ  ram,  00000000x          /* Ram with 0.5MB 0-0007FFFF

equ  prom_lo,  00000000x      /* PROM when LOW 0-1FFF
equ  prom_hi,  00BE0000x      /* PROM when HIGH BE0000-BEFFFF:

equ  vec_reg,  00BF6801x      /* VECTOR_REGISTER write address

equ  bccs, 00BF6000x                /* SRC_BRD_STAT 0*
                                    /* DST_BRD_STAT 0*
                                    /* Board control/status --- read/write
                                    /* bccs = Board Control Status


     equ  set., 00008000x     /* for setting control bits
     equ  clr., 00000000x     /* for clearing control bits
     equ  mask., clr.         /* for masking interrupts
     equ  unmask., set.       /* for unmasking interrupts

     equ  bccs_broken,    15  /* read
     equ  bccs_broken2,   14  /* read
     equ  bccs_mempar,    13  /* read only (data), write broken2 to clear
     equ  bccs_memcomp,   12  /* read only, write broken2 to clear
     equ  bccs_timask,    11  /* read, write to clear, Timer I-Mask
     equ  bccs_pkcomp,    10  /* PK compare: read only: hi true
     equ  bccs_cmdpend,   09  /* si command pending, write to clear
     equ  bccs_statchg,   08  /* si status change bit, write to clear

     equ  bccs_side,      07  /* Side D tracks PROM HI, side C tied to +5v
     equ  bccs_ipend,     06  /* an interrupt req. on sb is pending, read only
     equ  bccs_partner,   05  /* board can be partnered, read, set, clear
     equ  bccs_ZOUT_GT,   04  /* ZOUT GT, read, Bus protect/enable
     equ  bccs_LEVEL_1,   03  /* Level 1
     equ  bccs_romhigh,   02  /* rom is high, read, set, clear
     equ  bccs_cmd_mask,  01  /* interrupt mask for si cmd pending
                              /* (Level 5 interrupt, cmd pending)
     equ  bccs_imask,     00  /* interrupt mask for all conditions and
                              /* levels (Generic I-MASK), RD/WR
```

```
/*   DST_BRD_STAT LATCH BIT DEFINITION.  These bits are set by writing 8000x
/*   and cleared by writing 0000x to them.  The variable  bdcs points to this
/*   latch.
     equ  P_ENABLE,        07    /* P P-Bus enabled
     equ  Q_ENABLE,        06    /* Q P-Bus enabled
     equ  PARTNERED,       05    /* The partnered bit, used to pair brds
     equ  ZOUT_GT,         04    /* The bus enable bit
     equ  WR_PBUS_FORCE,   03    /* Set PBUS_FORCE bit.
     equ  PROM_IS_HIGH,    02    /* Prom is high bit
     equ  IMSK_STAT_CHG,   01    /* Int. mask for stat change bit/CMD_PEND
     equ  GENERIC_IMSK,    00    /* Generic interrupt mask, masks all ints.

/* DST_BRD_CNTL DECODER
/* The following equates (07-00) would be used as follows:
/* EX:    move.w  SYNC_JIFFY, (brd_ctrl)
/* where: SYNC_JIFFY would form the data word   0004x   and would issue
/*        the control pulse SYNC_JIFFY
/* writable board control pulses.  These definitions refer to data
/* bits 0 1 2 for decoding pulses.

equ  brd_ctrl,      00BFE400x   /* WRITABLE  DST_BRD_CTRL
     equ  ZCLR_BROKEN,     07    /* Clear out broken
     equ  ZCLR_BROKEN2,    06    /* Clear out broken_2
     equ  ZCLR_CHKSUM,     05    /* Clear checksum register
     equ  SYNC_JIFFY,      04    /* Sync the clocks
     equ  ZSET_INT_REQ,    03    /* Set interrupt request bit to VOS
     equ  ZCLR_DMA_EN,     02    /* Clear DMA enable bit
     equ  ZCLR_CMD,        01    /* Clear command pending bit
     equ  ZCLR_STAT_CHNG,00    /* Clear status change bit (STAT_CHNG )

/* PBUS-STATUS register.        (Read only)
equ  pbus_stat,  00BFBC00x          /* Pbus Status word.  READ ONLY !!!
     equ  VERIFY_OK,       15
     equ  PK_ONLINE,       15    /* GIOC online to P-bus
     equ  DMA_WRT,         14    /*
     equ  DMA_RD,          13    /*
     equ  SCAN_INTL,       12    /* Int from p-bus scanner.
     equ  SCAN_RUNSL,      11    /* SCAN_RUNS* = SCAN_EN * SCAN_RUN
     equ  PBUS_FORCE,      10    /* READ; ( SEE BELOW FOR PBUS_FORCE WRITE )
     equ  PENS,            09    /* P side enable, READ; (SEE WRITE ABOVE)
                                 /* PENS = sync P ENABLE
     equ  QENS,            08    /* Q side enable, READ; (SEE WRITE ABOVE)
                                 /* QENS = sync Q ENABLE
     equ  TO_ERRL,         07    /* Bit 07 Pbus Diag (i.e. one bus forced)
     equ  PBO_ERRORL,      06    /* P-bus obey error
     equ  PBS_ERRORL,      05    /* P-bus select error
     equ  PBS_BERR_EN,     04    /* Pbus select BERR Enabled (active hi)
     equ  PBUS_ENS,        03    /* P-bus enabled; = sync PBUS EN
     equ  PBUS_LOCKL,      02    /* Pbus Lock (locked if low)
     equ  OBEY_P,          01    /* Obey P; READ ONLY
     equ  OBEY_Q,          00    /* Obey Q; READ ONLY

equ  read_cmd,  00BFE401x           /* Read command register (SBI)
equ  read_pntr, 00BFE801x           /* Read pointer register (SBI)

equ  timer_data,  00BFAC00x         /* READ Timer data word, WRITE Timer data
equ  timer_cont,  00BFAC02x         /* READ Timer status word, WRITE timer
                                    /* command and data pointer words

equ  checksum,      00BFA400x       /* P/Q bus checksum WORD; RD

equ  diag_checksum_wrt, 00BFBC00x  /* Diagnostic path for testing checksum; WR

/* PBUS/SCANNER/DEV CONTROL WORD:  Bit 15 (1 to set / 0 to clear)
equ  pbus_ctrl,     00BFA400x       /* DST_CBI_STAT  byte)
     equ  EN_P_BUS,        07    /* Pbus enable bit (active hi)
     equ  P_BUS_ERREN,     06    /* P-bus error enable bit, active = 1
     equ  ENABLE_SCAN,     05
     equ  RUN_SCAN,        04
     equ  TIM_IMASK,       03
     equ  LEVEL1,          02
     equ  PRIV,            01    /* Active low
     equ  PBUS_LOCK,       00    /* Active low
```

```
equ  scan_listw,      00BFAC00x        /* Spare for WRITE. For word access.
equ  scan_listb,      00BFAC01x        /* through FFBFACFF, Odd Bytes Only !
                                       /* Bits  7-4 Slot number
                                       /* Bits  3-0 TBD (subchannel??)

equ  scan_int_stat,   00BFA800x        /* Scanner interrupt status word
                                       /* Bit  15   Adapter Alive       (active hi)
                                       /* Bit  14   Adapter Interrupt   (active hi)
                                       /* Bit  13   Adapter Obeying P
                                       /* Bit  12   Adapter Obeying Q
                                       /* Bits 11-8 TBE

                                       /* Bits  7-4 Slot number
                                       /* Bits  3-0 TBD (subchannel??)

/* Additional P-bus address definitions:
/* ------------------------------------

equ  pbus,  00C00000x                  /* Base address of pio address space (4mb)

/* PIO SELECT; BYTE
equ  pio_select,      00BFA801x        /* ????
                                       /* Bits 7-4     Slot number
                                       /* Bits 3-0     TBD (subchannel ?)

/* Select Adapter for Command
equ  adap_cmd,        00BF9002x        /* Bits 15-8   Slot/Subchannel
                                       /* Bit  7 MUST BE 1
                                       /* Bits 6-0    Command number

/* Select Adapter for DMA READ;  Must be LONGWORD WRITE !!!
equ  dma_read,        00BF9004x        /* Bits 31-24  Slot/subchannel
                                       /* Bits 23-22  MUST BE 00 !!!
                                       /* Bits 21-16  Upper 6 adapter address bits
                                       /* Bits 15-00  Lower 16 adapter adapter bits

/* Select Adapter for DMA WRITE; Must be LONGWORD WRITE !!!
equ  dma_write,       00BF9008x        /* Bits 31-24  Slot/subchannel
                                       /* Bits 23-22  MUST BE 00 !!!
                                       /* Bits 21-16  Upper 6 adapter address bits
                                       /* Bits 15-00  Lower 16 adapter adapter bits

/* Select Adapter for DMA VERIFY; Must be LONGWORD WRITE !!!
equ  dma_verify,      00BF900Cx        /* Bits 31-24  Slot/subchannel
                                       /* Bits 23-22  MUST BE 00 !!!
                                       /* Bits 21-16  Upper 6 adapter address bits
                                       /* Bits 15-00  Lower 16 adapter adapter bits

/*   There are actually 16 adapter slots.  However only 14 of them are
/*   usable due to two slots being dedicated to the terminator cards.
equ  MIN_IOA_SLOT, 0
equ  MAX_IOA_SLOT, 13

equ  IOA_MBX_PTR, 0200404x     /* Pointer to the ioa mailbox pointer.
equ  IOA_ID_PTR,  0200400x     /* Pointer to board id info.


equ  MAGIC_LOC, 0000040Bx      /* Magic location that contains pointer to
                               /* iop_pm_info.

checksum_test:
/*   register usage:
/*   ---------------
/*   d0; d1; d2; d3; a0
/*
     push.l     d0:d1:d2:d3:a0
     /* Clear checksum logic and validate.
     move.b     =055x, vec_reg          /* Set to fail code.
     move.w     =CCLR_CHKSUM, brd_ctrl  /* Clear checksum register.
     move.w     checksum, d0
     btst.b     =bdcs_broken2, bdcs     /* Make sure both sides did the same.
     bne.w      $cant_clr_cksum         /* Board broke, spin on failure...
     cmpi.w     =0, d0                  /* If checksum did not clear
     bne.w      $cant_clr_cksum         /* then spin on trying to clear.
```

```
     /* Run patterns through both the upper and lower bytes in to insure data
     /* path integrity and cal byte select equations.  This should also assure
     /* that the adder is not adding any false data and that the upper byte
     /* counter is not incrementing accidently by a false overflow.
     /*
     push.l    =diag_checksum_wrt + 1    /* Test lower byte in.
     bsr.w     $patterns                 /* If test returns then it passed.
     addq.l    =4, a7                    /* Readjust stack.
     push.l    =diag_checksum_wrt        /* Test upper byte in.
     bsr.w     $patterns
     addq.l    =4, a7                    /* Readjust stack.

     bsr.w     $check_adder

     bsr.w     $checksum_block
     move.b    =0AAx, vec_reg            /* Test pass indicator.
     pop.l     d0:d1:d2:d3:a0
     rts       /* THE END...  RETURN TO CALLER

$cant_clr_cksum:
     move.w    =ZCLR_BROKEN2, brd_ctrl   /* Clear broken2
     move.w    =ZCLR_CHKSUM, brd_ctrl    /* Clear checksum register (when added)
     move.w    checksum, d0
     bra.w     $cant_clr_cksum

$check_adder:
     /* Checksum register should be cleared before this routine is called.
     /* This is implied by the ordering of the test calls.  The routine
     /* $patterns leaves the checksum register cleared.
     /*
     /* Check out adder functionality with simple load-check operation.  This
     /* should cause the checksum logic to count up to overflow by two.
     /* This checks out the ability of the adder to overflow into the upper
     /* byte adder/counter.
     moveq.l   =1, d1
     move.w    =7, d2
     move.b    d1, diag_checksum_wrt     /* Write initial value.
$sum_it1:
     move.w    d1, diag_checksum_wrt
     add.w     d1, d1
     move.w    checksum, d0
     btst.b    =bdcs_broken2, bdcs       /* Make sure both sides did the same.
     bne.w     $adder_failure            /* Board broke, spin on failure...
     cmp.w     d0, d1
     bne.w     $adder_failure
     dbra      d2, $sum_it1
     /* Now continue to add 80x to prove that the adder will overflow when
     /* it hits 65536.
     move.l    =80x, d3
     move.w    =509, d2
$sum_it2:
     move.w    d3, diag_checksum_wrt
     add.w     d3, d1
     move.w    checksum, d0
     btst.b    =bdcs_broken2, bdcs       /* Make sure both sides did the same.
     bne.w     $adder_failure            /* Board broke, spin on failure...
     cmp.w     d0, d1
     bne.w     $adder_failure
     dbra      d2, $sum_it2

     rts       /* RETURN:     if we return then we passed...

$adder_failure:
     move.w    =ZCLR_BROKEN2, brd_ctrl   /* Clear broken2
     move.w    =ZCLR_CHKSUM, brd_ctrl    /* Clear checksum register.
     moveq.l   =1, d1
     move.w    =7, d2
     move.b    d1, diag_checksum_wrt     /* Write initial value.
$sum_loop:
     move.w    d1, diag_checksum_wrt
     add.w     d1, d1
     move.w    checksum, d0              /* Value should = (d1 * 2)
     dbra      d2, $sum_loop
```

```
        move.l      =509, d2
$sum_loop1:
        move.w      d3, diag_checksum_wrt
        add.w       d3, d1
        move.w      checksum, d0            /* Value should = (d1 * 2)
        dbra        d2, $sum_loop1
        bra         $adder_failure

$checksum_block:
        /* Sum a 4k area of the eeprom and save.  Run the area through the
        /* checksum logic.  Check that the checksum output = calculated value.
        movea.l     =prom_hi + 100x, a0     /* Prom address.
        move.l      =4095, d0               /* Byte count.
        moveq.l     =0, d1
        moveq.l     =0, d2
        move.w      =ZCLR_CHKSUM, brd_ctrl  /* Clear checksum register.
$calculate_sum:
        move.b      (a0)+, d2
        add.w       d2, d1
        move.b      d2, diag_checksum_wrt
        dbra        d0, $calculate_sum

        /* Validate that generated checksum = calculated checksum.
        move.w      checksum, d2
        btst.b      =bdcs_broken2, bdcs     /* Make sure both sides did the same.
        bne.w       $block_fail             /* Board broke, spin on failure...
        cmp.w       d2, d1
        bne.w       $block_fail

        rts         /* RETURN;     if we return then we passed...

$block_fail:
        move.w      =ZCLR_BROKEN2, brd_ctrl /* Clear broken2
        push.w      d1                      /* Calculated checksum
        move.w      checksum, d2
        bra         $block_fail

$patterns:
        movea.l     4(a7), a0               /* Get address.
        move.w      =255, d1
$test_loop:
        move.b      d1, (a0)                /* write to checksum logic.
        move.w      checksum, d0            /* Read checksum register.
        btst.b      =bdcs_broken2, bdcs     /* Make sure both sides did the same.
        bne.w       $pattern_fail           /* Board broke, spin on failure...
        cmp.w       d1, d0                  /* if data read ^= data written
        bne.w       $pattern_fail           /* then spin failure.
        move.w      =ZCLR_CHKSUM, brd_ctrl  /* Clear checksum register.
        move.w      checksum, d0
        btst.b      =bdcs_broken2, bdcs     /* Make sure both sides did the same.
        bne.w       $pattern_fail           /* Board broke, spin on failure...
        cmpi.w      =0, d0                  /* If checksum logic did not clear
        bne.w       $pattern_fail           /* then loop on failure
        dbra        d1, $test_loop          /* else continue
        rts         /* RETURN;  If test returns then it passed.

$pattern_fail:
        move.w      =ZCLR_BROKEN2, brd_ctrl /* Clear broken2
        move.w      =ZCLR_CHKSUM, brd_ctrl  /* Clear checksum register.
$fail_loop:
        move.b      d1, (a0)
        move.w      checksum, d0
        move.w      =ZCLR_CHKSUM, brd_ctrl  /* Clear checksum register.
        move.w      checksum, d0
        move.w      =ZCLR_BROKEN2, brd_ctrl /* Clear broken2
        bra         $fail_loop

end

/*  ***begin copyright*** *******************************  */
/*                                                         */
/*   STRATUS CONFIDENTIAL INFORMATION: CLASS II            */
/*   COPYRIGHT (c) Stratus Computer, Inc. 1986             */
```

```
/*                                                          */
/*  This  program  contains  confidential and proprietary  */
/*  information  of  Stratus Computer,  Inc.,   and   any  */
/*  reproduction,  disclosure, or use in whole or in part  */
/*  is   expressly   prohibited,   except   as   may   be  */
/*  specifically authorized by prior written agreement or  */
/*  permission of Stratus.                                  */
/*                                                          */
/*  ***end copyright*** ******************************      */

/*                          IOP Comm Emulation.
                            -------------------
     This is the first pass at comm emulation code.  This pass will not
     use locking.  There could be a potential race condition without the
     use of locks.  This is the reason for the lock calls being put in
     place but commented out.  If locking is needed, then we will add
     in a set_mbx command so that the iop can get the pointer to the
     com mbx structure which contains various info such as the io_lock
     pointer.
*/

/* Beginning of modification history */
/* Modified 86-10-09 by Bill Snapper to recompile with new eeprom_ptrs to
                                   reflect new prom_hi address. (MAP PTRS)
*/
/* Modified 86-10-14 by Bill Snapper to add in code to handle system console
                                   initialization when necessary and to change
                                   the CALL_MASK to level7.
*/
/* Modified 86-10-14 by Bill Snapper to force reconfiguration due to handshake
                                   bug?
*/
/* Modified 86-10-15 by Bill Snapper to re-initialize the ioa_mbxp after
                                   configuration.
*/
/* Modified 86-11-03 by Bill Snapper to initialize the ioa_mbx.status to 0
                                   before sending a command. */
/* Modified 86-11-10 by Bill Snapper to add START_READ command. */

/* Modified 86-11-15 by Bill_Snapper to NOT force reconfiguration due to
     handshake worked out.
*/
/* Modified 86-11-20 by Bill Snapper to clear cmd pend after the list ptr
                              has been retrieved from the sbi. */
/* Modified 86-12-01 by Bill Snapper to use the iop prom page table structure
                              instead of hard constants. */
/* Modified 87-01-20 by Bill Snapper to get sbi slot number before clearing
                              command pending. */
/* Modified 87-03-16 by Bill Snapper to add polling of ioa if es is not running
                              for start_read command. */
/* Modified 87-03-25 by Bill Snapper to use o$send_diag_cmd and use real
     status */
/* Modified 87-04-27 by Bill Snapper to use include file iop_prom_ext_stat
     which declares all common iop external static variables. */
/* Modified 87-05-06 by Bill Snapper to put in entry points for ES so it can
     send syserr messages to console if extreme conditions. */
/* Modified 87-05-08 by Bill Snapper to insure that card is a console type
     card before trying to configure it. */
/* Modified 87-05-21 by Bill Snapper to change TIME_PER_CHAR from 2ms to 4ms */
/* End of modification history */

iop_comm_emulation: proc;

/* Constants */
%replace  BUFF_SIZE by 80;          /* Maximum size of data @ a time. */
%replace  CALL_MASK by 7;
%replace  FALSE     by '0'b;
%replace  TRUE      by '1'b;

%replace  STOP_READ        by 81;    /* TEMP until cmds change to real #s */

%replace  MSEC_IN_JIFFIES      by 66;

%replace  TIME_PER_CHAR        by 244;   /* Approximately 4ms; worst case */
```

```
%replace  NO_WAIT              by -1;    /* Don't have p$send_diag_cmd wait. */

/* Parameters;  These are for ES to use console io. */
dcl  a_io_blockp          ptr;
dcl  a_ina_slot           fixed bin(15);

/* Automatic */
dcl  a_lock_ptr           ptr;
dcl  a_data               fixed bin(31); /* Used for timer callback. */
dcl  a_id                 fixed bin(31); /* Returned from callback.  NA */
dcl  count                fixed bin(15);
dcl  data_in              char(BUFF_SIZE)var; /* Holds copy of data to write */
dcl  e_code               fixed bin(15);
dcl  f_char               fixed bin(15); /* First char in io block to copy */
dcl  flag                 bit(1);
dcl  i                    fixed bin(15);
dcl  locked               bit(1);
dcl  p                    ptr; /* Temp pointer */

/* Include */
/* %include  'adapter_test_equates' */;
/*  adapter_test_equates.incl.pl1 */

/* ********************************************************************** */
/*    Adapter Local Command Codes in no particular order

      This include file contains the known commands for all adapters
      currently supported as of 26-Feb-1987.  It is subject to change as
      demands require. */

/* ********************************************************************** */

/* NOTE: Command codes 0-255 (0x-0FFx) are reserved to general handler      */

%replace NULL_GIOC_COMMAND                 by    0;  /* This command            */
                                                     /*  MUST BE ZERO!!         */
%replace GENERIC_CMD__RE_INIT_BOARD        by    1;  /* Restart the prom        */
                                                     /*  like hard init         */
%replace GENERIC_CMD__RESET_BOARD          by    2;  /* Obsolete -- did hard    */
                                                     /*  68K reset              */
%replace GENERIC_CMD__EXECUTE_SINGLE_TEST by     3;  /* Execute one test        */
                                                     /*  with params            */
%replace GENERIC_CMD__STOP_PROCESSOR       by    4;  /* Execute a               */
                                                     /*  'stop processor'       */
%replace GENERIC_CMD__RETURN_STATUS        by    5;  /* Return status for       */
                                                     /*  current op             */
%replace GENERIC_CMD__RETURN_ERROR_INFO by       6;  /* Return extra            */
                                                     /*  error information      */
%replace GENERIC_CMD__CHECKSUM_WHOLE_ROM by      7;  /* Checksum the            */
                                                     /*  entire EEPROM          */
%replace GENERIC_CMD__CHECKSUM_ID_ROM      by    8;  /* Checksum the ID         */
                                                     /*  part of EEPROM         */
%replace GENERIC_CMD__START_PROG_IN_MEM by       9;  /* Xfer program control    */
                                                     /*  to an addr             */
%replace GENERIC_CMD__ALLOCATE_XFER_BUF  by     10;  /* Give a large buffer     */
                                                     /*  to GIOC                */
%replace GENERIC_CMD__MOVE_BUF_TO_LOMEM  by     11;  /* Move allocated buffer   */
                                                     /*  to lo mem              */
%replace GENERIC_CMD__MOVE_LOMEM_TO_BUF by      12;  /* Move lo mem to          */
                                                     /*  allocated buffer       */
%replace GENERIC_CMD__EXECUTE_ALL_TESTS by      13;  /* Execute all tests just  */
                                                     /*  like the Mfg version   */
                                                     /*  of prom does           */
%replace GENERIC_CMD__RETURN_CMD_LIST      by   14;  /* Return a list of adap   */
                                                     /*  exec cmds              */
%replace GENERIC_CMD__RETURN_COMMAND_INFO by    15;  /* Return info on          */
                                                     /*  specified cmd          */
%replace GENERIC_CMD__RETURN_TEST_INFO     by   16;  /* Return info on          */
                                                     /*  specified test         */
%replace GENERIC_CMD__BUFFER_READ_ACK      by   17;  /* ACK receipt of a dump   */
                                                     /*  buffer                 */
%replace GENERIC_CMD__INIT_MEMORY          by   18;  /* Clear parity errs from  */
                                                     /*  memories               */
```

```
%replace GENERIC_CMD__RUN_SHORT_TESTS   by   19;  /* Run the                       */
                                                  /*  short-test suite             */
%replace GENERIC_CMD__RETURN_REV_INFO   by   20;  /* Return the board sw rev       */
                                                  /*  and ID prom area             */
%replace GENERIC_CMD__DUMP_ALL_MEMORY   by   21;  /* Dump all adapter data         */
                                                  /*  memory and devices           */
%replace GENERIC_CMD__PANIC_DUMP_MEMORY by   22;  /* Dump critical pages for       */
                                                  /*  crash analysis               */
%replace GENERIC_CMD__DO_NEXT_DUMP_PAGE by   23;  /* Process the next dump         */
                                                  /*  page in sequence             */

/* Following is the last legal command in the generic sequence...                 */
%replace GENERIC_CMD__QUIESCE           by  255;  /* Stop running tests            */
                                                  /*  -- await cmd                 */

/* ---------------------------------------------------------------------------- */
/* TEMP HACK:  Several  commands  currently  used  by the Enet boards were
               reassigned by this file on 5-Nov.  They will temporarily be
               reinstated to their previous values, until all software can
               be changed simultaneously.  At this  time,  dual  mnemonics
               for  these operations will be supplied, with the old values
               being listed as OLD_xxx and the  new  values  assuming  the
               simple form of the name.  ALL NEW SOFTWARE MUST support the
               new  values  as well as the old, until release is obtained,
               but old software will be obsoleted when the old values  are
               dropped.  */
/* ---------------------------------------------------------------------------- */
/* **************************************************************************** */
/* Disable the following command at install time:
%replace GENERIC_CMD__QUIESCE            by   128; /* Shutdown current op          */
/* Disable the following command at install time:
%replace GENERIC_CMD__ALLOCATE_XFER_BUF  by   133; /* Give a large buffer          */
                                                   /*  to GIOC                     */
/* Disable the following command at install time:
%replace GENERIC_CMD__MOVE_BUF_TO_LOMEM  by   134; /* Move allocated buffer        */
                                                   /*  to low memory               */
/* Disable the following command at install time:
%replace GENERIC_CMD__START_PROG_IN_MEM  by   135; /* Xfer program control         */
                                                   /*  to an address               */
/* Disable the following command at install time:
%replace GENERIC_CMD__MOVE_LOMEM_TO_BUF  by   136; /* Move low memory to           */
                                                   /*  allocated buffer            */
/* **************************************************************************** */

/* NOTE: This section is a command registry! */

/* ACOMM/CCOMM BOOT COMMANDS */

%replace BOOT_CMD__CONFIGURE_CONSOLE     by   257; /* Configure console            */
%replace BOOT_CMD__GIOC_MSG_OUT          by   258; /* Output msg to console        */
%replace BOOT_CMD__GIOC_BYTE_IN          by   259; /* Check for character          */
                                                   /*  from console                */
%replace BOOT_CMD__GIOC_MSG_IN           by   260; /* Input msg from console       */

/* DISK TESTS -- Only debugging commands are catalogued at this time */
%replace SMAC_CMD__WRITE_BLINDLY         by   270; /* Write block to disk          */
%replace SMAC_CMD__READ_BLINDLY          by   271; /* Read block from disk         */
%replace SMAC_CMD__WRITE_MULTI           by   272; /* Perform multiple-block       */
                                                   /*  dbg xfer                    */
%replace SMAC_CMD__READ_MULTI            by   273; /* Perform multiple-block       */
                                                   /*  dbg xfer                    */
%replace SMAC_CMD__CONTINUE_MULTI        by   274;


/* ENET TESTS -- All Enet tests are also assigned command numbers... */
%replace ENET_CMD__CONTROL_REG_TEST_0    by   284; /* Test control register        */
                                                   /*  bits                        */
%replace ENET_CMD__STATUS_REG_TEST_0     by   285; /* Test status register         */
                                                   /*  bits                        */
%replace ENET_CMD__MEMORY_TEST_0         by   286; /* Test all 0's patt on         */
                                                   /*  main mem                    */
%replace ENET_CMD__MEMORY_TEST_1         by   287; /* Test all 1's patt on         */
                                                   /*  main mem                    */
```

```
%replace ENET_CMD__MEMORY_TEST_2          by   288; /* Rotating bit pat on       */
                                                    /*  main mem                 */
%replace ENET_CMD__MEMORY_TEST_3          by   289; /* Test main memory parity */
%replace ENET_CMD__MEMORY_TEST_4          by   290; /* Test main memory          */
                                                    /*  data=addrs               */
%replace ENET_CMD__MEMORY_TEST_5          by   291; /* Test fram parity          */
%replace ENET_CMD__MEMORY_TEST_6          by   292; /* Test fram                 */
%replace ENET_CMD__MEMORY_TEST_7          by   293; /* Test fram                 */
%replace ENET_CMD__RESTORE_ROM_VECTORS    by   294; /* Try to catch interrupts */
%replace ENET_CMD__TIMER_TEST_0           by   295; /* Test TIMER counter        */
%replace ENET_CMD__TIMER_TEST_1           by   296; /* Test TIMER interrupt      */
                                                    /*  logic                    */
%replace ENET_CMD__TIMER_TEST_2           by   297; /* Test TIMER interrupt      */
                                                    /*  mask logic               */
%replace ENET_CMD__TIMER_TEST_3           by   298; /* Test G_A TIMER            */
                                                    /* intervals                 */
%replace ENET_CMD__TIMER_TEST_4           by   299; /* Test TIMER interrupts     */
%replace ENET_CMD__TIMER_TEST_5           by   300; /* Test TIMER interrupt      */
                                                    /*  mask logic               */
%replace ENET_CMD__LANCE_SETUP            by   301; /* Setup LANCE for           */
                                                    /*  xmit/receive             */
%replace ENET_CMD__LANCE_TEST_0           by   302; /* Stop the LANCE            */
%replace ENET_CMD__LANCE_TEST_1           by   303; /* Init the LANCE            */
%replace ENET_CMD__LANCE_TEST_2           by   304; /* Start the LANCE           */
%replace ENET_CMD__LANCE_TEST_3           by   305; /* Xmit a packet and         */
                                                    /*  check flags              */
%replace ENET_CMD__LANCE_TEST_4           by   306; /* Rcv xmit'd packet &       */
                                                    /*  check flags              */
%replace ENET_CMD__LANCE_TEST_5           by   307; /* Test LANCE interrupt      */
                                                    /*  logic                    */
%replace ENET_CMD__LANCE_TEST_6           by   308; /* Test LANCE interrupt      */
                                                    /*  mask logic               */
%replace ENET_CMD__LANCE_TEST_7           by   309; /* Test LANCE external       */
                                                    /*  loopback                 */
%replace ENET_CMD__ALL_LANCE_TESTS        by   310; /* Stop the LANCE            */

/* ACOMM TESTS */
%replace ACOMM_CMD__MEMORY_TEST_0         by   323; /* Test with data = addrs    */
%replace ACOMM_CMD__MEMORY_TEST_1         by   324; /* Test with rotating        */
                                                    /*  pattern                  */
%replace ACOMM_CMD__MEMORY_TEST_3         by   325; /* Parity error test         */
%replace ACOMM_CMD__CONTROL_REG_TEST_0    by   326; /* Test control/status       */
                                                    /*  regs                     */
%replace ACOMM_CMD__TIMER_TEST_0          by   327; /* Test timer counters       */
%replace ACOMM_CMD__TIMER_TEST_1          by   328; /* Test timer interrupts     */
%replace ACOMM_CMD__TIMER_TEST_2          by   329; /* Test timer interrupt      */
                                                    /*  mask                     */
%replace ACOMM_CMD__SCC_TEST_0            by   330; /* Test read/write           */
                                                    /*  scc regs                 */
%replace ACOMM_CMD__SCC_TEST_1            by   331; /* Test scc                  */
                                                    /*  loopback,polling         */
%replace ACOMM_CMD__SCC_TEST_2            by   332; /* Test scc                  */
                                                    /*  loopback,interrupts      */
%replace ACOMM_CMD__SCC_TEST_3            by   333; /* Test scc sync loopback    */
%replace ACOMM_CMD__MEMORY_TEST_2         by   334; /* Execute scc_test_1        */
                                                    /*  in ram                   */
%replace ACOMM_CMD__SCC_EXT_LOOPBACK      by   335; /* Requires ext connectors */
%replace ACOMM_CMD__INIT_BOARD            by   336; /* Init ram, timers, scc's */

/* CCOMM TESTS */
%replace CCOMM_CMD__MEMORY_TEST_0         by   340; /* Test with data = addrs    */
%replace CCOMM_CMD__MEMORY_TEST_1         by   341; /* Test with rotating        */
                                                    /*  pattern                  */
%replace CCOMM_CMD__MEMORY_TEST_3         by   342; /* Parity error test         */
%replace CCOMM_CMD__CONTROL_REG_TEST_0    by   343; /* Test control/status       */
                                                    /*  regs                     */
%replace CCOMM_CMD__TIMER_TEST_0          by   344; /* Test timer counters       */
%replace CCOMM_CMD__TIMER_TEST_1          by   345; /* Test timer interrupts     */
%replace CCOMM_CMD__TIMER_TEST_2          by   346; /* Test timer interrupt      */
                                                    /*  mask                     */
%replace CCOMM_CMD__SCC_TEST_0            by   347; /* Test read/write           */
                                                    /*  scc regs                 */
```

```
%replace CCOMM_CMD__SCC_TEST_1          by    348; /* Test scc                 */
                                                   /*  loopback,polling        */
%replace CCOMM_CMD__SCC_TEST_2          by    349; /* Test scc                 */
                                                   /*  loopback,interrupts.    */
%replace CCOMM_CMD__SCC_TEST_3          by    350; /* Test scc sync loopback   */
%replace CCOMM_CMD__MEMORY_TEST_2       by    351; /* Execute scc_test_1       */
                                                   /*  in ram                  */
%replace CCOMM_CMD__SCC_EXT_LOOPBACK    by    352; /* Requires ext connectors  */
%replace CCOMM_CMD__INIT_BOARD          by    353; /* Init ram, timers, scc's  */

/* UCOMM TESTS -- All Ucomm tests are also assigned command numbers... */
%replace UCOMM_CMD__CONTROL_REG_TEST_0  by    360; /* Test control              */
                                                   /*  register bits           */
%replace UCOMM_CMD__STATUS_REG_TEST_0   by    361; /* Test status              */
                                                   /*  register bits           */
%replace UCOMM_CMD__MEMORY_TEST_0       by    362; /* Test all 0's pattern     */
                                                   /*  on main mem             */
%replace UCOMM_CMD__MEMORY_TEST_1       by    363; /* Test all 1's pattern     */
                                                   /*  on main mem             */
%replace UCOMM_CMD__MEMORY_TEST_2       by    364; /* Rotating bit pat on      */
                                                   /*  main mem                */
%replace UCOMM_CMD__MEMORY_TEST_3       by    365; /* Test main memory parity  */
%replace UCOMM_CMD__MEMORY_TEST_4       by    366; /* Test main memory         */
                                                   /*  data=addrs              */
%replace UCOMM_CMD__RESTORE_ROM_VECTORS by    367; /* Maint - Try to catch     */
                                                   /*  interrupts              */
%replace UCOMM_CMD__TIMER_TEST_0        by    368; /* Test TIMER cntrs and     */
                                                   /*  zero timer              */
%replace UCOMM_CMD__TIMER_TEST_1        by    369; /* Test TIMER interrupt     */
                                                   /*  logic                   */
%replace UCOMM_CMD__TIMER_TEST_2        by    370; /* Test TIMER interrupt     */
                                                   /*  mask logic              */
%replace UCOMM_CMD__SCC_TEST_0          by    371; /* Write/Read SCC           */
                                                   /*  registers               */
%replace UCOMM_CMD__SCC_TEST_1          by    372; /* SCC non-interrupt        */
                                                   /*  loopback test           */
%replace UCOMM_CMD__SCC_TEST_2          by    373; /* SCC interrupt and        */
                                                   /*  loopback test           */
%replace UCOMM_CMD__SCC_TEST_3          by    374; /*          * NULL *        */
%replace UCOMM_CMD__SCC_TEST_4          by    375; /*          * NULL *        */
%replace UCOMM_CMD__SCC_TEST_5          by    376; /*          * NULL *        */
%replace UCOMM_CMD__SCC_TEST_6          by    377; /*          * NULL *        */
%replace UCOMM_CMD__DMAC_TEST_0         by    378; /* Test DMA regs with       */
                                                   /*  reads only              */
%replace UCOMM_CMD__DMAC_TEST_1         by    379; /* Test DMA read/write      */
                                                   /*  registers               */
%replace UCOMM_CMD__DMAC_TEST_2         by    380; /* Test DMAC/SCC r/w        */
                                                   /*  operations              */
%replace UCOMM_CMD__DMAC_TEST_3         by    381; /* Test DMAC/SCC            */
                                                   /*  array operations        */
%replace UCOMM_CMD__DMAC_TEST_4         by    382; /* Test DMAC/SCC            */
                                                   /*  linked array ops        */
%replace UCOMM_CMD__DMAC_TEST_5         by    383; /* Test DMAC interrupts     */

/* CTAPE TESTS */

%replace CTAPE_CMD__GO_TO_APPL_CODE     by    400; /* Go to application code   */
%replace CTAPE_CMD__TEST_ALL            by    401; /* Run all tests            */
%replace CTAPE_CMD__MEMORY_TEST_0       by    402; /* Ram initialization       */
%replace CTAPE_CMD__MEMORY_TEST_1       by    403; /* Ram pattern test         */
%replace CTAPE_CMD__MEMORY_TEST_2       by    404; /* Ram address test         */
%replace CTAPE_CMD__MEMORY_TEST_3       by    405; /* Concurrent memory test   */
%replace CTAPE_CMD__SCSI_LOOPBACK       by    406; /* Scsi loopback test       */
%replace CTAPE_CMD__TIMER_TEST          by    407; /* G.A. Interval            */
                                                   /*  timer test              */
%replace CTAPE_CMD__INTERRUPT_TEST      by    408; /* Interrupt test           */
%replace CTAPE_CMD__COMPARATOR_TEST     by    409; /* Comparator test          */
/* Reserve the following for old software...
%replace CTAPE_CMD__DMA_TEST            by    410; /* Reserved for Bill        */
%replace CTAPE_BOOT                     by    410; /* Get tape fw magic ptrs   */
%replace CTAPE_CMD__DMA_TEST            by    411; /* DMA test                 */
%replace CTAPE_CMD__GATE_ARRAY_TEST     by    412; /* Set code, broken,        */
                                                   /*  red light tests         */
```

```
/* DISK COMMANDS */
%replace  DISK_CMD_BASE              by 500;

%replace  DISK_LIST_CMD_MIN          by 532;   /* VOS list command 32 */
%replace  DISK_LIST_CMD_MAX          by 635;   /* VOS list command 135 */


/* ACOMMP COMMANDS */
%replace  MIN_ACOMMP_CMD             by 700;
%replace  MAX_ACOMMP_CMD             by 800;

/* other equates */

%replace  IOA_START_ADDR             by   0;
%replace  IOA_DIAG_MBX_PTR_ADDR      by   2098180;
%replace  IOA_BOARD_ID_PTR_ADDR      by   2098176;
%replace  IOA_MBX_STATUS_SUCCESS     by   61440;
%replace  IOA_UNIVERSAL_ADDR         by   -1;


/* %include  'board_id_structure' */;
/*  ***begin copyright*** ******************************  */
/*                                                      */
/*  STRATUS CONFIDENTIAL INFORMATION: CLASS II          */
/*  COPYRIGHT (c) Stratus Computer, Inc. 1985           */
/*                                                      */
/*  This  program  contains  confidential and proprietary */
/*  information  of  Stratus Computer, Inc.,  and  any  */
/*  reproduction, disclosure, or use in whole or in part */
/*  is   expressly   prohibited,   except   as   may   be */
/*  specifically authorized by prior written agreement or */
/*  permission of Stratus.                              */
/*                                                      */
/*  ***end copyright*** ********************************  */
/*  Begin include file board_id_structure.incl.pl1      */

/*  Board Id pointer is in location 1024 of any adapter board
    and it points the board id structure in EEPROM.  Use utility
    function to get this pointer after selecting the adapter.

*/

%replace  MAX            by   5;          /*allow last five board services*/
%replace  ID_VERSION     by   2;          /* Version of the structure. */

dcl  board_id_ptr         ptr;

dcl  1 board_id           based (board_id_ptr),
       2 version          fixed bin (15),     /* Structure revision number */
       2 board_type       fixed bin (15),
       2 flags,
         3 bootable       bit (1),            /* adapter is bootable */
         3 self_test      bit (1),            /* adapter has self test */
         3 pad            bit (14),           /* unused */
       2 model            char (4),           /* alphanumeric model */
       2 serial_number    fixed bin (31),     /* board serial num */
       2 revision         fixed bin (15),     /* board revision level */
       2 art_work_rev     fixed bin (15),     /* board artwork level */
       2 min_gioc_rev     fixed bin (15),     /* gioc compatibility */
       2 num_serviced     fixed bin (15),     /* # of times serviced */
       2 history (MAX),                       /* board history */
         3 service_date   fixed bin (31),     /* repair info */
         3 service_code   fixed bin (15),
       2 code_checksum    fixed bin (15),     /* Calculated checksum. */
       2 checksum         fixed bin (15);     /* structure safety check */

/*  End include file board_id_structure.incl.pl1              */

/* %include  'com_mbx' */;
/* BEGIN INCLUDE FILE com_mbx.incl.pl1  84-03-23  CRC */

declare   com_mbxp             ptr;

declare 1 com_mbx              based (com_mbxp),
        2 mbx,
```

```
/* %include 'com_mbx_inner.incl.pl1'; */

        3 interrupts                bit (32) aligned,   /* Per-chnl IP bits */
        3 lock_address              bit (32) aligned,   /* I/O lock phys addr */
        3 global_status             bit (16) aligned,   /* Ctlr H/W status */
        3 vector_number             fixed binary (15),  /* Interrupt vector */
        3 clock                     character (6),      /* Calendar clock info
                                                           + more H/W status */

        3 channel_status (0:MAX_CHANNEL_NUMBER),        /* Per channel info */
/* %include 'channel_status_inner'; */

          4 flags,
            5 uart_status           bit (8),            /* Copy of UART byte */
            5 clearable_flags,
              6 unused              bit (2),
              6 auto_baud_interrupt bit (1),            /* Detected baud rate in
                                                           immediate_data */
              6 uart_error          bit (1),            /* UART error pending */
              6 error_interrupt     bit (1),            /* Error int pending */
              6 input_interrupt     bit (1),            /* Input int pending */
              6 output_interrupt    bit (1),            /* Output int pending */
              6 dsl_interrupt       bit (1),            /* Dataset change */

          4 immediate_data          bit (16) aligned,   /* HW type, etc. */
      2 dummy_to_end_dcl     bin;

/* END INCLUDE FILE com_mbx.incl.pl1 */
/* %include  'iop_prom_cfg' */;
/*        Initial boot configuration table.
          --------------------------------
     This structure will remain in the iop just above the iop's stack.
*/

/*   sys_conp = sys_conc$    */
dcl  sys_conp              ptr;

dcl  1 sys_con             based( sys_conp ),
       2 slot              fixed bin(15), /* IOA chassis slot */
       2 flags,
         3 mbz             bit(14),
         3 rd_in_prog      bit(1),        /* START_READ in progress */
         3 cfg             bit(1),        /* Console configured */
       2 com_mbxp          ptr,           /* Pointer to vos comm mailbox */
       2 ica_mbxp          ptr,           /* Pointer to ioa's mailbox */
       2 f_char            fixed bin(15), /* f_char in data; OLD:Channel state */
       2 count             fixed bin(15), /* number of characters being output */
       2 ucode_rev         fixed bin(15), /* Prom code revision level */
       2 model             char(4),       /* Board id. */
       2 io_lock           ptr,           /* Board interlock pointer. */
       2 io_blockp         ptr;           /* Pointer to vos-bound io_block */

/*   bdp = bdp$; */
/*   bdcbp = boot disk control block pointer    */
dcl  bdcbp                 ptr;
dcl  1 boot_disk           based( bdcbp ),
       2 slot              fixed bin(15),
       2 flags,
         3 mbz             bit(14),
         3 io_in_prog      bit(1),
         3 cfg             bit(1),
       2 disk_mbxp         ptr,
       2 virt_ptr          ptr,
       2 io_lock           fixed bin(31),
       2 state             fixed bin(15),
       2 ucode_rev         fixed bin(15),
       2 model             char(4);

/* IOP ES to PROM interface info. */
dcl  esip                  ptr;      /* Ptr to es interface structure. */

%replace  MIN_INT          by 1;
%replace  MAX_INT          by 16;
%replace  ES_VECX          by 16;
```

```
dcl  1 es                  based( esip ),
       2 running           bit(1) aligned,
       2 callback          entry( entry, fixed bin(31), fixed bin(31),
                                  fixed bin(15), fixed bin(31),
                                  fixed bin(15) ) variable,
       2 revoke_call       entry( fixed bin(31), fixed bin(15) ) variable,
       2 reset_list(0:15)       bit(1),
       2 vec(MAX_INT),
         3 number          fixed bin(15),
         3 pending         bit(1) aligned,
       2 next_vec          fixed bin(15),
       2 prom_mbxp         ptr,              /* Pointer to iop_prom_mbx */
       2 dump_listp        ptr,              /* Pointer to iop dump table */
       2 dump_list_ix      fixed bin(15), /* Next dump list entry index */
       2 dump_page_cnt     fixed bin(15), /* Index for multiple dump pages */
       2 last_used         fixed bin(15), /* Last dump list entry used. */
       2 dump_checksum     fixed bin(15), /* Dump list checksum. */
       2 syserr_wrt        entry( fixed bin(31) ),
       2 syserr_rd         entry( fixed bin(31) );
/* %include  'iop_eeprom_ptrs' */;
/* Begin PL/I eeprom pointer definitions. */

/* ioa addresses */
%replace  PBUS_BASE              by 12582912;   /* '00C00000'b4 */
%replace  BOARD_ID_PTR           by 14681088;   /* 00E00400x */
%replace  SECTOR_BUFFER_ADDR     by 1048576;    /* '00100000'b4; Disk ioa. */

/* End PL/I eeprom pointer definitions. */

/* %include  'iop_prom_ext_stat' */;
/* Begin iop_prom_ext_stat.incl.pl1 */
/*   These are the external static variables used in the iop prom code.
     They are initialized in the module init_iop_prom_data.pl1
*/
dcl  next_buffer_rdy      bit(32) aligned ext static;
dcl  next_buffer_rdy_bin  fixed bin(31) defined(next_buffer_rdy);
dcl  good_stat            bit(32) aligned ext static;
dcl  good_stat_bin        fixed bin(31) defined(good_stat);
dcl  op_in_prog           bit(32) aligned ext static;
dcl  op_in_prog_bin       fixed bin(31) defined(op_in_prog);
dcl  ioa_reset_otay_bits  bit(32) aligned ext static;
dcl  ioa_reset_otay$      fixed bin(31) defined(ioa_reset_otay_bits);
dcl  ioa_otay$            bit(1) aligned ext static;
/* End iop_prom_ext_stat.incl.pl1 */
/* %include  'iop_prom_pgtbl' */;
/* Begin iop_prom_pgtbl.incl.pl1 */
/* NEW:   IOP prom virtual page table */

dcl  pgtblp          ptr;

dcl  1 vpgs                based(pgtblp),
       2 disk(0:13),
         3 list_page       fixed bin(31),
         3 data_page       fixed bin(31),
       2 comm_io_blk_pg    fixed bin(31), /* Entry for system console io block */
       2 tape,
         3 list_page       fixed bin(31),
         3 data_page       fixed bin(31),
         3 mbx_page        fixed bin(31), /* VOS Tape mailbox. */
       2 prom_mbx          fixed bin(31),
       2 dump_page         fixed bin(31);

/* End iop_prom_pgtbl.incl.pl1 */
/* %include  'io_block' */;
/* Begin include file io_block.incl.pl1   80-11-03 */

/* This include file defines the structure of an I/O block as supported
   by the communications controller. */

declare   io_blockp           ptr;

declare 1 io_block            based (io_blockp),
/*
.ins lod>incl>io_block_inner.incl.pl1
*/
```

```
/* %include 'io_block_inner.incl.pl1'; */
        3 next_block          bit (32) aligned,/*% physical ptr to next block %*/
        3 control,
          4 dial_out          bit (1),         /*% this is a dial out request %*/
          4 interrupt_on_exit bit (1),         /*% interrupt when done with block %
          4 mbz1              bit (6),

        3 control_sync,
          4 ctl_message_out bit (1),           /*% output data is control message %
          4 end_of_frame_out bit (1),           /*% last block of output frame %*/
          4 mbz2              bit (6),

        3 status,
          4 ctl_message       bit (1),         /*% input data is control message %*/
          4 end_of_frame      bit (1),         /*% end of physical frame %*/
          4 end_of_msg        bit (1),         /*% end of logical message %*/
          4 adapter_status    bit (1),         /*% data is a line adapter message %
          4 mbz1              bit (2),
          4 async_xfer_err    bit (1),         /*% CRC or block check error %*/
          4 opened_io_block   bit (1),         /*% controller entered block %*/

        3 exit_status         char (1),        /*% reason for terminating the block

        3 count               fixed bin (15),
        3 tally               fixed bin (15),
      2 data                  char (4096);

/* %include 'io_block_exit_status.incl.pl1'; */
/* Begin include file io_block_exit_status.incl.pl1   81-09-01 */


/* possible values for io_block.exit_status */

%replace  BLOCK_NOT_EXITED     by    0;
%replace  NORMAL_EXIT          by    1;
%replace  STOPPED_BY_COMMAND   by    2;
%replace  IO_BLOCK_OVERRUN     by    3;
%replace  IO_BLOCK_ABORTED     by    4;
%replace  IO_BLOCK_CRC_ERR     by    5;
%replace  IO_BLOCK_XFER_ERR    by    6;
%replace  IO_BLOCK_DEVICE_ERR  by    7;
%replace  IO_BLOCK_MAX_STATUS  by    7;


/* End include file io_block.incl.pl1 */

/* End include file io_block.incl.pl1 */
/* %include  'ioa_commands' */;
/*  ***begin copyright*** *******************************  */
/*                                                          */
/*  STRATUS CONFIDENTIAL INFORMATION: CLASS II              */
/*  COPYRIGHT (c) Stratus Computer, Inc. 1986               */
/*                                                          */
/*  This program contains confidential and proprietary      */
/*  information of Stratus Computer, Inc., and any          */
/*  reproduction, disclosure, or use in whole or in part    */
/*  is expressly prohibited, except as may be               */
/*  specifically authorized by prior written agreement or   */
/*  permission of Stratus.                                  */
/*                                                          */
/*  ***end copyright*** *********************************  */
/*  Begin include file ioa_commands.incl.pl1  */

%replace  MIN_IOA_CMD_NO        by    0;

%replace  CMD_RESET             by    0;
%replace  CMD_CLEAR_INT         by    1;
%replace  CMD_TOGGLE_OBEY_P     by    2;
%replace  CMD_TOGGLE_OBEY_Q     by    3;
%replace  CMD_CLEAR_BROKEN      by    4;
%replace  CMD_SET_BROKEN        by    5;
%replace  CMD_INT_DEVICE        by    6;
%replace  CMD_CLEAR_CPU_RESET   by    7;
```

```
%replace  MAX_IOA_CMD_NO       by    7;

/*  End include file ioa_commands.incl.pl1   */
/* %include  'ioa_mailbox' */;
/*                          ioa_mailbox.incl.pl1
                            --------------------

     This  include file contains the mailbox used to communicate
     between an IOA and the IOP.  Several  overlaid  definitions
     exist,  which  are used under different circumstances, such
     as dumping or IOA program debugging.

*/

/* Define typical IOA mailbox pointer.                                   */
dcl  ioa_mbxp              ptr; /* ioa_mbxp = contents of 200404x in ioa */

/* Original mbx template */
dcl  1 ioa_mbx    like ioa_mbx_template  based( ioa_mbxp );

dcl  1 ioa_mbx_template  based,
       2 command          fixed bin(15),
       2 buffer_addr      fixed bin(31),
       2 status           bit(32) aligned,
       2 f,
         3 ownership      bit(1),    /* = '0' = iop;  = '1' = ioa */
         3 mbz            bit(7),
         3 id_tag         char(1),
       2 msg_in           char(80) var,
       2 msg_out          char(80) var,
       2 more_info        bit(1) aligned,
       2 xtra_ptr         fixed bin(31);

/* Dump mailbox template */
dcl  1 ioa_mbx_dump   like ioa_mbx_dump_tpl based( ioa_mbxp );

dcl  1 ioa_mbx_dump_tpl  based,
       2 outbox_offset    char(92) var,       /* Not used for dumping          */
       2 mbz              fixed bin(15),      /* Must be zero for dump         */
       2 page_num         fixed bin(15),      /* Current adapter dump page     */
       2 data_type        fixed bin(15),      /* Dump data type                */
       2 absolute_addr    fixed bin(31),      /* Real IOA addr of dump data    */
       2 buf_byte_cnt     fixed bin(15),      /* Num bytes xfer'd this time    */
       2 page_seq_num     fixed bin(15),      /* Adapter's seq # for page      */
       2 remaining_cnt    fixed bin(15);      /* Num bytes still to be xfer'd  */
/*     2 unused_str_o     char(70) var;       /* Not used for dumping          */

/* Command info mailbox template */
dcl  1 ioa_mbx_cmdinfo   like ioa_mbx_c_i_tpl based( ioa_mbxp );

dcl  1 ioa_mbx_c_i_tpl   based,
       2 outbox_offset    char(92) var,       /* Not used for command info     */
       2 sw_rev           fixed bin(15);      /* Board's software revision     */
/*     2 unused_str_o     char(84) var;       /* Not used for dumping          */

%replace IOA_MAILBOX_PTR_ADDR by   2098180;
%replace IOP_OWNER by '0'b;
%replace IOA_OWNER by '1'b;

/*   Brief description of protocol for diagnostic usage.
     ---------------------------------------------------

     The  mailbox begins life with the IOP having ownership ( ownership =
     '0' ) and when the IOP has placed all the pertinent  information  in
     the box it will change ownership over to the IOA.  The IOP will then
     set the int_to_device bit in the IOA's Gate Array, which the adapter
     should  be  polling in order to know when a command has arrived.  It
     is not advised for the adapters to have their interrupts enabled  at
     this  point  in  time,  and  this  is  the  reason  for  polling the
     int_to_device bit.

     The  ownership  bit works in conjunction with the int_to_device bit.
     This should cover  the  case  where  an  adapter  detects  a  faulty
     int_to_device  bit.  Therefore  the  adapter  should  only process a
     command if the int_to_device bit and the ownership bit are both set.
```

```
Structure definitions.
----------------------
ioa_mbx.command ( input/output )
     - This is the command for the IOA to execute. On output it
       indicates the command executed by the IOA.

ioa_mbx.buffer_addr ( input/output )
     - Universal buffer longword address. The address of the
       primary buffer for an operation is placed here.

ioa_mbx.status ( output )
     - This will be filled in by the adapter indicating the
       status of the board, commands, etc...

ioa_mbx.ownership ( input/output )
     - This bit defines who the current owner of the mailbox is.  If
       this bit = '0'b then the IOP currently owns the mailbox, otherwise
       the adapter has ownership.

ioa_mbx.f.id_tag ( mailbox owner )
     - Id tag used by IOP-side processes only (not used by IOA)
       to encode owner of current mailbox op in order to prevent
       one IOP process from using another process's returned mbx.

ioa_mbx.msg_in ( input )
     - This is defined as a char(80) varying buffer.  It will be command
       dependent and can therefore have different meanings with overlays
       describing it.  However, the first two bytes will always specify
       the number of bytes in the buffer.  Whether the commands choose to
       use them is up to the individual command.

ioa_mbx.msg_out ( output )
     - This buffer is for the ioa to send data to the iop.  Again, the
       same applies to this buffer as to the .msg_in described above.

ioa_mbx.more_info ( input/output )
     - On output this signifies that there is more information than
       will fit into the msg_out buffer. Input meaning is command
       dependent.

ioa_mbx.xtra_ptr ( input/output )
     - The meaning of this pointer is command dependent, though
       generally it is used as a pointer to extra data that would
       not fit in the primary buffer, or as the secondary pointer
       for a command.

*/
/* %include 'product_names' */;
/* Begin include file product_names.incl.pl1 */

/* Note:  To add a product name and index, certain rules should be     */
/*        observed.                                                    */
/*                                                                     */
/*   1) The disks are first, and should be left somewhat open-ended    */
/*      to grow, perhaps up to 64.  This is not a firm rule.           */
/*                                                                     */
/*   2) Comm has reserved several ranges of numbers based on a         */
/*      certain hex value as a base.  These are 60-6F (96-111)         */
/*      and A0-AF (160-175).  This rule was broken during the          */
/*      assignment of tape drive values.                               */
/*                                                                     */
/*   3) A range of numbers for IOP adapters has also been reserved.    */
/*      *These may not match the hardware types presented by the cards. */
/*      This range starts at 64 (40x).                                 */
/*                                                                     */
/*   4) Main boards (CPUs, MEMs, etc) are currently in the range       */
/*      240 (E0x) to 254 (FEx), and 192 (C0x) to 222 (DEx).            */
/*                                                                     */

%replace  D102_MODELX      by    1;  /* 60MB Disk Drive */
%replace  D101_MODELX      by    2;  /* 30MB Disk Drive */
%replace  D103_MODELX      by    3;  /* 143MB Disk Drive */
%replace  D105_MODELX      by    4;  /* 287 MB Disk Drive */
%replace  UNKN_MODELX      by    5;  /* Unknown Disk Model */
```

```
%replace  D900_MODELX      by   6;  /* 85MB Disk Drive */
%replace  D901_MODELX      by   7;  /* 165MB Disk Drive */
%replace  D902_MODELX      by   8;  /* 203MB Disk Drive */
%replace  D108_MODELX      by   9;  /* 448MB Disk Drive */
%replace  D202_MODELX      by  10;  /* 320MB IOP Disk Drive */
%replace  D118_MODELX      by  11;  /* 448MB Disk Drive - TUV */
%replace  D201_MODELX      by  12;  /* 151MB Disk Drive */
%replace  D203_MODELX      by  13;  /* 654MB IOP Disk Drive */
%replace  D205_MODELX      by  14;  /* 151MB IOP Disk Drive */
%replace  K101_MODELX      by  64;  /* ACOMM Async full modem Card */
%replace  K102_MODELX      by  65;  /* UCOMM Async/Sync Card */
%replace  K103_MODELX      by  66;  /* CCOMM Async/Clock Card */
%replace  K104_MODELX      by  67;  /* ENET LAN Card */
%replace  K105_MODELX      by  68;  /* IOP Disk Adapter */
%replace  K106_MODELX      by  69;  /* IOP SCSI Tape Adapter */
%replace  K107_MODELX      by  70;  /* IOP Pertec Tape Adapter */
%replace  K108_MODELX      by  71;  /* PK Terminator */
%replace  K109_MODELX      by  72;  /* UCOMM 423 Async/Sync Card */
%replace  K110_MODELX      by  73;  /* ACOMMP IBM printer card */
%replace  K111_MODELX      by  74;  /* ACOMM async/sync null modem Card */
%replace  C110N_MODELX     by  96;  /* HS Async Null Modem */
%replace  C110F_MODELX     by  97;  /* HS Async Full Modem */
%replace  IBM_1203_MODELX  by  98;  /* IBM Printer Interface */
%replace  T103_OBS_MODELX  by 100;  /* Tape Drive 1600 bpi */
%replace  T103_MODELX      by 101;  /* Tape Drive 1600/3200 */
%replace  T201_MODELX      by 102;  /* Tape Drive 1600/6250 */
%replace  T251_MODELX      by 103;  /* Tape Drive 1600/3200/6250 */
%replace  C103_MODELX      by 126;  /* Null Modem Channel */
%replace  C102_MODELX      by 127;  /* Full Modem Channel */
%replace  C101_MODELX      by 128;  /* Comm Controller */
%replace  C106_MODELX      by 129;  /* Modem Non Dial-Up */
%replace  C108_MODELX      by 130;  /* Modem Dial-Up */
%replace  C111_MODELX      by 131;  /* Remote Support Modem */
%replace  C107_MODELX      by 160;  /* HS Sync I */
%replace  C109_MODELX      by 161;  /* HS Sync II */
%replace  C104_MODELX      by 190;  /* Sync Line Adapter */
%replace  C104A_MODELX     by 191;  /* Alt Sync Line Adapter */
%replace  G200_MODELX      by 192;  /* Fresco CPU */
%replace  K100_MODELX      by 193;  /* IOP */
%replace  G424_MODELX      by 194;  /* Spitfire CPU */
%replace  M408_MODELX      by 195;  /* Wallaby/8mb Memory Ctrlr/array Board */
%replace  M432_MODELX      by 196;  /* Wallaby/32mb Memory Ctrlr/array Board */
%replace  D214_MODELX      by 221;  /* Removable Disk Adapter */
%replace  D116_MODELX      by 222;  /* 448MB Disk Director (TUV) */
%replace  C105_MODELX      by 223;  /* Calendar Clock */
%replace  P106_MODELX      by 224;  /* CPU Board */
%replace  M100_MODELX      by 225;  /* Memory Controller Board */
%replace  M102_MODELX      by 226;  /* 2MB Memory Array Board */
%replace  C100_MODELX      by 227;  /* Comm Controller */
%replace  D100_MODELX      by 228;  /* Disk Controller */
%replace  T100_MODELX      by 229;  /* Tape Controller */
%replace  I100_MODELX      by 230;  /* Link Controller */
%replace  U100_MODELX      by 231;  /* PSI Board */
%replace  D104_MODELX      by 232;  /* Disk Controller */
%replace  D004_MODELX      by 233;  /* Disk SMD Adapter */
%replace  G601_MODELX      by 234;  /* Processor Controller */
%replace  G602_MODELX      by 235;  /* CPU/SAP Board */
%replace  G400_MODELX      by 236;  /* Zink Central Processor */
%replace  T102_MODELX      by 237;  /* 1600/3200 Tape Controller */
%replace  D107_MODELX      by 238;  /* 448MB Disk Controller */
%replace  D106_MODELX      by 239;  /* 448MB Disk Director */
%replace  C200_MODELX      by 240;  /* Comm Controller */
%replace  T200_MODELX      by 241;  /* 6250 Tape Controller */
%replace  M200_MODELX      by 242;  /* Bandit 16-bit Controller */
%replace  M210_MODELX      by 243;  /* Bandit 8MB Memory Array Board */
%replace  M300_MODELX      by 244;  /* Dinkum 64-bit Controller */
%replace  T301_MODELX      by 245;  /* Quarter inch SCSI  tape drive */
%replace  M316_MODELX      by 246;  /* 16MB Memory Array Board */
%replace  M320_MODELX      by 247;  /* 32MB Memory Array Board */
%replace  M318_MODELX      by 248;  /* 8MB Memory Array Board */
%replace  D110_MODELX      by 249;  /* Disk Controller */
%replace  D114_MODELX      by 250;  /* Disk Controller */
%replace  D117_MODELX      by 251;  /* Disk Controller */
%replace  M214_MODELX      by 252;  /* Bandit 4MB Memory Array Board */
%replace  G610_MODELX      by 253;  /* Hydra Controller/CPU/SAP Board */
```

```
%replace  T250_MODELX      by 254;  /* 1600/3200/6250 Tape Controller */
%replace  NONE_MODELX      by 255;  /* No Configured Channel */

%replace  MAX_DEV          by 255;

%replace  MIN_IOA_MODELX   by  64;
%replace  MAX_IOA_MODELX   by  74;

declare   s$hardware_names (0:255) char (6) var ext static;
declare   s$product_models (0:255) char (6) var ext static;
declare   s$product_names (0:255) char (32) var ext static;

/* End include file products_names.incl.pl1 */

/* Based */
dcl  stat_ovly              fixed bin(31) defined (ioa_mbx.status);

dcl  based_bit_16           bit(16) aligned based;

dcl  1 msg                  based,
       2 len                fixed bin(15),
       2 buff               char(80);
/* Entries */
dcl  configure_console          entry( fixed bin(15) );

dcl  p$clear_command_pending    entry;

dcl  p$command_pending          entry returns( bit(1) aligned );

dcl  p$do_sbi_command           entry;

dcl  p$get_sbi_command          entry() returns(fixed bin(15));

dcl  p$get_esi_ptr              entry() returns( ptr );

dcl  p$get_sys_cond             entry() returns( ptr );

dcl  p$get_ioa_slot             entry() returns( fixed bin(15) );

dcl  p$get_pgtbl_ptr            entry() returns( ptr );

dcl  p$pio_adapt_select         entry (fixed bin);

dcl  p$send_diag_cmd            entry( fixed bin(15), fixed bin(15),
                                       fixed bin(31), fixed bin(15) );

dcl  p$send_ioa_cmd         entry( fixed bin(15), fixed bin(15) );

dcl  p$get_brd_id_ptr           entry() returns( ptr );

dcl  p$get_sbi_addr             entry() returns( fixed bin(31) );
                                                /* get ptr from sbi */

dcl  p$map_vos_addr             entry( fixed bin(31), fixed bin(31) )
                                returns( ptr );

dcl  p$ioa_success              entry( ptr ) returns( bit(1) aligned );


start_controller: entry;
      return;

 reset_channel: entry;
      return;

 configure_channel: entry;
      return;

 es_block_io_init: entry;
      call init;
      es.syserr_wrt = start_write_ES;
      es.syserr_rd  = start_read_ES;
      return;
```

```
start_read_ES: entry( a_io_blockp );
/* The sys_mon.slot field is not touched here since it is assumed that it has
   been setup earlier since ES has to check the sys_mon.cfg bit before calling
   into here.  */
      call init;
      sys_mon.io_blockp = a_io_blockp;
      goto start_read_join;

start_read: entry;
      call init;
      sys_mon.io_blockp = get_io_blockp();
      sys_mon.slot = p$get_ioa_slot();
start_read_join:
      call p$clear_command_pending();
      io_blockp = sys_mon.io_blockp;
      a_data = binary( sys_mon.slot, 31 );
      call p$pio_adapt_select( sys_mon.slot );

      if ^sys_mon.flags.cfg    /* System console not configured. */
      then do;
            board_id_ptr = p$get_brd_id_ptr();
            if board_id.board_type = K111_MODELX
             | board_id.board_type = K103_MODELX
            then do;
                  call configure_console( e_code );
                  if e_code ^= 0
                  then do;
                        io_block.exit_status = byte( IO_BLOCK_DEVICE_ERR );
                        return;
                        end;
                  end;
            else do;
                  io_block.exit_status = byte( IO_BLOCK_DEVICE_ERR );
                  return;
                  end;
            end;

      ioa_mbxp = sys_mon.ioa_mbxp;
      sys_mon.flags.rd_in_proc = TRUE;

      if ioa_mbx.ownership = IOP_OWNER & ioa_mbx.command = 0
      then do;
            if io_block.tally > BUFF_SIZE
            then
               addr(ioa_mbx.msg_out)->msg.len = BUFF_SIZE; /* #chars we want */
            else
               addr(ioa_mbx.msg_out)->msg.len = io_block.tally;
            call p$send_diag_cmd(sys_mon.slot, BOOT_CMD__GIOC_MSG_IN, NO_WAIT,
                                  e_code);
            if e_code ^= 0
            then do;
                  io_block.exit_status = byte( IO_BLOCK_XFER_ERR );
                  return;
                  end;
            if es.running
            then do;
                  call es.callback( start_read_callback, a_data,
                                    ( 10 * MSEC_IN_JIFFIES ),
                                    (CALL_MASK), a_id, e_code );
                  return;
                  end;
            else do;  /* es not running; poll ioa and also process sbi cmds */
                  do while(ioa_mbx.ownership = IOA_OWNER);
                     if p$command_pending()
                     then do;
                           i = p$get_sbi_command(); /* Save command. */
                           call p$do_sbi_command;
                           if i = STOP_READ
                           then return;
                           else call p$pio_adapt_select( sys_mon.slot );
                           end;
                  end;
                  if stat_ovly = good_stat_bin
                  then do;
```

```
                    substr(io_block.data, 1, length(ioa_mbx.msg_out))
                       = substr(ioa_mbx.msg_out, 1, length(ioa_mbx.msg_out));
                    io_block.tally =
                                  io_block.tally - length(ioa_mbx.msg_out);
                    io_block.exit_status = byte( NORMAL_EXIT );
                    ioa_mbx.command = 0;
                    end;
               else do;
                    io_block.exit_status = byte( IO_BLOCK_DEVICE_ERR );
                    end;
               sys_mon.flags.rd_in_prog = FALSE;  /* TERMINATE read. */
             end;
        end;
     return;

start_read_callback: entry( p_data );
     a_data = p_data;
     call init();
     io_blockp = sys_mon.io_blockp;
     call p$pio_adapt_select( sys_mon.slot );

     if ( ioa_mbx.ownership ^= IOP_OWNER )
     then do;
          call es.callback( start_read_callback, a_data,
                          (10 * MSEC_IN_JIFFIES ), (CALL_MASK), a_id,
                          e_code );
          return;
          end;
     else do;
          if stat_ovly = good_stat_bin
          then do;
               substr( io_block.data, 1, length(ioa_mbx.msg_out) )
                     = substr( ioa_mbx.msg_out, 1, length( ioa_mbx.msg_out ) );
               io_block.tally = io_block.tally - length( ioa_mbx.msg_out );
               io_block.exit_status = byte( NORMAL_EXIT );
               ioa_mbx.command = 0;
               end;
          else do;
               io_block.exit_status = byte( IO_BLOCK_DEVICE_ERR );
               end;
          sys_mon.flags.rd_in_prog = FALSE;
          return;
          end;


stop_read: entry;
     sys_comp =  p$get_sys_comp();
     esic = p$get_esi_ptr();
     ioa_mbxp = sys_mon.ioa_mbxp;
     io_blockp = sys_mon.io_blockp;
/*     call lock( sys_mon.io_lock );    */
     if io_blockp ^= null()
     then io_block.exit_status = byte( STOPPED_BY_COMMAND );

     sys_mon.flags.rd_in_prog = FALSE;
     sys_mon.io_blockp = null();
/*     call unlock( sys_mon.io_lock );  */

     /* ???   Do we have to tell the acomm  ???
     */
     return;

start_write_ES: entry( a_io_blockp );
/* The sys_mon.slot field is not touched here since it is assumed that it has
   been setup earlier since ES has to check the sys_mon.cfg bit before calling
   into here.  */
     call init;
     sys_mon.io_blockp = a_io_blockp;
     goto start_write_join;

start_write: entry;
     call init();
     sys_mon.io_blockp = get_io_blockp();
     sys_mon.slot = p$get_ioa_slot();
```

```
start_write_join:
     call p$clear_command_pending();
     io_blockp = sys_mon.io_blockp;
     a_data = binary( sys_mon.slot, 31 );
     call p$pio_adapt_select( sys_mon.slot );

     if ^sys_mon.flags.cfg     /* System console not configured. */
     then do;
          board_id_ptr = p$get_brd_id_ptr();
          if board_id.board_type = K111_MODELX
           | board_id.board_type = K103_MODELX
          then do;
               call configure_console( e_code );
               if e_code ^= 0
               then do;
                    io_block.exit_status = byte( IO_BLOCK_DEVICE_ERR );
                    return;
                    end;
               else do;
                    ioa_mbxp = sys_mon.ioa_mbxp;
                    end;
               end;
          else do;
               io_block.exit_status = byte( IO_BLOCK_DEVICE_ERR );
               return;
               end;
          end;

/*    call lock( sys_mon.io_lock );   */
     f_char = 1;
     data_in = '';
     do while( flag );
       if io_block.tally > BUFF_SIZE
       then
          count = BUFF_SIZE;
       else
          count = io_block.tally;
       sys_mon.count = count;
       sys_mon.f_char = f_char + sys_mon.count;
       data_in = substr( io_block.data, f_char, count );
       /* call unlock( sys_mon.io_lock );   */

       if ioa_mbx.ownership = IOP_OWNER & ioa_mbx.command = 0
       then do;
            ioa_mbx.msg_in = substr( data_in, 1, length(data_in) );
            call p$send_diag_cmd(sys_mon.slot, BOOT_CMD__GIOC_MSG_OUT, NO_WAIT,
                                 e_code);
            if e_code ^= 0
            then do;
                 io_block.exit_status = byte( IO_BLOCK_XFER_ERR );
                 return;
                 end;

            if es.running
            then do;
                 call es.callback( sys_mon_entry, a_data,
                                   ( TIME_PER_CHAR * count ),
                                   (CALL_MASK), a_id, e_code );
                 return;

     /* Callback reentry point. */
sys_mon_entry: entry( p_data );
dcl  p_data     fixed bin(31);
                 a_data = p_data;
                 call init();
                 io_blockp = sys_mon.io_blockp;
                 call p$pio_adapt_select( sys_mon.slot );
                 end;
            else do;
                 call wait_for_cmd( ioa_mbxp, (TIME_PER_CHAR * count) );
                 end;

            /* if ( ioa_mbx.status ^= 'FF000001'b4 ) */
            if ioa_mbx.ownership ^= IOP_OWNER | stat_ovly ^= good_stat_bin
            then do;
```

```
                /* call lock( sys_mon.io_lock );  */
                io_block.exit_status = byte( IO_BLOCK_DEVICE_ERR );
                /* call unlock( sys_mon.io_lock ); */
                return;
                end;
           else do;
                ioa_mbx.command = 0;
                end;
           end;
      else do;
           /* call lock( sys_mon.io_lock );  */
           io_block.exit_status = byte( IO_BLOCK_ABORTED );
           /* call unlock( sys_mon.io_lock ); */
           return;
           end;

      /* call lock( sys_mon.io_lock );  */
      f_char = sys_mon.f_char;
      count = sys_mon.count;
      io_block.tally = io_block.tally - count;
      if io_block.tally = 0
      then do;
           flag = FALSE;
           io_block.exit_status = byte( NORMAL_EXIT );
           /* call unlock( sys_mon.io_lock );  */
           end;
     end;

     return;

lock: entry( a_lock_ptr );
     locked = TRUE;
     do while( locked );
       if substr( a_lock_ptr -> based_bit_16, 1, 1 ) = TRUE
       then locked = FALSE;
     end;
     return;

unlock: entry( a_lock_ptr );
     a_lock_ptr -> based_bit_16 = a_lock_ptr -> based_bit_16 | '8000'b4;

     return;

/* ====================================================================== */
init: proc;

     flag = TRUE;
     pgtblp = p$get_pgtbl_ptr();
     sys_conp = p$get_sys_conp();
     esip = p$get_esi_ptr();
     ioa_mbxp = sys_mon.ioa_mbxp;

end init;
/* ====================================================================== */
wait_for_cmd: proc( a_ioa_mbxp, a_time );
dcl  a_ioa_mbxp      ptr;
dcl  a_time          fixed bin(31);
dcl  s_time          fixed bin(31);

/* Entries */
dcl  delta_time                entry( fixed bin(31) ) returns( fixed bin(31) );
dcl  start_time                entry() returns( fixed bin(31) );
/* Execution */
     s_time = start_time();
     do while( ( delta_time( s_time ) < a_time )
             & ( a_ioa_mbxp->ioa_mbx.ownership = IOA_OWNER ) );
     end;
     return;
end wait_for_cmd;

/* ====================================================================== */
get_io_blockp: proc returns( ptr );
```

```
dcl  a_abs_ptr              fixed bin(31);
dcl  1 p_address_ovly       defined( a_abs_ptr ),
       2  filler            char(1),
       2  addr_hi           char(1),
       2  addr_mid          char(1),
       2  addr_lo           char(1);

dcl  virt_ptr               ptr;

/* Execution */

     /* Map the second page of the io block first.  Virt_ptr is temp. */
     a_abs_ptr = p$get_sbi_addr();
     return( p$map_vos_addr( a_abs_ptr, vpgs.comm_io_blk_pg ) );

end get_io_blockp;
/* ================================================================== */

end iop_comm_emulation;
/*   ***begin copyright*** ******************************   */
/*                                                          */
/*   STRATUS CONFIDENTIAL INFORMATION: CLASS II             */
/*   COPYRIGHT (c) Stratus Computer, Inc. 1986              */
/*                                                          */
/*   This  program  contains  confidential and proprietary  */
/*   information  of  Stratus Computer,  Inc.,  and   any   */
/*   reproduction,  disclosure, or use in whole or in part  */
/*   is   expressly   prohibited,   except   as   may   be  */
/*   specifically authorized by prior written agreement or  */
/*   permission of Stratus.                                 */
/*                                                          */
/*   ***end copyright*** ********************************   */

/* Beginning of modification history */
/* Written January 1986 by Tom Moser */
/* Modified 86-01-20 by Tom Moser to add code which empties vos command ring
     after a ring full situation */
/* Modified 86-01-24 by Tom Moser to use correct format for iop$get_level */
/* Modified 86-01-27 by Tom Moser to use iop_utility_calls */
/* Modified 86-02-14 by Tom Moser to make command delivery consistent */
/* Modified 86-03-11 by Tom Moser to make various changes */
/* Modified 86-03-20 by Tom Moser to check better */
/* Modified 86-03-24 by Tom_Moser to call interrupt_os */
/* Modified 86-03-25 by Tom Moser to just interrupt os on syserr delivery
     and not use cmd ring */
/* Modified 86-03-28 by Tom Moser to make iop$new_command be called on
     command pending interrupt */
/* Modified 86-04-02 by Tom_Moser to expect NOP commands and ignore them */
/* Modified 86-04-10 by Tom Moser to correctly meter ES_CHANNEL commands */
/* Modified 86-04-18 by Tom Moser to implement new command scheme */
/* Modified 86-05-02 by Tom Moser to flag ring_syserr and change tail pointer
     to conform with new vos scheme */
/* Modified 86-05-06 by Tom Moser to give better syserrs on failure */
/* Modified 86-05-19 by Tom Moser to support sync */
/* Modified 86-06-02 by Tom Moser to more sync stuff support RUN_ALONE */
/* Modified 86-06-12 by Martin Stokoe to use new error codes */
/* Modified 86-08-07 by Tom Moser to meter but don't syserr when ring empty
     (harmless race) - interrupt host on syserr even if we can't deliver it */
/* Modified 86-08-25 by Martin Stokoe to clear command pending early
     when processing ring commands */
/* Modified 86-10-03 by Tom Moser to meter but don't syserr when ring empty
     (harmless race) - interrupt host on syserr even if we can't deliver it */
/* Modified 86-10-03 by Tom Moser to expect disk list commands */
/* Modified 86-10-08 by Martin Stokoe to modify head/tail seq sending to VOS */
/* Modified 86-10-15 by Martin Stokoe to allow a wider range of commands
     to be passed onto the PROM code. This is for boot support. */
/* Modified 86-10-15 by Martin Stokoe to invoke watchdog timer */
/* Modified 86-10-16 by Tom Moser to allow inter-entity commands */
/* Modified 86-11-20 by Tom Moser to really make inter_entity commands work,
     poll command ring, fix obscure ring sequence error bug */
/* Modified 86-12-16 by Bill Snapper to use the call iop$send_os_interrupt
     instead of iop$interrupt_os. */
/* Modified 86-12-23 by Tom Moser to enhance syserr  */
/* Modified 87-02-02 by Tom Moser to fix idle_iop, rewrite panic_syserr */
```

```
/* Modified 87-03-02 by Tom Moser to improve panic syserr */
/* Modified 87-03-30 by Tom Moser to save last stack ptr */
/* Modified 87-04-16 by Tom Moser to redo panic syserr to not be panic
     unless  needed */
/* End of modification history */

iop_command: procedure recursive;

/* external */

dcl  1 cmdq           external static,
      2 head          ptr init (null()),
      2 tail          ptr init (null()),
      2 count         fixed bin (15) init (0);

dcl  iop$current_entity        fixed bin (15) external static;
dcl  iop$current_channel       fixed bin (15) external static;
dcl  iop$watchdog_timeout      fixed bin (15) external static;
dcl  iop$syserr_finger         fixed bin (15) external static;
dcl  iop$panic_syserr_timeout  fixed bin (15) external static;
dcl  es_limits                 fixed bin (15) external static;
dcl  iop$last_stack_ptr        ptr external static;

/* parameters */

dcl  a_sys_code      fixed bin (15);
dcl  a_sys_msg       char (80) varying;
dcl  a_channel       fixed bin (15);
dcl  a_function      fixed bin (15);
dcl  a_data_16       fixed bin (15);
dcl  a_data_32_1     fixed bin (31);
dcl  a_data_32_2     fixed bin (31);
dcl  a_limit         fixed bin (15);
dcl  a_code          fixed bin (15);

/* automatic */

dcl  command_code    fixed bin (15);
dcl  subchan         fixed bin (15);
dcl  data            fixed bin (31);
dcl  cmdqp           ptr;
dcl  fcn_code        fixed bin (15);
dcl  i               fixed bin (15);
dcl  pc              entry (fixed bin (15), fixed bin (15), fixed bin(15),
                            fixed bin (31), fixed bin (31)) variable;
dcl  command_type    fixed bin (15);
dcl  ent_id          fixed bin (15);
dcl  sys_code        fixed bin (15);
dcl  sys_msg         char (80) varying;
dcl  chan            fixed bin (15);
dcl  func            fixed bin (15);
dcl  data_16         fixed bin (15);
dcl  data_32_1       fixed bin (31);
dcl  data_32_2       fixed bin (31);
dcl  limit           fixed bin (15);
dcl  code            fixed bin (15);
dcl  ret_code        fixed bin (15);
dcl  old_level       fixed bin (15);
dcl  old_entity      fixed bin (15);
dcl  old_channel     fixed bin (15);
dcl  mtr_time        fixed bin (31);
dcl  ringt           fixed bin (15);
dcl  ringx           fixed bin (15);
dcl  ring_size       fixed bin (15);
dcl  p               ptr;

/* based */

dcl  based_word      fixed bin (31) based;

dcl  1 cmdqe         based (cmdqp),
      2 next         ptr,
      2 chan         fixed bin (15),
```

```
        2 func          fixed bin (15),
        2 data_16       fixed bin (15),
        2 data_32_1     fixed bin (31),
        2 data_32_2     fixed bin (31);


/* entries */

dcl  iop$enable_watchdog            entry;
dcl  iop$disable_watchdog           entry;
dcl  iop$clear_command_pending      entry;
dcl  iop$process_diag_command       entry;
dcl  iop$sync_with_partner          entry;
dcl  iop$command_pending            entry returns (bit (1) aligned);
dcl  iop$read_command               entry (fixed bin (15), fixed bin (15),
                                          fixed bin (31));
dcl  es_command                     entry (fixed bin (15), fixed bin (15),
                            fixed bin (15), fixed bin (31), fixed bin (31));
dcl  iop$send_os_interrupt          entry;
dcl  iop$send_os_ints               entry;
dcl  iop$entity_exception           entry (fixed bin (15));
dcl  iop$edit_string_i              entry (char(*) var, fixed bin (15))
                                    returns ( char (80) var);
dcl  iop$edit_string_iii            entry (char(*) var, fixed bin (15),
                                    fixed bin (15), fixed bin(15))
                                    returns ( char (80) var);

dcl  stackframeptr                  entry returns (ptr);

/* include */

/* %nolist;  %include 'iop_command_codes'; %list; */
/* Begin include file . . . . . iop_command_codes.incl.pl1 */

/* Basic io command to a iop */

%replace  IOP_COMMAND_NOP              by 240;
%replace  IOP_COMMAND_OLD_NOP          by 0;
%replace  IOP_COMMAND_SYNC_ALONE       by 241;
%replace  IOP_COMMAND_SYNC_PART        by 242;
%replace  IOP_COMMAND_LOAD_PAGE        by 243;
%replace  IOP_COMMAND_DUMP_PAGE        by 244;
%replace  IOP_COMMAND_EXEC_RAM         by 245;
%replace  IOP_COMMAND_EXEC_SET_MBXP    by 246;
%replace  IOP_COMMAND_GOTO_ADDR        by 247;
%replace  IOP_COMMAND_RUN_ALONE        by 248;

%replace  IOP_COMMAND_SET_MBXP         by 235;        /* Obsolete */
%replace  IOP_COMMAND_IDLE             by 236;
%replace  IOP_COMMAND_PREPARE_SYNC     by 237;
%replace  IOP_COMMAND_CANCEL_SYNC      by 238;
%replace  IOP_COMMAND_RESTART          by 239;

%replace  IOP_COMMAND_DIAG_MIN         by 32;
%replace  IOP_COMMAND_DIAG_MAX         by 63;

/* codes used by generic iop driver */

%replace  FIRST_IOP_DRIVER_COMMAND         by 64;

%replace  IOP_COMMAND_OPEN                 by 64;
%replace  IOP_COMMAND_CLOSE                by 65;
%replace  IOP_COMMAND_CONTROL              by 66;
%replace  IOP_COMMAND_READ                 by 67;
%replace  IOP_COMMAND_WRITE                by 68;
%replace  IOP_COMMAND_READ_BUFFER_FREE     by 69;
%replace  IOP_COMMAND_NEED_WRITE_BUFFER    by 70;

%replace  LAST_IOP_DRIVER_COMMAND          by 70;

%replace  IOP_PROCESS_COMMAND_RING         by 71;

/* Codes used for adding iop's */
/* The first two must match the same constants in comm_command_codes! */
```

```
%replace  ADDING_LONER         by 1;
%replace  ADDING_PARTNER       by 2;

/* End include file . . . . . iop_command_codes.incl.pl1 */
/* %nolist;  %include 'iop_mailbox'; */%list;
/* Begin include file . . . . . iop_mailbox.incl.pl1 */

dcl  iop$mailbox_addr    ptr external static;
dcl  iop$vos_ringp       ptr external static;
dcl  iop$iop_ringp       ptr external static;
dcl  iop$syserr_ringp    ptr external static;

dcl  iop_mbxp            ptr;
dcl  syserr_ringp        ptr;
dcl  ring_cmdp           ptr;
dcl  vos_ringp           ptr;
dcl  iop_ringp           ptr;

%replace IOP_RING_SIZE   by   32;
%replace IOP_SYSERR_SIZE by   16;

%replace IOP_ON_LINE            by   0;
%replace IOP_INITIALIZING       by  -1;
%replace IOP_FAILED_TO_INIT     by  -2;
%replace IOP_EXEC_OUT_OF_PROM   by  -3;

%replace IOP_MEX_ID          by '*IOPMEX*';

dcl 1 iop_mbx                based (iop_mbxp),
    2 id                     char (8),
    2 status,                                      /* set by IOP */
      3 ring_syserr          bit(1),
      3 pad                  bit(7),

    2 vector                 fixed bin (15),
    2 idle_status            fixed bin (15),
    2 save_time              fixed dec (15),

    2 lock_address           fixed bin (31),       /* board loop-lock addr */
    2 syserr_msg             char (80) var,

    2 flags,                                       /* Set by VOS for VOS */
      3 vos_seen_syserr          bit (1),
      3 dumping_syserr_ring      bit (1),
      3 pad                      bit(14),

    2 syserr_ringp           ptr,                  /* ptr to syserr ring */
    2 syserr_ring_addr       bit (32) aligned,     /* abs addr of syerr ring */
    2 syserr_size            fixed bin (15),       /* number of syserr ring */

    2 input_msg              char (80) var,
    2 output_msg             char (80) var,

    2 iop_head               fixed bin (15),       /* to iop ring head */
    2 iop_tail               fixed bin (15),       /* to iop ring tail */
    2 iop_ringp              ptr,                  /* ptr to to iop ring */
    2 iop_ring_addr          bit (32) aligned,     /* abs addr of to iop ring */

    2 iop_ring_size          fixed bin(15),

    2 vos_head               fixed bin (15),       /* iop to vos ring */
    2 vos_tail               fixed bin (15),
    2 vos_ringp              ptr,
    2 vos_ring_addr          bit (32) aligned,
    2 vos_ring_size          fixed bin(15),
    2 global_state           fixed bin (31),       /* state -1 uninit, 0 - normal
                                                        ^= 0/-1 error code (2) */

    2 pbus_status            like berr_mc.p_status,
    2 terminator_status,
      3 no_fan_fault bit (1),
      3 no_sync_fault bit (1),
      3 no_bulk_fault bit (1),
      3 no_volt_fault bit (1),
      3 other_enema_good bit (1),
```

```
    3 power_state bit (3),
    3 pad         bit (7);

dcl 1 iop_syserr_ring (IOP_SYSERR_SIZE) based(syserr_ringp),
      2 free bit(1) aligned,
      2 syserr_code fixed bin (15),
      2 msg char (80) varying;

dcl 1 ring_cmd              based(ring_cmdp),
        2 free                    bit (1),
        2 pad                     bit (7),
        2 channel                 fixed bin (15),
        2 command                 fixed bin (15),
        2 data_16_1               fixed bin (15),
        2 data_32_1               fixed bin (31),
        2 data_32_2               fixed bin (31);

dcl 1 iop_ring (0:IOP_RING_SIZE-1) based (iop_ringp) like ring_cmd;

dcl 1 vos_ring (0:IOP_RING_SIZE-1) based (vos_ringp) like ring_cmd;
/* values for iop_mbx.idle_status */

%replace IDLE_STATUS_INIT          by 0;
%replace IDLE_STATUS_COMPLETE      by 1;
%replace IDLE_STATUS_REJECT        by 2;
%replace IDLE_STATUS_WAIT          by 3;


/* End include file . . . . . iop_mailbox.incl.pl1 */

/* %nolist;  %include 'iop_equip_table';   %list */;
/*   ***begin copyright*** ******************************   */
/*                                                           */
/*   STRATUS CONFIDENTIAL INFORMATION: CLASS II              */
/*   COPYRIGHT (c) Stratus Computer, Inc. 1985               */
/*                                                           */
/*   This program contains confidential and proprietary     */
/*   information of Stratus Computer, Inc., and any          */
/*   reproduction, disclosure, or use in whole or in part    */
/*   is expressly prohibited, except as may be               */
/*   specifically authorized by prior written agreement or   */
/*   permission of Stratus.                                  */
/*                                                           */
/*   ***end copyright*** ********************************    */
/*   Begin include file iop_equip_table.incl.pl1             */

dcl  equip_table$             ptr external static;
dcl  equip_tablep             ptr;

%replace  MAX_ENTITIES        by   8;
%replace  NUM_OF_SLOTS        by   13;  /* 0-13 */
%replace  MAX_CHANNELS        by   512;

dcl 1 stat_tbl based,
          4 alive              bit (1),          /* 1 = alive, 0 = broken */
          4 initialized        bit (1),
          4 testing            bit (1),          /* 1 = yes, 0 = no */
          4 loading            bit (1),
          4 running            bit (1),
          4 prom_start         bit (1),
          4 exception          bit (1),
          4 burning_prom       bit (1),
          4 broken             bit (1),          /* cannot be made alive */
          4 pad                bit (23);

dcl 1 entity_tbl based,
          4 e_ptr              ptr,
          4 e_fb15             fixed bin (15);

dcl  1 equip_table            based (equip_tablep),
       2 slot (0:NUM_OF_SLOTS),
         3 entity             fixed bin (15),    /* associated entity or -1 */
         3 adapt_type         fixed bin (15),    /* 1-255, see below */
```

```
        3 priority              fixed bin (15),      /* 1-25, see below */
        3 status like stat_tpl,
        3 entity_data like entity_tpl,
      2 entity (1:MAX_ENTITIES),
        3 type                  fixed bin (15),
        3 status like stat_tpl,
        3 entity_data like entity_tpl,
        3 cmd_entry             entry (fixed bin (15), fixed bin (15),
                                       fixed bin (15), fixed bin (31),
                                       fixed bin (31)),
        3 config_entry          entry (fixed bin (15), bit (16) aligned,
                                       fixed bin (31),
                                       fixed bin (31), fixed bin (31)),
        3 slot_entry            entry (fixed bin (15), fixed bin (15)),
      2 channel (1:MAX_CHANNELS),
        3 entity                fixed bin (15),
        3 owner                 fixed bin (15),
        3 limit                 fixed bin (15),
        3 status like stat_tpl,
        3 entity_data like entity_tpl,
      2 slot_prom_rev(0:NUM_OF_SLOTS) fixed bin (15);

/*  range constants for the field 'priority'              */

%replace  MIN_PRIORITY          by    1;
%replace  DEFAULT_PRIORITY      by    256;
%replace  MAX_PRIORITY          by    256;

/* standard entity IDs */

%replace IOP_DISK_ENTITY_ID by 1;
%replace IOP_COMM_ENTITY_ID by 2;
%replace IOP_CTAPE_ENTITY_ID by 3;

%replace IOP_TEST_ENTITY_ID by 8;


/*  End include file iop_equip_table.incl.pl1              */

/* %nolist;  %include 'iop_constants';      %l */ist;
/* Begin include file . . . . . iop_constants.incl.pl1 */

%replace IOA_CLOCK_CHANNEL_NO by 2;
%replace TERM_SLOT_1            by 14;
%replace TERM_SLOT_2            by 15;

%replace MAX_IOP_INTERRUPT_LEVEL by 8;
%replace MAX_IOP_BACKGROUND_PRIORITY by 8;

%replace MASK_ALL_INTS by 7;
%replace ALLOW_TIMER_INTERRUPTS by 5;
%replace ALLOW_IOA_INTERRUPTS by 4;

%replace JIFFIES_PER_SECOND by 65536;

%replace ES_ENTITY by 0;
%replace ES_CHANNEL by 0;
%replace NON_ENTITY by -1;
%replace NONE by -1;

%replace START_ADAPT_MEM by 12582912;   /* 12M or C00000x */

/* End include file . . . . . iop_constants.incl.pl1 */

/* %nolist;  %include 'iop_meters'; */ %list;
/* Begin include file . . . . . iop_meters.incl.pl1 */
dcl   iop$mtrp                            ptr external static;
dcl   mtrp                                ptr;

dcl   iop$emtrp                           ptr external static;
dcl   emtrp                               ptr;

/* meters 1 - 3 are reserved for standard meters */
/* meter 4 is unused currently */
```

```
%replace  SYSERR_MTR                by   5;
%replace  FAILED_SYSERR_MTR         by   6;
%replace  BGND_MTR                  by   7;
%replace  BGND_TIME_MTR             by   8;
%replace  TIMER_MTR                 by   9;
%replace  TIMER_TIME_MTR            by   10;
%replace  DMA_MTR                   by   11;
%replace  DMA_BYTE_MTR              by   12;
%replace  DMA_TIME_MTR              by   13;
%replace  CMD_SEND_MTR              by   14;
%replace  CMD_RECV_MTR              by   15;
%replace  CMD_HOST_BUSY_MTR         by   16;
%replace  OBSOLETE_1                by   17;  /* OBSOLETE MAY BE REUSED */
%replace  INTERRUPT_MTR             by   18;

/* meters 18 - 32 are currently undefined */

%replace  MAX_IOP_MTR               by   32;

/* entity meters collected by the ES */

%replace  ENT_CMD_CALL_MTR          by   1;
%replace  ENT_CMD_TIME_MTR          by   2;
%replace  ENT_CMD_MAX_MTR           by   3;
%replace  ENT_BGND_MAX_MTR          by   4;
%replace  ENT_BGND_TIME_MTR         by   5;
%replace  ENT_BGND_CALLS_MTR        by   6;
%replace  ENT_TIMER_MAX_MTR         by   7;
%replace  ENT_TIMER_TIME_MTR        by   8;
%replace  ENT_TIMER_CALLS_MTR       by   9;
%replace  ENT_INT_CALL_MTR          by   10;
%replace  ENT_INT_TIME_MTR          by   11;
%replace  ENT_INT_MAX_MTR           by   12;

/* meters 13 - 16 are available */

%replace  MAX_ENT_MTR               by   16;

dcl iop_meters (MAX_IOP_MTR)        fixed bin (31) based (mtrp);
dcl entity_meters (0:MAX_ENTITIES, MAX_ENT_MTR)    fixed bin (31) based (emtrp);

/* End include file . . . . . iop_meters.incl.pl1 */
/* %nolist:  %include 'iop_utility_calls'; %list; */
/* Begin include file . . . . . iop_utility_calls.incl.pl1 */

dcl  iop$allocate entry (fixed bin (31), char (2) aligned) returns (ptr);
dcl  iop$free entry (ptr, char (2) aligned);

dcl  iop$get_level entry  returns (fixed bin (15));
dcl  iop$set_level entry (fixed bin (15));

dcl  iop$syserr_code entry (char (80) varying, fixed bin (15), fixed bin(15));
dcl  iop$panic_syserr entry (char (80) varying);

dcl  iop$read_time  entry returns (fixed bin (31));
dcl  iop$delta_time entry (fixed bin (31)) returns (fixed bin (31));

dcl  bin_to_char    entry (fixed bin (31)) returns (character (13) varying);
dcl  char_to_bin    entry (character (13) varying) returns (fixed bin (31));

dcl  iop$set_slot_priority entry (fixed bin (15), fixed bin (15),
                                  fixed bin (15));

/* End include file . . . . . iop_utility_calls.incl.pl1 */
/* %nolist:  %include 'iop_es_function_codes'; %list; */
%replace MIN_ES_FUNCTION        by 1;

%replace LOOPBACK               by 1;
%replace LOOPBACK_COUNT         by 2;
%replace LOOPBACK_LIMIT         by 3;
%replace LOOPBACK_BGND          by 4;
%replace LOOPBACK_TIMED         by 5;
%replace SET_ES_LIMIT           by 6;
%replace GET_SLOT               by 7;
```

```
%replace GET_CHAN              by 8;
%replace GET_ENTITY            by 9;
%replace SET_CHAN_SIZE         by 10;
%replace GET_CHAN_SIZE         by 11;
%replace SLOT_STATUS           by 12;
%replace CHAN_STATUS           by 13;
%replace ENTITY_STATUS         by 14;
%replace SLOT_TYPE             by 15;
%replace ENTITY_TYPE           by 16;
%replace BIND_SLOT             by 17;
%replace BIND_CHAN             by 18;
%replace UNBIND_SLOT           by 19;
%replace UNBIND_CHAN           by 20;
%replace SET_ERROR_RP          by 21;
%replace SET_LOG_RP            by 22;
%replace READ_METER            by 23;
%replace METER_BLOCK           by 24;
%replace FORCE_ERROR           by 25;

%replace MAX_ES_FUNCTION       by 25;

/* functions that are usolicited by host OS */

%replace MIN_UNSOLICITED_ES_FCN by 512;
%replace SYSLOG_AVAILABLE      by 512;
%replace SYSERR_AVAILABLE      by 513;
%replace CONFIGURATION_CHANGE by 514;
%replace MAX_UNSOLICITED_ES_FCN by 640;

%replace IGNORE_ERRORS         by 2;
%replace REPORT_ERR_NORMALLY   by 0;
%replace REPORT_ERR_PANIC      by 1;

%replace IGNORE_LOG            by 2;
%replace REPORT_LOG_NORMALLY   by 0;
%replace REPORT_LOG_PANIC      by 1;
/* %nolist;  %include 'iop_tasking_calls'; %list; */
/* Begin include file . . . . . iop_tasking_calls.incl.pl1 */
dcl  iop$queue_background_callback entry (entry, fixed bin (31), fixed bin(15),
     fixed bin (15), fixed bin (15));

dcl  iop$queue_timer_callback      entry (entry, fixed bin (31), fixed bin(31),
     fixed bin (15), fixed bin (31), fixed bin(15));

dcl  iop$revoke_timer_callback     entry (fixed bin(31), fixed bin(15));

/* End include file . . . . . iop_tasking_calls.incl.pl1 */
/* %nolist;  %include 'syserr_codes';      % */list;
/* Begin include file syserr_codes.incl.pl1 81-9-8 */

/* This include file contains the definitions of the various syserr
   codes to be used when calling syserr. The  codes should be added
   together to form the desired combination. */

declare    syserr_action_ptr ptr;

declare 1 syserr_action based (syserr_action_ptr),
        2 mbz                  bit (10),
        2 signal_kernelerror   bit (1),
        2 security_log         bit (1),
        2 hardware_error       bit (1),
        2 obsolete             bit (1), /* was overseer_log */
        2 dont_display         bit (1),
        2 crash                bit (1);

%replace  SYSERR_WARN                    by 0;
%replace  SYSERR_CRASH                   by 1;
%replace  SYSERR_DONT_DISPLAY            by 2;
%replace  SYSERR_HARDWARE_ERROR_LOG      by 8;
%replace  SYSERR_SECURITY_LOG            by 16;
%replace  SYSERR_SIGNAL_KERNELERROR      by 32;

/* End include file syserr_codes.incl.pl1 */
/* %nolist;  %include 'iop_error_codes';   %list; */
/* %nolist;  %include 'disk_cmds'; */  %list;
/* Begin include file ... disk_cmds.in  80-08-10 */
```

```
/* Controller commands */

%replace START_DRIVE_CMD       by  128;  /* 80x */
%replace KILL_CUR_LIST_CMD     by  144;  /* 90x */
%replace RESTART_DRIVE_CMD     by    0;  /* Restart same list addr */
%replace BOOT_FROM_DRIVE_CMD   by    1;
%replace RUN_SELF_TEST_CMD     by    2;
%replace ADD_MAILBOX           by  160;  /* a0x for D114's */
%replace DELETE_MAILBOX        by  161;  /* a1x for D114's */

/* List commands */

/* ***** WARNING:  You MUST change init_disk_data if you add new commands
                   to this list.                                ************* */

%replace READ_DEFECT           by  32;   /* Data Xfer */
%replace VERIFY_CMD            by  33;
%replace READ_HDR_CMD          by  34;
%replace FORMAT_CMD            by  35;
%replace READ_CMD              by  36;
%replace WRITE_CMD             by  37;
%replace READ_BIG_CMD          by  38;
%replace WRITE_BIG_CMD         by  39;


%replace WRITE_VERIFY_CMD      by  50;    /* IOP write verify */
%replace ADD_GEOMETRY_CMD      by  51;    /* IOP add disk geometry */

%replace SEEK_CMD              by 132;   /* Seek */

/* Control commands set "ready" bit in summary status byte */

%replace JUMP_CMD              by  64;   /* Control */
%replace SET_INT_NO_CMD        by  65;
%replace HALT_CMD              by  66;
%replace WAIT_CMD              by  67;
%replace RESET_DRIVE_CMD       by  68;
%replace RESET_INT_NO_CMD      by  69;
%replace FIND_PRESENT_DRIVE    by  70;   /* also sets "drive_exists" */
%replace DIAG_SEEK_1_CMD       by  71;

%replace SOFT_RESET_CMD        by 128;
%replace SEG_UP_CMD            by 129;   /* Control */
%replace SEG_DOWN_CMD          by 130;
%replace RESTORE_CMD           by 131;
%replace RESET_FAULT_CMD       by 133;
%replace GET_CYL_CMD           by 134;
%replace DIAG_SEEK_2_CMD       by 135;

                                         /* Following only on D107/D106 */
%replace SET_RED_LIGHT_CMD     by 16;
%replace CLR_RED_LIGHT_CMD     by 17;
%replace SET_BLB_CMD           by 18;    /* Buffer Loop Back */
%replace GET_EXT_STATUS_CMD    by 19;
%replace RESET_BLB_CMD         by 20;    /* Buffer Loop Back */
%replace SET_PWHM_CMD          by 21;    /* Post-write Header Match */
%replace RESET_PWHM_CMD        by 22;
%replace RELOAD_ADAPTER_CMD    by 23;
%replace READ_ADAPTER_PROM_CMD    by 43;  /* read id prom in disk director */

/* End include file ... disk_cmds.in */

%replace INTERNAL_COMMAND by 1;
%replace EXTERNAL_COMMAND by 2;
%replace QUEUE_COMMAND    by 3;
%replace ES_REPLY         by 4;

%replace FALSE by '0'b;
%replace TRUE  by '1'b;

%page;
/* --------------------------------------------------------------------- */

/* Execution */
```

```
/* MF. SPECIAL ENTRY FOR ES ONLY - sets es_reply flag to allow us to
     distinguish between a command initiated by the ES as a reply to an
     inter-entity command and an instantiation of such a command */
iop$deliver_command_es: entry (a_channel, a_function, a_data_16, a_data_32_1,
                               a_data_32_2, a_limit, a_code);

     command_type = ES_REPLY;
     goto delivery_join;

iop$deliver_command_q: entry (a_channel, a_function, a_data_16, a_data_32_1,
                               a_data_32_2, a_limit, a_code);

     command_type = QUEUE_COMMAND;
     goto delivery_join;

iop$deliver_command: entry (a_channel, a_function, a_data_16, a_data_32_1,
                               a_data_32_2, a_limit, a_code);

     command_type = INTERNAL_COMMAND;

delivery_join:

     chan = a_channel;
     func = a_function;
     data_16 = a_data_16;
     data_32_1= a_data_32_1;
     data_32_2 = a_data_32_2;
     limit = a_limit;
     a_code = 0;

     iop_mbxp = iop$mailbox_addr;
     vos_ringp = iop$vos_ringp;
     mtrp = iop$mtrp;
     emtrp = iop$emtrp;
     equip_tablep = equip_tablep$;

     if chan > MAX_CHANNELS | chan < 0
     then do;
          a_code = e$iop_invalid_log_chan_no;
          return;
          end;

/* NE. decision for type of command 4 cases
     CHAN = ES CHANNEL
          if current entity is ES entity then we are replying to host send
               command on the ring.
          if current entity is someone else then ES being called locally.
               Deliver the command to ES
     CHAN ^= ES CHANNEL
          if the owner is the ES entity then the channel is between host and
               entity command is sent on the ring
          if the OWNER is not ES then the channel is between 2 entities
*/
     if chan ^= ES_CHANNEL
     then do;
          if ^equip_table.channel(chan).initialized
               then a_code = e$iop_chan_not_initialized;
          if equip_table.channel(chan).entity = NON_ENTITY
               then a_code = e$iop_channel_not_bound;
          if equip_table.channel(chan).owner ^= ES_ENTITY
          then do;
               call iop$syserr_code('CMD: Non-local command.',
                         SYSERR_WARN, (0));
               goto deliver_command_join;          /* inter-entity commmand
                                                      non ES */
               end;
          end;
          else if iop$current_entity ^= ES_ENTITY
                 then goto deliver_command_join; /* channel = ES not ES is
                                                      inter-entity to ES or
                                                      reply */

     if a_code ^= 0
          then return;
```

```
      old_level = iop$get_level();
      call iop$set_level(MASK_ALL_INTS);

      if command_type ^= QUEUE_COMMAND          /* if we are not emptying queue */
      then do;
           call empty_cmd_queue;                /* try to empty the queue */
           if cmdq.count ^= 0
                then goto no_free_ring_entry; /* must deliver in sequence */
           end;

      ringx = mod(iop_mbx.vos_tail + 1, IOP_RING_SIZE);

      if vos_ring(ringx).free
      then do;
           iop_meters(CMD_SEND_MTR) = iop_meters(CMD_SEND_MTR) + 1;
           vos_ring(ringx).channel = chan;
           vos_ring(ringx).command = func;
           vos_ring(ringx).data_16_1 = data_16;
           vos_ring(ringx).data_32_1 = data_32_1;
           vos_ring(ringx).data_32_2 = data_32_2;
           vos_ring(ringx).free = FALSE;

           iop_mbx.vos_tail = ringx;

           goto cmd_ret;
           end;

      /* not free */

no_free_ring_entry:

      iop_meters(CMD_HOST_BUSY_MTR) = iop_meters(CMD_HOST_BUSY_MTR) + 1;
      if equip_table.channel(chan).limit ^< limit
      then
           a_code = e$iop_limit_exceeded;
      else
           call thread_in_cmd(a_code);

cmd_ret:
      call iop$send_os_interrupt;
      call iop$set_level(old_level);
      return;

%page;
/* ------------------------------------------------------------- */
iop$new_command: entry;

      iop_mbxp = iop$mailbox_addr;
      iop_ringp = iop$iop_ringp;
      mtrp = iop$mtrp;
      emtrp = iop$emtrp;
      equip_tablep = equip_tablep$;

      old_level = iop$get_level();
      call iop$set_level(MASK_ALL_INTS);

command_loop:

      if iop$command_pending()
      then do;
           call iop$read_command (command_code, subchan, data);
           iop$last_stack_ptr = stackframeptr ();

           if command_code = START_DRIVE_CMD
           then do;
                call iop$process_diag_command;     /* let prom try */
                call iop$set_level(old_level);
                return;
                end;
           if command_code = IOP_COMMAND_IDLE
           then do;
                call idle_iop;
                goto command_loop;
                end;
```

```
        if command_code ^= IOP_PROCESS_COMMAND_RING
        then do;
             call iop$process_diag_command;
             call iop$clear_command_pending;
             end;
        else call iop$clear_command_pending;
        end;

   command_type = EXTERNAL_COMMAND;

   call empty_cmd_queue;

   ringx = iop_mbx.iop_head;

   if ringx = iop_mbx.iop_tail & iop_ring(ringx).free
   then do;
        call empty_cmd_queue;
        call iop$set_level(old_level);
        return;
        end;

   ringx = mod( ringx + 1, IOP_RING_SIZE);

   if ^iop_ring(ringx).free
   then do;
        iop_meters(CMD_RECV_MTR) = iop_meters(CMD_RECV_MTR) + 1;
        chan = iop_ring(ringx).channel;
        func = iop_ring(ringx).command;
        data_16 = iop_ring(ringx).data_16_1;
        data_32_1= iop_ring(ringx).data_32_1;
        data_32_2 = iop_ring(ringx).data_32_2;

        iop_ring(ringx).free = TRUE;
        iop_mbx.iop_head = ringx;
        end;

   else
        call iop$panic_syserr('CMD: Command ring corrupt.');

%page;
/* ---------------------------------------------------------------- */
deliver_command_join:

   old_entity = iop$current_entity;
   old_channel = iop$current_channel;

   if chan > MAX_CHANNELS /* *** check status *** */
   then do;
        ret_code = e$iop_invalid_log_chan_no;
        goto deliver_error;
        end;

/* determine entity that gets command cases are:
     CHAN = ES
          type - INTERNAL - inter entity command to ES
                 EXTERNAL - host command to ES
                 ES_REPLY - ES repying to inter entity command

     CHAN ^= ES
          type - INTERNAL - owner ^ ES inter entity command
               current_entity  = owner - command is to channel
                              ^= owner - command is to owner
          type - EXTERNAL - to channel from VOS
*/

   ent_id = NON_ENTITY;                  /* initial value */
   if chan = ES_CHANNEL
   then do;
        if command_type = ES_REPLY
           then do;
                if iop$current_entity = ES_ENTITY
                   then call iop$panic_syserr('CMD: ES reply to self.');
                ent_id = iop$current_entity;
                end;
```

```
                        else ent_id = ES_ENTITY;
                   end;
              else do;
                   if command_type = INTERNAL_COMMAND
                   then do;
                        if equip_table.channel(chan).owner = iop$current_entity
                             then ent_id = equip_table.channel(chan).entity;
                             else if equip_table.channel(chan).entity =
                                  iop$current_entity
                                  then ent_id = equip_table.channel(chan).owner;
                        end;
                   else if equip_table.channel(chan).owner = ES_ENTITY
                        then ent_id = equip_table.channel(chan).entity;
                   end;

              if ent_id = NON_ENTITY
              then do;
                   ret_code = e$iop_invalid_log_chan_no;
                   goto deliver_error;
                   end;

              if ent_id = ES_ENTITY
                   then pc = es_command;
                   else pc = equip_table.entity(ent_id).cmd_entry;

 /* NB. DO NOT SET CURRENT ENTITY because we run inter-entity commands to
      the ES in context of current_entity (needed to correctly reply) */

              if ^(chan = ES_CHANNEL & command_type = INTERNAL_COMMAND)
                   then iop$current_entity = ent_id;
              iop$current_channel = chan;

              entity_meters(ent_id, ENT_CMD_CALL_MTR) = entity_meters(ent_id, ENT_CMD_CAL
R) + 1;

              mtr_time = iop$read_time ();

              on anyother
              begin;
                   call iop$entity_exception(ent_id);
                   ret_code = oncode();
                   goto command_exception;
                   end;
              call iop$enable_watchdog;
              call pc (chan, func, data_16, data_32_1, data_32_2);
              call iop$disable_watchdog;

              mtr_time = iop$delta_time (mtr_time);
              entity_meters(ent_id, ENT_CMD_TIME_MTR) = entity_meters(ent_id, ENT_CMD_TIM
R) + mtr_time;
              if mtr_time > entity_meters(ent_id, ENT_CMD_MAX_MTR)
                  then entity_meters(ent_id, ENT_CMD_MAX_MTR) = mtr_time;

              ret_code = 0;

 deliver_error:
              iop$current_entity = old_entity;
              iop$current_channel = old_channel;
              if ret_code = 0
                   then goto finish_deliver(command_type);

              goto error_deliver(command_type);

 error_deliver(EXTERNAL_COMMAND):

 /* *** */

              call iop$syserr_code(iop$edit_string_iii(
                  'CMD: - cannot deliver command ^i to logical channel ^i. Code = ^i.',
                        func, chan, ret_code), SYSERR_WARN, code);

 finish_deliver(EXTERNAL_COMMAND):

              goto command_loop;
```

```
error_deliver(ES_REPLY)::
error_deliver(INTERNAL_COMMAND):
     call iop$set_level(old_level);
     a_code = ret_code;
finish_deliver(ES_REPLY)::
finish_deliver(INTERNAL_COMMAND):
     return;

command_exception:
     call iop$disable_watchdog;
     goto deliver_error;
%page;
/* ------------------------------------------------------------------------- */

iop$panic_syserr: entry (a_sys_msg);

     call iop$syserr_code(a_sys_msg, SYSERR_WARN, code);
     if code = 0
          then return;
     sys_msg = a_sys_msg;
     iop_mbxp = iop$mailbox_addr;
     if iop_mbxp = null()
          then return;                  /* *** can do nothing *** */
     old_level = iop$get_level();
     call iop$set_level(MASK_ALL_INTS);
     i = 0;
     do while (iop_mbx.syserr_msg ^= '');
          i = i + 1;
          if i > 10 * iop$panic_syserr_timeout
               then iop_mbx.syserr_msg = '';          /* FORCE */
          mtr_time = iop$read_time ();
          do while (iop$delta_time(mtr_time) < 6553);     /* .1 sec */
               end;
          call iop$send_os_ints;
          end;
     iop_mbx.syserr_msg = sys_msg;
     call iop$send_os_interrupt;
     call iop$set_level(old_level);
     return;

iop$syserr_code: entry (a_sys_msg, a_sys_code, a_code);

     sys_msg = a_sys_msg;
     sys_code = a_sys_code;
     a_code = 0;
     iop_mbxp = iop$mailbox_addr;
     if iop_mbxp = null()
          then return;                  /* *** can do nothing *** */
     syserr_ringp = iop$syserr_ringp;
     mtrp = iop$mtrp;
     if syserr_ringp = null() | mtrp = null()     /* still in init use panic */
     then do;
          call iop$panic_syserr(sys_msg);     /* try to deliver */
          return;
          end;
     iop_meters(SYSERR_MTR) = iop_meters(SYSERR_MTR) + 1;

     old_level = iop$get_level();
     call iop$set_level(MASK_ALL_INTS);

     do i = iop$syserr_finger repeat (max(mod(i+1,IOP_SYSERR_SIZE),1)) while (^iop_s
yserr_ring(i).free & i ^=  max (iop$syserr_finger - 1,1));
          end;
     iop$syserr_finger = max(mod(i+1,IOP_SYSERR_SIZE),1);
     if iop_syserr_ring(i).free
     then do;
          iop_syserr_ring(i).msg = sys_msg;
          iop_syserr_ring(i).syserr_code = sys_code;
          iop_syserr_ring(i).free = FALSE;
          end;
     else do;
          a_code = e$iop_cannot_queue_message;
          iop_meters(FAILED_SYSERR_MTR) = iop_meters(FAILED_SYSERR_MTR) + 1;
          end;
```

```
     iop_mbx.status.ring_syserr = TRUE;
     call iop$send_os_interrupt;
     call iop$set_level(old_level);
     return;

%page;
/* ------------------------------------------------------------------ */
idle_iop: procedure;

     iop_mbx.idle_status = 1;
     call iop$clear_command_pending;

     do while (TRUE);
          do while (^iop$command_pending ());
          end;

          call iop$read_command (command_code, subchan, data);
          if command_code = IOP_COMMAND_PREPARE_SYNC
          then do;
               call iop$clear_command_pending;
               call iop$sync_with_partner;
               end;
          else if command_code = IOP_COMMAND_RESTART
               then do;
                    call iop$clear_command_pending;
                    return;
                    end;
               else do;
                    call iop$process_diag_command;
                    if command_code = IOP_COMMAND_RUN_ALONE
                         then return;
                    end;
          end;

end idle_iop;

%page;
/* ------------------------------------------------------------------ */
thread_in_cmd: procedure (code);

dcl  code            fixed bin (15);
dcl  new_cmdp        ptr;

     new_cmdp = iop$allocate(size(cmdqe), 'CQ');
     if new_cmdp = null()
     then do;
          code = e$iop_cannot_allocate_space;
          return;
          end;

     new_cmdp -> cmdqe.chan = chan;
     new_cmdp -> cmdqe.data_16 = data_16;
     new_cmdp -> cmdqe.data_32_1 = data_32_1;
     new_cmdp -> cmdqe.data_32_2 = data_32_2;
     new_cmdp -> cmdqe.func = func;
     new_cmdp -> cmdqe.next = null();
     if cmdq.head = null()
     then do;                                         /* queue empty */
          cmdq.head = new_cmdp;
          cmdq.tail = new_cmdp;
          end;
     else do;                                         /* add at end */
          cmdq.tail -> cmdqe.next = new_cmdp;
          cmdq.tail = new_cmdp;
          end;
     cmdq.count = cmdq.count + 1;
     equip_table.channel(chan).limit = equip_table.channel(chan).limit + 1;
     code = 0;
     call queue_empty_callback;

end thread_in_cmd;

empty_cmd_queue: proc;
```

```
dcl  chan           fixed bin (15);
dcl  func           fixed bin (15);
dcl  data_16        fixed bin (15);
dcl  data_32_1      fixed bin (31);
dcl  data_32_2      fixed bin (31);
dcl  code           fixed bin (15);

empty_loop:

     if cmdq.count = 0
          then return;             /* empty now */

     if iop$current_entity ^= ES_ENTITY
          then call iop$panic_syserr('CMD: wrong entity during empty.');

     cmdqp = cmdq.head;

     if cmdqp = null()
     then do;
          call iop$panic_syserr('CMD: count not 0 but cmdq.head = null().');
          cmdq.count = 0;
          return;
          end;

     chan = cmdqe.chan;
     data_16 = cmdqe.data_16;
     data_32_1 = cmdqe.data_32_1;
     data_32_2 = cmdqe.data_32_2;
     func = cmdqe.func;
     call iop$deliver_command_q (chan, func, data_16, data_32_1, data_32_2,
                                  0, code);
     if code = 0
     then do;
          cmdq.count = cmdq.count - 1;
          equip_table.channel(chan).limit =
               equip_table.channel(chan).limit - 1;
          if cmdq.tail = cmdqp
          then do;
               if cmdq.count ^= 0
                    then call iop$panic_syserr('CMD: count not 0 sent tail.');
               if cmdqe.next ^= null()
                    then call iop$panic_syserr('CMD: next not null sent tail.');
               cmdq.tail = null;
               end;
          cmdq.head = cmdqe.next;
          call iop$free(cmdqp, 'CQ');
          end;
     goto empty_loop;

end empty_cmd_queue;

empty_bgnd_subr: proc (trash);

dcl trash fixed bin (31);

dcl code  fixed bin (15);

     call empty_cmd_queue;
queue_empty_callback: entry;
     if cmdq.count ^= 0
     then call iop$queue_background_callback(empty_bgnd_subr, 0,
          MAX_IOP_BACKGROUND_PRIORITY, MASK_ALL_INTS, code);
     if code ^= 0 then call iop$panic_syserr(iop$edit_string_i(
          'CMD: could not queue callback. Code = ^i.',code));

end empty_bgnd_subr;

end iop_command;
```

```
/*   ***begin copyright*** ************************************   */
/*                                                               */
/*   STRATUS CONFIDENTIAL INFORMATION: CLASS II                  */
/*   COPYRIGHT (c) Stratus Computer, Inc. 1986                   */
/*                                                               */
/*   This  program  contains  confidential and proprietary       */
```

```
/*  information of Stratus Computer, Inc.,  and  any          */
/*  reproduction, disclosure, or use in whole or in part      */
/*  is  expressly  prohibited,  except  as  may  be           */
/*  specifically authorized by prior written agreement or     */
/*  permission of Stratus.                                    */
/*                                                            */
/*  ***end copyright*** ***************************************/

/* Beginning of modification history */
/* Written from vos fault_handler 86-10-06 by Tom Moser */
/* Modified 87-03-02 by Tom Moser to support pbus errors */
/* Modified 87-03-05 by Tom Moser to temp always print terminator status */
/* Modified 87-03-30 by Tom Moser to fix syserr */
/* Modified 87-04-27 by Tom Moser to clear dma always and clear lots if
     unknown */
/* Modified 87-06-01 by Tom Moser to support enema terminators */
/* End of modification history */

iop$condition_handler:
    procedure (a_mcp) recursive options (fault_handler, support);

/* parameters */

dcl  a_mcp                ptr;

/* automatic */

dcl  fx*                  fixed bin (15);
dcl  oncode               fixed bin (15);
dcl  code                 fixed bin (15);
dcl  berr_code            fixed bin (15);
dcl  interrupt_call       bit (1) aligned;
dcl  intstr               char (10) varying;
dcl  break_list (16)      bit (1);
dcl  i                    fixed bin (31);
dcl  terminator_failed    bit (1) aligned;
dcl  term_charp           ptr;
dcl  pb_good              bit (1) aligned;
dcl  qb_good              bit (1) aligned;

dcl  term_char            char (1) based (term_charp) volatile;
dcl  based_fb31           fixed bin (31) based;


/* external */

dcl  iop$send_cmd_to_adapt    entry(fixed, fixed, fixed);
dcl  iop_debug$fault      entry (ptr);
dcl  iop_debug_full$get_fault_name entry(fixed bin (15))
     returns (char (20) varying);
dcl  signal_fault entry (bin (15), ptr, char (32) var in, bin (15),
        char (256) var in);
dcl  s$signal_condition entry (bin (15), ptr, char (32) var in, bin (15),
        char (256) var in);
dcl  exit_nested_berr          entry;
dcl  iop$term_obey_p                entry () returns (bit (1) aligned);
dcl  iop$term_obey_q                entry () returns (bit (1) aligned);
dcl  iop$reset_terminator           entry ();
dcl  iop$get_p_status               entry returns (bit (16) aligned);
dcl  iop$obey_p                     entry ();
dcl  iop$obey_q                     entry ();
dcl  iop$force_pbus                 entry ();
dcl  iop$obey_both                  entry ();
dcl  iop$disable_pbus_bus_error   entry;
dcl  iop$enable_pbus_bus_error    entry;
dcl  iop$clear_pbus_error     entry;
dcl  iop$init_scanner         entry;
dcl  iop$reset_dma_in_prog    entry;
dcl  iop$stop_scanner         entry;
dcl  iop$select_terminator    entry;
dcl  iop$edit_string_ivv             entry (char(*) var in, fixed bin (15),
                                         char (*) var in, char (*) var in)
                                         returns ( char (80) var);
dcl  iop$edit_string_I              entry (char(*) var in, fixed bin (31))
```

```
                                       returns ( char (80) var);
dcl  iop$ecit_string_Ii             entry (char(*) var in, fixed bin (31),
                                          fixed bin (15))
                                       returns ( char (80) var);
dcl  iop$ecit_string_i              entry (char(*) var in, fixed bin (15))
                                       returns ( char (80) var);


dcl  old_style_enemas$          bit (1) aligned external static;

dcl  1 berr_info                external static volatile,
          2 expect_nested_berr       bit (1) aligned init ('0'b),
          2 nested_berr_occurred     bit (1) aligned init ('0'b),
          2 testno                   fixed bin (15),
          2 test_info (4)            fixed bin (31),
          2 save_nested_berr_mc      like berr_mc;

%replace  FALSE      by '0'b;
%replace  TRUE       by '1'b;

%replace  TERM_PATTERN_TST by 1;
%replace  TERMINATOR_CHAR_LOCATION by '00000000'b4;
/* include */

/* %include 'iop_berr_names'; */
dcl iop_berr_names (0:19) char (25) varying external static initial (
   'Unknown',
   'Prom Write',
   'Local-Virtual No Code',
   'Overrange',
   'Exec Writeable',
   'Exec Dma',
   'No Write Access',
   'No Read Access',
   'No Priv Access',
   'Dma Read No Write Access',
   'P Bus Off',
   'P Bus Locked',
   'P Bus Obey Err',
   'Time Out Err',
   'Select Err',
   'Read Sync Pg',
   'Main Read No Grant',
   'Not Supv',
   'Not Priv',
   'Dma Cpu Write');
%nolist;
/* %include 'ioa_commands'; */
/*   ***begin copyright*** ******************************   */
/*                                                           */
/*   STRATUS CONFIDENTIAL INFORMATION: CLASS II              */
/*   COPYRIGHT (c) Stratus Computer, Inc. 1986               */
/*                                                           */
/*   This program contains confidential and proprietary      */
/*   information of Stratus Computer, Inc., and any          */
/*   reproduction, disclosure, or use in whole or in part    */
/*   is expressly prohibited, except as may be               */
/*   specifically authorized by prior written agreement or   */
/*   permission of Stratus.                                  */
/*                                                           */
/*   ***end copyright*** ********************************     */
/*   Begin include file ioa_commands.incl.pl1  */

%replace  MIN_IOA_CMD_NO       by    0;

%replace  CMD_RESET            by    0;
%replace  CMD_CLEAR_INT        by    1;
%replace  CMD_TOGGLE_OBEY_P    by    2;
%replace  CMD_TOGGLE_OBEY_Q    by    3;
%replace  CMD_CLEAR_BROKEN     by    4;
%replace  CMD_SET_BROKEN       by    5;
%replace  CMD_INT_DEVICE       by    6;
%replace  CMD_CLEAR_CPU_RESET  by    7;
```

```
%replace  MAX_IOA_CMD_NO        by    7;

/*  End include file ioa_commands.incl.pl1  */
/* %include 'condition_numbers'; */
/* Begin include file condition_numbers.incl.pl1   84-11-15 */

/* Modified for UNIX by RAE 84-06-26 */
/* Modified for Ada by RIE 86-11-03 */

/* This include file contains the numbers used for standard conditions */

%replace  ERROR_CONDITION_NO                    by 1;
%replace  UNDEFINEDFILE_CONDITION_NO            by 2;
%replace  BREAK_CONDITION_NO                    by 3;
%replace  ENDPAGE_CONDITION_NO                  by 4;
%replace  ENDFILE_CONDITION_NO                  by 5;
%replace  KEY_CONDITION_NO                      by 6;
%replace  PAUSE_CONDITION_NO                    by 7;
%replace  UNDERFLOW_CONDITION_NO                by 8;
%replace  OVERFLOW_CONDITION_NO                 by 9;
%replace  ZERODIVIDE_CONDITION_NO               by 10;
%replace  FIXEDOVERFLOW_CONDITION_NO            by 11;
%replace  USER_DEFINED_CONDITION_NO             by 12;
%replace  WARNING_CONDITION_NO                  by 13;
%replace  ANYOTHER_CONDITION_NO                 by 14;
%replace  HANGUP_CONDITION_NO                   by 15;
%replace  ALARMTIMER_CONDITION_NO               by 16;
%replace  CPUTIMER_CONDITION_NO                 by 17;
%replace  REENTER_CONDITION_NO                  by 18;
%replace  PROCESSINTERRUPT_CONDITION_NO         by 19;
%replace  PROCESSPAUSE_CONDITION_NO             by 20;
%replace  KERNELERROR_CONDITION_NO              by 21;
%replace  SUBPROCESSDONE_CONDITION_NO           by 22;
%replace  USRSIGNAL_CONDITION_NO                by 23;
%replace  CLEANUP_CONDITION_NO                  by 24;
%replace  TASKTIMER_CONDITION_NO                by 25;
%replace  CONSTRAINT_ERROR_CONDITION_NO         by 26;
%replace  NUMERIC_ERROR_CONDITION_NO            by 27;
%replace  PROGRAM_ERROR_CONDITION_NO            by 28;
%replace  STORAGE_ERROR_CONDITION_NO            by 29;
%replace  TASKING_ERROR_CONDITION_NO            by 30;
%replace  ADA_OTHERS_CONDITION_NO               by 31;
%replace  MAX_CONDITION_NO                      by 31;

/* End include file condition_numbers.incl.pl1 */

/* %include 'error_codes'; */
/* %include 'iop_mc'; */
/* Begin include file ... iop_mc.incl.pl1  80-12-31 */

dcl  mcp ptr;

dcl 1 mc based (mcp),       /* machine conditions */
     2 identifier           char(4),               /* *MC* */
     2 berr_type_code       fixed bin (15),
     2 align_bdcs           char (0) aligned,
     2 bdcs,
       3  bdcs_broken       bit (1),
       3  bdcs_broken2      bit (1),
       3  bdcs_mempar       bit (1),
       3  bdcs_memcomp      bit (1),
       3  bdcs_timask       bit (1),
       3  bdcs_pkcomp       bit (1),
       3  bdcs_cmdpend      bit (1),
       3  bdcs_statchg      bit (1),
       3  bdcs_side         bit (1),
       3  bdcs_ipend        bit (1),
       3  bdcs_partner      bit (1),
       3  bdcs_zout_gt      bit (1),
       3  bdcs_level1       bit (1),
       3  bdcs_romhigh      bit (1),
       3  bdcs_cmd_mask     bit (1),
       3  bdcs_imask        bit (1),
```

```
    2 align_p_status       char (0) aligned,
    2 p_status,
      3 dma_vfy_ok         bit (1),
      3 dma_wrt            bit (1),
      3 dma_rd             bit (1),
      3 scan_int           bit (1),
      3 scan_up_L          bit (1),
      3 pbus_force         bit (1),
      3 pside_enb          bit (1),
      3 qside_enb          bit (1),
      3 pbus_diag          bit (1),
      3 pbus_obey_er       bit (1),
      3 pbus_sel_er        bit (1),
      3 pbus_berr_en       bit (1),
      3 pbus_enb           bit (1),
      3 pbus_lock          bit (1),
      3 obey_p             bit (1),
      3 obey_q             bit (1),
    2 ioa_slot             fixed bin (15),
    2 usp                  fixed bin (31),
    2 d                    (0:7) fixed bin (31),
    2 a                    (0:6) fixed bin (31),
    2 int_sr               bit (16) aligned,
    2 status               bit (16) aligned,
    2 pc                   fixed bin (31),
    2 align_info           char (0) aligned,
    2 info,
      3 extended_fmt       bit (1) ,
      3 mbz                bit (3),
      3 vector             bit (12);

dcl 1 berr_mc based (mcp),     /* bus or address error machine conditions */
    2 identifier           char(4),
    2 berr_type_code       fixed bin (15),
    2 align_bdcs           char (0) aligned,
    2 bdcs,
      3  bdcs_broken       bit (1),
      3  bdcs_broken2      bit (1),
      3  bdcs_mempar       bit (1),
      3  bdcs_memcomp      bit (1),
      3  bdcs_timask       bit (1),
      3  bdcs_pkcomp       bit (1),
      3  bdcs_cmdpend      bit (1),
      3  bdcs_statchg      bit (1),
      3  bdcs_side         bit (1),
      3  bdcs_ipend        bit (1),
      3  bdcs_partner      bit (1),
      3  bdcs_zout_gt      bit (1),
      3  bdcs_level1       bit (1),
      3  bdcs_romhigh      bit (1),
      3  bdcs_cmd_mask     bit (1),
      3  bdcs_imask        bit (1),

    2 align_p_status       char (0) aligned,
    2 p_status,
      3 dma_vfy_ok         bit (1),
      3 dma_wrt            bit (1),
      3 dma_rd             bit (1),
      3 scan_int           bit (1),
      3 scan_up_L          bit (1),
      3 pbus_force         bit (1),
      3 pside_enb          bit (1),
      3 qside_enb          bit (1),
      3 pbus_diag          bit (1),
      3 pbus_obey_er       bit (1),
      3 pbus_sel_er        bit (1),
      3 pbus_berr_en       bit (1),
      3 pbus_enb           bit (1),
      3 pbus_lock          bit (1),
      3 obey_p             bit (1),
      3 obey_q             bit (1),
    2 ioa_slot             fixed bin (15),
    2 usp                  fixed bin (31),
```

```
    2 c                     (0:7) fixed bin (31),
    2 a                     (0:6) fixed bin (31),
    2 int_sr                bit (16) aligned,
    2 status                bit (16) aligned,
    2 pc                    fixed bin (31),
    2 align_info            char (0) aligned,
    2 info,
      3 extended_fmt        bit (1),
      3 mbz                 bit (3),
      3 vector              bit (12),
    2 align_stat            char (0) aligned,
    2 special_status,
      3 rerun               bit (1),
      3 pad1                bit (1),
      3 inst_fetch          bit (1),
      3 data_fetch          bit (1),
      3 r_m_w_cycle         bit (1),
      3 high_byte           bit (1),
      3 byte_xfer           bit (1),
      3 read                bit (1),
      3 pad2                bit (5),
      3 function_code       bit (3),
    2 fault_addr            fixed bin (31),
    2 resv_data_out         bit (16) aligned,
    2 data_out              bit (16) aligned,
    2 resv_data_in          bit (16) aligned,
    2 data_in               bit (16) aligned,
    2 resv_inst             bit (16) aligned,
    2 instruction_reg       bit (16) aligned,
    2 internal_info         (16) fixed bin (15);

/* End include file ... iop_mc.incl.pl1 */
/* %include 'iop_berr_codes'; */
/* Begin include file iop_berr_codes.incl.pl1 */

%replace  UNKNOWN           by    0;
%replace  PROM_WRT          by    1;
%replace  LV_NP_CODE        by    2;
%replace  OVERRANGE         by    3;
%replace  EXEC_WRTABLE      by    4;
%replace  EXEC_DMA          by    5;
%replace  NO_WRT_ACC        by    6;
%replace  NO_RD_ACC         by    7;
%replace  NO_PRV_ACC        by    8;
%replace  DMA_RD_NO_WRT_ACC     by    9;
%replace  BUS_OFF           by    10;
%replace  BUS_LOCKED        by    11;
%replace  OBEY_ERR          by    12;
%replace  TIME_OUT_ERR      by    13;
%replace  SELECT_ERR        by    14;
%replace  RD_SYNC_PG        by    15;
%replace  MAIN_RD_NO_GT     by    16;
%replace  NOT_SUPV          by    17;
%replace  NOT_PRIV          by    18;
%replace  DMA_CPU_WRT       by    19;

%replace  INT_BASE          by    32;  /* added to above code if interrupt */
/* End include file iop_berr_codes.incl.pl1 */
/* %include 'iop_equip_table'; */
/*  ***begin copyright*** *****************************  */
/*                                                      */
/*  STRATUS CONFIDENTIAL INFORMATION: CLASS II          */
/*  COPYRIGHT (c) Stratus Computer, Inc. 1985           */
/*                                                      */
/*  This program contains confidential and proprietary  */
/*  information of Stratus Computer, Inc., and any      */
/*  reproduction, disclosure, or use in whole or in part */
/*  is expressly prohibited, except as may be           */
/*  specifically authorized by prior written agreement or */
/*  permission of Stratus.                              */
/*                                                      */
/*  ***end copyright*** *******************************  */
/*  Begin include file iop_equip_table.incl.pl1         */
```

```
dcl  equip_tablep$              ptr external static;
dcl  equip_tablep               ptr;

%replace  MAX_ENTITIES          by    8;
%replace  NUM_OF_SLOTS          by    13;  /* 0-13 */
%replace  MAX_CHANNELS          by    512;

dcl 1 stat_tpl based,
          4 alive                 bit (1),          /* 1 = alive, 0 = broken */
          4 initialized           bit (1),
          4 testing               bit (1),          /* 1 = yes, 0 = no */
          4 loading               bit (1),
          4 running               bit (1),
          4 prom_start            bit (1),
          4 exception             bit (1),
          4 burning_prom          bit (1),
          4 broken                bit (1),          /* cannot be made alive */
          4 pad                   bit (23);

dcl 1 entity_tpl based,
          4 e_ptr                 ptr,
          4 e_fb15                fixed bin (15);

dcl  1 equip_table              based (equip_tablep),
       2 slot (0:NUM_OF_SLOTS),
         3 entity               fixed bin (15),     /* associated entity or -1 */
         3 adapt_type           fixed bin (15),     /* 1-255, see below */
         3 priority             fixed bin (15),     /* 1-25, see below */
         3 status like stat_tpl,
         3 entity_data like entity_tpl,
       2 entity (1:MAX_ENTITIES),
         3 type                 fixed bin (15),
         3 status like stat_tpl,
         3 entity_data like entity_tpl,
         3 cmd_entry            entry (fixed bin (15), fixed bin (15),
                                       fixed bin (15), fixed bin (31),
                                       fixed bin (31)),
         3 config_entry         entry (fixed bin (15), bit (16) aligned,
                                       fixed bin (31),
                                       fixed bin (31), fixed bin (31)),
         3 slot_entry           entry (fixed bin (15), fixed bin (15)),
       2 channel (1:MAX_CHANNELS),
         3 entity               fixed bin (15),
         3 owner                fixed bin (15),
         3 limit                fixed bin (15),
         3 status like stat_tpl,
         3 entity_data like entity_tpl,
       2 slot_prom_rev(0:NUM_OF_SLOTS) fixed bin (15);

/*  range constants for the field 'priority'                */

%replace  MIN_PRIORITY          by    1;
%replace  DEFAULT_PRIORITY      by    256;
%replace  MAX_PRIORITY          by    256;

/* standard entity IDs */

%replace IOP_DISK_ENTITY_ID by 1;
%replace IOP_COMM_ENTITY_ID by 2;
%replace IOP_CTAPE_ENTITY_ID by 3;

%replace IOP_TEST_ENTITY_ID by 8;


/*  End include file iop_equip_table.incl.pl1               */

/* %include 'fault_codes'; */
/* Begin include file . . . . . fault_codes.incl.pl1 */

%replace UNASSIGNED_VECTOR_0        by 0;
%replace RESET                      by 1;
%replace PAGE_FAULT                 by 2;
%replace ADDRESS_ERROR              by 3;
%replace ILLEGAL_INSTRUCTION        by 4;
```

```
%replace ZERO_DIVIDE                    by 5;
%replace CHK_INSTRUCTION                by 6;
%replace TRAPV_INSTRUCTION              by 7;
%replace PRIVILEGE_VIOLATION            by 8;
%replace TRACE                          by 9;
%replace LINE_1010_EMULATOR             by 10;
%replace LINE_1111_EMULATOR             by 11;
%replace UNASSIGNED_VECTOR_12           by 12;
%replace COPROC_PROTOCOL_VIOLATION by 13;
%replace FORMAT_ERROR                   by 14;
%replace UNINITIALIZED_INTERRUPT_VECTOR by 15;
%replace UNASSIGNED_VECTOR_16           by 16;
%replace UNASSIGNED_VECTOR_17           by 17;
%replace UNASSIGNED_VECTOR_18           by 18;
%replace UNASSIGNED_VECTOR_19           by 19;
%replace UNASSIGNED_VECTOR_20           by 20;
%replace UNASSIGNED_VECTOR_21           by 21;
%replace UNASSIGNED_VECTOR_22           by 22;
%replace UNASSIGNED_VECTOR_23           by 23;
%replace SPURIOUS_INTERRUPT             by 24;
%replace LEVEL_1_AUTOVECTOR             by 25;
%replace LEVEL_2_AUTOVECTOR             by 26;
%replace LEVEL_3_AUTOVECTOR             by 27;
%replace LEVEL_4_AUTOVECTOR             by 28;
%replace LEVEL_5_AUTOVECTOR             by 29;
%replace LEVEL_6_AUTOVECTOR             by 30;
%replace LEVEL_7_AUTOVECTOR             by 31;
%replace TRAP_0_INSTRUCTION             by 32;
%replace TRAP_1_INSTRUCTION             by 33;
%replace TRAP_2_INSTRUCTION             by 34;
%replace TRAP_3_INSTRUCTION             by 35;
%replace TRAP_4_INSTRUCTION             by 36;
%replace TRAP_5_INSTRUCTION             by 37;
%replace TRAP_6_INSTRUCTION             by 38;
%replace TRAP_7_INSTRUCTION             by 39;
%replace TRAP_8_INSTRUCTION             by 40;
%replace TRAP_9_INSTRUCTION             by 41;
%replace TRAP_10_INSTRUCTION            by 42;
%replace TRAP_11_INSTRUCTION            by 43;
%replace TRAP_12_INSTRUCTION            by 44;
%replace TRAP_13_INSTRUCTION            by 45;
%replace TRAP_14_INSTRUCTION            by 46;
%replace TRAP_15_INSTRUCTION            by 47;
%replace BRANCH_SET_ON_UNORDERED        by 48;
%replace INEXACT_RESULT                 by 49;
%replace FP_DIVIDE_BY_ZERO              by 50;
%replace UNDERFLOW                      by 51;
%replace OPERAND_ERROR                  by 52;
%replace OVERFLOW                       by 53;
%replace SIGNALLING_NAN                 by 54;
%replace UNASSIGNED_VECTOR_55           by 55;
%replace UNASSIGNED_VECTOR_56           by 56;
%replace UNASSIGNED_VECTOR_57           by 57;
%replace UNASSIGNED_VECTOR_58           by 58;
%replace UNASSIGNED_VECTOR_59           by 59;
%replace UNASSIGNED_VECTOR_60           by 60;
%replace UNASSIGNED_VECTOR_61           by 61;
%replace UNASSIGNED_VECTOR_62           by 62;
%replace UNASSIGNED_VECTOR_63           by 63;
%replace BAD_KERNEL_CALL                by 64;
%replace PRIVILEGED_CALL                by 65;
%replace PROGRAM_INTERRUPT              by 66;
%replace SAP_EXCEPTION                  by 67;

/* End include file . . . . . fault_codes.incl.pl1 */
/* %include 'iop_fault_names'; */
/* Begin include file . . . . . iop_fault_names.incl.pl1 */

dcl  iop_fault_names (0:63) char (20) var static init (
     'unassigned vector 0',    /* 0 */
     'reset',                  /* 1 */
     'bus error',              /* 2 */
     'address error',          /* 3 */
     'invalid instruction',    /* 4 */
```

```
        'zero divide',              /* 5 */
        'CHK instruction',          /* 6 */
        'TRAPV instruction',        /* 7 */
        'privilege violation',      /* 8 */
        'trace',                    /* 9 */
        'invalid instruction',      /* 10 - "Line A emulator" */
        'invalid instruction',      /* 11 - "Line F emulator" */
        'unassigned vector 12',     /* 12 */
        'unassigned vector 13',     /* 13 */
        'format error',             /* 14 */
        'uninitialized vector',     /* 15 */
        'unassigned vector 16',     /* 16 */
        'unassigned vector 17',     /* 17 */
        'unassigned vector 18',     /* 18 */
        'unassigned vector 19',     /* 19 */
        'unassigned vector 20',     /* 20 */
        'unassigned vector 21',     /* 21 */
        'unassigned vector 22',     /* 22 */
        'unassigned vector 23',     /* 23 */
        'spurious interrupt',       /* 24 */
        'level 1 autovector',       /* 25 */
        'level 2 autovector',       /* 26 */
        'level 3 autovector',       /* 27 */
        'level 4 autovector',       /* 28 */
        'level 5 autovector',       /* 29 */
        'level 6 autovector',       /* 30 */
        'level 7 autovector',       /* 31 */
        'trap 0 instruction',       /* 32 */
        'trap 1 instruction',       /* 33 */
        'trap 2 instruction',       /* 34 */
        'trap 3 instruction',       /* 35 */
        'trap 4 instruction',       /* 36 */
        'trap 5 instruction',       /* 37 */
        'trap 6 instruction',       /* 38 */
        'trap 7 instruction',       /* 39 */
        'trap 8 instruction',       /* 40 */
        'trap 9 instruction',       /* 41 */
        'trap 10 instruction',      /* 42 */
        'trap 11 instruction',      /* 43 */
        'trap 12 instruction',      /* 44 */
        'trap 13 instruction',      /* 45 */
        'trap 14 instruction',      /* 46 */
        'unsupported pop',          /* 47 */
        'unassigned vector 48',     /* 48 */
        'unassigned vector 49',     /* 49 */
        'unassigned vector 50',     /* 50 */
        'unassigned vector 51',     /* 51 */
        'unassigned vector 52',     /* 52 */
        'unassigned vector 53',     /* 53 */
        'unassigned vector 54',     /* 54 */
        'unassigned vector 55',     /* 55 */
        'unassigned vector 56',     /* 56 */
        'unassigned vector 57',     /* 57 */
        'unassigned vector 58',     /* 58 */
        'unassigned vector 59',     /* 59 */
        'unassigned vector 60',     /* 60 */
        'unassigned vector 61',     /* 61 */
        'unassigned vector 62',     /* 62 */
        'unassigned vector 63'); /* 63 */

/* End include file . . . . . iop_fault_names.incl.pl1 */
/* %include 'iop_utility_calls'; */
/* Begin include file . . . . . iop_utility_calls.incl.pl1 */

dcl  iop$allocate entry (fixed bin (31), char (2) aligned) returns (ptr);
dcl  iop$free entry (ptr, char (2) aligned);

dcl  iop$get_level entry  returns (fixed bin (15));
dcl  iop$set_level entry (fixed bin (15));

dcl  iop$syserr_code entry (char (80) varying, fixed bin (15), fixed bin(15));
dcl  iop$panic_syserr entry (char (80) varying);

dcl  iop$read_time  entry returns (fixed bin (31));
dcl  iop$delta_time entry (fixed bin (31)) returns (fixed bin (31));
```

```
dcl  bin_to_char    entry (fixed bin (31)) returns (character (13) varying);
dcl  char_to_bin    entry (character (13) varying) returns (fixed bin (31));

dcl  iop$set_slot_priority entry (fixed bin (15), fixed bin (15),
                                  fixed bin (15));

/* End include file . . . . . iop_utility_calls.incl.pl1 */
%list;

/* static */

dcl  iop$always_debug_fault   bit (1) aligned external static;
dcl  iop$always_debug_berr(0:15) bit (1) external static;

dcl  iop$condition_level      fixed bin (15) external static;
dcl  iop$berr_count           fixed bin (15) external static;

dcl  mem_test_bytes (6)       bit (32) aligned internal static initial (
     'CC55AA33'b4,
     '01FE02FD'b4,        /* sliding single 1 and 0 patterns */
     '04FB08F7'b4,
     '10EF20DF'b4,
     '40BF807F'b4,
     'F00F00FF'b4);       /* split patterns MUST END WITH FF */

dcl  byte_test_patterns (24)  char (1) defined mem_test_bytes;

%page;
/* program */

     if iop$always_debug_fault                    /* always debug? */
     then do;
          call iop_debug$fault(a_mcp);
          return;
          end;

     mcp = a_mcp;

     fx = divide (bin (mc.vector,15), 4 ,15);
     oncode = 0;

     call iop$panic_syserr('Condition handler: Fault =' ||
          iop_debug_full$get_fault_name(fx) || ' begin processing.');

     if fx = ADDRESS_ERROR &
        berr_mc.a (4) = 1 &                   /* null pc in call */
        berr_mc.fault_addr = 1 &              /* fault address = null */
        berr_mc.special_status.inst_fetch     /* should be a bad jsr */
          then oncode = e$call_to_missing_module;

%page;
/* For kernel faults, it is transfered to by fault_handler above */

/* Check for faults that can reasonably occur in kernel/super user mode
   and need to be signalled */

     goto fault_code (fx);
fault_code (ZERO_DIVIDE):
     call signal_fault (ZERODIVIDE_CONDITION_NO, mcp, '', e$zerodivide, '');
     goto cant_restart;

fault_code (TRAPV_INSTRUCTION):
     call signal_fault (FIXEDOVERFLOW_CONDITION_NO, mcp, '',
                        e$fixedoverflow, '');
     return;

fault_code (CHK_INSTRUCTION):
     call signal_fault (ERROR_CONDITION_NO, mcp, '', e$subscriptrange, '');
     goto cant_restart;

fault_code (BRANCH_SET_ON_UNORDERED):
     call signal_fault (ERROR_CONDITION_NO, mcp, '',
                        e$branch_or_set_on_unordered, '');
```

```
     goto cant_restart;
     return;

fault_code (INEXACT_RESULT):
     call signal_fault (ERROR_CONDITION_NO, mcp, '', e$inexact_result, '');
     return;

fault_code (UNDERFLOW):
     call signal_fault (UNDERFLOW_CONDITION_NO, mcp, '', e$underflow, '');
     return;

fault_code (OVERFLOW):
     call signal_fault (OVERFLOW_CONDITION_NO, mcp, '', e$overflow, '');
     return;

fault_code (SIGNALLING_NAN):
     call signal_fault (ERROR_CONDITION_NO, mcp, '',
                        e$trapping_not_a_number, '');
     return;

/* These vectors are handled elsewhere */

fault_code(*):;

/* signal faults that not checked above which require signalling */

     if oncode = 0
          then oncode = e$cpu_exception;
     call signal_fault (ERROR_CONDITION_NO, mcp, '', oncode,
               '');

cant_restart:
     do while ('1'b);
          call s$signal_condition (ERROR_CONDITION_NO, null(), '',
               e$invalid_return, '');
     end;
     return;

%page;
iop$berr_handler: entry (a_mcp);

     if iop$always_debug_berr(0)                        /* always debug? */
     then do;
          call iop_debug$fault(a_mcp);
          return;
          end;

     mcp = a_mcp;
     equip_tablep = equip_tablep$;
     berr_code = berr_mc.berr_type_code;

     interrupt_call = (berr_code >= INT_BASE);
     if interrupt_call
     then do;
          berr_code = berr_code - INT_BASE;
          intstr = 'interrupt ,';
          end;
     else intstr = ',';

     iop$berr_count = iop$berr_count + 1;
     call iop$panic_syserr(iop$edit_string_ivv(
          'Condition handler: Bus error (^i) ^v - ^v.', iop$berr_count, intstr,
               iop_berr_names(berr_code)));

     call iop$reset_dma_in_prog();

     if interrupt_call & berr_code ^= TIME_OUT_ERR & berr_code ^= OBEY_ERR
     then do;
          call iop$panic_syserr('UNEXPECTED BERR TYPE AT INTERRUPT');
          return;
          end;

     iop$condition_level = iop$condition_level + 1;
     if iop$condition_level > 1
```

```
     then do;
          call iop$clear_pbus_error();
          if berr_info.expect_nested_berr & iop$condition_level = 2
          then do;
               berr_info.expect_nested_berr = FALSE;
               berr_info.save_nested_berr_mc = berr_mc;
               berr_info.nested_berr_occurred = TRUE;
               iop$condition_level = iop$condition_level - 1;
/* clear rerun so that the offending instruction is not done and we will
     notice the bus error via the static str berr_info */
               berr_mc.special_status.rerun = TRUE;
               return;
               end;
          else do;
               call iop$panic_syserr(iop$edit_string_1(
                    'UNEXPECTED NESTED BERR. Depth = ^i. Entering debugger.',
                    iop$condition_level));
               call iop_debug$fault(a_mcp);
               return;
               end;
          end;

     goto berr_action(berr_code);

/* Impossible errors should never occur */

berr_action(BUS_OFF)::
berr_action(BUS_LOCKED)::
berr_action(DMA_CPU_WRT)::
berr_action(MAIN_RD_NO_GT)::
/* *** IMPOSSIBLE ERROR **** */

impossible_signal:
     call iop$panic_syserr('IMPOSSIBLE BUS ERROR');
     call signal_berr (e$iop_impossible_error);
     return;

/* *** IMPOSSIBLE ERROR **** */

/* pbus select error cases */

berr_action(SELECT_ERR)::
     if ^berr_mc.p_status.pbus_berr_en
     then do;
          call iop$panic_syserr('SELECT ERROR WHEN NOT ENABLED *');
          goto impossible_signal;
          end;
     call iop$disable_pbus_bus_error();                    /* clear error */
     call iop$enable_pbus_bus_error();
     call signal_berr (e$iop_adapt_not_alive);
     goto cant_restart;

/* NB. This code must reference structures common to mc and berr_mc only as
     it may be invoked via level 3 interrupt */

berr_action(TIME_OUT_ERR)::

     call pbus_error_setup;

/* *** TEMP *** */

     if old_style_enemas
     then do;
          call iop$panic_syserr('BERR: (OLD_TERM) Timeout error cleared.');
          goto no_enema_timeout;
          end;

/* *** TEMP *** */

     if do_term_test()
     then do;
          call iop$panic_syserr('BERR: Hard timeout - looking for bad IOA.');
          terminator_failed = TRUE;
          do i = 13 to 0 by -1 while (terminator_failed);
```

```
                call iop$send_cmd_to_adapt ((i), CMD_SET_BROKEN, code);
                if code ^= 0
                then call iop$panic_syserr(iop$edit_string_Ii('BERR: Could not brea
IOA ^I. Code = ^i', i, code));
                terminator_failed = do_term_test();
                if ^terminator_failed              /* found a bus hoser slot */
                then do;
                     equip_table.slot(i).priority = 1;  /* insure it is in
                                                           scan list */
                     call iop$panic_syserr(iop$edit_string_I(
                          'BERR: Timeout cleared when breaking IOA ^i.', i));
                     equip_table.slot(i).status.broken = TRUE;
                     end;
                     else call iop$send_cmd_to_adapt((i), CMD_CLEAR_BROKEN, code);
                end;
          end;
               else call iop$panic_syserr('BERR: Benign timeout cleared');

no_enema_timeout:         /* *** TEMP *** */

      call pbus_error_restore;
      return;                          /* retry should be OK */

berr_action(OBEY_ERR):

      call pbus_error_setup;

/* *** TEMP *** */

      if old_style_enemas
      then do;
           call iop$panic_syserr('BERR: (OLD_TERM) Obey error cleared.');
           goto no_enema_obey;
           end;

/* *** TEMP *** */

      call iop$obey_p;
      call iop$force_pbus;
      pb_good = iop$term_obey_p(); /* try to have terminator obey p too */
      if pb_good
           then pb_good = do_term_test();
      if ^pb_good
           then call iop$panic_syserr ('BERR: (OBEY) P bus failed.');
      call iop$obey_q;
      call iop$force_pbus;
      qb_good = iop$term_obey_q(); /* try to have terminator obey q too */
      if qb_good
           then qb_good = do_term_test();
      if ^pb_good
           then call iop$panic_syserr ('BERR: (OBEY) Q bus failed.');
      if pb_good &
         qb_good
      then call iop$obey_both;
      else if pb_good
           then call iop$obey_p;
           else if qb_good
                then call iop$obey_q;
                else call iop$panic_syserr ('BERR: (OBEY) both buses are bad.');

no_enema_obey:       /* *** TEMP *** */
      call iop$reset_terminator;
      call pbus_error_restore;
      return;

/* errors which are invariably fatal unless the user has a handler */

berr_action(EXEC_DMA)::
berr_action(DMA_RD_NO_WRT_ACC)::
berr_action(LV_NP_CODE)::
berr_action(OVERRANGE)::
berr_action(EXEC_WRTABLE)::
berr_action(PD_SYNC_PG)::
berr_action(NOT_SUPV)::
berr_action(NOT_PRIV)::
```

```
berr_action(NO_WRT_ACC)::
berr_action(NO_RD_ACC)::
berr_action(NO_PRV_ACC)::
berr_action(PROM_WRT)::
berr_action(*)::
      call signal_berr (e$cpu_exception);
      goto cant_restart;

berr_action(UNKNOWN)::
      call iop$disable_pbus_bus_error();                    /* clear error */
      call iop$clear_pbus_error();
      call iop$enable_pbus_bus_error();
      call iop$panic_syserr('BERR: UNKNOWN BUS ERROR. Entering Debugger.');
      iop$condition_level = iop$condition_level - 1;
      call iop_debug$fault(mcp);
      return;

signal_berr: proc (a_code);

dcl a_code fixed bin (15);

      iop$condition_level = iop$condition_level - 1;
      if iop$condition_level ^= 0
          then call iop$panic_syserr('BERR: signalling berr at nested berr.');
      call signal_fault (ERROR_CONDITION_NO, mcp, '', a_code,
              '');

end signal_berr;
do_term_test: procedure returns (bit (1) aligned);

dcl  pb_status      bit (16) aligned;
dcl  1 pb_status_bits like berr_mc.p_status defined pb_status;

      call iop$select_terminator();
      call setup_for_nested_berr(TERM_PATTERN_TST);
      term_charp = ptr(bin(TERMINATOR_CHAR_LOCATION));
      do berr_info.test_info (1) = 1 to 24 while (^berr_info.nested_berr_occurred);
          term_char = byte_test_patterns(berr_info.test_info(1));
          if ^berr_info.nested_berr_occurred
          then do;
              pb_status = iop$get_p_status();
              if ^pb_status_bits.pbus_diag | ^pb_status_bits.pbus_obey_er
                  then return(TRUE);
              if term_char ^= byte_test_patterns(berr_info.test_info(1))
              then do;
                  call iop$panic_syserr('BERR: TEST BYTE MISMATCH.');
                  call iop_debug$fault(mcp);
                  end;
              pb_status = iop$get_p_status();
              if ^pb_status_bits.pbus_diag | ^pb_status_bits.pbus_obey_er
                  then return(TRUE);
              end;
          end;
     return (berr_info.nested_berr_occurred);
end do_term_test;
setup_for_nested_berr: procedure (test_type);

dcl test_type fixed bin (15);

     berr_info.testno = test_type;
     berr_info.nested_berr_occurred = FALSE;
     berr_info.expect_nested_berr = TRUE;

end setup_for_nested_berr;
pbus_error_setup: procedure;

     string(break_list) = string (FALSE);
     if ^berr_mc.p_status.scan_up_L
         then call iop$stop_scanner;
     call iop$clear_pbus_error();
     if berr_mc.p_status.pbus_berr_en
         then call iop$disable_pbus_bus_error();
     return;
end pbus_error_setup;
```

```
pbus_error_restore: procedure;
     if ^berr_mc.p_status.scan_uc_L
          then call iop$init_scanner;
     if berr_mc.p_status.pbus_berr_en
          then call iop$enable_pbus_bus_error();
     iop$condition_level = iop$condition_level - 1;;
     if berr_mc.p_status.dma_rd | berr_mc.p_status.dma_wrt
     then do;
          call iop$panic_syserr('BERR: Signalling DMA restart.');
          call signal_berr (e$iop_dma_must_restart);
          goto cant_restart;       /* must unwind */
          end;
     return;                       /* retry should be OK */

end pbus_error_restore;
end iop$condition_handler;
iop$terminator_interrupt: procedure (a_slot, a_alive, a_int);

/* %nolist:  %include  'iop_constants';     %l */ist;
/* Begin include file . . . . . iop_constants.incl.pl1 */

%replace IOA_CLOCK_CHANNEL_NO by 2;
%replace TERM_SLOT_1          by 14;
%replace TERM_SLOT_2          by 15;

%replace MAX_IOP_INTERRUPT_LEVEL by 8;
%replace MAX_IOP_BACKGROUND_PRIORITY by 8;

%replace MASK_ALL_INTS by 7;
%replace ALLOW_TIMER_INTERRUPTS by 5;
%replace ALLOW_IOA_INTERRUPTS by 4;

%replace JIFFIES_PER_SECOND by 65536;

%replace ES_ENTITY by 0;
%replace ES_CHANNEL by 0;
%replace NON_ENTITY by -1;
%replace NONE by -1;

%replace START_ADAPT_MEM by 12582912;   /* 12M or C00000x */

/* End include file . . . . . iop_constants.incl.pl1 */


dcl  a_slot          fixed bin;
dcl  a_alive         bit (1) aligned;
dcl  a_int           bit (1) aligned;

dcl  term_stat                     bit (16) aligned;
dcl  int_entry                     bit (1) aligned;
dcl  reset_needed                  bit (1) aligned;
dcl  iop$save_term_status          bit (16) aligned external static;

dcl  based_fb15                    fixed bin (15) based;

dcl  iop$get_term_status           entry (fixed bin (15))
                                        returns (bit (16) aligned);
dcl  iop$reset_terminator          entry();
dcl  iop$disable_pbus_bus_error   entry;
dcl  iop$enable_pbus_bus_error    entry;
dcl  iop$send_ioa_cmd              entry (fixed bin, fixed bin);
dcl  iop$init_scanner              entry;
dcl  iop$send_os_interrupt         entry;
dcl  iop$edit_string_fh            entry (char (*) var in, fixed bin (15),
                                        bit (16) aligned) returns
                                        (char (80) var);
dcl  iop$edit_string_hh            entry (char (*) var in, bit (16) aligned,
                                        bit (16) aligned) returns
                                        (char (80) var);
dcl  iop$term_1_good               bit (1) aligned external static
                                        initial ('1'b);
dcl  iop$term_2_good               bit (1) aligned external static
                                        initial ('1'b);
dcl  iop$other_term_index          fixed bin (15) external static;
```

```
dcl  1 terminator_status_bits based,
       2 no_fan_fault bit (1),
       2 no_sync_fault bit (1),
       2 no_bulk_fault bit (1),
       2 no_volt_fault bit (1),
       2 other_enema_good bit (1),
       2 power_state bit (3),
       2 pad          bit (8);


dcl tino fixed bin (15) internal static init (0);
dcl  iop$edit_string_iihhh           entry (char (*) var in, fixed bin (15),fixec
in (15),
                                       bit (1) aligned,bit (1) aligned,bit (16) a
gned) returns
                                       (char (80) var);
/* %nolist;  %include 'iop_utility_calls'; %list; */
/* Begin include file . . . . . iop_utility_calls.incl.pl1 */

dcl  iop$allocate entry (fixed bin (31), char (2) aligned) returns (ptr);
dcl  iop$free entry (ptr, char (2) aligned);

dcl  iop$get_level entry  returns (fixed bin (15));
dcl  iop$set_level entry (fixed bin (15));

dcl  iop$syserr_code entry (char (80) varying, fixed bin (15), fixed bin(15));
dcl  iop$panic_syserr entry (char (80) varying);

dcl  iop$read_time  entry returns (fixed bin (31));
dcl  iop$delta_time entry (fixed bin (31)) returns (fixed bin (31));
dcl  bin_to_char     entry (fixed bin (31)) returns (character (13) varying);
dcl  char_to_bin     entry (character (13) varying) returns (fixed bin (31));

dcl  iop$set_slot_priority entry (fixed bin (15), fixed bin (15),
                                 fixed bin (15));

/* End include file . . . . . iop_utility_calls.incl.pl1 */
/* %nolist;  %include 'iop_constants';     %l */ist;
/* Begin include file . . . . . iop_constants.incl.pl1 */

%replace ICA_CLOCK_CHANNEL_NO by 2;
%replace TERM_SLOT_1          by 14;
%replace TERM_SLOT_2          by 15;

%replace MAX_IOP_INTERRUPT_LEVEL by 8;
%replace MAX_IOP_BACKGROUND_PRIORITY by 8;

%replace MASK_ALL_INTS by 7;
%replace ALLOW_TIMER_INTERRUPTS by 5;
%replace ALLOW_ICA_INTERRUPTS by 4;

%replace JIFFIES_PER_SECOND by 65536;

%replace ES_ENTITY by 0;
%replace ES_CHANNEL by 0;
%replace NON_ENTITY by -1;
%replace NONE by -1;

%replace START_ADAPT_MEM by 12582912;   /* 12M or C00000x */

/* End include file . . . . . iop_constants.incl.pl1 */

/* %nolist;  %include 'iop_mailbox'; */%list;
/* Begin include file . . . . . iop_mailbox.incl.pl1 */

dcl  iop$mailbox_addr    ptr external static;
dcl  iop$vos_ringp       ptr external static;
dcl  iop$iop_ringp       ptr external static;
dcl  iop$syserr_ringp    ptr external static;

dcl  iop_mbxp            ptr;
dcl  syserr_ringp        ptr;
dcl  ring_cmdp           ptr;
dcl  vos_ringp           ptr;
```

```
dcl  iop_ringp             ptr;

%replace IOP_RING_SIZE    by   32;
%replace IOP_SYSERR_SIZE  by   16;

%replace IOP_ON_LINE              by   0;
%replace IOP_INITIALIZING         by  -1;
%replace IOP_FAILED_TO_INIT       by  -2;
%replace IOP_EXEC_OUT_OF_PROM     by  -3;

%replace IOP_MBX_ID       by '*IOPMBX*';

dcl 1 iop_mbx             based (iop_mbxp),
    2 id                  char (8),
    2 status,                                    /* set by IOP */
      3 ring_syserr       bit(1),
      3 pad               bit(7),

    2 vector              fixed bin (15),
    2 idle_status         fixed bin (15),
    2 save_time           fixed dec (15),

    2 lock_address        fixed bin (31),        /* Board loop-lock addr */
    2 syserr_msg          char (80) var,

    2 flags,                                     /* Set by VOS for VOS */
      3 vos_seen_syserr         bit (1),
      3 dumping_syserr_ring     bit (1),
      3 pad                     bit(14),

    2 syserr_ringp        ptr,                   /* ptr to syserr ring */
    2 syserr_ring_addr    bit (32) aligned,      /* abs addr of syerr ring */
    2 syserr_size         fixed bin (15),        /* number of syserr ring */

    2 input_msg           char (80) var,
    2 output_msg          char (80) var,

    2 iop_head            fixed bin (15),        /* to iop ring head */
    2 iop_tail            fixed bin (15),        /* to iop ring tail */
    2 iop_ringp           ptr,                   /* ptr to to iop ring */
    2 iop_ring_addr       bit (32) aligned,      /* abs addr of to iop ring */

    2 iop_ring_size       fixed bin(15),

    2 vos_head            fixed bin (15),        /* iop to vos ring */
    2 vos_tail            fixed bin (15),
    2 vos_ringp           ptr,
    2 vos_ring_addr       bit (32) aligned,
    2 vos_ring_size       fixed bin(15),
    2 global_state        fixed bin (31),        /* state -1 uninit, 0 - normal
                                                    ^= 0/-1 error code (2) */
    2 pbus_status         like perr_mc.p_status,
    2 terminator_status,
       3 no_fan_fault bit (1),
       3 no_sync_fault bit (1),
       3 no_bulk_fault bit (1),
       3 no_volt_fault bit (1),
       3 other_enema_good bit (1),
       3 power_state bit (3),
       3 pad          bit (7);


dcl 1 iop_syserr_ring (IOP_SYSERR_SIZE) based(syserr_ringp),
      2 free bit(1) aligned,
      2 syserr_code fixed bin (15),
      2 msg char (80) varying;

dcl 1 ring_cmd            based(ring_cmdp),
         2 free                bit (1),
         2 pad                 bit (7),
         2 channel             fixed bin (15),
         2 command             fixed bin (15),
         2 data_16_1           fixed bin (15),
         2 data_32_1           fixed bin (31),
         2 data_32_2           fixed bin (31);
```

```
dcl 1 iop_ring (0:IOP_RING_SIZE-1) based (iop_ringp) like ring_cmd;

dcl 1 vos_ring (0:IOP_RING_SIZE-1) based (vos_ringp) like ring_cmd;

/* values for iop_mbx.idle_status */

%replace IDLE_STATUS_INIT            by 0;
%replace IDLE_STATUS_COMPLETE        by 1;
%replace IDLE_STATUS_REJECT          by 2;
%replace IDLE_STATUS_WAIT            by 3;


/* End include file . . . . . . iop_mailbox.incl.pl1 */

/* %nolist;  %include 'iop_mc'; */     %list;
/* Begin include file ... iop_mc.incl.pl1  80-12-31 */

dcl  mcp ptr;

dcl 1 mc based (mcp),          /* machine conditions */
     2 identifier              char(4),                /* *MC* */
     2 berr_type_code          fixed bin (15),
     2 align_bdcs              char (0) aligned,
     2 bdcs,
       3  bdcs_broken          bit (1),
       3  bdcs_broken2         bit (1),
       3  bdcs_mempar          bit (1),
       3  bdcs_memcomp         bit (1),
       3  bdcs_timask          bit (1),
       3  bdcs_pkcomp          bit (1),
       3  bdcs_cmdpend         bit (1),
       3  bdcs_statchg         bit (1),
       3  bdcs_side            bit (1),
       3  bdcs_ipend           bit (1),
       3  bdcs_partner         bit (1),
       3  bdcs_zout_gt         bit (1),
       3  bdcs_level1          bit (1),
       3  bdcs_romhigh         bit (1),
       3  bdcs_cmd_mask        bit (1),
       3  bdcs_imask           bit (1),

     2 align_p_status          char (0) aligned,
     2 p_status,
       3 dma_vfy_ok            bit (1),
       3 dma_wrt               bit (1),
       3 dma_rd                bit (1),
       3 scan_int              bit (1),
       3 scan_up_L             bit (1),
       3 pbus_force            bit (1),
       3 pside_enb             bit (1),
       3 qside_enb             bit (1),
       3 pbus_diag             bit (1),
       3 pbus_obey_er          bit (1),
       3 pbus_set_er           bit (1),
       3 pbus_berr_en          bit (1),
       3 pbus_enb              bit (1),
       3 pbus_lock             bit (1),
       3 obey_p                bit (1),
       3 obey_q                bit (1),
     2 iop_slot                fixed bin (15),
     2 usp                     fixed bin (31),
     2 d                       (0:7) fixed bin (31),
     2 a                       (0:6) fixed bin (31),
     2 int_sr                  bit (16) aligned,
     2 status                  bit (16) aligned,
     2 pc                      fixed bin (31),
     2 align_info              char (0) aligned,
     2 info,
       3 extended_fmt          bit (1) ,
       3 foz                   bit (3),
       3 vector                bit (12);

dcl 1 berr_mc based (mcp),     /* bus or address error machine conditions */
```

```
  2 identifier          char(4),
  2 berr_type_code      fixed bin (15),
  2 align_bccs          char (0) aligned,
  2 bccs,
    3 bccs_broken       bit (1),
    3 bccs_broken2      bit (1),
    3 bccs_mempar       bit (1),
    3 bccs_memcomp      bit (1),
    3 bccs_timask       bit (1),
    3 bccs_pkcomp       bit (1),
    3 bccs_cmdpend      bit (1),
    3 bccs_statchg      bit (1),
    3 bccs_side         bit (1),
    3 bccs_ipend        bit (1),
    3 bccs_partner      bit (1),
    3 bccs_zout_gt      bit (1),
    3 bccs_level1       bit (1),
    3 bccs_romhigh      bit (1),
    3 bccs_cmd_mask     bit (1),
    3 bccs_imask        bit (1),

  2 align_p_status      char (0) aligned,
  2 p_status,
   3 dma_vfy_ok         bit (1),
   3 dma_wrt            bit (1),
   3 dma_rd             bit (1),
   3 scan_int           bit (1),
   3 scan_up_L          bit (1),
   3 pbus_force         bit (1),
   3 pside_enb          bit (1),
   3 qside_enb          bit (1),
   3 pbus_diag          bit (1),
   3 pbus_obey_er       bit (1),
   3 pbus_sel_er        bit (1),
   3 pbus_berr_en       bit (1),
   3 pbus_enb           bit (1),
   3 pbus_lock          bit (1),
   3 obey_p             bit (1),
   3 obey_q             bit (1),
  2 ioa_slot            fixed bin (15),
  2 usp                 fixed bin (31),
  2 d                   (0:7) fixed bin (31),
  2 a                   (0:6) fixed bin (31),
  2 int_sr              bit (16) aligned,
  2 status              bit (16) aligned,
  2 pc                  fixed bin (31),
  2 align_info          char (0) aligned,
  2 info,
   3 extended_fmt       bit (1),
   3 mbz                bit (3),
   3 vector             bit (12),
  2 align_stat          char (0) aligned,
  2 special_status,
   3 rerun              bit (1),
   3 pad1               bit (1),
   3 inst_fetch         bit (1),
   3 data_fetch         bit (1),
   3 r_m_w_cycle        bit (1),
   3 high_byte          bit (1),
   3 byte_xfer          bit (1),
   3 read               bit (1),
   3 pad2               bit (5),
   3 function_code      bit (3),
  2 fault_addr          fixed bin (31),
  2 resv_data_out       bit (16) aligned,
  2 data_out            bit (16) aligned,
  2 resv_data_in        bit (16) aligned,
  2 data_in             bit (16) aligned,
  2 resv_inst           bit (16) aligned,
  2 instruction_reg     bit (16) aligned,
  2 internal_info       (16) fixed bin (15);

/* End include file ... ioa_mc.incl.pl1 */
```

```
     int_entry = TRUE;
     term_stat = iop$get_term_status(TERM_SLOT_2);
     tino = tino + 1;
     call iop$panic_syserr(iop$edit_string_iihhh('TI: # ^i SL ^i AL ^h IN ^h ST ^2
, tino,  a_slot, a_alive, a_int, term_stat));
     if a_alive
     then do;
          if a_int
               then call iop$send_ioa_cmd (a_slot, CMD_CLEAR_BROKEN);
reread_status:
          if term_stat = iop$save_term_status
          then do;
               if int_entry
                    then call iop$panic_syserr(iop$edit_string_ih(
'ES: Spurious terminator interrupt from slot ^i status = ^2h',
     a_slot, term_stat));
               return;
               end;
          reset_needed = FALSE;
          call iop$panic_syserr(iop$edit_string_hh('ES: Terminator status change o
= ^2hx new = ^2hx.', iop$save_term_status, term_stat));
          if addr(term_stat) -> terminator_status_bits.other_enema_good ^=
             addr(iop$save_term_status) ->
               terminator_status_bits.other_enema_good
          then do;            /* terminator set different */
               reset_needed = TRUE;
               if a_slot = TERM_SLOT_1
                  then iop$term_2_good =
                   addr(term_stat) -> terminator_status_bits.other_enema_good;
                  else iop$term_1_good =
                   addr(term_stat) -> terminator_status_bits.other_enema_good;
               if addr(term_stat) -> terminator_status_bits.other_enema_good
               then do;
                    if a_slot = TERM_SLOT_2   /* slot 1 good */
                    then do;
                         if iop$other_term_index = TERM_SLOT_1
                              then call iop$panic_syserr(
'ES: Term int - term 1 is good when scanning 1 already.');
                         iop$other_term_index = TERM_SLOT_1;
                         end;
                    end;
               end;
               else if a_slot = TERM_SLOT_1
                    then iop$other_term_index = TERM_SLOT_2;
          iop$save_term_status = term_stat;
          end;
     else do;
          reset_needed = TRUE;
          if a_slot = TERM_SLOT_1
               then iop$other_term_index = TERM_SLOT_2;
          end;
     if reset_needed
     then do;
          call iop$disable_pbus_bus_error;
          call iop$reset_terminator;
          call iop$enable_pbus_bus_error;
          call iop$init_scanner;
          int_entry = FALSE;
          term_stat = iop$get_term_status(TERM_SLOT_2);
          tino = tino + 1;
          call iop$panic_syserr(iop$edit_string_ih('TR: # ^i ST ^2h', tino, term_s
t));
          goto reread_status;
          end;
     iop_mbxp = iop$mailbox_addr;
     string(iop_mbx.terminator_status) = string(term_stat);
     call iop$send_os_interrupt;
     return;
end;
```

```
/*  ***begin copyright*** ************************************  */
/*                                                              */
/*  STRATUS CONFIDENTIAL INFORMATION: CLASS II                  */
/*  COPYRIGHT (c) Stratus Computer, Inc. 1986                   */
/*                                                              */
```

```
/*  This program contains confidential and proprietary          */
/*  information of Stratus Computer, Inc., and any              */
/*  reproduction, disclosure, or use in whole or in part        */
/*  is expressly prohibited, except as may be                   */
/*  specifically authorized by prior written agreement or       */
/*  permission of Stratus.                                      */
/*                                                              */
/*  ***end copyright*** ****************************************  */

%options system_programming;
/* Beginning of modification history */
/* Written 10-17-86 by Tom Moser */
/* Modified 87-03-02 by Tom Moser to shorten considerably - use
    iop_condition_report_full to get everything */
/* Modified 87-04-27 by Tom Moser to report more info in first line in
    case we crash */
/* End of modification history */

iop$report_condition_info: procedure;

/* %include 'iop_utility_calls'; */
/* Begin include file . . . . . iop_utility_calls.incl.pl1 */

dcl  iop$allocate entry (fixed bin (31), char (2) aligned) returns (ptr);
dcl  iop$free entry (ptr, char (2) aligned);

dcl  iop$get_level entry  returns (fixed bin (15));
dcl  iop$set_level entry (fixed bin (15));

dcl  iop$syserr_code entry (char (80) varying, fixed bin (15), fixed bin(15));
dcl  iop$panic_syserr entry (char (80) varying);

dcl  iop$read_time  entry returns (fixed bin (31));
dcl  iop$delta_time entry (fixed bin (31)) returns (fixed bin (31));

dcl  bin_to_char    entry (fixed bin (31)) returns (character (13) varying);
dcl  char_to_bin    entry (character (13) varying) returns (fixed bin (31));

dcl  iop$set_slot_priority entry (fixed bin (15), fixed bin (15),
                                  fixed bin (15));

/* End include file . . . . . iop_utility_calls.incl.pl1 */
/* %include 'condition_info'; */
/* Begin condition_info.incl.pl1 */

declare   1 condition_info     based,
          2 oncode             fixed bin(15),
          2 onfile             char(32) varying,
          2 onloc              char(32) varying,
          2 onkey              char(64) varying,
          2 condition_no       fixed bin(15),
          2 m_ptr              ptr,
          2 mc_ptr             ptr,
          2 name               char(32) varying,
          2 message            char(256) varying,
          2 onframe            ptr,
          2 nextframe          ptr;

/* End condition_info.incl.pl1 */
/* %include 'iop_mc'; */
/* Begin include file ... iop_mc.incl.pl1  80-12-31 */

dcl  mcp ptr;

dcl 1 mc based (mcp),      /* machine conditions */
    2 identifier           char(4),              /* *MC* */
    2 perr_type_code       fixed bin (15),
    2 align_pbcs           char (0) aligned,
    2 pbcs,
      3  pbcs_broken       bit (1),
      3  pbcs_broken2      bit (1),
      3  pbcs_mempar       bit (1),
      3  pbcs_memcomp      bit (1),
      3  pbcs_timask       bit (1),
```

```
      3  bdcs_pkcomp      bit (1),
      3  bdcs_cmdpend     bit (1),
      3  bdcs_statchg     bit (1),
      3  bdcs_side        bit (1),
      3  bdcs_ipend       bit (1),
      3  bdcs_partner     bit (1),
      3  bdcs_zout_gt     bit (1),
      3  bdcs_level1      bit (1),
      3  bdcs_romhigh     bit (1),
      3  bdcs_cmd_mask    bit (1),
      3  bdcs_imask       bit (1),

    2 align_p_status      char (0) aligned,
    2 p_status,
      3 dma_vfy_ok        bit (1),
      3 dma_wrt           bit (1),
      3 dma_rd            bit (1),
      3 scan_int          bit (1),
      3 scan_up_L         bit (1),
      3 pbus_force        bit (1),
      3 pside_enb         bit (1),
      3 qside_enb         bit (1),
      3 pbus_diag         bit (1),
      3 pbus_obey_er      bit (1),
      3 pbus_sel_er       bit (1),
      3 pbus_berr_en      bit (1),
      3 pbus_enb          bit (1),
      3 pbus_lock         bit (1),
      3 obey_p            bit (1),
      3 obey_q            bit (1),
    2 ioa_slot            fixed bin (15),
    2 usp                 fixed bin (31),
    2 d                   (0:7) fixed bin (31),
    2 a                   (0:6) fixed bin (31),
    2 int_sr              bit (16) aligned,
    2 status              bit (16) aligned,
    2 pc                  fixed bin (31),
    2 align_info          char (0) aligned,
    2 info,
      3 extended_fmt      bit (1) ,
      3 mbz               bit (3),
      3 vector            bit (12);

dcl 1 berr_mc based (mcp),     /* bus or address error machine conditions */
    2 identifier          char(4),
    2 berr_type_code      fixed bin (15),
    2 align_bdcs          char (0) aligned,
    2 bdcs,
      3  bdcs_broken      bit (1),
      3  bdcs_broken2     bit (1),
      3  bdcs_mempar      bit (1),
      3  bdcs_memcomp     bit (1),
      3  bdcs_timask      bit (1),
      3  bdcs_okcomp      bit (1),
      3  bdcs_cmdpend     bit (1),
      3  bdcs_statchg     bit (1),
      3  bdcs_side        bit (1),
      3  bdcs_ipend       bit (1),
      3  bdcs_partner     bit (1),
      3  bdcs_zout_gt     bit (1),
      3  bdcs_level1      bit (1),
      3  bdcs_romhigh     bit (1),
      3  bdcs_cmd_mask    bit (1),
      3  bdcs_imask       bit (1),

    2 align_p_status      char (0) aligned,
    2 p_status,
      3 dma_vfy_ok        bit (1),
      3 dma_wrt           bit (1),
      3 dma_rd            bit (1),
      3 scan_int          bit (1),
      3 scan_up_L         bit (1),
      3 pbus_force        bit (1),
      3 pside_enb         bit (1),
```

```
      3 osice_enb          bit (1),
      3 cbus_diag          bit (1),
      3 cbus_obey_er       bit (1),
      3 cbus_sel_er        bit (1),
      3 cbus_berr_en       bit (1),
      3 cbus_enb           bit (1),
      3 cbus_lock          bit (1),
      3 obey_p             bit (1),
      3 obey_q             bit (1),
    2 ioa_slot             fixed bin (15),
    2 usp                  fixed bin (31),
    2 c                    (0:7) fixed bin (31),
    2 a                    (0:6) fixed bin (31),
    2 int_sr               bit (16) aligned,
    2 status               bit (16) aligned,
    2 pc                   fixed bin (31),
    2 align_info           char (0) aligned,
    2 info,
      3 extended_fmt       bit (1),
      3 mbz                bit (3),
      3 vector             bit (12),
    2 align_stat           char (0) aligned,
    2 special_status,
      3 rerun              bit (1),
      3 cad1               bit (1),
      3 inst_fetch         bit (1),
      3 data_fetch         bit (1),
      3 r_m_w_cycle        bit (1),
      3 high_byte          bit (1),
      3 byte_xfer          bit (1),
      3 read               bit (1),
      3 cad2               bit (5),
      3 function_code      bit (3),
    2 fault_addr           fixed bin (31),
    2 resv_data_out        bit (16) aligned,
    2 data_out             bit (16) aligned,
    2 resv_data_in         bit (16) aligned,
    2 data_in              bit (16) aligned,
    2 resv_inst            bit (16) aligned,
    2 instruction_reg      bit (16) aligned,
    2 internal_info        (16) fixed bin (15);

/* End include file ... iop_mc.incl.pl1 */

dcl  s$find_condition_info entry (ptr, fixed bin(15));

dcl  iop$condition_report_flag     fixed bin (15) external static;
dcl  iop$current_entity            fixed bin (15) external static;
dcl  iop$current_slot              fixed bin (15) external static;
dcl  iop$current_channel           fixed bin (15) external static;
dcl  iop$current_interrupt         fixed bin (15) external static;

dcl code               fixed bin (15);
dcl p                  ptr;
dcl 1 ci               like condition_info based (p);

/* execution */

     if iop$condition_report_flag = 0
          then return;

     on anyother
          goto give_up;

     call s$find_condition_info(p, code);
     if code ^= 0
     then do;
          call iop$panic_syserr('CONDITION REPORT: Cannot find condition info. co
:' || bin_to_char((code)));
          return;
          end;

     mcp = ci.mc_ptr;
/*   *** hardware_log only ***
```

```
     call rptcod('Condition: ' || bin_to_char((ci.condition_no)) ||
          ' oncode = ' ,ci.oncode);
     call rptmes('At address: ' || iop_debug_full$describe_location(ptr
          (mc.pc)));
     call rptmes('Fault was ' || iop_debug_full$get_fault_name(divide (bin
          (mc.vector,15), 4 ,15)));
     call rptcod('Channel = ' || bin_to_char((iop$current_channel)) ||
                 '; Entity  = ' || bin_to_char((iop$current_entity)) ||
                 '; PIC set = ' || hex((iop$current_slot),2) ||
                 'x; Int IOA = ', iop$current_interrupt);
     if mc.extended_fmt
          then call rptmes('Fault address: ' || hex (
               berr_mc.fault_addr, 8));
*/
     return;

give_up:
     call iop$panic_syserr(' CONDITION SIGNALLED WHILE REPORTING CONDITION!');
     return;

end iop$report_condition_info;
iop$berr_log: procedure (a_mcp);

/* %nolist;  %include 'iop_utility_calls'; %list; */
/* Begin include file . . . . . iop_utility_calls.incl.pl1 */

dcl  iop$allocate entry (fixed bin (31), char (2) aligned) returns (ptr);
dcl  iop$free entry (ptr, char (2) aligned);

dcl  iop$get_level entry  returns (fixed bin (15));
dcl  iop$set_level entry (fixed bin (15));

dcl  iop$syserr_code entry (char (80) varying, fixed bin (15), fixed bin(15));
dcl  iop$panic_syserr entry (char (80) varying);

dcl  iop$read_time  entry returns (fixed bin (31));
dcl  iop$delta_time entry (fixed bin (31)) returns (fixed bin (31));

dcl  bin_to_char    entry (fixed bin (31)) returns (character (13) varying);
dcl  char_to_bin    entry (character (13) varying) returns (fixed bin (31));

dcl  iop$set_slot_priority entry (fixed bin (15), fixed bin (15),
                                  fixed bin (15));

/* End include file . . . . . iop_utility_calls.incl.pl1 */
/* %include 'iop_mc'; */
/* Begin include file ... iop_mc.incl.pl1  80-12-31 */

dcl  mcp ptr;

dcl 1 mc based (mcp),        /* machine conditions */
    2 identifier             char(4),                /* *MC* */
    2 berr_type_code         fixed bin (15),
    2 align_bdcs             char (0) aligned,
    2 bdcs,
      3  bdcs_broken         bit (1),
      3  bdcs_broken2        bit (1),
      3  bdcs_mempar         bit (1),
      3  bdcs_memcomp        bit (1),
      3  bdcs_timask         bit (1),
      3  bdcs_pkcomp         bit (1),
      3  bdcs_cmdpend        bit (1),
      3  bdcs_statchg        bit (1),
      3  bdcs_side           bit (1),
      3  bdcs_ipend          bit (1),
      3  bdcs_partner        bit (1),
      3  bdcs_zout_gt        bit (1),
      3  bdcs_level1         bit (1),
      3  bdcs_romhigh        bit (1),
      3  bdcs_cmd_mask       bit (1),
      3  bdcs_imask          bit (1),
    2 align_p_status         char (0) aligned,
    2 p_status,
```

```
    3 dma_vfy_ok        bit (1),
    3 dma_wrt           bit (1),
    3 dma_rd            bit (1),
    3 scan_int          bit (1),
    3 scan_up_L         bit (1),
    3 pbus_force        bit (1),
    3 pside_enb         bit (1),
    3 oside_enb         bit (1),
    3 pbus_diag         bit (1),
    3 pbus_obey_er      bit (1),
    3 pbus_sel_er       bit (1),
    3 pbus_berr_en      bit (1),
    3 pbus_enb          bit (1),
    3 pbus_lock         bit (1),
    3 obey_p            bit (1),
    3 obey_q            bit (1),
  2 ioa_slot            fixed bin (15),
  2 usp                 fixed bin (31),
  2 d                   (0:7) fixed bin (31),
  2 a                   (0:6) fixed bin (31),
  2 int_sr              bit (16) aligned,
  2 status              bit (16) aligned,
  2 pc                  fixed bin (31),
  2 align_info          char (0) aligned,
  2 info,
    3 extended_fmt      bit (1) ,
    3 mbz               bit (3),
    3 vector            bit (12);

dcl 1 berr_mc based (mcp),    /* bus or address error machine conditions */
  2 identifier          char(4),
  2 berr_type_code      fixed bin (15),
  2 align_bdcs          char (0) aligned,
  2 bdcs,
    3  bdcs_broken      bit (1),
    3  bdcs_broken2     bit (1),
    3  bdcs_mempar      bit (1),
    3  bdcs_memcomp     bit (1),
    3  bdcs_timask      bit (1),
    3  bdcs_pkcomp      bit (1),
    3  bdcs_cmdpend     bit (1),
    3  bdcs_statchg     bit (1),
    3  bdcs_side        bit (1),
    3  bdcs_ipend       bit (1),
    3  bdcs_partner     bit (1),
    3  bdcs_zout_gt     bit (1),
    3  bdcs_level1      bit (1),
    3  bdcs_romhigh     bit (1),
    3  bdcs_cmd_mask    bit (1),
    3  bdcs_imask       bit (1),

  2 align_p_status      char (0) aligned,
  2 p_status,
    3 dma_vfy_ok        bit (1),
    3 dma_wrt           bit (1),
    3 dma_rd            bit (1),
    3 scan_int          bit (1),
    3 scan_up_L         bit (1),
    3 pbus_force        bit (1),
    3 pside_enb         bit (1),
    3 oside_enb         bit (1),
    3 pbus_diag         bit (1),
    3 pbus_obey_er      bit (1),
    3 pbus_sel_er       bit (1),
    3 pbus_berr_en      bit (1),
    3 pbus_enb          bit (1),
    3 pbus_lock         bit (1),
    3 obey_p            bit (1),
    3 obey_q            bit (1),
  2 ioa_slot            fixed bin (15),
  2 usp                 fixed bin (31),
  2 d                   (0:7) fixed bin (31),
  2 a                   (0:6) fixed bin (31),
  2 int_sr              bit (16) aligned,
```

```
    2 status              bit (16) aligned,
    2 pc                  fixed bin (31),
    2 align_info          char (0) aligned,
    2 info,
      3 extended_fmt      bit (1),
      3 mbz               bit (3),
      3 vector            bit (12),
    2 align_stat          char (0) aligned,
    2 special_status,
      3 rerun             bit (1),
      3 pad1              bit (1),
      3 inst_fetch        bit (1),
      3 data_fetch        bit (1),
      3 r_m_w_cycle       bit (1),
      3 high_byte         bit (1),
      3 byte_xfer         bit (1),
      3 read              bit (1),
      3 pad2              bit (5),
      3 function_code     bit (3),
    2 fault_addr          fixed bin (31),
    2 resv_data_out       bit (16) aligned,
    2 data_out            bit (16) aligned,
    2 resv_data_in        bit (16) aligned,
    2 data_in             bit (16) aligned,
    2 resv_inst           bit (16) aligned,
    2 instruction_reg     bit (16) aligned,
    2 internal_info       (16) fixed bin (15);

/* End include file ... iop_mc.incl.pl1 */

dcl a_mcp           ptr;



dcl   iop$save_p_status        bit (16) aligned external static;
dcl   iop$current_entity       fixed bin (15) external static;
dcl   iop$current_slot         fixed bin (15) external static;
dcl   iop$current_channel      fixed bin (15) external static;
dcl   iop$current_interrupt    fixed bin (15) external static;

dcl   pb_status                fixed bin (15) defined berr_mc.p_status;
dcl   pb_sts                   bit (16) aligned defined berr_mc.p_status;
dcl   spec_sts                 fixed bin (15) defined berr_mc.special_status;
dcl   bdcs                     fixed bin (15) defined berr_mc.bdcs;

dcl   iop$edit_string_hhhHHiiii     entry (char (*) varying, fixed bin (15),
                                    fixed bin (15), fixed bin (15),
                                    fixed bin (31), fixed bin (31),
                                    fixed bin (15), fixed bin (15),
                                    fixed bin (15), fixed bin (15))
                                    returns (char (80) var);
      mcp = a_mcp;
      call iop$panic_syserr(iop$edit_string_hhhHHiiii(
'BERR STS: ^h ^h ^h ^H ^H ^i ^i ^i ^i.',
           bdcs, pb_status, spec_sts, berr_mc.fault_addr, mc.pc,
           iop$current_entity, iop$current_channel, iop$current_interrupt,
           iop$current_slot));
      call iop$report_pbus_status('BERR: ', iop$save_p_status, pb_sts);
      iop$save_p_status = pb_sts;
      return;
end iop$berr_log;
iop$report_pbus_status: procedure (msg, old_s, new_s);

dcl msg   char (40) var;
dcl (old_s, new_s) bit (16) aligned;
dcl based_fb15 fixed bin (15) based;

/* %nolist;  %include 'iop_utility_calls'; %list; */
/* Begin include file . . . . . iop_utility_calls.incl.pl1 */

dcl   iop$allocate entry (fixed bin (31), char (2) aligned) returns (ptr);
dcl   iop$free entry (ptr, char (2) aligned);

dcl   iop$get_level entry  returns (fixed bin (15));
dcl   iop$set_level entry (fixed bin (15));
```

```
dcl  iop$syserr_code entry (char (80) varying, fixed bin (15), fixed bin(15));
dcl  iop$panic_syserr entry (char (80) varying);

dcl  iop$read_time  entry returns (fixed bin (31));
dcl  iop$delta_time entry (fixed bin (31)) returns (fixed bin (31));

dcl  bin_to_char    entry (fixed bin (31)) returns (character (13) varying);
dcl  char_to_bin    entry (character (13) varying) returns (fixed bin (31));

dcl  iop$set_slot_priority entry (fixed bin (15), fixed bin (15),
                            fixed bin (15));

/* End include file . . . . . iop_utility_calls.incl.pl1 */

dcl  iop$edit_string_vhh            entry (char (*) varying, char (*) varying,
                                         fixed bin(15), fixed bin(15))
                                    returns (char (80) var);

dcl  iop$save_p_status              bit (16) aligned external static;

dcl  hex                            entry (bin (31), bin (15)) returns (char (8)
                                    var);


     if old_s ^= new_s
          then call iop$panic_syserr(iop$edit_string_vhh(
'^v old status = ^h, new status = ^h.', msg, addr(old_s) -> based_fb15,
                              addr(new_s) -> based_fb15));
     iop$save_p_status = new_s;

end iop$report_pbus_status;
/*   ***begin copyright*** **************************************   */
/*                                                                 */
/*   STRATUS CONFIDENTIAL INFORMATION: CLASS II                    */
/*   COPYRIGHT (c) Stratus Computer, Inc. 1986                     */
/*                                                                 */
/*   This program contains confidential and proprietary            */
/*   information of Stratus Computer, Inc., and any                */
/*   reproduction, disclosure, or use in whole or in part          */
/*   is expressly prohibited, except as may be                     */
/*   specifically authorized by prior written agreement or         */
/*   permission of Stratus.                                        */
/*                                                                 */
/*   ***end copyright*** ****************************************   */

%options system_programming;
/* Beginning of modification history */
/* Created 87-01-19 from iop_condition_report by Tom Moser */
/* Modified 87-04-27 by Tom Moser to report more info in first line in
     case we crash */
/* End of modification history */

iop$report_condition_info: procedure;

/* %include 'iop_utility_calls'; */
/* Begin include file . . . . . iop_utility_calls.incl.pl1 */

dcl  iop$allocate entry (fixed bin (31), char (2) aligned) returns (ptr);
dcl  iop$free entry (ptr, char (2) aligned);

dcl  iop$get_level entry  returns (fixed bin (15));
dcl  iop$set_level entry (fixed bin (15));

dcl  iop$syserr_code entry (char (80) varying, fixed bin (15), fixed bin(15));
dcl  iop$panic_syserr entry (char (80) varying);

dcl  iop$read_time  entry returns (fixed bin (31));
dcl  iop$delta_time entry (fixed bin (31)) returns (fixed bin (31));

dcl  bin_to_char    entry (fixed bin (31)) returns (character (13) varying);
dcl  char_to_bin    entry (character (13) varying) returns (fixed bin (31));

dcl  iop$set_slot_priority entry (fixed bin (15), fixed bin (15),
                            fixed bin (15));
```

```
/* End include file . . . . . iop_utility_calls.incl.pl1 */
/* %include 'condition_info'; */
/* Begin condition_info.incl.pl1 */

declare    1 condition_info      based,
           2 oncode              fixed bin(15),
           2 onfile              char(32) varying,
           2 onloc               char(32) varying,
           2 onkey               char(64) varying,
           2 condition_no        fixed bin(15),
           2 q_ptr               ptr,
           2 mc_ptr              ptr,
           2 name                char(32) varying,
           2 message             char(256) varying,
           2 onframe             ptr,
           2 nextframe           ptr;

/* End condition_info.incl.pl1 */
/* %include 'iop_mc'; */
/* Begin include file ... iop_mc.incl.pl1  80-12-31 */

dcl  mcp ptr;

dcl 1 mc based (mcp),       /* machine conditions */
     2 identifier           char(4),                    /* *MC* */
     2 berr_type_code       fixed bin (15),
     2 align_bdcs           char (0) aligned,
     2 bdcs,
       3  bdcs_broken       bit (1),
       3  bdcs_broken2      bit (1),
       3  bdcs_mempar       bit (1),
       3  bdcs_memcomp      bit (1),
       3  bdcs_timask       bit (1),
       3  bdcs_pkcomp       bit (1),
       3  bdcs_cmdpend      bit (1),
       3  bdcs_statchg      bit (1),
       3  bdcs_side         bit (1),
       3  bdcs_ipend        bit (1),
       3  bdcs_partner      bit (1),
       3  bdcs_zout_gt      bit (1),
       3  bdcs_level1       bit (1),
       3  bdcs_romhigh      bit (1),
       3  bdcs_cmc_mask     bit (1),
       3  bdcs_imask        bit (1),

     2 align_p_status       char (0) aligned,
     2 p_status,
       3 dma_vfy_ok         bit (1),
       3 dma_wrt            bit (1),
       3 dma_rd             bit (1),
       3 scan_int           bit (1),
       3 scan_up_L          bit (1),
       3 pbus_force         bit (1),
       3 pside_enb          bit (1),
       3 qside_enb          bit (1),
       3 pbus_diag          bit (1),
       3 pbus_obey_er       bit (1),
       3 pbus_sel_er        bit (1),
       3 pbus_berr_en       bit (1),
       3 pbus_enb           bit (1),
       3 pbus_lock          bit (1),
       3 obey_p             bit (1),
       3 obey_q             bit (1),
     2 ioa_slot             fixed bin (15),
     2 usp                  fixed bin (31),
     2 d                    (0:7) fixed bin (31),
     2 a                    (0:6) fixed bin (31),
     2 int_sr               bit (16) aligned,
     2 status               bit (16) aligned,
     2 pc                   fixed bin (31),
     2 align_info           char (0) aligned,
     2 info,
       3 extended_fmt       bit (1) ,
       3 mcz                bit (3),
       3 vector             bit (12);
```

```
dcl 1 berr_mc based (mcp),     /* bus or address error machine conditions */
    2 identifier          char(4),
    2 berr_type_code      fixed bin (15),
    2 align_bdcs          char (0) aligned,
    2 bdcs,
      3  bdcs_broken      bit (1),
      3  bdcs_broken2     bit (1),
      3  bdcs_mempar      bit (1),
      3  bdcs_memcomp     bit (1),
      3  bdcs_timask      bit (1),
      3  bdcs_pkcomp      bit (1),
      3  bdcs_cmdpend     bit (1),
      3  bdcs_statchg     bit (1),
      3  bdcs_side        bit (1),
      3  bdcs_ipend       bit (1),
      3  bdcs_partner     bit (1),
      3  bdcs_zout_gt     bit (1),
      3  bdcs_level1      bit (1),
      3  bdcs_romhigh     bit (1),
      3  bdcs_cmd_mask    bit (1),
      3  bdcs_imask       bit (1),

    2 align_p_status      char (0) aligned,
    2 p_status,
      3 dma_vfy_ok        bit (1),
      3 dma_wrt           bit (1),
      3 dma_rd            bit (1),
      3 scan_int          bit (1),
      3 scan_up_l         bit (1),
      3 pbus_force        bit (1),
      3 pside_enb         bit (1),
      3 qside_enb         bit (1),
      3 pbus_diag         bit (1),
      3 pbus_obey_er      bit (1),
      3 pbus_sel_er       bit (1),
      3 pbus_berr_en      bit (1),
      3 pbus_enb          bit (1),
      3 pbus_lock         bit (1),
      3 obey_p            bit (1),
      3 obey_q            bit (1),
    2 ioa_slot            fixed bin (15),
    2 usp                 fixed bin (31),
    2 d                   (0:7) fixed bin (31),
    2 a                   (0:6) fixed bin (31),
    2 int_sr              bit (16) aligned,
    2 status              bit (16) aligned,
    2 pc                  fixed bin (31),
    2 align_info          char (0) aligned,
    2 info,
      3 extended_fmt      bit (1),
      3 mbz               bit (3),
      3 vector            bit (12),
    2 align_stat          char (0) aligned,
    2 special_status,
      3 rerun             bit (1),
      3 pad1              bit (1),
      3 inst_fetch        bit (1),
      3 data_fetch        bit (1),
      3 r_m_w_cycle       bit (1),
      3 high_byte         bit (1),
      3 byte_xfer         bit (1),
      3 read              bit (1),
      3 pad2              bit (5),
      3 function_code     bit (3),
    2 fault_addr          fixed bin (31),
    2 resv_data_out       bit (16) aligned,
    2 data_out            bit (16) aligned,
    2 resv_data_in        bit (16) aligned,
    2 data_in             bit (16) aligned,
    2 resv_inst           bit (16) aligned,
    2 instruction_reg     bit (16) aligned,
    2 internal_info       (16) fixed bin (15);

/* End include file ... iop_mc.incl.pl1 */
```

```
dcl  s$find_condition_info entry (ptr, fixed bin(15));
dcl  iop_debug_full$get_fault_name entry(fixed bin (15))
     returns (char (20) varying);
dcl iop_debug_full$describe_location entry (ptr) returns (char (64) varying);
dcl iop_debug$regs_output entry (ptr, entry (char (80) varying));
dcl  hex                        entry (bin (31), bin (15)) returns (char (8)
                                var);
dcl  hexp                       entry (ptr, bin (15)) returns (char (8)
                                var);

dcl  iop$condition_report_flag     fixed bin (15) external static;
dcl  iop$current_entity            fixed bin (15) external static;
dcl  iop$current_slot              fixed bin (15) external static;
dcl  iop$current_channel           fixed bin (15) external static;
dcl  iop$current_interrupt         fixed bin (15) external static;
dcl  iop$crptn                     fixed bin (15) external static init (0);
/* values for flag */
/* 0 - no report   */
/* 1 - brief report */
/* 2 - normal report */
/* >2 - very long report */

dcl msgpfx           char (13) varying static external init ('');
dcl code             fixed bin (15);
dcl p                ptr;
dcl i                fixed bin (15);
dcl 1 ci             like condition_info based (p);
dcl line_out         char(80) var;
dcl 1  reg_line,
       2  name1               char (3),
       2  pad1                char (1),
       2  data1               char (8),
       2  pad2                char (4),
       2  name2               char (3),
       2  pad3                char (1),
       2  data2               char (8);

declare   function_codes (0:7) char (22) var int static init (
          'function code 000',
          'user data',
          'user program',
          'function code 011',
          'function code 100',
          'kernel data',
          'kernel program',
          'interrupt acknowledge');

dcl based_p          ptr based;

/* execution */

     if iop$condition_report_flag = 0
          then return;

     on anyother
          goto give_up;

     call s$find_condition_info(p, code);
     if code ^= 0
     then do;
          call rptcod('CONDITION REPORT: Cannot find condition info. code =',
               code);
          return;
          end;

     mcp = ci.mc_ptr;
     iop$crptn = iop$crptn + 1;
     msgpfx = bin_to_char((iop$crptn)) || ' ';
     call rptmes('CONDITION REPORT:');
     call rptcod('Condition: ' || bin_to_char((ci.condition_no)) ||
          ' oncode = ' ,ci.oncode);
     call rptmes('Signalled in procedure: ' || ci.onloc);
     call rptmes('At address: ' || iop_debug_full$describe_location(ptr
          (mc.pc)));
```

```
     call rptmes('Fault was ' || iop_debug_full$get_fault_name(divide (bin
          (mc.vector,15), 4 ,15)));
     if iop$condition_report_flag = 1
          then return;
     call rptcod('Channel = ' || bin_to_char((iop$current_channel)) ||
               '; Entity  = ' || bin_to_char((iop$current_entity)) ||
               '; PIC sel = ' || hex((iop$current_slot),2) ||
               'x; Int ICA = ', iop$current_interrupt);
     call rptmes('Signalled at: ' || iop_debug_full$describe_location(addrel
          (ci.nextframe,4) -> based_p));
     if mc.extended_fmt
          then call rptmes('Fault address: ' || hex (
               berr_mc.fault_addr, 8));
     if iop$condition_report_flag = 2
          then return;

     call iop_debug$regs_output(mcp, rptmes);

     return;

give_up:
     call rptmes(' CONDITION SIGNALLED WHILE REPORTING CONDITION!');
     return;

rptcod: procedure (a_errstr, a_code);

dcl  a_errstr        char (80) varying;
dcl  a_code          fixed bin(15);
     call iop$panic_syserr(msgpfx || a_errstr || bin_to_char((a_code)));
end rptcod;
rptmes: procedure (a_errstr);

dcl  a_errstr        char (80) varying;
     call iop$panic_syserr(msgpfx || a_errstr);
end rptmes;

status_reg:    proc (a_fb15) returns(char(32) var);

dcl  a_fb15     fixed bin(15);

dcl str         char(32) var;
dcl fb15        fixed bin(15);
dcl fb31        fixed bin(31);
dcl srp       . ptr;
dcl 1 sr             based(srp),
     2 trace         bit(1),
     2 pad1          bit(1),
     2 kernel        bit(1),
     2 pad2          bit(2),
     2 mask          bit(3),
     2 pad3          bit(3),
     2 extend        bit(1),
     2 neg           bit(1),
     2 zero          bit(1),
     2 overflow      bit(1),
     2 carry         bit(1);

     fb15 = a_fb15;
     srp = addr(fb15);
     str = '';

     str = '  cc ';
     if sr.extend
     then str = str || 'x';
     if sr.neg
     then str = str || 'n';
     if sr.zero
     then str = str || 'z';
     if sr.overflow
     then str = str || 'o';
     if sr.carry
     then str = str || 'c';
     str = substr( str || '      ', 1, 8);
         fb31 = bin( sr.mask, 2);
```

```
str = str || ' mask=' || hex( fb31, 1);

if sr.kernel
then str = str || '   kernel mode';
else str = str || '   user mode';

return (str);

end status_reg;
end iop$report_condition_info;
iop$err_log: procedure (a_mcp);

/* %nolist;  %include 'iop_utility_calls'; %list; */
/* Begin include file . . . . . iop_utility_calls.incl.pl1 */
dcl  iop$allocate entry (fixed bin (31), char (2) aligned) returns (ptr);
dcl  iop$free entry (ptr, char (2) aligned);

dcl  iop$get_level entry  returns (fixed bin (15));
dcl  iop$set_level entry (fixed bin (15));

dcl  iop$syserr_code entry (char (80) varying, fixed bin (15), fixed bin(15));
dcl  iop$panic_syserr entry (char (80) varying);

dcl  iop$read_time  entry returns (fixed bin (31));
dcl  iop$delta_time entry (fixed bin (31)) returns (fixed bin (31));

dcl  bin_to_char    entry (fixed bin (31)) returns (character (13) varying);
dcl  char_to_bin    entry (character (13) varying) returns (fixed bin (31));

dcl  iop$set_slot_priority entry (fixed bin (15), fixed bin (15),
                                  fixed bin (15));

/* End include file . . . . . iop_utility_calls.incl.pl1 */
/* %include 'iop_mc'; */
/* Begin include file ... iop_mc.incl.pl1  80-12-31 */

dcl  mcp ptr;

dcl 1 mc based (mcp),      /* machine conditions */
    2 identifier           char(4),              /* *MC* */
    2 berr_type_code       fixed bin (15),
    2 align_bdcs           char (0) aligned,
    2 bdcs,
      3  bdcs_broken       bit (1),
      3  bdcs_broken2      bit (1),
      3  bdcs_mempar       bit (1),
      3  bdcs_memcomp      bit (1),
      3  bdcs_timask       bit (1),
      3  bdcs_pkcomp       bit (1),
      3  bdcs_cmdpend      bit (1),
      3  bdcs_statchg      bit (1),
      3  bdcs_side         bit (1),
      3  bdcs_ipend        bit (1),
      3  bdcs_partner      bit (1),
      3  bdcs_zout_gt      bit (1),
      3  bdcs_level1       bit (1),
      3  bdcs_romhigh      bit (1),
      3  bdcs_cmd_mask     bit (1),
      3  bdcs_imask        bit (1),

    2 align_p_status       char (0) aligned,
    2 p_status,
      3 dma_vfy_ok         bit (1),
      3 dma_wrt            bit (1),
      3 dma_rd             bit (1),
      3 scan_int           bit (1),
      3 scan_up_L          bit (1),
      3 pbus_force         bit (1),
      3 bside_eno          bit (1),
      3 aside_enb          bit (1),
      3 pbus_diag          bit (1),
      3 pbus_obey_er       bit (1),
      3 pbus_sel_er        bit (1),
      3 pbus_perr_en       bit (1),
```

```
      3 pbus_enb            bit (1),
      3 pbus_lock           bit (1),
      3 obey_p              bit (1),
      3 obey_q              bit (1),
    2 ioa_slot              fixed bin (15),
    2 usc                   fixed bin (31),
    2 c                     (0:7) fixed bin (31),
    2 a                     (0:6) fixed bin (31),
    2 int_sr                bit (16) aligned,
    2 status                bit (16) aligned,
    2 pc                    fixed bin (31),
    2 align_info            char (0) aligned,
    2 info,
      3 extended_fmt        bit (1) ,
      3 mbz                 bit (3),
      3 vector              bit (12);

dcl 1 berr_mc based (mcp),    /* bus or address error machine conditions */
    2 identifier            char(4),
    2 berr_type_code        fixed bin (15),
    2 align_bdcs            char (0) aligned,
    2 bdcs,
      3  bdcs_broken        bit (1),
      3  bdcs_broken2       bit (1),
      3  bdcs_mempar        bit (1),
      3  bdcs_memcomp       bit (1),
      3  bdcs_timask        bit (1),
      3  bdcs_pkcomp        bit (1),
      3  bdcs_cmdpend       bit (1),
      3  bdcs_statchg       bit (1),
      3  bdcs_side          bit (1),
      3  bdcs_ipend         bit (1),
      3  bdcs_partner       bit (1),
      3  bdcs_zout_gt       bit (1),
      3  bdcs_level1        bit (1),
      3  bdcs_romhigh       bit (1),
      3  bdcs_cmd_mask      bit (1),
      3  bdcs_imask         bit (1),

    2 align_p_status        char (0) aligned,
    2 p_status,
      3 dma_vfy_ok          bit (1),
      3 dma_wrt             bit (1),
      3 dma_rd              bit (1),
      3 scan_int            bit (1),
      3 scan_up_L           bit (1),
      3 pbus_force          bit (1),
      3 pside_enb           bit (1),
      3 qside_enb           bit (1),
      3 pbus_diag           bit (1),
      3 pbus_obey_er        bit (1),
      3 pbus_sel_er         bit (1),
      3 pbus_berr_en        bit (1),
      3 pbus_enb            bit (1),
      3 pbus_lock           bit (1),
      3 obey_p              bit (1),
      3 obey_q              bit (1),
    2 ioa_slot              fixed bin (15),
    2 usc                   fixed bin (31),
    2 c                     (0:7) fixed bin (31),
    2 a                     (0:6) fixed bin (31),
    2 int_sr                bit (16) aligned,
    2 status                bit (16) aligned,
    2 pc                    fixed bin (31),
    2 align_info            char (0) aligned,
    2 info,
      3 extended_fmt        bit (1),
      3 mbz                 bit (3),
      3 vector              bit (12),
    2 align_stat            char (0) aligned,
    2 special_status,
      3 rerun               bit (1),
      3 pad1                bit (1),
      3 inst_fetch          bit (1),
```

```
      3 data_fetch         bit (1),
      3 r_m_w_cycle        bit (1),
      3 high_byte          bit (1),
      3 byte_xfer          bit (1),
      3 read               bit (1),
      3 pad2               bit (5),
      3 function_code      bit (3),
    2 fault_addr           fixed bin (31),
    2 resv_data_out        bit (16) aligned,
    2 data_out             bit (16) aligned,
    2 resv_data_in         bit (16) aligned,
    2 data_in              bit (16) aligned,
    2 resv_inst            bit (16) aligned,
    2 instruction_reg      bit (16) aligned,
    2 internal_info        (16) fixed bin (15);

/* End include file ... iop_mc.incl.pl1 */

dcl a_mcp           ptr;


dcl  iop$save_p_status        bit (16) aligned external static;
dcl  iop$current_entity       fixed bin (15) external static;
dcl  iop$current_slot         fixed bin (15) external static;
dcl  iop$current_channel      fixed bin (15) external static;
dcl  iop$current_interrupt    fixed bin (15) external static;

dcl  pb_status                fixed bin (15) defined berr_mc.p_status;
dcl  pb_sts                   bit (16) aligned defined berr_mc.p_status;
dcl  spec_sts                 fixed bin (15) defined berr_mc.special_status;
dcl  bdcs                     fixed bin (15) defined berr_mc.bdcs;

dcl  iop$edit_string_hhhHHiiii      entry (char (*) varying, fixed bin (15),
                                     fixed bin (15), fixed bin (15),
                                     fixed bin (31), fixed bin (31),
                                     fixed bin (15), fixed bin (15),
                                     fixed bin (15), fixed bin (15))
                                     returns (char (80) var);
     mcp = a_mcp;
     call iop$panic_syserr(iop$edit_string_hhhHHiiii(
'BERR STS: ^h ^h ^h ^H ^H ^i ^i ^i ^i.',
          bdcs, pb_status, spec_sts, berr_mc.fault_addr, mc.pc,
          iop$current_entity, iop$current_channel, iop$current_interrupt,
          iop$current_slot));
     call iop$report_pbus_status('BERR: ', iop$save_p_status, pb_sts);
     iop$save_p_status = pb_sts;
     return;
end iop$berr_log;
iop$report_pbus_status: procedure (msg, old_s, new_s);

dcl msg    char (40) var;
dcl (old_s, new_s)  bit (16) aligned;
dcl difs            bit (16) aligned;
dcl i               fixed bin (15);
dcl changes         char (80) var;

dcl difs_bits (16)  bit (1) based;
dcl based_fb15      fixed bin (15) based;

/* %nolist;  %include 'iop_utility_calls'; %list; */
/* Begin include file . . . . . iop_utility_calls.incl.pl1 */

dcl  iop$allocate entry (fixed bin (31), char (2) aligned) returns (ptr);
dcl  iop$free entry (ptr, char (2) aligned);

dcl  iop$get_level entry  returns (fixed bin (15));
dcl  iop$set_level entry (fixed bin (15));

dcl  iop$syserr_code entry (char (80) varying, fixed bin (15), fixed bin(15));
dcl  iop$panic_syserr entry (char (80) varying);

dcl  iop$read_time  entry returns (fixed bin (31));
dcl  iop$delta_time entry (fixed bin (31)) returns (fixed bin (31));
```

```
dcl  bin_to_char     entry (fixed bin (31)) returns (character (13) varying);
dcl  char_to_bin     entry (character (13) varying) returns (fixed bin (31));

dcl  iop$set_slot_priority entry (fixed bin (15), fixed bin (15),
                                fixed bin (15));

/* End include file . . . . . iop_utility_calls.incl.pl1 */

dcl  iop$save_p_status              bit (16) aligned external static;

dcl  hex                            entry (bin (31), bin (15)) returns (char (8)
                                    var);


     if old_s ^= new_s
          then call iop$panic_syserr(msg || ' old status = ' ||
                              hex((addr(old_s) -> based_fb15), 4) ||
                              ' new status = ' ||
                              hex((addr(new_s) -> based_fb15), 4));
     iop$save_p_status = new_s;
     return;                        /* for now */

     difs = (old_s | new_s) & ^(old_s & new_s);   /* XOR */
     changes = 'PBUS STATUS: ';
     do i = 1 to 16;
          if addr(difs) -> difs_bits(i)
               then if addr(old_s) -> difs_bits(i)
                         then changes = changes;
                         else changes = changes;
          end;
     call iop$panic_syserr(changes);
 end iop$report_pbus_status;
 /*   ***begin copyright*** ******************************  */
 /*                                                         */
 /*   STRATUS CONFIDENTIAL INFORMATION: CLASS II            */
 /*   COPYRIGHT (c) Stratus Computer, Inc. 1986             */
 /*                                                         */
 /*   This  program  contains  confidential and proprietary */
 /*   information  of  Stratus Computer,  Inc.,   and   any */
 /*   reproduction,  disclosure, or use in whole or in part */
 /*   is   expressly   prohibited,   except   as   may   be */
 /*   specifically authorized by prior written agreement or */
 /*   permission of Stratus.                                */
 /*                                                         */
 /*   ***end copyright*** ********************************  */

 /* Beginning of modification history */
 /* Written August 1986 by Alex Tatarinov. */
 /* Modified 87-04-06 by Alex Tatarinov to add EXTENDED_STATUS support and
      improve error reporting. */
 /* Modified 87-04-23 by Alex Tatarinov to clear cmd status and tally
      when moving minor command to ICA buffer. */
 /* Modified 87-04-27 by Alex Tatarinov to not stop on a soft (correctable)
    error. These kind of errors just reported by VOS and not retried. */
 /* Modified 87-05-11 by Alex Tatarinov to fix a synchronization problem
    between processing VOS and ICA. Fixes iop-95. */
 /* Modified 87-05-18 by Alex Tatarinov to issue RESET_CP_PTRS after
    STOP_CHANNEL is done. Fixes iop-103. */
 /* Modified 87-05-28 by Alex Tatarinov to get SCSI config tables at
      INITIALIZE_CONTROLLER time rather than at ADD_SLOT time, since the
      adaptor might not be running yet. Fixes iop-102. */
 /* Modified 87-06-11 by Alex Tatarinov to not wait for IOA if it is not
      ready. */
 /* End of modification history */

 iop_ctape_entity: procedure recursive;

 /* replace */

 %replace TRUE         by '1'b;
 %replace FALSE        by '0'b;

 %replace STOPPED      by   0;
 %replace READY        by   1;
```

```
%replace TAPE_MAX_CHANNELS          by  4;    /* max assignable chans */
%replace INITIAL_TAPE_LIMIT         by  1;    /* initial limit for vos sends */
%replace ONE_PAGE                   by  1;
%replace IOA_CMD_SIZE               by 24;

%replace RESET_CP_PTRS              by 5;
%replace NULL_CMDx                  by 'ff'b4;
%replace NULL_CMDd                  by 255;

%replace JIFFIES_PER_SECOND         by 65536;

/* parameters */

dcl  a_log_chan                     fixed bin (15);
dcl  a_data_16                      fixed bin (15);
dcl  a_data_32_1                    fixed bin (31);
dcl  a_data_32_2                    fixed bin (31);
dcl  a_ret_code                     fixed bin (31);
dcl  a_func_code                    fixed bin (15);
dcl  a_slot_no                      fixed bin (15);
dcl  a_bit16                        bit (16) aligned;

%page;
/* automatic */

dcl  addrp                          ptr;
dcl  cmd_name                       char(9);
dcl  cmtrp                          ptr;
dcl  code                           fixed bin (15);
dcl  data1_size                     fixed bin (31);
dcl  data2_size                     fixed bin (31);
dcl  data_16                        fixed bin (15);
dcl  data_32_1                      fixed bin (31);
dcl  data_32_2                      fixed bin (31);
dcl  datap                          ptr;
dcl  dep_data                       fixed bin (31);
dcl  done                           bit(1) aligned;
dcl  first_time                     bit(1) aligned;
dcl  func_code                      fixed bin (15);
dcl  i                              fixed bin (15);
dcl  inc_data                       fixed bin (31);
dcl  intrpt_code                    fixed bin (15);
dcl  ioa_data_addr                  fixed bin (31);
dcl  ioa_data_size                  fixed bin (31);
dcl  ioa_ptr                        ptr;
dcl  ioa_slot                       fixed bin (15);
dcl  ioa_subchannel                 fixed bin (15);
dcl  ioa_tolp                       fixed bin (15);
dcl  iop_no                         fixed bin (15);
dcl  iop_slot                       fixed bin (15);
dcl  log_chan                       fixed bin (15);
dcl  mapped_ptr                     ptr;
dcl  my_chan                        fixed bin (15);
dcl  ptrx                           ptr;
dcl  scsi_id                        fixed bin (15);
dcl  slot_no                        fixed bin (15);
dcl  smtrp                          ptr;
dcl  vos_cmd_addr                   fixed bin (31);
dcl  vos_addr                       fixed bin (31);
dcl  vos_ptr                        ptr;


%page;
/* include */
/* %include 'global_tape_constants'; */
/* Begin global_tape_constants.incl.pl1   81-02-20 */

/* This include file describes the global constants used by the
   tape control software. */

%replace VERSION_NO                 by 1;
%replace NO_PREVIOUS                by -1;
%replace TRUE                       by '1'b;
%replace FALSE                      by '0'b;
```

```
%replace HIGH                        by '1'b;
%replace LOW                         by '0'b;
%replace CMD_SIZE                    by 12;
%replace WAIT_TIME                   by 10240; /* 10 secs */

     /*  Block type codes. */

%replace TPCB_ID                     by 'WT';
%replace TPIA_ID                     by 'TI';
%replace TCE_ID                      by 'TO';
%replace TPPT_ID                     by 'TB';
%replace TPGM_ID                     by 'TM';

     /*  tape control states  */

%replace NO_PREVIOUS_STATE             by 0;
%replace PUT_DATA_IN_BUFFER_STATE      by 1;
%replace GET_DATA_FROM_BUFFER_STATE    by 2;
%replace WRITE_STATE                   by 3;
%replace READ_STATE                    by 4;
%replace ALLOBLK_STATE                 by 5;
%replace CONTROL_STATE                 by 6;

     /* tape control actions  */

%replace PUT_DATA_IN_BUFFER_ACTION     by 1;
%replace GET_DATA_FROM_BUFFER_ACTION   by 2;
%replace WRITE_ACTION                  by 3;
%replace READ_ACTION                   by 4;
%replace ALLOBLK_ACTION                by 5;
%replace POSITION_DATA_ACTION          by 6;
%replace CONTROL_ACTION                by 7;
%replace SET_BLOCK_SIZE_ACTION         by 8;

     /* tape controller major commands */

%replace INITIALIZE_CONTROLLER       by 1;
%replace START_CHANNEL               by 2;
%replace STOP_CHANNEL                by 3;
%replace UNINITIALIZE_CONTROLLER     by 4;

     /* minor commands for tape controller */

%replace TERMINATE                 by '00'b4;
%replace READ_FORWARD              by '01'b4;
%replace WRITE_FORWARD             by '02'b4;
%replace WRITE_FILEMARK            by '03'b4;
%replace ERASE_FIXED_LEN           by '04'b4;
%replace SECURITY_ERASE            by '05'b4;
%replace SPACE                     by '06'b4;
%replace SEARCH                    by '07'b4;
%replace TRANSFER                  by '08'b4;
%replace IDLE                      by '09'b4;
%replace REWIND                    by '0a'b4;
%replace UNMOUNT                   by '0b'b4;
%replace SET_HIGH_SPEED            by '0c'b4;
%replace SET_LOW_SPEED             by '0d'b4;
%replace SET_HIGH_DENSITY          by '0e'b4;
%replace SET_LOW_DENSITY           by '0f'b4;
%replace GET_EXTENDED_STATUS       by '10'b4;
%replace SET_DENSITY               by '11'b4;
%replace BACKSPACE_ERASE           by '12'b4;
%replace ADJUST                    by '13'b4;
%replace GET_CONFIG_STATUS         by '14'b4;  /* T250 drive only */

     /* minor commands */

%replace STOP_                     by 0;
%replace READ_FORWARD_             by 1;
%replace WRITE_FORWARD_            by 2;
%replace WRITE_FILEMARK_           by 3;
%replace ERASE_FIXED_LEN_          by 4;
%replace SECURITY_ERASE_           by 5;
%replace SPACE_                    by 6;

%replace MIN_PGM_CMD               by    1;

%replace MIN_CONTROL_CMD           by    3;
```

```
%replace SEARCH_                by 7;
%replace TRANSFER_              by 8;
%replace IDLE_                  by 9;
%replace REWIND_                by 10;
%replace UNMOUNT_               by 11;
%replace SET_HIGH_SPEED_        by 12;
%replace SET_LOW_SPEED_         by 13;
%replace SET_HIGH_DENSITY_      by 14;
%replace SET_LOW_DENSITY_       by 15;
%replace GET_EXTENDED_STATUS_   by 16;
%replace SET_DENSITY_           by 17;
%replace BACKSPACE_ERASE_       by 18;
%replace ADJUST_                by 19;
%replace GET_CONFIG_STATUS_     by 20;
%replace MAX_CONTROL_CMD        by 20;
%replace MAX_PGM_CMD            by 20;

%replace CONTROL_               by 21; /* any tape control operation. */

/* error codes to hardware log. */

%replace CORRECTABLE_ERROR     by '01';
%replace RECOVERABLE_ERROR     by '02';
%replace UNRECOVERABLE_ERROR   by '03';

/* tape operator states */

%replace  OP_CHAIN_EMPTY              by   -1;
%replace  OP_NOT_COMPLETED            by    0;
%replace  OP_COMPLETED                by    1; /* op at start of op_chain */
%replace  OP_NOT_COMPLETED_EOF        by    2;
%replace  OP_COMPLETED_EOF            by    3;
%replace  OP_NOT_COMPLETED_EOT        by    4;
%replace  OP_COMPLETED_EOT            by    5;
%replace  OP_NOT_COMPLETED_EOF_EOT    by    6;
%replace  OP_COMPLETED_EOF_EOT        by    7;

/* End include file global_tape_constants.incl.pl1 */
%page;
/* %include 'tape_cntrl_constants'; */

/* tape_cntrl_constants      *********************** */

%replace MAX_DEFERRED_WRITES by 512;
%replace MAX_RETRY           by 10;
%replace MAX_WRITE_RETRY     by 48;
%replace NO                  by 0;
%replace NULL                by 0;
%replace PAGES_99            by 99;
%replace PAGES_16            by 16;
%replace C_SIZE              by 682; /* 8K of command area */
%replace RETRY               by 2;
%replace VERSION_NO_2        by 2;
%replace YES                 by 1;
%replace APPEND_IDLE         by 1;
%replace APPEND_STOP         by 2;
%replace APPEND_NOTHING      by 3;
%replace BACKSPACE_COUNT     by 9;

/* control, read and write state values */

%replace FIRST_STATE         by 1;

%replace NULL_STATE          by 1;
%replace DRIVE_TYPE_CHK      by 2;
%replace REWIND_WAIT         by 3;
%replace LOAD_PT_CHK         by 4;
%replace AUTO_LOW_CHK        by 5;
%replace AUTO_LOW_WAIT       by 6;
%replace AUTO_HIGH_CHK       by 7;
%replace AUTO_HIGH_WAIT      by 8;
%replace CONTROL             by 9;
%replace DEFERRED_WRITE      by 10;
%replace READ_AHEAD          by 11;
```

```
%replace DONE              by 12;
%replace WAIT_REG          by 13;
%replace CORRECTABLE       by 14;
%replace COMPLETED         by 15;
%replace ERROR             by 16;
%replace EXECUTING         by 17;
%replace MANUAL_DENSITY    by 18;
%replace DRIVE_TYPE_WAIT   by 19;
%replace CLEANING          by 20;
%replace CLEAN_WAIT        by 21;
%replace CLEAN_ABORT       by 22;
%replace REPOSITIONING     by 23;
%replace REPOSITION_WAIT   by 24;
%replace REPOSITION_ABRT   by 25;
%replace ABORTED_CLEAN     by 26;
%replace ABORTED_REPOS     by 27;
%replace ABORTED_RDWR      by 28;

%replace END_STATE         by 28;

/* submit_cmd parameters */

%replace null_addr         by '00000000'b4;
%replace nic               by '1'b;
%replace soe               by '1'b;
%replace ioc               by '1'b;

/* minor commands  (same as global_tape_constants.incl less appended '_') */

%replace READ              by 1;
%replace WRITE             by 2;
%replace FILEMARK          by 3;
%replace ERASE             by 4;
%replace UNLOAD            by 11;
%replace HIGH_SPEED        by 12;
%replace LOW_SPEED         by 13;
%replace HIGH_DENSITY      by 14;
%replace LOW_DENSITY       by 15;
%replace READ_EXTND        by 16;
%replace STOP_LIST         by 17;
%replace READ_CONFIG       by 20;

/* block names (same as block_type_names.incl.pl1)     */

%replace CMD_AREA          by 'MC';       /* command area                */
%replace BLOCK_Q           by 'BQ';       /* block set pointer queue     */
%replace BLOCK_SET         by 'TS';       /* indicates a block set       */
%replace DRIVE_TB          by 'TD';       /* drive characteristics       */
%replace QUEUE             by 'QP';       /* command pointer queue       */
%replace PAGE_SET          by 'TP';       /* page set list               */
%replace STATUS            by 'TM';       /* tape scratch/error buffer */
%replace TPCB              by 'TB';       /* tape control block          */

/* end of tape_cntrl_constants ************************* */
%page;
/* %include 'tape_command'; */
/* Begin include file tape_command.incl.pl1   81-02-17 */

/* This include file describes the format of a minor command
   used by the tape controller. */

dcl cmdp                        ptr;

dcl 1 command                   based(cmdp),
      4 type                    bit(8),

/*

      -----------------------------------------------------------------
      |       |       |       |       |       |       |       |       |
      |   7   |   6   |   5   |   4   |   3   |   2   |   1   |   0   |
      |       |       |       |       |       |       |       |       |
      -----------------------------------------------------------------

*/
```

```
4 control,
 5 mbz                        bit(2),            /* 7,6 */
 5 stop_on_eot                bit(1),            /* 5 */
 5 next_is_continued          bit(1),            /* 4 */
 5 interrupt_on_completion    bit(1),            /* 3 */
 5 stop_on_error              bit(1),            /* 2 */
 5 interrupt_on_error         bit(1),            /* 1 */
 5 no_data_transfer           bit(1),            /* 0 */

4 status,
 5 eot                        bit(1),            /* 7 */
 5 filemark_found             bit(1),            /* 6 */
 5 file_protect               bit(1),            /* 5 */
 5 mbz                        bit(3),            /* 4-2 */
 5 record_longer_than_buffer  bit(1),            /* 1 */
 5 io_completed               bit(1),            /* 0 */

      /* error info */
 5 correctable_error          bit(1),           /* 7 */
 5 hard_error                 bit(1),           /* 6 */
 5 parity_error               bit(1),           /* 5 */
 5 read_after_write_error     bit(1),           /* 4 */
 5 bad_data_written           bit(1),           /* 3 */
 5 code                       bit(3),           /* 2-0 */

/* code -

    0 - No error.
    1 - No id burst (normal for 3200bpi mode )
    2 - Drive not ready.
    3 - Tape file protected, tried to write.
    4 - Minor command not recognized.
    5 - Over/under run error.
    6 - Frame under/over run error.
    7 - Big IRG or blank tape.

*/

4 count                       fixed bin(15),
4 tally                       fixed bin(15),
4 address                     bit(32) aligned,
4 next_dcw                    char(0) aligned;

/* End include file tape_command.incl.pl1 */
%page;
/* %include 'tape_mbx'; */
/* Begin include file  tape_mbx.incl.pl1   80-12-04 */

/* This include file contains the declaration for the tape
   controller mailbox region (understood by the tape controller
   board). */

declare   tape_mbxp            ptr;

declare 1 tape_mbx             based (tape_mbxp),
/* %include 'tape_mbx_inner.incl.pl1'; */

/*        This include file should NOT be modified unless
          the tape controller software is also changed.      */

          4 lock_address        bit (32) aligned,   /* physical address of the cor
oller lock %*/
          4 vector_number       fixed bin (15),     /* interrupt vector number %*
          4 global_status,

           /* left byte */

           5 eot                 bit(1),            /* 7 */
           5 speed               bit(1),            /* 6 */
           5 write_protect       bit(1),            /* 5 */
           5 load_pt             bit(1),            /* 4 */
           5 on_line             bit(1),            /* 3 */
           5 high_density        bit(1),            /* 2 */
           5 page_straddle_error bit(1),            /* 1 */
```

```
        5 major_command_error bit(1),              /* 0 */

        /* right byte */
        5 cmd_busy              bit(1),
        5 rmbz                  bit(7),

      4 event_id             fixed bin(31),
      3 dummy               bit(0);
/* End include file tape_mbx.incl.pl1 */
%page;
/* %include 'iop_ctape_constants'; */
/* BEGIN INCLUDE FILE  iop_ctape_constants.incl.pl1 */

/* Minor commands */

dcl cmd_table(0:20)   char(8) static init( 'TERMINAT',
                                           'READ',
                                           'WRITE',
                                           'WRITEFMK',
                                           'ERASEFLN',
                                           'SECERASE',
                                           'SPACE   ',
                                           'SEARCH  ',
                                           'TRANSFER',
                                           'IDLE    ',
                                           'REWIND  ',
                                           'UNMOUNT ',
                                           'HISPEED ',
                                           'LOSPEED ',
                                           'HI DEN  ',
                                           'LO DEN  ',
                                           'EXT_STAT',
                                           'STOP',
                                           '',
                                           '',
                                           'READ_CFG');

dcl  scsi_phases(0:7)    char (16) static init('DATA OUT',
                                               'DATA IN',
                                               'COMMAND',
                                               'STATUS',
                                               'UNSPEC INFO OUT',
                                               'UNSPEC INFO IN',
                                               'MSG OUT',
                                               'MSG IN');

dcl  scsi_cmds(0:27)     char(16) static init('TEST UNIT READY',
                                             'REWIND',
                                             'INVALID',
                                             'REQUEST SENCE',
                                             'INVALID',
                                             'READ BLOCK LIMIT',
                                             'INVALID',
                                             'INVALID',
                                             'READ',
                                             'INVALID',
                                             'WRITE',
                                             'INVALID',
                                             'INVALID',
                                             'INVALID',
                                             'INVALID',
                                             'INVALID',
                                             'WRITE FILEMARK',
                                             'SPACE',
                                             'INQUIRY',
                                             'VERIFY',
                                             'RECOVER DATA',
                                             'MODE SELECT',
                                             'RESERVE UNIT',
                                             'RELEASE UNIT',
                                             'INVALID',
                                             'ERASE',
                                             'MODE SENCE',
                                             'LOAD/UNLOAD');
```

```
dcl  sence_keys(0:13)    char(16) static init('NO SENCE',
                                        'RECOVERABLE ERR',
                                        'NOT READY',
                                        'MEDIA ERROR',
                                        'HARDWARE ERROR',
                                        'ILLEGAL REQUEST',
                                        'UNIT ATTENTION',
                                        'DATA PROTECTION',
                                        'END OF DATA',
                                        'VENDOR KEY',
                                        'RESERV KEY1',
                                        'ABORTED CMD',
                                        'EQUAL',
                                        'VOLUME OVERFLOW');

/* END INCLUDE FILE  iop_ctape_constants.incl.pl1 */
/* %include 'iop_common_entity_defs'; */
%replace MAX_CMD_CODE                by  127;
%replace MIN_CMD_CODE                by  1;
%replace ERROR_ID                    by  128;
%include 'iop_config_codes';  /* configuration codes */
%include 'iop_constants';     /* various handy data items */
%include 'iop_equip_table';   /* equip table configuration */
%page;
/* %include 'scsi_config_tables'; */
/* Begin include file ... scsi_config_tables.incl.pl1  87-02-04 */

/* Note -> ioa memory location scsi_configs contains a
   pointer to scsi_config_ptr_tbl .... scsi_configs is
   located at address SCSI_CONFIG_OFFSET  ( see below )  */

/* The scsi_config_ptr_tbl is a table containing  pointers to
   a unique  configuration table for each of the 8 possible
   scsi controllers on the scsi bus ...
   A null pointer indicates a controller with that id number
   does not exsit on the scsi bus  ...                          */

%replace  MIN_SCSI_ID          by 0 ;
%replace  MAX_SCSI_ID          by 7 ;
%replace  SCSI_CONFIG_OFFSET   by 260; /* user vector 65 ( loc 104x ) in exception
ctor table */

dcl  scsi_config_ptr_table_ptr ptr;
dcl  1 scsi_config_ptr_table  based( scsi_config_ptr_table_ptr ),
        2 id(MIN_SCSI_ID:MAX_SCSI_ID) ptr ;

dcl  scsi_config_table_ptr    ptr;
dcl  1 scsi_config_table      based( scsi_config_table_ptr ),
        2 cdb_ptr             ptr, /* ptr to command descripter block */
        2 data_ptr            ptr, /* ptr to data block               */
        2 status_ptr          ptr, /* ptr to status block             */
        2 msg_ptr             ptr, /* ptr to message block            */
        2 request_sence_ptr   ptr, /* ptr to last request_sence block */
        2 error_code_ptr      ptr, /* ptr to error code               */
        2 mbx_ptr             ptr, /* ptr to device's unique mailbox  */
        2 ext_ptr             ptr, /* device unique configuration info */
        2 cur_phase           bin(15),/* current phase                */
        2 prev_phase          bin(15),/* previous phase               */
        2 scsi_rev            char(1), /* scsi revision */
        2 device_type         bit(8),  /* device type ie. sequential  */
        2 status,
           3 active           bit(1), /* alive on bus                     */
           3 selected         bit(1), /* currently exicuting a command */
           3 disconnected     bit(1), /* disconnected while exicuting a command *
           3 int              bit(1), /* Interrupt issued for this device */
           3 reserved         bit(1), /* Controller has been reserved */
           3 rmb              bit(1), /* Media is removeable          */
           3 pad              bit(2),
        2 debug_sw            bin(15),/* Debugging flag               */
        2 debug_bk            bin(15) ;

%replace DEBUG_STOP   by -1 ;
%replace DEBUG_GO     by  0 ;
```

```
/* The following is the scsi ioa status table.
   It is layed over the ioa_mbx.status area        */

%replace  SCSI_IOA_MAILBOX_OFFSET  by 264 ; /* or 108x in exception vector table *

dcl scsi_ioa_status_ptr  ptr ;

dcl 1 scsi_ioa_status              based( scsi_ioa_status_ptr ),
        2 diag_cmd_issued          bit(1),
        2 pad                      bit(31) ;

/* End include file ... scsi_config_table.incl.pl1  87-02-04 */
/* %include 'scsi_qctape_config_ext'; */
/* Begin include file scsi_qctape_config_ext.incl.pl1 ... 87-05-27 */

dcl  qctape_info_ptr      ptr ;
dcl  1 qctape_info        based( qctape_info_ptr ),
       2 alignment        char(0),
       2 cp,                       /* channel program list            */
         3 top            ptr,     /* ptr to start of cp list         */
         3 bot            ptr,     /* ptr to bottom of cp list        */
         3 free           ptr,     /* ptr to start of free area       */
         3 pend           ptr,     /* ptr to start of pended area     */
         3 cmplt          ptr,     /* ptr to start of complete  area  */
       2 data,                     /* data buffer is circular         */
         3 top            ptr,     /* ptr to top of data area         */
         3 bot            ptr,     /* ptr to bottom of data buffer    */
         3 free           ptr,     /* ptr to start of free area       */
         3 pend           ptr,     /* ptr to start of pended area     */
         3 cmplt          ptr,     /* ptr to start of complete area   */
       2 read_buff,                /* read buffer - temp storage      */
         3 read_buffer_ptr    ptr, /* */
         3 cur_valid_data_ptr ptr, /* pointer to start of valid data  */
         3 max_valid_data_ptr ptr, /* pointer to end of valid data    */
         3 cur_cp_buff_ptr    ptr, /* pointer to current position in cp buffer */
         3 requested_byte_count bin(15),
         3 remaining_requested_byte_count bin(15),
         3 valid_byte_count bin(15),
         3 remaining_valid_byte_count bin(15),
         3 transfer_byte_count bin(15),
         3 status,
           4 start_of_record_encountered      bit(1),
           4 position_at_end_of_logical_block bit(1),
           4 end_of_linked_cp                 bit(1),
           4 early_warning                    bit(1),
           4 encountered_filemark             bit(1),
           4 end_of_recorded_media_detected   bit(1),
           4 prev_read_encountered_erm        bit(1),
           4 prev_read_encountered_filemark   bit(1),
           4 no_data_detected                 bit(1),
           4 init_tape_drive                  bit(1),
           4 processing_channel_program_list  bit(1),
           4 drive_rewinding                  bit(1),
           4 scsi_bus_parity_error            bit(1),
           4 cartridge_not_in_drive           bit(1),
           4 soft_error_detected              bit(1),
           4 pad                              bit(1),
       2 current_cp_ptr                       ptr,
       2 previous_cp_ptr                      ptr,
       2 extended_status_ptr                  ptr ;;

/* End include file scsi_tape_config_ext.incl.pl1 ... 87-05-27 */
/* %include 'scsi_tape_cp'; */
/* Begin include file scsi_tape_cp.incl.pl1 ... created 86-10-02 */

/* This file describes the format of an iop and scsi ioa minor    */
/* command channel program list and channel program structure .. */

/* Following is scsi tape (ioa) cp list */

%replace MIN_IOA_CP           by 01 ;
%replace MAX_IOA_CP           by 10 ;

dcl  1 ioa_cp_list                       based,
```

```
            2 alignment                      char (0) aligned,  /* Alignment */
            2 cp (MIN_IOA_CP:MAX_IOA_CP)     like ioa_cmd_tmpl ;

  dcl  current_cp_ptr              ptr ;
  dcl  1 cp                        based( current_cp_ptr )
                                   like ioa_cmd_tmpl ;

  /* Following is ioa cp structure */

  dcl  1 ioa_cmd_tmpl              based,
           2 alignment             char(0),
           2 minor_cmd             like command,
           2 vos_cp_addr           ptr,        /* ptr to vos cp */
           2 ioa_data_addr         ptr,
           2 next_cp_addr          ptr ;       /* ptr to next ioa  cp */


  /* End include file scsi_tape_cp.incl.pl1 ... created 86-10-02 */
  /* %include 'scsi_tmbx'; */
  /* Begin include file scsi_tmbx ... created 86-12-16 */
  /* Defines scsi cartridge tape mailbox */

  %replace MIN_INTRPT_CODE               by 0;
  %replace INVALID_INTRPT                by 0;
  %replace IDLE_INTRPT                   by 1;
  %replace CMPLT_INTRPT                  by 2;
  %replace TMBX_STATUS_INTRPT            by 3;
  %replace FILEMARK_DETECTED_INTRPT      by 4;
  %replace MAX_INTRPT_CODE               by 4;

  dcl  scsi_tmbxp                        ptr;
  dcl  1 scsi_tmbx                       based(scsi_tmbxp),
         2 aligned                       char(0) aligned,
         2 cmd                           char(1),       /* major command mailbox */
         2 int_code                      char(1),
         2 int_conditions,
            3 interrupt_on_idle          bit (1), /* when no more pended commands */
            3 interrupt_on_cmplt         bit (1), /* when a command is completed */
            3 pad                        bit (6),
         2 tape_status,
            3 eot                        bit (1),
            3 mbz1                       bit (1),
            3 write_protected            bit (1),
            3 bot                        bit (1),
            3 on_line                    bit (1),
            3 mbz2                       bit (2),
            3 major_cmd_error            bit (1);


  /* End of include file scsi_tmbx ... created 86-12-16 */

  /* %nolist; %include 'iop_error_codes'; %list; */
  /* %nolist; %include 'syserr_codes'; %list; */
  /* Begin include file syserr_codes.incl.pl1 81-9-8 */

  /* This include file contains the definitions of the various syserr
     codes to be used when calling syserr. The  codes should be added
     together to form the desired combination. */

  declare   syserr_action_ptr ptr;

  declare 1 syserr_action based (syserr_action_ptr),
          2 mbz                  bit (10),
          2 signal_kernelerror   bit (1),
          2 security_log         bit (1),
          2 hardware_error       bit (1),
          2 obsolete             bit (1), /* was overseer_log */
          2 cont_display         bit (1),
          2 crash                bit (1);

  %replace  SYSERR_WARN                     by 0;
  %replace  SYSERR_CRASH                    by 1;
  %replace  SYSERR_CONT_DISPLAY             by 2;
  %replace  SYSERR_HARDWARE_ERROR_LOG       by 8;
```

```
%replace  SYSERR_SECURITY_LOG          by 16;
%replace  SYSERR_SIGNAL_KERNELERROR    by 32;

/* End include file syserr_codes.incl.pl1 */

%page;
/* based */

dcl  1 addr_based                      based (addrp),
       2 alignment                     char(0) aligned,
       2 pad                           char (1),
       2 page_no                       bit (12),
       2 offset                        bit (12);

dcl  bin31_based                       fixed bin (31) based;
dcl  bit32_based                       bit (32) aligned based;

dcl  1 bin15_based                     based,
       2 bin15_1                       fixed bin (15),
       2 bin15_2                       fixed bin (15);

dcl  basedptr                          ptr based;
dcl  char1_based                       char(1) based;
dcl  ioa_infop                         ptr;
dcl  1 ioa_info                        based (ioa_infop),
       2 config_tablep                 ptr,
       2 tape_infop                    ptr,
       2 scsi_tmbxp                    ptr,
       2 cp,                                /* channel program list           */
         3 top                         ptr, /* ptr to start of cp list        */
         3 bot                         ptr, /* ptr to bottom of cp list       */
         3 free                        ptr, /* ptr to start of free area      */
         3 cmplt                       ptr, /* ptr to start of complete  area */
       2 data,                              /* data buffer is circular        */
         3 top                         ptr, /* ptr to top of data area        */
         3 bot                         ptr, /* ptr to bottom of data buffer   */
         3 free                        ptr, /* ptr to start of free area      */
         3 cmplt                       ptr, /* ptr to start of complete area  */
       2 restart_cmd_addr              fixed bin (31),
       2 data_shiftp                   ptr,
       2 flags,
         3 cp_buffer_empty             bit (1),
         3 cp_buffer_full              bit (1),
         3 data_buffer_full            bit (1),
         3 callback_queued             bit (1),
         3 ioa_stopped                 bit (1),
         3 vos_stopped                 bit (1),
         3 pad                         bit (10);

dcl  current_configp                   ptr;
dcl  1 current_config                  based(current_configp)
                                       like scsi_config_table;

dcl  tape_infop                        ptr;
dcl  1 tape_info                       based (tape_infop) like qctape_info;

dcl  ioa_cmdp                          ptr;
dcl  1 ioa_cmd                         based (ioa_cmdp) like ioa_cmd_tmpl;

%page;
/* static */

dcl  legal_command (MIN_CMD_CODE : MAX_CMD_CODE ) bit (1) internal static;
dcl  tape_global_state                 fixed bin (15) internal static;

dcl  tape_limit                  fixed bin (15) internal static;
dcl  1 tape_slot_tab (0 : NUM_OF_SLOTS ) internal static,
      2 status,
          3 known          bit (1),
          3 initialized    bit (1),
          3 pad            bit (14),
      2 chx                fixed bin (15);
```

```
dcl  1 tape_chan_tab (TAPE_MAX_CHANNELS) internal static,
       2 status,
           3 known          bit (1),
           3 initialized    bit (1),
           3 pad            bit (14),
       2 log_chan           fixed bin (15),
       2 ioa_slot           fixed bin (15),
       2 ioa_subchannel     fixed bin (15),
       2 vos_mbxp           ptr,
       2 ioa_data           like ioa_info;

%page;
/* entries */

%include 'iop_command_calls'; /* entries and defs for command ring usage */
%include 'iop_utility_calls'; /* various iop utility defs and entries */
%include 'iop_tasking_calls'; /* callback entries for timed wait and bgnd */
%include 'iop_mapper_calls';  /* entries for mapping */
%include 'iop_transfer_calls';/* entries for data transfer */

/* %nolist; %include 'bif_dcls'; %list; */
/* BEGIN INCLUDE FILE ... bif_dcls.incl.pl1 */

/* These are documented in >lcd>sed>sec-58.  */

declare   addrel    builtin;
declare   after     entry (char (*) var in, char (*) var in)
                    returns (char (256) var);
declare   arglistptr entry returns (ptr);
declare   before    entry (char (*) var in, char (*) var in)
                    returns (char (256) var);
declare   bytesize builtin;
/*   break  is gone.  Use the scaneq builtin.  */
/*   breakf is gone.  Use the scaneq builtin.  */
declare   codeptr   entry (entry in) returns (ptr);
/*   count  is gone.  Use the scanne builtin.  */
/*   countf is gone.  Use the scanne builtin.  */
declare   displayptr entry (entry in) returns (ptr);
declare   hash      entry (char (*) var in, bin (15) in)
                    returns (bin (15));
declare   hex       entry (bin (31) in, bin (15) in)
                    returns (char (8) var);
declare   hex_dump  entry (char (*) in, bin (15) in, bin (15) in)
                    returns (char (256) var);
declare   hexp      entry (ptr in, bin (15) in) returns (char (8) var);
declare   hexs      entry (char (*) in, bin (15) in)
                    returns (char (256) var);
declare   ltrim     builtin;
declare   maxlength builtin;
declare   occurs    entry (char(*) var in, char(*) var in)
                    returns(fixed bin);
declare   ptr       builtin;
declare   quote     entry (char (*) var in) returns (char (256) var);
/*   rbreak and rbreakf are obsolete.  Use rscaneq or rscaneqf.  */
declare   rbreak    entry (char (*) var in, char (*) var in)
                    returns (bin (15));
declare   rbreakf   entry (char (*) in, char (*) var in)
                    returns (bin (15));
/*   rcount and rcountf are obsolete.  Use rscanne or rscannef.  */
declare   rcount    entry (char (*) var in, char (*) var in)
                    returns (bin (15));
declare   rcountf   entry (char (*) in, char (*) var in)
                    returns (bin (15));
declare   rel       builtin;
declare   reverse   entry (char (*) var in) returns (char (256) var);
declare   reverseb  entry (bit (*));
declare   rindex    entry (char (*) var in, char (*) var in)
                    returns (bin (15));
declare   rscaneq   entry (char (*) var in, char (*) var in)
                    returns (bin (15));
declare   rscaneqf  entry (char (*) in, char (*) var in)
                    returns (bin (15));
declare   rscanne   entry (char (*) var in, char (*) var in)
                    returns (bin (15));
```

```
declare   rscannef  entry (char (*) in, char (*) var in)
                    returns (bin (15));
declare   rtrim     builtin;
declare   search    builtin;
declare   stackframeptr entry returns (ptr);
declare   staticptr entry (entry in) returns (ptr);
declare   unhex     entry (char (*) var in, bin (31), bin (15));
declare   unquote   entry (char (*) var in) returns (char (256) var);

/* END INCLUDE FILE ... bif_dcls.incl.pl1 */

declare   iop$select_adapter  entry (fixed bin (15), fixed bin (15));
declare   iop_debug$define_entity_command entry (entry, fixed bin(15));
declare   iop_debug entry;

%page;
/************************************/
/****                          ****/
/**** COMMAND PROCESSING SECTION ****/
/****                          ****/
/************************************/
ctape_entity_command: entry (a_log_chan, a_func_code, a_data_16,
                             a_data_32_1, a_data_32_2);

     log_chan = a_log_chan;
     func_code = a_func_code;
     data_16 = a_data_16;
     data_32_1 = a_data_32_1;
     data_32_2 = a_data_32_2;

     code = 0;

     if tape_global_state ^= READY          /* ready for commands? */
     then do;
          call cmd_err(e$iop_entity_not_ready, 0);
          return;
          end;
/* check for known channel ie. one that the ES has told us about */

     if ^find_chx(log_chan, my_chan)
     then do;
          call cmd_err(e$iop_invalid_log_chan_no, bin(log_chan, 31));
          return;
          end;

/* check for legal command */

     if func_code < MIN_CMD_CODE | func_code > MAX_CMD_CODE
     then do;
          call cmd_err(e$iop_invalid_command, bin(func_code, 31));
          return;
          end;

     if ^legal_command(func_code)
     then do;
          call cmd_err(e$iop_unsupported_function, bin(func_code, 31));
          return;
          end;

     ioa_slot = tape_chan_tab (my_chan).ioa_slot;

     on error
          begin;
          code = oncode();
          tape_slot_tab(ioa_slot).status.initialized = FALSE;
          tape_chan_tab(my_chan).status.initialized = FALSE;
          goto CMD_RETURN;
          end;

     call setup;

     call iop$select_adapter (ioa_slot, code);
     if code ^= 0
     then do;
```

```
        call rpterr ('Can not select adapter.', SYSERR_WARN);
        goto CMD_RETURN;
        end;

    goto tape_executor(func_code);

CMD_RETURN:

    if code ^= 0
    then call rpterr ('Code ' || bin_to_char((code)), SYSERR_WARN);
    return;

%page;
tape_executor(INITIALIZE_CONTROLLER)::

/* Get SCSI config tables */

    scsi_config_ptr_table_ptr=addrel(addrel(ptr(SCSI_CONFIG_OFFSET),
                          START_ADAPT_MEM)->baseaptr,START_ADAPT_MEM);

    current_configp = addrel(scsi_config_ptr_table.id(0),START_ADAPT_MEM);
    tape_infop =  addrel(current_config.ext_ptr,START_ADAPT_MEM);
    ioa_infop = addr(tape_chan_tab(tape_slot_tab(ioa_slot).chx).ioa_data);
    ioa_info.cp.top = tape_info.cp.top;
    ioa_info.cp.bot = tape_info.cp.bot;
    ioa_info.data.top = tape_info.data.top;
    ioa_info.data.bot = tape_info.data.bot;

    ioa_info.config_tablep = current_configp;
    ioa_info.tape_infop =  tape_infop;
    ioa_info.scsi_tmbxp = addrel(current_config.mbx_ptr,START_ADAPT_MEM);
    ioa_info.callback_queued = FALSE;

/* Forward to IOA */
    scsi_tmbxp = ioa_info.scsi_tmbxp;
    scsi_tmbx.cmd = byte(INITIALIZE_CONTROLLER);

/* Map VOS tape mailbox. */
    call map_vos_mem (data_32_1, tape_mbxp, code);
    tape_chan_tab(my_chan).vos_mbxp = tape_mbxp;

    goto CMD_RETURN;

%page;
tape_executor(START_CHANNEL)::

    ioa_info.restart_cmd_addr = data_32_1;     /* vos cmd physical address */
    ioa_info.cp.free = ioa_info.cp.top;
    ioa_info.cp.cmplt = ioa_info.cp.top;
    ioa_info.data.free = ioa_info.data.top;
    ioa_info.data.cmplt = ioa_info.data.top;
    ioa_info.data_buffer_full = FALSE;
    ioa_info.cp_buffer_empty = TRUE;
    ioa_info.cp_buffer_full = FALSE;
    ioa_info.ioa_stopped = FALSE;
    ioa_info.vos_stopped = FALSE;
    ioa_info.data_shiftp = null();

    scsi_tmbx.cmd = byte(START_CHANNEL);

    call process_channel;

    goto CMD_RETURN;

%page;
tape_executor(STOP_CHANNEL)::

    scsi_tmbx.cmd = byte(STOP_CHANNEL);

    tape_mbx.global_status.cmd_busy = FALSE;

    ioa_info.vos_stopped = TRUE;
    call process_channel;
```

```
     ioa_info.ioa_stopped = TRUE;
     ioa_info.data_shiftp = null();

     scsi_tmbx.cmd = byte(RESET_CP_PTRS);

     goto CMD_RETURN;

%page;
tape_executor(UNINITIALIZE_CONTROLLER)::

     scsi_tmbx.cmd = byte(UNINITIALIZE_CONTROLLER);

     tape_slot_tab(ioa_slot).status.initialized = FALSE;
     tape_chan_tab(my_chan).status.initialized = FALSE;

     if tape_chan_tab(my_chan).vos_mbxp ^= null ()
     then call iop$free_x_map_pages(ES_CHANNEL,
                        addr(tape_chan_tab(my_chan).vos_mbxp) -> bit32_based,
                                                          ONE_PAGE, code);

     goto CMD_RETURN;

%page;
process_channel: proc;

     mapped_ptr = null();
     vos_ptr = null();
     scsi_tmbx.interrupt_on_cmplt = FALSE;

     ioa_cmdp = iop$allocate(size(ioa_cmd), 'XX');
     if ioa_cmdp = null()
     then do;
          code = e$iop_cannot_allocate_space;
          goto PROCESS_CHANNEL_RETURN;
          end;

     cmdp = iop$allocate(size(command), 'XX');
     if cmdp = null()
     then do;
          code = e$iop_cannot_allocate_space;
          goto PROCESS_CHANNEL_RETURN;
          end;

     if ^ioa_info.vos_stopped
     then do;
          /* Map vos cmd page */
          vos_cmd_addr = ioa_info.restart_cmd_addr;
          call map_vos_mem (vos_cmd_addr, vos_ptr, code);
          if code ^= 0
          then goto PROCESS_CHANNEL_RETURN;
          mapped_ptr = vos_ptr;
          command = vos_ptr -> command;
          end;

/* Main loop */

     done = FALSE;
     do while (^done);

          if ioa_ready ()
          then call process_ioa (code);
          else if vos_ready ()
               then call process_vos (code);
               else done = TRUE;

          if code ^= 0
          then done = TRUE;

     end;

PROCESS_CHANNEL_RETURN::

     if code = 0 & ^ioa_info.ioa_stopped
     then do;
```

```
        if ioa_info.vos_stopped
        then ioa_info.restart_cmd_addr = -1;
        else ioa_info.restart_cmd_addr = vos_cmd_addr;

        if ^ioa_info.callback_queued
        then do;
             call iop$queue_background_callback(process_callback,
                       (ioa_slot), 0, 5, code);
             if code = 0
             then ioa_info.callback_queued = TRUE;
             end;

        scsi_tmbx.interrupt_on_cmplt = TRUE;

        if ^pend_list_exists() &
           ^cmplt_list_exists()
        then ioa_info.cp_buffer_empty = TRUE;
        end;
   else do;
        ioa_info.vos_stopped = TRUE;
        ioa_info.restart_cmd_addr = -1;
        ioa_info.data_shiftp = null();
        scsi_tmbx.cmd = byte(RESET_CP_PTRS);
        end;

   if mapped_ptr ^= null()
   then call iop$free_x_map_pages(ES_CHANNEL,addr(mapped_ptr) -> bit32_based,
                                                                ONE_PAGE, (0));
   if cmdp ^= null()
   then call iop$free(cmdp, 'XX');

   if ioa_cmdp ^= null()
   then call iop$free(ioa_cmdp, 'XX');

   return;

end process_channel;

%page;
vos_ready: proc returns (bit (1) aligned);

   if ioa_info.vos_stopped
   then return (FALSE);

   if command.type = IDLE
   then return (FALSE);

   if bin(command.type) = STOP_LIST
   then do;
        call copy_cmd_to_ioa;
        ioa_info.vos_stopped = TRUE;
        return (FALSE);
        end;

   /* see if ioa cp buffer is full */
   if ^free_list_exists ()
   then return (FALSE);

   if command.type ^= READ_FORWARD &
      command.type ^= WRITE_FORWARD &
      command.type ^= GET_EXTENDED_STATUS
   then return (TRUE);                    /* don't need a data buffer */

   if ioa_info.data_buffer_full
   then return (FALSE);

   if ioa_info.data.free >= ioa_info.data.cmplt
   then do;
        data1_size = rel(ioa_info.data.bot) - rel(ioa_info.data.free);
        data2_size = rel(ioa_info.data.cmplt) - rel(ioa_info.data.top);
        end;
   else do;
        data1_size = rel(ioa_info.data.cmplt) - rel(ioa_info.data.free);
        data2_size = 0;
        end;
```

```
     if data1_size >= command.count
     then return (TRUE);
     else do;
          if data2_size > 0
          then do;
               ioa_info.data_shiftp = ioa_info.data.free;
               ioa_info.data.free = ioa_info.data.top;
               end;
          if data2_size >= command.count
          then return (TRUE);
          else do;
               ioa_info.data_buffer_full = TRUE;
               return (FALSE);
               end;
          end;

end vos_ready;

%page;
ioa_ready: proc returns (bit(1) aligned);

     if ioa_info.ioa_stopped
     then return (FALSE);

     if cmplt_list_exists ()
     then return (TRUE);
     else return (FALSE);

end ioa_ready;

%page;
process_callback: entry (a_data);
dcl a_data          fixed bin(31);

     code = 0;
     ioa_slot = a_data;
     if ^slot_ok ((a_data))
     then goto CALLBACK_RETURN;
     on error
          begin;
          code = oncode();
          tape_slot_tab(ioa_slot).status.initialized = FALSE;
          tape_chan_tab(my_chan).status.initialized = FALSE;
          goto CALLBACK_RETURN;
          end;

     call setup;

     ioa_info.callback_queued = FALSE;

     if ^ioa_info.ioa_stopped |
        ^ioa_info.vos_stopped
     then call process_channel;

CALLBACK_RETURN:

     if code ^= 0
     then call rpterr ('Code ' || bin_to_char((code)), SYSERR_WARN);
     return;

%page;
process_vos: proc (a_code);

dcl  a_code          fixed bin (15);

     a_code = 0;

     do while (a_code = 0 & vos_ready());

     ioa_data_addr = 0;
     if command.type = READ_FORWARD |
        command.type = WRITE_FORWARD |
        command.type = GET_EXTENDED_STATUS
     then do;
```

```
    ioa_data_addr = rel (ioa_info.data.free);

    ioa_data_size = command.count + mod(command.count,2);

    /* If writing, move data from vos to ioa */

    if command.type = WRITE_FORWARD
    then do;
         call iop$mos_to_ioa  (command.address,
                               addr(ioa_data_addr)->bit32_based,
                               ioa_slot, (command.count), (0), a_code);
         if a_code ^= 0
         then return;

         end;

    /* Adjust data free pointer. */

    ioa_info.data.free = addrel(ioa_info.data.free, ioa_data_size);

    if ioa_info.data.free >= ioa_info.data.bot
    then ioa_info.data.free = addrel(ioa_info.data.top,
         rel(ioa_info.data.free) - rel(ioa_info.data.bot));

    if ioa_info.data.free = ioa_info.data.cmplt
    then ioa_info.data_buffer_full = TRUE;

    end; /* READ or WRITE */

    /* copy to ioa */
    call copy_cmd_to_ioa;

    /* get next cmd */

    if command.type = TRANSFER
    then call transfer(a_code);
    else do;
         vos_ptr = addrel (vos_ptr, CMD_SIZE);
         command = vos_ptr -> command;
         vos_cmd_addr = vos_cmd_addr + CMD_SIZE;
         end;

  end; /* do while */

  return;

end process_vos;

%page;
copy_cmd_to_ioa: proc;

  ioa_ptr = addrel (ioa_info.cp.free,START_ADAPT_MEM);

  ioa_ptr -> ioa_cmd.vos_cp_addr = ptr(vos_cmd_addr);
  ioa_ptr -> ioa_cmd.ioa_data_addr = ptr(ioa_data_addr);

  ioa_ptr -> ioa_cmd.minor_cmd.control = command.control;
  ioa_ptr -> ioa_cmd.minor_cmd.count = command.count;
  string(ioa_ptr->ioa_cmd.minor_cmd.status) = '0000'b4;
  ioa_ptr -> ioa_cmd.minor_cmd.tally = 0;
  ioa_ptr -> ioa_cmd.minor_cmd.address = command.address;

  ioa_ptr -> char1_based = byte(bin(command.type));

  ioa_info.cp.free = ioa_ptr -> ioa_cmd.next_cp_addr;
  ioa_info.cp_buffer_empty = FALSE;

end copy_cmd_to_ioa;

%page;
transfer: proc(a_code);
```

```
dcl a_code                  fixed bin(15);
dcl vos_cmd_page            fixed bin(15);
dcl new_vos_cmd_page        fixed bin(15);

     a_code = 0;

     vos_cmd_page = bin(addr(vos_cmd_addr) -> addr_based.page_no, 15);
     new_vos_cmd_page = bin(addr(command.address)->addr_based.page_no,15);

     /* New cmd physical address in vos memory */
     vos_cmd_addr = bin (command.address, 31);

     if new_vos_cmd_page ^= vos_cmd_page
     then do;
          call iop$free_x_map_pages(ES_CHANNEL,
                    addr(mapped_ptr)->bit32_based, ONE_PAGE, a_code);
          if a_code ^= 0 then return;

          call map_vos_mem (vos_cmd_addr, vos_ptr, a_code);
          if a_code ^= 0 then return;

          mapped_ptr = vos_ptr;
          end;
     else addr(vos_ptr) -> addr_based.offset =
                    addr(command.address)->addr_based.offset;

     /* Make a local copy */
     command = vos_ptr -> command;

end transfer;

%page;
process_ioa: proc (a_code);

dcl  a_code              fixed bin (15);
dcl  vos_cmdp            ptr;
dcl  next_cmdp           ptr;
dcl  n_bytes             fixed bin (15);

     ioa_ptr = addrel (ioa_info.cp.cmplt,START_ADAPT_MEM);
     ioa_cmd = ioa_ptr -> ioa_cmd;

     do while (ioa_cmd.type ^= NULL_CMDx &
               ioa_cmd.status.io_completed  &
               ^ioa_info.ioa_stopped);

          if ioa_cmd.type = READ_FORWARD |
             ioa_cmd.type = WRITE_FORWARD |
             ioa_cmd.type = GET_EXTENDED_STATUS
          then if ioa_info.data.cmplt = ioa_info.data_shiftp
               then do;
                    ioa_info.data.cmplt = ioa_info.data.top;
                    ioa_info.data_shiftp = null();
                    end;

          if (ioa_cmd.type=READ_FORWARD | ioa_cmd.type=GET_EXTENDED_STATUS) &
             (ioa_cmd.tally > 0)
          then do;
               n_bytes = min (ioa_cmd.count, ioa_cmd.tally);
               ioa_data_addr = rel (ioa_info.data.cmplt);
               call iop$ioa_to_hos (ioa_cmd.address,
                              addr(ioa_data_addr) -> bit32_based,
                              ioa_slot, (n_bytes), (0), a_code);
               if a_code ^= 0
               then return;

               end;

          if ioa_cmd.type = READ_FORWARD |
             ioa_cmd.type = WRITE_FORWARD |
```

```
   ioa_cmd.type = GET_EXTENDED_STATUS
then do;

     /* adjust data cmplt pointer */
     ioa_data_size = ioa_cmd.count + mod(ioa_cmd.count,2);
     ioa_info.data.cmplt = addrel(ioa_info.data.cmplt,
                                              ioa_data_size);
     if ioa_info.data.cmplt = ioa_info.data_shiftp
     then do;
          ioa_info.data.cmplt = ioa_info.data.top;
          ioa_info.data_shiftp = null();
          end;
     else
     if ioa_info.data.cmplt >= ioa_info.data.bot
     then ioa_info.data.cmplt = addrel(ioa_info.data.top,
                   rel(ioa_info.data.cmplt) - rel(ioa_info.data.bot));

     ioa_info.data_buffer_full = FALSE;

     end;

vos_addr = rel (ioa_cmd.vos_cp_addr);
call map_vos_mem (vos_addr, vos_cmdp, a_code);
if a_code ^= 0
then return;

/* Copy cmd to vos */
vos_cmdp -> command.tally = ioa_cmd.minor_cmd.tally;
vos_cmdp -> command.status = ioa_cmd.minor_cmd.status;

/* Do we have to stop ? */

if (ioa_cmd.type = READ_FORWARD & ioa_cmd.status.filemark_found) |
   (bin(ioa_cmd.type) = STOP_LIST)                                |
   (vos_cmdp -> command.stop_on_eot & ioa_cmd.eot)                |
   (vos_cmdp -> command.stop_on_error &
               substr(string(ioa_cmd.status),10,8) ^= '00'b4)
then do;
     ioa_info.ioa_stopped = TRUE;
     call send_cmd (log_chan, 1, (0), (0), (0));
     end;
else
/* Do we have to interrupt vos ? */
if (vos_cmdp -> command.interrupt_on_completion) |
   (vos_cmdp -> command.interrupt_on_error &
             substr(string(ioa_cmd.status),10,8) ^= '00'b4)
then call send_cmd (log_chan, 1, (0), (0), (0));

ioa_info.cp.cmplt = ioa_cmd.next_cp_addr;
ioa_info.cp_buffer_full = FALSE;

if ^ioa_info.ioa_stopped
then do;
     next_cmdp = addrel(vos_cmdp,CMD_SIZE);
     if  next_cmdp -> command.type = IDLE &
        ^next_cmdp -> command.status.io_completed
     then do;
          next_cmdp -> command.status.io_completed = TRUE;
          if next_cmdp -> command.interrupt_on_completion
          then call send_cmd (log_chan, 1, (0), (0), (0));
          end;

     /* Reset minor cmd */
     ioa_ptr -> char1_based = byte(NULL_CMDc);

     /* Get next cmd */
     ioa_ptr = addrel (ioa_info.cp.cmplt,START_ADAPT_MEM);

     /* Make local copy */
     ioa_cmd = ioa_ptr -> ioa_cmd;

     end;

/* Free vos_cmdp */
```

```
        call iop$free_x_map_pages(ES_CHANNEL, addr(vos_cmdp) -> bit32_based,
                                  ONE_PAGE, a_code);
        if a_code ^= 0
        then return;

     end; /* while */

     return;

end process_ioa;

%page;
cmplt_list_exists: proc returns (bit (1) aligned);

     if ioa_info.cp_buffer_empty
     then return (FALSE);

     first_time = TRUE;
     do ptrx = ioa_info.cp.top repeat (ioa_ptr->ioa_cmd.next_cp_addr)
                 while (ptrx ^= ioa_info.cp.top | first_time);
          first_time = FALSE;
          ioa_ptr = addrel(ptrx,START_ADAPT_MEM);
          if ioa_ptr -> ioa_cmd.type ^= NULL_CMDx   &
             ioa_ptr -> ioa_cmd.status.io_completed
          then return (TRUE);
     end;

     return (FALSE);

end cmplt_list_exists;

free_list_exists: proc returns (bit (1) aligned);

     if ioa_info.cp_buffer_full
     then return (FALSE);

     first_time = TRUE;
     do ptrx = ioa_info.cp.top repeat (ioa_ptr->ioa_cmd.next_cp_addr)
                 while (ptrx ^= ioa_info.cp.top | first_time);
          first_time = FALSE;
          ioa_ptr = addrel(ptrx,START_ADAPT_MEM);
          if ioa_ptr -> ioa_cmd.type = NULL_CMDx
          then return (TRUE);
     end;
     ioa_info.cp_buffer_full = TRUE;
     return (FALSE);

end free_list_exists;

pend_list_exists: proc returns (bit (1) aligned);

     if ioa_info.cp_buffer_empty
     then return (FALSE);

     first_time = TRUE;
     do ptrx = ioa_info.cp.top repeat (ioa_ptr->ioa_cmd.next_cp_addr)
                 while (ptrx ^= ioa_info.cp.top | first_time);
          first_time = FALSE;
          ioa_ptr = addrel(ptrx,START_ADAPT_MEM);
          if ioa_ptr -> ioa_cmd.type ^= NULL_CMDx &
             ^ ioa_ptr -> ioa_cmd.status.io_completed
          then return (TRUE);
     end;

     return (FALSE);

end pend_list_exists;

%page;
/*****************************************/
/****                                ****/
/**** CONFIGURATION MANAGEMENT SECTION ****/
/****                                ****/
/*****************************************/
ctape_entity_config: entry (a_func_code, a_bit16, a_data_32_1, a_data_32_2,
                            a_ret_code);
```

```
     func_code = a_func_code;
     ind_data = a_data_32_1;
     dep_data = a_data_32_2;
     a_ret_code = 0;                    /* assume no error */
     code = 0;

     if func_code < MIN_CONFIG_CODE | func_code > MAX_CONFIG_CODE
     then do;
          a_ret_code = config_error(e$iop_invalid_function_code, func_code);
          return;
          end;

     on error
          begin;
          code = oncode();
          goto CONFIG_RETURN;
          end;

     goto config(func_code);

CONFIG_RETURN:

     if code ^= 0
     then call roterr ('Code ' || bin_to_char((code)), SYSERR_WARN);

     return;

%page;
config(CONFIG_INIT):

/* initialize the entity at a basic level - this is a master reset of
   everything - it happens whenever the entity is started by the IOP ES,
   dep_data is entity dependent data passed from the vos and is returned
   to the vos, ind_data is just for your info and is constant for all entities
*/

/* Initialize all software structures and become ready to recieve commands */

     if tape_global_state ^= STOPPED  /* we can only do this if stopped */
     then do;
          a_ret_code = config_error(e$iop_cannot_init_entity, 0);
          return;
          end;

     do i = 0 to NUM_OF_SLOTS;
          tape_slot_tab(i).status.known = FALSE;
          tape_slot_tab(i).status.initialized = FALSE;
          tape_slot_tab(i).chx = NONE;
     end;

     do i = 1 to TAPE_MAX_CHANNELS;
          tape_chan_tab(i).status.known = FALSE;
          tape_chan_tab(i).status.initialized = FALSE;
          tape_chan_tab(i).vos_mbxp = null ();
          tape_chan_tab(i).log_chan = 0;
          tape_chan_tab(i).ioa_slot = -1;
          tape_chan_tab(i).ioa_subchannel = -1;
     end;

     do i = MIN_CMD_CODE to MAX_CMD_CODE;
          legal_command (i) = FALSE;
     end;

     legal_command (INITIALIZE_CONTROLLER)   = TRUE;
     legal_command (START_CHANNEL)           = TRUE;
     legal_command (STOP_CHANNEL)            = TRUE;
     legal_command (UNINITIALIZE_CONTROLLER) = TRUE;

     tape_limit = INITIAL_TAPE_LIMIT;

     call iop_debug$define_entity_command
                              (tape_entity_debug, IOP_CTAPE_ENTITY_ID);
```

```
     tape_global_state = READY;
     return;

%page;
config(CONFIG_SHUTDOWN):
     call rpterr('Stopping', SYSERR_WARN);

     tape_global_state = STOPPED;        /* ready for sw init */
     return;

%page;
config(CONFIG_ADD_SLOT):

     ioa_slot = ind_data;

     if ioa_slot < 0 |
        ioa_slot > NUM_OF_SLOTS |
        tape_slot_tab(ioa_slot).status.known
     then do;
          a_ret_code = config_error(e$iop_invalid_slot_no, bin(ioa_slot,15));
          return;
          end;

     tape_slot_tab(ioa_slot).status.initialized = TRUE;
     tape_slot_tab(ioa_slot).status.known = TRUE;

/* Find chx */

     do i = 1 to TAPE_MAX_CHANNELS
          while (tape_chan_tab(i).ioa_slot ^= ioa_slot);
     end;

     if i <= TAPE_MAX_CHANNELS
     then tape_slot_tab(ioa_slot).chx = i;
     else tape_slot_tab(ioa_slot).chx = NONE;

     call rpterr('Added slot ' || bin_to_char((ioa_slot)), SYSERR_WARN);
     return;

%page;
config(CONFIG_DELETE_SLOT):

     ioa_slot = ind_data;
     if tape_slot_tab(ioa_slot).status.initialized    /* should do stop first */
     then call rpterr('Slot deleted while running?', SYSERR_WARN);

     tape_slot_tab(ioa_slot).chx = NONE;            /* no channel index */
     tape_slot_tab(ioa_slot).status.initialized = FALSE;
     tape_slot_tab(ioa_slot).status.known = FALSE;

     call rpterr('Deleted slot ' || bin_to_char((ioa_slot)),SYSERR_WARN);
     return;
%page;
config(CONFIG_ADD_CHAN):

/* dep_data = ioa_slot/ioa_subchannel  */

     ioa_slot = addr (dep_data) -> bin15_based.bin15_1;
     ioa_subchannel = addr (dep_data) -> bin15_based.bin15_2;

/* ind_data = logical channel number */

     if find_chx(bin(ind_data,15), my_chan)
     then do;
          a_ret_code = config_error(e$iop_chan_already_initialized,
                                    bin(ind_data,15));
          return;
          end;

     do my_chan = 1 to TAPE_MAX_CHANNELS
        while (tape_chan_tab(my_chan).status.known);
     end;
```

```
     if my_chan > TAPE_MAX_CHANNELS | tape_chan_tab(my_chan).status.known
     then do;
          a_ret_code = config_error(e$iop_cannot_allocate_space,
                                    bin(ind_data,15));
          return;
          end;

     tape_chan_tab(my_chan).log_chan = ind_data;
     tape_chan_tab(my_chan).status.known = TRUE;
     tape_chan_tab(my_chan).ioa_slot = ioa_slot;
     tape_chan_tab(my_chan).ioa_subchannel = ioa_subchannel;

/* initialize a new logical channel */

     tape_chan_tab(my_chan).status.initialized = TRUE;

     call rpterr('Added channel ' || bin_to_char(ind_data), SYSERR_WARN);
     return;

%page;
config(CONFIG_DELETE_CHAN):

     if ^find_chx(bin(ind_data, 15), my_chan)
     then do;
          a_ret_code = config_error(e$iop_invalid_log_chan_no,
                                    bin(ind_data,15));
          return;
          end;
     if tape_chan_tab(my_chan).status.initialized   /* should do stop first */
     then call rpterr('Logical channel deleted while running',SYSERR_WARN);

     tape_chan_tab(my_chan).status.initialized = FALSE;
     tape_chan_tab(my_chan).status.known = FALSE;
     tape_chan_tab(my_chan).ioa_slot = NONE;

     call rpterr('Deleted channel ' || bin_to_char(ind_data),SYSERR_WARN);
     return;
%page;
config(CONFIG_READ_METER):

/* read the meter - ind_data , dep_data are passed from hos returned to hos */

     call rpterr('Read meter', SYSERR_WARN);
     return;
%page;
config(CONFIG_READ_STATUS):

/* read the status - ind_data , dep_data are passed from hos returned to hos */
     call rpterr('Read status', SYSERR_WARN);
     return;
%page;
/****************************************/
/****                              ****/
/**** IOA INTERRUPT MANAGEMENT SECTION ****/
/****                              ****/
/****************************************/
/* slot interrupt entry called from IOP ES when a slot interrupts */

ctape_entity_slot: entry (a_slot_no, a_data_16);
code = 0;
if ^slot_ok (a_slot_no)
then return;

ioa_slot = a_slot_no;

on error
     begin;
     code = oncode ();
     tape_slot_tab(ioa_slot).status.initialized = FALSE;
     tape_chan_tab(my_chan).status.initialized = FALSE;
     goto INTRPT_RETURN;
     end;
```

```
     call setup;

     intrpt_code = rank(scsi_tmbx.int_code);
     if intrpt_code < MIN_INTRPT_CODE |
        intrpt_code > MAX_INTRPT_CODE
     then intrpt_code = INVALID_INTRPT;

     goto PROCESS_INTERRUPT(intrpt_code);

PROCESS_INTERRUPT(INVALID_INTRPT)::

     call rpterr('Slot ' || bin_to_char((ioa_slot)) ||
                                        ' - INVALID interrupt', SYSERR_WARN);
     goto INTRPT_RETURN;

PROCESS_INTERRUPT(IDLE_INTRPT)::

     call rpterr('Slot ' || bin_to_char((ioa_slot)) ||
                                        ' - IDLE interrupt ?', SYSERR_WARN);
     goto INTRPT_RETURN;

PROCESS_INTERRUPT(CMPLT_INTRPT)::
     call process_channel;
     goto INTRPT_RETURN;

PROCESS_INTERRUPT(TMBX_STATUS_INTRPT)::

     /* Copy global status bits to VOS tape mailbox */
     /* TEMPORARY HACK with addrel */
     addrel(tape_mbxp,6) -> char1_based = addrel(scsi_tmbxp,3) -> char1_based;
     call send_cmd (log_chan, 1, (0), (0), (0));   /* interrupt VOS */

INTRPT_RETURN:
     if code ^= 0
     then call rpterr ('Code ' || bin_to_char((code)), SYSERR_WARN);
     return;

%page;
slot_ok: proc (a_slot_no) returns (bit (1) aligned);

dcl  a_slot_no            fixed bin (15);
dcl  code                 fixed bin (15);

     if ^tape_slot_tab(a_slot_no).status.known
     then do;
          call rpterr('Unknown slot interrupted ' ||
                    bin_to_char((a_slot_no)), SYSERR_WARN);
          return (FALSE);
          end;

     my_chan = tape_slot_tab(a_slot_no).chx;

     if my_chan = NONE
     then log_chan = NONE;
     else log_chan = tape_chan_tab(my_chan).log_chan;

     if log_chan = NONE
     then do;
          call rpterr('Slot interrupted no channel set ' ||
                    bin_to_char((a_slot_no)), SYSERR_WARN);
          return (FALSE);
          end;

     call iop$select_adapter (a_slot_no, code);
     if code ^= 0
     then return (FALSE);

     return (TRUE);

end slot_ok;

%page;
tape_entity_debug: entry (a_n_args, a_args, a_recognized);
dcl  a_n_args        fixed bin(15);
```

```
dcl  a_args(0:8)     char (32) var;
dcl  a_recognized    bit (1) aligned;
dcl  iop_debug$msg   entry (char(*) var);
dcl  char256         char(256) var;
dcl  long            bit(1) aligned;

     a_recognized = TRUE;

     if a_args(0) = 'help'
     then call iop_debug$msg('dump_scsi (IOA_slot) [-long]');
     else do;
          ioa_slot = char_to_bin ((a_args(1)));
          if ^slot_ok (ioa_slot)
          then call iop_debug$msg('Invalid slot ' || bin_to_char((ioa_slot)));
          else
          if a_args(0) = 'dump_scsi'
          then call dump_scsi_tables;
          else a_recognized = FALSE;
          end;

     return;

%page;
dump_scsi_tables: proc;

dcl code                 fixed bin(15);
dcl count_char           char (6);
dcl 1 cmd_based          based,
     2 pad1              char(0) aligned,
     2 pad2              bit(8),
     2 bits(24)          bit(1),
     2 pad3              char (8);
dcl tally_char           char (6);

/* %nolist; %include 'scsi_defs'; %list; */
/* Begin include file scsi_defs.incl.pl1 ... created 86-10-02 */

/*            Basic Form of SCSI Command Descripter Block          */
/*                                                                 */
/* Byte    Bit 7     6     5     4     3     2     1     0         */
/*       |---------------------------------------------------|     */
/*  00   |          group_code    |      command_op_code      |     */
/*       |---------------------------------------------------|     */
/*  01   | logical_unit_number |      command_parameters      |     */
/*       |---------------------------------------------------|     */
/*  02   |                command_parameters                  |     */
/*       |---------------------------------------------------|     */
/*  03   |                command_parameters                  |     */
/*       |---------------------------------------------------|     */
/*  04   |                command_parameters                  |     */
/*       |---------------------------------------------------|     */
/*  05   |                   control_byte                     |     */
/*       |---------------------------------------------------|     */
/*  06   |                 byte_count (MSB)                   |     */
/*       |---------------------------------------------------|     */
/*  07   |                 byte_count (LSB)                   |     */
/*       |---------------------------------------------------|     */
/*  08   |            Stratus unique  control_byte            |     */
/*       |---------------------------------------------------|     */
/*  09   |              user unique  control_byte             |     */
/*       |---------------------------------------------------|     */

/* The following is the basic structure for a scsi command descriptor block */

dcl  cdb_ptr  ptr ;

dcl  1 cdb_ptr_overlay      defined cdb_ptr,
        2 pad                  char(2),
        2 msb                  char(1),
        2 lsb                  char(1) ;

dcl  1 cdb      based( cdb_ptr ),
        2 align                char(0) aligned, /* ALIGNMENT            */
        2 group                bit(3),   /* group type                   */
```

```
          2 cmd                bit(5),   /* command type                */
          2 lun                bit(3),   /* logical unit number         */
          2 cmd_pars           bit(5),   /* command parameters          */
          2 cmd_info_byte_1    char(1),  /* command information         */
          2 cmd_info_byte_2    char(1),  /* command information         */
          2 cmd_info_byte_3    char(1),  /* command information         */
          2 control            bit(8),   /* must be '00000000'b         */
          2 aux_cntrl,                   /* never issued to scsi bus    */
              3 block_cnt      bit(1),   /* count is in fixed blocks    */
              3 pad            bit(7),
          2 user               bit(8);   /* never issued to scsi bus    */

/* The following is a variation of the above for ease of use     */
/* with vendor unique scsi command ADSI_SET_READ_WRITE_PARAMS..  */

dcl params_cdb_ptr   ptr ;
dcl  1 params_cdb_blk    based( params_cdb_ptr ),
          2 align              char(0),  /* alignment          */
          2 cmd                bit(8),   /* command type       */
          2 lun                bit(3),   /* logical unit number   */
          2 drive_type         bit(5),   /* drive mamufacturer    */
          2 max_track_num      char(1),  /* maximun track number  */
          2 min_transfer_size  char(1),  /* minimun transfer size */
          2 resrv1             bit(5),   /* must be '00000'b      */
          2 extend             bit(1),   /* extend mode           */
          2 resrv2             bit(1),   /* must be '0'b          */
          2 qic                bit(1),   /* qic-24 mode           */
          2 control            bit(8) ;  /* must be '00000000'b   */
%page;
/* %include  'scsi_command_defs.incl.pl1' */ ;

/* Begin include file scsi_command_defs.incl.pl1 - 86-10-02 */

/* SCSI id limits */

%replace  MIN_SCSI_DEVICE      by 0 ;
%replace  MAX_SCSI_DEVICE      by 7 ;

/* Supported Standard SCSI Tape Command Types */

%replace  SCSI_TEST_UNIT_READY      by    '00000'b ;
%replace  SCSI_REWIND               by    '00001'b ;
%replace  SCSI_REQUEST_SENCE        by    '00011'b ;
%replace  SCSI_READ_BLOCK_LIMITS    by    '00101'b ;
%replace  SCSI_READ                 by    '01000'b ;
%replace  SCSI_WRITE                by    '01010'b ;
%replace  SCSI_WRITE_FILEMARKS      by    '10000'b ;
%replace  SCSI_SPACE                by    '10001'b ;
%replace  SCSI_INQUIRY              by    '10010'b ;
%replace  SCSI_VERIFY               by    '10011'b ;
%replace  SCSI_RECOVER_BUFFER_DATA  by    '10100'b ;
%replace  SCSI_MODE_SELECT          by    '10101'b ;
%replace  SCSI_MODE_SENCE           by    '11010'b ;
%replace  SCSI_RESERVE_UNIT         by    '10110'b ;
%replace  SCSI_RELEASE_UNIT         by    '10111'b ;
%replace  SCSI_ERASE                by    '11001'b ;
%replace  SCSI_LOAD_UNLOAD          by    '11011'b ;

/* The following is an Adaptive Data Systems Inc. Vendor Unique Command Type */
%replace ADSI_SET_READ_WRITE_PARAMS by   '00110'b ;

/* Command Parameter Definitions */

%replace  IMMED              by    '00001'b ;
%replace  SPACE_DATA_BLK     by    '00000'b ;
%replace  SPACE_FILEMARK     by    '00001'b ;
%replace  SPACE_TO_EOM       by    '00011'b ;
%replace  SHORT              by    '00000'b ;
%replace  LONG               by    '00001'b ;
%replace  FIXED              by    '00001'b ;
%replace  UNLOAD_TAPE        by    '00000'b ;
%replace  LOAD_TAPE          by    '00001'b ;
%replace  RETENTION          by    '00010'b ;

/* Defines standard scsi tape messages from tape controller
   to host adapter during message in phase                  */
```

```
%replace COMMAND_COMPLETED          by   0 ;   /* 00x */
%replace SAVE_DATA_PTRS             by   2 ;   /* 02x */
%replace RESTORE_PTRS               by   3 ;   /* 03x */
%replace DISCONNECTED               by   4 ;   /* 04x */
%replace MESSAGE_REJECTED           by   7 ;   /* 07x */
%replace IDENTIFY_RESELECT          by 128 ;   /* 80x */

/* Defines standard scsi tape messages from host adapter
   to tape controller during message out phase              */

%replace IDENTIFY_SELECT            by 192 ;   /* C0x */
%replace INITIATOR_DETECTED         by   5 ;   /* 05x */
%replace ABORT                      by   6 ;   /* 06x */
%replace MESSAGE_REJECTED           by   7 ;   /* 07x */
%replace NO_OPERATION               by   8 ;   /* 08x */
%replace MESSAGE_PARITY             by   9 ;   /* 09X */
%replace BUS_DEVICE_RESET           by  12 ;   /* 0Cx */

/* Defines standard scsi status messages */

%replace GOOD_STATUS                by  0 ;   /* '00000000'b */
%replace CHECK_SENCE                by  2 ;   /* '00000010'b */
%replace BUSY                       by  8 ;   /* '00001000'b */
%replace RESERVATION_CONFLICT       by 24 ;   /* '00011000'b */

%page;

/* Defines scsi command groups or types */
/* Group code defines size of command descriptor block */

%replace  GROUP_ZERO      by '000'b ;     /* Group zero - six byte commands   */
%replace  GROUP_ONE       by '001'b ;     /* Group one  - ten byte commands   */
%replace  GROUP_TWO       by '010'b ;     /* Reserved */
%replace  GROUP_THREE     by '011'b ;     /* Reserved */
%replace  GROUP_FOUR      by '100'b ;     /* Reserved */
%replace  GROUP_FIVE      by '101'b ;     /* Group five - twelve byte commands */
%replace  GROUP_SIX       by '110'b ;     /* Vendor unique */
%replace  GROUP_SEVEN     by '111'b ;     /* Vendor unique */

/* Define size of scsi command descriptor block */
/* Group code defines size of command descriptor block */

%replace  GROUP_ZERO_SIZE      by 06 ;    /* Group zero - six byte commands   */
%replace  GROUP_ONE_SIZE       by 10 ;    /* Group one  - ten byte commands   */
%replace  GROUP_TWO_SIZE       by 00 ;    /* Reserved */
%replace  GROUP_THREE_SIZE     by 00 ;    /* Reserved */
%replace  GROUP_FOUR_SIZE      by 00 ;    /* Reserved */
%replace  GROUP_FIVE_SIZE      by 12 ;    /* Group five - twelve byte commands */
%replace  GROUP_SIX_SIZE       by 00 ;    /* Vendor unique */
%replace  GROUP_SEVEN_SIZE     by 00 ;    /* Vendor unique */

%page;

/* Define scsi phases */

%replace DATA_OUT          by 0 ;
%replace DATA_IN           by 1 ;
%replace COMMAND           by 2 ;
%replace STATUS_PHASE      by 3 ;
%replace UNSPEC_INFO_OUT   by 4 ;
%replace UNSPEC_INFO_IN    by 5 ;
%replace MSG_OUT           by 6 ;
%replace MSG_IN            by 7 ;

/* SCSI_MODE_SELECT/SCSI_MODE_SENCE parameters */

%replace NON_BUFFERED_MODE     by '000'b ;
%replace BUFFERED_MODE         by '001'b ;

/* The following is an addition major tape command
   used to reset the channel program list and data
   data buffer area */

%replace NULL_MAJOR_CMD   by -1 ;
%replace RESET_POINTERS   by  5 ;
```

```
%replace NULL_MINOR_CMD_ by -1 ;
%replace NULL_MINOR_CMD  by '11111111'b ;

/* End include file scsi_command_defs.incl.pl1 */
%page;
/*              SCSI Cartridge Tape Sence Data Block                        */
/*            ( Returned from REQUEST_SENCE Command )                       */
/*                                                                          */
/* Byte    Bit 7    6     5     4     3     2     1     0                  */
/*        |-------------------------------------------------------|         */
/*  00    | VALID  |  1  |  1  |  1  |  0  |  0  |  0  |  0  |              */
/*        |-------------------------------------------------------|         */
/*  01    |   0    |  0  |  0  |  0  |  0  |  0  |  0  |  0  |              */
/*        |-------------------------------------------------------|         */
/*  02    |  FIL   | EOM |  0  |  0  |      sence_key        |              */
/*        |-------------------------------------------------------|         */
/*  03    |               Information byte  (MSB)                 |         */
/*        |-------------------------------------------------------|         */
/*  04    |               Information byte                        |         */
/*        |-------------------------------------------------------|         */
/*  05    |               Information byte                        |         */
/*        |-------------------------------------------------------|         */
/*  06    |               Information byte  (LSB)                 |         */
/*        |-------------------------------------------------------|         */
/*  07    |               Sence byte length                       |         */
/*        |-------------------------------------------------------|         */
/*  08    |   0    | CNI |  0  | WRP | EOM | UDE | BNL | FIL |              */
/*        |-------------------------------------------------------|         */
/*  09    |   0    |  0  | NDT |  0  | BOM | BPE |  0  |  0  |              */
/*        |-------------------------------------------------------|         */
/*  0A    |               Data Error Counter (MSB)                |         */
/*        |-------------------------------------------------------|         */
/*  0B    |               Data Error Counter (LSB)                |         */
/*        |-------------------------------------------------------|         */
/*  0C    |               Data Underrun Counter (MSB)             |         */
/*        |-------------------------------------------------------|         */
/*  0D    |               Data Underrun Counter (LSB)             |         */
/*        |-------------------------------------------------------|         */


dcl  sence_data_block_ptr       ptr ;

dcl  1 sence_data_block         based( sence_data_block_ptr ),
          2 align               char(0),  /* alignment      */
          2 valid               bit(1),   /* Valid data flag */
          2 type                bit(7),   /* contents always '0111000'b 70x */
          2 pad1                bit(8),   /* contents always '00000000'b */
          2 filemark            bit(1),   /* filemark encountered during read */
          2 end_of_media        bit(1),   /* tape pos at phy end of media */
          2 pad2                bit(1),   /* contents always '0'b */
          2 pad3                bit(1),   /* contents always '0'b */
          2 sence_key           bit(4),   /* condition of completed command */
          2 sence_data,                   /* four bytes of potential data */
              3 msb             char(1),  /* most significate info byte */
              3 hmb             char(1),  /* high middle info byte */
              3 lmb             char(1),  /* low middle info byte */
              3 lsb             char(1),  /* least significate info byte */
          2 extended_length     bit(8), /* extended sence length = '0000110'b */
          2 sence,
              3 pad4            bit(1),   /* contents always '0'b */
/*NOTE*/      3 cni             bit(1),   /* tape not in drive */
              3 pad5            bit(1),   /* contents always '0'b */
/*NOTE*/      3 wrp             bit(1),   /* tape write protected */
/*NOTE*/      3 eom             bit(1),   /* phy end of media */
              3 ure             bit(1),   /* unrecoverable error */
              3 bnl             bit(1),   /* block not located   */
              3 fil             bit(1),   /* filemark detected   */
              3 pad6            bit(1),   /* contents always '0'b */
              3 pad7            bit(1),   /* contents always '0'b */
              3 ndt             bit(1),   /* no data detected  */
              3 pad8            bit(1),   /* contents always '0'b */
/*NOTE*/      3 bom             bit(1),   /* phy beginning of media  */
              3 bpe             bit(1),   /* scsi bus parity error   */
          2 data_error_cnt      bin(15),  /* data error counter */
          2 data_un_run_cnt     bin(15);  /* data under run conuter */
```

```
/*NOTE--> cnf, wrp, bom anc eom are considered "informational"
        bits and will not be cleared or reset by the REQUEST_SENCE
        command.  All other status bits are clearec by the
        REQUEST_SENCE command.

/* The following are sence key definitions */

%replace  NO_SENCE              by    '0000'b ;
%replace  RECOVERABLE_ERR       by    '0001'b ;
%replace  NOT_READY             by    '0010'b ;
%replace  MEDIA_ERR             by    '0011'b ;
%replace  HARDWARE_ERR          by    '0100'b ;
%replace  ILLEGAL_REQUEST       by    '0101'b ;
%replace  UNIT_ATTENTION        by    '0110'b ;
%replace  DATA_PROTECTION       by    '0111'b ;
%replace  END_OF_RECORDED_DATA  by    '1000'b ;
%replace  ABORTED_COMMAND       by    '1011'b ;
%replace  VOLUME_OVERFLOW       by    '1101'b ;

%replace  NO_SENCE_               by    0 ;
%replace  RECOVERABLE_ERR_        by    1 ;
%replace  NOT_READY_              by    2 ;
%replace  MEDIA_ERR_              by    3 ;
%replace  HARDWARE_ERR_           by    4 ;
%replace  ILLEGAL_REQUEST_        by    5 ;
%replace  UNIT_ATTENTION_         by    6 ;
%replace  DATA_PROTECTION_        by    7 ;
%replace  END_OF_RECORDED_DATA_   by    8 ;
%replace  ABORTED_COMMAND_        by    11 ;
%replace  VOLUME_OVERFLOW_        by    13 ;

/* Unsupported or reserved sence keys */
%replace  VENDOR_SENCE_KEY_       by    9 ;
%replace  EQUAL_                  by    12 ;
%replace  RESERVED_SENCE_KEY_I_   by    10 ;
%replace  RESERVED_SENCE_KEY_II_  by    14 ;
%replace  RESERVED_SENCE_KEY_III_ by    15 ;


%page;

/*              SCSI Cartridge Tape Inquiry Data Block                      */
/*                ( Returned from  INQUIRY  Command )                       */
/*                                                                          */
/* The following is a inquiry data block returned from INQUIRY command.     */

/* Byte                                                                     */
/*      |------------------------------------------------------|           */
/*  00  |           Device Type Code (01 = sequential)         |           */
/*      |------------------------------------------------------|           */
/*  01  |           Device Type Qualifer ( 80x = removable)    |           */
/*      |------------------------------------------------------|           */
/*  02  |           SCSI revision level                        |           */
/*      |------------------------------------------------------|           */
/*  03  |           Reserved                                   |           */
/*      |------------------------------------------------------|           */
/*  04  |           Length of additional bytes (0Bx)           |           */
/*      |------------------------------------------------------|           */
/*  05  |       Type of controller (03x = streaming tape)      |           */
/*      |------------------------------------------------------|           */
/*  06  |           Controller firmware level                  |           */
/*      |------------------------------------------------------|           */
/*  07  |           Number of drives installed                 |           */
/*      |------------------------------------------------------|           */
/*  08  |           Reserved                                   |           */
/*      |------------------------------------------------------|           */
/*  09  |           Reserved                                   |           */
/*      |------------------------------------------------------|           */
/*  0A  |           Reserved                                   |           */
/*      |------------------------------------------------------|           */
/*  0B  |           Reserved                                   |           */
/*      |------------------------------------------------------|           */
/*  0C  |           Reserved                                   |           */
```

```
/*      |---------------------------------------------------|        */
/*  0D  |              Data block size    (01x)             |        */
/*      |---------------------------------------------------|        */
/*  0E  |   Ready status (00x = not_ready 01x = ready)      |        */
/*      |---------------------------------------------------|        */
/*  0F  |      Media type ( 80x = removable media )         |        */
/*      |---------------------------------------------------|        */

dcl tape_inquiry_data_blk_ptr      ptr ;

dcl  1 tape_inquiry_data_blk        based( tape_inquiry_data_blk_ptr ),
          3 align                   char(0),  /* alignment                    */
          3 device_type_code        bit(8),   /* Device Type Code             */
          3 device_media_code       bit(8),   /* Removable/Fixed Media        */
          3 scsi_rev_level          bit(8),   /* scsi revision level          */
          3 resrv1                  char(1),  /* reserved */
          3 extended_length         bit(8),   /* Extended length of this blk */
/* %include 'tape_inquiry_blk_inner.incl.pl1' */;;
/* Begin include file tape_inquiry_data_blk_inner ... created 86-10-02  */

          3 ctrlr_type              bit(8),   /* Type of controller           */
          3 firmware_level          bit(8),   /* Controller firmware level    */
          3 number_of_drives        bit(8),   /* Number of drives installed   */
          3 resrv2                  char(5),  /* reserved */
          3 blk_size                bit(8),   /* data block size              */
          3 pad1                    bit(7),   /* pad                          */
          3 not_ready               bit(1),   /* Ready Status                 */
          3 media_type              bit(8);   /* Media Type                   */

/* End include file tape_inquiry_data_blk_inner ... created 86-10-02  */


/* Device type definitions */

%replace  DIRECT_ACCESS_DEVICE          by '00000000'b ; /* 00x */
%replace  SEQUENTIAL_ACCESS_DEVICE      by '00000001'b ; /* 01x */
%replace  PRINTER                       by '00000010'b ; /* 02x */
%replace  PROCESSOR                     by '00000011'b ; /* 03x */
%replace  WRITE_ONCE_READ_MULTIPLE      by '00000100'b ; /* 04x */
%replace  READ_ONLY_DIRECT_ACCESS       by '00000101'b ; /* 05x */
%replace  LUN_NOT_PRESENT               by '10000000'b ; /* 80x */

%page;
/*           SCSI Cartridge Tape Mode Select Data Block                   */
/*              ( Issued  from MODE_SELECT Command )                      */
/*              ( Returned from MODE_SENCE Command )                      */
/*                                                                        */
/* Byte    Bit 7     6     5     4     3     2     1     0                */
/*      |---------------------------------------------------|             */
/*  00  |                Sence data length                  |             */
/*      |---------------------------------------------------|             */
/*  01  |                 Media type                        |             */
/*      |---------------------------------------------------|             */
/*  02  |   WP     |  Buffered Mode |       Speed           |             */
/*      |---------------------------------------------------|             */
/*  03  | Length in bytes of following discriptor list (08x)|             */
/*      |---------------------------------------------------|             */
/*  04  |             Density code                          |             */
/*      |---------------------------------------------------|             */
/*  05  |             Number of blocks (MSB)                |             */
/*      |---------------------------------------------------|             */
/*  06  |             Number of blocks                      |             */
/*      |---------------------------------------------------|             */
/*  07  |             Number of blocks (LSB)                |             */
/*      |---------------------------------------------------|             */
/*  08  |                    Reserved                       |             */
/*      |---------------------------------------------------|             */
/*  09  |             Block Length     (MSB)                |             */
/*      |---------------------------------------------------|             */
/*  0A  |             Block Length     (MSB)                |             */
/*      |---------------------------------------------------|             */
/*  0B  |             Block Length     (MSB)                |             */
/*      |---------------------------------------------------|             */
```

```
dcl  mode_select_blk_ptr       ptr ;

dcl  1 mode_select_blk         based( mode_select_blk_ptr ),
       2 sence_data_length          char(1), /* valid only in MODE_SENCE cmd */
       2 media_type                 bit(8),  /* valid only in MODE_SENCE cmd */
       2 wp                         bit(1),  /* valid only in MODE_SENCE cmd */
       2 buffer_mode                bit(3),        /* device buffering        */
       2 speed                      bit(4),        /* always 0 for streamer   */
       2 extended_length            char(1),       /* vendor extended length  */
       2 density_code               bit(8),        /* qic-24 or qic-11        */
       2 pad1                       char(1),
       2 number_of_blks             bin(15),       /* */
       2 pad2                       char(1),
       2 blk_length                 bin(15)  ;     /* size of block           */



     if a_args(2) = '-long'
     then long = TRUE;
     else long = FALSE;

     ioa_cmdp = iop$allocate(size(ioa_cmd), 'XX');
     if ioa_cmdp = null()
     then do;
          call iop_debug$msg ('Can not allocate space for ioa_cmd structure');
          return;
          end;

     data_32_1 = addrel(ptr(SCSI_CONFIG_OFFSET),START_ADAPT_MEM)->bin31_based;
     call iop_debug$msg ('SCSI root pointer at 104x = ' ||
                                                   hex(data_32_1,6));

     data_32_1 = addrel(ptr(data_32_1),START_ADAPT_MEM) -> bin31_based;
     call iop_debug$msg('Current config table at      ' ||
                                                   hex(data_32_1,6));
     if ptr(data_32_1) = null()
     then return;

     current_configp = addrel(ptr(data_32_1),START_ADAPT_MEM);
     if long
     then do;
          char256 = '';
          if current_config.status.active
          then char256 = char256 || ' ACTIVE';
          if current_config.status.selected
          then char256 = char256 || ' SELECTED';
          if current_config.status.disconnected
          then char256 = char256 || ' DISCONNECTED';

          call iop_debug$msg('  Status:                        ' || char256);
          call iop_debug$msg('  Cmd Descriptor Block at        ' ||
                                        hexp(current_config.cdb_ptr,6));

          if current_config.cdb_ptr ^= null()
          then do;
               cdb_ptr = addrel(current_config.cdb_ptr,START_ADAPT_MEM);

          call iop_debug$msg('    Group:                       ' ||
                              bin_to_char(bin(cdb.group,31)));
          if bin(cdb.cmd) < lbound(scsi_cmds,1) |
             bin(cdb.cmd) > hbound(scsi_cmds,1)
          then char256 = 'INVALID';
          else char256 = scsi_cmds(bin(cdb.cmd));
          call iop_debug$msg('    Command:                     ' || char256);
          call iop_debug$msg('    Command parameters:          ' ||
                                bin_to_char(bin(cdb.cmd_pars,31)));
          call iop_debug$msg('    Command info 1:              ' ||
                                        hexs(cdb.cmd_info_byte_1,2));
          call iop_debug$msg('    Command info 2:              ' ||
                                        hexs(cdb.cmd_info_byte_2,2));
          call iop_debug$msg('    Command info 3:              ' ||
                                        hexs(cdb.cmd_info_byte_3,2));
          end;
```

```
call iop_debug$msg('  Request Sence Block at    ' ||
                   hexp(current_config.request_sence_ptr,6));
if current_config.request_sence_ptr ^= null()
then do;
     sence_data_block_ptr = addrel(current_config.request_sence_ptr,
                                   START_ADAPT_MEM);
     if sence_data_block.valid
     then char256 = 'YES';
     else char256 = 'NO';
     call iop_debug$msg('    Valid:                    ' || char256);
     call iop_debug$msg('    Type:                     ' ||
                        hex(bin(sence_data_block.type,31),2));
     char256 = '';
     if sence_data_block.filemark
     then char256 = 'FILEMARK ';
     if sence_data_block.end_of_media
     then char256 = char256 || 'EOT';
     if char256 ^= ''
     then call iop_debug$msg('    Flags:                   ' ||
                                                    char256);

     if bin(sence_data_block.sence_key) < lbound(sence_keys,1) |
        bin(sence_data_block.sence_key) > hbound(sence_keys,1)
     then char256 = 'INVALID';
     else char256 = sence_keys(bin(sence_data_block.sence_key));
     call iop_debug$msg('    Sence key:                ' || char256);
     call iop_debug$msg('    Sence data:               ' ||
                    hexs(string(sence_data_block.sence_data),8));
     call iop_debug$msg('    Extended length:          ' ||
            bin_to_char(bin(sence_data_block.extended_length,31)));
     call iop_debug$msg('    Sence:');
     char256 = '';
     if sence_data_block.sence.cni
     then call iop_debug$msg(
            '                           TAPE NOT IN DRIVE');
     if sence_data_block.sence.wrp
     then call iop_debug$msg(
            '                           WRITE PROTECTED');
     if sence_data_block.sence.eom
     then call iop_debug$msg(
            '                           END OF MEDIA');
     if sence_data_block.sence.ure
     then call iop_debug$msg(
            '                           UNRECOVERABLE ERROR');
     if sence_data_block.sence.bnl
     then call iop_debug$msg(
            '                           BLOCK NOT LOCATED');
     if sence_data_block.sence.fil
     then call iop_debug$msg(
            '                           FILEMARK DETECTED');
     if sence_data_block.sence.ndt
     then call iop_debug$msg(
            '                           NO DATA DETECTED');
     if sence_data_block.sence.bom
     then call iop_debug$msg(
            '                           BEGINNING OF MEDIA');
     if sence_data_block.sence.bpe
     then call iop_debug$msg(
            '                           SCSI BUS PARITY ERROR');

     call iop_debug$msg('    Data error count:         ' ||
            bin_to_char(bin(sence_data_block.data_error_cnt,31)));
     call iop_debug$msg('    Data under run count:     ' ||
          bin_to_char(bin(sence_data_block.data_un_run_cnt,31)));
     end;
char256 = '';
ptrx = addrel(current_config.status_ptr,START_ADAPT_MEM);
if ptrx ^= null()
then do;
     if rank(ptrx->char1_based) = GOOD_STATUS
     then char256 = 'GOOD';
     else
     if rank(ptrx->char1_based) = CHECK_SENCE
     then char256 = 'CHECK SENCE';
```

```
     else
     if rank(ptrx->char1_based) = BUSY
     then char256 = 'BUSY';
     else
     if rank(ptrx->char1_based) = RESERVATION_CONFLICT
     then char256 = 'RESERVATION CONFLICT';
     end;
else char256 = 'UNDEFINED';
call iop_debug$msg('  SCSI status                    ' || char256);
char256 = '';
ptrx = addrel(current_config.msg_ptr,START_ADAPT_MEM);
if ptrx ^= null()
then do;
     if rank(ptrx->char1_based) = COMMAND_COMPLETED
     then char256 = 'COMMAND COMPLTED';
     else
     if rank(ptrx->char1_based) = SAVE_DATA_PTRS
     then char256 = 'SAVE DATA PTRS';
     else
     if rank(ptrx->char1_based) = RESTORE_PTRS
     then char256 = 'RESTORE PTRS';
     else
     if rank(ptrx->char1_based) = DISCONNECTED
     then char256 = 'DISCONNECTED';
     else
     if rank(ptrx->char1_based) = MESSAGE_REJECTED
     then char256 = 'MESSAGE REJECTED';
     else
     if rank(ptrx->char1_based) = IDENTIFY_RESELECT
     then char256 = 'IDENTIFY RESELECT';
          end;
     else char256 = 'UNDEFINED';
     call iop_debug$msg('  SCSI message                    ' || char256);

     if current_config.cur_phase < lbound(scsi_phases,1) |
        current_config.cur_phase > hbound(scsi_phases,1)
     then char256 = 'INVALID';
     else char256 = scsi_phases(current_config.cur_phase);
     call iop_debug$msg('  Current phase                   ' || char256);

     if current_config.prev_phase < lbound(scsi_phases,1) |
        current_config.prev_phase > hbound(scsi_phases,1)
     then char256 = 'INVALID';
     else char256 = scsi_phases(current_config.prev_phase);

     call iop_debug$msg('  Previous phase                  ' || char256);
     end;

call iop_debug$msg('  Mailbox at                     ' ||
                         hexp(current_config.mbx_ptr,6));

if current_config.mbx_ptr ^= null()
then do;
     scsi_tmbxp = addrel(current_config.mbx_ptr,START_ADAPT_MEM);
     if scsi_tmbx.cmd = byte(NULL_CMDd)
     then char256 = 'NULL';
     else
     if scsi_tmbx.cmd = byte(INITIALIZE_CONTROLLER)
     then char256 = 'INIT CONTROLLER';
     else
     if scsi_tmbx.cmd = byte(START_CHANNEL)
     then char256 = 'START CONTROLLER';
     else
     if scsi_tmbx.cmd = byte(STOP_CHANNEL)
     then char256 = 'STOP CONTROLLER';
     else
     if scsi_tmbx.cmd = byte(UNINITIALIZE_CONTROLLER)
     then char256 = 'UNINIT CNTRLR';
     else
     if scsi_tmbx.cmd = byte(RESET_CP_PTRS)
     then char256 = 'RESET PTRS';
     else char256 = 'INVALID';

     call iop_debug$msg('    Command:                   ' || char256);
```

```
     intrpt_code = rank(scsi_tmbx.int_code);
     call iop_debug$msg('    Interrupt code:               ' ||
                                          bin_to_char((intrpt_code)));
     char256 = '';
     if scsi_tmbx.interrupt_on_idle
     then char256 = char256 || ' INTRPT_ON_IDLE';
     if scsi_tmbx.interrupt_on_cmplt
     then char256 = char256 || ' INTRPT_ON_CMPLT';
     if scsi_tmbx.bot
     then char256 = char256 || ' BOT';
     if scsi_tmbx.eot
     then char256 = char256 || ' EOT';
     if scsi_tmbx.on_line
     then char256 = char256 || ' ON_LINE';
     if scsi_tmbx.write_protected
     then char256 = char256 || ' W/PROTECT';
     if scsi_tmbx.major_cmd_error
     then char256 = char256 || ' MJR_CMD_ERR';

     call iop_debug$msg('    Status:                       ' || char256);
     end;

call iop_debug$msg('  Tape info at                   ' ||
                              hexp(current_config.ext_ptr,6));

if current_config.ext_ptr ^= null()
then do:
     tape_infop = addrel(current_config.ext_ptr,START_ADAPT_MEM);
     call iop_debug$msg('    CP top:                       ' ||
                                          hexp(tape_info.cp.top,6));
     call iop_debug$msg('    CP bot:                       ' ||
                                          hexp(tape_info.cp.bot,6));
     call iop_debug$msg('    DATA top:                     ' ||
                                          hexp(tape_info.data.top,6));
     call iop_debug$msg('    DATA bot:                     ' ||
                                          hexp(tape_info.data.bot,6));
     if long
     then do;
          call iop_debug$msg('    Read Buffer Ptr:          ' ||
                              hexp(tape_info.read_buffer_ptr,6));
          call iop_debug$msg('    Start of valid data:      ' ||
                              hexp(tape_info.cur_valid_data_ptr,6));
          call iop_debug$msg('    End of valid data:        ' ||
                              hexp(tape_info.max_valid_data_ptr,6));
          call iop_debug$msg('    Currrent position in cp ' ||
                              hexp(tape_info.cur_cp_buff_ptr,6));

          call iop_debug$msg('    Requested byte count:     ' ||
               bin_to_char(bin(tape_info.requested_byte_count,31)));
          call iop_debug$msg('    Remaining byte count:     ' ||
             bin_to_char(bin(tape_info.remaining_valid_byte_count,31)));
          call iop_debug$msg('    Transfer byte count:      ' ||
                    bin_to_char(bin(tape_info.transfer_byte_count,31)));
          call iop_debug$msg('    Status:');
          if tape_info.status.start_of_record_encountered
          then call iop_debug$msg(
                  '                        START OF RECORD');
          if tape_info.status.position_at_end_of_logical_block
          then call iop_debug$msg(
                  '                        AT END OF LOGICAL BLOCK');
          if tape_info.status.end_of_linked_cp
          then call iop_debug$msg(
                  '                        END OF LINKED CP');
          if tape_info.status.early_warning
          then call iop_debug$msg(
                  '                        EARLY WARNING');
          if tape_info.status.encountered_filemark
          then call iop_debug$msg(
                  '                        FILEMARK DETECTED ');
          if tape_info.status.end_of_recorded_media_detected
          then call iop_debug$msg(
                  '                        END OF MEDIA DETECTED ');
          if tape_info.status.prev_read_encountered_erm
          then call iop_debug$msg(
                  '                        PREV ERM DETECTED ');
```

```
        if tape_info.status.prev_read_encountered_filemark
        then call iop_debug$msg(
                 '                                PREV FILEMARK DETECTED ');
        if tape_info.status.no_data_detected
        then call iop_debug$msg(
                 '                                NO DATA DETECTED ');
        if tape_info.status.init_tape_drive
        then call iop_debug$msg(
                 '                                INIT TAPE DRIVE ');
        if tape_info.status.processing_channel_program_list
        then call iop_debug$msg(
                 '                                PROCESSING CP LIST ');
        if tape_info.status.drive_rewinding
        then call iop_debug$msg(
                 '                                DRIVE REWINDING ');
        if tape_info.status.scsi_bus_parity_error
        then call iop_debug$msg(
                 '                                SCSI BUS PARITY ERROR ');
        if tape_info.status.cartridge_not_in_drive
        then call iop_debug$msg(
                 '                                CARTRIDGE NOT IN DRIVE ');
        if tape_info.status.soft_error_detected
        then call iop_debug$msg(
                 '                                SOFT ERROR DETECTED');

        end;
     call iop_debug$msg('    Current CP:                ' ||
                           hexp(tape_info.current_cp_ptr,6));
     call iop_debug$msg('    Previous CP:               ' ||
                           hexp(tape_info.previous_cp_ptr,6));
     call iop_debug$msg('    Extenced status at:        ' ||
                         hexp(tape_info.extended_status_ptr,6));

     end;
  call iop_debug$msg('                  snisin effli chprw');
  call iop_debug$msg(
'            eioeed ompro oraer                     VOS      VOS     IOA');
  call iop_debug$msg('  Addr CmdName  tcerrt tktcc rdrat Code Count Tally DataAc
r CmdAddr DataAddr');

  first_time = TRUE;
  do ptrx = tape_info.cp.top repeat (ioa_cmd.next_cp_addr)
        while ((ptrx ^= tape_info.cp.top | first_time) &
             ptrx ^= null());
     first_time = FALSE;
     ioa_ptr = addrel(ptrx,START_ADAPT_MEM);
     ioa_cmd = ioa_ptr -> ioa_cmd;
     if ioa_cmd.type = NULL_CMDx
     then cmd_name = 'NULL';
     else
     if bin(ioa_cmd.type) < lbound(cmd_table,1) |
        bin(ioa_cmd.type) > hbound(cmd_table,1)
     then cmd_name = 'INVALID';
     else cmd_name = cmd_table(bin(ioa_cmd.type));
     char256 = hexp(ptrx,6) || ' ' || cmd_name;
     if cmd_name ^= 'NULL' & cmd_name ^= 'INVALID'
     then do;
          do i = 3 to 21;
               if i ^= 12 & i ^= 13 & i ^= 14
               then if ioa_cmdp -> cmd_based.bits(i)
               then char256 = char256 || '1';
               else char256 = char256 || '0';
          if i = 8
          then char256 = char256 || ' ';
          if i = 16
          then char256 = char256 || ' ';
     end;
     char256 = char256 || ' ';
     code = bin(substr(string(ioa_cmd.status),14,3));
     count_char = bin_to_char((ioa_cmd.count));
     tally_char = bin_to_char((ioa_cmd.tally));
     char256 = char256 || '  ' || bin_to_char((code)) || '    ' ||
                 count_char || tally_char ||
                 hex(bin(ioa_cmd.address),6) || '  ' ||
```

```
                        hexp(ioa_cmd.vos_cp_addr,6) || '    ' ||
                        hexp(ioa_cmd.ioa_data_addr,6);
               end;
          call iop_debug$msg(char256);
     end;

end dump_scsi_tables;

%page;
config_error: procedure (error_code, additional_data) returns (fixed bin (31));

/* stores an error code and additional data in 2 halves of 32 bit a_ret_code
   * for return to the es */

dcl error_code      fixed bin (15);
dcl additional_data fixed bin (15);

dcl ret_code fixed bin(31);

dcl error_array(2) fixed bin (15) defined ret_code;

     error_array(1) = additional_data;
     error_array(2) = error_code;
     return(ret_code);

end config_error;
%page;
find_chx: procedure (log_chan, chx) returns (bit (1) aligned);

/* find index to channel table that corresponds to logical channel number */

dcl  log_chan       fixed bin (15);
dcl  chx            fixed bin (15);

     do chx = 1 to TAPE_MAX_CHANNELS;
          if tape_chan_tab(chx).status.known &
               tape_chan_tab(chx).log_chan = log_chan
               then return (TRUE);
          end;
     return (FALSE);
end find_chx;
%page;
cmd_err: procedure (a_err_code, a_extra_data);

dcl  a_err_code     fixed bin (15);
dcl  a_extra_data   fixed bin (31);
dcl  err_code       fixed bin (15);
dcl  extra_data     fixed bin (31);

     err_code = a_err_code;
     extra_data = a_extra_data;

/* report a command error on the command ring */

     call send_cmd(log_chan, func_code + ERROR_ID, err_code, extra_data, 0);
     return;

end cmd_err;

%page;
map_vos_mem: proc (a_vos_addr, a_iop_ptr, a_code);

dcl a_vos_addr      fixed bin (31);
dcl a_iop_ptr       ptr;
dcl a_code          fixed bin (15);
dcl access_infop    ptr;

     a_code = 0;
     a_iop_ptr = null ();

     access_infop = iop$allocate (size(access_info), 'XX');
     if access_infop = null ()
     then do;
          a_code = e$iop_cannot_allocate_space;
          return;
          end;
```

```
     access_infop -> access_info.version = ACCESS_INFO_VERSION_1;
     string (access_infop -> access_info.flag) = '0000'b4;
     access_infop -> access_info.flag.read_access = TRUE;
     access_infop -> access_info.flag.write_access = TRUE;

     call iop$map_x_pages (ES_CHANNEL, addr(a_vos_addr) -> bit32_based,
          access_infop -> access_info.version,ONE_PAGE,
          addr(a_iop_ptr) -> bit32_based,a_code);

     call iop$free (access_infop, 'XX');

end map_vos_mem;

%page;
send_cmd: proc (a_chn, a_fnc, a_d16, a_d32_1, a_d32_2);

dcl  (a_chn, a_fnc, a_d16)      fixed bin (15);
dcl  (a_d32_1, a_d32_2)         fixed bin (31);

dcl  code                       fixed bin (15);
dcl  (chn, fnc, d16)            fixed bin (15);
dcl  (d32_1, d32_2)             fixed bin (31);

     chn = a_chn;
     fnc = a_fnc;
     d16 = a_d16;
     d32_1 = a_d32_1;
     d32_2 = a_d32_2;
     call iop$deliver_command(chn, fnc, d16, d32_1, d32_2, tape_limit, code);
     if code = 0
          then return;
     call rpterr('Delivery of command to vos failed', SYSERR_WARN);

end send_cmd;
%page;
rpterr: procedure (a_errstr, a_errtyp);

dcl  a_errstr          char (80) varying;
dcl  a_errtyp          fixed bin (15);

dcl  errstr            char (80) varying;
dcl  errtyp            fixed bin (15);
dcl  code              fixed bin (15);

     errstr = a_errstr;
     errtyp = a_errtyp;
     call iop$syserr_code('CTAPE entity: ' || errstr, errtyp, code);
     if code = 0
          then return;
end rpterr;

%page;
setup: proc;

     ioa_infop = addr (tape_chan_tab(my_chan).ioa_data);
     tape_mpxp = tape_chan_tab(my_chan).vos_mpxp;
     scsi_tmpxp = ioa_info.scsi_tmpxp;

end setup;

end iop_ctape_entity;
```

```
/* +++begin copyright+++ ************************************/
/*                                                          */
/* STRATUS CONFIDENTIAL INFORMATION                         */
/* COPYRIGHT (c) Stratus Computer, Inc. 1985                */
/*                                                          */
/* This  program  contains  confidential and proprietary */
/* information  of  Stratus Computer,  Inc.,   and   any */
/* reproduction,  disclosure, or use in whole or in part */
/* is   expressly   prohibited,   except   as   may   be */
/* specifically authorized by prior written agreement or */
/* permission of Stratus.                                   */
/*                                                          */
/* +++end copyright+++ **************************************/
```

```
/* ICP_DEBUG: This module implements a crude debugger */
/* Beginning of modification history */
/* written November 1982 by Larry Johnson */

/* modified 12 Dec 85 by R Crockett for iop */

/* Modified 86-02-17 by Tom Moser to use read_time instead of start_time */
/* Modified 86-03-25 by Pradip Gosalia to use iop$send_cmd_to_adapt */
/* Modified 86-04-01 by Tom Moser to add psi$debug_msg entry for common
     psi/iop debugger code */
/* Modified 86-04-01 by Tom Moser to print syserr on fault */
/* Modified 86-05-02 by Tom Moser to expect IOP_MBX_ID instead of PSI */
/* Modified 86-05-13 by Tom Moser to rewrite help text and give error if
     unknown command */
/* Modified 86-05-15 by Tom Moser to enhance readability - add error info */
/* Modified 86-06-05 by Martin Stokoe to enhance MC description */
/* Modified 86-06-13 by Tom Moser to allow greater address range in dump_IOA */
/* Modified 86-06-17 by Martin Stokoe to remove address checking for dump */
/* Modified 86-07-02 by Tom Moser to merge iop_ioa_debug */
/* Modified 86-07-09 by Tom Moser to do general cleanup and compression */
/* Modified 86-07-14 by Tom Moser to more cleanup add step and status cmds
     allow bind using iop$dummy_debug_full */
/* Modified 86-07-21 by Tom_Moser to remove load/start adapt cmds - enter
     IOA debugger cmd - poll entry */
/* Modified 86-08-07 by Tom Moser to add search commands */
/* Modified 86-10-04 by Martin Stokoe to implement entity debugger commands */
/* Modified 86-10-17 by Tom Moser to add more status and handler exceptions */
/* Modified 86-11-20 by Tom Moser to change address range checks, only
     syserr once in print_why */
/* Modified 87-02-12 by Tom Moser to enhance status support new mc */
/* Modified 87-03-23 by Tom Moser to chenge start ioa debug to use dev dep
     routines */
/* Modified 87-05-06 by Tom Moser to add more status and recovery */
/* Modified 87-05-20 by Tom Moser to try to eliminate deadly embrace and
     multi line output - clean up status */
/* End of modification history */

iop_debug:
     proc;

/* include */

/* %include 'iop_adapter_types'; */
/* Begin include file adapter_types.incl.pl1 */
%replace  MIN_ADAP_TYPE          by  1;

%replace  TERMINATOR             by  1;
%replace  ACOMM                  by  2;
%replace  UCOMM_422              by  3;
%replace  ENET                   by  4;
%replace  DISK                   by  5;
%replace  CTAPE                  by  6;
%replace  MTAPE                  by  7;
%replace  CLKCOMM                by  8;
%replace  UCOMM_232              by  9;
%replace  UCOMM_423              by  10;

%replace  MAX_ADAP_TYPE          by 10;

/* End include file adapter_types.incl.pl1 */
/* %include 'iop_utility_calls'; */
/* Begin include file . . . . . iop_utility_calls.incl.pl1 */

dcl  iop$allocate entry (fixed bin (31), char (2) aligned) returns (ptr);
dcl  iop$free entry (ptr, char (2) aligned);

dcl  iop$get_level entry  returns (fixed bin (15));
dcl  iop$set_level entry (fixed bin (15));

dcl  iop$syserr_code entry (char (80) varying, fixed bin (15), fixed bin(15));
dcl  iop$panic_syserr entry (char (80) varying);

dcl  iop$read_time  entry returns (fixed bin (31));
dcl  iop$delta_time entry (fixed bin (31)) returns (fixed bin (31));
```

```
dcl  bin_to_char     entry (fixed bin (31)) returns (character (13) varying);
dcl  char_to_bin     entry (character (13) varying) returns (fixed bin (31));

dcl  iop$set_slot_priority entry (fixed bin (15), fixed bin (15),
                                  fixed bin (15));

/* End include file . . . . . iop_utility_calls.incl.pl1 */
/* %include 'ioa_mailbox'; */
/*                        ioa_mailbox.incl.pl1
                          -------------------

     This  include file contains the mailbox used to communicate
     between an IOA and the IOP.  Several  overlaid  definitions
     exist,  which  are used under different circumstances, such
     as dumping or IOA program debugging.

*/

/* Define typical IOA mailbox pointer.                                          */
dcl  ioa_mbxp              ptr; /* ioa_mbxp = contents of 200404x in ioa */

/* Original mbx template */
dcl  1 ioa_mbx    like ioa_mbx_template  based( ioa_mbxp );

dcl  1 ioa_mbx_template  based,
       2 command          fixed bin(15),
       2 buffer_addr      fixed bin(31),
       2 status           bit(32) aligned,
       2 f,
         3 ownership      bit(1),    /* = '0' = iop;  = '1' = ioa */
         3 mbz            bit(7),
         3 io_tag         char(1),
       2 msg_in           char(80) var,
       2 msg_out          char(80) var,
       2 more_info        bit(1) aligned,
       2 xtra_ptr         fixed bin(31);

/* Dump mailbox template */
dcl  1 ioa_mbx_dump   like ioa_mbx_dump_tpl based( ioa_mbxp );

dcl  1 ioa_mbx_dump_tpl  based,
       2 outbox_offset    char(92) var,       /* Not used for dumping          */
       2 mbz              fixed bin(15),      /* Must be zero for dump         */
       2 page_num         fixed bin(15),      /* Current adapter dump page     */
       2 data_type        fixed bin(15),      /* Dump data type                */
       2 absolute_addr    fixed bin(31),      /* Real IOA addr of dump data    */
       2 buf_byte_cnt     fixed bin(15),      /* Num bytes xfer'd this time    */
       2 page_seq_num     fixed bin(15),      /* Adapter's seq # for page      */
       2 remaining_cnt    fixed bin(15);      /* Num bytes still to be xfer'd */
/*     2 unused_str_o     char(70) var;       /* Not used for dumping          */

/* Command info mailbox template */
dcl  1 ioa_mbx_cmdinfo   like ioa_mbx_c_i_tpl based( ioa_mbxp );

dcl  1 ioa_mbx_c_i_tpl   based,
       2 outbox_offset    char(92) var,       /* Not used for command info     */
       2 sw_rev           fixed bin(15);      /* Board's software revision     */
/*     2 unused_str_o     char(84) var;       /* Not used for dumping          */

%replace IOA_MAILBOX_PTR_ADDR by   2098180;
%replace IOP_OWNER by '0'b;
%replace IOA_OWNER by '1'b;

/*   Brief description of protocol for diagnostic usage.
     -------------------------------------------------

     The  mailbox begins life with the IOP having ownership ( ownership =
     '0' ) and when the IOP has placed all the pertinent  information  in
     the box it will change ownership over to the IOA.  The IOP will then
     set the int_to_device bit in the IOA's Gate Array, which the adapter
     should  be  polling in order to know when a command has arrived.  It
     is not advised for the adapters to have their interrupts enabled  at
     this  point  in  time,  and  this  is  the  reason  for  polling the
     int_to_device bit.
```

```
The  ownership  bit works in conjunction with the int_to_device bit.
This should cover  the  case  where  an  adapter  detects  a  faulty
int_to_device  bit.  Therefore  the  adapter  should  only process a
command if the int_to_device bit and the ownership bit are both set.

Structure definitions.
---------------------
ioa_mbx.command ( input/output )
     - This is the command for the IOA to execute. On output it
       indicates the command executed by the IOA.

ioa_mbx.buffer_addr ( input/output )
     - Universal buffer longword address. The address of the
       primary buffer for an operation is placed here.

ioa_mbx.status ( output )
     - This will be filled in by the adapter indicating the
       status of the board, commands, etc...

ioa_mbx.ownership ( input/output )
     - This bit defines who the current owner of the mailbox is.  If
       this bit = '0'b then the IOP currently owns the mailbox, otherwise
       the adapter has ownership.

ioa_mbx.f.id_tag ( mailbox owner )
     - Id tag used by IOP-side processes only (not used by IOA)
       to encode owner of current mailbox op in order to prevent
       one IOP process from using another process's returned mbx.

ioa_mbx.msg_in ( input )
     - This is defined as a char(80) varying buffer.  It will be command
       dependent and can therefore have different meanings with overlays
       describing it.  However, the first two bytes will always specify
       the number of bytes in the buffer.  Whether the commands choose to
       use them is up to the individual command.

ioa_mbx.msg_out ( output )
     - This buffer is for the ioa to send data to the iop.  Again, the
       same applies to this buffer as to the .msg_in described above.

ioa_mbx.more_info ( input/output )
     - On output this signifies that there is more information than
       will fit into the msg_out buffer. Input meaning is command
       dependent.

ioa_mbx.xtra_ptr ( input/output )
     - The meaning of this pointer is command dependent, though
       generally it is used as a pointer to extra data that would
       not fit in the primary buffer, or as the secondary pointer
       for a command.

*/
/* %include 'iop_map_structures'; */
/*  ***begin copyright*** ******************************  */
/*                                                        */
/*  STRATUS CONFIDENTIAL INFORMATION: CLASS II            */
/*  COPYRIGHT (c) Stratus Computer, Inc. 1985             */
/*                                                        */
/*  This  program  contains  confidential and proprietary */
/*  information  of  Stratus Computer,  Inc.,  and  any   */
/*  reproduction, disclosure, or use in whole or in part  */
/*  is  expressly  prohibited,  except  as  may  be       */
/*  specifically authorized by prior written agreement or */
/*  permission of Stratus.                                */
/*                                                        */
/*  ***end copyright*** ********************************  */
/*  Begin include file iop_map_structures.incl.pl1           */

dcl  access_infop              ptr;

dcl  1 access_info             based (access_infop),
       2 version               fixed bin, /* = 1 */
       2 flags,
         3 read_access         bit (1),  /* 1 = yes, 0 = no */
```

```
        3 write_access          bit (1),   /* 1 = yes, 0 = no */
        3 priv_access           bit (1),   /* 1 = yes, 0 = no */
        3 local_memory          bit (1),   /* 1 = local, 0 = main(vos) */
        3 inter_lock            bit (1),   /* 1 = yes, 0 = no */
        3 io_st_bus             bit (1),   /* 1 = yes, 0 = no */
        3 dma                   bit (1),   /* 1 = yes, 0 = no */
        3 unused                bit (9);

%replace  ACCESS_INFO_VERSION_1     by    1;

/*  End include file iop_map_structures.incl.pl1                  */

/* %include 'ioa_commands'; */
/*   ***begin copyright*** ******************************   */
/*                                                         */
/*   STRATUS CONFIDENTIAL INFORMATION: CLASS II            */
/*   COPYRIGHT (c) Stratus Computer, Inc. 1986             */
/*                                                         */
/*   This program contains confidential and proprietary    */
/*   information of Stratus Computer, Inc., and any        */
/*   reproduction, disclosure, or use in whole or in part  */
/*   is expressly prohibited, except as may be             */
/*   specifically authorized by prior written agreement or */
/*   permission of Stratus.                                */
/*                                                         */
/*   ***end copyright*** ********************************   */
/*. Begin include file ioa_commands.incl.pl1  */

%replace  MIN_IOA_CMD_NO        by    0;

%replace  CMD_RESET             by    0;
%replace  CMD_CLEAR_INT         by    1;
%replace  CMD_TOGGLE_OBEY_P     by    2;
%replace  CMD_TOGGLE_OBEY_Q     by    3;
%replace  CMD_CLEAR_BROKEN      by    4;
%replace  CMD_SET_BROKEN        by    5;
%replace  CMD_INT_DEVICE        by    6;
%replace  CMD_CLEAR_CPU_RESET   by    7;

%replace  MAX_IOA_CMD_NO        by    7;

/*  End include file ioa_commands.incl.pl1  */

/* %include 'iop_error_codes'; */
/* %include 'stack_frame'; */
/* Begin include file -- stack_frame.incl.pl1  80-12-30 */

declare (sp, b_sp) ptr;

declare 1 stack_frame based (b_sp),
          2 display_ptr ptr,            /* -20 */
          2 entry_ptr ptr,              /* -16 */
          2 static_ptr ptr,             /* -12 */
          2 orig_frame_end ptr,         /*  -8 */
          2 on_ptr ptr,                 /*  -4 */
          2 prev_sp ptr,                /*   0 */
          2 return_ptr ptr;             /*  +4 */

/*        2 args (*) ptr                /*  +8... */
/* End include file -- stack_frame.incl.pl1 */
/* %include 'stack_frame_constants'; */
/* BEGIN INCLUDE FILE ... stack_frame_constants.incl.pl1 */

%replace backup_sp             by -20;

/* END INCLUDE FILE ... stack_frame_constants.incl.pl1 */
/* %include 'iop_constants'; */
/* begin include file . . . . . iop_constants.incl.pl1 */

%replace IOA_CLOCK_CHANNEL_NO by 0;
%replace TERM_SLOT_1           by 14;
%replace TERM_SLOT_2           by 15;

%replace MAX_IOP_INTERRUPT_LEVEL by 8;
%replace MAX_IOP_BACKGROUND_PRIORITY by [illegible];
```

```
%replace MASK_ALL_INTS by 7;
%replace ALLOW_TIMER_INTERRUPTS by 5;
%replace ALLOW_ICA_INTERRUPTS by 4;

%replace JIFFIES_PER_SECOND by 65536;

%replace ES_ENTITY by 0;
%replace ES_CHANNEL by 0;
%replace NON_ENTITY by -1;
%replace NONE by -1;

%replace START_ADAPT_MEM by 12582912;   /* 12M or C00000x */

/* End include file . . . . . iop_constants.incl.pl1 */

/* %include 'iop_mailbox'; */
/* Begin include file . . . . . iop_mailbox.incl.pl1 */

dcl  iop$mailbox_addr    ptr external static;
dcl  iop$vos_ringp       ptr external static;
dcl  iop$iop_ringp       ptr external static;
dcl  iop$syserr_ringp    ptr external static;

dcl  iop_mbxp            ptr;
dcl  syserr_ringp        ptr;
dcl  ring_cmdp           ptr;
dcl  vos_ringp           ptr;
dcl  iop_ringp           ptr;

%replace IOP_RING_SIZE   by   32;
%replace IOP_SYSERR_SIZE by   16;

%replace IOP_ON_LINE              by   0;
%replace IOP_INITIALIZING         by  -1;
%replace IOP_FAILED_TO_INIT       by  -2;
%replace IOP_EXEC_OUT_OF_PROM by  -3;

%replace IOP_MBX_ID          by '*IOPMBX*';

dcl 1 iop_mbx                based (iop_mbxp),
    2 id                     char (8),
    2 status,                                    /* set by IOP */
      3 ring_syserr          bit(1),
      3 pad                  bit(7),

    2 vector                 fixed bin (15),
    2 idle_status            fixed bin (15),
    2 save_time              fixed dec (15),

    2 lock_address           fixed bin (31),     /* Board loop-lock addr */
    2 syserr_msg             char (80) var,

    2 flags,                                     /* Set by VOS for VOS */
      3 vos_seen_syserr          bit (1),
      3 dumping_syserr_ring      bit (1),
      3 pad                      bit(14),

    2 syserr_ringp           ptr,                /* ptr to syserr ring */
    2 syserr_ring_addr       bit (32) aligned,   /* abs addr of syerr ring */
    2 syserr_size            fixed bin (15),     /* number of syserr ring */

    2 input_msg              char (80) var,
    2 output_msg             char (80) var,

    2 iop_head               fixed bin (15),     /* to iop ring head */
    2 iop_tail               fixed bin (15),     /* to iop ring tail */
    2 iop_ringp              ptr,                /* ptr to to iop ring */
    2 iop_ring_addr          bit (32) aligned,   /* abs addr of to iop ring */

    2 iop_ring_size          fixed bin(15),

    2 vos_head               fixed bin (15),     /* iop to vos ring */
    2 vos_tail               fixed bin (15),
```

```
    2 vos_ringp            ptr,
    2 vos_ring_addr        bit (32) aligned,
    2 vos_ring_size        fixed bin(15),
    2 global_state         fixed bin (31),     /* state -1 uninit, 0 - normal
                                                  ^= 0/-1 error code (2) */
    2 pbus_status          like berr_mc.p_status,
    2 terminator_status,
      3 no_fan_fault bit (1),
      3 no_sync_fault bit (1),
      3 no_bulk_fault bit (1),
      3 no_volt_fault bit (1),
      3 other_enema_good bit (1),
      3 power_state bit (3),
      3 pad          bit (7);

dcl 1 iop_syserr_ring (IOP_SYSERR_SIZE) based(syserr_ringp),
     2 free bit(1) aligned,
     2 syserr_code fixed bin (15),
     2 msg char (80) varying;

dcl 1 ring_cmd             based(ring_cmdp),
        2 free                   bit (1),
        2 pad                    bit (7),
        2 channel                fixed bin (15),
        2 command                fixed bin (15),
        2 data_16_1              fixed bin (15),
        2 data_32_1              fixed bin (31),
        2 data_32_2              fixed bin (31);

dcl 1 iop_ring (0:IOP_RING_SIZE-1) based (iop_ringp) like ring_cmd;

dcl 1 vos_ring (0:IOP_RING_SIZE-1) based (vos_ringp) like ring_cmd;

/* values for iop_mbx.idle_status */

%replace IDLE_STATUS_INIT            by 0;
%replace IDLE_STATUS_COMPLETE        by 1;
%replace IDLE_STATUS_REJECT          by 2;
%replace IDLE_STATUS_WAIT            by 3;


/* End include file . . . . . iop_mailbox.incl.pl1 */

/* %include 'iop_mc'; */
/* Begin include file ... iop_mc.incl.pl1  90-12-31 */

dcl  mcp ptr;

dcl 1 mc based (mcp),      /* machine conditions */
    2 identifier           char(4),                  /* *MC* */
    2 berr_type_code       fixed bin (15),
    2 align_bccs           char (0) aligned,
    2 bccs,
      3  bccs_broken       bit (1),
      3  bccs_broken2      bit (1),
    . 3  bccs_mempar       bit (1),
      3  bccs_memcomp      bit (1),
      3  bccs_timask       bit (1),
      3  bccs_pkcomp       bit (1),
      3  bccs_cmdpend      bit (1),
      3  bccs_statchg      bit (1),
      3  bccs_side         bit (1),
      3  bccs_ipend        bit (1),
      3• bccs_partner      bit (1),
      3  bccs_zout_gt      bit (1),
      3  bccs_level1       bit (1),
      3  bccs_romhign      bit (1),
      3  bccs_cmd_mask     bit (1),
      3  bccs_imask        bit (1),

    2 align_p_status       char (0) aligned,
    2 p_status,
      3 dma_vfy_ok         bit (1),
```

```
      3 dma_wrt               bit (1),
      3 dma_rd                bit (1),
      3 scan_int              bit (1),
      3 scan_up_L             bit (1),
      3 pbus_force            bit (1),
      3 pside_enb             bit (1),
      3 cside_enb             bit (1),
      3 pbus_diag             bit (1),
      3 pbus_obey_er          bit (1),
      3 pbus_sel_er           bit (1),
      3 pbus_berr_en          bit (1),
      3 pbus_enb              bit (1),
      3 pbus_lock             bit (1),
      3 obey_p                bit (1),
      3 obey_c                bit (1),
    2 ioa_slot                fixed bin (15),
    2 usp                     fixed bin (31),
    2 d                       (0:7) fixed bin (31),
    2 a                       (0:6) fixed bin (31),
    2 int_sr                  bit (16) aligned,
    2 status                  bit (16) aligned,
    2 pc                      fixed bin (31),
    2 align_info              char (0) aligned,
    2 info,
      3 extended_fmt          bit (1) ,
      3 mbz                   bit (3),
      3 vector                bit (12);

dcl 1 berr_mc based (mcp),      /* bus or address error machine conditions */
    2 identifier              char(4),
    2 berr_type_code          fixed bin (15),
    2 align_bdcs              char (0) aligned,
    2 bdcs,
      3  bdcs_broken          bit (1),
      3  bdcs_broken2         bit (1),
      3  bdcs_mempar          bit (1),
      3  bdcs_memcomp         bit (1),
      3  bdcs_timask          bit (1),
      3  bdcs_pkcomp          bit (1),
      3  bdcs_cmdpend         bit (1),
      3  bdcs_statchg         bit (1),
      3  bdcs_side            bit (1),
      3  bdcs_ipend           bit (1),
      3  bdcs_partner         bit (1),
      3  bdcs_zout_gt         bit (1),
      3  bdcs_level1          bit (1),
      3  bdcs_romhigh         bit (1),
      3  bdcs_cmd_mask        bit (1),
      3  bdcs_imask           bit (1),

    2 align_p_status          char (0) aligned,
    2 p_status,
      3 dma_vfy_ok            bit (1),
      3 dma_wrt               bit (1),
      3 dma_rd                bit (1),
      3 scan_int              bit (1),
      3 scan_up_L             bit (1),
      3 pbus_force            bit (1),
      3 pside_enb             bit (1),
      3 cside_enb             bit (1),
      3 pbus_diag             bit (1),
      3 pbus_obey_er          bit (1),
      3 pbus_sel_er           bit (1),
      3 pbus_berr_en          bit (1),
      3 pbus_enb              bit (1),
      3 pbus_lock             bit (1),
      3 obey_p                bit (1),
      3 obey_c                bit (1),
    2 ioa_slot                fixed bin (15),
    2 usp                     fixed bin (31),
    2 d                       (0:7) fixed bin (31),
    2 a                       (0:6) fixed bin (31),
    2 int_sr                  bit (16) aligned,
    2 status                  bit (16) aligned,
    2 pc                      fixed bin (31),
    2 align_info              char (0) aligned,
```

```
    2 info,
      3 extended_fmt       bit (1),
      3 mbz                bit (3),
      3 vector             bit (12),
    2 align_stat           char (0) aligned,
    2 special_status,
      3 rerun              bit (1),
      3 pad1               bit (1),
      3 inst_fetch         bit (1),
      3 data_fetch         bit (1),
      3 r_m_w_cycle        bit (1),
      3 high_byte          bit (1),
      3 byte_xfer          bit (1),
      3 read               bit (1),
      3 pad2               bit (5),
      3 function_code      bit (3),
    2 fault_addr           fixed bin (31),
    2 resv_data_out        bit (16) aligned,
    2 data_out             bit (16) aligned,
    2 resv_data_in         bit (16) aligned,
    2 data_in              bit (16) aligned,
    2 resv_inst            bit (16) aligned,
    2 instruction_reg      bit (16) aligned,
    2 internal_info        (16) fixed bin (15);

/* End include file ... iop_mc.incl.pl1 */
/* %include 'iop_equip_table'; */
/*   +++begin copyright+++ ********************************   */
/*                                                            */
/*   STRATUS CONFIDENTIAL INFORMATION: CLASS II               */
/*   COPYRIGHT (c) Stratus Computer, Inc. 1985                */
/*                                                            */
/*   This program contains confidential and proprietary       */
/*   information of Stratus Computer, Inc., and any           */
/*   reproduction, disclosure, or use in whole or in part     */
/*   is expressly prohibited, except as may be                */
/*   specifically authorized by prior written agreement or    */
/*   permission of Stratus.                                   */
/*                                                            */
/*   +++end copyright+++ ********************************     */
/*   Begin include file iop_equip_table.incl.pl1              */

dcl  equip_tables$             ptr external static;
dcl  equip_tablep              ptr;

%replace MAX_ENTITIES          by   8;
%replace NUM_OF_SLOTS          by   13;  /* 0-13 */
%replace MAX_CHANNELS          by   512;

dcl 1 stat_tbl based,
          4 alive               bit (1),          /* 1 = alive, 0 = broken */
          4 initialized         bit (1),
          4 testing             bit (1),          /* 1 = yes, 0 = no */
          4 loading             bit (1),
          4 running             bit (1),
          4 prom_start          bit (1),
          4 exception           bit (1),
          4 burning_prom        bit (1),
          4 broken              bit (1),          /* cannot be made alive */
          4 pad                 bit (23);

dcl 1 entity_tbl based,
          4 e_ptr               ptr,
          4 e_fb15              fixed bin (15);

dcl  1 equip_table             based (equip_tablep),
       2 slot (0:NUM_OF_SLOTS),
         3 entity              fixed bin (15),     /* associated entity or -1 */
         3 adapt_type          fixed bin (15),     /* 1-255, see below */
         3 priority            fixed bin (15),     /* 1-25, see below */
         3 status like stat_tbl,
         3 entity_data like entity_tbl,
       2 entity (1:MAX_ENTITIES),
         3 type                fixed bin (15),
```

```
        3 status like stat_tpl,
        3 entity_data like entity_tpl,
        3 cmo_entry            entry (fixed bin (15), fixed bin (15),
                                      fixed bin (15), fixed bin (31),
                                      fixed bin (31)),
        3 config_entry         entry (fixed bin (15), bit (16) aligned,
                                      fixed bin (31),
                                      fixed bin (31), fixed bin (31)),
        3 slot_entry           entry (fixed bin (15), fixed bin (15)),
      2 channel (1:MAX_CHANNELS),
        3 entity               fixed bin (15),
        3 owner                fixed bin (15),
        3 limit                fixed bin (15),
        3 status like stat_tpl,
        3 entity_data like entity_tpl,
      2 slot_prom_rev(0:NUM_OF_SLOTS) fixed bin (15);

/*  range constants for the field 'priority'                  */

%replace  MIN_PRIORITY         by    1;
%replace  DEFAULT_PRIORITY     by    256;
%replace  MAX_PRIORITY         by    256;

/* standard entity IDs */

%replace IOP_DISK_ENTITY_ID by 1;
%replace IOP_COMM_ENTITY_ID by 2;
%replace IOP_CTAPE_ENTITY_ID by 3;

%replace IOP_TEST_ENTITY_ID by 8;


/*  End include file iop_equip_table.incl.pl1                 */

/* %include 'iop_addr_routines'; */
/* Begin include file ... iop_addr_routines ... */

iop$ioa_addr: procedure (a_ioa_no, a_local_ptr) returns (ptr) inline;

dcl a_ioa_no          fixed bin (15);
dcl a_local_ptr       ptr;

dcl iop$base_vectors (0:13) fixed bin (31) external static;
dcl addrel builtin;

/* DEBUG ...

dcl  iop$debug_crash entry (char(80) var);

     if a_ioa_no < lbound(iop$base_vectors,1) |
        a_ioa_no < hbound(iop$base_vectors,1)
         then call iop$debug_crash('ILLEGAL slot no in call to iop$ioa_addr.');

   ... END DEBUG */

     return (addrel(a_local_ptr, iop$base_vectors(a_ioa_no)));

end iop$ioa_addr;
iop$ioa_abs_addr: procedure (a_local_ptr) returns (ptr) inline;

dcl a_local_ptr       ptr;

/* %include 'iop_constants'; */
/* Begin include file . . . . . iop_constants.incl.pl1 */

%replace IOA_CLOCK_CHANNEL_NO by 2;
%replace TERM_SLOT_1             by 14;
%replace TERM_SLOT_2             by 15;

%replace MAX_IOP_INTERRUPT_LEVEL by 8;
%replace MAX_IOP_BACKGROUND_PRIORITY by 8;

%replace MASK_ALL_INTS by 7;
%replace ALLOW_TIMER_INTERRUPTS by 5;
%replace ALLOW_IOA_INTERRUPTS by 4;
```

```
%replace JIFFIES_PER_SECOND by 65536;

%replace ES_ENTITY by 0;
%replace ES_CHANNEL by 0;
%replace NON_ENTITY by -1;
%replace NONE by -1;

%replace START_ADAPT_MEM by 12582912;   /* 12M or C00000x */

/* End include file . . . . . iop_constants.incl.pl1 */

dcl addrel builtin;

     return (addrel(a_local_ptr, START_ADAPT_MEM));

end iop$ioa_abs_addr;

/* End include file ... iop_addr_routines ... */

/* constants */

%replace CALL_ENTRY      by 0;
%replace FAULT_ENTRY     by 1;
%replace CRASH_ENTRY     by 2;
%replace LEVEL7_ENTRY    by 3;
%replace MSG_ENTRY       by 4;
%replace BREAK_ENTRY     by 5;
%replace TRACE_ENTRY     by 6;

%replace STEP_ENTRY      by 7;
%replace POLL_ENTRY      by 8;

%replace USING_IOP       by   -1;

%replace  ICA_MAX             by   8;

%replace  IOP_OWNERSHIP       by   '0'b;
%replace  ICA_OWNERSHIP       by   '1'b;

%replace LOCAL_MEMORY_LIMIT   by 524288; /* 512k */

%replace  ALIVE     by    '1'b;
%replace  OPEN      by    '1'b;
%replace  CLOSED    by    '0'b;
%replace  FALSE     by    '0'b;
%replace  TRUE      by    '1'b;

%replace  MAX_ICA_ADDR by 4194303;      /* 3FFFFFx */

%replace  MAX_ENTITY_CMDS by 10;

/* parameters */

dcl  a_mcp                      ptr;
dcl  a_msg                      char (*) var;
dcl  a_entry_var                entry variable;
dcl  a_entity_id                fixed bin(15);
dcl  a_output_sucr              entry (char (80) var) variable;

/* automatic */

dcl  vos_address                ptr;
dcl  te_address                 ptr;
dcl  copy_length                fixed;

dcl  offset_p                   ptr;

dcl  slot_select                ptr;
dcl  target_slot                fixed;

dcl  entry_sw                   fixed bin (15);
dcl  input                      char (80) var;
dcl  saved_input                char (80) var;
```

```
dcl  input_line                   char (80) var;
dcl  ioa_input                    char (80) var;

dcl  n_args                       fixed bin (15);
dcl  args (0:8)                   char (32) var;
dcl  debug_sp                     ptr;
dcl  i                            fixed bin (15);
dcl  p                            ptr;
dcl  old_p                        pointer;
dcl  n_bytes                      fixed bin (15);
dcl  n_words                      fixed bin (15);
dcl  val                          fixed bin (31);
dcl  stuff                        fixed bin (31);
dcl  temp_string                  char (64) varying;
dcl  err_msg                      char (64) varying;
dcl  msg                          char (80) varying;
dcl  element_size                 fixed bin (15);
dcl  entry_level                  fixed bin (15);
dcl  task_no                      fixed bin (31);
dcl  temp_mcp                     pointer;
dcl  pc_temp                      fixed bin (31);
dcl  code                         fixed bin (15);
dcl  real_why                     bit(1) aligned;
dcl  faultno                      fixed bin(15);
dcl  added_entity_cmd             bit (1) aligned;
dcl  recognized                   bit (1) aligned;
dcl  ennui                        bit (1) aligned;
dcl  at_prompt                    bit (1) aligned;
dcl  redirected_command           bit (1) aligned;
dcl  not_sw                       bit (1) aligned;
dcl  all_sw                       bit (1) aligned;

dcl  1  entry_var,
        2  display                ptr,
        2  code                   ptr,
        2  static                 ptr;
dcl  defined_entry_var            entry variable defined (entry_var);

dcl  1  label_var,
        2  code                   ptr,
        2  stack                  ptr;
dcl  defined_label_var            label variable defined (label_var);

dcl  def_mc_stat                  fixed bin (15) defined mc.p_status;
dcl  def_mc_bdcs                  fixed bin (15) defined mc.bdcs;
dcl  def_mc_spec_stat             fixed bin (15) defined berr_mc.special_status;

dcl  desired_ioa_slot             ptr;
dcl  pp                            ptr;

/* BUILTINS */

dcl (bin, addrel, unspec, string, bit, null)    builtin;

/* static */

/* static */

dcl  entity_commands_available  bit (1) aligned int static init ('0'b);
dcl  1 entity_command (MAX_ENTITY_CMDS) int static,
      2   defined          bit(1) aligned,
      2   entity_id        fixed bin(15),
      2   routine          entry (fixed bin (15), (0:8) char (32) var,
                                  bit(1) aligned ) variable;

dcl  star_addr                    fixed bin (31) static initial (1);
dcl  using_loc                    fixed bin (15) static initial (USING_IOP);

dcl  iop$current_entity           fixed bin (15) external static;
dcl  iop$current_slot             fixed bin (15) external static;
dcl  iop$current_interrupt        fixed bin (15) external static;
dcl  iop$current_channel          fixed bin (15) external static;


dcl  es_slot_ptrs(0:NUM_OF_SLOTS) ptr   external static;
dcl  pbus_slot_ptrs(0:NUM_OF_SLOTS) ptr   external static;
```

```
dcl  ioa_channel_state(0:NUM_OF_SLOTS) bit (1) static initial
                        ((NUM_OF_SLOTS)(CLOSED), CLOSED);

dcl  help_text (31)            char (77) var int static init (
     'break <addr>',
     'call <routine> [static_ptr]',
     'clear <addr> | -all',
     'close <ICA_slot> | -all',
     'continue',
     'disassemble <addr> [n_words]                 ; max n_words = 256',
     'disassemble_IOA <IOA_slot> <addr> [n_words] ; max n_words = 256',
     'disassemble_vos <addr> [n_words]             ; max n_words = 256',
     'dump <addr> [n_bytes]                        ; default n_bytes = 16 max = 409

     'dump_IOA <IOA_slot> <addr> [n_bytes]         ; default n_bytes = 16 max = 409

     'dump_vos <addr> [n_bytes]                    ; default n_bytes = 16 max = 409

     'frame [addr]',
     'fstack <task_no>',
     'go [addr [stack_frame_addr]]',
     'help',
     'ICA <ICA_slot> <command line>                ; send command line to IOA',
     'IOP <command_line>                           ; command for IOP',
     'list                                         ; list breaks',
     'open <ICA_slot> | -all',
     'regs',
     'search[_IOA][.b | .w | .l] <from> <to> [^]<byte_to_find>',
     'send_ioa_cmd <ICA_slot> <command_number>',
     'set[.b | .w | .l] <addr> {values}            ; default set.w',
     'set_ICA <IOA_slot> <addr> {values}           ; set.w',
     'start_ioa_debug <ICA_slot>',
     'status [-all]                                ; debugger status',
     'step [number_of_instructions]                ; NOT SUPPORTED',
     'trace [addr]',
     'use (IOP | ICA <ICA_slot>)',
     'where [addr]',
     'why'
);

dcl  cmd_names (40)            char (16) var int static init (
                               'break',              /* 1 */
                               'call',               /* 2 */
                               'clear',              /* 3 */
                               'continue',           /* 4 */
                               'disassemble',        /* 5 */
                               'dump',               /* 6 */
                               'frame',              /* 7 */
                               'fstack',             /* 8 */
                               'go',                 /* 9 */
                               'help',               /* 10 */
                               'list',               /* 11 */
                               'regs',               /* 12 */
                               'set',                /* 13 */
                               'set.b',              /* 14 */
                               'set.l',              /* 15 */
                               'set.w',              /* 16 */
                               'trace',              /* 17 */
                               'where',              /* 18 */
                               'why',                /* 19 */
                               'dump_ICA',           /* 20 */
                               'set_ICA',            /* 21 */
                               'dump_vos',           /* 22 */
                               'use',                /* 23 */
                               'disassemble_vos',    /* 24 */
                               'disassemble_ICA',    /* 25 */
                               'send_ioa_cmd',       /* 26 */
                               'start_ioa_debug',    /* 27 */
                               'open',               /* 28 */
                               'ICA',                /* 29 */
                               'status',             /* 30 */
                               'close',              /* 31 */
                               'step',               /* 32 */
                               'search',             /* 33 */
```

```
                                  'search_IOA',        /* 34 */
                                  'search.b',          /* 35 */
                                  'search.w',          /* 36 */
                                  'search.l',          /* 37 */
                                  'search_IOA.b',      /* 38 */
                                  'search_IOA.w',      /* 39 */
                                  'search_IOA.l');     /* 40 */

/* based */

dcl  based_ptr                ptr based;
dcl  based_char1              char (1) based;
dcl  based_fb15               fixed bin (15) based;
dcl  based_fb31               fixed bin (31) based;


/* external */

dcl  iop$read_from_ioa        entry (ptr, fixed bin(31), fixed bin (15));
dcl  iop$write_to_ioa         entry (ptr, fixed bin(31), fixed bin (15));

dcl  iop$read_from_vos        entry (ptr, fixed bin(31), fixed bin (15));
dcl  iop$write_to_vos         entry (ptr, fixed bin(31), fixed bin (15));
dcl  iop$ioa_enter_debug      entry (fixed bin (15), fixed bin (15));

dcl  hex                      entry (bin (31), bin (15)) returns (char (8)
                              var);
dcl  hexp                     entry (ptr, bin (15)) returns (char (8)
                              var);
dcl  unhex                    entry (char(*) var, fixed bin (31), fixed bin);
dcl  ptr                      entry (bin (31)) returns (ptr);
dcl  rel                      entry (ptr) returns (bin (31));
dcl  stackframeptr            entry returns (ptr);
dcl  iop$report_condition_info entry;

/**** DELETED RGC *********/
/*dcl  iop$n_tasks                fixed bin ext static;      */
/*************************/

dcl  iop$copy_ioa             entry(ptr, ptr, fixed);

dcl  iop$select_adapter       entry (fixed, fixed);

dcl  iop$send_cmd_to_adapt    entry(fixed, fixed, fixed);

dcl  iop_debug_full$continue_break
                              entry (ptr);
dcl  iop_debug_full$clear_break
                              entry (ptr);
dcl  iop_debug_full$clear_all_breaks
                              entry;
dcl  iop_debug_full$list_breaks
                              entry;
dcl  iop_debug_full$restart_break
                              entry (ptr);
dcl  iop_debug_full$set_break entry (ptr);
dcl  iop_debug_full$trace     entry (ptr, fixed bin (31), ptr);
dcl  iop_debug_full$fstack    entry (fixed bin (31));
dcl  iop_debug_full$disassemble
                              entry (ptr, fixed bin);

dcl  iop_debug_full$disassemble_vos
                              entry (ptr, fixed bin);
dcl  iop_debug_full$disassemble_ioa
                              entry (ptr, fixed bin);


dcl  iop_debug_full$addr_to_module
                              entry (fixed bin (31), fixed bin)
                              returns (char (32) varying);
dcl  iop_debug_full$describe_location
                              entry (pointer) returns (char (64) varying);
dcl  iop_debug_full$eval_location
                              entry (char (32) varying, char (64) varying)
                              returns (pointer);
```

```
dcl  iop_debug_full$frame       entry (ptr) returns (char(64) var);


dcl  iop$map_page               entry (fixed bin (15), bit (32) aligned,
                                      fixed bin(15), bit (32) aligned,
                                      fixed bin (15));
dcl  iop$free_map_page          entry (fixed bin (15), bit (32) aligned,
                                      fixed bin (15));


dcl  map_ptr                    ptr;

%page;
/* ========================================================== */

/* call entry is here */

     mcp = null ();
     entry_sw = CALL_ENTRY;
     go to join;

iop_debug$poll:
     entry;
     mcp = null();
     entry_sw = POLL_ENTRY;
     goto join;

iop_debug$fault:                                  /* unexpected fault */
     entry (a_mcp);
     mcp = a_mcp;
     entry_sw = FAULT_ENTRY;
     go to join;

iop_debug$break:                                  /* breakpoint */
     entry (a_mcp);

     mcp = a_mcp;
     entry_sw = BREAK_ENTRY;
     go to join;

iop_debug$trace_fault:                            /* part of continuing a breakpt */
     entry (a_mcp);

     mcp = a_mcp;
     entry_sw = TRACE_ENTRY;
     go to join;

iop_debug$crash:                                  /* stop everything */
     entry (a_msg);

     mcp = null ();
     entry_sw = CRASH_ENTRY;
     go to join;

iop_debug$level7:                                 /* manual "break" */
     entry (a_mcp);

     mcp = a_mcp;
     entry_sw = LEVEL7_ENTRY;
     go to join;

psi_debug$msg:            /* needed for common psi/iop debugger code */
     entry (a_msg);
iop_debug$msg:                                    /* blab and return */
     entry (a_msg);

     mcp = null ();
     entry_sw = MSG_ENTRY;

     go to join;

iop_debug$define_entity_command:
     entry (a_entry_var, a_entity_id);
```

```
     if ^entity_commands_available
     then do i = lbound(entity_command,1) to hbound(entity_command,1);
               entity_command.defined(i) = '0'b;
               entity_command.entity_id(i) = 0;
               end;

     added_entity_cmd = '0'b;
     do i = lbound(entity_command,1) to hbound(entity_command,1)
          while (^added_entity_cmd);
          if ^entity_command.defined(i)
          then do;
               entity_command.defined(i) = '1'b;
               entity_command.entity_id(i) = a_entity_id;
               entity_command.routine(i) = a_entry_var;
               added_entity_cmd = '1'b;
               end;
          end;

     if added_entity_cmd
     then entity_commands_available = '1'b;
     else call iop$syserr_code ('Unable to add debugger command for entity ' ||
                                 bin_to_char((a_entity_id)), 0, (0) );

     return;

%page;
join:
     entry_level = iop$get_level ();
     call iop$set_level (MASK_ALL_INTS);
     debug_sp = stackframeptr ();

     target_slot = -1;
     on anyother
     begin;
          call write_vos_msg('Error condition signalled in debugger. oncode ='
               || bin_to_char((oncode())));
          call iop$report_condition_info;
          if target_slot ^= -1 & ioa_channel_state(target_slot) = OPEN &
               oncode() = e$iop_adapt_not_alive
          then do;
               call write_vos_msg('IOA ERROR IN DEBUGGER. Closing IOA ' ||
                    bin_to_char((target_slot)));
               ioa_channel_state(target_slot) = CLOSED;
               end;
          goto reenter_debug;
          end;
     real_why = '0'b;
     call print_why;

     n_args = 0;
     if entry_sw = MSG_ENTRY
        then do;
             call iop$set_level (entry_level);
             return;
             end;
     if entry_sw = TRACE_ENTRY
        then do;
             call iop_debug_full$restart_break (mcp);
             call iop$set_level (entry_level);
             return;
             end;

reenter_debug:
     if mcp ^= null()                                  /* set default frame */
     then p = ptr(mc.a(6));
     else p = debug_sp;
     temp_string = iop_debug_full$frame(p);
     if entry_sw = POLL_ENTRY
         then goto loop_without_prompt;

%page;
     /* basic command loop */

loop:
     if entry_sw = POLL_ENTRY
```

```
      then do;
           call iop$set_level (entry_level);
           return;
           end;

      if using_loc = USING_IOP
           then call write_vos_msg ('IOP Debugger: \');
           else call write_vos_msg ('IOA (' ||
                          bin_to_char((using_loc)) || ') Debugger: \');
      at_prompt = TRUE;

loop_without_prompt:

      equip_tablep = equip_tablep$;
      ennui = TRUE;

/* check the equipment table for IOAs that are present. Only scan the */
/* mailbox if the IOA is ALIVE                                        */

      do target_slot = 0 to NUM_OF_SLOTS;
      if (equip_table.slot(target_slot).alive = ALIVE &
           ioa_channel_state(target_slot) = OPEN)
           then do;
                call iop$select_adapter( target_slot, code);
                if code = 0
                then do;
                     ioa_input = '';
                     call read_ioa_msg_no_wait(ioa_input);
                     if ( length(ioa_input) > 0 )
                     then do;
                          if at_prompt
                               then call write_vos_msg('');
                          call write_vos_msg('*IOA (' ||
                               bin_to_char((target_slot)) || '): ' ||
                               ioa_input);
                          ennui = FALSE;
                     end;
                end;
           end;
      end;

      /* Look for commands from VOS */

      call read_vos_msg_no_wait (input);
      saved_input = input;

      call parse_command;

      if n_args >= 0
         then do;
              if using_loc ^= USING_IOP & ^redirected_command
                   then go to using_ioa_cmd;
              do i = 1 to hbound (cmd_names, 1);
                   if cmd_names (i) = args (0)
                        then go to cmd (i);
                   end;
              recognized = '0'b;
              if entity_commands_available
              then do i = 1 to MAX_ENTITY_CMDS while (^recognized);
                        if entity_command.defined (i)
                        then call entity_command.routine (i)
                                  (n_args, args, recognized);
                        end;
              if recognized
              then goto loop;
              call write_vos_msg ('unrecognized command - ' || saved_input);
              end;

      if entry_sw = POLL_ENTRY
      then do;
           call iop$set_level (entry_level);
           return;
           end;
```

```
     if ennui
          then call waste_time;

     if ^at_prompt & ennui
          then go to loop;

     go to loop_without_prompt;

%page;
/* common error reporting */

search_action (*)::
set_action (*):
     call write_vos_msg ('Internal error.');
     go to loop;
too_many_args:
     call write_vos_msg ('Too many args.');
     go to loop;
missing_arg:
     call write_vos_msg ('Missing arg.');
     go to loop;
bad_byte_count:
     call write_vos_msg ('Invalid byte count.');
     go to loop;
invalid_hex:
     call write_vos_msg ('Bad hex number.');
     go to loop;
no_star:
     call write_vos_msg ('No value for "*".');
     go to loop;
no_machine_conditions:
     call write_vos_msg ('No machine conditions available.');
     go to loop;
eval_error:
     call write_vos_msg (err_msg);
     go to loop;
ioa_select_error:
     call write_vos_msg('Error in selecting IOA ' || bin_to_char((code)));
     go to loop;
bad_ioa_no:
     call write_vos_msg('IOA number not in range 0 - 13');
     go to loop;

%page;
/* commands */


cmd (1):                                          /* break */

     p = evaluate (args (1));

     call iop_debug_full$set_break (p);
     go to loop;

cmd (2):                                          /* call */
     if n_args = 0
        then go to missing_arg;

     entry_var.display = null ();

     if n_args >= 2
        then do;
              p = ptr (cv_hex (args (2)));
              if rel(p) > bin('7FFFFF'b4)
                 then do;
                       call write_vos_msg('Static address out of range ' ||
                          hexp(p, 8));
                       goto cmd2_exit;
                       end;
              entry_var.static = p;
              end;
        else entry_var.static = null ();

     p = evaluate (args (1));
```

```
     if rel(p) > bin('7FFFFF'b4)
          then do;
               call write_vos_msg('Code address out of range ' || hexp(p, 8));
               goto cmd2_exit;
               end;
     entry_var.code = p;

     call defined_entry_var;

cmd2_exit:

     go to loop;

%page;
cmd (3):                                              /* clear */
     if args(1) = '-all'
     then do;
          call iop_debug_full$clear_all_breaks;
          goto loop;
          end;

     p = evaluate (args (1));

     call iop_debug_full$clear_break (p);
     go to loop;

cmd (4):                                              /* continue */
     if entry_sw ^= BREAK_ENTRY & entry_sw ^= STEP_ENTRY
        then do;
             call write_vos_msg (
                       'Can''t continue without a breakpoint -- only go.')
                       ;
             goto loop;
             end;
     call iop_debug_full$continue_break (mcp);
     call iop$set_level (entry_level);
     return;

%page;
cmd (5):                                              /* disassemble */
     if n_args >= 2
        then n_words = cv_hex (args (2));
        else n_words = -1;

     p = evaluate (args (1));

     if n_words < -1 | n_words > 256
        then go to bad_byte_count;

     /* map page containg the address pointed by p and get ptr to virt addr */

     call iop_debug_full$disassemble(p, n_words);

     go to loop;

cmd (6):                                              /* dump */
     if n_args >= 2
        then n_bytes = cv_hex (args (2));
        else n_bytes = 16;

     if n_bytes < 1 | n_bytes > 4096
        then go to bad_byte_count;

     p = evaluate (args (1));

     call dump (p, n_bytes);

     go to loop;

%page;
cmd(7):                                               /* frame */
     if n_args > 1
     then goto too_many_args;
```

```
     if n_args = 0
     then temp_string=iop_debug_full$frame (null()); /* display frame addr  */
     else do;
          p = evaluate (args(1));
          temp_string=iop_debug_full$frame (p);      /* set frame addr */
          end;

     call write_vos_msg (temp_string);
     goto loop;

cmd (8):                                          /* fstack */
     if n_args = 0
        then go to missing_arg;

     call unhex (args (1), task_no, code);
     if code ^= 0
        then go to invalid_hex;

     call iop_debug_full$fstack (task_no);
     go to loop;

cmd (9):                                          /* go */
     if entry_sw = BREAK_ENTRY
        then do;
             call write_vos_msg (
                    'Can''t ''go'' from a break-- only continue.');
             goto loop;
             end;
     if n_args > 0
        then if mcp = null ()
                then do;
                     if n_args < 2
                        then goto missing_arg;
                                                  /* MUST have stack here */
                     label_var.code = evaluate (args (1));
                     label_var.stack = evaluate (args (2));
                     goto defined_label_var;
                     end;
                else do;
                     pc_temp = rel (evaluate (args (1)));
                     if ^mc.extended_fmt
                        then mc.pc = pc_temp;
                                                  /* pc spec */
                        else do;
                             berr_mc.pc = pc_temp;
                             berr_mc.special_status.rerun = TRUE;
                             call write_vos_msg(
'WARNING: Changing PC for extended exception frame. Special status = '
     || hex((cef_mc_spec_stat),4));
                             end;
                     if n_args > 1
                        then mc.a (6) = cv_hex (args (2));
                                                  /* stack ptr */
                     end;

     else if mcp ^= null () &  mc.extended_fmt    /* no arg given */
          then call write_vos_msg (
'WARNING: restarting bus/address error from the same address.');
     call iop$set_level (entry_level);
     return;

cmd (10):                                         /* help */
     do i = 1 to hbound (help_text, 1);
          call write_vos_msg (help_text (i));
     end;

     if entity_commands_available
     then do i = 1 to MAX_ENTITY_CMDS;
          if entity_command.defined(i)
          then do;
               call iop_debug$msg (' ');
               call iop_debug$msg ('Commands for entity' ||
                              bin_to_char((entity_command.entity_id(i))));
```

```
            call entity_command.routine(i) (n_args, args, ('0'b) );
            end;
         end;

      go to loop;

cmd (11):                                          /* list */
      call iop_debug_full$list_breaks ();
      goto loop;

cmd (12):                                           /* regs */
      call iop_debug$regs (mcp);
      go to loop;

%page;
cmd (13):                                           /* set */
      element_size = 2;
      go to set_join;

cmd (14):                                           /* set.b */
      element_size = 1;
      go to set_join;

cmd (15):                                           /* set.l */
      element_size = 4;
      go to set_join;

cmd (16):                                           /* set.w */
      element_size = 2;
      go to set_join;

set_join:
      if n_args < 2
         then go to missing_arg;

      p = evaluate (args (1));
      old_p = p;

      do i = 2 to n_args;
         val = cv_hex (args (i));                  /* just to validate */
      end;

      do i = 2 to n_args;
        map_ptr = p;

/* map pointer only if it is less than 512K. */

        if rel(p)  < LOCAL_MEMORY_LIMIT
           then map_ptr = set_access(map_ptr, 1);

/* execute the following block only if mapping was successful. */

        if map_ptr ^= null()
           then do;

              val = cv_hex (args (i));
              go to set_action (element_size);

set_action (1):
              map_ptr -> based_char1 = byte (val);
              go to end_set_action;

set_action (2):
              map_ptr -> based_fb15 = val;
              go to end_set_action;

set_action (4):
              map_ptr -> based_fb31 = val;

end_set_action:

              if rel(p)  < LOCAL_MEMORY_LIMIT
                 then call reset_access(map_ptr, 1);
```

```
                p = addrel (p, element_size);

              end;

          else
              call write_vos_msg('Error in mapping target address.');

   end;

set_action_exit:

      go to loop;

%page;
cmd (17):                                               /* trace */
      if n_args > 0
         then do;
              p = ptr (cv_hex (args (1)));
              pc_temp = -1;
              temp_mcp = null;
              end;
      else if mcp ^= null
         then do;
              temp_mcp = mcp;
              p = ptr (mc.a (6));                       /* sp */
              if mc.extended_fmt
                 then pc_temp = berr_mc.pc;
                 else pc_temp = mc.pc;
              end;
      else do;
            p = debug_sp;
            pc_temp = -1;
            temp_mcp = null;
            end;

      call iop_debug_full$trace (p, pc_temp, temp_mcp);
      go to loop;

%page;
cmd (18):                                               /* where */
      p = evaluate (args (1));

      temp_string = iop_debug_full$describe_location (p);
      call write_vos_msg (temp_string);
      go to loop;

cmd (19):                                               /* why */
      real_why = TRUE;
      call print_why;
      go to loop;

%page;
cmd (20):                                               /* dump_ioa_mem */
      if n_args >= 3
         then n_bytes = cv_hex (args (3));
         else n_bytes = 16;

      if n_bytes < 1 | n_bytes > 4096
         then go to bad_byte_count;

      p = evaluate (args (2));


/* check target IOA slot with equipment table  */

      call get_slot(1);

/* insert code to load IOA select register with the desired slot #. */
/*  slot# -> IOA_SLOT_SELECT                                         */

      call iop$select_adapter( target_slot, code);
      if code ^= 0
           then go to ioa_select_error;
```

```
        call dump_ioa (p, n_bytes);

        go to loop;

cmd (21):                                          /* set IOA */

        element_size = 2;
        if n_args < 3
           then go to missing_arg;

        p = evaluate (args (2));

/* check target IOA slot with equipment table  */

        call get_slot(1);

        call iop$select_adapter( target_slot, code);
        if code ^= 0
             then go to ioa_select_error;

        do i = 3 to n_args;

             val = cv_hex (args (i));
             offset_p = iop$ioa_abs_addr(p);

             offset_p -> based_fb15 = val;

             p = addrel (p, element_size);
        end;

        go to loop;

cmd (22):                                          /* dump vos */
        if n_args >= 2
           then n_bytes = cv_hex (args (2));
           else n_bytes = 16;

        if n_bytes < 1 | n_bytes > 4096
           then go to bad_byte_count;

        p = evaluate (args (1));

        call dump_vos (p, n_bytes);

        go to loop;

%page;
cmd (23):                                          /* use */

        if args(1) ^= 'IOP' & args(1) ^= 'IOA'
        then do;
             call write_vos_msg('Invalid argument ,' || args(1) ||
                                ', for use command.');
             go to loop;
             end;

        if args(1) = 'IOP'
             then using_loc = USING_IOP;
        else do;
             call get_slot (2);
             using_loc = target_slot;
             end;
        go to loop;

%page;
cmd (24):                                          /* disassemble vos */
        if n_args >= 2
           then n_words = cv_hex (args (2));
           else n_words = -1;

        p = ptr( cv_hex( args (1)) );

        if n_words < -1 | n_words > 256
           then go to bad_byte_count;
```

```
    call iop_debug_full$disassemble_vos(p, n_words);

    go to loop;

cmd (25):                                   /* disassemble IOA */
    if n_args >= 3
       then n_words = cv_hex (args (3));
       else n_words = -1;

    p = evaluate (args (2));

/* check target IOA slot with equipment table  */

    call get_slot(1);

    call iop$select_adapter( target_slot, code);
    if code ^= 0
         then go to ioa_select_error;

    if n_words < -1 | n_words > 256
       then go to bad_byte_count;

    call iop_debug_full$disassemble_ioa(iop$ioa_abs_addr(p), n_words);
    go to loop;

%page;
cmd(26):                         /* send IOA command */

    call get_slot(1);

    call iop$select_adapter( target_slot, code);
    if code ^= 0
         then go to ioa_select_error;

    ioa_mbxp = iop$ioa_abs_addr(
                  iop$ioa_abs_addr(ptr(IOA_MAILBOX_PTR_ADDR)) ->
                                   based_ptr);

    if ioa_mbx.ownership = bit(IOP_OWNERSHIP)
         then ioa_mbx.command = bin(cv_hex(args(2)));
         else call write_vos_msg('OWNERSHIP CONFLICT');

    ioa_mbx.ownership = bit (IOA_OWNERSHIP);

    call interrupt_ioa(code);

/*     call clear_vos_msg;        */

    goto loop;

cmd(27):                              /* start IOA debug */

    call get_slot(1);

    call iop$ioa_enter_debug(target_slot, code);
    if code ^= 0
        then call write_vos_msg('DEBUG: could not start ioa debugger. code = '
               || bin_to_char((code)));
    goto loop;

%page;
cmd (28):                             /* open */

    if args(1) = '-all'
    then do i = 0 to NUM_OF_SLOTS;
          ioa_channel_state(i) = OPEN;
          end;
    else do;
          call get_slot(1);
          ioa_channel_state(target_slot) = OPEN;
          if ^equip_table.slot(target_slot).alive
              then call write_vos_msg('warning: IOA slot ' ||
                            bin_to_char((target_slot)) || ' is not alive.');
```

```
        end;
    go to loop;

using_ioa_cmd:
    target_slot = using_loc;
    go to cmd_29_join;

cmd(29):                                /* IOA */

    call get_slot(1);
    call rebuild_input(2);
    input_line = input;

/* check target IOA slot with equipment table  */

cmd_29_join:

    if ioa_channel_state(target_slot) = CLOSED
        then call write_vos_msg('warning: IOA slot ' ||
                            bin_to_char((target_slot)) || ' is not open.');
    call iop$select_adapter( target_slot, code);
    if code ^= 0
        then go to ioa_select_error;

    call write_ioa_msg_no_wait(input_line);

    goto loop_without_prompt;       /* better if fast reply */

cmd (30):                               /* status */

    real_why = TRUE;
    call print_why;
    all_sw = (args(1) = '-all');

    call write_vos_msg('Active channel ' || bin_to_char((iop$current_channel))
        || ' entity ' || bin_to_char((iop$current_entity))
        || ' IOA ' || bin_to_char((iop$current_interrupt))
        || ' pio ' || hex((iop$current_slot),2) ||'x');
    msg = 'Using ';
    if using_loc = USING_IOP
        then msg = msg || 'IOP';
        else msg = msg || 'IOA' || hex((using_loc),2);
    call write_vos_msg(msg);
    call write_vos_msg('IOA status:');
    do i = 0 to NUM_OF_SLOTS;
        if equip_table.slot(i).adapt_type ^= 0 |
           string(equip_table.slot(i).status.testing) ^= string(FALSE) |
           all_sw
        then do;
            msg = 'IOA ' || bin_to_char((i)) || ' type ' ||
            bin_to_char((equip_table.slot(i).adapt_type)) || ' priority ' ||
            bin_to_char((equip_table.slot(i).priority));
            if ioa_channel_state(i) = OPEN
                then msg = msg || ' open';
            if equip_table.slot(i).status.alive
                then msg = msg || ' alive';
            if equip_table.slot(i).status.broken
                then msg = msg || ' broken';
            if equip_table.slot(i).status.initialized
                then msg = msg || ' initialized';
            if equip_table.slot(i).status.loading
                then msg = msg || ' loading';
            if equip_table.slot(i).status.testing
                then msg = msg || ' testing';
            if equip_table.slot(i).status.running
                then msg = msg || ' running';
            if equip_table.slot(i).status.prom_start
                then msg = msg || ' PROM started';
            if equip_table.slot(i).status.exception
                then msg = msg || ' ERROR';
            if equip_table.slot(i).status.burning_prom
                then msg = msg || ' PROM updating';
            if equip_table.slot(i).entity ^= -1
                then msg = msg || ' Bound to entity ' ||
                bin_to_char((equip_table.slot(i).entity));
```

```
                    call write_vos_msg(msg);
                    if es_slot_ptrs(i) ^= null()
                         then call write_vos_msg(' ES has slot data block @ ' ||
                              hexp(es_slot_ptrs(i),8));
                    if pbus_slot_ptrs(i) ^= null()
                         then call write_vos_msg(' PM has slot data block @ ' ||
                              hexp(pbus_slot_ptrs(i),8));
                    end;
               end;
          call write_vos_msg('ENTITY status:');
          do i = 1 to MAX_ENTITIES;
               if equip_table.entity(i).type ^= -1
               then do;
                    msg = 'Entity ' || bin_to_char((i)) || ' type ' ||
                    bin_to_char((equip_table.entity(i).type));
                    if equip_table.entity(i).status.initialized
                         then msg = msg || ' initialized';
                    if equip_table.entity(i).status.exception
                         then msg = msg || ' ERROR';
                    call write_vos_msg(msg);
                    end;
               end;
          call write_vos_msg('CHANNEL status:');
          do i = 1 to MAX_CHANNELS;
               if equip_table.channel(i).entity ^= NON_ENTITY
               then do;
                    msg = 'Channel ' || bin_to_char((i)) ||
                          ' Bound to entity ' ||
                          bin_to_char((equip_table.channel(i).entity)) ||
                          ' limit ' || bin_to_char((equip_table.channel(i).limit))
                          || ' e_data ' ||
                          hex((equip_table.channel(i).entity_data.e_fb15),4) ||
                          ' e_ptr ' ||
                          hexp(equip_table.channel(i).entity_data.e_ptr,8);
                    if equip_table.channel(i).owner ^= NON_ENTITY
                         then msg = msg || ' owner ' ||
                         bin_to_char((equip_table.channel(i).owner));
                    if equip_table.channel(i).status.initialized
                         then msg = msg || ' initialized';
                    if equip_table.channel(i).status.exception
                         then msg = msg || ' ERROR';
                    call write_vos_msg(msg);
                    end;
               end;
          go to loop;

cmd (31):                          /* close */

          if args(1) = '-all'
          then do i = 0 to NUM_OF_SLOTS;
               ioa_channel_state(i) = CLOSED;
               end;
          else do;
               call get_slot(1);
               ioa_channel_state(target_slot) = CLOSED;
               end;
          go to loop;
%page;
cmd (32):                          /* step */

          call write_vos_msg('Single stepping not currently implemented.');
          goto loop;

%page;
cmd (35):                          /* search.b */
          element_size = 1;
          goto search_join;
cmd (37):                          /* search.l */
          element_size = 4;
          goto search_join;
cmd (33):                          /* search */
;
cmd(36):                           /* search.w */
          element_size = 2;
```

```
search_join:
     p = evaluate ( args (1));
     to_address = evaluate( args(2));
     not_sw = (substr(args(3),1,1) = '^' | substr(args(3),1,1) = '!');
     if not_sw
          then args(3) = substr(args(3),2);
     val = cv_hex(args (3));
     goto search_common;

cmd(38):                                /* search_IOA.b */
     element_size = 1;
     goto search_ioa_join;
cmd(40):                                /* search_IOA.l */
     element_size = 4;
     goto search_ioa_join;
cmd (34):                               /* search_IOA */
;
cmd(39):                                /* search_IOA.w */
     element_size = 2;
search_ioa_join:
     call get_slot(1);
     call iop$select_adapter( target_slot, code);
     if code ^= 0
          then go to ioa_select_error;

     p = iop$ioa_abs_addr(evaluate ( args (2)));
     to_address = iop$ioa_abs_addr(evaluate( args(3)));
     not_sw = (substr(args(4),1,1) = '^' | substr(args(4),1,1) = '!');
     if not_sw
          then args(4) = substr(args(4),2);
     val = cv_hex(args (4));

search_common:
     if rel(p) > rel(to_address)
          then go to loop;

     do p = p repeat addrel(p, element_size) while (rel(p) ^> rel(to_address));
          goto search_action(element_size);
search_action (1):
               stuff = rank(p -> based_char1);
               go to end_search_action;

search_action (2):
               stuff = p -> based_fb15;
               go to end_search_action;

search_action (4):
               stuff = p -> based_fb31;

end_search_action:

          if not_sw = (stuff ^= val)
          then if not_sw
               then call write_vos_msg('Value not found at ' || hexp(p,8) ||
                    ' it contains ' || hex(stuff,8));
               else call write_vos_msg('Value found at ' || hexp(p,8));
          call read_vos_msg_no_wait(input);
          if inout ^= ''
          then do;  /* terminate search and reset message */
               call iop$write_to_vos(addr(input),
                         rel(addr(iop_mbx.input_msg)), 2);
               p = to_address;
               end;
          end;
     go to loop;
interrupt_ioa: procedure (code);

dcl  code fixed bin(15);

     code = 0;
     call iop$send_cmd_to_adapt(target_slot, CMD_INT_DEVICE, code);
     if code ^= 0
          then call write_vos_msg('ERROR IN INTERRUPTING IOA ' ||
                    bin_to_char((code)));
```

```
end interrupt_ioa;
%page;
evaluate:
     proc (arg) returns (ptr);

declare  arg                   char (32) varying,
         p                     pointer;

     if arg = '*'
        then if star_addr ^= 1               /* null */
                then p = ptr (star_addr);
                else goto no_star;
        else do;
             p = iop_debug_full$eval_location (arg, err_msg);
             call set_star (rel (p));
             end;

     if p = null ()
        then goto eval_error;

     return (p);

end evaluate;
%page;
/* breaks command line into arguments */
parse_command:
     proc;

dcl  i                           fixed bin (15);

     redirected_command = FALSE;
reparse:
     input_line = input;                     /* entire string */
     args(0) = '';                           /* initially nothing */
     n_args = -1;
     args (1) = '*';                         /* good default if missing */

     do while (input ^= '');
          if n_args >= hbound (args, 1)
             then go to too_many_args;
          i = index (input, ' ');
          if i = 1
             then input = substr (input, 2);
          else if i = 0
             then do;                        /* rest of line is arg */
                  n_args = n_args + 1;
                  args (n_args) = input;
                  input = '';
                  end;
          else do;
                n_args = n_args + 1;
                args (n_args) = substr (input, 1, i - 1);
                input = substr (input, i + 1);
                end;
     end;

/* check here for special commands which redirect the input */

     if redirected_command               /* pass 2 all done now */
          then return;
     if args(0) = 'IOP' | args(0) = 'IOA' | args(0) = 'use'
          then redirected_command = TRUE;
          else return;
     if args(0) ^= 'IOP'
          then return;
     call rebuild_input(1);
     go to reparse;
     return;
end parse_command;

rebuild_input: proc(start);

dcl start fixed bin;
dcl i     fixed bin;
```

```
     input = '';
     do i = start to n_args;
          input = input || args(i) || ' ';
          end;
     return;
end rebuild_input;
%page;
/* =========================================================== */

print_why:
     proc;

dcl  pc                       fixed bin (31);
dcl  msg                      char (64) var;
dcl  mem_ptr                  pointer;

dcl  core_image (0:261123)    char (1) based (mem_ptr);

dcl  bit16                    bit (16) based;

declare  iop_debug_full$get_fault_name
                              ext entry (fixed bin) returns (char (20)
                              varying);

     go to print (entry_sw);

print (CALL_ENTRY):
     pc = rel (addrel (debug_sp, backup_sp) -> stack_frame.return_ptr);
     call set_star (pc);
     call write_vos_msg ('Called from ' ||
               iop_debug_full$describe_location (ptr (pc)));
     return;

print (FAULT_ENTRY):
     faultno = divide (bin (mc.vector,15), 4 ,15);
     msg = iop_debug_full$get_fault_name (faultno);
     if msg = ''
        then msg = 'Fault type ' || hex ((faultno), 2);

     if iop$mailbox_addr ^= null() & ^real_why
          then call iop$panic_syserr(msg || ' at ' ||
               iop_debug_full$describe_location (ptr (mc.pc)));

pc_join:
     if ^mc.extended_fmt
        then pc = mc.pc;
        else do;                          /* search backwards for real pc */
             mem_ptr = ptr (0);
             pc = berr_mc.pc;
             do pc = pc to pc - 10 by -2 while (addr (core_image (pc)) ->
                       bit16 ^= berr_mc.instruction_reg);
             end;
             berr_mc.pc = pc;
             end;

     call write_vos_msg (msg || ' at ' ||
               iop_debug_full$describe_location (ptr (pc)));

     call set_star (pc);
     return;

print (CRASH_ENTRY):
     :
print (MSG_ENTRY):
     call write_vos_msg (a_msg);
print (*):
     return;

print (LEVEL7_ENTRY):
     msg = 'Level 7';
```

```
     go to pc_join;

print (BREAK_ENTRY):
     msg = 'Breakpoint';
     if ^real_why
     then mc.pc = mc.pc - 2;                    /* back up to start of
                                                   trap instruction */
     goto pc_join;

print (TRACE_ENTRY):
;
print (POLL_ENTRY):
     if real_why
          then call write_vos_msg('Polling.');
     return;

end print_why;
%page;
/* ============================================================ */

/* dump a piece of memory */

dump:
     proc (a_p, a_n);

dcl  mac_ptr                         ptr;

dcl  a_p                             ptr;
dcl  a_n                             fixed bin (15);

dcl  p                               ptr;
dcl  n                               fixed bin (15);
dcl  n_on_line                       fixed bin (15);
dcl  char1                           char (1);
dcl  dump_type                       fixed bin (15);
dcl  dump_temp                       char (32);
dcl  i                               fixed bin (15);

dcl  1  dump_line,
        2  addr                      char (6),
        2  pad1                      char (2),
        2  part1                     char (8),
        2  pad2                      char (1),
        2  part2                     char (8),
        2  pad3                      char (1),
        2  part3                     char (8),
        2  pad4                      char (1),
        2  part4                     char (8),
        2  pad5                      char (2),
        2  bar1                      char (1),
        2  graphics                  char (16),
        2  bar2                      char (1);

%replace  LOCAL_DUMP      by    1;
%replace  IOA_DUMP        by    2;
%replace  VOS_DUMP        by    3;

     dump_type = LOCAL_DUMP;
     go to dump_join;

dump_ioa: entry (a_p, a_n);

     dump_type = IOA_DUMP;
     go to dump_join;

dump_vos: entry (a_p, a_n);

     dump_type = VOS_DUMP;

dump_join:

     p = a_p;
     n = a_n;
```

```
     do while (n > 0);

          n_on_line = min (16, n);
          string (dump_line) = '';
          dump_temp = '';
          dump_line.addr = hexp (p, 6);

          do i = 1 to n_on_line;

          go to set_dump_access(dump_type);

set_dump_access(IOA_DUMP):
          map_ptr = iop$ioa_abs_addr(p);
          go to dump_join_2;

set_dump_access(LOCAL_DUMP):
          if rel(p)  < LOCAL_MEMORY_LIMIT
               then map_ptr = set_access(p, 1);
               else map_ptr = p;
          go to dump_join_2;

set_dump_access(VOS_DUMP):
          map_ptr = set_vos_access(p, 1);

dump_join_2:
          if map_ptr ^= null()
          then do;
               char1 = map_ptr -> based_char1;
               substr (dump_temp, 2 * (i - 1) + 1, 2) = hex (rank (char1), 2);
               if rank (char1) < 32 | rank (char1) > 126
                    then char1 = '.';
               substr (dump_line.graphics, i, 1) = char1;
               go to reset_dump_access(dump_type);

reset_dump_access(LOCAL_DUMP):
               if ( rel(p)  < LOCAL_MEMORY_LIMIT & map_ptr ^= null() )
                    then call reset_access(map_ptr, 1);
               go to dump_join_3;

reset_dump_access(VOS_DUMP):
     call reset_access(map_ptr, 1);

reset_dump_access(IOA_DUMP):
     ;
dump_join_3:
               p = addrel (p, 1);
               end;
          end;

          dump_line.part1 = substr (dump_temp, 1, 8);
          dump_line.part2 = substr (dump_temp, 9, 8);
          dump_line.part3 = substr (dump_temp, 17, 8);
          dump_line.part4 = substr (dump_temp, 25, 8);
          dump_line.bar1 = '|';
          dump_line.bar2 = '|';
          call write_vos_msg (string (dump_line))  ;
          n = n - n_on_line;

     end;

     return;

end dump;
%page;
/* ========================================================== */

write_vos_msg:
     proc (a_msg);

dcl  a_msg                         char (*) var;

dcl  output_addr                   fixed bin(31);
dcl  output_buffer                 char (256) varying;
dcl  output_msg                    char (96) var;
```

```
     output_buffer = a_msg;
     if output_buffer = ''
        then output_buffer = ' ';
     output_msg = 'x';

     iop_mbxp = iop$mailbox_addr;
     output_addr = rel(addr(iop_mbx.output_msg));

     do while (length (output_buffer) > 0);

/* loop til previous msg picked up */

          do while (length (output_msg) ^= 0);
               call validate_mailbox;

               call iop$read_from_vos (addr (output_msg), output_addr, 2);

/* ******************************  */
/* NB. Unmask here so VOS can do IO */
/* dangerous but better than crash  */
/* ******************************  */
               if length (output_msg) ^= 0
               then do;
                    call iop$set_level(0);
                    call waste_time;
                    call iop$set_level(MASK_ALL_INTS);
                    end;
          end;

/* write text of new message */
          if length (output_buffer) <= maxlength (output_msg)
             then do;
                  output_msg = output_buffer;
                  output_buffer = '';
                  end;
             else do;
                  output_msg = substr (output_buffer, 1,
                            maxlength (output_msg) - 1) || '\';
                  output_buffer = substr (output_buffer,
                            maxlength (output_msg));
                  end;

          call validate_mailbox;

          call iop$write_to_vos (addrel (addr (output_msg), 2),
                         output_addr + 1, length (output_msg));

/* write length of new message */

          call iop$write_to_vos (addr (output_msg), output_addr, 2);

     end;

     at_prompt = FALSE;
     return;

end write_vos_msg;

/* ============================================================ */

write_ioa_msg:
     proc (a_msg);

dcl  a_msg                    char (*) var;

dcl  output_addr              fixed bin(31);
dcl  output_buffer            char (256) varying;
dcl  output_msg               char (80) var;
dcl  waiting                  bit (1) aligned;

     waiting = TRUE;
     go to write_ioa_msg_join;

write_ioa_msg_no_wait: entry (a_msg);
```

```
     waiting = FALSE;

write_ioa_msg_join:

     output_buffer = a_msg;
     if output_buffer = ''
        then output_buffer = ' ';
     output_msg = 'x';

     ioa_mbxp = iop$ioa_abs_addr(
                   iop$ioa_abs_addr(ptr(IOA_MAILBOX_PTR_ADDR)) ->
                                  based_ptr);
     output_addr = rel(addr(ioa_mbx.msg_in));

     do while (length (output_buffer) > 0);

/* loop til previous msg picked up */

          do while ((length (output_msg) ^= 0) & waiting);

              call iop$read_from_ioa (addr (output_msg), output_addr, 2);

          end;

/* write text of new message */

          if length (output_buffer) <= maxlength (output_msg)
             then do;
                  output_msg = output_buffer;
                  output_buffer = '';
                  end;
             else do;
                  output_msg = substr (output_buffer, 1,
                            maxlength (output_msg) - 1) || '\';
                  output_buffer = substr (output_buffer,
                            maxlength (output_msg));
                  end;

          call iop$write_to_ioa (addrel (addr (output_msg), 2),
                         output_addr + 2, length (output_msg));

/* write length of new message */

          call iop$write_to_ioa (addr (output_msg), output_addr, 2);

     end;

     return;

end write_ioa_msg;
/* ========================================================== */

read_vos_msg_no_wait:
     proc (a_msg);

dcl  a_msg                      char (*) var;

dcl  input_msg                  char (80) var;
dcl  input_addr                 fixed bin(31);

     iop_mbxp = iop$mailbox_addr;
     input_addr = rel (addr(iop_mbx.input_msg));

     input_msg = '';
     call validate_mailbox;

     call iop$read_from_vos (addr (input_msg), input_addr, 82);

     if length (input_msg) = 0
        then do;
            a_msg = '';
            return;
            end;
        else do;
            a_msg = input_msg;
```

```
            input_msg = '';
            call validate_mailbox;

            call iop$write_to_vos (addr (input_msg), input_addr, 2);

            return;
            end;
end read_vos_msg_no_wait;
/* ============================================================ */

read_ioa_msg_no_wait:
     proc (a_msg);

dcl  a_msg                      char (*) var;

dcl  input_msg                  char (80) var;
dcl  input_addr                 fixed bin(31);

     ioa_mbxp = iop$ioa_abs_addr(
                iop$ioa_abs_addr(ptr(IOA_MAILBOX_PTR_ADDR)) ->
                                  based_ptr);
     input_addr = rel (addr(ioa_mbx.msg_out));

     input_msg = '';

     call iop$read_from_ioa (addr (input_msg), input_addr, 82);

     if length (input_msg) = 0
          then do;
               a_msg = '';
               return;
               end;
          else do;
               a_msg = input_msg;
               input_msg = '';
               call iop$write_to_ioa (addr (input_msg), input_addr, 2);
               return;
               end;
     end read_ioa_msg_no_wait;
/* ============================================================ */

clear_vos_msg:
     proc ;

dcl  input_msg                  char (80) var;

     iop_mbxp = iop$mailbox_addr;
     input_msg = '';
     call validate_mailbox;
     call iop$write_to_vos (addr (input_msg), rel(addr(iop_mbx.input_msg)), 2);
     return;

end clear_vos_msg;
%page;
/* ============================================================ */

iop_debug$regs:
      entry (a_msg);

dcl  1  reg_line,
        2  name1                char (3),
        2  pad1                 char (1),
        2  data1                char (8),
        2  pad2                 char (4),
        2  name2                char (3),
        2  pad3                 char (1),
        2  data2                char (8);
dcl  line_out           char(80) var;

dcl  output_subr        entry (char (80) var) variable;

     /* execution */

     output_subr = write_vos_msg;
     goto regs_join;
```

```
iop_debug$regs_output:
      entry (a_mcp, a_output_subr);

     output_subr = a_output_subr;

regs_join:
     mcp = a_mcp;

     if mcp = null ()
     then do;
          call output_subr ('No registers');
          return;
          end;
     else call output_subr ('Machine conditions at ' || hexp (mcp, 6));

     string (reg_line) = '';
     substr (reg_line.name1, 2, 1) = 'd';
     substr (reg_line.name2, 2, 1) = 'a';
     do i = 0 to 7;
          substr (reg_line.name1, 3, 1) = substr ('01234567', i + 1, 1);
          substr (reg_line.name2, 3, 1) = substr (reg_line.name1, 3, 1);
          reg_line.data1 = hex (mc.d (i), 8);
          if i = 7
          then do;
               reg_line.name2 = 'usp';
               reg_line.data2 = hex (mc.usp, 8);
               end;
          else reg_line.data2 = hex (mc.a (i), 8);
          call output_subr (string (reg_line));
     end;

     line_out = '';
     if ^mc.extended_fmt
     then do;
          line_out = ' pc ' || hex (mc.pc, 8);
          line_out = line_out || '    ' || status_reg(bin (mc.status, 15));
          end;
     else do;
          line_out = ' pc ' || hex (berr_mc.pc, 8);
          line_out = line_out || '    ' || status_reg(bin(berr_mc.status, 15));
          end;
     call output_subr (line_out);

     call output_subr ('  p_bus status:    ' || hex (bin(cef_mc_stat, 31), 4));
     call output_subr ('  board control:   ' || hex (bin(cef_mc_bdcs, 31),  4));
     call output_subr ('  bus error code: ' || hex ((mc.berr_type_code), 4));

     if mc.extended_fmt
     then call dump_berr_info;

     return;

dump_berr_info: proc;

declare   function_codes (0:7) char (22) var int static init (
          'function code 000',
          'user data',
          'user program',
          'function code 011',
          'function code 100',
          'kernel data',
          'kernel program',
          'interrupt acknowledge');

     /* execution */

     line_out = ' instruction:    ' || hex(bin(berr_mc.instruction_reg), 4);
     call output_subr (line_out);

     line_out = ' fault address: ' || hex (berr_mc.fault_addr, 8);
     call output_subr (line_out);

     line_out = ' function code: ' ||
               function_codes(bin(berr_mc.function_code, 2));
```

```
      call output_subr (line_out);

      line_out = ' CPU flags:     ';
      if berr_mc.rerun
      then line_out = line_out || ' rerun';
      if berr_mc.inst_fetch
      then line_out = line_out || ' inst_fetch';
      if berr_mc.data_fetch
      then line_out = line_out || ' data_fetch';
      if berr_mc.r_m_w_cycle
      then line_out = line_out || ' r_m_w_cycle';
      if berr_mc.high_byte
      then line_out = line_out || ' high_byte';
      if berr_mc.byte_xfer
      then line_out = line_out || ' byte_xfer';
      if berr_mc.read
      then line_out = line_out || ' read';
      call output_subr (line_out);

      end dump_berr_info;

 status_reg:    proc (a_fb15) returns(char(32) var);

 dcl  a_fb15    fixed bin(15);

 dcl str        char(32) var;
 dcl fb15       fixed bin(15);
 dcl fb31       fixed bin(31);
 dcl srp        ptr;
 dcl 1 sr            based(srp),
     2 trace        bit(1),
     2 pad1         bit(1),
     2 kernel       bit(1),
     2 pad2         bit(2),
     2 mask         bit(3),
     2 pad3         bit(3),
     2 extend       bit(1),
     2 neg          bit(1),
     2 zero         bit(1),
     2 overflow     bit(1),
     2 carry        bit(1);

     fb15 = a_fb15;
     srp = addr(fb15);
     str = '';

     str = '  cc ';
     if sr.extend
     then str = str || 'x';
     if sr.neg
     then str = str || 'n';
     if sr.zero
     then str = str || 'z';
     if sr.overflow
     then str = str || 'o';
     if sr.carry
     then str = str || 'c';
     str = substr( str || '      ', 1, 8);
         fb31 = bin( sr.mask, 2);
     str = str || ' mask=' || hex( fb31, 1);

     if sr.kernel
     then str = str || '   kernel mode';
     else str = str || '   user mode';

     return (str);

end status_reg;
%page;
/* ========================================================== */

get_slot: proc (n);

dcl n fixed bin;
```

```
     target_slot = cv_hex (args (n));
     if target_slot < 0 | target_slot > NUM_OF_SLOTS
          then go to bad_ioa_no;
     if ^equip_table.slot(target_slot).alive
          then call write_vos_msg('WARNING: target IOA not alive.');


     return;
end get_slot;

/* ============================================================ */

/* set the value of '*'. */

set_star:
     proc (pc);

declare  pc                        fixed bin (31),
         junk                      char (32) varying;

     star_addr = pc;
     junk = iop_debug_fulladdr_to_module (star_addr, 0);
                                             /* set default module */
     return;
     end set_star;

/* ============================================================ */

cv_hex:
     proc (a_text) returns (fixed bin (31));

dcl  a_text                        char (*) var;

dcl  val                           fixed bin (31);
dcl  code                          fixed bin (15);

     call unhex (a_text, val, code);
     if code ^= 0
        then go to invalid_hex;

     return (val);
     end cv_hex;

/* ============================================================ */

validate_mailbox:
     proc;

dcl  test                          char (8);
dcl  mb_addr                       fixed bin(31);

     test = '';
     mb_addr = rel(iop$mailbox_addr);
     call iop$read_from_vos (addr (test), mb_addr, 8);
punt:
     if test = IOP_MBX_ID
        then return;
        else go to punt;

     end validate_mailbox;

/* ============================================================ */

/* routine to loop while waiting on vos so we dont waste
   a lot of time on the bus */

waste_time:
     proc;

dcl  begin                         fixed bin (31);
dcl  dummy1                        fixed bin (31);
dcl  dummy2                        fixed bin (15);

     /* Avoid hogging the Stratabus - spin internally */
```

```
     begin = iop$read_time ();
     do while (iop$delta_time (begin) < 3000);
       dummy1 = 0;
       do dummy2 = 1 to 100;
            dummy1 = dummy1 + dummy2;
            end;
       end;

     return;

     end waste_time;
end iop_debug;
%page;
set_access:    proc (p_ptr, number_pages) returns (ptr);
dcl  p_ptr                      ptr;
dcl  number_pages               fixed bin (15);

dcl  r_ptr                      ptr;
dcl  len                        fixed bin (15);
dcl  code                       fixed bin (15);
dcl  phy_address                bit(32) aligned;
dcl  vir_address                bit(32) aligned;
dcl  address_fb31               fixed bin (31);
dcl  1 accinf                   like access_info;
dcl  1 access_flags             like access_info.flag;

dcl  iop$map_x_pages               entry (fixed bin (15), bit (32) aligned,
                                        fixed bin(15), fixed bin (15),
                                        bit (32) aligned, fixed bin (15));

/* %include 'iop_map_structures'; */
/*  +++begin copyright+++ ******************************  */
/*                                                        */
/*  STRATUS CONFIDENTIAL INFORMATION: CLASS II            */
/*  COPYRIGHT (c) Stratus Computer, Inc. 1985             */
/*                                                        */
/*  This  program  contains  confidential and proprietary */
/*  information  of  Stratus Computer,  Inc.,  and  any   */
/*  reproduction, disclosure, or use in whole or in part  */
/*  is   expressly   prohibited,   except   as   may   be */
/*  specifically authorized by prior written agreement or */
/*  permission of Stratus.                                */
/*                                                        */
/*  +++end copyright+++ ********************************  */
/*  Begin include file iop_map_structures.incl.pl1           */

dcl  access_infop               ptr;

dcl  1 access_info              based (access_infop),
       2 version                fixed bin, /* = 1 */
       2 flag,
         3 read_access          bit (1),  /* 1 = yes, 0 = no */
         3 write_access         bit (1),  /* 1 = yes, 0 = no */
         3 priv_access          bit (1),  /* 1 = yes, 0 = no */
         3 local_memory         bit (1),  /* 1 = local, 0 = main(vos) */
         3 inter_lock           bit (1),  /* 1 = yes, 0 = no */
         3 io_st_bus            bit (1),  /* 1 = yes, 0 = no */
         3 dma                  bit (1),  /* 1 = yes, 0 = no */
         3 unused               bit (9);

%replace  ACCESS_INFO_VERSION_1     by   1;

/*  End include file iop_map_structures.incl.pl1             */

/* %nolist; %include 'iop_utility_calls'; %list; */
/* Begin include file . . . . . iop_utility_calls.incl.pl1 */

dcl  iop$allocate entry (fixed bin (31), char (2) aligned) returns (ptr);
dcl  iop$free entry (ptr, char (2) aligned);

dcl  iop$get_level entry  returns (fixed bin (15));
dcl  iop$set_level entry (fixed bin (15));

dcl  iop$syserr_code entry (char (80) varying, fixed bin (15), fixed bin(15));
dcl  iop$panic_syserr entry (char (80) varying);
```

```
dcl  iop$read_time  entry returns (fixed bin (31));
dcl  iop$delta_time entry (fixed bin (31)) returns (fixed bin (31));

dcl  bin_to_char    entry (fixed bin (31)) returns (character (13) varying);
dcl  char_to_bin    entry (character (13) varying) returns (fixed bin (31));

dcl  iop$set_slot_priority entry (fixed bin (15), fixed bin (15),
                                  fixed bin (15));

/* End include file . . . . . iop_utility_calls.incl.pl1 */

%replace  RWLP                  by 'F0'b4;
%replace  RWP                   by 'E0'b4;

     string(access_flags) = RWLP;
     goto set_access_join;

set_vos_access:    entry (p_ptr, number_pages) returns (ptr);

     string(access_flags) = RWP;

set_access_join:

     lcn = 0;
     code = 0;
     address_fb31 = rel (p_ptr);
     phy_address = bit(unspec(address_fb31),32);

     accinf.version = ACCESS_INFO_VERSION_1;
     accinf.flag = access_flags;

     call iop$map_x_pages (lcn, phy_address, accinf.version,
                          number_pages, vir_address, code);

     if code = 0
     then do;
            address_fb31 = bin (vir_address);
            r_ptr = ptr (address_fb31);
            end;
     else do;
            r_ptr = null();
            call iop_debug$msg ('Error in mapping a page ' ||
                         bin_to_char((code)));
            end;

     return (r_ptr);

end set_access;
%page;
reset_access:       proc (p_ptr, number_pages);
dcl  p_ptr                    ptr;
dcl  number_pages             fixed bin (15);

dcl  lcn                      fixed bin (15);
dcl  code                     fixed bin (15);
dcl  vir_address              bit(32) aligned;
dcl  address_fb31             fixed bin (31);

dcl  iop$free_x_map_pages        entry (fixed bin (15), bit (32) aligned,
                                      fixed bin, fixed bin (15));

     lcn = 0;
     code = 0;
     address_fb31 = rel (p_ptr);
     vir_address = bit(unspec(address_fb31), 32 );

     call iop$free_x_map_pages (lcn, vir_address, number_pages, code);

     if code ^= 0
     then call iop_debug$msg ('ERROR IN FREEING A MAPPED PAGE');

     return;

end reset_access;
```

```
/*   ***begin copyright*** ******************************   */
/*                                                          */
/*   STRATUS CONFIDENTIAL INFORMATION: CLASS II             */
/*   COPYRIGHT (c) Stratus Computer, Inc. 1986              */
/*                                                          */
/*   This  program  contains  confidential and proprietary  */
/*   information  of  Stratus Computer,  Inc.,   and   any  */
/*   reproduction, disclosure, or use in whole or in part   */
/*   is   expressly   prohibited,   except   as   may   be  */
/*   specifically authorized by prior written agreement or  */
/*   permission of Stratus.                                 */
/*                                                          */
/*   ***end copyright*** ********************************   */

/* IOP_DEBUG_FULL contains extended support for the onboard IOP  debugger. */


/* Beginning of modification history */
/* Written 04-06-84 by C. D. Tavares */
/* Extended for breakpoint support 7/24/84 by CDT */
/* Symbolic support added 8/1/84 by CDT */
/* Modified 84-12-17 by Chris Tavares to generalize symbolic support. */
/* Modified 84-12-19 by Chris Tavares to trace "frameless frames" right
   and to identify the names of pops in stack traces. */
/* Modified 85-03-21 by Richard Barnes for new stack_frame.entry_ptr
   protocol. */
/* Modified 85-04-08 by Martin Stokoe to -     */
/*   - provide module_name+offset input        */
/*   - add frame command and dump &s           */
/* Modified 85-05-02 by Chris_Tavares to fix traces of frameless frames
   immediately followed by interrupt frames.
/*Modified 86-01-10 by R.Crockett for use with Peacekeeper IOP. */
/* Modified 86-03-31 by Pradip Gosalia to change order of */
/*    .                  iop$map_x_pages params and do not set dma bit*/
/* Modified 86-04-01 by Pradip Gosalia to fix disassmeble* so it */
/*                       allows disassembley starting on odd address */
/* Modified 86-04-01 by Tom Moser to merge Martins changes - fix disassemble */
/* Modified 86-04-11 by R.Crockett to restore original code in
     debug_full$trace */
/* Modified 86-05-15 by Tom Moser to allow &s(expr) to end in 'x'
     remove needless output from trace */
/* Modified 86-05-30 by Martin Stokoe to fix fstack & display argument values
     during trace */
/* Modified 86-07-09 by Tom Moser to fix set_access and remove unused fcns */
/* Modified 86-07-21 by Tom Moser to shrink code - initial support for step */
/* Modified 87-03-02 by Tom Moser to support new iop$ioa_addr stuff */
/* End of modification history */

%replace LOCAL_MEMORY_LIMIT   by 524288; /* 512k */

%replace POP_ORIGIN       by 4096;
%replace PAGE_SIZE        by 4096;
%replace NORMAL_FRAME     by 0;
%replace FRAMELESS_FRAME by 1;
%replace INTERRUPT_FRAME by 2;
%replace NOT_A_POP        by 0;
%replace VALID_NAME       by
'ABCDEFGHIJKLMNOPQRSTUVWXYZabcdefghijklmnopqrstuvwxyz_-1234567890@$#';

/* %include 'stack_frame_constants'; */
/* BEGIN INCLUDE FILE ... stack_frame_constants.incl.pl1 */

%replace backup_sp              by -20;

/* END INCLUDE FILE ... stack_frame_constants.incl.pl1 */
/* %include 'pop_names'; */
/* BEGIN INCLUDE FILE - pop_names.incl.pl1 */
/* Beginning of modification history */
/* Modified 86-11-26 by Otto Newman to add new pop names for use
   by Ace.  */
/* End of modification history */

%replace POP_VERSION      by 3;      /* used by compilers */

%replace nb_pop_names     by 310;
```

```
declare   pop_used bit(hb_pop_names) aligned ext static initial('0'b);

declare   highest_pop_used fixed bin(15) ext static initial(0);

declare   pop_names(1:hb_pop_names) char(24) varying ext static initial(
     'stop','goto','allocate','free','assign_bits',
     'compare_bits','or_bits','and_bits','bool_bits','not_bits',
     'index_bits','cat_bits','copy_bits','old_assign_chars',
          'assign_vchars',
     'index_chars','cat_chars','append_chars','translate','verify',
     'copy_chars','old_move_bytes','compare_chars','move_words',
          'move_longwords',
     'valid','short_int_power','flt_int_power','int_int_power',
          'long_dec_power',
     'flt_power','ceil_short_dec','floor_short_dec','trunc_short_dec',
          'round_short_dec',
     'ceil_flt','floor_flt','trunc_flt','ceil_long_dec','floor_long_dec',
     'trunc_long_dec','round_long_dec','mod_long_dec','div_long_int',
          'mult_long_int',
     'mult_long_dec','sign_long_int','sign_flt','mod_short_int',
          'mod_long_int',
     'div_long_dec','old_mod_flt','sign_short_int','sign_long_dec',
          'mult_short_dec',
     'div_short_dec','mod_short_dec','signal','revert','on',
     'onloc','onkey','onfile','time','date',
     'range_ck','stringrange_ck','collate','oncode','move_long_bytes',
     'move_long_words','move_long_longwords','div_long_short_int',
          'any_to_any','mod_long_short_int',
     'translate_const','acos','asin','atan','atan2',
     'atand','atand2','atanh','cos','cosd',
     'cosh','exp','log','','log2',
     'log10','sin','sind','sinh','sqrt',
     '','tan','tand','tanh','lacos',
     'lasin','latan','latan2','latand','latand2',
     'latanh','lcos','lcosd','lcosh','lexp',
     'llog','llog2','llog10','lsin','lsind',
     'lsinh','lsqrt','ltan','ltand','ltanh',
     'verify_const','assign_rchars','basic_computed_goto',
          'basic_computed_gosub','zero_words',
     'load_short_flt','load_long_flt','old_load_ext_flt','store_short_flt',
          'store_long_flt',
     'old_store_ext_flt','add_short_flt','add_long_flt','old_add_ext_flt',
          'sub_short_flt',
     'sub_long_flt','old_sub_ext_flt','mult_short_flt','mult_long_flt',
          'old_mult_ext_flt',
     'div_short_flt','div_long_flt','old_div_ext_flt','flt_to_ext_int',
          'ext_int_to_flt',
     '','compare_short_flt','compare_long_flt','old_compare_ext_flt',
          'flt_to_short_int',
     'flt_to_long_int','short_int_to_flt','long_int_to_flt','abs_flt',
          'negate_flt',
     'test_flt','max_short_flt','max_long_flt','old_max_ext_flt',
          'min_short_flt',
     'min_long_flt','old_min_ext_flt','assign_even_to_vcs',
          'signal_fixedoverflow','size_ck_short_int',
     'size_ck_long_int','size_ck_short_dec','size_ck_long_dec',
          'is_numeric','is_alphabetic',
     'size_ck_ext_int','any_to_any_no_check','move_bytes',
          'zero_long_words','basic_compare_chars',
     'old_assign_chars_ck','assign_vchars_ck','assign_even_to_vcs_ck',
          'mult_ext_dec','div_ext_dec',
     'rem_long_int','rem_short_dec','rem_long_dec','cpu_profile',
          'mult_ext_long_dec',
     'on_preallocated','compare_even_chars','compare_same_chars',
          'rem_long_short_int','old_rem_flt',
     'fint_flt','fsign_short_int','fsign_long_int','fsign_flt',
          'old_mult_short_cplx_flt',
     'old_mult_long_cplx_flt','old_mult_ext_cplx_flt',
          'old_div_short_cplx_flt','old_div_long_cplx_flt',
          'old_div_ext_cplx_flt',
     'compare_same_even_chars','cobol_odo_ck','round_to_short_flt',
          'fetch_bits','fetch_short_bits',
     'store_bits','index_bits_true','index_bits_false','verify_for_ltrim',
          'verify_const_for_ltrim',
```

```
    'verify_for_rtrim','verify_const_for_rtrim','search','search_const',
         'signal_error',
    'append_chars_ck','assign_decimal','fixdec_to_cobol_decimal',
         'cobol_decimal_to_fixdec','bad_stack',
    'mult_long_uns','div_long_short_uns','div_long_uns',
         'rem_long_short_uns','rem_long_uns',
    'round_to_long_flt','int_lint_power','mult_sap_cplx_flt',
         'div_sap_cplx_flt','mod_sap_flt',
    'assign_chars','assign_chars_ck','fetch_last_opnd1_none',
         'fetch_last_opnd1_left','fetch_last_opnd1_right',
    'single_bit_util','s$valid','divide1_64','divide2_64','divide3_64',
    'divide4_64','signal_and_return','signal_and_abort',
         'signal_zerodivide','cpu_profile_trap',
    'mult_short_sap_cplx_flt','mult_long_sap_cplx_flt',
         'div_short_sap_cplx_flt','div_long_sap_cplx_flt','index_chars_1',
    'verify_1','verify_for_ltrim_1','verify_for_rtrim_1','scaneq',
         'scaneq_1',
    'scaneq_const','scanne','scanne_1','scanne_const',
         'pascal_range_ck_short',
    'pascal_range_ck_long','range_ck_short',
/* START POP_VERSION 1 */
         'mult_long_int_nofofl','mult_long_uns_nofofl',
/* START POP VERSION 2 */
         'load_ext_flt',
    'store_ext_flt','add_ext_flt','sub_ext_flt','mult_ext_flt',
         'div_ext_flt',
    'compare_ext_flt','max_ext_flt','min_ext_flt','mod_flt',
         'rem_ext_flt',
    'mult_short_cplx_flt','mult_long_cplx_flt','mult_ext_cplx_flt',
         'div_short_cplx_flt','div_long_cplx_flt',
    'div_ext_cplx_flt','mod_fpc_flt',
/* START POP VERSION 3 */
         'ada_mod_long_int','ada_mod_short_int','ada_mod_long_short_int',
    'fill_bytes','fill_replicated_bytes','compare_tiny_int_array',
         'compare_short_int_array','compare_long_int_array',
    'compare_byte_array','compare_bit_array','compare_short_uns_array',
         'compare_long_uns_array', 'move_bytes_ovlp',
    'move_words_ovlp', 'move_longwords_ovlp', 'move_long_bytes_ovlp',
         'move_long_words_ovlp', 'move_long_longwords_ovlp',
    'move_rbytes', 'move_rwords', 'move_rlongwords', 'move_long_rbytes',
         'move_long_rwords',
    'move_long_rlongwords',
/* START POP VERSION 4 */
         (4) ('')):

declare   pops_supported(0:POP_VERSION) fixed bin(15) int static initial(
          262,264,282,306);

/* END INCLUDE FILE - pop_names.incl.pl1 */

/* based */

dcl  based_ptr                 ptr based;
dcl  based_char1               char (1) based;
dcl  based_fb15                fixed bin (15) based;
dcl  based_fb31                fixed bin (31) based;


/* BUILTINS */
dcl (bin, addrel, unspec, string, bit, null)    builtin;

/* Entries */

declare  after                 entry(char(*) var,char(*) var)
                                   returns(char(256) var);
declare  hex                   entry (bin (31), bin (15)) returns (char (8)
                               var);
declare  hexp                  entry (ptr, bin (15)) returns (char (8)
                               var);

declare  iop_debug$fault       entry (pointer);

declare  iop_debug$msg         entry (char (*) varying);
```

```
declare  iop_debug$regs           entry (pointer);

declare (iop_debug$reprotect,
         iop_debug$unprotect)     entry (pointer);

declare  ptr                      entry (bin (31)) returns (ptr);

declare  rel                      entry (ptr) returns (bin (31));

dcl  bin_to_char                  entry (fixed bin (31))
                                        returns (char (13) var);
dcl  char_to_bin                  entry (char (*) var)
                                        returns (fixed bin (31));

declare  s$decode_line_id         entry (pointer, fixed bin, fixed bin, fixed
                                  bin);

declare  s$disassemble            entry (fixed bin (31), fixed bin (31), fixed
                                  bin (31), fixed bin (31), bit (32) aligned,
                                  fixed bin (31), (5) char (256) varying);

declare  s$encode_line_id         entry (pointer, fixed bin, fixed bin)
                                  returns (fixed bin);

declare  s$get_runtime_line_no
                                  entry (pointer, fixed bin (31), fixed
                                  bin (31), fixed bin, fixed bin);

declare  s$get_runtime_location
                                  entry (pointer, fixed bin, fixed bin)
                                  returns (fixed bin (31));

declare  stackframeptr            entry returns (ptr);

declare  unhex                    entry (char (*) var, bin (31), bin (15));

dcl  set_access                   entry(ptr, fixed bin(15)) returns(ptr);

dcl  reset_access                 entry(ptr, fixed bin(15));

dcl  set_vos_access               entry(ptr, fixed bin(15)) returns(ptr);

/* External Static */

declare  iop$code_pages           external fixed bin;

declare  iop$n_tasks              fixed bin static init (1);

declare  iop$external_vars_map_origin
                                  external fixed bin (31);

declare  iop$n_external_vars      external fixed bin;

declare  iop$n_modules            external fixed bin;

declare  iop$module_map_origin
                                  external fixed bin (31);

declare  iop$program_end          fixed bin (31) ext static;

declare  iop$stack_end (20)       pointer ext static;

declare  iop$symtab_origin        external fixed bin (13);

/* Static (Constants) */

/*: dcl_attributes_column=[illegible], remark_column=[illegible] */

declare  1  options          static,
            2  print         bit (1) initial ('0'b),    /* print output ourselves */
            2  step          bit (1) initial ('1'b),    /* just do 1 instruction */
            2  [illegible]   bit (1) initial ('0'b),    /* watch for equal insts */
            2  compact       bit (1) initial ('1'b),    /* compact format wanted */
            2  sap           bit (1) initial ('0'b),    /* if for the SAP */
            2  pad           bit (27) initial ('0'b);
```

```
/*: ccl_attributes_column=31, remark_column=46 */


/* Static */

declare  1  s                    static,
            2  continue_index fixed bin initial (-1),
            2  step_count     fixed bin initial (-1),
            2  ocp_breaks_processed
                              bit (1) aligned initial ('0'b),
            2  default_module_name
                              char (32) varying initial (''),
            2  frame          fixed bin(31) initial (0),
            2  break_info,
               3  n_breaks    fixed bin initial (0),
               3  each (30),
                  4  break_pc pointer,
                  4  mapped_break_pc pointer,
                  4  former_contents
                              bit (16) aligned,
                  4  adjacent_stuff
                              bit (48);      /* for disassembler */


/* Based */

declare  1  based_image       based,
            2  contents       bit (16),
            2  adjacent_stuff bit (48);

%page;

ocp_debug_fulltrace:
     proc (a_sp, a_pc, a_mcp);

/* Parameters */

declare  a_sp                 pointer,
         a_pc                 fixed bin (31),
         a_mcp                pointer;

/* Automatic */

declare  argsp                ptr,
         argument_count       fixed bin,
         buf                  char (13) varying,
         digit                fixed bin,
         entrypoint_name      char (33) varying,
         fb31                 fixed bin (31),
         i                    fixed bin,
         idx                  fixed bin,
         is_ocp_frame         bit (1) aligned,
         new_pc               fixed bin (31),
         next_pc_ptr          ptr,
         or_units_exist       bit (1) aligned,
         mac_ptr              ptr,
         pc                   fixed bin (31);

/* Based */

declare  argp (100)           ptr based (argsp);
declare  based_fb             fixed bin (15) based;
declare  based_c2 (2)         char (2) based;
declare  based_c4             char (4) based;
declare  based_ptr (100)      ptr based;

/* %include 'stack_frame'; */
/* begin include file -- stack_frame.incl.pl1  80-12-30 */

declare (sp, b_sp) ptr;

declare 1 stack_frame based (b_sp),
          2 display_ptr ptr,             /* -20 */
          2 entry_ptr ptr,               /* -16 */
```

```
          2 static_ptr ptr,                   /* -12 */
          2 orig_frame_end ptr,               /*  -8 */
          2 on_ptr ptr,                       /*  -4 */
          2 prev_sp ptr,                      /*   0 */
          2 return_ptr ptr;                   /*  +4 */

/*        2 args (N) ptr                      /*  +8... */

/* End include file -- stack_frame.incl.pl1 */

/* %include 'entry_block'; */
/* Begin include file ... entry_block.incl.pl1  80-12-30 */

/* Beginning of modification history */
/* Modified 87-05-29 by HsuenJu Ko to add entry_block.pop and
     entry_block.unwinder. */
/* End of modification history */

declare entry_block_ptr ptr;

declare   1 entry_block          based (entry_block_ptr),
          2 n_args               fixed bin (15),
          2 flags,
            3 is_subroutine      bit (1),
            3 is_function        bit (1),
            3 main               bit (1),
            3 support            bit (1),
            3 kernel             bit (1),
            3 has_fac            bit (1),
            3 fault_handler      bit (1),
            3 command_args       bit (1),
            3 signaller          bit (1),
            3 full_table         bit (1),
            3 save_registers     bit (1),
            3 pop                bit (1),
            3 unwinder           bit (1),
            3 mbz                bit (3),
          2 symtab_addr          pointer,
          2 name                 char (32) varying;

/* End include file ... entry_block.incl.pl1 */
/* %include 'iop_mc'; */
/* Begin include file ... iop_mc.incl.pl1  80-12-31 */

dcl  mcp ptr;

dcl 1 mc based (mcp),        /* machine conditions */
    2 identifier             char(4),                /* *MC* */
    2 perr_type_code         fixed bin (15),
    2 align_bccs             char (0) aligned,
    2 bccs,
      3  bccs_broken         bit (1),
      3  bccs_broken2        bit (1),
      3  bccs_mempar         bit (1),
      3  bccs_memcomp        bit (1),
      3  bccs_timask         bit (1),
      3  bccs_pkcomp         bit (1),
      3  bccs_cmdpend        bit (1),
      3  bccs_statchg        bit (1),
      3  bccs_side           bit (1),
      3  bccs_ipend          bit (1),
      3  bccs_partner        bit (1),
      3  bccs_zout_ct        bit (1),
      3  bccs_level1         bit (1),
      3  bccs_romhigh        bit (1),
      3  bccs_crc_mask       bit (1),
      3  bccs_imask          bit (1),

    2 align_p_status         char (0) aligned,
    2 p_status,
      3 dma_vfy_ok           bit (1),
      3 dma_wrt              bit (1),
      3 dma_rd               bit (1),
      3 scan_int             bit (1),
```

```
      3 scan_up_L           bit (1),
      3 pbus_force          bit (1),
      3 pside_enb           bit (1),
      3 qside_enb           bit (1),
      3 pbus_diag           bit (1),
      3 pbus_obey_er        bit (1),
      3 pbus_sel_er         bit (1),
      3 pbus_berr_en        bit (1),
      3 pbus_enb            bit (1),
      3 pbus_lock           bit (1),
      3 obey_p              bit (1),
      3 obey_q              bit (1),
    2 ioa_slot              fixed bin (15),
    2 usp                   fixed bin (31),
    2 d                     (0:7) fixed bin (31),
    2 a                     (0:6) fixed bin (31),
    2 int_sr                bit (16) aligned,
    2 status                bit (16) aligned,
    2 pc                    fixed bin (31),
    2 align_info            char (0) aligned,
    2 info,
      3 extended_fmt        bit (1) ,
      3 mbz                 bit (3),
      3 vector              bit (12);

dcl 1 berr_mc based (mcp),      /* bus or address error machine conditions */
    2 identifier            char(4),
    2 berr_type_code        fixed bin (15),
    2 align_bccs            char (0) aligned,
    2 bccs,
      3  bccs_broken        bit (1),
      3  bccs_broken2       bit (1),
      3  bccs_mempar        bit (1),
      3  bccs_memcomp       bit (1),
      3  bccs_timask        bit (1),
      3  bccs_pkcomp        bit (1),
      3  bccs_cmdpend       bit (1),
      3  bccs_statchg       bit (1),
      3  bccs_side          bit (1),
      3  bccs_ipend         bit (1),
      3  bccs_partner       bit (1),
      3  bccs_zout_gt       bit (1),
      3  bccs_level1        bit (1),
      3  bccs_romhigh       bit (1),
      3  bccs_cmd_mask      bit (1),
      3  bccs_imask         bit (1),

    2 align_p_status        char (0) aligned,
    2 p_status,
      3 dma_vfy_ok          bit (1),
      3 dma_wrt             bit (1),
      3 dma_rd              bit (1),
      3 scan_int            bit (1),
      3 scan_up_L           bit (1),
      3 pbus_force          bit (1),
      3 pside_enb           bit (1),
      3 qside_enb           bit (1),
      3 pbus_diag           bit (1),
      3 pbus_obey_er        bit (1),
      3 pbus_sel_er         bit (1),
      3 pbus_berr_en        bit (1),
      3 pbus_enb            bit (1),
      3 pbus_lock           bit (1),
      3 obey_p              bit (1),
      3 obey_q              bit (1),
    2 ioa_slot              fixed bin (15),
    2 usp                   fixed bin (31),
    2 d                     (0:7) fixed bin (31),
    2 a                     (0:6) fixed bin (31),
    2 int_sr                bit (16) aligned,
    2 status                bit (16) aligned,
    2 pc                    fixed bin (31),
    2 align_info            char (0) aligned,
    2 info,
```

```
      3 extended_fmt        bit (1),
      3 mbz                 bit (3),
      3 vector              bit (12),
    2 align_stat            char (0) aligned,
    2 special_status,
      3 rerun               bit (1),
      3 pad1                bit (1),
      3 inst_fetch          bit (1),
      3 data_fetch          bit (1),
      3 r_m_w_cycle         bit (1),
      3 high_byte           bit (1),
      3 byte_xfer           bit (1),
      3 read                bit (1),
      3 pad2                bit (5),
      3 function_code       bit (3),
    2 fault_addr            fixed bin (31),
    2 resv_data_out         bit (16) aligned,
    2 data_out              bit (16) aligned,
    2 resv_data_in          bit (16) aligned,
    2 data_in               bit (16) aligned,
    2 resv_inst             bit (16) aligned,
    2 instruction_reg       bit (16) aligned,
    2 internal_info         (16) fixed bin (15);

/* End include file ... iop_mc.incl.pl1 */

     sp = a_sp;
     pc = a_pc;
     mcp = a_mcp;
     next_pc_ptr = null ();

     fb31 = rel (sp);

     do i = iop$n_tasks to 1 by -1 while (fb31 > rel (iop$stack_end (i)));
     end;

     call iop_debug$msg (' ');
     call iop_debug$msg ('In stack for task ' || bin_to_char ((i)) ||
            ':');
     call iop_debug$msg (' ');

     if mcp ^= null ()
        then do;
             call iop_debug$regs (mcp);
             call iop_debug$msg ('');

             next_pc_ptr = find_next_pc_after_mc (pc, mcp);
             end;

     do while ( sp ^= null () );

/* Locate the main stack frame information. */

          b_sp = addrel (sp, backup_sp);

/* Find out who the frame belongs to. */

          fb31 = rel (stack_frame.entry_ptr);
          is_pop_frame = (fb31 = 0);

/* The call-out pc for this stack frame has already been obtained from the
   previous stack frame.  */

/*: ^fill */

          if frame_type (pc) = FRAMELESS_FRAME
                   & next_pc_ptr ^= null ()
                   & ^is_pop_frame
             then do;
/*: fill */

/* The pc actually belongs to a "frameless" procedure which used no entry
   sequence and then did jsr onto the stack.  We report it, pick up the pc
   next to it, and try again.  Note we must know where the pc came from so
   we can pick up the next location (otherwise we must treat it as a
   "normal" frame).  Frameless routines are identified by brute-force --
```

```
   there isn't any other way to detect them.  Thus, a user-written
   frameless routine won't be caught here and will show up on the stack
   funny, although it won't break the trace.  This is also why we exempt
   pop frames here -- although their pc is in pop, we know a real frame
   goes with them.  */

                  call announce_frame ('Frameless routine',
                        'Procedure at', pc, NOT_A_POP);

                  pc = rel (next_pc_ptr -> based_ptr (1));
                  next_pc_ptr = addr (next_pc_ptr -> based_ptr (2));

                  goto next_frame;
                  end;

         if frame_type (pc) = INTERRUPT_FRAME
            then do;

/* The pc belongs to the interrupt handler.  We seek out the machine
   conditions, dump them, and set the new sp and pc from the machine
   conditions.  */

                  call announce_frame ('Interrupt frame',
                        'Interrupt handler at', pc, NOT_A_POP);

                  mcp = next_pc_ptr;

                  do i = 1 to 100 while (mcp -> based_c4 ^= '*MC*');
                     mcp = addr (mcp -> based_c2 (2));
                  end;

                  if i ^> 100
                     then do;
                        call iop_debug$msg (' ');

                        call iop_debug$regs (mcp);

                        if mcp -> mc.extended_fmt
                           then pc = mcp -> berr_mc.pc;
                           else pc = mcp -> mc.pc;

                        sp = ptr (mcp -> mc.a (6));
                        next_pc_ptr = find_next_pc_after_mc (pc, mcp);
                        goto next_frame;
                        end;

                     else do;
                        call iop_debug$msg (
                              '  Can''t find machine conditions.');
                        call iop_debug$msg (' ');
/* ... and drop through to handle as normal frame */

                        end;
                  end;

/* Here we handle more or less normal frames.  Now that we are securely
   ensconced in one, we will update next_pc_ptr for the next loop around.
   */

         next_pc_ptr = addr (stack_frame.return_ptr);
         if is_pop_frame
            then do;

                  new_pc = rel (next_pc_ptr -> based_ptr (1));
                  next_pc_ptr = addr (next_pc_ptr -> based_ptr (2));

/* Some pop frames are called directly from programs (e.g., signal).
   But most pop frames are followed by a frameless pc, also in pop,
   representing where pop was working happily until it got upset and
   decided to call out for a bigger brother or Chinese food.  If so,
   skip that pc and grab the next one.  */

                  if frame_type (new_pc) = FRAMELESS_FRAME
                     then do;
```

```
                        new_pc = rel (next_pc_ptr -> based_ptr (1));
                        next_pc_ptr = addr (next_pc_ptr ->
                                  based_ptr (2));
                        end;

                call announce_frame ('Frame at ' || hexp (sp, 6),
                 .        'Programmed Operator at', pc, new_pc);

                if new_pc = 1               /* null */
                   then pc = -1;
                   else pc = new_pc;
                sp = stack_frame.prev_sp;
                goto next_frame;
                end;

/* If we get here, we are in a frame so plain that it's not even vanilla. */

        on_units_exist = (mod(fb31,2) ^= 0);
        if on_units_exist
           then fb31 = fb31 - 1;

        entry_block_ptr = ptr (fb31);
        entrypoint_name = '';
        argument_count = 0;

/*: ^fill */
        if fb31 >= iop$code_pages * PAGE_SIZE
                & fb31 < iop$symtab_origin
           then if length (entry_block.name) > 0 &
                     length (entry_block.name) ^>
                     maxlength (entry_block.name)
                  then if verify (entry_block.name, VALID_NAME) = 0
                          then do;
                               entrypoint_name = entry_block.name ||
                                         ' ';
                               argument_count = entry_block.n_args;
                               end;
/*: fill */

        call announce_frame ('Frame at ' || hexp (sp, 6), 'Procedure '
                 || entry_block.name || ' at', pc, NOT_A_POP);

        if on_units_exist
           then call iop_debug$msg ('  On-unit(s) at ' ||
                     hexp (stack_frame.on_ptr, 6));
        if entry_block.n_args = 0
           then call iop_debug$msg ('  No args.');
           else do;
                if entry_block.flags.kernel
                   then argsp = stack_frame.display_ptr;
                   else argsp = addrel (addr (stack_frame.return_ptr),
                             4);

                do i = 1 to entry_block.n_args;
                     buf = bin_to_char ((i));
                     call iop_debug$msg ('  Arg ' || buf || ' at ' ||
                                         hexp( argp (i), 6) || 'x -> ' ||
                                         hex( argp (i) -> based_fb31, 8));
                       end;
                end;

        pc = rel (next_pc_ptr -> based_ptr (1));
        next_pc_ptr = addr (next_pc_ptr -> based_ptr (2));
        sp = stack_frame.prev_sp;

next_frame:
        call iop_debug$msg (' ');

     end;

     call iop_debug$msg ('End of trace.');
     return;
```

```
find_next_pc_after_mc:
     proc (pc, mcp) returns (pointer);

declare  pc                         fixed bin (31);
declare  mcp                        pointer;

/* If the program that faulted was a frameless frame, we have to work to
   find the next pc, right after the machine conditions.  If not, the
   next pc will be found in the usual way.  */

      if frame_type (pc) ^= FRAMELESS_FRAME
         then return (null ());

      if mcp -> mc.extended_fmt
         then return (addr (addr (mcp -> berr_mc.pc) -> based_ptr (2)));

      return (addr (addr (mcp -> mc.pc) -> based_ptr (2)));

      end find_next_pc_after_mc;


announce_frame:
     proc (frame_type, entry_type, pc, prev_pc);

/* Parameters */

declare  frame_type                 char (*) varying,
         entry_type                 char (*) varying,
         pc                         fixed bin (31),
         prev_pc                    fixed bin (31);
/* Automatic */

declare  i                          fixed bin,
         loc_string                 char (128) varying,
         pop_loc                    fixed bin;


      call iop_debug$msg (frame_type);

      loc_string = ' ' || entry_type || ' ';

      if pc = -1
         then loc_string = loc_string || '(no pc)';

         else do;
              loc_string = loc_string ||
                     iop_debug_full$describe_location (ptr (pc));

/*: ^fill */
              if prev_pc ^= NOT_A_POP & prev_pc ^= 1
                                          /* null = nonrestartable pop */
/*: fill */
                 then do;                 /* Get name of pop. */
                      pop_loc = ptr (prev_pc - 2) -> based_fb;
                                          /* target of jsr */
                      pop_loc = divide (pop_loc - POP_ORIGIN, 4, 15) + 1;

                      if pop_loc > 0 & pop_loc <= hbound (pop_names, 1)
                         then do;
                              i = index (loc_string, ' (') - 1;
                                          /* "(no line)" */
                              if i = -1
                                 then i = length (loc_string);
                              loc_string = substr (loc_string, 1, i) ||
                                    ' (' || pop_names (pop_loc) || ')';
                              end;
                      end;
              end;

     call iop_debug$msg (loc_string);

     end announce_frame;

frame_type:
```

```
proc (pc) returns (fixed bin);

/* Parameters */

declare  pc                    fixed bin (31);

/* Static */

declare   1  s                 static,
             2 (begin_pop,
                end_pop,
                begin_float_pop,
                end_float_pop,
                begin_dec_pop,
                end_dec_pop,
                begin_any_to_any,
                end_any_to_any,
                begin_fast_utils,
                end_fast_utils,
                begin_interrupt_handler,
                end_interrupt_handler)
                               fixed bin (31) initial (0);

/* External */

declare (pop$start,
         pop$end,
         s$float_pop,
         s$end_float_pop,
         s$dec_pop,
         s$end_dec_pop,
         s$any_to_any,
         s$end_any_to_any,
         iop$begin_fast_utils,
         iop$end_fast_utils,
         iop$begin_interrupt_handler,
         iop$end_interrupt_handler)
                               pointer external static;


     if s.begin_pop = 0
        then do;                                   /* initialize */
             s.begin_pop = rel (addr (pop$start));
             s.end_pop = rel (addr (pop$end));
             s.begin_float_pop = rel (addr (s$float_pop));
             s.end_float_pop = rel (addr (s$end_float_pop));
             s.begin_dec_pop = rel (addr (s$dec_pop));
             s.end_dec_pop = rel (addr (s$end_dec_pop));
             s.begin_any_to_any = rel (addr (s$any_to_any));
             s.end_any_to_any = rel (addr (s$end_any_to_any));
             s.begin_fast_utils = rel (addr (iop$begin_fast_utils));
             s.end_fast_utils = rel (addr (iop$end_fast_utils));
             s.begin_interrupt_handler =
                       rel (addr (iop$begin_interrupt_handler));
             s.end_interrupt_handler =
                       rel (addr (iop$end_interrupt_handler));
             end;

     if pc >= s.begin_fast_utils & pc <= s.end_fast_utils
        then return (FRAMELESS_FRAME);
     if pc >= s.begin_interrupt_handler & pc <= s.end_interrupt_handler
        then return (INTERRUPT_FRAME);
     if pc >= s.begin_pop & pc <= s.end_pop
        then return (FRAMELESS_FRAME);
     if pc >= s.begin_dec_pop & pc <= s.end_dec_pop
        then return (FRAMELESS_FRAME);
     if pc >= s.begin_float_pop & pc <= s.end_float_pop
        then return (FRAMELESS_FRAME);
     if pc >= s.begin_any_to_any & pc <= s.end_any_to_any
        then return (FRAMELESS_FRAME);
     return (NORMAL_FRAME);

     end frame_type;
```

```
     end iop_debug_fullstrace;
%page;
iop_debug_fullsframe: proc (a_sp) returns (char(64) var);

dcl  a_sp           ptr;

dcl  results        char(64) var;
dcl  fb31           fixed bin(31);

     results = '';

     if a_sp = null()
     then do;
          do fb31 = iop$n_tasks to 1 by -1
               while (s.frame > rel (iop$stack_end (fb31)));
               end;
          results = 'Using stack frame at ' ||
                     hex(s.frame,6) || 'x ' ||
                    'for task ' || bin_to_char(fb31);
          end;
     else do;
          if rel(a_sp) <= iop$program_end        /* being generous here */
          then results = 'Invalid address for a stack frame';
          else s.frame = rel(a_sp);
          end;

     return (results);

     end iop_debug_fullsframe;
%page;
iop_debug_fullsfstack:
     proc (a_taskno);

/* Parameters */

declare  a_taskno              fixed bin (31);

/* Automatic */

declare  fb31                  fixed bin (31),
         my_own_sp             pointer,
         i                     fixed bin,
         next_frame_loc        fixed bin (31),
         next_frame_p          pointer,
         pc                    fixed bin (31),
         tries                 fixed bin,
         valid_block           bit (1) aligned,
         valid_frame           bit (1) aligned;

/* Based */

declare  based_p               pointer based;

/* include files stack_frame and entry_block, available above */
%nolist;
/* %include 'stack_frame'; */
/* Begin include file -- stack_frame.incl.pl1  80-12-30 */

declare (sp, b_sp) ptr;

declare 1 stack_frame based (b_sp),
          2 display_ptr ptr,           /* -20 */
          2 entry_ptr ptr,             /* -16 */
          2 static_ptr ptr,            /* -12 */
          2 orig_frame_end ptr,        /*  -8 */
          2 on_ptr ptr,                /*  -4 */
          2 prev_sp ptr,               /*   0 */
          2 return_ptr ptr;            /*  +4 */

/*        2 args (N) ptr               /*  +8... */

/* End include file -- stack_frame.incl.pl1 */
/* %include 'entry_block'; */
/* Begin include file ... entry_block.incl.pl1  80-12-30 */
```

```
/* Beginning of modification history */
/* Modified 87-05-29 by HsuenJu Ko to add entry_block.pop and
     entry_block.unwinder. */
/* End of modification history */

declare entry_block_ptr ptr;

declare    1 entry_block        based (entry_block_ptr),
           2 n_args             fixed bin (15),
           2 flags,
             3 is_subroutine    bit (1),
             3 is_function      bit (1),
             3 main             bit (1),
             3 support          bit (1),
             3 kernel           bit (1),
             3 has_fac          bit (1),
             3 fault_handler    bit (1),
             3 command_args     bit (1),
             3 signaller        bit (1),
             3 full_table       bit (1),
             3 save_registers   bit (1),
             3 pop              bit (1),
             3 unwinder         bit (1),
             3 mbz              bit (3),
           2 symtab_addr        pointer,
           2 name               char (32) varying;

/* End include file ... entry_block.incl.pl1 */
%list;


     sp = iop$stack_end(1);             /* bottom of stack */
     sp = addrel( sp, -8);              /* skip over null sp & pc */

     my_own_sp = stackframeptr ();

     do while ('1'b);
          t_sp = addrel (sp, backup_sp);
          pc = rel (stack_frame.return_ptr);

          call iop_debug$msg ('Frame at ' || hexp (sp, 6));

          if sp = my_own_sp                    /* STOP-- don't blow up trying */
             then do;                          /* to track a moving target! */
                  call iop_debug$msg (
                         '  stack trace facility-- end of stack.');
                  return;
                  end;

          fb31 = rel (stack_frame.entry_ptr);
          if mod (fb31, 2) ^= 0
             then fb31 = fb31 - 1;

          if fb31 = 0
             then do;
                  valid_block = '1'b;
                  call iop_debug$msg (' Programmed Operator at ' ||
                         iop_debug_full$describe_location (ptr (pc)));
                  next_frame_p = addrel (sp, 20);
                  end;

             else do;
                  entry_block_ptr = ptr (fb31);
                  if fb31 < 0
                     then valid_block = '0'b;
                  else if fb31 > iop$program_end
                     then valid_block = '0'b;
                  else valid_block = (length (entry_block.name) >= 0 &
                         length (entry_block.name) <= 32);

                  if valid_block
                     then call iop_debug$msg (' Procedure ' ||
                         entry_block.name);
                  next_frame_p = stack_frame.orig_frame_end;
                  end;
```

```
            valid_frame = '0'b;

            do tries = 1 to 5 while (valid_block & ^valid_frame);

                 do i = 1 to 2000 while (next_frame_p -> based_p ^= sp);
                      next_frame_p = addrel (next_frame_p, -2);
                 end;

                 b_sp = addrel (next_frame_p, backup_sp);

                 if i <= 2000
                    then if rel (stack_frame.entry_ptr) = 0
                                                 /* programmed operator */
                            then valid_frame = '1'b;

                            else do;
                                 next_frame_loc = rel (next_frame_p);
                                 fb31 = rel (stack_frame.orig_frame_end);
/*: ^fill */
                                 if mod (fb31, 2) = 0
                                           & fb31 < next_frame_loc
                                           & (fb31 - next_frame_loc) < 32768
                                    then valid_frame = '1'b;
/*: fill */
                                 end;
            end;

            if ^valid_frame
               then do;
                    call iop_debug$msg (
                              '   ...is invalid; no further frames found.');
                    return;
                    end;

            if rel (next_frame_p) >= rel (sp)  /* stack looped or regressing */
               then do;
                    call iop_debug$msg (
                              '  ...is mischained; no further frames found.'
                              );
                    return;
                    end;

            sp = next_frame_p;
            call iop_debug$msg (' ');

       end;

       end iop_debug_full$fstack;

%page;

iop_debug_full$disassemble:
       proc (a_codep, a_n_words);

%replace BREAK_LOCATOR    by '    '18'17BREAK '18'18';
%replace INDENTATION      by 45;

/* Parameters */

declare  a_codep                  pointer,
         a_n_words                fixed bin;

/* Automatic */

declare  breakp                   pointer,
         breakloc                 fixed bin (31),
         buffers (5)              char (256) varying,
         codep                    pointer,
         finish_addr              fixed bin (31),
         i                        fixed bin,
         line_desc                char (12) varying,
         loc                      fixed bin (31),
         module_id                fixed bin,
```

```
          module_name               char (32) varying,
          n_words                   fixed bin (31),
          p                         pointer,
          map_ptr                   pointer,
          p_map_ptr                   pointer,
          start_addr                fixed bin (31),
          used                      fixed bin (31);

dcl       1 def_code_ptr             defined (codep),
           2 pad bit(31),
           2 lo_code_ptr bit(1);

/* Based */

declare   fb31                      fixed bin (31) based;

     codep = a_codep;
     def_code_ptr.lo_code_ptr = '0'b;
loc = rel (codep);

call iop_debug_full$find_next_bkpt (loc, breakp, breakloc);

module_name = iop_debug_full$addr_to_module (loc, module_id);

if module_id > 0
               /* there is a table */
   then do;
        call iop_debug$msg (' ');
        call iop_debug$msg ('In module ' || module_name || ':');

        line_desc = addr_to_extents (module_id, loc, start_addr,
                    finish_addr);

        if start_addr > 0
           then do;
                if loc ^= start_addr
                   then buffers (1) = copy (' ', INDENTATION) ||
                          'Mid-line ' || line_desc;
                   else buffers (1) = copy (' ', INDENTATION) ||
                          'Line ' || line_desc;
                call iop_debug$msg (buffers (1));

                if a_n_words = -1
                   then a_n_words = divide (finish_addr - loc + 1, 2,
                          15);
                end;
        end;

   else                                  /* no table */
        unspec (finish_addr) = '7FFFFFFF'b4;

if a_n_words = -1                        /* no table or no source map */
   then a_n_words = 16;                  /* (e.g., assembler has no map) */

buffers = '';

do n_words = a_n_words repeat (n_words - used) while (n_words > 0);

     if loc > finish_addr
        then do;
             line_desc = addr_to_extents (module_id, loc, start_addr,
                    finish_addr);
             call iop_debug$msg (copy (' ', INDENTATION) || 'Line '
                    || line_desc);
             end;

     if loc = breakloc
        then do;
             p = breakp;
             call iop_debug_full$find_next_bkpt (loc + 1, breakp,
                    breakloc);
             end;
        else p = codep;
```

```
/* map 2 page2 containing the address pointed
                by p and get ptr to virt addr */
        map_ptr = p;

        if rel(p) < LOCAL_MEMORY_LIMIT
             then map_ptr = set_access(map_ptr, 2);

        if map_ptr ^= null()
             then do;

                  p_map_ptr = map_ptr;
                  call s$disassemble (loc, p_map_ptr -> fb31, n_words, 0,
                     string (options), used, buffers);

                  if rel(p) < LOCAL_MEMORY_LIMIT & map_ptr ^= null()
                     then call reset_access(map_ptr, 2);

                  end;

        else return;

        if p ^= codep
           then buffers (1) = buffers (1) || BREAK_LOCATOR;

        do i = 1 to 5 while (length (buffers (i)) > 0);
             call iop_debug$msg (buffers (i));
             buffers (i) = '';
        end;
        loc = loc + used * 2;
        codep = addrel (codep, used * 2);
     end;

     return;

addr_to_extents:
     proc (p_module_id, p_pc, p_start_addr, p_finish_addr)
             returns (char (12) varying);

/* Parameters */

declare  p_pc                    fixed bin (31),
         p_module_id             fixed bin,
         p_start_addr            fixed bin (31),
         p_finish_addr           fixed bin (31);

/* Automatic */

declare  address                 fixed bin (31),
         file_number             fixed bin,
         iln                     fixed bin,
         line_desc               char (12) varying,
         line_number             fixed bin,
         n_words                 fixed bin,
         symtab_ptr              pointer;

/* include file program_module, available below */
%nolist;
/* %include 'program_module'; */
/* BEGIN INCLUDE FILE ... program_module.incl.pl1 */

/* Beginning of modification history */
/* Modified 87-06-02 by TsuenJu Ko for program_module.module_origins and
     program_module.processor_family. */
/* End of modification history */

/* This include file contains declarations for a program module. */

%replace  program_module_version_1           by        1;

declare    clink_ptr                ptr,
           elink_ptr                ptr,
           em_entryp                ptr,
           entry_map_ptr            ptr,
```

```
          evm_entryp                    ptr,
          external_vars_map_ptr         ptr,
          link_map_ptr                  ptr,
          link_names_map_ptr            ptr,
          lm_entryp                     ptr,
          lnm_entryp                    ptr,
          module_map_ptr                ptr,
          mm_entryp                     ptr,
          pm_n_relocations              bin (31),
          pm_n_entries                  bin (15),
          pm_n_external_vars            bin (15),
          pm_n_link_names               bin (15),
          pm_n_modules                  bin (15),
          pm_n_unsnapped_links          bin (15),
          program_module_ptr            ptr,
          relocation_map_ptr            ptr,
          rm_entryp                     ptr;

/* The header is always record 1 of the program file */

declare 1 program_module                based (program_module_ptr),
        2 version                       bin (15),
        2 binder_version                char (32) varying,
        2 binder_options                char (32) varying,
        2 system_name                   char (32) varying,
        2 user_name                     char (65) varying,
        2 date_bound                    bin (31),
        2 main_entry_link,
          3 code_address                bin (31),
          3 static_address              bin (31),
        2 user_boundary                 bin (31),
        2 n_modules                     bin (15),
        2 n_external_vars               bin (15),
        2 n_link_names                  bin (15),
        2 n_unsnapped_links             bin (15),
        2 n_vm_pages                    bin (15),
        2 n_header_pages                bin (15),
        2 info (3, 4),
          3 address                     bin (31),
          3 len                         bin (31),
        2 module_map_address            bin (31),
        2 module_map_len                bin (31),
        2 external_vars_map_address
                                        bin (31),
        2 external_vars_map_len         bin (31),
        2 link_names_map_address        bin (31),
        2 link_names_map_len            bin (31),
        2 link_map_address              bin (31),
        2 link_map_len                  bin (31),
        2 header_address                bin (31),
        2 header_len                    bin (31),
        2 access_info (0:2047),
          3 user                        bit (1),
          3 execute                     bit (1),
          3 read                        bit (1),
          3 write                       bit (1),
          3 mbz                         bit (4),
        2 flags,
          3 profile                     bit (1),
          3 references_kernel           bit (1),
          3 execute_in_kernel           bit (1),
          3 byte_access_info            bit (1),
          3 needs_sac                   bit (1),
          3 usf_rules                   bit (1),
          3 load_in_kernel              bit (1),
          3 mbz                         bit (25),
        2 n_tasks                       bin (15),
        2 task_static_len (3)           bin (31),
        2 stack_len                     bin (31),
        2 n_entries                     bin (15),
        2 entry_map_address             bin (31),
        2 entry_map_len                 bin (31),
        2 pcm_version                   bin (15),
        2 processor                     bin (15),
```

```
        2 release_name              char (32) var,
        2 relocation_info,
          3 relocation_map_address  bin (31),
          3 relocation_map_len      bin (31),
          3 n_relocations           bin (31),
        2 high_water_mark           bin (31),
        2 copyright_notice          char (256) var,
        2 module_origins (14)       bin (31),
        2 processor_family          bin (15),
        2 mbz (655)                 bin (15);

declare 1 module_map (pm_n_modules)
                                    based (module_map_ptr),
        2 name                      char (32) varying,
        2 sectionx                  bin (15),
        2 dtc                       bin (31),
        2 dtm                       bin (31),
        2 code_address              bin (31),
        2 code_len                  bin (31),
        2 symtab_address            bin (31),
        2 symtab_len                bin (31),
        2 static_address            bin (31),
        2 static_len                bin (31),
        2 modes,
          3 user                    bit (1),
          3 execute                 bit (1),
          3 read                    bit (1),
          3 write                   bit (1),
        2 flags,
          3 profile                 bit (1),
          3 needs_sap               bit (1),
          3 mbz                     bit (10),
        2 date_compiled             bin (31);
declare 1 mm_entry                  based (mm_entryp),
        2 name                      char (32) varying,
        2 sectionx                  bin (15),
        2 dtc                       bin (31),
        2 dtm                       bin (31),
        2 code_address              bin (31),
        2 code_len                  bin (31),
        2 symtab_address            bin (31),
        2 symtab_len                bin (31),
        2 static_address            bin (31),
        2 static_len                bin (31),
        2 modes,
          3 user                    bit (1),
          3 execute                 bit (1),
          3 read                    bit (1),
          3 write                   bit (1),
        2 flags,
          3 profile                 bit (1),
          3 needs_sap               bit (1),
          3 mbz                     bit (10),
        2 date_compiled             bin (31);

declare 1 external_vars_map (pm_n_external_vars)
                                    based (external_vars_map_ptr),
        2 name                      char (32) varying,
        2 address                   bin (31),
        2 len                       bin (31),
        2 sectionx                  bin (15);

declare 1 evm_entry                 based (evm_entryp),
        2 name                      char (32) varying,
        2 address                   bin (31),
        2 len                       bin (31),
        2 sectionx                  bin (15);

declare link_names_map (pm_n_link_names) char (32) var
                                    based (link_names_map_ptr);

declare lnm_entry char (32) var     based (lnm_entryp);
```

```
declare 1 link_map (pm_n_unsnapped_links)
                                        based (link_map_ptr),
        2 address                       bin (31),
        2 namex                         bin (15);

declare 1 lm_entry                      based (lm_entryp),
        2 address                       bin (31),
        2 namex                         bin (15);

declare 1 entry_map (pm_n_entries) based (entry_map_ptr),
        2 name                          char (32) varying,
        2 code_address                  bin (31),
        2 static_address                bin (31);

declare 1 em_entry                      based (em_entryp),
        2 name                          char (32) varying,
        2 code_address                  bin (31),
        2 static_address                bin (31);

declare 1 dlink                         based (dlink_ptr),
        2 address                       bin (31);

declare 1 elink                         based (elink_ptr),
        2 code_address                  bin (31),
        2 static_address                bin (31);

declare 1 relocation_map (pm_n_relocations)
                                        based (relocation_map_ptr),
        2 sectionx                      char (1),
        2 regionx                       char (1),
        2 offset                        bin (31),
        2 reloc_sectionx                char (1),
        2 reloc_regionx                 char (1),
        2 reloc_offset                  bin (31),
        2 len                           bin (15);

declare 1 rm_entry                      based (rm_entryp),
        2 sectionx                      char (1),
        2 regionx                       char (1),
        2 offset                        bin (31),
        2 reloc_sectionx                char (1),
        2 reloc_regionx                 char (1),
        2 reloc_offset                  bin (31),
        2 len                           bin (15);


/* END INCLUDE FILE ... program_module.incl.pl1 */
%list;

     p_start_addr = 0;
     unspec (p_finish_addr) = '7FFFFFFF'b4;

     address = p_pc;
     module_map_ptr = ptr (ioc$module_map_origin);

     if module_map_ptr = null ()
        then return ('');

     mm_entryp = addr (module_map (p_module_id));
     symtab_ptr = ptr (mm_entry.symtab_address);

     call s$get_runtime_line_no (symtab_ptr, address, p_start_addr,
               n_words, iln);
     if iln > 0
        then do;
             p_finish_addr = p_start_addr + (n_words * 2) - 1;
             if iln = 32767
                then return ('**END**');
                else do;
                     call s$decode_line_id (symtab_ptr, iln, file_number,
                               line_number);
                     if file_number = 0
                        then line_desc = '';
                        else line_desc = bin_to_char ((file_number)) ||
                               '-';
```

```
                        line_desc = line_desc || bin_to_char ((line_number));
                        return (line_desc);
                        end;
                end;
      return ('(no line)');

      end addr_to_extents;

      end ioc_debug_full$disassemble;

%page;
ioc_debug_full$disassemble_vos:
      proc (a_codep, a_n_words);

%replace BREAK_LOCATOR   by '    '1B'17BREAK '1E'18';
%replace INDENTATION     by 45;

/* Parameters */

declare  a_codep              pointer,
         a_n_words            fixed bin;

/* Automatic */

declare  breakp               pointer,
         breakloc             fixed bin (31),
         buffers (5)          char (256) varying,
         codep                pointer,
         i                    fixed bin,
         line_desc            char (12) varying,
         loc                  fixed bin (31),
         module_id            fixed bin,
         module_name          char (32) varying,
         n_words              fixed bin (31),
         p                    pointer,
         map_ptr              pointer,
         start_addr           fixed bin (31),
         used                 fixed bin (31);

dcl      1 def_code_ptr        defined (codep),
          2 pad bit(31),
          2 lo_code_ptr bit(1);

/* Based */

declare  fb31                 fixed bin (31) based;

     codep = a_codep;
     def_code_ptr.lo_code_ptr = '0'b;
     loc = rel (codep);

     if a_n_words = -1 then
        a_n_words  = 12;                  /* no table or no source map */
                                  /* (e.g., assembler has no map) */
     buffers = '';

     do n_words = a_n_words repeat (n_words - used) while (n_words > 0);

          map_ptr = set_vos_access(codep, 2);

          if map_ptr ^= null()
               then do;
                         p = map_ptr;
                         call s$disassemble (loc, p -> fb31, n_words, 0,
                           string (options), used, buffers);
                         call reset_access(map_ptr, 2);
                      end;
               else do;
                    call ioc_debug$msg('Error accessing target address');
                    return;
                    end;

          do i = 1 to 5 while (length (buffers (i)) > 0);
```

```
                call iop_debug$msg (buffers (i));
                buffers (i) = '';
             end;
             loc = loc + used * 2;
             codep = addrel (codep, used * 2);
         end;

         return;

         end iop_debug_full$disassemble_vos;

%page;
iop_debug_full$disassemble_ioa:
     proc (a_codep, a_n_words);

%replace BREAK_LOCATOR   by '    '18'17BREAK '18'18';
%replace INDENTATION     by 45;

/* Parameters */

declare  a_codep                 pointer,
         a_n_words               fixed bin;

/* Automatic */

declare  breakp                  pointer,
         breakloc                fixed bin (31),
         buffers (5)             char (256) varying,
         codep                   pointer,
         i                       fixed bin,
         line_desc               char (12) varying,
         loc                     fixed bin (31),
         module_id               fixed bin,
         module_name             char (32) varying,
         n_words                 fixed bin (31),
         p                       pointer,
         map_ptr                 pointer,
         start_addr              fixed bin (31),
         used                    fixed bin (31);

dcl      1 def_code_ptr           defined (codep),
          2 pad bit(31),
          2 lo_code_ptr bit(1);

/* Based */

declare  fb31                    fixed bin (31) based;

/* include */

/* %nolist; %include 'iop_utility_calls'; %list; */
/* Begin include file . . . . . iop_utility_calls.incl.pl1 */

dcl  iop$allocate entry (fixed bin (31), char (2) aligned) returns (ptr);
dcl  iop$free entry (ptr, char (2) aligned);

dcl  iop$get_level entry  returns (fixed bin (15));
dcl  iop$set_level entry (fixed bin (15));

dcl  iop$syserr_code entry (char (80) varying, fixed bin (15), fixed bin(15));
dcl  iop$panic_syserr entry (char (80) varying);

dcl  iop$read_time  entry returns (fixed bin (31));
dcl  iop$delta_time entry (fixed bin (31)) returns (fixed bin (31));

dcl  bin_to_char     entry (fixed bin (31)) returns (character (13) varying);
dcl  char_to_bin     entry (character (13) varying) returns (fixed bin (31));

dcl  iop$set_slot_priority entry (fixed bin (15), fixed bin (15),
                                  fixed bin (15));

/* End include file . . . . . iop_utility_calls.incl.pl1 */

     codep = a_codep;
```

```
     def_code_ptr.lo_code_ptr = '0'b;
     loc = rel (codep);

     if a_n_words = -1 then
        a_n_words = 16;                                 /* no table or no source map */
                                                    /* (e.g., assembler has no map) */

     buffers = '';

     do n_words = a_n_words repeat (n_words - used) while (n_words > 0);

          p = codep;

          call s$disassemble (loc, p -> fb31, n_words, 0,
                        string (options), used, buffers);

         do i = 1 to 5 while (length (buffers (i)) > 0);
              call iop_debug$msg (buffers (i));
              buffers (i) = '';
         end;
         loc = loc + used * 2;
         codep = addrel (codep, used * 2);
     end;

     return;

end iop_debug_full$disassemble_ica;
%page;
s$sec_write:
     proc (b1, b2, c, b3);                          /* to satisfy s$disassemble */

declare (b1,
         b2,
         b3)                    fixed bin,
         c                      char (*);

     end s$sec_write;
%page;
iop_debug_full$set_break:
     proc (p_pc_ptr);

%replace TRAP_3_INSTRUCTION
                             by '4E43'b4;
%replace TRACE_BIT           by '8000'b4;          /* in 68000 status reg */

/* Parameters */

declare  p_pc_ptr                pointer;

/* Automatic */

declare  bno                     fixed bin,
          map_ptr                ptr,
         pc_ptr                  pointer;

     map_ptr = p_pc_ptr;
     map_ptr =  set_access(map_ptr, 1);
     if map_ptr = null()
          then do;
               call iop_debug$msg('Error in mapping break address');
               return;
               end;

     pc_ptr = p_pc_ptr;

     if find_break (pc_ptr) ^= -1
        then do;
             call iop_debug$msg ('Already a break there.');
             return;
             end;

     bno = s.break_info.n_breaks + 1;
     if bno > hbound (s.break_info.each, 1)
        then do;
```

```
            call iop_debug$msg ('Too many breaks.');
            return;
            end;

      s.break_info.break_pc (bno) = pc_ptr;
      s.break_info.mapped_break_pc (bno) = map_ptr;

      s.break_info.former_contents (bno) = map_ptr -> based_image.contents;
      s.break_info.adjacent_stuff (bno) = map_ptr ->
                based_image.adjacent_stuff;

      s.break_info.n_breaks = bno;

      map_ptr -> based_image.contents = TRAP_3_INSTRUCTION;

      if map_ptr ^= null()
           then  call reset_access(map_ptr, 1);

      return;

%page;
iop_debug_full$continue_break:
   entry (p_mc_ptr);
/* Parameters */

declare  p_mc_ptr              pointer;

/* include file iop_mc, available above */
%nolist;
/* %include 'iop_mc'; */
/* Begin include file ... iop_mc.incl.pl1  80-12-31 */

dcl  mcp ptr;

dcl 1 mc based (mcp),     /* machine conditions */
    2 identifier          char(4),              /* *MC* */
    2 berr_type_code      fixed bin (15),
    2 align_bdcs          char (0) aligned,
    2 bdcs,
      3  bdcs_broken      bit (1),
      3  bdcs_broken2     bit (1),
      3  bdcs_mempar      bit (1),
      3  bdcs_memcomp     bit (1),
      3  bdcs_timask      bit (1),
      3  bdcs_okcomp      bit (1),
      3  bdcs_cmdpend     bit (1),
      3  bdcs_statchg     bit (1),
      3  bdcs_side        bit (1),
      3  bdcs_ipend       bit (1),
      3  bdcs_partner     bit (1),
      3  bdcs_zout_gt     bit (1),
      3  bdcs_level1      bit (1),
      3  bdcs_romhigh     bit (1),
      3  bdcs_cmd_mask    bit (1),
      3  bdcs_imask       bit (1),

    2 align_p_status      char (0) aligned,
    2 p_status,
      3 dma_vfy_ok        bit (1),
      3 dma_wrt           bit (1),
      3 dma_rd            bit (1),
      3 scan_int          bit (1),
      3 scan_up_L         bit (1),
      3 pbus_force        bit (1),
      3 pside_enb         bit (1),
      3 pside_ent         bit (1),
      3 pbus_diag         bit (1),
      3 pbus_prev_er      bit (1),
      3 pbus_sel_er       bit (1),
      3 pbus_berr_en      bit (1),
      3 pbus_ent          bit (1),
      3 pbus_lock         bit (1),
      3 pkey_r            bit (1),
      3 pkey_p            bit (1),
```

```
    2 ioa_slot              fixed bin (15),
    2 usp                   fixed bin (31),
    2 d                     (0:7) fixed bin (31),
    2 a                     (0:6) fixed bin (31),
    2 int_sr                bit (16) aligned,
    2 status                bit (16) aligned,
    2 pc                    fixed bin (31),
    2 align_info            char (0) aligned,
    2 info,
      3 extended_fmt        bit (1) ,
      3 mbz                 bit (3),
      3 vector              bit (12);

dcl 1 berr_mc based (mcp),     /* bus or address error machine conditions */
    2 identifier            char(4),
    2 berr_type_code        fixed bin (15),
    2 align_bdcs            char (0) aligned,
    2 bdcs,
      3  bdcs_broken        bit (1),
      3  bdcs_broken2       bit (1),
      3  bdcs_mempar        bit (1),
      3  bdcs_memcomp       bit (1),
      3  bdcs_timask        bit (1),
      3  bdcs_pkcomp        bit (1),
      3  bdcs_cmdpend       bit (1),
      3  bdcs_statchg       bit (1),
      3  bdcs_side          bit (1),
      3  bdcs_ipend         bit (1),
      3  bdcs_partner       bit (1),
      3  bdcs_zout_gt       bit (1),
      3  bdcs_level1        bit (1),
      3  bdcs_romhigh       bit (1),
      3  bdcs_cmd_mask      bit (1),
      3  bdcs_imask         bit (1),

    2 align_p_status        char (0) aligned,
    2 p_status,
      3 dma_vfy_ok          bit (1),
      3 dma_wrt             bit (1),
      3 dma_rd              bit (1),
      3 scan_int            bit (1),
      3 scan_up_L           bit (1),
      3 pbus_force          bit (1),
      3 pside_enb           bit (1),
      3 qside_enb           bit (1),
      3 pbus_diag           bit (1),
      3 pbus_obey_er        bit (1),
      3 pbus_sel_er         bit (1),
      3 pbus_berr_en        bit (1),
      3 pbus_enb            bit (1),
      3 pbus_lock           bit (1),
      3 obey_p              bit (1),
      3 obey_q              bit (1),
    2 ioa_slot              fixed bin (15),
    2 usp                   fixed bin (31),
    2 d                     (0:7) fixed bin (31),
    2 a                     (0:6) fixed bin (31),
    2 int_sr                bit (16) aligned,
    2 status                bit (16) aligned,
    2 pc                    fixed bin (31),
    2 align_info            char (0) aligned,
    2 info,
      3 extended_fmt        bit (1),
      3 mbz                 bit (3),
      3 vector              bit (12),
    2 align_stat            char (0) aligned,
    2 special_status,
      3 rerun               bit (1),
      3 cam1                bit (1),
      3 inst_fetch          bit (1),
      3 data_fetch          bit (1),
      3 r_m_w_cycle         bit (1),
      3 high_byte           bit (1),
      3 byte_xfer           bit (1),
```

```
      3 read                  bit (1),
      3 pad2                  bit (5),
      3 function_code         bit (3),
    2 fault_addr              fixed bin (31),
    2 resv_data_out           bit (16) aligned,
    2 data_out                bit (16) aligned,
    2 resv_data_in            bit (16) aligned,
    2 data_in                 bit (16) aligned,
    2 resv_inst               bit (16) aligned,
    2 instruction_reg         bit (16) aligned,
    2 internal_info           (16) fixed bin (15);

/* End include file ... iop_mc.incl.pl1 */
%list;

      pc_ptr = ptr (p_mc_ptr -> mc.pc);

      bno = find_break (pc_ptr);

      if bno = -1
         then return;                                  /* Break previously cleared. */

      map_ptr = pc_ptr;
      map_ptr = set_access(map_ptr, 1);
      if map_ptr = null()
           then do;
                call iop_debug$msg('Error in mapping break address');
                return;
                end;
      map_ptr -> based_image.contents = s.break_info.former_contents (bno);

      /* Now turn on the trace bit in the status register.  This will cause
         a trace fault to occur after this intruction has been executed.
         Then iop_debug_full$restart_break will put BACK the breakpoint
         instruction for next time.   */

      p_mc_ptr -> mc.status = p_mc_ptr -> mc.status | TRACE_BIT;

      s.continue_index = bno;                          /* remember current bkpt */
      if map_ptr ^= null()
           then call reset_access(map_ptr, 1);

      return;
%page;
iop_debug_full$clear_all_breaks: entry;

      do while (s.break_info.n_breaks ^= 0);
           call clear_break(s.break_info.break_pc (1));
           end;

      return;

iop_debug_full$clear_break:
      entry (p_pc_ptr);
      call clear_break(p_pc_ptr);
      return;

%page;
iop_debug_full$restart_break:
      entry (p_mc_ptr);

      if s.continue_index = -1 & s.step_count = -1 /* no remembered bkpt? */
         then do;
              call iop_debug$msg ('Unexpected trace fault.');
              call iop_debug$fault (p_mc_ptr);
              return;
              end;

      call iop_debug$msg ('Continuing...');    /* lets us know we won */

      bno = s.continue_index;
      s.continue_index = -1;

      pc_ptr = s.break_info.break_pc (bno);
```

```
      map_ptr = pc_ptr;
      map_ptr = set_access(map_ptr, 1);
      if map_ptr = null()
           then do;
                call iop_debug$msg('Error in mapping break address');
                return;
                end;

      map_ptr -> based_image.contents = TRAP_3_INSTRUCTION;

      p_mc_ptr -> mc.status = p_mc_ptr -> mc.status & ^TRACE_BIT;

      if map_ptr ^= null()
           then call reset_access(map_ptr, 1);

      return;

%page;
iop_debug_full$list_breaks:
      entry;

      if ^s.pcp_breaks_processed
         then call load_pcp_breaks;

      if s.break_info.n_breaks = 0
         then call iop_debug$msg ('No breaks.');

         else do bno = 1 to s.break_info.n_breaks;
              call iop_debug$msg ('Break set at ' ||
                        iop_debug_full$describe_location (s.break_info.
                        break_pc (bno)));
              end;

      return;

%page;
iop_debug_full$find_next_bkpt:
      entry (p_base, p_break_p, p_break_loc);
/* Parameters */

declare  p_base                   fixed bin (31),
         p_break_p                pointer,
         p_break_loc              fixed bin (31);

/* Automatic */

declare  closest_bno              fixed bin;

      closest_bno = -1;
      p_break_loc = -1;
      p_break_p = null ();

      if ^s.pcp_breaks_processed
         then call load_pcp_breaks;

      if s.break_info.n_breaks = 0
         then return;

      do bno = 1 to s.break_info.n_breaks;
           if rel (s.break_info.break_pc (bno)) >= p_base
              then do;
                   if closest_bno = -1
                      then closest_bno = bno;
                   else if rel (s.break_info.break_pc (closest_bno)) >
                             rel (s.break_info.break_pc (bno))
                      then closest_bno = bno;
                   end;
      end;

      if closest_bno ^= -1
         then do;
              p_break_loc = rel (s.break_info.break_pc (closest_bno));
              p_break_p =
                        addr (s.break_info.former_contents (closest_bno));
              end;
```

```
     return;

clear_break: procedure (p_pc_ptr);

dcl  p_pc_ptr  ptr;

     map_ptr = p_pc_ptr;
     map_ptr = set_access(map_ptr, 1);
     if map_ptr = null()
          then do;
               call iop_debug$msg('Error in mapping break address');
               return;
               end;

     pc_ptr = p_pc_ptr;

     bno = find_break (pc_ptr);

     if bno = -1
        then do;
             call iop_debug$msg ('No break there.');
             return;
             end;

     map_ptr -> based_image.contents = s.break_info.former_contents (bno);

     do bno = bno to s.break_info.n_breaks - 1;
          s.break_info.each (bno) = s.break_info.each (bno + 1);
     end;

     s.break_info.n_breaks = s.break_info.n_breaks - 1;

     if map_ptr ^= null()
          then call reset_access(map_ptr, 1);

     return;

end clear_break;

find_break:
     proc (p_pc_ptr) returns (fixed bin);

/* Parameters */

declare  p_pc_ptr               pointer;

/* Automatic */

declare  bno                    fixed bin;

     if ^s.pcp_breaks_processed
        then call load_pcp_breaks;

     do bno = 1 to s.break_info.n_breaks
             while (s.break_info.break_pc (bno) ^= p_pc_ptr);
     end;

     if bno > s.break_info.n_breaks
        then return (-1);
        else return (bno);

     end find_break;

load_pcp_breaks:
     proc;

/* Automatic */

declare  bno                    fixed bin,
         i                      fixed bin,
         pc_ptr                 pointer;

/* We DO NOT use the following variable, ever.  It exists solely to use
   its include file, so it will be known that we are sensitive to the
```

```
    format of this structure.  It is impossible for us to use the include
    file directly to describe the structure, because of the interaction
    between the "initial" attribute specified in the include file and the
    fact that we have placed this variable in predefined static in
    iop_variables.  */

declare  1  iop_pcp_brks        static,
/* %include 'pcp_breaks_inner'; */
/* Begin include file ... pcp_breaks_inner.incl.pl1  83-01-31 */

            2 n_brks fixed bin (15) init (0),
            2 break (16),
              3 brk_addr fixed bin (31),
              3 brk_inst fixed bin (15);

/* End include file ... pcp_breaks_inner.incl.pl1 */

/* Now the REAL use of the structure */

declare  1  iop$pcp_brks        external static,
            2  n_brks           fixed bin (15),
            2  break (16),
               3  brk_addr      fixed bin (31),
               3  brk_inst      fixed bin (15);

     do i = 1 to iop$pcp_brks.n_brks;
          bno = s.break_info.n_breaks + 1;
          if bno > hbound (s.break_info.each, 1)
             then do;
                  call iop_debug$msg ('Too many breaks.');
                  return;
                  end;

          pc_ptr = ptr (iop$pcp_brks.break (i).brk_addr);
          s.break_info.break_pc (bno) = pc_ptr;
          s.break_info.former_contents (bno) =
                   unspec (iop$pcp_brks.break (i).brk_inst);
          s.break_info.adjacent_stuff (bno) = pc_ptr ->
                   based_image.adjacent_stuff;

          s.break_info.n_breaks = bno;
     end;

     s.pcp_breaks_processed = '1'b;

     return;
     end load_pcp_breaks;

end iop_debug_full$set_break;

%page;
iop_debug_full$get_fault_name:
     proc (a_faultno) returns (char (20) varying);

declare  a_faultno              fixed bin;

/* %include 'iop_fault_names'; */
/* Begin include file . . . . . iop_fault_names.incl.pl1 */

dcl  iop_fault_names (0:63) char (20) var static init (
     'unassigned vector 0',    /* 0 */
     'reset',                  /* 1 */
     'bus error',              /* 2 */
     'address error',          /* 3 */
     'invalid instruction',    /* 4 */
     'zero divide',            /* 5 */
     'CHK instruction',        /* 6 */
     'TRAPV instruction',      /* 7 */
     'privilege violation',    /* 8 */
     'trace',                  /* 9 */
     'invalid instruction',    /* 10 - "Line A emulator" */
     'invalid instruction',    /* 11 - "Line F emulator" */
     'unassigned vector 12',   /* 12 */
     'unassigned vector 13',   /* 13 */
```

```
        'format error',              /* 14 */
        'uninitialized vector',      /* 15 */
        'unassigned vector 16',      /* 16 */
        'unassigned vector 17',      /* 17 */
        'unassigned vector 18',      /* 18 */
        'unassigned vector 19',      /* 19 */
        'unassigned vector 20',      /* 20 */
        'unassigned vector 21',      /* 21 */
        'unassigned vector 22',      /* 22 */
        'unassigned vector 23',      /* 23 */
        'spurious interrupt',        /* 24 */
        'level 1 autovector',        /* 25 */
        'level 2 autovector',        /* 26 */
        'level 3 autovector',        /* 27 */
        'level 4 autovector',        /* 28 */
        'level 5 autovector',        /* 29 */
        'level 6 autovector',        /* 30 */
        'level 7 autovector',        /* 31 */
        'trap 0 instruction',        /* 32 */
        'trap 1 instruction',        /* 33 */
        'trap 2 instruction',        /* 34 */
        'trap 3 instruction',        /* 35 */
        'trap 4 instruction',        /* 36 */
        'trap 5 instruction',        /* 37 */
        'trap 6 instruction',        /* 38 */
        'trap 7 instruction',        /* 39 */
        'trap 8 instruction',        /* 40 */
        'trap 9 instruction',        /* 41 */
        'trap 10 instruction',       /* 42 */
        'trap 11 instruction',       /* 43 */
        'trap 12 instruction',       /* 44 */
        'trap 13 instruction',       /* 45 */
        'trap 14 instruction',       /* 46 */
        'unsupported pop',           /* 47 */
        'unassigned vector 48',      /* 48 */
        'unassigned vector 49',      /* 49 */
        'unassigned vector 50',      /* 50 */
        'unassigned vector 51',      /* 51 */
        'unassigned vector 52',      /* 52 */
        'unassigned vector 53',      /* 53 */
        'unassigned vector 54',      /* 54 */
        'unassigned vector 55',      /* 55 */
        'unassigned vector 56',      /* 56 */
        'unassigned vector 57',      /* 57 */
        'unassigned vector 58',      /* 58 */
        'unassigned vector 59',      /* 59 */
        'unassigned vector 60',      /* 60 */
        'unassigned vector 61',      /* 61 */
        'unassigned vector 62',      /* 62 */
        'unassigned vector 63');     /* 63 */

/* End include file . . . . . iop_fault_names.incl.pl1 */

      if a_faultno < lbound (iop_fault_names, 1) |
          a_faultno > hbound (iop_fault_names, 1)
        then return ('');
     return (iop_fault_names (a_faultno));
     end iop_debug_full$get_fault_name;

%page;
/* These procedures attempt to generate symbolic addresses from physical
   addresses.

   Cribbed from debug_symbolic and cohorts 08/01/84 by CDT */

iop_debug_full$describe_location:
     proc (p_pc_ptr) returns (char (64) varying);

/* Parameters */

declare  p_pc_ptr               pointer;

/* Automatic */
```

```
declare  address                 fixed bin (31),
         file_number             fixed bin,
         i                       fixed bin,
         iln                     fixed bin,
         line_desc               char (12) varying,
         line_number             fixed bin,
         module_id               fixed bin,
         module_name             char (32) varying,
         n                       fixed bin,
         offset                  fixed bin (31),
         result                  char (64) varying,
         symtab_ptr              pointer;

/* %include 'program_module'; */
/* BEGIN INCLUDE FILE ... program_module.incl.pl1 */

/* Beginning of modification history */
/* Modified 87-06-02 by HsuenJu Ko for program_module.module_origins and
     program_module.processor_family. */
/* End of modification history */

/* This include file contains declarations for a program module. */

%replace  program_module_version_1           by        1;

declare   dlink_ptr                  ptr,
          elink_ptr                  ptr,
          em_entryp                  ptr,
          entry_map_ptr              ptr,
          evm_entryp                 ptr,
          external_vars_map_ptr      ptr,
          link_map_ptr               ptr,
          link_names_map_ptr         ptr,
          lm_entryp                  ptr,
          lnm_entryp                 ptr,
          module_map_ptr             ptr,
          mm_entryp                  ptr,
          pm_n_relocations           bin (31),
          pm_n_entries               bin (15),
          pm_n_external_vars         bin (15),
          pm_n_link_names            bin (15),
          pm_n_modules               bin (15),
          pm_n_unsnapped_links       bin (15),
          program_module_ptr         ptr,
          relocation_map_ptr         ptr,
          rm_entryp                  ptr;

/* The header is always record 1 of the program file */

declare 1 program_module             based (program_module_ptr),
        2 version                    bin (15),
        2 binder_version             char (32) varying,
        2 binder_options             char (32) varying,
        2 system_name                char (32) varying,
        2 user_name                  char (65) varying,
        2 date_bound                 bin (31),
        2 main_entry_link,
          3 code_address             bin (31),
          3 static_address           bin (31),
        2 user_boundary              bin (31),
        2 n_modules                  bin (15),
        2 n_external_vars            bin (15),
        2 n_link_names               bin (15),
        2 n_unsnapped_links          bin (15),
        2 n_vm_pages                 bin (15),
        2 n_header_pages             bin (15),
        2 info (3, 4),
          3 address                  bin (31),
          3 len                      bin (31),
        2 module_map_address         bin (31),
        2 module_map_len             bin (31),
        2 external_vars_map_address
                                     bin (31),
        2 external_vars_map_len      bin (31),
```

```
        2 link_names_map_address   bin (31),
        2 link_names_map_len       bin (31),
        2 link_map_address         bin (31),
        2 link_map_len             bin (31),
        2 header_address           bin (31),
        2 header_len               bin (31),
        2 access_info (0:2047),
          3 user                   bit (1),
          3 execute                bit (1),
          3 read                   bit (1),
          3 write                  bit (1),
          3 mbz                    bit (4),
        2 flags,
          3 profile                bit (1),
          3 references_kernel      bit (1),
          3 execute_in_kernel      bit (1),
          3 byte_access_info       bit (1),
          3 needs_sap              bit (1),
          3 usf_rules              bit (1),
          3 load_in_kernel         bit (1),
          3 mbz                    bit (25),
        2 n_tasks                  bin (15),
        2 task_static_len (3)      bin (31),
        2 stack_len                bin (31),
        2 n_entries                bin (15),
        2 entry_map_address        bin (31),
        2 entry_map_len            bin (31),
        2 pcb_version              bin (15),
        2 processor                bin (15),
        2 release_name             char (32) var,
        2 relocation_info,
          3 relocation_map_address bin (31),
          3 relocation_map_len     bin (31),
          3 n_relocations          bin (31),
        2 high_water_mark          bin (31),
        2 copyright_notice         char (256) var,
        2 module_origins (14)      bin (31),
        2 processor_family         bin (15),
        2 mbz (655)                bin (15);


declare 1 module_map (pm_n_modules)
                                   based (module_map_ptr),
        2 name                     char (32) varying,
        2 sectionx                 bin (15),
        2 dtc                      bin (31),
        2 dtm                      bin (31),
        2 code_address             bin (31),
        2 code_len                 bin (31),
        2 symtab_address           bin (31),
        2 symtab_len               bin (31),
        2 static_address           bin (31),
        2 static_len               bin (31),
        2 modes,
          3 user                   bit (1),
          3 execute                bit (1),
          3 read                   bit (1),
          3 write                  bit (1),
        2 flags,
          3 profile                bit (1),
          3 needs_sap              bit (1),
          3 mbz                    bit (10),
        2 date_compiled            bin (31);

declare 1 mm_entry                 based (mm_entryp),
        2 name                     char (32) varying,
        2 sectionx                 bin (15),
        2 dtc                      bin (31),
        2 dtm                      bin (31),
        2 code_address             bin (31),
        2 code_len                 bin (31),
        2 symtab_address           bin (31),
        2 symtab_len               bin (31),
        2 static_address           bin (31),
```

```
        2 static_len                bin (31),
        2 modes,
          3 user                    bit (1),
          3 execute                 bit (1),
          3 read                    bit (1),
          3 write                   bit (1),
        2 flags,
          3 profile                 bit (1),
          3 needs_sap               bit (1),
          3 mbz                     bit (10),
        2 date_compiled             bin (31);
declare 1 external_vars_map (pm_n_external_vars)
                                    based (external_vars_map_ptr),
        2 name                      char (32) varying,
        2 address                   bin (31),
        2 len                       bin (31),
        2 sectionx                  bin (15);

declare 1 evm_entry                 based (evm_entryp),
        2 name                      char (32) varying,
        2 address                   bin (31),
        2 len                       bin (31),
        2 sectionx                  bin (15);

declare link_names_map (pm_n_link_names) char (32) var
                                    based (link_names_map_ptr);

declare lnm_entry char (32) var     based (lnm_entryp);

declare 1 link_map (pm_n_unsnapped_links)
                                    based (link_map_ptr),
        2 address                   bin (31),
        2 namex                     bin (15);

declare 1 lm_entry                  based (lm_entryp),
        2 address                   bin (31),
        2 namex                     bin (15);

declare 1 entry_map (pm_n_entries) based (entry_map_ptr),
        2 name                      char (32) varying,
        2 code_address              bin (31),
        2 static_address            bin (31);

declare 1 em_entry                  based (em_entryp),
        2 name                      char (32) varying,
        2 code_address              bin (31),
        2 static_address            bin (31);

declare 1 olink                     based (olink_ptr),
        2 address                   bin (31);

declare 1 elink                     based (elink_ptr),
        2 code_address              bin (31),
        2 static_address            bin (31);

declare 1 relocation_map (pm_n_relocations)
                                    based (relocation_map_ptr),
        2 sectionx                  char (1),
        2 regionx                   char (1),
        2 offset                    bin (31),
        2 reloc_sectionx            char (1),
        2 reloc_regionx             char (1),
        2 reloc_offset              bin (31),
        2 len                       bin (15);

declare 1 rm_entry                  based (rm_entryp),
        2 sectionx                  char (1),
        2 regionx                   char (1),
        2 offset                    bin (31),
        2 reloc_sectionx            char (1),
        2 reloc_regionx             char (1),
        2 reloc_offset              bin (31),
        2 len                       bin (15);
```

```
/* END INCLUDE FILE ... program_module.incl.pl1 */

      result = ltrim (hexp (p_pc_ptr, 8), '0') || 'x: ';

      if p_pc_ptr = null ()
         then do;
              result = result || 'null()';
              return (result);
              end;

      address = rel (p_pc_ptr);
      module_map_ptr = ptr (iop$module_map_origin);

      if module_map_ptr = null ()
         then do;
              result = result || ' (no symbol table)';
              return (result);
              end;

/* First, search the list of external variables.  This seems non-intuitive,
   but in the PSI, a number of external variables are actually defined in
   the code section of the program module, and it is handier to identify
   these by name rather than as non-specific "code in module_name".  */

      external_vars_map_ptr = ptr (iop$external_vars_map_origin);
      pm_n_external_vars = iop$n_external_vars;

      do i = 1 to pm_n_external_vars;

           evm_entryp = addr (external_vars_map (i));

/*: ^fill */
           if address = evm_entry.address /* sometimes len is 0 */
                    | (address > evm_entry.address
                    & address < evm_entry.address + evm_entry.len)
              then do;                             /* It's an external variable */
/*: fill */
                   n = address - evm_entry.address;

                   result = result || evm_entry.name;
                   if n ^= 0
                      then result = result || '+' || hex ((n), 4) || 'x';
                   result = result || ' (external variable)';
                   return (result);
                   end;
      end;

/* If not found, search for it as a code location. */

      module_name = iop_debug_full$addr_to_module (address, module_id);
      if module_id > 0
         then do;
              mm_entryp = addr (module_map (module_id));
              symtab_ptr = ptr (mm_entry.symtab_address);

              result = result || module_name;
              offset = address - mm_entry.code_address;

              if offset > 0
                 then result = result || '+' || ltrim (hex (offset, 8),
                         '0');

              call s$get_runtime_line_no (symtab_ptr, address, (0), (0),
                        iln);
              if iln > 0
                 then do;
                      if iln = 32767
                         then line_desc = '**END**';
                         else do;
                              call sidecode_line_id (symtab_ptr, iln,
                                        file_number, line_number);
                              if file_number = 0
                                 then line_desc = '';
                                 else line_desc =
```

```
                                  bin_to_char ((file_number)) ||
                                  '-';
                    line_desc = line_desc ||
                              bin_to_char ((line_number));
                    end;


               result = result || ', line ' || line_desc;
               end;
          else result = result || ' (no source line)';

     return (result);

     end;

/* Try to match ANY other object which contains the address.  */

     pm_n_modules = iop$n_modules;

     do i = 1 to pm_n_modules;

          mm_entryp = addr (module_map (i));
          symtab_ptr = ptr (mm_entry.symtab_address);

/*: ^fill */
          if address >= mm_entry.symtab_address
                  & address < mm_entry.symtab_address +
                  mm_entry.symtab_len
             then do;
/*: fill */
                 result = result || mm_entry.name || ', symtab+' ||
                        bin_to_char (address -
                        mm_entry.symtab_address);

                 return (result);
                 end;

/*: ^fill */
          else if address >= mm_entry.static_address
                  & address < mm_entry.static_address +
                  mm_entry.static_len
             then do;
/*: fill */
                 result = result || mm_entry.name || ', static+' ||
                        bin_to_char (address -
                        mm_entry.static_address);

                 return (result);
                 end;
     end;

     result = result || 'matches no symbol.';
     return (result);

     end iop_debug_full$describe_location;

%page;
iop_debug_full$addr_to_module:
     proc (p_pc, p_module_id) returns (char (32) varying);

/* Parameters */

declare  p_pc                   fixed bin (31),
         p_module_id            fixed bin;

/* Automatic */

declare  address                fixed bin (31),
         i                      fixed bin,
         symtab_ptr             pointer;

/* include file program_module, available above */
%nolist;
/* %include 'program_module'; */
```

```
/* BEGIN INCLUDE FILE ... program_module.incl.pl1 */

/* Beginning of modification history */
/* Modified 87-06-02 by HsuenJu Ko for program_module.module_origins and
   program_module.processor_family. */
/* End of modification history */

/* This include file contains declarations for a program module. */

%replace  program_module_version_1            by        1;

declare   dlink_ptr                 ptr,
          elink_ptr                 ptr,
          em_entryp                 ptr,
          entry_map_ptr             ptr,
          evm_entryp                ptr,
          external_vars_map_ptr     ptr,
          link_map_ptr              ptr,
          link_names_map_ptr        ptr,
          lm_entryp                 ptr,
          lnm_entryp                ptr,
          module_map_ptr            ptr,
          mm_entryp                 ptr,
          pm_n_relocations          bin (31),
          pm_n_entries              bin (15),
          pm_n_external_vars        bin (15),
          pm_n_link_names           bin (15),
          pm_n_modules              bin (15),
          pm_n_unsnapped_links      bin (15),
          program_module_ptr        ptr,
          relocation_map_ptr        ptr,
          rm_entryp                 ptr;

/* The header is always record 1 of the program file */

declare 1 program_module            based (program_module_ptr),
        2 version                   bin (15),
        2 binder_version            char (32) varying,
        2 binder_options            char (32) varying,
        2 system_name               char (32) varying,
        2 user_name                 char (65) varying,
        2 date_bound                bin (31),
        2 main_entry_link,
          3 code_address            bin (31),
          3 static_address          bin (31),
        2 user_boundary             bin (31),
        2 n_modules                 bin (15),
        2 n_external_vars           bin (15),
        2 n_link_names              bin (15),
        2 n_unsnapped_links         bin (15),
        2 n_vm_pages                bin (15),
        2 n_header_pages            bin (15),
        2 info (3, 4),
          3 address                 bin (31),
          3 len                     bin (31),
        2 module_map_address        bin (31),
        2 module_map_len            bin (31),
        2 external_vars_map_address
                                    bin (31),
        2 external_vars_map_len     bin (31),
        2 link_names_map_address    bin (31),
        2 link_names_map_len        bin (31),
        2 link_map_address          bin (31),
        2 link_map_len              bin (31),
        2 header_address            bin (31),
        2 header_len                bin (31),
        2 access_info (0:2047),
          3 user                    bit (1),
          3 execute                 bit (1),
          3 read                    bit (1),
          3 write                   bit (1),
          3 mbz                     bit (4),
        2 flags,
          3 pmfile                  bit (1),
```

```
      3 references_kernel      bit (1),
      3 execute_in_kernel      bit (1),
      3 byte_access_info       bit (1),
      3 needs_sap              bit (1),
      3 usf_rules              bit (1),
      3 load_in_kernel         bit (1),
      3 mbz                    bit (25),
    2 n_tasks                  bin (15),
    2 task_static_len (3)      bin (31),
    2 stack_len                bin (31),
    2 n_entries                bin (15),
    2 entry_map_address        bin (31),
    2 entry_map_len            bin (31),
    2 pof_version              bin (15),
    2 processor                bin (15),
    2 release_name             char (32) var,
    2 relocation_info,
      3 relocation_map_address bin (31),
      3 relocation_map_len     bin (31),
      3 n_relocations          bin (31),
    2 high_water_mark          bin (31),
    2 copyright_notice         char (256) var,
    2 module_origins (14)      bin (31),
    2 processor_family         bin (15),
    2 mbz (655)                bin (15);


declare 1 module_map (pm_n_modules)
                               based (module_map_ptr),
        2 name                 char (32) varying,
        2 sectionx             bin (15),
        2 dtc                  bin (31),
        2 dtm                  bin (31),
        2 code_address         bin (31),
        2 code_len             bin (31),
        2 symtab_address       bin (31),
        2 symtab_len           bin (31),
        2 static_address       bin (31),
        2 static_len           bin (31),
        2 modes,
          3 user               bit (1),
          3 execute            bit (1),
          3 read               bit (1),
          3 write              bit (1),
        2 flags,
          3 profile            bit (1),
          3 needs_sap          bit (1),
          3 mbz                bit (10),
        2 date_compiled        bin (31);

declare 1 mm_entry             based (mm_entryp),
        2 name                 char (32) varying,
        2 sectionx             bin (15),
        2 dtc                  bin (31),
        2 dtm                  bin (31),
        2 code_address         bin (31),
        2 code_len             bin (31),
        2 symtab_address       bin (31),
        2 symtab_len           bin (31),
        2 static_address       bin (31),
        2 static_len           bin (31),
        2 modes,
          3 user               bit (1),
          3 execute            bit (1),
          3 read               bit (1),
          3 write              bit (1),
        2 flags,
          3 profile            bit (1),
          3 needs_sap          bit (1),
          3 mbz                bit (10),
        2 date_compiled        bin (31);

declare 1 external_vars_map (pm_n_external_vars)
```

```
                                         based (external_vars_map_ptr),
          2 name                         char (32) varying,
          2 address                      bin (31),
          2 len                          bin (31),
          2 sectionx                     bin (15);

declare 1 evm_entry                      based (evm_entryp),
          2 name                         char (32) varying,
          2 address                      bin (31),
          2 len                          bin (31),
          2 sectionx                     bin (15);

declare link_names_map (pm_n_link_names) char (32) var
                                         based (link_names_map_ptr);

declare lnm_entry char (32) var          based (lnm_entryp);

declare 1 link_map (pm_n_unsnapped_links)
                                         based (link_map_ptr),
          2 address                      bin (31),
          2 namex                        bin (15);

declare 1 lm_entry                       based (lm_entryp),
          2 address                      bin (31),
          2 namex                        bin (15);

declare 1 entry_map (pm_n_entries)       based (entry_map_ptr),
          2 name                         char (32) varying,
          2 code_address                 bin (31),
          2 static_address               bin (31);

declare 1 em_entry                       based (em_entryp),
          2 name                         char (32) varying,
          2 code_address                 bin (31),
          2 static_address               bin (31);

declare 1 dlink                          based (dlink_ptr),
          2 address                      bin (31);

declare 1 elink                          based (elink_ptr),
          2 code_address                 bin (31),
          2 static_address               bin (31);

declare 1 relocation_map (pm_n_relocations)
                                         based (relocation_map_ptr),
          2 sectionx                     char (1),
          2 regionx                      char (1),
          2 offset                       bin (31),
          2 reloc_sectionx               char (1),
          2 reloc_regionx                char (1),
          2 reloc_offset                 bin (31),
          2 len                          bin (15);

declare 1 rm_entry                       based (rm_entryp),
          2 sectionx                     char (1),
          2 regionx                      char (1),
          2 offset                       bin (31),
          2 reloc_sectionx               char (1),
          2 reloc_regionx                char (1),
          2 reloc_offset                 bin (31),
          2 len                          bin (15);


/* END INCLUDE FILE ... program_module.incl.pl1 */
%list;

     p_module_id = -1;

     address = p_pc;

     if address = 1
        then return ('null ()');

/* don't scrub s.default_module_name just because somebody evaluated null. */
```

```
/* Search the module map for a code section which contains the address.  */

      module_map_ptr = ptr (iop$module_map_origin);
      if module_map_ptr = null ()
         then return ('');

      pm_n_modules = iop$n_modules;

      do i = 1 to pm_n_modules;

          mm_entryp = addr (module_map (i));
          symtab_ptr = ptr (mm_entry.symtab_address);

/*: ^fill */
          if address >= mm_entry.code_address
                 & address < mm_entry.code_address + mm_entry.code_len
             then do;
/*: fill */
                 p_module_id = i;
                 s.default_module_name = mm_entry.name;
                 return (s.default_module_name);
                 end;
      end;

      return ('');

      end iop_debug_full$addr_to_module;

%page;
iop_debug_full$eval_location:
     proc (p_symbol_name, p_line_desc) returns (pointer);

/* Parameters */

declare  p_symbol_name         char (32) varying,
         p_line_desc           char (64) varying;

/* Automatic */

declare  address               fixed bin (31),
         code                  fixed bin,
         file_number           fixed bin,
         i                     fixed bin,
         iln                   fixed bin,
         j                     fixed bin,
         line_number           fixed bin,
         offset_exprn          char (12) varying,
         start_iln             fixed bin,
         symbol_name           char (32) varying,
         symtab_ptr            pointer,
         syntax_err            bit(1) aligned;

/* include file program_module, available above */
%nolist;
/* %include 'program_module'; */
/* BEGIN INCLUDE FILE ... program_module.incl.pl1 */

/* Beginning of modification history */
/* Modified 87-06-02 by HsuenJu Ko for program_module.module_origins and
     program_module.processor_family. */
/* End of modification history */

/* This include file contains declarations for a program module. */

%replace  program_module_version_1          by        1;

declare   dlink_ptr               ptr,
          elink_ptr               ptr,
          em_entryp               ptr,
          entry_map_ptr           ptr,
          evm_entryp              ptr,
          external_vars_map_ptr   ptr,
          link_map_ptr            ptr,
          link_names_map_ptr      ptr,
```

```
         lm_entryp                 ptr,
         lnm_entryp                ptr,
         module_map_ptr            ptr,
         mm_entryp                 ptr,
         pm_n_relocations          bin (31),
         pm_n_entries              bin (15),
         pm_n_external_vars        bin (15),
         pm_n_link_names           bin (15),
         pm_n_modules              bin (15),
         pm_n_unsnapped_links      bin (15),
         program_module_ptr        ptr,
         relocation_map_ptr        ptr,
         rm_entryp                 ptr;

/* The header is always record 1 of the program file */

declare 1 program_module              based (program_module_ptr),
        2 version                     bin (15),
        2 binder_version              char (32) varying,
        2 binder_options              char (32) varying,
        2 system_name                 char (32) varying,
        2 user_name                   char (65) varying,
        2 date_bound                  bin (31),
        2 main_entry_link,
          3 code_address              bin (31),
          3 static_address            bin (31),
        2 user_boundary               bin (31),
        2 n_modules                   bin (15),
        2 n_external_vars             bin (15),
        2 n_link_names                bin (15),
        2 n_unsnapped_links           bin (15),
        2 n_vm_pages                  bin (15),
        2 n_header_pages              bin (15),
        2 info (3, 4),
          3 address                   bin (31),
          3 len                       bin (31),
        2 module_map_address          bin (31),
        2 module_map_len              bin (31),
        2 external_vars_map_address
                                      bin (31),
        2 external_vars_map_len       bin (31),
        2 link_names_map_address      bin (31),
        2 link_names_map_len          bin (31),
        2 link_map_address            bin (31),
        2 link_map_len                bin (31),
        2 header_address              bin (31),
        2 header_len                  bin (31),
        2 access_info (0:2047),
          3 user                      bit (1),
          3 execute                   bit (1),
          3 read                      bit (1),
          3 write                     bit (1),
          3 mbz                       bit (4),
        2 flags,
          3 profile                   bit (1),
          3 references_kernel         bit (1),
          3 execute_in_kernel         bit (1),
          3 byte_access_info          bit (1),
          3 needs_sap                 bit (1),
          3 usf_rules                 bit (1),
          3 load_in_kernel            bit (1),
          3 mbz                       bit (25),
        2 n_tasks                     bin (15),
        2 task_static_len (3)         bin (31),
        2 stack_len                   bin (31),
        2 n_entries                   bin (15),
        2 entry_map_address           bin (31),
        2 entry_map_len               bin (31),
        2 cor_version                 bin (15),
        2 processor                   bin (15),
        2 release_name                char (32) var,
        2 relocation_info,
          3 relocation_map_address    bin (31),
          3 relocation_map_len        bin (31),
```

```
    3 n_relocations                 bin (31),
  2 high_water_mark                 bin (31),
  2 copyright_notice                char (256) var,
  2 module_origins (14)             bin (31),
  2 processor_family                bin (15),
  2 mbz (655)                       bin (15);


declare 1 module_map (pm_n_modules)
                                    based (module_map_ptr),
  2 name                            char (32) varying,
  2 sectionx                        bin (15),
  2 dtc                             bin (31),
  2 dtm                             bin (31),
  2 code_address                    bin (31),
  2 code_len                        bin (31),
  2 symtab_address                  bin (31),
  2 symtab_len                      bin (31),
  2 static_address                  bin (31),
  2 static_len                      bin (31),
  2 modes,
    3 user                          bit (1),
    3 execute                       bit (1),
    3 read                          bit (1),
    3 write                         bit (1),
  2 flags,
    3 profile                       bit (1),
    3 needs_sap                     bit (1),
    3 mbz                           bit (10),
  2 date_compiled                   bin (31);

declare 1 mm_entry                  based (mm_entryp),
  2 name                            char (32) varying,
  2 sectionx                        bin (15),
  2 dtc                             bin (31),
  2 dtm                             bin (31),
  2 code_address                    bin (31),
  2 code_len                        bin (31),
  2 symtab_address                  bin (31),
  2 symtab_len                      bin (31),
  2 static_address                  bin (31),
  2 static_len                      bin (31),
  2 modes,
    3 user                          bit (1),
    3 execute                       bit (1),
    3 read                          bit (1),
    3 write                         bit (1),
  2 flags,
    3 profile                       bit (1),
    3 needs_sap                     bit (1),
    3 mbz                           bit (10),
  2 date_compiled                   bin (31);

declare 1 external_vars_map (pm_n_external_vars)
                                    based (external_vars_map_ptr),
  2 name                            char (32) varying,
  2 address                         bin (31),
  2 len                             bin (31),
  2 sectionx                        bin (15);

declare 1 evm_entry                 based (evm_entryp),
  2 name                            char (32) varying,
  2 address                         bin (31),
  2 len                             bin (31),
  2 sectionx                        bin (15);

declare link_names_map (pm_n_link_names) char (32) var
                                    based (link_names_map_ptr);

declare lnm_entry char (32) var     based (lnm_entryp);

declare 1 link_map (pm_n_unsnapped_links)
                                    based (link_map_ptr),
  2 address                         bin (31),
```

```
        2 namex                      bin (15);

declare 1 lm_entry                   based (lm_entryp),
        2 address                    bin (31),
        2 namex                      bin (15);

declare 1 entry_map (pm_n_entries) based (entry_map_ptr),
        2 name                       char (32) varying,
        2 code_address               bin (31),
        2 static_address             bin (31);

declare 1 em_entry                   based (em_entryp),
        2 name                       char (32) varying,
        2 code_address               bin (31),
        2 static_address             bin (31);

declare 1 olink                      based (olink_ptr),
        2 address                    bin (31);

declare 1 elink                      based (elink_ptr),
        2 code_address               bin (31),
        2 static_address             bin (31);

declare 1 relocation_map (pm_n_relocations)
                                     based (relocation_map_ptr),
        2 sectionx                   char (1),
        2 regionx                    char (1),
        2 offset                     bin (31),
        2 reloc_sectionx             char (1),
        2 reloc_regionx              char (1),
        2 reloc_offset               bin (31),
        2 len                        bin (15);

declare 1 rm_entry                   based (rm_entryp),
        2 sectionx                   char (1),
        2 regionx                    char (1),
        2 offset                     bin (31),
        2 reloc_sectionx             char (1),
        2 reloc_regionx              char (1),
        2 reloc_offset               bin (31),
        2 len                        bin (15);


/* END INCLUDE FILE ... program_module.incl.pl1 */
%list;

     p_line_desc = p_symbol_name;

     call unhex (p_symbol_name, address, code);
     if code = 0
     then return (ptr (address));                  /* simple hex address */

     symbol_name = p_symbol_name;

     if length(symbol_name) >= 2
     then if substr(symbol_name,1,2) = '$s'
          then return(eval_stack_offset(symbol_name));

     i = search (symbol_name,'$+-');

     if i > 0
        then do;
             offset_exprn = substr (symbol_name, i);
             if i = 1
                then do;
                     if s.default_module_name = ''
                        then do;
                             p_line_desc = 'no default module name';
                             return (null ());
                             end;
                     symbol_name = s.default_module_name;
                     end;
                else do;
```

```
                    symbol_name = substr (symbol_name, 1, i - 1);
                    s.default_module_name = symbol_name;
                    end;

              p_line_desc = symbol_name;
              end;
         else offset_exprn = '';

      module_map_ptr = ptr (iop$module_map_origin);

      if module_map_ptr = null ()
         then do;
              p_line_desc = 'no symbol table';
              return (null ());
              end;

      if offset_exprn = ''                          /* Try external vars */
         then do;
              external_vars_map_ptr = ptr (iop$external_vars_map_origin);
              pm_n_external_vars = iop$n_external_vars;

              do i = 1 to pm_n_external_vars;
                   if external_vars_map (i).name = symbol_name
                      then return (ptr (external_vars_map (i).address));
              end;
              end;

/* Try the code section. */

      pm_n_modules = iop$n_modules;

      do i = 1 to pm_n_modules;

           mm_entryp = addr (module_map (i));
           symtab_ptr = ptr (mm_entry.symtab_address);

           if symbol_name = mm_entry.name
              then do;
                   p_line_desc = 'Module ' || p_line_desc;

                   if offset_exprn = ''
                   then return (ptr (mm_entry.code_address));

                   if substr(offset_exprn,1,1) ^= '&'
                   then do;
                        call eval_plus_minus(offset_exprn,address,syntax_err);
                        if syntax_err
                        then do;
                             p_line_desc = p_line_desc ||
                                     ': invalid syntax';
                             return (null ());
                             end;
                        address = mm_entry.code_address + address;
                        return(ptr(address));
                        end;

                   else offset_exprn=substr(offset_exprn,2);

                   j = index (offset_exprn, '-');
                   if j = 0
                      then do;
                           file_number = 0;
                           line_number = char_to_bin ((offset_exprn));
                           end;
                      else do;
                           file_number = char_to_bin (substr (offset_exprn,
                                   1, j - 1));
                           line_number = char_to_bin (substr (offset_exprn,
                                   j + 1));
                           end;

                   iln = s$encode_line_id (symtab_ptr, file_number,
                           line_number);
                   if iln = -1
```

```
            then do;
                 p_line_desc = p_line_desc ||
                            ': cannot find line';
                 return (null ());
                 end;

          address = s$get_runtime_location (symtab_ptr, iln,
                     start_iln);
          if address = -1
             then do;
                 p_line_desc = p_line_desc ||
                            ': cannot determine address';
                 return (null ());
                 end;
          if iln ^= start_iln
             then do;
                 p_line_desc = p_line_desc ||
                            ': no code for line ' || offset_exprn;
                 return (null ());
                 end;

          p_line_desc = p_line_desc || ', line ' || offset_exprn;

          return (ptr (address));

          end;
     end;

     p_line_desc = 'Cannot locate symbol: ' || p_symbol_name;
     return (null ());

%page;
eval_stack_offset: proc (p_exprn) returns(ptr);

dcl  p_exprn        char(32) var;
dcl  address        fixed bin(31);
dcl  code           fixed bin(15);
dcl  exprn          char(12) var;
dcl  offset_p       ptr;

     if s.frame = 0
     then do;
          p_line_desc = 'No frame address has been specified';
          return(null());
          end;

     if length (p_exprn) > 2
     then do;
          exprn = substr(p_exprn,3);
          i = min (8,length(exprn)) + 1;
          if substr(exprn, length(exprn), 1) = 'x' |
             substr(exprn, length(exprn), 1) = 'X'
             then i = i - 1;
          exprn = substr('ffffffff' || exprn ,i,8);
          call unhex (exprn,address,code);
          if code ^= 0
          then do;
               p_line_desc = 'Invalid stack offset';
               return(null());
               end;
          end;
     else address = 0;

     address = s.frame + address;

     return(ptr(address));

     end eval_stack_offset;
%page;
eval_plus_minus:   proc (p_exprn,p_offset,p_syntax_err) recursive;

dcl  p_exprn         char(12) var;
dcl  p_offset        fixed bin(31);
dcl  p_syntax_err    bit(1) aligned;
```

```
dcl  syntax_err        bit(1) aligned;
dcl  i                 fixed bin(15);
dcl  exprn             char(12) var;
dcl  next_exprn        char(12) var;
dcl  offset            fixed bin(31);
dcl  next_offset       fixed bin(31);

     p_syntax_err = '0'b;
     p_offset = 0;

     if p_exprn = ''                         /* nothing there... */
     then return;

     exprn = p_exprn;

     if search(exprn,'+-') ^= 1
     then do;
          p_syntax_err = '1'b;
          return;
          end;

     i = search (substr(exprn,2),'+-');

     if  i > 0                               /* more operators exist */
     then do;
          next_exprn = substr(exprn,i+1);
          exprn      = substr(exprn,1,i);
          call eval_plus_minus (next_exprn,next_offset,syntax_err);
          if syntax_err
          then p_syntax_err = '1'b;
          else offset = calc_offset(exprn) + next_offset;
          end;
     else offset = calc_offset(exprn);    /* last operator in expression */

     if ^p_syntax_err
     then p_offset = offset;

     return;


calc_offset:   proc (p_exprn) returns (fixed bin(31));

dcl  p_exprn   char(12) var;

dcl exprn      char(12) var;
dcl offset     fixed bin(31);
dcl i          fixed bin(15);
dcl code       fixed bin(15);
dcl sign       char(1);

     offset = 0;
     sign   = substr(p_exprn,1,1);
     exprn = substr(p_exprn,2);

     if exprn = ''
     then return(offset);

     i = index(exprn,'x');

     if i > 0                                /* hex number */
     then do;
          call unhex (exprn,offset,code);
          if code ^= 0
          then p_syntax_err = '1'b;
          end;
     else do;                                /* decimal number */
          if verify (exprn,'0123456789 ') = 0
          then offset = char_to_bin (exprn);
          else p_syntax_err = '1'b;
          end;

     if sign = '-'
     then return (-offset);
     else return (offset);
```

```
     end calc_offset;

     end eval_plus_minus;
     end iop_debug_full$eval_location;
/*  ***begin copyright*** ******************************  */
/*                                                        */
/*  STRATUS CONFIDENTIAL INFORMATION: CLASS II            */
/*  COPYRIGHT (c) Stratus Computer, Inc. 1986             */
/*                                                        */
/*  This program contains confidential and proprietary    */
/*  information of Stratus Computer, Inc., and any        */
/*  reproduction, disclosure, or use in whole or in part  */
/*  is expressly prohibited, except as may be             */
/*  specifically authorized by prior written agreement or */
/*  permission of Stratus.                                */
/*                                                        */
/*  ***end copyright*** ********************************  */

/* Beginning of modification history */
/* Written by Tom Moser */
/* Modified 87-03-30 by Tom Moser to allow dump after crash and setup stack */
/* Modified 87-04-16 by Tom Moser to mark ES dead */
/* End of modification history */

s$invoke_deh: procedure (p_cond_no, p_fcb_ptr, p_name_ptr,
                   p_oncode, p_continue) options (support);


declare    p_cond_no      bin (15),      /* for deh */
           p_fcb_ptr      ptr,           /* for deh */
           p_name_ptr     ptr,           /* for deh */
           p_oncode       bin (15),      /* for deh */
           p_continue     bin (15);      /* for deh */

dcl        code           fixed bin (15);
declare    iop_debug$crash            entry (char (*) varying);
declare    iop$report_condition_info entry;

declare    iop$always_debug_fault     bit (1) aligned external static;
dcl        iop$last_stack_ptr       ptr external static;
dcl        iop$esip                 ptr external static;

dcl        stackframeptr            entry returns (ptr);
dcl        iop$process_diag_command entry;
dcl        iop$edit_string_ii       entry (char(*) var, fixed bin (15),
                                    fixed bin (15))
                                    returns ( char (80) var);

/* %nolist;  %include 'iop_utility_calls'; %list; */
/* Begin include file . . . . . iop_utility_calls.incl.pl1 */

dcl  iop$allocate entry (fixed bin (31), char (2) aligned) returns (ptr);
dcl  iop$free entry (ptr, char (2) aligned);

dcl  iop$get_level entry  returns (fixed bin (15));
dcl  iop$set_level entry (fixed bin (15));

dcl  iop$syserr_code entry (char (80) varying, fixed bin (15), fixed bin(15));
dcl  iop$panic_syserr entry (char (80) varying);

dcl  iop$read_time  entry returns (fixed bin (31));
dcl  iop$delta_time entry (fixed bin (31)) returns (fixed bin (31));

dcl  bin_to_char    entry (fixed bin (31)) returns (character (13) varying);
dcl  char_to_bin    entry (character (13) varying) returns (fixed bin (31));

dcl  iop$set_slot_priority entry (fixed bin (15), fixed bin (15),
                                  fixed bin (15));

/* End include file . . . . . iop_utility_calls.incl.pl1 */
/* %nolist;  %include 'iop_constants';     %l */ist;
/* Begin include file . . . . . iop_constants.incl.pl1 */

%replace IOA_CLOCK_CHANNEL_NO by 2;
```

```
%replace TERM_SLOT_1            by 14;
%replace TERM_SLOT_2            by 15;

%replace MAX_IOP_INTERRUPT_LEVEL by 8;
%replace MAX_IOP_BACKGROUND_PRIORITY by 8;

%replace MASK_ALL_INTS by 7;
%replace ALLOW_TIMER_INTERRUPTS by 5;
%replace ALLOW_ICA_INTERRUPTS by 4;

%replace JIFFIES_PER_SECOND by 65536;

%replace ES_ENTITY by 0;
%replace ES_CHANNEL by 0;
%replace NON_ENTITY by -1;
%replace NONE by -1;

%replace START_ADAPT_MEM by 12582912;   /* 12M or C00000x */

/* End include file . . . . . iop_constants.incl.pl1 */

/* %nolist;  %include 'iop_command_calls'; %list; */
/* Begin include file . . . . . iop_command_calls.incl.pl1 */

dcl  iop$deliver_command entry (fixed bin (15), fixed bin(15), fixed bin(15),
      fixed bin (31), fixed bin(31), fixed bin (15), fixed bin(15));

/* End include file . . . . . iop_command_calls.incl.pl1 */
/* %nolist;  %include 'iop_mailbox'; */%list;
/* Begin include file . . . . . iop_mailbox.incl.pl1 */

dcl  iop$mailbox_addr    ptr external static;
dcl  iop$vos_ringp       ptr external static;
dcl  iop$iop_ringp       ptr external static;
dcl  iop$syserr_ringp    ptr external static;

dcl  iop_mbxp            ptr;
dcl  syserr_ringp        ptr;
dcl  ring_cmdp           ptr;
dcl  vos_ringp           ptr;
dcl  iop_ringp           ptr;

%replace IOP_RING_SIZE   by   32;
%replace IOP_SYSERR_SIZE by   16;

%replace IOP_ON_LINE            by   0;
%replace IOP_INITIALIZING       by  -1;
%replace IOP_FAILED_TO_INIT     by  -2;
%replace IOP_EXEC_OUT_OF_PROM   by  -3;
          2 pad                 bit (7),
          2 channel             fixed bin (15),
          2 command             fixed bin (15),
          2 data_16_1           fixed bin (15),
          2 data_32_1           fixed bin (31),
          2 data_32_2           fixed bin (31);

dcl 1 iop_ring (0:IOP_RING_SIZE-1) based (iop_ringp) like ring_cmd;

dcl 1 vos_ring (0:IOP_RING_SIZE-1) based (vos_ringp) like ring_cmd;

/* values for iop_mbx.idle_status */

%replace IDLE_STATUS_INIT           by 0;
%replace IDLE_STATUS_COMPLETE       by 1;
%replace IDLE_STATUS_REJECT         by 2;
%replace IDLE_STATUS_WAIT           by 3;


/* End include file . . . . . iop_mailbox.incl.pl1 */

/* %nolist;  %include 'iop_es_ecc'; */ %list;
/* Begin include file . . . . . iop_common_ecc.pl1 */

/* Generic command ranges for iop entities */
```

```
/* command 0 is unused */

/* commands 01 to 1Fx (31) are for commands that are part of the normal
     entity operation */

%replace MIN_CMD_CODE                by   1;
%replace FIRST_NORMAL_CMD            by   1;
/* regular command codes 01 - 1Fx */

%replace BIND_CHAN_ENT         by   1;
%replace UNBIND_CHAN_ENT       by   2;
%replace BIND_SLOT_ENT         by   3;
%replace UNBIND_SLOT_ENT       by   4;
%replace SET_GLOBAL_METER_CMD        by   5;
%replace READ_GLOBAL_METER_CMD       by   6;
%replace READ_SYNC_INFO_CMD    by 7;

%replace LAST_NORMAL_CMD             by   31;

/* commands 20x (32) - 5F (95) are for maintenance operations */
%replace FIRST_MAINT_CMD             by   32;

/* Maintenance commands 20x (32) - 2Fx (47) are for maintenance of entity */

%replace FIRST_ENTITY_MAINT_CMD      by   32;
%replace INIT_ENTITY_CMD             by   32;
%replace STOP_ENTITY_CMD             by   33;
%replace SET_ENTITY_STATUS_CMD       by   34;
%replace READ_ENTITY_STATUS_CMD      by   35;
%replace SET_ENTITY_PARAM_CMD        by   36;
%replace READ_ENTITY_PARAM_CMD       by   37;
     %replace PROTOCOL_VER_PARAM     by    1;
     %replace LIMIT_PARAM            by    2;
%replace IOP_MEX_ID          by '*IOPMEX*';

dcl 1 iop_mbx               based (iop_mbxp),
    2 id                    char (8),
    2 status,                                   /* set by IOP */
      3 ring_syserr         bit(1),
      3 pad                 bit(7),

    2 vector                fixed bin (15),
    2 idle_status           fixed bin (15),
    2 save_time             fixed dec (15),

    2 lock_address          fixed bin (31),     /* Board loop-lock addr */
    2 syserr_msg            char (80) var,

    2 flags,                                    /* Set by VOS for VOS */
      3 vos_seen_syserr          bit (1),
      3 dumping_syserr_ring      bit (1),
      3 pad                      bit(14),

    2 syserr_ringp          ptr,                /* ptr to syserr ring */
    2 syserr_ring_addr      bit (32) aligned,   /* abs addr of syerr ring */
    2 syserr_size           fixed bin (15),     /* number of syserr ring */

    2 input_msg             char (80) var,
    2 output_msg            char (80) var,

    2 iop_head              fixed bin (15),     /* to iop ring head */
    2 iop_tail              fixed bin (15),     /* to iop ring tail */
    2 iop_ringp             ptr,                /* ptr to to iop ring */
    2 iop_ring_addr         bit (32) aligned,   /* abs addr of to iop ring */

    2 iop_ring_size         fixed bin(15),

    2 vos_head              fixed bin (15),     /* iop to vos ring */
    2 vos_tail              fixed bin (15),
    2 vos_ringp             ptr,
    2 vos_ring_addr         bit (32) aligned,
    2 vos_ring_size         fixed bin(15),
    2 global_state          fixed bin (31),     /* state -1 uninit, 0 - normal
                                                    ^= 0/-1 error code (2) */
```

```
     2 pbus_status          like berr_mc.p_status,
     2 terminator_status,
        3 no_fan_fault bit (1),
        3 no_sync_fault bit (1),
        3 no_bulk_fault bit (1),
        3 no_volt_fault bit (1),
        3 other_enema_good bit (1),
        3 power_state bit (3),
        3 pad           bit (7);


dcl 1 iop_syserr_ring (IOP_SYSERR_SIZE) based(syserr_ringp),
      2 free bit(1) aligned,
      2 syserr_code fixed bin (15),
      2 msg char (80) varying;

dcl 1 ring_cmd              based(ring_cmdp),
        2 free                    bit (1),
%replace SET_ENTITY_METER_CMD         by   40;
%replace READ_ENTITY_METER_CMD        by   41;
      %replace CMD_ERROR_MTR          by    1;
      %replace SEND_MTR               by    2;
      %replace SEND_FAILED_MTR        by    3;

/* more entity maintenance commands */

%replace LAST_ENTITY_MAINT_CMD        by   47;

/* Maintenance commands 30x (48) - 3Fx (63) are for maintenance of channels */

%replace FIRST_CHAN_MAINT_CMD         by   48;
%replace INIT_CHAN_CMD                by   48;
%replace STOP_CHAN_CMD                by   49;
%replace SET_CHAN_STATUS_CMD          by   50;
%replace READ_CHAN_STATUS_CMD         by   51;
%replace SET_CHAN_PARAM_CMD           by   52;
%replace READ_CHAN_PARAM_CMD          by   53;
%replace SET_CHAN_METER_CMD           by   54;
%replace READ_CHAN_METER_CMD          by   55;

/* more channel maintenance commands */

%replace LAST_CHAN_MAINT_CMD          by   63;

/* Maintenance commands 40x (64) - 4Fx (79) are for maintenance of slots */

%replace FIRST_SLOT_MAINT_CMD         by   64;
%replace INIT_SLOT_CMD                by   64;
%replace STOP_SLOT_CMD                by   65;
%replace SET_SLOT_STATUS_CMD          by   66;
%replace READ_SLOT_STATUS_CMD         by   67;
%replace SET_SLOT_PARAM_CMD           by   68;
%replace READ_SLOT_PARAM_CMD          by   69;
%replace SET_SLOT_METER_CMD           by   70;
%replace READ_SLOT_METER_CMD          by   71;
%replace LOAD_SLOT_PRGM_CMD           by   72;
%replace START_SLOT_PRGM_CMD          by   73;
%replace BURN_SLOT_PROM_CMD           by   74;
%replace DUMP_SLOT_MEM_CMD            by   75;
%replace TEST_SLOT_CMD                by   76;

/* more slot maintenance commands */

%replace LAST_SLOT_MAINT_CMD          by   79;

/* Maintenance commands 50x (80) - 5Fx (95) are for testing functions */
%replace FIRST_TEST_MAINT_CMD         by   80;
%replace ALWAYS_ERROR_CMD             by   80;
%replace LAST_TEST_MAINT_CMD          by   95;

%replace LAST_MAINT_CMD               by   95;

%replace  MAX_CMD_CODE                by   95;
```

```
/* Command codes in the range 80x (128) - FFx (255) are error codes which
     correspond to command code which is 128 (ERROR_ID) less. ie. 131 is
     error code for function 3 (131 - ERROR_ID) = 3 */
%replace  ERROR_ID                   by   128;
%replace  FIRST_ERROR_CODE           by   128;
%replace  LAST_ERROR_CODE            by   255;

/* Command codes in the range of 100x - 17Fx are unsolicited commands -
     commands sent from iop to host as attention commands */

%replace  FIRST_UNSOLIC_CMD          by   256;
%replace  BROKEN_SLOT_CMD            by   256;
%replace  ADDED_SLOT_CMD             by   257;
%replace  EXCEPTION_SLOT_CMD         by   258;
%replace  EXCEPTION_CHAN_CMD         by   259;
%replace  EXCEPTION_ENTITY_CMD       by   260;
%replace  EXCEPTION_SLOT_ONLY_CMD    by   261;
%replace  HARI_KIRI_CMD              by   262;
%replace  LAST_UNSOLIC_CMD           by   383;

/* values for channel - slot - entity status commands */

     %replace GET_TYPE          by  1;
     %replace GET_STATUS        by  2;
     %replace GET_BIND          by  3;

     %replace SET_RESET         by  4;
     %replace GET_FULL_IOA_ID   by  5;
     %replace GET_PROM_REV      by  6;
     %replace SET_MISC_PARAM1   by  7;

%replace INITIAL_ES_LIMIT       by  8;    /* ring limit for host sends */
%replace MIN_ES_STATUS          by  GET_TYPE;
%replace MAX_ES_STATUS          by  SET_MISC_PARAM1;
%replace MIN_ES_PARAM           by  PROTOCOL_VER_PARAM;
%replace MAX_ES_PARAM           by  LIMIT_PARAM;
%replace MIN_ES_METER           by  1;
%replace MAX_ES_METER           by  MAX_IOP_MTR;

%replace MIN_ES_CHAN_METER      by  1;
%replace MAX_ES_CHAN_METER      by  1;
%replace MIN_ES_CHAN_STATUS     by  GET_STATUS;
%replace MAX_ES_CHAN_STATUS     by  GET_BIND;

%replace MIN_ES_SLOT_METER      by  1;
%replace MAX_ES_SLOT_METER      by  1;
%replace MIN_ES_SLOT_STATUS     by  GET_TYPE;
%replace MAX_ES_SLOT_STATUS     by  GET_FULL_IOA_ID;

/* "testing" commands for ES */

%replace LOOPBACK_CMD          by  81;
%replace LOOPBACK_BOND_CMD     by  82;
%replace LOOPBACK_TIMED_CMD    by  83;
/* End include file . . . . . iop_common_ecc.pl1 */
/* %nolist;  %include 'iop_error_codes';   %list; */
/* %nolist;  %include 'iop_prom_cfg';      % */list;
/*        Initial boot configuration table.
          --------------------------------
     This structure will remain in the iop just above the iop's stack.
*/

/*   sys_conf = sys_conf$   */
dcl  sys_conf               ptr;

dcl  1 sys_mon              based( sys_conf ),
       2 slot               fixed bin(15), /* IOA chassis slot */
       2 flags,
         3 mbz              bit(14),
         3 rd_in_prog       bit(1),        /* START_READ in progress */
         3 cfg              bit(1),        /* Console configured */
       2 com_mbxp           ptr,           /* Pointer to vos comm mailbox */
       2 ioa_mbxp           ptr,           /* Pointer to ioa's mailbox */
       2 f_char             fixed bin(15), /* f_char in data; OLD:Channel state */
```

```
        2 count            fixed bin(15), /* number of characters being output */
        2 ucode_rev        fixed bin(15), /* Prom code revision level */
        2 model            char(4),       /* Board id. */
        2 io_lock          ptr,           /* Board interlock pointer. */
        2 io_blockp        ptr;           /* Pointer to vos-bound io_block */

/*   bdp = bop$; */
/*   bdcbp = boot disk control block pointer   */
dcl  bdcbp                 ptr;
dcl  1 boot_disk           based( bdcbp ),
        2 slot             fixed bin(15),
        2 flags,
          3 mbz            bit(14),
          3 io_in_prog     bit(1),
          3 cfg            bit(1),
        2 disk_mbxp        ptr,
        2 virt_ptr         ptr,
        2 io_lock          fixed bin(31),
        2 state            fixed bin(15),
        2 ucode_rev        fixed bin(15),
        2 model            char(4);

/* IOP ES to PROM interface info. */
dcl  esip                  ptr;      /* Ptr to es interface structure. */

%replace  MIN_INT          by 1;
%replace  MAX_INT          by 16;
%replace  ES_VECX          by 16;

dcl  1 es                  based( esip ),
       2 running           bit(1) aligned,
       2 callback          entry( entry, fixed bin(31), fixed bin(31),
                                  fixed bin(15), fixed bin(31),
                                  fixed bin(15) ) variable,
       2 revoke_call       entry( fixed bin(31), fixed bin(15) ) variable,
       2 reset_list(0:15)     bit(1),
       2 vec(MAX_INT),
         3 number          fixed bin(15),
         3 pending         bit(1) aligned,
       2 next_vec          fixed bin(15),
       2 prom_mbxp         ptr,             /* Pointer to iop_prom_mbx */
       2 dump_listp        ptr,             /* Pointer to iop dump table */
       2 dump_list_ix      fixed bin(15), /* Next dump list entry index */
       2 dump_page_cnt     fixed bin(15), /* Index for multiple dump pages */
       2 last_used         fixed bin(15), /* Last dump list entry used. */
       2 dump_checksum     fixed bin(15), /* Dump list checksum. */
       2 syserr_wrt        entry( fixed bin(31) ),
       2 syserr_rd         entry( fixed bin(31) );
     iop$last_stack_ptr = stackframeptr ();
     esip = iop$esip;
     es.running = '0'b;
     call iop$panic_syserr(iop$edit_string_ii(
     'CRASH: Default error handler invoked for condition ^i. Oncode = ^i.',
          p_cond_no, p_oncode));

     if iop$always_debug_fault
          then call iop_debug$crash('IOP Default error handler invoked.');
          else call iop$report_condition_info;

     iop_mbxp = iop$mailbox_addr;
     if p_oncode ^= 0
          then iop_mbx.global_state = p_oncode;
          else iop_mbx.global_state = e$iop_impossible_error;
     code = 1;
     do while ('1'b);
          if code ^= 0          /* tell host of suicide if possible */
               then call iop$deliver_command(ES_CHANNEL, HARI_KIRI_CMD,
                         p_oncode, 0, 0, 0, code);
          call iop$process_diag_command;     /* let prom do commands here */
          end;

end;
```

```
/*   ***begin copyright*** ******************************   */
/*                                                          */
/*   STRATUS CONFIDENTIAL INFORMATION: CLASS II             */
/*   COPYRIGHT (c) Stratus Computer, Inc. 1986              */
/*                                                          */
/*   This program contains confidential and proprietary     */
/*   information of Stratus Computer, Inc., and any         */
/*   reproduction, disclosure, or use in whole or in part   */
/*   is expressly prohibited, except as may be              */
/*   specifically authorized by prior written agreement or  */
/*   permission of Stratus.                                 */
/*                                                          */
/*   ***end copyright*** ********************************   */

/* Beginning of modification history */
/* Written June 1986 by Joe Croman */
/* Modified 87-06-01 by Joe Croman to recompile to add mailbox support */
/* End of modification history */
iop_disk_dma: procedure;

/* include */
%nolist;
/* %include 'thread_entries.incl.pl1'; */
/* BEGIN thread_entries.incl, TNH, 85-7-1 */

/*       %include 'links_template'; */
/* Begin links_template.incl, 85-10-09, Tim Hill */

/* NOTE: For a list header, nextp is the list head and
         prevp is the list tail! */

     dcl 1 links_template based,
           2 nextp               ptr,
           2 next_linksp         ptr,
           2 prevp               ptr,
           2 prev_linksp         ptr;

/* End links_template.incl */

     dcl s$init_list_header builtin;
     dcl s$init_list_node   builtin;
     dcl s$thread_after     builtin;
     dcl s$thread_at_back   builtin;
     dcl s$thread_at_front  builtin;
     dcl s$thread_before    builtin;
     dcl s$unthread         builtin;

     dcl s$thread_list_after entry (
          /* prev_node.links */ 1 like links_template,
          /* from_header */ 1 like links_template);
     dcl s$thread_list_at_back entry (/* to_header */ 1 like links_template,
          /* from_header */ 1 like links_template);
     dcl s$thread_list_at_front entry (
          /* to_header */ 1 like links_template,
          /* from_header */ 1 like links_template);
     dcl s$thread_list_before entry (
          /* next_node.links */ 1 like links_template,
          /* from_header */ 1 like links_template);
     dcl s$thread_sublist_after entry (
          /* prev_node.links */ 1 like links_template,
          /* first_node.links */ 1 like links_template,
          /* last_node.links */ 1 like links_template);
     dcl s$thread_sublist_at_back entry (
          /* to_header */ 1 like links_template,
          /* first_node.links */ 1 like links_template,
          /* last_node.links */ 1 like links_template);
     dcl s$thread_sublist_at_front entry (
          /* to_header */ 1 like links_template,
          /* first_node.links */ 1 like links_template,
          /* last_node.links */ 1 like links_template);
     dcl s$thread_sublist_before entry (
          /* next_node.links */ 1 like links_template,
          /* first_node.links */ 1 like links_template,
          /* last_node.links */ 1 like links_template);
```

```
/* END thread_entries.incl */
/* %include 'iop_error_codes'; */
/* %include 'syserr_codes'; */
/* Begin include file syserr_codes.incl.pl1 81-9-8 */

/* This include file contains the definitions of the various syserr
   codes to be used when calling syserr. The  codes should be added
   together to form the desired combination. */

declare   syserr_action_ptr ptr;

declare 1 syserr_action based (syserr_action_ptr),
        2 mbz                   bit (10),
        2 signal_kernelerror    bit (1),
        2 security_log          bit (1),
        2 hardware_error        bit (1),
        2 obsolete              bit (1), /* was overseer_log */
        2 dont_display          bit (1),
        2 crash                 bit (1);

%replace  SYSERR_WARN                       by 0;
%replace  SYSERR_CRASH                      by 1;
%replace  SYSERR_DONT_DISPLAY               by 2;
%replace  SYSERR_HARDWARE_ERROR_LOG         by 8;
%replace  SYSERR_SECURITY_LOG               by 16;
%replace  SYSERR_SIGNAL_KERNELERROR         by 32;

/* End include file syserr_codes.incl.pl1 */
%include 'iop_command_calls'; /* entries and defs for command ring usage */
%include 'iop_utility_calls'; /* various iop utility defs and entries */
%include 'iop_tasking_calls'; /* callback entries for timed wait and bgnd */
%include 'iop_mapper_calls';  /* entries for mapping */
%include 'iop_transfer_calls';/* entries for data transfer */
/* %include 'iop_addr_routines.incl.pl1'; */
/* Begin include file ... iop_addr_routines ... */

iop$ioa_addr: procedure (a_ioa_no, a_local_ptr) returns (ptr) inline;

dcl a_ioa_no          fixed bin (15);
dcl a_local_ptr       ptr;

dcl iop$base_vectors (0:13) fixed bin (31) external static;
dcl addrel builtin;
/* DEBUG ...

dcl  iop$debug_crash entry (char(80) var);

      if a_ioa_no < lbound(iop$base_vectors,1) |
         a_ioa_no < hbound(iop$base_vectors,1)
          then call iop$debug_crash('ILLEGAL slot no in call to iop$ioa_addr.');

   ... END DEBUG */

      return (addrel(a_local_ptr, iop$base_vectors(a_ioa_no)));

end iop$ioa_addr;
iop$ioa_abs_addr: procedure (a_local_ptr) returns (ptr) inline;

dcl a_local_ptr       ptr;

/* %include 'iop_constants'; */
/* Begin include file . . . . . iop_constants.incl.pl1 */

%replace IOA_CLOCK_CHANNEL_NO by 2;
%replace TERM_SLOT_1          by 14;
%replace TERM_SLOT_2          by 15;

%replace MAX_IOP_INTERRUPT_LEVEL by 6;
%replace MAX_IOP_BACKGROUND_PRIORITY by 6;

%replace MASK_ALL_INTS by 7;
%replace ALLOW_TIMER_INTERRUPTS by 5;
%replace ALLOW_IOA_INTERRUPTS by 4;
```

```
%replace JIFFIES_PER_SECOND by 65536;

%replace ES_ENTITY by 0;
%replace ES_CHANNEL by 0;
%replace NON_ENTITY by -1;
%replace NONE by -1;

%replace START_ADAPT_MEM by 12582912;   /* 12M or C00000x */

/* End include file . . . . . iop_constants.incl.pl1 */


dcl addrel builtin;

     return (addrel(a_local_ptr, START_ADAPT_MEM));

end iop$ioa_abs_addr;

/* End include file ... iop_addr_routines ... */
%list;
%page;
%include 'iop_constants';     /* various handy data items */
%page;
/* %include 'ioa_disk_constants.incl.pl1'; */
/* Begin include file ... ioa_disk_constants.incl.pl1  86-06-04 */

%replace  MAX_INT                    by   01;
%replace  MAX_STATE_CHANGE           by   100;
%replace  IOA_DISK_ROM_SIZE          by   32768;
%replace  IOA_DISK_RAM_SIZE          by   8192;
%replace  IOA_DISK_ROM_OFFSET        by   32768;

%replace  MIN_PROM_IO_REQ            by   0;   /* Primitive io */
%replace  MIN_IO_REQUEST             by   2;  /* 2:27 */
%replace  MAX_REQUESTS               by   27;  /* 0:27 */

%replace  MAX_SEEK_RETRY             by   5;
%replace  DISK_COMMAND               by   500;
%replace  RANGE_SIZE                 by   150;

/* sequencer commands */
%replace  MIN_IOA_SEQ_CMD           by 16;
%replace  MAX_IOA_SEQ_CMD           by 26;


%replace  IOA_READ_BLINDLY          by 16;
%replace  IOA_VERIFY_LOCALLY        by 17;
%replace  IOA_READ_HEADER           by 18;
%replace  IOA_FORMAT_NORMAL         by 19;
%replace  IOA_READ_NORMAL           by 20;
%replace  IOA_WRITE_NORMAL          by 21;
%replace  IOA_READ_DATA             by 22;
%replace  IOA_WRITE_BIG             by 23;
%replace  IOA_FORMAT_HEADER         by 24;
%replace  IOA_SALAD_PLATE_WRITE     by 25;
%replace  IOA_SALAD_PLATE_READ      by 26;

/* smc control - 8006 */
%replace  OFFSET_PLUS           by '01'b4;
%replace  OFFSET_MINUS          by '02'b4;
%replace  CLEAR_FAULT           by '04'b4;

%replace  RECALIBRATE           by '10'b4;
%replace  DATA_EARLY            by '20'b4;
%replace  DATA_LATE             by '40'b4;

/* Changed by WDC 10/2 */
%replace DRIVE_POWER          by '04'b4; /* MUST STAY ON!!! */

%replace DRIVE_SELECT         by '20'b4;
%replace TAG4                 by '08'b4;
%replace TAG5                 by '10'b4;
%replace PROM_HIGH            by '01'b4;
```

```
%replace ON_CYLINDER          by '02'b4;
%replace DISK_READY           by '01'b4;


/* internal prom error codes */
%replace       SEG_TIMEOUT_ERR          by    -1;
%replace       IOP_INTERRUPT            by    -2;
%replace       SEEK_TIMEOUT_ERR         by    -3;
%replace       RESTORE_FAILURE          by    -4;

/* time constants based on 6.5 msec interval */

%replace       SEG_TIMEOUT              by    20;
%replace       SEEK_TIMEOUT             by    20;
%replace       ONE_SECTOR_TIME          by    3;

/* End include file ... ioa_disk_constants.incl.pl1 */
%page;
/* %include 'iop_disk_constants.incl.pl1'; */
/* Begin include file ... iop_disk_block_request.incl.pl1  86-06-04 */

%replace SECTORS_PER_BLOCK          by  2;
%replace MAX_DISK_CHANNELS          by  14;    /* max assignable chans */
%replace INITIAL_DISK_LIMIT         by  1;     /* initial limit for host sends */
%replace BLOCK_REQUESTS_PER_SLOT    by  32;
%replace MIN_NO_OF_BLOCK_REQUESTS   by  32;
%replace CHANNELS_PER_SLOT          by  0;     /* start at 0 */
%replace SECTOR_SIZE                by  2048;
%replace PAGE_SIZE                  by  4096;
%replace BUFFER_SIZE                by  2304;   /* 9 * 256 */

%replace NULL_STATE                 by  0;
%replace STOPPED_STATE              by  1;
%replace READY_STATE                by  2;

/* channel substates */

%replace LIST_ACTIVE                by  1;

%replace NULL_SLOT                  by -1;
%replace NULL_CHANNEL               by -1;


/* End include file ... iop_disk_block_request.incl.pl1 */
%page;
%include 'iop_equip_table';   /* equip table configuration */
%page;
/* %include 'iop_common_entity_defs'; */
%replace MAX_CMD_CODE               by  127;
%replace MIN_CMD_CODE               by  1;
%replace ERROR_ID                   by  128;
%page;
/* %include 'iop_disk_ecc'; */
%replace MIN_DISK_STATUS          by  1;
%replace MAX_DISK_STATUS          by  1;
%replace MIN_DISK_PARAM           by  1;
%replace MAX_DISK_PARAM           by  1;
%replace MAX_DISK_METER           by  1;

%replace MAX_DISK_CHAN_METER      by  1;
%replace MIN_DISK_CHAN_STATUS     by  1;
%replace MAX_DISK_CHAN_STATUS     by  1;
%replace MIN_DISK_CHAN_PARAM      by  1;
     %replace SIMPLEX_CHANNEL     by  1;
     %replace MULTIPLEX_CHANNEL   by  2;
     %replace MULTIPLEX_MEMBER    by  3;
%replace MAX_DISK_CHAN_PARAM      by  1;

%replace MAX_DISK_SLOT_METER      by  1;
%replace MIN_DISK_SLOT_STATUS     by  1;
%replace MAX_DISK_SLOT_STATUS     by  1;
%replace MIN_DISK_SLOT_PARAM      by  1;
```

```
%replace MAX_DISK_SLOT_PARAM      by  1;

/* normal commands for disk entity */

%replace MIN_IOP_DISK_CMD      by   1;
%replace READ_DISK_PAGE        by   1;
%replace WRITE_DISK_PAGE       by   2;
%replace VERIFY_DISK_PAGE      by   3;
%replace WV_DISK_PAGE          by   4;
%replace UPDATE_MAILBOX        by   5;
%replace MAX_IOP_DISK_CMD      by   5;

%replace UNINITIALIZED_TYPE       by  -1;
%replace SIMPLEX_TYPE             by   0;
%replace MULTIPLEX_TYPE           by   1;
%page;
%include 'iop_config_codes';  /* configuration codes */
%page;
/* %include 'iop_disk_sector_format.incl.pl1'; */
/* Begin include file ... iop_disk_sector_format.incl.pl1 */

%replace MAX_DISK_BUFFERS            by         27;  /* 0:27 */
%replace ADDR_SYNC                   by         'fafa'b4;
%replace DATA_SYNC                   by         'fdfc'b4;

declare (sector_formatp, disk_bufferp)        ptr;

declare disk_buffer (0:MAX_DISK_BUFFERS) char(BUFFER_SIZE)
                                            based (disk_bufferp);

declare 1 sector_format  like disk_sector_format_template
                                            based (sector_formatp);

declare 1 disk_sector_format_template      based,
          2 addr_sync              bit(16),
          2 header,
            3 cylinder             fixed bin(15),
            3 head                 char(1),
            3 sector               char(1),
          2 header_crc             fixed bin(31),
          2 data_sync              bit(16),
          2 dup_header,
            3 cylinder             fixed bin(15),
            3 head                 char(1),
            3 sector               char(1),
          2 sector_data (2048)     char(1),
          2 checksum               fixed bin(15),
          2 data_crc               fixed bin(31);

/* End include file ... iop_disk_sector_format.incl.pl1 */
%page;
/* %include 'ioa_disk_request.incl.pl1'; */
/* Begin include file ... ioa_disk_request.incl.pl1  */


declare   disk_requestp       ptr;
declare 1 disk_request like ioa_disk_request_template based (disk_requestp);

declare   disk_request_arrayp ptr;
declare 1 disk_request_array (0:MAX_REQUESTS) like ioa_disk_request_template
                                            based (disk_request_arrayp);

declare 1 ioa_disk_request_template   based,
          2 command                fixed bin(15),
          2 flags,
            3 dma_required         bit (1),
            3 retry                bit (1),
            3 interrupt            bit (1),
            3 padf                 bit (13),
          2 links                  like links_template,
          2 state                  fixed bin(15),
          2 request_priority       fixed bin(15),
          2 list_priority          fixed bin(15),
          2 retry_count            fixed bin(15),
```

```
          2 vos_id                      fixed bin(31),
          2 disk_addr                   like disk_address_template,
          2 index                       fixed bin(15),
          2 pad0                        bit(8),
          2 status                      bit (32) aligned,
          2 pad1 (8)                    fixed bin(15);

/* ioa_disk_request states */

%replace  FREE                  by   0;
%replace  PENDING               by   1;
%replace  ACTIVE                by   2;
%replace  POST                  by   3;

/* End include file ioa_disk_request.incl.pl1 */
%page;
/* %include 'iop_disk_block_request.incl.pl1'; */
/* Begin include file ... iop_disk_block_request.incl.pl1  86-06-04 */

/* This include file defines the IOP disk queue structures */

%replace MAX_SECTOR_REQUESTS        by 3;     /* 0:3 */

declare block_requestp     ptr;
declare 1 block_request like block_request_template based (block_requestp);

declare block_request_clear bit(size(block_request)) based (block_requestp);

declare 1 block_request_template based,
          2 no                   fixed bin(15),
          2 state                   fixed bin(15),
          2 channel_no              fixed bin(15),
          2 command                 fixed bin(15),
          2 links                   like links_template,
          2 flags,
            3 pad1 (16)             bit (1),
          2 vos_id                  fixed bin (31),
          2 priority                char (1),          /* 1 is highest */
          2 page_no                 fixed bin (15),    /* VOS Page number */
          2 block_no                fixed bin (31),    /* disk block number */
          2 disk_addr               like disk_address_template,
          2 sectors_required        fixed bin (15),
          2 sector_request(0:MAX_SECTOR_REQUESTS) like sector_request_template,
          2 status                  bit(32) aligned;
declare 1 sector_request_template       based,
          2 flags,
            3 complete            bit(1),
            3 error               bit(1),
            3 allocated           bit(1),
            3 pad (13)            bit(1),
          2 page_offset           fixed bin (15),
          2 request_no            fixed bin (15),
          2 buffer_no             fixed bin (15),
          2 status                bit(32) aligned;

/* End include file ... iop_disk_block_request.incl.pl1 */
%page;
/* %include 'iop_disk_slot.incl.pl1'; */
/* Begin include file ... iop_disk_slot.incl.pl1 */


declare disk_slotp              ptr;
declare 1 disk_slot like disk_slot_template       based (disk_slotp);

declare 1 disk_slot_template            based,
          2 slot_no                                    fixed bin(15),
          2 state                                      fixed bin(15),
          2 channel_index(0:CHANNELS_PER_SLOT)         fixed bin(15),
          2 geometry                                 like disk_geometry_template,
          2 data_buffers                                   ptr,
          2 request_arrays                             ptr,
          2 buffer_alloc_maps                          ptr,
          2 pad_bits(6)                                bit (1),
          2 iop_mailboxs                               ptr,
```

```
            2 ioa_disk_statep                                          ptr,
            2 meters,
              3 pad (10)                                               fixed bin(31);

/* End include file ... iop_disk_slot.incl.pl1 */
%page;
/* %include 'iop_disk_channel.incl.pl1'; */
/* Begin include file ... iop_disk_channel.incl.pl1 */

declare disk_channelp              ptr;
declare 1 disk_channel like disk_channel_template based (disk_channelp);

declare 1 disk_channel_template         based,
          2 state                       fixed bin(15),
          2 sub_state                   fixed bin (15), /* of above state */
          2 channel_no                  fixed bin(15),
          2 index                       fixed bin(15), /* in channel table */
          2 slot                        fixed bin(15),
          2 sub_slot                    fixed bin(15), /* drive # on slot */
          2 disk_type                   fixed bin(15),
          2 flags,
            3 pad                       bit (16),
          2 active_list_header          like links_template,
          2 pending_list_header         like links_template,
          2 list_emulation_header       like links_template,
          2 meters,
            3 pad1 (10)                 fixed bin (31);


/* End include file ... iop_disk_channel.incl.pl1 */
%page;
/* %include 'iop_disk_address.incl.pl1'; */
/* Begin include file ... disk_address.incl.pl1  86-06-04 */

/* This include file defines the IOP disk queue structures */

declare disk_addressp     ptr;
declare 1 disk_address like disk_address_template based (disk_addressp);

declare 1 disk_address_template based,
          2 cylinder              fixed bin (15),    /* As above, decomposed */
          2 head                 fixec bin(15),
          2 sector                fixed bin (15);

/* End include file ... disk_address.incl.pl1 */
/* %include 'disk_mailbox_template.incl.pl1'; */
/* Begin include file ... disk_mailbox_template.incl.pl1  87-05-30 */


declare    1 disk_mailbox_template  based,    /* for disks in a drawer */
             2 align_flag       bit(0) aligned,/* use by hardware so must be */
             2 fan_error        bit(1),/* aligned  !!!!!! */
             2 drawer_present   bit(1),
             2 drive_select_error bit(1),
             2 unused(13) bit(1);


/* End include file ... disk_mailbox_template.incl.pl1 */
%page;
/* %include 'iop_disk_geometry.incl.pl1'; */
/* Begin include file ... disk_geometry.incl.pl1 */

declare disk_geometryp             ptr;
declare 1 disk_geometry like disk_geometry_template based (disk_geometryp);

declare 1 disk_geometry_template         based,
          2 blocks_per_disk             fixed bin (31),
          2 sectors_per_block           fixed bin (15),
          2 sectors_per_cylinder        fixed bin (15),
          2 sectors_per_track           fixed bin (15),
          2 sec_up_time_out             fixed bin (15);

/* End include file ... disk_geometry.incl.pl1 */
%page;
```

```
/* %include 'ioa_disk_ram.incl.pl1'; */
/* Begin include file ... ioa_disk_ram.incl.pl1  86-05-27 */

/* this include file is a memory map for the disk IOA */


declare ioa_disk_ramp              ptr;

declare 1 ioa_disk_ram based (ioa_disk_ramp),
          2 interrupt_vectors (256)      ptr,
          2 prom_id                      fixed bin(31),
          2 prom_version                 fixed bin(15),
          2 microcode_version            fixed bin(15),
          2 mailbox_ptr                  ptr,
          2 request_area_ptr             ptr,
          2 free_list_header             like links_template,
          2 pending_list_header          like links_template,
          2 active_list_header           like links_template,
          2 buffer_alloc_map             bit (32) aligned,
          2 disk_state_mailbox           like disk_mailbox_template,
          2 pad (61)                     fixed bin(15),
          2 request_array (0:MAX_REQUESTS)
                                         like ioa_disk_request_template;

%page;
declare hex entry (fixed bin(31), fixed bin(15)) returns (char(8) varying);
declare report_error entry (fixed bin(15), char(80) var, fixed bin(15));

/* parameters */
declare 1 p_block_request                like block_request_template;
declare   p_sector_index                 fixed bin (15);
declare   p_slot                         fixed bin (15);
declare   p_code                         fixed bin (15);
%page;
/* static */

declare start_of_disk_rams               ptr  external static;
declare start_of_disk_buffers            ptr  external static;

/* automatics */

declare   host_addr                      bit (32) aligned defined host_ptr;
declare   host_ptr                       ptr;
declare   ioa_addr                       bit (32) aligned;
declare   code                           fixed bin (15);
declare   check_sum                      fixed bin (15);

declare   bit32_1                        bit(32) aligned defined fb31_1;
declare   fb31_1                         fixed bin(31);
declare   bit32_2                        bit(32) aligned defined fb31_2;
declare   fb31_2                         fixed bin(31);

dma_sector_to_host: entry (p_block_request, p_sector_index, p_slot, p_code);

     disk_bufferp = start_of_disk_buffers;

     sector_formatp =
   ioc$ioa_abs_addr(addr(disk_buffer(p_block_request.sector_request(p_sector_index)
uffer_no)));

     host_addr = host_address(p_block_request.page_no,
                 p_block_request.sector_request (p_sector_index).page_offset);
     ioa_addr = ioa_sector_address
                 (p_block_request.sector_request(p_sector_index).buffer_no);

     bit32_1 = host_addr;
     bit32_2 = ioa_addr;

     call ioc$ioa_to_hcs (host_addr, ioa_addr, p_slot, SECTOR_SIZE,
                              check_sum, code);

     if code = 0
     then do;
```

```
          if sector_format.checksum ^= check_sum
          then do;
               p_code = e$iop_checksum_error;
               end;
          end;

     call report_error(1,'from disk: '|| hex((sector_format.checksum),4) || '   '
                    || 'iop:  '|| hex((check_sum),4)|| '  '||
          hex((p_block_request.sector_request(p_sector_index).buffer_no),4)
            , SYSERR_WARN);


      return;

%page;
cma_sector_from_host: entry (p_block_request, p_sector_index, p_slot, p_code);

      disk_bufferp = start_of_disk_buffers;

      sector_formatp =
    iop$ioa_abs_addr(addr(disk_buffer(p_block_request.sector_request(p_sector_index).
buffer_no)));

      host_addr = host_address(p_block_request.page_no,
                  p_block_request.sector_request (p_sector_index).page_offset);
      ioa_addr = ioa_sector_address
                  (p_block_request.sector_request(p_sector_index).buffer_no);

      bit32_1 = host_addr;
      bit32_2 = ioa_addr;

      call iop$hos_to_ioa (host_addr, ioa_addr, p_slot, SECTOR_SIZE,
                                 check_sum, code);

      /* write checksum to sector buffer */

      if code = 0
      then do;
           sector_format.checksum = check_sum;
           end;

      call report_error(1,'to disk: '|| hex((sector_format.checksum),4) || '   '
                  || 'iop:  '|| hex((check_sum),4)|| '  '||
         hex((p_block_request.sector_request(p_sector_index).buffer_no),4) ,
            SYSERR_WARN);

      p_code = code;

      return;
%page;
cma_sector_verify: entry (p_block_request, p_sector_index, p_slot, p_code);

      disk_bufferp = start_of_disk_buffers;

      sector_formatp =
    iop$ioa_abs_addr(addr(disk_buffer(p_block_request.sector_request(p_sector_index).
buffer_no)));

      host_addr = host_address(p_block_request.page_no,
                  p_block_request.sector_request (p_sector_index).page_offset);
      ioa_addr = ioa_sector_address
                  (p_block_request.sector_request(p_sector_index).buffer_no);
      bit32_1 = host_addr;
      bit32_2 = ioa_addr;

      if iop$verify_addr (host_ptr, ioa_addr, p_slot, SECTOR_SIZE,
                                     check_sum, code)
      then do;
           if sector_format.checksum ^= check_sum
           then do;
                code = e$iop_checksum_error;
                end;
           end;
```

```
   call report_error(1,'both disk: '|| hex((sector_format.checksum),4) || '  '
                || 'iop:  '|| hex((check_sum),4) || '  '||
        hex((p_block_request.sector_request(p_sector_index).buffer_no),4),
        SYSERR_WARN);

    /* compare checksum to sector buffer ? */

    p_code = code;

    return;
%page;
host_address: procedure (p_page_no, p_page_offset) returns (bit (32) aligned);

declare   p_page_no                        fixed bin(15);
declare   p_page_offset                    fixed bin(15);

declare   page_addr_fb                     fixed bin(31) defined page_addr_ptr;
declare   page_addr_ptr                    bit (32) aligned;


    page_addr_fb = (p_page_no * PAGE_SIZE) + p_page_offset;

    return (page_addr_ptr);
end host_address;
%page;
ioa_sector_address: procedure (p_buffer_no) returns (bit (32) aligned);

declare   p_buffer_no               fixed bin(15);

declare   sector_ptr                ptr defined sector_bit32;
declare   sector_bit32              bit (32) aligned;

    sector_ptr = addr(sector_format.sector_data);

    return (sector_bit32);
end ioa_sector_address;
end ioc_disk_dma;
/*   ***begin copyright*** *****************************   */
/*                                                        */
/*   STRATUS CONFIDENTIAL INFORMATION: CLASS II           */
/*   COPYRIGHT (c) Stratus Computer, Inc. 1986            */
/*                                                        */
/*   This  program  contains  confidential and proprietary */
/*   information  of  Stratus Computer,  Inc.,  and  any  */
/*   reproduction,  disclosure, or use in whole or in part */
/*   is   expressly   prohibited,   except   as   may   be */
/*   specifically authorized by prior written agreement or */
/*   permission of Stratus.                               */
/*                                                        */
/*   ***end copyright*** *******************************   */

/* Beginning of modification history */
/* Written April 1986 by Tom Moser */
/* Modified 86-06-05 by Tom Moser to support page disk commands */
/* Modified 86-06-10 by Joe Croman to be consistent with personal preference */
/* Modified 86-06-16 by Tom Moser to configure ICA and chan - make ready for
     commands */
/* Modified 87-04-06 by Joe Croman to implement ADD_GEOMETRY cmd */
/* Modified 87-06-01 by Joe Croman to add disk mailbox support;to fix
     request allocation problem;cleaned up error messages;changed to
     always allow slot to be added;move buffer allocation map into
     adapter for prim IO performance; iop-120 */
/* End of modification history */


ioc_disk_entity: procedure recursive;

/* replace */

%replace TRUE  by '1'b;
%replace FALSE by '0'b;
%replace NOT_VERIFY by '0'b;
%replace VERIFY by '1'b;
```

```
%page;
/* include */
/*%nolist;*/
/* %include 'thread_entries.incl.pl1'; */
/* BEGIN thread_entries.incl, TNH, 85-7-1 */

/*      %include 'links_template'; */
/* Begin links_template.incl, 85-10-09, Tim Hill */

/* NOTE: For a list header, nextp is the list head and
        prevp is the list tail! */

     dcl 1 links_template based,
          2 nextp                    ptr,
          2 next_linksp              ptr,
          2 prevp                    ptr,
          2 prev_linksp              ptr;

/* End links_template.incl */

     dcl s$init_list_header builtin;
     dcl s$init_list_node   builtin;
     dcl s$thread_after     builtin;
     dcl s$thread_at_back   builtin;
     dcl s$thread_at_front  builtin;
     dcl s$thread_before    builtin;
     dcl s$unthread         builtin;

     dcl s$thread_list_after entry (
          /* prev_node.links */ 1 like links_template,
          /* from_header */ 1 like links_template);
     dcl s$thread_list_at_back entry (/* to_header */ 1 like links_template,
          /* from_header */ 1 like links_template);
     dcl s$thread_list_at_front entry (
          /* to_header */ 1 like links_template,
          /* from_header */ 1 like links_template);
     dcl s$thread_list_before entry (
          /* next_node.links */ 1 like links_template,
          /* from_header */ 1 like links_template);
     dcl s$thread_sublist_after entry (
          /* prev_node.links */ 1 like links_template,
          /* first_node.links */ 1 like links_template,
          /* last_node.links */ 1 like links_template);
     dcl s$thread_sublist_at_back entry (
          /* to_header */ 1 like links_template,
          /* first_node.links */ 1 like links_template,
          /* last_node.links */ 1 like links_template);
     dcl s$thread_sublist_at_front entry (
          /* to_header */ 1 like links_template,
          /* first_node.links */ 1 like links_template,
          /* last_node.links */ 1 like links_template);
     dcl s$thread_sublist_before entry (
          /* next_node.links */ 1 like links_template,
          /* first_node.links */ 1 like links_template,
          /* last_node.links */ 1 like links_template);

/* END thread_entries.incl */
/* %include 'iop_error_codes'; */
/* %include 'syserr_codes'; */
/* Begin include file syserr_codes.incl.pl1 81-9-8 */

/* This include file contains the definitions of the various syserr
   codes to be used when calling syserr. The  codes should be added
   together to form the desired combination. */

declare    syserr_action_ptr ptr;

declare 1 syserr_action based (syserr_action_ptr),
        2 mbz                    bit (10),
        2 signal_kernelerror     bit (1),
        2 security_log           bit (1),
        2 hardware_error         bit (1),
        2 obsolete               bit (1), /* was overseer_log */
```

```
        2 dont_display          bit (1),
        2 crash                 bit (1);

%replace  SYSERR_WARN                         by 0;
%replace  SYSERR_CRASH                        by 1;
%replace  SYSERR_DONT_DISPLAY                 by 2;
%replace  SYSERR_HARDWARE_ERROR_LOG           by 8;
%replace  SYSERR_SECURITY_LOG                 by 16;
%replace  SYSERR_SIGNAL_KERNELERROR           by 32;
/* End include file syserr_codes.incl.pl1 */
/* %include 'ioa_commands.incl.pl1'; */
/*  ***begin copyright*** ******************************  */
/*                                                        */
/*  STRATUS CONFIDENTIAL INFORMATION: CLASS II            */
/*  COPYRIGHT (c) Stratus Computer, Inc. 1986             */
/*                                                        */
/*  This program contains confidential and proprietary    */
/*  information of Stratus Computer, Inc., and any        */
/*  reproduction, disclosure, or use in whole or in part  */
/*  is expressly prohibited, except as may be             */
/*  specifically authorized by prior written agreement or */
/*  permission of Stratus.                                */
/*                                                        */
/*  ***end copyright*** ********************************  */
/*  Begin include file ioa_commands.incl.pl1  */

%replace  MIN_IOA_CMD_NO        by    0;

%replace  CMD_RESET             by    0;
%replace  CMD_CLEAR_INT         by    1;
%replace  CMD_TOGGLE_OBEY_P     by    2;
%replace  CMD_TOGGLE_OBEY_Q     by    3;
%replace  CMD_CLEAR_BROKEN      by    4;
%replace  CMD_SET_BROKEN        by    5;
%replace  CMD_INT_DEVICE        by    6;
%replace  CMD_CLEAR_CPU_RESET   by    7;

%replace  MAX_IOA_CMD_NO        by    7;

/*  End include file ioa_commands.incl.pl1  */
%include 'iop_command_calls'; /* entries and defs for command ring usage */
%include 'iop_utility_calls'; /* various iop utility defs and entries */
%include 'iop_tasking_calls'; /* callback entries for timed wait and bgnd */
%include 'iop_mapper_calls';  /* entries for mapping */
%include 'iop_transfer_calls';/* entries for data transfer */
/* %include 'ioa_mailbox.incl.pl1'; */
/*                         ioa_mailbox.incl.pl1
                           --------------------

      This include file contains the mailbox used to communicate
      between an IOA and the IOP.  Several overlaid definitions
      exist, which are used under different circumstances, such
      as dumping or IOA program debugging.

*/

/* Define typical IOA mailbox pointer.                                  */
dcl  ioa_mbxp              ptr; /* ioa_mbxp = contents of 200404x in ioa */

/* Original mbx template */
dcl  1 ioa_mbx    like ioa_mbx_template  based( ioa_mbxp );

dcl  1 ioa_mbx_template  based,
       2 command           fixed bin(15),
       2 buffer_addr       fixed bin(31),
       2 status            bit(32) aligned,
       2 f,
         3 ownership       bit(1),    /* = '0' = iop;  = '1' = ioa */
         3 mbz             bit(7),
         3 io_tag          char(1),
       2 msg_in            char(80) var,
       2 msg_out           char(80) var,
       2 more_info         bit(1) aligned,
       2 xtra_ptr          fixed bin(31);
```

```
/* Dump mailbox template */
dcl  1 ioa_mbx_dump   like ioa_mbx_dump_tpl based( ioa_mbxp );

dcl  1 ioa_mbx_dump_tpl  based,
       2 outbox_offset    char(92) var,       /* Not used for dumping             */
       2 mbz              fixed bin(15),      /* Must be zero for dump            */
       2 page_num         fixed bin(15),      /* Current adapter dump page        */
       2 data_type        fixed bin(15),      /* Dump data type                   */
       2 absolute_addr    fixed bin(31),      /* Real IOA addr of dump data       */
       2 buf_byte_cnt     fixed bin(15),      /* Num bytes xfer'd this time       */
       2 page_seq_num     fixed bin(15),      /* Adapter's seq # for page         */
       2 remaining_cnt    fixed bin(15);      /* Num bytes still to be xfer'd     */
/*     2 unused_str_o     char(70) var;       /* Not used for dumping             */

/* Command info mailbox template */
dcl  1 ioa_mbx_cmdinfo   like ioa_mbx_c_i_tpl based( ioa_mbxp );

dcl' 1 ioa_mbx_c_i_tpl   based,
       2 outbox_offset    char(92) var,       /* Not used for command info        */
       2 sw_rev           fixed bin(15);      /* Board's software revision        */
/*     2 unused_str_o     char(84) var;       /* Not used for dumping             */

%replace IOA_MAILBOX_PTR_ADDR by   2096180;
%replace IOP_OWNER by '0'b;
%replace IOA_OWNER by '1'b;

/*    Brief description of protocol for diagnostic usage.
      ---------------------------------------------------

      The  mailbox begins life with the IOP having ownership ( ownership =
      '0' ) and when the IOP has placed all the pertinent  information  in
      the box it will change ownership over to the IOA.  The IOP will then
      set the int_to_device bit in the IOA's Gate Array, which the adapter
      should  be  polling in order to know when a command has arrived.  It
      is not advised for the adapters to have their interrupts enabled  at
      this  point  in  time,  and  this  is  the  reason  for  polling the
      int_to_device bit.

      The  ownership  bit works in conjunction with the int_to_device bit.
      This should cover  the  case  where  an  adapter  detects  a  faulty
      int_to_device  bit.  Therefore  the  adapter  should  only process a
      command if the int_to_device bit and the ownership bit are both set.

      Structure definitions.
      ----------------------
      ioa_mbx.command ( input/output )
            - This is the command for the IOA to execute. On output it
              indicates the command executed by the IOA.

      ioa_mbx.buffer_addr ( input/output )
            - Universal buffer longword address. The address of the
              primary buffer for an operation is placed here.
      ioa_mbx.status ( output )
            - This will be filled in by the adapter indicating the
              status of the board, commands, etc...

      ioa_mbx.ownership ( input/output )
            - This bit defines who the current owner of the mailbox is.  If
              this bit = '0'b then the IOP currently owns the mailbox, otherwise
              the adapter has ownership.

      ioa_mbx.f.ic_tag ( mailbox owner )
            - Ic tag used by IOP-side processes only (not used by IOA)
              to encode owner of current mailbox op in order to prevent
              one IOP process from using another process's returned mbx.

      ioa_mbx.msg_in ( input )
            - This is defined as a char(80) varying buffer.  It will be command
              dependent and can therefore have different meanings with overlays
              describing it.  However, the first two bytes will always specify
              the number of bytes in the buffer.  Whether the commands choose to
              use them is up to the individual command.

      ioa_mbx.msg_out ( output )
```

```
          - This buffer is for the ioa to send data to the iop.  Again, the
            same applies to this buffer as to the .msg_in described above.

    ioa_mbx.more_info ( input/output )
          - On output this signifies that there is more information than
            will fit into the msg_out buffer. Input meaning is command
            dependent.

    ioa_mbx.xtra_ptr ( input/output )
          - The meaning of this pointer is command dependent, though
            generally it is used as a pointer to extra data that would
            not fit in the primary buffer, or as the secondary pointer
            for a command.

*/
/* %include 'iop_addr_routines.incl.pl1'; */
/* Begin include file ... iop_addr_routines ... */

iop$ioa_addr: procedure (a_ioa_no, a_local_ptr) returns (ptr) inline;

dcl a_ioa_no          fixed bin (15);
dcl a_local_ptr       ptr;

dcl iop$base_vectors (0:13) fixed bin (31) external static;
dcl addrel builtin;


/* DEBUG ...

dcl  iop$debug_crash entry (char(80) var);

      if a_ioa_no < lbound(iop$base_vectors,1) |
         a_ioa_no < hbound(iop$base_vectors,1)
          then call iop$debug_crash('ILLEGAL slot no in call to iop$ioa_addr.');

   ... END DEBUG */

      return (addrel(a_local_ptr, iop$base_vectors(a_ioa_no)));
end iop$ioa_addr;
iop$ioa_abs_addr: procedure (a_local_ptr) returns (ptr) inline;

dcl a_local_ptr       ptr;

/* %include 'iop_constants': */
/* Begin include file . . . . . iop_constants.incl.pl1 */

%replace IOA_CLOCK_CHANNEL_NO by 2;
%replace TERM_SLOT_1          by 14;
%replace TERM_SLOT_2          by 15;

%replace MAX_IOP_INTERRUPT_LEVEL by 8;
%replace MAX_IOP_BACKGROUND_PRIORITY by 9;

%replace MASK_ALL_INTS by 7;
%replace ALLOW_TIMER_INTERRUPTS by 5;
%replace ALLOW_IOA_INTERRUPTS by 4;

%replace JIFFIES_PER_SECOND by 65536;

%replace ES_ENTITY by 0;
%replace ES_CHANNEL by 0;
%replace NON_ENTITY by -1;
%replace NONE by -1;

%replace START_ADAPT_MEM by 12582912;   /* 12M or C00000x */

/* End include file . . . . . iop_constants.incl.pl1 */


dcl addrel builtin;

      return (addrel(a_local_ptr, START_ADAPT_MEM));

end iop$ioa_abs_addr;
```

```
/* End include file ... iop_addr_routines ... */
/* %include 'disk_cmds.incl.pl1'; */
/* Begin include file ... disk_cmds.in  80-08-10 */

/* Controller commands */

%replace START_DRIVE_CMD        by  128;  /* 80x */
%replace KILL_CUR_LIST_CMD      by  144;  /* 90x */
%replace RESTART_DRIVE_CMD      by    0;  /* Restart same list addr */
%replace BOOT_FROM_DRIVE_CMD    by    1;
%replace RUN_SELF_TEST_CMD      by    2;
%replace ADD_MAILBOX            by  160;  /* a0x for D114's */
%replace DELETE_MAILBOX         by  161;  /* a1x for D114's */

/* List commands */

/* ***** WARNING:  You MUST change init_disk_data if you add new commands
                   to this list.                                  ************* */

%replace READ_DEFECT            by  32;   /* Data Xfer */
%replace VERIFY_CMD             by  33;
%replace READ_HDR_CMD           by  34;
%replace FORMAT_CMD             by  35;

%replace READ_CMD               by  36;
%replace WRITE_CMD              by  37;
%replace READ_BIG_CMD           by  38;
%replace WRITE_BIG_CMD          by  39;


%replace WRITE_VERIFY_CMD       by  50;    /* IOP write verify */
%replace ADD_GEOMETRY_CMD       by  51;    /* IOP add disk geometry */

%replace SEEK_CMD               by 132;   /* Seek */

/* Control commands set "ready" bit in summary status byte */

%replace JUMP_CMD               by  64;   /* Control */
%replace SET_INT_NO_CMD         by  65;
%replace HALT_CMD               by  66;
%replace WAIT_CMD               by  67;
%replace RESET_DRIVE_CMD        by  68;
%replace RESET_INT_NO_CMD       by  69;
%replace FIND_PRESENT_DRIVE     by  70;   /* also sets "drive_exists" */
%replace DIAG_SEEK_1_CMD        by  71;

%replace SOFT_RESET_CMD         by 128;
%replace SEG_UP_CMD             by 129;   /* Control */
%replace SEG_DOWN_CMD           by 130;
%replace RESTORE_CMD            by 131;
%replace RESET_FAULT_CMD        by 133;
%replace GET_CYL_CMD            by 134;
%replace DIAG_SEEK_2_CMD        by 135;

                                          /* Following only on D107/D106 */
%replace SET_RED_LIGHT_CMD      by 16;
%replace CLR_RED_LIGHT_CMD      by 17;
%replate SET_BLB_CMD            by 18;    /* Buffer Loop Back */
%replace GET_EXT_STATUS_CMD     by 19;
%replace RESET_BLB_CMD          by 20;    /* Buffer Loop Back */
%replace SET_PWHM_CMD           by 21;    /* Post-write Header Match */
%replace RESET_PWHM_CMD         by 22;
%replace RELOAD_ADAPTER_CMD     by 23;
%replace READ_ADAPTER_PROM_CMD    by 43;  /* read ic prom in disk director */

/* End include file ... disk_cmds.in */
/* %include 'disk_mailbox_template.incl.pl1'; */
/* Begin include file ... disk_mailbox_template.incl.pl1  87-05-30 */


declare    1 disk_mailbox_template  based,     /* for disks in a drawer */
             2 align_flag         bit(3) aligned,/* use by hardware so must be */
             2 tag_error          bit(1),/* aligned  !!!!!! */
```

```
        2 drawer_present  bit(1),
        2 drive_select_error bit(1),
        2 unused(13) bit(1);

/* End include file ... disk_mailbox_template.incl.pl1 */
%list;
%page;
%include 'ioc_constants';      /* various handy data items */
%page;
/* %include 'ioa_disk_constants.incl.pl1'; */
/* Begin include file ... ioa_disk_constants.incl.pl1  86-06-04 */

%replace  MAX_INT                   by   01;
%replace  MAX_STATE_CHANGE          by   100;

%replace  IOA_DISK_ROM_SIZE         by   32768;
%replace  IOA_DISK_RAM_SIZE         by   8192;
%replace  IOA_DISK_ROM_OFFSET       by   32768;

%replace  MIN_PROM_IO_REQ           by   0;   /* Primitive io */
%replace  MIN_IO_REQUEST            by   2;  /* 2:27 */
%replace  MAX_REQUESTS              by   27;  /* 0:27 */

%replace  MAX_SEEK_RETRY            by   5;
%replace  DISK_COMMAND              by   500;
%replace  RANGE_SIZE                by   150;

/* sequencer commands */
%replace  MIN_IOA_SEQ_CMD          by 16;
%replace  MAX_IOA_SEQ_CMD          by 26;


%replace  IOA_READ_BLINDLY         by 16;
%replace  IOA_VERIFY_LOCALLY       by 17;
%replace  IOA_READ_HEADER          by 18;
%replace  IOA_FORMAT_NORMAL        by 19;
%replace  IOA_READ_NORMAL          by 20;
%replace  IOA_WRITE_NORMAL         by 21;
%replace  IOA_READ_DATA            by 22;
%replace  IOA_WRITE_BIG            by 23;
%replace  IOA_FORMAT_HEADER        by 24;
%replace  IOA_SALAD_PLATE_WRITE    by 25;
%replace  IOA_SALAD_PLATE_READ     by 26;

/* smd control - 8006 */
%replace  OFFSET_PLUS          by '01'b4;
%replace  OFFSET_MINUS         by '02'b4;
%replace  CLEAR_FAULT          by '04'b4;

%replace  RECALIBRATE          by '10'b4;
%replace  DATA_EARLY           by '20'b4;
%replace  DATA_LATE            by '40'b4;

/* Changed by WDG 10/2 */
%replace DRIVE_POWER          by '04'b4; /* MUST STAY ON!!! */

%replace DRIVE_SELECT         by '20'b4;
%replace TAG4                 by '08'b4;
%replace TAG5                 by '10'b4;
%replace PROM_HIGH            by '01'b4;

%replace ON_CYLINDER          by '02'b4;
%replace DISK_READY           by '01'b4;


/* internal prom error codes */
%replace        SEQ_TIMEOUT_ERR           by    -1;
%replace        IOP_INTERRUPT             by    -2;
%replace        SEEK_TIMEOUT_ERR          by    -3;
%replace        RESTORE_FAILURE           by    -4;

/* time constants based on 6.5 msec interval */
```

```
%replace        SEG_TIMEOUT                 by   20;
%replace        SEEK_TIMEOUT                by   20;
%replace        ONE_SECTOR_TIME             by   3;

/* End include file ... ioa_disk_constants.incl.pl1 */
%page;
/* %include 'iop_disk_constants.incl.pl1'; */
/* Begin include file ... iop_disk_block_request.incl.pl1  86-06-04 */

%replace SECTORS_PER_BLOCK          by  2;
%replace MAX_DISK_CHANNELS          by  14;    /* max assignable chans */
%replace INITIAL_DISK_LIMIT         by  1;     /* initial limit for host sends */
%replace BLOCK_REQUESTS_PER_SLOT    by  32;
%replace MIN_NO_OF_BLOCK_REQUESTS   by  32;
%replace CHANNELS_PER_SLOT          by  0;     /* start at 0 */
%replace SECTOR_SIZE                by  2048;
%replace PAGE_SIZE                  by  4096;
%replace BUFFER_SIZE                by  2304;   /* 9 * 256 */

%replace NULL_STATE                 by  0;
%replace STOPPED_STATE              by  1;
%replace READY_STATE                by  2;

/* channel substates */

%replace LIST_ACTIVE                by  1;

%replace NULL_SLOT                  by -1;
%replace NULL_CHANNEL               by -1;



/* End include file ... iop_disk_block_request.incl.pl1 */
%page;
%include 'iop_equip_table';   /* equip table configuration */
%page;
/* %include 'iop_common_entity_defs'; */
%replace MAX_CMD_CODE               by  127;
%replace MIN_CMD_CODE               by  1;
%replace ERROR_ID                   by  128;
%page;
/* %include 'iop_disk_ecc'; */
%replace MIN_DISK_STATUS          by  1;
%replace MAX_DISK_STATUS          by  1;
%replace MIN_DISK_PARAM           by  1;
%replace MAX_DISK_PARAM           by  1;
%replace MAX_DISK_METER           by  1;

%replace MAX_DISK_CHAN_METER      by  1;
%replace MIN_DISK_CHAN_STATUS     by  1;
%replace MAX_DISK_CHAN_STATUS     by  1;
%replace MIN_DISK_CHAN_PARAM      by  1;
     %replace SIMPLEX_CHANNEL     by  1;
     %replace MULTIPLEX_CHANNEL   by  2;
     %replace MULTIPLEX_MEMBER    by  3;

%replace MAX_DISK_CHAN_PARAM      by  1;

%replace MAX_DISK_SLOT_METER      by  1;
%replace MIN_DISK_SLOT_STATUS     by  1;
%replace MAX_DISK_SLOT_STATUS     by  1;
%replace MIN_DISK_SLOT_PARAM      by  1;
%replace MAX_DISK_SLOT_PARAM      by  1;

/* normal commands for disk entity */

%replace MIN_IOP_DISK_CMD       by   1;
%replace READ_DISK_PAGE         by   1;
%replace WRITE_DISK_PAGE        by   2;
%replace VERIFY_DISK_PAGE       by   3;
%replace WV_DISK_PAGE           by   4;
%replace UPDATE_MAILBOX         by   5;
%replace MAX_IOP_DISK_CMD       by   5;
```

```
%replace UNINITIALIZED_TYPE        by  -1;
%replace SIMPLEX_TYPE              by   0;
%replace MULTIPLEX_TYPE            by   1;
%page;
%include 'iop_config_codes';  /* configuration codes */
%page;
/* %include 'iop_disk_sector_format.incl.pl1'; */
/* Begin include file ... iop_disk_sector_format.incl.pl1 */

%replace MAX_DISK_BUFFERS          by        27;  /* 0:27 */
%replace ADDR_SYNC                 by        'fafa'b4;
%replace DATA_SYNC                 by        'fcfd'b4;

declare (sector_formatp, disk_bufferp)         ptr;

declare disk_buffer (0:MAX_DISK_BUFFERS) char(BUFFER_SIZE)
                                              based (disk_bufferp);

declare 1 sector_format  like disk_sector_format_template
                                              based (sector_formatp);

declare 1 disk_sector_format_template     based,
          2 addr_sync                bit(16),
          2 header,
            3 cylinder               fixed bin(15),
            3 head                   char(1),
            3 sector                 char(1),
          2 header_crc               fixed bin(31),
          2 data_sync                bit(16),
          2 dup_header,
            3 cylinder               fixed bin(15),
            3 head                   char(1),
            3 sector                 char(1),
          2 sector_data (2048)       char(1),
          2 checksum                 fixed bin(15),
          2 data_crc                 fixed bin(31);

/* End include file ... iop_disk_sector_format.incl.pl1 */
%page;
/* %include 'ioa_disk_request.incl.pl1'; */
/* Begin include file ... ioa_disk_request.incl.pl1  */

declare   disk_requestp        ptr;
declare 1 disk_request like ioa_disk_request_template based (disk_requestp);

declare   disk_request_arrayp ptr;
declare 1 disk_request_array (0:MAX_REQUESTS) like ioa_disk_request_template
                                              based (disk_request_arrayp);

declare 1 ioa_disk_request_template   based,
          2 command                  fixed bin(15),
          2 flags,
            3 dma_required           bit (1),
            3 retry                  bit (1),
            3 interrupt              bit (1),
            3 padf                   bit (13),
          2 links                    like links_template,
          2 state                    fixed bin(15),
          2 request_priority         fixed bin(15),
          2 list_priority            fixed bin(15),
          2 retry_count              fixed bin(15),
          2 vcs_id                   fixed bin(31),
          2 disk_addr                like disk_address_template,
          2 index                    fixed bin(15),
          2 pad0                     bit(8),
          2 status                   bit (32) aligned,
          2 pad1 (8)                 fixed bin(15);

/* ioa_disk_request states */

%replace  FREE               by   0;
%replace  PENDING            by   1;
%replace  ACTIVE             by   2;
%replace  POST               by   3;
```

```
/* End include file ioa_disk_request.incl.pl1 */
%page;
/* %include 'iop_disk_block_request.incl.pl1'; */
/* Begin include file ... iop_disk_block_request.incl.pl1  86-06-04 */

/* This include file defines the IOP disk queue structures */

%replace MAX_SECTOR_REQUESTS        by 3;     /* 0:3 */

declare block_requestp    ptr;
declare 1 block_request like block_request_template based (block_requestp);

declare block_request_clear bit(size(block_request)) based (block_requestp);

declare 1 block_request_template based,
          2 no                  fixed bin(15),
          2 state                  fixed bin(15),
          2 channel_no             fixed bin(15),
          2 command                fixed bin(15),
          2 links                  like links_template,
          2 flags,
            3 pad1 (16)            bit (1),
          2 vos_id                 fixed bin (31),
          2 priority               char (1),         /* 1 is highest */
          2 page_no                fixed bin (15),    /* VOS Page number */
          2 block_no               fixed bin (31),     /* disk block number */
          2 disk_addr              like disk_address_template,
          2 sectors_required       fixed bin (15),
          2 sector_request(0:MAX_SECTOR_REQUESTS) like sector_request_template,
          2 status                 bit(32) aligned;


declare 1 sector_request_template      based,
          2 flags,
            3 complete            bit(1),
            3 error               bit(1),
            3 allocated           bit(1),
            3 pad (13)            bit(1),
          2 page_offset           fixed bin (15),
          2 request_no            fixed bin (15),
          2 buffer_no             fixed bin (15),
          2 status                bit(32) aligned;

/* End include file ... iop_disk_block_request.incl.pl1 */
%page;
/* %include 'iop_disk_slot.incl.pl1'; */
/* Begin include file ... iop_disk_slot.incl.pl1 */


declare disk_slotp              ptr;
declare 1 disk_slot like disk_slot_template       based (disk_slotp);

declare 1 disk_slot_template             based,
          2 slot_no                                    fixed bin(15),
          2 state                                      fixed bin(15),
          2 channel_index(0:CHANNELS_PER_SLOT)         fixed bin(15),
          2 geometry                                 like disk_geometry_template,
          2 data_bufferp                                   ptr,
          2 request_arrayp                             ptr,
          2 buffer_alloc_mapp                          ptr,
          2 pad_bits(6)                                bit (1),
          2 iop_mailboxp                               ptr,
          2 ioa_disk_statep                            ptr,
          2 meters,
            3 pad (10)                                 fixed bin(31);

/* End include file ... iop_disk_slot.incl.pl1 */
%page;
/* %include 'iop_disk_channel.incl.pl1'; */
/* Begin include file ... iop_disk_channel.incl.pl1 */

declare disk_channelp             ptr;
declare 1 disk_channel like disk_channel_template based (disk_channelp);
```

```
declare 1 disk_channel_template           based,
          2 state                         fixed bin(15),
          2 sub_state                     fixed bin (15), /* of above state */
          2 channel_no                    fixed bin(15),
          2 index                         fixed bin(15), /* in channel table */
          2 slot                          fixed bin(15),
          2 sub_slot                      fixed bin(15), /* drive # on slot */
          2 disk_type                     fixed bin(15),
          2 flags,
            3 pad                         bit (16),
          2 active_list_header            like links_template,
          2 pending_list_header           like links_template,
          2 list_emulation_header         like links_template,
          2 meters,
            3 pad1 (10)                   fixed bin (31);


/* End include file ... iop_disk_channel.incl.pl1 */
%page;
/* %include 'iop_disk_address.incl.pl1'; */
/* Begin include file ... disk_address.incl.pl1  86-06-04 */

/* This include file defines the IOP disk queue structures */

declare disk_addressp    ptr;
declare 1 disk_address like disk_address_template based (disk_addressp);

declare 1 disk_address_template based,
          2 cylinder              fixed bin (15),    /* As above, decomposed */
          2 head                fixed bin(15),
          2 sector               fixed bin (15);

/* End include file ... disk_address.incl.pl1 */
%page;
/* %include 'iop_disk_geometry.incl.pl1'; */
/* Begin include file ... disk_geometry.incl.pl1 */

declare disk_geometryp            ptr;
declare 1 disk_geometry like disk_geometry_template based (disk_geometryp);

declare 1 disk_geometry_template          based,
          2 blocks_per_disk              fixed bin (31),
          2 sectors_per_block            fixed bin (15),
          2 sectors_per_cylinder         fixed bin (15),
          2 sectors_per_track            fixed bin (15),
          2 seq_up_time_out              fixed bin (15);

/* End include file ... disk_geometry.incl.pl1 */
%page;
/* %include 'ioa_disk_ram.incl.pl1'; */
/* Begin include file ... ioa_disk_ram.incl.pl1  86-05-27 */

/* this include file is a memory map for the disk IOA */


declare ioa_disk_ramp              ptr;

declare 1 ioa_disk_ram based (ioa_disk_ramp),
          2 interrupt_vectors (256)     ptr,
          2 prom_id                     fixed bin(31),
          2 prom_version                fixed bin(15),
          2 microcode_version           fixed bin(15),
          2 mailbox_ptr                 ptr,
          2 request_area_ptr            ptr,
          2 free_list_header            like links_template,
          2 pending_list_header         like links_template,
          2 active_list_header          like links_template,
          2 buffer_alloc_map            bit (32) aligned,
          2 disk_state_mailbox          like disk_mailbox_template,
          2 pad (61)                    fixed bin(15),
          2 request_array (0:MAX_REQUESTS)
                                        like ioa_disk_request_template;
```

```
%page;
/* %include 'disk_status.incl.pl1'; */
/* Begin include file ... disk_status.incl.pl1   80-08-07 */

declare statp ptr;

declare 1 status based (statp),
          2 flags,
            3 completed              bit (1),
            3 drive_exists           bit (1),
            3 error                  bit (1),
            3 halted                 bit (1),
            3 ready                  bit (1),
            3 pad1                   bit (2),
            3 internal_read_failed   bit (1),
          2 controller,
            3 disagree               bit (1),
            3 dma_error              bit (1),
            3 terminal_count         bit (1),
            3 record_not_found       bit (1),
            3 forced_nmi             bit (1),
            3 drive_not_busy         bit (1),
            3 verify_error           bit (1),
            3 crc_error              bit (1),
          2 sector_info,
            3 pad2                   bit (7),
            3 bad_sector             bit (1),
          2 drive,                   /* Valid ONLY for Priam drives */
            3 command_reject         bit (1),
            3 write_fault            bit (1),
            3 drive_fault            bit (1),
            3 drive_busy             bit (1),
            3 at_cyl_0               bit (1),
            3 seek_fault             bit (1),
            3 seek_complete          bit (1),
            3 drive_ready            bit (1);

dcl  1 status_chars           based(statp) ,
       2 flags                char(1) ,
       2 controller           char(1) ,
       2 sector_info          char(1) ,
       2 drive                char(1) ;

dcl  1 drive_smd defined(status_chars.drive), /* Valid ONLY for Smd drives */
       2 pad3                 bit (3),
       2 write_protected      bit (1),
       2 fault                bit (1),
       2 seek_fault           bit (1),
       2 seek_complete        bit (1),
       2 drive_ready          bit (1);

dcl  1 iop_status             defined( status_chars.sector_info ),
       2 prom_error           bit(1),   /* IOP Prom detected error */
       2 entity_error         bit(1),   /* IOP entity detected error */
       2 checksum_error       bit(1),   /* Data checksum error */
       2 mbx_timeout          bit(1),   /* IOA mailbox timeout */
       2 rec_timeout          bit(1),   /* IOA disk request timeout */
       2 dead_ioa             bit(1),   /* Either dead or non-existent ioa */
       2 verify_error         bit(1),   /* IOP dma verify error */
       2 mbz                  bit(1);

/* End include file ... disk_status.incl.pl1 */
%page;
/* entries */

declare hex entry (fixed bin(31), fixed bin(15)) returns (char(8) varying);
declare dma_sector_to_host entry (1 like block_request_template,
                              fixed bin (15), fixed bin(15), fixed bin(15));
declare dma_sector_from_host entry (1 like block_request_template,
                              fixed bin (15), fixed bin(15), fixed bin(15));
declare dma_sector_verify entry (1 like block_request_template, fixed bin (15),
                              fixed bin(15), fixed bin(15));
declare   iop$select_adapter entry (fixed bin(15), fixed bin(15));
declare   iop$send_cmd_to_adapt entry(fixed bin(15),fixed bin(15),
                                fixed bin(15));
```

```
%page;
/* parameters */

declare  p_channel_no                   fixed bin (15);
declare  p_param_16                     fixed bin (15);
declare  p_status_flags                 bit(16) aligned;
declare  p_param_32_1                   fixed bin (31);
declare  p_param_32_2                   fixed bin (31);
declare  p_return_code                  fixed bin (31);
declare  p_command                  fixed bin (15);
declare  p_slot                       fixed bin (15);
declare  p_sub_channel                  fixed bin (15);
%page;
/* automatic */
declare  interrupt_level                fixed bin (15);
declare  error_type                     fixed bin (15);
declare  command                        fixed bin (15);
declare  channel_no                     fixed bin (15);
declare  param_16                       fixed bin (15);
declare  param_32_1                     fixed bin (31);
declare  param_32_2                     fixed bin (31);
declare  channel_ptr                    ptr;
declare  priority                       fixed bin (15);
declare  slot                           fixed bin (15);
declare  vos_id                         fixed bin (31);
declare  code                           fixed bin (15);
declare  dec_data                       fixed bin (31);
declare  inc_data                       fixed bin (31);
declare  i                              fixed bin (15);
declare  channel_index                  fixed bin(15);
declare  char_array(PAGE_SIZE)          char(1) based (char_arrayp);
declare  char_arrayp                    ptr;
declare  blk_addr                       ptr defined blk_fb;
declare  blk_fb                         fixed bin(31);
declare  freep                          ptr;
declare  newp                           ptr;
declare  sector_buffer_allocatedp       ptr;
declare  sector_buffer_allocated(32)    bit(1) based(sector_buffer_allocatedp);
%page;
/* defined */

declare  1 inc_data_defined  defined inc_data,
           2 sub_channel        fixed bin (15),
           2 chan            fixed bin (15);

declare  1 disk_addr_32_2       defined param_32_2,
           2 priority                  bit (8),
           2 block_no                  bit (24);
%page;
/* static */

declare error_number                fixed bin(31) internal static init(0);

declare   start_of_disk_rams$           ptr external static;
declare   start_of_disk_buffers$        ptr external static;
declare disk_write_dma_pages$           char(PAGE_SIZE) external static;
declare disk_error_msg$                 fixed bin(15) external static;
declare block_request_active$                 fixed bin(15) external static;

declare  legal_command (MIN_CMD_CODE : MAX_CMD_CODE ) bit (1) internal static;

declare  disk_entity_state  fixed bin (15) internal static init(STOPPED_STATE);

declare   no_of_block_requests       fixed bin(15) internal static init (0);
declare 1 free_block_request_header like links_template internal static;

declare   no_of_disk_slots       fixed bin(15) internal static init(0);
declare  1 disk_slot_table internal static,
           2 meters (10)               fixed bin(31),
           2 slot_ptrs (0:NUM_OF_SLOTS)   ptr;

declare   no_of_disk_channels       fixed bin(15) internal static init(0);
declare  1 disk_channel_table internal static,
```

```
        2 max_retrys                              fixed bin (15),
        2 meters (10)                             fixed bin(31),
        2 channel_ptrs (MAX_DISK_CHANNELS)        ptr;

%page;
/***********************************/
/****                          ****/
/**** COMMAND PROCESSING SECTION ****/
/****                          ****/
/***********************************/
disk_entity_command: entry (p_channel_no, p_command, p_param_16,
                            p_param_32_1, p_param_32_2);

/* FORMAT OF COMMAND */
/* channel_no is the logical channel which implies the slot */
/* func code is the operation to perform */
/* param_16 is the host physical page number */
/* param_32_1 host ID  */
/* param_32_2 is 1 byte of priority and 3 bytes of the disk_address */

     channel_no = p_channel_no;
     command = p_command;
     param_16 = p_param_16;
     vos_id = p_param_32_1;
     param_32_2 = p_param_32_2;

     if disk_entity_state ^= READY_STATE          /* ready for commands? */
     then do;
          call report_error(0,'entity not ready', SYSERR_WARN);
          call command_error(e$iop_entity_not_ready, p_param_32_1);
          return;
          end;

/* *** */
/*------------------------------------------------------------------------*/
/* entity is initialized special checks of disk_entity_state for various */
/*    commands can go here or in the actual command executors           */
/*------------------------------------------------------------------------*/

/* check for known channel_no ie. one that the ES has told us about */

     if ^find_channel(channel_no, channel_index, channel_ptr)
     then do;
          call report_error(0,'bad channel no - ' || hex((channel_no),4),
                                                    SYSERR_WARN);
          call command_error(e$iop_invalid_log_chan_no, p_param_32_1);
          return;
          end;

     disk_channelp = channel_ptr;

     slot = disk_channel.slot;

     if disk_channel.state ^= READY_STATE
     then do;
          call report_error(0,'channel not ready', SYSERR_WARN);
          call command_error(e$iop_channel_not_ready, p_param_32_1);
          return;
          end;

     if slot = NULL_SLOT
     then do;
          call report_error(0,'null slot', SYSERR_WARN);
          call command_error(e$iop_no_ioa_assigned_to_channel, vos_id);
          return;
          end;

     disk_slotp = disk_slot_table.slot_ptrs(slot);

     if disk_slot.state ^= READY_STATE
     then do;
          call report_error(0,'slot not ready', SYSERR_WARN);
          call command_error(e$iop_ioa_not_ready, p_param_32_1);
          return;
          end;
```

```
/* check for legal command */

      if command < MIN_CMD_CODE | command > MAX_CMD_CODE
      then do;
           call report_error(0,'invalid command', SYSERR_WARN);
           call command_error(e$iop_invalid_command, p_param_32_1);
           return;
           end;

      if command = ADD_GEOMETRY_CMD
      then do;
           call update_geometry (p_param_16, p_param_32_1, p_param_32_2);
           return;
           end;
      if ^legal_command(command)
      then do;
           call report_error(0,'illegal command '|| hex ((command),4),
                                                          SYSERR_WARN);
           call command_error(e$iop_unsupported_function, p_param_32_1);
           return;
           end;


/* get request block from free list ; wait if its empty */

      call get_block_request (free_block_request_header, block_requestp);
      if block_requestp = null()
      then do;
           /* no block requests are available */
           call command_error(e$iop_no_request_blocks, p_param_32_1);
           return;
           end;

      call iop$select_adapter (disk_slot.slot_no, code);
      if code ^= 0
      then do;
           call command_error(code, (disk_slot.slot_no));
           end;


      blk_addr = block_requestp;

      goto disk_command(command);

%page;
/* *** */
/*-----------------------------------------------------------------*/
/* here is the place to put the entity command code for each command */
/*-----------------------------------------------------------------*/


disk_command(READ_DISK_PAGE):;
disk_command(WRITE_DISK_PAGE):;
disk_command(VERIFY_DISK_PAGE):;
     block_request.sectors_required = 2;
     goto dsk_cmd_join;

disk_command(WV_DISK_PAGE):
     block_request.sectors_required = 4;

dsk_cmd_join:
     priority = binary(disk_addr_32_2.priority);

/* fill in info */

     block_request.vos_id = vos_id;
     block_request.command = command;
     block_request.channel_no = channel_no;
     block_request.page_no = param_16;
     block_request.block_no = bin(disk_addr_32_2.block_no);


     call convert_block_to_disk_address (disk_slot.geometry,
                              block_request.block_no, block_request.disk_addr);
```

```
/* allocate buffers on IOA for request; if none queue to pending list */

     if allocate_buffers (disk_slot, block_request.sectors_required,
                                block_request.sector_request)
     then do;  /* got the buffers, start request on IOA */
          call start_block_request (disk_slot, disk_channel, block_request);
          end;
     else do;  /* no buffers available */

          call queue_request_to_channel(disk_channel.pending_list_header,
                                                          block_request);
          end;

     return;

%page;
/******************************************/
/****                                 ****/
/**** CONFIGURATION MANAGEMENT SECTION ****/
/****                                 ****/
/******************************************/
disk_entity_config: entry (p_command, p_status_flags,
               p_param_32_1, p_param_32_2, p_return_code);

     command = p_command;
     ind_data = p_param_32_1;
     dep_data = p_param_32_2;
     p_return_code = 0;                    /* assume no error */

     if command < MIN_CONFIG_CODE | command > MAX_CONFIG_CODE
     then do;
          p_return_code = config_error(e$ioc_invalid_function_code, command);
          return;
          end;

     goto config_command (command);

%page;
config_command(CONFIG_INIT):

/* *** */
/* initialize the entity at a basic level - this is a master reset of
     everything - it happens whenever the entity is started by the IOP ES
*/
/* dep_data is entity dependent data passed from the host */
/* and is returned to the host */
/* ind_data is just for your info and is constant for all entities */


/* Initialize all software structures and become ready to recieve commands */

     if disk_entity_state ^= STOPPED_STATE /* we can only do this if stopped */
     then do;
          p_return_code = config_error(e$ioc_cannot_init_entity, 0);
          return;
          end;


     do i = 0 to NUM_OF_SLOTS;
          disk_slot_table.slot_ptrs(i) = null();
          end;

     do i = 1 to MAX_DISK_CHANNELS;
          disk_channel_table.channel_ptrs(i) = null();
          end;


/* need to initialize the block requests */


     call s$init_list_header(free_block_request_header);
```

```
/* *** */
/*-----------------------------------------------------------------------*/
/* this code may differ if the size of the channel table is variable */
/*-----------------------------------------------------------------------*/

     do i = MIN_CMD_CODE to MAX_CMD_CODE;
          legal_command (i) = FALSE;
          end;

     legal_command(READ_DISK_PAGE) = TRUE;
     legal_command(WRITE_DISK_PAGE) = TRUE;
     legal_command(VERIFY_DISK_PAGE) = TRUE;
     legal_command(WV_DISK_PAGE) = TRUE;
     legal_command(ADD_GEOMETRY_CMD) = TRUE;

/* *** */
/*-------------------------------------------*/
/* setup array for specific entity commands */
/*-------------------------------------------*/

/* *** */
/* add more code here for initializing this entity */
     disk_entity_state = READY_STATE;

     return;
%page;
config_command(CONFIG_SHUTDOWN):
     call report_error(1,'Stopping', SYSERR_WARN);

/* *** */
/*-------------------------------------------*/
/* more cleanup for entire entity shutdown */
/*-------------------------------------------*/

     disk_entity_state = STOPPED_STATE;        /* ready for sw init */
     return;

%page;
config_command(CONFIG_ADD_SLOT):

     if ind_data_defined.sub_channel > CHANNELS_PER_SLOT
     then do;
          p_return_code = config_error(e$iop_invalid_sub_channel,
                                      (ind_data_defined.sub_channel));
          return;
          end;

     ind_data = ind_data_defined.chan;
     if (ind_data < 0 | ind_data > NUM_OF_SLOTS)
     then do;
          p_return_code=config_error(e$iop_invalid_slot_no, bin(ind_data,15));
          return;
          end;


     /* allocate slot if its not already allocated */

     if disk_slot_table.slot_ptrs(ind_data) = null()
     then do;
          disk_slot_table.slot_ptrs(ind_data) =
                                      iop$allocate(size(disk_slot), 'DE');
          if disk_slot_table.slot_ptrs(ind_data) = null()
          then do;
               p_return_code = config_error(e$iop_cannot_allocate_space,
                                                       bin(ind_data,15));
               return;
               end;
          end;

     disk_slotp = disk_slot_table.slot_ptrs(ind_data);

     disk_slot.slot_no = ind_data;
     disk_slot.state = NULL_STATE;
```

```
call iop$select_adapter (disk_slot.slot_no, code);
if code ^= 0
then do;
     p_return_code = config_error(code, bin(ind_data,15));
     end;

/**default to D101 */

disk_slot.geometry.blocks_per_disk = 561 * 13;
disk_slot.geometry.sectors_per_block = 2;
disk_slot.geometry.sectors_per_track = 9;
disk_slot.geometry.sectors_per_cylinder = 26;

/* set IOA addresses */
ioa_disk_ramp = iop$ioa_abs_addr(start_of_disk_rams);
disk_slot.request_arrayp = addr(ioa_disk_ram.request_array);
disk_slot.buffer_alloc_mapp = addr(ioa_disk_ram.buffer_alloc_map);
disk_slot.ioa_disk_statep = addr(ioa_disk_ram.disk_state_mailbox);

disk_slot.data_bufferp = iop$ioa_abs_addr(start_of_disk_buffers);

do i = 0 to CHANNELS_PER_SLOT;
     disk_slot.channel_index(i) = NULL_CHANNEL;
     end;

i = no_of_block_requests;
do while(no_of_block_requests <
                    (BLOCK_REQUESTS_PER_SLOT * (no_of_disk_slots+1)));
     block_requestp = iop$allocate(size(block_request), 'DE');
     if block_requestp = null()
     then do;
          if no_of_block_requests < MIN_NO_OF_BLOCK_REQUESTS
          then do;
                    p_return_code = config_error(e$iop_cannot_allocate_space,
                                                      bin(ind_data,15));
                    return;
                    end;
               else do;
                    goto complete_slot;
                    end;
               end;

          i = i + 1;
          no_of_block_requests = no_of_block_requests + 1;
          block_request.no = i;

          call mask_interrupts;
          call s$thread_at_back (free_block_request_header,
                                   block_requestp, block_request.links);
          call unmask_interrupts;

          end;
complete_slot:
     no_of_disk_slots = no_of_disk_slots + 1;
     call report_error(1,'Added slot number ' || hex(ind_data,8),
                                                            SYSERR_WARN);
     call try_make_ready;

     return;
%page;
config_command(CONFIG_DELETE_SLOT):

     if disk_slot_table.slot_ptrs(ind_data) = null()
     then do;
          /* invalid slot number */
          p_return_code = config_error(e$iop_invalid_slot_no,
                                                      bin(ind_data,15));
          return;
          end;

     disk_slotp = disk_slot_table.slot_ptrs(ind_data);

     if disk_slot.state ^= STOPPED_STATE
     then do;
```

```
     call report_error(1,'Slot deleted while running', SYSERR_WARN);
     end;

/* check to see if all of the channel are null() */
do i = 0 to CHANNELS_PER_SLOT
                    while (disk_slot.channel_index(i) = NULL_CHANNEL);
     if (disk_slot.channel_index(i) ^= NULL_CHANNEL)
     then do;
          call report_error(1,'Slot deleted with channels attached',
                                                        SYSERR_WARN);
          return;
          end;
     end;

/* free if no errors */
disk_slot_table.slot_ptrs(inc_data) = null();
call iop$free(disk_slotp, 'DE');

no_of_disk_slots = no_of_disk_slots - 1;
     call report_error(1,'Deleted slot number ' || hex(inc_data,8),
                                                           SYSERR_WARN);
     return;
$page;
config_command(CONFIG_ADD_CHAN):

     if find_channel(bin(inc_data,15), channel_index, channel_ptr)
     then do;
          p_return_code = config_error(e$iop_chan_already_initialized,
                                   bin(inc_data,15));
          return;
          end;

     call mask_interrupts;

     do i = 1 to MAX_DISK_CHANNELS
                 while (disk_channel_table.channel_ptrs(i) ^= null());
          end;

     if (disk_channel_table.channel_ptrs(i) ^= null())
     then do;
          call unmask_interrupts();
          p_return_code = config_error(e$iop_cannot_allocate_space,
                                   bin(inc_data,15));
          return;
          end;

     disk_channelp = iop$allocate(size(disk_channel), 'DE');

     if disk_channelp = null ()
     then do;
          call unmask_interrupts();
          p_return_code = config_error(e$iop_cannot_allocate_space,
                                   bin(inc_data,15));
          return;
          end;

     disk_channel_table.channel_ptrs(i) = disk_channelp;

     call unmask_interrupts();

     disk_channel.channel_no = inc_data;
     disk_channel.index = i;
     disk_channel.state = STOPPED_STATE;
     disk_channel.sub_state = NULL_STATE;
     disk_channel.slot = dev_data;
     disk_channel.sub_slot = 0;

     call s$init_list_header (disk_channel.active_list_header);
     call s$init_list_header (disk_channel.pending_list_header);

/* initialize a new logical channel */

     no_of_disk_channels = no_of_disk_channels + 1;
```

```
        call report_error(1,' *** Added channel number ' || hex(ind_data,8),
                                                                      SYSERR_WARN);
        call try_make_ready;
        return;
%page;

config_command(CONFIG_DELETE_CHAN):

        if ^find_channel(bin(ind_data, 15), channel_index, disk_channelp)
        then do;
             r_return_code = config_error(e$iop_invalid_log_chan_no,
                                          bin(ind_data,15));
             return;
             end;

        if disk_channel.state ^= STOPPED_STATE    /* should do stop fcn first */
        then do;
             call report_error(1,'Logical channel deleted while running',
                                                                      SYSERR_WARN);
             end;

        call mask_interrupts();

        /* need to go unlink from slot here */
        disk_slotp = disk_slot_table.slot_ptrs(disk_channel.slot);
        if disk_slotp ^= null()
        then do;
             disk_slot.channel_index(disk_channel.sub_slot) = NULL_CHANNEL;
             end;

        disk_channel_table.channel_ptrs(disk_channel.index) = null();
        call unmask_interrupts();

        freep = disk_channel.active_list_header.nextp;
        do while (freep ^= null());

             newp = freep;
             freep = freep-> block_request.nextp;

             call s$unthread (newp-> block_request.links);

             call s$thread_at_back (free_block_request_header,
                                    newp, newp->block_request.links);
             end;

        freep = disk_channel.pending_list_header.nextp;
        do while (freep ^= null());

             newp = freep;
             freep = freep-> block_request.nextp;

             call s$unthread (newp-> block_request.links);

             call s$thread_at_back (free_block_request_header,
                                    newp, newp->block_request.links);
             end;

        call iop$free(disk_channelp, 'DE');

        no_of_disk_channels = no_of_disk_channels - 1;

        call report_error(1,'Deleted channel number ' || hex(ind_data,8),
                                                                      SYSERR_WARN);
        return;
%page;
config_command(CONFIG_READ_METER):
/* *** */
/* read the meter - ind_data , dep_data are passed from hos returned to hos */
        call report_error(1,'Read meter', SYSERR_WARN);

        return;
%page;
config_command(CONFIG_READ_STATUS):
/* *** */
```

```
/* reac the status - ind_data , dep_cata are passed from hos returned to hos */
     call report_error(1,'Read status', SYSERR_WARN);

     return;
%page;
/*****************************************/
/****                                ****/
/**** IOA INTERRUPT MANAGEMENT SECTION ****/
/****                                ****/
/*****************************************/
/* slot interrupt entry callec from IOP ES when a slot interrupts */
disk_entity_slot: entry (p_slot, p_sub_channel);

declare   fb15            fixec bin(15)  based;

     if disk_slot_table.slot_ptrs(p_slot) = null()
     then do;
          call report_error(0,'Unknown slot interrupted'|| hex((p_slot),4),
                                                                  SYSERR_WARN);
          return;
          end;

     disk_slotp = disk_slot_table.slot_ptrs(p_slot);

     /* currently there is only one disk per card */
     channel_incex = disk_slot.channel_index(0);

     if channel_index = NULL_CHANNEL
     then do;
          call report_error(0,'Slot interrupted no channel set' ||
                                          hex((p_slot),4), SYSERR_WARN);
          return;
          end;
     else do;
          disk_channelp = disk_channel_table.channel_ptrs(channel_index);
          end;

     call mask_interrupts;
     call iop$select_adapter (p_slot, code);
     if code ^= 0
     then do;
          call command_error(code, p_param_32_1);
          end;

     if p_sub_channel ^= 0
     then do;
          /* change of state in mailbox */
          call send_command(disk_channel.channel_no, UPDATE_MAILBOX,
                          disk_slot.ioa_disk_statep->fb15, (0), (0));
          end;

/* process the interrupt and call post_block_request(slot, request_ptr) */

sector_buffer_allocatecp = disk_slot.buffer_alloc_mapp;

do while (disk_request_to_process (disk_slot, disk_requestp));

     call find_block_request (block_requestp, i,
                  disk_channel.active_list_header, disk_request);

     blk_addr = block_requestp;

     block_request.status = block_request.status |
                                                disk_request.status;
     block_request.sector_request(i).error =
                   analyze_disk_status(disk_request, error_type);

     if ^block_request.sector_request(i).error
     then do;

          goto blk_rqst_cmd(block_request.command);

          blk_rqst_cmd (+V_DISK_PAGE):;
```

```
            if disk_request.command = IOA_READ_NORMAL
            then do;

                 call dma_sector_verify (block_request, i, p_slot,
                                                                      code);

                 if code ^= 0
                 then do;
                      statp = addr(block_request.status);
                      status.flags.error = '1'b;
                      status.controller.verify_error = '1'b;
                      end;
                 end;

            goto blk_rqst_cmd_exit;

       blk_rqst_cmd (VERIFY_DISK_PAGE):

            /* DMA VERIFY */
            call dma_sector_verify (block_request, i, p_slot, code);

            if code ^= 0
            then do;
                 statp = addr(block_request.status);
                 status.flags.error = '1'b;
                 status.controller.verify_error = '1'b;
                 end;

            goto blk_rqst_cmd_exit;

       blk_rqst_cmd (READ_DISK_PAGE):

            call dma_sector_to_host (block_request, i, p_slot, code);

            if code ^= 0
            then do;
                 statp = addr(block_request.status);
                 status.flags.error = '1'b;
                 status.controller.crc_error = '1'b;
                 end;

            /* goto blk_rqst_cmd_exit; */

       blk_rqst_cmd (*);;

       blk_rqst_cmd_exit:

       end;

  block_request.sector_request(i).complete = '1'b;
  disk_request.state = FREE;
  sector_buffer_allocated(block_request.sector_request(i).request_no)
                                                                  = '0'b;

  if block_request_complete (block_request)
  then do;
       call post_block_request (disk_channel, block_request);
       end;
  end;

call unmask_interrupts ();

do while (block_request_pending (disk_channel, block_requestp));

  if allocate_buffers (disk_slot, block_request.sectors_required,
                                   block_request.sector_request)
  then do;  /* got the buffers, start request on IOA */
       call sfunthread (block_request.links);
       call start_block_request (disk_slot, disk_channel,
                                                      block_request);
       end;
  else do; /* no buffers left in IOA */
       return;
       end;
  end;
```

```
    return;

%page;

try_make_ready: procedure;

    do channel_index = 1 to MAX_DISK_CHANNELS;
        disk_channelp = disk_channel_table.channel_ptrs(channel_index);
        if disk_channelp ^= null() & disk_channel.state = STOPPED_STATE
        then do;
            disk_slotp = disk_slot_table.slot_ptrs(disk_channel.slot);
            if disk_slotp ^= null()
            then do;
                disk_slot.channel_index(disk_channel.sub_slot) =
                                                    channel_index;
                disk_channel.state = READY_STATE;
                disk_slot.state = READY_STATE;
                call report_error(0,'Channel / drive made ready ' ||
                    hex((disk_channel.channel_no),4) || ' / ' ||
                    hex((disk_channel.slot),4), SYSERR_WARN);

                /* send mailbox states */

                call send_command(disk_channel.channel_no, UPDATE_MAILBOX,
                        disk_slot.ioa_disk_statep->fb15, (0), (0));
                end;
            end;
        end;

end try_make_ready;
%page;
post_block_request: procedure (a_disk_channel, a_block_request);

declare 1 a_disk_channel                    like disk_channel_template;
declare 1 a_block_request                   like block_request_template;

declare   bit32                             bit(32) defined fb31;
declare   fb31                              fixed bin(31);

/* examine status for success */

    bit32 = block_request.status;
    call send_command(block_request.channel_no, block_request.command,
         0, block_request.vos_id, fb31);



/* thread block request on free list */

    call mask_interrupts();

    call s$unthread (block_request.links);

    string(block_request_clear) = '0000'b4;
    call s$init_list_node ( block_request.links );

    call s$thread_at_back (free_block_request_header,
                          addr(block_request), block_request.links);
    call unmask_interrupts();

    block_request_actives = block_request_actives - 1;

    return;

end post_block_request;
%page;
cleanup_channel: procedure;
/* *** TBS TBS TBS TBS TBS *** */
end cleanup_channel;
%page;
config_error: procedure (p_error_code, p_param_16) returns (fixed bin (31));
```

```
/* stores an error code and additional data in 2 halves of 32 bit p_return_code
     for return to the es */

declare p_error_code      fixed bin (15);
declare p_param_16 fixed bin (15);

declare ret_code fixed bin(31);

declare error_array(2) fixed bin (15) defined ret_code;

     error_array(1) = p_error_code;
     error_array(2) = p_param_16;
     return(ret_code);

end config_error;
%page;
find_channel: procedure (p_channel_no, p_channel_index, p_channel_ptr)
                                            returns (bit (1) aligned);

/* find index to channel table that corresponds to logical channel number */

declare  p_channel_no        fixed bin(15);
declare  p_channel_index     fixed bin(15);
declare  p_channel_ptr       ptr;

declare  chx              fixed bin(15);

     do chx = 1 to MAX_DISK_CHANNELS;
          if disk_channel_table.channel_ptrs(chx) ^= null()
          then do;
               disk_channelp = disk_channel_table.channel_ptrs(chx);
               if disk_channel.channel_no = p_channel_no
               then do;
                    p_channel_index = chx;
                    p_channel_ptr = disk_channelp;
                    return (TRUE);
                    end;
               end;
          end;
     p_channel_index = NULL_CHANNEL;
     p_channel_ptr = null();
     return (FALSE);
end find_channel;
%page;
command_error: procedure (p_error_code, p_param_32_1);

declare  p_error_code      fixed bin (15);
declare  p_param_32_1    fixed bin (31);

declare  error_code        fixed bin (15);
declare  param_32_1      fixed bin (31);

     error_code = p_error_code;
     param_32_1 = p_param_32_1;

/* report a command error on the command ring */

     call send_command(channel_no, command + ERROR_ID, error_code, param_32_1, 0
     return;

end command_error;
%page;
send_command: proc (p_channel_no, p_command, p_param_16,
                                            p_param_32_1, p_param_32_2);

declare  (p_channel_no, p_command, p_param_16)     fixed bin (15);
declare  (p_param_32_1, p_param_32_2)        fixed bin (31);

declare  code                        fixed bin (15);
declare  (channel_no, command, param_16)          fixed bin (15);
declare  (param_32_1, param_32_2)           fixed bin (31);

     channel_no = p_channel_no;
     command = p_command;
```

```
     param_16 = p_param_16;
     param_32_1 = p_param_32_1;
     param_32_2 = p_param_32_2;

     call iop$deliver_command(channel_no, command, param_16,
                              param_32_1, param_32_2, INITIAL_DISK_LIMIT, code);
     if code ^= 0
     then do;
          /* send of command failed take appropriate action */
          if code = e$iop_limit_exceeded
          then do;
               do while (code^=e$iop_limit_exceeded);
                    call iop$deliver_command(channel_no, command, param_16,
                              param_32_1, param_32_2, INITIAL_DISK_LIMIT, code);
                    end;
               end;
          else do;
               call report_error(1,'Delivery of command to host failed',
                                                            SYSERR_WARN);
               end;
          end;

     return;

end send_command;
%page;
report_error: entry (p_display, p_error_string, p_error_type);

declare  p_display              fixed bin(15);
declare  p_error_string         char (80) varying;
declare  p_error_type           fixed bin (15);

declare  error_string           char (80) varying;

     if p_display > disk_error_msgs
     then do;
          return;
          end;

     error_string = p_error_string;
     error_type = p_error_type;
     error_number = error_number + 1;
     call iop$syserr_code('DISK ENTITY(' || bin_to_char(error_number) || '): '
                      || error_string, error_type, code);
     if code ^= 0
     then do;
          call iop$panic_syserr('**DISK ENTITY(' ||
                    bin_to_char(error_number) || '): ' || error_string);
          end;

/* could not send error to host take appropriate action */
     return;
%page;
get_block_request: procedure (p_list_header, p_request_ptr);

declare 1 p_list_header         like links_template;
declare p_request_ptr           ptr;

     call mask_interrupts;

     if (p_list_header.next_linksp = addr(p_list_header)) &
                    (p_list_header.prev_linksp = addr(p_list_header))
     then do;   /* list is empty */
          call unmask_interrupts();
          p_request_ptr = null();
          return;
          end;

     block_requestp = p_list_header.nextp;
     call s$unthread ( block_request.links );

     call unmask_interrupts;
```

```
     string(block_request_clear) = '0000'b4;
     call s$init_list_node ( block_request.links );


     p_request_ptr = block_requestp;

     block_request_active$ = block_request_active$ + 1;

end get_block_request;
%page;
convert_block_to_disk_address: procedure (p_geometry, p_block_no, p_disk_addr);

/* This routine converts a disk block number (the outside world's
   representation of disk addresses) to the correct cylinder, head,
   and sector for the disk type. */

declare 1 p_geometry          like disk_geometry_template;
declare p_block_no           fixed bin(31);
declare 1 p_disk_addr          like disk_address_template;

/* Automatic */

declare block  fixed bin (31);
declare sector fixed bin (31);
declare head  fixed bin (31);

/* */

     block = p_block_no;
     sector = block * p_geometry.sectors_per_block; /* Absolute sector no */

     p_disk_addr.cylinder =
        divide (sector, p_geometry.sectors_per_cylinder, 15, 0); /* Cylinder */
     sector =
        mod (sector, p_geometry.sectors_per_cylinder); /* Sector in cylinder */

     head =
       divide (sector, p_geometry.sectors_per_track, 15, 0); /* Track number */
     sector =
             mod (sector, p_geometry.sectors_per_track); /* Sector in track */

     p_disk_addr.head = head;
     p_disk_addr.sector = sector;

     return;

end convert_block_to_disk_access;
%page;
queue_request_to_channel: procedure (p_header, p_block_request);

declare 1 p_header                like links_template;
declare 1 p_block_request         like block_request_template;

call mask_interrupts();

call s$thread_at_back (p_header, addr(p_block_request), p_block_request.links);

call unmask_interrupts();

end queue_request_to_channel;
%page;
start_block_request: procedure (p_slot, p_channel, p_block_request);

declare 1 p_slot                  like disk_slot_template;
declare 1 p_channel               like disk_channel_template;
declare 1 p_block_request         like block_request_template;

declare   iop_request(0:3)       ptr;
declare   sector(0:3)            ptr;

     call queue_request_to_channel(p_channel.active_list_header,
                                                        p_block_request);
     disk_request_arrayp = p_slot.request_arrayp;
     disk_bufferp = p_slot.data_bufferp;
```

```
     ioa_request(0) =
        addr(disk_request_array(p_block_request.sector_request(0).request_no));
     ioa_request(1) =
        addr(disk_request_array(p_block_request.sector_request(1).request_no));

     sector(0) =  addr(disk_buffer(ioa_request(0)->disk_request.index));
     sector(1) =  addr(disk_buffer(ioa_request(1)->disk_request.index));

     /* fill in requests and turn over to IOA */
     goto disk_command(p_block_request.command);
%page;
     disk_command(VERIFY_DISK_PAGE):;
     disk_command(READ_DISK_PAGE):

          ioa_request(0)->disk_request.command = IOA_READ_NORMAL;
          ioa_request(1)->disk_request.command = IOA_READ_NORMAL;

          p_block_request.sector_request(0).page_offset = 0;
          p_block_request.sector_request(1).page_offset = SECTOR_SIZE;

          call fill_in_generic (NOT_VERIFY);

          /* pass the request over to the IOA */

          ioa_request(0)->disk_request.state = PENDING;
          ioa_request(1)->disk_request.state = PENDING;

          return;
%page;
     disk_command(WRITE_DISK_PAGE):;

          ioa_request(0)->disk_request.command = IOA_WRITE_NORMAL;
          ioa_request(1)->disk_request.command = IOA_WRITE_NORMAL;

          p_block_request.sector_request(0).page_offset = 0;
          p_block_request.sector_request(1).page_offset = SECTOR_SIZE;

          call fill_in_generic (NOT_VERIFY);

          ioa_request(0)->disk_request.dma_required = '1'b;
          ioa_request(1)->disk_request.dma_required = '1'b;

          /* give the request to adapter so can start seek */
          ioa_request(0)->disk_request.state = PENDING;
          ioa_request(1)->disk_request.state = PENDING;

          /**** DMA 0 ****/
          call dma_sector_from_host (p_block_request, 0, p_channel.slot, code);
          if code ^= 0
          then do;
               call report_error (1,'dma from host failed: ' ||
                                 hex ((code),4), SYSERR_WARN);

               end;

          /**** DMA 1 ****/
          call dma_sector_from_host (p_block_request, 1, p_channel.slot, code);
          if code ^= 0
          then do;
               call report_error (1,'dma from host failed: ' ||
                                 hex ((code),4), SYSERR_WARN);

               end;

          ioa_request(0)->disk_request.dma_required = '0'b;
          ioa_request(1)->disk_request.dma_required = '0'b;

          return;
%page;
     disk_command(WV_DISK_PAGE):
          ioa_request(0)->disk_request.command = IOA_WRITE_NORMAL;
```

```
        ioa_request(1)->disk_request.command = IOA_WRITE_NORMAL;

        p_block_request.sector_request(0).page_offset = 0;
        p_block_request.sector_request(1).page_offset = SECTOR_SIZE;

        call fill_in_generic (NOT_VERIFY);

        ioa_request(0)->disk_request.dma_required = '1'b;
        ioa_request(1)->disk_request.dma_required = '1'b;

        ioa_request(0)->disk_request.state = PENDING;
        ioa_request(1)->disk_request.state = PENDING;

        /**** DMA 0 ****/
        call dma_sector_from_host (p_block_request, 0, p_channel.slot, code);
        if code ^= 0
        then do;
             call report_error (1,'dma from host failed: ' ||
                                  hex ((code),4), SYSERR_WARN);

             end;

        /**** DMA 1 ****/
        call dma_sector_from_host (p_block_request, 1, p_channel.slot, code);
        if code ^= 0
        then do;
             call report_error (1,'dma from host failed: ' ||
                                  hex ((code),4), SYSERR_WARN);

             end;

        ioa_request(0)->disk_request.dma_required = '0'b;
        ioa_request(1)->disk_request.dma_required = '0'b;

        /* setup verify for block */

        ioa_request(0) =
      addr(disk_request_array(p_block_request.sector_request(2).request_no));
        ioa_request(1) =
      addr(disk_request_array(p_block_request.sector_request(3).request_no));

        sector(0) =  addr(disk_buffer(ioa_request(0)->disk_request.index));

        sector(1) = addr(disk_buffer(ioa_request(1)->disk_request.index));

        ioa_request(0)->disk_request.command = IOA_READ_NORMAL;
        ioa_request(1)->disk_request.command = IOA_READ_NORMAL;

        p_block_request.sector_request(2).page_offset = 0;
        p_block_request.sector_request(3).page_offset = SECTOR_SIZE;

        call fill_in_generic (VERIFY);

        ioa_request(0)->disk_request.list_priority = 1;
        ioa_request(1)->disk_request.list_priority = 1;

        ioa_request(0)->disk_request.state = PENDING;
        ioa_request(1)->disk_request.state = PENDING;

        return;

   return;

fill_in_generic: procedure (a_verify);

declare a_verify                bit(1) aligned;

/* sector 0 */

        sector_formatp = sector(0);
```

```
        disk_requestp = ioa_request(0);

        /* fill header info in ioa request block and data buffer */

        sector_format.header.cylinder = p_block_request.disk_addr.cylinder;
        sector_format.cup_header.cylinder =
                                        p_block_request.disk_addr.cylinder;
        disk_request.disk_addr.cylinder = p_block_request.disk_addr.cylinder;


        sector_format.header.head = byte(p_block_request.disk_addr.head);
        sector_format.cup_header.head = byte(p_block_request.disk_addr.head);
        disk_request.disk_addr.head = p_block_request.disk_addr.head;

        sector_format.header.sector = byte(p_block_request.disk_addr.sector);
        sector_format.cup_header.sector =
                                  byte(p_block_request.disk_addr.sector);
        disk_request.disk_addr.sector = p_block_request.disk_addr.sector;


        /* add sysnc values to data buffer */
        sector_format.addr_sync = ADDR_SYNC;
        sector_format.data_sync = DATA_SYNC;

        /* complete to ioa request */
        string(disk_request.flags) = '0000'b4;
        disk_request.interrupt = '1'b;
        disk_request.retry_count = 0;
        disk_request.request_priority = 0;

        if a_verify
        then do;
             disk_request.list_priority = 1;
             end;
        else do;
             disk_request.list_priority = 0;
             end;

        disk_request.retry_count = 0;
        disk_request.vos_id = p_block_request.vos_id;


/* sector 1 */
        sector_formatp = sector(1);
        disk_requestp = ioa_request(1);

        sector_format.header.cylinder = p_block_request.disk_addr.cylinder;
        sector_format.cup_header.cylinder =
                                        p_block_request.disk_addr.cylinder;
        disk_request.disk_addr.cylinder = p_block_request.disk_addr.cylinder;

        /* check to see if block crosses track boundary */
        if (p_block_request.disk_addr.sector + 1) =
                                  (disk_slot.geometry.sectors_per_track)
        then do; /* crosses track boundary */
             sector_format.header.head =
                                  byte(p_block_request.disk_addr.head + 1);
             sector_format.cup_header.head =
                                  byte(p_block_request.disk_addr.head + 1);
             disk_request.disk_addr.head =
                                    p_block_request.disk_addr.head + 1;

             sector_format.header.sector = byte(0);
             sector_format.cup_header.sector = byte(0);
             disk_request.disk_addr.sector = 0;
             end;
        else do; /* does not cross just increment sector no */

             sector_format.header.head =
                                    byte(p_block_request.disk_addr.head);
             sector_format.cup_header.head =
                                     byte(p_block_request.disk_addr.head);
             disk_request.disk_addr.head = p_block_request.disk_addr.head;
```

```
                sector_format.header.sector =
                                        byte(p_block_request.disk_addr.sector + 1);
                sector_format.dup_header.sector =
                                        byte(p_block_request.disk_addr.sector + 1);
                disk_request.disk_addr.sector =
                                           p_block_request.disk_addr.sector +1;

                end;

           sector_format.addr_sync = ADDR_SYNC;
           sector_format.data_sync = DATA_SYNC;

           string(disk_request.flags) = '0000'b4;
           disk_request.interrupt = '1'b;
           disk_request.retry_count = 0;
           disk_request.request_priority = 0;

           if a_verify
           then do;
                disk_request.list_priority = 1;
                end;
           else do;
                disk_request.list_priority = 0;
                end;

           disk_request.vos_id = p_block_request.vos_id;

end fill_in_generic;
end start_block_request;
%page;
allocate_buffers: procedure (p_disk_slot, p_buffers_required, p_buffers)
                                                                    returns (bit(1));

declare 1 p_disk_slot                             like disk_slot_template;
declare   p_buffers_required                      fixed bin(15);
declare 1 p_buffers (0:MAX_SECTOR_REQUESTS)  like sector_request_template;

declare   number_allocated                        fixed bin(15);
declare   last_allocated                          fixed bin(15) internal static
                                                           init(MIN_IO_REQUEST);

     number_allocated = 0;

     call mask_interrupts();

     disk_request_arrayp = p_disk_slot.request_arrayp;

     sector_buffer_allocatedp = p_disk_slot.buffer_alloc_mapp;

     do i = MIN_IO_REQUEST to MAX_REQUESTS
                         while (number_allocated ^= p_buffers_required);

          if ^sector_buffer_allocated(last_allocated)
          then do;
               p_buffers(number_allocated).request_no = last_allocated;
               p_buffers(number_allocated).buffer_no =
                                   disk_request_array(last_allocated).index;
               number_allocated = number_allocated + 1;
               end;

          last_allocated = last_allocated + 1;
          if last_allocated > MAX_REQUESTS
          then do;
               last_allocated = MIN_IO_REQUEST;
               end;
          end;

     if p_buffers_required ^= number_allocated
     then do;
          call unmask_interrupts();
          return ('0'b);
          end;
```

```
     /* we got all the buffers, so now lets allocate them */
     do i = 0 to (p_buffers_required - 1);

          sector_buffer_allocated(p_buffers(i).request_no) = '1'b;

          string(p_buffers(i).flags) = '0000'b4;
          p_buffers(i).allocated = '1'b;
          p_buffers(i).status = '00000000'b4;
          end;

     call unmask_interrupts();

     return ('1'b);

end allocate_buffers;
%page;
disk_request_to_process: procedure (a_disk_slot, a_requestp)
                                             returns (bit(1) aligned);

declare 1 a_disk_slot              like disk_slot_template;
declare   a_requestp               ptr;

     disk_request_arrayp = a_disk_slot.request_arrayp;

     do i = MIN_IO_REQUEST to MAX_REQUESTS;
          if disk_request_array(i).state = POST
          then do;
               a_requestp = addr(disk_request_array(i));
               return ('1'b);
               end;
          end;

     a_requestp = null();
     return ('0'b);

end disk_request_to_process;

%page;
find_block_request: procedure (a_block_requestp, a_sector_index,
                                        a_list_header, a_request);

declare   a_block_requestp              ptr;
declare   a_sector_index                fixed bin(15);
declare 1 a_list_header                 like links_template;
declare 1 a_request                     like ioa_disk_request_template;

declare   i                             fixed bin(15);

     do block_requestp = a_list_header.nextp  repeat block_request.links.nextp
                              while (block_requestp ^= null());
          if (block_request.vos_id = a_request.vos_id)
          then do;
               do i = 0 to MAX_SECTOR_REQUESTS
                    while (block_request.sector_request(i).allocated);
                    if block_request.sector_request(i).buffer_no =
                                                  a_request.index
                    then do;
                         a_block_requestp = block_requestp;
                         a_sector_index = i;
                         return;
                         end;
                    end;
               end;
          end;

          a_block_requestp = null();
          a_sector_index = -1;

end find_block_request;
%page;
block_request_complete: procedure (a_block_request) returns (bit(1) aligned);

declare 1 a_block_request               like block_request_template;
```

```
declare   complete                                bit(1) aligned;

     complete = '1'b;

     do i = 0 to MAX_SECTOR_REQUESTS
               while (a_block_request.sector_request(i).allocated);

          complete = complete & a_block_request.sector_request(i).complete;

          end;

     return (complete);

end block_request_complete;
%page;
analyze_disk_status: procedure (a_disk_request, a_error_type)
                                             returns( bit(1) aligned );

declare 1 a_disk_request              like ioa_disk_request_template;
declare   a_error_type                fixed bin(15);
declare   bit32_to_fb                 bit(32) aligned defined fb31;
declare   fb31                        fixed bin(31);
declare   bit8_to_char                bit(8) defined char1;
declare   char1                       char(1);
declare   error                       bit(1) aligned;

     error = '0'b;
     return (error);

end analyze_disk_status;
%page;
mask_interrupts: procedure;

     interrupt_level = iop$get_level();
     call iop$set_level(MASK_ALL_INTS);
end mask_interrupts;

unmask_interrupts: procedure;

     call iop$set_level(interrupt_level);
end unmask_interrupts;
%page;
block_request_pending: procedure (p_disk_channel, p_block_requestp)
                                                  returns (bit(1));

declare 1 p_disk_channel                    like disk_channel_template;
declare   p_block_requestp                  ptr;

     if (p_disk_channel.pending_list_header.nextp = null())
     then do; /* list is empty */
          p_block_requestp = null();
          return ('0'b);
          end;
     else do;
          p_block_requestp = p_disk_channel.pending_list_header.nextp;
          return ('1'b);
          end;

end block_request_pending;
%page;
update_geometry: procedure (p_data_16_1, p_data_32_1, p_data_32_2);

declare   p_data_16_1        fixed bin (15);
declare   p_data_32_1        fixed bin (31);
declare   p_data_32_2        fixed bin (31);

declare   1 data_32_2_ovly  defined p_data_32_2,
            2 sectors_per_block      fixed bin(15),
            2 sectors_per_track      fixed bin(15);

     disk_slot.geometry.blocks_per_disk = p_data_32_1;
     disk_slot.geometry.sectors_per_block = data_32_2_ovly.sectors_per_block;
     disk_slot.geometry.sectors_per_track = data_32_2_ovly.sectors_per_track;
     disk_slot.geometry.sectors_per_cylinder = p_data_16_1;
```

```
call report_error(1,'update geometry  bpd = '||
                    hex ((disk_slot.geometry.blocks_per_disk),8) ||
        ' spb = ' || hex ((disk_slot.geometry.sectors_per_block),2) ||
        ' spt = ' || hex ((disk_slot.geometry.sectors_per_track),2) ||
        ' spc = ' || hex ((disk_slot.geometry.sectors_per_cylinder),2),

                                                             SYSERR_WARN);

end update_geometry;
%page;
format_bad_block_page: procedure;

/* %include  'bad_block_page.incl.pl1' */;
/*  +++begin copyright+++ ************************************   */
/*                                                              */
/*  STRATUS CONFIDENTIAL INFORMATION: CLASS II                  */
/*  COPYRIGHT (c) Stratus Computer, Inc. 1985                   */
/*                                                              */
/*  This  program  contains  confidential and proprietary       */
/*  information  of  Stratus Computer,  Inc.,   and   any       */
/*  reproduction, disclosure, or use in whole or in part        */
/*  is   expressly   prohibited,   except   as   may   be       */
/*  specifically authorized by prior written agreement or       */
/*  permission of Stratus.                                      */
/*                                                              */
/*  +++end copyright+++ **************************************   */
/* Begin include file bad_block_page.incl.pl1 */

/* This file describes the format of the bad block page */
/* located on all disks at page 3. */
/* Modified 84-10-17 by J. A. Bush for version 2 */

%replace  MAX_BAD_SECTORS by 1012;
%replace  OLD_MAX_BAD_SECTORS by 500;
%replace  BAD_BLOCK_SECTOR by 6;
%replace  BAD_BLOCK_PAGE_VERSION_2 by 2;

dcl  bbp_ptr              ptr;
dcl  bb_entry_p           ptr;
dcl  trk_sctp             ptr;
dcl  bad_block_count      fixed bin (15);

dcl  1 bbp                based (bbp_ptr),
       2 new_format       bit (1),            /* '1'b => use this structure */
                                              /* '0'b => use old_bbp below */
       2 count            bit (15).           /* must use 'bin' of count */
       2 checksum         fixed bin (31),
       2 disk_id,
         3 version        fixed bin (15),     /* must be 2 */
         3 type           fixed bin (15),     /* disk_type */
         3 type_name      char (20) var,
         3 platter_id     fixed bin (31),     /* drive serial# for */
                                              /* nonremovable disk */
         3 dtm_formatted fixed bin (31),      /* date time formatted */
         3 vendor_bad     fixed bin (15),
         3 format_complete bit (1) aligned,   /* '0'b => not completely
                                                 formatted */
       2 bad_area (2) fixed bin (15),
       2 ent (MAX_BAD_SECTORS),
         3 track_sect     fixed bin (15),
         3 cylinder       fixed bin (15);

dcl  1 trk_sct            based (trk_sctp),
       2 trk              char (1),
       2 sct              char (1);

dcl 1 bb_entry (bad_block_count) based (bb_entry_p),
      2 track_sect     fixed bin (15),
      2 cylinder       fixed bin (15);

/* structure for old (version 1) bad block page */

dcl  1 old_bbp            based (bbp_ptr),
       2 count            fixed bin (15),
```

```
        2 checksum          fixed bin (31),
        2 ent (1:OLD_MAX_BAD_SECTORS),
          3 track_sect      fixed bin (15),
          3 cylinder        fixed bin (15),
        2 disk_id,
          3 version         fixed bin (15),       /* must be 1 */
          3 type            fixed bin (15),       /* disk_type */
          3 type_name       char (32) var,
          3 platter_id      fixed bin (31),       /* drive serial# for */
                                                  /* nonremovable disk */
          3 vendor_bad      fixed bin (15);

/* End include file bad_block_page.incl.pl1 */


     bbp_ptr = addr(disk_write_dma_pages);
     bbp.format_complete = '1'b;
     bbp.new_format = '1'b;
     bbp.disk_id.version = BAD_BLOCK_PAGE_VERSION_2;
     bbp.count = bit (bin ((0), 15), 15);
     bbp.checksum = 0;

end format_bad_block_page;
fill_in_dma_page: procedure(a_block_no);

declare a_block_no              fixed bin(31);

declare fb31_array(1024)         fixed bin(31) based (fb31p);
declare fb31p                   ptr;

     fb31p = addr(disk_write_dma_pages);

     do i = 1 to 1024;
          fb31_array(i) = a_block_no;
          end;
end fill_in_dma_page;
end iop_disk_entity;
```

```
/*   ***begin copyright*** ******************************   */
/*                                                          */
/*   STRATUS CONFIDENTIAL INFORMATION: CLASS II             */
/*   COPYRIGHT (c) Stratus Computer, Inc. 1986              */
/*                                                          */
/*   This  program  contains  confidential and proprietary  */
/*   information  of  Stratus Computer,  Inc.,  and   any   */
/*   reproduction,  disclosure, or use in whole or in part  */
/*   is   expressly   prohibited,   except   as   may   be  */
/*   specifically authorized by prior written agreement or  */
/*   permission of Stratus.                                 */
/*                                                          */
/*   ***end copyright*** ********************************   */
```

```
/*                              IOP_DISK_LISTS
                                --------------
     This is the code to support disk list emulation for the iop disk
     subsystem.

*/

/* Beginning of modification history */
/* Modified 86-10-09 by Bill Snapper to - handle a disk controller timeout
                                      - change the map pages used to reflect
                                        the change in prom_hi address.
*/
/* Modified 86-10-09 by Bill Snapper to change HALT_CMD to return failure
                                       status when appropriate.
*/
/* Modified 86-10-09 by Bill Snapper to not return bad status for now so we can
                                       initialize a disk.
*/
/* Modified 86-11-10 by Bill Snapper to fix up brain damage. */
```

```
/* Modified 86-10-10 by Bill Snapper to make disk_list_callback an external
                                             entry point so that global storage
                                             variables are available.
*/
/* Modified 86-10-18 by Bill Snapper to change CALL_MASK to only mask to level7
*/
/* Modified 86-10-28 by Bill Snapper to set dma_complete when io to disk ioa
                                      has been completed. */
/* Modified 86-11-05 by Bill Snapper to - timeout resets to adapter on fault
                                        - return to caller for invalid cmd
                                        - reset disk adapter & boot time.
                                        - return fault status if fault occurs
                                        - handle MAX_CALLS exceeded
                                        - check the checksum read from disk

*/
/* Modified 86-11-20 by Bill Snapper to clear cmd pend after the list ptr
                                  has been retrieved from the spi. */
/* Modified 86-12-01 by Bill Snapper to add support for handling multiple disks
                                  concurrently. */
/* Modified 86-12-01 by Bill Snapper to put the checksum check in the
                                  correct place for callback. */
/* Modified 86-12-04 by Bill Snapper to support SET_INT_NO_CMD and have lists
                                  able to interrupt if necessary. */
/* Modified 86-12-10 by Bill Snapper to execute the halt command in the boot
                                  list to keep structures sanity.  */
/* Modified 86-12-31 by Bill Snapper to just return if a disk list is already
                                  in progress. */
/* Modified 87-01-14 by Bill Snapper to move READ_DEFECT label into real code
                                  area. */
/* Modified 87-01-14 by Bill Snapper to add support for VERIFY_CMD. */
/* Modified 87-01-20 by Bill Snapper to add a configured bit to the dli
                structure.  This is necessary in order to know if the disk
                adapter has to be reset before trying to talk to it. */
/* Modified 87-02-02 by Bill Snapper to use the K105_MODELX number instead
                of the DISK id defined in iop_adapter_types.  For initial
                testing both will be recognized. */
/* Modified 87-02-05 by Bill Snapper to set the list pointer up correctly in
                timer callback. */
/* Modified 87-02-05 by Bill Snapper to change disk_boot so it can be called
                by the module iop_boot.  This is to support multiple device
                boot capability. */
/* Modified 87-02-05 by Bill Snapper to support remaining disk list emulation
                commands. */
/* Modified 87-02-16 by Bill_Snapper to change name if disk_address include
                file to iop_disk_address. */
/* Modified 87-02-18 by Bill Snapper to add fault flag to dli structure,
                                        add list_flag to dli structure,
                                        remove external static var hacks,
                                        localize list pointer updating */
/* Modified 87-02-19 by Bill Snapper to save and restore the world when
                entering and exiting callback. */
/* Modified 87-02-19 by Bill Snapper to add support for READ_DEFECTS/RD_HDR */
/* Modified 87-02-20 by Bill Snapper to pass back real status from disk request
                ring. */
/* Modified 87-02-24 by Bill Snapper to add iop status into disk_status. */
/* Modified 87-02-25 by Bill Snapper to check the status returned from mailbox
                commands.  First pass check the SEEK_CMD status and if a failure
                occurs set .halted and .fault and kill list. */
/* Modified 87-03-24 by Bill Snapper to not continue on with any control
      commands if there are current data_xfer operations in progress. */
/* Modified 87-03-24 by Bill Snapper to not increment .num_calls for buffers
      that are not in progress. */
/* Modified 87-04-01 by Bill Snapper to remove ALL reference to the adapter
      type DISK and only support K105_MODELX.  If the halt_on_error bit is
      set in a list entry, do not complete list, abort.  However, if it is not
      set and an error occurs I will attempt to complete the list. */
/* Modified 87-04-02 by Bill Snapper to check if dli.vecx is a real vector. */
/* Modified 87-04-09 by Bill Snapper to initialize status pointer in the
      correct place during callback. */
/* Modified 87-04-09 by Bill Snapper to move the list processing loop outside
      of the do i = 0 to 1 loop in callback. */
/* Modified 87-04-17 by Bill Snapper to add halt_on_error to initial boot list
      built so that error detection can occur. */
```

```
/* Modified 87-04-21 by Bill Snapper to check error bits in status word in both
     callback and disk polling. Do not transfer data if an error occurs and
     also set appropriate error status bits.  FOR INITIAL TESTING DO THIS ONLY
     IN POLLING.  IF IT WORKS ADAPT TO CALLBACK. */
/* Modified 87-04-22 by Bill Snapper to add a SEEK in the boot list to insure
     that the drive gets on proper cylinder at boot time. */
/* Modified 87-04-30 by Bill Snapper to allow iop prom to use all of the
     available request buffers on the disk ioa.  This should increase
     performance for list io greater than a single block.  Mainly speeding
     up format_disk and test_disks. */
/* Modified 87-05-18 by Bill Snapper to use timer callback when resetting a ioa
     if ES is running. */

/* End of modification history */

iop_disk_lists: proc;

%replace  MAX_REQUESTS        by 27;


/* Includes */
/* %include  'adapter_error_equates' */;
/* FILE: Adapter Error Codes -- Error code registry for IOP adapter boards    */

/* MBX Ownership byte definitions */
%replace MBX_OWNER__ADAPTER_OWNS_MBX     by   '80'b4; /* Adapter/GIOC          */
                                                      /* ownership flag:       */
                                                      /*  80x = adapter owns   */
                                                      /*  mailbox              */
%replace MBX_OWNER__GIOC_OWNS_MBX        by   '00'b4; /* Adapter/GIOC          */
                                                      /* ownership flag:       */
                                                      /*  00x = IOP owns       */
                                                      /*  mailbox              */

/* Success and failure status prefix codes */
%replace MBX_STS__GT_SUCCESS    by  'FF000001'b4; /* Status for successful    */
                                                  /*  GENERIC TEST            */

%replace MBX_STS_SP             by  'FF000001'b4; /* Same success prefix as   */
                                                  /*  above                   */

%replace MBX_STS__GT_FAILURE_PREFIX by 'FE000001'b4; /* Prefix for errors     */
                                                  /*  encountered during a    */
                                                  /*  GENERIC TEST            */

%replace MBX_STS_FP             by  'FE000001'b4; /* Same error prefix as     */
                                                  /*  above                   */

/* Success status codes */
%replace MBX_STS__ADAPTER_OK          by  'FF000002'b4; /* OK Status msg      */
%replace MBX_STS__START_FUNC_TEST     by  'FF000003'b4; /* Response to a      */
                                                        /*  Test_All          */
%replace MBX_STS__ADAPTER_RESETTING   by  'FF000004'b4; /* Resetting          */
%replace MBX_STS__ADAPTER_HALTING     by  'FF000005'b4; /* Halt               */
%replace MBX_STS__NULL_CMD_RESPONSE   by  'FF000006'b4; /* Response to a      */
                                                        /*  null command      */
%replace MBX_STS__NEXT_BUFFER_READY   by  'FF000007'b4; /* Response to a      */
                                                        /*  dump buffer       */
%replace MBX_STS__OPERATION_IN_PROGRESS by 'FE000007'b4; /* Mark this         */
                                                        /*  operation in progress */

/* ERROR CODES */
%replace MBX_ERR__UNIMPLEMENTED_FEATURE by 'FE000060'b4; /* Some Non-Feature*/
                                                        /*  was requested     */
%replace MBX_ERR__ILLEGAL_CMD       by  'FE000070'b4; /* Illegal/unknown      */
                                                      /*  adapter command     */
                                                      /*  received            */
%replace MBX_ERR__OP_IN_PROGRESS    by  'FE000071'b4; /* Operation was        */
                                                      /*  requested before    */
                                                      /*  previous finished   */
%replace MBX_ERR__NO_CMD_GIVEN      by  'FE000072'b4; /* Mailbox recv'd       */
                                                      /*  but no command given */
%replace MBX_ERR__BAD_ACK_RESPONSE  by  'FE000073'b4; /* Response to          */
```

```
                                              /*  send was not an ACK        */
%replace MBX_ERR__INVALID_TEST_NUMBER by 'FE000075'b4; /* Requested test     */
                                              /*  does not exist             */
%replace MBX_ERR__UNKNOWN_COMMAND    by  'FE000076'b4; /* Requested          */
                                              /*  command is unknown         */
%replace MBX_ERR__COMMAND_NOT_FOUND by  'FE000077'b4; /* Requested           */
                                              /*  command is unknown         */

%replace MBX_ERR__BUS_ERROR             by 'FE000100'b4; /* Bus Error              */
%replace MBX_ERR__INSTR_ERROR           by 'FE000101'b4; /* Instruction Error      */
%replace MBX_ERR__TRAP                  by 'FE000102'b4; /* Trap Instruction       */
%replace MBX_ERR__UNEXP_INTR_ERROR      by 'FE000103'b4; /* Bogus Interrupt        */
%replace MBX_ERR__JUMP_0_ERROR          by 'FE000104'b4; /* PC jumped to zero      */
%replace MBX_ERR__ERROR_CALL_ERROR      by 'FE000105'b4; /* JSR ERROR call         */
%replace MBX_ERR__ERROR_TRAP_0_ERROR    by 'FE000106'b4; /* TRAP 0 error call      */
%replace MBX_ERR__BAD_HARDWARE_ERROR    by 'FE000107'b4; /* Bad Hardware error     */
%replace MBX_ERR__RESVD_INSTR_ERROR     by 'FE000108'b4; /* Reserved Instruction*/
%replace MBX_ERR__INSTR_TRACE           by 'FE000109'b4; /* Trace Trap             */


/* NOTE: The following status codes will DISAPPEAR at first release!!!      */
/* %replace MBX_STS__SUCCESS     by   '0000F000'b4; /* Status for successful   */
                                              /*  Cmd Done                   */

/* %replace MBX_STS__ADAPTER_FAILURE_PREFIX by '0000F000'b4; /* Status word */
                                              /*  prefix value for           */
                                              /*  adapter failures           */

%replace MBX_STS__SUCCESS          by  MBX_STS__GT_SUCCESS; /* Success status   */
%replace MBX_STS__ADAPTER_FAILURE_PREFIX by MBX_STS__GT_FAILURE_PREFIX;
                                              /* Prefix for errors           */
/* %include  'adapter_test_equates' */;
/*  adapter_test_equates.incl.pl1 */

/* ************************************************************************** */
/*   Adapter Local Command Codes in no particular order

     This  include  file  contains  the  known  commands  for all adapters
     currently supported as of 26-Feb-1987.  It is subject  to  change  as
     demands require. */

/* ************************************************************************** */

/* NOTE: Command codes 0-255 (0x-0FFx) are reserved to general handler       */

%replace NULL_GIOC_COMMAND                 by     0;  /* This command        */
                                                      /*  MUST BE ZERO!!     */
%replace GENERIC_CMD__RE_INIT_BOARD        by     1;  /* Restart the prom    */
                                                      /*  like hard init     */
%replace GENERIC_CMD__RESET_BOARD          by     2;  /* Obsolete -- did hard */
                                                      /*  68K reset          */
%replace GENERIC_CMD__EXECUTE_SINGLE_TEST by    3;  /* Execute one test    */
                                                      /*  with params        */
%replace GENERIC_CMD__STOP_PROCESSOR       by     4;  /* Execute a           */
                                                      /*  'stop processor'   */
%replace GENERIC_CMD__RETURN_STATUS        by     5;  /* Return status for   */
                                                      /*  current op         */
%replace GENERIC_CMD__RETURN_ERROR_INFO by      6;  /* Return extra        */
                                                      /*  error information  */
%replace GENERIC_CMD__CHECKSUM_WHOLE_ROM by     7;  /* Checksum the        */
                                                      /*  entire EEPROM      */
%replace GENERIC_CMD__CHECKSUM_ID_ROM      by     8;  /* Checksum the ID     */
                                                      /*  part of EEPROM     */
%replace GENERIC_CMD__START_PROC_IN_MEM by      9;  /* Xfer program control */
                                                      /*  to an addr         */
%replace GENERIC_CMD__ALLOCATE_XFER_BUF   by    10;  /* Give a large buffer  */
                                                      /*  to GIOC            */
%replace GENERIC_CMD__MOVE_BUF_TO_LOMEM   by    11;  /* Move allocated buffer */
                                                      /*  to lo mem          */
%replace GENERIC_CMD__MOVE_LOMEM_TO_BUF by     12;  /* Move lo mem to      */
                                                      /*  allocated buffer   */
%replace GENERIC_CMD__EXECUTE_ALL_TESTS by     13;  /* Execute all tests just */
                                                      /*  like the Mfg version */
                                                      /*  of prom does       */
```

```
%replace GENERIC_CMD__RETURN_CMD_LIST      by   14; /* Return a list of adap    */
                                                    /*  exec cmds               */
%replace GENERIC_CMD__RETURN_COMMAND_INFO by   15; /* Return info on           */
                                                    /*  specified cmd           */
%replace GENERIC_CMD__RETURN_TEST_INFO     by   16; /* Return info on           */
                                                    /*  specified test          */
%replace GENERIC_CMD__BUFFER_READ_ACK      by   17; /* ACK receipt of a dump    */
                                                    /*  buffer                  */
%replace GENERIC_CMD__INIT_MEMORY          by   18; /* Clear parity errs from   */
                                                    /*  memories                */
%replace GENERIC_CMD__RUN_SHORT_TESTS      by   19; /* Run the                  */
                                                    /*  short-test suite        */
%replace GENERIC_CMD__RETURN_REV_INFO      by   20; /* Return the board sw rev  */
                                                    /*  and ID prom area        */
%replace GENERIC_CMD__DUMP_ALL_MEMORY      by   21; /* Dump all adapter data    */
                                                    /*  memory and devices      */
%replace GENERIC_CMD__PANIC_DUMP_MEMORY    by   22; /* Dump critical pages for  */
                                                    /*  crash analysis          */
%replace GENERIC_CMD__DO_NEXT_DUMP_PAGE    by   23; /* Process the next dump    */
                                                    /*  page in sequence        */

/* Following is the last legal command in the generic sequence...               */
%replace GENERIC_CMD__QUIESCE              by  255; /* Stop running tests       */
                                                    /*  -- await cmd            */

/* ---------------------------------------------------------------------------- */
/* TEMP HACK:  Several  commands  currently  used  by the Enet boards were
               reassigned by this file on 5-Nov.  They will temporarily be
               reinstated to their previous values, until all software can
               be changed simultaneously.  At this  time,  dual  mnemonics
               for  these operations will be supplied, with the old values
               being listed as OLD_xxx and the  new  values  assuming  the
               simple form of the name.  ALL NEW SOFTWARE MUST support the
               new  values  as well as the old, until release is obtained,
               but old software will be obsoleted when the old values  are
               dropped.  */

/* ---------------------------------------------------------------------------- */
/* **************************************************************************** */
/* Disable the following command at install time:
%replace GENERIC_CMD__QUIESCE              by  128; /* Shutdown current op      */
/* Disable the following command at install time:
%replace GENERIC_CMD__ALLOCATE_XFER_BUF    by  133; /* Give a large buffer      */
                                                    /*  to GIOC                 */
/* Disable the following command at install time:
%replace GENERIC_CMD__MOVE_BUF_TO_LOMEM    by  134; /* Move allocated buffer    */
                                                    /*  to low memory           */
/* Disable the following command at install time:
%replace GENERIC_CMD__START_PROG_IN_MEM    by  135; /* Xfer program control     */
                                                    /*  to an address           */
/* Disable the following command at install time:
%replace GENERIC_CMD__MOVE_LOMEM_TO_BUF    by  136; /* Move low memory to       */
                                                    /*  allocated buffer        */
/* **************************************************************************** */

/* NOTE: This section is a command registry! */

/* ACOMM/DCOMM BOOT COMMANDS */

%replace BOOT_CMD__CONFIGURE_CONSOLE       by  257; /* Configure console        */
%replace BOOT_CMD__GIOC_MSG_OUT            by  258; /* Output msg to console    */
%replace BOOT_CMD__GIOC_BYTE_IN            by  259; /* Check for character      */
                                                    /*  from console            */
%replace BOOT_CMD__GIOC_MSG_IN             by  260; /* Input msg from console   */

/* DISK TESTS -- Only debugging commands are catalogued at this time */
%replace SMAC_CMD__WRITE_BLINDLY           by  270; /* Write block to disk      */
%replace SMAC_CMD__READ_BLINDLY            by  271; /* Read block from disk     */
%replace SMAC_CMD__WRITE_MULTI             by  272; /* Perform multiple-block   */
                                                    /*  dbg xfer                */
%replace SMAC_CMD__READ_MULTI              by  273; /* Perform multiple-block   */
                                                    /*  dbg xfer                */
%replace SMAC_CMD__CONTINUE_MULTI          by  274;
```

```
/* ENET TESTS -- All Enet tests are also assigned command numbers... */
%replace ENET_CMD__CONTROL_REG_TEST_0   by   284; /* Test control register   */
                                                  /*  bits                    */
%replace ENET_CMD__STATUS_REG_TEST_0    by   285; /* Test status register    */
                                                  /*  bits                    */
%replace ENET_CMD__MEMORY_TEST_0        by   286; /* Test all 0's patt on    */
                                                  /*  main mem                */
%replace ENET_CMD__MEMORY_TEST_1        by   287; /* Test all 1's patt on    */
                                                  /*  main mem                */
%replace ENET_CMD__MEMORY_TEST_2        by   288; /* Rotating bit pat on     */
                                                  /*  main mem                */
%replace ENET_CMD__MEMORY_TEST_3        by   289; /* Test main memory parity */
%replace ENET_CMD__MEMORY_TEST_4        by   290; /* Test main memory        */
                                                  /*  data=addrs              */
%replace ENET_CMD__MEMORY_TEST_5        by   291; /* Test fram parity        */
%replace ENET_CMD__MEMORY_TEST_6        by   292; /* Test fram               */
%replace ENET_CMD__MEMORY_TEST_7        by   293; /* Test fram               */
%replace ENET_CMD__RESTORE_ROM_VECTORS  by   294; /* Try to catch interrupts */
%replace ENET_CMD__TIMER_TEST_0         by   295; /* Test TIMER counter      */
%replace ENET_CMD__TIMER_TEST_1         by   296; /* Test TIMER interrupt    */
                                                  /*  logic                   */
%replace ENET_CMD__TIMER_TEST_2         by   297; /* Test TIMER interrupt    */
                                                  /*  mask logic              */
%replace ENET_CMD__TIMER_TEST_3         by   298; /* Test G_A TIMER          */
                                                  /* intervals                */
%replace ENET_CMD__TIMER_TEST_4         by   299; /* Test TIMER interrupts   */
%replace ENET_CMD__TIMER_TEST_5         by   300; /* Test TIMER interrupt    */
                                                  /*  mask logic              */
%replace ENET_CMD__LANCE_SETUP          by   301; /* Setup LANCE for         */
                                                  /*  xmit/receive            */
%replace ENET_CMD__LANCE_TEST_0         by   302; /* Stop the LANCE          */
%replace ENET_CMD__LANCE_TEST_1         by   303; /* Init the LANCE          */
%replace ENET_CMD__LANCE_TEST_2         by   304; /* Start the LANCE         */
%replace ENET_CMD__LANCE_TEST_3         by   305; /* Xmit a packet and       */
                                                  /*  check flags             */
%replace ENET_CMD__LANCE_TEST_4         by   306; /* Rcv xmit'd packet &     */
                                                  /*  check flags             */
%replace ENET_CMD__LANCE_TEST_5         by   307; /*.Test LANCE interrupt    */
                                                  /*  logic                   */
%replace ENET_CMD__LANCE_TEST_6         by   308; /* Test LANCE interrupt    */
                                                  /*  mask logic              */
%replace ENET_CMD__LANCE_TEST_7         by   309; /* Test LANCE external     */
                                                  /*  loopback                */
%replace ENET_CMD__ALL_LANCE_TESTS      by   310; /* Stop the LANCE          */

/* ACOMM TESTS */
%replace ACOMM_CMD__MEMORY_TEST_0       by   323; /* Test with data = addrs  */
%replace ACOMM_CMD__MEMORY_TEST_1       by   324; /* Test with rotating      */
                                                  /*  pattern                 */
%replace ACOMM_CMD__MEMORY_TEST_3       by   325; /* Parity error test       */
%replace ACOMM_CMD__CONTROL_REG_TEST_0  by   326; /* Test control/status     */
                                                  /*  regs                    */
%replace ACOMM_CMD__TIMER_TEST_0        by   327; /* Test timer counters     */
%replace ACOMM_CMD__TIMER_TEST_1        by   328; /* Test timer interrupts   */
%replace ACOMM_CMD__TIMER_TEST_2        by   329; /* Test timer interrupt    */
                                                  /*  mask                    */
%replace ACOMM_CMD__SCC_TEST_0          by   330; /* Test read/write         */
                                                  /*  scc regs                */
%replace ACOMM_CMD__SCC_TEST_1          by   331; /* Test scc                */
                                                  /*  loopback,polling        */
%replace ACOMM_CMD__SCC_TEST_2          by   332; /* Test scc                */
                                                  /*  loopback,interrupts     */
%replace ACOMM_CMD__SCC_TEST_3          by   333; /* Test scc sync loopback  */
%replace ACOMM_CMD__MEMORY_TEST_2       by   334; /* Execute scc_test_1      */
                                                  /*  in ram                  */
%replace ACOMM_CMD__SCC_EXT_LOOPBACK    by   335; /* Requires ext connectors */
%replace ACOMM_CMD__INIT_BOARD          by   336; /* Init ram, timers, scc's */

/* CCOMM TESTS */
%replace CCOMM_CMD__MEMORY_TEST_0       by   340; /* Test with data = addrs  */
%replace CCOMM_CMD__MEMORY_TEST_1       by   341; /* Test with rotating      */
                                                  /*  pattern                 */
%replace CCOMM_CMD__MEMORY_TEST_3       by   342; /* Parity error test       */
%replace CCOMM_CMD__CONTROL_REG_TEST_0  by   343; /* Test control/status     */
                                                  /*  regs                    */
```

```
%replace CCOMM_CMD__TIMER_TEST_0          by   344; /* Test timer counters      */
%replace CCOMM_CMD__TIMER_TEST_1          by   345; /* Test timer interrupts    */
%replace CCOMM_CMD__TIMER_TEST_2          by   346; /* Test timer interrupt     */
                                                    /*  mask                    */
%replace CCOMM_CMD__SCC_TEST_0            by   347; /* Test read/write          */
                                                    /*  scc regs                */
%replace CCOMM_CMD__SCC_TEST_1            by   348; /* Test scc                 */
                                                    /*  loopback,polling        */
%replace CCOMM_CMD__SCC_TEST_2            by   349; /* Test scc                 */
                                                    /*  loopback,interrupts     */
%replace CCOMM_CMD__SCC_TEST_3            by   350; /* Test scc sync loopback   */
%replace CCOMM_CMD__MEMORY_TEST_2         by   351; /* Execute scc_test_1       */
                                                    /*  in ram                  */
%replace CCOMM_CMD__SCC_EXT_LOOPBACK      by   352; /* Requires ext connectors  */
%replace CCOMM_CMD__INIT_BOARD            by   353; /* Init ram, timers, scc's  */
/* UCOMM TESTS -- All Ucomm tests are also assigned command numbers... */
%replace UCOMM_CMD__CONTROL_REG_TEST_0    by   360; /* Test control             */
                                                    /*  register bits           */
%replace UCOMM_CMD__STATUS_REG_TEST_0     by   361; /* Test status              */
                                                    /*  register bits           */
%replace UCOMM_CMD__MEMORY_TEST_0         by   362; /* Test all 0's pattern     */
                                                    /*  on main mem             */
%replace UCOMM_CMD__MEMORY_TEST_1         by   363; /* Test all 1's pattern     */
                                                    /*  on main mem             */
%replace UCOMM_CMD__MEMORY_TEST_2         by   364; /* Rotating bit pat on      */
                                                    /*  main mem                */
%replace UCOMM_CMD__MEMORY_TEST_3         by   365; /* Test main memory parity  */
%replace UCOMM_CMD__MEMORY_TEST_4         by   366; /* Test main memory         */
                                                    /*  data=addrs              */
%replace UCOMM_CMD__RESTORE_ROM_VECTORS   by   367; /* Maint - Try to catch     */
                                                    /*  interrupts              */
%replace UCOMM_CMD__TIMER_TEST_0          by   368; /* Test TIMER cntrs and     */
                                                    /*  zero timer              */
%replace UCOMM_CMD__TIMER_TEST_1          by   369; /* Test TIMER interrupt     */
                                                    /*  logic                   */
%replace UCOMM_CMD__TIMER_TEST_2          by   370; /* Test TIMER interrupt     */
                                                    /*  mask logic              */
%replace UCOMM_CMD__SCC_TEST_0            by   371; /* Write/Read SCC           */
                                                    /*  registers               */
%replace UCOMM_CMD__SCC_TEST_1            by   372; /* SCC non-interrupt        */
                                                    /*  loopback test           */
%replace UCOMM_CMD__SCC_TEST_2            by   373; /* SCC interrupt and        */
                                                    /*  loopback test           */
%replace UCOMM_CMD__SCC_TEST_3            by   374; /*          * NULL *        */
%replace UCOMM_CMD__SCC_TEST_4            by   375; /*          * NULL *        */
%replace UCOMM_CMD__SCC_TEST_5            by   376; /*          * NULL *        */
%replace UCOMM_CMD__SCC_TEST_6            by   377; /*          * NULL *        */
%replace UCOMM_CMD__DMAC_TEST_0           by   378; /* Test DMA regs with       */
                                                    /*  reads only              */
%replace UCOMM_CMD__DMAC_TEST_1           by   379; /* Test DMA read/write      */
                                                    /*  registers               */
%replace UCOMM_CMD__DMAC_TEST_2           by   380; /* Test DMAC/SCC r/w        */
                                                    /*  operations              */
%replace UCOMM_CMD__DMAC_TEST_3           by   381; /* Test DMAC/SCC            */
                                                    /*  array operations        */
%replace UCOMM_CMD__DMAC_TEST_4           by   382; /* Test DMAC/SCC            */
                                                    /*  linked array ops        */
%replace UCOMM_CMD__DMAC_TEST_5           by   382; /* Test DMAC interrupts     */

/* CTAPE TESTS */

%replace CTAPE_CMD__GO_TO_APPL_CODE       by   400; /* Go to application code   */
%replace CTAPE_CMD__TEST_ALL              by   401; /* Run all tests            */
%replace CTAPE_CMD__MEMORY_TEST_0         by   402; /* Ram initialization       */
%replace CTAPE_CMD__MEMORY_TEST_1         by   403; /* Ram pattern test         */
%replace CTAPE_CMD__MEMORY_TEST_2         by   404; /* Ram address test         */
%replace CTAPE_CMD__MEMORY_TEST_3         by   405; /* Concurrent memory test   */
%replace CTAPE_CMD__SCSI_LOOPBACK         by   406; /* Scsi loopback test       */
%replace CTAPE_CMD__TIMER_TEST            by   407; /* G.A. Interval            */
                                                    /*  timer test              */
%replace CTAPE_CMD__INTERRUPT_TEST        by   409; /* Interrupt test           */
%replace CTAPE_CMD__COMPARATOR_TEST       by   409; /* Comparator test          */
/* Reserve the following for old software...
%replace CTAPE_CMD__DMA_TEST              by   410; /* Reserved for Bill        */
%replace CTAPE_ROOT                       by   410; /* Get tape fw magic ptrs   */
```

```
%replace CTAPE_CMD__DMA_TEST              by   411; /* DMA test                   */
%replace CTAPE_CMD__GATE_ARRAY_TEST       by   412; /* Set code, broken,          */
                                                    /*  red light tests           */


/* DISK COMMANDS */
%replace  DISK_CMD_BASE                   by 500;

%replace  DISK_LIST_CMD_MIN               by 532;   /* VOS list command 32 */
%replace  DISK_LIST_CMD_MAX               by 635;   /* VOS list command 135 */


/* ACOMMP COMMANDS */
%replace  MIN_ACOMMP_CMD                  by 700;
%replace  MAX_ACOMMP_CMD                  by 800;

/* other equates */

%replace  IOA_START_ADDR                  by   0;
%replace  IOA_DIAG_MBX_PTR_ADDR           by   2098180;
%replace  IOA_BOARD_ID_PTR_ADDR           by   2098176;
%replace  IOA_MBX_STATUS_SUCCESS          by   61440;
%replace  IOA_UNIVERSAL_ADDR              by   -1;


/* %include  'board_id_structure' */;
/*   ***begin copyright*** *****************************  */
/*                                                        */
/*   STRATUS CONFIDENTIAL INFORMATION: CLASS II           */
/*   COPYRIGHT (c) Stratus Computer, Inc. 1985            */
/*                                                        */
/*   This  program  contains  confidential and proprietary */
/*   information  of  Stratus Computer, Inc.,  and  any   */
/*   reproduction, disclosure, or use in whole or in part */
/*   is  expressly  prohibited,  except  as  may  be      */
/*   specifically authorized by prior written agreement or */
/*   permission of Stratus.                               */
/*                                                        */
/*   ***end copyright*** *******************************  */
/*   Begin include file board_id_structure.incl.pl1       */

/*   Board Id pointer is in location 1024 of any adapter board
     and it points the board id structure in EEPROM.  Use utility
     function to get this pointer after selecting the adapter.

*/

%replace  MAX             by   5;             /*allow last five board services*/
%replace  ID_VERSION      by   2;             /* Version of the structure. */

dcl  board_id_ptr         ptr;

dcl  1 board_id           based (board_id_ptr),
       2 version          fixed bin (15),     /* Structure revision number */
       2 board_type       fixed bin (15),
       2 flags,
         3 bootable       bit (1),            /* adapter is bootable */
         3 self_test      bit (1),            /* adapter has self test */
         3 pad            bit (14),           /* unused */
       2 model            char (4),           /* alphanumeric model */
       2 serial_number    fixed bin (31),     /* board serial num */
       2 revision         fixed bin (15),     /* board revision level */
       2 art_work_rev     fixed bin (15),     /* board artwork level */
       2 min_gioc_rev     fixed bin (15),     /* gioc compatibility */
       2 num_serviced     fixed bin (15),     /* # of times serviced */
       2 history (MAX),                       /* board history */
         3 service_date   fixed bin (31),     /* repair info */
         3 service_code   fixed bin (15),
       2 code_checksum    fixed bin (15),     /* Calculated checksum. */
       2 checksum         fixed bin (15);     /* structure safety check */

/*  End include file board_id_structure.incl.pl1              */
```

```
/* %include 'ioa_mailbox' */;
/*                        ioa_mailbox.incl.pl1
                          --------------------

     This include file contains the mailbox used to communicate
     between an IOA and the IOP.  Several overlaid definitions
     exist, which are used under different circumstances, such
     as dumping or IOA program debugging.

*/

/* Define typical IOA mailbox pointer.                                   */
dcl  ioa_mbxp              ptr; /* ioa_mbxp = contents of 200404x in ioa */

/* Original mbx template */
dcl  1 ioa_mbx    like ioa_mbx_template  based( ioa_mbxp );

dcl  1 ioa_mbx_template   based,
       2 command           fixed bin(15),
       2 buffer_addr       fixed bin(31),
       2 status            bit(32) aligned,
       2 f,
       * 3 ownership       bit(1),    /* = '0' = iop;  = '1' = ioa */
         3 mbz             bit(7),
         3 io_tag          char(1),
       2 msg_in            char(80) var,
       2 msg_out           char(80) var,
       2 more_info         bit(1) aligned,
       2 xtra_ptr          fixed bin(31);

/* Dump mailbox template */
dcl  1 ioa_mbx_dump   like ioa_mbx_dump_tpl based( ioa_mbxp );

dcl  1 ioa_mbx_dump_tpl   based,
       2 outbox_offset     char(92) var,       /* Not used for dumping          */
       2 mbz               fixed bin(15),      /* Must be zero for dump         */
       2 page_num          fixed bin(15),      /* Current adapter dump page     */
       2 data_type         fixed bin(15),      /* Dump data type                */
       2 absolute_addr     fixed bin(31),      /* Real IOA addr of dump data    */
       2 buf_byte_cnt      fixed bin(15),      /* Num bytes xfer'd this time    */
       2 page_seq_num      fixed bin(15),      /* Adapter's seq # for page      */
       2 remaining_cnt     fixed bin(15);      /* Num bytes still to be xfer'd */
/*     2 unused_str_o      char(70) var;       /* Not used for dumping          */

/* Command info mailbox template */
dcl  1 ioa_mbx_cmdinfo    like ioa_mbx_c_i_tpl based( ioa_mbxp );
dcl  1 ioa_mbx_c_i_tpl    based,
       2 outbox_offset     char(92) var,       /* Not used for command info     */
       2 sw_rev            fixed bin(15);      /* Board's software revision     */
/*     2 unused_str_o      char(64) var;       /* Not used for dumping          */

%replace IOA_MAILBOX_PTR_ADDR by   2098180;
%replace IOP_OWNER by '0'b;
%replace IOA_OWNER by '1'b;

/*   Brief description of protocol for diagnostic usage.
     ---------------------------------------------------

     The mailbox begins life with the IOP having ownership ( ownership =
     '0' ) and when the IOP has placed all the pertinent information in
     the box it will change ownership over to the IOA.  The IOP will then
     set the int_to_device bit in the IOA's Gate Array, which the adapter
     should be polling in order to know when a command has arrived.  It
     is not advised for the adapters to have their interrupts enabled at
     this point in time, and this is the reason for polling the
     int_to_device bit.

     The ownership bit works in conjunction with the int_to_device bit.
     This should cover the case where an adapter detects a faulty
     int_to_device bit.  Therefore the adapter should only process a
     command if the int_to_device bit and the ownership bit are both set.

     Structure definitions.
     ----------------------
```

```
ioa_mbx.command ( input/output )
      - This is the command for the IOA to execute. On output it
        indicates the command executed by the IOA.

ioa_mbx.buffer_addr ( input/output )
      - Universal buffer longword address. The address of the
        primary buffer for an operation is placed here.

ioa_mbx.status ( output )
      - This will be filled in by the adapter indicating the
        status of the board, commands, etc...

ioa_mbx.ownership ( input/output )
      - This bit defines who the current owner of the mailbox is.  If
        this bit = '0'b then the IOP currently owns the mailbox, otherwise
        the adapter has ownership.

ioa_mbx.f.id_tag ( mailbox owner )
      - Id tag used by IOP-side processes only (not used by IOA)
        to encode owner of current mailbox op in order to prevent
        one IOP process from using another process's returned mbx.

ioa_mbx.msg_in ( input )
      - This is defined as a char(80) varying buffer.  It will be command
        dependent and can therefore have different meanings with overlays
        describing it.  However, the first two bytes will always specify
        the number of bytes in the buffer.  Whether the commands choose to
        use them is up to the individual command.

ioa_mbx.msg_out ( output )
      - This buffer is for the ioa to send data to the iop.  Again, the
        same applies to this buffer as to the .msg_in described above.
ioa_mbx.more_info ( input/output )
      - On output this signifies that there is more information than
        will fit into the msg_out buffer. Input meaning is command
        dependent.

ioa_mbx.xtra_ptr ( input/output )
      - The meaning of this pointer is command dependent, though
        generally it is used as a pointer to extra data that would
        not fit in the primary buffer, or as the secondary pointer
        for a command.

*/
/* %include 'iop_disk_address' */;
/* Begin include file ... disk_address.incl.pl1  86-06-04 */

/* This include file defines the IOP disk queue structures */

declare disk_addressp     ptr;
declare 1 disk_address like disk_address_template based (disk_addressp);

declare 1 disk_address_template based,
          2 cylinder              fixed bin (15),    /* As above, decomposed */
          2 head                 fixed bin(15),
          2 sector                fixed bin (15);

/* End include file ... disk_address.incl.pl1 */
/* %include 'disk_cmds' */;
/* Begin include file ... disk_cmds.in  80-08-10 */

/* Controller commands */

%replace START_DRIVE_CMD        by  128;  /* 80x */
%replace KILL_CUR_LIST_CMD      by  144;  /* 90x */
%replace RESTART_DRIVE_CMD      by    0;  /* Restart same list addr */
%replace BOOT_FROM_DRIVE_CMD    by    1;
%replace RUN_SELF_TEST_CMD      by    2;
%replace ADD_MAILBOX            by  160;  /* a0x for D114's */
%replace DELETE_MAILBOX         by  161;  /* a1x for D114's */

/* List commands */
```

```
/* ***** WARNING:  You MUST change init_disk_data if you add new commands
                   to this list.                               ************* */

%replace READ_DEFECT             by  32;   /* Data Xfer */
%replace VERIFY_CMD              by  33;
%replace READ_HDR_CMD            by  34;
%replace FORMAT_CMD              by  35;

%replace READ_CMD                by  36;
%replace WRITE_CMD               by  37;
%replace READ_BIG_CMD            by  38;
%replace WRITE_BIG_CMD           by  39;


%replace WRITE_VERIFY_CMD        by  50;    /* IOP write verify */
%replace ADD_GEOMETRY_CMD        by  51;    /* IOP add disk geometry */

%replace SEEK_CMD                by 132;   /* Seek */
/* Control commands set "ready" bit in summary status byte */

%replace JUMP_CMD                by  64;   /* Control */
%replace SET_INT_NO_CMD          by  65;
%replace HALT_CMD                by  66;
%replace WAIT_CMD                by  67;
%replace RESET_DRIVE_CMD         by  68;
%replace RESET_INT_NO_CMD        by  69;
%replace FIND_PRESENT_DRIVE      by  70;   /* also sets "drive_exists" */
%replace DIAG_SEEK_1_CMD         by  71;

%replace SOFT_RESET_CMD          by 128;
%replace SEQ_UP_CMD              by 129;   /* Control */
%replace SEQ_DOWN_CMD            by 130;
%replace RESTORE_CMD             by 131;
%replace RESET_FAULT_CMD         by 133;
%replace GET_CYL_CMD             by 134;
%replace DIAG_SEEK_2_CMD         by 135;

                                           /* Following only on D107/D106 */
%replace SET_RED_LIGHT_CMD       by 16;
%replace CLR_RED_LIGHT_CMD       by 17;
%replace SET_BLB_CMD             by 18;    /* Buffer Loop Back */
%replace GET_EXT_STATUS_CMD      by 19;
%replace RESET_BLB_CMD           by 20;    /* Buffer Loop Back */
%replace SET_PWHM_CMD            by 21;    /* Post-write Header Match */
%replace RESET_PWHM_CMD          by 22;
%replace RELOAD_ADAPTER_CMD      by 23;
%replace READ_ADAPTER_PROM_CMD     by 43;  /* read id prom in disk director */

/* End include file ... disk_cmds.in */
/* %include  'disk_dcws' */;
/* Begin include file ... disk_dcws.incl.pl1  80-09-07 */

declare listp ptr;

declare 1 data_xfer based (listp),                         /* Data Transfer DCW */
          2 cmd char (1),
          2 flags,
/* %include 'disk_dcw_flags.incl.pl1'; */
            3 interrupt bit (1),
            3 retry bit (1),
            3 halt_on_error bit (1),
            3 padf bit (5),
          2 track bit (8),
          2 sector bit (8),
          2 memory_addr fixed bin (31),
          2 status_wd bit (32) aligned,

          2 next_dcw fixed bin; /* for addressing */

declare   fsip ptr;

declare 1 format_sector_info based (fsip),
          2 filler bit (7),
          2 bad_sector bit (1);
```

```
declare 1 seek based (listp),                         /* Seek DCW */
          2 cmd char (1),
          2 flags,
/* %include 'disk_dcw_flags.incl.pl1'; */
            3 interrupt bit (1),
            3 retry bit (1),
            3 halt_on_error bit (1),
            3 padf bit (5),
          2 cylinder bit (16),
          2 status_wd bit (32) aligned,

          2 next_dcw fixed bin; /* for addressing */

declare 1 control based (listp),                      /* Control DCW */
          2 cmd char (1),
          2 flags,
/* %include 'disk_dcw_flags.incl.pl1'; */
            3 interrupt bit (1),
            3 retry bit (1),
            3 halt_on_error bit (1),
            3 padf bit (5),
          2 value bit (16),
          2 status_wd bit (32) aligned,

          2 next_dcw fixed bin; /* for addressing */

/* End include file disk_dcws.incl.pl1 */
/* %include 'iop_prom_dli' */;
/* Begin disk_list_io.incl.pl1 */

%replace MAX_CALLS       by 150;   /* 150 * 20ms = 3 second maximum for now. */

dcl  base_dlip           ptr;
dcl  dlip                ptr; /* Disk List info pointer */

dcl  1 dli_array(0:13)   like dli_template based(base_dlip) volatile;

dcl  1 dli               like dli_template based(dlip);

dcl  1 dli_template      based,
       2 flags,
         3 mbz           bit(10),
         3 callback_req  bit(1),          /* Callback required. */
         3 reset_in_prog bit(1),          /* IOA going through reset init. */
         3 list_flag     bit(1),          /* List being processed. */
         3 fault         bit(1),          /* Fault occurred */
         3 in_prog       bit(1),          /* Disk io in progress. */
         3 cfg           bit(1),          /* Disk has been initialized */
       2 vecx            fixed bin(15),   /* Interrupt vector index. */
       2 list_headp      ptr,             /* Pointer to head of disk list. */
       2 cur_listp       ptr,             /* Current point within list. */
       2 cur_cylinder    fixed bin(15),
       2 num_ops_in_prog fixed bin(15),   /* Number of operations in progress. */
       2 req_list        bit(32) aligned,
       2 es_call_time    fixed bin(31),
       2 es_io           fixed bin(31);

/* End disk_list_io.incl.pl1 */
/* %include 'iop_prom_ext_stat' */;
/* Begin iop_prom_ext_stat.incl.pl1 */
/*   These are the external static variables used in the iop prom code.
     They are initialized in the module init_iop_prom_data.pl1
dcl  next_buffer_rdy      bit(32) aligned ext static;
dcl  next_buffer_rdy_bin  fixed bin(31) defined(next_buffer_rdy);
dcl  good_stat            bit(32) aligned ext static;
dcl  good_stat_bin        fixed bin(31) defined(good_stat);
dcl  op_in_prog           bit(32) aligned ext static;
dcl  op_in_prog_bin       fixed bin(31) defined(op_in_prog);
dcl  ioa_reset_otay_bits$ bit(32) aligned ext static;
dcl  ioa_reset_otay$      fixed bin(31) defined(ioa_reset_otay_bits$);
dcl  ioa_otay$            bit(1) aligned ext static;
/* End iop_prom_ext_stat.incl.pl1 */
/* %include 'disk_status' */;
/* Begin include file ... disk_status.incl.pl1   80-08-07 */
```

```
declare statp ptr;

declare 1 status based (statp),
          2 flags,
            3 completed              bit (1),
            3 drive_exists           bit (1),
            3 error                  bit (1),
            3 halted                 bit (1),
            3 ready                  bit (1),
            3 pad1                   bit (2),
            3 internal_read_failed bit (1),
          2 controller,
            3 disagree               bit (1),
            3 dma_error              bit (1),
            3 terminal_count         bit (1),
            3 record_not_found       bit (1),
            3 forced_nmi             bit (1),
            3 drive_not_busy         bit (1),
            3 verify_error           bit (1),
            3 crc_error              bit (1),
          2 sector_info,
            3 pad2                   bit (7),
            3 bad_sector             bit (1),
          2 drive,                   /* Valid ONLY for Priam drives */
            3 command_reject         bit (1),
            3 write_fault            bit (1),
            3 drive_fault            bit (1),
            3 drive_busy             bit (1),
            3 at_cyl_0               bit (1),
            3 seek_fault             bit (1),
            3 seek_complete          bit (1),
            3 drive_ready            bit (1);

dcl  1 status_chars            based(statp) ,
       2 flags                 char(1) ,
       2 controller            char(1) ,
       2 sector_info           char(1) ,
       2 drive                 char(1) ;

dcl  1 drive_smd defined(status_chars.drive), /* Valid ONLY for Smd drives */
       2 pad3                  bit (3),
       2 write_protected       bit (1),
       2 fault                 bit (1),
       2 seek_fault            bit (1),
       2 seek_complete         bit (1),
       2 drive_ready           bit (1);
dcl  1 iop_status              defined( status_chars.sector_info ),
       2 prom_error            bit(1),    /* IOP Prom detected error */
       2 entity_error          bit(1),    /* IOP entity detected error */
       2 checksum_error        bit(1),    /* Data checksum error */
       2 mbx_timeout           bit(1).    /* IOA mailbox timeout */
       2 req_timeout           bit(1),    /* IOA disk request timeout */
       2 dead_ioa              bit(1),    /* Either dead or non-existent ioa */
       2 verify_error          bit(1),    /* IOP dma verify error */
       2 mbz                   bit(1);

/* End include file ... disk_status.incl.pl1 */
/* %nolist;  %include  'error_codes'; %list; */

/* %include  'iop_prom_cfg' */;
/*         Initial boot configuration table.
           ---------------------------------
     This structure will remain in the iop just above the iop's stack.
*/

/*   sys_conp = sys_conp$    */
dcl  sys_conp               ptr;

dcl  1 sys_com              based( sys_conp ),
       2 slot               fixed bin(15), /* IOA chassis slot */
       2 flags,
         3 mbz              bit(14),
         3 rd_in_prog       bit(1),          /* START_READ in progress */
```

```
          3 cfg              bit(1),         /* Console configured */
        2 com_mbxp           ptr,            /* Pointer to vos comm mailbox */
        2 ioa_mbxp           ptr,            /* Pointer to ioa's mailbox */
        2 f_char             fixed bin(15),  /* f_char in data; OLD:Channel state */
        2 count              fixed bin(15),  /* number of characters being output */
        2 ucode_rev          fixed bin(15),  /* Prom code revision level */
        2 model              char(4),        /* Board id. */
        2 io_lock            ptr,            /* Board interlock pointer. */
        2 io_blockp          ptr;            /* Pointer to vos-bound io_block */

/*   bdp = bdp$; */
/*   bdcbp = boot disk control block pointer    */
dcl  bdcbp                   ptr;
dcl  1 boot_disk             based( bdcbp ),
        2 slot               fixed bin(15),
        2 flags,
          3 mbz              bit(14),
          3 io_in_prog       bit(1),
          3 cfg              bit(1),
        2 disk_mbxp          ptr,
        2 virt_ptr           ptr,
        2 io_lock            fixed bin(31),
        2 state              fixed bin(15),
        2 ucode_rev          fixed bin(15),
        2 model              char(4);

/* ICP ES to PROM interface info. */
dcl  esip                    ptr;      /* Ptr to es interface structure. */

%replace  MIN_INT            by 1;
%replace  MAX_INT            by 16;
%replace  ES_VECX            by 16;
dcl  1 es                    based( esip ),
        2 running            bit(1) aligned,
        2 callback           entry( entry, fixed bin(31), fixed bin(31),
                                    fixed bin(15), fixed bin(31),
                                    fixed bin(15) ) variable,
        2 revoke_call        entry( fixed bin(31), fixed bin(15) ) variable,
        2 reset_list(0:15)      bit(1),
        2 vec(MAX_INT),
          3 number           fixed bin(15),
          3 pending          bit(1) aligned,
        2 next_vec           fixed bin(15),
        2 prom_mbxp          ptr,            /* Pointer to icp_prom_mbx */
        2 dump_listp         ptr,            /* Pointer to icp dump table */
        2 dump_list_ix       fixed bin(15),  /* Next dump list entry index */
        2 dump_page_cnt      fixed bin(15),  /* Index for multiple dump pages */
        2 last_used          fixed bin(15),  /* Last dump list entry used. */
        2 dump_checksum      fixed bin(15),  /* Dump list checksum. */
        2 syserr_wrt         entry( fixed bin(31) ),
        2 syserr_rd          entry( fixed bin(31) );
/* %include  'icp_prom_pgtbl' */;
/* Begin icp_prom_pgtbl.incl.pl1 */
/* NEW:   ICP prom virtual page table */

dcl  pgtblp             ptr;

dcl  1 vpgs                  based(pgtblp),
        2 disk(0:13),
          3 list_page        fixed bin(31),
          3 data_page        fixed bin(31),
        2 comm_io_blk_pg     fixed bin(31), /* Entry for system console io block */
        2 tape,
          3 list_page        fixed bin(31),
          3 data_page        fixed bin(31),
          3 mbx_page         fixed bin(31), /* VOS Tape mailbox. */
        2 prom_mbx           fixed bin(31),
        2 dump_page          fixed bin(31);

/* End icp_prom_pgtbl.incl.pl1 */
/* %include  'icp_eeprom_ptrs' */;
/* Begin PL/I eeprom pointer definitions. */
```

```
/* ioa addresses */
%replace  PEUS_BASE              by 12582912;    /* '00C00000'b4 */
%replace  BOARD_ID_PTR           by 14681088;    /* 0CE00400x */
%replace  SECTOR_BUFFER_ADDR     by 1048576;     /* '00100000'b4; Disk ioa. */

/* End PL/I eeprom pointer definitions. */


%include  'ioa_commands';      /* Gate array commands. */
/* %include  'ioa_disk_constants' */;
/* Begin include file ... ioa_disk_constants.incl.pl1  86-06-04 */

%replace  MBX_INT                      by    01;
%replace  MAX_STATE_CHANGE             by    100;

%replace  IOA_DISK_ROM_SIZE            by    32768;
%replace  IOA_DISK_RAM_SIZE            by    8192;
%replace  IOA_DISK_ROM_OFFSET          by    32768;
%replace  MIN_PROM_IO_REQ              by    0;    /* Primitive io */
%replace  MIN_IO_REQUEST               by    2;  /* 2:27 */
%replace  MAX_REQUESTS                 by    27;  /* 0:27 */

%replace  MAX_SEEK_RETRY               by    5;
%replace  DISK_COMMAND                 by    500;
%replace  RANGE_SIZE                   by    150;

/* sequencer commands */
%replace  MIN_IOA_SEQ_CMD             by 16;
%replace  MAX_IOA_SEQ_CMD             by 26;


%replace  IOA_READ_BLINDLY            by 16;
%replace  IOA_VERIFY_LOCALLY          by 17;
%replace  IOA_READ_HEADER             by 18;
%replace  IOA_FORMAT_NORMAL           by 19;
%replace  IOA_READ_NORMAL             by 20;
%replace  IOA_WRITE_NORMAL            by 21;
%replace  IOA_READ_DATA               by 22;
%replace  IOA_WRITE_BIG               by 23;
%replace  IOA_FORMAT_HEADER           by 24;
%replace  IOA_SALAD_PLATE_WRITE       by 25;
%replace  IOA_SALAD_PLATE_READ        by 26;

/* smd control - 9006 */
%replace  OFFSET_PLUS            by '01'b4;
%replace  OFFSET_MINUS           by '02'b4;
%replace  CLEAR_FAULT            by '04'b4;

%replace  RECALIBRATE            by '10'b4;
%replace  DATA_EARLY             by '20'b4;
%replace  DATA_LATE              by '40'b4;

/* Changed by WDS 10/2 */
%replace DRIVE_POWER           by '04'b4; /* MUST STAY ON!!! */

%replace DRIVE_SELECT          by '20'b4;
%replace TAG4                  by '08'b4;
%replace TAG5                  by '10'b4;
%replace PROM_HIGH             by '01'b4;

%replace ON_CYLINDER           by '02'b4;
%replace DISK_READY            by '01'b4;


/* internal prom error codes */
%replace       SEQ_TIMEOUT_ERR             by    -1;
%replace       IOP_INTERRUPT               by    -2;
%replace       SEEK_TIMEOUT_ERR            by    -3;
%replace       RESTORE_FAILURE             by    -4;

/* time constants based on 6.5 msec interval */

%replace       SEQ_TIMEOUT                 by    20;
%replace       SEEK_TIMEOUT                by    20;
```

```
%replace        ONE_SECTOR_TIME              by    3;

/* End include file ... ioa_disk_constants.incl.pl1 */
%include  'ioa_disk_ram';     /* Template of ram layout. */
%include  'ioa_disk_request'; /* disk request array template */

/* %include  'iop_adapter_types' */;
/* Begin include file adapter_types.incl.pl1 */

%replace  MIN_ADAP_TYPE            by  1;

%replace  TERMINATOR             by  1;
%replace  ACOMM                  by  2;
%replace  UCOMM_422              by  3;
%replace  ENET                   by  4;
%replace  DISK                   by  5;
%replace  CTAPE                  by  6;
%replace  MTAPE                  by  7;
%replace  CLKCOMM                by  8;
%replace  UCOMM_232              by  9;
%replace  UCOMM_423              by  10;

%replace  MAX_ADAP_TYPE            by 10;

/* End include file adapter_types.incl.pl1 */
/* %nolist;  %include  'product_names';     %l */ist;
/* Begin include file product_names.incl.pl1 */

/* Note:  To add a product name and index, certain rules should be      */
/*        observed.                                                     */
/*                                                                      */
/*   1) The disks are first, and should be left somewhat open-ended     */
/*      to grow, perhaps up to 64.  This is not a firm rule.            */
/*                                                                      */
/*   2) Comm has reserved several ranges of numbers based on a          */
/*      certain hex value as a base.  These are 60-6F (96-111)          */
/*      and A0-AF (160-175).  This rule was broken during the           */
/*      assignment of tape drive values.                                */
/*                                                                      */
/*   3) A range of numbers for IOP adapters has also been reserved.     */
/*      These may not match the hardware types presented by the cards. */
/*      This range starts at 64 (40x).                                  */
/*                                                                      */
/*   4) Main boards (CPUs, MEMs, etc) are currently in the range        */
/*      240 (E0x) to 254 (FEx), and 192 (C0x) to 222 (DEx).             */
/*                                                                      */

%replace  D102_MODELX       by   1;  /* 60MB Disk Drive */
%replace  D101_MODELX       by   2;  /* 30MB Disk Drive */
%replace  D103_MODELX       by   3;  /* 143MB Disk Drive */
%replace  D105_MODELX       by   4;  /* 287 MB Disk Drive */
%replace  UNKN_MODELX       by   5;  /* Unknown Disk Model */
%replace  D900_MODELX       by   6;  /* 85MB Disk Drive */
%replace  D901_MODELX       by   7;  /* 165MB Disk Drive */
%replace  D902_MODELX       by   8;  /* 200MB Disk Drive */
%replace  D108_MODELX       by   9;  /* 448MB Disk Drive */
%replace  D202_MODELX       by  10;  /* 320MB IOP Disk Drive */
%replace  D118_MODELX       by  11;  /* 448MB Disk Drive - TUV */
%replace  D201_MODELX       by  12;  /* 151MB Disk Drive */
%replace  D203_MODELX       by  13;  /* 654MB IOP Disk Drive */
%replace  D205_MODELX       by  14;  /* 151MB IOP Disk Drive */
%replace  K101_MODELX       by  64;  /* ACOMM Async full modem Card */
%replace  K102_MODELX       by  65;  /* UCOMM Async/Sync Card */
%replace  K103_MODELX       by  66;  /* CCOMM Async/Clock Card */
%replace  K104_MODELX       by  67;  /* ENET LAN Card */
%replace  K105_MODELX       by  68;  /* IOP Disk Adapter */
%replace  K106_MODELX       by  69;  /* IOP SCSI Tape Adapter */
%replace  K107_MODELX       by  70;  /* IOP Pertec Tape Adapter */
%replace  K108_MODELX       by  71;  /* PK Terminator */
%replace  K109_MODELX       by  72;  /* UCOMM 423 Async/Sync Card */
%replace  K110_MODELX       by  73;  /* ACOMMP IBM printer card */
%replace  K111_MODELX       by  74;  /* ACOMM async/sync null modem Card */
%replace  C110N_MODELX      by  96;  /* HD Async Null Modem */
%replace  C110F_MODELX      by  97;  /* HD Async Full Modem */
```

```
%replace  IBM_1203_MODELX   by  98;  /* IBM Printer Interface */
%replace  T103_OBS_MODELX   by 100;  /* Tape Drive 1600 bpi */
%replace  T103_MODELX       by 101;  /* Tape Drive 1600/3200 */
%replace  T201_MODELX       by 102;  /* Tape Drive 1600/6250 */
%replace  T251_MODELX       by 103;  /* Tape Drive 1600/3200/6250 */
%replace  C103_MODELX       by 126;  /* Null Modem Channel */
%replace  C102_MODELX       by 127;  /* Full Modem Channel */
%replace  C101_MODELX       by 128;  /* Comm Controller */
%replace  C106_MODELX       by 129;  /* Modem Non Dial-Up */
%replace  C108_MODELX       by 130;  /* Modem Dial-Up */
%replace  C111_MODELX       by 131;  /* Remote Support Modem */
%replace  C107_MODELX       by 160;  /* HS Sync I */
%replace  C109_MODELX       by 161;  /* HS Sync II */
%replace  C104_MODELX       by 190;  /* Sync Line Adapter */
%replace  C104A_MODELX      by 191;  /* Alt Sync Line Adapter */
%replace  G200_MODELX       by 192;  /* Fresco CPU */
%replace  K100_MODELX       by 193;  /* IOP */
%replace  G424_MODELX       by 194;  /* Spitfire CPU */
%replace  M408_MODELX       by 195;  /* Wallaby/8mb Memory Ctrlr/array Board */
%replace  M432_MODELX       by 196;  /* Wallaby/32mb Memory Ctrlr/array Board */
%replace  D214_MODELX       by 221;  /* Removable Disk Adapter */
%replace  D116_MODELX       by 222;  /* 448MB Disk Director (TUV) */
%replace  C105_MODELX       by 223;  /* Calendar Clock */
%replace  P106_MODELX       by 224;  /* CPU Board */
%replace  M100_MODELX       by 225;  /* Memory Controller Board */
%replace  M102_MODELX       by 226;  /* 2MB Memory Array Board */
%replace  C100_MODELX       by 227;  /* Comm Controller */
%replace  D100_MODELX       by 228;  /* Disk Controller */
%replace  T100_MODELX       by 229;  /* Tape Controller */
%replace  I100_MODELX       by 230;  /* Link Controller */
%replace  U100_MODELX       by 231;  /* PSI Board */
%replace  D104_MODELX       by 232;  /* Disk Controller */
%replace  D004_MODELX       by 233;  /* Disk SMD Adapter */
%replace  G601_MODELX       by 234;  /* Processor Controller */
%replace  G602_MODELX       by 235;  /* CPU/SAP Board */
%replace  G400_MODELX       by 236;  /* Zink Central Processor */
%replace  T102_MODELX       by 237;  /* 1600/3200 Tape Controller */
%replace  D107_MODELX       by 238;  /* 448MB Disk Controller */
%replace  D106_MODELX       by 239;  /* 448MB Disk Director */
%replace  C200_MODELX       by 240;  /* Comm Controller */
%replace  T200_MODELX       by 241;  /* 6250 Tape Controller */
%replace  M200_MODELX       by 242;  /* Bandit 16-bit Controller */
%replace  M210_MODELX       by 243;  /* Bandit 8MB Memory Array Board */
%replace  M300_MODELX       by 244;  /* Dinkum 64-bit Controller */
%replace  T301_MODELX       by 245;  /* Quarter inch SCSI  tape drive */
%replace  M310_MODELX       by 246;  /* 16MB Memory Array Board */
%replace  M320_MODELX       by 247;  /* 32MB Memory Array Board */
%replace  M318_MODELX       by 248;  /* 8MB Memory Array Board */
%replace  D110_MODELX       by 249;  /* Disk Controller */
%replace  D114_MODELX       by 250;  /* Disk Controller */
%replace  D117_MODELX       by 251;  /* Disk Controller */
%replace  M214_MODELX       by 252;  /* Bandit 4MB Memory Array Board */
%replace  G610_MODELX       by 253;  /* Hydra Controller/CPU/SAP Board */
%replace  T250_MODELX       by 254;  /* 1600/3200/6250 Tape Controller */
%replace  NONE_MODELX       by 255;  /* No Configured Channel */

%replace  MAX_DEV           by 255;

%replace  MIN_IOA_MODELX    by  64;
%replace  MAX_IOA_MODELX    by  74;

declare   s$hardware_names (0:255) char (6) var ext static;
declare   s$product_models (0:255) char (6) var ext static;
declare   s$product_names (0:255) char (32) var ext static;

/* End include file products_names.incl.pl1 */
/* %include  'iop_disk_constants' */;
/* Begin include file ... iop_disk_block_request.incl.pl1  86-06-04 */

%replace SECTORS_PER_BLOCK           by  2;
%replace MAX_DISK_CHANNELS           by  14;   /* max assignable chans */
%replace INITIAL_DISK_LIMIT          by  1;    /* initial limit for host sends */
%replace BLOCK_REQUESTS_PER_SLOT     by  32;
%replace MIN_NO_OF_BLOCK_REQUESTS    by  32;
```

```
%replace CHANNELS_PER_SLOT          by  0;   /* start at 0 */
%replace SECTOR_SIZE                by  2048;
%replace PAGE_SIZE                  by  4096;
%replace BUFFER_SIZE                by  2304;   /* 9 * 256 */

%replace NULL_STATE                 by  0;
%replace STOPPED_STATE              by  1;
%replace READY_STATE                by  2;

/* channel substates */

%replace LIST_ACTIVE                by  1;

%replace NULL_SLOT                  by -1;
%replace NULL_CHANNEL               by -1;


/* End include file ... iop_disk_block_request.incl.pl1 */
/* %include  'iop_disk_sector_format' */;
/* Begin include file ... iop_disk_sector_format.incl.pl1 */

%replace MAX_DISK_BUFFERS           by        27;  /* 0:27 */
%replace ADDR_SYNC                  by        'fafa'b4;
%replace DATA_SYNC                  by        'fcfc'b4;

declare (sector_formatp, disk_bufferp)        ptr;

declare disk_buffer (0:MAX_DISK_BUFFERS) char(BUFFER_SIZE)
                                              based (disk_bufferp);

declare 1 sector_format  like disk_sector_format_template
                                              based (sector_formatp);

declare 1 disk_sector_format_template     based,

          2 addr_sync                 bit(16),
          2 header,
            3 cylinder                fixed bin(15),
            3 head                    char(1),
            3 sector                  char(1),
          2 header_crc                fixed bin(31),
          2 data_sync                 bit(16),
          2 dup_header,
            3 cylinder                fixed bin(15),
            3 head                    char(1),
            3 sector                  char(1),
          2 sector_data (2048)        char(1),
          2 checksum                  fixed bin(15),
          2 data_crc                  fixed bin(31);

/* End include file ... iop_disk_sector_format.incl.pl1 */
/* %include  'thread_entries' */;
/* BEGIN thread_entries.incl, TNH, 85-7-1 */

/*       %include 'links_template'; */
/* Begin links_template.incl, 85-10-09, Tim Hill */

/* NOTE: For a list header, nextp is the list head and
         prevp is the list tail! */

     dcl 1 links_template based,
           2 nextp                    ptr,
           2 next_linksp              ptr,
           2 prevp                    ptr,
           2 prev_linksp              ptr;

/* End links_template.incl */

     dcl s$init_list_header builtin;
     dcl s$init_list_node   builtin;
     dcl s$thread_after     builtin;
     dcl s$thread_at_back   builtin;
     dcl s$thread_at_front  builtin;
```

```
dcl s$thread_before      builtin;
dcl s$unthread           builtin;

dcl s$thread_list_after entry (
     /* prev_node.links */ 1 like links_template,
     /* from_header */ 1 like links_template);
dcl s$thread_list_at_back entry (/* to_header */ 1 like links_template,
     /* from_header */ 1 like links_template);
dcl s$thread_list_at_front entry (
     /* to_header */ 1 like links_template,
     /* from_header */ 1 like links_template);
dcl s$thread_list_before entry (
     /* next_node.links */ 1 like links_template,
     /* from_header */ 1 like links_template);
dcl s$thread_sublist_after entry (
     /* prev_node.links */ 1 like links_template,
     /* first_node.links */ 1 like links_template,
     /* last_node.links */ 1 like links_template);
dcl s$thread_sublist_at_back entry (
     /* to_header */ 1 like links_template,
     /* first_node.links */ 1 like links_template,
     /* last_node.links */ 1 like links_template);
dcl s$thread_sublist_at_front entry (
     /* to_header */ 1 like links_template,
     /* first_node.links */ 1 like links_template,
     /* last_node.links */ 1 like links_template);
dcl s$thread_sublist_before entry (
     /* next_node.links */ 1 like links_template,
     /* first_node.links */ 1 like links_template,
     /* last_node.links */ 1 like links_template);

/* END thread_entries.incl */

/* Replaces */
%replace  MSEC_IN_JIFFIES     by 66;
%replace  CALL_MASK           by 7;

%replace  FALSE               by '0'b;
%replace  TRUE                by '1'b;

/* Automatic */
dcl  abs_listp            fixed bin(31);
dcl  a_data               fixed bin(31);
dcl  blk_checksum         fixed bin(15);
dcl  callback_data        fixed bin(31);
dcl  1 cb                 defined (callback_data),
       2 num_calls        fixed bin(15),
       2 ioa_slot         fixed bin(15);
dcl  e_code               fixed bin(15);
dcl  ioa_slot             fixed bin(15);
/* listp is declared in disk_ccws.incl.pl1 */
dcl  listp_bin            fixed bin(31) defined (listp);
dcl  old_level            fixed bin(15);
dcl  rec_ix               fixed bin(15);
dcl  timeout              fixed bin(31);
dcl  s_time               fixed bin(31);

dcl  vosp                 ptr;       /* Pointer to vos data_xfer buffer */
dcl  temp_ptr_fb31        fixed bin(31);
dcl  temp_ptr             ptr defined( temp_ptr_fb31 );
dcl  temp_ptr_bit         bit(32) aligned defined( temp_ptr_fb31 );

/* Based */
/* incredible hack */
dcl  disk_mbx_data        fixed bin(15) based(addr(ioa_mbx.msg_in));
dcl  disk_mbx_status      bit(32) aligned based(addr(ioa_mbx.msg_out));
dcl  bits                 bit(8) aligned;
dcl  bits_char            char(1) defined( bits );

dcl  ptr_based            ptr based;

dcl  stat_ovly            fixed bin(31) defined (ioa_mbx.status);
```

```
/* Entries */
dcl  bit8_to_char              entry( bit(8) ) returns( char(1) );
dcl  bin31_to_ptr              entry( fixed bin(31) ) returns( ptr );
dcl  bit32_to_ptr              entry( bit(32) aligned ) returns( ptr );
dcl  ptr_to_bin31              entry( ptr ) returns( fixed bin(31) );
dcl  ptr_to_bit32              entry( ptr ) returns( bit(32) aligned );

dcl  p$clear_command_pending   entry;

dcl  p$send_diag_cmd           entry( fixed bin(15), fixed bin(15),
                                      fixed bin(31), fixed bin(15) );

dcl  p$get_level               entry returns( fixed bin (15) );

dcl  p$or_bits                 entry( bit(32) aligned, bit(32) aligned )
                               returns( bit(32) aligned );

dcl  p$set_level               entry( fixed bin(15) );

dcl  p$setup_pbus              entry;

dcl  p$restore_pbus            entry;

dcl  p$get_boot_ptr            entry() returns( ptr );

dcl  p$get_esi_ptr             entry() returns( ptr );

dcl  p$get_dli_ptr             entry() returns( ptr );

dcl  p$get_ioa_diag_mbxp       entry() returns( ptr );

dcl  p$get_brd_id_ptr          entry() returns( ptr );

dcl  p$get_ioa_slot            entry() returns( fixed bin(15) );

dcl  p$get_pctbl_ptr           entry() returns( ptr );

dcl  p$pio_adapt_select        entry (fixed bin);

dcl  p$send_ioa_cmd            entry( fixed bin(15), fixed bin(15) );

dcl  p$set_reset_list          entry( fixed bin(15) );

dcl  p$get_sbi_addr            entry() returns( fixed bin(31) );
                                                 /* get ptr from sbi */

dcl  p$map_vos_addr            entry( fixed bin(31), fixed bin(31) )
                               returns( ptr );

dcl  p$set_boot_fail           entry();

dcl  p$interrupt_os            entry( fixed bin(15) );

dcl  p$send_vos_interrupt      entry( fixed bin(15), fixed bin(15) );

dcl  p$get_vectorx             entry( fixed bin(15), fixed bin(15) );

dcl  p$reset_dma_access        entry (ptr, fixed bin);

dcl  p$set_dma_access          entry (ptr, fixed bin);

dcl  p$transfer_write          entry (fixed bin(15), bit (32) aligned, ptr,
                               fixed bin(31), fixed bin (15), fixed bin (15));

dcl  p$transfer_read           entry (fixed bin(15), bit (32) aligned, ptr,
                               fixed bin(31), fixed bin (15), fixed bin (15))

dcl  p$transfer_verify         entry (fixed bin(15), bit (32) aligned, ptr,
                               fixed bin(31), fixed bin (15), fixed bin (15))
                               returns( bit(1) aligned );

dcl  p$tas_bit32               entry(bit(32) aligned, fixed bin(15))
                               returns(bit(1) aligned);
```

```
dcl  p$test_bit32              entry(bit(32) aligned, fixed bin(15))
                               returns(bit(1) aligned);

dcl  p$clr_bit32               entry(bit(32) aligned, fixed bin(15));

dcl  p$set_bit32               entry(bit(32) aligned, fixed bin(15));

dcl  delta_time                entry( fixed bin(31) ) returns( fixed bin(31) );
dcl  start_time                entry() returns( fixed bin(31) );

/* Main Code Execution */

     /* Mask to level7 */
     old_level = p$get_level();
     call p$set_level( (CALL_MASK) );

     ioa_disk_ramp = bin31_to_ptr( (PBUS_BASE) );
     disk_bufferp = bin31_to_ptr( (PBUS_BASE + SECTOR_BUFFER_ADDR) );
     pgtblp = p$get_pgtbl_ptr();
     base_dlip = p$get_dli_ptr();
     ioa_slot = p$get_ioa_slot();
     if (ioa_slot >= 0 & ioa_slot <= 13)
     then
        dlip = addr( dli_array(ioa_slot) );
     else do;  /* Invalid slot number. */
          call p$clear_command_pending();
          call p$set_level(old_level);
          return;
          end;

     esip = p$get_esi_ptr();
     dli.list_flag = TRUE;

     if dli.in_prog /* disk list currently in progress. */
     then do;        /* Return and process this later.  DO NOT CLEAR CMD_PEND */
          call p$set_level( old_level );
          return;
          end;
     else do;        /* no disk list in progress */
          cb.ioa_slot = ioa_slot;
          cb.num_calls = 0;
          dli.fault = FALSE;
          dli.list_headp = get_listptr();
          if dli.list_headp = null()
          then do;
               call p$clear_command_pending();
               call p$set_level(old_level);
               return;
               end;
          listp = dli.list_headp;
          dli.cur_listp = listp;
          timeout = dli.es_call_time;    /* Call time used for RD/WR/FORMAT */
          end;

     call p$clear_command_pending();
     call p$fio_adapt_select( ioa_slot );
     ioa_mbxp = p$get_ioa_diag_mbxp();
     if ioa_mbxp = null()
     then do;
          call p$set_level( old_level );
          return;
          end;

     do while( dli.list_flag ):
       if rank( control.cmd ) >= READ_DEFECT
              & rank( control.cmd ) <= WRITE_BIG_CMD
       then do;
             call process_data_xfer();
             end;
       else if ( rank( control.cmd ) >= JUMP_CMD
              & rank( control.cmd ) <= DIAG_SEEK_1_CMD )
              | ( rank( control.cmd ) >= SOFT_RESET_CMD
              & rank( control.cmd ) <= DIAG_SEEK_0_CMD )
             then do;
```

```
                call process_control_cmd();
                if dli.fault
                then do;
                     dli.list_flag = FALSE; /* DO NOT COMPLETE LIST */
                     call null_dli;/* KILL_CUR_LIST to ioa, reset iop strs */
                     end;
                end;
           else do;      /* INVALID LIST CMD; DO NOT PROCESS! */
                /* Restore interrupt mask. */
                call p$set_level( old_level );
                return;
                end;

      if ( ^dli.list_flag & ^es.running & dli.num_ops_in_prog ^= 0
           & ^dli.fault )
      then do;
           dli.list_flag = TRUE;
           call poll_disk();       /* ES not running, poll till completion. */
           if dli.fault
           then do;
                call p$send_ioa_cmd( ioa_slot, CMD_RESET );
                call p$send_ioa_cmd( ioa_slot, CMD_CLEAR_CPU_RESET );
                timeout = (380 * MSEC_IN_JIFFIES);
                s_time = start_time();
                do while( delta_time( s_time ) < timeout );
                end;
                end;
           /* Allow the list to finish processing. */
           dli.list_flag = TRUE;  /* Set list flag to run, we're running. */
           listp = dli.cur_listp; /* Reset listp to current node. */
           end;
     end;

     if (dli.in_prog | dli.callback_req) & es.running
     then do;
          call es.callback(disk_list_callback_ext, binary(ioa_slot, 31),
                         timeout, (CALL_MASK), dli.es_id, e_code );
          /* if e_code ^= 0 then ??? */
          dli.callback_req = FALSE;
          end;

     /* Restore interrupt mask. */
     call p$set_level( old_level );

     return;


/* ==================================================================== */
/*                             KILL CURRENT LIST                        */
kill_current_list: entry;
     /* Mask to level7 */
     old_level = p$get_level();
     call p$set_level( (CALL_MASK) );

     base_dlip = p$get_dli_ptr();
     ioa_slot = p$get_ioa_slot();
     if (ioa_slot >= 0 & ioa_slot <= 13)
     then
        dlip = addr( dli_array(ioa_slot) );
     else do;  /* Invalid slot number. */
          call p$clear_command_pending();
          call p$set_level(old_level);
          return;
          end;

     call p$pic_adapt_select( ioa_slot );
     ioa_mbxp = p$get_ioa_diag_mbxp();
     if ioa_mbxp = null()
     then goto KILL_EXIT;

     call null_dli; /* This issues KILL_CUR_LIST. */

KILL_EXIT:
     call p$set_level( old_level );
     call p$clear_command_pending();
     return;
```

```
/* ====================================================================== */
/*                               IOP_DISK_BOOT
                                 -------------
     This is called from iop_boot only after it has been determined that
     the device in a_slot is actually a disk controller.
*/
iop_disk_boot: entry( a_slot );
dcl  a_slot                fixed bin(15);
dcl  rdy_flag              bit(1);
dcl  ix                    fixed bin(15);
dcl  local_list            char(200) aligned; /* Get some space to build list. */

     /* Module entry point. */
     ioa_slot = a_slot;
     bdcbp = p$get_boot_ptr();

     /* Reset disk adapter. */
     call p$send_ioa_cmd( ioa_slot, CMD_RESET );
     call p$send_ioa_cmd( ioa_slot, (CMD_CLEAR_CPU_RESET) );
     /* Wait ~400ms for reset complete. */
     timeout = (400 * MSEC_IN_JIFFIES);
     s_time = start_time();

     call p$set_reset_list( ioa_slot );
     board_id_ptr = p$get_brd_id_ptr();
     ioa_disk_ramp = bin31_to_ptr( (PBUS_BASE) );
     disk_bufferp = bin31_to_ptr( (PBUS_BASE + SECTOR_BUFFER_ADDR) );

     pgtblp = p$get_pgtbl_ptr();
     base_dlip = p$get_dli_ptr();
     dlip = addr( dli_array(ioa_slot) );
     string(dli.flags) = string(FALSE);
     call build_local_list();

     /* Wait the remainder of time needed for reset to complete. */
     do while( delta_time( s_time ) < timeout );
     end;

     ioa_mbxp = p$get_ioa_diag_mbxp();              /* 40 second timeout */
     if ioa_mbxp = null()
     then do;
          call p$set_boot_fail();
          return;
          end;

     call p$send_diag_cmd( ioa_slot, DISK_CMD_BASE + SEQ_UP_CMD, 40000,
                           e_code );
     if e_code ^= 0
     then do;
          call p$set_boot_fail();
          return;
          end;

     rdy_flag = FALSE;
     statp = addr(disk_mbx_status);
     do while(^rdy_flag);
          call p$send_diag_cmd( ioa_slot, DISK_CMD_BASE + HALT_CMD, 2000,
                                e_code );
          if e_code ^= 0
          then do;
               call p$set_boot_fail();
               return;
               end;
          rdy_flag = status.drive.drive_ready;
     end;

     dli.cfg = TRUE;          /* Ok */
     dli.fault = FALSE;
     /* Now start the list. */
     listp = addr( local_list );   /* Read in disk_up. */
     call process_control_cmd();   /* Seek to cylinder 0. */
     if dli.fault
     then do;
```

```
            call p$set_boot_fail();
            return;
            end;
      call process_data_xfer();      /* READ_CMD */
      if dli.fault
      then do;
            call p$set_boot_fail();
            return;
            end;
      call process_data_xfer();      /* READ_CMD */
      if dli.fault
      then do;
            call p$set_boot_fail();
            return;
            end;
      call poll_disk();
      if dli.fault
      then do;
            call p$set_boot_fail();
            return;
            end;
      listp = dli.cur_listp;
      call process_control_cmd();   /* HALT_CMD */
      if dli.fault
      then do;
            call p$set_boot_fail();
            return;
            end;
      call p$interrupt_os( ica_slot );
      return;

build_local_list: proc;

      /* dli.cur_cylinder = 0;    No need for seek.   Oh yes there is!!! */
      listp = addr( local_list );
      dli.list_headp = listp;
      dli.cur_listp = listp;

      /* First node in list. */
      seek.cmd = byte( SEEK_CMD );
      string( seek.flags ) = '0'b;
      seek.flags.halt_on_error = TRUE;
      seek.cylinder = '0000'b4;
      seek.status_wd = string('0'b);
      listp = addr (seek.next_dcw);

      /* Second node in list. */
      data_xfer.cmd = byte( READ_CMD );
      string(data_xfer.flags) = string('0'b);
      data_xfer.flags.halt_on_error = TRUE;
      data_xfer.track = '00'b4;       /* Track 0 */
      data_xfer.sector = '02'b4;
      data_xfer.memory_addr = 7 * 4096 + 0; /* Page 7, byte offset 0 */
      data_xfer.status_wd = string('0'b);
      listp = addr(data_xfer.next_dcw);

      /* Third node in the list. */
      data_xfer.cmd = byte( READ_CMD );
      string(data_xfer.flags) = string('0'b);
      data_xfer.flags.halt_on_error = TRUE;
      data_xfer.track = '00'b4;       /* Track 0 */
      data_xfer.sector = '03'b4;
      data_xfer.memory_addr = 7 * 4096 + 2048; /* Page 7, byte offset 2048 */
      data_xfer.status_wd = string('0'b);
      listp = addr(data_xfer.next_dcw);

      /* Halt entry in the list. */
      control.cmd = byte( HALT_CMD );
      string(control.flags) = string('0'b);
      control.flags.halt_on_error = TRUE;
      control.value = '0'b;
      data_xfer.status_wd = string('0'b);
      listp = addr(data_xfer.next_dcw);
```

```
    return;
end build_local_list;


/* ======================================================================== */
process_data_xfer: proc;
dcl  a_code     fixed bin(15);
     dcl  p          ptr;

     goto DATA_XFER( rank(data_xfer.cmd) );

DATA_XFER( VERIFY_CMD ):;
     /*
     pass through command to ioa
     upon completion do a dma_verify against vos page
     and check the returned checksum vs header checksum
     return
     */
DATA_XFER( READ_HDR_CMD ):;
DATA_XFER( READ_BIG_CMD ):;
DATA_XFER( WRITE_BIG_CMD ):;
DATA_XFER( READ_DEFECT ):;     /* NEW */
DATA_XFER( READ_CMD ):;
DATA_XFER( FORMAT_CMD ):;
DATA_XFER( WRITE_CMD ):
     req_ix = get_sector_reqx();
     if req_ix = -1
     then do;
          dli.list_flag = FALSE;
          return;
          end;
     else do;
          timeout = dli.es_call_time;    /* Reset callback time to sector io. */
          blk_checksum = 0;
          disk_requestp = addr(ioa_disk_ram.request_array(req_ix));
          disk_request.vos_id = listp_bin;
          dli.in_prog = TRUE;
          disk_request.command = rank(data_xfer.cmd);
          disk_request.disk_addr.cylinder = dli.cur_cylinder;
          disk_request.disk_addr.head = binary(data_xfer.track, 15);
          disk_request.disk_addr.sector = binary(data_xfer.sector, 15);

          sector_formatp = addr(disk_buffer(req_ix));
          /* Now get ioa relative pointer to sector data area. */
          temp_ptr = addr( sector_format.sector_data );
          temp_ptr_fb31 = temp_ptr_fb31 - PBUS_BASE;

          /* Zero flags for now. */
          string(disk_request.flags) = string('0'b);
          disk_request.flags.dma_required = TRUE;

          /* IOA has enough information to start operation now. */
          string(disk_request.status) = string('0'b);
          disk_request.state = PENDING;

          /* DO NOT USE INTERRUPTS UNTIL CALLBACK DEBUGGED!!! */
          /* disk_request.flags.interrupt = es.running; */

          if (rank( data_xfer.cmd ) = WRITE_BIG_CMD
              | rank(data_xfer.cmd) = WRITE_CMD
              | rank(data_xfer.cmd) = FORMAT_CMD)
          then do;
               vosp = map_vos_dma_page(data_xfer.memory_addr,
                                        vpgs.disk(ioa_slot).data_page);
               call pstransfer_write(ioa_slot,temp_ptr_bit, vosp,(2048),
                                  blk_checksum, a_code);
               end;

          /* Build header. */
          sector_format.checksum = blk_checksum;
          sector_format.addr_sync = ADDR_SYNC;
          sector_format.header.cylinder = dli.cur_cylinder;
```

```
        bits = data_xfer.track;
        sector_format.header.head = bits_char;
        sector_format.dup_header.head = bits_char;

        bits = data_xfer.sector;
        sector_format.header.sector = bits_char;
        sector_format.dup_header.sector = bits_char;

        sector_format.data_sync = DATA_SYNC;
        sector_format.dup_header.cylinder = dli.cur_cylinder;
        /* Header information all set in IOA.  GO! */
        /* Complete request. */
        disk_request.flags.dma_required = FALSE;

        dli.num_ops_in_prog = dli.num_ops_in_prog + 1;

        dli.cur_listp = addr( data_xfer.next_ccw );
        listp = dli.cur_listp;
        return;
        end;

end process_data_xfer;
/* ======================================================================== */
process_control_cmd: proc;
dcl  a_code          fixed bin(15);

     statp = addr( control.status_wd ); /* Set vos status pointer. */
     string(status) = string('0'b);     /* Set status to null */

     /* If the disk is not configured then reset it before trying IO. This
        will at least allow us to send a command via mailbox.  If a board
        can't be configured the individual command will deal with it. */
     if ^dli.cfg
     then do;
          call config_disk;
          if dli.callback_req
          then do;  /* Allow ES to regain control until we are called back. */
               dli.list_flag = FALSE;
               return;
               end;
          end;
     /* Dispatch to command.  No command validation since it has been checked
        prior to this call. */
     goto PROC_CTRL( rank(control.cmd) );

PROC_CTRL( DIAG_SEEK_2_CMD ):;
PROC_CTRL( DIAG_SEEK_1_CMD ):;
PROC_CTRL( SEEK_CMD ):
     if dli.num_ops_in_prog ^= 0
     then do;
          dli.list_flag = FALSE;
          return;
          end;

     ioa_mbxp = p$get_ioa_diag_mbxp();
     if ^dli.cfg | ioa_mbxp = null()
     then do;
          status.flags.error = TRUE;
          iop_status.prom_error = TRUE;
          iop_status.dead_ioa = TRUE;
          status.flags.completed = TRUE;
          if control.flags.halt_on_error
          then do;
               status.flags.halted = TRUE;
               dli.fault = TRUE;
               return;
               end;
          else goto PROC_CTRL_COMMON_EXIT;
          end;

     dli.cur_cylinder = binary( seek.cylinder, 15 );
     disk_mbx_data = dli.cur_cylinder;
     call p$send_diag_cmd( ioa_slot, DISK_CMD_BASE + rank(control.cmd), 2000,
                           a_code );
```

```
if a_code ^= 0
then do;
     status.flags.error = TRUE;
     iop_status.prom_error = TRUE;
     if a_code = e$dead_io_board
     then iop_status.dead_ioa = TRUE;
     else iop_status.mbx_timeout = TRUE;
     if control.flags.halt_on_error
     then do;
          status.flags.halted = TRUE;
          dli.fault = TRUE;
          return;
          end;
     end;
else do;
     seek.status_wd = p$or_bits(seek.status_wd, disk_mbx_status);
     if status.flags.error
     then do;
          iop_status.prom_error = TRUE;
          if seek.flags.halt_on_error
          then do;
               status.flags.halted = TRUE;
               dli.fault = TRUE;
               return;
               end;
          end;
     end;

goto PROC_CTRL_COMMON_EXIT;
PROC_CTRL( HALT_CMD ):
     if dli.num_ops_in_prog ^= 0 & ^dli.fault
     then do;  /* IO outstanding, wait for finish or timeout. */
          dli.list_flag = FALSE;
          return;
          end;

     if ^dli.cfg    /* No disk board or dead disk board out there. */
     then do;       /* Case of os looking for disks in iop backplane. */
          /* iop_status.prom_error = TRUE;  May not be error!!! */
          iop_status.dead_ioa = TRUE;   /* Definitely dead. */
          status.flags.completed = TRUE;
          goto HALT_COMPLETE; /* This will allow us to interrupt if reqd. */
          end;

     /* If we got here we can assume that there is (or was) a disk board out
        there and if the pointer comes back null the card probably died.
        Blow TAPS to os. */
     ioa_mbxp = p$get_ioa_diag_mbxp();
     if ioa_mbxp = null()
     then do;
          status.flags.error = TRUE;
          iop_status.prom_error = TRUE;
          iop_status.dead_ioa = TRUE;
          status.flags.completed = TRUE;
          dli.fault = TRUE;
          goto HALT_COMPLETE;
          end;

     /* List is through, set status. */
     call p$send_diag_cmd(ioa_slot,DISK_CMD_BASE + rank(control.cmd),
                              2000, a_code);
     if a_code ^= 0
     then do;
          status.flags.error = TRUE;
          iop_status.prom_error = TRUE;
          if a_code = e$dead_io_board
          then iop_status.dead_ioa = TRUE;
          else iop_status.mbx_timeout = TRUE;
          dli.fault = TRUE;
          status.flags.completed = TRUE;
          end;
     else do;
          control.status_wd = p$or_bits(control.status_wd, disk_mbx_status);
          end;
```

```
HALT_COMPLETE:
     dli.in_prog = FALSE;
     dli.list_flag = FALSE;
     if control.flags.interrupt & dli.vecx ^= 0
     then do;
          call p$send_vos_interrupt( dli.vecx, a_code );
          if a_code ^= 0
          then do;
               dli.fault = TRUE;    /* May be redundant. */
               iop_status.prom_error = TRUE;
               end;
          end;
     /* No need to advance pointers here since this is the end of list.  This
        is why we do not exit through PROC_CTRL_COMMON_EXIT here. */
     return;


PROC_CTRL( SET_INT_NO_CMD ):
     call p$get_vectorx(binary(control.value, 15), dli.vecx);
     if dli.vecx = -1
     then do;
          iop_status.prom_error = TRUE;
          status.flags.error = TRUE;     /* Can't get a vector number!!! */
          end;
     status.flags.completed = TRUE;
     if status.flags.error & control.flags.halt_on_error
     then do;
          status.flags.halted = TRUE;
          dli.fault = TRUE;
          return;
          end;
     else goto PROC_CTRL_COMMON_EXIT;


PROC_CTRL( RESET_INT_NO_CMD ):       /* Best command, can't fail. */
     if ( (dli.vecx >= MIN_INT) & (dli.vecx < MAX_INT) )
     then do;
          es.vec(dli.vecx).number = 0;
          es.vec(dli.vecx).pending = FALSE;
          dli.vecx = 0;
          end;
     status.flags.completed = TRUE;
     goto PROC_CTRL_COMMON_EXIT;


PROC_CTRL( RESET_FAULT_CMD ):;
PROC_CTRL( SET_CYL_CMD ):;
PROC_CTRL( JUMP_CMD ):;
PROC_CTRL( WAIT_CMD ):;
PROC_CTRL( RESTORE_CMD ):;
PROC_CTRL( RESET_DRIVE_CMD ):;
PROC_CTRL( SOFT_RESET_CMD ):;
PROC_CTRL( SEQ_DOWN_CMD ):;
PROC_CTRL( SEQ_UP_CMD ):
     if dli.num_ops_in_prog ^= 0
     then do;
          dli.list_flag = FALSE;
          return;
          end;

     ioa_mbxp = p$get_ioa_diag_mbxp();
     if ^dli.cfg | ioa_mbxp = null()
     then do;  /* No disk board or dead disk board out there. */
          status.flags.error = TRUE;
          iop_status.prom_error = TRUE;
          iop_status.dead_ioa = TRUE;
          status.flags.completed = TRUE;
          if control.flags.halt_on_error
          then do;
               status.flags.halted = TRUE;
               dli.fault = TRUE;
               return;   /* Do not advance list ptrs. */
```

```
          end;
     else goto PROC_CTRL_COMMON_EXIT;
     end;

call p$send_diag_cmd(ioa_slot, DISK_CMD_BASE + rank(control.cmd),
                     2000, a_code);
if a_code ^= 0
then do;
     iop_status.prom_error = TRUE;
     if a_code = e$dead_io_board
     then iop_status.dead_ioa = TRUE;
     else iop_status.mbx_timeout = TRUE;
     if control.flags.halt_on_error
     then do;
          status.flags.halted = TRUE;
          dli.fault = TRUE;
          return;
          end;
     end;
else do;
     control.status_wd = p$or_bits(control.status_wd, disk_mbx_status);
     end;

goto PROC_CTRL_COMMON_EXIT;


PROC_CTRL( FIND_PRESENT_DRIVE ):
if dli.num_ops_in_prog ^= 0
then do;
     dli.list_flag = FALSE;
     return;
     end;

if ^dli.cfg    /* No disk board or dead disk board out there. */
then do;
     iop_status.dead_ioa = TRUE;
     status.flags.completed = TRUE;
     goto PROC_CTRL_COMMON_EXIT;
     end;

/* If we got here we can assume that there is (or was) a disk board out
   there and if the pointer comes back null the card probably died.
   Blow TAPS to os. */
ioa_mbxp = p$get_ioa_diag_mbxp();
if ioa_mbxp = null()
then do;
     status.flags.error = TRUE;
     iop_status.prom_error = TRUE;
     iop_status.dead_ioa = TRUE;
     status.flags.completed = TRUE;
     if control.flags.halt_on_error
     then do;
          dli.fault = TRUE;
          status.flags.halted = TRUE;
          return;
          end;
     else goto PROC_CTRL_COMMON_EXIT;
     end;

call p$send_diag_cmd(ioa_slot, DISK_CMD_BASE + rank(control.cmd),
                     1000, a_code);
if a_code ^= 0
then do;
     status.flags.error = TRUE;
     iop_status.prom_error = TRUE;
     if a_code = e$dead_io_board
     then iop_status.dead_ioa = TRUE;
     else iop_status.mbx_timeout = TRUE;
     status.flags.completed = TRUE;
     if control.flags.halt_on_error
     then do;
          status.flags.halted = TRUE;
          dli.fault = TRUE;
          return;
```

```
            end;
         end;
      else do;
         control.status_wd = p$or_bits(control.status_wd, disk_mbx_status);
         end;

      goto PROC_CTRL_COMMON_EXIT;

PROC_CTRL( * ):
      dli.fault = TRUE;
      return;

PROC_CTRL_COMMON_EXIT:
      dli.cur_listp = addr( control.next_dcw );
      listp = dli.cur_listp;
      return;

end process_control_cmd;

/* ====================================================================== */
/*    This procedure is called if while processing a list command it is
      determined that there is no disk configured in the dli table.

      The caller is expected to check the state of dli.cfg after the call to
      determine if a disk has been found and started.  The caller is also
      expected to fill in the appropriate disk status.

      Two bits are used to determine state of config_disk, they are:
      - dli.reset_in_prog
           If this bit is set then we have already reset the ioa and we have
           come back to see if it is alive and running.
      - dli.callback_req.
           This bit signals to the caller that a callback is required.  The
           callback will be queued and control will return back to ES until
           we have been called back.
*/

config_disk: proc;

      if ^dli.reset_in_prog
      then do;  /* Find disk.  If disk exists then reset it. */
           call p$send_ioa_cmd( ioa_slot, CMD_CLEAR_BROKEN );
           board_id_ptr = p$get_brd_id_ptr();
           if board_id.board_type = K10E_MODELX     /* DISK */
           then do;  /* Disk found, begin reset code. */
                dli.reset_in_prog = TRUE;
                call p$send_ioa_cmd( ioa_slot, CMD_RESET );
                call p$send_ioa_cmd( ioa_slot, CMD_CLEAR_CPU_RESET );
                timeout = (400 * MSEC_IN_JIFFIES);
                if es.running
                then do;
                     dli.callback_req = TRUE;
                     return;
                     end;
                /* ES not running, time out locally. */
                s_time = start_time();
                do while( delta_time( s_time ) < timeout );
                end;

                end;
          else return;   /* No disk found here, get out. */
          end;

     /* 400ms reset time passed. */
     dli.reset_in_prog = FALSE;
     ioa_mbxp = p$get_ioa_diag_mbxp();
     if ioa_mbxp = null()       /* Dead ioa... */
     then return;
     if ioa_dtays   /* Check ioa status, real dtay status is there. */
     then do;
          if stat_ovly = ioa_reset_dtay1
          then dli.cfg = TRUE;
          end;
     else dli.cfg = TRUE;      /* Set assuming ioa reset ok. */
```

```
      if dli.cfg
      then call p$set_reset_list( ioa_slot );
      return;

      /* START FIRMWARE AND RUN SELF TESTS LATER WHEN MBX CODE HAS BEEN
         INTEGRATED */

end config_disk;

/* ========================================================================== */
get_listptr: proc returns( ptr );

dcl  a_abs_ptr             fixed bin(31);
dcl  1 p_address_ovly      defined( a_abs_ptr ),
       2  filler           char(1),
       2  addr_hi          char(1),
       2  addr_mid         char(1),
       2  addr_lo          char(1);

dcl  virt_ptr              ptr;

/* Execution */

      a_abs_ptr = p$get_sbi_addr();
      if a_abs_ptr = 0
      then return ( null() );
      else return( p$map_vos_addr( a_abs_ptr, vpgs.disk(ioa_slot).list_page ) );

end get_listptr;
/* ========================================================================== */
map_vos_dma_page: proc( a_temp_ptr_fb31, a_map_entry ) returns( ptr );
dcl  a_code                fixed bin(15);
dcl  a_map_entry           fixed bin(31);
dcl  a_temp_ptr            ptr defined( a_temp_ptr_fb31 );
dcl  a_temp_ptr_fb31       fixed bin(31);
dcl  a_temp_ptr_bit        bit(32) aligned defined( a_temp_ptr_fb31 );
dcl  p                     ptr;

      p = p$map_vos_addr( a_temp_ptr_fb31, a_map_entry );
      call p$set_dma_access ( p, a_code );
      return( p );

end map_vos_dma_page;
/* ========================================================================== */
disk_list_callback_ext: entry( a_data );

      callback_data = a_data;
      ioa_slot = cb.ioa_slot;
      cb.num_calls = cb.num_calls + 1;
      if ( ioa_slot >= 0  & ioa_slot <= 13 )
      then
         call disk_list_callback();
      else do;
           /* ERROR.  CALLED BACK WITH INVALID SLOT NUMBER.... RETURN */
           end;
      return;

disk_list_callback: proc;
dcl  a_code                fixed bin(15);
dcl  flag                  bit(1);
dcl  i                     fixed bin(15);

      call p$setup_pbus;

      ioa_disk_ramp = bin31_to_ptr( (PBUS_BASE) );
      disk_bufferp = bin31_to_ptr( (PBUS_BASE + SECTOR_BUFFER_ADDR) );
      petblp = p$get_pgtbl_ptr();
      base_clip = p$get_cli_ptr();
      clip = addr( dli_array(ioa_slot) );
      dli.fault = FALSE;  /* Negate fault bit. */
      esip = p$get_esi_ptr();
      call p$pic_adapt_select( ioa_slot );

      ioa_mbxp = p$get_ioa_diag_mbxp();
```

```
if ioa_mbxp = null()
then do;  /* Do not process anything... Do not callback... */
      call null_dli; /* LET LIST TIMEOUT */
      call p$restore_pbus;
      return;
      end;

timeout = dli.es_call_time;   /* Reset callback time to sector io. */

req_ix = MIN_PROM_IO_REQ; /* MUST BE INITIALIZED BEFORE NEXT_REQ_IX FXN */
req_ix = next_req_ix();

do while(dli.num_ops_in_prog ^= 0 & req_ix ^= -1);
      disk_requestp = addr(ioa_disk_ram.request_array(req_ix));
      listp = ptr(disk_request.vos_id);
      statp = addr( data_xfer.status_wd );
      if disk_request.state = POST
       & p$test_bit32(ioa_disk_ram.buffer_alloc_map, req_ix)
      then do;
            if rank( control.cmd ) = READ_CMD
             | rank( control.cmd ) = VERIFY_CMD
             | rank( control.cmd ) = READ_HDR_CMD
             | rank( control.cmd ) = READ_DEFECT
             | rank( control.cmd ) = READ_BIG_CMD
            then do;
                  vosp = map_vos_cma_page(data_xfer.memory_addr,
                                          vpgs.disk(ioa_slot).data_page);
                  sector_formatp = addr(disk_buffer(req_ix));
                  /* Now get ioa relative pointer to sector data area. */
                  if rank( control.cmd ) = READ_CMD
                  | rank( control.cmd ) = VERIFY_CMD
                  then temp_ptr = addr( sector_format.sector_data );
                  else temp_ptr = sector_formatp;
                  temp_ptr_fb31 = temp_ptr_fb31 - PBUS_BASE;
                  if rank(data_xfer.cmd) ^= VERIFY_CMD
                  then
                  call p$transfer_read( ioa_slot, temp_ptr_bit, vosp,
                                        (2048), blk_checksum, a_code );
                  else do;
                        if ^p$transfer_verify( ioa_slot, temp_ptr_bit, vosp,
                                              (2048), blk_checksum, a_code )
                        then do;
                              iop_status.prom_error = TRUE;
                              iop_status.verify_error = TRUE;
                              status.flags.error = TRUE;
                              status.controller.verify_error = TRUE;
                              end;
                        end;
                  if (sector_format.checksum ^= blk_checksum)
                  & (rank( control.cmd ) = READ_CMD
                   | rank( control.cmd ) = VERIFY_CMD)
                  then do;
                        status.flags.error = TRUE;
                        status.controller.crc_error = TRUE;
                        iop_status.prom_error = TRUE;
                        iop_status.checksum_error = TRUE;
                        end;
                  end;

            data_xfer.status_wd = p$or_bits(data_xfer.status_wd,
                                            disk_request.status);

            disk_request.state = FREE;
            dli.num_ops_in_prog = dli.num_ops_in_prog - 1;
            call p$clr_bit32(ioa_disk_ram.buffer_alloc_map, req_ix);
            call p$clr_bit32(dli.req_list, req_ix);
            end;

      req_ix = next_req_ix();  /* Get next request index. */
end; /* END DO WHILE(dli.num_ops_in_prog ^= 0 & req_ix ^= -1); */

if dli.num_ops_in_prog ^= 0 & cb.num_calls > MAX_CALLS
then do;
      status.flags.error = TRUE;
```

```
          iop_status.prom_error = TRUE;
          iop_status.req_timeout = TRUE;
          if control.flags.halt_on_error
          then do;
                /* Null out dli structure. */
                call null_dli;
                call p$restore_pbus;
                return;
                end;
           else do;
                call p$clr_bit32(ioa_disk_ram.buffer_alloc_map, req_ix);
                call p$clr_bit32(dli.req_list, req_ix);
                dli.num_ops_in_prog = dli.num_ops_in_prog - 1;
                end;
           end;

      listp = dli.cur_listp;
      dli.list_flag = TRUE;
      do while( dli.list_flag );
        if rank( control.cmd ) >= READ_DEFECT
              & rank( control.cmd ) <= WRITE_BIG_CMD
        then do;
              call process_data_xfer();
              end;
        else if ( rank( control.cmd ) >= JUMP_CMD
                & rank( control.cmd ) <= DIAG_SEEK_1_CMD )
                | ( rank( control.cmd ) >= SOFT_RESET_CMD
                & rank( control.cmd ) <= DIAG_SEEK_2_CMD )
              then do;
                    call process_control_cmd();
                    if dli.fault
                    then do;
                          dli.list_flag = FALSE; /* DO NOT COMPLETE LIST */
                          call null_dli;
                          end;
                    end;
              else do;
                    /* Return some kind of error here; Invalid list cmd */
                    end;
      end;

      if dli.num_ops_in_prog ^= 0 | dli.callback_req
      then do;
           call es.callback(disk_list_callback_ext,binary(ioa_slot,31),
                            timeout, (CALL_MASK), dli.es_id, e_code );
           /* if e_code ^= 0 then ??? */
           dli.callback_req = FALSE;
           end;

      call p$restore_pbus;
      return;

end disk_list_callback;
/* ====================================================================== */
/*    If the environment software has not been loaded then poll the adapter
      to wait for completion.

      Change this code later to process the next entry on the list as a
      dli node becomes free.  For now, wait until both buffers become
      FREE before returning or doing anymore processing.
*/
poll_disk: proc;
dcl   a_code             fixed bin(15);
dcl   j                  fixed bin(15);
dcl   poll_flag          bit(1);

      timeout = (1000 * 2 * MSEC_IN_JIFFIES) + 30000;    /* ~2.5 seconds */
      s_time = start_time();

      req_ix = MIN_FROM_IO_REQ; /* MUST BE INITIALIZED BEFORE NEXT_REQ_IX FXN */
      req_ix = next_req_ix();

      poll_flag = TRUE;
      do while(dli.num_ops_in_prog ^= 0 & req_ix ^= -1 & poll_flag );
```

```
disk_requestp = addr(ioa_disk_ram.request_array(req_ix));
listp = ptr(disk_request.vos_id);
statp = addr( data_xfer.status_wd );
if p$test_bit32(cli.req_list, req_ix) & disk_request.state = POST
then do;
     if rank( control.cmd ) = READ_CMD
      | rank( control.cmd ) = VERIFY_CMD
      | rank( control.cmd ) = READ_HDR_CMD
      | rank( control.cmd ) = READ_DEFECT
      | rank( control.cmd ) = READ_BIG_CMD
     then do;
          vosp = map_vos_dma_page(data_xfer.memory_addr,
                                   vpgs.disk(ioa_slot).data_page);
          sector_formatp = addr(disk_buffer(req_ix));
          /* Now get ioa relative pointer to sector data area. */
          if rank( control.cmd ) = READ_CMD
           | rank( control.cmd ) = VERIFY_CMD
          then temp_ptr = addr( sector_format.sector_data );
          else temp_ptr = sector_formatp;
          temp_ptr_fb31 = temp_ptr_fb31 - PBUS_BASE;
          if rank(data_xfer.cmd) ^= VERIFY_CMD
          then
             call p$transfer_read( ioa_slot, temp_ptr_bit, vosp,
                                   (2048), blk_checksum, a_code );
          else do;
               if ^p$transfer_verify( ioa_slot, temp_ptr_bit, vosp,
                                      (2048), blk_checksum, a_code )
               then do;
                    iop_status.prom_error = TRUE;
                    iop_status.verify_error = TRUE;
                    status.flags.error = TRUE;
                    status.controller.verify_error = TRUE;
                    /* cli.fault = TRUE; */
                    end;
               end;

          if (sector_format.checksum ^= blk_checksum)
           & (rank( control.cmd ) = READ_CMD
            | rank( control.cmd ) = VERIFY_CMD)
          then do;
               iop_status.prom_error = TRUE;
               status.flags.error = TRUE;
               status.controller.crc_error = TRUE;
               iop_status.checksum_error = TRUE;
               /* cli.fault = TRUE; */
               end;
          end;

     data_xfer.status_wd = p$or_bits(data_xfer.status_wd,
                                     disk_request.status);
     if status.flags.error & data_xfer.flags.halt_on_error
     then cli.fault = TRUE;
     disk_request.state = FREE;
     cli.num_ops_in_prog = cli.num_ops_in_prog - 1;
     call p$clr_bit32(ioa_disk_ram.buffer_alloc_map, req_ix);
     call p$clr_bit32(cli.req_list, req_ix);
     end;

if cli.num_ops_in_prog = 0
then
   poll_flag = FALSE;

if delta_time(s_time) > timeout
then do;
     status.flags.error = TRUE;
     iop_status.prom_error = TRUE;
     iop_status.req_timeout = TRUE;
     poll_flag = FALSE;
     cli.fault = TRUE;
     end;
if req_ix < MAX_REQUESTS
then req_ix = next_req_ix();
else do;
     req_ix = 0;
```

```
                req_ix = next_req_ix();
                end;
        end;
end poll_disk;
/* ======================================================================== */
null_dli: proc;
dcl  i          fixed bin(15);

     /* Null out dli structure. */
     dli.in_prog = FALSE;
     dli.list_headp = null();
     dli.cur_listp = null();
     dli.num_ops_in_prog = 0;
     string(dli.req_list) = string(FALSE);

     ioa_mbxp = p$get_ioa_diag_mbxp();
     if ioa_mbxp = null()
     then return;
     /* Most likely dead card, impossible to send KILL_CUR_LIST. */
     call p$send_diag_cmd( ioa_slot, DISK_CMD_BASE + KILL_CUR_LIST_CMD, 2000,
                           e_code );
     return;
end null_dli;

get_sector_reqx: proc returns(fixed bin(15));
dcl  gsrx       fixed bin(15);

     do gsrx = MIN_PROM_IO_REQ to MAX_REQUESTS;
          if ^p$test_bit32(dli.req_list, gsrx)
          then if p$tas_bit32(ioa_disk_ram.buffer_alloc_map, gsrx)
               then do;
                    call p$set_bit32(dli.req_list, gsrx);
                    return(gsrx);
                    end;
     end;
     return(-1);    /* No free buffers found. */
end get_sector_reqx;

next_req_ix: proc returns(fixed bin(15));
dcl  nrx        fixed bin(15);

     do nrx = req_ix to MAX_REQUESTS;
          if p$test_bit32(dli.req_list, nrx)
          then return(nrx);
     end;
     return(-1);

end next_req_ix;

end iop_disk_lists;
```

```
/*   ***begin copyright*** *******************************   */
/*                                                           */
/*   STRATUS CONFIDENTIAL INFORMATION: CLASS II              */
/*   COPYRIGHT (c) Stratus Computer, Inc. 1986               */
/*                                                           */
/*   This  program  contains  confidential and proprietary   */
/*   information  of  Stratus Computer,  Inc.,  and  any     */
/*   reproduction,  disclosure, or use in whole or in part   */
/*   is   expressly   prohibited,   except   as   may   be   */
/*   specifically authorized by prior written agreement or   */
/*   permission of Stratus.                                  */
/*                                                           */
/*   ***end copyright*** *********************************   */
```

```
/* IOP$EDIT_STRING: Routine to take a control string and some parameters
   and edit a message by inserting parameters where indicated into
   the control string. */
/* This routine is vaguely similar to Multics ioa_ */

/* Beginning of modification history */
/* Extracted from s$edit_string January 1987 by Tom Moser */
/* Modified 87-04-01 by Tom Moser to fix ^i - clean up  */
/* End of modification history */
```

```
%page;
/* Substitutions are indicated by a sequence starting with "^" in the
   control string.  The format of the sequences is:

     ^[w][.d]c

   where  w  and  d  are  unsigned integers and c is one of the characters
   given in the following table.

   With  the  exception of the hex_dump format (^z), w is the width of the
   output field and defaults to the minimum necessary to hold  the  value.
   The  numeric  formats  output  asterisks  if w is too small to hold the
   value.  The character formats ignore w if it's too small.  For ^z, w is
   the number of bytes to dump.

   d  is  used  with the decimal, float, and hex_dump formats as described
   below.

     CONTROL    ARGUMENT        GENERATES              NOTES
     ^^         none            ^
     ^a         char (w)        copies the string      default w = 1
     ^c         none            space to column w      default w = 1
     ^d         fixed dec(9,d)  999.99 type            d = scale (default 0)
     ^D         fixed dec(18,d) 999.99 type            d = scale (default 0)
     ^h         fixed bin (15)  hex (n, w)
     ^H         fixed bin (31)  hex (n, w)
     ^i         fixed bin (15)  char (n, w)
     ^I         fixed bin (31)  char (n, w)
     ^p         ptr             hexp (ptr, w)
     ^r         char (*) var    right justified
     ^v         char (*) var    copies the string
     ^V         char (*) var    quote (string)         w is ignored
     ^x         none            w spaces               default w = 1
     ^z         char (w)        hex_dump (s, w, d)     default w = 8, d = 4
   d is used as follows:

     ^d, ^D     number  of  digits to the right of the decimal point (i.e.,
                scale);  default = 0

     ^z         the output is arranged in groups of d bytes (2d hex digits)
                with  a  space  between  each  two groups;  default = 4;  0
                means no spaces
*/

ioa_edit_string: proc (a_arglistp, a_max_len, a_result);

/* parameters */

dcl  a_arglistp       ptr;
dcl  a_max_len        fixed bin (15);
dcl  a_result         char (80) var;

/* automatic */

dcl  append           char (80) var;
dcl  arglistp         ptr;
dcl  argp             ptr;
dcl  c                char (1);
dcl  controlp         ptr;
dcl  dec_temp         fixed dec (18);
dcl  i                fixed bin (15);
dcl  inputl           fixed bin (15);
dcl  inputp           ptr;
dcl  next_arg         fixed bin (15);
dcl  outputl          fixed bin (15);
dcl  outputp          ptr;
dcl  value1           fixed bin (15);
dcl  value2           fixed bin (15);
dcl  value_sw1        bit (1) aligned;
dcl  value_sw2        bit (1) aligned;

/* based */

dcl  arglist          (100) ptr based (arglistp);
```

```
dcl  output           char (outputl) var based (outputp);

dcl 1 control         based (controlp),
    2 n_bytes         fixed bin (15),
    2 data            char (control.n_bytes);

dcl  input            char (inputl) based (inputp);

dcl  based_vs         char (80) var based;
dcl  based_fb15       fixed bin (15) based;
dcl  based_fb31       fixed bin (31) based;
dcl  based_fd9        fixed dec (9) based;
dcl  based_fd18       fixed dec (18) based;
dcl  based_ptr        ptr based;
dcl  based_char       char (value1) based;

/* include */

/* builtin */
dcl (addr, addrel, bin, char, index, length, substr, verify) builtin;

/* external */

dcl  hex        entry (fixed bin (31), fixed bin (15)) returns (char (8) var);
dcl  hex_dump   entry (char (*) in, fixed bin (15) in, fixed bin (15) in)
                      returns (char (256) var);
dcl  char_to_bin                entry (char (*) var)
                                                 returns (fixed bin (31));
dcl  hexp       entry (ptr, fixed bin (15)) returns (char (8) var);
dcl  quote      entry (char (*) var in) returns (char (256) var);

/* constants */

%replace EDIT_OPTIONS by '^v$I>H.axbcdIrz';

/* static */

dcl  bad_vs char (32) var int static init ('BAD STRING');

/* ============================================================ */

     arglistp = a_arglistp;
     controlp = arglist (1);
     inputp = addr (control.data);
     inputl = length (control.data);
     outputl = a_max_len;
     outputp = addr (a_result);
     output = '';
     next_arg = 2;

loop:
     i = index (input, '^');
     if i = 0  /* no more controls */
     then do;
copy_rest:
          output = output || input;
done:     return;
          end;

     if i > 1
     then do;  /* text before control */
          output = output || substr (input, 1, i-1);
          inputp = addrel (inputp, i-1);
          inputl = inputl - (i-1);
          end;

     if inputl < 2
     then go to copy_rest;

     value_sw1 = '0'b;
     value_sw2 = '0'b;
     value1 = 1;
     value2 = 1;
```

```
     i = verify (substr (input, 2), '0123456789');
     if i = 0
     then go to copy_rest;    /* all digits */
     if i > 1
          value_sw1 = '1'b;
          value1 = char_to_bin (substr (input, 2, i - 1));
          end;
     c = substr (input, i + 1, 1);
     inputp = addrel (inputp, i + 1);
     inputl = inputl - (i + 1);
     if c = '.'
     then do;
          i = verify (input, '0123456789');
          if i = 0
          then go to copy_rest;
          if i > 1
          then do;
               value_sw2 = '1'b;
               value2 = char_to_bin (substr (input, 1, i - 1));
               end;
          c = substr (input, i, 1);
          inputp = addrel (inputp, (i));
          inputl = inputl - i;
          end;

     i = index (EDIT_OPTIONS, c);
     go to case (i);

case (0): /* bad option */
     append = '^' || c;
     go to join;

case (1): /* ^^ */
     append = '^';
     go to join;

case (2): /* ^v */
     argp = addr (arglist (next_arg) -> based_vs);
     i = length (argp -> based_vs);
     if i < 0
     then do;
          argp = addr (bad_vs);
          i = length (bad_vs);
          end;
     output = output || argp -> based_vs;
     if value_sw1
     then if value1 > i
          then output = output || char ('', value1 - i);
     next_arg = next_arg + 1;
     go to loop;

case (3): /* ^i */
     dec_temp = arglist (next_arg) -> based_fb15;
     next_arg = next_arg + 1;
     go to num_join;

case (4): /* ^I */
     dec_temp = arglist (next_arg) -> based_fb31;
     next_arg = next_arg + 1;
     go to num_join;

case (5): /* ^h */
     if ^value_sw1
     then value1 = 4;
     append = hex ((arglist (next_arg) -> based_fb15), value1);
     next_arg = next_arg + 1;
     go to join;

case (6): /* ^H */
     if ^value_sw1
     then value1 = 8;
     append = hex (arglist (next_arg) -> based_fb31, value1);
     next_arg = next_arg + 1;
     go to join;
```

```
case (7): /* ^v */
      argp = addr (arglist (next_arg) -> based_vs);
      i = length (argp -> based_vs);
      if i < 0
      then do;
            argp = addr (bad_vs);
            i = length (bad_vs);
            end;
      output = output || quote (argp -> based_vs);
      next_arg = next_arg + 1;
      go to loop;

case (8): /* ^p */
      if ^value_sw1
      then value1 = 8;
      append = hexp (arglist (next_arg) -> based_ptr, value1);
      next_arg = next_arg + 1;
      go to join;

case (9): /* ^x */
      output = output || char ('', value1);
      go to loop;

case (10): /* ^c */
      value1 = value1 - length (output) - 1;
      if value1 > 0
      then go to case (9);
      else go to loop;

case (11): /* ^a */
      output = output || arglist (next_arg) -> based_char;
      next_arg = next_arg + 1;
      go to loop;

case (12): /* ^d */
      dec_temp = arglist (next_arg) -> based_fd9;
      next_arg = next_arg + 1;
      go to dec_join;

case (13): /* ^D */
      dec_temp = arglist (next_arg) -> based_fd18;
      next_arg = next_arg + 1;

dec_join:
      if value_sw2
      then value2 = min (max (value2, -18), 18);
      else
out_join:
            value2 = 0;
      append = convert_dec_to_char (dec_temp, value2);
justify_number:
      if value_sw1
      then if value1 < length (append)
            then do;
                  append = copy ('*', value1);
                  end;
            else if value1 > length (append)
                  then append = char ('', value1 - length (append)) || append;
      go to join;

case (14): /* ^r */
      argp = arglist (next_arg);
      i = length (argp -> based_vs);
      if i < 0
      then do;
            argp = addr (bad_vs);
            i = length (bad_vs);
            end;
      if value_sw1
      then if value1 > i
            then output = output || char ('', value1 - i);
      output = output || argp -> based_vs;
      next_arg = next_arg + 1;
      go to loop;
```

```
case (15): /* ^z */
     if ^value_sw1
     then value1 = 8;
     if ^value_sw2
     then value2 = 4;
     append = hex_dump (arglist (next_arg) -> based_char, value1, value2);
     next_arg = next_arg + 1;
     go to join;

join:
     output = output || append;
     go to loop;

%page;
convert_dec_to_char: procedure (a_dec, a_right) returns (char (20) varying);

dcl a_dec        fixed dec (18);
dcl a_right      fixed bin (15);

dcl my_dec       fixed dec (18);
dcl my_string    char (20) varying;
dcl i            fixed bin (15);
dcl rem          fixed bin (15);
dcl minus        bit (1) aligned;

%replace CVT_INT_TO_CHAR_MAJIC_CONSTANT by 48;

     minus = (a_dec < 0);
     my_dec = abs(a_dec);
     my_string = '';
     do i = 1 to 18 while (my_dec ^= 0);
          if a_right ^= 0 & i = a_right + 1
          then
               my_string = '.' || my_string;
          else do;
               rem = mod(my_dec, 10);
               my_dec = divide (my_dec, 10, 18, 0);
               rem = rem + CVT_INT_TO_CHAR_MAJIC_CONSTANT;
               my_string = byte(rem) || my_string;
               end;
          end;
     if my_string = ''
          then my_string = '0';
     if minus
          then my_string = '-' || my_string;

     return (my_string);

end convert_dec_to_char;

end iop_edit_string;
%page;
iop$edit_string: proc (a_list) returns (char(80) varying);

dcl a_list fixed bin (15);                /* anything will work */

dcl  arglistptr      entry returns (ptr);

dcl msg char(80) varying;

     call iop_edit_string(arglistptr(), 80, msg);
     return (msg);

end iop$edit_string;
/*   ***begin copyright*** ******************************   */
/*                                                          */
/*   STRATUS CONFIDENTIAL INFORMATION: CLASS II             */
/*   COPYRIGHT (c) Stratus Computer, Inc. 1984              */
/*                                                          */
/*   This  program  contains  confidential and proprietary  */
/*   information  of  Stratus Computer,  Inc.,  and  any    */
/*   reproduction, disclosure, or use in whole or in part   */
/*   is  expressly  prohibited,  except  as  may  be        */
/*   specifically authorized by prior written agreement or  */
```

```
/*  permission of Stratus.                                        */
/*                                                                */
/*  ***end copyright*** *********************************         */

/* CONDITION_HANDLING: Contains following system entry points:
/*   s$enable_condition
/*   s$revert_condition
/*   s$signal_condition
/*   s$find_condition_info
/*   s$continue_to_signal

/* Beginning of modification history
/* Written 86-10-07 by Tom Moser from s$enable_condition
/* End of modification history

/*       "flag" field as follows:
/*
/*           2 flags,
/*             3 enabled     bit(1),
/*             3 snap        bit(1),
/*             3 system      bit(1),
/*             3 use_frame   bit(1),   /* use the handler environment
/*             3 shared      bit(1),   /* shared handler - copy if reuse
/*             3 do_goto     bit(1),   /* goto rather than call
/*             3 mbz         bit(2),
/*                                                                          */

/* The following pl1-ops are called directly

/*   equ        compare_chars,1058x
/*   equ        assign_vchars,1038x
/*   equ        move_words,1050x
/*   equ        goto,1004x

     extent     compare_chars,direct
     extent     assign_vchars,direct
     extent     move_words,direct
     extent     goto,direct

     equ        null,1

     priv       on


     using      'on_unit',a5


/*      incl       'stack_fr ame'
/* BEGIN include file -- stack_frame.incl.asm

     equ        stack_frame.prev_sp,0
     equ        stack_frame.on_ptr,-4
     equ        stack_frame.orig_frame_end,-8
     equ        stack_frame.static_ptr,-12
     equ        stack_frame.entry_ptr,-16
     equ        stack_frame.display_ptr,-20
     equ        stack_frame.fac,-32

     equ        long_frame_header_size,-stack_frame.fac
     equ        short_frame_header_size,-stack_frame.entry_ptr

/* END include file -- stack_frame.incl.asm
/*      incl       'on_u nit'
/* Begin include file ... on_unit.incl.asm

/* Created by cv_incl from the PL/I include file on 810424

/***************************************************************/
/*                                                             */
/*   WARNING   WARNING   WARNING   WARNING   WARNING   WARNING */
/*                                                             */
/*   The "flags" field of this structure is assigned to DIRECTLY */
/*   by code emitted by the code generator.  It CANNOT be moved  */
/*   under any circumstances.  NEVER.  And I mean NEVER.         */
```

```
/*                                                                    */
/*   WARNING   WARNING   WARNING   WARNING   WARNING   WARNING       */
/*                                                                    */
/********************************************************************/

          use       'on_unit',dummy
on_unit.next:
          ds.l      1

on_unit.flags:
          ds.b      0                                /* SEE WARNING!
          equ       on_unit.flags.enabled,7  /* unit enabled
                              /*  (off for reverted unit)
          equ       on_unit.flags.snap,6     /* snap dump (unimpl)
          equ       on_unit.flags.system,5   /* system handler
          equ       on_unit.flags.use_frame,4/* use handler frame
                              /*  (instead of on_unit value)
          equ       on_unit.flags.shared,3   /* on unit sharable
                              /*  (must copy to reuse)
          equ       on_unit.flags.do_goto,2  /* goto handler (ada)
                              /*  (instead of call as in pl1)
          ds.b      1
on_unit.code:
          ds.b      1
on_unit.fct_ptr:
          ds.l      1
on_unit.entry_var:
          ds.l      3
on_unit.cond_name:
          ds.w      1
          ds.b      32

          equ       on_unit_len,56
          use       'code'
/* End include file ... on_unit.incl.asm
/*      incl      'entry_bl ock'
/* Begin include file ... entry_block.incl.asm

/* Beginning of modification history
/* Created by cv_incl from the PL/I include file on 810629.
/* Modified 87-06-05 by HsuehJu Ko for save_registers, pop and unwinder
/*   by hand since the file is generated by the old version cv_incl which
/*   is different from the one generated by the new version of cv_incl.
/* End of modification history

          use       'entry_block',dummy
entry_block.n_args:
          ds.w      1

entry_block.flags:
          ds.b      0
          equ       entry_block.flags.is_subroutine,15
          equ       entry_block.flags.is_function,14
          equ       entry_block.flags.main,13
          equ       entry_block.flags.support,12
          equ       entry_block.flags.kernel,11
          equ       entry_block.flags.has_fac,10
          equ       entry_block.flags.fault_handler,9
          equ       entry_block.flags.command_args,8
          equ       entry_block.flags.signaller,7
          equ       entry_block.flags.full_table,6
          equ       entry_block.flags.save_registers,5
          equ       entry_block.flags.pop,4
          equ       entry_block.flags.unwinder,3
          ds.w      1
entry_block.symtab_addr:
          ds.l      1
entry_block.name:
          ds.w      1
          ds.b      32

          equ       entry_block_len,42
          use       'code'
```

```
/* End include file ... entry_block.incl.asm
/*       incl      'condition_numb ers'
/* Begin include file ...condition_numbers.incl.asm
/* Generated at 87-03-06 15:19:02 EST by cv_incl Release 6.alpha.g from
/*     %es#m49>Languages>Swinton>install>os>condition_numbers.incl.pl1.

     equ        ERROR_CONDITION_NO,1
     equ        UNDEFINEDFILE_CONDITION_NO,2
     equ        BREAK_CONDITION_NO,3
     equ        ENDPAGE_CONDITION_NO,4
     equ        ENDFILE_CONDITION_NO,5
     equ        KEY_CONDITION_NO,6
     equ        PAUSE_CONDITION_NO,7
     equ        UNDERFLOW_CONDITION_NO,8
     equ        OVERFLOW_CONDITION_NO,9
     equ        ZERODIVIDE_CONDITION_NO,10
     equ        FIXEDOVERFLOW_CONDITION_NO,11
     equ        USER_DEFINED_CONDITION_NO,12
     equ        WARNING_CONDITION_NO,13
     equ        ANYOTHER_CONDITION_NO,14
     equ        HANGUP_CONDITION_NO,15
     equ        ALARMTIMER_CONDITION_NO,16
     equ        CPUTIMER_CONDITION_NO,17
     equ        REENTER_CONDITION_NO,18
     equ        PROCESSINTERRUPT_CONDITION_NO,19
     equ        PROCESSPAUSE_CONDITION_NO,20
     equ        KERNELERROR_CONDITION_NO,21
     equ        SUBPROCESSDONE_CONDITION_NO,22
     equ        USRSIGNAL_CONDITION_NO,23
     equ        CLEANUP_CONDITION_NO,24
     equ        TASKTIMER_CONDITION_NO,25
     equ        CONSTRAINT_ERROR_CONDITION_NO,26
     equ        NUMERIC_ERROR_CONDITION_NO,27
     equ        PROGRAM_ERROR_CONDITION_NO,28
     equ        STORAGE_ERROR_CONDITION_NO,29
     equ        TASKING_ERROR_CONDITION_NO,30
     equ        ADA_OTHERS_CONDITION_NO,31
     equ        MAX_CONDITION_NO,31

/* End include file ...condition_numbers.incl.asm
/*       incl      'condition_i nfo'
/* Begin include file ... condition_info.incl.asm

/* Created by cv_incl from the PL/I include file on 811020

          use       'condition_info',dummy
condition_info.oncode:
          ds.w      1
condition_info.onfile:
          ds.w      1
          ds.b      32
condition_info.onloc:
          ds.w      1
          ds.b      32
condition_info.onkey:
          ds.w      1
          ds.b      64
condition_info.condition_no:
          ds.w      1
condition_info.c_ptr:
          ds.l      1
condition_info.mc_ptr:
          ds.l      1
condition_info.name:
          ds.w      1
          ds.b      32
condition_info.message:
          ds.w      1
          ds.b      256
condition_info.onframe:
          ds.l      1
condition_info.nextframe:
          ds.l      1
```

```
     equ        condition_info_len,446
     use        'code'
/* End include file ... condition_info.incl.asm
/*       incl 'mc'
/* Begin include file ...mc.incl.asm
/* Generated at 86-12-16 00:09:50 EST by cv_incl Release 6.alpha.c from
/*      %es#m6>Stratus>Tom_Clark>bug_fixes>vos-1384>lcd>os>mc.incl.pl1.

     equ        MC_MAX_SIZE,472
     equ        MC_MAX_FLOAT_SIZE,292
     equ        MC_MAX_EXT_SIZE,92
     equ        MC_FT_SAP,'0010'b4
     equ        MC_FT_68881_NULL,'0020'b4
     equ        MC_FT_68881_IDLE,'0021'b4
     equ        MC_FT_68881_BUSY,'0022'b4
     equ        MC_EXT_68000_STD,'0000'b4
     equ        MC_EXT_68000_LONG,'0001'b4
     equ        MC_EXT_68010_STD,'0010'b4
     equ        MC_EXT_68010_LONG,'0011'b4
     equ        MC_EXT_68020_NORM_4W,'0020'b4
     equ        MC_EXT_68020_THROW_4W,'0021'b4
     equ        MC_EXT_68020_NORM_6W,'0022'b4
     equ        MC_EXT_68020_MIDINST,'0023'b4
     equ        MC_EXT_68020_SHORT_BC,'0024'b4
     equ        MC_EXT_68020_LONG_BC,'0025'b4
     equ        MC_EXT_CPU_TYPE_MASK,'00F0'b4
     equ        MC_EXT_CPU_68000,'0000'b4
     equ        MC_EXT_CPU_68010,'0010'b4
     equ        MC_EXT_CPU_68020,'0020'b4
     equ        MC_EXT_68000_STD_BIN,0
     equ        MC_EXT_68000_LONG_BIN,1
     equ        MC_EXT_68010_STD_BIN,16
     equ        MC_EXT_68010_LONG_BIN,17
     equ        MC_EXT_68020_NORM_4W_BIN,32
     equ        MC_EXT_68020_THROW_4W_BIN,33
     equ        MC_EXT_68020_NORM_6W_BIN,34
     equ        MC_EXT_68020_MIDINST_BIN,35
     equ        MC_EXT_68020_SHORT_BC_BIN,36
     equ        MC_EXT_68020_LONG_BC_BIN,37
     use        'mc',dummy
mc:
mc.flags:
mc.flags.fault.byte:
     equ        mc.flags.fault.bit,15
     equ        mc.flags.fault.mask,'8000'b4
mc.flags.floating.byte:
     equ        mc.flags.floating.bit,14
     equ        mc.flags.floating.mask,'4000'b4
mc.flags.level_6_1_mask.byte:
     equ        mc.flags.level_6_1_mask.bit,13
     equ        mc.flags.level_6_1_mask.mask,'2000'b4
mc.flags.super_user.byte:
     equ        mc.flags.super_user.bit,12
     equ        mc.flags.super_user.mask,'1000'b4
mc.flags.kill_process.byte:
     equ        mc.flags.kill_process.bit,11
     equ        mc.flags.kill_process.mask,'0800'b4
mc.flags.level_7_1_mask.byte:
     equ        mc.flags.level_7_1_mask.bit,10
     equ        mc.flags.level_7_1_mask.mask,'0400'b4
mc.flags.pad:
     equ        mc.flags.pad.bit,0
     equ        mc.flags.pad.mask,'03FF'b4
                                                                ds.b 2
     equ        mc.flags.length,2
mc.f_bytes:                                                     ds.b 2
mc.float_offset:                                                ds.b 2
mc.float_type:
                                                                ds.b 2
mc.common_offset:                                               ds.b 2
mc.ext_offset:                                                  ds.b 2
mc.ext_type:
                                                                ds.b 2
     equ        mc.length,14
```

```
     use        'code'

     use        'mc_sap_float',dummy
mc_sap_float:
mc_sap_float.control:                                 ds.b 4
     equ        mc_sap_float.control.length,4
                                                      ds.b 12
     equ        mc_sap_float.control.dim,4
mc_sap_float.regs:
mc_sap_float.regs.data:                               ds.b 4
     equ        mc_sap_float.regs.data.length,4
                                                      ds.b 12
     equ        mc_sap_float.regs.data.dim,4
     equ        mc_sap_float.regs.length,16
                                                      ds.b 48
     equ        mc_sap_float.regs.dim,4
     equ        mc_sap_float.length,80
     use        'code'

     use        'mc_68881_float_null',dummy
mc_68881_float_null:
mc_68881_float_null.format_ind:
mc_68881_float_null.format_ind.version_number:      ds.b 1
mc_68881_float_null.format_ind.state_frame_size:    ds.b 1
mc_68881_float_null.format_ind.reserved:            ds.b 2
     equ        mc_68881_float_null.format_ind.length,4
     equ        mc_68881_float_null.length,4
     use        'code'

     use        'mc_68881_float_idle',dummy
mc_68881_float_idle:
mc_68881_float_idle.control:                        ds.b 4
mc_68881_float_idle.status:                         ds.b 4
mc_68881_float_idle.inst_addr:                      ds.b 4
mc_68881_float_idle.regs:
mc_68881_float_idle.regs.data:
                                                    ds.b 12
     equ        mc_68881_float_idle.regs.length,12
                                                    ds.b 84
     equ        mc_68881_float_idle.regs.dim,8
mc_68881_float_idle.format_ind:
mc_68881_float_idle.format_ind.version_number:      ds.b 1
mc_68881_float_idle.format_ind.state_frame_size:    ds.b 1
mc_68881_float_idle.format_ind.reserved:            ds.b 2
     equ        mc_68881_float_idle.format_ind.length,4
mc_68881_float_idle.comm_cond_reg:                  ds.b 2
mc_68881_float_idle.reserved:                       ds.b 2
mc_68881_float_idle.exceptional_operand:
                                                    ds.b 12
mc_68881_float_idle.operand_register:               ds.b 4
mc_68881_float_idle.biu_flags:
mc_68881_float_idle.biu_flags.protocol_viol_pend.byte:
     equ        mc_68881_float_idle.biu_flags.protocol_viol_pend.bit,31
     equ        mc_68881_float_idle.biu_flags.protocol_viol_pend.mask,'80000000'b4
mc_68881_float_idle.biu_flags.instr_pend.byte:
     equ        mc_68881_float_idle.biu_flags.instr_pend.bit,30
     equ        mc_68881_float_idle.biu_flags.instr_pend.mask,'40000000'b4
mc_68881_float_idle.biu_flags.pend_inst_acc_typ.byte:
     equ        mc_68881_float_idle.biu_flags.pend_inst_acc_typ.bit,29
     equ        mc_68881_float_idle.biu_flags.pend_inst_acc_typ.mask,'20000000'b4
mc_68881_float_idle.biu_flags.acc_oper_reg_exp.byte:
     equ        mc_68881_float_idle.biu_flags.acc_oper_reg_exp.bit,28
     equ        mc_68881_float_idle.biu_flags.acc_oper_reg_exp.mask,'10000000'b4
mc_68881_float_idle.biu_flags.float_pt_excp_pend.byte:
     equ        mc_68881_float_idle.biu_flags.float_pt_excp_pend.bit,27
     equ        mc_68881_float_idle.biu_flags.float_pt_excp_pend.mask,'08000000'b4
mc_68881_float_idle.biu_flags.op_to_mem_move_pend.byte:
     equ        mc_68881_float_idle.biu_flags.op_to_mem_move_pend.bit,26
     equ        mc_68881_float_idle.biu_flags.op_to_mem_move_pend.mask,'04000000'b4
mc_68881_float_idle.biu_flags.pad0:
     equ        mc_68881_float_idle.biu_flags.pad0.bit,24
     equ        mc_68881_float_idle.biu_flags.pad0.mask,'03000000'b4
                                                    ds.b 1
mc_68881_float_idle.biu_flags.oper_reg_0_7_valid.byte:
```

```
     equ       mc_68881_float_idle.biu_flags.oper_reg_0_7_valid.bit,23
     equ       mc_68881_float_idle.biu_flags.oper_reg_0_7_valid.mask,'00800000'b4
mc_68881_float_idle.biu_flags.oper_reg_8_15_valid.byte:
     equ       mc_68881_float_idle.biu_flags.oper_reg_8_15_valid.bit,22
     equ       mc_68881_float_idle.biu_flags.oper_reg_8_15_valid.mask,'00400000'b4
mc_68881_float_idle.biu_flags.oper_reg_16_23_valid.byte:
     equ       mc_68881_float_idle.biu_flags.oper_reg_16_23_valid.bit,21
     equ       mc_68881_float_idle.biu_flags.oper_reg_16_23_valid.mask,'00200000'b4
mc_68881_float_idle.biu_flags.oper_reg_24_31_valid.byte:
     equ       mc_68881_float_idle.biu_flags.oper_reg_24_31_valid.bit,20
     equ       mc_68881_float_idle.biu_flags.oper_reg_24_31_valid.mask,'00100000'b4
mc_68881_float_idle.biu_flags.pad1:
     equ       mc_68881_float_idle.biu_flags.pad1.bit,0
     equ       mc_68881_float_idle.biu_flags.pad1.mask,'000FFFFF'b4
                                                        ds.b 3
     equ       mc_68881_float_idle.biu_flags.length,4
     equ       mc_68881_float_idle.length,136
     use       'code'

     use       'mc_68881_float_busy',dummy
mc_68881_float_busy:
mc_68881_float_busy.control:                            ds.b 4
mc_68881_float_busy.status:                             ds.b 4
mc_68881_float_busy.inst_addr:                          ds.b 4
mc_68881_float_busy.regs:
mc_68881_float_busy.regs.data:
                                                        ds.b 12
     equ       mc_68881_float_busy.regs.length,12
                                                        ds.b 84
     equ       mc_68881_float_busy.regs.dim,8
mc_68881_float_busy.format_ind:
mc_68881_float_busy.format_ind.version_number:          ds.b 1
mc_68881_float_busy.format_ind.state_frame_size:        ds.b 1
mc_68881_float_busy.format_ind.reserved:                ds.b 2
     equ       mc_68881_float_busy.format_ind.length,4
mc_68881_float_busy.internal_regs:                      ds.b 2
     equ       mc_68881_float_busy.internal_regs.length,2
                                                        ds.b 178
     equ       mc_68881_float_busy.internal_regs.dim,90
     equ       mc_68881_float_busy.length,292
     use       'code'

     use       'mc_common',dummy
mc_common:
mc_common.start_time:                                   ds.b 4
mc_common.usp:                                          ds.b 4
mc_common.d:                                            ds.b 4
     equ       mc_common.d.length,4
                                                        ds.b 28
     equ       mc_common.d.dim,8
mc_common.a:                                            ds.b 4
     equ       mc_common.a.length,4
                                                        ds.b 24
     equ       mc_common.a.dim,7
mc_common.int_sr:
                                                        ds.b 2
mc_common.jsr_temp:
                                                        ds.b 2
mc_common.faultno:                                      ds.b 2
     equ       mc_common.length,74
     use       'code'

     use       'std_68000_ext',dummy
std_68000_ext:
std_68000_ext.status:
                                                        ds.b 2
std_68000_ext.pc:                                       ds.b 4
     equ       std_68000_ext.length,6
     use       'code'

     use       'long_68000_ext',dummy
long_68000_ext:
long_68000_ext.reason:
long_68000_ext.reason.pad2:
```

```
     equ        long_68000_ext.reason.pad2.bit,5
     equ        long_68000_ext.reason.pad2.mask,'FFE0'b4
                                                            ds.b 1
long_68000_ext.reason.read.byte:
     equ        long_68000_ext.reason.read.bit,4
     equ        long_68000_ext.reason.read.mask,'0010'b4
long_68000_ext.reason.inst.byte:
     equ        long_68000_ext.reason.inst.bit,3
     equ        long_68000_ext.reason.inst.mask,'0008'b4
long_68000_ext.reason.fc:
     equ        long_68000_ext.reason.fc.bit,0
     equ        long_68000_ext.reason.fc.mask,'0007'b4
                                                            ds.b 1
     equ        long_68000_ext.reason.length,2
long_68000_ext.access_address:                              ds.b 4
long_68000_ext.instruction_reg:
                                                            ds.b 2
long_68000_ext.status:
                                                            ds.b 2
long_68000_ext.pc:                                          ds.b 4
     equ        long_68000_ext.length,14
     use        'code'

     use        'std_68010_ext',dummy
std_68010_ext:
std_68010_ext.status:
                                                            ds.b 2
std_68010_ext.pc:                                           ds.b 4
std_68010_ext.info:
std_68010_ext.info.format:
     equ        std_68010_ext.info.format.bit,12
     equ        std_68010_ext.info.format.mask,'F000'b4
std_68010_ext.info.vector:
     equ        std_68010_ext.info.vector.bit,0
     equ        std_68010_ext.info.vector.mask,'0FFF'b4
                                                            ds.b 2
     equ        std_68010_ext.info.length,2
     equ        std_68010_ext.length,8
     use        'code'

     use        'long_68010_ext',dummy
long_68010_ext:
long_68010_ext.status:
                                                            ds.b 2
long_68010_ext.pc:                                          ds.b 4
long_68010_ext.info:
long_68010_ext.info.format:
     equ        long_68010_ext.info.format.bit,12
     equ        long_68010_ext.info.format.mask,'F000'b4
long_68010_ext.info.vector:
     equ        long_68010_ext.info.vector.bit,0
     equ        long_68010_ext.info.vector.mask,'0FFF'b4
                                                            ds.b 2
     equ        long_68010_ext.info.length,2
long_68010_ext.special_status:
long_68010_ext.special_status.rerun.byte:
     equ        long_68010_ext.special_status.rerun.bit,15
     equ        long_68010_ext.special_status.rerun.mask,'8000'b4
long_68010_ext.special_status.pad1.byte:
     equ        long_68010_ext.special_status.pad1.bit,14
     equ        long_68010_ext.special_status.pad1.mask,'4000'b4
long_68010_ext.special_status.inst_fetch.byte:
     equ        long_68010_ext.special_status.inst_fetch.bit,13
     equ        long_68010_ext.special_status.inst_fetch.mask,'2000'b4
long_68010_ext.special_status.data_fetch.byte:
     equ        long_68010_ext.special_status.data_fetch.bit,12
     equ        long_68010_ext.special_status.data_fetch.mask,'1000'b4
long_68010_ext.special_status.r_m_w_cycle.byte:
     equ        long_68010_ext.special_status.r_m_w_cycle.bit,11
     equ        long_68010_ext.special_status.r_m_w_cycle.mask,'0800'b4
long_68010_ext.special_status.high_byte.byte:
     equ        long_68010_ext.special_status.high_byte.bit,10
     equ        long_68010_ext.special_status.high_byte.mask,'0400'b4
long_68010_ext.special_status.byte_xfer.byte:
```

```
     equ        long_68010_ext.special_status.byte_xfer.bit,9
     equ        long_68010_ext.special_status.byte_xfer.mask,'0200'b4
long_68010_ext.special_status.read.byte:
     equ        long_68010_ext.special_status.read.bit,8
     equ        long_68010_ext.special_status.read.mask,'0100'b4
                                                        ds.b 1
long_68010_ext.special_status.pad2:
     equ        long_68010_ext.special_status.pad2.bit,3
     equ        long_68010_ext.special_status.pad2.mask,'00F8'b4
long_68010_ext.special_status.function_code:
     equ        long_68010_ext.special_status.function_code.bit,0
     equ        long_68010_ext.special_status.function_code.mask,'0007'b4
                                                        ds.b 1
     equ        long_68010_ext.special_status.length,2
long_68010_ext.fault_addr:                              ds.b 4
long_68010_ext.resv_data_out:
                                                        ds.b 2
long_68010_ext.data_out:
                                                        ds.b 2
long_68010_ext.resv_data_in:
                                                        ds.b 2
long_68010_ext.data_in:
                                                        ds.b 2
long_68010_ext.resv_inst:
                                                        ds.b 2
long_68010_ext.instruction:
                                                        ds.b 2
long_68010_ext.internal_info:                           ds.b 2
     equ        long_68010_ext.internal_info.length,2
                                                        ds.b 30
     equ        long_68010_ext.internal_info.dim,16
     equ        long_68010_ext.length,58
     use        'code'

     use        'normal_4w_68020_ext',dummy
normal_4w_68020_ext:
normal_4w_68020_ext.status:
                                                        ds.b 2
normal_4w_68020_ext.pc:                                 ds.b 4
normal_4w_68020_ext.info:
normal_4w_68020_ext.info.format:
     equ        normal_4w_68020_ext.info.format.bit,12
     equ        normal_4w_68020_ext.info.format.mask,'F000'b4
normal_4w_68020_ext.info.vector:
     equ        normal_4w_68020_ext.info.vector.bit,0
     equ        normal_4w_68020_ext.info.vector.mask,'0FFF'b4
                                                        ds.b 2
     equ        normal_4w_68020_ext.info.length,2
     equ        normal_4w_68020_ext.length,8
     use        'code'

     use        'throwaway_4w_68020_ext',dummy
throwaway_4w_68020_ext:
throwaway_4w_68020_ext.status:
                                                        ds.b 2
throwaway_4w_68020_ext.pc:                              ds.b 4
throwaway_4w_68020_ext.info:
throwaway_4w_68020_ext.info.format:
     equ        throwaway_4w_68020_ext.info.format.bit,12
     equ        throwaway_4w_68020_ext.info.format.mask,'F000'b4
throwaway_4w_68020_ext.info.vector:
     equ        throwaway_4w_68020_ext.info.vector.bit,0
     equ        throwaway_4w_68020_ext.info.vector.mask,'0FFF'b4
                                                        ds.b 2
     equ        throwaway_4w_68020_ext.info.length,2
     equ        throwaway_4w_68020_ext.length,8
     use        'code'

     use        'normal_6w_68020_ext',dummy
normal_6w_68020_ext:
normal_6w_68020_ext.status:
                                                        ds.b 2
normal_6w_68020_ext.pc:                                 ds.b 4
normal_6w_68020_ext.info:
normal_6w_68020_ext.info.format:
```

```
     equ       normal_6w_68020_ext.info.format.bit,12
     equ       normal_6w_68020_ext.info.format.mask,'F000'b4
normal_6w_68020_ext.info.vector:
     equ       normal_6w_68020_ext.info.vector.bit,0
     equ       normal_6w_68020_ext.info.vector.mask,'0FFF'b4
                                                      ds.b 2
     equ       normal_6w_68020_ext.info.length,2
normal_6w_68020_ext.inst_address:                     ds.b 4
     equ       normal_6w_68020_ext.length,12
     use       'code'

     use       'coproc_midinst_68020_ext',dummy
coproc_midinst_68020_ext:
coproc_midinst_68020_ext.status:
                                                      ds.b 2
coproc_midinst_68020_ext.pc:                          ds.b 4
coproc_midinst_68020_ext.info:
coproc_midinst_68020_ext.info.format:
     equ       coproc_midinst_68020_ext.info.format.bit,12
     equ       coproc_midinst_68020_ext.info.format.mask,'F000'b4
coproc_midinst_68020_ext.info.vector:
     equ       coproc_midinst_68020_ext.info.vector.bit,0
     equ       coproc_midinst_68020_ext.info.vector.mask,'0FFF'b4
                                                      ds.b 2
     equ       coproc_midinst_68020_ext.info.length,2
coproc_midinst_68020_ext.inst_address:                ds.b 4
coproc_midinst_68020_ext.internal_regs:               ds.b 2
     equ       coproc_midinst_68020_ext.internal_regs.length,2
                                                      ds.b 6
     equ       coproc_midinst_68020_ext.internal_regs.dim,4
     equ       coproc_midinst_68020_ext.length,20
     use       'code'

     use       'short_bc_68020_ext',dummy
short_bc_68020_ext:
short_bc_68020_ext.status:
                                                      ds.b 2
short_bc_68020_ext.pc:                                ds.b 4
short_bc_68020_ext.info:
short_bc_68020_ext.info.format:
     equ       short_bc_68020_ext.info.format.bit,12
     equ       short_bc_68020_ext.info.format.mask,'F000'b4
short_bc_68020_ext.info.vector:
     equ       short_bc_68020_ext.info.vector.bit,0
     equ       short_bc_68020_ext.info.vector.mask,'0FFF'b4
                                                      ds.b 2
     equ       short_bc_68020_ext.info.length,2
short_bc_68020_ext.internal_reg_0:                    ds.b 2
short_bc_68020_ext.special_status:
short_bc_68020_ext.special_status.fault_stage_c.byte:
     equ       short_bc_68020_ext.special_status.fault_stage_c.bit,15
     equ       short_bc_68020_ext.special_status.fault_stage_c.mask,'8000'b4
short_bc_68020_ext.special_status.fault_stage_b.byte:
     equ       short_bc_68020_ext.special_status.fault_stage_b.bit,14
     equ       short_bc_68020_ext.special_status.fault_stage_b.mask,'4000'b4
short_bc_68020_ext.special_status.rerun_stage_c.byte:
     equ       short_bc_68020_ext.special_status.rerun_stage_c.bit,13
     equ       short_bc_68020_ext.special_status.rerun_stage_c.mask,'2000'b4
short_bc_68020_ext.special_status.rerun_stage_b.byte:
     equ       short_bc_68020_ext.special_status.rerun_stage_b.bit,12
     equ       short_bc_68020_ext.special_status.rerun_stage_b.mask,'1000'b4
short_bc_68020_ext.special_status.pad0:
     equ       short_bc_68020_ext.special_status.pad0.bit,9
     equ       short_bc_68020_ext.special_status.pad0.mask,'0E00'b4
short_bc_68020_ext.special_status.flt_rr_data_cycle.byte:
     equ       short_bc_68020_ext.special_status.flt_rr_data_cycle.bit,8
     equ       short_bc_68020_ext.special_status.flt_rr_data_cycle.mask,'0100'b4
                                                      ds.b 1
short_bc_68020_ext.special_status.rmw_data_cycle.byte:
     equ       short_bc_68020_ext.special_status.rmw_data_cycle.bit,7
     equ       short_bc_68020_ext.special_status.rmw_data_cycle.mask,'0080'b4
short_bc_68020_ext.special_status.read_data_cycle.byte:
     equ       short_bc_68020_ext.special_status.read_data_cycle.bit,6
     equ       short_bc_68020_ext.special_status.read_data_cycle.mask,'0040'b4
```

```
short_bc_68020_ext.special_status.data_cycle_size:
     equ        short_bc_68020_ext.special_status.data_cycle_size.bit,4
     equ        short_bc_68020_ext.special_status.data_cycle_size.mask,'0030'b4
short_bc_68020_ext.special_status.pad1.byte:
     equ        short_bc_68020_ext.special_status.pad1.bit,3
     equ        short_bc_68020_ext.special_status.pad1.mask,'0008'b4
short_bc_68020_ext.special_status.funct_code:
     equ        short_bc_68020_ext.special_status.funct_code.bit,0
     equ        short_bc_68020_ext.special_status.funct_code.mask,'0007'b4
                                                          ds.b 1
     equ        short_bc_68020_ext.special_status.length,2
short_bc_68020_ext.inst_pipe_stage_c:                     ds.b 2
short_bc_68020_ext.inst_pipe_stage_b:                     ds.b 2
short_bc_68020_ext.data_fault_addr:                       ds.b 4
short_bc_68020_ext.internal_regs_1_2:                     ds.b 2
     equ        short_bc_68020_ext.internal_regs_1_2.length,2
                                                          ds.b 2
     equ        short_bc_68020_ext.internal_regs_1_2.dim,2
short_bc_68020_ext.data_output_buffer:                    ds.b 4
short_bc_68020_ext.internal_regs_3_4:                     ds.b 2
     equ        short_bc_68020_ext.internal_regs_3_4.length,2
                                                          ds.b 2
     equ        short_bc_68020_ext.internal_regs_3_4.dim,2
     equ        short_bc_68020_ext.length,32
     use        'code'

     use        'long_bc_68020_ext',dummy
long_bc_68020_ext:
long_bc_68020_ext.status:
                                                          ds.b 2
long_bc_68020_ext.pc:                                     ds.b 4
long_bc_68020_ext.info:
long_bc_68020_ext.info.format:
     equ        long_bc_68020_ext.info.format.bit,12
     equ        long_bc_68020_ext.info.format.mask,'F000'b4
long_bc_68020_ext.info.vector:
     equ        long_bc_68020_ext.info.vector.bit,0
     equ        long_bc_68020_ext.info.vector.mask,'0FFF'b4
                                                          ds.b 2
     equ        long_bc_68020_ext.info.length,2
long_bc_68020_ext.internal_reg_0:                         ds.b 2
long_bc_68020_ext.special_status:
long_bc_68020_ext.special_status.fault_stage_c.byte:
     equ        long_bc_68020_ext.special_status.fault_stage_c.bit,15
     equ        long_bc_68020_ext.special_status.fault_stage_c.mask,'8000'b4
long_bc_68020_ext.special_status.fault_stage_b.byte:
     equ        long_bc_68020_ext.special_status.fault_stage_b.bit,14
     equ        long_bc_68020_ext.special_status.fault_stage_b.mask,'4000'b4
long_bc_68020_ext.special_status.rerun_stage_c.byte:
     equ        long_bc_68020_ext.special_status.rerun_stage_c.bit,13
     equ        long_bc_68020_ext.special_status.rerun_stage_c.mask,'2000'b4
long_bc_68020_ext.special_status.rerun_stage_b.byte:
     equ        long_bc_68020_ext.special_status.rerun_stage_b.bit,12
     equ        long_bc_68020_ext.special_status.rerun_stage_b.mask,'1000'b4
long_bc_68020_ext.special_status.pad0:
     equ        long_bc_68020_ext.special_status.pad0.bit,9
     equ        long_bc_68020_ext.special_status.pad0.mask,'0E00'b4
long_bc_68020_ext.special_status.flt_rr_data_cycle.byte:
     equ        long_bc_68020_ext.special_status.flt_rr_data_cycle.bit,8
     equ        long_bc_68020_ext.special_status.flt_rr_data_cycle.mask,'0100'b4
                                                          ds.b 1
long_bc_68020_ext.special_status.rmw_data_cycle.byte:
     equ        long_bc_68020_ext.special_status.rmw_data_cycle.bit,7
     equ        long_bc_68020_ext.special_status.rmw_data_cycle.mask,'0080'b4
long_bc_68020_ext.special_status.read_data_cycle.byte:
     equ        long_bc_68020_ext.special_status.read_data_cycle.bit,6
     equ        long_bc_68020_ext.special_status.read_data_cycle.mask,'0040'b4
long_bc_68020_ext.special_status.data_cycle_size:
     equ        long_bc_68020_ext.special_status.data_cycle_size.bit,4
     equ        long_bc_68020_ext.special_status.data_cycle_size.mask,'0030'b4
long_bc_68020_ext.special_status.pad1.byte:
     equ        long_bc_68020_ext.special_status.pad1.bit,3
     equ        long_bc_68020_ext.special_status.pad1.mask,'0008'b4
```

```
long_bc_68020_ext.special_status.funct_code:
     equ        long_bc_68020_ext.special_status.funct_code.bit,0
     equ        long_bc_68020_ext.special_status.funct_code.mask,'0007'b4
                                                          ds.b 1
     equ        long_bc_68020_ext.special_status.length,2
long_bc_68020_ext.inst_pipe_stage_c:                      ds.b 2
long_bc_68020_ext.inst_pipe_stage_b:                      ds.b 2
long_bc_68020_ext.data_fault_addr:                        ds.b 4
long_bc_68020_ext.internal_regs_1_2:                      ds.b 2
     equ        long_bc_68020_ext.internal_regs_1_2.length,2
                                                          ds.b 2
     equ        long_bc_68020_ext.internal_regs_1_2.dim,2
long_bc_68020_ext.data_output_buffer:                     ds.b 4
long_bc_68020_ext.internal_regs_3_6:                      ds.b 2
     equ        long_bc_68020_ext.internal_regs_3_6.length,2
                                                          ds.b 6
     equ        long_bc_68020_ext.internal_regs_3_6.dim,4
long_bc_68020_ext.stage_b_addr:                           ds.b 4
long_bc_68020_ext.internal_regs_7_8:                      ds.b 2
     equ        long_bc_68020_ext.internal_regs_7_8.length,2
                                                          ds.b 2
     equ        long_bc_68020_ext.internal_regs_7_8.dim,2
long_bc_68020_ext.data_input_buffer:                      ds.b 4
long_bc_68020_ext.internal_regs_9_31:                     ds.b 2
     equ        long_bc_68020_ext.internal_regs_9_31.length,2
                                                          ds.b 42
     equ        long_bc_68020_ext.internal_regs_9_31.dim,22
     equ        long_bc_68020_ext.length,92
     use        'code'


/* End include file ...mc.incl.asm
/*      incl        'status_register'
/*       incl        'fault_codes'
/* Begin include file ...fault_codes.incl.asm
/* Generated at 86-07-14 16:38:28 EDT by cv_incl Release 5ah from
/*      %es#m8>Stratus>Tom_Clark>fresco>68881>incl>fault_codes.incl.pl1.

     equ        UNASSIGNED_VECTOR_0,0
     equ        RESET,1
     equ        PAGE_FAULT,2
     equ        ADDRESS_ERROR,3
     equ        ILLEGAL_INSTRUCTION,4
     equ        ZERO_DIVIDE,5
     equ        CHK_INSTRUCTION,6
     equ        TRAPV_INSTRUCTION,7
     equ        PRIVILEGE_VIOLATION,8
     equ        TRACE,9
     equ        LINE_1010_EMULATOR,10
     equ        LINE_1111_EMULATOR,11
     equ        UNASSIGNED_VECTOR_12,12
     equ        COPROC_PROTOCOL_VIOLATION,13
     equ        FORMAT_ERROR,14
     equ        UNINITIALIZED_INTERRUPT_VECTOR,15
     equ        UNASSIGNED_VECTOR_16,16
     equ        UNASSIGNED_VECTOR_17,17
     equ        UNASSIGNED_VECTOR_18,18
     equ        UNASSIGNED_VECTOR_19,19
     equ        UNASSIGNED_VECTOR_20,20
     equ        UNASSIGNED_VECTOR_21,21
     equ        UNASSIGNED_VECTOR_22,22
     equ        UNASSIGNED_VECTOR_23,23
     equ        SPURIOUS_INTERRUPT,24
     equ        LEVEL_1_AUTOVECTOR,25
     equ        LEVEL_2_AUTOVECTOR,26
     equ        LEVEL_3_AUTOVECTOR,27
     equ        LEVEL_4_AUTOVECTOR,28
     equ        LEVEL_5_AUTOVECTOR,29
     equ        LEVEL_6_AUTOVECTOR,30
     equ        LEVEL_7_AUTOVECTOR,31
     equ        TRAP_0_INSTRUCTION,32
     equ        TRAP_1_INSTRUCTION,33
     equ        TRAP_2_INSTRUCTION,34
     equ        TRAP_3_INSTRUCTION,35
```

```
        equ     TRAP_4_INSTRUCTION,36
        equ     TRAP_5_INSTRUCTION,37
        equ     TRAP_6_INSTRUCTION,38
        equ     TRAP_7_INSTRUCTION,39
        equ     TRAP_8_INSTRUCTION,40
        equ     TRAP_9_INSTRUCTION,41
        equ     TRAP_10_INSTRUCTION,42
        equ     TRAP_11_INSTRUCTION,43
        equ     TRAP_12_INSTRUCTION,44
        equ     TRAP_13_INSTRUCTION,45
        equ     TRAP_14_INSTRUCTION,46
        equ     TRAP_15_INSTRUCTION,47
        equ     BRANCH_SET_ON_UNORDERED,48
        equ     INEXACT_RESULT,49
        equ     FP_DIVIDE_BY_ZERO,50
        equ     UNDERFLOW,51
        equ     OPERAND_ERROR,52
        equ     OVERFLOW,53
        equ     SIGNALLING_NAN,54
        equ     UNASSIGNED_VECTOR_55,55
        equ     UNASSIGNED_VECTOR_56,56
        equ     UNASSIGNED_VECTOR_57,57
        equ     UNASSIGNED_VECTOR_58,58
        equ     UNASSIGNED_VECTOR_59,59
        equ     UNASSIGNED_VECTOR_60,60
        equ     UNASSIGNED_VECTOR_61,61
        equ     UNASSIGNED_VECTOR_62,62
        equ     UNASSIGNED_VECTOR_63,63
        equ     SAD_KERNEL_CALL,64
        equ     PRIVILEGED_CALL,65
        equ     PROGRAM_INTERRUPT,66
        equ     SAP_EXCEPTION,67

/* End include file ...fault_codes.incl.asm

        eject
/* $$ENABLE_CONDITION: Enables a condition by pushing an on-unit
/*                     on to the current stack frame

        extdef    $$enable_condition
        *
/* Usage:
/*   dcl  $$enable_condition (fb15, ptr, ch32v, entry);
/*   call $$enable_condition (cond, fcbp, name, handler);

/* Pick up arguments.  The following regs are setup
/* and maintained for the entire program
/*   d7 = condition number
/*   a4 = fcbp
/*   a3 -> handler entry variable
/*   a2 -> name (varying string)
/*   d4 = prev ptr or end of unshared list
/*   d5 = null ptr or beginning of shared list
/*   d6 = flag for old/new or address to link to

$$enable_condition:
        movem.l   4(a7),a0-a3;
        move.w    (a0),d7          /* condition number
        movea.l   (a1),a4          /* fcb ptr
        moveq.l   =null,d5

/* Search existing on_units for specified condition

        moveq.l   =0,d6            /* will mean no link later

        lea       stack_frame.on_ptr(a6),a5
                                   /* where first on unit is linked
        move.l    a5,d4            /* prev link
        btst.b    =0,stack_frame.entry_ptr+3(a6)
                                   /* is there any on unit
        beq.s     $new_on_unit     /* no, make one
        movea.l   (a5),a5          /* first on unit

$search:
```

```
        cmp.b      on_unit.code,d7       /* match codes
        bne.b      $next

        cmpa.l     on_unit.fcb_ptr,a4  /* match fcb ptr
        bne.b      $next

        cmp.w      =USER_DEFINED_CONDITION_NO,d7
                                 /* name match needed?
        bne.b      $check_match  /* no, so got match

        move.w     on_unit.cond_name,d0      /* op1 len
        lea        on_unit.cond_name+2,a0    /* op1 addr
        move.w     (a2),d1        /* op2 len
        lea        2(a2),a1       /* op2 addr
        jsr        compare_chars
        beq.b      $check_match   /* got a complete match

$next:
        move.l     on_unit.next,d0      /* forward pointer
        cmp.l      d5,d0          /* compare to null
        beq.b      $add_on_unit   /* end of chain
        movea.l    d0,a5          /* move to on_unit reg
        btst.b     =on_unit.flags.shared,on_unit.flags
        bne.b      $search        /* remember prev to first shared
        move.l     a5,d4          /* address to link to
        bra.b      $search

$check_match:
        btst.b     =on_unit.flags.shared,on_unit.flags
        beq.b      $fill_in_unit     /* not shared - just reuse old

        move.l     a5,d5             /* temporarily save found unit
        movea.l    d4,a0             /* prev to first shared
        movea.l    on_unit.next(a0),a5  /* start of copy

$copy_shared:                        /* copy loop for preceding shared units
        cmpa.l     d5,a5             /* check done (or none)
        beq.b      $insert_unit      /* insert new one
        moveq      =16,d3            /* reusable arg list space
        jsr        s$copy_on_unit    /* do copy
        movea.l    a0,a5
        move.l     a5,d4             /* copied is prev
        movea.l    on_unit.next,a5   /* next unit to copy
        bra.b      $copy_shared

$add_on_unit:
        movea.l    d4,a5              /* end of unshared part

$insert_unit:
        move.l     on_unit.next,d5   /* link to rest of shared list

/* Create a new on unit by growing the stack frame
/* My return address and my argument list are in the
/* way, so must be extremely careful here
/* The stack frame is extended in such a way that
/* the return address and parameters are overlayed
/* by the end of the on unit.  A new return address
/* is moved farther down the stack so that I can
/* return. 16 bytes of pad are left between the
/* return address and the on unit so that my old
/* caller can add 16 to a7 to pop off his argument
/* list. The following picture shows this trasform:

/*                                  <------20------>
/*                                  +--+--+--+--+--+
/* OLD:                             |RA|A1|A2|A3|A4|
/*      +--+--+--+--+--+--------------+--+--+--+--+--+
/* NEW: |RA|XX|XX|XX|XX|      ON UNIT               |
/*      +--+--+--+--+--+--------------+--+--+--+--+--+
/*         <-----16----><-------on_unit_len------->
/*      ^                           ^
/*      |                           |
/*      +--a7 at rts                +--a7 at entry
```

```
/* If the condition is not a USER_DEFINED_CONDTION,
/* then the length of the on-unit is reduced by 32
/* bytes since there will be no on_unit.cond_name

$new_on_unit:

     move.l     d4,d6            /* address to link to
     move.l     (a7),d0          /* pick up return address
     suba.w     =on_unit_len-20,a7
     cmp.w      =USER_DEFINED_CONDITION_NO,d7
                                 /* does cond have name?
     beq.b      $has_name        /* yes

     adda.w     =32,a7           /* no, leave only room for cnt

$has_name:
     movea.l    a7,a5            /* on unit ptr
     move.l     a5,stack_frame.orig_frame_end(a6)
                                 /* new official end
     suba.w     =16,a7           /* padding for params
     push.l     d0               /* store new return address

/* now fill in the new on unit

$fill_in_unit:

     move.b     =0,on_unit.flags
     move.l     (a3),on_unit.entry_var    /* copy handler
     move.l     4(a3),on_unit.entry_var+4
     move.l     8(a3),on_unit.entry_var+8

     tst.l      d6               /* new on  unit?
     beq.b      $skip_assign
     move.l     d5,on_unit.next       /* store null or old link at end
     move.b     d7,on_unit.code
     move.l     a4,on_unit.fct_ptr
     move.w     =0,on_unit.cond_name      /* ''
     cmp.w      =USER_DEFINED_CONDITION_NO,d7
     bne.b      $skip_assign
     lea        on_unit.cond_name+2,a0    /* addr (target)
     moveq.l    =32,d0           /* maxlen (target)
     lea        2(a2),a1         /* addr (source)
     move.w     (a2),d1          /* len (source */
     jsr        assign_vchars

$skip_assign:
     bset.b     =on_unit.flags.enabled,on_unit.flags

/* now new unit can be threaded in

     tst.l      d6               /* new?
     beq.b      $rts             /* no

     movea.l    d6,a0
     move.l     a5,(a0)          /* thread
     btst.b     =0,stack_frame.entry_ptr+3(a6)
                                 /* first unit?
     bne.b      $rts             /* no

     addq.b     =1,stack_frame.entry_ptr+3(a6)
                                 /* frame now has units
$rts:
     rts

     eject

/* S$REVERT_CONDITION: Reverts a previously enabled
/*                     condition

/* Usage:
/*   cal  s$revert_condition (fb15, ptr, ch32v);
/*   call s$revert_condition (cond, fcbp, name);

     extdef     s$revert_condition
```

```
/* Pick up arguments. The following regs are setup
/* and maintained for the entire program
/*    d7 = condition number
/*    a4 = fcbp
/*    a2 -> name (varying string)
/* also uses dedicated regs
/*    d4 = prev link
/*    d5 = null ptr
/* also uses a0,a1,d0,d1

s$revert_condition:
     movem.l   4(a7),a0-a2;
     move.w    (a0),d7           /* condition number
     movea.l   (a1),a4           /* fcb ptr
     moveq.l   =null,d5
/* Search existing on_units for specified condition

     btst.b    =0,stack_frame.entry_ptr+3(a6)
                                 /* is there any on unit
     beq.b     $rts              /* no

     lea       stack_frame.on_ptr(a6),a5
                                 /* first on unit
     move.l    a5,d4              /* first prev
     movea.l   (a5),a5            /* first on unit

$search:
     cmp.b     on_unit.code,d7      /* match codes
     bne.b     $check_shared

     cmpa.l    on_unit.fcb_ptr,a4  /* match fcb ptr
     bne.b     $check_shared

     cmp.w     =USER_DEFINED_CONDITION_NO,d7
                                 /* name match needed?
     bne.b     $found            /* no, so got match

     move.w    on_unit.cond_name,d0      /* op1 len
     lea       on_unit.cond_name+2,a0   /* op1 addr
     move.w    (a2),d1           /* op2 len
     lea       2(a2),a1          /* op2 addr
     jsr       compare_chars
     beq.b     $found           /* got a complete match

$check_shared:
     btst.b    =on_unit.flags.shared,on_unit.flags
     beq.b     $next

     moveq     =12,d3            /* reusable arg list space
     bsr       s$copy_on_unit    /* copy static unit
     movea.l   a0,a5

$next:
     move.l    a5,d4            /* save prev
     movea.l   on_unit.next,a5   /* forward pointer
     cmpa.l    d5,a5            /* compare to null
     beq.b     $rts             /* end of chain
     bra.b     $search

/* now revert the condition

$found:

     btst.b    =on_unit.flags.shared,on_unit.flags
     bne.b     $skip             /* skip disabled static unit
     bclr.b    =on_unit.flags.enabled,on_unit.flags
     bra.b     $rts

$skip:
     movea.l   d4,a0             /* get prev
     move.l    on_unit.next,on_unit.next(a0)    /* update to skip disabled

$rts:
     rts
```

```
/* s$copy_on_unit

/* Create a new on unit by growing the stack frame
/*  takes three args by value -
/*         d3  reusable arg list space
/*         d4  prev pointer
/*         a5  address of on unit to be copied
/*  return the created on unit pointer in a0
/*  also uses a0,a1,d0,d1,d2,d6
/*  leaves d4,d5,d7 alone

/* The stack frame gets extended in such a way
/* that the return address and parameters of
/* s$enable_condition or s$revert_condition
/* at the end of the fixed part of the stack
/* get moved to the end of the extended stack
/* so that the caller can return.
/* 16 (or 12) bytes of pad are left between the
/* return address and the on unit so that the pl1
/* caller can add 16 (or 12) to a7 to pop off his arg
/* list. The following picture shows this transform:

/*                                <----20(16)---->
/*                                +--+--+--+--+--+
/* OLD:                           |RA|A1|A2|A3|A4|
/*       +--+--+--+--+--+--------------------------+
/* NEW:  |RA|XX|XX|XX|XX|  CREATED ON UNITS        |
/*       +--+--+--+--+--+--------------------------+
/*          <---16(12)--><------on_unit_len----->
/*       ^                        ^
/*       |                        |
/*       +--a7 at rts             +--a7 at entry

s$copy_on_unit:
     pop.l      d6           /* save return loc
     move.l     (a7),d2      /* preserve callers return
     lea        -(on_unit_len-4)(a7,d3.w),a7  /* extend stack
     move.b     on_unit.code,d1
     cmp.b      =USER_DEFINED_CONDITION_NO,d1
                                /* does cond have name?
     beq.b      $has_name       /* yes

/* If the condition is not a USER_DEFINED_CONDITION,
/* then the length of the on-unit is reduced by 32
/* bytes since there will be no on_unit.cond_name

     adda.w     =32,a7          /* no, leave only room for cnt

$has_name:

/* now fill in the new on unit

     move.b     d1,on_unit.code(a7)
     move.b     on_unit.flags,on_unit.flags(a7)
     bclr.b     =on_unit.flags.shared,on_unit.flags(a7)
     move.w     =0,on_unit.cond_name(a7)     /* ''
     move.l     on_unit.fcb_ptr,on_unit.fcb_ptr(a7)

     move.l     on_unit.entry_var,on_unit.entry_var(a7)
     move.l     on_unit.entry_var+4,on_unit.entry_var+4(a7)
     move.l     on_unit.entry_var+8,on_unit.entry_var+8(a7)

     move.l     on_unit.next,on_unit.next(a7)     /* get next

     cmp.b      =USER_DEFINED_CONDITION_NO,d1
     bne.b      $skip_assign
     moveq.l    =32,d0          /* maxlen (target)
     lea        on_unit.cond_name+2,a1       /* addr (source)
     move.w     on_unit.cond_name,d1         /* len (source)
     lea        on_unit.cond_name+2(a7),a0   /* addr (target)
     jsr        assign_vcrars

$skip_assign:
```

```
     movea.l    a7,a0              /* for return

 /* now extend the stack for the copied args and return

     move.l     a7,stack_frame.orig_frame_end(a6)
                                   /* new official end
     suba.w     d3,a7              /* space for parms
     push.l     d2                 /* preserve callers return

 /* now new unit can be threaded in

     movea.l    d4,a1
     cmpa.w     =null,a1
     beq.b      $rt2

     move.l     a0,(a1)            /* thread into head

 $rt2:
     push.l     d6                 /* and go return
     rts

     eject
 /* S$SIGNAL_CONDITION: Search for handler for a speicified
 /*                     condition
     *
 /* Usage:
 /*   dcl  s$signal_condition entry (fb15,ptr,c32v,fb15,c256v);
 /*   call s$signal_condition (cond,fcbp,name,oncode,msg);

 /* there is also an alternate entry used to signal a fault:
 /* Usage:
 /*   dcl  signal_fault entry (fb15,ptr,c32v,fb15,c256v);
 /*   call signal_fault (cond,mcp,name,oncode,msg);

 /* This entry uses a stack frame that is identical to the
 /* frame used by s$find_condition_info

 /* stack frame variables

     auto.w     cond_no            /* condition =
     auto.l     fcb_ptr
     auto.l     mc_ptr
     auto.l     name_ptr
     auto.w     oncode
     auto.l     message_ptr
     auto.l     save_regs(5)
     auto.w     continue
     auto.w     system_handler_used
     auto.w     searching_stack
     auto.w     condition_info((condition_info_len+1)/2)
     auto.w     code
     auto.w     goto_used
     auto.l     target(2)

 /* s$signal condition

     extdef     s$signal_condition

 s$signal_condition:
     entry      s$signal_condition  (support,signaller)

 /* pick up arguments

     movem.l    8(a6),a0-a4;
     move.w     (a0),cond_no       /* condition number
     move.l     (a1),fcb_ptr       /* addr (fcb)
     move.l     a2,name_ptr        /* addr (name condition)
     move.w     (a3),oncode        /* value of oncode
     move.l     a4,message_ptr     /* addr (message)
     move.l     =null,mc_ptr       /* no mcp for this entry
     bra.b      signal_join

 /* signal_fault entry:
```

```
     extdef     signal_fault

signal_fault:
     entry      signal_fault   (support,signaller)

/* pick up arguments

     movem.l    8(a6),a0-a4;
     move.w     (a0),cond_no    /* condition number
     movea.l    (a1),a1         /* addr (machine conditions)
     move.l     a1,mc_ptr
     move.l     a2,name_ptr     /* addr (name condition)
     move.w     (a3),oncode     /* value of oncode
     move.l     a4,message_ptr  /* addr (message)
     move.l     =null,fcb_ptr   /* no fcbp for fault

/* now search backwards for frames with on-units
/*
/* Register usage in the search code:
/*
/* d0-d2 -  scratch
/* d5    -> anyother_on_unit or 0
/* d6    -  ANYOTHER_CONDITION_NO
/* d7    -  cond_no
/* a0-a1 -  scratch
/* a2    -  name_ptr
/* a3    -  fcb_ptr
/* a4    -> stack frame being checked
/* a5    -> on_unit being checked

signal_join:
     move.w     =1,searching_stack  /* say we are searching
     move.w     cond_no,d7      /* to speed up scan
     movea.l    fcb_ptr,a3      /* ..
     movea.l    name_ptr,a2     /* ..
     moveq      =ANYOTHER_CONDITION_NO,d6 /* ..
     clr.w      goto_used               /* start assuming call
     movea.l    stack_frame.prev_sp(a6),a4 /* start search
     cmp.w      =CLEANUP_CONDITION_NO,d7  /* not allowed
     bne.b      $test_frame

     move.w     =ERROR_CONDITION_NO,d7   /* change to error
     move.w     =e$bad_cleanup,oncode

$test_frame:
     moveq      =0,d5           /* addr(anyother_on_unit)
     cmpa.l     a4,a7           /* make sure in right order
     bge.w      $use_system     /* bad link

/* check here for another s$signal_condition frame that is
/* still searching the stack. If this is the case, give up
/* and call the default handler

     move.l     stack_frame.entry_ptr(a4),d0 /* operator?
     beq.b      $not_signaller_frame          /* yes

     btst.l     =0,d0
     bne.b      $not_signaller_frame  /* signal has no on-unit

     movea.l    d0,a0
     using      'entry_block',a0
     move.w     entry_block.flags,d0     /* get flags
     btst.l     =entry_block.flags.signaller,d0
     drop       'entry_block'
     beq.b      $not_signaller_frame

     tst.w      searching_stack(a4) /* that signaller searching?
     bne.w      $use_system         /* yes, give up

$not_signaller_frame:

/* now check frame for on-unit

     btst.b     =0,stack_frame.entry_ptr+3(a4)
```

```
        beq.b       $next_frame      /* no on units

        movea.l     stack_frame.on_ptr(a4),a5      /* first unit

    $search:
        btst.b      =on_unit.flags.enabled,on_unit.flags
        beq.b       $next_unit      /* not enabled

        cmp.b       on_unit.code,d7       /* right conditon?
        bne.b       $check_anyother       /* no

        cmpa.l      on_unit.fcb_ptr,a3   /* right fcb?
        bne.b       $check_anyother       /* no

        cmp.w       =USER_DEFINED_CONDITION_NO,d7
        bne.b       $found_handler /* name compare not needed

        move.w      on_unit.cond_name,d0
        lea         on_unit.cond_name+2,a0
        move.w      (a2),d1          /* len of name
        lea         2(a2),a1
        jsr         compare_chars
        beq.b       $found_handler
    $check_anyother:
        cmp.b       on_unit.code,d6
        bne         $next_unit

        move.l      a5,d5       /* remember anyother on_unit

    $next_unit:
        movea.l     on_unit.next,a5
        cmpa.w      =null,a5         /* check for end
        bne.b       $search

        tst.l       d5          /* did we have anyother on_unit?
        beq         $next_frame

        movea.l     d5,a5       /* yes, use it!
        bra         $found_handler

    $next_frame:

        movea.l     stack_frame.prev_sp(a4),a4
        bra.w       $test_frame         /* on to new frame


    /* an on unit for condition has been found, so
    /* call the handler.

    $found_handler:
        btst.b      =on_unit.flags.system,on_unit.flags
        bne.w       $use_system      /* use default

        movem.l     d6-d7;a2-a4,save_regs /* in case must continue
        clr.b       system_handler_used

        btst.b      =on_unit.flags.do_goto,on_unit.flags
        beq.w       $test_use

        move.w      =1,goto_used

    $test_use:
        btst.b      =on_unit.flags.use_frame,on_unit.flags
        beq.w       $use_handler     /* use true handler

        movea.l     a4,a3            /* set local frame for handler
        movem.l     on_unit.entry_var+4,a4-a5;
        bra         $check_goto

    $use_handler:
        movem.l     on_unit.entry_var,a3-a5;

    $check_goto:
        tst.w       goto_used
```

```
        beq.b       $call_handler

        move.l      a4,target
        move.l      a3,target+4(a6)

$call_handler:
        move.w      =0,continue     /* initialize return val
        pea         continue        /* build arg list
        pea         oncode
        push.l      name_ptr
        pea         fcb_ptr
        pea         cond_no

        move.w      =0,searching_stack  /* no longer searching

$not_tracing:
        tst.w       goto_used
        beq.b       $do_jsr          /* do regular call handler

        lea         target,a0        /* do non-local go to handler
        jsr         goto
        trap        =15              /* cannot return

$do_jsr:
        jsr         (a4)            /* call handler

$handler_return_addr:
        adda.w      =20,a7          /* pop arg list
        cmpi.b      =0,system_handler_used
        bne.b       $return         /* system handled it, done

        cmpi.w      =0,continue     /* need to signal more?
        beq.b       $return         /* no

        movem.l     save_regs,d6-d7;a2-a4 /* get saved sp
        move.w      =1,searching_stack  /* back to searching
        bra.w       $next_frame

$return:
        return

$use_system:
        movem.l     d6-d7;a2-a4,save_regs /* in case need to continue
        movem.l     default_handler_link,a4;a5
        move.b      =1,system_handler_used
        bra.w       $call_handler

default_handler_link:
        elink       s$invoke_deh

        eject

/* S$FIND_CONDITION_INFO: Locates information from previous
/* condition

/* Usage:
/*    dcl  s$find_condition_info (ptr, fb15);
/*    call s$find_condition_info (infop, code);

/* Since the format of the stack frame for this procedure
/* is identical with s$signal_condition, variables can be
/* copied directly out of that frame once it is found.
/* This procedure returns a pointer to a structure
/* in the frame of s$signal_condition

        extdef      s$find_condition_info

s$find_condition_info:
        entry       s$find_condition_info

/* find signaller frame

        movea.l     stack_frame.prev_sp(a6),a4
$test_frame:
```

```
        cmpa.l      a4,a7            /* end of stack
        bge.b       $not_found

        move.l      stack_frame.entry_ptr(a4),d0
        beq.b       $next_frame      /* branch if operator frame

        bclr.l      =0,d0            /* force even
        movea.l     d0,a0
        using       'entry_block',a0
        move.w      entry_block.flags,d0
        btst.l      =entry_block.flags.signaller,d0
        bne.b       $found           /* found signaller frame

        drop        'entry_block'

$next_frame:
        movea.l     stack_frame.prev_sp(a4),a4
        bra.b       $test_frame

/* no signaller frame found

$not_found:
        movea.l     8(a6),a0         /* addr (infop)
        move.l      =null,(a0)
        movea.l     12(a6),a0        /* addr (code)
        move.w      =eino_signal_frame,(a0)
        return

/* found signaller frame, so build required structure.
/* room has been reserved in the signal stack frame for
/* doing this.

$found:
        lea         condition_info(a4),a3
        using       'condition_info',a3

        move.w      oncode(a4),condition_info.oncode
        move.w      cond_no(a4),condition_info.condition_no
        move.l      fcb_ptr(a4),condition_info.q_ptr
        move.l      mc_ptr(a4),condition_info.mc_ptr
        move.l      =null,condition_info.onframe

        move.w      =0,condition_info.name    /* ''
        cmpi.w      =USER_DEFINED_CONDITION_NO,cond_no(a4)
        bne.b       $no_name

        moveq.l     =32,d0           /* maxlen (name)
        lea         condition_info.name+2,a0
        movea.l     name_ptr(a4),a1      /* addr name
        move.w      (a1),d1
        lea         2(a1),a1
        jsr         assign_vchars

$no_name:
        move.w      =256,d0          /* maxlen (message)
        lea         condition_info.message+2,a0
        movea.l     message_ptr(a4),a1
        move.w      (a1),d1
        lea         2(a1),a1
        jsr         assign_vchars

/* no ioc condition info relating to files

        move.w      =0,condition_info.onfile /* ''
        move.w      =0,condition_info.onloc
        move.w      =0,condition_info.onkey
        moveq       =0,d1         /* clear fault_handler flag

/* now find the signalling procedure to determine onloc

$find_onloc:
        move.w      d1,d2         /* remember fault_handler flag
        moveq       =0,d1         /* clear fault_handler flag
        movea.l     a4,a1         /* remember frame ptr
```

```
     -movea.l   stack_frame.prev_sp(a4),a4
      cmpa.l    a4,a7
      bge.b     $no_onloc

      move.l    stack_frame.entry_ptr(a4),d0
      beq.b     $find_onloc    /* branch if operator frame

      bclr.l    =0,d0          /* force even
      movea.l   d0,a2
      using     'entry_block',a2
      move.w    entry_block.flags,d0
      btst.l    =entry_block.flags.signaller,d0
      beq.b     $not_signaller

      tst.w     searching_stack(a4) /* interrupt signaller?
      bne.b     $this_is_onloc /* dont dare to go farther
      bra.b     $find_onloc    /* otherwise, search on

$not_signaller:
      btst.l    =entry_block.flags.fault_handler,d0
      beq       $check_support

      moveq     =1,d1          /* set fault_handler flag
      bra.b     $find_onloc

$check_support:
      btst.l    =entry_block.flags.support,d0
      bne.b     $find_onloc

/* passed all tests, this is onloc frame

$this_is_onloc:
      move.l    a4,condition_info.onframe
      move.l    a1,condition_info.nextframe

/* if mc_ptr is null and if this is a fault frame,
/* get mc_ptr from the fault frame.  This protects us
/* against some user-mode support routine's resignalling
/* of a faulting condition without passing mc_ptr.
      tst.w     d2             /* do we have a fault_frame?
      beq       $assign_onloc

      cmpi.l    =null,condition_info.mc_ptr /* mc_ptr = null?
      bne       $assign_onloc

      movea.l   8(a1),a2       /* arg1 of nextframe is mc_ptr!
      move.l    (a2),condition_info.mc_ptr /* ..

/* set the onloc name

$assign_onloc:
      moveq.l   =32,d0         /* maxlen (onloc)
      lea       condition_info.onloc+2,a0
      move.w    entry_block.name,d1
      lea       entry_block.name+2,a1
      jsr       assign_vchars
$no_onloc:
      drop      'entry_block'
      drop      'condition_info'

/* return addr of info, and zero return code

      movea.l   8(a6),a0
      move.l    a3,(a0)
      movea.l   12(a6),a0
      move.w    =0,(a0)
      return
      eject
/* S$CONTINUE_TO_SIGNAL: Locates the stack frame for
/* the previous signaller, and sets the continue
/* bit in the handlers param list as if the handler
/* did it.

/* Usage:
```

```
/*   dcl  s$continue_to_signal entry;
/*   call s$continue_to_signal;

/* Since the format of the stack frame for this procedure
/* is identical with s$signal_condition, variables can be
/* referenced directly out of that frame once it is found.

     extdef     s$continue_to_signal

s$continue_to_signal:
     entry      s$continue_to_signal

/* find signaller frame

     movea.l    stack_frame.prev_sp(a6),a4

$test_frame:
     cmpa.l     a4,a7          /* end of stack
     bge.b      $not_found

     move.l     stack_frame.entry_ptr(a4),d0
     beq.b      $next_frame    /* branch if operator frame

     bclr.l     =0,d0          /* force even
     movea.l    d0,a0
     using      'entry_block',a0
     move.w     entry_block.flags,d0
     btst.l     =entry_block.flags.signaller,d0
     bne.b      $found         /* found signaller frame

     drop       'entry_block'

$next_frame:
     movea.l    stack_frame.prev_sp(a4),a4
     bra.b      $test_frame

/* no signaller frame found

$not_found:    /* nothing to do
     return

/* found signaller frame, so set required bit

$found:
     move.w     =1,continue(a4) /* this is all the work
     return

/*   incl       'os_error_codes',nolist

     end
/*   ***begin copyright*** ******************************   */
/*                                                          */
/*   STRATUS CONFIDENTIAL INFORMATION: CLASS II             */
/*   COPYRIGHT (c) Stratus Computer, Inc. 1986              */
/*                                                          */
/*   This program contains confidential and proprietary     */
/*   information of Stratus Computer, Inc., and any         */
/*   reproduction, disclosure, or use in whole or in part   */
/*   is expressly prohibited, except as may be              */
/*   specifically authorized by prior written agreement or  */
/*   permission of Stratus.                                 */
/*                                                          */
/*   ***end copyright*** ********************************   */

/* Beginning of modification history */
/* Written April 1986 by Tom Moser */
/* Modified 86-05-15 by Martin_Stocke to add in generic_comm */
/* Modified 86-09-19 by Tom Moser to use replaces for entity IDs */
/* Modified 86-10-15 by Tom Moser to add CTAPE and TEST entities */
/* End of modification history */

/* initialize entry points for all ICP entities */

icp_entity_initializer: procedure;
```

```
/* %include 'iop_equip_table'; */
/*   ***begin copyright*** ******************************   */
/*                                                         */
/*   STRATUS CONFIDENTIAL INFORMATION: CLASS II            */
/*   COPYRIGHT (c) Stratus Computer, Inc. 1985             */
/*                                                         */
/*   This program contains confidential and proprietary    */
/*   information of Stratus Computer, Inc., and any        */
/*   reproduction, disclosure, or use in whole or in part  */
/*   is expressly prohibited, except as may be             */
/*   specifically authorized by prior written agreement or */
/*   permission of Stratus.                                */
/*                                                         */
/*   ***end copyright*** ********************************   */
/*   Begin include file iop_equip_table.incl.pl1           */

dcl  equip_tablep$            ptr external static;
dcl  equip_tablep             ptr;

%replace  MAX_ENTITIES        by   8;
%replace  NUM_OF_SLOTS        by   13;  /* 0-13 */
%replace  MAX_CHANNELS        by   512;

dcl 1 stat_tpl based,
          4 alive               bit (1),          /* 1 = alive, 0 = broken */
          4 initialized         bit (1),
          4 testing             bit (1),          /* 1 = yes, 0 = no */
          4 loading             bit (1),
          4 running             bit (1),
          4 prom_start          bit (1),
          4 exception           bit (1),
          4 burning_prom        bit (1),
          4 broken              bit (1),          /* cannot be made alive */
          4 pad                 bit (23);
dcl 1 entity_tpl based,
          4 e_ptr               ptr,
          4 e_fb15              fixed bin (15);

dcl  1 equip_table            based (equip_tablep),
       2 slot (0:NUM_OF_SLOTS),
         3 entity             fixed bin (15),     /* associated entity or -1 */
         3 adapt_type         fixed bin (15),     /* 1-255, see below */
         3 priority           fixed bin (15),     /* 1-25, see below */
         3 status like stat_tpl,
         3 entity_data like entity_tpl,
       2 entity (1:MAX_ENTITIES),
         3 type               fixed bin (15),
         3 status like stat_tpl,
         3 entity_data like entity_tpl,
         3 cmd_entry          entry (fixed bin (15), fixed bin (15),
                                     fixed bin (15), fixed bin (31),
                                     fixed bin (31)),
         3 config_entry       entry (fixed bin (15), bit (16) aligned,
                                     fixed bin (31),
                                     fixed bin (31), fixed bin (31)),
         3 slot_entry         entry (fixed bin (15), fixed bin (15)),
       2 channel (1:MAX_CHANNELS),
         3 entity             fixed bin (15),
         3 owner              fixed bin (15),
         3 limit              fixed bin (15),
         3 status like stat_tpl,
         3 entity_data like entity_tpl,
       2 slot_prom_rev(0:NUM_OF_SLOTS) fixed bin (15);

/*   range constants for the field 'priority'              */

%replace  MIN_PRIORITY        by   1;
%replace  DEFAULT_PRIORITY    by   256;
%replace  MAX_PRIORITY        by   256;

/* standard entity IDs */

%replace IOP_DISK_ENTITY_ID by 1;
```

```
%replace IOP_COMM_ENTITY_ID by 2;
%replace IOP_CTAPE_ENTITY_ID by 3;

%replace IOP_TEST_ENTITY_ID by 8;


/*  End include file iop_equip_table.incl.pl1                    */

/* %include 'iop_constants'; */
/* Begin include file . . . . . iop_constants.incl.pl1 */

%replace IOA_CLOCK_CHANNEL_NO by 2;
%replace TERM_SLOT_1          by 14;
%replace TERM_SLOT_2          by 15;

%replace MAX_IOP_INTERRUPT_LEVEL by 8;
%replace MAX_IOP_BACKGROUND_PRIORITY by 8;

%replace MASK_ALL_INTS by 7;
%replace ALLOW_TIMER_INTERRUPTS by 5;
%replace ALLOW_IOA_INTERRUPTS by 4;

%replace JIFFIES_PER_SECOND by 65536;

%replace ES_ENTITY by 0;
%replace ES_CHANNEL by 0;
%replace NON_ENTITY by -1;
%replace NONE by -1;

%replace START_ADAPT_MEM by 12582912;   /* 12M or C00000x */

/* End include file . . . . . iop_constants.incl.pl1 */

/* %include 'iop_adapter_types'; */
/* Begin include file adapter_types.incl.pl1 */

%replace  MIN_ADAP_TYPE          by  1;

%replace  TERMINATOR            by  1;
%replace  ACOMM                 by  2;
%replace  UCOMM_422             by  3;
%replace  ENET                  by  4;
%replace  DISK                  by  5;
%replace  CTAPE                 by  6;
%replace  MTAPE                 by  7;
%replace  CLKCOMM               by  8;
%replace  UCOMM_232             by  9;
%replace  UCOMM_423             by  10;

%replace  MAX_ADAP_TYPE          by 10;

/* End include file adapter_types.incl.pl1 */

/* automatic */

dcl  i    fixed bin (15);
/* external */

dcl  disk_entity_command             entry (fixed bin (15), fixed bin (15),
                            fixed bin (15), fixed bin (31), fixed bin (31));
dcl  disk_entity_config              entry (fixed bin (15),
                                           bit (16) aligned, fixed bin (31),
                                           fixed bin (31), fixed bin (31));
dcl  disk_entity_slot                entry (fixed bin (15), fixed bin(15));
dcl  generic_comm_entity_command     entry (fixed bin (15), fixed bin (15),
                            fixed bin (15), fixed bin (31), fixed bin (31));
dcl  generic_comm_entity_config      entry (fixed bin (15),
                                           bit (16) aligned, fixed bin (31),
                                           fixed bin (31), fixed bin (31));
dcl  generic_comm_entity_slot        entry (fixed bin (15), fixed bin(15));
dcl  ctape_entity_command            entry (fixed bin (15), fixed bin (15),
                            fixed bin (15), fixed bin (31), fixed bin (31));
dcl  ctape_entity_config             entry (fixed bin (15),
```

```
                                          bit (16) aligned, fixed bin (31),
                                          fixed bin (31), fixed bin (31));
dcl  ctape_entity_slot            entry (fixed bin (15), fixed bin(15));
dcl  test_entity_command          entry (fixed bin (15), fixed bin (15),
                        fixed bin (15), fixed bin (31), fixed bin (31));
dcl  test_entity_config           entry (fixed bin (15),
                                          bit (16) aligned, fixed bin (31),
                                          fixed bin (31), fixed bin (31));
dcl  test_entity_slot             entry (fixed bin (15), fixed bin(15));

%replace TEST by 1234;

%page;
/* execution */

     equip_tablep = equip_tablep$;

     do i = 1 to MAX_ENTITIES;
          equip_table.entity(i).type = NON_ENTITY;
          end;

/* entity number 1 is disk */

     equip_table.entity(IOP_DISK_ENTITY_ID).type = DISK;
     equip_table.entity(IOP_DISK_ENTITY_ID).cmd_entry = disk_entity_command;
     equip_table.entity(IOP_DISK_ENTITY_ID).config_entry = disk_entity_config;
     equip_table.entity(IOP_DISK_ENTITY_ID).slot_entry = disk_entity_slot;

     equip_table.entity(IOP_COMM_ENTITY_ID).type = ACOMM;
     equip_table.entity(IOP_COMM_ENTITY_ID).cmd_entry =
          generic_comm_entity_command;
     equip_table.entity(IOP_COMM_ENTITY_ID).config_entry =
          generic_comm_entity_config;
     equip_table.entity(IOP_COMM_ENTITY_ID).slot_entry =
          generic_comm_entity_slot;

     equip_table.entity(IOP_CTAPE_ENTITY_ID).type = CTAPE;
     equip_table.entity(IOP_CTAPE_ENTITY_ID).cmd_entry = ctape_entity_command;
     equip_table.entity(IOP_CTAPE_ENTITY_ID).config_entry =
               ctape_entity_config;
     equip_table.entity(IOP_CTAPE_ENTITY_ID).slot_entry = ctape_entity_slot;

     equip_table.entity(IOP_TEST_ENTITY_ID).type = TEST;
     equip_table.entity(IOP_TEST_ENTITY_ID).cmd_entry = test_entity_command;
     equip_table.entity(IOP_TEST_ENTITY_ID).config_entry = test_entity_config;
     equip_table.entity(IOP_TEST_ENTITY_ID).slot_entry = test_entity_slot;

/* *** INITIALIZE OTHER ENTITIES HERE *** */

end iop_entity_initializer;
```

```
/*  ***begin copyright*** ***************************************   */
/*                                                                  */
/*  STRATUS CONFIDENTIAL INFORMATION: CLASS II                      */
/*  COPYRIGHT (c) Stratus Computer, Inc. 1986                       */
/*                                                                  */
/*  This  program  contains  confidential and proprietary           */
/*  information  of  Stratus Computer,  Inc..   and   any           */
/*  reproduction,  disclosure, or use in whole or in part           */
/*  is   expressly   prohibited,   except   as   may   be           */
/*  specifically authorized by prior written agreement or           */
/*  permission of Stratus.                                          */
/*                                                                  */
/*  ***end copyright*** *****************************************   */
```

```
%options system_programming;
/* Beginning of modification history */
/* Written January 1986 by Tom Moser */
/* Modified February 1986 by R. Crockett */
/* Modified 86-02-27 by Tom Moser to be in generic entity format, support
     all config functions for entities */
/* Modified 86-04-18 by Tom Moser to use new format for cmd entry and
     config args */
/* Modified 86-05-06 by Tom Moser to add LOAD_SLOT_PRGM_CMD and fix reply
     args when entity refuses config */
```

```
/* Modified 86-05-07 by Tom Moser to add rpt_config routine */
/* Modified 86-05-13 by Tom Moser to provide sub_chan for calling slot entry */
/* Modified 86-06-03 by Tom Moser to allow redundent binds */
/* Modified 86-06-09 by Martin Stokoe to use new error codes */
/* Modified 86-06-10 by Martin Stokoe to correct UNBIND_SLOT_ENT */
/* Modified 86-06-19 by Tom Moser to load ENET board */
/* Modified 86-08-11 by Tom Moser to use checksumming for loading and
     update state of iop$current_* at process_slot */
/* Modified 86-08-14 by Tom Moser to fix index var at del_slot del_chan */
/* Modified 86-08-14 by Tom Moser to temporarily remove check for loading at
     START_SLOT_PRGM */
/* Modified 86-08-15 by Tom Moser to do checksummed transfer */
/* Modified 86-09-17 by Martin Stokoe to implement watchdog timer */
/* Modified 86-10-09 by Tom_Moser to load ENET when it's bound already */
/* Modified 86-10-21 by Tom Moser to implement fault handling and fix bug
     in iop$current_slot mgmt */
/* Modified 86-11-04 by Tom Moser to implement death and resurrection after
     faults */
/* Modified 86-11-20 by Tom Moser to call new entry needed for inter entity */
/* Modified 87-01-27 by Tom Moser to support allow_dummy_entitys */
/* Modified 87-03-02 by Tom Moser to improve death reporting kill zombies */
/* Modified 87-03-09 by Tom Moser to allow load of prom started IOA */
/* Modified 87-03-25 by Tom Moser to add prom IOA id fcns */
/* Modified 87-03-31 by Tom Moser to add real mailbox status (switchable) */
/* Modified 87-04-03 by Tom Moser to add burn prom command / slot test cmd */
/* Modified 87-04-21 by Tom Moser to kill current entity on unowned slot
     exception */
/* Modified 87-05-11 by Tom Moser to add board type arg to set_prom_write */
/* Modified 87-05-21 by Tom Moser to fix bug when starting non-loaded IOA */
/* Modified 87-05-28 by Tom Moser to add get ioa prom rev command */
/* End of modification history */

iop_es_entity: procedure recursive;

/* replace */
%replace TRUE by '1'b;
%replace FALSE by '0'b;

dcl oncode                              builtin;

/* parameters */

dcl  a_log_chan                         fixed bin (15);
dcl  a_data_16                          fixed bin (15);
dcl  a_data_32_1                        fixed bin (31);
dcl  a_data_32_2                        fixed bin (31);
dcl  a_lan_slot                         fixed bin (31);
dcl  a_func_code                        fixed bin (15);
dcl  a_slot_no                          fixed bin (15);
dcl  a_sub_chan                         fixed bin (15);
dcl  a_adap_type                        fixed bin (15);
dcl  a_slot                             fixed bin (15);
dcl  a_entity                           fixed bin (15);

/* automatic */

dcl  1 accinf                           like access_info;
dcl  1 entity_death_xsum                defined data_32_2,
       2 slots                          fixed bin (15),
       2 chans                          fixed bin (15);
dcl  addr1_32                           bit (32) aligned defined data_32_1;
dcl  addr2_32                           bit (32) aligned defined data_32_2;
dcl  bytes                              fixed bin (31);
dcl  chx                                fixed bin (31);
dcl  1 cmd_ovly                         defined data_16,
       2 slot                           bit(4),
       2 n_bytes                        bit(12);
dcl  code                               fixed bin (15);
dcl  data_16                            fixed bin (15);
dcl  data_32_1                          fixed bin (31);
dcl  1 data_32_1_xsum_ret               defined data_32_1,
       2 unused                         fixed bin (15),
       2 xsum                           fixed bin (15);
dcl  data_32_2                          fixed bin (31);
```

```
dcl  1 d32_status                    like stat_tpl defined status;
dcl  entity                          fixed bin (31);
dcl  enx                             fixed bin (31);
dcl  fault_address                   fixed bin (31);
dcl  fault_data                      fixed bin (31);
dcl  func_code                       fixed bin (15);
dcl  (i,j)                           fixed bin (31);
dcl  ioa1                            fixed bin (15);
dcl  ioa_target_addr                 fixed bin (31);
dcl  log_chan                        fixed bin (15);
dcl  my_chan                         fixed bin (15);
dcl  parameter                       fixed bin (31);
dcl  ptr_32_1                        ptr defined data_32_1;
dcl  ret_cod                         fixed bin (31);
dcl  slot_no                         fixed bin (15);
dcl  slx                             fixed bin (31);
dcl  status                          fixed bin (31);
dcl  sub_chan                        fixed bin (15);
dcl  adap_type                       fixed bin (31);
dcl  vaddr                           ptr;
dcl  vaddr_32                        bit (32) aligned defined vaddr;
dcl  ioa_mbx_msg_in_def_word         fixed bin (15) defined ioa_mbx.msg_in;
dcl  save_entity                     fixed bin (15);
dcl  save_slot                       fixed bin (15);
dcl  (xsum, xsum2)                   fixed bin (15);

/* based */

dcl  based_ptr              ptr based;
dcl  based_char1            char (1) based;
dcl  based_word             fixed bin (15) based;
dcl  based_fb31             fixed bin (31) based;

dcl  1 ioa_state_info      based (es_slot_ptrs(ioa1)),
       2 data_16            fixed bin (15),
       2 data_32_1          fixed bin (31),
       2 data_32_2          fixed bin (31),
       2 func_code          fixed bin (15),
       2 log_chan           fixed bin (15),
       2 ioa_addr           fixed bin (31),
       2 retries            fixed bin (15),
       2 timer_id           fixed bin (31),
       2 state              fixed bin (15),
       2 x_data_16          fixed bin (15),
       2 x_data_32_1        fixed bin (31),
       2 x_data_32_2        fixed bin (31),
       2 x_data_ptr         ptr;

/* IOAs are in wait RESET state initially - the load sequence is
     -vos says load-
     MEM_INIT
     ?what about test?
     GET_ADDR
!->  xfer to addr
--   MOVE_ADDR (unless unnecessary)
     START
*/


%replace PROM_BYTE_WRITE_TIME by 640;   /* ~10ms */

%replace IOA_WAIT_PROM_ADDR    by 1;
%replace IOA_WAIT_PROM_MOVE    by 2;
%replace IOA_INACTIVE          by 3;
%replace IOA_WAIT_MEM_INIT     by 4;
%replace IOA_WAIT_TEST         by 5;
%replace IOA_WAIT_SUBTEST_N    by 6;
%replace IOA_WAIT_RESET        by 7;
%replace IOA_WAIT_OWNERSHIP    by 8;
%replace IOA_WAIT_BYTE_WRITE   by 9;

%replace PROM_VERSION_ADDR     by 12451852;   /* BE0000x */
```

```
/* entries */

dcl  iop$select_adapter         entry (fixed, fixed);
dcl  iop$send_cmd_to_adapt      entry(fixed, fixed, fixed);
dcl  iop$enable_watchdog        entry;
dcl  iop$disable_watchdog       entry;
dcl  kill_ghouls                entry (fixed bin (31));
dcl  iop$report_condition_info entry;
dcl  iop$set_prom_write         entry (fixed bin (15),
                                    fixed bin (15), fixed bin (15));

dcl  iop$edit_string_Iii              entry (char(*) var, fixed bin (31),
                                          fixed bin (15), fixed bin (15))
                                          returns ( char (80) var);
dcl  iop$edit_string_II             entry (char(*) var, fixed bin (31),
                                          fixed bin (31))
                                          returns ( char (80) var);
dcl  iop$edit_string_iI             entry (char(*) var, fixed bin (15),
                                          fixed bin (31))
                                          returns ( char (80) var);
dcl  iop$edit_string_ii             entry (char(*) var, fixed bin (15),
                                          fixed bin (15))
                                          returns ( char (80) var);
dcl  iop$edit_string_iii            entry (char(*) var, fixed bin (15),
                                          fixed bin (15), fixed bin (15))
                                          returns ( char (80) var);
dcl  iop$edit_string_IH             entry (char(*) var, fixed bin (31),
                                          fixed bin (31))
                                          returns ( char (80) var);
dcl  iop$edit_string_i              entry (char(*) var, fixed bin (15))
                                          returns ( char (80) var);
dcl  iop$edit_string_I              entry (char(*) var, fixed bin (31))
                                          returns ( char (80) var);
/* include */

/* %nolist; %include 'adapter_test_equates';    %list; */
/*  adapter_test_equates.incl.pl1 */

/* ********************************************************************** */
/*   Adapter Local Command Codes in no particular order

     This include file contains the known commands for all adapters
     currently supported as of 26-Feb-1987.  It is subject to change as
     demands require. */

/* ********************************************************************** */

/* NOTE: Command codes 0-255 (0x-0FFx) are reserved to general handler      */

%replace NULL_GIOC_COMMAND                  by    0;  /* This command         */
                                                      /*  MUST BE ZERO!!      */
%replace GENERIC_CMD__RE_INIT_BOARD         by    1;  /* Restart the prom     */
                                                      /*  like hard init      */
%replace GENERIC_CMD__RESET_BOARD           by    2;  /* Obsolete -- did hard */
                                                      /*  68K reset           */
%replace GENERIC_CMD__EXECUTE_SINGLE_TEST by      3;  /* Execute one test     */
                                                      /*  with params         */
%replace GENERIC_CMD__STOP_PROCESSOR        by    4;  /* Execute a            */
                                                      /*  'stop processor'    */
%replace GENERIC_CMD__RETURN_STATUS         by    5;  /* Return status for    */
                                                      /*  current op          */
%replace GENERIC_CMD__RETURN_ERROR_INFO by        6;  /* Return extra         */
                                                      /*  error information   */
%replace GENERIC_CMD__CHECKSUM_WHOLE_ROM by       7;  /* Checksum the         */
                                                      /*  entire EEPROM       */
%replace GENERIC_CMD__CHECKSUM_ID_ROM       by    8;  /* Checksum the ID      */
                                                      /*  part of EEPROM      */
%replace GENERIC_CMD__START_PROG_IN_MEM by        9;  /* Xfer program control */
                                                      /*  to an addr          */
%replace GENERIC_CMD__ALLOCATE_XFER_BUF  by      10;  /* Give a large buffer  */
                                                      /*  to GIOC             */
%replace GENERIC_CMD__MOVE_BUF_TO_LOMEM  by      11;  /* Move allocated buffer */
                                                      /*  to lo mem           */
%replace GENERIC_CMD__MOVE_LOMEM_TO_BUF by       12;  /* Move lo mem to       */
```

```
                                                  /*  allocated buffer          */
%replace GENERIC_CMD__EXECUTE_ALL_TESTS by   13;  /* Execute all tests just     */
                                                  /*  like the Mfg version      */
                                                  /*  of prom does              */
%replace GENERIC_CMD__RETURN_CMD_LIST   by   14;  /* Return a list of adap      */
                                                  /*  exec cmds                 */
%replace GENERIC_CMD__RETURN_COMMAND_INFO by 15;  /* Return info on             */
                                                  /*  specified cmd             */
%replace GENERIC_CMD__RETURN_TEST_INFO  by   16;  /* Return info on             */
                                                  /*  specified test            */
%replace GENERIC_CMD__BUFFER_READ_ACK   by   17;  /* ACK receipt of a dump      */
                                                  /*  buffer                    */
%replace GENERIC_CMD__INIT_MEMORY       by   18;  /* Clear parity errs from     */
                                                  /*  memories                  */
%replace GENERIC_CMD__RUN_SHORT_TESTS   by   19;  /* Run the                    */
                                                  /*  short-test suite          */
%replace GENERIC_CMD__RETURN_REV_INFO   by   20;  /* Return the board sw rev    */
                                                  /*  and ID prom area          */
%replace GENERIC_CMD__DUMP_ALL_MEMORY   by   21;  /* Dump all adapter data      */
                                                  /*  memory and devices        */
%replace GENERIC_CMD__PANIC_DUMP_MEMORY by   22;  /* Dump critical pages for    */
                                                  /*  crash analysis            */
%replace GENERIC_CMD__DO_NEXT_DUMP_PAGE by   23;  /* Process the next dump      */
                                                  /*  page in sequence          */

/* Following is the last legal command in the generic sequence...               */
%replace GENERIC_CMD__QUIESCE           by  255;  /* Stop running tests         */
                                                  /*  -- await cmd              */

/* ---------------------------------------------------------------------------- */
/* TEMP HACK:  Several commands currently used by the Enet boards were
               reassigned by this file on 5-Nov. They will temporarily be
               reinstated to their previous values, until all software can
               be changed simultaneously. At this time, dual mnemonics
               for these operations will be supplied, with the old values
               being listed as OLD_xxx and the new values assuming the
               simple form of the name. ALL NEW SOFTWARE MUST support the
               new values as well as the old, until release is obtained,
               but old software will be obsoleted when the old values are
               dropped. */

/* ---------------------------------------------------------------------------- */
/* **************************************************************************** */
/* Disable the following command at install time:
%replace GENERIC_CMD__QUIESCE           by  129;  /* Shutdown current op        */
/* Disable the following command at install time:
%replace GENERIC_CMD__ALLOCATE_XFER_BUF by  133;  /* Give a large buffer        */
                                                  /*  to GIOC                   */
/* Disable the following command at install time:
%replace GENERIC_CMD__MOVE_BUF_TO_LOMEM by  134;  /* Move allocated buffer      */
                                                  /*  to low memory             */
/* Disable the following command at install time:
%replace GENERIC_CMD__START_PROG_IN_MEM by  135;  /* Xfer program control       */
                                                  /*  to an address             */
/* Disable the following command at install time:
%replace GENERIC_CMD__MOVE_LOMEM_TO_BUF by  136;  /* Move low memory to         */
                                                  /*  allocated buffer          */
/* **************************************************************************** */

/* NOTE: This section is a command registry! */

/* ACOMM/DCOMM BOOT COMMANDS */

%replace BOOT_CMD__CONFIGURE_CONSOLE    by  257;  /* Configure console          */
%replace BOOT_CMD__GIOC_MSG_OUT         by  258;  /* Output msg to console      */
%replace BOOT_CMD__GIOC_BYTE_IN         by  259;  /* Check for character        */
                                                  /*  from console              */
%replace BOOT_CMD__GIOC_MSG_IN          by  260;  /* Input msg from console     */

/* DISK TESTS -- Only debugging commands are catalogued at this time */
%replace SMAC_CMD__WRITE_BLINDLY        by  270;  /* Write block to disk        */
%replace SMAC_CMD__READ_BLINDLY         by  271;  /* Read block from disk       */
%replace SMAC_CMD__WRITE_MULTI          by  272;  /* Perform multiple-block     */
                                                  /*  dpo xfer                  */
```

```
%replace SMAC_CMD__READ_MULTI               by   273; /* Perform multiple-block  */
                                                      /*  dbg xfer               */
%replace SMAC_CMD__CONTINUE_MULTI           by   274;

/* ENET TESTS -- All Enet tests are also assigned command numbers... */
%replace ENET_CMD__CONTROL_REG_TEST_0       by   284; /* Test control register   */
                                                      /*  bits                   */
%replace ENET_CMD__STATUS_REG_TEST_0        by   285; /* Test status register    */
                                                      /*  bits                   */
%replace ENET_CMD__MEMORY_TEST_0            by   286; /* Test all 0's patt on    */
                                                      /*  main mem               */
%replace ENET_CMD__MEMORY_TEST_1            by   287; /* Test all 1's patt on    */
                                                      /*  main mem               */
%replace ENET_CMD__MEMORY_TEST_2            by   288; /* Rotating bit pat on     */
                                                      /*  main mem               */
%replace ENET_CMD__MEMORY_TEST_3            by   289; /* Test main memory parity */
%replace ENET_CMD__MEMORY_TEST_4            by   290; /* Test main memory        */
                                                      /*  data=addrs             */
%replace ENET_CMD__MEMORY_TEST_5            by   291; /* Test fram parity        */
%replace ENET_CMD__MEMORY_TEST_6            by   292; /* Test fram               */
%replace ENET_CMD__MEMORY_TEST_7            by   293; /* Test fram               */
%replace ENET_CMD__RESTORE_POM_VECTORS      by   294; /* Try to catch interrupts */
%replace ENET_CMD__TIMER_TEST_0             by   295; /* Test TIMER counter      */
%replace ENET_CMD__TIMER_TEST_1             by   296; /* Test TIMER interrupt    */
                                                      /*  logic                  */
%replace ENET_CMD__TIMER_TEST_2             by   297; /* Test TIMER interrupt    */
                                                      /*  mask logic             */
%replace ENET_CMD__TIMER_TEST_3             by   298; /* Test G_A TIMER          */
                                                      /* intervals               */
%replace ENET_CMD__TIMER_TEST_4             by   299; /* Test TIMER interrupts   */
%replace ENET_CMD__TIMER_TEST_5             by   300; /* Test TIMER interrupt    */
                                                      /*  mask logic             */
%replace ENET_CMD__LANCE_SETUP              by   301; /* Setup LANCE for         */
                                                      /*  xmit/receive           */
%replace ENET_CMD__LANCE_TEST_0             by   302; /* Stop the LANCE          */
%replace ENET_CMD__LANCE_TEST_1             by   303; /* Init the LANCE          */
%replace ENET_CMD__LANCE_TEST_2             by   304; /* Start the LANCE         */
%replace ENET_CMD__LANCE_TEST_3             by   305; /* Xmit a packet and       */
                                                      /*  check flags            */
%replace ENET_CMD__LANCE_TEST_4             by   306; /* Rcv xmit'd packet &     */
                                                      /*  check flags            */
%replace ENET_CMD__LANCE_TEST_5             by   307; /* Test LANCE interrupt    */
                                                      /*  logic                  */
%replace ENET_CMD__LANCE_TEST_6             by   308; /* Test LANCE interrupt    */
                                                      /*  mask logic             */
%replace ENET_CMD__LANCE_TEST_7             by   309; /* Test LANCE external     */
                                                      /*  loopback               */
%replace ENET_CMD__ALL_LANCE_TESTS          by   310; /* Stop the LANCE          */

/* ACOMM TESTS */
%replace ACOMM_CMD__MEMORY_TEST_0           by   323; /* Test with data = addrs  */
%replace ACOMM_CMD__MEMORY_TEST_1           by   324; /* Test with rotating      */
                                                      /*  pattern                */
%replace ACOMM_CMD__MEMORY_TEST_3           by   325; /* Parity error test       */
%replace ACOMM_CMD__CONTROL_REG_TEST_0      by   326; /* Test control/status     */
                                                      /*  regs                   */
%replace ACOMM_CMD__TIMER_TEST_0            by   327; /* Test timer counters     */
%replace ACOMM_CMD__TIMER_TEST_1            by   328; /* Test timer interrupts   */
%replace ACOMM_CMD__TIMER_TEST_2            by   329; /* Test timer interrupt    */
                                                      /*  mask                   */
%replace ACOMM_CMD__SCC_TEST_0              by   330; /* Test read/write         */
                                                      /*  scc regs               */
%replace ACOMM_CMD__SCC_TEST_1              by   331; /* Test scc                */
                                                      /*  loopback,polling       */
%replace ACOMM_CMD__SCC_TEST_2              by   332; /* Test scc                */
                                                      /*  loopback,interrupts    */
%replace ACOMM_CMD__SCC_TEST_3              by   333; /* Test scc sync loopback  */
%replace ACOMM_CMD__MEMORY_TEST_2           by   334; /* Execute scc_test_1      */
                                                      /*  in ram                 */
%replace ACOMM_CMD__SCC_EXT_LOOPBACK        by   335; /* Requires ext connectors */
%replace ACOMM_CMD__INIT_BOARD              by   336; /* Init ram, timers, scc's */
```

```
/* CCOMM TESTS */
%replace CCOMM_CMD__MEMORY_TEST_0        by    340; /* Test with data = addrs   */
%replace CCOMM_CMD__MEMORY_TEST_1        by    341; /* Test with rotating       */
                                                    /*  pattern                 */
%replace CCOMM_CMD__MEMORY_TEST_3        by    342; /* Parity error test        */
%replace CCOMM_CMD__CONTROL_REG_TEST_0   by    343; /* Test control/status      */
                                                    /*  regs                    */
%replace CCOMM_CMD__TIMER_TEST_0         by    344; /* Test timer counters      */
%replace CCOMM_CMD__TIMER_TEST_1         by    345; /* Test timer interrupts    */
%replace CCOMM_CMD__TIMER_TEST_2         by    346; /* Test timer interrupt     */
                                                    /*  mask                    */
%replace CCOMM_CMD__SCC_TEST_0           by    347; /* Test read/write          */
                                                    /*  scc regs                */
%replace CCOMM_CMD__SCC_TEST_1           by    348; /* Test scc                 */
                                                    /*  loopback,polling        */
%replace CCOMM_CMD__SCC_TEST_2           by    349; /* Test scc                 */
                                                    /*  loopback,interrupts     */
%replace CCOMM_CMD__SCC_TEST_3           by    350; /* Test scc sync loopback   */
%replace CCOMM_CMD__MEMORY_TEST_2        by    351; /* Execute scc_test_1       */
                                                    /*  in ram                  */
%replace CCOMM_CMD__SCC_EXT_LOOPBACK     by    352; /* Requires ext connectors  */
%replace CCOMM_CMD__INIT_BOARD           by    353; /* Init ram, timers, scc's  */

/* UCOMM TESTS -- All Ucomm tests are also assigned command numbers... */
%replace UCOMM_CMD__CONTROL_REG_TEST_0   by    360; /* Test control             */
                                                    /*  register bits           */
%replace UCOMM_CMD__STATUS_REG_TEST_0    by    361; /* Test status              */
                                                    /*  register bits           */
%replace UCOMM_CMD__MEMORY_TEST_0        by    362; /* Test all 0's pattern     */
                                                    /*  on main mem             */
%replace UCOMM_CMD__MEMORY_TEST_1        by    363; /* Test all 1's pattern     */
                                                    /*  on main mem             */
%replace UCOMM_CMD__MEMORY_TEST_2        by    364; /* Rotating bit pat on      */
                                                    /*  main mem                */
%replace UCOMM_CMD__MEMORY_TEST_3        by    365; /* Test main memory parity  */
%replace UCOMM_CMD__MEMORY_TEST_4        by    366; /* Test main memory         */
                                                    /*  data=addrs              */
%replace UCOMM_CMD__RESTORE_ROM_VECTORS  by    367; /* Maint - Try to catch     */
                                                    /*  interrupts              */
%replace UCOMM_CMD__TIMER_TEST_0         by    368; /* Test TIMER cntrs and     */
                                                    /*  zero timer              */
%replace UCOMM_CMD__TIMER_TEST_1         by    369; /* Test TIMER interrupt     */
                                                    /*  logic                   */
%replace UCOMM_CMD__TIMER_TEST_2         by    370; /* Test TIMER interrupt     */
                                                    /*  mask logic              */
%replace UCOMM_CMD__SCC_TEST_0           by    371; /* Write/Read SCC           */
                                                    /*  registers               */
%replace UCOMM_CMD__SCC_TEST_1           by    372; /* SCC non-interrupt        */
                                                    /*  loopback test           */
%replace UCOMM_CMD__SCC_TEST_2           by    373; /* SCC interrupt and        */
                                                    /*  loopback test           */
%replace UCOMM_CMD__SCC_TEST_3           by    374; /*           * NULL *       */
%replace UCOMM_CMD__SCC_TEST_4           by    375; /*           * NULL *       */
%replace UCOMM_CMD__SCC_TEST_5           by    376; /*           * NULL *       */
%replace UCOMM_CMD__SCC_TEST_6           by    377; /*           * NULL *       */
%replace UCOMM_CMD__DMAC_TEST_0          by    378; /* Test DMA regs with       */
                                                    /*  reads only              */
%replace UCOMM_CMD__DMAC_TEST_1          by    379; /* Test DMA read/write      */
                                                    /*  registers               */
%replace UCOMM_CMD__DMAC_TEST_2          by    380; /* Test DMAC/SCC r/w        */
                                                    /*  operations              */
%replace UCOMM_CMD__DMAC_TEST_3          by    381; /* Test DMAC/SCC            */
                                                    /*  array operations        */
%replace UCOMM_CMD__DMAC_TEST_4          by    382; /* Test DMAC/SCC            */
                                                    /*  linked array ops        */
%replace UCOMM_CMD__DMAC_TEST_5          by    382; /* Test DMAC interrupts     */

/* CTAPE TESTS */

%replace CTAPE_CMD__GO_TO_APPL_CODE      by    400; /* Go to application code   */
%replace CTAPE_CMD__TEST_ALL             by    401; /* Run all tests            */
%replace CTAPE_CMD__MEMORY_TEST_0        by    402; /* Ram initialization       */
%replace CTAPE_CMD__MEMORY_TEST_1        by    403; /* Ram pattern test         */
%replace CTAPE_CMD__MEMORY_TEST_2        by    404; /* Ram address test         */
```

```
%replace CTAPE_CMD__MEMORY_TEST_3        by   405; /* Concurrent memory test  */
%replace CTAPE_CMD__SCSI_LOOPBACK        by   406; /* Scsi loopback test      */
%replace CTAPE_CMD__TIMER_TEST           by   407; /* G.A. Interval           */
                                                   /*  timer test             */
%replace CTAPE_CMD__INTERRUPT_TEST       by   408; /* Interrupt test          */
%replace CTAPE_CMD__COMPARATOR_TEST      by   409; /* Comparator test         */
/* Reserve the following for old software...
%replace CTAPE_CMD__DMA_TEST             by   410; /* Reserved for Bill       */
%replace CTAPE_BOOT                      by   410; /* Get tape fw magic ptrs  */
%replace CTAPE_CMD__DMA_TEST             by   411; /* DMA test                */
%replace CTAPE_CMD__GATE_ARRAY_TEST      by   412; /* Set code, broken,       */
                                                   /*  red light tests        */


/* DISK COMMANDS */
%replace  DISK_CMD_BASE                  by 500;

%replace  DISK_LIST_CMD_MIN              by 532;   /* VOS list command 32 */
%replace  DISK_LIST_CMD_MAX              by 635;   /* VOS list command 135 */


/* ACOMMP COMMANDS */
%replace  MIN_ACOMMP_CMD                 by 700;
%replace  MAX_ACOMMP_CMD                 by 800;

/* other equates */

%replace  IOA_START_ADDR                 by   0;
%replace  IOA_DIAG_MBX_PTR_ADDR          by   2098180;
%replace  IOA_BOARD_ID_PTR_ADDR          by   2098176;
%replace  IOA_MBX_STATUS_SUCCESS         by   61440;
%replace  IOA_UNIVERSAL_ADDR             by   -1;


/* %nolist; %include 'adapter_error_equates';   %list */t;
/* FILE: Adapter Error Codes -- Error code registry for IOP adapter boards   */

/* MBX Ownership byte definitions */
%replace MBX_OWNER__ADAPTER_OWNS_MBX    by   '80'b4; /* Adapter/GIOC           */
                                                   /* ownership flag:          */
                                                   /*  80x = adapter owns      */
                                                   /*  mailbox                 */
%replace MBX_OWNER__GIOC_OWNS_MBX       by   '00'b4; /* Adapter/GIOC           */
                                                   /* ownership flag:          */
                                                   /*  00x = IOP owns          */
                                                   /*  mailbox                 */

/* Success and failure status prefix codes */
%replace MBX_STS__GT_SUCCESS    by  'FF000001'b4; /* Status for successful     */
                                                   /*  GENERIC TEST            */

%replace MBX_STS_SP             by  'FF000001'b4; /* Same success prefix as    */
                                                   /*  above                   */

%replace MBX_STS__GT_FAILURE_PREFIX by 'FE000001'b4; /* Prefix for errors      */
                                                   /*  encountered during a    */
                                                   /*  GENERIC TEST            */

%replace MBX_STS_FP             by  'FE000001'b4; /* Same error prefix as      */
                                                   /*  above                   */

/* Success status codes */
%replace MBX_STS__ADAPTER_OK             by  'FF000002'b4; /* OK Status msg    */
%replace MBX_STS__START_FUNC_TEST        by  'FF000003'b4; /* Response to a    */
                                                   /*  Test_All                */
%replace MBX_STS__ADAPTER_RESETTING      by  'FF000004'b4; /* Resetting        */
%replace MBX_STS__ADAPTER_HALTING        by  'FF000005'b4; /* Halt             */
%replace MBX_STS__NULL_CMD_RESPONSE      by  'FF000006'b4; /* Response to a    */
                                                   /*  null command            */
%replace MBX_STS__NEXT_BUFFER_READY      by  'FF000007'b4; /* Response to a    */
                                                   /*  dump buffer             */
%replace MBX_STS__OPERATION_IN_PROGRESS by  'FE000007'b4; /* Mark this         */
                                                   /*  operation in progress   */
```

```
/* ERROR CODES */
%replace MEX_ERR__UNIMPLEMENTED_FEATURE by  'FE000060'b4; /* Some Non-Feature*/
                                                          /* was requested    */
%replace MEX_ERR__ILLEGAL_CMD       by  'FE000070'b4; /* Illegal/unknown      */
                                                      /* adapter command      */
                                                      /* received             */
%replace MEX_ERR__OP_IN_PROGRESS    by  'FE000071'b4; /* Operation was        */
                                                      /* requested before     */
                                                      /* previous finished    */
%replace MBX_ERR__NO_CMD_GIVEN      by  'FE000072'b4; /* Mailbox recv'd       */
                                                      /* but no command given */
%replace MEX_ERR__BAD_ACK_RESPONSE  by  'FE000073'b4; /* Response to          */
                                                      /* send was not an ACK  */
%replace MEX_ERR__INVALID_TEST_NUMBER by 'FE000075'b4; /* Requested test      */
                                                      /* does not exist       */
%replace MBX_ERR__UNKNOWN_COMMAND   by  'FE000076'b4; /* Requested            */
                                                      /* command is unknown   */
%replace MEX_ERR__COMMAND_NOT_FOUND by  'FE000077'b4; /* Requested            */
                                                      /* command is unknown   */

%replace MEX_ERR__BUS_ERROR           by 'FE000100'b4; /* Bus Error            */
%replace MBX_ERR__INSTR_ERROR         by 'FE000101'b4; /* Instruction Error    */
%replace MEX_ERR__TRAP                by 'FE000102'b4; /* Trap Instruction     */
%replace MBX_ERR__UNEXP_INTR_ERROR    by 'FE000103'b4; /* Bogus Interrupt      */
%replace MEX_ERR__JUMP_0_ERROR        by 'FE000104'b4; /* PC jumped to zero    */
%replace MEX_ERR__ERROR_CALL_ERROR    by 'FE000105'b4; /* JSR ERROR call       */
%replace MEX_ERR__ERROR_TRAP_0_ERROR  by 'FE000106'b4; /* TRAP 0 error call    */
%replace MEX_ERR__BAD_HARDWARE_ERROR  by 'FE000107'b4; /* Bad Hardware error   */
%replace MEX_ERR__RESVD_INSTR_ERROR   by 'FE000108'b4; /* Reserved Instruction*/
%replace MEX_ERR__INSTR_TRACE         by 'FE000109'b4; /* Trace Trap           */

/* NOTE: The following status codes will DISAPPEAR at first release!!!       */
/* %replace MEX_STS__SUCCESS     by  '0000F000'b4; /* Status for successful   */
                                                   /* Cmd Done                */

/* %replace MEX_STS__ADAPTER_FAILURE_PREFIX by '0000F000'b4; /* Status word */
                                                      /* prefix value for     */
                                                      /* adapter failures     */

%replace MEX_STS__SUCCESS          by  MBX_STS__GT_SUCCESS; /* Success status */
%replace MEX_STS__ADAPTER_FAILURE_PREFIX by MEX_STS__GT_FAILURE_PREFIX;
                                                      /* Prefix for errors    */
/* %nolist; %include 'board_id_structure'; %list; */
/*  ***begin copyright*** *******************************  */
/*                                                         */
/*  STRATUS CONFIDENTIAL INFORMATION: CLASS II             */
/*  COPYRIGHT (c) Stratus Computer, Inc. 1985              */
/*                                                         */
/*  This program contains confidential and proprietary     */
/*  information of Stratus Computer, Inc., and any         */
/*  reproduction, disclosure, or use in whole or in part   */
/*  is expressly prohibited, except as may be              */
/*  specifically authorized by prior written agreement or  */
/*  permission of Stratus.                                 */
/*                                                         */
/*  ***end copyright*** *********************************  */
/*  Begin include file board_id_structure.incl.pl1         */

/*  Board Id pointer is in location 1024 of any adapter board
    and it points the board id structure in EEPROM.  Use utility
    function to get this pointer after selecting the adapter.

*/

%replace  MAX           by   5;          /*allow last five board services*/
%replace  ID_VERSION    by   2;          /* Version of the structure. */

dcl  board_id_ptr       ptr;

dcl  1 board_id         based (board_id_ptr),
       2 version        fixed bin (15),     /* Structure revision number */
       2 board_type     fixed bin (15),
       2 flags,
```

```
            3 bootable       bit (1),            /* adapter is bootable */
            3 self_test      bit (1),            /* adapter has self test */
            3 pac            bit (14),           /* unused */
          2 model            char (4),           /* alphanumeric model */
          2 serial_number    fixed bin (31),     /* board serial num */
          2 revision         fixed bin (15),     /* board revision level */
          2 art_work_rev     fixed bin (15),     /* board artwork level */
          2 min_gioc_rev     fixed bin (15),     /* gioc compatibility */
          2 num_serviced     fixed bin (15),     /* # of times serviced */
          2 history (MAX),                       /* board history */
            3 service_date   fixed bin (31),     /* repair info */
            3 service_code   fixed bin (15),
          2 code_checksum    fixed bin (15),     /* Calculated checksum. */
          2 checksum         fixed bin (15);     /* structure safety check */

/*  End include file board_id_structure.incl.pl1                  */

/* %nolist; %include 'iop_constants';       % */list;
/* Begin include file . . . . . iop_constants.incl.pl1 */

%replace IOA_CLOCK_CHANNEL_NO by 2;
%replace TERM_SLOT_1          by 14;
%replace TERM_SLOT_2          by 15;

%replace MAX_IOP_INTERRUPT_LEVEL by 8;
%replace MAX_IOP_BACKGROUND_PRIORITY by 8;

%replace MASK_ALL_INTS by 7;
%replace ALLOW_TIMER_INTERRUPTS by 5;
%replace ALLOW_IOA_INTERRUPTS by 4;

%replace JIFFIES_PER_SECOND by 65536;

%replace ES_ENTITY by 0;
%replace ES_CHANNEL by 0;
%replace NON_ENTITY by -1;
%replace NONE by -1;

%replace START_ADAPT_MEM by 12582912;   /* 12M or C00000x */

/* End include file . . . . . iop_constants.incl.pl1 */

/* %nolist; %include 'syserr_codes'; */%list;
/* Begin include file syserr_codes.incl.pl1 81-9-8 */

/* This include file contains the definitions of the various syserr
   codes to be used when calling syserr. The  codes should be added
   together to form the desired combination. */

declare   syserr_action_ptr ptr;

declare 1 syserr_action based (syserr_action_ptr),
          2 mbz                  bit (10),
          2 signal_kernelerror   bit (1),
          2 security_log         bit (1),
          2 hardware_error       bit (1),
          2 obsolete             bit (1), /* was overseer_log */
          2 dont_display         bit (1),
          2 crash                bit (1);

%replace  SYSERR_WARN                      by 0;
%replace  SYSERR_CRASH                     by 1;
%replace  SYSERR_DONT_DISPLAY              by 2;
%replace  SYSERR_HARDWARE_ERROR_LOG        by 8;
%replace  SYSERR_SECURITY_LOG              by 16;
%replace  SYSERR_SIGNAL_KERNELERROR        by 32;

/* End include file syserr_codes.incl.pl1 */
/* %nolist; %include 'ioc_error_codes';    %list; */
/* %nolist; %include 'ioc_config_codes';   %lis */t;
/* Begin include file . . . . . ioc_config_codes.incl.pl1 */

%replace  MIN_CONFIG_CODE      by 1;
%replace  CONFIG_INIT          by 1;
```

```
%replace  CONFIG_SHUTDOWN      by 2;
%replace  CONFIG_ADD_SLOT      by 3;
%replace  CONFIG_DELETE_SLOT   by 4;
%replace  CONFIG_ADD_CHAN      by 5;
%replace  CONFIG_DELETE_CHAN   by 6;
%replace  CONFIG_READ_METER    by 7;
%replace  CONFIG_READ_STATUS   by 8;
%replace  CONFIG_BROKEN_SLOT   by 9;
%replace  CONFIG_ALIVE_SLOT    by 10;
%replace  MAX_CONFIG_CODE      by 10;

%replace  CFG_FORCE            by '8000'b4;
%replace  CFG_ERROR            by '4000'b4;
%replace  CFG_LOCAL            by '2000'b4;

/* End include file . . . . . iop_config_codes.incl.pl1 */
/* %nolist; %include 'ioa_commands'; */%list;
/*  ***begin copyright*** *****************************  */
/*                                                       */
/*  STRATUS CONFIDENTIAL INFORMATION: CLASS II           */
/*  COPYRIGHT (c) Stratus Computer, Inc. 1986            */
/*                                                       */
/*  This program contains confidential and proprietary   */
/*  information of Stratus Computer, Inc., and any       */
/*  reproduction, disclosure, or use in whole or in part */
/*  is expressly prohibited, except as may be            */
/*  specifically authorized by prior written agreement or */
/*  permission of Stratus.                               */
/*                                                       */
/*  ***end copyright*** *******************************  */
/*  Begin include file ioa_commands.incl.pl1  */

%replace  MIN_IOA_CMD_NO       by   0;

%replace  CMD_RESET            by   0;
%replace  CMD_CLEAR_INT        by   1;
%replace  CMD_TOGGLE_OBEY_P    by   2;
%replace  CMD_TOGGLE_OBEY_Q    by   3;
%replace  CMD_CLEAR_BROKEN     by   4;
%replace  CMD_SET_BROKEN       by   5;
%replace  CMD_INT_DEVICE       by   6;
%replace  CMD_CLEAR_CPU_RESET  by   7;

%replace  MAX_IOA_CMD_NO       by   7;

/*  End include file ioa_commands.incl.pl1  */
/* %nolist; %include 'ioa_mailbox'; */ %list;
/*                       ioa_mailbox.incl.pl1
                         --------------------

     This  include file contains the mailbox used to communicate
     between an IOA and the IOP.  Several  overlaid  definitions
     exist,  which  are used under different circumstances, such
     as dumping or IOA program debugging.

*/

/* Define typical IOA mailbox pointer.                                */
dcl  ioa_mbxp            ptr; /* ioa_mbxp = contents of 200404x in ioa */

/* Original mbx template */
dcl  1 ioa_mbx   like ioa_mbx_template  based( ioa_mbxp );

dcl  1 ioa_mbx_template  based,
       2 command         fixed bin(15),
       2 buffer_addr     fixed bin(31),
       2 status          bit(32) aligned,
       2 f,
         3 ownership     bit(1),   /* = '0' = iop;  = '1' = ioa */
         3 mbz           bit(7),
         3 ic_tag        char(1),
       2 msg_in          char(80) var,
       2 msg_out         char(80) var,
       2 more_info       bit(1) aligned,
       2 xtra_ptr        fixed bin(31);
```

```
/* Dump mailbox template */
dcl  1 ioa_mbx_dump    like ioa_mbx_dump_tpl based( ioa_mbxp );

dcl  1 ioa_mbx_dump_tpl  based,
       2 outbox_offset   char(92) var,      /* Not used for dumping           */
       2 mbz             fixed bin(15),     /* Must be zero for dump          */
       2 page_num        fixed bin(15),     /* Current adapter dump page      */
       2 data_type       fixed bin(15),     /* Dump data type                 */
       2 absolute_addr   fixed bin(31),     /* Real IOA addr of dump data     */
       2 buf_byte_cnt    fixed bin(15),     /* Num bytes xfer'd this time     */
       2 page_seq_num    fixed bin(15),     /* Adapter's seq # for page       */
       2 remaining_cnt   fixed bin(15);     /* Num bytes still to be xfer'd   */
/*     2 unused_str_o    char(70) var;      /* Not used for dumping           */
/* Command info mailbox template */
dcl  1 ioa_mbx_cmdinfo   like ioa_mbx_c_i_tpl based( ioa_mbxp );

dcl  1 ioa_mbx_c_i_tpl   based,
       2 outbox_offset   char(92) var,      /* Not used for command info      */
       2 sw_rev          fixed bin(15);     /* Board's software revision      */
/*     2 unused_str_o    char(84) var;      /* Not used for dumping           */

%replace IOA_MAILBOX_PTR_ADDR by   2098180;
%replace IOP_OWNER by '0'b;
%replace IOA_OWNER by '1'b;

/*   Brief description of protocol for diagnostic usage.
     ----------------------------------------------------

     The  mailbox begins life with the IOP having ownership ( ownership =
     '0' ) and when the IOP has placed all the pertinent  information  in
     the box it will change ownership over to the IOA.  The IOP will then
     set the int_to_device bit in the IOA's Gate Array, which the adapter
     should  be  polling in order to know when a command has arrived.  It
     is not advised for the adapters to have their interrupts enabled  at
     this  point  in  time,  and  this  is  the  reason  for  polling the
     int_to_device bit.

     The  ownership  bit works in conjunction with the int_to_device bit.
     This should cover  the  case  where  an  adapter  detects  a  faulty
     int_to_device  bit.  Therefore  the  adapter  should  only process a
     command if the int_to_device bit and the ownership bit are both set.

     Structure definitions.
     ----------------------
     ioa_mbx.command ( input/output )
       .   - This is the command for the IOA to execute. On output it
             indicates the command executed by the IOA.

     ioa_mbx.buffer_addr ( input/output )
           - Universal buffer longword address. The address of the
             primary buffer for an operation is placed here.

     ioa_mbx.status ( output )
           - This will be filled in by the adapter indicating the
             status of the board, commands, etc...

     ioa_mbx.ownership ( input/output )
           - This bit defines who the current owner of the mailbox is.  If
             this bit = '0'b then the IOP currently owns the mailbox, otherwise
             the adapter has ownership.

     ioa_mbx.f.id_tag ( mailbox owner )
           - Id tag used by IOP-side processes only (not used by IOA)
             to encode owner of current mailbox op in order to prevent
             one IOP process from using another process's returned mbx.

     ioa_mbx.msg_in ( input )
           - This is defined as a char(80) varying buffer.  It will be command
             dependent and can therefore have different meanings with overlays
             describing it.  However, the first two bytes will always specify
             the number of bytes in the buffer.  Whether the commands choose to
             use them is up to the individual command.
```

```
     ioa_mbx.msg_out ( output )
          - This buffer is for the ioa to send data to the iop.  Again, the
            same applies to this buffer as to the .msg_in described above.

     ioa_mbx.more_info ( input/output )
          - On output this signifies that there is more information than
            will fit into the msg_out buffer. Input meaning is command
            dependent.

     ioa_mbx.xtra_ptr ( input/output )
          - The meaning of this pointer is command dependent, though
            generally it is used as a pointer to extra data that would
            not fit in the primary buffer, or as the secondary pointer
            for a command.

*/
/* %nolist; %include 'iop_equip_table';    %li */st;
/*   ***begin copyright*** ******************************   */
/*                                                          */
/*   STRATUS CONFIDENTIAL INFORMATION: CLASS II             */
/*   COPYRIGHT (c) Stratus Computer, Inc. 1985              */
/*                                                          */
/*   This program contains confidential and proprietary    */
/*   information of Stratus Computer, Inc., and any         */
/*   reproduction, disclosure, or use in whole or in part   */
/*   is expressly prohibited, except as may be              */
/*   specifically authorized by prior written agreement or  */
/*   permission of Stratus.                                 */
/*                                                          */
/*   ***end copyright*** ********************************   */
/*   Begin include file iop_equip_table.incl.pl1            */

dcl  equip_tablep$              ptr external static;
dcl  equip_tablep               ptr;

%replace  MAX_ENTITIES          by    8;
%replace  NUM_OF_SLOTS          by    13;  /* 0-13 */
%replace  MAX_CHANNELS          by    512;

dcl 1 stat_tpl based,
            4 alive               bit (1),          /* 1 = alive, 0 = broken */
            4 initialized         bit (1),
            4 testing             bit (1),          /* 1 = yes, 0 = no */
            4 loading             bit (1),
            4 running             bit (1),
            4 prom_start          bit (1),
            4 exception           bit (1),
            4 burning_prom        bit (1),
            4 broken              bit (1),          /* cannot be made alive */
            4 pad                 bit (23);

dcl 1 entity_tpl based,
            4 e_ptr               ptr,
            4 e_fb15              fixed bin (15);

dcl  1 equip_table            based (equip_tablep),
       2 slot (0:NUM_OF_SLOTS),
         3 entity             fixed bin (15),     /* associated entity or -1 */
         3 adapt_type         fixed bin (15),     /* 1-255, see below */
         3 priority           fixed bin (15),     /* 1-25, see below */
         3 status like stat_tpl,
         3 entity_data like entity_tpl,
       2 entity (1:MAX_ENTITIES),
         3 type               fixed bin (15),
         3 status like stat_tpl,
         3 entity_data like entity_tpl,
         3 crc_entry          entry (fixed bin (15), fixed bin (15),
                                     fixed bin (15), fixed bin (31),
                                     fixed bin (31)),
         3 config_entry       entry (fixed bin (15), bit (16) aligned,
                                     fixed bin (31),
                                     fixed bin (31), fixed bin (31)),
         3 slot_entry         entry (fixed bin (15), fixed bin (15)),
       2 channel (1:MAX_CHANNELS),
```

```
            3 entity                   fixed bin (15),
            3 owner                    fixed bin (15),
            3 limit                    fixed bin (15),
            3 status like stat_tpl,
            3 entity_data like entity_tpl,
          2 slot_prom_rev(0:NUM_OF_SLOTS) fixed bin (15);

/*  range constants for the field 'priority'                        */

%replace  MIN_PRIORITY          by    1;
%replace  DEFAULT_PRIORITY      by    256;
%replace  MAX_PRIORITY          by    256;

/* standard entity IDs */

%replace IOP_DISK_ENTITY_ID by 1;
%replace IOP_COMM_ENTITY_ID by 2;
%replace IOP_CTAPE_ENTITY_ID by 3;

%replace IOP_TEST_ENTITY_ID by 8;


/*  End include file iop_equip_table.incl.pl1                       */

/* %nolist; %include 'iop_meters'; */  %list;
/* Begin include file . . . . . iop_meters.incl.pl1 */

dcl  iop$mtrp                              ptr external static;
dcl  mtrp                                  ptr;

dcl  iop$emtrp                             ptr external static;
dcl  emtrp                                 ptr;

/* meters 1 - 3 are reserved for standard meters */
/* meter 4 is unused currently */
%replace  SYSERR_MTR                by    5;
%replace  FAILED_SYSERR_MTR         by    6;
%replace  BGND_MTR                  by    7;
%replace  BGND_TIME_MTR             by    8;
%replace  TIMER_MTR                 by    9;
%replace  TIMER_TIME_MTR            by    10;
%replace  DMA_MTR                   by    11;
%replace  DMA_BYTE_MTR              by    12;
%replace  DMA_TIME_MTR              by    13;
%replace  CMD_SEND_MTR              by    14;
%replace  CMD_RECV_MTR              by    15;
%replace  CMD_HOST_BUSY_MTR         by    16;
%replace  OBSOLETE_1                by    17;  /* OBSOLETE MAY BE REUSED */
%replace  INTERRUPT_MTR             by    18;

/* meters 18 - 32 are currently undefined */

%replace  MAX_IOP_MTR               by    32;

/* entity meters collected by the ES */

%replace  ENT_CMD_CALL_MTR          by    1;
%replace  ENT_CMD_TIME_MTR          by    2;
%replace  ENT_CMD_MAX_MTR           by    3;
%replace  ENT_BGND_MAX_MTR          by    4;
%replace  ENT_BGND_TIME_MTR         by    5;
%replace  ENT_BGND_CALLS_MTR        by    6;
%replace  ENT_TIMER_MAX_MTR         by    7;
%replace  ENT_TIMER_TIME_MTR        by    8;
%replace  ENT_TIMER_CALLS_MTR       by    9;
%replace  ENT_INT_CALL_MTR          by    10;
%replace  ENT_INT_TIME_MTR          by    11;
%replace  ENT_INT_MAX_MTR           by    12;

/* meters 13 - 16 are available */

%replace  MAX_ENT_MTR               by    16;

dcl iop_meters (MAX_IOP_MTR)        fixed bin (31) based (mtrp);
```

```
dcl entity_meters (0:MAX_ENTITIES, MAX_ENT_MTR)    fixed bin (31) based (emtrp);

/* End include file . . . . . iop_meters.incl.pl1 */
/* %nolist; %include 'iop_sync_info';        % */list;
/* include file iop_sync_info.incl.pl1 */

%replace IOP_SYNC_PM_INFO_V3  by 3;

declare  iop_pm_info_locp     ptr;
declare  iop_sync_pm_infop    ptr;

declare  1 iop_pm_info_loc   based (iop_pm_info_locp),  /* at addr 0400x */
           2  magic_constant char (8),                 /* '*PMINFO*' */
           2  pm_info_area_ptr fixed bin (31);

dcl 1 iop_sync_pm_info          based (iop_sync_pm_infop),
           2  version           fixed bin (15),
                                              /* 3 */
           2  code_pages        fixed bin (15),
           2  n_modules         fixed bin (15),
           2  n_external_vars
                                fixed bin (15),
           2  symtab_origin     fixed bin (31),
           2  module_map_origin
                                fixed bin (31),
           2  external_vars_map_origin
                                fixed bin (31),
           2  program_end       fixed bin (31),
           2  release_name      char(32),
           2  duplexing_data,
                3  stack_pages      fixed bin (15),
                3  heap_size        fixed bin (31);

/* end include file iop_sync_info.incl.pl1 */
%include 'iop_es_dcc';          /* es specific commands and constants */

/* %nolist; %include 'iop_command_calls';  %list */;
/* Begin include file . . . . . iop_command_calls.incl.pl1 */

dcl  iop$deliver_command entry (fixed bin (15), fixed bin(15), fixed bin(15),
      fixed bin (31), fixed bin(31), fixed bin (15), fixed bin(15));

/* End include file . . . . . iop_command_calls.incl.pl1 */
/* %nolist; %include 'iop_utility_calls';  %list */;
/* Begin include file . . . . . iop_utility_calls.incl.pl1 */

dcl  iop$allocate entry (fixed bin (31), char (2) aligned) returns (ptr);
dcl  iop$free entry (ptr, char (2) aligned);

dcl  iop$get_level entry  returns (fixed bin (15));
dcl  iop$set_level entry (fixed bin (15));

dcl  iop$syserr_code entry (char (80) varying, fixed bin (15), fixed bin(15));
dcl  iop$panic_syserr entry (char (80) varying);

dcl  iop$read_time  entry returns (fixed bin (31));
dcl  iop$delta_time entry (fixed bin (31)) returns (fixed bin (31));

dcl  bin_to_char    entry (fixed bin (31)) returns (character (13) varying);
dcl  char_to_bin    entry (character (13) varying) returns (fixed bin (31));

dcl  iop$set_slot_priority entry (fixed bin (15), fixed bin (15),
                                  fixed bin (15));

/* End include file . . . . . iop_utility_calls.incl.pl1 */
/* %nolist; %include 'iop_tasking_calls';  %list */;
/* Begin include file . . . . . iop_tasking_calls.incl.pl1 */

dcl  iop$queue_background_callback entry (entry, fixed bin (31), fixed bin(15),
     fixed bin (15), fixed bin (15));

dcl  iop$queue_timer_callback      entry (entry, fixed bin (31), fixed bin(31),
     fixed bin (15), fixed bin (31), fixed bin(15));
```

```
dcl  iop$revoke_timer_callback      entry (fixed bin(31), fixed bin(15));

/* End include file . . . . . iop_tasking_calls.incl.pl1 */
/* %nolist; %include 'iop_transfer_calls'; %list; */
/* Begin include file . . . . . iop_transfer_calls.incl.pl1 */

/* virtual address (mapped) calls */

dcl iop$addr_to_ioa entry (ptr, bit (32) aligned, fixed bin(15),
                    fixed bin (31), fixed bin (15), fixed bin (15));

dcl iop$ioa_to_addr entry (ptr, bit (32) aligned, fixed bin(15),
                    fixed bin (31), fixed bin (15), fixed bin (15));

dcl iop$verify_addr entry (ptr, bit (32) aligned, fixed bin(15),
                    fixed bin (31), fixed bin (15), fixed bin (15))
                    returns (bit(1) aligned);
dcl iop$ioa_to_ioa entry (bit (32) aligned, bit (32) aligned, fixed bin(15),
                    fixed bin(15), fixed bin (31), fixed bin (15),
                    fixed bin (15));

/* physical address calls to-from hos */

dcl iop$hos_to_ioa entry (bit (32) aligned, bit (32) aligned, fixed bin (15),
                    fixed bin (31), fixed bin (15), fixed bin (15));

dcl iop$ioa_to_hos entry (bit (32) aligned, bit (32) aligned, fixed bin (15),
                    fixed bin (31), fixed bin (15), fixed bin (15));

dcl iop$verify_hos entry (bit (32) aligned, bit (32) aligned, fixed bin(15),
                    fixed bin (31), fixed bin (15), fixed bin (15))
                    returns (bit(1) aligned);

/* special call for disk sw */

dcl iop$hos_to_both entry (ptr, bit (32) aligned,
                     fixed bin (15), ptr, fixed bin (31), fixed bin (15),
                     fixed bin (15));

/* checksum functions */

dcl iop$combine_checksum entry (fixed bin (15), fixed bin (15))
                    returns (fixed bin (15));

dcl  iop$checksum_bytes    entry (ptr, fixed bin (15), fixed bin (15));

/* End include file . . . . . iop_transfer_calls.incl.pl1 */

/* %nolist; %include 'iop_mapper_calls';   %lis */t;
/* Begin include file . . . . . iop_mapper_calls.incl.pl1 */

dcl  iop$map_x_pages          entry (fixed bin (15), bit (32) aligned,
                                     fixed bin (15), fixed bin (15),
                                     bit (32) aligned, fixed bin (15));

dcl  iop$free_x_map_pages     entry (fixed bin (15), bit (32) aligned,
                                     fixed bin (15), fixed bin (15));

dcl  1 access_info            based,
       2 version              fixed bin (15), /* = 1 */
       2 flag,
         3 read_access        bit (1),   /* 1 = yes, 0 = no */
         3 write_access       bit (1),   /* 1 = yes, 0 = no */
         3 priv_access        bit (1),   /* 1 = yes, 0 = no */
         3 local_memory       bit (1),   /* 1 = local, 0 = main(vos) */
         3 inter_lock         bit (1),   /* 1 = yes, 0 = no */
         3 io_st_bus          bit (1),   /* 1 = yes, 0 = no */
         3 dma                bit (1),   /* 1 = yes, 0 = no */
         3 unused             bit (9);

%replace  ACCESS_INFO_VERSION_1     by    1;
```

```
/* End include file . . . . . iop_mapper_calls.incl.pl1 */
/* %nolist; %include 'iop_adapter_types';  %list */;
/* Begin include file adapter_types.incl.pl1 */

%replace  MIN_ADAP_TYPE          by  1;

%replace  TERMINATOR           by  1;
%replace  ACOMM                by  2;
%replace  UCOMM_422            by  3;
%replace  ENET                 by  4;
%replace  DISK                 by  5;
%replace  CTAPE                by  6;
%replace  MTAPE                by  7;
%replace  CLKCOMM              by  8;
%replace  UCOMM_232            by  9;
%replace  UCOMM_423            by  10;

%replace  MAX_ADAP_TYPE          by 10;

/* End include file adapter_types.incl.pl1 */
/* %include 'iop_addr_routines'; */
/* Begin include file ... iop_addr_routines ... */

iop$ioa_addr: procedure (a_ioa_no, a_local_ptr) returns (ptr) inline;

dcl a_ioa_no         fixed bin (15);
dcl a_local_ptr      ptr;

dcl iop$base_vectors (0:13) fixed bin (31) external static;
dcl addrel builtin;


/* DEBUG ...

dcl  iop$debug_crash entry (char(80) var);

     if a_ioa_no < lbound(iop$base_vectors,1) |
        a_ioa_no < hbound(iop$base_vectors,1)
         then call iop$debug_crash('ILLEGAL slot no in call to iop$ioa_addr.');

   ... END DEBUG */

     return (addrel(a_local_ptr, iop$base_vectors(a_ioa_no)));

end iop$ioa_addr;
iop$ioa_abs_addr: procedure (a_local_ptr) returns (ptr) inline;

dcl a_local_ptr      ptr;

/* %include 'iop_constants'; */
/* Begin include file . . . . . iop_constants.incl.pl1 */

%replace IOA_CLOCK_CHANNEL_NO by 0;
%replace TERM_SLOT_1          by 14;
%replace TERM_SLOT_2          by 15;

%replace MAX_IOP_INTERRUPT_LEVEL by 8;
%replace MAX_IOP_BACKGROUND_PRIORITY by 8;

%replace MASK_ALL_INTS by 7;
%replace ALLOW_TIMER_INTERRUPTS by 5;
%replace ALLOW_IOA_INTERRUPTS by 4;
%replace JIFFIES_PER_SECOND by 65536;

%replace ES_ENTITY by 0;
%replace ES_CHANNEL by 0;
%replace NON_ENTITY by -1;
%replace NONE by -1;

%replace START_ADAPT_MEM by 12582912;    /* 12M or C00000x */

/* End include file . . . . . iop_constants.incl.pl1 */
```

```
dcl addrel builtin;

     return (addrel(a_local_ptr, START_ADAPT_MEM));

end iop$ioa_abs_addr;

/* End include file ... iop_addr_routines ... */

/* static */

dcl  es_slot_ptrs(0:NUM_OF_SLOTS) ptr   external static initial
          ((NUM_OF_SLOTS)(null()), null());

dcl  es_testing$ (0:15) bit (1) external static initial ((16)(0));


dcl  es_protocol_version fixed bin (15) internal static;

dcl  1 save_equip_data(0:NUM_OF_SLOTS) internal static,
       2  entity     fixed bin (15),
       2  slot_type fixed bin (15);

dcl  iop$current_entity         fixed bin (15) external static;
dcl  iop$current_slot           fixed bin (15) external static;
dcl  iop$current_channel        fixed bin (15) external static;
dcl  iop$current_interrupt      fixed bin (15) external static;
dcl  es_limits                  fixed bin (15) external static;

dcl  old_style_status$          bit (1) aligned external static;
dcl  allow_dummy_entitys        (0:15) bit (1)  external static;

declare  iop$code_pages         external fixed bin;

dcl       iop$heap_pages        fixed bin (15) external static;

declare  iop$external_vars_map_origin
                                external fixed bin (31);

declare  iop$n_external_vars    external fixed bin;

declare  iop$n_modules          external fixed bin;

declare  iop$module_map_origin
                                external fixed bin (31);

declare  iop$program_end        fixed bin (31) ext static;
declare  iop$symtab_origin      external fixed bin (31);

declare  iop$stack_pages        external fixed bin (15);


%page;
/* execution */
es_command: entry (a_log_chan, a_func_code,
                   a_data_16, a_data_32_1, a_data_32_2);

     equip_tables = equip_tables$;
     mtrp = iop$mtrp;

     log_chan = a_log_chan;
     func_code = a_func_code;
     data_16 = a_data_16;
     data_32_1 = a_data_32_1;
     data_32_2 = a_data_32_2;
     ret_cod = 0;

/* check for legal command */

     if log_chan ^= ES_CHANNEL
     then call rpterr(iop$edit_string_i(
          'ES: bad channel ^i at command entry.',log_chan), SYSERR_WARN);

     on anyother
     begin;
```

```
        call iop$report_condition_info;
        code = oncode();                          /* CONTEXT ??? *** */
        goto command_exception;
        end;

    if func_code < MIN_CMD_CODE | func_code > MAX_CMD_CODE
    then do;
        call cmd_err(e$iop_invalid_command, bin(func_code, 31));
        return;
        end;

    goto es_executor(func_code);

%page;
es_executor(*):
    call cmd_err(e$iop_unsupported_function, bin(func_code, 31));
    return;

/* normal es functions */

es_executor(BIND_CHAN_ENT):
    if ^check_chan_init(data_32_1, chx, TRUE)
         then return;
    if ^check_entity_init((data_16), enx, TRUE)
        then return;
    entity = equip_table.channel(chx).entity;
    if entity ^= NON_ENTITY & entity ^= enx /* allow redundent binds */
    then do;
        call cmd_err(e$iop_channel_already_bound, entity);
        return;
        end;
    equip_table.channel(chx).entity = enx;
    equip_table.channel(chx).owner = iop$current_entity;
    call equip_table.entity(enx).config_entry(CONFIG_ADD_CHAN, '0'b, chx,
                                data_32_2, ret_cod);
    if ret_cod ^= 0 &
       ^(ret_cod = e$iop_dummy_entity & allow_dummy_entity$(enx))
    then do;
        call del_chan(chx);
        call cmd_err(e$iop_entity_refused, ret_cod);
        end;
        else call send_cmd (log_chan, func_code, data_16, data_32_1,
                                data_32_2);
    return;

es_executor(UNBIND_CHAN_ENT):
    if ^check_chan_init(data_32_1, chx, FALSE)
        then return;
    if ^check_entity_exc((data_16), enx, FALSE)
        then return;
    entity = equip_table.channel(chx).entity;
    if entity ^= enx
    then do;
        call cmd_err(e$iop_channel_not_bound, entity);
        return;
        end;
    call equip_table.entity(enx).config_entry(CONFIG_DELETE_CHAN, '0'b, chx,
                                data_32_2, ret_cod);
    if ret_cod = 0 |
       (ret_cod = e$iop_dummy_entity & allow_dummy_entity$(enx))
    then do;
        call del_chan(chx);
        call send_cmd(log_chan, func_code, data_16, data_32_1, data_32_2);
        end;
        else call cmd_err(e$iop_entity_refused, ret_cod);
    return;

%page;
es_executor(BIND_SLOT_ENT):
    if ^check_slot_init(data_32_1, slx, TRUE)
        then return;
    if ^check_entity_init((data_16), enx, TRUE)
        then return;
    entity = equip_table.slot(slx).entity;
```

```
    if entity ^= NON_ENTITY & entity ^= enx /* allow redundent binds */
    then do;
         call cmd_err(e$iop_slot_already_bound, entity);
         return;
         end;
    if equip_table.slot(slx).entity = NON_ENTITY /* not bound now */
         then call iop$set_slot_priority((slx), DEFAULT_PRIORITY, code);
    equip_table.slot(slx).entity = enx;
    call equip_table.entity(enx).config_entry(CONFIG_ADD_SLOT, '0'b, slx,
                        data_32_2, ret_cod);
    if ret_cod ^= 0 &
       ^(ret_cod = e$iop_dummy_entity & allow_dummy_entity$(enx))
    then do;
         call del_slot(slx);
         call cmd_err(e$iop_entity_refused, ret_cod);
         end;
         else call send_cmd (log_chan, func_code, data_16, data_32_2,
                             data_32_2);
    return;

es_executor(UNBIND_SLOT_ENT):
    if ^check_slot_init(data_32_1, slx, FALSE)
         then return;
    if ^check_entity_exc((data_16), enx, FALSE)
         then return;
    entity = equip_table.slot(slx).entity;
    if entity ^= enx
    then do;
         call cmd_err(e$iop_slot_not_bound, entity);
         return;
         end;
    call equip_table.entity(enx).config_entry(CONFIG_DELETE_SLOT, '0'b, slx,
                                      data_32_2, ret_cod);
    if ret_cod = 0 |
       (ret_cod = e$iop_dummy_entity & allow_dummy_entity$(enx))
    then do;
         call del_slot(slx);
         call send_cmd(log_chan, func_code, data_16, data_32_1, data_32_2);
         end;
         else call cmd_err(e$iop_entity_refused, ret_cod);
    return;

%page;
/* maintenance functions for es entity */

es_executor(INIT_ENTITY_CMD):
    if ^check_entity((data_16), enx)
         then return;
    if equip_table.entity(enx).status.initialized
    then do;
         call cmd_err(e$iop_entity_already_initialized, enx);
         return;
         end;
    call equip_table.entity(enx).config_entry(CONFIG_INIT, '0'b, enx,
                                      data_32_1, ret_cod);
    if ret_cod = 0 |
       (ret_cod = e$iop_dummy_entity & allow_dummy_entity$(enx))
    then do;
         equip_table.entity(enx).status.initialized = TRUE;
         call send_cmd(log_chan, func_code, data_16, data_32_1, data_32_2);
         end;
         else call cmd_err(e$iop_entity_refused, ret_cod);
    return;

es_executor(STOP_ENTITY_CMD):
    if ^check_entity_exc((data_16), enx, FALSE)
         then return;
    if equip_table.entity(enx).status.exception
         then goto stop_entity_exc;
    call equip_table.entity(enx).config_entry(CONFIG_SHUTDOWN, '0'b,
                                 enx, data_32_2, ret_cod);
    if ret_cod = 0 |
       (ret_cod = e$iop_dummy_entity & allow_dummy_entity$(enx))
    then do;
```

```
          do i = 1 to MAX_CHANNELS;
               if equip_table.channel(i).entity = enx
               then do;
                    call rpterr(iop$edit_string_II(
'ES: entity ^I stopped with channel ^I assigned.', enx, i), SYSERR_WARN);
                    call del_chan(i);
                    end;
               end;
          do i = 0 to NUM_OF_SLOTS;
               if equip_table.slot(i).entity = enx
               then do;
                    call rpterr(iop$edit_string_II(
'ES: entity ^I stopped with slot ^I assigned.', enx, i), SYSERR_WARN);
                    call del_slot(i);
                    end;
               end;
stop_entity_exc:
          equip_table.entity(enx).status.exception = FALSE;
          equip_table.entity(enx).status.initialized = FALSE;
          call send_cmd(log_chan, func_code, data_16, data_32_2, ret_cod);
          end;
          else call cmd_err(e$iop_entity_refused, ret_cod);
     return;
%page;
es_executor(SET_ENTITY_STATUS_CMD):
/* *** TBS *** */
     call cmd_err(e$iop_unsupported_function, SET_ENTITY_STATUS_CMD);
     return;

es_executor(READ_ENTITY_STATUS_CMD):
     if data_16 < MIN_ES_STATUS | data_16 > MAX_ES_STATUS
     then do;
          call cmd_err(e$iop_invalid_status_id, data_32_1);
          return;
          end;

     if ^check_entity(data_32_1, enx)
           then return;

     goto es_ent_status_reader(data_16);

es_ent_status_reader(GET_TYPE):
     status = equip_table.entity(enx).type;
     goto return_status;

es_ent_status_reader(GET_STATUS):
     d32_status = equip_table.entity(enx).status;

return_status:
     call send_cmd(log_chan, func_code, data_16, data_32_1, status);
     return;

%page;
es_executor(SET_ENTITY_PARAM_CMD):
     if data_16 < MIN_ES_PARAM | data_16 > MAX_ES_PARAM
     then do;
          call cmd_err(e$iop_invalid_parameter_id, (data_16));
          return;
          end;

     goto es_param_setter(data_16);

es_param_setter(LIMIT_PARAM):
     es_limits = data_32_2;
     return;

es_param_setter(PROTOCOL_VER_PARAM):
     if data_32_2 ^= 1                        /* currently only version 1 */
     then do;
          call cmd_err(e$iop_invalid_protocol_version, data_32_2);
          return;
          end;
     es_protocol_version = data_32_2;
     return;
```

```
es_executor(READ_ENTITY_PARAM_CMD):
     if data_16 < MIN_ES_PARAM | data_16 > MAX_ES_PARAM
     then do;
          call cmd_err(e$iop_invalid_parameter_id, (data_16));
          return;
          end;
     if data_32_1 ^= ES_ENTITY
     then if data_32_1 = -1 & data_16 = PROTOCOL_VER_PARAM
          then do;
               parameter = ptr(PROM_VERSION_ADDR) -> based_word;
               goto return_param;
               end;
          else do;
               call cmd_err(e$iop_invalid_entity_id, (data_16));
               return;
               end;

     goto es_param_reader(data_16);

es_param_reader(LIMIT_PARAM):
     parameter = es_limits;
     goto return_param;

es_param_reader(PROTOCOL_VER_PARAM):
     parameter = es_protocol_version;

return_param:
     call send_cmd(log_chan, func_code, data_16, parameter, 0);
     return;

%page;

es_executor(SET_ENTITY_METER_CMD):
     emtrp = iop$emtrp;
     if ^check_entity(data_32_2, enx)
          then return;
     if data_16 < 1 | data_16 > MAX_ENT_MTR | data_32_1 ^= 0
          then call cmd_err(e$iop_invalid_meter_id, (data_16));
          else entity_meters(enx, data_16) = data_32_2;
     return;
es_executor(READ_ENTITY_METER_CMD):
     emtrp = iop$emtrp;
     if ^check_entity(data_32_2, enx)
          then return;
     if data_16 < 1 | data_16 > MAX_ENT_MTR
          then call cmd_err(e$iop_invalid_meter_id, (data_16));
          else
               call send_cmd(log_chan, func_code, 0, 0,
                             entity_meters(enx, data_16));
     return;

es_executor(SET_GLOBAL_METER_CMD):
     if data_16 < MIN_ES_METER | data_16 > MAX_ES_METER | data_32_1 ^= 0
          then call cmd_err(e$iop_invalid_meter_id, (data_16));
          else iop_meters(data_16) = data_32_2;
     return;

es_executor(READ_GLOBAL_METER_CMD):
     if data_16 < MIN_ES_METER | data_16 > MAX_ES_METER | data_32_1 ^= 0
          then call cmd_err(e$iop_invalid_meter_id, (data_16));
          else
               call send_cmd(log_chan, func_code, 0, 0,
                             iop_meters(data_16));
     return;

%page;
es_executor(READ_SYNC_INFO_CMD):
     if data_16 < bytesize(iop_sync_pm_info)
     then do;
          call cmd_err(e$iop_size_too_small, (data_16));
          return;
          end;
     accinf.version = ACCESS_INFO_VERSION_1;
```

```
     string (accinf.flag) = '0'b;
     accinf.flag.read_access = TRUE;
     accinf.flag.write_access = TRUE;
     call iop$map_x_pages(ES_CHANNEL, addr1_32, accinf.version, 1, vaddr_32,
                         code);
     if code ^= 0
     then do;
          call cmd_err(code, 0);
          return;
          end;
     vaddr -> iop_sync_pm_info.version = IOP_SYNC_PM_INFO_V3;
     vaddr -> iop_sync_pm_info.code_pages = iop$code_pages;
     vaddr -> iop_sync_pm_info.n_modules = iop$n_modules;
     vaddr -> iop_sync_pm_info.n_external_vars = iop$n_external_vars;
     vaddr -> iop_sync_pm_info.symtab_origin = iop$symtab_origin;
     vaddr -> iop_sync_pm_info.module_map_origin = iop$module_map_origin;
     vaddr -> iop_sync_pm_info.external_vars_map_origin =
                         iop$external_vars_map_origin;
     vaddr -> iop_sync_pm_info.program_end = iop$program_end;
     vaddr -> iop_sync_pm_info.stack_pages = iop$stack_pages;
     vaddr -> iop_sync_pm_info.heap_size = iop$heap_pages * 4096;

     call iop$free_x_map_pages(ES_CHANNEL, vaddr_32, 1, code);
     if code ^= 0
          then call rpterr(iop$edit_string_i(
          'ES: could not free sync info structure mapping. Code = ^i.', code),
          SYSERR_WARN);
     call send_cmd(log_chan, func_code, data_16, data_32_1, data_32_2);
     return;

%page;
/* maintenance functions for es channels */

es_executor(INIT_CHAN_CMD):
     if ^check_chan((data_16), chx)
          then return;
     if equip_table.channel(chx).initialized
          then call cmd_err(esiop_chan_already_initialized, chx);
     equip_table.channel(chx).initialized = TRUE;
     return;

es_executor(STOP_CHAN_CMD):
     if ^check_chan_init((data_16), chx, FALSE)
          then return;
     entity = equip_table.channel(chx).entity;
     if entity ^= NON_ENTITY & equip_table.entity(entity).status.initialized
     then do;
          call rpterr(iop$edit_string_II(
'ES: stopping channel ^I bound to entity ^I.', chx, entity), SYSERR_WARN);
          call equip_table.entity(entity).config_entry(CONFIG_DELETE_CHAN,
                              CFG_FORCE, chx, 0, ret_cod);
          if ret_cod ^= 0 &
             ^(ret_cod = esiop_dummy_entity & allow_dummy_entity$(entity))
          then do;               /* failed to delete */
               call rpterr(iop$edit_string_II(
'ES: entity ^I refused channel ^I delete at stop.', entity, chx), SYSERR_WARN);
               end;
          end;
     call del_chan(chx);
     equip_table.channel(chx).initialized = FALSE;
     return;

%page;
es_executor(SET_CHAN_STATUS_CMD):
/* *** TBS *** */
     call cmd_err(esiop_invalid_chan_status_id, (data_16));
     return;

es_executor(READ_CHAN_STATUS_CMD):

     if data_16 < MIN_ES_CHAN_STATUS | data_16 > MAX_ES_CHAN_STATUS
     then do;
          call cmd_err(esiop_invalid_chan_status_id, (data_16));
          return;
          end;
```

```
     if ^check_chan(data_32_1, chx)
          then return;

     goto es_chan_status_reader(data_16);

es_chan_status_reader(GET_STATUS):
     d32_status = equip_table.channel(chx).status;
     goto return_chan_status;

es_chan_status_reader(GET_BIND):
     status = equip_table.channel(chx).entity;

return_chan_status:
     call send_cmd(log_chan, func_code, data_16, data_32_1, status);
     return;

%page;
/* maintenance functions for es slots */

es_executor(INIT_SLOT_CMD):
     if ^check_slot((data_16), slx)
          then return;
     if equip_table.slot(slx).initialized
          then call cmd_err(es$iop_slot_already_initialized, slx);
     equip_table.slot(slx).initialized = TRUE;
     return;

es_executor(STOP_SLOT_CMD):
     if ^check_slot_init((data_16), slx, FALSE)
          then return;
     entity = equip_table.slot(slx).entity;
     if entity ^= NON_ENTITY & equip_table.entity(entity).status.initialized
     then do;
          call rpterr(iop$edit_string_II(
'ES: stopping slot ^I bound to entity ^I.', slx, entity), SYSERR_WARN);
          call equip_table.entity(entity).config_entry(CONFIG_DELETE_SLOT,
                                   CFG_FORCE, slx, 0, ret_cod);
          if ret_cod ^= 0 &
             ^(ret_cod = e$iop_dummy_entity & allow_dummy_entitys(entity))
          then do;                 /* failed to delete */
               call rpterr(iop$edit_string_II(
'ES: entity ^I refused slot ^I delete at stop.', entity, slx), SYSERR_WARN);
/* *** TEMP DELETE ANYWAY BY FALLING THROUGH *** */
               end;
          end;
     call del_slot(slx);
     equip_table.slot(slx).initialized = FALSE;
     return;
%page;
es_executor(SET_SLOT_STATUS_CMD):
     if data_16 = SET_RESET                  /* only one for now */
     then do;
          if ^check_slot(data_32_1, slx)
               then return;
          ical = slx;
          if equip_table.slot(slx).entity ^= NON_ENTITY
          then do;
               call cmd_err(e$iop_slot_already_bound, entity);
               return;
               end;
          call free_ioa_str;
          string(equip_table.slot(slx).status) = string(FALSE);
          equip_table.slot(slx).adapt_type = 0;   /* cause pbus mgr to do it */
          equip_table.slot(slx).entity_data.e_ptr = null();
          equip_table.slot(slx).entity_data.e_fb15 = 0;
          save_equip_data(slx).entity = NON_ENTITY;
          save_equip_data(slx).slot_type = 0;
          call send_cmd(log_chan, func_code, data_16, data_32_1, 0);
          return;
          end;

     call cmd_err(e$iop_invalid_slot_status_id, (data_16));
     return;
```

```
es_executor(READ_SLOT_STATUS_CMD):

     if data_16 < MIN_ES_SLOT_STATUS | data_16 > MAX_ES_SLOT_STATUS
     then do;
es_slot_status_reader(*):
          call cmd_err(es$iop_invalid_slot_status_id, (data_16));
          return;
          end;

     if ^check_slot(data_32_1, slx)
          then return;

     goto es_slot_status_reader(data_16);

es_slot_status_reader(GET_PROM_REV):
     status = equip_table.slot_prom_rev(slx);
     goto return_slot_status;

es_slot_status_reader(GET_TYPE):
     status = equip_table.slot(slx).adapt_type;
     goto return_slot_status;

es_slot_status_reader(GET_STATUS):
     d32_status = equip_table.slot(slx).status;
     goto return_slot_status;

es_slot_status_reader(GET_BIND):
     status = equip_table.slot(slx).entity;

es_slot_status_reader(GET_FULL_IOA_ID):
     call iop$select_adapter((slx), code);
     if code ^= 0
     then do;
          call cmd_err(code, slx);
          return;
          end;
     accinf.version = ACCESS_INFO_VERSION_1;
     string (accinf.flag) = '0'b;
     accinf.flag.read_access = TRUE;
     accinf.flag.write_access = TRUE;
     call iop$map_x_pages(ES_CHANNEL, addr2_32, accinf.version, 1, vaddr_32,
      *                   code);
     if code ^= 0
     then do;
          call cmd_err(code, 0);
          return;
          end;
     on error
     begin;
          call iop$free_x_map_pages(ES_CHANNEL, vaddr_32, 1, code);
          call cmd_err(oncode(), 0);
          goto onret;
          end;
     vaddr -> board_id = iop$ioa_abs_addr(iop$ioa_abs_addr(
                         ptr(IOA_BOARD_ID_PTR_ADDR)) -> based_ptr) -> board_id;
     status = data_32_2;
     call iop$free_x_map_pages(ES_CHANNEL, vaddr_32, 1, code);
     if code ^= 0
          then call rpterr(iop$edit_string_i(
          'ES: could not free board id structure mapping. Code = ^i.', code),
          SYSERR_WARN);

return_slot_status:
     call send_cmd(log_chan, func_code, data_16, data_32_1, status);
onret:
     return;
%page;
es_executor(BURN_SLOT_PROM_CMD): ;
     if ^check_slot(binary (cmd_ovly.slot), i)
          then return;
     ioal = i;
     if equip_table.slot(ioal).status.running
     then do;
          call cmd_err(es$ioc_adapter_already_running, (ioal));
```

```
          return;
          end;
     if equip_table.slot(ioal).entity ^= NON_ENTITY
     then do;
          call cmd_err(e$iop_slot_already_bound,
               (equip_table.slot(ioal).entity));
          return;
          end;

     accinf.version = ACCESS_INFO_VERSION_1;
     string (accinf.flag) = '0'b;
     accinf.flag.read_access = TRUE;
     accinf.flag.write_access = TRUE;
     call iop$map_x_pages(ES_CHANNEL, addr2_32, accinf.version, 1, vaddr_32,
                          code);
     if code ^= 0
     then do;
          call cmd_err(code, 0);
          return;
          end;

     if ^equip_table.slot(ioal).status.burning_prom
     then do;
          call free_ioa_str;
          if ^allocate_ioa_str()
               then return;
/* we setup everything here except the burning prom status - if we fail then
   the pbus manager takes over and brings the card back into service. Once
   the bruning prom bit is set pbus manager leaves it alone. a SET_RESET
   will make the pbus manager take over again and that is the way to end
   a prom burn */
               string(equip_table.slot(slx).status) = string(FALSE);
               equip_table.slot(slx).adapt_type = 0;
               equip_table.slot(slx).entity_data.e_ptr = null();
               equip_table.slot(slx).entity_data.e_fb15 = 0;
               save_equip_data(slx).entity = NON_ENTITY;
               save_equip_data(slx).slot_type = 0;
               call iop$send_cmd_to_adapt(ioal, CMD_RESET, code);
               if code ^= 0
                    then call iop$set_prom_write(ioal, 0, code); /* *** type *** */
               if code ^= 0
               then do;
                    call cmd_err(code, 0);
                    call free_ioa_str;
                    return;
                    end;
               equip_table.slot(ioal).status.burning_prom = TRUE; /* no pmgr */
               call save_ioa_context;
               ioa_state_info.x_data_16 = binary (cmd_ovly.n_bytes) + 1;
               ioa_state_info.x_data_32_1 = data_32_1;
               ioa_state_info.x_data_ptr = vaddr;
               end;

load_ioa_prom_byte:
     iop$current_interrupt = NONE;          /* not in interrupt context */
     on anyother
     begin;
          call iop$report_condition_info;
          code = oncode();                  /* CONTEXT ??? *** */
          goto adapt_load_error;
          end;
     if ioa_state_info.x_data_16 = 0
     then do;
          bytes = binary (cmd_ovly.n_bytes) + 1;
          vaddr = ioa_state_info.x_data_ptr;
          data_32_1 = ioa_state_info.x_data_32_1;
          if iop$verify_addr(vaddr, addr1_32, ioal, bytes, xsum2, code)
               then call send_cmd(log_chan, func_code, data_16,
                    data_32_1, data_32_2);
               else call cmd_err(code, 0);
          return;
          end;

     ptr_32_1 -> based_char1 = vaddr -> based_char1; /* write byte to PROM */
```

```
     ptr_32_1 = addrel(ptr_32_1,1);
     vaddr = addrel(vaddr,1);
     ioa_state_info.x_data_16 = ioa_state_info.x_data_16 - 1;
     ioa_state_info.state = IOA_WAIT_BYTE_WRITE;
     ioa_state_info.data_32_1 = data_32_1;
     ioa_state_info.data_32_2 = data_32_2;
     call start_poller;
     return;

es_executor(LOAD_SLOT_PRGM_CMD):
     if ^check_slot(binary (cmd_ovly.slot), i)
          then return;
     ioal = i;
     if ^equip_table.slot(ioal).status.alive
     then do;
          call cmd_err(e$iop_adapt_not_alive, (ioal));
          return;
          end;
     if equip_table.slot(ioal).status.running
     then do;
          call cmd_err(e$iop_adapter_already_running, (ioal));
          return;
          end;

     equip_table.slot(ioal).status.loading = TRUE;
     on anyother
     begin;
          call iop$report_condition_info;
          code = oncode();
          goto adapt_load_error;
          end;
     if es_slot_ptrs(ioal) = null()
     then do;
          if ^allocate_ioa_str()
               then return;
          call save_ioa_context;
          ioa_state_info.state = IOA_WAIT_OWNERSHIP;
          ioa_state_info.retries = 0;
          if get_mbx_no_err(TRUE) | ioa_mbx.command ^= 0
          then do;
               call start_poller;
               return;
               end;
got_mtx:
          ioa_mbx.command = GENERIC_CMD__INIT_MEMORY;
          if ^wake_ioa(TRUE)
               then return;
          ioa_state_info.state = IOA_WAIT_MEM_INIT;
          return;
          end;

do_actual_load:

     iop$current_interrupt = NONE;           /* not in interrupt context */
     on anyother
     begin;
          call iop$report_condition_info;
          code = oncode();                   /* CONTEXT ??? *** */
          goto adapt_load_error;
          end;
     if ^get_ioa_mbx(TRUE)
          then return;                       /* imposible */
     bytes = binary (cmd_ovly.n_bytes) + 1;
     ioa_target_addr = data_32_1;
     if ioa_state_info.ioa_addr ^= IOA_UNIVERSAL_ADDR
          then data_32_1 = ioa_state_info.ioa_addr;
     call iop$hos_to_ioa(addr2_32, addr1_32, ioal, bytes, xsum,
                              code);
     if code ^= 0
     then
          call cmd_err(code, 0);
     else do;             /* xfr ok now verify */
          if iop$verify_hos(addr2_32, addr1_32, ioal, bytes, xsum2, code)
          then do;        /* verify ok */
```

```
                if ioa_state_info.ioa_addr = IOA_UNIVERSAL_ADDR
                     then call send_cmd(log_chan, func_code, data_16,
                                (xsum), data_32_2);
                     else do;
                          ioa_mbx.command = GENERIC_CMD__MOVE_BUF_TO_LOMEM;
                          if old_style_status$
                               then ioa_mbx.command = 134;
                          ioa_mbx.buffer_addr = ioa_state_info.ioa_addr;
                          ioa_mbx.xtra_ptr = ioa_target_addr;
                          ioa_mbx_msg_in_def_word = bytes;
                          if ^wake_ioa(TRUE)
                               then return;
                          ioa_state_info.state = IOA_WAIT_PROM_MOVE;
                          end;
                     end;
                else call cmd_err(code, 0);   /* verify failed */
                end;      /* end xfr ok */
      return;

es_executor(START_SLOT_PRGM_CMD):
/* *** */
/* better checks */
      if ^check_slot((data_16), i)
           then return;
      ioa1 = i;
      if ^equip_table.slot(ioa1).status.alive
      then do;
           call cmd_err(e$iop_adapt_not_alive, (data_16));
           return;
           end;
      code = 0;
      on anyother
      begin;
           call iop$report_condition_info;
           code = oncode();
           goto adapt_load_error;
           end;

      if ^get_ioa_mbx(TRUE)
           then return;
      ioa_mbx.command = GENERIC_CMD__START_PROG_IN_MEM;
      if old_style_status$
           then ioa_mbx.command = 135;
      ioa_mbx.xtra_ptr = IOA_START_ADDR;
      ioa_mbx_msg_in_def_word = 0;
      if ^wake_ioa(FALSE)
           then return;
      call free_ioa_str;
      equip_table.slot(ioa1).status.loading = FALSE;
      equip_table.slot(ioa1).status.running = TRUE;
      equip_table.slot(ioa1).status.prom_start = FALSE;
      call send_cmd (log_chan, func_code, data_16, data_32_1,
                     data_32_2);
      return;

es_executor(DUMP_SLOT_MEM_CMD):
      if ^check_slot(binary (cmd_ovly.slot), i)
           then return;
      ioa1 = i;
      on anyother
      begin;
           call iop$report_condition_info;
           code = oncode();                    /* CONTEXT ??? *** */
           goto adapt_load_error;
           end;

      if ^allocate_ioa_str()
           then return;
      if ^get_ioa_mbx(TRUE)
           then return;
/* *** TBS *** */
      call cmd_err(e$iop_unsupported_function, bin(func_code, 31));
      return;
```

```
adapt_load_error:
     call free_ioa_str;
     code = e$iop_adapt_not_alive;
     i = ioa1;
     goto common_condition;
command_exception:
     i = 0;
common_condition:
     call cmd_err(code, i);
     return;

%page;
es_executor(TEST_SLOT_CMD):
     if ^check_slot((data_16), i)
          then return;
     ioa1 = i;
     if equip_table.slot(ioa1).status.running
     then do;
          call cmd_err(e$iop_adapter_already_running, (ioa1));
          return;
          end;
     if equip_table.slot(ioa1).entity ^= NON_ENTITY
     then do;
          call cmd_err(e$iop_slot_already_bound,
               (equip_table.slot(ioa1).entity));
          return;
          end;
     call free_ioa_str;
     if ^allocate_ioa_str()
          then return;
     if ^get_ioa_mbx(TRUE)
          then return;
     es_testing$(ioa1) = TRUE;
     call save_ioa_context;
     ioa_state_info.state = IOA_WAIT_TEST;
     ioa_state_info.x_data_32_1 = iop$read_time();
     ioa_mbx.command = data_32_1;        /* *** */
     if wake_ioa(TRUE)
          then;
     return;

%page;
/* testing functions */

es_executor(ALWAYS_ERROR_CMD):

/* this function is a NOP or a "keep alive" function it returns error with
     error code = 0 and data_32_2 the same as provided */

     call send_cmd(log_chan, func_code + ERROR_ID, 0, data_32_1, data_32_2);
     return;

es_executor(LOOPBACK_CMD):
     call send_cmd(log_chan, func_code, data_16, data_32_1, data_32_2);
     return;

es_executor(LOOPBACK_BGND_CMD):
     call iop$queue_background_callback(es_loopback_bgnd_subr, data_32_1,
          data_16, MASK_ALL_INTS, code);
     if code ^= 0
          then call cmd_err(code, 0);
     return;

es_executor(LOOPBACK_TIMED_CMD):
     call iop$queue_timer_callback(es_loopback_timer_subr, data_32_1,
          (data_16), 7, i, code);
     if code ^= 0
          then call cmd_err(code, 0);
     return;

%page;
ioa_poller: entry (a_lan_slot);
```

```
      equip_tablep = equip_tableps;
      ioal = a_lan_slot;
      if ^setup_ioa_data()
      then do;
           call roterr(iop$edit_string_i(
 'ES: IOA poller cannot setup data for slot ^i.', ioal), SYSERR_WARN);
           return;
           end;
      on anyother
      begin;
           call iop$report_condition_info;
           code = oncode();                          /* CONTEXT ??? *** */
           goto adapt_load_error;
           end;
      ioa_state_info.retries = ioa_state_info.retries + 1;
      if ioa_state_info.retries > 50
      then do;
           call cmd_err(e$iop_timeout, (ioa_state_info.state));
           call free_ioa_str;
           return;
           end;
      call ioa_state_driver;
      return;
 %page;
 /* various utility subroutines */

 es_init: entry;
      equip_tablep = equip_tableps;
      do i = 0 to NUM_OF_SLOTS;
           equip_table.slot(i).entity = NON_ENTITY;
           equip_table.slot(i).entity_data.e_ptr = null();
           equip_table.slot(i).entity_data.e_fb15 = 0;
           save_equip_data(i).entity = NON_ENTITY;
           save_equip_data(i).slot_type = equip_table.slot(i).adapt_type;
           es_slot_ptrs(i) = null();
           end;
      do i = 1 to MAX_CHANNELS;
           string(equip_table.channel(i).status) = FALSE;
           equip_table.channel(i).entity = NON_ENTITY;
           equip_table.channel(i).owner = NON_ENTITY;
           equip_table.channel(i).limit = 0;
           equip_table.channel(i).entity_data.e_ptr = null();
           equip_table.channel(i).entity_data.e_fb15 = 0;
           end;
      do i = 1 to MAX_ENTITIES;
           equip_table.entity(i).type = NON_ENTITY;
           string(equip_table.entity(i).status) = FALSE;
           equip_table.entity(i).entity_data.e_ptr = null();
           equip_table.entity(i).entity_data.e_fb15 = 0;
           end;

      emtrp = iop$emtrp;
      entity_meters = 0;
      es_limits = INITIAL_ES_LIMIT;
      return;

%page;
iop$slot_alive: entry (a_slot_no);
     equip_tablep = equip_tableps;
     i = a_slot_no;
     save_entity = iop$current_entity;
     iop$current_entity = ES_ENTITY;
     if equip_table.slot(i).status.alive
          then call roterr(iop$edit_string_iii(
          'ES: IOA ^i type ^i rev. ^i added.', i,
          equip_table.slot(i).adapt_type, equip_table.slot_prom_rev(i)),
          SYSERR_WARN);
     old_status = equip_table.slot(i).status;
     call send_cmd(ES_CHANNEL, ADDED_SLOT_CMD, (i), status,
                    (equip_table.slot(i).adapt_type));
     iop$current_entity = save_entity;
     if save_equip_data(i).entity ^= NON_ENTITY &
        save_equip_data(i).slot_type ^= equip_table.slot(i).adapt_type
```

```
    then do;  /* was owned but type changed unbind (force) and reset prio */
        enx = equip_table.slot(i).entity;
        equip_table.slot(i).entity = NON_ENTITY;
        call rpterr(iop$edit_string_II(
        'ES: IOA ^I type changed w/ entity ^I bound - IOA unbound.', i, enx),
        SYSERR_WARN);
        ret_cod = 0;
        call equip_table.entity(enx).config_entry(CONFIG_DELETE_SLOT,
                                      CFG_FORCE, i, 0, ret_cod);
        if ret_cod ^= 0 &
           ^(ret_cod = e$iop_dummy_entity & allow_dummy_entity$(enx))
             then call rpterr(iop$edit_string_IH(
'ES: Entity ^I refused IOA delete at type change. Codes = ^Hx.', enx, ret_cod),
             SYSERR_WARN);
      * call del_slot(i);
        call iop$set_slot_priority((i), DEFAULT_PRIORITY, code);
        return;
        end;
        call iop$set_slot_priority((i), equip_table.slot(i).priority, code);
     return;

iop$slot_broken: entry (a_slot_no, a_sub_chan, a_adap_type);
     equip_tablep = equip_tablep$;
     i = a_slot_no;
     ioal = 1;
     adap_type = a_adap_type;
     call rpterr(iop$edit_string_I('ES: IOA ^I is broken.', i), SYSERR_WARN);
     save_entity = iop$current_entity;
     iop$current_entity = ES_ENTITY;
     d32_status = equip_table.slot(i).status;
     call send_cmd(ES_CHANNEL, BROKEN_SLOT_CMD, (i), status, adap_type);
     equip_table.slot(i).adapt_type = 0;
     equip_table.slot(i).priority = 0;  /* pbus manager will reinit */
     equip_table.slot(i).status.alive = FALSE;
     equip_table.slot(i).status.testing = FALSE;
     equip_table.slot(i).status.loading = FALSE;
     equip_table.slot(i).status.running = FALSE;
     equip_table.slot(i).status.prom_start = FALSE;
     call free_ioa_str;
     iop$current_entity = save_entity;
     save_equip_data(i).slot_type = adap_type;
     save_equip_data(i).entity = equip_table.slot(i).entity;
     return;

iop$process_slot: entry (a_slot_no, a_sub_chan);

     slot_no = a_slot_no;
     sub_chan = a_sub_chan;
     equip_tablep = equip_tablep$;
     mtrp = iop$mtrp;
     iop_meters(INTERRUPT_MTR) = iop_meters(INTERRUPT_MTR) + 1;
     on anyother
     begin;
          call iop$report_condition_info;
          code = oncode();                    /* CONTEXT ??? *** */
          goto slot_error;
          end;

     call iop$send_cmd_to_adapt (slot_no, CMD_CLEAR_INT, code);
     if code ^= 0
          then call rpterr(iop$edit_string_ii(
'IOA interrupt: Cannot clear int for IOA ^i. Code = ^i.', slot_no, code),
SYSERR_WARN);
     if equip_table.slot(slot_no).status.testing
          then return;

     entity = equip_table.slot(slot_no).entity;

     ioal = slot_no;

     save_entity = iop$current_entity;
     save_slot = iop$current_interrupt;
     iop$current_interrupt = slot_no;
```

```
 /* NB: This is amazingly disgusting since theoretically the owning entity
     should see the interrupts. Since the VOS comm code binds the slot before
     the load we look for this. */

     if  es_slot_ptrs(ioal) ^= null()
     then do;
          call ioa_state_driver();
          goto slot_int_return;
          end;

     if entity = NON_ENTITY
     then do;
          if ^equip_table.slot(slot_no).status.prom_start
          then do;
               call rpterr(iop$edit_string_i(
'IOA interrupt: No entity bound for IOA ^i - masking interrupts', slot_no),
SYSERR_WARN);
               call iop$set_slot_priority (slot_no, 0, code);
               goto slot_int_return;
               end;
               else call rpterr(iop$edit_string_i(
'IOA interrupt: PROM controls IOA ^i.', slot_no), SYSERR_WARN);
          end;
          else do;
               on anyother
               begin;
                    call iop$slot_exception(slot_no); /* *** */
                    goto slot_int_return;
                    end;
               iop$current_entity = entity;
               emtrp = iop$emtrp;
               call iop$enable_watchdog;
               i = iop$read_time ();
               call equip_table.entity(entity).slot_entry (slot_no, sub_chan);
               i = iop$delta_time(i);
               call iop$disable_watchdog;
               entity_meters(entity, ENT_INT_CALL_MTR) =
                         entity_meters(entity, ENT_INT_CALL_MTR) + 1;
               entity_meters(entity, ENT_INT_TIME_MTR) =
                    entity_meters(entity, ENT_INT_TIME_MTR) + i;
               if i > entity_meters(entity, ENT_INT_MAX_MTR)
                    then entity_meters(entity, ENT_INT_MAX_MTR) = i;
               end;
slot_int_return:
     iop$current_interrupt = save_slot;
     iop$current_entity = save_entity;
     return;

slot_error:
     call rpterr(iop$edit_string_i(
'IOA interrupt: Condition occurred. Oncode = ^i.', code), SYSERR_WARN);
     return;

%page;
iop$slot_exception: entry (a_slot);

     ioal = a_slot;
fault_is_slot:
     equip_tablep = equip_tablep$;
     call build_fault(fault_data, fault_address);
     call rpterr(iop$edit_string_i(
'ES: FATAL IOA ^i EXCEPTION.', ioal), SYSERR_WARN);
     call iop$report_condition_info;
     save_entity = iop$current_entity;
     iop$current_entity = ES_ENTITY;
     call send_cmd(ES_CHANNEL, EXCEPTION_SLOT_ONLY_CMD, (ioal), fault_data,
               equip_table.slot(ioal).adapt_type * 65536 + enx);
     iop$current_entity = save_entity;
     enx = equip_table.slot(ioal).entity;
     on anyother
          goto slot_except_delete;
     call equip_table.entity(enx).config_entry(CONFIG_DELETE_SLOT,
               CFG_FORCE | CFG_ERROR | CFG_LOCAL, (ioal), 0, ret_cod);
```

```
slot_excpt_delete:
     call del_slot((ioa1));
     equip_table.slot(ioa1).status.exception = TRUE;
     return;

iop$entity_exception: entry (a_entity);

     enx = a_entity;
     equip_tablep = equip_tablep$;
     call build_fault(fault_data, fault_address);
     if fault_address > START_ADAPT_MEM & iop$current_slot ^= -1
     then do;
          ioa1 = divide (iop$current_slot, 15, 15);
          if equip_table.slot(iop$current_slot).entity ^= iop$current_entity
               then call rpterr(iop$edit_string_iii(
'ES: FATAL Slot ^i EXCEPTION. Owning entity is ^i but entity ^i is current.',
iop$current_slot, equip_table.slot(iop$current_slot).entity,
iop$current_entity), SYSERR_WARN);
               else goto fault_is_slot;
          end;

     data_32_2 = 0;
     call rpterr(iop$edit_string_I(
'ES: FATAL Entity ^I EXCEPTION.', enx), SYSERR_WARN);
     call iop$report_condition_info;
     save_entity = iop$current_entity;
     iop$current_entity = ES_ENTITY;
     call kill_ghouls(enx);        /* eliminate potential zombie entities */
     do i = 0 to NUM_OF_SLOTS;
          if equip_table.slot(i).entity = enx
          then do;
               entity_death_xsum.slots = entity_death_xsum.slots + 1;
               call send_cmd(ES_CHANNEL, EXCEPTION_SLOT_CMD, (i),
                    fault_data, equip_table.slot(i).adapt_type * 65536 + enx);
               on anyother
                    goto ent_excpt_del_slot;
               call equip_table.entity(enx).config_entry(CONFIG_DELETE_SLOT,
                    CFG_FORCE | CFG_ERROR | CFG_LOCAL, i, 0, ret_cod);
ent_excpt_del_slot:
               call del_slot(i);
               equip_table.slot(i).status.exception = TRUE;
               end;
          end;
     do i = 1 to MAX_CHANNELS;
          if equip_table.channel(i).entity = enx
          then do;
               entity_death_xsum.chans = entity_death_xsum.chans + 1;
               if equip_table.channel(i).owner ^= ES_ENTITY
                  then call rpterr('ES TEMP - Inter entity channel exception',
                                   SYSERR_WARN); /* *** */
               call send_cmd(equip_table.channel(i).owner, EXCEPTION_CHAN_CMD,
                      (i), fault_data, (enx));
               on anyother
                    goto ent_excpt_del_chan;
               call equip_table.entity(enx).config_entry(CONFIG_DELETE_CHAN,
                    CFG_FORCE | CFG_ERROR | CFG_LOCAL, i, 0, ret_cod);
ent_excpt_del_chan:
               call del_chan(i);
               equip_table.channel(i).status.exception = TRUE;
               end;
          end;
     call send_cmd(ES_CHANNEL, EXCEPTION_ENTITY_CMD, (enx), fault_data, data_32_2)
     on anyother
          goto ent_excpt_del_ent;
     call equip_table.entity(enx).config_entry(CONFIG_SHUTDOWN,
          CFG_FORCE | CFG_ERROR | CFG_LOCAL, enx, 0, ret_cod);
ent_excpt_del_ent:
     iop$current_entity = save_entity;
     equip_table.entity(enx).status.exception = TRUE;
     equip_table.entity(enx).status.initialized = FALSE;
     return;

%page;
```

```
select_and_get_owner: procedure returns (bit(1) aligned);

dcl  code       fixed bin (15);
dcl  i_own      bit (1) aligned;

     call iop$select_adapter(ioal, code);
     if code ^= 0
     then do;
          call rpterr(iop$edit_string_ii(
'ES: IOA poller cannot select slot ^i. Code = ^i.', ioal, code), SYSERR_WARN);
          return (FALSE);
          end;
     ioa_mbxp = iop$ioa_abs_addr(iop$ioa_abs_addr(
                         ptr(IOA_DIAG_MBX_PTR_ADDR)) -> based_ptr);
     i_own = (ioa_mbx.ownership = IOP_OWNER);
     if ^i_own
          then call start_poller;
     return (i_own);
end select_and_get_owner;

ioa_state_driver: procedure;

     goto ioa_load_int(ioa_state_info.state);

ioa_load_int(IOA_WAIT_TEST):
     if ^select_and_get_owner()
          then return;
     if ioa_error()
          then return;
     call send_cmd (log_chan, func_code, data_16, data_32_1,
                    data_32_2);
     ;
ioa_load_int(IOA_WAIT_OWNERSHIP):
     if ^select_and_get_owner()
          then return;
     if ioa_mbx.command ^= 0
     then do;
          call start_poller;
          return;
          end;
     if ^get_ioa_mbx(TRUE)                 /* cant fail just to zero mbx */
          then return;
     goto got_mbx;
     ;    /* *** */

ioa_load_int(*):
     call rpterr(iop$edit_string_ii(
'IOA interrupt: IOA ^i illegal polling state ^i.', ioal, ioa_state_info.state),
     SYSERR_WARN);
     call free_ioa_str;
     return;

ioa_load_int(IOA_WAIT_BYTE_WRITE):
     if iop$delta_time(ioa_state_info.x_data_32_1) < PROM_BYTE_WRITE_TIME
          then call start_poller;
     goto load_ioa_prom_byte;

ioa_load_int(IOA_WAIT_MEM_INIT):
     if ^select_and_get_owner()
          then return;
     if ioa_error()
          then return;
     if ^get_ioa_mbx(TRUE)                 /* cant fail just to zero mbx */
          then return;
     ioa_mbx.command = GENERIC_CMD__ALLOCATE_XFER_BUF;
     if old_style_status$ then
     ioa_mbx.command = 133;
     if ^wake_ioa(TRUE)
          then return;
     ioa_state_info.state = IOA_WAIT_PROM_ADDR;
     return;
```

```
ioa_load_int(IOA_WAIT_PROM_ADDR):
     if ^select_and_get_owner()
          then return;
     ioa_state_info.state = IOA_INACTIVE;
     if ioa_error()
          then return;
     ioa_state_info.ioa_addr =  ioa_mbx.buffer_addr;
     data_32_2 = ioa_state_info.data_32_2;
     data_16 = ioa_state_info.data_16;
     goto do_actual_load;

ioa_load_int(IOA_WAIT_PROM_MOVE):
     if ^select_and_get_owner()
          then return;
     ioa_state_info.state = IOA_INACTIVE;
     ioa_state_info.x_data_16 = iop$current_interrupt;
     if ioa_error()
          then return;
     call send_cmd(ES_CHANNEL, LOAD_SLOT_PRGM_CMD, ioa_state_info.data_16,
                ioa_state_info.data_32_1, ioa_state_info.data_32_2);
     return;

ioa_load_int(IOA_INACTIVE):
     if ioa_state_info.x_data_16 = iop$current_interrupt
          then call rpterr(iop$edit_string_i(
'IOA interrupt: Unexpected IOA ^i interrupt during load.', ioa1), SYSERR_WARN);
     ioa_state_info.x_data_16 = iop$current_interrupt;
     return;

end ioa_state_driver;
save_ioa_context: proc;

     ioa_state_info.data_32_1 = data_32_1;
     ioa_state_info.data_32_2 = data_32_2;
     ioa_state_info.data_16 = data_16;
     ioa_state_info.func_code = func_code;
     ioa_state_info.log_chan = log_chan;

end save_ioa_context;

start_poller: proc;

     call iop$queue_timer_callback( ioa_poller, (ioa1), PROM_BYTE_WRITE_TIME,
                MASK_ALL_INTS, ioa_state_info.timer_id, code);
     if code ^= 0
          then call rpterr(iop$edit_string_i(
          'ES: could not queue timer callback for ioa polling. Code = ^i.',
          code), SYSERR_WARN);
end start_poller;
build_fault: procedure (a_fault_data, a_fault_addr);

/* %include 'condition_info'; */
/* Begin condition_info.incl.pl1 */

declare   1 condition_info     based,
          2 oncode             fixed bin(15),
          2 onfile             char(32) varying,
          2 onloc              char(32) varying,
          2 onkey              char(64) varying,
          2 condition_no       fixed bin(15),
          2 c_ptr              ptr,
          2 mc_ptr             ptr,
          2 name               char(32) varying,
          2 message            char(256) varying,
          2 onframe            ptr,
          2 nextframe          ptr;

/* End condition_info.incl.pl1 */
/* %include 'iop_mc'; */
/* Begin include file ... iop_mc.incl.pl1  80-12-31 */

dcl  mcp ptr;
```

```
dcl 1 mc based (mcp),      /* machine conditions */
    2 identifier           char(4),                  /* *MC* */
    2 berr_type_code       fixed bin (15),
    2 align_bdcs           char (0) aligned,
    2 bdcs,
      3  bdcs_broken       bit (1),
      3  bdcs_broken2      bit (1),
      3  bdcs_mempar       bit (1),
      3  bdcs_memcomp      bit (1),
      3  bdcs_timask       bit (1),
      3  bdcs_pkcomp       bit (1),
      3  bdcs_cmdpend      bit (1),
      3  bdcs_statchg      bit (1),
      3  bdcs_side         bit (1),
      3  bdcs_ipend        bit (1),
      3  bdcs_partner      bit (1),
      3  bdcs_zout_gt      bit (1),
      3  bdcs_level1       bit (1),
      3  bdcs_romhigh      bit (1),
      3  bdcs_cmd_mask     bit (1),
      3  bdcs_imask        bit (1),

    2 align_p_status       char (0) aligned,
    2 p_status,
      3 cma_vfy_ok         bit (1),
      3 cma_wrt            bit (1),
      3 cma_rd             bit (1),
      3 scan_int           bit (1),
      3 scan_up_L          bit (1),
      3 pbus_force         bit (1),
      3 pside_enb          bit (1),
      3 cside_enb          bit (1),
      3 pbus_diag          bit (1),
      3 pbus_obey_er       bit (1),
      3 pbus_sel_er        bit (1),
      3 pbus_berr_en       bit (1),
      3 pbus_enb           bit (1),
      3 pbus_lock          bit (1),
      3 obey_p             bit (1),
      3 obey_c             bit (1),
    2 ioa_slot             fixed bin (15),
    2 usp                  fixed bin (31),
    2 d                    (0:7) fixed bin (31),
    2 a                    (0:6) fixed bin (31),
    2 int_sr               bit (16) aligned,
    2 status               bit (16) aligned,
    2 pc                   fixed bin (31),
    2 align_info           char (0) aligned,
    2 info,
      3 extended_fmt       bit (1) ,
      3 mbz                bit (3),
      3 vector             bit (12);

dcl 1 berr_mc based (mcp),      /* bus or address error machine conditions */
    2 identifier           char(4),
    2 berr_type_code       fixed bin (15),
    2 align_bdcs           char (0) aligned,
    2 bdcs,
      3  bdcs_broken       bit (1),
      3  bdcs_broken2      bit (1),
      3  bdcs_mempar       bit (1),
      3  bdcs_memcomp      bit (1),
      3  bdcs_timask       bit (1),
      3  bdcs_pkcomp       bit (1),
      3  bdcs_cmdpend      bit (1),
      3  bdcs_statchg      bit (1),
      3  bdcs_side         bit (1),
      3  bdcs_ipend        bit (1),
      3  bdcs_partner      bit (1),
      3  bdcs_zout_gt      bit (1),
      3  bdcs_level1       bit (1),
      3  bdcs_romhigh      bit (1),
      3  bdcs_cmd_mask     bit (1),
      3  bdcs_imask        bit (1),
```

```
    2 align_p_status         char (0) aligned,
    2 p_status,
      3 dma_vfy_ok           bit (1),
      3 dma_wrt              bit (1),
      3 dma_rd               bit (1),
      3 scan_int             bit (1),
      3 scan_up_L            bit (1),
      3 pbus_force           bit (1),
      3 pside_enb            bit (1),
      3 aside_enb            bit (1),
      3 pbus_diag            bit (1),
      3 pbus_obey_er         bit (1),
      3 pbus_sel_er          bit (1),
      3 pbus_berr_en         bit (1),
      3 pbus_enb             bit (1),
      3 pbus_lock            bit (1),
      3 obey_p               bit (1),
      3 obey_c               bit (1),
    2 ioa_slot               fixed bin (15),
    2 usp                    fixed bin (31),
    2 d                      (0:7) fixed bin (31),
    2 a                      (0:6) fixed bin (31),
    2 int_sr                 bit (16) aligned,
    2 status                 bit (16) aligned,
    2 pc                     fixed bin (31),
    2 align_info             char (0) aligned,
    2 info,
      3 extended_frt         bit (1),
      3 mbz                  bit (3),
      3 vector               bit (12),
    2 align_stat             char (0) aligned,
    2 special_status,
      3 rerun                bit (1),
      3 pad1                 bit (1),
      3 inst_fetch           bit (1),
      3 data_fetch           bit (1),
      3 r_m_w_cycle          bit (1),
      3 high_byte            bit (1),
      3 byte_xfer            bit (1),
      3 read                 bit (1),
      3 pad2                 bit (5),
      3 function_code        bit (3),
    2 fault_addr             fixed bin (31),
    2 resv_data_out          bit (16) aligned,
    2 data_out               bit (16) aligned,
    2 resv_data_in           bit (16) aligned,
    2 data_in                bit (16) aligned,
    2 resv_inst              bit (16) aligned,
    2 instruction_reg        bit (16) aligned,
    2 internal_info          (16) fixed bin (15);

/* End include file ... iop_mc.incl.pl1 */

dcl  a_fault_data    fixed bin (31);
dcl  a_fault_addr    fixed bin (31);

dcl  s$find_condition_info entry (ptr, fixed bin(15));

dcl  1 fault_ovly    defined a_fault_data,
       2 type        char (1),
       2 sub_type    char (1),
       2 opcode      fixed bin (15);

dcl  p               ptr;
dcl  code            fixed bin (15);
dcl  1 ci            like condition_info based (p);

     call s$find_condition_info(p, code);
     if code ^= 0
     then do;
          a_fault_data = 0;
          a_fault_addr = 0;
          return;
          end;
```

```
     mcp = ci.mc_ptr;
     fault_ovly.oncode = ci.oncode;
     fault_ovly.type = byte(divide (bin (mc.vector,15), 4 ,15));
/* *** sub_type *** */
     a_fault_addr = berr_mc.fault_addr;
     return;

end build_fault;
%page;
setup_ioa_data: procedure returns (bit (1) aligned);

          if es_slot_ptrs(ioa1) = null()
               then return(FALSE);
          if ioa_state_info.timer_id ^= 0
          then do;
               call iop$revoke_timer_callback(ioa_state_info.timer_id, (0));
               ioa_state_info.timer_id = 0;
               end;
          data_16 = ioa_state_info.data_16;
          data_32_1 = ioa_state_info.data_32_1;
          data_32_2 = ioa_state_info.data_32_2;
          log_chan = ioa_state_info.log_chan;
          func_code = ioa_state_info.func_code;

          return(TRUE);

end setup_ioa_data;
ioa_error: procedure returns (bit (1) aligned);

dcl  status     fixed bin (31);
dcl  my_sts     bit (32) aligned;

     if ^setup_ioa_data()
          then return(TRUE);
     if ^get_ioa_mbx(FALSE)
          then return(TRUE);
/* *** */
     if old_style_status$
          then my_sts = MBX_STS__SUCCESS;
          else my_sts = MBX_STS__GT_SUCCESS;
/* *** */
/* *** if status ^= bin(MBX_STS__GT_SUCCESS) *** */
     if ioa_mbx.status ^= my_sts
     then do;
          call free_ioa_str;
          call cmd_err(e$iop_prom_command_failed,
               addr(ioa_mbx.status) -> based_fb31);
          return(TRUE);
          end;
     return (FALSE);
end ioa_error;

free_ioa_str: procedure;

     if es_slot_ptrs(ioa1) = null()
          then return;
     es_testing$(ioa1) = FALSE;
     equip_table.slot(ioa1).status.burning_prom = FALSE;
     call iop$free(es_slot_ptrs(ioa1), 'ES');
     es_slot_ptrs(ioa1) = null();
     equip_table.slot(ioa1).status.loading = FALSE;

end free_ioa_str;

wake_ioa: procedure (polling) returns (bit (1) aligned);

dcl  polling   bit (1) aligned;

     ioa_mbx.ownership = IOA_OWNER;
     call iop$send_cmd_to_adapt(ioa1, CMD_INT_DEVICE, code);
     if code ^= 0
     then do;
```

```
            call free_ioa_str;
            call cmd_err(code, 0);
            return(FALSE);
            end;
      if polling
      then do;
            call start_poller;
            ioa_state_info.retries = 0;
            end;
            else if es_slot_ptrs(ioal) ^= null()   /* may be start of non-
                                                     loaded IOA */
                  then ioa_state_info.timer_id = 0;
      return(TRUE);
end wake_ioa;

allocate_ioa_str: procedure returns (bit(1) aligned);

      if es_slot_ptrs(ioal) = null ()
      then do;
            es_slot_ptrs(ioal) =
                  iop$allocate(size(ioa_state_info), 'ES');
            if es_slot_ptrs(ioal) = null ()
                  then call cmd_err(e$iop_cannot_allocate_space, 0);
            end;
      return (es_slot_ptrs(ioal) ^= null ());

end allocate_ioa_str;
get_mbx_no_err: proc (zero_mbx) returns (bit (1) aligned);
dcl  zero_mbx  bit (1) aligned;

dcl  bytcnt      fixed bin (15);

      call iop$select_adapter(ioal, code);
      if code ^= 0
            then return(FALSE);
      ioa_mbxp = iop$ioa_abs_addr(iop$ioa_abs_addr(
                        ptr(IOA_DIAG_MBX_PTR_ADDR)) -> based_ptr);
      if ioa_mbx.ownership = IOA_OWNER
            then return(FALSE);
      bytcnt = bytesize(ioa_mbx);
      if zero_mbx
      then begin;
            dcl ioa_mbx_ovly(bytcnt)  bit (8) defined ioa_mbx;
            string(ioa_mbx_ovly) = string('0'b);
            end;
      return(TRUE);
end get_mbx_no_err;
get_ioa_mbx: procedure (zero_mbx) returns (bit (1) aligned);

dcl  zero_mbx  bit (1) aligned;

dcl  bytcnt      fixed bin (15);
      call iop$select_adapter(ioal, code);
      if code ^= 0
      then do;
            call free_ioa_str;
            call cmd_err(code, 0);
            return(FALSE);
            end;
      ioa_mbxp = iop$ioa_abs_addr(iop$ioa_abs_addr(
                        ptr(IOA_DIAG_MBX_PTR_ADDR)) -> based_ptr);
      if ioa_mbx.ownership = IOA_OWNER
      then do;
            call free_ioa_str;
            call cmd_err(e$iop_timeout, 0);
            return(FALSE);
            end;
      bytcnt = bytesize(ioa_mbx);
      if zero_mbx
      then begin;
            dcl ioa_mbx_ovly(bytcnt)  bit (8) defined ioa_mbx;
            string(ioa_mbx_ovly) = string('0'b);
            end;
```

```
    return(TRUE);
end get_ioa_mbx;
%page;
%page;
cmd_err: procedure (a_err_code, a_extra_data);

dcl  a_err_code      fixed bin (15);
dcl  a_extra_data    fixed bin (31);

dcl  err_code        fixed bin (15);
dcl  extra_data      fixed bin (31);

     mtrp = iop$mtrp;
     err_code = a_err_code;
     extra_data = a_extra_data;

/* report a command error on the command ring */

     iop_meters(CMD_ERROR_MTR) = iop_meters(CMD_ERROR_MTR) + 1;
     call send_cmd(log_chan, func_code + ERROR_ID, err_code, extra_data, 0);
     return;

end cmd_err;
%page;
send_cmd: proc (a_chn, a_fnc, a_d16, a_d1, a_d2);

dcl  (a_chn, a_fnc, a_d16) fixed bin (15);
dcl  (a_d1, a_d2)    fixed bin (31);

dcl  code            fixed bin (15);
dcl  (chn, fnc, d16)      fixed bin (15);
dcl  (d1, d2)        fixed bin (31);

dcl  iop$deliver_command_es entry (fixed bin (15), fixed bin(15),
                                   fixed bin (15), fixed bin (31),
                                   fixed bin (31), fixed bin (15),
                                   fixed bin (15));

     mtrp = iop$mtrp;
     chn = a_chn;
     fnc = a_fnc;
     d16 = a_d16;
     d1 = a_d1;
     d2 = a_d2;

     iop_meters(SEND_MTR) = iop_meters(SEND_MTR) + 1;
     call iop$deliver_command_es(chn, fnc, d16, d1, d2, es_limits, code);
     if code = 0
          then return;
     iop_meters(SEND_FAILED_MTR) = iop_meters(SEND_FAILED_MTR) + 1;
     call rpterr(iop$edit_string_ii(
'ES: Delivery of command ^i to host failed. Code = ^i', fnc, code),
     SYSERR_WARN);
end send_cmd;
%page;
rpterr: procedure (a_errstr, a_errtyp);

dcl  a_errstr        char (80) varying;
dcl  a_errtyp        fixed bin (15);

dcl  errstr          char (80) varying;
dcl  errtyp          fixed bin (15);
dcl  code            fixed bin (15);

     errstr = a_errstr;
     errtyp = a_errtyp;
     if errtyp = SYSERR_CRASH
          then errtyp = SYSERR_WARN;     /* crashing the host is not nice */
     call iop$syserr_code(errstr, errtyp, code);
     if code = 0
          then return;
     if a_errtyp = SYSERR_CRASH
          then call iop$panic_syserr(errstr);
```

```
end rpterr;
%page;
check_slot: proc (slotin, slotx) returns (bit (1) aligned);

dcl  slotin     fixed bin (31);
dcl  slotx      fixed bin (31);
dcl  init_check bit (1) aligned;
dcl  implicit   bit (1) aligned;

     init_check = FALSE;
     goto check_slot_join;

check_slot_init: entry (slotin, slotx, implicit) returns (bit (1) aligned);
     init_check = TRUE;

check_slot_join:
     if slotin < 0 | slotin > NUM_OF_SLOTS
     then do;
          call cmd_err(e$iop_invalid_slot_no, slotin);
          return (FALSE);
          end;
     slotx = slotin;
     if equip_table.slot(slotx).status.exception & init_check
     then do;
          call send_cmd(log_chan, func_code, data_16, data_32_1, data_32_2);
          equip_table.slot(slotx).status.exception = FALSE;
          return(FALSE);
          end;
     if init_check & ^equip_table.slot(slotx).initialized
     then do;
          if ^implicit
          then do;
               call cmd_err(e$iop_slot_not_initialized, slotin);
               return (FALSE);
               end;
/* implicit initialization */
          equip_table.slot(slotx).initialized = TRUE;
          end;
     return (TRUE);
end check_slot;
%page;
check_entity: proc (entityin, entityx) returns (bit (1) aligned);

dcl  entityin     fixed bin (31);
dcl  entityx      fixed bin (31);
dcl  init_check bit (1) aligned;
dcl  implicit   bit (1) aligned;
dcl  allow_exception bit (1) aligned;

     init_check = FALSE;
     allow_exception = FALSE;
     goto check_entity_join;

check_entity_exc: entry (entityin, entityx, implicit) returns (bit (1) aligned);
     init_check = FALSE;
     goto check_entity_join;
     allow_exception = TRUE;

check_entity_init: entry (entityin, entityx, implicit) returns (bit (1) aligned);
     init_check = TRUE;
     allow_exception = FALSE;

check_entity_join:
     if entityin < 1 | entityin > MAX_ENTITIES |
          equip_table.entity(entityin).type = NON_ENTITY
     then do;
          call cmd_err(e$iop_invalid_entity_id, entityin);
          return (FALSE);
          end;
     entityx = entityin;
     if equip_table.entity(entityx).status.exception & allow_exception
          then return(TRUE);
```

```
     if init_check & ^equip_table.entity(entityx).initialized
     then do;
          if ^implicit
          then do;
               call cmd_err(e$iop_entity_not_initialized, entityin);
               return (FALSE);
               end;
/* implicit init */
          ret_cod = 0;
          equip_table.entity(entityx).status.exception = FALSE;
          call equip_table.entity(entityx).config_entry(CONFIG_INIT, CFG_LOCAL,
                     entityx, 0, ret_cod);
          if ret_cod = 0 |
             (ret_cod = e$iop_dummy_entity & allow_dummy_entity$(entityx))
               then equip_table.entity(entityx).status.initialized = TRUE;
               else do;
                    call cmd_err(e$iop_entity_not_initialized, ret_cod);
                    return(FALSE);
                    end;
          end;
     return (TRUE);
end check_entity;
%page;
check_chan: proc (chanin, chanx) returns (bit (1) aligned);

dcl  chanin     fixed bin (31);
dcl  chanx      fixed bin (31);
dcl  init_check bit (1) aligned;
dcl  implicit   bit (1) aligned;

     init_check = FALSE;
     goto check_chan_join;

check_chan_init: entry (chanin, chanx, implicit) returns (bit (1) aligned);
     init_check = TRUE;
check_chan_join:
     if chanin < 1 | chanin > MAX_CHANNELS
     then do;
          call cmd_err(e$iop_invalid_log_chan_no, chanin);
          return (FALSE);
          end;
     chanx = chanin;
     if equip_table.channel(chanx).status.exception & init_check
     then do;
          call send_cmd(log_chan, func_code, data_16, data_32_1, data_32_2);
          equip_table.channel(chanx).status.exception = FALSE;
          return(FALSE);
          end;
     if init_check & ^equip_table.channel(chanx).initialized
     then do;
          if ^implicit
          then do;
               call cmd_err(e$iop_chan_not_initialized, chanin);
               return (FALSE);
               end;
/* implicit initialization */
          equip_table.channel(chanx).initialized = TRUE;
          end;
     return (TRUE);
end check_chan;
%page;
del_chan: proc (chan);

dcl chan fixed bin (31);

     equip_table.channel(chan).entity = NON_ENTITY;
     equip_table.channel(chan).owner = NON_ENTITY;
     equip_table.channel(chan).limit = 0;
     equip_table.channel(chan).entity_data.e_ptr = null();
     equip_table.channel(chan).entity_data.e_fb15 = 0;

end del_chan;

del_slot: proc (slot);
```

```
dcl slot fixed bin (31);

     equip_table.slot(slot).entity = NON_ENTITY;
     equip_table.slot(slot).entity_data.e_ptr = null();
     equip_table.slot(slot).entity_data.e_fb15 = 0;
     equip_table.slot(slot).status.running = FALSE;
     equip_table.slot(slot).status.loading = FALSE;
     save_equip_data(slot).entity = NON_ENTITY;

end del_slot;
%page;
es_loopback_bgnd_subr: proc (data);

dcl data fixed bin (31);

dcl fcn  fixed bin (15);

     fcn = LOOPBACK_BGND_CMD;
     goto loopback_reply_join;

es_loopback_timer_subr: entry (data);

     fcn = LOOPBACK_TIMED_CMD;

loopback_reply_join:

     call send_cmd(iop$current_channel, fcn, 0, data, data);

end es_loopback_bgnd_subr;

end iop_es_entity;


/*   +++begin copyright+++ ******************************  */
/*                                                          */
/*   STRATUS CONFIDENTIAL INFORMATION: CLASS II             */
/*   COPYRIGHT (c) Stratus Computer, Inc. 1986              */
/*                                                          */
/*   This program contains confidential and proprietary    */
/*   information of Stratus Computer, Inc., and any        */
/*   reproduction, disclosure, or use in whole or in part  */
/*   is expressly prohibited, except as may be             */
/*   specifically authorized by prior written agreement or */
/*   permission of Stratus.                                 */
/*                                                          */
/*   +++end copyright+++ ********************************  */

/* IOP_INITIALIZER: Program to handle IOP initialization after
                    it is loaded by rom code*/

/* Beginning of modification history */
/* Written 86-03-25 by Tom Moser from many other files that did the same
     thing */
/* Modified 86-03-27 by Pradip Gosalia to uncomment iop$slot_keeper */
/* Modified 86-03-31 by Pradip Gosalia to map pages without dma access */
/*                   and correct the order of params for iop$map_x_pages */
/* Modified 86-04-18 by Tom Moser to init entity table */
/* Modified 86-05-07 by Tom Moser to call rpt_config */
/* Modified 86-05-19 by Tom Moser to reserve stack space for prom code */
/* Modified 86-06-04 by Martin Stokoe to init iop$stack_end */
/* Modified 86-08-01 by Tom Moser to move initial stack and remove
     initializer frame */
/* Modified 86-08-13 by Tom Moser to change last string to bin_to_char */
/* Modified 86-09-11 by Tom Moser to reserve space for prom prim io on stack */
/* Modified 86-10-04 by Martin Stokoe to report release version  */
/* Modified 86-10-15 by Tom Moser to init entities before allowing ints */
/* Modified 86-10-28 by Tom Moser to use binc file variables for config */
/* Modified 86-10-28 by Martin Stokoe to implement new version
      scheme like VOS */
/* Modified 86-12-03 by Bill Snapper to give the eeprom more ram storage space
      for its structures.  Changed the variable RSVD_PROM_STACK_SIZE from 256
      to 1024. */
/* Modified 87-03-02 by Tom Moser to fix minor problems with interrupts */
```

```
/* Modified 87-03-09 by Tom Moser to remove deadly embrace involving global
     state */
/* Modified 87-03-16 by Tom Moser to build dump list */
/* End of modification history */

/* MODULE ABSTRACT
1.  entry from rom (running on temp stack)
    init map pages for heap
    setup heap
2.  init map pages for stack
    map real stack
3.  setup mapper
4.  Process an expected set up of the boards mail box
5.  initialize the local interrupt vector from  the mailbox
6.  setup command and syserr rings
7.  allocate and init meters
8.  allocate equip table
9.  initialize tasking
10. initialize the timer chip
11. initialize dma
12. initial environmental software
13. allow interrupts
14. initialize entities
15. configure P/Q bus
16. call slot keeper
17. Send init complete message to host
18. Report configuration of IOAs to host
19. start processing at main entry

*/

iop$initializer: proc;

/* automatic */


dcl  command         fixed bin (15);
dcl  subchan         fixed bin (15);
dcl  data            fixed bin (31);
dcl  heap_addr       fixed bin (31);
dcl  heap_start      bit (32) aligned defined heap_addr;
dcl  stack_addr      fixed bin (31);
dcl  stack_start     bit (32) aligned defined stack_addr;
dcl  iop_pmbx        bit (32) aligned;
dcl  iop_vmbx        bit (32) aligned;
dcl  i               fixed bin (15);
dcl  code            fixed bin (15);
dcl  prog_pages      fixed bin (15);
dcl  1 access_str    like access_info;

%replace PAGE_SIZE by 4096;
%replace RWLP by 'FC'b4;
%replace RWV  by 'C0'b4;
%replace NULLA by '10'b4;
%replace RSVD_PROM_STACK_SIZE by 1024;        /* used by prom sometimes */

%replace  TRUE      by '1'b;
%replace  FALSE     by '0'b;

/* entries */

dcl  iop$get_esi_ptr               entry() returns( ptr );
dcl  iop$get_sys_conp              entry() returns( ptr );

dcl  iop_entity_initializer        entry();
dcl  iop$init_mapper               entry();
dcl  iop$init_map_table            entry (bit (32) aligned, fixed bin,
                                        fixed bin, fixed bin);
dcl  iop$init_tasking              entry();
dcl  iop$process_diag_command      entry;
dcl  es_init                       entry();
dcl  init_dma                      entry();
dcl  init_dump_list                entry();
```

```
dcl  iop$set_interval_timer          entry (fixed dec (15));
dcl  iop$clear_command_pending       entry;
dcl  iop$command_pending             entry returns (bit (1) aligned);
dcl  iop$read_command                entry (fixed bin (15), fixed bin (15),
                                            fixed bin (31));
dcl  iop$configure_timer             entry (fixed dec (15));
dcl  iop$set_os_interrupt_vector     entry (fixed bin (15));
dcl  s$$define_area                  entry (ptr, fixed bin (31), fixed bin (15));
dcl  iop$init_main         entry (fixed bin (31));
dcl  iop$init_scanner      entry ();
dcl  iop$configure_bus     entry (fixec bin);
dcl  iop$slot_keeper       entry ();


/* external */

dcl  iop$release_name      char(32) ext static;
dcl  iop$prom_stack_storage_size fixec bin (15) external static;
dcl  iop$heap_ptr          ptr ext static;
dcl  iop$heap_pages        fixed bin (15) external static;
dcl  iop$cono              ptr external static;
dcl  iop$esip              ptr external static;

dcl  iop$stack_pages       fixed bin (15) external static;
dcl  iop$stack_end         fixed bin (31) external static;
dcl  iop$mem_pages         fixed bin (15) external static;
dcl  iop$program_end       fixed bin (31) external static;
dcl  iop$jiffy_never       fixed dec (15) external static;

/* include */

/* %nolist; %include 'iop_constants';      % */list;
/* Begin include file . . . . . iop_constants.incl.pl1 */

%replace IOA_CLOCK_CHANNEL_NO by 2;
%replace TERM_SLOT_1          by 14;
%replace TERM_SLOT_2          by 15;

%replace MAX_IOP_INTERRUPT_LEVEL by 8;
%replace MAX_IOP_BACKGROUND_PRIORITY by 8;

%replace MASK_ALL_INTS by 7;
%replace ALLOW_TIMER_INTERRUPTS by 5;
%replace ALLOW_IOA_INTERRUPTS by 4;

%replace JIFFIES_PER_SECOND by 65536;

%replace ES_ENTITY by 0;
%replace ES_CHANNEL by 0;
%replace NON_ENTITY by -1;
%replace NONE by -1;

%replace START_ADAPT_MEM by 12582912;   /* 12M or C00000x */

/* End include file . . . . . iop_constants.incl.pl1 */

/* %nolist; %include 'iop_equip_table';    %li */st;
/*  ***begin copyright*** ******************************  */
/*                                                        */
/*  STRATUS CONFIDENTIAL INFORMATION: CLASS II            */
/*  COPYRIGHT (c) Stratus Computer, Inc. 1985             */
/*                                                        */
/*  This program contains conficential and proprietary    */
/*  information of Stratus Computer, Inc., and any        */
/*  reproduction, disclosure, or use in whole or in part  */
/*  is expressly prohibited, except as may be             */
/*  specifically authorized by prior written agreement or */
/*  permission of Stratus.                                */
/*                                                        */
/*  ***end copyright*** ********************************  */
/*  Begin include file iop_equip_table.incl.pl1           */

dcl  equip_table$            ptr external static;
dcl  equip_tablep            ptr;
```

```
%replace  MAX_ENTITIES          by    8;
%replace  NUM_OF_SLOTS          by    13;  /* 0-13 */
%replace  MAX_CHANNELS          by    512;

dcl 1 stat_tpl based,
          4 alive                bit (1),           /* 1 = alive, 0 = broken */
          4 initialized          bit (1),
          4 testing              bit (1),           /* 1 = yes, 0 = no */
          4 loading              bit (1),
          4 running              bit (1),
          4 prom_start           bit (1),
          4 exception            bit (1),
          4 burning_prom         bit (1),
          4 broken               bit (1),           /* cannot be made alive */
          4 pad                  bit (23);

dcl 1 entity_tpl based,
          4 e_ptr                ptr,
          4 e_fb15               fixed bin (15);

dcl  1 equip_table              based (equip_tablep),
       2 slot (0:NUM_OF_SLOTS),
         3 entity               fixed bin (15),     /* associated entity or -1 */
         3 adapt_type           fixed bin (15),     /* 1-255, see below */
         3 priority             fixed bin (15),     /* 1-25, see below */
         3 status like stat_tpl,
         3 entity_data like entity_tpl,
       2 entity (1:MAX_ENTITIES),
         3 type                 fixed bin (15),
         3 status like stat_tpl,
         3 entity_data like entity_tpl,
         3 cmd_entry            entry (fixed bin (15), fixed bin (15),
                                       fixed bin (15), fixed bin (31),
                                       fixed bin (31)),
         3 config_entry         entry (fixed bin (15), bit (16) aligned,
                                       fixed bin (31),
                                       fixed bin (31), fixed bin (31)),
         3 slot_entry           entry (fixed bin (15), fixed bin (15)),
       2 channel (1:MAX_CHANNELS),
         3 entity               fixed bin (15),
         3 owner                fixed bin (15),
         3 limit                fixed bin (15),
         3 status like stat_tpl,
         3 entity_data like entity_tpl,
       2 slot_prom_rev(0:NUM_OF_SLOTS) fixed bin (15);

/*  range constants for the field 'priority'                 */

%replace  MIN_PRIORITY          by    1;
%replace  DEFAULT_PRIORITY      by    256;
%replace  MAX_PRIORITY          by    256;
/* standard entity IDs */

%replace IOP_DISK_ENTITY_ID by 1;
%replace IOP_COMM_ENTITY_ID by 2;
%replace IOP_CTAPE_ENTITY_ID by 3;

%replace IOP_TEST_ENTITY_ID by 8;


/*  End include file iop_equip_table.incl.pl1                */

/* %nolist; %include 'iop_command_codes';  %list */;
/* Begin include file . . . . . iop_command_codes.incl.pl1 */

/* Basic io command to a iop */

%replace  IOP_COMMAND_NOP              by 240;
%replace  IOP_COMMAND_OLD_NOP          by 0;
%replace  IOP_COMMAND_SYNC_ALONE       by 241;
%replace  IOP_COMMAND_SYNC_PART        by 242;
%replace  IOP_COMMAND_LOAD_PAGE        by 243;
%replace  IOP_COMMAND_DUMP_PAGE        by 244;
%replace  IOP_COMMAND_EXEC_RAM         by 245;
```

```
%replace  IOP_COMMAND_EXEC_SET_MBXP by 246;
%replace  IOP_COMMAND_GOTO_ADDR      by 247;
%replace  IOP_COMMAND_RUN_ALONE      by 248;

%replace  IOP_COMMAND_SET_MBXP       by 235;        /* Obsolete */
%replace  IOP_COMMAND_IDLE           by 236;
%replace  IOP_COMMAND_PREPARE_SYNC   by 237;
%replace  IOP_COMMAND_CANCEL_SYNC    by 238;
%replace  IOP_COMMAND_RESTART        by 239;

%replace  IOP_COMMAND_DIAG_MIN       by 32;
%replace  IOP_COMMAND_DIAG_MAX       by 63;

/* codes used by generic iop driver */

%replace  FIRST_IOP_DRIVER_COMMAND       by 64;

%replace  IOP_COMMAND_OPEN               by 64;
%replace  IOP_COMMAND_CLOSE              by 65;
%replace  IOP_COMMAND_CONTROL            by 66;
%replace  IOP_COMMAND_READ               by 67;
%replace  IOP_COMMAND_WRITE              by 68;
%replace  IOP_COMMAND_READ_BUFFER_FREE   by 69;
%replace  IOP_COMMAND_NEED_WRITE_BUFFER  by 70;

%replace  LAST_IOP_DRIVER_COMMAND        by 70;

%replace  IOP_PROCESS_COMMAND_RING       by 71;

/* Codes used for adding iop's */
/* The first two must match the same constants in comm_command_codes! */

%replace  ADDING_LONER         by 1;
%replace  ADDING_PARTNER       by 2;

/* End include file . . . . . iop_command_codes.incl.pl1 */
/* %nolist; %include 'iop_mapper_calls';   %lis */t;
/* Begin include file . . . . . iop_mapper_calls.incl.pl1 */

dcl  iop$map_x_pages           entry (fixed bin (15), bit (32) aligned,
                                      fixed bin (15), fixed bin (15),
                                      bit (32) alignep, fixed bin (15));

dcl  iop$free_x_map_pages      entry (fixed bin (15), bit (32) aligned,
                                      fixed bin (15), fixed bin (15));

dcl  1 access_info             based,
       2 version               fixed bin (15), /* = 1 */
       2 flag,
         3 read_access         bit (1),  /* 1 = yes, 0 = no */
         3 write_access        bit (1),  /* 1 = yes, 0 = no */
         3 priv_access         bit (1),  /* 1 = yes, 0 = no */
         3 local_memory        bit (1),  /* 1 = local, 0 = main(vos) */
         3 inter_lock          bit (1),  /* 1 = yes, 0 = no */
         3 io_st_bus           bit (1),  /* 1 = yes, 0 = no */
         3 dma                 bit (1),  /* 1 = yes, 0 = no */
         3 unused              bit (9);

%replace  ACCESS_INFO_VERSION_1    by   1;


/* End include file . . . . . iop_mapper_calls.incl.pl1 */
/* %nolist; %include 'iop_utility_calls';  %list */;
/* Begin include file . . . . . iop_utility_calls.incl.pl1 */

dcl  iop$allocate entry (fixed bin (31), char (2) aligned) returns (ptr);
dcl  iop$free entry (ptr, char (2) aligned);

dcl  iop$get_level entry  returns (fixed bin (15));
dcl  iop$set_level entry (fixed bin (15));

dcl  iop$syserr_code entry (char (80) varying, fixed bin (15), fixed bin(15));
dcl  iop$panic_syserr entry (char (80) varying);
```

```
dcl  iop$read_time   entry returns (fixed bin (31));
dcl  iop$delta_time  entry (fixed bin (31)) returns (fixed bin (31));

dcl  bin_to_char     entry (fixed bin (31)) returns (character (13) varying);
dcl  char_to_bin     entry (character (13) varying) returns (fixed bin (31));

dcl  iop$set_slot_priority entry (fixed bin (15), fixed bin (15),
                                  fixed bin (15));

/* End include file . . . . . iop_utility_calls.incl.pl1 */
/* %nolist; %include 'iop_meters'; */  %list;
/* Begin include file . . . . . iop_meters.incl.pl1 */

dcl  iop$mtrp                              ptr external static;
dcl  mtrp                                  ptr;

dcl  iop$emtrp                             ptr external static;
dcl  emtrp                                 ptr;

/* meters 1 - 3 are reserved for standard meters */
/* meter 4 is unused currently */
%replace  SYSERR_MTR                  by   5;
%replace  FAILED_SYSERR_MTR           by   6;
%replace  BGND_MTR                    by   7;
%replace  BGND_TIME_MTR               by   8;
%replace  TIMER_MTR                   by   9;
%replace  TIMER_TIME_MTR              by   10;
%replace  DMA_MTR                     by   11;
%replace  DMA_BYTE_MTR                by   12;
%replace  DMA_TIME_MTR                by   13;
%replace  CMD_SEND_MTR                by   14;
%replace  CMD_RECV_MTR                by   15;
%replace  CMD_HOST_BUSY_MTR           by   16;
%replace  OBSOLETE_1                  by   17;  /* OBSOLETE MAY BE REUSED */
%replace  INTERRUPT_MTR               by   18;

/* meters 18 - 32 are currently undefined */

%replace  MAX_IOP_MTR                 by   32;

/* entity meters collected by the ES */

%replace  ENT_CMD_CALL_MTR            by   1;
%replace  ENT_CMD_TIME_MTR            by   2;
%replace  ENT_CMD_MAX_MTR             by   3;
%replace  ENT_BGND_MAX_MTR            by   4;
%replace  ENT_BGND_TIME_MTR           by   5;
%replace  ENT_BGND_CALLS_MTR          by   6;
%replace  ENT_TIMER_MAX_MTR           by   7;
%replace  ENT_TIMER_TIME_MTR          by   8;
%replace  ENT_TIMER_CALLS_MTR         by   9;
%replace  ENT_INT_CALL_MTR            by   10;
%replace  ENT_INT_TIME_MTR            by   11;
%replace  ENT_INT_MAX_MTR             by   12;

/* meters 13 - 16 are available */

%replace  MAX_ENT_MTR                 by   16;

dcl iop_meters (MAX_IOP_MTR)       fixed bin (31) based (mtrp);
dcl entity_meters (0:MAX_ENTITIES, MAX_ENT_MTR)    fixed bin (31) based (emtrp);

/* End include file . . . . . iop_meters.incl.pl1 */
/* %nolist; %include 'iop_mailbox'; */ %list;
/* Begin include file . . . . . iop_mailbox.incl.pl1 */

dcl  iop$mailbox_addr    ptr external static;
dcl  iop$vos_ringp       ptr external static;
dcl  iop$iop_ringp       ptr external static;
dcl  iop$syserr_ringp    ptr external static;

dcl  iop_mbxp            ptr;
dcl  syserr_ringp        ptr;
```

```
dcl  ring_cmdp              ptr;
dcl  vos_ringp              ptr;
dcl  iop_ringp              ptr;

%replace IOP_RING_SIZE    by   32;
%replace IOP_SYSERR_SIZE  by   16;

%replace IOP_ON_LINE            by   0;
%replace IOP_INITIALIZING       by  -1;
%replace IOP_FAILED_TO_INIT     by  -2;
%replace IOP_EXEC_OUT_OF_PROM   by  -3;

%replace IOP_MEX_ID        by '*IOPMEX*';

dcl 1 iop_mbx               based (iop_mbxp),
    2 id                    char (8),
    2 status,                                    /* set by IOP */
      3 ring_syserr         bit(1),
      3 pad                 bit(7),

    2 vector                fixed bin (15),
    2 idle_status           fixed bin (15),
    2 save_time             fixed dec (15),

    2 lock_address          fixed bin (31),      /* Board loop-lock addr */
    2 syserr_msg            char (80) var,

    2 flags,                                     /* Set by VOS for VOS */
      3 vos_seen_syserr         bit (1),
      3 dumping_syserr_ring     bit (1),
      3 pad                     bit(14),

    2 syserr_ringp          ptr,                 /* ptr to syserr ring */
    2 syserr_ring_addr      bit (32) aligned,    /* abs addr of syerr ring */
    2 syserr_size           fixed bin (15),      /* number of syserr ring */

    2 input_msg             char (80) var,
    2 output_msg            char (80) var,

    2 iop_head              fixed bin (15),      /* to iop ring head */
    2 iop_tail              fixed bin (15),      /* to iop ring tail */
    2 iop_ringp             ptr,                 /* ptr to to iop ring */
    2 iop_ring_addr         bit (32) aligned,    /* abs addr of to iop ring */

    2 iop_ring_size         fixed bin(15),

    2 vos_head              fixed bin (15),      /* iop to vos ring */
    2 vos_tail              fixed bin (15),
    2 vos_ringp             ptr,
    2 vos_ring_addr         bit (32) aligned,
    2 vos_ring_size         fixed bin(15),
    2 global_state          fixed bin (31),      /* state -1 uninit, 0 - normal
                                                       ^= 0/-1 error code (2) */

    2 pbus_status           like berr_mc.p_status,
    2 terminator_status,
      3 no_fan_fault bit (1),
      3 no_sync_fault bit (1),
      3 no_bulk_fault bit (1),
      3 no_volt_fault bit (1),
      3 other_enema_good bit (1),
      3 power_state bit (3),
      3 pad          bit (7);


dcl 1 iop_syserr_ring (IOP_SYSERR_SIZE) based(syserr_ringp),
     2 free bit(1) aligned,
     2 syserr_code fixed bin (15),
     2 msg char (80) varying;
dcl 1 ring_cmd              based(ring_cmdp),
        2 free                 bit (1),
        2 pad                  bit (7),
        2 channel              fixed bin (15),
        2 command              fixed bin (15),
        2 data_16_1            fixed bin (15),
```

```
        2 data_32_1             fixed bin (31),
        2 data_32_2             fixed bin (31);

dcl 1 iop_ring (0:IOP_RING_SIZE-1) based (iop_ringp) like ring_cmd;

dcl 1 vos_ring (0:IOP_RING_SIZE-1) based (vos_ringp) like ring_cmd;

/* values for iop_mbx.idle_status */

%replace IDLE_STATUS_INIT           by 0;
%replace IDLE_STATUS_COMPLETE       by 1;
%replace IDLE_STATUS_REJECT         by 2;
%replace IDLE_STATUS_WAIT           by 3;


/* End include file . . . . . iop_mailbox.incl.pl1 */

/* %nolist; %include 'iop_tasking_calls';  %list */;
/* Begin include file . . . . . iop_tasking_calls.incl.pl1 */

dcl  iop$queue_background_callback entry (entry, fixed bin (31), fixed bin(15),
     fixed bin (15), fixed bin (15));

dcl  iop$queue_timer_callback      entry (entry, fixed bin (31), fixed bin(31),
     fixed bin (15), fixed bin (31), fixed bin(15));

dcl  iop$revoke_timer_callback     entry (fixed bin(31), fixed bin(15));

/* End include file . . . . . iop_tasking_calls.incl.pl1 */
/* %nolist; %include 'iop_prom_cfg'; */%list;
/*        Initial boot configuration table.
          --------------------------------
     This structure will remain in the iop just above the iop's stack.
*/

/*   sys_conp = sys_conp$   */
dcl  sys_conp                ptr;

dcl  1 sys_mon               based( sys_conp ),
       2 slot                fixed bin(15), /* IOA chassis slot */
       2 flags,
         3 mbz               bit(14),
         3 rd_in_prog        bit(1),        /* START_READ in progress */
         3 cfg               bit(1),        /* Console configured */
       2 com_mbxp            ptr,           /* Pointer to vos comm mailbox */
       2 ioa_mbxp            ptr,           /* Pointer to ioa's mailbox */
       2 f_char              fixed bin(15), /* f_char in data; OLD:Channel state */
       2 count               fixed bin(15), /* number of characters being output */
       2 ucode_rev           fixed bin(15), /* Prom code revision level */
       2 model               char(4),       /* Board id. */
       2 io_lock             ptr,           /* Board interlock pointer. */
       2 io_blockp           ptr;           /* Pointer to vos-bound io_block */

/*   bcp = bcp$; */
/*   bdcbp = boot disk control block pointer    */
dcl  bootp                   ptr;
dcl  1 boot_disk             based( bdcbp ),
       2 slot                fixed bin(15),
       2 flags,
         3 mbz               bit(14),
         3 io_in_prog        bit(1),
         3 cfg               bit(1),
       2 disk_mbxp           ptr,
       2 virt_ptr            ptr,
       2 io_lock             fixed bin(31),
       2 state               fixed bin(15),
       2 ucode_rev           fixed bin(15),
       2 model               char(4);

/* IOP ES to PROM interface info. */
dcl  esip                    ptr;      /* Ptr to es interface structure. */

%replace  MIN_INT            by 1;
%replace  MAX_INT            by 16;
```

```
%replace  ES_VECX          by 16;

dcl  1 es                  based( esip ),
       2 running           bit(1) aligned,
       2 callback          entry( entry, fixed bin(31), fixed bin(31),
                                  fixed bin(15), fixed bin(31),
                                  fixed bin(15) ) variable,
       2 revoke_call       entry( fixed bin(31), fixed bin(15) ) variable,
       2 reset_list(0:15)     bit(1),
       2 vec(MAX_INT),
         3 number          fixed bin(15),
         3 pending         bit(1) aligned,
       2 next_vec          fixed bin(15),
       2 prom_mbxp         ptr,             /* Pointer to iop_prom_mbx */
       2 dump_listp        ptr,             /* Pointer to iop dump table */
       2 dump_list_ix      fixed bin(15), /* Next dump list entry index */
       2 dump_page_cnt     fixed bin(15), /* Index for multiple dump pages */
       2 last_used         fixed bin(15), /* Last dump list entry used. */
       2 dump_checksum     fixed bin(15), /* Dump list checksum. */
       2 syserr_wrt        entry( fixed bin(31) ),
       2 syserr_rd         entry( fixed bin(31) );
/* %nolist; %include 'disk_cmds'; */   %list;
/* Begin include file ... disk_cmds.in  80-08-10 */

/* Controller commands */

%replace START_DRIVE_CMD       by  128;  /* 80x */
%replace KILL_CUR_LIST_CMD     by  144;  /* 90x */
%replace RESTART_DRIVE_CMD     by    0;  /* Restart same list addr */
%replace BOOT_FROM_DRIVE_CMD   by    1;
%replace RUN_SELF_TEST_CMD     by    2;
%replace ADD_MAILBOX           by  160;  /* a0x for D114's */
%replace DELETE_MAILBOX        by  161;  /* a1x for D114's */

/* List commands */

/* ***** WARNING:  You MUST change init_disk_data if you add new commands
                   to this list.                              ************** */

%replace READ_DEFECT           by  32;   /* Data Xfer */
%replace VERIFY_CMD            by  33;
%replace READ_HDR_CMD          by  34;
%replace FORMAT_CMD            by  35;

%replace READ_CMD              by  36;
%replace WRITE_CMD             by  37;
%replace READ_BIG_CMD          by  38;
%replace WRITE_BIG_CMD         by  39;


%replace WRITE_VERIFY_CMD      by  50;    /* IOP write verify */
%replace ADD_GEOMETRY_CMD      by  51;    /* IOP add disk geometry */

%replace SEEK_CMD              by 132;   /* Seek */

/* Control commands set "ready" bit in summary status byte */

%replace JUMP_CMD              by  64;   /* Control */
%replace SET_INT_NO_CMD        by  65;
%replace HALT_CMD              by  66;
%replace WAIT_CMD              by  67;
%replace RESET_DRIVE_CMD       by  68;
%replace RESET_INT_NO_CMD      by  69;
%replace FIND_PRESENT_DRIVE    by  70;    /* also sets "drive_exists" */
%replace DIAG_SEEK_1_CMD       by  71;

%replace SOFT_RESET_CMD        by 128;
%replace SEG_UP_CMD            by 129;    /* Control */
%replace SEG_DOWN_CMD          by 130;
%replace RESTORE_CMD           by 131;
%replace RESET_FAULT_CMD       by 133;
%replace SET_CYL_CMD           by 134;
%replace DIAG_SEEK_2_CMD       by 135;
```

```
                                                        /* Following only on D107/D106 */
%replace SET_RED_LIGHT_CMD        by 16;
%replace CLR_RED_LIGHT_CMD        by 17;
%replace SET_BLB_CMD              by 18;                /* Buffer Loop Back */
%replace GET_EXT_STATUS_CMD       by 19;
%replace RESET_BLB_CMD            by 20;                /* Buffer Loop Back */
%replace SET_PWHM_CMD             by 21;                /* Post-Write Header Match */
%replace RESET_PWHM_CMD           by 22;
%replace RELOAD_ADAPTER_CMD       by 23;
%replace READ_ADAPTER_PROM_CMD       by 43;  /* read id prom in disk director */

/* End include file ... disk_cmds.in */

%page;
/* ========================================================= */

/* Check configuration values */

      code = 0;
      prog_pages = divide (iop$program_end + 4095, 4096, 15, 0);

      if ((prog_pages + iop$heap_pages + iop$stack_pages) > iop$mem_pages)
      then do;
            iop$heap_ptr = null();
            code = 1;
            end;
      else do;

/* Set up heap */

            if iop$heap_pages = 0
            then iop$heap_ptr = null ();
            else do;
                  heap_addr = prog_pages * PAGE_SIZE;
                  iop$heap_ptr = ptr (heap_addr);

                  access_str.version = ACCESS_INFO_VERSION_1;
                  string(access_str.flag) = RWLP;

                  call iop$init_map_table(heap_start, iop$heap_pages,
                                    access_str.version, code);

                  call s$$define_area (iop$heap_ptr, iop$heap_pages * 4096, code);
                  if code ^= 0
                  then iop$heap_ptr = null ();
                  end;
                  end;

/*  initialize the stack with the configured number of pages*/

      stack_addr = (iop$mem_pages  - iop$stack_pages) * PAGE_SIZE;

      call iop$init_map_table(stack_start, iop$stack_pages,
                              access_str.version, code);

/*  initialize the map code */

      call iop$init_mapper;

      iop_mrxc = null ();
      iop$esip = iop$get_esi_ptr();
      esip = iop$esip;
      iop$conp = iop$get_sys_conp();
      sys_conp = iop$conp;

      call iop$set_level(MASK_ALL_INTS); /* mask all except debug */

/* wait for command set mailbox command from host */

loop:
      do while (^iop$command_pending ());
      end;

      call iop$read_command (command, subchan, data);
```

```
    if command = IOP_COMMAND_EXEC_SET_MBXP | command = IOP_COMMAND_SET_MBXP
    then do;
         code = 0;
         access_str.version = ACCESS_INFO_VERSION_1;
         string(access_str.flag) = RWV;

         iop_pmbx  = bit(unspec (data), 32);
         call iop$map_x_pages(ES_CHANNEL,iop_pmbx, access_str.version,
                              1, iop_vmbx,code);
                                                   /* ignore error code */
         iop$mailbox_addr = ptr(bin (iop_vmbx, 31));
         iop_mbxp = iop$mailbox_addr;
         call iop$clear_command_pending;
         end;
    else do;
         if command = START_DRIVE_CMD | command = 42 |
            command = 43                              /* 42 43 *** HACK ALERT */
         then call iop$process_diag_command;
         else do;
              call iop$process_diag_command;
              call iop$clear_command_pending;
              end;
         end;
    if iop_mbxp = null ()
    then go to loop;

/* SET_MBX and following NOP command have been done, ready to start. */

/* setup interrupt vector for host interrupts */

     es.vec(ES_VECX).number = iop_mbx.vector;

/* setup rings */

     if iop_mbx.syserr_size ^= IOP_SYSERR_SIZE |
        iop_mbx.vos_ring_size ^= IOP_RING_SIZE |
        iop_mbx.iop_ring_size ^= IOP_RING_SIZE
          then call iop$panic_syserr('INIT - invalid ring size');
     call iop$map_x_pages(ES_CHANNEL, iop_mbx.vos_ring_addr,
                          access_str.version, 1, iop_vmbx, code);
     iop$vos_ringp = ptr(bin (iop_vmbx, 31));
     call iop$map_x_pages(ES_CHANNEL, iop_mbx.iop_ring_addr,
                          access_str.version, 1, iop_vmbx, code);
     iop$iop_ringp = ptr(bin (iop_vmbx, 31));
     call iop$map_x_pages(ES_CHANNEL, iop_mbx.syserr_ring_addr,
                          access_str.version, 1, iop_vmbx,  code);
     iop$syserr_ringp = ptr(bin (iop_vmbx, 31));

/* init meters */

     iop$mtrp = iop$allocate(size(iop_meters), 'IM');
     if iop$mtrp = null()
          then call iop$panic_syserr('INIT - cannot allocate meter block');
     else do;
          mtrp = iop$mtrp;
          do i = 1 to MAX_IOP_MTR;
               iop_meters(i) = 0;
               end;
          end;

     iop$emtrp = iop$allocate(size(entity_meters), 'IM');
     if iop$emtrp = null()
          then call iop$panic_syserr('INIT - cannot allocate entity meter block');

/* allocate equipment table */

     equip_tablep$ = iop$allocate(size(equip_table), 'ET');
     if equip_tablep$ = null()
     then call iop$panic_syserr('INIT cannot allocate equipment table.');

/* init dump list now before any interesting stuff */
     call init_dump_list;

/* init tasking storage */
```

```
     call iop$init_tasking;

/* initialize the timer chip */

     call iop$configure_timer (0);
     call iop$set_interval_timer (iop$jiffy_never);

/* initialize dma */

     call init_dma;

/* initialize the environmental software and null out equip_table */

     call es_init;

/*   initialize entities */

     call iop_entity_initializer;


/* configure p/q bus, take survey of adapters and there status, store
     it in equip_table  */

     call iop$configure_bus (code);

/* ignore error code */

/*  add code to assign priority (1-25) to each adapter in equip_table from
    configuration file or depending on adapter type */

/* initialize scanner list based on info from equip_table */

     call iop$init_scanner;

     call iop$slot_keeper;

/* Setup es interface structure for prom so that es services are available
   to the eeprom.
*/
     es.callback = iop$queue_timer_callback;
     es.revoke_call = iop$revoke_timer_callback;
     es.running = TRUE;

/*   Cancel the single character io read in progress.  This is since we are
     switching to io_block console io. */
     sys_mon.flags.rd_in_prog = FALSE;

/* begin to run normally */

     iop_mbx.global_state = IOP_ON_LINE;

/* initialization is complete tell host */

     call iop$syserr_code(rtrim(iop$release_name) ||
          ' - initialization complete.', 0, code);
     if code ^= 0
          then call iop$panic_syserr('INIT: Unable to send syserr. code =' ||
                                     bin_to_char((code)));

     stack_addr = (iop$mem_pages * PAGE_SIZE) - iop$prom_stack_storage_size;
     iop$stack_end = stack_addr;
     call iop$init_main(stack_addr);    /* Charlie (never returns) */

end iop$initializer;
/* ***begin copyright*** ***********************************/
/*                                                          */
/* STRATUS CONFIDENTIAL INFORMATION                         */
/* COPYRIGHT (c) Stratus Computer, Inc. 1985                */
/*                                                          */
/* This  program  contains  confidential and proprietary */
/* information  of  Stratus Computer,  Inc.,   and   any */
/* reproduction,  disclosure, or use in whole or in part */
/* is   expressly   prohibited,   except   as   may   be */
/* specifically authorized by prior written agreement or */
```

```
/* permission of Stratus.                                              */
/*                                                                     */
/* ***end copyright*** ***********************************************/

/* IOP_INTERRUPT_HANDLER: This module sits at virtual
/* address 0, to handle faults and interrupts
/* Beginning of modification history
/* Modified 86-03-20 by Pradip Gosalia to change interrupt levels
/* Modified 86-03-27 by Martin Stokoe to support MC68010
/* Modified 86-04-02 by Tom Moser to merge divergent iop_interrupt_handlers
/* Modified 86-09-16 by Tom Moser to change initial code to not reset SP
/* Modified 86-09-18 by Martin Stokoe to support watchdog timer
/* Modified 86-10-06 by Tom Moser to add bus error handler
/* Modified 87-03-02 by Tom Moser for more bus error stuff
/* Modified 87-04-16 by Tom Moser to change berr log args
/* Modified 87-06-01 by Tom Moser to check for pbus errors when accessing
/*   control page
/* End of modification history

      extdat      iop$memory
      extdat      iop$begin_interrupt_handler

      eject
/*       incl       'iop _mc'
/* Begin include file ...iop_mc.incl.asm
/* Generated at 87-05-11 12:40:27 EDT by cv_incl Release 6.alpha.g from
/*     %es#m6>Stratus>Tom_Moser>iop>install>ldc>iop_mc.incl.pl1.

      use         'mc',dummy
mc:
mc.identifier:                                                  ds.b 4
mc.berr_type_code:                                              ds.b 2
mc.bdcs:
mc.bdcs.bdcs_broken.byte:
      equ         mc.bdcs.bdcs_broken.bit,15
      equ         mc.bdcs.bdcs_broken.mask,'8000'b4
mc.bdcs.bdcs_broken2.byte:
      equ         mc.bdcs.bdcs_broken2.bit,14
      equ         mc.bdcs.bdcs_broken2.mask,'4000'b4
mc.bdcs.bdcs_mempar.byte:
      equ         mc.bdcs.bdcs_mempar.bit,13
      equ         mc.bdcs.bdcs_mempar.mask,'2000'b4
mc.bdcs.bdcs_memcomp.byte:
      equ         mc.bdcs.bdcs_memcomp.bit,12
      equ         mc.bdcs.bdcs_memcomp.mask,'1000'b4
mc.bdcs.bdcs_timask.byte:
      equ         mc.bdcs.bdcs_timask.bit,11
      equ         mc.bdcs.bdcs_timask.mask,'0800'b4
mc.bdcs.bdcs_pkcomp.byte:
      equ         mc.bdcs.bdcs_pkcomp.bit,10
      equ         mc.bdcs.bdcs_pkcomp.mask,'0400'b4
mc.bdcs.bdcs_cmdpend.byte:
      equ         mc.bdcs.bdcs_cmdpend.bit,9
      equ         mc.bdcs.bdcs_cmdpend.mask,'0200'b4
mc.bdcs.bdcs_statchg.byte:
      equ         mc.bdcs.bdcs_statchg.bit,8
      equ         mc.bdcs.bdcs_statchg.mask,'0100'b4
                                                                 ds.b 1
mc.bdcs.bdcs_side.byte:
      equ         mc.bdcs.bdcs_side.bit,7
      equ         mc.bdcs.bdcs_side.mask,'0080'b4
mc.bdcs.bdcs_ipend.byte:
      equ         mc.bdcs.bdcs_ipend.bit,6
      equ         mc.bdcs.bdcs_ipend.mask,'0040'b4
mc.bdcs.bdcs_partner.byte:
      equ         mc.bdcs.bdcs_partner.bit,5
      equ         mc.bdcs.bdcs_partner.mask,'0020'b4
mc.bdcs.bdcs_zout_gt.byte:
      equ         mc.bdcs.bdcs_zout_gt.bit,4
      equ         mc.bdcs.bdcs_zout_gt.mask,'0010'b4
mc.bdcs.bdcs_level1.byte:
      equ         mc.bdcs.bdcs_level1.bit,3
      equ         mc.bdcs.bdcs_level1.mask,'0008'b4
mc.bdcs.bdcs_romhigh.byte:
```

```
     equ        mc.bdcs.bdcs_romhigh.bit,2
     equ        mc.bdcs.bdcs_romhigh.mask,'0004'b4
mc.bdcs.bdcs_cmd_mask.byte:
     equ        mc.bdcs.bdcs_cmd_mask.bit,1
     equ        mc.bdcs.bdcs_cmd_mask.mask,'0002'b4
mc.bdcs.bdcs_imask.byte:
     equ        mc.bdcs.bdcs_imask.bit,0
     equ        mc.bdcs.bdcs_imask.mask,'0001'b4
                                                          ds.b 1
     equ        mc.bdcs.length,2
mc.p_status:
mc.p_status.dma_vfy_ok.byte:
     equ        mc.p_status.dma_vfy_ok.bit,15
     equ        mc.p_status.dma_vfy_ok.mask,'8000'b4
mc.p_status.dma_wrt.byte:
     equ        mc.p_status.dma_wrt.bit,14
     equ        mc.p_status.dma_wrt.mask,'4000'b4
mc.p_status.dma_rd.byte:
     equ        mc.p_status.dma_rd.bit,13
     equ        mc.p_status.dma_rd.mask,'2000'b4
mc.p_status.scan_int.byte:
     equ        mc.p_status.scan_int.bit,12
     equ        mc.p_status.scan_int.mask,'1000'b4
mc.p_status.scan_up_L.byte:
     equ        mc.p_status.scan_up_L.bit,11
     equ        mc.p_status.scan_up_L.mask,'0800'b4
mc.p_status.pbus_force.byte:
     equ        mc.p_status.pbus_force.bit,10
     equ        mc.p_status.pbus_force.mask,'0400'b4
mc.p_status.pside_enb.byte:
     equ        mc.p_status.pside_enb.bit,9
     equ        mc.p_status.pside_enb.mask,'0200'b4
mc.p_status.cside_enb.byte:
     equ        mc.p_status.cside_enb.bit,8
     equ        mc.p_status.cside_enb.mask,'0100'b4
                                                          ds.b 1
mc.p_status.pbus_diag.byte:
     equ        mc.p_status.pbus_diag.bit,7
     equ        mc.p_status.pbus_diag.mask,'0080'b4
mc.p_status.pbus_obey_er.byte:
     equ        mc.p_status.pbus_obey_er.bit,6
     equ        mc.p_status.pbus_obey_er.mask,'0040'b4
mc.p_status.pbus_sel_er.byte:
     equ        mc.p_status.pbus_sel_er.bit,5
     equ        mc.p_status.pbus_sel_er.mask,'0020'b4
mc.p_status.pbus_berr_en.byte:
     equ        mc.p_status.pbus_berr_en.bit,4
     equ        mc.p_status.pbus_berr_en.mask,'0010'b4
mc.p_status.pbus_enb.byte:
     equ        mc.p_status.pbus_enb.bit,3
     equ        mc.p_status.pbus_enb.mask,'0008'b4
mc.p_status.pbus_lock.byte:
     equ        mc.p_status.pbus_lock.bit,2
     equ        mc.p_status.pbus_lock.mask,'0004'b4
mc.p_status.obey_p.byte:
     equ        mc.p_status.obey_p.bit,1
     equ        mc.p_status.obey_p.mask,'0002'b4
mc.p_status.obey_q.byte:
     equ        mc.p_status.obey_q.bit,0
     equ        mc.p_status.obey_q.mask,'0001'b4
                                                          ds.b 1
     equ        mc.p_status.length,2
mc.ica_slot:                                              ds.b 2
mc.usp:                                                   ds.b 4
mc.d:                                                     ds.b 4
     equ        mc.d.length,4
                                                          ds.b 28
     equ        mc.d.dim,8
mc.a:                                                     ds.b 4
     equ        mc.a.length,4
                                                          ds.b 24
     equ        mc.a.dim,7
mc.int_sr:
                                                          ds.b 2
```

```
mc.status:
                                                        ds.b 2
mc.pc:                                                  ds.b 4
mc.info:
mc.info.extended_fmt.byte:
     equ       mc.info.extended_fmt.bit,15
     equ       mc.info.extended_fmt.mask,'8000'b4
mc.info.mbz:
     equ       mc.info.mbz.bit,12
     equ       mc.info.mbz.mask,'7000'b4
mc.info.vector:
     equ       mc.info.vector.bit,0
     equ       mc.info.vector.mask,'0FFF'b4
                                                        ds.b 2
     equ       mc.info.length,2
     equ       mc.length,86
     use       'code'

     use       'berr_mc',dummy
berr_mc:
berr_mc.identifier:                                     ds.b 4
berr_mc.berr_type_code:                                 ds.b 2
berr_mc.bdcs:
berr_mc.bdcs.bdcs_broken.byte:
     equ       berr_mc.bdcs.bdcs_broken.bit,15
     equ       berr_mc.bdcs.bdcs_broken.mask,'8000'b4
berr_mc.bdcs.bdcs_broken2.byte:
     equ       berr_mc.bdcs.bdcs_broken2.bit,14
     equ       berr_mc.bdcs.bdcs_broken2.mask,'4000'b4
berr_mc.bdcs.bdcs_mempar.byte:
     equ       berr_mc.bdcs.bdcs_mempar.bit,13
     equ       berr_mc.bdcs.bdcs_mempar.mask,'2000'b4
berr_mc.bdcs.bdcs_memcomp.byte:
     equ       berr_mc.bdcs.bdcs_memcomp.bit,12
     equ       berr_mc.bdcs.bdcs_memcomp.mask,'1000'b4
berr_mc.bdcs.bdcs_timask.byte:
     equ       berr_mc.bdcs.bdcs_timask.bit,11
     equ       berr_mc.bdcs.bdcs_timask.mask,'0800'b4
berr_mc.bdcs.bdcs_pkcomp.byte:
     equ       berr_mc.bdcs.bdcs_pkcomp.bit,10
     equ       berr_mc.bdcs.bdcs_pkcomp.mask,'0400'b4
berr_mc.bdcs.bdcs_cmdpend.byte:
     equ       berr_mc.bdcs.bdcs_cmdpend.bit,9
     equ       berr_mc.bdcs.bdcs_cmdpend.mask,'0200'b4
berr_mc.bdcs.bdcs_statchg.byte:
     equ       berr_mc.bdcs.bdcs_statchg.bit,8
     equ       berr_mc.bdcs.bdcs_statchg.mask,'0100'b4
                                                        ds.b 1
berr_mc.bdcs.bdcs_side.byte:
     equ       berr_mc.bdcs.bdcs_side.bit,7
     equ       berr_mc.bdcs.bdcs_side.mask,'0080'b4
berr_mc.bdcs.bdcs_ipend.byte:
     equ       berr_mc.bdcs.bdcs_ipend.bit,6
     equ       berr_mc.bdcs.bdcs_ipend.mask,'0040'b4
berr_mc.bdcs.bdcs_partner.byte:
     equ       berr_mc.bdcs.bdcs_partner.bit,5
     equ       berr_mc.bdcs.bdcs_partner.mask,'0020'b4
berr_mc.bdcs.bdcs_zout_gt.byte:
     equ       berr_mc.bdcs.bdcs_zout_gt.bit,4
     equ       berr_mc.bdcs.bdcs_zout_gt.mask,'0010'b4
berr_mc.bdcs.bdcs_level1.byte:
     equ       berr_mc.bdcs.bdcs_level1.bit,3
     equ       berr_mc.bdcs.bdcs_level1.mask,'0008'b4
berr_mc.bdcs.bdcs_romhigh.byte:
     equ       berr_mc.bdcs.bdcs_romhigh.bit,2
     equ       berr_mc.bdcs.bdcs_romhigh.mask,'0004'b4
berr_mc.bdcs.bdcs_cmd_mask.byte:
     equ       berr_mc.bdcs.bdcs_cmd_mask.bit,1
     equ       berr_mc.bdcs.bdcs_cmd_mask.mask,'0002'b4
berr_mc.bdcs.bdcs_imask.byte:
     equ       berr_mc.bdcs.bdcs_imask.bit,0
     equ       berr_mc.bdcs.bdcs_imask.mask,'0001'b4
                                                        ds.b 1
     equ       berr_mc.bdcs.length,2
```

```
berr_mc.p_status:
berr_mc.p_status.dma_vfy_ok.byte:
     equ       berr_mc.p_status.dma_vfy_ok.bit,15
     equ       berr_mc.p_status.dma_vfy_ok.mask,'8000'b4
berr_mc.p_status.dma_wrt.byte:
     equ       berr_mc.p_status.dma_wrt.bit,14
     equ       berr_mc.p_status.dma_wrt.mask,'4000'b4
berr_mc.p_status.dma_rd.byte:
     equ       berr_mc.p_status.dma_rd.bit,13
     equ       berr_mc.p_status.dma_rd.mask,'2000'b4
berr_mc.p_status.scan_int.byte:
     equ       berr_mc.p_status.scan_int.bit,12
     equ       berr_mc.p_status.scan_int.mask,'1000'b4
berr_mc.p_status.scan_up_L.byte:
     equ       berr_mc.p_status.scan_up_L.bit,11
     equ       berr_mc.p_status.scan_up_L.mask,'0800'b4
berr_mc.p_status.pbus_force.byte:
     equ       berr_mc.p_status.pbus_force.bit,10
     equ       berr_mc.p_status.pbus_force.mask,'0400'b4
berr_mc.p_status.pside_enb.byte:
     equ       berr_mc.p_status.pside_enb.bit,9
     equ       berr_mc.p_status.pside_enb.mask,'0200'b4
berr_mc.p_status.qside_enb.byte:
     equ       berr_mc.p_status.qside_enb.bit,8
     equ       berr_mc.p_status.qside_enb.mask,'0100'b4
                                                              ds.b 1
berr_mc.p_status.pbus_diag.byte:
     equ       berr_mc.p_status.pbus_diag.bit,7
     equ       berr_mc.p_status.pbus_diag.mask,'0080'b4
berr_mc.p_status.pbus_obey_er.byte:
     equ       berr_mc.p_status.pbus_obey_er.bit,6
     equ       berr_mc.p_status.pbus_obey_er.mask,'0040'b4
berr_mc.p_status.pbus_sel_er.byte:
     equ       berr_mc.p_status.pbus_sel_er.bit,5
     equ       berr_mc.p_status.pbus_sel_er.mask,'0020'b4
berr_mc.p_status.pbus_berr_en.byte:
     equ       berr_mc.p_status.pbus_berr_en.bit,4
     equ       berr_mc.p_status.pbus_berr_en.mask,'0010'b4
berr_mc.p_status.pbus_enb.byte:
     equ       berr_mc.p_status.pbus_enb.bit,3
     equ       berr_mc.p_status.pbus_enb.mask,'0008'b4
berr_mc.p_status.pbus_lock.byte:
     equ       berr_mc.p_status.pbus_lock.bit,2
     equ       berr_mc.p_status.pbus_lock.mask,'0004'b4
berr_mc.p_status.obey_p.byte:
     equ       berr_mc.p_status.obey_p.bit,1
     equ       berr_mc.p_status.obey_p.mask,'0002'b4
berr_mc.p_status.obey_q.byte:
     equ       berr_mc.p_status.obey_q.bit,0
     equ       berr_mc.p_status.obey_q.mask,'0001'b4
                                                              ds.b 1
     equ       berr_mc.p_status.length,2
berr_mc.ioa_slot:                                             ds.b 2
berr_mc.usp:                                                  ds.b 4
berr_mc.d:                                                    ds.b 4
     equ       berr_mc.d.length,4
                                                              ds.b 28
     equ       berr_mc.d.dim,8
berr_mc.a:                                                    ds.b 4
     equ       berr_mc.a.length,4
                                                              ds.b 24
     equ       berr_mc.a.dim,7
berr_mc.int_sr:
                                                              ds.b 2
berr_mc.status:
                                                              ds.b 2
berr_mc.pc:                                                   ds.b 4
berr_mc.info:
berr_mc.info.extended_fmt.byte:
     equ       berr_mc.info.extended_fmt.bit,15
     equ       berr_mc.info.extended_fmt.mask,'8000'b4
berr_mc.info.mbz:
     equ       berr_mc.info.mbz.bit,12
     equ       berr_mc.info.mbz.mask,'7000'b4
```

```
berr_mc.info.vector:
     equ        berr_mc.info.vector.bit,0
     equ        berr_mc.info.vector.mask,'0FFF'b4
                                                          ds.b 2
     equ        berr_mc.info.length,2
berr_mc.special_status:
berr_mc.special_status.rerun.byte:
     equ        berr_mc.special_status.rerun.bit,15
     equ        berr_mc.special_status.rerun.mask,'8000'b4
berr_mc.special_status.pad1.byte:
     equ        berr_mc.special_status.pad1.bit,14
     equ        berr_mc.special_status.pad1.mask,'4000'b4
berr_mc.special_status.inst_fetch.byte:
     equ        berr_mc.special_status.inst_fetch.bit,13
     equ        berr_mc.special_status.inst_fetch.mask,'2000'b4
berr_mc.special_status.data_fetch.byte:
     equ        berr_mc.special_status.data_fetch.bit,12
     equ        berr_mc.special_status.data_fetch.mask,'1000'b4
berr_mc.special_status.r_m_w_cycle.byte:
     equ        berr_mc.special_status.r_m_w_cycle.bit,11
     equ        berr_mc.special_status.r_m_w_cycle.mask,'0800'b4
berr_mc.special_status.high_byte.byte:
     equ        berr_mc.special_status.high_byte.bit,10
     equ        berr_mc.special_status.high_byte.mask,'0400'b4
berr_mc.special_status.byte_xfer.byte:
     equ        berr_mc.special_status.byte_xfer.bit,9
     equ        berr_mc.special_status.byte_xfer.mask,'0200'b4
berr_mc.special_status.read.byte:
     equ        berr_mc.special_status.read.bit,8
     equ        berr_mc.special_status.read.mask,'0100'b4
                                                          ds.b 1
berr_mc.special_status.pad2:
     equ        berr_mc.special_status.pad2.bit,3
     equ        berr_mc.special_status.pad2.mask,'00F8'b4
berr_mc.special_status.function_code:
     equ        berr_mc.special_status.function_code.bit,0
     equ        berr_mc.special_status.function_code.mask,'0007'b4
                                                          ds.b 1
     equ        berr_mc.special_status.length,2
berr_mc.fault_addr:                                       ds.b 4
berr_mc.resv_data_out:
                                                          ds.b 2
berr_mc.data_out:
                                                          ds.b 2
berr_mc.resv_data_in:
                                                          ds.b 2
berr_mc.data_in:
                                                          ds.b 2
berr_mc.resv_inst:
                                                          ds.b 2
berr_mc.instruction_reg:
                                                          ds.b 2
berr_mc.internal_info:                                    ds.b 2
     equ        berr_mc.internal_info.length,2
                                                          ds.b 30
     equ        berr_mc.internal_info.dim,15
     equ        berr_mc.length,138
     use        'code'


/* End include file ...icp_mc.incl.asm
     eject
/*       incl       'status_register_ma sks'
/* BEGIN INCLUDE FILE ... status_register_masks.incl.asm
/*
/* Written 810324 by FG
/*
/* This include file exists because the BTST, BSET,
/* and BCLR instructions do not work on the status
/* or condition code register...only the ANDI, ORI,
/* EORI, and MOVE instructions do.

/* OBSOLETE -- see below
```

```
/* The new cv_incl tool produces masks, so use of this file
/* is discouraged in favor of status_register.incl.asm
/* which is updated for new cpu types

     equ       sr.trace,              8000x
     equ       sr.kernel,             2000x
     equ       sr.interrupt_mask,     0700x
     equ       sr.extend,             0010x
     equ       sr.negative,           0008x
     equ       sr.zero,               0004x
     equ       sr.overflow,           0002x
     equ       sr.carry,              0001x

     equ       sr.unused_bits_mask,58E0x

/* END INCLUDE FILE ... status_register_masks.incl.asm
     eject
/*      incl      'fault_co des'
/* Begin include file ...fault_codes.incl.asm
/* Generated at 86-07-14 16:38:28 EDT by cv_incl Release 5ah from
/*      %es#m6>Stratus>Tom_Clark>fresco>68881>incl>fault_codes.incl.pl1.

     equ       UNASSIGNED_VECTOR_0,0
     equ       RESET,1
     equ       PAGE_FAULT,2
     equ       ADDRESS_ERROR,3
     equ       ILLEGAL_INSTRUCTION,4
     equ       ZERO_DIVIDE,5
     equ       CHK_INSTRUCTION,6
     equ       TRAPV_INSTRUCTION,7
     equ       PRIVILEGE_VIOLATION,8
     equ       TRACE,9
     equ       LINE_1010_EMULATOR,10
     equ       LINE_1111_EMULATOR,11
     equ       UNASSIGNED_VECTOR_12,12
     equ       COPROC_PROTOCOL_VIOLATION,13
     equ       FORMAT_ERROR,14
     equ       UNINITIALIZED_INTERRUPT_VECTOR,15
     equ       UNASSIGNED_VECTOR_16,16
     equ       UNASSIGNED_VECTOR_17,17
     equ       UNASSIGNED_VECTOR_18,18
     equ       UNASSIGNED_VECTOR_19,19
     equ       UNASSIGNED_VECTOR_20,20
     equ       UNASSIGNED_VECTOR_21,21
     equ       UNASSIGNED_VECTOR_22,22
     equ       UNASSIGNED_VECTOR_23,23
     equ       SPURIOUS_INTERRUPT,24
     equ       LEVEL_1_AUTOVECTOR,25
     equ       LEVEL_2_AUTOVECTOR,26
     equ       LEVEL_3_AUTOVECTOR,27
     equ       LEVEL_4_AUTOVECTOR,28
     equ       LEVEL_5_AUTOVECTOR,29
     equ       LEVEL_6_AUTOVECTOR,30
     equ       LEVEL_7_AUTOVECTOR,31
     equ       TRAP_0_INSTRUCTION,32
     equ       TRAP_1_INSTRUCTION,33
     equ       TRAP_2_INSTRUCTION,34
     equ       TRAP_3_INSTRUCTION,35
     equ       TRAP_4_INSTRUCTION,36
     equ       TRAP_5_INSTRUCTION,37
     equ       TRAP_6_INSTRUCTION,38
     equ       TRAP_7_INSTRUCTION,39
     equ       TRAP_8_INSTRUCTION,40
     equ       TRAP_9_INSTRUCTION,41
     equ       TRAP_10_INSTRUCTION,42
     equ       TRAP_11_INSTRUCTION,43
     equ       TRAP_12_INSTRUCTION,44
     equ       TRAP_13_INSTRUCTION,45
     equ       TRAP_14_INSTRUCTION,46
     equ       TRAP_15_INSTRUCTION,47
     equ       BRANCH_SET_ON_UNORDERED,48
     equ       INEXACT_RESULT,49
     equ       FP_DIVIDE_BY_ZERO,50
     equ       UNDERFLOW,51
```

```
        equ         OPERAND_ERROR,52
        equ         OVERFLOW,53
        equ         SIGNALLING_NAN,54
        equ         UNASSIGNED_VECTOR_55,55
        equ         UNASSIGNED_VECTOR_56,56
        equ         UNASSIGNED_VECTOR_57,57
        equ         UNASSIGNED_VECTOR_58,58
        equ         UNASSIGNED_VECTOR_59,59
        equ         UNASSIGNED_VECTOR_60,60
        equ         UNASSIGNED_VECTOR_61,61
        equ         UNASSIGNED_VECTOR_62,62
        equ         UNASSIGNED_VECTOR_63,63
        equ         BAD_KERNEL_CALL,64
        equ         PRIVILEGED_CALL,65
        equ         PROGRAM_INTERRUPT,66
        equ         SAP_EXCEPTION,67

/* End include file ...fault_codes.incl.asm
        eject
/*        incl       'iop_hardware_d efs'
/*   +++begin copyright+++ ********************************   */
/*                                                             */
/*   STRATUS CONFIDENTIAL INFORMATION: CLASS II                */
/*   COPYRIGHT (c) Stratus Computer, Inc. 1985                 */
/*                                                             */
/*   This  program  contains  confidential and proprietary     */
/*   information  of  Stratus Computer,  Inc.,   and   any     */
/*   reproduction, disclosure, or use in whole or in part      */
/*   is   expressly   prohibited,   except   as   may   be     */
/*   specifically authorized by prior written agreement or     */
/*   permission of Stratus.                                    */
/*                                                             */
/*   +++end copyright+++ **********************************    */
/*        title      'IOP hardware definitions'

/*   Beginning of modification history.
/* Modified 86-10-31 by Bill Snapper to change prom_hi, map, and certain
/*              virtual address constants to reflect new prom_hi address.
/*   End of modification history.

equ  iop_map_table_start,     005FC000x
equ  offset_user_start,  00003700x         /* '005FC700'b4
equ  offset_user_end,    00002EF4x         /* '005FEEF4'b4; virt page 5BDx

/* Actual table end = 5FEF70x but the last 34 virtual pages have been reserved
/* by the eeprom for primitive io.  Therefore the last virtual address for the
/* OS = 5D7FFFx

/* REMOVED: 11/3/86;  Not used anywhere???
/* equ  offset_table_end,    00002F5Cx          /* '005FEF5C'b4

equ  readable,  '00008000'b4  /* readable page
equ  writeable, '00004000'b4  /* writeable page
equ  priv,      '00002000'b4  /* privileged
equ  local,     '00001000'b4  /* local memory
equ  interlock, '00000800'b4  /* interlock
equ  io_access, '00000400'b4  /* access to vos
equ  dma,       '00000200'b4  /* dma access
equ  spr,       '00000100'b4  /* spare

equ  ioc_map_lower_address,   0007FFFFx
equ  ioc_map_higher_address,  00000000x

equ  OS_BASE,   00200000x  /* offset of OS image in memory
/* Actually 5DF000x but see above note.
equ  VM_STACK,  005D7000x  /* top virtual stack address

equ  ram,       00000000x  /* ram start address
equ  page,      4096
equ  ram_size,  0007FFFFx  /* size of ram is 512 Kbytes

equ  prom_lo,   00000000x  /* rom start address  when low
equ  prom_hi,   005E0000x  /* rom start address  when high
```

```
ecu  set., 'C0008000'b4        /* for setting control bits
ecu  clr., 'C0000000'b4        /* for clearing control bits
ecu  mask.,    clr.            /* for masking interrupts
ecu  unmask..  set.            /* for unmasking interrupts

ecu  iop$sync_sel,  00BF8000x  /* page used for board syncing

ecu  iop$adapt_cmd,  00BF9002x /* adapter local command
ecu  set_cmd., 80x                /* for sending cmd to adapter
     ecu  cmd_reset, 00           /* do reset
     ecu  cmd_clear_int, 01       /* clear interrupt
     ecu  cmd_toggle_obey_p, 02   /* toggle obey p
     equ  cmd_toggle_obey_q, 03   /* toggle obey q
     equ  cmd_clear_broken, 04    /* clear broken
     equ  cmd_set_broken, 05      /* set broken
     ecu  cmd_int_device, 06      /* interrupt device
     ecu  cmd_clear_cpu_reset, 07 /* clear cpu reset

ecu  iop$dma_read,   00BF9004x  /* select adapter for dma read

ecu  iop$dma_write, 00BF9006x  /* select adapter for dma write

ecu  iop$dma_verify, 00BF900Cx /* select adapter for dma verify

ecu  iop$timer_data,00BFA000x   /* timer data register --- read/write
                                /*   never access as a long word

ecu  iop$timer_cont,00BFA002x   /* timer control register ---

ecu  checksum, 00BFA400x    /* read checksum word

ecu  diag_checksum_wrt, 00BFE000x  /* Diagnostic path for testing checksum; wR

     /* P BUS CONTROL WORD */
ecu  iop$pbus_ctrl,     00BFA400x    /* p bus control write

     equ p_bus_enable,  07    /* P bus enable
     ecu p_berr_enable, 06    /* p bus berr enable
     ecu scan_enable,   05    /* enable scanner
     ecu scan_run,      04    /* start scanner
     ecu timer_mask,    03    /* timer mask/clear
     ecu set_level1,    02    /* generate level 1 interrupt
     ecu privL,         01    /* priv
     ecu p_bus_lockL,   00    /* Pbus lock

     /* SCANNER INTERFACE */
ecu  iop$scan_listw,      00BFAC00x   /* spare for write, word access.
ecu  iop$scan_listb,      00BFAC01x   /* through 00BFADFF, odd bytes only!
                                         /* bits 7-4 slot number
                                         /* bits 3-0 TBD
     ecu SCAN_RAM_SIZE,  255             /* 0-255 entries in scan_list

ecu  iop$scan_int_status,  00BFA600x   /* read scanner status register
     ecu adap_alive,       15             /* slot alive
     ecu adap_interrupt, 14               /* adapter interrupt
     ecu adap_obey_p,      13             /* bus obey
     ecu adap_obey_q,      12             /* bus obey
                                          /* bits 11-8 tbd
                                          /* bits 7-4 slot num
                                          /* bits 3-0 tbd

     /* PIO SELECT INTERFACE */
ecu  iop$pio_select, 00BFA801x     /* PIO select address

ecu  iop$bcs,        00BFB000x  /* control / status x --- read
     ecu  bcs_broken,     15    /* read only
     ecu  bcs_broken2,    14    /* read only
     ecu  bcs_member,     13    /* read only, write broken2 to clear
     ecu  bcs_mercomp,    12    /* read only, write broken2 to clear
     ecu  bcs_timask,     11    /* read timer mask
     ecu  bcs_pkcomp,     10    /* self test bit
     ecu  bcs_cmdpend,    09    /* command pending
     ecu  bcs_statchg,    08    /* status change bit
     ecu  bcs_side,       07    /* side 1 if one, 0 if zero, read only
```

```
    equ  bccs_ipend,      06   /* an interrupt req. on sb is pending,
    equ  bccs_partner,    05   /* board can be partnered,
    equ  bdcs_zout_gt,    04   /* read bus protect/enable
    equ  bdcs_level1,     03   /* level1 interrupt
    equ  bdcs_romhigh,    02   /* rom is high, read, set, clear
    equ  bdcs_cmd_mask,   01   /* int mask for commands (sbi)
    equ  bccs_imask,      00   /* int mask for all conditions and levels

    /* write equates for bdcs */

    equ  bdcs_pbusenb,    07   /* Pbus enable
    equ  bdcs_qbusenb,    06   /* Gbus enable
    equ  partnered,       05   /* used to pair boards
    equ  zout_gt,         04   /* bus enable bit
    equ  set_pbus_force,03     /* set PBUS_force bit
    equ  prom_is_high,    02   /* set prom to high address
    equ  imask_istat,     01   /* interrupt mask for cmd pending
    equ  imask_all,       00   /* mask for all conditions

    /* STRATUS BUS COMMAND INTERFACE */
equ  iop$read_cmd,  00BFB401x   /* start of eight bytes of data for
                               /*   command specification --- read only

equ  iop$read_pntr, 00BFB801x  /* read pointer associated with cmd

equ  inum,        00BFB801x  /* interrupt number for external
                               /*  interrupt  write

equ  inum.word, 00BFB800x   /* interrupt number for external
                               /*  interrupt  write as a word

    /* BOARD CONTROL WORD */
equ  iop$brd_ctrl,  00BFB400x   /*  board control location

     equ  clr_broken ,   07   /* clear broken flag
     equ  clr_broken2,   06   /* clears broken2 flag,
                              /* mem parity, mem compare err
     equ  clr_chksum,    05   /* TED
     equ  sync_jiffy,    04   /* sync the clocks
     equ  set_int_req,   03   /* generate external request
     equ  clr_dma_enb,   02   /* clear self test bit
     equ  clr_cmd,       01   /* clear command pending
     equ  clr_stat_chng,00    /* clear status change bit

     /* P BUS STATUS WORD */
equ  iop$p_status,     00BFB000x

     equ dma_vfy_ok,     15   /* dma verify ok
     equ dma_wrt,        14
     equ dma_rd,         13
     equ scan_int,       12   /* scanner interrupt (activelow)
     equ scan_up,        11   /* scanner active (enable*running)
     equ pbus_force,     10
     equ psice_enb,      9    /* P bus enabled
     equ qside_enb,      8    /* Q bus enabled
     equ pbus_diag,      7    /* P bus diag force bus
     equ pbus_obey_er,   6    /* Pbus obey error
     equ pbus_sel_er,    5    /* Pbus select error
     equ pbus_berr_en,   4    /* Pbus select berr enabled
     equ pbus_enb,       3    /* Pbus enabled
     equ pbus_lock,      2    /* pbus lock lock= low
     equ obey_p,         1    /* obey q bus
     equ obey_q,         0    /* obey p bus

     /* adapter memory location */
equ  start_adapt_mem,          00000000x

     /* terminator memory location */
equ  term_mem_loc,          00100000x

     /* terminator memory location */
equ  term_dual_addr_loc,    00300000x

     /* board id ctr location, offset */
```

```
equ  board_id_loc, 200400x

/*   Static storage area for eeprom.  The following locations are in the
/*   upper portion of the map that are unusable for virtual mapping.  They
/*   are only 24 bit words (bits 31-08) since the lower byte does not exist.
/*   The locations available are 00BFEFA0x - 00BFFFFCx.
/*
/*   These locations are initialized by the eeprom and should only be used
/*   for containing data necessary for initial communication between the
/*   eeprom and the environment software.

equ  MAP_TOP,  00BFEF7Cx       /* Highest usable map entry for virtual mapping.

equ  map_esip, 00BFFFC4x       /* Holds the pointer to es interface structure.
equ  sys_cons, 00BFFFC8x       /* Holds the pointer to the system_console *


     equ       null,1
     equ       LEVEL_ONE_VECTOR_NUMBER,129

     priv      on

iop$memory:                         /* base of virtual memory
iop$begin_interrupt_handler:
     dc.l      null
     dc.l      reset_fault
     dc.l      fault_handler  /*  page_fault_fault
     dc.l      fault_handler  /*  address_error_fault
     dc.l      fault_handler  /*  illegal_instruction_fault
     dc.l      fault_handler  /*  zero_divide_fault
     dc.l      fault_handler  /*  chk_instruction_fault
     dc.l      fault_handler  /*  trapv_instruction_fault
     dc.l      fault_handler  /*  privilege_violation_fault
     dc.l      fault_handler  /*  trace_fault
     dc.l      fault_handler  /*  line_1010_emulator_fault
     dc.l      fault_handler  /*  line_1111_emulator_fault
     dc.l      fault_handler  /*  unassigned_vector_12_fault
     dc.l      fault_handler  /*  unassigned_vector_13_fault
     dc.l      fault_handler  /*  unassigned_vector_14_fault
     dc.l      fault_handler  /*  unassigned_vector_15_fault
     dc.l      fault_handler  /*  unassigned_vector_16_fault
     dc.l      fault_handler  /*  unassigned_vector_17_fault
     dc.l      fault_handler  /*  unassigned_vector_18_fault
     dc.l      fault_handler  /*  unassigned_vector_19_fault
     dc.l      fault_handler  /*  unassigned_vector_20_fault
     dc.l      fault_handler  /*  unassigned_vector_21_fault
     dc.l      fault_handler  /*  unassigned_vector_22_fault
     dc.l      fault_handler  /*  unassigned_vector_23_fault
     dc.l      fault_handler  /*  spurious_interrupt_fault
     dc.l      fault_handler  /*  level_1_autovector_fault
     dc.l      fault_handler  /*  level_2_autovector_fault
     dc.l      fault_handler  /*  level_3_autovector_fault
     dc.l      fault_handler  /*  level_4_autovector_fault
     dc.l      fault_handler  /*  level_5_autovector_fault
     dc.l      fault_handler  /*  level_6_autovector_fault
     dc.l      fault_handler  /*  level_7_autovector_fault
     dc.l      fault_handler  /*  trap_0_instruction_fault
     dc.l      fault_handler  /*  trap_1_instruction_fault
     dc.l      fault_handler  /*  trap_2_instruction_fault
     dc.l      fault_handler  /*  trap_3_instruction_fault
     dc.l      fault_handler  /*  trap_4_instruction_fault
     dc.l      fault_handler  /*  trap_5_instruction_fault
     dc.l      fault_handler  /*  trap_6_instruction_fault
     dc.l      fault_handler  /*  trap_7_instruction_fault
     dc.l      fault_handler  /*  trap_8_instruction_fault
     dc.l      fault_handler  /*  trap_9_instruction_fault
     dc.l      fault_handler  /*  trap_10_instruction_fault
     dc.l      fault_handler  /*  trap_11_instruction_fault
     dc.l      fault_handler  /*  trap_12_instruction_fault
     dc.l      fault_handler  /*  trap_13_instruction_fault
     dc.l      fault_handler  /*  trap_14_instruction_fault
     dc.l      fault_handler  /*  trap_15_instruction_fault
     dc.l      fault_handler  /*  unassigned_vector_48_fault
     dc.l      fault_handler  /*  unassigned_vector_49_fault
```

```
        dc.l        fault_handler   /*  unassigned_vector_50_fault
        dc.l        fault_handler   /*  unassigned_vector_51_fault
        dc.l        fault_handler   /*  unassigned_vector_52_fault
        dc.l        fault_handler   /*  unassigned_vector_53_fault
        dc.l        fault_handler   /*  unassigned_vector_54_fault
        dc.l        fault_handler   /*  unassigned_vector_55_fault
        dc.l        fault_handler   /*  unassigned_vector_56_fault
        dc.l        fault_handler   /*  unassigned_vector_57_fault
        dc.l        fault_handler   /*  unassigned_vector_58_fault
        dc.l        fault_handler   /*  unassigned_vector_59_fault
        dc.l        fault_handler   /*  unassigned_vector_60_fault
        dc.l        fault_handler   /*  unassigned_vector_61_fault
        dc.l        fault_handler   /*  unassigned_vector_62_fault
        dc.l        fault_handler   /*  unassigned_vector_63_fault

/* interrupt vectors

        dc.l        bad_interrupt       /* vector  64
        dc.l        bad_interrupt       /* vector  65
        dc.l        bad_interrupt       /* vector  66
        dc.l        bad_interrupt       /* vector  67
        dc.l        bad_interrupt       /* vector  68
        dc.l        bad_interrupt       /* vector  69
        dc.l        bad_interrupt       /* vector  70
        dc.l        bad_interrupt       /* vector  71
        dc.l        bad_interrupt       /* vector  72
        dc.l        bad_interrupt       /* vector  73
        dc.l        bad_interrupt       /* vector  74
        dc.l        bad_interrupt       /* vector  75
        dc.l        bad_interrupt       /* vector  76
        dc.l        bad_interrupt       /* vector  77
        dc.l        bad_interrupt       /* vector  78
        dc.l        bad_interrupt       /* vector  79
        dc.l        bad_interrupt       /* vector  80
        dc.l        bad_interrupt       /* vector  81
        dc.l        bad_interrupt       /* vector  82
        dc.l        bad_interrupt       /* vector  83
        dc.l        bad_interrupt       /* vector  84
        dc.l        bad_interrupt       /* vector  85
        dc.l        bad_interrupt       /* vector  86
        dc.l        bad_interrupt       /* vector  87
        dc.l        bad_interrupt       /* vector  88
        dc.l        bad_interrupt       /* vector  89
        dc.l        bad_interrupt       /* vector  90
        dc.l        bad_interrupt       /* vector  91
        dc.l        bad_interrupt       /* vector  92
        dc.l        bad_interrupt       /* vector  93
        dc.l        bad_interrupt       /* vector  94
        dc.l        bad_interrupt       /* vector  95
        dc.l        bad_interrupt       /* vector  96
        dc.l        bad_interrupt       /* vector  97
        dc.l        bad_interrupt       /* vector  98
        dc.l        bad_interrupt       /* vector  99
        dc.l        bad_interrupt       /* vector 100
        dc.l        bad_interrupt       /* vector 101
        dc.l        bad_interrupt       /* vector 102
        dc.l        bad_interrupt       /* vector 103
        dc.l        bad_interrupt       /* vector 104
        dc.l        bad_interrupt       /* vector 105
        dc.l        bad_interrupt       /* vector 106
        dc.l        bad_interrupt       /* vector 107
        dc.l        bad_interrupt       /* vector 108
        dc.l        bad_interrupt       /* vector 109
        dc.l        bad_interrupt       /* vector 110
        dc.l        bad_interrupt       /* vector 111
        dc.l        bad_interrupt       /* vector 112
        dc.l        bad_interrupt       /* vector 113
        dc.l        bad_interrupt       /* vector 114
        dc.l        bad_interrupt       /* vector 115
        dc.l        bad_interrupt       /* vector 116
        dc.l        bad_interrupt       /* vector 117
        dc.l        bad_interrupt       /* vector 118
        dc.l        bad_interrupt       /* vector 119
        dc.l        bad_interrupt       /* vector 120
```

```
dc.l    bad_interrupt   /* vector 121
dc.l    bad_interrupt   /* vector 122
dc.l    bad_interrupt   /* vector 123
dc.l    bad_interrupt   /* vector 124
dc.l    bad_interrupt   /* vector 125
dc.l    bad_interrupt   /* vector 126
dc.l    bad_interrupt   /* vector 127
dc.l    bad_interrupt   /* vector 128
dc.l    interrupt       /* vector 129 - level 1
dc.l    interrupt       /* vector 130 - level 2
dc.l    interrupt       /* vector 131 - level 3
dc.l    interrupt       /* vector 132 - level 4
dc.l    interrupt       /* vector 133 - level 5
dc.l    interrupt       /* vector 134 - level 6
dc.l    interrupt       /* vector 135 - level 7
dc.l    bad_interrupt   /* vector 136
dc.l    bad_interrupt   /* vector 137
dc.l    bad_interrupt   /* vector 138
dc.l    bad_interrupt   /* vector 139
dc.l    bad_interrupt   /* vector 140
dc.l    bad_interrupt   /* vector 141
dc.l    bad_interrupt   /* vector 142
dc.l    bad_interrupt   /* vector 143
dc.l    bad_interrupt   /* vector 144
dc.l    bad_interrupt   /* vector 145
dc.l    bad_interrupt   /* vector 146
dc.l    bad_interrupt   /* vector 147
dc.l    bad_interrupt   /* vector 148
dc.l    bad_interrupt   /* vector 149
dc.l    bad_interrupt   /* vector 150
dc.l    bad_interrupt   /* vector 151
dc.l    bad_interrupt   /* vector 152
dc.l    bad_interrupt   /* vector 153
dc.l    bad_interrupt   /* vector 154
dc.l    bad_interrupt   /* vector 155
dc.l    bad_interrupt   /* vector 156
dc.l    bad_interrupt   /* vector 157
dc.l    bad_interrupt   /* vector 158
dc.l    bad_interrupt   /* vector 159
dc.l    bad_interrupt   /* vector 160
dc.l    bad_interrupt   /* vector 161
dc.l    bad_interrupt   /* vector 162
dc.l    bad_interrupt   /* vector 163
dc.l    bad_interrupt   /* vector 164
dc.l    bad_interrupt   /* vector 165
dc.l    bad_interrupt   /* vector 166
dc.l    bad_interrupt   /* vector 167
dc.l    bad_interrupt   /* vector 168
dc.l    bad_interrupt   /* vector 169
dc.l    bad_interrupt   /* vector 170
dc.l    bad_interrupt   /* vector 171
dc.l    bad_interrupt   /* vector 172
dc.l    bad_interrupt   /* vector 173
dc.l    bad_interrupt   /* vector 174
dc.l    bad_interrupt   /* vector 175
dc.l    bad_interrupt   /* vector 176
dc.l    bad_interrupt   /* vector 177
dc.l    bad_interrupt   /* vector 178
dc.l    bad_interrupt   /* vector 179
dc.l    bad_interrupt   /* vector 180
dc.l    bad_interrupt   /* vector 181
dc.l    bad_interrupt   /* vector 182
dc.l    bad_interrupt   /* vector 183
dc.l    bad_interrupt   /* vector 184
dc.l    bad_interrupt   /* vector 185
dc.l    bad_interrupt   /* vector 186
dc.l    bad_interrupt   /* vector 187
dc.l    bad_interrupt   /* vector 188
dc.l    bad_interrupt   /* vector 189
dc.l    bad_interrupt   /* vector 190
dc.l    bad_interrupt   /* vector 191
dc.l    bad_interrupt   /* vector 192
dc.l    bad_interrupt   /* vector 193
dc.l    bad_interrupt   /* vector 194
dc.l    bad_interrupt   /* vector 195
```

```
        dc.l        bad_interrupt           /* vector 196
        dc.l        bad_interrupt           /* vector 197
        dc.l        bad_interrupt           /* vector 198
        dc.l        bad_interrupt           /* vector 199
        dc.l        bad_interrupt           /* vector 200
        dc.l        bad_interrupt           /* vector 201
        dc.l        bad_interrupt           /* vector 202
        dc.l        bad_interrupt           /* vector 203
        dc.l        bad_interrupt           /* vector 204
        dc.l        bad_interrupt           /* vector 205
        dc.l        bad_interrupt           /* vector 206
        dc.l        bad_interrupt           /* vector 207
        dc.l        bad_interrupt           /* vector 208
        dc.l        bad_interrupt           /* vector 209
        dc.l        bad_interrupt           /* vector 210
        dc.l        bad_interrupt           /* vector 211
        dc.l        bad_interrupt           /* vector 212
        dc.l        bad_interrupt           /* vector 213
        dc.l        bad_interrupt           /* vector 214
        dc.l        bad_interrupt           /* vector 215
        dc.l        bad_interrupt           /* vector 216
        dc.l        bad_interrupt           /* vector 217
        dc.l        bad_interrupt           /* vector 218
        dc.l        bad_interrupt           /* vector 219
        dc.l        bad_interrupt           /* vector 220
        dc.l        bad_interrupt           /* vector 221
        dc.l        bad_interrupt           /* vector 222
        dc.l        bad_interrupt           /* vector 223
        dc.l        bad_interrupt           /* vector 224
        dc.l        bad_interrupt           /* vector 225
        dc.l        bad_interrupt           /* vector 226
        dc.l        bad_interrupt           /* vector 227
        dc.l        bad_interrupt           /* vector 228
        dc.l        bad_interrupt           /* vector 229
        dc.l        bad_interrupt           /* vector 230
        dc.l        bad_interrupt           /* vector 231
        dc.l        bad_interrupt           /* vector 232
        dc.l        bad_interrupt           /* vector 233
        dc.l        bad_interrupt           /* vector 234
        dc.l        bad_interrupt           /* vector 235
        dc.l        bad_interrupt           /* vector 236
        dc.l        bad_interrupt           /* vector 237
        dc.l        bad_interrupt           /* vector 238
        dc.l        bad_interrupt           /* vector 239
        dc.l        bad_interrupt           /* vector 240
        dc.l        bad_interrupt           /* vector 241
        dc.l        bad_interrupt           /* vector 242
        dc.l        bad_interrupt           /* vector 243
        dc.l        bad_interrupt           /* vector 244
        dc.l        bad_interrupt           /* vector 245
        dc.l        bad_interrupt           /* vector 246
        dc.l        bad_interrupt           /* vector 247
        dc.l        bad_interrupt           /* vector 248
        dc.l        bad_interrupt           /* vector 249
        dc.l        bad_interrupt           /* vector 250
        dc.l        bad_interrupt           /* vector 251
        dc.l        bad_interrupt           /* vector 252
        dc.l        bad_interrupt           /* vector 253
        dc.l        bad_interrupt           /* vector 254
        dc.l        bad_interrupt           /* vector 255

/* ==============================================

/* The following must be at this known address, since
/* ss$acc_iop_controller looks for it here.  If the
/* interrupt vector ever somehow grows bigger, the
/* org statement will cause a phase error and prevent
/* assembly, eventually forcing someone to read this
/* comment and modify ss$acc_iop_controller to match.

        org         0400x
        extdat      iop$pm_info_loc
iop$pm_info_loc:
        char        '.PMINFO.'        /* gullibility check
```

```
     dlink      iop$comm_area

interrupt:

/* mask, and save registers

     push.w     sr                /* save new status register
     ori.w      =sr.interrupt_mask,sr     /* first, mask interupts
     push.l     d0-d7;a0-a6       /* push rest of registers
     move.l     usp,a0
     push.l     a0

     movea.l    iop$current_slot_link, a0      /* iop dependent data
     move.w     (a0), d0
     push.w     d0                /* save currently selected slot on stack
     push.w     iop$p_status
     push.w     iop$bdcs
     push.w     =UNKNOWN

     move.l     ='*MC*',d0        /* leave flag for debugger in
     push.l     d0                /* place where time would go

/* full machine conditions structure now pushed

     using      'mc',a7

     move.w     mc.info.vector,d0
     andi.w     =mc.info.vector.mask,d0
     subi.w     =LEVEL_ONE_VECTOR_NUMBER * 4,d0
     jmp        branch(,d0.w)

branch:
     jmp        level1
     jmp        level2
     jmp        level3
     jmp        level4
     jmp        level5
     jmp        level6
     jmp        level7

     eject
/* Level 1 interrupt handler - software interrupt

level1:
/*     movem.l   iop$int1_link,a4;a5          /* currently unused
/*     jsr       (a4)                         /* UNUSED
     bra        restart_interrupt

/* Level 2 interrupt handler - IOP-Pbus error/state change

level2:
     movem.l    iop$int2_link,a4;a5

pbs_err_handler:
     nop
     btst.b     =bdcs_broken, iop$bdcs
     bne        pbs_err_handler

     move.w     iop$p_status, d0
     move.w     =clr_broken2, iop$brc_ctrl  /* Clear the broken2 and interrupt.
     push.w     d0                          /* parameter
     push.l     a7                          /* addr of param
     jsr        (a4)
     addq.l     =6,a7             /* pop stuff off stack
     bra        restart_interrupt

/* level 3 pbus error

level3:
     movem.l    iop$int3_link,a4;a5
     move.w     iop$p_status, d0
     push.w     d0                          /* parameter
     push.l     a7                          /* addr of param
     jsr        (a4)
```

```
     addq.l     =6,a7                              /* pop stuff off stack
     move.w     =privL,iop$pbus_ctrl               /* set PRIVILEGE
     move.w     iop$p_status,d0                    /* d0 gets pbus status
     move.w     iop$bdcs,d1                        /* d1 gets board status
     jsr        obvious_pbus_errs                  /* any obvious errs ?
     add.w      =INT_BASE,d4
     jmp        exit_berr                          /* store and return

/* Level 4 interrupt handler - command pending

level4:
     move.w     =mask.+bdcs_cmd_mask,iop$bdcs /* mask it
     push.w     =1             /* arg for notify!!!!!
     push.l     a7             /* addr (arg)
     movem.l    iop$int4_link,a4:a5
     jsr        (a4)
     addq.l     =6,a7          /* pop stuff off stack
     bra.b      restart_interrupt

/* Level 5 interrupt handler - Scanner interrupts

level5:
     movem.l    iop$int5_link,a4:a5
     jsr        (a4)
     bra        restart_interrupt


/* Level 6 interrupt handler - Timer interrupts

level6:
     move.w     =clr.+timer_mask,iop$pbus_ctrl
     movem.l    iop$int6_link,a4:a5
     push.l     a7                                  /* mcp ptr
     push.l     a7                                  /* param for mcp
     jsr        (a4)
     addq.l     =8,a7
     move.w     =set.+timer_mask,iop$pbus_ctrl
     bra        restart_interrupt

/* Level 7 interrupt handler

/* clear level 7 interrupt

level7:
     move.w     =clr.+bdcs_statchg,iop$trc_ctrl

/* call debugger

     movem.l    iop_debug$level7_link,a4:a5
     push.l     a7             /* mcp, = addr (mc)
     push.l     a7             /* addr (mcp), the parameter
     jsr        (a4)
     addq.l     =8,a7


/* restart interrupted code

restart_interrupt:
     clr.l      (a7)+          /* clobber and pop '*MC*'
     addq.l     =6,a7          /* remove berr_type, bdcs, p_status
     pop.w      d0             /* get lastly selected slot from stack
     movea.l    iop$current_slot_link, a0
     move.w     d0, (a0)       /* save it back
     move.b     d0, iop$pio_select /* else select adapter
     pop.l      a0             /* usp
     move.l     a0,usp
     pop.l      d0-d7:a0-a6
     addq.l     =2,a7          /* pop int_sr
     rte

bad_interrupt: /* bad vector, this should be impossible
     trap       =15

iop_debug$level7_link:
```

```
     elink      iop_debug$level7
iop$int2_link:
     elink      iop$pbus_obey_toggle
iop$int3_link:
     elink      iop$pbus_error_interrupt
iop$int4_link:
     elink      iop$new_command
iop$int5_link:
     elink      iop$scanner_interrupt
iop$int6_link:
     elink      iop$timer_interrupt

     drop       'mc'
     eject

/* Common fault handler for MC68010

fault_handler:
     push.w     sr               /* push sr to keep same format
                                 /* as interrupt
     push.l     d0-d7;a0-a6
     move       usp,a3
     push.l     a3

     movea.l    iop$current_slot_link, a0     /* iop dependent data
     move.w     (a0), d0
     push.w     d0               /* save currently selected slot on stack
     push.w     iop$p_status
     push.w     iop$pccs
     push.w     =UNKNOWN

     move.l     ='*MC*',d0       /* leave flag for debugger in
     push.l     d0               /* place where time should go

process_fault:
     using      'mc',a7
     move.w     mc.info.vector,d1
     andi.w     =mc.info.vector.mask,d1
     lsr.w      =2,d1

     cmp.w      =TRAP_3_INSTRUCTION,d1   /* breakpoint?
     beq.b      process_breakpoint
     cmp.w      =TRAP_2_INSTRUCTION,d1   /* av/pcp breakpoint?
     beq.b      process_breakpoint
     cmp.w      =TRACE,d1                /* trace (breakpoint restart)?
     beq.b      process_trace
/* PUT CHECKS FOR BENIGN OR SPECIAL FAULTS HERE

/* either a bus error or other interesting exception decide whether to
/* signal or go directly to debug

     movea.l    bypass_condition$_link, a0     /* iop dependent data
     move.w     (a0), d0
     tst.w      d0
     bne.b     process_fault_prim

     cmp.w      =PAGE_FAULT,d1           /* bus error?
     beq.b      berr

/* unexpected condition

     movem.l    iop$condition_link,a4;a5
     push.l     a7               /* mcp, = addr (mc)
     push.l     a7               /* addr (mcp), the parameter
     jsr        (a4)
     addq.l     =8,a7

     bra.w      restart_interrupt


process_fault_prim:
     movem.l    iop_debug$fault_link,a4;a5
     bra.b      benign_fault
```

```
process_breakpoint:
     movem.l    iop_debug$breakpoint_link,a4:a5
     bra.b      benign_fault
process_trace:
     movem.l    iop_debug$trace_link,a4:a5
benign_fault:
     push.l     a7              /* mcp, = addr (mc)
     push.l     a7              /* addr (mcp), the parameter
     jsr        (a4)
     addq.l     =8,a7
     bra.w      restart_interrupt

     drop       'mc'

     eject
/*****************************************************************************
/* PRIMITIVE BERR ANALYZER FOR PROM
/* SHOULD RETURN A FAULT CODE TO SBI TEST
/* FOR REPORTING REASON FOR BUS ERROR

/*       incl      'iop_berr_sta tus'
     equ  READ,          08                          /* bits 8 in spc stat
     equ  SUPV,          02
     equ  CODE,          01
     equ  DATA,          00

     equ  RDAC,          15                          /* map bits
     equ  WRTAC,         14
     equ  PRVAC,         13
     equ  LOCAL,         12
     equ  DMAAC,         09
     equ  MAX_MEM,       00800000x

     equ  ZOUT_GT,       04                          /* board status bits
     equ  PROM_HI,       02

     equ  DMA_WRT,       14                          /* pbus status bits
     equ  DMA_RD,        13
     equ  TIMEOUT_,      07
     equ  PBO_ERR_,      06
     equ  PBS_ERR_,      05
     equ  PBS_ERR_EN,    04
     equ  PBUS_ON,       03
     equ  PBUS_LOCK_,    02
     equ  OBEY_P,        01
     equ  OBEY_G,        00


/*       incl      'iop_berr_co ces'
/* Begin include file ...iop_berr_codes.incl.asm
/* Generated at 86-12-01 12:24:28 EST by cv_incl Release 6.alpha.c from
/*       %es#m6>Stratus>Tom_Moser>iop>berr>iop_berr_codes.incl.pl1.

      equ        UNKNOWN,0
      equ        PROM_WRT,1
      equ        LV_NP_CODE,2
      equ        OVERRANGE,3
      equ        EXEC_WRTABLE,4
      equ        EXEC_DMA,5
      equ        NO_WRT_ACC,6
      equ        NO_RD_ACC,7
      equ        NO_PRV_ACC,8
      equ        DMA_RD_NO_WRT_ACC,9
      equ        BUS_OFF,10
      equ        BUS_LOCKED,11
      equ        OBEY_ERR,12
      equ        TIME_OUT_ERR,13
      equ        SELECT_ERR,14
      equ        RD_SYNC_PG,15
      equ        MAIN_RD_NO_CT,16
      equ        NOT_SUPV,17
      equ        NOT_PRIV,18
      equ        DMA_CPU_WRT,19
      equ        INT_BASE,32
```

```
/* End incluce file ...iop_berr_codes.incl.asm

berr:                                                       /* why are we here
     move.w     =privL,iop$pbus_ctrl                        /* set PRIVILEGE
     move.w     iop$p_status,d0                             /* d0 gets pbus status
     move.w     iop$bdcs,d1                                 /* d1 gets board status
     movea.l    a7, a0
     using      'berr_mc',a0
     move.l     berr_mc.fault_addr,d2                       /* d2 gets fault address
     move.w     berr_mc.special_status,d3                   /* d3 gets spec status word
     movem.l    d0;d1;d2;d3,-(a7)                           /* save stuff
     push.l     a0                                          /* mcp, = addr (mc)
     push.l     a7                                          /* addr (mcp), the parameter
     drop       'berr_mc'
     movem.l    iop$berr_log_link,a4;a5
     jsr        (a4)                                        /* log error before too late
     addq.l     =8, a7                                      /* remove proc args
     movem.l    (a7)+,d0;d1;d2;d3                           /* restore stuff

     tst.l      d2                                          /* negative address
     blt        overrange                                   /* is really too big
     cmpi.l     =VM_STACK,d2                                /* local virtual ?
     blt        pos_memory_berr                             /* no, jump to mem check
                                                            /* yes
     cmpi.l     =prom_hi,d2                                 /* in hi prom ?
     bge        other_loc_virt_berr                         /* no, check other stuff

tst_prom_write:                                             /* yes
     btst.l     =berr_mc.special_status.read.bit,d3 /* writing prom ?
     bne        i_dont_belong_here                          /* no
prom_wrt_berr:
     move.w     =PROM_WRT,d4                                /* load prom wrt flt code
     jmp        exit_berr                                   /* exit

i_dont_belong_here:
     move.w     =UNKNOWN,d4
     jmp        exit_berr

pos_memory_berr:
     btst.l     =prom_is_high,d1                            /* prom_hi  lo ?
     bne        memory_berr                                 /* no, check memory access
                                                            /* yes
     cmpi.l     =00010000x,d2                               /* in lo prom
     blt        tst_prom_write                              /* yes, check for write
                                                            /* no, check memory access
memory_berr:
     lsr.l      =8,d2
     lsr.l      =2,d2                                       /* d2 gets (virt page x 4)
     addi.l     =iop_map_table_start,d2                     /* d2 point to map entry
     movea.l    d2,a4
     move.l     (a4),d5                                     /* d5 gets map entry
     btst.l     =LOCAL,d5                                   /* local mem?
     beq        grant_check                                 /* if no, check zout gt
     cmpi.l     =MAX_MEM,d5                                 /* if yes, check overrange
     blt        access_check
overrange:
     move.w     =OVERRANGE,d4                               /* load LOC overrange code
     jmp        exit_berr                                   /* exit

grant_check:
     btst.l     =ZOUT_GT,d1                                 /* zout grant set
     bne        access_check                                /* yes, go check access bits
     btst.l     =berr_mc.special_status.read.bit,d3 /* no, was it a read?
     beq        access_check                                /* no, go check access bits
     move.w     =MAIN_RD_NO_GT,d4                           /* yes, load err code
     jmp        exit_berr                                   /* exit

access_check:
     btst.l     =CODE,d3                                    /* CODE fetch?
     beq        not_code_err                                /* no, check for next type
     btst.l     =WRTAC,d5                                   /* yes, check for wrt access
     beq        not_code_err                                /* not a code wrt
     move.w     =EXEC_WRTABLE,d4                            /* load execute-wrtable code
     jmp        exit_berr                                   /* exit
```

```
not_code_err:
     btst.l     =READ,d3                          /* is it a write ?
     bne        chk_rd_err                        /* no, check for read err
chk_wrt_acc:
     btst.l     =WRTAC,d5                         /* write access?
     bne        chk_dma_pbus_errs                 /* yes, chk dma-pbus err
     move.w     =NO_WRT_ACC,d4                    /* no, load write err code
     jmp        exit_berr                         /* exit

chk_rd_err:
     btst.l     =RDAC,d5                          /* read access?
     bne        chk_dma_pbus_errs                 /* yes, chk dma-pbus err
     move.w     =NO_RD_ACC,d4                     /* no, load read err code
     jmp        exit_berr

chk_dma_pbus_errs:
     btst.l     =DMAAC,d5                         /* is page DMA ?
     bne        chk_priv                          /* no, check next type
     jsr        is_dma                            /* is cycle DMA?
     beq        chk_priv                          /* no, check next type
dma_code:
     btst.l     =CODE,d3                          /* CODE fetch?
     beq        dma_cpu_wrt                       /* no, check for next type
     move.w     =EXEC_DMA,d4                      /* yes, load execute-dma code
     jmp        exit_berr                         /* exit
dma_cpu_wrt:
     btst.l     =berr_mc.special_status.read.bit,d3 /* cpu write during dma cyc ?
     bne        dma_wrt_acc                       /* no, check wrt access
     move.w     =DMA_CPU_WRT,d4                   /* yes, return fault code
     jmp        exit_berr                         /* exit
dma_wrt_acc:
     btst.l     =dma_rd,d0                        /* DMA RD = 1 ?
     beq        chk_dma_other                     /* no, check next type
     btst.l     =dma_wrt,d0                       /* is DMA WRT = 0 ?
     bne        chk_dma_other                     /* no, check next type
     btst.l     =WRTAC,d5                         /* write access?
     bne        chk_dma_other                     /* yes, chk dma-pbus err
     move.w     =DMA_RD_NO_WRT_ACC,d4             /* no, load dma/rd/write code
     jmp        exit_berr                         /* exit

chk_dma_other:
     jsr        obvious_pbus_errs                 /* any obvious errs ?
     bne        chk_priv                          /* no
     jmp        exit_berr

chk_priv:
     btst.l     =PRVAC,d5                         /* privileged page ?
     beq        i_dont_belong_here                /* no, give unknown
     move.w     =NO_PRV_ACC,d4                    /* yes, indicate priv
     jmp        exit_berr                         /* by default.

other_loc_virt_berr:
     btst.l     =CODE,d3                          /* CODE fetch from NP-LV
     beq        chk_lv                            /* no, check next type
     move.w     =LV_NP_CODE,d4                    /* yes, load err code
     jmp        exit_berr

chk_lv:
     move.l     d2, d5
     lsr.l      =8,d5
     lsr.l      =4,d5                             /* d5 has virtual page #
     subi.w     =0EF8X,d5                         /* d5 has 0-7 ctl,8-1031 pio
     beq        chk_sync_pg                       /* 0 is sync page
     cmpi.w     =8, d5
     blt        special_page
     jsr        obvious_pbus_errs                 /* any obvious errs ?
     beq        i_dont_belong_here                /* no
     jmp        exit_berr
special_page:
     cmpi.w     =4, d5                            /* 4 - 7 is map
     bge        chk_map_sel
     cmpi.w     =2, d5                            /* 2 = supv page
     beq        chk_supv_sel
     cmpi.w     =3, d5                            /* 3 = priv page
```

```
     beq         chk_priv_sel

/* page is BF9 (d5 = 1)
/* ***
     jsr         obvious_pbus_errs                      /* any obvious errs ?
     bne         i_dont_belong_here                     /* no
     jmp         exit_berr

chk_sync_pg:
     btst.l      =berr_mc.special_status.read.bit,d3 /* writing sync ?
     beq         i_dont_belong_here                     /* yes, leave quietly.
     move.w      =RD_SYNC_PG,d4                         /* no, load err code.
     jmp         exit_berr                              /* exit
chk_supv_sel:
     btst.l      =SUPV,d3                               /* yes, supv mode?
     bne         i_dont_belong_here                     /* yes, leave quietly
     move.w      =NOT_SUPV,d4                           /* load not supv err code
     jmp         exit_berr
chk_map_sel:
chk_priv_sel:
     move.w      =NOT_PRIV,d4                           /* default no privilege err
     jmp         exit_berr
     move.w      =NOT_PRIV,d4                           /* default no privilege err
     jmp         exit_berr

chk_dma_sel:

chk_pio_sel:

local_virtual_adr_table:

/************************************
/* SUBR TO CHECK PBUS ERROR BITS
/************************************

obvious_pbus_errs:                  /* returns eq if obvious err w/error code
     btst.l      =pbus_enb,d0                           /* bus on ?
     bne         chk_locked                             /* yes, chk lock
     move.w      =BUS_OFF,d4                            /* load off err
     rts                                                /* already eq
chk_locked:
     btst.l      =pbus_lock,d0                          /* bus locked ?
     bne         chk_obey_err                           /* no, chk errs
     move.w      =BUS_LOCKED,d4                         /* load locked err
     rts
chk_obey_err:
     btst.l      =pbus_obey_er,d0                           /* obey err ?
     bne         chk_timeout_err                        /* no, chk time out
     move.w      =OBEY_ERR,d4                           /* load obey err code
     rts
chk_timeout_err:
     btst.l      =pbus_diag,d0                           /* timeout err ?
     bne         chk_sel_err                            /* no, chk select
     move.w      =TIME_OUT_ERR,d4                       /* load t/o code
     rts
chk_sel_err:
     btst.l      =pbus_sel_er,d0                           /* select err ?
     bne         no_obvious_err                         /* no, return
     move.w      =SELECT_ERR,d4                         /* load select err code
no_obvious_err:
     rts

/********************************
/*  SUBR CHECKS IF A DMA ENABLED
/********************************

is_dma:                                                 /* returns ne if dma en
     btst.l      =dma_rd,d0                             /* is DMA RD set ?
     bne         ret_dma                                /* if yes, return ne
     btst.l      =dma_wrt,d0                            /* if no, test for DMA WRT
ret_dma:
     rts
```

```
exit_berr:
     using      'berr_mc',a7
     add.w      d4,berr_mc.berr_type_code
     drop       'berr_mc'
     push.l     a7              /* mcp, = addr (mc)
     push.l     a7              /* addr (mcp), the parameter
     movem.l    iop$berr_handler_link,a4:a5
     jsr        (a4)            /* call berr handler
     adda.w     =8,a7           /* fix up stack for return
     bra        restart_interrupt

/***************************************************************************

     eject
/* code in the prom does a simulated reset fault
/* when starting the loaded code. This causes
/* us to start executing here

reset_fault:
     move.w     =2700x,sr

/* check for boot load or sync up case

     movea.l    iop$sync_up_state_link,a0
     tst.w      (a0)
     beq.b      $boot
     movea.l    iop$restart_after_sync_link,a4
     jmp        (a4)            /* go get in sync
$boot:
     movea.l    =null,a1
     push.l     a1              /* null return addr
     push.l     a1              /* null prev a6
     move.l     a1,usp          /* null usp
     movem.l    iop$initializer_link,a4:a5
     jmp        (a4)

iop$initializer_link:
     elink      iop$initializer

iop$berr_handler_link:
     elink      iop$berr_handler

iop$condition_link:
     elink      iop$condition_handler

iop$berr_log_link:
     elink      iop$berr_log

iop_debug$breakpoint_link:
     elink      iop_debug$break

iop_debug$trace_link:
     elink      iop_debug$trace_fault

iop_debug$fault_link:
     elink      iop_debug$fault

iop$sync_up_state_link:
     elink      iop$sync_up_state

iop$restart_after_sync_link:
     elink      iop$restart_after_sync

iop$current_slot_link:
     elink      iop$current_slot

bypass_condition_link:
     elink      bypass_condition$

     extrn      iop$end_interrupt_handler
iop$end_interrupt_handler:
     rs.w

[illegible]_addr:
     dc.l       init_was_last
```

```
        use      'static'

    init_was_last:
        cc.b       0

        end
/*  ***begin copyright*** ******************************  */
/*                                                       */
/*  STRATUS CONFIDENTIAL INFORMATION: CLASS II          */
/*  COPYRIGHT (c) Stratus Computer, Inc. 1986           */
/*                                                       */
/*  This program contains confidential and proprietary  */
/*  information of Stratus Computer, Inc., and any      */
/*  reproduction, disclosure, or use in whole or in part */
/*  is expressly prohibited, except as may be           */
/*  specifically authorized by prior written agreement or */
/*  permission of Stratus.                              */
/*                                                       */
/*  ***end copyright*** ********************************  */

/* Beginning of modification history */
/* Written March 1986 from psi_interrupt_handler by Tom_Moser */
/* Modified 86-04-21 by Tom Moser to handle new cmd ring format */
/* Modified 86-04-11 by Martin Stokoe to implement logical channels etc. */
/* Modified 86-06-24 by Martin Stokoe to better handle many syserr's */
/* Modified 86-10-01 by Martin Stokoe to modify head/tail sequence */
/* Modified 86-11-20 by Tom Moser to improve interrupt response and eliminate
    race */
/* Modified 86-12-29 by Martin Stokoe to simplify lock call statements */
/* Modified 87-02-24 by Martin Stokoe to defer handling syserr messages
    if IOP is boot device and not fully initialized. */
/* Modified 87-04-06 by Joe Croman to add second argument */
/* Modified 87-04-15 by Tom Moser to always print syserrs */
/* End of modification history */

iop_interrupt_handler:   proc (a_iop_no, a_mcp);

/* args */
dcl a_iop_no     fixed bin(31);
dcl a_mcp        ptr;

/* automatics */
dcl pos                    fixed bin(15);
dcl my_head                fixed bin(15);
dcl my_tail                fixed bin(15);
dcl iop_no                 fixed bin(15);
dcl p                      ptr;
dcl pp                     ptr;
dcl syserr_pending         bit(1) aligned;
dcl dump_ring              bit(1) aligned;
dcl syserr_msg             char(256) var;
dcl syserr_code            fixed bin(15);
dcl lockp                  ptr;
dcl 1 my_vos_ringe         like ring_cmd;

/* include */
/* %include 'iop_mailbox'; */
/* Begin include file . . . . . iop_mailbox.incl.pl1 */

dcl   iop$mailbox_addr     ptr external static;
dcl   iop$vos_ringp        ptr external static;
dcl   iop$iop_ringp        ptr external static;
dcl   iop$syserr_ringp     ptr external static;

dcl   iop_mbxp             ptr;
dcl   syserr_ringp         ptr;
dcl   ring_cmdp            ptr;
dcl   vos_ringp            ptr;
dcl   iop_ringp            ptr;

%replace IOP_RING_SIZE   by   32;
%replace IOP_SYSERR_SIZE by   16;

%replace IOP_ON_LINE          by    0;
```

```
%replace IOP_INITIALIZING     by  -1;
%replace IOP_FAILED_TO_INIT   by  -2;
%replace IOP_EXEC_OUT_OF_PROM by  -3;

%replace IOP_MBX_ID          by '*IOPMBX*';

dcl 1 iop_mbx                based (iop_mbxp),
    2 id                     char (8),
    2 status,                                    /* set by IOP */
      3 ring_syserr          bit(1),
      3 pad                  bit(7),

    2 vector                 fixed bin (15),
    2 idle_status            fixed bin (15),
    2 save_time              fixed dec (15),

    2 lock_address           fixed bin (31),     /* Board loop-lock addr */
    2 syserr_msg             char (80) var,

    2 flags,                                     /* Set by VOS for VOS */
      3 vos_seen_syserr         bit (1),
      3 dumping_syserr_ring     bit (1),
      3 pad                     bit(14),

    2 syserr_ringp           ptr,                /* ptr to syserr ring */
    2 syserr_ring_addr       bit (32) aligned,   /* abs addr of syerr ring */
    2 syserr_size            fixed bin (15),     /* number of syserr ring */

    2 input_msg              char (80) var,
    2 output_msg             char (80) var,

    2 iop_head               fixed bin (15),     /* to iop ring head */
    2 iop_tail               fixed bin (15),     /* to iop ring tail */
    2 iop_ringp              ptr,                /* ptr to to iop ring */
    2 iop_ring_addr          bit (32) aligned,   /* abs addr of to iop ring */

    2 iop_ring_size          fixed bin(15),

    2 vos_head               fixed bin (15),     /* iop to vos ring */
    2 vos_tail               fixed bin (15),
    2 vos_ringp              ptr,
    2 vos_ring_addr          bit (32) aligned,
    2 vos_ring_size          fixed bin(15),
    2 global_state           fixed bin (31),     /* state -1 uninit, 0 - normal
                                                       ^= 0/-1 error code (2) */
    2 pbus_status            like berr_mc.p_status,
    2 terminator_status,
      3 no_fan_fault bit (1),
      3 no_sync_fault bit (1),
      3 no_bulk_fault bit (1),
      3 no_volt_fault bit (1),
      3 other_enema_good bit (1),
      3 power_state bit (3),
      3 pad          bit (7);


dcl 1 iop_syserr_ring (IOP_SYSERR_SIZE) based(syserr_ringp),
     2 free bit(1) aligned,
     2 syserr_code fixed bin (15),
     2 msg char (80) varying;

dcl 1 ring_cmd              based(ring_cmdp),
        2 free                 bit (1),
        2 pad                  bit (7),
        2 channel              fixed bin (15),
        2 command              fixed bin (15),
        2 data_16_1            fixed bin (15),
        2 data_32_1            fixed bin (31),
        2 data_32_2            fixed bin (31);

dcl 1 iop_ring (0:IOP_RING_SIZE-1) based (iop_ringp) like ring_cmd;

dcl 1 vos_ring (0:IOP_RING_SIZE-1) based (vos_ringp) like ring_cmd;
```

```
/* values for iop_mbx.idle_status */

%replace IDLE_STATUS_INIT           by 0;
%replace IDLE_STATUS_COMPLETE       by 1;
%replace IDLE_STATUS_REJECT         by 2;
%replace IDLE_STATUS_WAIT           by 3;

/* End include file . . . . . iop_mailbox.incl.pl1 */

/* %include 'iop_data'; */
/* Begin include file . . . . . iop_data.incl.pl1 */

/* Describes various permanent IOP data bases */

dcl  iop_datap$ ptr ext static;

dcl  iop_datap ptr;

dcl  iop_data_max_controllers fixed bin (15);

dcl 1 iop_data              based (iop_datap),
     2 max_controllers      fixed bin (15),
     2 group_lockp          ptr,
     2 config_lockp         ptr,
     2 cvtp                 ptr,
     2 info                 (iop_data_max_controllers),
      3 slot                fixed bin (15),
      3 vector              fixed bin (15),

      3 slot_lockp          ptr,
      3 iop_lockp           ptr,
      3 vos_lockp           ptr,
      3 cat_lockp           ptr,
      3 cso_lockp           ptr,
      3 maint_lockp         ptr,
      3 flags,
       4 paired             bit (1),
       4 idled              bit (1),
       4 configured         bit (1),
       4 testing            bit (1),
       4 should_be_paired bit (1),
       4 monitor_in_use bit(1),
       4 acquired           bit(1),
       4 ioa_reset_issued bit(1),
       4 pad                bit (7),

      3 mbxp                ptr,
      3 catp                ptr,
      3 maintp              ptr,
      3 statementp          ptr,
      3 fw_pathsp           ptr,

      3 register,
       4 a                  fixed bin(31),
       4 b                  fixed bin(31),
       4 c                  fixed bin(31),

      3 cso_head            ptr,
      3 cso_tail            ptr,
      3 cso_n_heros         fixed bin (15),

      3 max_memory          fixed bin (15),
      3 n_pages_mem         fixed bin (15),
      3 iop_memp            ptr,
      3 iop_absp            ptr,
      3 iop_abs_vpn         fixed bin (15),
      3 iop_abs_ppn         fixed bin (15);

/* this structure defines the array of memory used by the iop */

dcl  iop_memp               ptr;

dcl  iop_mem_max_pages      fixed bin (15);
```

```
dcl 1 iop_mem                based (iop_memp),
     2 max_pages             fixed bin (15),
     2 n_pages               fixed bin (15),
     2 page_nos              (iop_mem_max_pages) fixed bin (15);

dcl iopcsqep               ptr;
dcl 1 iopcsqe              based (iopcsqep),
      2 next                ptr,
      2 chan                fixed bin (15),
      2 func                fixed bin (15),
      2 data_16_1           fixed bin (15),
      2 data_32_1           fixed bin (31),
      2 data_32_2           fixed bin (31);

dcl iopcsqp                ptr;
dcl 1 iopcsq               based (iopcsqp),
      2 head                ptr,
      2 tail                ptr,
      2 n_hercs             fixed bin (15);

dcl maintp                  ptr;
dcl 1 maint                 based (maintp),
      2 busy                bit (1) aligned,
      2 data_16_1           fixed bin (15),
      2 data_32_1           fixed bin (31),
      2 data_32_2           fixed bin (31);

/* End include file . . . . . iop_data.incl.pl1 */
/* %include 'iop_cvt_cat'; */
/* Defines the Channel Vector Table and Channel Assignment Tables
   for the IOP support by VOS */

%replace MAX_IOP_VECTORS       by 5;
%replace MAX_IOA_TYPES         by 10;
%replace MAX_IOP_CHANNELS      by 256;

dcl cvtp              ptr;
dcl 1 cvt(0:MAX_IOP_VECTORS) based (cvtp) like cvt_type;

dcl 1 cvt_type        based,
      2   driver_id       char(32) var,
      2   user(MAX_IOA_TYPES) fixed bin(15),
      2   interrupt       entry (fixed bin (15), fixed bin (15)),
      2   add             entry (bit(64) aligned, fixed bin (15)),
      2   broken          entry (bit(64) aligned, fixed bin (15)),
      2   idle            entry (fixed bin (15), fixed bin (15),
                                 fixed bin (15), fixed bin (15)),
      2   restart         entry (fixed bin (15), fixed bin (15),
                                 fixed bin (15), fixed bin (15)),
      2   pwr_fail        entry (fixed bin (15), fixed bin (15),
                                 fixed bin (15), fixed bin (15)),
      2   exception       entry (fixed bin (15), ptr, fixed bin(15));

dcl catp        ptr;
dcl 1 cat(0:MAX_IOP_CHANNELS-1) based(catp),
      2 status,
         3 active       bit(1),
         3 connected    bit(1),
         3 configured   bit(1),
         3 undefined    bit(13),
      2 ioa_slot         fixed bin (15),       /* IOA slot number 0-13 */
      2 subchan          fixed bin (15),       /* Card subchannel */
      2 vector           ptr,                  /* Vector pointer */
      2 ioa_type         fixed bin (15),       /* IOA Type */
      2 data             bit(64) aligned;      /* Sratch Area - Optional */

/* %nolist; %include 'lock_calls.incl.pl1'; %list; */
/* Begin of include file lock_calls.incl.pl1, 85-06-28 JK */

declare    attach_lock          entry (char (32) var in,
                                       bit (1) aligned in,
                                       fixed bin (31) in,
                                       pointer);
declare    attach_group_lock    entry (char (32) var in,
```

```
                                                 bit (1) aligned in,
                                                 fixed bin (31) in,
                                                 fixed bin (31) in,
                                                 pointer);
declare    attach_low_use_lock entry (char (32) var in,
                                                 bit (1) aligned in,
                                                 pointer);
declare    attach_member_lock  entry (pointer in,
                                                 pointer in,
                                                 pointer,
                                                 fixed bin (15));
declare    attach_member_lock_name
                               entry (char (32) var in,
                                                 pointer in,
                                                 pointer,
                                                 fixed bin (15));
declare    detach_member_lock  entry (pointer);
declare    get_n_locks         entry (pointer in)
                                    returns (fixed bin (31)) options (c);
declare    lock                entry (pointer in) options (c);
declare    mylock              entry (pointer in)
                                    returns (bit (1) aligned) options (c);
declare    read_lock           entry (pointer in) options (c);
declare    try_lock            entry (pointer in)
                                    returns (bit (1) aligned) options (c);
declare    unlock              entry (pointer in) options (c);

/* End of include file lock_calls.incl.pl1 */

/* entries */
dcl  syserr_edit_iv entry (fixed bin (15), char (*) var, fixed bin (15),
          char (*) var);

/* based */
dcl based_fb15       fixed bin (15) based;

     /* execution */

     syserr_pending = '0'b;
     dump_ring = '0'b;

     iop_datap = iop_dataps;
     iop_no = a_iop_no;

     iop_mbxp = iop_data.mbxp(iop_no);
     catp = iop_data.catp(iop_no);
     cvtp = iop_data.cvtp;
     lockp = iop_data.vos_lockp(iop_no);

     /* lock mailbox for only a brief time to get errors & capture ring */

     call lock(lockp);

     /* print syserrs later -  reduces locking time */

     if iop_mbx.syserr_msg ^= ''
     then if ^iop_mbx.vos_seen_syserr
          then do;
               iop_mbx.vos_seen_syserr = '1'b;
               syserr_pending = '1'b;
               end;

     if iop_mbx.ring_syserr
     then if ^iop_mbx.dumping_syserr_ring
          then do;
               iop_mbx.dumping_syserr_ring = '1'b;
               dump_ring = '1'b;
               end;

     call unlock (lockp);

     if syserr_pending
     then call iop_syserr;
```

```
     vos_ringp = iop_mbx.vos_ringp;

     pos = mod(iop_mbx.vos_head + 1, IOP_RING_SIZE);    /* read without lock */

     /* process interrupts first */

/* NB. We look to see if the entry is free first. If it is then we get the
     lock and look again. This way if another CPU gets the command before we
     look then we are done. If we find something to do we must look again
     after getting the lock in case another CPU is racing and won. MOST
     IMPORTANT we only write the head pointer under the lock and we always
     look once more after each write. */

     do while (^vos_ring(pos).free);
          call lock (lockp);
          pos = mod(iop_mbx.vos_head + 1, IOP_RING_SIZE);     /* read really */
          if ^vos_ring(pos).free                              /* in use? */
          then do;
               my_vos_ringe = vos_ring(pos);                  /* capture */
               vos_ring.free(pos) = '1'b;                     /* free */
               iop_mbx.vos_head = pos;
               call unlock (lockp);                           /* allow others */
               pp = addr(my_vos_ringe);                       /* process */
               p = cat.vector(my_vos_ringe.channel);
               call p -> cvt_type.interrupt (iop_no, pp -> based_fb15);
               end;
          else
               call unlock(lockp);                            /* loop more */
          pos = mod(iop_mbx.vos_head + 1, IOP_RING_SIZE);     /* next one */
          end;

     if dump_ring
     then call dump_syserr_ring;

     return;
%page;
iop_syserr:   proc;

     iop_mbx.vos_seen_syserr = '0'b;
     syserr_msg = iop_mbx.syserr_msg;
     iop_mbx.syserr_msg = '';
     call syserr_edit_iv (0, 'iop[^i]: ^v', iop_no, syserr_msg);

     end iop_syserr;
%page;
dump_syserr_ring: proc;

dcl  i                     fixed bin(15);
dcl  fb15                  fixed bin(15);
dcl  messages_pending      bit(1) aligned;

     messages_pending = '1'b;
     syserr_ringp = iop_mbx.syserr_ringp;
     do i = 1 to 5 while (messages_pending);
          iop_mbx.ring_syserr = '0'b;
          do fb15 = 1 to IOP_SYSERR_SIZE;
               if ^iop_syserr_ring.free(fb15)
               then do;
                    syserr_msg = iop_syserr_ring.msg(fb15);
                    syserr_code = iop_syserr_ring.syserr_code(fb15);
                    iop_syserr_ring.free(fb15) = '1'b;
                    call syserr_edit_iv (syserr_code,
                         'IOP[^i]: ^v', iop_no, syserr_msg);
                    end;
               end;
          messages_pending = iop_mbx.ring_syserr;
          end;

     iop_mbx.dumping_syserr_ring = '0'b;

     end dump_syserr_ring;

     end iop_interrupt_handler;
```

```
/*   ***begin copyright*** *******************************   */
/*                                                            */
/*   STRATUS CONFIDENTIAL INFORMATION: CLASS II               */
/*   COPYRIGHT (c) Stratus Computer, Inc. 1986                */
/*                                                            */
/*   This program contains confidential and proprietary       */
/*   information of Stratus Computer, Inc., and any           */
/*   reproduction, disclosure, or use in whole or in part     */
/*   is expressly prohibited, except as may be                */
/*   specifically authorized by prior written agreement or    */
/*   permission of Stratus.                                   */
/*                                                            */
/*   ***end copyright*** *********************************    */

/* IOP_IO_COMMAND: Interface to io_command for iop_drivers. */

/* Beginning of modification history */
/* Written April 1986 by Tom Moser */
/* Modified 86-04-14 by Tom Moser to implement iop_io_comand_full */
/* Modified 86-04-21 by Tom Moser to handle new cmd ring format */
/* Modified 86-05-20 by Martin Stokoe to merge csi_io_command with
     existing iop_io_command_full & to support optimized syncing */
/* Modified 86-06-28 by Martin Stokoe to clean up cow stomach problems */
/* Modified 86-08-28 by Martin Stokoe to increase locking effiency */
/* Modified 86-10-01 by Martin Stokoe to NOT use the slot lock  */
/* Modified 86-11-10 by Tom Moser to fix csd and lock problems */
/* Modified 86-11-20 by Tom Moser to disable cow stomach - return error */
/* Modified 86-12-01 by Martin Stokoe to support red/green iop lights */
/* Modified 87-02-09 by Martin Stokoe to fix pbus init race condition */
/* Modified 87-03-14 by Martin Stokoe to be more like comm_io_command
     when returning error codes */
/* Modified 87-03-19 by Bill Snapper to remove iop_broken_controller_real
     and set the bit iop_data.configured off in s$adc_iop_controller to
     get rid of subroutine call. */
/* Modified 87-04-15 by Tom Moser to return error if sending to ^connected
     chan */
/* End of modification history */

/* %nolist; %include 'error_codes'; %list;       */
/* %nolist; %include 'iop_error_codes'; %list; */

iop_io_command_real: proc (a_func, a_chan, a_slot, a_data, a_code)
          options (kernel);

/* parameters */

dcl  a_iop_no          fixed bin (15);
dcl  a_cmd             fixed bin (15);
dcl  a_chan            fixed bin (15);
dcl  a_data            fixed bin (31);
dcl  a_data_b32        bit(32) aligned;
dcl  a_data_16_1       fixed bin (15);
dcl  a_data_32_1       fixed bin (31);
dcl  a_data_32_2       fixed bin (31);
dcl  a_func            fixed bin (15);
dcl  a_code            fixed bin (15);
dcl  a_slot            fixed bin (15);
dcl  a_event_id        fixed bin (31);
dcl  a_buffer_ans      fixed bin (31);
dcl  a_iop_iop         ptr;
dcl  a_partner_slot    fixed bin (15);
dcl  a_mem_page        fixed bin (15);
dcl  a_static_beg      fixed bin(15);
dcl  a_static_end      fixed bin(15);
dcl  a_head_beg        fixed bin(15);
dcl  a_head_end        fixed bin(15);
dcl  a_stack_beg       fixed bin(15);
dcl  a_stack_end       fixed bin(15);

/* automatic */

dcl  iop_no            fixed bin (15);
dcl  chan              fixed bin (15);
dcl  cmd               fixed bin (15);
```

```
dcl  data             bit (32) aligned;
dcl  data_16_1        fixed bin (15);
dcl  data_32_1        fixed bin (31);
dcl  data_32_2        fixed bin (31);
dcl  func             fixed bin (15);
dcl  flash_mode       fixed bin (15);
dcl  flash_time       fixed bin (31);
dcl  code             fixed bin (15);
dcl  i                fixed bin (15);
dcl  io_pagep         ptr;
dcl  locked           bit(1) aligned;
dcl  cow_stomach      bit(1) aligned;
dcl  iop_idled        bit(1) aligned;
dcl  pump_stomach     bit(1) aligned;
dcl  slot             fixed bin (15);
dcl  status           char(1);
dcl  subchan          fixed bin (15);
dcl  partner_slot     fixed bin (15);
dcl  event_id         fixed bin (31);
dcl  buffer_abs       fixed bin (31);
dcl  cmd_sw           bit (1) aligned;
dcl  idle_start       fixed bin (31);
dcl  start            fixed bin (31);
dcl  my_tail          fixed bin (15);
dcl  my_head          fixed bin (15);
dcl  mem_page         fixed bin (15);
dcl  old_code         fixed bin (15);
dcl  sequence_no      fixed bin (15);
dcl  recover_partner bit(1) aligned;
dcl  recover_slot     fixed bin (15);
dcl  recover_partner_slot fixed bin(15);
dcl  ringx            fixed bin (15);
dcl  static_beg       fixed bin(15);
dcl  static_end       fixed bin(15);
dcl  heap_beg         fixed bin(15);
dcl  heap_end         fixed bin(15);
dcl  stack_beg        fixed bin(15);
dcl  stack_end        fixed bin(15);

/* constants */

%replace IDLE_TIMEOUT_1  by  131072;  /* 2 seconds */
%replace IDLE_TIMEOUT_2  by  1310720; /* 20 seconds */
%replace INIT_TIMEOUT    by  1310720; /* 20 seconds */
%replace TEN_MSEC        by  6500;    /* 10msec in jiffies */
%replace FLASH_TIME      by  2500;
%replace TURN_ON_LIGHT   by  6;
%replace TURN_OFF_LIGHT  by  7;
%replace IOP_READY       by  0;
%replace INITIALIZING    by -1;

/* %include 'iop_command_codes'; */
/* Begin include file . . . . . iop_command_codes.incl.pl1 */

/* Basic io command to a iop */

%replace  IOP_COMMAND_NOP              by 240;
%replace  IOP_COMMAND_OLD_NOP          by 0;
%replace  IOP_COMMAND_SYNC_ALONE       by 241;
%replace  IOP_COMMAND_SYNC_PART        by 242;
%replace  IOP_COMMAND_LOAD_PAGE        by 243;
%replace  IOP_COMMAND_DUMP_PAGE        by 244;
%replace  IOP_COMMAND_EXEC_RAM         by 245;
%replace  IOP_COMMAND_EXEC_SET_MBXP    by 246;
%replace  IOP_COMMAND_GOTO_ADDR        by 247;
%replace  IOP_COMMAND_RUN_ALONE        by 248;

%replace  IOP_COMMAND_SET_MBXP         by 235;        /* Obsolete */
%replace  IOP_COMMAND_IDLE             by 236;
%replace  IOP_COMMAND_PREPARE_SYNC     by 237;
%replace  IOP_COMMAND_CANCEL_SYNC      by 238;
%replace  IOP_COMMAND_RESTART          by 239;

%replace  IOP_COMMAND_DIAG_MIN         by 32;
```

```
%replace  IOP_COMMAND_DIAG_MAX          by 63;

/* codes used by generic iop driver */

%replace  FIRST_IOP_DRIVER_COMMAND          by 64;

%replace  IOP_COMMAND_OPEN                  by 64;
%replace  IOP_COMMAND_CLOSE                 by 65;
%replace  IOP_COMMAND_CONTROL               by 66;
%replace  IOP_COMMAND_READ                  by 67;
%replace  IOP_COMMAND_WRITE                 by 68;
%replace  IOP_COMMAND_READ_BUFFER_FREE      by 69;
%replace  IOP_COMMAND_NEED_WRITE_BUFFER     by 70;

%replace  LAST_IOP_DRIVER_COMMAND           by 70;

%replace  IOP_PROCESS_COMMAND_RING          by 71;

/* Codes used for adding iop's */
/* The first two must match the same constants in comm_command_codes! */

%replace  ADDING_LONER          by 1;
%replace  ADDING_PARTNER        by 2;

/* End include file . . . . . iop_command_codes.incl.pl1 */

dcl  RECOVERY_COMMANDS (3,10) fixed bin (15) int static init (
          IOP_COMMAND_RESTART, IOP_COMMAND_NOP,
          IOP_COMMAND_NOP, IOP_COMMAND_NOP,
          IOP_COMMAND_NOP, IOP_COMMAND_NOP,
          IOP_COMMAND_NOP, IOP_COMMAND_NOP,
          IOP_COMMAND_NOP, IOP_COMMAND_NOP,

          IOP_COMMAND_CANCEL_SYNC, IOP_COMMAND_RUN_ALONE,
          IOP_COMMAND_RESTART, IOP_COMMAND_NOP,
          IOP_COMMAND_NOP, IOP_COMMAND_NOP,
          IOP_COMMAND_NOP, IOP_COMMAND_NOP,
          IOP_COMMAND_NOP, IOP_COMMAND_NOP,

          IOP_COMMAND_SYNC_ALONE,IOP_COMMAND_EXEC_RAM,
          IOP_COMMAND_RESTART, IOP_COMMAND_NOP,
          IOP_COMMAND_NOP, IOP_COMMAND_NOP,
          IOP_COMMAND_NOP, IOP_COMMAND_NOP,
          IOP_COMMAND_NOP, IOP_COMMAND_NOP);

%replace RECOVERY_COMMAND_COUNT by 4;

/* based */

dcl  1 board      defined(status) like bstat;

/* %include 'iop_cvt_cat'; */
/* Defines the Channel Vector Table and Channel Assignment Tables
   for the IOP support by VOS */

%replace MAX_IOP_VECTORS        by 5;
%replace MAX_IOA_TYPES          by 10;
%replace MAX_IOP_CHANNELS       by 256;

dcl cvtp             ptr;
dcl 1 cvt(0:MAX_IOP_VECTORS) based (cvtp) like cvt_type;

dcl 1 cvt_type       based,
      2  driver_id        char(32) var,
      2  user(MAX_IOA_TYPES) fixed bin(15),
      2  interrupt        entry (fixed bin (15), fixed bin (15)),
      2  add              entry (bit(64) aligned, fixed bin (15)),
      2  broken           entry (bit(64) aligned, fixed bin (15)),
      2  idle             entry (fixed bin (15), fixed bin (15),
                                 fixed bin (15), fixed bin (15)),
      2  restart          entry (fixed bin (15), fixed bin (15),
                                 fixed bin (15), fixed bin (15)),
      2  pwr_fail         entry (fixed bin (15), fixed bin (15),
                                 fixed bin (15), fixed bin (15)),
```

```
     2   exception        entry (fixed bin (15), ptr, fixed bin(15));

dcl catp        ptr;
dcl 1 cat(0:MAX_IOP_CHANNELS-1) based(catp),
      2 status,
         3 active      bit(1),
         3 connected   bit(1),
         3 configured  bit(1),
         3 undefined   bit(13),
      2 ioa_slot        fixed bin (15),       /* IOA slot number 0-13 */
      2 subchan         fixed bin (15),       /* Card subchannel */
      2 vector          ptr,                  /* Vector pointer */
      2 ioa_type        fixed bin (15),       /* IOA Type */
      2 data            bit(64) aligned;      /* Sratch Area - Optional */
/* %include 'iop_data'; */
/* Begin include file . . . . . iop_data.incl.pl1 */
/* Describes various permanent IOP data bases */

dcl  iop_datap$ ptr ext static;

dcl  iop_datap ptr;

dcl  iop_data_max_controllers fixed bin (15);

dcl 1 iop_data               based (iop_datap),
     2 max_controllers       fixed bin (15),
     2 group_lockp           ptr,
     2 config_lockp          ptr,
     2 cvtp                  ptr,
     2 info                  (iop_data_max_controllers),
      3 slot                 fixed bin (15),
      3 vector               fixed bin (15),

      3 slot_lockp           ptr,
      3 iop_lockp            ptr,
      3 vos_lockp            ptr,
      3 cat_lockp            ptr,
      3 csq_lockp            ptr,
      3 maint_lockp          ptr,

      3 flags,
        4 paired             bit (1),
        4 idled              bit (1),
        4 configured         bit (1),
        4 testing            bit (1),
        4 should_be_paired   bit (1),
        4 monitor_in_use     bit(1),
        4 acquired           bit(1),
        4 ioa_reset_issued   bit(1),
        4 pad                bit (7),

      3 mbxp                 ptr,
      3 catp                 ptr,
      3 maintp               ptr,
      3 statementp           ptr,
      3 fw_pathsp            ptr,

      3 register,
        4 a                  fixed bin(31),
        4 b                  fixed bin(31),
        4 c                  fixed bin(31),

      3 csq_head             ptr,
      3 csq_tail             ptr,
      3 csq_n_herds          fixed bin (15),

      3 max_memory           fixed bin (15),
      3 n_pages_mem          fixed bin (15),
      3 iop_memp             ptr,
      3 iop_ansp             ptr,
      3 iop_abs_vpn          fixed bin (15),
      3 iop_abs_ppn          fixed bin (15);

 /* this structure defines the array of memory used by the iop */
```

```
dcl   iop_memp                 ptr;
dcl   iop_mem_max_pages        fixed bin (15);

dcl 1 iop_mem                  based (iop_memp),
      2 max_pages              fixed bin (15),
      2 n_pages                fixed bin (15),
      2 page_nos               (iop_mem_max_pages) fixed bin (15);

dcl iopcsqep                  ptr;
dcl 1 iopcsqe                 based (iopcsqep),
       2 next                  ptr,
       2 chan                  fixed bin (15),
       2 func                  fixed bin (15),
       2 data_16_1             fixed bin (15),
       2 data_32_1             fixed bin (31),
       2 data_32_2             fixed bin (31);

dcl iopcsqp                   ptr;
dcl 1 iopcsq                  based (iopcsqp),
      2 head                   ptr,
      2 tail                   ptr,
      2 n_heros                fixed bin (15);

dcl maintp                     ptr;
dcl 1 maint                    based (maintp),
      2 busy                   bit (1) aligned,
      2 data_16_1              fixed bin (15),
      2 data_32_1              fixed bin (31),
      2 data_32_2              fixed bin (31);

/* End include file . . . . . iop_data.incl.pl1 */
/* %include 'iop_mailbox'; */
/* Begin include file . . . . . iop_mailbox.incl.pl1 */

dcl   iop$mailbox_addr      ptr external static;
dcl   iop$vos_ringp         ptr external static;
dcl   iop$iop_ringp         ptr external static;
dcl   iop$syserr_ringp      ptr external static;

dcl   iop_mbxp              ptr;
dcl   syserr_ringp          ptr;
dcl   ring_cmdp             ptr;
dcl   vos_ringp             ptr;
dcl   iop_ringp             ptr;

%replace IOP_RING_SIZE    by   32;
%replace IOP_SYSERR_SIZE  by   16;

%replace IOP_ON_LINE            by    0;
%replace IOP_INITIALIZING       by   -1;
%replace IOP_FAILED_TO_INIT     by   -2;
%replace IOP_EXEC_OUT_OF_PROM   by   -3;

%replace IOP_MBX_ID          by '*IOPMBX*';

dcl 1 iop_mbx                based (iop_mbxp),
    2 id                     char (8),
    2 status,                                        /* set by IOP */
      3 ring_syserr          bit(1),
      3 pad                  bit(7),
    2 vector                 fixed bin (15),
    2 idle_status            fixed bin (15),
    2 save_time              fixed dec (15),

    2 lock_address           fixed bin (31),      /* Board loop-lock addr */
    2 syserr_msg             char (80) var,

    2 flags,                                         /* Set by VOS for VOS */
      3 vos_seen_syserr            bit (1),
      3 dumping_syserr_ring        bit (1),
      3 pad                        bit(14),

    2 syserr_ringp           ptr,                 /* ptr to syserr ring */
    2 syserr_ring_addr       bit (32) aligned,    /* abs addr of syerr ring */
```

```
    2 syserr_size          fixed bin (15),     /* number of syserr ring */

    2 input_msg            char (80) var,
    2 output_msg           char (80) var,

    2 iop_head             fixed bin (15),     /* to iop ring head */
    2 iop_tail             fixed bin (15),     /* to iop ring tail */
    2 iop_ringp            ptr,                /* ptr to to iop ring */
    2 iop_ring_addr        bit (32) aligned,   /* abs addr of to iop ring */

    2 iop_ring_size        fixed bin(15),

    2 vos_head             fixed bin (15),     /* iop to vos ring */
    2 vos_tail             fixed bin (15),
    2 vos_ringp            ptr,
    2 vos_ring_addr        bit (32) aligned,
    2 vos_ring_size        fixed bin(15),
    2 global_state         fixed bin (31),     /* state -1 uninit, 0 - normal
                                                  ^= 0/-1 error code (2) */
    2 pbus_status          like berr_mc.p_status,
    2 terminator_status,
       3 no_fan_fault bit (1),
       3 no_sync_fault bit (1),
       3 no_bulk_fault bit (1),
       3 no_volt_fault bit (1),
       3 other_enema_good bit (1),
       3 power_state bit (3),
       3 pad          bit (7);


dcl 1 iop_syserr_ring (IOP_SYSERR_SIZE) based(syserr_ringp),
      2 free bit(1) aligned,
      2 syserr_code fixed bin (15),
      2 msg char (80) varying;

dcl 1 ring_cmd              based(ring_cmdp),
         2 free                 bit (1),
         2 pad                  bit (7),
         2 channel              fixed bin (15),
         2 command              fixed bin (15),
         2 data_16_1            fixed bin (15),
         2 data_32_1            fixed bin (31),
         2 data_32_2            fixed bin (31);

dcl 1 iop_ring (0:IOP_RING_SIZE-1) based (iop_ringp) like ring_cmd;
dcl 1 vos_ring (0:IOP_RING_SIZE-1) based (vos_ringp) like ring_cmd;

/* values for iop_mbx.idle_status */

%replace IDLE_STATUS_INIT            by 0;
%replace IDLE_STATUS_COMPLETE        by 1;
%replace IDLE_STATUS_REJECT          by 2;
%replace IDLE_STATUS_WAIT            by 3;


/* End include file . . . . . iop_mailbox.incl.pl1 */

/* %include 'config_data'; */
/* Begin include file ... config_data.incl.pl1  80-12-09 */

/* This include file defines the physical chassis slot configuration
   data, determined by the cpu prom routines for all boards.
   Additional data giving the system and module id's for this system
   are added by the startup_utility before transfering to the system
   initialization code.

   The same structure is copied into the wired heap during
   initialization and updated periodically as dynamic changes to the
   configuration are made.  mctp$ points to this copy.  */

%replace  MCT_VERSION_1 by   1;      /* current MCT revision */

dcl config_data$ (128) fixed bin ext; /* mctp = addr (config_data$); */
/* This data is located in the 256 bytes at location F00x in page 0 */
```

```
dcl mctps      ptr  external;
dcl mctp       ptr;

dcl 1 mct based (mctp),            /* The machine config table */
      2 slot (0:31) like mct_slot, /* config by slot */
      2 flags,
        3 manual_boot bit (1),     /* manual boot switch or simulated */
        3 tape_boot bit (1),
        3 boot_from_part bit (1), /* override default boot partition */
        3 auto_dump bit (1),
        3 link_boot bit (1),
        3 have_cpu_type bit (1),
        3 broken_mem    bit (1),
        3 mon_term_iop  bit (1),  /* '1'b => monitor terminal on IOP */
        3 spare_flags bit (24),
      2 kernel_hwm fixed bin (15),      /* Kernel High Water Mark */
      2 boot_slot_no fixed bin (15),
      2 bus_status,
        3 flags,
          4 testing_a bit (1),
          4 testing_b bit (1),
          4 a_alive bit (1),
          4 b_alive bit (1),
          4 filler bit (12),
        3 a_last_failure_time fixed bin (31),
        3 b_last_failure_time fixed bin (31),
      2 backplane_type  fixed bin (15),
      2 revision        fixed bin (15),
      2 ext_ptr         ptr,  /* Ptr to extension for new backpanels */
      2 boot_disk_slot  fixed bin (15),
      2 boot_disk_drive fixed bin (15),
      2 boot_cpu_type   fixed bin (15),
      2 sys_data,                        /* Data from label */
        3 system_no fixed bin (15),
        3 system_name char (32) varying,
        3 module_no fixed bin (15),
        3 module_name char (32) varying,
        3 net_addr fixed bin (15),
        3 boot_disk_no fixed bin (15),
        3 boot_part_no fixed bin (15),
        3 label_flags,
          4 fox_on_top bit (1),
          4 auto_boot bit (1),
          4 spare_flags bit (14),
        3 boot_part_fblock fixed bin (31),
        3 broken_mem_slot_no       char (1),
        3 broken_mem_reason_code char (1),
        3 mon_term_config,
          4 adapter_slot           char (1),
          4 subchan                char (1);


/* A discussion of the various boot_ fields above:

     boot_slot_no - the slot number of the physical device we
                    have booted from (tape, disk, link).
     boot_disk_no - the DDN of the module's master disk. (set
                    for awhile to the drive no on the boot controller
                    but changed when we learn the DDN).
     boot_part_no - partiton we have booted from
     boot_disk_slot &
     boot_disk_drive - are the slot/drive pair of the disk we are
                    now running on. May or may not be the actual
                    boot disk, but certainly is the master disk.
     slot_no        on an unseccessful power fail arguments are
     reason         passed to slot_no and reason. slot_no will
                    have the slot num of the failed mem and reason
                    will have a coded number that explains the
                    cause of the failure

*/

dcl mctsp     ptr;
```

```
dcl 1 mct_slot based (mctsp),
        3 board_type fixed bin (15),
        3 status,
          4 active bit (1),        /* Board is online and active */
          4 broken bit (1),        /* Board is broken and not usable */
          4 missing bit (1),       /* Board is now missing */
          4 paired bit (1),        /* Board has a duplicate */
          4 alive bit (1),         /* Board is alive */
          4 red_light bit (1),     /* Board has red light on */
          4 pw_fail_reset bit (1),/* Board reset by pwrfail */
          4 testing bit (1),       /* Board is under test */
        3 flags,
          4 init_devices bit (1), /* Device has init devices command */
          4 bootable bit (1),      /* Device is bootable */
          4 self_test bit(1),      /* Device has self test */
          4 sio bit (1),           /* Device responds to stand io cmds */
          4 array_size bit(4);     /* Array Board Size */

dcl 1 mct_link based (mctsp),
      2 link_slot like mct_slot,
      2 next_slot  fixed bin (15);

dcl 1 mct_ext based (mct.ext_ptr),      /* the special_slots */
      2 slot_0 (0:1) like mct_slot,
      2 slot_1 (0:1) like mct_slot,
      2 slot_30 (0:1) like mct_slot,
      2 slot_31 (0:1) like mct_slot;

/* Array board size codes are as follows:

     1-5 Obsolete, not used    8 = 8mb
     6 = 2mb                   9 = 16mb
     7 = 4mb                  10 = 32mb */

/* End include file ... config_data.incl.pl1 */

/* %include 'wired_memory_owners'; */

/* Begin include file . . . . . wired_memory_owners.incl.pl1 */

%replace WIRED_MEMORY_UNKNOWN       by 0;
%replace WIRED_MEMORY_KERNEL        by 1;
%replace WIRED_MEMORY_BUFFER_MAN    by 2;
%replace WIRED_MEMORY_TAPE          by 3;
%replace WIRED_MEMORY_PCI           by 4;
%replace WIRED_MEMORY_WIRED_HEAP    by 5;
%replace WIRED_MEMORY_COMM_HEAP     by 6;
%replace WIRED_MEMORY_FORMS         by 7;
%replace WIRED_MEMORY_EDIT          by 8;
%replace WIRED_MEMORY_LINK          by 9;
%replace WIRED_MEMORY_DISK          by 10;
%replace WIRED_MEMORY_COMM          by 11;
%replace WIRED_MEMORY_MAP           by 12;
%replace WIRED_MEMORY_ICP           by 13;

%replace MAX_WIRED_MEMORY_OWNER     by 13;

/* End include file . . . . . wired_memory_owners.incl.pl1 */
/* %include 'new_io_page'; */
/* Begin include file   io_page.incl.pl1   81-02-03 */


declare 1 io_page (0:31) based,
/* %include 'new_io_slot.incl.pl1'; */
     /* Begin include file   io_slot.incl.pl1   81-02-03 */

          2 hole_0x                  char (1),
          2 com_stat                 char (1),       /* 01x */
          2 hole_2x                  char (15),
          2 data_1                   char (1),       /* 11x */
          2 hole_12x                 char (3),
          2 data_2                   char (1),       /* 15x */
          2 hole_16x                 char (3),
          2 data_3                   char (1),       /* 19x */
          2 hole_1Ax                 char (3),
```

```
         2 subchan                 char (1),       /* 1Dx */
         2 hole_1Ex                char (31),
         2 reset_interrupt         char (1),       /* 3Dx */
         2 hole_3Ex                char (2),

         2 hole_40x                char (1),
         2 board_control           char (1),       /* 41x */
         2 hole_42x                char (3),
         2 io_address              char (1),       /* 45x */
         2 hole_46x                char (7),
         2 vector_number           char (1),       /* 4Dx */
         2 hole_4Ex                char (3),
         2 reset                   char (1),       /* 51x */
         2 hole_52x                char (3),
         2 obey_bus_a              char (1),       /* 55x */
         2 hole_56x                char (3),
         2 obey_bus_b              char (1),       /* 59x */
         2 hole_5Ax                char (3),
         2 obey_both_busses        char (1),       /* 5Dx */
         2 hole_5Ex                char (3),
         2 set_interrupt_mask      char (1),       /* 61x */
         2 hole_62x                char (15),
         2 clear_interrupt_mask    char (1),       /* 71x */
         2 hole_72x                char (14);

     /* End include file   io_slot.incl.pl1   */


declare 1 io_slot based,
/* %include 'new_io_slot.incl.pl1'; */
     /* Begin include file   io_slot.incl.pl1   81-02-03 */

         2 hole_0x                 char (1),
         2 com_stat                char (1),       /* 01x */
         2 hold_2x                 char (15),
         2 data_1                  char (1),       /* 11x */
         2 hole_12x                char (3),
         2 data_2                  char (1),       /* 15x */
         2 hole_16x                char (3),
         2 data_3                  char (1),       /* 19x */
         2 hole_1Ax                char (3),
         2 subchan                 char (1),       /* 1Dx */
         2 hole_1Ex                char (31),
         2 reset_interrupt         char (1),       /* 3Dx */
         2 hole_3Ex                char (2),

         2 hole_40x                char (1),
         2 board_control           char (1),       /* 41x */
         2 hole_42x                char (3),
         2 io_address              char (1),       /* 45x */
         2 hole_46x                char (7),
         2 vector_number           char (1),       /* 4Dx */
         2 hole_4Ex                char (3),
         2 reset                   char (1),       /* 51x */
         2 hole_52x                char (3),
         2 obey_bus_a              char (1),       /* 55x */
         2 hole_56x                char (3),
         2 obey_bus_b              char (1),       /* 59x */
         2 hole_5Ax                char (3),
         2 obey_both_busses        char (1),       /* 5Dx */
         2 hole_5Ex                char (3),
         2 set_interrupt_mask      char (1),       /* 61x */
         2 hole_62x                char (15),
         2 clear_interrupt_mask    char (1),       /* 71x */
         2 hole_72x                char (14);

     /* End include file   io_slot.incl.pl1   */


declare 1 nstat based,
          2 flags,
            3 unused bit (4),
            3 alive bit (1),
            3 interrupts_enabled bit (1),
```

```
        3 interrupt_pending bit (1),
        3 command_busy bit (1);

declare 1 hstat based,
          2 flags,
            3 obey_bus_a bit (1),
            3 obey_bus_b bit (1),
            3 unused bit (1),
            3 controller_defined bit (1),
            3 spare_1 bit (1),
            3 broken_2 bit (1),
            3 fan_error bit (1),
            3 red_light_set bit (1);


/* End include file   io_page.incl.pl1   */

/* %nolist; %include 'lock_calls'; %list; */
/* Begin of include file lock_calls.incl.pl1, 85-06-28 JK */

declare   attach_lock          entry (char (32) var in,
                                      bit (1) aligned in,
                                      fixed bin (31) in,
                                      pointer);
declare   attach_group_lock    entry (char (32) var in,
                                      bit (1) aligned in,
                                      fixed bin (31) in,
                                      fixed bin (31) in,
                                      pointer);
declare   attach_low_use_lock  entry (char (32) var in,
                                      bit (1) aligned in,
                                      pointer);
declare   attach_member_lock   entry (pointer in,
                                      pointer in,
                                      pointer,
                                      fixed bin (15));
declare   attach_member_lock_name
                               entry (char (32) var in,
                                      pointer in,
                                      pointer,
                                      fixed bin (15));
declare   detach_member_lock   entry (pointer);
declare   get_n_locks          entry (pointer in)
                                  returns (fixed bin (31)) options (c);
declare   lock                 entry (pointer in) options (c);
declare   rylock               entry (pointer in)
                                  returns (bit (1) aligned) options (c);
declare   read_lock            entry (pointer in) options (c);
declare   try_lock             entry (pointer in)
                                  returns (bit (1) aligned) options (c);
declare   unlock               entry (pointer in) options (c);

/* End of include file lock_calls.incl.pl1 */

/* external */

dcl  delta_time entry (fixed bin (31)) returns (fixed bin (31));
dcl  hex  entry (fixed bin(31), fixed bin(15)) returns (char(8) var);
dcl  io_command entry (fixed bin (15), fixed bin (15), fixed bin (15),
          bit (32) aligned, fixed bin (15));
dcl  io_status entry (fixed bin (15), fixed bin (15))
          returns (bit (1) aligned);
dcl  iop_absp entry (fixed bin (15), fixed bin (31)) returns (ptr);
dcl  get_iop_no entry (fixed bin(15), fixed bin(15), fixed bin(15) );
dcl  release_wired_buffer entry (fixed bin (15), fixed bin (15));
dcl  reset_ats_mapping entry (fixed bin (15), fixed bin (15));
dcl  set_interrupt_slot entry (fixed bin (15), bit (1) aligned,
          fixed bin (15), fixed bin (15));
dcl  start_time entry returns (fixed bin (31));
dcl  syserr_code_edit_i entry (fixed bin (15), fixed bin (15),
          char (*) var, fixed bin (15));
dcl  syserr_code_edit_ii entry (fixed bin (15), fixed bin (15),
          char (*) var, fixed bin (15), fixed bin (15));
dcl  syserr_edit_ii entry (fixed bin (15), char (*) var, fixed bin (15),
          fixed bin (15));
```

```
/* static */
dcl io_pages        fixed bin(15) ext static;

%page;
/* ========================================================== */

/* iop_io_command_real: proc (a_func, a_chan, a_slot, a_data, a_code)
        options (kernel) */

     call get_iop_no (a_slot, iop_no, a_code);

     if a_code ^= 0
     then return;

     chan = a_chan;
     func = a_func;
     data_32_1 = a_data;
     data_32_2 = 0;
     data_16_1 = 0;

     goto iop_io_command_join;

iop_io_command_full_real: entry (a_iop_no, a_chan, a_func, a_data_16_1,
                 a_data_32_1, a_data_32_2, a_code) options (kernel);

     /* execution */

     a_code = 0;
     iop_no = a_iop_no;
     chan = a_chan;
     func = a_func;
     data_16_1 = a_data_16_1;
     data_32_1 = a_data_32_1;
     data_32_2 = a_data_32_2;

iop_io_command_join:

     /* send command or cow stomach it */

     iop_datap = iop_datap$;
     iop_data_max_controllers = iop_data.max_controllers;
     iop_mbxp = iop_data.mbxp (iop_no);
     iop_ringp = iop_mbx.iop_ringp;

     slot = iop_data.slot(iop_no);

     cow_stomach = '0'b;
     locked = '1'b;

     /* Has controller been deconfigured due to a broken */

     if ^iop_data.configured (iop_no)
     then do;
          a_code = e$dead_io_board;
          return;
          end;

     if mylock(iop_data.config_lockp)
     then do;
          a_code = e$mylock;
          return;
          end;

     call read_lock (iop_data.config_lockp);

     if ^iop_data.configured (iop_no)
     then do;
          a_code = e$dead_io_board;
          call unlock (iop_data.config_lockp);
          return;
          end;

     datp = iop_data.info.datp(iop_no);
```

```
     if ^cat(chan).connected
     then do;
          a_code = e$iop_channel_not_bound;
          call unlock (iop_data.config_lockp);
          return;
          end;


     if iop_data.idled(iop_no)
     then iop_idled = '1'b;
     else iop_idled = '0'b;

/*
     if iop_data.csq_n_herds(iop_no) ^= 0
     then pump_stomach = '1'b;
     else pump_stomach = '0'b;
*/
     call lock (iop_data.iop_lockp(iop_no));

     my_tail = iop_mbx.iop_tail;
     ringx = mod(my_tail + 1, IOP_RING_SIZE);

/*
     if pump_stomach
     then call pump_cow_stomach;
*/

     if iop_ring.free(ringx)
     then do;
          iop_ring.channel(ringx) = chan;
          iop_ring.command(ringx) = func;
          iop_ring.data_16_1(ringx) = data_16_1;
          iop_ring.data_32_1(ringx) = data_32_1;
          iop_ring.data_32_2(ringx) = data_32_2;
          iop_ring.free(ringx) = '0'b;
          end;
     else do;
          a_code = e$iop_limit_exceeded;
/*            cow_stomach = '1'b;     */
          goto iop_io_command_exit;
          end;

     my_head = iop_mbx.iop_head;
     iop_mbx.iop_tail = ringx;

     code = 0;
     if my_tail = my_head
     then if ^iop_idled
          then call iop_command (IOP_PROCESS_COMMAND_RING,0, slot, '0'b, code);
     if code ^= 0
          then call syserr_code_edit_i (0, code,
               'iop_io_command: Could not send PROCESS_COMMAND_RING to IOP ^i.'
               ,iop_no);

iop_io_command_exit:

     call unlock (iop_data.iop_lockp(iop_no));

/*
     if cow_stomach
     then call thread_iopcsq(iop_no, chan, func, data_16_1,
                                   data_32_1, data_32_2, a_code);
*/

     call unlock (iop_data.config_lockp);

     return;

%page;
iop_direct_io_command_real: entry (a_cmd, a_chan, a_slot,
                                   a_data_d32, a_code) options (kernel);

     cmd = a_cmd;
     subchan = a_chan;
```

```
    slot = a_slot;
    data = a_data_b32;
    call get_iop_no ( slot, iop_no, (0));

    iop_datap = iop_dataps;
    iop_data_max_controllers = iop_data.max_controllers;
    iop_mbxp = iop_data.mbxp(iop_no);

    call lock (iop_data.iop_lockp(iop_no));

    call iop_command ( cmd, subchan, slot, data, code);

    call unlock (iop_data.iop_lockp(iop_no));

    a_code = code;

    return;

%page;
/* ============================================================ */

free_iop_mem_real: entry (a_iop_no);

    iop_no = a_iop_no;

    iop_datap = iop_dataps;

    if iop_data.n_pages_mem (iop_no) > 0
    then do;
         iop_memp = iop_data.iop_memp (iop_no);
         iop_mem_max_pages = iop_mem.max_pages;
         do i = 1 to iop_mem.n_pages;
              if iop_data.iop_abs_ppn (iop_no) = iop_mem.page_nos (i)
              then do;
                   call reset_abs_mapping (iop_data.iop_abs_vpn (iop_no),
                             iop_data.iop_abs_ppn (iop_no));
                   iop_data.iop_abs_ppn (iop_no) = -1;
                   end;
              call release_wired_buffer (WIRED_MEMORY_PSI,
                        iop_mem.page_nos (i));
         end;
         iop_mem.n_pages = 0;
         iop_data.n_pages_mem (iop_no) = 0;
         end;

    return;

%page;
/* ============================================================ */

iop_sync_boards_real: entry (a_iop_no, a_slot, a_partner_slot,
          a_static_beg, a_static_end, a_heap_beg, a_heap_end,
          a_stack_beg, a_stack_end, a_mem_page, a_code) options (kernel);

    iop_no = a_iop_no;
    iop_datap = iop_dataps;
    iop_data_max_controllers = iop_data.max_controllers;
    iop_mbxp = iop_data.mbxp (iop_no);

    slot = a_slot;
    partner_slot = a_partner_slot;

    static_beg = a_static_beg;
    static_end = a_static_end;
    heap_beg = a_heap_beg;
    heap_end = a_heap_end;
    stack_beg = a_stack_beg;
    stack_end = a_stack_end;

    mem_page = a_mem_page;
    mctp = mctps;
    io_pages  = addr(io_pages);
    a_partner_slot = -1;
```

```
/* idle controller */

      call lock (iop_data.config_lockp);
      iop_data.testing (iop_no) = '1'b;
      iop_data.idled (iop_no) = '1'b;
      call unlock (iop_data.config_lockp);

      call idle_controller (partner_slot);
      if code ^= 0
      then goto RECOVER_PHASE_I;

/* tell existing controller we are starting */

      call do_command (IOP_COMMAND_PREPARE_SYNC, 0, partner_slot,
              '0'b, code);
      if code ^= 0
      then go to RECOVER_PHASE_II;

      call start_flashing_iop (slot);

      /* now copy the specified RAM */

      /* copy MAP pages 0BFCx - 0BFFx */
      do i = 3068 to 3071;
           call dump_page (i, partner_slot);
           if code ^= 0
           then go to RECOVER_PHASE_II;
           call load_page (i, slot);
           if code ^= 0
           then go to RECOVER_PHASE_II;
      end;

      do i = static_beg to static_end;
           call dump_page (i, partner_slot);
           if code ^= 0
           then go to RECOVER_PHASE_II;
           call load_page (i, slot);
           if code ^= 0
           then go to RECOVER_PHASE_II;
      end;

      do i = heap_beg to heap_end;
           call dump_page (i, partner_slot);
           if code ^= 0
           then go to RECOVER_PHASE_II;
           call load_page (i, slot);
           if code ^= 0
           then go to RECOVER_PHASE_II;
      end;

      do i = stack_beg to stack_end;
           call dump_page (i, partner_slot);
           if code ^= 0
           then go to RECOVER_PHASE_II;
           call load_page (i, slot);
           if code ^= 0
           then go to RECOVER_PHASE_II;
      end;

/* now RAM and controller of the two iop's are alike */
/* now bring the controllers in sync */

      call do_command (IOP_COMMAND_SYNC_PART, 0, slot, '0'b, code);
      if code ^= 0
      then go to RECOVER_PARTNER_ONLY;

      /* Give the board some time to twiddle the bus etc. */

      start = start_time ();
      do while (delta_time (start) < 6553); /* loop .1 seconds */
           call flashing_iop (slot);
           call waste_time;
      end;
```

```
        /* check board status */
        status = io_pagep->io_page.com_stat(slot);
        if ^board.alive
        then do;
             code = e$dead_io_board;
             goto RECOVER_PARTNER_ONLY;
             end;
        if ^board.command_busy
        then do;
             code = e$io_busy_timeout;
             go to RECOVER_PARTNER_ONLY;
             end;

        call stop_flashing_on_red (slot);

        call do_command (IOP_COMMAND_SYNC_PART, 0, partner_slot, '0'b,
                  code);
        if code ^= 0
        then go to RECOVER_NEW_IOP_ONLY;

        /* Give the board some time to twiddle the bus etc. */

        start = start_time ();
        status = io_pagep->io_page.com_stat(partner_slot);

        do while (delta_time (start) < 6553 & board.command_busy);
             call waste_time;
             status = io_pagep->io_page.com_stat(partner_slot);
        end;

        if ^board.alive
        then do;
        code = e$dead_io_board;
        goto RECOVER_NEW_IOP_ONLY;
        end;
  if board.command_busy
  then do;
        code = e$io_busy_timeout;
        go to RECOVER_PARTNER_ONLY;
        end;

  mct.slot.active (slot) = '1'b;
  mct.slot.paired (slot) = '1'b;
  mct.slot.paired (partner_slot) = '1'b;
  iop_data.slot (iop_no) = min (slot, partner_slot);

  /* Lets assume if the following fails its because of the new IOP.
     Since the partner has been running */

  call set_interrupt_slot (iop_data.vector (iop_no), '1'b,
            iop_data.slot (iop_no), code);
  if code ^= 0
  then go to RECOVER_PARTNER_ONLY;

  call do_command (IOP_COMMAND_EXEC_RAM, 0, iop_data.slot (iop_no),
            '0'b, code);
  if code ^= 0
  then go to RECOVER_PARTNER_ONLY;

  call do_command (IOP_COMMAND_RESTART, 0, iop_data.slot (iop_no),
            '0'b, code);
  if code ^= 0
  then go to RECOVER_PARTNER_ONLY;

  /* restart any queued i/o */
  iop_mbxp = iop_data.mbxp (iop_no);
  if iop_mbx.iop_tail ^= iop_mbx.iop_head
  then call do_command (IOP_PROCESS_COMMAND_RING, 0,
                        iop_data.slot (iop_no), '0'b, (0));

  call lock (iop_data.config_lockp);
  iop_data.paired (iop_no) = '1'b;
  iop_data.testing (iop_no) = '0'b;
  iop_data.idled (iop_no) = '0'b;
```

```
     call unlock (iop_data.config_lockp);

     call syserr_edit_ii (0,
               'iop_sync_boards: IOP in slot ^i paired with slot ^i.',
               slot, partner_slot);
     a_code = 0;

     return;

/* Recovery cases are as follows: */

/* Running Board    New Board    Recover    Recovery Fails    code / break      */
/*                                                                               */
/*   OK              Fails       Running       NO             code / -1          */
/*   Fails            OK          New          NO               0  / -1          */
/*   OK              Fails       Running       YES            code / Running     */
/*   Fails            OK          New          YES            code / New         */
RECOVER_PHASE_I:
     recover_partner = '1'b;
     sequence_no = 1;
     goto RECOVER_COMMON;

RECOVER_PHASE_II:
     recover_partner = '1'b;
     sequence_no = 2;
     goto RECOVER_COMMON;

RECOVER_PARTNER_ONLY:
     recover_partner = '1'b;
     sequence_no = 3;
     goto RECOVER_COMMON;

RECOVER_NEW_IOP_ONLY:
     recover_partner = '0'b;
     sequence_no = 3;
     goto RECOVER_COMMON;

RECOVER_COMMON:

     call stop_flashing_on_rec (slot);

     if recover_partner
     then call syserr_code_edit_i (0, code,
               'iop_sync_boards: Add of partner IOP in slot ^i failed.',
               slot);
     else call syserr_code_edit_i (0, code,
     'iop_sync_boards: Cannot duplex boards. Switching to IOP in slot ^i.',
               slot);

     old_code = code;                    /* save reason for failure */

     if recover_partner
     then do;
          recover_slot = partner_slot;
          recover_partner_slot = slot;
          end;
     else do;
          recover_slot = slot;
          recover_partner_slot = partner_slot;
          end;

     call lock (iop_data.config_lockp);

     mct.slot (recover_slot).paired = '0'b;
     mct.slot (recover_partner_slot).paired = '0'b;
     mct.slot (recover_slot).active ='1'b;
     mct.slot (recover_partner_slot).active = '0'b;
     iop_data.paired (iop_no) = '0'b;
     iop_data.testing (iop_no) = '0'b;
     iop_data.idled (iop_no) = '0'b;
     iop_data.slot (iop_no) = recover_slot;

     /* Set failed board broken */
     io_pagep->io_page.board_control(recover_partner_slot) = byte(4);
```

```
     call set_interrupt_slot (iop_data.vector (iop_no), '0'b,
                         recover_slot, (0));
     do i = 1 to RECOVERY_COMMAND_COUNT;
          call do_command (RECOVERY_COMMANDS (sequence_no,i), 0,
                         recover_slot, '0'b, code);
          if code ^= 0
          then go to RECOVERY_FAILS;
     end;

     call unlock (iop_data.config_lockp);

     if recover_partner
     then a_code = old_code;   /* Report reason new board failed */
     else a_code = 0;          /* Now running on new board */

     return;

RECOVERY_FAILS:

     call unlock (iop_data.config_lockp);

     a_partner_slot = recover_slot;      /* break this board */
     a_code = code;                   /* Report reason new board failed */

     return;

%page;
/* ========================================================== */

iop_idle_controller_real: entry (a_iop_no, a_code) options (kernel);

     iop_no = a_iop_no;
     iop_datap = iop_dataps;
     iop_data_max_controllers = iop_data.max_controllers;
     iop_mbxp = iop_data.mbxp (iop_no);
     mctp = mctps;

/* idle controller */

     iop_data.idled (iop_no) = '1'b;

     call idle_controller (iop_data.slot (iop_no));
     if code ^= 0
     then do;
          call do_command (IOP_COMMAND_RESTART, 0, iop_data.slot (iop_no),
                 '0'b, (0));
          call do_command (IOP_COMMAND_NOP, 0, iop_data.slot (iop_no),
                 '0'b, (0));
          iop_data.idled (iop_no) = '0'b;
          end;
     a_code = code;
     return;

/* ========================================================== */

iop_restart_controller_real: entry (a_iop_no, a_code) options (kernel);

     iop_no = a_iop_no;
     iop_datap = iop_dataps;
     iop_data_max_controllers = iop_data.max_controllers;
     iop_mbxp = iop_data.mbxp (iop_no);
     mctp = mctps;

/* restart controller */

     call do_command (IOP_COMMAND_RESTART, 0, iop_data.slot (iop_no),
            '0'b, code);

     if code = 0
     then call do_command (IOP_COMMAND_NOP, 0, iop_data.slot (iop_no),
            '0'b, code);

     iop_data.idled (iop_no) = '0'b;
```

```
     a_code = code;
     return;

/* ============================================================ */

idle_controller: proc (a_slot);

dcl  a_slot fixed bin (15);

     iop_mbx.idle_status = IDLE_STATUS_INIT;
     call do_command (IOP_COMMAND_IDLE, 0, a_slot, '0'b, code);
     if code ^= 0
     then return;
     call do_command (IOP_COMMAND_NOP, 0, a_slot, '0'b, code);
     if code ^= 0
     then return;

     idle_start = start_time ();
     do while (iop_mbx.idle_status = IDLE_STATUS_INIT);
          call waste_time;
          if delta_time (idle_start) > IDLE_TIMEOUT_1
          then do;
               code = e$timeout;
               return;
               end;
     end;

     do while (iop_mbx.idle_status = IDLE_STATUS_WAIT);
          call waste_time;
          if delta_time (idle_start) > IDLE_TIMEOUT_2
          then do;
               code = e$timeout;
               return;
               end;
     end;

     if iop_mbx.idle_status ^= IDLE_STATUS_COMPLETE
     then do;
          code = e$inconsistent_device_state;
          return;
          end;

     code = 0;
     return;

end idle_controller;
/* ============================================================ */

pump_cow_stomach: proc;

dcl chan          fixed bin(15);

     /* If the stomach cannot be fully pumped, a command sequence
        error will eventually occur */

     chan = 0;

     do while ( iop_ring.free(ringx) & chan >= 0 );
          call unthread_iocb (iop_no,chan,func,data_16_1,
                                  data_32_1,data_32_2,a_code);
          if chan >= 0
          then do;
               iop_ring(ringx).channel = chan;
               iop_ring(ringx).command = func;
               iop_ring(ringx).data_16_1 = data_16_1;
               iop_ring(ringx).data_32_1 = data_32_1;
               iop_ring(ringx).data_32_2 = data_32_2;
               iop_ring(ringx).free = '0'b;
               ringx = mod(ringx + 1, IOP_RING_SIZE);
               end;
          end;

     end pump_cow_stomach;
```

```
/* ========================================================== */
do_command: proc (a_opcode, a_chan, a_slot, a_data, a_code);

dcl  a_opcode        fixed bin (15);
dcl  a_chan          fixed bin (15);
dcl  a_slot          fixed bin (15);
dcl  a_data          bit (32) aligned;
dcl  a_code          fixed bin (15);

     call iop_command (a_opcode, a_chan, a_slot, a_data, a_code);
     if a_code ^= 0
     then call syserr_code_edit_if (0, a_code,
                    'iop_command: Command = ^2h, Slot = ^i',
                    a_opcode, a_slot);
     return;

end do_command;
/* ========================================================== */
iop_command: proc (a_opcode, a_chan, a_slot, a_data, a_code);

dcl a_opcode     fixed bin(15);
dcl a_chan       fixed bin(15);
dcl a_slot       fixed bin(15);
dcl a_data       bit(32) aligned;
dcl a_code       fixed bin(15);

dcl iop_global_state    fixed bin(15);

     /* execution */

STATE_TABLE_BEG:
     iop_global_state = iop_mbx.global_state;

     /* IOP failed to initialize and returned  error code */
     if iop_global_state > IOP_ON_LINE
     then do;
          a_code = iop_global_state;
          return;
          end;

     goto STATE(iop_global_state);

STATE(IOP_ON_LINE):

     call io_command (a_opcode, a_chan, a_slot, a_data, a_code);
     return;

STATE(IOP_EXEC_OUT_OF_PROM):

     if a_opcode = IOP_COMMAND_EXEC_SET_MBXP
     then iop_mbx.global_state = IOP_INITIALIZING;

     call io_command (a_opcode, a_chan, a_slot, a_data, a_code);

     if a_code ^= 0
     then do;
          iop_mbx.global_state = IOP_EXEC_OUT_OF_PROM;
          return;
          end;

     return;

STATE(IOP_FAILED_TO_INIT):

     a_code = eideac_io_board;
     return;

STATE(IOP_INITIALIZING):

     idle_start = start_time();

     do while (iop_mbx.global_state = IOP_INITIALIZING);
          call waste_time;
```

```
        if delta_time (idle_start) > INIT_TIMEOUT
        then do;
             iop_mbx.global_state = IOP_FAILED_TO_INIT;
             a_code = esio_busy_timeout;
             return;
             end;
     end;

     goto STATE_TABLE_BEG;

     end iop_command;
/* ============================================================ */

load_page: proc (a_iop_page, a_slot);

dcl  a_iop_page        fixed bin (15);
dcl  a_slot            fixed bin (15);
dcl  data              bit (32) aligned;
dcl  chan          bit (8) aligned;


/* io command has obscure format here */
/*    CMD is normal
      SUBCHN is low byte of IOP page number
      DATA1 is high byte of VOS page number
      DATA2 is low byte of VOS page number
      DATA3 is high byte of IOP page number */

     call flashing_iop (slot);

     chan = bit (bin (mod (a_iop_page, 256), 8), 8);
     data = '0'b;
     substr (data, 9, 16) = bit (bin (mem_page, 16), 16);
     substr (data, 25, 8) =
               bit (bin (divide (a_iop_page, 256, 15, 0), 8), 8);

     call do_command (IOP_COMMAND_LOAD_PAGE, bin (chan), a_slot,
               data, code);
     if code ^= 0
     then return;

     call do_command (IOP_COMMAND_NOP, 0, a_slot, '0'b, code);
     if code ^= 0
     then return;

end load_page;

/* ============================================================ */

dump_page: proc (a_iop_page, a_slot);

dcl  a_iop_page        fixed bin (15);
dcl  a_slot            fixed bin (15);

dcl  data              bit (32) aligned;
dcl  chan          bit (8) aligned;


/* io command has obscure format here */
/*    CMD is normal
      SUBCHN is low byte of VOS page number
      DATA1 is high byte of IOP page number
      DATA2 is low byte of IOP page number
      DATA3 is high byte of VOS page number */

     call flashing_iop (slot);

     chan = bit (bin (mod (mem_page, 256), 8), 8);
     data = '0'b;
     substr (data, 9, 16) = bit (bin (a_iop_page, 16), 16);
     substr (data, 25, 8) =
               bit (bin (divide (mem_page, 256, 15, 0), 8), 8);

     call do_command (IOP_COMMAND_DUMP_PAGE, bin (chan), a_slot,
```

```
                data, code);
        if code ^= 0
        then return;
        call dc_command (IOP_COMMAND_NOP, 0, a_slot, '0'b, code);
        if code ^= 0
        then return;

    end dump_page;

    /* ============================================================ */

    waste_time: proc;

    dcl (i, j) fixed bin (15);

         j = 0;
         do i = 1 to 100;
              j = j + i;
         end;
         return;

    end waste_time;


    /* ============================================================ */
    start_flashing_iop: proc (a_slot);

    dcl a_slot      fixed bin(15);

         flash_time = start_time ();
         flash_mode = TURN_ON_LIGHT;

         io_pagep->io_page.board_control(a_slot) = byte(TURN_OFF_LIGHT);

         end start_flashing_iop;

    flashing_iop:   proc (a_slot);

    dcl a_slot      fixed bin(15);

         if delta_time (flash_time) < FLASH_TIME /* 0.1 seconds */
         then return;

         flash_time = start_time ();
         io_pagep->io_page.board_control(a_slot) = byte(flash_mode);

         if flash_mode = TURN_OFF_LIGHT
         then flash_mode = TURN_ON_LIGHT;
         else flash_mode = TURN_OFF_LIGHT;

         end flashing_iop;

    stop_flashing_on_red: proc (a_slot);

    dcl a_slot      fixed bin(15);

         /* set light red */
         io_pagep->io_page.board_control(a_slot) = byte(TURN_ON_LIGHT);

         end stop_flashing_on_red;

         end iop_io_command_real;
    %page;
    /* ============================================================ */

    /* entry for mapping a iop_abs page into a physical buffer */

    iop_absp: proc (a_iop_no, a_physical_addr) returns (ptr);

    /* parameters */

    dcl  a_iop_no          fixed bin (15);
    dcl  a_physical_addr fixed bin (31);
```

```
/* automatic */

dcl  pon            fixed bin (15);
dcl  offset         fixed bin (15);
dcl  iop_no         fixed bin (15);

/* based */

/* %include 'iop_data'; */
/* Begin include file . . . . . iop_data.incl.pl1 */

/* Describes various permanent IOP data bases */

dcl  iop_databs ptr ext static;

dcl  iop_datap ptr;

dcl  iop_data_max_controllers fixed bin (15);

dcl 1 iop_data              based (iop_datap),
      2 max_controllers     fixed bin (15),
      2 group_lockp         ptr,
      2 config_lockp        ptr,
      2 cvtp                ptr,
      2 info                (iop_data_max_controllers),
        3 slot              fixed bin (15),
        3 vector            fixed bin (15),

        3 slot_lockp        ptr,
        3 iop_lockp         ptr,
        3 vcs_lockp         ptr,
        3 cat_lockp         ptr,
        3 csc_lockp         ptr,
        3 maint_lockp       ptr,

        3 flags,
          4 paired          bit (1),
          4 idled           bit (1),
          4 configured      bit (1),
          4 testing         bit (1),
          4 should_be_paired bit (1),
          4 monitor_in_use  bit(1),
          4 acquired        bit(1),
          4 iop_reset_issued bit(1).
          4 pad             bit (7),

        3 mbxp              ptr,
        3 catp              ptr,
        3 maintp            ptr,
        3 statementp        ptr,
        3 fw_pathsp         ptr,

        3 register,
          4 a               fixed bin(31),
          4 b               fixed bin(31),
          4 c               fixed bin(31),

        3 csc_head          ptr,
        3 csc_tail          ptr,
        3 csc_n_heads       fixed bin (15),

        3 max_memory        fixed bin (15),
        3 n_pages_mem       fixed bin (15),
        3 iop_memp          ptr,
        3 iop_absp          ptr,
        3 iop_abs_vpn       fixed bin (15),
        3 iop_abs_ppn       fixed bin (15);

/* this structure defines the array of memory used by the iop */

dcl  iop_mem                ptr;

dcl  iop_mem_max_pages      fixed bin (15);
```

```
dcl 1 iop_mem                 based (iop_memp),
     2 max_pages              fixed bin (15),
     2 n_pages                fixed bin (15),
     2 page_nos               (iop_mem.max_pages) fixed bin (15);

dcl iopcscep                  ptr;
dcl 1 iopcsce                 based (iopcscep),
      2 next                   ptr,
      2 chan                   fixed bin (15),
      2 func                   fixed bin (15),
      2 data_16_1              fixed bin (15),
      2 data_32_1              fixed bin (31),
      2 data_32_2              fixed bin (31);

dcl iopcscp                   ptr;
dcl 1 iopcsc                  based (iopcscp),
      2 head                   ptr,
      2 tail                   ptr,
      2 n_hercs                fixed bin (15);

dcl maintp                    ptr;
dcl 1 maint                   based (maintp),
      2 busy                   bit (1) aligned,
      2 data_16_1              fixed bin (15),
      2 data_32_1              fixed bin (31),
      2 data_32_2              fixed bin (31);

/* End include file . . . . . iop_data.incl.pl1 */

/* external */

dcl  setup_abs_mapping entry (fixed bin (15), fixed bin (15));

     iop_datap = iop_datops;
     iop_no = a_iop_no;

     ppn = divide (a_physical_addr, 4096, 15, 0);
     offset = mod (a_physical_addr, 4096);

     call setup_abs_mapping (iop_data.iop_abs_vpn (iop_no), ppn);
     iop_data.iop_abs_ppn (iop_no) = ppn;
     return (addrel (iop_data.iop_absp (iop_no), offset));

end iop_absp;
%page;
/* ========================================================== */

thread_iopcsc: proc (a_iop_no, a_chan, a_func, a_data_16_1,
                     a_data_32_1, a_data_32_2, a_code) recursive;

dcl  a_iop_no          fixed bin (15);
dcl  a_code            fixed bin (15);
dcl  a_chan            fixed bin (15);
dcl  a_func            fixed bin (15);
dcl  a_data_16_1       fixed bin (15);
dcl  a_data_32_1       fixed bin (31);
dcl  a_data_32_2       fixed bin (31);

/* automatic */

dcl  iop_no            fixed bin (15);
dcl  code              fixed bin (15);
dcl  p                 ptr;
dcl  did_some          bit(1) aligned;

/* entry */

dcl  allocate_wired_heap        entry (fixed bin (31), char (2))
                                returns (ptr);
dcl  free_wired_heap            entry (ptr, char (2));

/* incl */
/* %nolist; %include 'lock_calls'; %list; */
/* Begin of include file lock_calls.incl.pl1, 85-06-28 JK */
```

```
declare   attach_lock           entry (char (32) var in,
                                       bit (1) aligned in,
                                       fixed bin (31) in,
                                       pointer);
declare   attach_group_lock     entry (char (32) var in,
                                       bit (1) aligned in,
                                       fixed bin (31) in,
                                       fixed bin (31) in,
                                       pointer);
declare   attach_low_use_lock entry (char (32) var in,
                                       bit (1) aligned in,
                                       pointer);
declare   attach_member_lock    entry (pointer in,
                                       pointer in,
                                       pointer,
                                       fixed bin (15));
declare   attach_member_lock_name
                                entry (char (32) var in,
                                       pointer in,
                                       pointer,
                                       fixed bin (15));
declare   detach_member_lock    entry (pointer);
declare   get_n_locks           entry (pointer in)
                                    returns (fixed bin (31)) options (c);
declare   lock                  entry (pointer in) options (c);
declare   mylock                entry (pointer in)
                                    returns (bit (1) aligned) options (c);
declare   read_lock             entry (pointer in) options (c);
declare   try_lock              entry (pointer in)
                                    returns (bit (1) aligned) options (c);
declare   unlock                entry (pointer in) options (c);

/* End of include file lock_calls.incl.pl1 */
/* %include 'iop_data'; */
/* Begin include file . . . . . iop_data.incl.pl1 */

/* Describes various permanent IOP data bases */

dcl  iop_datap$ ptr ext static;

dcl  iop_datap ptr;

dcl  iop_data_max_controllers fixed bin (15);

dcl 1 iop_data              based (iop_datap),
     2 max_controllers      fixed bin (15),
     2 group_lockp          ptr,
     2 config_lockp         ptr,
     2 cvtp                 ptr,
     2 info                 (iop_data_max_controllers),
      3 slot                fixed bin (15),
      3 vector              fixed bin (15),

      3 slot_lockp          ptr,
      3 iop_lockp           ptr,
      3 vcs_lockp           ptr,
      3 cat_lockp           ptr,
      3 csp_lockp           ptr,
      3 maint_lockp         ptr,

      3 flags,
       4 paired             bit (1),
       4 idled              bit (1),
       4 configured         bit (1),
       4 testing            bit (1),
       4 should_be_paired bit (1),
       4 monitor_in_use bit(1),
       4 acquired           bit(1),
       4 ioa_reset_issued bit(1),
       4 pad                bit (7),

      3 mbxp                ptr,
      3 catp                ptr,
      3 maintp              ptr,
```

```
      3 statementp        ptr,
      3 fw_pathsp         ptr,

      3 register,
        4 a               fixed bin(31),
        4 b               fixed bin(31),
        4 c               fixed bin(31),

      3 csc_head          ptr,
      3 csc_tail          ptr,
      3 csc_r_heros       fixed bin (15),

      3 max_memory        fixed bin (15),
      3 n_pages_mem       fixed bin (15),
      3 iop_memp          ptr,
      3 iop_absp          ptr,
      3 iop_abs_vpn       fixed bin (15),
      3 iop_abs_ppn       fixed bin (15);

/* this structure defines the array of memory used by the iop */

dcl  iop_memp             ptr;

dcl  iop_mem_max_pages    fixed bin (15);

dcl 1 iop_mem             based (iop_memp),
    2 max_pages           fixed bin (15),
    2 n_pages             fixed bin (15),
    2 page_nos            (iop_mem_max_pages) fixed bin (15);

dcl iopcsoep             ptr;
dcl 1 iopcsoe            based (iopcsoep),
     2 next               ptr,
     2 chan               fixed bin (15),
     2 func               fixed bin (15),
     2 data_16_1          fixed bin (15),
     2 data_32_1          fixed bin (31),
     2 data_32_2          fixed bin (31);

dcl iopcsop              ptr;
dcl 1 iopcso             based (iopcsop),
     2 head               ptr,
     2 tail               ptr,
     2 n_heros            fixed bin (15);

dcl maintp               ptr;
dcl 1 maint              based (maintp),
     2 busy               bit (1) aligned,
     2 data_16_1          fixed bin (15),
     2 data_32_1          fixed bin (31),
     2 data_32_2          fixed bin (31);

/* End include file . . . . . iop_data.incl.pl1 */

/* execution */

     a_code = 0;

     iop_no = a_iop_no;
     iop_datap = iop_dataps;
     iop_data_max_controllers = iop_data.max_controllers;
     iopcsoep = allocate_wired_heap(size(iopcsoe), 'IO');

     if iopcsoep = null()
     then do;
          a_code = esno_alloc_wired_heap;
          return;
          end;

     call lock (iop_data.csc_lockp(iop_no));

     iopcsoe.next = null ();
     iopcsoe.chan = a_chan;
     iopcsoe.func = a_func;
```

```
     iopcsqe.data_16_1 = a_data_16_1;
     iopcsqe.data_32_1 = a_data_32_1;
     iopcsqe.data_32_2 = a_data_32_2;

     call lock (iop_data.csq_lockp(iop_no));

     iopcsqp = addr(iop_data.csq_head(iop_no));

     if iopcsq.head = null()
     then do;                                        /* queue empty */
          iopcsq.head = iopcsqep;
          iopcsq.tail = iopcsqep;
          end;
     else do;                                        /* add at end */
          iopcsq.tail -> iopcsqe.next = iopcsqep;
          iopcsq.tail = iopcsqep;
          end;

     iopcsq.n_herds = iopcsq.n_herds + 1;

     call unlock (iop_data.csq_lockp(iop_no));

     return;

%page;
/* process the iop cow stomach queue for a given IOP */

unthread_iopcsq: entry (a_iop_no, a_chan, a_func, a_data_16_1,
                        a_data_32_1, a_data_32_2, a_code);

     a_code = 0;

     iop_datap = iop_datap$;
     iop_data_max_controllers = iop_data.max_controllers;
     iop_no = a_iop_no;

     call lock (iop_data.csq_lockp(iop_no));

     iopcsqp = addr(iop_data.csq_head(iop_no));

     if iopcsq.n_herds = 0
     then do;
          a_chan = -1;
          call unlock (iop_data.csq_lockp(iop_no));
          return;
          end;

     iopcsqep = iopcsq.head;

     a_chan    = iopcsqe.chan;
     a_data_16_1 = iopcsqe.data_16_1;
     a_data_32_1 = iopcsqe.data_32_1;
     a_data_32_2 = iopcsqe.data_32_2;
     a_func    = iopcsqe.func;

     iopcsq.head = iopcsqe.next;
     iopcsq.n_herds = iopcsq.n_herds - 1;

     call free_wired_heap (iopcsqep, 'IO');

     call unlock (iop_data.csq_lockp(iop_no));

     end thread_iopcsq;
/*   ***begin copyright*** *****************************   */
/*                                                         */
/*   STRATUS CONFIDENTIAL INFORMATION: CLASS II            */
/*   COPYRIGHT (c) Stratus Computer, Inc. 1986             */
/*                                                         */
/*   This program contains confidential and proprietary    */
/*   information of Stratus Computer, Inc., and any        */
/*   reproduction, disclosure, or use in whole or in part  */
/*   is expressly prohibited, except as may be             */
/*   specifically authorized by prior written agreement or */
```

```
/*  permission of Stratus.                                                 */
/*                                                                         */
/*  ***end copyright*** *********************************                  */

/*   IOP prom dump utilities.   */
iop_dump: proc;
/* Beginning of modification history */
/* Created 87-01-21 by Bill Snapper */
/* Modified 87-03-19 by Bill Snapper to add code to dump ioas */
/* Modified 87-04-30 by Bill Snapper to make error reporting more robust as
     well as checking iop pages to verify that they at least have been mapped
     for READ access and not IO access before dumping page. */
/* Modified 87-06-15 by Bill Snapper to add hack that will attempt to revive a
     ioa so that it can at least dump it's default dump list of data. */
/* End of modification history */

/*   This module is responsible for dumping the contents of an iop to vos
     main memory when requested.  The following will be the standard info
     dumped:
                  Internal Static
                  External Static
                  Stack & Heaps
                  Access Translation Map
                  Scanner ram
                  All prom data structures.
                  All readable hardware staus registers

     The only area that will not be dumped (unless specificly asked for)
     will be the actual code (Environmemt software).  The iop will know
     how the ram is broken up by the iop_pm_sync_info structure that is
     used to start an iop.  This will be copied up into prom ram storage
     space before program execution and will be checksummed to insure data
     integrity.
*/

/* Entry points into iop_dump */

/* Replace */
%replace  DUMP_STARTED    by 1;

%replace  IOP_REGS_BASE   by 3066;

%replace  MSEC_IN_JIFFIES      by 66;
%replace  CALL_MASK            by 7;

%replace  FALSE                by '0'b;
%replace  TRUE                 by '1'b;

%replace  NO_READ_MSG
          by 'This page is not mapped for read access, see map entry in dump.';

/* Include */
/* %include  'adapter_error_equates' */;
/* FILE: Adapter Error Codes -- Error code registry for IOP adapter boards   */

/* MBX Ownership byte definitions */
%replace MBX_OWNER__ADAPTER_OWNS_MBX     by   '80'b4; /* Adapter/GIOC          */
                                                      /* ownership flag:       */
                                                      /*  80x = adapter owns   */
                                                      /*  mailbox              */
%replace MBX_OWNER__GIOC_OWNS_MBX        by   '00'b4; /* Adapter/GIOC          */
                                                      /* ownership flag:       */
                                                      /*  00x = IOP owns       */
                                                      /*  mailbox              */

/* Success and failure status prefix codes */
%replace MBX_STS__GT_SUCCESS     by   'FF000001'b4; /* Status for successful   */
                                                    /*  GENERIC TEST           */

%replace MBX_STS_SP              by   'FF000001'b4; /* Same success prefix as  */
                                                    /*  above                  */

%replace MBX_STS__GT_FAILURE_PREFIX by 'FE000001'b4; /* Prefix for errors      */
                                                     /*  encountered during a  */
```

```
                                                   /*  GENERIC TEST            */

%replace MEX_STS_FP              by   'FE000001'b4; /* Same error prefix as    */
                                                   /*  above                   */

/* Success status codes */
%replace MEX_STS__ADAPTER_OK             by   'FF000002'b4; /* OK Status msg    */
%replace MEX_STS__START_FUNC_TEST        by   'FF000003'b4; /* Response to a    */
                                                   /*  Test_All                */
%replace MEX_STS__ADAPTER_RESETTING      by   'FF000004'b4; /* Resetting        */
%replace MEX_STS__ADAPTER_HALTING        by   'FF000005'b4; /* Halt             */
%replace MBX_STS__NULL_CMD_RESPONSE      by   'FF000006'b4; /* Response to a    */
                                                   /*  null command            */
%replace MBX_STS__NEXT_BUFFER_READY      by   'FF000007'b4; /* Response to a    */
                                                   /*  dump buffer             */
%replace MEX_STS__OPERATION_IN_PROGRESS by   'FE000007'b4; /* Mark this        */
                                                   /*  operation in progress   */

/* ERROR CODES */
%replace MEX_ERR__UNIMPLEMENTED_FEATURE by  'FE000060'b4; /* Some Non-Feature*/
                                                   /*  was requested           */
%replace MEX_ERR__ILLEGAL_CMD       by  'FE000070'b4; /* Illegal/unknown       */
                                                   /*  adapter command         */
                                                   /*  received                */
%replace MBX_ERR__OP_IN_PROGRESS    by  'FE000071'b4; /* Operation was         */
                                                   /*  requested before        */
                                                   /*  previous finished       */
%replace MBX_ERR__NO_CMD_GIVEN      by  'FE000072'b4; /* Mailbox recv'd        */
                                                   /*  but no command given    */
%replace MEX_ERR__BAD_ACK_RESPONSE  by  'FE000073'b4; /* Response to           */
                                                   /*  send was not an ACK     */
%replace MEX_ERR__INVALID_TEST_NUMBER by 'FE000075'b4; /* Requested test       */
                                                   /*  does not exist          */
%replace MEX_ERR__UNKNOWN_COMMAND   by  'FE000076'b4; /* Requested             */
                                                   /*  command is unknown      */
%replace MEX_ERR__COMMAND_NOT_FOUND by  'FE000077'b4; /* Requested             */
                                                   /*  command is unknown      */

%replace MEX_ERR__BUS_ERROR             by 'FE000100'b4; /* Bus Error           */
%replace MEX_ERR__INSTR_ERROR           by 'FE000101'b4; /* Instruction Error   */
%replace MEX_ERR__TRAP                  by 'FE000102'b4; /* Trap Instruction    */
%replace MEX_ERR__UNEXP_INTR_ERROR      by 'FE000103'b4; /* Bogus Interrupt     */
%replace MEX_ERR__JUMP_0_ERROR          by 'FE000104'b4; /* PC jumped to zero   */
%replace MEX_ERR__ERROR_CALL_ERROR      by 'FE000105'b4; /* JSR ERROR call      */
%replace MEX_ERR__ERROR_TRAP_0_ERROR    by 'FE000106'b4; /* TRAP 0 error call   */
%replace MEX_ERR__BAD_HARDWARE_ERROR    by 'FE000107'b4; /* Bad Hardware error  */
%replace MEX_ERR__RESVD_INSTR_ERROR     by 'FE000108'b4; /* Reserved Instruction*/
%replace MEX_ERR__INSTR_TRACE           by 'FE000109'b4; /* Trace Trap          */


/* NOTE: The following status codes will DISAPPEAR at first release!!!        */
/* %replace MEX_STS__SUCCESS     by  '0000F000'b4; /* Status for successful   */
                                                  /*  Cmd Done                 */

/* %replace MEX_STS__ADAPTER_FAILURE_PREFIX by '0000F000'b4; /* Status word */
                                                  /*  prefix value for         */
                                                  /*  adapter failures         */

%replace MEX_STS__SUCCESS       by  MEX_STS__GT_SUCCESS; /* Success status     */
%replace MEX_STS__ADAPTER_FAILURE_PREFIX by MEX_STS__GT_FAILURE_PREFIX;
                                                  /* Prefix for errors         */
/* %include 'adapter_test_equates' */;
/*  adapter_test_equates.incl.pl1 */

/* ********************************************************************** */
/*   Adapter Local Command Codes in no particular order

     This include file contains the known commands for all adapters
     currently supported as of 26-Feb-1987.  It is subject to change as
     demands require. */

/* ********************************************************************** */

/* NOTE: Command codes 0-255 (0x-0FFx) are reserved to general handler       */
```

```
%replace NULL_GIOC_COMMAND                          by    0;  /* This command               */
                                                              /*  MUST BE ZERO!!            */
%replace GENERIC_CMD__RE_INIT_BOARD                 by    1;  /* Restart the prom           */
                                                              /*  like hard init            */
%replace GENERIC_CMD__RESET_BOARD                   by    2;  /* Obsolete -- did hard       */
                                                              /*  68K reset                 */
%replace GENERIC_CMD__EXECUTE_SINGLE_TEST by        3;        /* Execute one test           */
                                                              /*  with params               */
%replace GENERIC_CMD__STOP_PROCESSOR                by    4;  /* Execute a                  */
                                                              /*  'stop processor'          */
%replace GENERIC_CMD__RETURN_STATUS                 by    5;  /* Return status for          */
                                                              /*  current op                */
%replace GENERIC_CMD__RETURN_ERROR_INFO by          6;        /* Return extra               */
                                                              /*  error information         */
%replace GENERIC_CMD__CHECKSUM_WHOLE_ROM by         7;        /* Checksum the               */
                                                              /*  entire EEPROM             */
%replace GENERIC_CMD__CHECKSUM_ID_ROM               by    8;  /* Checksum the ID            */
                                                              /*  part of EEPROM            */
%replace GENERIC_CMD__START_PROG_IN_MEM by          9;        /* Xfer program control       */
                                                              /*  to an addr                */
%replace GENERIC_CMD__ALLOCATE_XFER_BUF             by   10;  /* Give a large buffer        */
                                                              /*  to GIOC                   */
%replace GENERIC_CMD__MOVE_BUF_TO_LOMEM             by   11;  /* Move allocated buffer      */
                                                              /*  to lo mem                 */
%replace GENERIC_CMD__MOVE_LOMEM_TO_BUF by         12;        /* Move lo mem to             */
                                                              /*  allocated buffer          */
%replace GENERIC_CMD__EXECUTE_ALL_TESTS by         13;        /* Execute all tests just     */
                                                              /*  like the Mfg version      */
                                                              /*  of prom does              */
%replace GENERIC_CMD__RETURN_CMD_LIST               by   14;  /* Return a list of adap      */
                                                              /*  exec cmds                 */
%replace GENERIC_CMD__RETURN_COMMAND_INFO by       15;        /* Return info on             */
                                                              /*  specified cmd             */
%replace GENERIC_CMD__RETURN_TEST_INFO              by   16;  /* Return info on             */
                                                              /*  specified test            */
%replace GENERIC_CMD__BUFFER_READ_ACK               by   17;  /* ACK receipt of a dump      */
                                                              /*  buffer                    */
%replace GENERIC_CMD__INIT_MEMORY                   by   18;  /* Clear parity errs from     */
                                                              /*  memories                  */
%replace GENERIC_CMD__RUN_SHORT_TESTS               by   19;  /* Run the                    */
                                                              /*  short-test suite          */
%replace GENERIC_CMD__RETURN_REV_INFO               by   20;  /* Return the board sw rev    */
                                                              /*  and ID prom area          */
%replace GENERIC_CMD__DUMP_ALL_MEMORY               by   21;  /* Dump all adapter data      */
                                                              /*  memory and devices        */
%replace GENERIC_CMD__PANIC_DUMP_MEMORY by         22;        /* Dump critical pages for    */
                                                              /*  crash analysis            */
%replace GENERIC_CMD__DO_NEXT_DUMP_PAGE by         23;        /* Process the next dump      */
                                                              /*  page in sequence          */

/* Following is the last legal command in the generic sequence...                          */
%replace GENERIC_CMD__QUIESCE                   by  255;      /* Stop running tests         */
                                                              /*  -- await cmd              */

/* ------------------------------------------------------------------------------------ */
/* TEMP HACK:  Several commands currently used by the Enet boards were
               reassigned by this file on 5-Nov.  They will temporarily be
               reinstated to their previous values, until all software can
               be changed simultaneously.  At this time, dual mnemonics
               for these operations will be supplied, with the old values
               being listed as OLD_xxx and the new values assuming the
               simple form of the name.  ALL NEW SOFTWARE MUST support the
               new values as well as the old, until release is obtained,
               but old software will be obsoleted when the old values are
               dropped.  */

/* ------------------------------------------------------------------------------------ */
/* ************************************************************************************ */
/* Disable the following command at install time:
%replace GENERIC_CMD__QUIESCE                   by  128;  /* Shutdown current op            */
/* Disable the following command at install time:
%replace GENERIC_CMD__ALLOCATE_XFER_BUF by         133;  /* Give a large buffer            */
                                                          /*  to GIOC                       */
/* Disable the following command at install time:
```

```
%replace GENERIC_CMD__MOVE_BUF_TO_LOMEM by   134; /* Move allocated buffer   */
                                                  /*  to low memory          */
/* Disable the following command at install time:
%replace GENERIC_CMD__START_PROG_IN_MEM by   135; /* Xfer program control    */
                                                  /*  to an address          */
/* Disable the following command at install time:
%replace GENERIC_CMD__MOVE_LOMEM_TO_BUF by   136; /* Move low memory to      */
                                                  /*  allocated buffer       */
/* ********************************************************************** */

/* NOTE: This section is a command registry! */

/* ACOMM/CCOMM BOOT COMMANDS */

%replace BOOT_CMD__CONFIGURE_CONSOLE     by  257; /* Configure console       */
%replace BOOT_CMD__GIOC_MSG_OUT          by  258; /* Output msg to console   */
%replace BOOT_CMD__GIOC_BYTE_IN          by  259; /* Check for character     */
                                                  /*  from console           */
%replace BOOT_CMD__GIOC_MSG_IN           by  260; /* Input msg from console  */

/* DISK TESTS -- Only debugging commands are catalogued at this time */
%replace SMAC_CMD__WRITE_BLINDLY         by  270; /* Write block to disk     */
%replace SMAC_CMD__READ_BLINDLY          by  271; /* Read block from disk    */
%replace SMAC_CMD__WRITE_MULTI           by  272; /* Perform multiple-block  */
                                                  /*  dbg xfer               */
%replace SMAC_CMD__READ_MULTI            by  273; /* Perform multiple-block  */
                                                  /*  dbg xfer               */
%replace SMAC_CMD__CONTINUE_MULTI        by  274;


/* ENET TESTS -- All Enet tests are also assigned command numbers... */
%replace ENET_CMD__CONTROL_REG_TEST_0    by  284; /* Test control register   */
                                                  /*  bits                   */
%replace ENET_CMD__STATUS_REG_TEST_0     by  285; /* Test status register    */
                                                  /*  bits                   */
%replace ENET_CMD__MEMORY_TEST_0         by  286; /* Test all 0's patt on    */
                                                  /*  main mem               */
%replace ENET_CMD__MEMORY_TEST_1         by  287; /* Test all 1's patt on    */
                                                  /*  main mem               */
%replace ENET_CMD__MEMORY_TEST_2         by  288; /* Rotating bit pat on     */
                                                  /*  main mem               */
%replace ENET_CMD__MEMORY_TEST_3         by  289; /* Test main memory parity */
%replace ENET_CMD__MEMORY_TEST_4         by  290; /* Test main memory        */
                                                  /*  data=addrs             */
%replace ENET_CMD__MEMORY_TEST_5         by  291; /* Test fram parity        */
%replace ENET_CMD__MEMORY_TEST_6         by  292; /* Test fram               */
%replace ENET_CMD__MEMORY_TEST_7         by  293; /* Test fram               */
%replace ENET_CMD__RESTORE_ROM_VECTORS   by  294; /* Try to catch interrupts */
%replace ENET_CMD__TIMER_TEST_0          by  295; /* Test TIMER counter      */
%replace ENET_CMD__TIMER_TEST_1          by  296; /* Test TIMER interrupt    */
                                                  /*  logic                  */
%replace ENET_CMD__TIMER_TEST_2          by  297; /* Test TIMER interrupt    */
                                                  /*  mask logic             */
%replace ENET_CMD__TIMER_TEST_3          by  298; /* Test G_A TIMER          */
                                                  /* intervals               */
%replace ENET_CMD__TIMER_TEST_4          by  299; /* Test TIMER interrupts   */
%replace ENET_CMD__TIMER_TEST_5          by  300; /* Test TIMER interrupt    */
                                                  /*  mask logic             */
%replace ENET_CMD__LANCE_SETUP           by  301; /* Setup LANCE for         */
                                                  /*  xmit/receive           */
%replace ENET_CMD__LANCE_TEST_0          by  302; /* Stop the LANCE          */
%replace ENET_CMD__LANCE_TEST_1          by  303; /* Init the LANCE          */
%replace ENET_CMD__LANCE_TEST_2          by  304; /* Start the LANCE         */
%replace ENET_CMD__LANCE_TEST_3          by  305; /* Xmit a packet and       */
                                                  /*  check flags            */
%replace ENET_CMD__LANCE_TEST_4          by  306; /* Rcv xmit'd packet &     */
                                                  /*  check flags            */
%replace ENET_CMD__LANCE_TEST_5          by  307; /* Test LANCE interrupt    */
                                                  /*  logic                  */
%replace ENET_CMD__LANCE_TEST_6          by  308; /* Test LANCE interrupt    */
                                                  /*  mask logic             */
%replace ENET_CMD__LANCE_TEST_7          by  309; /* Test LANCE external     */
                                                  /*  loopback               */
%replace ENET_CMD__ALL_LANCE_TESTS       by  310; /* Stop the LANCE          */
```

```
/* ACOMM TESTS */
%replace ACOMM_CMD__MEMORY_TEST_0        by   323; /* Test with data = addrs  */
%replace ACOMM_CMD__MEMORY_TEST_1        by   324; /* Test with rotating      */
                                                   /*  pattern                */
%replace ACOMM_CMD__MEMORY_TEST_3        by   325; /* Parity error test       */
%replace ACOMM_CMD__CONTROL_REG_TEST_0   by   326; /* Test control/status     */
                                                   /*  regs                   */
%replace ACOMM_CMD__TIMER_TEST_0         by   327; /* Test timer counters     */
%replace ACOMM_CMD__TIMER_TEST_1         by   328; /* Test timer interrupts   */
%replace ACOMM_CMD__TIMER_TEST_2         by   329; /* Test timer interrupt    */
                                                   /*  mask                   */
%replace ACOMM_CMD__SCC_TEST_0           by   330; /* Test read/write         */
                                                   /*  scc regs               */
%replace ACOMM_CMD__SCC_TEST_1           by   331; /* Test scc                */
                                                   /*  loopback,polling       */
%replace ACOMM_CMD__SCC_TEST_2           by   332; /* Test scc                */
                                                   /*  loopback,interrupts    */
%replace ACOMM_CMD__SCC_TEST_3           by   333; /* Test scc sync loopback  */
%replace ACOMM_CMD__MEMORY_TEST_2        by   334; /* Execute scc_test_1      */
                                                   /*  in ram                 */
%replace ACOMM_CMD__SCC_EXT_LOOPBACK     by   335; /* Requires ext connectors */
%replace ACOMM_CMD__INIT_BOARD           by   336; /* Init ram, timers, scc's */

/* CCOMM TESTS */
%replace CCOMM_CMD__MEMORY_TEST_0        by   340; /* Test with data = addrs  */
%replace CCOMM_CMD__MEMORY_TEST_1        by   341; /* Test with rotating      */
                                                   /*  pattern                */
%replace CCOMM_CMD__MEMORY_TEST_3        by   342; /* Parity error test       */
%replace CCOMM_CMD__CONTROL_REG_TEST_0   by   343; /* Test control/status     */
                                                   /*  regs                   */
%replace CCOMM_CMD__TIMER_TEST_0         by   344; /* Test timer counters     */
%replace CCOMM_CMD__TIMER_TEST_1         by   345; /* Test timer interrupts   */
%replace CCOMM_CMD__TIMER_TEST_2         by   346; /* Test timer interrupt    */
                                                   /*  mask                   */
%replace CCOMM_CMD__SCC_TEST_0           by   347; /* Test read/write         */
                                                   /*  scc regs               */
%replace CCOMM_CMD__SCC_TEST_1           by   348; /* Test scc                */
                                                   /*  loopback,polling       */
%replace CCOMM_CMD__SCC_TEST_2           by   349; /* Test scc                */
                                                   /*  loopback,interrupts    */
%replace CCOMM_CMD__SCC_TEST_3           by   350; /* Test scc sync loopback  */
%replace CCOMM_CMD__MEMORY_TEST_2        by   351; /* Execute scc_test_1      */
                                                   /*  in ram                 */
%replace CCOMM_CMD__SCC_EXT_LOOPBACK     by   352; /* Requires ext connectors */
%replace CCOMM_CMD__INIT_BOARD           by   353; /* Init ram, timers, scc's */

/* UCOMM TESTS -- All Ucomm tests are also assigned command numbers... */
%replace UCOMM_CMD__CONTROL_REG_TEST_0   by   360; /* Test control            */
                                                   /*  register bits          */
%replace UCOMM_CMD__STATUS_REG_TEST_0    by   361; /* Test status             */
                                                   /*  register bits          */
%replace UCOMM_CMD__MEMORY_TEST_0        by   362; /* Test all 0's pattern    */
                                                   /*  on main mem            */
%replace UCOMM_CMD__MEMORY_TEST_1        by   363; /* Test all 1's pattern    */
                                                   /*  on main mem            */
%replace UCOMM_CMD__MEMORY_TEST_2        by   364; /* Rotating bit pat on     */
                                                   /*  main mem               */
%replace UCOMM_CMD__MEMORY_TEST_3        by   365; /* Test main memory parity */
%replace UCOMM_CMD__MEMORY_TEST_4        by   366; /* Test main memory        */
                                                   /*  data=addrs             */
%replace UCOMM_CMD__RESTORE_ROM_VECTORS  by   367; /* Maint - Try to catch    */
                                                   /*  interrupts             */
%replace UCOMM_CMD__TIMER_TEST_0         by   368; /* Test TIMER cntrs and    */
                                                   /*  zero timer             */
%replace UCOMM_CMD__TIMER_TEST_1         by   369; /* Test TIMER interrupt    */
                                                   /*  logic                  */
%replace UCOMM_CMD__TIMER_TEST_2         by   370; /* Test TIMER interrupt    */
                                                   /*  mask logic             */
%replace UCOMM_CMD__SCC_TEST_0           by   371; /* Write/Read SCC          */
                                                   /*  registers              */
%replace UCOMM_CMD__SCC_TEST_1           by   372; /* SCC non-interrupt       */
                                                   /*  loopback test          */
%replace UCOMM_CMD__SCC_TEST_2           by   373; /* SCC interrupt and       */
                                                   /*  loopback test          */
```

```
%replace UCOMM_CMD__SCC_TEST_3          by    374; /*            * NULL *          */
%replace UCOMM_CMD__SCC_TEST_4          by    375; /*            * NULL *          */
%replace UCOMM_CMD__SCC_TEST_5          by    376; /*            * NULL *          */
%replace UCOMM_CMD__SCC_TEST_6          by    377; /*            * NULL *          */
%replace UCOMM_CMD__DMAC_TEST_0         by    378; /* Test DMA regs with           */
                                                   /*  reads only                  */
%replace UCOMM_CMD__DMAC_TEST_1         by    379; /* Test DMA read/write          */
                                                   /*  registers                   */
%replace UCOMM_CMD__DMAC_TEST_2         by    380; /* Test DMAC/SCC r/w            */
                                                   /*  operations                  */
%replace UCOMM_CMD__DMAC_TEST_3         by    381; /* Test DMAC/SCC                */
                                                   /*  array operations            */
%replace UCOMM_CMD__DMAC_TEST_4         by    382; /* Test DMAC/SCC                */
                                                   /*  linked array ops            */
%replace UCOMM_CMD__DMAC_TEST_5         by    383; /* Test DMAC interrupts         */

/* CTAPE TESTS */

%replace CTAPE_CMD__GO_TO_APPL_CODE     by    400; /* Go to application code      */
%replace CTAPE_CMD__TEST_ALL            by    401; /* Run all tests                */
%replace CTAPE_CMD__MEMORY_TEST_0       by    402; /* Ram initialization           */
%replace CTAPE_CMD__MEMORY_TEST_1       by    403; /* Ram pattern test             */
%replace CTAPE_CMD__MEMORY_TEST_2       by    404; /* Ram address test             */
%replace CTAPE_CMD__MEMORY_TEST_3       by    405; /* Concurrent memory test       */
%replace CTAPE_CMD__SCSI_LOOPBACK       by    406; /* Scsi loopback test           */
%replace CTAPE_CMD__TIMER_TEST          by    407; /* G.A. interval                */
                                                   /*  timer test                  */
%replace CTAPE_CMD__INTERRUPT_TEST      by    408; /* Interrupt test               */
%replace CTAPE_CMD__COMPARATOR_TEST     by    409; /* Comparator test              */
/* Reserve the following for old software...
%replace CTAPE_CMD__DMA_TEST            by    410; /* Reserved for Bill            */
%replace CTAPE_BOOT                     by    410; /* Get tape fw magic ptrs       */
%replace CTAPE_CMD__DMA_TEST            by    411; /* DMA test                     */
%replace CTAPE_CMD__GATE_ARRAY_TEST     by    412; /* Set code, broken,            */
                                                   /*  red light tests             */

/* DISK COMMANDS */
%replace  DISK_CMD_BASE                 by 500;

%replace  DISK_LIST_CMD_MIN             by 532;   /* VOS list command 32 */
%replace  DISK_LIST_CMD_MAX             by 635;   /* VOS list command 135 */


/* ACOMMP COMMANDS */
%replace  MIN_ACOMMP_CMD                by 700;
%replace  MAX_ACOMMP_CMD                by 800;

/* other equates */

%replace  IOA_START_ADDR                by   0;
%replace  IOA_DIAG_MBX_PTR_ADDR         by   2098180;
%replace  IOA_BOARD_ID_PTR_ADDR         by   2098176;
%replace  IOA_MBX_STATUS_SUCCESS        by   61440;
%replace  IOA_UNIVERSAL_ADDR            by   -1;


/* %include 'board_id_structure' */;
/*  ***begin copyright*** *******************************  */
/*                                                        */
/*  STRATUS CONFIDENTIAL INFORMATION: CLASS II            */
/*  COPYRIGHT (c) Stratus Computer, Inc. 1985             */
/*                                                        */
/*  This  program  contains  confidential and proprietary */
/*  information  of  Stratus Computer,  Inc.,  and   any  */
/*  reproduction,  disclosure, or use in whole or in part */
/*  is   expressly   prohibited,   except   as   may   be */
/*  specifically authorized by prior written agreement or */
/*  permission of Stratus.                                */
/*                                                        */
/*  ***end copyright*** *********************************  */
/*  begin include file board_id_structure.incl.pl1        */

/*  Board Id pointer is in location 1024 of any adapter board
    and it points the board id structure in EEPROM.  Use utility
    function to get this pointer after selecting the adapter.
```

```
*/

%replace MAX            by   5;          /*allow last five board services*/
%replace ID_VERSION     by   2;          /* Version of the structure. */

dcl  board_id_ptr        ptr;

dcl  1 board_id          based (board_id_ptr),
       2 version         fixed bin (15),     /* Structure revision number */
       2 board_type      fixed bin (15),
       2 flags,
         3 bootable      bit (1),            /* adapter is bootable */
         3 self_test     bit (1),            /* adapter has self test */
         3 pad           bit (14),           /* unused */
       2 model           char (4),           /* alphanumeric model */
       2 serial_number   fixed bin (31),     /* board serial num */
       2 revision        fixed bin (15),     /* board revision level */
       2 art_work_rev    fixed bin (15),     /* board artwork level */
       2 min_gioc_rev    fixed bin (15),     /* gioc compatibility */
       2 num_serviced    fixed bin (15),     /* # of times serviced */
       2 history (MAX),                      /* board history */
         3 service_date  fixed bin (31),     /* repair info */
         3 service_code  fixed bin (15),
       2 code_checksum   fixed bin (15),     /* Calculated checksum. */
       2 checksum        fixed bin (15);     /* structure safety check */

/*  End include file board_id_structure.incl.pl1                 */

/* %nolist; %include  'error_codes'; %list; */
/* %include  'iop_dump_list' */;
/* Begin include file iop_dump_list */

%replace DUMP_EXTENSION_SIZE   by 50;
%replace INITIAL_DUMP_LIST_SIZE by 4;

dcl  dump_listp      ptr;
dcl  dump_strp       ptr;

dcl  1 dump_list_str based (dump_strp),
       2 n_entries        fixed bin (15),
       2 last_used        fixed bin (15),
       2 entriesp         ptr;

dcl  1 dump_list (dump_list_str.n_entries) based (dump_listp),
       2 dump_entry like dump_entries;

dcl  1 dump_entries based,
       3 page_num fixed bin (15),
       3 num_pgs  fixed bin (15);

dcl  1 initial_dump_entries (INITIAL_DUMP_LIST_SIZE)  external static,
       2 page_num fixed bin (15) initial (3068,    0, 3066, -1),
       2 num_pgs  fixed bin (15) initial (   4, 128,    1,  0);

/* End include file iop_dump_list */
/* %include  'iop_prom_mbx' */;
/* Begin iop_prom_mbx.incl.pl1 */

%replace  PROM_ID          by 'iop prom';
%replace  DUMP_STARTED     by 1;
%replace  DUMP_ENDED       by 2;

/* dcl  iop_prom_mbxps        ptr external static; */
dcl  iop_prom_mbxp       ptr;
dcl  iop_prom_mbxp_bit   bit(32) aligned;
dcl  iop_prom_mbxp_int   fixed bin(31) defined(iop_prom_mbxp_bit);

dcl  1 iop_prom_mbx      based(iop_prom_mbxp) volatile,
       2 id              char(8),
       2 status          fixed bin(15),
       2 dataw           fixed bin(15),
       2 datal           fixed bin(31),
       2 code            fixed bin(15),
       2 msg             char(80) var;
```

```
/* End iop_prom_mbx.incl.pl1 */
/* %include  'iop_prom_cfg' */;
/*       Initial boot configuration table.
         ---------------------------------
    This structure will remain in the iop just above the iop's stack.
*/

/*   sys_conp = sys_conp$    */
dcl  sys_conp              ptr;

dcl  1 sys_mcn             based( sys_conp ),
       2 slot              fixed bin(15), /* IOA chassis slot */
       2 flags,
         3 mbz             bit(14),
         3 rd_in_prog      bit(1),        /* START_READ in progress */
         3 cfg             bit(1),        /* Console configured */
       2 com_mbxp          ptr,           /* Pointer to vos comm mailbox */
       2 ioa_mbxp          ptr,           /* Pointer to ioa's mailbox */
       2 f_char            fixed bin(15), /* f_char in data; CLD:Channel state */
       2 count             fixed bin(15), /* number of characters being output */
       2 ucode_rev         fixed bin(15), /* Prom code revision level */
       2 model             char(4),       /* Board id. */
       2 io_lock           ptr,           /* Board interlock pointer. */
       2 io_blockp         ptr;           /* Pointer to vos-bound io_block */

/*   bdp = bdp$; */
/*   bdcbp = boot disk control block pointer    */
dcl  bdcbp                 ptr;
dcl  1 boot_disk           based( bdcbp ),
       2 slot              fixed bin(15),
       2 flags,
         3 mbz             bit(14),
         3 io_in_prog      bit(1),
         3 cfg             bit(1),
       2 disk_mbxp         ptr,
       2 virt_ptr          ptr,
       2 io_lock           fixed bin(31),
       2 state             fixed bin(15),
       2 ucode_rev         fixed bin(15),
       2 model             char(4);

/* IOP ES to PROM interface info. */
dcl  esip                  ptr;      /* Ptr to es interface structure. */

%replace  MIN_INT          by 1;
%replace  MAX_INT          by 16;
%replace  ES_VECX          by 15;

dcl  1 es                  based( esip ),
       2 running           bit(1) aligned,
       2 callback          entry( entry, fixed bin(31), fixed bin(31),
                                  fixed bin(15), fixed bin(31),
                                  fixed bin(15) ) variable,
       2 revoke_call       entry( fixed bin(31), fixed bin(15) ) variable,
       2 reset_list(0:15)       bit(1),
       2 vec(MAX_INT),
         3 number          fixed bin(15),
         3 pending         bit(1) aligned,
       2 next_vec          fixed bin(15),
       2 prom_mbxp         ptr,              /* Pointer to iop_prom_mbx */
       2 dump_listp        ptr,              /* Pointer to iop dump table */
       2 dump_list_ix      fixed bin(15), /* Next dump list entry index */
       2 dump_page_cnt     fixed bin(15), /* Index for multiple dump pages */
       2 last_used         fixed bin(15), /* Last dump list entry used. */
       2 dump_checksum     fixed bin(15), /* Dump list checksum. */
       2 syserr_wrt        entry( fixed bin(31) ),
       2 syserr_rd         entry( fixed bin(31) );
/* %include  'iop_prom_ext_stat' */;
/* Begin iop_prom_ext_stat.incl.pl1 */
/*   These are the external static variables used in the iop prom code.
     They are initialized in the module init_iop_prom_data.pl1
*/
dcl  next_buffer_rdy      bit(32) aligned ext static;
dcl  next_buffer_rdy_bin fixed bin(31) defined(next_buffer_rdy);
```

```
dcl  good_stat             bit(32) aligned ext static;
dcl  good_stat_bin         fixed bin(31) defined(good_stat);
dcl  op_in_prog            bit(32) aligned ext static;
dcl  op_in_prog_bin        fixed bin(31) defined(op_in_prog);
dcl  ioa_reset_otay_bits bit(32) aligned ext static;
dcl  ioa_reset_otays       fixed bin(31) defined(ioa_reset_otay_bits);
dcl  ioa_otays             bit(1) aligned ext static;
/* End iop_prom_ext_stat.incl.pl1 */
/* %include  'iop_prom_pgtbl' */;
/* Begin iop_prom_pgtbl.incl.pl1 */
/* NEW:   IOP prom virtual page table */

dcl  pgtblp          ptr;

dcl  1 vpgs                basec(pgtblp),
       2 disk(0:13),
         3 list_page       fixed bin(31),
         3 data_page       fixed bin(31),
       2 comm_io_blk_pg    fixed bin(31), /* Entry for system console io block */
       2 tape,
         3 list_page       fixed bin(31),
         3 data_page       fixed bin(31),
         3 mbx_page        fixed bin(31), /* VOS Tape mailbox. */
       2 prom_mbx          fixed bin(31),
       2 dump_page         fixed bin(31);

/* End iop_prom_pgtbl.incl.pl1 */
/* %include  'iop_eeprom_ptrs' */;
/* Begin PL/I eeprom pointer definitions. */

/* ioa addresses */
%replace  PBUS_BASE                 by 12582912;   /* '00C00000'b4 */
%replace  BOARD_ID_PTR              by 14681068;   /* 00E00400x */
%replace  SECTOR_BUFFER_ADDR        by 1048576;    /* '00100000'b4; Disk ioa. */

/* End PL/I eeprom pointer definitions. */

%include  'ioa_commands';      /* Gate array commands. */
/* %include  'ioa_mailbox' */;
/*                          ioa_mailbox.incl.pl1
                            --------------------

     This  include file contains the mailbox used to communicate
     between an IOA and the IOP.  Several  overlaid  definitions
     exist,  which  are used under different circumstances, such
     as dumping or IOA program debugging.

*/

/* Define typical IOA mailbox pointer.                                        */
dcl  ioa_mbxp            ptr; /* ioa_mbxp = contents of 200404x in ioa */
/* Original mbx template */
dcl  1 ioa_mbx   like ioa_mbx_template  based( ioa_mbxp );

dcl  1 ioa_mbx_template  based,
       2 command           fixed bin(15),
       2 buffer_addr       fixed bin(31),
       2 status            bit(32) aligned,
       2 f,
         3 ownership       bit(1),    /* = '0' = iop;  = '1' = ioa */
         3 mbz             bit(7),
         3 io_tag          char(1),
       2 msg_in            char(80) var,
       2 msg_out           char(80) var,
       2 more_info         bit(1) aligned,
       2 xtra_ptr          fixed bin(31);

/* Dump mailbox template */
dcl  1 ioa_mbx_dump   like ioa_mbx_dump_tpl based( ioa_mbxp );

dcl  1 ioa_mbx_dump_tpl  based,
       2 outbox_offset   char(92) var,        /* Not used for dumping            */
       2 mbz             fixed bin(15),       /* Must be zero for dump           */
       2 page_num        fixed bin(15),       /* Current adapter dump page       */
```

```
        2 data_type          fixed bin(15),       /* Dump data type                 */
        2 absolute_addr      fixed bin(31),       /* Real IOA addr of dump data     */
        2 buf_byte_cnt       fixed bin(15),       /* Num bytes xfer'd this time     */
        2 page_seq_num       fixed bin(15),       /* Adapter's seq # for page       */
        2 remaining_cnt      fixed bin(15);       /* Num bytes still to be xfer'd */
/*      2 unused_str_o       char(70) var;        /* Not used for dumping           */

/* Command info mailbox template */
dcl  1 ioa_mbx_cmdinfo      like ioa_mbx_c_i_tpl based( ioa_mbxp );

dcl  1 ioa_mbx_c_i_tpl      based,
        2 outbox_offset      char(92) var,        /* Not used for command info      */
        2 sw_rev             fixed bin(15);       /* Board's software revision      */
/*      2 unused_str_o       char(84) var;        /* Not used for dumping           */

%replace IOA_MAILBOX_PTR_ADDR by   2098180;
%replace IOP_OWNER by '0'b;
%replace IOA_OWNER by '1'b;

/*   Brief description of protocol for diagnostic usage.
     ----------------------------------------------------

     The  mailbox begins life with the IOP having ownership ( ownership =
     '0' ) and when the IOP has placed all the pertinent  information  in
     the box it will change ownership over to the IOA.  The IOP will then
     set the int_to_device bit in the IOA's Gate Array, which the adapter
     should  be  polling in order to know when a command has arrived.  It
     is not advised for the adapters to have their interrupts enabled  at
     this  point  in  time,  and  this  is  the  reason  for  polling the
     int_to_device bit.

     The  ownership  bit works in conjunction with the int_to_device bit.
     This should cover  the  case  where  an  adapter  detects  a  faulty
     int_to_device  bit.  Therefore  the  adapter  should  only process a
     command if the int_to_device bit and the ownership bit are both set.
     Structure definitions.
     ----------------------
     ioa_mbx.command ( input/output )
          - This is the command for the IOA to execute. On output it
            indicates the command executed by the IOA.

     ioa_mbx.buffer_addr ( input/output )
          - Universal buffer longword address. The address of the
            primary buffer for an operation is placed here.

     ioa_mbx.status ( output )
          - This will be filled in by the adapter indicating the
            status of the board, commands, etc...

     ioa_mbx.ownership ( input/output )
          - This bit defines who the current owner of the mailbox is.  If
            this bit = '0'b then the IOP currently owns the mailbox, otherwise
            the adapter has ownership.

     ioa_mbx.f.id_tag ( mailbox owner )
          - Id tag used by IOP-side processes only (not used by IOA)
            to encode owner of current mailbox op in order to prevent
            one IOP process from using another process's returned mbx.

     ioa_mbx.msg_in ( input )
          - This is defined as a char(80) varying buffer.  It will be command
            dependent and can therefore have different meanings with overlays
            describing it.  However, the first two bytes will always specify
            the number of bytes in the buffer.  Whether the commands choose to
            use them is up to the individual command.

     ioa_mbx.msg_out ( output )
          - This buffer is for the ioa to send data to the iop.  Again, the
            same applies to this buffer as to the .msg_in described above.

     ioa_mbx.more_info ( input/output )
          - On output this signifies that there is more information than
            will fit into the msg_out buffer. Input meaning is command
            dependent.
```

```
ioa_mbx.xtra_ptr ( input/output )
       - The meaning of this pointer is command dependent, though
         generally it is used as a pointer to extra data that would
         not fit in the primary buffer, or as the secondary pointer
         for a command.

*/
/* %include 'iop_default_dump_list'; */
/* %include 'iop_dump_constants'; */

/* Automatic */
dcl  byte_count     fixed bin(15); /* Used to track segmented ioa dumps */
dcl  checksum       fixed bin(15);
dcl  e_code         fixed bin(15);
dcl  ioa_slot       fixed bin(15);
dcl  ix             fixed bin(15);
dcl  next_char      fixed bin(15);
dcl  p              ptr;
dcl  vosp           ptr;
dcl  vosp_bin       fixed bin(31) defined(vosp);
dcl  time           fixed bin(31);
dcl  pagep          ptr;

/* Based */
dcl  page(1024)     fixed bin(31) based;
dcl  page_ch        char(4096) based;
dcl  stat_ovly      fixed bin(31) defined (ioa_mbx.status);

/* Entries */
dcl  bit8_to_char              entry( bit(8) ) returns( char(1) );
dcl  bin31_to_ptr              entry( fixed bin(31) ) returns( ptr );
dcl  bit32_to_ptr              entry( bit(32) aligned ) returns( ptr );
dcl  ptr_to_bin31              entry( ptr ) returns( fixed bin(31) );
dcl  ptr_to_bit32              entry( ptr ) returns( bit(32) aligned );

dcl  s$checksum_bytes          entry(ptr, fixed bin(15), fixed bin(15));

dcl  p$clear_command_pending   entry;

dcl  p$get_level               entry returns( fixed bin (15) );

dcl  p$set_level               entry( fixed bin(15) );

dcl  p$get_esi_ptr             entry() returns( ptr );

dcl  p$get_ioa_diag_mbxp       entry() returns( ptr );

dcl  p$get_prc_id_ptr          entry() returns( ptr );

dcl  p$get_ioa_slot            entry() returns( fixed bin(15) );

dcl  p$get_pcttl_ptr           entry() returns( ptr );

dcl  p$pio_adapt_select        entry (fixed bin);

dcl  p$send_diag_cmd           entry( fixed bin(15), fixed bin(15),
                                      fixed bin(31), fixed bin(15) );

dcl  p$send_ioa_cmd            entry( fixed bin(15), fixed bin(15) );

dcl  p$get_sbi_addr            entry() returns( fixed bin(31) );
                                               /* get ptr from sbi */

dcl  p$map_vos_addr            entry( fixed bin(31), fixed bin(31) )
                               returns( ptr );

dcl  p$reset_dma_access        entry (ptr, fixed bin);

dcl  p$readable_pg             entry(fixed bin(15))
                               returns(bit(1) aligned);

dcl  p$set_dma_access          entry (ptr, fixed bin);

dcl  p$transfer_write          entry (fixed bin(15), bit (32) aligned, ptr,
```

```
                              fixed bin(31), fixed bin (15), fixed bin (15));

cl  p$transfer_read           entry (fixed bin(15), bit (32) aligned, ptr,
                              fixed bin(31), fixed bin (15), fixed bin (15));

cl  p$transfer_verify         entry (fixed bin(15), bit (32) aligned, ptr,
                              fixed bin(31), fixed bin (15), fixed bin (15))
                              returns( bit(1) aligned );

cl  delta_time                entry( fixed bin(31) ) returns( fixed bin(31) );
cl  start_time                entry() returns( fixed bin(31) );

*   The default dump map is for iop prom primitive io and it
    consists of:
          - Translation map
          - IOP prom structures
          - IOP prom stack storage
          - IOP hardware registers; pages BFAx & BFBx
/
* Execution */

*   START_IOP_DUMP    */
tart_iop_dump: entry;

    pgtblp = p$get_pgtbl_ptr();
    esip = p$get_esi_ptr();
    es.prom_mbxp = p$map_vos_addr( p$get_spi_addr(), vpgs.prom_mbx );
    iop_prom_mbxp = es.prom_mbxp;
    iop_prom_mbx.code = 0;

    es.dump_list_ix = 1;      /* First entry to dump. */
    es.dump_page_cnt = 0;     /* Multiple dump entries. */

    dump_listp = es.dump_listp;
    if dump_listp = null()
    then do;
         iop_prom_mbx.status = e$inconsistent_device_state;
         iop_prom_mbx.code = e$inconsistent_device_state;
         call p$clear_command_pending;
         return;
         end;

    call p$checksum_bytes(dump_listp, (es.last_used * bytesize(dump_entries)),
                         checksum);
    if checksum ^= es.dump_checksum
    then do;
         iop_prom_mbx.status = e$inconsistent_device_state;
         iop_prom_mbx.code = e$iop_checksum_error;
         call p$clear_command_pending;
         return;
         end;

    /* If we make it here then it worked... */
    iop_prom_mbx.status = DUMP_STARTED;
    call p$clear_command_pending;
    return;


    IOP_GET_NEXT_DUMP_PAGE    */
p_get_next_dump_page: entry;

    pgtblp = p$get_pgtbl_ptr();
    esip = p$get_esi_ptr();
    /* MAP VOS DUMP PAGE */
    vosp = p$map_vos_addr( p$get_spi_addr(), vpgs.dump_page );
    iop_prom_mbxp = es.prom_mbxp;
    iop_prom_mbx.code = 0;

    dump_listp = es.dump_listp;

    if dump_listp = null()
    then do;
         iop_prom_mbx.status = e$end_of_file;
         call p$clear_command_pending;
```

```
        return;
        end;

   if dump_list(es.dump_list_ix).page_num = -1
   then do;
        iop_prom_mbx.status = e$end_of_file;
        call p$clear_command_pending;
        return;
        end;
   else do;
        if dump_list(es.dump_list_ix).page_num = IOP_REGS_BASE
        then call dump_hardware_regs( vosp );
        else do;
             pagep = ptr( (dump_list(es.dump_list_ix).page_num
                        + es.dump_page_cnt) * 4096);
             if p$readable_pg( dump_list(es.dump_list_ix).page_num
                        + es.dump_page_cnt)
             then vosp -> page_ch = pagep -> page_ch;
             else substr(vosp -> page_ch, 1, length(NO_READ_MSG))
                                                    = NO_READ_MSG;
             end;

        iop_prom_mbx.dataw = dump_list(es.dump_list_ix).page_num
                           + es.dump_page_cnt;

        /* Update used values. */
        es.dump_page_cnt = es.dump_page_cnt + 1;
        if dump_list(es.dump_list_ix).num_pgs = es.dump_page_cnt
        then do;
             es.dump_page_cnt = 0;
             es.dump_list_ix = es.dump_list_ix + 1;
             end;
        call p$clear_command_pending;
        return;
        end;

start_ioa_dump: entry;
     pgtblp = p$get_pgtbl_ptr();
     esip = p$get_esi_ptr();
     es.prom_mbxp = p$map_vos_addr( p$get_spi_addr(), vpgs.prom_mbx );
     iop_prom_mbxp = es.prom_mbxp;
     iop_prom_mbx.code = 0;

     ioa_slot = p$get_ioa_slot();
     call p$pio_adapt_select(ioa_slot);
     call p$send_ioa_cmd( ioa_slot, CMD_CLEAR_BROKEN );
     board_id_ptr = p$get_brd_id_ptr();
     if board_id.board_type = 0
     then goto START_IOA_FAULT_EXIT;

     /*   Issue the GENERIC_CMD__PANIC_DUMP_MEMORY command to ioa.
          If it fails, reset ioa and try again, otherwise set the DUMP_STARTED
          state and exit.
          If it fails a second time, then the ioa can not be dumped.
     */
     ix = 0;
     do while( ix <= 1 );
          call p$send_diag_cmd( ioa_slot, GENERIC_CMD__PANIC_DUMP_MEMORY, 2000,
                              e_code );
          if e_code ^= 0
          then do;
               if ix = 1 /* This was the second try, give up. */
               then goto START_IOA_FAULT_EXIT;
               ix = ix + 1;   /* Set = to pass 1 */

               /*   RESET IOA, THIS WILL ALLOW DEFAULT DUMP LIST TO BE DUMPED.
                    THIS SHOULD COVER THE CASE OF CODE CRASH. */
               call p$send_ioa_cmd( ioa_slot, CMD_RESET );
               call p$send_ioa_cmd( ioa_slot, CMD_CLEAR_CPU_RESET );
               time = start_time();
               /* Time reset out to 400ms.  This should be sufficient time to
                  initialize the mailbox ram. */
               do while( delta_time(time) < 400 * MSEC_IN_JIFFIES );
               end;
```

```
                call p$send_ioa_cmd( ioa_slot, CMD_CLEAR_BROKEN );
                ioa_mbxp = p$get_ioa_diag_mbxp();
                if ioa_mbxp = null()
                then goto START_IOA_FAULT_EXIT;
                else do;
                     if stat_ovly ^= ioa_reset_okays
                     then goto START_IOA_FAULT_EXIT;
                     end;
                end;
           else do;
                iop_prom_mbx.status = DUMP_STARTED;
                ix = 2;    /* Terminate loop. */
                end;
      end;

START_IOA_SUCCESS_EXIT:
      call p$clear_command_pending;
      return;

START_IOA_FAULT_EXIT:
      iop_prom_mbx.status = e$inconsistent_device_state;
      iop_prom_mbx.code = e$inconsistent_device_state;
      call p$clear_command_pending;
      return;


ioa_get_next_dump_page: entry;
      pgtblp = p$get_pgtbl_ptr();
      esip = p$get_esi_ptr();
      iop_prom_mbxp = es.prom_mbxp;
      iop_prom_mbx.code = 0;

      vosp = p$map_vos_addr( p$get_spi_addr(), vpgs.dump_page );
      ioa_slot = p$get_ioa_slot();
      call p$pio_adapt_select(ioa_slot);
      byte_count = 0;
      next_char = 1;
      ioa_mbxp = p$get_ioa_diag_mbxp();
      if ioa_mbxp = null()
      then do;
           iop_prom_mbx.status = e$inconsistent_device_state;
           iop_prom_mbx.code = e$inconsistent_device_state;
           goto IOA_GET_COMMON_EXIT;
           end;

      if ioa_mbx.ownership = IOA_OWNER
      then do;
           iop_prom_mbx.status = e$inconsistent_device_state;
           iop_prom_mbx.code = e$iop_ownership_conflict;
           goto IOA_GET_COMMON_EXIT;
           end;

      /* IOA ok to start dumping. */
      call p$send_diag_cmd( ioa_slot, GENERIC_CMD__DO_NEXT_DUMP_PAGE, 2000,
                            e_code );
      if e_code = e$dead_io_board | ioa_mbx_dump.buf_byte_cnt > 4096
       | stat_ovly ^= next_buffer_rdy_pin
      then do;
           if ioa_mbx_dump.buf_byte_cnt = 0
            & stat_ovly = good_stat_pin
           then iop_prom_mbx.status = e$end_of_file;
           else do;
                iop_prom_mbx.status = e$inconsistent_device_state;
                iop_prom_mbx.code = e$inconsistent_device_state;
                end;
           goto IOA_GET_COMMON_EXIT;
           end;

      do while (byte_count < 4096 & stat_ovly ^= good_stat_pin);
           byte_count = byte_count + ioa_mbx_dump.buf_byte_cnt;
           if byte_count > 4096
           then do;
                iop_prom_mbx.status = e$inconsistent_device_state;
                iop_prom_mbx.code = e$iop_invalid_byte_count;
```

```
               goto IOA_GET_COMMON_EXIT;
               end;
          else do;
               substr(vosp->page_ch, next_char, ioa_mbx_dump.buf_byte_cnt)
                 = substr(ptr(ioa_mbx_dump.absolute_addr + PBUS_BASE)->page_ch,
                            1, ioa_mbx_dump.buf_byte_cnt);
               next_char = next_char + ioa_mbx_dump.buf_byte_cnt;
               iop_prom_mbx.dataw = ioa_mbx_dump.page_num;
               end;
          call pssend_diag_cmd( ioa_slot, GENERIC_CMD__DO_NEXT_DUMP_PAGE, 2000,
                               e_code );
          if stat_ovly ^= next_buffer_rdy_bin & stat_ovly ^= good_stat_bin
          then do;  /* Not end of page and not another buffer... */
               iop_prom_mbx.status = e$inconsistent_device_state;
               iop_prom_mbx.code = e$inconsistent_device_state;
               goto IOA_GET_COMMON_EXIT;
               end;
     end;

IOA_GET_COMMON_EXIT:
     call psclear_command_pending;
     return;
dump_hardware_regs: proc( a_ptr );
dcl  a_ptr       ptr;
dcl  i           fixed bin(15);

     /* Dump scan ram first. */
     p = ptr( (IOP_REGS_BASE + 4096) + 3072 );
     do i = 1 to 128;
          a_ptr -> page(i) = p -> page(i);
     end;
     return;
end dump_hardware_regs;

end iop_dump;
/*   +++begin copyright+++ *******************************   */
/*                                                            */
/*   STRATUS CONFIDENTIAL INFORMATION: CLASS II               */
/*   COPYRIGHT (c) Stratus Computer, Inc. 1986                */
/*                                                            */
/*   This  program  contains  confidential and proprietary    */
/*   information  of  Stratus Computer,  Inc.,   and   any    */
/*   reproduction,  disclosure, or use in whole or in part    */
/*   is   expressly   prohibited,   except   as   may   be    */
/*   specifically authorized by prior written agreement or    */
/*   permission of Stratus.                                   */
/*                                                            */
/*   +++end copyright+++ *******************************      */

/*    IOP_UTIL : Collection of interfaces that deal directly
/*               with IOP hardware control.
/*
/* Beginning of modification history.
/*
/* Modified 85-11-20 by Pradip Gosalia Initial coding.
/*
/* Modified 85-12-05 by Tom Moser to add iop$get_level, iop$set_level
/*   iop$syserr, iop$syserr_force, iop$syslog, iop$syslog_force
/*
/* Modified 85-12-10 by Pradip Gosalia to add more routines for
/*                     pbus_manager.
/*
/* Modified 85-12-19 by Tom Moser to add iop$address_vos, iop$interrupt_os
/*
/* Modified 86-01-03 by Pradip Gosalia to use error codes from
/*                     iop_error_codes file.
/* Modified 86-01-06 by Pradip Gosalia to save current slected slot in
/*                     iop$rio_select_adapt
/* Modified 86-01-09 by Tom Moser to fix a bug in syserr code
/*
/* Modified 86-01-08 by Pradip Gosalia to update iop$reset_adapt.
/* Modified 86-01-10 by Pradip Gosalia to add routines for iop mapper.
/* Modified 86-01-22 by Pradip Gosalia to pass sub_chan_no in
/*                     iop$get_scan_int_status routine.
```

```
/* Modified 86-01-22 by Tom Moser to add dma routines
/* Modified 86-01-27 by Tom Moser to number slots 0-13 instead of 1-14
/* Modified 86-02-14 by Tom Moser to fix erroneous instrs and speed up
/*   iop$hcs_to_both dma
/* Modified 86-02-19 by Pradip Gosalia to add iop$init_stack, and fix a
/*                   bug in iop$map_one_page
/* Modified 86-02-26 by Pradip Gosalia to add iop$unlock_pbus routine
/* Modified 86-02-27 by Pradip Gosalia to board_id_ptr to board_type
/*                   in the iop$get_board_id_type routine
/* Modified 86-03-19 by Pradip Gosalia to add two map routines
/* Modified 86-03-19 by Pradip Gosalia to take old map routines
/* Modified 86-03-20 by Tom Moser to fix interrupt_os
/* Modified 86-03-21 by Tom Moser to add iop$verify_addr, hooks for
/*   bus error handler in dma code
/* Modified 86-03-21 by Tom Moser to add set_os_interrupt_vector
/* Modified 86-03-24 by Pradip Gosalia to add iop$send_ioa_cmd routine
/*                   and take out iop$reset_adapt, iop$clear_adapt_interrupt
/* Modified 86-03-26 by Tom Moser to merge iop/psi_util routines
/* Modified 86-10-15 by Martin Stokoe to use e$iop_ error codes */
/* End of modification history.
/* Any new entries that do not push stack frame must be
/* added BEFORE iop$begin_fast_utils; any that do, AFTER.

     priv      on

     equ       null,1

/*      incl      'iop_hardware_defs'
/*  +++begin copyright+++ ********************************  */
/*                                                          */
/*  STRATUS CONFIDENTIAL INFORMATION: CLASS II              */
/*  COPYRIGHT (c) Stratus Computer, Inc. 1985               */
/*                                                          */
/*  This program contains confidential and proprietary      */
/*  information of Stratus Computer, Inc., and any          */
/*  reproduction, disclosure, or use in whole or in part    */
/*  is expressly prohibited, except as may be               */
/*  specifically authorized by prior written agreement or   */
/*  permission of Stratus.                                  */
/*                                                          */
/*  +++end copyright+++ **********************************  */
/*     title     'IOP hardware definitions'

/*   Beginning of modification history.
/* Modified 86-10-31 by Bill Snapper to change prom_hi, map, and certain
/*              virtual address constants to reflect new prom_hi address.
/*   End of modification history.

equ  iop_map_table_start,     00EFC000x
equ  offset_user_start,  0000700x       /* '00EFC700'b4
equ  offset_user_end,    00002EF4x      /* '00EFEEF4'b4; virt page 8BDx

/* Actual table end = EFEF7Cx but the last 34 virtual pages have been reserved
/* by the eeprom for primitive io.  Therefore the last virtual address for the
/* ES = 8D7FFFx

/* REMOVED: 11/3/86: Not used anywhere???
/* equ  offset_table_end,   00002F5Cx       /* '00EFEF5C'b4

equ  readable,  '00008000'b4  /* readable page
equ  writeable, '00004000'b4  /* writeable page
equ  priv,      '00002000'b4  /* privileged
equ  local,     '00001000'b4  /* local memory
equ  interlock, '00000800'b4  /* interlock
equ  io_access, '00000400'b4  /* access to vos
equ  dma,       '00000200'b4  /* dma access
equ  spr,       '00000100'b4  /* spare

equ  iop_map_lower_address,   007FFFFx
equ  iop_map_higher_address,  0000000x

equ  OS_BASE,   00200000x  /* offset of OS image in memory
/* Actually 8DF000x but see above note.
equ  VM_STACK,  008D7000x  /* top virtual stack address
```

```
equ  ram,        00000000x  /* ram start address
equ  page,       4096
equ  ram_size,   0007FFFFx  /* size of ram is 512 Kbytes
equ  prom_lo,    00000000x  /* rom start address  when low
equ  prom_hi,    00BE0000x  /* rom start address  when high

equ  set.,  '00008000'b4       /* for setting control bits
equ  clr.,  '00000000'b4       /* for clearing control bits
equ  mask.,     clr.           /* for masking interrupts
equ  unmask.,   set.           /* for unmasking interrupts

equ  iop$sync_sel,  00BF8000x  /* page used for board syncing

equ  iop$adapt_cmd,  00BF9002x /* adapter local command
equ  set_cmd., 80x              /* for sending cmd to adapter
     equ  cmd_reset, 00         /* do reset
     equ  cmd_clear_int, 01     /* clear interrupt
     equ  cmd_toggle_obey_p, 02 /* toggle obey p
     equ  cmd_toggle_obey_q, 03 /* toggle obey q
     equ  cmd_clear_broken, 04  /* clear broken
     equ  cmd_set_broken, 05    /* set broken
     equ  cmd_int_device, 06    /* interrupt device
     equ  cmd_clear_cpu_reset, 07 /* clear cpu reset

equ  iop$dma_read,   00BF9004x  /* select adapter for dma read

equ  iop$dma_write, 00BF9008x  /* select adapter for dma write

equ  iop$dma_verify, 00BF900Cx /* select adapter for dma verify

equ  iop$timer_data,00BFA000x   /* timer data register --- read/write
                                /*   never access as a long word

equ  iop$timer_cont,00BFA002x   /* timer control register ---

equ  checksum, 00BFA400x     /* read checksum word

equ  diag_checksum_wrt, 00BFEC00x  /* Diagnostic path for testing checksum; WR

     /* P BUS CONTROL WORD */
equ  iop$pbus_ctrl,     00BFA400x    /* p bus control write

     equ p_bus_enable,   07    /* P bus enable
     equ p_berr_enable, 06    /* p bus berr enable
     equ scan_enable,    05    /* enable scanner
     equ scan_run,       04    /* start scanner
     equ timer_mask,     03    /* timer mask/clear
     equ set_level1,     02    /* generate level 1 interrupt
     equ privL,          01    /* priv
     equ p_bus_lockL,    00    /* Pbus lock

     /* SCANNER INTERFACE */
equ  iop$scan_listw,     00BFAC00x   /* spare for write, word access.
equ  iop$scan_listb,     00BFAC01x   /* through 00BFADFF, odd bytes only!
                                        /* bits 7-4 slot number
                                        /* bits 3-0 TBD
     equ SCAN_RAM_SIZE,  255            /* 0-255 entries in scan_list

equ  iop$scan_int_status,  00BFA800x   /* read scanner status register
     equ adap_alive,      15              /* slot alive
     equ adap_interrupt, 14              /* adapter interrupt
     equ adap_obey_p,     13              /* bus obey
     equ adap_obey_q,     12              /* bus obey
                                          /* bits 11-8 tbd
                                          /* bits 7-4 slot num
                                          /* bits 3-0 tbd

     /* PIO SELECT INTERFACE */
equ  iop$pio_select, 00BFA801x      /* PIO select address

equ  iop$bdcs,        00BF9000x  /* control / status x --- read
     equ  bdcs_broken,    15    /* read only
     equ  bdcs_broken2,   14    /* read only
     equ  bdcs_rembar,    13    /* read only, write broken2 to clear
```

```
     equ   bdcs_memcomp,  12   /* read only, write broken2 to clear
     equ   bdcs_timask,   11   /* read timer mask
     equ   bdcs_pkcomp,   10   /* self test bit
     equ   bdcs_cmdpend,  09   /* command pending
     equ   bdcs_statchg,  08   /* status change bit
     equ   bdcs_side,     07   /* side D if one, C if zero, read only
     equ   bdcs_ipend,    06   /* an interrupt req. on sb is pending,
     equ   bdcs_partner,  05   /* board can be partnered,
     equ   bdcs_zout_gt,  04   /* read bus protect/enable
     equ   bdcs_level1,   03   /* level1 interrupt
     equ   bdcs_romhigh,  02   /* rom is high, read, set, clear
     equ   bdcs_cmd_mask, 01   /* int mask for commands (sbi)
     equ   bdcs_imask,    00   /* int mask for all conditions and levels

     /* write equates for bdcs */

     equ   bdcs_pbusenb,  07   /* Pbus enable
     equ   bdcs_qbusenb,  06   /* Qbus enable
     equ   partnered,     05   /* used to pair boards
     equ   zout_gt,       04   /* bus enable bit
     equ   set_pbus_force,03   /* set PBUS_force bit
     equ   prom_is_high,  02   /* set prom to high address
     equ   imask_istat,   01   /* interrupt mask for cmd pending
     equ   imask_all,     00   /* mask for all conditions

     /* STATUS BUS COMMAND INTERFACE */
equ  iopsread_cmd,  00EFB401x   /* start of eight bytes of data for
                                /*   command specification --- read only

equ  iopsread_pntr, 00BFB801x  /* read pointer associated with cmd

equ  inum,       00BFB801x   /* interrupt number for external
                               /*  interrupt  write

equ  inum.word, 00EFB800x   /* interrupt number for external
                               /*  interrupt  write as a word

     /* BOARD CONTROL WORD */
equ  iopbord_ctrl,  00EFB400x   /*  board control location

     equ   clr_broken ,   07   /* clear broken flag
     equ   clr_broken2,   06   /* clears broken2 flag,
                               /* mem parity, mem compare err
     equ   clr_chksum,    05   /* TBD
     equ   sync_jiffy,    04   /* sync the clocks
     equ   set_int_req,   03   /* generate external request
     equ   clr_dma_enb,   02   /* clear self test bit
     equ   clr_cmd,       01   /* clear command pending
     equ   clr_stat_chng,00    /* clear status change bit
     /* P BUS STATUS WORD */
equ  iopfr_status,    00EFB000x

     equ dma_vfy_ok,       15   /* dma verify ok
     equ dma_wrt,          14
     equ dma_rd,           13
     equ scan_int,         12   /* scanner interrupt (activelow)
     equ scan_up,          11   /* scanner active (enable*running)
     equ pbus_force,       10
     equ pside_enb,        9    /* P bus enabled
     equ qside_enb,        8    /* Q bus enabled
     equ pbus_diag,        7    /* P bus diag force bus
     equ pbus_obey_er,     6    /* Pbus obey error
     equ pbus_sel_er,      5    /* Pbus select error
     equ pbus_berr_en,     4    /* Pbus select berr enabled
     equ pbus_enb,         3    /* Pbus enabled
     equ pbus_lock,        2    /* pbus lock lock= low
     equ obey_q,           1    /* obey q bus
     equ obey_p,           0    /* obey p bus

     /* adapter memory location */
equ  start_adapt_mem,          00000000x

     /* terminator memory location */
equ  term_mem_loc,          00100000x
```

```
     /* terminator memory location */
equ  term_dual_addr_loc,   00300000x

     /* board id ptr location, offset */
equ  board_id_loc, 200400x

/*   Static storage area for eeprom.  The following locations are in the
/*   upper portion of the map that are unusable for virtual mapping.  They
/*   are only 24 bit words (bits 31-08) since the lower byte does not exist.
/*   The locations available are 00BFEFA0x - 00BFFFFCx.
/*
/*   These locations are initialized by the eeprom and should only be used
/*   for containing data necessary for initial communication between the
/*   eeprom and the environment software.

equ  MAP_TOP,  00BFEF7Cx       /* Highest usable map entry for virtual mapping.

equ  map_esip, 00BFFFC4x       /* Holds the pointer to es interface structure.
equ  sys_cons, 00BFFFC8x       /* Holds the pointer to the system_console "
/*      incl       'iop_equip_table'
/* Begin include file ...iop_equip_table.incl.asm
/* Generated at 87-04-05 22:26:57 EDT by cv_incl Release 6.alpha.g from
/*      %es#m6>Stratus>Tom_Moser>iop>devdep>iop_equip_table.incl.pl1.

      equ        MAX_ENTITIES,8
      equ        NUM_OF_SLOTS,13
      equ        MAX_CHANNELS,512
      equ        MIN_PRIORITY,1
      equ        DEFAULT_PRIORITY,256
      equ        MAX_PRIORITY,256
      equ        IOP_DISK_ENTITY_ID,1
      equ        IOP_COMM_ENTITY_ID,2
      equ        IOP_CTAPE_ENTITY_ID,3
      equ        IOP_TEST_ENTITY_ID,8
      extvar.b   equip_tableps(4)
      use        'stat_tbl',dummy
stat_tbl:
stat_tbl.alive.byte:
      equ        stat_tbl.alive.bit,31
      equ        stat_tbl.alive.mask,'80000000'b4
stat_tbl.initialized.byte:
      equ        stat_tbl.initialized.bit,30
      equ        stat_tbl.initialized.mask,'40000000'b4
stat_tbl.testing.byte:
      equ        stat_tbl.testing.bit,29
      equ        stat_tbl.testing.mask,'20000000'b4
stat_tbl.loading.byte:
      equ        stat_tbl.loading.bit,28
      equ        stat_tbl.loading.mask,'10000000'b4
stat_tbl.running.byte:
      equ        stat_tbl.running.bit,27
      equ        stat_tbl.running.mask,'08000000'b4
stat_tbl.prom_start.byte:
      equ        stat_tbl.prom_start.bit,26
      equ        stat_tbl.prom_start.mask,'04000000'b4
stat_tbl.exception.byte:
      equ        stat_tbl.exception.bit,25
      equ        stat_tbl.exception.mask,'02000000'b4
stat_tbl.burning_prom.byte:
      equ        stat_tbl.burning_prom.bit,24
      equ        stat_tbl.burning_prom.mask,'01000000'b4
                                                            ds.b 1
stat_tbl.broken.byte:
      equ        stat_tbl.broken.bit,23
      equ        stat_tbl.broken.mask,'00800000'b4
stat_tbl.pad:
      equ        stat_tbl.pad.bit,0
      equ        stat_tbl.pad.mask,'007FFFFF'b4
                                                            ds.b 3
      equ        stat_tbl.length,4
      use        'code'

      use        'entity_tbl',dummy
entity_tbl:
```

```
entity_tpl.e_ptr:                                        ds.b 4
entity_tpl.e_fb15:                                       ds.b 2
     equ       entity_tpl.length,6
     use       'code'

     use       'equip_table',dummy
equip_table:
equip_table.slot:
equip_table.slot.entity:                                 ds.b 2
equip_table.slot.adapt_type:                             ds.b 2
equip_table.slot.priority:                               ds.b 2
equip_table.slot.status:
equip_table.slot.status.alive.byte:
     equ       equip_table.slot.status.alive.bit,31
     equ       equip_table.slot.status.alive.mask,'80000000'b4
equip_table.slot.status.initialized.byte:
     equ       equip_table.slot.status.initialized.bit,30
     equ       equip_table.slot.status.initialized.mask,'40000000'b4
equip_table.slot.status.testing.byte:
     equ       equip_table.slot.status.testing.bit,29
     equ       equip_table.slot.status.testing.mask,'20000000'b4
equip_table.slot.status.loading.byte:
     equ       equip_table.slot.status.loading.bit,28
     equ       equip_table.slot.status.loading.mask,'10000000'b4
equip_table.slot.status.running.byte:
     equ       equip_table.slot.status.running.bit,27
     equ       equip_table.slot.status.running.mask,'08000000'b4
equip_table.slot.status.prom_start.byte:
     equ       equip_table.slot.status.prom_start.bit,26
     equ       equip_table.slot.status.prom_start.mask,'04000000'b4
equip_table.slot.status.exception.byte:
     equ       equip_table.slot.status.exception.bit,25
     equ       equip_table.slot.status.exception.mask,'02000000'b4
equip_table.slot.status.burning_prom.byte:
     equ       equip_table.slot.status.burning_prom.bit,24
     equ       equip_table.slot.status.burning_prom.mask,'01000000'b4
                                                         ds.b 1
equip_table.slot.status.broken.byte:
     equ       equip_table.slot.status.broken.bit,23
     equ       equip_table.slot.status.broken.mask,'00800000'b4
equip_table.slot.status.pad:
     equ       equip_table.slot.status.pad.bit,0
     equ       equip_table.slot.status.pad.mask,'007FFFFF'b4
                                                         ds.b 3
     equ       equip_table.slot.status.length,4
equip_table.slot.entity_data:
equip_table.slot.entity_data.e_ptr:                      ds.b 4
equip_table.slot.entity_data.e_fb15:                     ds.b 2
     equ       equip_table.slot.entity_data.length,6
     equ       equip_table.slot.length,16
                                                         ds.b 208
     equ       equip_table.slot.dim,14
equip_table.entity:
equip_table.entity.type:                                 ds.b 2
equip_table.entity.status:
equip_table.entity.status.alive.byte:
     equ       equip_table.entity.status.alive.bit,31
     equ       equip_table.entity.status.alive.mask,'80000000'b4
equip_table.entity.status.initialized.byte:
     equ       equip_table.entity.status.initialized.bit,30
     equ       equip_table.entity.status.initialized.mask,'40000000'b4
equip_table.entity.status.testing.byte:
     equ       equip_table.entity.status.testing.bit,29
     equ       equip_table.entity.status.testing.mask,'20000000'b4
equip_table.entity.status.loading.byte:
     equ       equip_table.entity.status.loading.bit,28
     equ       equip_table.entity.status.loading.mask,'10000000'b4
equip_table.entity.status.running.byte:
     equ       equip_table.entity.status.running.bit,27
     equ       equip_table.entity.status.running.mask,'08000000'b4
equip_table.entity.status.prom_start.byte:
     equ       equip_table.entity.status.prom_start.bit,26
     equ       equip_table.entity.status.prom_start.mask,'04000000'b4
equip_table.entity.status.exception.byte:
```

```
     equ        equip_table.entity.status.exception.bit,25
     equ        equip_table.entity.status.exception.mask,'02000000'b4
equip_table.entity.status.burning_prom.byte:
     equ        equip_table.entity.status.burning_prom.bit,24
     equ        equip_table.entity.status.burning_prom.mask,'01000000'b4
                                                   ds.b 1
equip_table.entity.status.broken.byte:
     equ        equip_table.entity.status.broken.bit,23
     equ        equip_table.entity.status.broken.mask,'00800000'b4
equip_table.entity.status.pad:
     equ        equip_table.entity.status.pad.bit,0
     equ        equip_table.entity.status.pad.mask,'007FFFFF'b4
                                                   ds.b 3
     equ        equip_table.entity.status.length,4
equip_table.entity.entity_data:
equip_table.entity.entity_data.e_ptr:              ds.b 4
equip_table.entity.entity_data.e_fb15:             ds.b 2
     equ        equip_table.entity.entity_data.length,6
equip_table.entity.cmd_entry:                      ds.b 12
equip_table.entity.config_entry:                   ds.b 12
equip_table.entity.slot_entry:                     ds.b 12
     equ        equip_table.entity.length,48
                                                   ds.b 336
     equ        equip_table.entity.dim,8
equip_table.channel:
equip_table.channel.entity:                        ds.b 2
equip_table.channel.owner:                         ds.b 2
equip_table.channel.limit:                         ds.b 2
equip_table.channel.status:
equip_table.channel.status.alive.byte:
     equ        equip_table.channel.status.alive.bit,31
     equ        equip_table.channel.status.alive.mask,'80000000'b4
equip_table.channel.status.initialized.byte:
     equ        equip_table.channel.status.initialized.bit,30
     equ        equip_table.channel.status.initialized.mask,'40000000'b4
equip_table.channel.status.testing.byte:
     equ        equip_table.channel.status.testing.bit,29
     equ        equip_table.channel.status.testing.mask,'20000000'b4
equip_table.channel.status.loading.byte:
     equ        equip_table.channel.status.loading.bit,28
     equ        equip_table.channel.status.loading.mask,'10000000'b4
equip_table.channel.status.running.byte:
     equ        equip_table.channel.status.running.bit,27
     equ        equip_table.channel.status.running.mask,'08000000'b4
equip_table.channel.status.prom_start.byte:
     equ        equip_table.channel.status.prom_start.bit,26
     equ        equip_table.channel.status.prom_start.mask,'04000000'b4
equip_table.channel.status.exception.byte:
     equ        equip_table.channel.status.exception.bit,25
     equ        equip_table.channel.status.exception.mask,'02000000'b4
equip_table.channel.status.burning_prom.byte:
     equ        equip_table.channel.status.burning_prom.bit,24
     equ        equip_table.channel.status.burning_prom.mask,'01000000'b4
                                                   ds.b 1
equip_table.channel.status.broken.byte:
     equ        equip_table.channel.status.broken.bit,23
     equ        equip_table.channel.status.broken.mask,'00800000'b4
equip_table.channel.status.pad:
     equ        equip_table.channel.status.pad.bit,0
     equ        equip_table.channel.status.pad.mask,'007FFFFF'b4
                                                   ds.b 3
     equ        equip_table.channel.status.length,4
equip_table.channel.entity_data:
equip_table.channel.entity_data.e_ptr:             ds.b 4
equip_table.channel.entity_data.e_fb15:            ds.b 2
     equ        equip_table.channel.entity_data.length,6
     equ        equip_table.channel.length,16
                                                   ds.b 8176
     equ        equip_table.channel.dim,512
     equ        equip_table.length,8800
     use        'code'

/* End include file ...iop_equip_table.incl.asm
```

```
/*	incl	'iop_error_codes'

	extcat	iop$begin_fast_utils
iop$begin_fast_utils:
	ds.w	0

	title '************  iop$add_scan_entry  **********'

/*	IOP$ADD_SCAN_ENTRY - adds a slot number at the specified
/*			place in the scanner list.

/*	dcl  iop$add_scan_entry		entry (fixed bin, fixed bin);
/*	dcl  place_index		fixed bin;
/*	dcl  slot_no			fixed bin;
/*	     call iop$add_scan_entry (place_index, slot_no);

	extdef	iop$add_scan_entry

iop$add_scan_entry:

	movem.l	4(a7), a0;a1		/* addr (params)
	move.w	(a0), d0		/* place_index
	mulu	=2, d0			/* to access odd bytes
	move.w	(a1), d1		/* slot_no
	mulu	=16, d1			/* slot_no in bits 7-4
	or.w	=00Fx, d1		/* bits 3-0 = '1'b

	movea.l	=iop$scan_listw + 1, a0 /* addr for byte writing of scanner
	move.b	d1, 0(a0,d0.w)		/* add the entry
	rts

	title '************  iop$continue_scanner  **********'

/*	IOP$CONTINUE_SCANNER - restarts scanner from the next slot
/*			in the scanner list.

/*	dcl  iop$continue_scanner	entry ();
/*	     call iop$continue_scanner;

	extdef	iop$continue_scanner

iop$continue_scanner:

	move.w	=clr.!scan_run, iop$pbus_ctrl	/* continue from next
	move.w	=set.!scan_run, iop$pbus_ctrl	/* entry
	rts

	title '************  iop$diag_pbus  **********'
/*	IOP$DIAG_PBUS - runs diagnostic tests on the pbus and returns
/*			good (0) or bad code.

/*	dcl  iop$diag_pbus		entry (fixed bin);
/*	dcl  code			fixed bin;
/*	     call iop$diag_pbus (code);

	extdef	iop$diag_pbus

iop$diag_pbus:

	movea.l	4(a7), a0
	move.w	=0, (a0)		/* code = 0, pbus is fine
	rts

	title '************  iop$disable_pbus_bus_error  **********'

/*	IOP$DISABLE_PBUS_BUS_ERROR - disables PBUS bus error.
/*
/*	dcl  iop$disable_pbus_bus_error	entry ();
/*	     call iop$disable_pbus_bus_error;

	extref	iop$disable_pbus_bus_error
```

```
iop$disable_pbus_bus_error:

     move.w    =clr.!p_berr_enable, iop$pbus_ctrl
     rts


     title '***********  iop$enable_pbus_bus_error  **********'

/*   IOP$ENABLE_PBUS_BUS_ERROR - enables PBUS bus error.
/*
/*   dcl  iop$enable_pbus_bus_error    entry ();
/*        call iop$enable_pbus_bus_error;

     extdef    iop$enable_pbus_bus_error

iop$enable_pbus_bus_error:

     move.w    =set.!p_berr_enable, iop$pbus_ctrl
     rts


     title '***********  iop$get_board_type  **********'

/*   IOP$GET_BOARD_TYPE - returns board type for the currently
/*                        selected board (adapter) or zero if no board

/*   dcl  iop$get_board_type        entry () returns (fixed bin);
/*   dcl  board_type                fixed bin;
/*   board_type = iop$get_board_id_ptr();

     extdef    iop$get_board_type

iop$get_board_type:

     movea.l   =start_adapt_mem, a0             /* a0 = c00000x
     adda.l    =board_id_loc, a0                /* a0 = board id ptr loc
     movea.l   (a0), a0                         /* a0 = ptr to board id
     cmpa.l    =0, a0                           /* board there?
     beq       type_zero                        /* jump if not
     cmpa.l    =1, a0                           /* is it null pointer
     beq       type_zero                        /* jump if so

     adda.l    =start_adapt_mem, a0             /* add offset
     adda.l    =2, a0                           /* we need board type
     move.w    (a0), d0                         /* get it
     rts

type_zero:
     move.w    =0, d0
     rts                                        /* return type of zero


     title '***********  iop$get_scan_int_status  **********'

/*   IOP$GET_SCAN_INT_STATUS - gets status information for scanner
/*                             interrupt.

/*   dcl  iop$get_scan_int_status  entry (fixed bin, fixed bin, bit(1) aligned,
/*                                        bit(1) aligned);
/*   dcl  slot_no                  fixed bin;
/*   dcl  sub_chan_no              fixed bin;
/*   dcl  alive                    bit (1) aligned;
/*   dcl  interrupt                bit (1) aligned;
/*        call iop$get_scan_int_status (slot_no, alive, interrupt);

     extdef    iop$get_scan_int_status

iop$get_scan_int_status:

     movem.l   4(a7), a1:a2:a3:a4               /* addr (params)
     move.w    iop$scan_int_status, d0          /* d0 = int_status
     btst      =adap_alive, d0                  /* test bit
     bne       $yes                             /* on
```

```
     move.w     =0, (a3)                              /* return '0'b
     bra        $testint

$yes:

     move.w     =8000x, (a3)                          /* return '1'b

$testint:

     btst       =adap_interrupt, d0                   /* test bit
     bne        $yes1                                 /* on
     move.w     =0, (a4)                              /* return '0'b
     bra        $slotno

$yes1:

     move.w     =8000x, (a4)                          /* return '1'b

$slotno:

     move.l     d0, d1                                /* copy
     and.w      =00F0x, d0                            /* slot num bits 7-3
     lsr.w      =4, d0                                /* slot num bits 3-0
     move.w     d0, (a1)                              /* return slot num

     and.w      =000Fx, d1                            /* sub_chan_no in d1
     move.w     d1, (a2)                              /* return sub_chan_no
     rts

     title '***********  iop$init_next_ptr  **********'

/*   IOP$INIT_NEXT_MAP_PTR - initializes the next entry pointer for
/*                           the map table.

/*   dcl  iop$init_next_map_ptr        entry ();
/*        call iop$init_next_map_ptr;

     extdef     iop$init_next_map_ptr

iop$init_next_map_ptr:

     movea.l    iop$next_map_entry_link, a0   /* get address
     move.l     =iop_map_table_start, d0
     add.l      =offset_user_start, d0
     move.l     d0, (a0)                      /* store starting address
     rts

     title '***********  iop$init_scan_list  **********'

/*   IOP$INIT_SCAN_LIST - initializes the scanner list with
/*                        terminating ('FF'b4) value.

/*   dcl  iop$init_scan_list        entry ();
/*        call iop$init_scan_list;

     extdef     iop$init_scan_list

iop$init_scan_list:

     move.l     =SCAN_RAM_SIZE, d1        /* loop count
     move.l     =0FFx, d0                 /* terminating entry
     movea.l    =iop$scan_listw, a0       /* address for word writing of scanner

$init_scan:

     move.w     d0, (a0)+
     dbra       d1, $init_scan            /* do it for full list

     rts

     title '***********  iop$init_stack  **********'
```

```
/*   IOP$INIT_STACK - swaps temp stack with real stack.

/*   dcl  iop$init_stack              entry (stack_addr);
/*   dcl  stack_addr                  fixed bin (31);
/*        call iop$init_stack (stack_addr);
     extdef    iop$init_stack

iop$init_stack:

     movea.l   4(a7), a0
     movea.l   (a0), a7              /* swap stack address
     movem.l   iop$init2_link, a4;a5
     jsr       (a4)

     title '***********  iop$map_no_pages  **********'

/*   IOP$MAP_NO_PAGES - initializes blocks of pages for the required
/*                      access

/*   dcl  iop$map_no_pages           entry (bit (32) aligned, fixed bin (15),
/*                                          bit (8) aligned, fixed bin (15));
/*   dcl  start_address               bit (32) aligned;
/*   dcl  num_of_pages                fixed bin (15);
/*   dcl  flag                        bit (8) aligned;
/*      bit defination for flag
/*        read_access     7    1 = yes, 0 = no
/*        write_access    6    1 = yes, 0 = no
/*        priv_access     5    1 = yes, 0 = no
/*        local_memory    4    1 = local, 0 = main(vos)
/*        inter_lock      3    1 = yes, 0 = no
/*        io_st_bus       2    1 = yes, 0 = no
/*        dma             1    1 = yes, 0 = no
/*        unused          0
/*
/*   dcl  code                        fixed bin (15);
/*        call iop$map_no_pages      (start_address, num_of_pages, flag,
/*                                     code);

     extdef    iop$map_no_pages

iop$map_no_pages:

     movem.l   4(a7), a0;a1;a2;a3  /* addr (parameters)
     move.l    (a0), d0            /* current_address = start_address
     move.w    (a1), d1            /* loop count = num_of_pages
     sub.w     =1, d1              /* loop count: num_of_pages-1 to 0
     move.l    =0, d2              /*
     move.b    (a2), d2            /* get flag
     lsl.w     =8, d2              /* move to bits 15-8

$iop_map_loop:

     cmp.l     =iop_map_lower_address, d0
     ble       $iop_map_lower             /* jump if lower portion
     move.w    =es$iop_invalid_address, (a3) /* return error code
     rts

$iop_map_lower:

     movea.l   =iop_map_table_start, a4
     move.l    d0, d3                 /* d3 = d0
     and.l     =07FFF000x, d3         /* get bits 27-12
     move.l    d3, d4                 /* d4 = d3
     lsr.l     =8, d4                 /*
     lsr.l     =2, d4                 /* d4 = page no * 4, offset in table
     lsl.l     =4, d3                 /* move page no to bits 31-16
     or.l      d2, d3                 /* add access flag in bits 15-7
     adda.l    d4, a4                 /* calculate entry location
     move.l    d3, (a4)               /* store entry

     add.l     =page, d0              /* d0 = next physical address
     dbra      d1, $iop_map_loop      /* repeat till all done

     move.l    =0, (a3)               /* success, code = 0
     rts
```

```
     title '***********  iop$map_x_num_pages  **********'

/*   IOP$MAP_X_NUM_PAGES - maps specifed no of pages for the required access.

/*   dcl  iop$map_x_num_pages       entry (bit (32) aligned, bit (8) aligned,
/*                                  fixed bin (15), bit (32) aligned,
/*                                  fixed bin(15));
/*   dcl  physical_address          bit (32) aligned;
/*   dcl  flag                      bit (8) aligned;
/*      bit defination for flag
/*        read_access     7     1 = yes, 0 = no
/*        write_access    6     1 = yes, 0 = no
/*        priv_access     5     1 = yes, 0 = no
/*        local_memory    4     1 = local, 0 = main(vos)
/*        inter_lock      3     1 = yes, 0 = no
/*        io_st_bus       2     1 = yes, 0 = no
/*        dma             1     1 = yes, 0 = no
/*        unused          0
/*
/*   dcl  no_of_pages               fixed bin (15);
/*   dcl  mapped_address            bit (32) aligned;
/*   dcl  code                      fixed bin (15);
/*        call iop$map_x_num_pages     (physical_address, flag, no_of_pages,
/*                                      mapped_address, code);

     extdef     iop$map_x_num_pages

iop$map_x_num_pages:

     movem.l    4(a7), a0:a1:a2      /* addr (parameters)
     move.w     (a2), d5             /* no of pages
     movea.l    iop$next_map_entry_link, a4
     movea.l    (a4), a4             /* a4= next entry address
     move.l     =iop_map_table_start, d3
     add.l      =offset_user_start, d3    /* user start
     move.l     =iop_map_table_start, d4
     add.l      =offset_user_end, d4    /* user end
     moveq.l    =0, d6

$iop_find_loop:

     move.l     (a4), d1                  /* d1 = entry value
     and.l      =0FFFFFF00X, d1           /* mask off lower 8 bits
     cmp.l      =0, d1                    /* is it free?
     beq        $iop_map                  /* yes, jump
     adda.l     =4, a4                    /* try next one
     cmpa.l     d4, a4                    /* wrap around
     ble        $iop_find_loop            /* no, check it out
     movea.l    d3, a4                    /* start from top
     bra        $iop_find_loop            /* keep going

$iop_map:

     movea.l    a4, a3               /* a3 = a4
     lsl.w      =2, d5               /* number of pages*4
     adda.w     d5, a3
     cmpa.l     d4, a3               /* wrap around?
     ble        $iop_no_wrap         /* no check now
     movea.l    d3, a4               /* start from top

$iop_no_wrap:

     movea.l    a4, a3
     move.w     (a2), d5             /* no of pages
     subq.w     =1, d5

$try_next:
     move.l     (a4), d1             /* get entry
     and.l      =0FFFFFF00x, d1      /* mask off lower 8 bits
     cmp.l      =0, d1               /* is it free
     beq        $check_next          /* yes check next
     adda.l     =4, a4
     cmpa.l     d4, a4
     ble        $iop_no_wrap
```

```
        cmp.l       =1, d6
        beq         $table_full

        moveq.l     =1, d6
        movea.l     d3, a4              /* start from top
        movea.l     a4, a3              /* a3 = a4
        move.w      (a2), d5
        lsl.w       =2, d5              /* number of pages*4
        adda.w      d5, a3
        cmpa.l      d4, a3              /* wrap around?
        ble         $iop_no_wrap        /* check if not

$table_full:

        movea.l     20(a7), a3          /* parameter addr for code
        move.w      =e$iop_map_table_full, (a3) /* return error code
        rts

$check_next:

        adda.l      =4, a4              /* yes so check next
        dbra        d5, $try_next

        movea.l     a3, a4
        move.w      (a2), d5            /* no of pages
        subq.w      =1, d5              /*

        move.l      (a0), d0            /* d0 = physical address
        move.l      =0, d2              /*
        move.b      (a1), d2            /* get flag
        lsl.w       =8, d2              /* move to bits 15-8
        move.l      d0, d3                  /* d3 = d0
        move.l      a4, d1                  /* d1 = a4, entry location
        sub.l       =iop_map_table_start, d1
        and.l       =0000FFFFx, d1          /* get bits 15-0
        lsl.l       =8, d1                  /* multiply by 4, and
        lsl.l       =2, d1                  /* move it to bits 23-12
        and.l       =00000FFFx, d0          /* get offset from physical address
        or.l        d1, d0                  /* d0 = virtual address
        movea.l     16(a7), a2              /* addr for vir addr
        move.l      d0, (a2)                /* return virtual address

        movea.l     20(a7), a3          /* parameter addr for code
        move.w      =0, (a3)            /* return good code
        move.l      d3, d0                  /* d0 = d3

        movea.l     iop$next_map_entry_link, a3
        move.l      a4, (a3)                /* save last entry location

$map_loop:

        move.l      d0, d3                  /* d3 = d0
        and.l       =07FFF000x, d3          /* get bits 27-12
        lsl.l       =4, d3                  /* move to leftmost 31-16
        or.l        d2, d3                  /* add access flag in bits 15-7
        move.l      d3, (a4)                /* store entry

        add.l       =page, d0
        adda.l      =4, a4
        dbra        d5, $map_loop

        rts

        title '************  iop$obey_both  **********'
         .
/*      IOP$OBEY_BOTH - forces the pbus logic to listen to both p and
/*                      q buses.
/*
/*      dcl  iop$obey_both    entry ();
/*           call iop$obey_both;

        extdef      iop$obey_both

iop$obey_both:
```

```
     move.w    =set.!bdcs_pbusenb, iop$bdcs
     move.w    =set.!bdcs_qbusenb, iop$bdcs
     move.w    =set.!set_pbus_force, iop$bdcs
     move.w    =clr.!set_pbus_force, iop$bdcs
     rts

     title '***********  iop$obey_p  **********'

/*   IOP$OBEY_P - forces the pbus logic to listen to p bus only.
/*
/*   dcl  iop$obey_p    entry ();
/*        call iop$obey_p;

     extdef    iop$obey_p
iop$obey_p:

     move.w    =set.!bdcs_pbusenb, iop$bdcs
     move.w    =clr.!bdcs_qbusenb, iop$bdcs
     move.w    =set.!set_pbus_force, iop$bdcs
     move.w    =clr.!set_pbus_force, iop$bdcs
     rts

     title '***********  iop$obey_q  **********'

/*   IOP$OBEY_Q - forces the pbus logic to listen to q bus only.
/*
/*   dcl  iop$obey_q    entry ();
/*        call iop$obey_q;

     extdef    iop$obey_q

iop$obey_q:

     move.w    =clr.!bdcs_pbusenb, iop$bdcs
     move.w    =set.!bdcs_qbusenb, iop$bdcs
     move.w    =set.!set_pbus_force, iop$bdcs
     move.w    =clr.!set_pbus_force, iop$bdcs
     rts

     title '***********  iop$pbus_enabled  **********'

/*   IOP$PBUS_ENABLED - returns ('1'b or '0'b) depending on whether
/*                      pbus is enabled.

/*   dcl  iop$pbus_enabled         entry () returns (bit(1) aligned);
/*   dcl  pbus_enabled             bit (1) aligned;
/*        pbus_enabled =  iop$pbus_enabled ();

     extdef    iop$pbus_enabled

iop$pbus_enabled:

     btst      .=pbus_enb, iop$p_status + 1   /* test bit
     bne       $yes                           /* on
     moveq.l   =0, d0                         /* return '0'b
     rts

$yes:
     move.w    =8000x, d0                     /* return '1'b
     rts

     title '***********  iop$pio_adapt_select  **********'

/*   IOP$PIO_ADAPT_SELECT - selects an adapter in the specified
/*                          slot number.
/*
/*   dcl  iop$pio_adapt_select    entry (fixed bin);
/*   dcl  slot_no                 fixed bin;
/*        call iop$pio_adapt_select (slot_no);

     extdef    iop$pio_adapt_select
```

```
iop$pio_adapt_select:

     movea.l    4(a7), a0
     move.w     (a0), d0                  /* get slot_no
     movea.l    iop$current_slot_link, a1
     mulu       =16, d0                   /* slot_no in bits 7-4
     move.w     d0, (a1)                  /* save current slot no
     move.b     d0, iop$pio_select        /* select adapter
     rts

     title '***********  iop$send_ioa_cmd  **********'

/*   IOP$SEND_IOA_CMD - issues given command to the specified adapter.
/*
/*   dcl  iop$send_ioa_cmd   entry (fixed bin, fixed bin);
/*   dcl  cmd_no             fixed bin;
/*   dcl  slot_no            fixed bin;
/*        call iop$send_ioa_cmd (slot_no, cmd_no);

     extdef    iop$send_ioa_cmd

iop$send_ioa_cmd:

     movem.l    4(a7), a0;a1
     move.w     (a0), d0                  /* get slot_no
     move.w     =12, d1
     asl.w      d1, d0                    /* slot_no in bits 15-12

     move.w     (a1), d1                  /* get cmd_no
     or.w       =set_cmd., d1             /* set cmd bit
     or.w       d1, d0                    /* or slot_no to it
     move.w     d0, iop$adapt_cmd         /* issue cmd

     rts



     title '***********  iop$start_scanner  **********'

/*   IOP$START_SCANNER - starts the scanner from the first entry
/*                       in the scanner list.

/*   dcl  iop$start_scanner        entry ();
/*        call iop$start_scanner;

     extdef    iop$start_scanner

iop$start_scanner:

     move.w     =set.!scan_run, iop$pbus_ctrl       /* start scanner
     move.w     =set.!scan_enable, iop$pbus_ctrl    /* enable scanner
     rts


     title '***********  iop$stop_scanner  **********'

/*   IOP$STOP_SCANNER - stops the scanner.

/*   dcl  iop$stop_scanner        entry ();
/*        call iop$stop_scanner;

     extdef    iop$stop_scanner

iop$stop_scanner:

     move.w     =clr.!scan_run, iop$pbus_ctrl       /* stop scanner
     move.w     =clr.!scan_enable, iop$pbus_ctrl    /* disable scanner
     rts

     title '***********  iop$terminator_test  **********'

/*   IOP$TERMINATOR_TEST - writes and reads a fixed character in
/*                         terminator card to check status of currently
/*                         selected bus.
```

```
/*
/*   dcl  iop$terminator_test     entry (fixed bin);
/*   dcl  code                    fixed bin;
/*        call iop$terminator_test (code);

     extdef     iop$terminator_test

iop$terminator_test:

     movea.l    4(a7), a0
     move.w     =0, (a0)              /* test successful
     rts


     title '***********  iop$turn_on_pbus  **********'

/*   IOP$TURN_ON_PBUS - issues necessary commands to turn the pbus on.

/*   dcl  iop$turn_on_pbus          entry ();
/*        call iop$turn_on_pbus;
     *
     extdef     iop$turn_on_pbus

iop$turn_on_pbus:

     move.w     =set.!set_pbus_force, iop$bdcs      /* force pbus to obey both
     move.w     =clr.!set_pbus_force, iop$bdcs
     move.w     =set.!p_bus_enable, iop$pbus_ctrl  /* turn on the bus
     rts

     title '***********  iop$unlock_pbus  **********'

/*   IOP$UNLOCK_PBUS - issues necessary commands to unlock pbus

/*   dcl  iop$unlock_pbus          entry ();
/*        call iop$unlock_pbus;

     extdef     iop$unlock_pbus

iop$unlock_pbus:

     move.w     =set.!p_bus_lockL, iop$pbus_ctrl  /* unlock the bus
     rts

     title '***********  iop$unmap_x_num_pages  **********'
/*   IOP$UNMAP_X_NUM_PAGES - frees specified number of contiguous page entries
/*                           from map table.

/*   dcl  iop$unmap_x_num_pages    entry (bit (32) aligned,
/*                                        fixed bin(15), fixed bin (15));
/*   dcl  virtual_page_address     bit (32) aligned;
/*   dcl  no_of_pages              fixed bin (15);
/*   dcl  code                     fixed bin (15);
/*        call iop$unmap_x_num_pages (virtual_page_address, no_of_pages, code);

     extdef     iop$unmap_x_num_pages

iop$unmap_x_num_pages:

     movem.l    4(a7), a0:a1:a2                 /* addr (parameters)
     move.l     (a0), d0                        /* d0 = virtual address
     move.w     (a1), d5                        /* d5 = num of pages
     subq.w     =1, d5

     and.l      =00FFF000x, d0                  /* d0 = virtual page no
     lsr.l      =8, d0                          /*
     lsr.l      =4, d0                          /* vir pg no in bits 11-0
     cmp.l      =500, d0                        /* is it reserved ones?
     blt        $iop_unmap_error                /* jump if so

     lsl.l      =2, d0                          /* page no * 4
     add.l      =iop_map_table_start, d0        /* d0 = entry address
     movea.l    d0, a3                          /* a3 = entry address
```

```
$unmap_loop:

     move.l     (a3), d0                        /* d0 = entry value
     and.l      =0000FFFFx, d0                  /* get access flag
     cmp.l      =0, d0                          /* is it legal?
     bne        $iop_unmap                      /* yes

$iop_unmap_error:

     move.w     =e$iop_page_not_mapped, (a2)   /* return error code

     rts

$iop_unmap:

     move.l     =0, (a3)                        /* free entry
     adda.l     =4, a3                          /* take next one
     dbra       d5, $unmap_loop                 /* free all pages

     move.l     =0, (a2)                        /* success

     rts

     title      '*********** iop interrupt routines **********'

/* interfaces for dealing with interrupt levels
/* levels 0 thru 8 are defined in software.
/* they correspond to 68000 level 0 thru 7, and
/* IOP global interrupt mask (level 8)
     extdef     iop$interrupt_os
iop$interrupt_os:
     move.w     iop$bdcs,d0       /* check for pending
     btst.l     =bdcs_ipend,d0
     bne.b      $rts
     move.w     =set_int_req,iop$brd_ctrl
$rts:
     rts

/* dcl iop$set_os_interrupt_vector (fixed bin (15));
/* call iop$set_os_interrupt_vector (vector_no);

     extdef     iop$set_os_interrupt_vector

iop$set_os_interrupt_vector:
     movea.l    4(a7),a0          /* addr of param
     move.w     (a0),inum.word /* move vector
     rts

/* dcl  iop$get_level entry returns (fixed bin (15));
/* level = iop$get_level ();

     extdef     iop$get_level

iop$get_level:
     move.w     iop$bdcs,d0
     btst.l     =imask_all,d0
     beq.b      $level8        /* at level 8
     move.w     sr,d0        /* must use sr
     lsr.w      =8,d0
     andi.w     =7,d0
     rts
$level8:
     moveq.l    =8,d0
     rts

     eject
/* dcl  iop$set_level entry (bin (15))
/* call iop$set_level (new_level)

     extdef     iop$set_level

iop$set_level:
     movea.l    4(a7),a0          /* addr of param
     move.w     (a0),d0
```

```
     cmpi.w     =6,d0           /* level 6?
     beq.b      $level6
     andi.w     =7,d0
     lsl.w      =8,d0
     ori.w      =2000x,d0       /* supervisor
     move.w     d0,sr           /* correct 68000 level
     move.w     =unmask.+imask_all,iop$pdcs /* clear iop mask
     rts
$level6:
     move.w     =mask.+imask_all,iop$pdcs /* set iop mask
     nop
     nop
     nop
     rts
     title      '*********** iop dma interfaces **********'

/* dcl iop$verify_addr entry (ptr, bit (32) aligned, fixed bin (15),
/*                             fixed bin (31), fixed bin (15));
/* call iop$verify_addr (mapped_ptr, ioa_phys_addr, ioa_slot_no, byte_count,
/*                      code);

     extdef     iop$verify_addr

iop$verify_addr:
/* tell BUS ERROR HANDLER dma verify
     movem.l    4(a7),a0:a1:a2:a3:a4
     bsr        dma_setup
     tst.w      d3                     /* error
     bne        dma_error
     move.l     d1, iop$dma_verify
     bra        dma_join

/* dcl iop$addr_to_ioa entry (ptr, bit (32) aligned, fixed bin (15),
/*                             fixed bin (31), fixed bin (15));
/* call iop$addr_to_ioa (mapped_ptr, ioa_phys_addr, ioa_slot_no, byte_count,
/*                      code);

     extdef     iop$addr_to_ioa

iop$addr_to_ioa:
/* tell BUS ERROR HANDLER dma write
     movem.l    4(a7),a0:a1:a2:a3:a4
     bsr        dma_setup
     tst.w      d3                     /* error
     bne        dma_error
     move.l     d1, iop$dma_write
     bra        dma_join

/* dcl iop$ioa_to_addr entry (ptr, bit (32) aligned, fixed bin (15),
/*      .                      fixed bin (31), fixed bin (15));
/* call iop$ioa_to_addr (mapped_ptr, ioa_phys_addr, ioa_slot_no, byte_count,
/*                      code);

     extdef     iop$ioa_to_addr

iop$ioa_to_addr:
/* tell BUS ERROR HANDLER dma read
     movem.l    4(a7),a0:a1:a2:a3:a4
     bsr        dma_setup
     tst.w      d3                     /* error
     bne        dma_error
     move.l     d1, iop$dma_read

/* N.B. The reason behind the 34 bytes per move multiple of eight long-
/*      words is that the 68000 does one extra word read per execution of
/*      the movem instruction for memory operands.  This does not cause
/*      the address register to increment itself but will move the extra
/*      two bytes to or from the pbus, causing the address counters to
/*      increment. Thus 8 * 4 + 2 = 34

dma_join:
     move.l     (a3), d0               /* get byte count
     movea.l    (a0), a0               /* and mapped address
     divu       =34, d0                /* Get length of movem loop
```

```
     move.w    d0, d1                       /* d1 has movem loop count
     swap      d0 .                         /* d0 has remaincer length of bytes to move
     btst.l    #0, d0                       /* if d0 is odd then move a byte first
     beq       even_bytes
     move.b    (a0)+, d2                    /* Do a 1 byte dma
     subi.w    #1, d0                       /* Adjust byte count
 even_bytes:
     cmpi.w    #0, d0
     beq       check_movem_cnt              /* If count = 0 then no words to move
     lsr.w     #1, d0
     subi.l    #1, d0

 move_words:
     move.w    (a0)+, d2
     dbf       d0, move_words

 check_mover_cnt:
     tst.w     d1
     beq       dma_done
     subi.l    #1, d1
 move_34_bytes:
     movem.l   (a0)+, d0;d2-d7;a2
     adda.w    #2, a0
     dbf       d1, move_34_bytes

 /* NB. we always test and return the verify status even if this was read or
 /* write. Only verify callers expect a boolean return so this is benign.

 dma_done:
     moveq.l   #0, d0                             /* assume return '0'b
     btst      #dma_vfy_ok, iopsb_status          /* was verify ok?
     beq       $no                                /* no (or not verify don't care)
     move.w    #8000x, d0                         /* return '1'b if verify ok
 $no:
     move.w    #clr_dma_enb, iopsdrc_ctrl         /* clear dma enabled
 /* tell BUS ERROR HANDLER no more DMA
     bra       unmask                             /* unmask and return

     eject

 /* dcl iopsnos_to_both entry (ptr, bit (32) aligned, fixed bin (15), ptr,
 /*                          fixed bin (31), fixed bin (15));
 /* call iopsnos_to_both (mapped_ptr, ioa_phys_addr, ioa_slot_no, local_ptr
 /*                       byte_count, code);

     extdef    iopsnos_to_both

 iopsnos_to_both:
 /* tell BUS ERROR HANDLER dma write
     movem.l   4(a7),a0;a1;a2          /* get some params map_ptr, ioa_addr, ioa_ic
     movem.l   20(a7),a3;a4            /* more params byte_count, code
     bsr       dma_setup
     tst.w     d3                      /* error?
     bne       dma_error               /* yes.
     move.l    d1, iopsdma_write
     move.l    (a3), d0                /* get byte count
     movea.l   (a0), a0                /* and mapped address
     movea.l   16(a7), a1              /* get local address
     movea.l   (a1), a1
     divu      #4, d0                  /* Get length of movem loop
     move.w    d0, d1                  /* d1 has movem loop count
     swap      d0                      /* d0 has remaincer length of bytes to move
     btst.l    #0, d0                  /* if d0 is odd then move a byte first
     beq       b_even_bytes
     move.b    (a0)+, d2               /* Do a 1 byte dma
     move.b    d2, (a1)+               /* and local
     subi.w    #1, d0                  /* Adjust byte count
 b_even_bytes:
     cmpi.w    #0, d0
     beq       dma_both_long           /* If count = 0 then no words to move
     lsr.w     #1, d0                  /* words to move = remainder / 2
     subi.l    #1, d0                  /* - 1

 both_words:
```

```
        move.w      (a0)+, (a1)+
        dbf         d0, both_words

dma_both_long:
        tst.w       d1
        beq         dma_done
        move.l      (a0)+, d2                   /* 1 word at a time dma
        move.l      d2, (a1)+                   /* local store
        subi.l      =1, d1
        bra         dma_both_long

        move.w      =clr_dma_enb, iop$brd_ctrl
        bra         dma_done                    /* unmask and return

        eject

/* setup for dma
/*    0. assume no error; init returned code to 0
/*    1. load all regs for dma xfr d0 = count a0 = address
/*    2. build dma control word from params in d1
/*    3. mask all ints
/*    4. unlock Pbus
/* enter with
/* (a4) - addr of returned error code
/* (a1) - addr of ioa physical address
/* (a2) - addr of ioa io
/* returns
/* (d3) = 0 OK
/* (d3) ^= 0 error (d0) is code

dma_setup:
        moveq.l     =0, d3                      /* init error flag
        move.w      d3, (a4)                    /* init returned code
        moveq.l     =0, d1
        move.w      (a2), d1                    /* Read the ioa slot number
        blt         dma_bad_slot                /* illegal if .lt. 0
        cmpi.w      =NUM_OF_SLOTS, d1           /* legal slot?
        bgt         dma_bad_slot                /* no
        moveq.l     =28, d2                     /* Shift amount
        lsl.l       d2, d1                      /* adjust channel #
        move.l      (a1), d0                    /* read ioa address
        or.l        d0, d1                      /* build status word
        bsr         mask                        /* mask all interrupts during dma
/* tell BUS ERROR HANDLER dma args
        move.w      =set.ip_bus_lockL, iop$pbus_ctrl     /* Unlock the pbus
        rts
dma_bad_slot:
        move.w      =e$iop_invalid_slot_no, d3
        rts

dma_error:
        move.w      d3, (a4)                    /* return error
        rts

        title       '************  iop - os message interface  **********'

/* routines to handle syserr/syslog messages
/* then normal interface uses the command ring the following is only
/* for emergency cases

/* iop$panic_syserr will put out a syserr message even if it must
/* wait for the preceding message to be completed.

/* dcl  iop$panic_syserr entry (char(80) varying);
/* call iop$panic_syserr (message);

        extdef      iop$panic_syserr

iop$panic_syserr:
        movea.l     4(a7),a1            /* addr of message
        push.w      sr
        ori.w       =2700x,sr

        movea.l     iop$mailbox_addr_link,a0
```

```
        movea.l     (a0),a0
        using       'iop_mbx',a0
$wait:
        tst.w       iop_mbx.syserr_msg /* test for old msg
        beq.b       $ok_to_start
        nop
        nop
        nop
        nop
        bra.b       $wait
$ok_to_start:
        move.w      (a1),d1           /* byte count
        ble.b       $skip             /* ignore <= 0
        cmp.w       =80,d1            /* check len
        ble.b       $len_ok
        moveq.l     =80,d1
$len_ok:
        lea         2(a1),a1          /* start of input message
        lea         iop_mbx.syserr_msg+2,a2 /* mailbox msg assume syserr
        move.w      d1,d2             /* length
        subq.w      =1,d2
$copy:
        move.b      (a1)+,(a2)+
        dbf         d2,$copy
        move.w      d1,iop_mbx.syserr_msg /* last, store length
        jsr         iop$interrupt_os
$skip:
        pop.w       sr
        rts
        drop        'iop_mbx'
        title       '***********   misc routines   **********'

        extdef      iop$restart_after_sync
iop$restart_after_sync:
/* *** TBD ***
        rts

/*   This routine returns the command pending bit
/*   dcl   iop$command_pending entry returns (bit (1) aligned);
/*   pending = iop$command_pending ();

        extdef      iop$command_pending
iop$command_pending:
        move.w      iop$bdcs,d0              /* get word with bit
        btst.l      =bdcs_cmdpend,d0       /* test bit
        bne.b       $yes                   /* on
        moveq.l     =0,d0                  /* return '0'b
        rts
$yes:
        move.w      =8000x,d0              /* return '1'b
        rts

        eject
/* entry to clear the command pending bit

/*   dcl iop$clear_command_pending entry;
/*   call iop$clear_command_pending;

        extdef      iop$clear_command_pending

iop$clear_command_pending:
        move.w      =clr.+clr_cmd,iop$ord_ctrl  /* clear is by bit
        move.w      =unmask.+imask_istat,iop$bdcs /* can unmask now
        rts

        eject

/* entry to read a command from the command register

/* dcl   iop$read_command entry (fixed bin (15),
/*         fixed bin (15), fixed bin (31));
/* call iop$read_command (command, subchan, data);

        extdef      iop$read_command
```

```
iop$read_command:
     movem.l    4(a7),a0;a1;a2        /* addr (params)
     moveq.l    =0,d0
     move.b     iop$read_cmd+0,d0          /* pick up command
     move.w     d0,(a0)
     move.b     iop$read_pntr+6,d0         /* pick up subchan
     move.w     d0,(a1)
     move.b     iop$read_pntr+0,d0          /* data 1
     lsl.l      =8,d0
     move.b     iop$read_pntr+2,d0         /* data 2
     lsl.l      =8,d0
     move.b     iop$read_pntr+4,d0         /* data 3
     move.l     d0,(a2)              /* return data
     rts
     eject

/* entry to move bytes to vos memory */

/* dcl iop$write_to_vos entry (ptr, fixed bin (31),
/*          fixed bin (15);
/* call iop$write_to_vos (iop_ptr, vos_addr, n_bytes);

     extdef     iop$write_to_vos

iop$write_to_vos:
     movem.l    4(a7),a1;a2;a3
     movea.l    (a1),a1              /* iop addr
     movea.l    (a2),a0              /* vos addr
     move.w     (a3),d0              /* byte count
     subq.w     =1,d0
     bmi.b      $done
$loop:
     move.b     (a1)+,(a0)+
     dbf        d0,$loop
$done:
     rts

     eject
/* entry to move bytes from vos memory */

/* dcl iop$read_from_vos entry (ptr, fixed bin (31),
/*          fixed bin (15);
/* call iop$read_from_vos (iop_ptr, vos_addr, n_bytes);

     extdef     iop$read_from_vos

iop$read_from_vos:
     movem.l    4(a7),a1;a2;a3
     movea.l    (a1),a1              /* iop addr
     movea.l    (a2),a0              /* vos addr
     move.w     (a3),d0              /* byte count
     subq.w     =1,d0
     bmi.b      $done
$loop:
     move.b     (a0)+,(a1)+
     dbf        d0,$loop
$done:
     rts

     title      '**********    routines to deal with IOAs **********'

/* dcl iop$write_to_ioa entry (ptr, fixed bin (31),
/*          fixed bin (15);
/* call iop$write_to_ioa (iop_ptr, vos_addr, n_bytes);

     extdef     iop$write_to_ioa
iop$write_to_ioa:
     movem.l    4(a7),a1;a2;a3
     movea.l    (a1),a1              /* iop addr
     movea.l    (a2),a0              /* ioa addr
     move.w     (a3),d0              /* byte count
     subq.w     =1,d0
     bmi.b      $done
$loop:
```

```
     move.b    (a1)+,(a0)+
     dbf       d0,$loop
$done:
     rts

/* dcl iop$read_from_ioa entry (ptr, fixed bin (31),
/*        fixed bin (15);
/* call iop$read_from_ioa (iop_ptr, vos_addr, n_bytes);

     extdef    iop$read_from_ioa
iop$read_from_ioa:
     movem.l   4(a7),a1;a2;a3
     movea.l   (a1),a1            /* iop addr
     movea.l   (a2),a0            /* ioa  addr
     move.w    (a3),d0            /* byte count
     subq.w    =1,d0
     bmi.b     $done
$loop:
     move.b    (a0)+,(a1)+
     dbf       d0,$loop
$done:
     rts

/* copy into ioa memory from vos mapped memory
/*          iop$copy_ioa (v_addr, to, length)

     extdef    iop$copy_ioa
iop$copy_ioa:
     movem.l   4(a7), a0;a1;a2
     movea.l   (a0), a0
     movea.l   (a1), a1
     move.w    (a2), d1           /* number of bytes to be moved
     subq.l    =1, d1             /* minus one for 0-xxxx
$copy:
     move.b    (a0)+, (a1)+
     dbra      d1, $copy

     rts

     title     '***********  Local utility routines  **********'

/* mask - mask all ints and save old state
/* destroys d0
mask:
     move.w    iop$bdcs,d0
     move.w    =mask.+bdcs_imask,iop$bdcs        /* mask all interrupts
     btst.l    =bdcs_imask,d0                    /* were they masked?
     beq.b     $yes                              /* yes, leave alone
     move.w    =unmask.+bdcs_imask,d0            /* unmask
     bra.b     $save
$yes:
     move.w    =mask.+bdcs_imask,d0              /* mask
$save:
     move.w    d0,#save_bdcs
     nop
     nop
     nop
     rts

/* unmask interrupts to state at entry
unmask:
     move.w    #save_bdcs,iop$bdcs
     rts

     use       'static'
save_bdcs:
     ds.w      /* save bdcs here for old mask
     use       'code'

     eject

     extdef    iop$es_main_entry
iop$es_main_entry:
     movea.l   iop$program_link,a0
```

```
     movem.l    (a0),a3;a4;a5
     jsr        (a4)
     trap       =15         /* never to return

     eject

     extdat     iop$end_fast_utils
iop$end_fast_utils:
     ds.w       0

iop$mailbox_addr_link:
     dlink      iop$mailbox_addr

/*      incl       'iop_mail box'
/* Begin include file ...iop_mailbox.incl.asm
/* Generated at 87-03-02 16:16:00 EST by cv_incl Release 6.alpha.g from
/*      %es#m6>Stratus>Martin_Stokoe>iop>vos>6al_install>iop_mailbox.incl.pl1.

     equ        IOP_RING_SIZE,32
     equ        IOP_SYSERR_SIZE,16
     equ        IOP_ON_LINE,0
     equ        IOP_INITIALIZING,-1
     equ        IOP_FAILED_TO_INIT,-2
     equ        IOP_EXEC_OUT_OF_PROM,-3
/*   equ        IOP_MBX_ID,'*IOPMBX*'
     equ        IDLE_STATUS_INIT,0
     equ        IDLE_STATUS_COMPLETE,1
     equ        IDLE_STATUS_REJECT,2
     equ        IDLE_STATUS_WAIT,3
     extvar.b   iop$mailbox_addr(4)
     extvar.b   iop$vos_ringp(4)
     extvar.b   iop$iop_ringp(4)
     extvar.b   iop$syserr_ringp(4)
     use        'iop_mbx',dummy
iop_mbx:
iop_mbx.id:                                               ds.b 8
iop_mbx.status:
iop_mbx.status.ring_syserr.byte:
     equ        iop_mbx.status.ring_syserr.bit,7
     equ        iop_mbx.status.ring_syserr.mask,'80'b4
iop_mbx.status.pad:
     equ        iop_mbx.status.pad.bit,0
     equ        iop_mbx.status.pad.mask,'7F'b4
                                                          ds.b 1
     equ        iop_mbx.status.length,1
                                                          ds.b 1
iop_mbx.vector:                                           ds.b 2
iop_mbx.idle_status:                                      ds.b 2
iop_mbx.save_time:                                        ds.b 8
iop_mbx.lock_address:                                     ds.b 4
iop_mbx.syserr_msg:                                       ds.b 82
iop_mbx.flags:
iop_mbx.flags.vos_seen_syserr.byte:
     equ        iop_mbx.flags.vos_seen_syserr.bit,15
     equ        iop_mbx.flags.vos_seen_syserr.mask,'8000'b4
iop_mbx.flags.dumping_syserr_ring.byte:
     equ        iop_mbx.flags.dumping_syserr_ring.bit,14
     equ        iop_mbx.flags.dumping_syserr_ring.mask,'4000'b4
iop_mbx.flags.pad:
     equ        iop_mbx.flags.pad.bit,0
     equ        iop_mbx.flags.pad.mask,'3FFF'b4
                                                          ds.b 2
     equ        iop_mbx.flags.length,2
iop_mbx.syserr_ringp:                                     ds.b 4
iop_mbx.syserr_ring_addr:
                                                          ds.b 4
iop_mbx.syserr_size:                                      ds.b 2
iop_mbx.input_msg:                                        ds.b 82
iop_mbx.output_msg:                                       ds.b 82
iop_mbx.iop_head:                                         ds.b 2
iop_mbx.iop_tail:                                         ds.b 2
iop_mbx.iop_ringp:                                        ds.b 4
iop_mbx.iop_ring_addr:
                                                          ds.b 4
```

```
iop_mbx.iop_ring_size:                          ds.b 2
iop_mbx.vos_head:                               ds.b 2
iop_mbx.vos_tail:                               ds.b 2
iop_mbx.vos_ringp:                              ds.b 4
iop_mbx.vos_ring_addr:
                                                ds.b 4
iop_mbx.vos_ring_size:                          ds.b 2
iop_mbx.global_state:                           ds.b 4
     equ       iop_mbx.length,316
     use       'code'

     use       'iop_syserr_ring',dummy
iop_syserr_ring:
iop_syserr_ring.free.byte:
                                                ds.b 2
iop_syserr_ring.syserr_code:                    ds.b 2
iop_syserr_ring.msg:                            ds.b 62
     equ       iop_syserr_ring.length,66
                                                ds.b 1290
     equ       iop_syserr_ring.dim,16
     use       'code'

     use       'ring_cmd',dummy
ring_cmd:
ring_cmd.free.byte:
ring_cmd.pad:
                                                ds.b 1
                                                ds.b 1
ring_cmd.channel:                               ds.b 2
ring_cmd.command:                               ds.b 2
ring_cmd.data_16_1:                             ds.b 2
ring_cmd.data_32_1:                             ds.b 4
ring_cmd.data_32_2:                             ds.b 4
     equ       ring_cmd.length,16
     use       'code'

     use       'iop_ring',dummy
iop_ring:
iop_ring.free.byte:
iop_ring.pad:
                                                ds.b 1
                                                ds.b 1
iop_ring.channel:                               ds.b 2
iop_ring.command:                               ds.b 2
iop_ring.data_16_1:                             ds.b 2
iop_ring.data_32_1:                             ds.b 4
iop_ring.data_32_2:                             ds.b 4
     equ       iop_ring.length,16
                                                ds.b 496
     equ       iop_ring.dim,32
     use       'code'

     use       'vos_ring',dummy
vos_ring:
vos_ring.free.byte:
vos_ring.pad:
                                                ds.b 1
                                                ds.b 1
vos_ring.channel:                               ds.b 2
vos_ring.command:                               ds.b 2
vos_ring.data_16_1:                             ds.b 2
vos_ring.data_32_1:                             ds.b 4
vos_ring.data_32_2:                             ds.b 4
     equ       vos_ring.length,16
                                                ds.b 496
     equ       vos_ring.dim,32
     use       'code'

/* End include file ...iop_mailbox.incl.asm

iop$current_slot_link:
     clink     iop$current_slot
```

```
iop$next_map_entry_link:
     clink      iop$next_map_entry

iop$program_link:
     clink      iop$program

iop$init2_link:
     elink      iop$init2

     end
/*   ***begin copyright*** ******************************   */
/*                                                           */
/*   STRATUS CONFIDENTIAL INFORMATION: CLASS II              */
/*   COPYRIGHT (c) Stratus Computer, Inc. 1986               */
/*                                                           */
/*   This program contains confidential and proprietary      */
/*   information of Stratus Computer, Inc., and any          */
/*   reproduction, disclosure, or use in whole or in part    */
/*   is expressly prohibited, except as may be               */
/*   specifically authorized by prior written agreement or   */
/*   permission of Stratus.                                  */
/*                                                           */
/*   ***end copyright*** ********************************     */

/* Beginning of modification history */
/* Written 86-04-18 by Martin Stokoe for IOP */
/* Modified 86-12-02 by Martin Stokoe to implement entity exception
     statement */
/* Modified 87-01-20 by Martin Stokoe to implement deacxsum */
/* Modified 87-01-29 by Martin Stokoe to eliminate a race condition */
/* Modified 87-03-09 by Martin Stokoe to support reloading of
     running IOAs */
/* Modified 87-03-16 by Doug Steinfeld to change add/broken IOA calls
     to not pass entity statement but to rather use a device_id */
/* Modified 87-04-15 by Tom Moser to make ^cat.connected on EXCEPTION_CHAN */
/* Modified 87-06-02 by Tom Moser to redo exception processing */
/* End of modification history */

/* Supports all maintenance channel commands from the IOP */

iop_maint_chan_interrupt:     proc (a_iop_no, a_fb_15);
     *
/* arguments */
dcl a_iop_no          fixed  bin(15);
dcl a_fb_15           fixed  bin(15);

/* include */

/* %nolist;  %include 'syserr_codes';       % */list;
/* Begin include file syserr_codes.incl.pl1 81-9-8 */

/* This include file contains the definitions of the various syserr
   codes to be used when calling syserr. The  codes should be added
   together to form the desired combination. */

declare    syserr_action_ptr ptr;

declare 1 syserr_action based (syserr_action_ptr),
        2 mbz                  bit (10),
        2 signal_kernelerror   bit (1),
        2 security_log         bit (1),
        2 hardware_error       bit (1),
        2 obsolete             bit (1), /* was overseer_log */
        2 cont_display         bit (1),
        2 crash                bit (1);

%replace  SYSERR_WARN                      by 0;
%replace  SYSERR_CRASH                     by 1;
%replace  SYSERR_CONT_DISPLAY              by 2;
%replace  SYSERR_HARDWARE_ERROR_LOG        by 8;
%replace  SYSERR_SECURITY_LOG              by 16;
%replace  SYSERR_SIGNAL_KERNELERROR        by 32;
```

```
/* End include file syserr_codes.incl.pl1 */
/* %nolist; %include 'device_id'; */ %list;
/* Begin include file      device_id.incl.pl1          87-02-19 */

%replace  NULL_DEVICE_ID   by     'FFFFFFFFFFFFFFFF'b4;
%replace  NULL_VALUE       by     255;

%replace  MIN_LEVEL        by     1;

%replace  SLOT_LEVEL       by     1;
%replace  DEVICE_LEVEL     by     2;
%replace  CHANNEL_LEVEL    by     3;

%replace  MAX_LEVEL        by     8;

/* End include file      device_id.incl.pl1  */
/* %nolist;  %include 'iop_mc'; */     %list;
/* Begin include file ... iop_mc.incl.pl1  80-12-31 */

dcl  mcp ptr;

dcl 1 mc based (mcp),      /* machine conditions */
     2 identifier          char(4),              /* *MC* */
     2 berr_type_code      fixed bin (15),
     2 align_bdcs          char (0) aligned,
     2 bdcs,
       3  bdcs_broken      bit (1),
       3  bdcs_broken2     bit (1),
       3  bdcs_mempar      bit (1),
       3  bdcs_memcomp     bit (1),
       3  bdcs_timask      bit (1),
       3  bdcs_pkcomp      bit (1),
       3  bdcs_cmdpend     bit (1),
       3  bdcs_statchg     bit (1),
       3  bdcs_side        bit (1),
       3  bdcs_ipend       bit (1),
       3  bdcs_partner     bit (1),
       3  bdcs_zout_gt     bit (1),
       3  bdcs_level1      bit (1),
       3  bdcs_romhigh     bit (1),
       3  bdcs_cnd_mask    bit (1),
       3  bdcs_imask       bit (1),

     2 align_p_status      char (0) aligned,
     2 p_status,
       3 dma_vfy_ok        bit (1),
       3 dma_wrt           bit (1),
       3 dma_rd            bit (1),
       3 scan_int          bit (1),
       3 scan_up_L         bit (1),
       3 pbus_force        bit (1),
       3 pside_enb         bit (1),
       3 qside_enb         bit (1),
       3 pbus_diag         bit (1),
       3 pbus_obey_er      bit (1),
       3 pbus_sel_er       bit (1),
       3 pbus_berr_en      bit (1),
       3 pbus_err          bit (1),
       3 pbus_lock         bit (1),
       3 obey_p            bit (1),
       3 obey_q            bit (1),
     2 ioa_slot            fixed bin (15),
     2 usp                 fixed bin (31),
     2 d                   (0:7) fixed bin (31),
     2 a                   (0:6) fixed bin (31),
     2 int_sr              bit (16) aligned,
     2 status              bit (16) aligned,
     2 pc                  fixed bin (31),
     2 align_info          char (0) aligned,
     2 info,
       3 extended_fmt      bit (1) ,
       3 mbz               bit (3),
       3 vector            bit (12);
```

```
1 1 berr_mc based (mcp),     /* bus or address error machine conditions */
  2 identifier          char(4),
  2 berr_type_code      fixed bin (15),
  2 align_bdcs          char (0) aligned,
  2 bdcs,
    3  bdcs_broken      bit (1),
    3  bdcs_broken2     bit (1),
    3  bdcs_mempar      bit (1),
    3  bdcs_memcomp     bit (1),
    3  bdcs_timask      bit (1),
    3  bdcs_pkcomp      bit (1),
    3  bdcs_cmdpend     bit (1),
    3  bdcs_statchg     bit (1),
    3  bdcs_side        bit (1),
    3  bdcs_irend       bit (1),
    3  bdcs_partner     bit (1),
    3  bdcs_zout_gt     bit (1),
    3  bdcs_level1      bit (1),
    3  bdcs_romhigh     bit (1),
    3  bdcs_cmd_mask    bit (1),
    3  bdcs_imask       bit (1),

  2 align_p_status      char (0) aligned,
  2 p_status,
    3 dma_vfy_ok        bit (1),
    3 dma_wrt           bit (1),
    3 dma_rd            bit (1),
    3 scan_int          bit (1),
    3 scan_up_L         bit (1),
    3 pbus_force        bit (1),
    3 cside_enb         bit (1),
    3 cside_enb         bit (1),
    3 pbus_diag         bit (1),
    3 pbus_obey_er      bit (1),
    3 pbus_sel_er       bit (1),
    3 pbus_berr_en      bit (1),
    3 pbus_enb          bit (1),
    3 pbus_lock         bit (1),
    3 obey_p            bit (1),
    3 obey_c[illegible] bit (1),
  2 ioa_slot            fixed bin (15),
  2 usp                 fixed bin (31),
  2 d                   (0:7) fixed bin (31),
  2 a                   (0:6) fixed bin (31),
  2 int_sr              bit (16) aligned,
  2 status              bit (16) aligned,
  2 pc                  fixed bin (31),
  2 align_info          char (0) aligned,
  2 info,
    3 extended_fmt      bit (1),
    3 mbz               bit (3),
    3 vector            bit (12),
  2 align_stat          char (0) aligned,
  2 special_status,
    3 rerun             bit (1),
    3 pad1              bit (1),
    3 inst_fetch        bit (1),
    3 data_fetch        bit (1),
    3 r_m_w_cycle       bit (1),
    3 high_byte         bit (1),
    3 byte_xfer         bit (1),
    3 read              bit (1),
    3 pad2              bit (5),
    3 function_code     bit (3),
  2 fault_addr          fixed bin (31),
  2 resv_data_out       bit (16) aligned,
  2 data_out            bit (16) aligned,
  2 resv_data_in        bit (16) aligned,
  2 data_in             bit (16) aligned,
  2 resv_inst           bit (16) aligned,
  2 instruction_reg     bit (16) aligned,
  2 internal_info       (16) fixed bin (15);
```

```
/* End include file ... iop_mc.incl.pl1 */
/* %include 'iop_data'; */
/* Begin include file . . . . . iop_data.incl.pl1 */

/* Describes various permanent IOP data bases */

dcl  iop_dataps ptr ext static;

dcl  iop_datap ptr;

dcl  iop_data_max_controllers fixed bin (15);

dcl 1 iop_data               based (iop_datap),
     2 max_controllers       fixed bin (15),
     2 group_lockp           ptr,
     2 config_lockp          ptr,
     2 cvtp                  ptr,
     2 info                  (iop_data_max_controllers),
       3 slot                fixed bin (15),
       3 vector              fixed bin (15),

       3 slot_lockp          ptr,
       3 iop_lockp           ptr,
       3 vos_lockp           ptr,
       3 cat_lockp           ptr,
       3 csq_lockp           ptr,
       3 maint_lockp         ptr,

       3 flags,
         4 paired            bit (1),
         4 idled             bit (1),
         4 configured        bit (1),
         4 testing           bit (1),
         4 should_be_paired bit (1),
         4 monitor_in_use bit(1),
         4 acquired          bit(1),
         4 ioa_reset_issued bit(1),
         4 pad               bit (7),

       3 mcxp                ptr,
       3 catp                ptr,
       3 maintp              ptr,
       3 statementp          ptr,
       3 fw_pathsp           ptr,

       3 register,
         4 a                 fixed bin(31),
         4 b                 fixed bin(31),
         4 c                 fixed bin(31),

       3 csq_head            ptr,
       3 csq_tail            ptr,
       3 csq_n_heads         fixed bin (15),

       3 max_memory          fixed bin (15),
       3 n_pages_mem         fixed bin (15),
       3 iop_memp            ptr,
       3 iop_atsp            ptr,
       3 iop_abs_vpn         fixed bin (15),
       3 iop_ats_ppn         fixed bin (15);

/* this structure defines the array of memory used by the iop */

dcl  iop_memp                ptr;

dcl  iop_mem_max_pages       fixed bin (15);

dcl 1 iop_mem                based (iop_memp),
     2 max_pages             fixed bin (15),
     2 n_pages               fixed bin (15),
     2 page_nos              (iop_mem_max_pages) fixed bin (15);

dcl iopcsqep                ptr;
dcl 1 iopcsqe               based (iopcsqep),
```

```
     2 next                  ptr,
     2 chan                  fixed bin (15),
     2 func                  fixed bin (15),
     2 data_16_1             fixed bin (15),
     2 data_32_1             fixed bin (31),
     2 data_32_2             fixed bin (31);

dcl iopcsqp                 ptr;
dcl 1 iopcsq                based (iopcsqp),
     2 head                  ptr,
     2 tail                  ptr,
     2 n_heros               fixed bin (15);

dcl maintp                  ptr;
dcl 1 maint                 based (maintp),
     2 busy                  bit (1) aligned,
     2 data_16_1             fixed bin (15),
     2 data_32_1             fixed bin (31),
     2 data_32_2             fixed bin (31);

/* End include file . . . . . iop_data.incl.pl1 */
/* %include 'iop_es_ecc'; */
/* Begin include file . . . . . iop_common_ecc.pl1 */

/* Generic command ranges for iop entities */

/* command 0 is unused */

/* commands 01 to 1Fx (31) are for commands that are part of the normal
     entity operation */

%replace MIN_CMD_CODE                      by    1;
%replace FIRST_NORMAL_CMD                  by    1;
/* regular command codes 01 - 1Fx */

%replace BIND_CHAN_ENT          by    1;
%replace UNBIND_CHAN_ENT        by    2;
%replace BIND_SLOT_ENT          by    3;
%replace UNBIND_SLOT_ENT        by    4;
%replace SET_GLOBAL_METER_CMD              by    5;
%replace READ_GLOBAL_METER_CMD             by    6;
%replace READ_SYNC_INFO_CMD     by 7;

%replace LAST_NORMAL_CMD                   by    31;

/* commands 20x (32) - 5F (95) are for maintenance operations */
%replace FIRST_MAINT_CMD                   by    32;

/* Maintenance commands 20x (32) - 2Fx (47) are for maintenance of entity */

%replace FIRST_ENTITY_MAINT_CMD            by    32;
%replace INIT_ENTITY_CMD                   by    32;
%replace STOP_ENTITY_CMD                   by    33;
%replace SET_ENTITY_STATUS_CMD             by    34;
%replace READ_ENTITY_STATUS_CMD            by    35;
%replace SET_ENTITY_PARAM_CMD              by    36;
%replace READ_ENTITY_PARAM_CMD             by    37;
     %replace PROTOCOL_VER_PARAM           by     1;
     %replace LIMIT_PARAM                  by     2;

%replace SET_ENTITY_METER_CMD              by    40;
%replace READ_ENTITY_METER_CMD             by    41;
     %replace CMD_ERROR_MTR                by     1;
     %replace SEND_MTR                     by     2;
     %replace SEND_FAILED_MTR              by     3;

/* more entity maintenance commands */

%replace LAST_ENTITY_MAINT_CMD             by    47;

/* Maintenance commands 30x (48) - 3Fx (63) are for maintenance of channels */

%replace FIRST_CHAN_MAINT_CMD              by    48;
%replace INIT_CHAN_CMD                     by    48;
%replace STOP_CHAN_CMD                     by    49;
```

```
%replace SET_CHAN_STATUS_CMD        by    50;
%replace READ_CHAN_STATUS_CMD       by    51;
%replace SET_CHAN_PARAM_CMD         by    52;
%replace READ_CHAN_PARAM_CMD        by    53;
%replace SET_CHAN_METER_CMD         by    54;
%replace READ_CHAN_METER_CMD        by    55;

/* more channel maintenance commands */

%replace LAST_CHAN_MAINT_CMD        by    63;

/* Maintenance commands 40x (64) - 4Fx (79) are for maintenance of slots */

%replace FIRST_SLOT_MAINT_CMD       by    64;
%replace INIT_SLOT_CMD              by    64;
%replace STOP_SLOT_CMD              by    65;
%replace SET_SLOT_STATUS_CMD        by    66;
%replace READ_SLOT_STATUS_CMD       by    67;
%replace SET_SLOT_PARAM_CMD         by    68;
%replace READ_SLOT_PARAM_CMD        by    69;
%replace SET_SLOT_METER_CMD         by    70;
%replace READ_SLOT_METER_CMD        by    71;
%replace LOAD_SLOT_PRGM_CMD         by    72;
%replace START_SLOT_PRGM_CMD        by    73;
%replace BURN_SLOT_PROM_CMD         by    74;
%replace DUMP_SLOT_MEM_CMD          by    75;
%replace TEST_SLOT_CMD              by    76;

/* more slot maintenance commands */

%replace LAST_SLOT_MAINT_CMD        by    79;

/* Maintenance commands 50x (80) - 5Fx (95) are for testing functions */
%replace FIRST_TEST_MAINT_CMD       by    80;
%replace ALWAYS_ERROR_CMD           by    80;
%replace LAST_TEST_MAINT_CMD        by    95;

%replace LAST_MAINT_CMD             by    95;

%replace  MAX_CMD_CODE              by    95;

/* Command codes in the range 80x (128) - FFx (255) are error codes which
     correspond to command code which is 128 (ERROR_ID) less. ie. 131 is
     error code for function 3 (131 - ERROR_ID) = 3 */

%replace  ERROR_ID                  by    128;
%replace  FIRST_ERROR_CODE          by    128;
%replace  LAST_ERROR_CODE           by    255;

/* Command codes in the range of 100x - 17Fx are unsolicited commands -
     commands sent from iop to host as attention commands */

%replace  FIRST_UNSOLIC_CMD         by    256;
%replace  BROKEN_SLOT_CMD           by    256;
%replace  ADDED_SLOT_CMD            by    257;
%replace  EXCEPTION_SLOT_CMD        by    258;
%replace  EXCEPTION_CHAN_CMD        by    259;
%replace  EXCEPTION_ENTITY_CMD      by    260;
%replace  EXCEPTION_SLOT_ONLY_CMD   by    261;
%replace  HARI_KIRI_CMD             by    262;
%replace  LAST_UNSOLIC_CMD          by    383;

/* values for channel - slot - entity status commands */

     %replace GET_TYPE              by  1;
     %replace GET_STATUS            by  2;
     %replace GET_BIND              by  3;

     %replace SET_RESET             by  4;
     %replace GET_FULL_ICA_ID       by  5;
     %replace GET_PROM_REV          by  6;
     %replace GET_MISC_PARAM1       by  7;

%replace INITIAL_SS_LIMIT           by  0;     /* ring limit for host sends */
```

```
%replace MIN_ES_STATUS          by  GET_TYPE;
%replace MAX_ES_STATUS          by  SET_MISC_PARAM1;
%replace MIN_ES_PARAM           by  PROTOCOL_VER_PARAM;
%replace MAX_ES_PARAM           by  LIMIT_PARAM;
%replace MIN_ES_METER           by  1;
%replace MAX_ES_METER           by  MAX_IOP_MTR;

%replace MIN_ES_CHAN_METER      by  1;
%replace MAX_ES_CHAN_METER      by  1;
%replace MIN_ES_CHAN_STATUS     by  GET_STATUS;
%replace MAX_ES_CHAN_STATUS     by  GET_BIND;

%replace MIN_ES_SLOT_METER      by  1;
%replace MAX_ES_SLOT_METER      by  1;
%replace MIN_ES_SLOT_STATUS     by  GET_TYPE;
%replace MAX_ES_SLOT_STATUS     by  GET_FULL_IOA_ID;

/* "testing" commands for ES */

%replace LOOPBACK_CMD         by  81;
%replace LOOPBACK_BGND_CMD    by  82;
%replace LOOPBACK_TIMED_CMD   by  83;
/* End include file . . . . . . iop_common_ecc.pl1 */
/* %include 'iop_mailbox'; */
/* Begin include file . . . . . . iop_mailbox.incl.pl1 */

dcl  iop$mailbox_addr    ptr external static;
dcl  iop$vos_ringp       ptr external static;
dcl  iop$iop_ringp       ptr external static;
dcl  iop$syserr_ringp    ptr external static;

dcl  iop_mbxp            ptr;
dcl  syserr_ringp        ptr;
dcl  ring_cmdp           ptr;
dcl  vos_ringp           ptr;
dcl  iop_ringp           ptr;

%replace IOP_RING_SIZE   by   32;
%replace IOP_SYSERR_SIZE by   16;

%replace IOP_ON_LINE            by   0;
%replace IOP_INITIALIZING       by  -1;
%replace IOP_FAILED_TO_INIT     by  -2;
%replace IOP_EXEC_OUT_OF_PROM   by  -3;

%replace IOP_MBX_ID        by '*IOPMBX*';

dcl 1 iop_mbx             based (iop_mbxp),
    2 id                  char (8),
    2 status,                                   /* set by IOP */
      3 ring_syserr       bit(1),
      3 pad               bit(7),

    2 vector              fixed bin (15),
    2 idle_status         fixed bin (15),
    2 save_time           fixed dec (15),

    2 lock_address        fixed bin (31),       /* Board loop-lock addr */
    2 syserr_msg          char (80) var,

    2 flags,                                    /* Set by VOS for VOS */
      3 vos_seen_syserr        bit (1),
      3 dumping_syserr_ring    bit (1),
      3 pad                    bit(14),

    2 syserr_ringp        ptr,                  /* ptr to syserr ring */
    2 syserr_ring_addr    bit (32) aligned,     /* abs addr of syerr ring */
    2 syserr_size         fixed bin (15),       /* number of syserr ring */

    2 input_msg           char (80) var,
    2 output_msg          char (80) var,

    2 iop_head            fixed bin (15),       /* to iop ring head */
    2 iop_tail            fixed bin (15),       /* to iop ring tail */
    2 iop_ringp           ptr,                  /* ptr to to iop ring */
```

```
    2 iop_ring_addr       bit (32) aligneo,    /* abs addr of to iop ring */

    2 iop_ring_size       fixed bin(15),

    2 vos_heao            fixed bin (15),      /* iop to vos ring */
    2 vos_tail            fixed bin (15),
    2 vos_ringp           ptr,
    2 vos_ring_addr       bit (32) aligned,
    2 vos_ring_size       fixed bin(15),
    2 global_state        fixed bin (31),      /* state -1 uninit, 0 - normal
                                                  ^= 0/-1 error code (2) */
    2 pbus_status         like perr_mc.p_status,
    2 terminator_status,
       3 no_fan_fault bit (1),
       3 no_sync_fault bit (1),
       3 no_bulk_fault bit (1),
       3 no_volt_fault bit (1),
       3 other_enema_gooo bit (1),
       3 power_state bit (3),
       3 pad          bit (7);


dcl 1 iop_syserr_ring (IOP_SYSERR_SIZE) based(syserr_ringp),
     2 free bit(1) alignec,
     2 syserr_code fixed bin (15),
     2 msg char (80) varying;

dcl 1 ring_cmd              based(ring_cmdp),
        2 free                   bit (1),
        2 pad                    bit (7),
        2 channel                fixeo bin (15),
        2 command                fixed bin (15),
        2 data_16_1              fixed bin (15),
        2 data_32_1              fixed bin (31),
        2 data_32_2              fixed bin (31);

dcl 1 iop_ring (0:IOP_RING_SIZE-1) based (iop_ringp) like ring_cmd;

dcl 1 vos_ring (0:IOP_RING_SIZE-1) based (vos_ringp) like ring_cmd;

/* values for iop_mbx.idle_status */

%replace IDLE_STATUS_INIT           by 0;
%replace IDLE_STATUS_COMPLETE       by 1;
%replace IDLE_STATUS_REJECT         by 2;
%replace IDLE_STATUS_WAIT           by 3;


/* End include file . . . . . iop_mailbox.incl.pl1 */

/* %include 'diag_cmd_q_cmds'; */
/* Begin include file      diag_cmd_q_cmds.incl.pl1 -PPG-   86-06-24 */


/* diagnostic command queue commands */

%replace  MIN_Q_CMD          by       0;
%replace  MAX_Q_CMD          by     255;

/* board diagnostic commands */

%replace  MIN_Q_BOARD_CMD  by        1;          /* min boarc diagnostic commano */

%replace  CMD_DUP_MEM_ERR  by        1;          /* mem error from redun. mem    */
%replace  CMD_EXER         by        2;          /* boaro maximal test bd iole   */
%replace  CMD_COMP         by        3;          /* error checking logic test    */
%replace  CMD_FUNC         by        4;          /* functional self test         */
%replace  CMD_COMM_BUS_ERROR by      5;          /* comm bus error to report     */
%replace  CMD_LOAD_BD_FIRMWARE by    6;          /* loac boaro-level firmware    */

%replace  MAX_Q_BOARD_CMD  by        6;          /* max boarc cmc--limit is 99   */


/* device diagnostic commands */
```

```
%replace  MIN_Q_DEVICE_CMD by      100;          /* min device diagnostic cmd    */

%replace  CMD_EXER_SUBCHAN by      100;          /* device maximal test          */
%replace  CMD_BROKEN_SUBCHAN by    101;
%replace  CMD_ADD_SUBCHAN  by      102;
%replace  CMD_LOAD_FIRMWARE by     103;
%replace  CMD_IOP_EXCEPTION by     104;
%replace  MAX_Q_DEVICE_CMD by      104;          /* max device cmd--limit is 199 */


/* diagnostic process control commands */

%replace  MIN_Q_CNTL_CMD    by     200;          /* min control command          */

%replace  CMD_RESET         by     200;          /* reset a board                */
%replace  CMD_INIT          by     201;          /* initialize diag queue        */
%replace  MIN_TOGGLE_CMD    by     202;
%replace  TOGGLE_DISK       by     202;          /* disk full diagnostic sw      */
%replace  TOGGLE_COMM       by     203;          /* comm full diagnostic sw      */
%replace  TOGGLE_LINK       by     204;          /* link full diagnostic sw      */
%replace  TOGGLE_TAPE       by     205;          /* tape full diagnostic sw      */
%replace  MAX_TOGGLE_CMD    by     205;
%replace  CMD_COMPLETE_PFR  by     206;          /* complete pwr fail recovery   */
%replace  MAX_Q_CNTL_CMD    by     206;          /* max cntl command--max is 255 */


/* Subcommands indicating state/method of acquisition and disposition */

%replace  CMD_DEVICE_INACTIVE       by       0;   /* device not active          */
%replace  CMD_DEVICE_ACTIVE         by     256;   /* device active              */

%replace  CMD_BREAK_COMM            by       0;   /* idle comm by delete        */
%replace  CMD_IDLE_COMM             by     512;   /* idle comm by idle          */

%replace  CMD_UNSCHED_ACQUISITION   by       0;   /* acquired broken            */
%replace  CMD_SCHED_ACQUISITION     by    1024;   /* scheduled acquisition      */

%replace  CMD_ACQUIRED_FROM_MAINT   by       0;   /* maint proc gave device     */
%replace  CMD_ACQUIRED_FROM_VOS     by    2048;   /* vos gave device            */

%replace  CMD_LOG                   by       0;   /* log the diagnostic         */
%replace  CMD_NO_LOG                by    4096;   /* don't log the diagnostic   */

%replace  CMD_NO_DUMP_STATE         by       0;   /* don't dump bd/dev state    */
%replace  CMD_DUMP_STATE            by    8192;   /* dump bd/dev state          */

/* Template to access command word */

declare   diag_cmdp  ptr;

declare  1     diag_cmd                  based( diag_cmdp ),
               2    alignment            char( 0 ) aligned,
               2    filler               bit(2),
               2    dump_state           bit(1),
               2    dont_log             bit(1),
               2    acquired_from_vos    bit(1),
               2    sched_acquisition    bit(1),
               2    force_idle           bit(1),
               2    device_active        bit(1),
               2    command              char(1);


/* logging */

%replace  DONT_LOG                  by    0;
%replace  LOG_ACTION                by    1;
%replace  DONT_LOG_DONT_RESTORE     by    2;
%replace  LEAVE_TESTING             by    3;

/* End include file      diag_cmd_q_cmds.incl.pl1     */
/* %include 'icr_cvt_cat'; */
/* Defines the Channel Vector Table and Channel Assignment Tables
   for the IOP support by VOS */

%replace MAX_IOP_VECTORS       by 5;
```

```
%replace MAX_IOA_TYPES          by 10;
%replace MAX_IOP_CHANNELS       by 256;

dcl cvtp                ptr;
dcl 1 cvt(0:MAX_IOP_VECTORS) based (cvtp) like cvt_type;

dcl 1 cvt_type        based,
      2   driver_id       char(32) var,
      2   user(MAX_IOA_TYPES) fixed bin(15),
      2   interrupt       entry (fixed bin (15), fixed bin (15)),
      2   add             entry (bit(64) aligned, fixed bin (15)),
      2   broken          entry (bit(64) aligned, fixed bin (15)),
      2   idle            entry (fixed bin (15), fixed bin (15),
                                 fixed bin (15), fixed bin (15)),
      2   restart         entry (fixed bin (15), fixed bin (15),
                                 fixed bin (15), fixed bin (15)),
      2   pwr_fail        entry (fixed bin (15), fixed bin (15),
                                 fixed bin (15), fixed bin (15)),
      2   exception       entry (fixed bin (15), ptr, fixed bin(15));

dcl catp          ptr;
dcl 1 cat(0:MAX_IOP_CHANNELS-1) based(catp),
      2 status,
          3 active       bit(1),
          3 connected    bit(1),
          3 configured   bit(1),
          3 undefined    bit(13),
      2 ioa_slot         fixed bin (15),       /* ICA slot number 0-13 */
      2 subchan          fixed bin (15),       /* Card subchannel */
      2 vector           ptr,                  /* Vector pointer */
      2 ioa_type         fixed bin (15),       /* IOA Type */
      2 data             bit(64) aligned;      /* Sratch Area - Optional */
/* %include 'iop_entity_statement'; */
/* Include file iop_entity_statement */

%replace IOP_STATEMENT_VERSION    by 1;
%replace IOP_STATEMENT_OPEN       by 1;
%replace IOP_STATEMENT_CLOSED     by 2;
%replace IOP_EXCEPTION_STATEMENT  by 3;
%replace IOP_BROKEN_STATEMENT     by 4;
%replace IOP_ADD_STATEMENT        by 5;

dcl entity_statementp  ptr;

dcl 1 entity_statement based (entity_statementp),
     2 version                  char(1),
     2 status                   char(1),
     2 nextp                    ptr,
     2 length                   fixed bin(15),
     2 tally                    fixed bin(15),
     2 id                       fixed bin(15),
     2 name                     char(32) var,
     2 fault_description,
         3 primary              fixed bin(15),
         3 secondary            fixed bin(15),
         3 oncode               fixed bin(15),
     2 bound_slot(0:15)         bit(1),
     2 bound_channel(0:255)     bit(1),
     2 modelx(0:15)             fixed bin(15);
/* End include file iop_entity_statement */

/* automatics */

dcl c16               fixed bin(15);
dcl c32_1             fixed bin(31);
dcl c32_2             fixed bin(31);
dcl command           fixed bin(15);
dcl configured        bit(1) aligned;
dcl device_id         bit(64) aligned;
dcl i                 fixed bin(15);
dcl fb15              fixed bin(15);
dcl code              fixed bin(15);
dcl curp              ptr;
dcl p                 ptr;
```

```
dcl lockp           ptr;
dcl func            fixed bin(15);
dcl iop_no          fixed bin(15);
dcl ioa_slot        fixed bin(15);
dcl ioa_type        fixed bin(15);
dcl slot            fixed bin(15);

dcl 1 device_io_array,
      2   num_args              fixed bin(15),
      2   array_bound           fixed bin(15),
      2   arg( DEVICE_LEVEL )   fixed bin(15);

/* defined and based */

dcl 1 fault_fields  defined (d32_1),
     2 type         char(1),
     2 sub_type     char(1),
     2 oncode       fixed bin(15);

dcl 1 slot_fields   defined (d32_2),
     2 type         fixed bin(15),
     2 entity       fixed bin(15);

dcl 1 xsum          defined (d32_2),
     2 slot_excep   fixed bin(15),
     2 chan_excep   fixed bin(15);

/* Whenever the entity statement is altered the erasure must be updated */

dcl 1 erase                     based,
     2 version                  char(1),
     2 status                   char(1),
     2 nextp                    ptr,
     2 length                   fixed bin(15),
     2 tally                    fixed bin(15),
     2 id                       fixed bin(15),
     2 name                     char(32) var,
     2 slot_status              char(72);


/* entries */

/* %nolist; %include 'lock_calls'; %list; */
/* Begin of include file lock_calls.incl.pl1, 85-06-25 JK */
declare   attach_lock           entry (char (32) var in,
                                       bit (1) aligned in,
                                       fixed bin (31) in,
                                       pointer);
declare   attach_group_lock     entry (char (32) var in,
                                       bit (1) aligned in,
                                       fixed bin (31) in,
                                       fixed bin (31) in,
                                       pointer);
declare   attach_low_use_lock entry (char (32) var in,
                                       bit (1) aligned in,
                                       pointer);
declare   attach_member_lock    entry (pointer in,
                                       pointer in,
                                       pointer,
                                       fixed bin (15));
declare   attach_member_lock_name
                                entry (char (32) var in,
                                       pointer in,
                                       pointer,
                                       fixed bin (15));
declare   detach_member_lock    entry (pointer);
declare   get_n_locks           entry (pointer in)
                                     returns (fixed bin (31)) options (c);
declare   lock                  entry (pointer in) options (c);
declare   mylock                entry (pointer in)
                                     returns (bit (1) aligned) options (c);
declare   read_lock             entry (pointer in) options (c);
declare   try_lock              entry (pointer in)
                                     returns (bit (1) aligned) options (c);
```

```
declare   unlock                  entry (pointer in) options (c);

/* End of include file lock_calls.incl.pl1 */

dcl  allocate_wired_zeros        entry( fixed bin (31), char (2)) returns (ptr);

dcl  diag_enc_cmd                entry( bit(64) aligned, fixed bin(15),
                                        fixed bin(15) );

dcl  diag_issue_cmd              entry (fixed bin(15), fixed bin(15),
                                        fixed bin(15), fixed bin(15) );

/* HACK */
dcl change_device_id entry( bit(64) aligned, fixed bin(15), fixed bin(15) );

/* END HACK */

dcl  encode_device_id            entry( 1, 2  fixed bin(15),
                                           2  fixed bin(15),
                                           2  (*) fixed bin(15) )
                                 returns( bit(64) aligned );

dcl  syserr_code                 entry (fixed bin (15), fixed bin (15),
                                        char (*) var in);
dcl  syserr_edit_iII             entry (fixed bin (15), char (*) var in,
                                        fixed bin (15), fixed bin (15),
                                        fixed bin (31), fixed bin (31));
dcl  syserr_edit_iH              entry (fixed bin (15), char (*) var in,
                                        fixed bin (15), fixed bin (31));

%page;
/* execution */

     iop_datap = iop_dataps;
     iop_no = a_iop_no;
     iop_data_max_controllers = iop_data.max_controllers;

     code = 0;
     slot = iop_data.slot(iop_no);
     maintp = iop_data.maintp(iop_no);

     ring_cmdp = addr(a_fb_15);
     d16   = ring_cmd.data_16_1;
     d32_1 = ring_cmd.data_32_1;
     d32_2 = ring_cmd.data_32_2;

     func = ring_cmd.command;

     if func >= FIRST_UNSOLIC_CMD & func <= LAST_UNSOLIC_CMD
          then goto UNSOLIC_MAINT_ACTION(func);

/* solicited command */

     if maint.busy
          then call store_maint_data;
          else do;
               if func = BURN_SLOT_PROM_CMD | func = BURN_SLOT_PROM_CMD + ERROR_ID
               then do;
/* *** TBS ***
                    iop_prom_mbxp = iop_prom_mbxps;
                    iop_prom_mbx.state =
*** TBS *** */
                    return;
                    end;
UNSOLIC_MAINT_ACTION(*):
               call syserr_edit_iII(SYSERR_WARN,
'iop_maint_interrupt: IOP(^i) Unexpected cmd = ^i data = ^H ^H.', iop_no, func,
d32_1, d32_2);
          end;
     return;

UNSOLIC_MAINT_ACTION(HARI_KIRI_CMD):
     iop_mbxp = iop_data.mbxp(iop_no);
     call syserr_edit_iH(SYSERR_CRASH, 'IOP(^i) has crashed. Last state info = ^H.
iop_no, iop_mbx.global_state);
```

```
     /* *** */
     return;
UNSOLIC_MAINT_ACTION(ADDED_SLOT_CMD):

     command = CMD_ADD_SUBCHAN +
               CMD_DEVICE_INACTIVE +
               CMD_UNSCHED_ACQUISITION +
               CMD_ACQUIRED_FROM_VOS +
               CMD_LOG;

     goto diag_cmd_join;

UNSOLIC_MAINT_ACTION(BROKEN_SLOT_CMD):
     command = CMD_BROKEN_SUBCHAN +
               CMD_DEVICE_ACTIVE  +
               CMD_UNSCHED_ACQUISITION +
               CMD_ACQUIRED_FROM_VOS   +
               CMD_LOG;

diag_cmd_join:

     device_id_array.num_args = DEVICE_LEVEL;
     device_id_array.array_bound = DEVICE_LEVEL;
     device_id_array.arg( SLOT_LEVEL ) = slot;
     device_id_array.arg( DEVICE_LEVEL ) = d16;
     device_id = encode_device_id( device_id_array );

/* HACK  The following hack passes the IOA type to the diagnostic process */
/*       This has been done since maint$read_external_iop_prom which      */
/*       resides in maint$read_prom.pl1 cannot yet read the IOA prom to   */
/*       obtain the IOA modelx.                                           */

     call change_device_id( device_id, MAX_LEVEL, slot_fields.entity);
/* END HACK */

     call diag_enq_cmd( device_id, command, code );
     if code ^= 0
          then call syserr_code( SYSERR_WARN, code,
               'iop_maint_chan: Cannot enqueue diagnostic command');
     return;

UNSOLIC_MAINT_ACTION(EXCEPTION_SLOT_CMD)::
UNSOLIC_MAINT_ACTION(EXCEPTION_CHAN_CMD)::
UNSOLIC_MAINT_ACTION(EXCEPTION_ENTITY_CMD)::
UNSOLIC_MAINT_ACTION(EXCEPTION_SLOT_ONLY_CMD)::

     call lock (iop_data.vos_lockp(iop_no));
     call find_statement;
     entity_statement.tally = entity_statement.tally + 1;
     call unlock (iop_data.vos_lockp(iop_no));
     goto OPEN_ACTION(func);

OPEN_ACTION(EXCEPTION_ENTITY_CMD):
     entity_statement.id = d16;
     entity_statement.primary = rank(fault_fields.type);
     entity_statement.secondary = rank(fault_fields.sub_type);
     entity_statement.oncode = fault_fields.oncode;
     entity_statement.length = xsum.slot_excep + xsum.chan_excep + 1;
     goto open_action_end;

OPEN_ACTION(EXCEPTION_SLOT_ONLY_CMD):
     entity_statement.length = 1;
     entity_statement.primary = rank(fault_fields.type);
     entity_statement.secondary = rank(fault_fields.sub_type);
     entity_statement.oncode = fault_fields.oncode;
     entity_statement.bound_slot(d16) = '1'b;
     entity_statement.modelx(d16) = slot_fields.type;
     entity_statement.status = byte (IOP_BROKEN_STATEMENT);
     call set_recipient;
     call diag_issue_cmd (slot, d16, CMD_BROKEN_SUBCHAN, (0) );
     return;

OPEN_ACTION(EXCEPTION_SLOT_CMD):
```

```
      entity_statement.bound_slot(d16) = '1'b;
      entity_statement.modelx(d16) = slot_fields.type;
      goto open_action_end;

 OPEN_ACTION(EXCEPTION_CHAN_CMD):
      entity_statement.bound_channel(d16) = '1'b;
      if entity_statement.name = ''
      then do;
            catp = iop_data.info.catp(iop_no);
            cat(d16).connected = '0'b;
            p = cat.vector(d16);
            cvtp = iop_data.cvtp;
            entity_statement.name = p->cvt_type.driver_id;
            end;

 open_action_end:
      call exception_statement_ready;
      return;

 statement_error:
      if code ^= 0
      then call syserr_code (0, code,
                  'iop_maint_chan: Cannot issue diagnostic command');

      return;

 exception_statement_ready: proc;

      if entity_statement.length = 0
      then return;

      if entity_statement.tally ^= entity_statement.length
      then return;

      entity_statement.status = byte (IOP_EXCEPTION_STATEMENT);
      call diag_issue_cmd (slot, (0), CMD_IOP_EXCEPTION, code );

      end exception_statement_ready;

 set_recipient: proc;

      if entity_statement.name ^= ''
      then return;

      cvtp = iop_data.cvtp;

      configured = '0'b;
      do i = lbound(cvt,1) to hbound(cvt,1) while (^configured);
           p = addr(cvt(i));
           do fb15 = 1 to hbound(p->cvt_type.user,1);
                if p->cvt_type.user(fb15) = c32_2
                then configured = '1'b;
                end;
           end;

      p = addr( cvt(i-1) );

      if configured
      then entity_statement.name = p->cvt_type.driver_id;
      end set_recipient;

 find_statement: proc;
      do entity_statementp = iop_data.statementp(iop_no)
         repeat entity_statement.nextp while (entity_statementp ^= null());
           end;

      if entity_statementp = null
      then do;
           entity_statementp = allocate_wired_zeros (size(entity_statement),'xx');
           if entity_statementp = null ()
           then do;
                call unlock (iop_data.vos_locks(iop_no));
                goto statement_error;
                end;
```

```
          entity_statement.version = byte(IOP_STATEMENT_VERSION);
          entity_statement.nextp = iop_data.statementp(iop_no);
          iop_data.statementp(iop_no) = entity_statementp;
          entity_statement.status = byte (IOP_STATEMENT_CLOSED);
          end;

     if rank(entity_statement.status) = IOP_STATEMENT_OPEN
          then return;

     entity_statementp -> erase.slot_status = copy ( byte(0), 72);
     entity_statement.status = byte (IOP_STATEMENT_OPEN);
     entity_statement.tally = 0;
     entity_statement.length = 0;
     entity_statement.id = 0;
     entity_statement.name = '';
     return;
end find_statement;

store_maint_data: procedure;

     if func >= ERROR_ID
          then maint.data_16_1 = d16;
          else maint.data_16_1 = 0;
     maint.data_32_1 = d32_1;   /* error field   */
     maint.data_32_2 = d32_2;   /* returned data */
     maint.busy = '0'b;
     return;

end store_maint_data;
end iop_maint_chan_interrupt;
/*  ***begin copyright*** *******************************  */
/*                                                         */
/*  STRATUS CONFIDENTIAL INFORMATION: CLASS II             */
/*  COPYRIGHT (c) Stratus Computer, Inc. 1986              */
/*                                                         */
/*  This program contains confidential and proprietary     */
/*  information of Stratus Computer, Inc., and any         */
/*  reproduction, disclosure, or use in whole or in part   */
/*  is expressly prohibited, except as may be              */
/*  specifically authorized by prior written agreement or  */
/*  permission of Stratus.                                 */
/*                                                         */
/*  ***end copyright*** *********************************  */


/* Beginning of modification history */

/* Started 86-01-07 by Pradip Gosalia Initial Coding  */
/* Modified 86-02-17 by Tom Moser to call iop$syserr correctly */
/* Modified 86-02-25 by Pradip Gosalia to do more address checking
                     in iop$map_page */
/* Modified 86-03-11 by Tom Moser to redo syserr for new scheme */
/* Modified 86-03-14 by Pradip Gosalia to add two new routines */
/* Modified 86-03-19 by Pradip Gosalia to take old routines out */
/* Modified 86-03-27 by Pradip Gosalia to use bin_to_char routine */
/* Modified 86-03-31 by Pradip Gosalia to change order of parameters in */
/*                     iop$map_x_pages */
/* Modified 86-04-01 by Tom Moser to remove explicit dcl of bin/char routines
     these are defined in iop_utility_calls */
/* Modified 86-06-09 by Martin Stokoe to use new error codes */
/* Modified 87-03-10 by Tom Moser to add dump list support */
/* End of modification history */

iop_number: proc;
     return;

%page;

/* INCLUDE FILES */

/* %nolist; %include 'syserr_codes'; %list; */
/* Begin include file syserr_codes.incl.pl1 86-9-8 */

/* This include file contains the definitions of the various syserr
```

```
   codes to be used when calling syserr. The  codes should be added
   together to form the desired combination. */

declare    syserr_action_ptr ptr;

declare 1 syserr_action based (syserr_action_ptr),
        2 mbz                    bit (10),
        2 signal_kernelerror     bit (1),
        2 security_log           bit (1),
        2 hardware_error         bit (1),
        2 obsolete               bit (1), /* was overseer_log */
        2 dont_display           bit (1),
        2 crash                  bit (1);

%replace  SYSERR_WARN                       by 0;
%replace  SYSERR_CRASH                      by 1;
%replace  SYSERR_DONT_DISPLAY               by 2;
%replace  SYSERR_HARDWARE_ERROR_LOG         by 8;
%replace  SYSERR_SECURITY_LOG               by 16;
%replace  SYSERR_SIGNAL_KERNELERROR         by 32;

/* End include file syserr_codes.incl.pl1 */
/* %nolist; %include 'iop_utility_calls'; %list; */
/* Begin include file . . . . . iop_utility_calls.incl.pl1 */

dcl  iop$allocate entry (fixed bin (31), char (2) aligned) returns (ptr);
dcl  iop$free entry (ptr, char (2) aligned);

dcl  iop$get_level entry  returns (fixed bin (15));
dcl  iop$set_level entry (fixed bin (15));

dcl  iop$syserr_code entry (char (80) varying, fixed bin (15), fixed bin(15));
dcl  iop$panic_syserr entry (char (80) varying);

dcl  iop$read_time  entry returns (fixed bin (31));
dcl  iop$delta_time entry (fixed bin (31)) returns (fixed bin (31));

dcl  bin_to_char     entry (fixed bin (31)) returns (character (13) varying);
dcl  char_to_bin     entry (character (13) varying) returns (fixed bin (31));

dcl  iop$set_slot_priority entry (fixed bin (15), fixed bin (15),
                               fixed bin (15));

/* End include file . . . . . iop_utility_calls.incl.pl1 */
/* %include  'iop_error_codes'; %page; */
/* %include  'iop_map_entry_counts' */; %page;
/*  ***begin copyright*** *******************************  */
/*                                                         */
/*  STRATUS CONFIDENTIAL INFORMATION: CLASS II             */
/*  COPYRIGHT (c) Stratus Computer, Inc. 1985              */
/*                                                         */
/*  This  program  contains  confidential and proprietary  */
/*  information  of  Stratus Computer,  Inc.,  and  any    */
/*  reproduction,  disclosure, or use in whole or in part  */
/*  is   expressly   prohibited,   except   as   may   be  */
/*  specifically authorized by prior written agreement or  */
/*  permission of Stratus.                                 */
/*                                                         */
/*  ***end copyright*** *********************************  */
/*  Begin include file iop_map_entry_counts.incl.pl1          */

%replace  MAX_LOG_CHAN_NO      by   256;      /* maximum logical chan nos */
%replace  MAX_MAP_ENTRIES      by   2505;     /* maximum map entries */

dcl  iop_map_entry_countsps   ptr  external  static;

dcl  iop_map_entry_countsp    ptr;

dcl  1 iop_map_entry_counts   based (iop_map_entry_countsp),
       2 free_entries         fixed bin,
       2 log_chan_no (0:MAX_LOG_CHAN_NO),     /* 0-MAX_LOG_CHAN_NO */
         3 active             fixed bin;      /* map entries in use */

/*  End include file iop_map_entry_counts.incl.pl1           */
```

```
/* %include 'iop_map_structures' */; %page;
/*  ***begin copyright*** ********************************  */
/*                                                           */
/*  STRATUS CONFIDENTIAL INFORMATION: CLASS II               */
/*  COPYRIGHT (c) Stratus Computer, Inc. 1985                */
/*                                                           */
/*  This program contains confidential and proprietary       */
/*  information of Stratus Computer, Inc., and any           */
/*  reproduction, disclosure, or use in whole or in part     */
/*  is expressly prohibited, except as may be                */
/*  specifically authorized by prior written agreement or    */
/*  permission of Stratus.                                   */
/*                                                           */
/*  ***end copyright*** **********************************   */
/*  Begin include file iop_map_structures.incl.pl1               */

dcl  access_infop              ptr;

dcl  1 access_info             based (access_infop),
       2 version               fixed bin, /* = 1 */
       2 flags,
         3 read_access         bit (1),  /* 1 = yes, 0 = no */
         3 write_access        bit (1),  /* 1 = yes, 0 = no */
         3 priv_access         bit (1),  /* 1 = yes, 0 = no */
         3 local_memory        bit (1),  /* 1 = local, 0 = main(vos) */
         3 inter_lock          bit (1),  /* 1 = yes, 0 = no */
         3 io_st_bus           bit (1),  /* 1 = yes, 0 = no */
         3 dma                 bit (1),  /* 1 = yes, 0 = no */
         3 unused              bit (9);

%replace  ACCESS_INFO_VERSION_1     by    1;

/*  End include file iop_map_structures.incl.pl1                  */

/* EXTERNAL ENTRIES */

dcl  iop$init_next_map_ptr     entry ();
dcl  iop$map_x_num_pages       entry (bit (32) aligned, bit (8) aligned,
                                      fixed bin (15), bit (32) aligned,
                                      fixed bin (15));
dcl  iop$map_no_pages          entry (bit (32) aligned, fixed bin (15),
                                      bit (8) aligned, fixed bin (15));
dcl  iop$unmap_x_num_pages     entry (bit (32) aligned, fixed bin (15),
                                                fixed bin (15));

/* INTERNAL ENTRIES */

dcl  iop$init_mapper           entry ();
dcl  iop$init_map_table        entry (bit (32) aligned, fixed bin (15),
                                      fixed bin (15), fixed bin (15));
dcl  iop$free_x_map_pages      entry (fixed bin (15), bit (32) aligned,
                                      fixed bin (15), fixed bin (15));
dcl  iop$map_x_pages           entry (fixed bin (15), bit (32) aligned,
                                      fixed bin (15), fixed bin (15),
                                      bit (32) aligned, fixed bin (15));

/* BUILTINS */
dcl  (addr, bin, char, size, string, unspec)          builtin;

/* CONSTANTS */

%replace  FALSE                       by    '0'b;
%replace  MAP_ID                      by    'MP';
%replace  TRUE                        by    '1'b;
%replace  IOP_MAP_LOWER_ADDRESS       by    524288;  /* 512k */

/* PARAMETERS */

dcl  p_access_info             fixed bin;
dcl  p_code                    fixed bin;
```

```
dcl  p_log_chan_no               fixed bin;
dcl  p_mapped_address            bit (32) aligned;
dcl  p_num_of_pages              fixed bin (15);
dcl  p_physical_address          bit (32) aligned;
dcl  p_start_address             bit (32) aligned;
dcl  p_virtual_page_address      bit (32) aligned;

/* AUTOMATIC */

dcl  access_flag     bit (8) aligned;
dcl  add_fb31        fixed bin (31);
dcl  code            fixed bin;
dcl  i               fixed bin;
dcl  fb31_1          fixed bin (31);

/* EXTERNAL */

dcl  iop$dump_strp  ptr external static;

%page;
/*-----------------------------------------------------------------------*/

/* IOP$INIT_MAPPER - entry to allocate and initialize structures used by
                     IOP Mapper */

iop$init_mapper:    entry;

/*  allocate memory for map entry counts structure */

     iop_map_entry_countsp = iop$allocate (size(iop_map_entry_counts),
                                                    MAP_ID);

/*  save the pointer for the structure in the external static variable */

     iop_map_entry_countsp$ = iop_map_entry_countsp;

/*  initialize all the counts to zero */

     do i = 0 to MAX_LOG_CHAN_NO;
          iop_map_entry_counts.log_chan_no(i).active = 0;
     end;

/*  initialize free map entries count */
     iop_map_entry_counts.free_entries = MAX_MAP_ENTRIES;

/*  initialize next map entry point */

     call iop$init_next_map_ctr;

/*  return */

     return;

/*-----------------------------------------------------------------------*/

%page;
/*-----------------------------------------------------------------------*/

init_dump_list: entry;

dcl  (first_page, page_count) fixed bin (15);

dcl  iop$return_dump_entry    entry (fixed bin (15), fixed bin (15));

%replace IOP_MAP_TABLE_PAGE   by 3066;
%replace IOP_MAP_TABLE_SIZE   by 4;
%replace IOP_CONTROL_PAGE     by 3066;

/* add special dump list pages here special pages */

/* MAP */
     call add_dump_pair(IOP_MAP_TABLE_PAGE, IOP_MAP_TABLE_SIZE);
/* CONTROL PAGE */
```

```
     call add_dump_pair(IOP_CONTROL_PAGE, 1);

     first_page = 0;
     call iop$return_dump_entry(first_page, page_count);
     do while (first_page ^= -1);
          call add_dump_pair(first_page, page_count);
          first_page = first_page + page_count;
          call iop$return_dump_entry(first_page, page_count);
          end;
     return;

%page;
/*-----------------------------------------------------------------------*/

/* IOP$INIT_MAP_TABLE - entry to initialize blocks of pages for required
                        access */

iop$init_map_table:      entry (p_start_address, p_num_of_pages,
                                p_access_info, p_code);

/*  initialize automatic, static variables, pointers, and return code */

      p_code = 0;
      access_infop = addr (p_access_info);

/*  if access_info version number = 1
    then return with code = e$iop_wrong_version */

      if access_info.version ^= ACCESS_INFO_VERSION_1
      then do;
             p_code = e$iop_wrong_version;
             return;
           end;

/*  check validity of number of pages */

      if p_num_of_pages < 0
      then do;
             p_code = e$iop_invalid_address;
             return;
           end;
      else
           if p_num_of_pages = 0
           then return;

/*  map pages */

      access_flag = string (access_info.flag);
      if bin(access_flag) = 0
      then do;
             p_code = e$iop_invalid_access;
             return;
           end;

      call iop$map_no_pages (p_start_address, p_num_of_pages, access_flag,
                                                                code);

      if iop$dump_strp ^= null() & access_info.flag.write_access &
              access_info.flag.local_memory
           then call add_dump_pair(divide(bin(p_start_address), 4096, 15, 0),
                     p_num_of_pages);

/*  if any error in mapping
    then set code = e$iop_invalid_address */

      if code ^= 0
      then p_code = e$iop_invalid_address;

/*  return */

      return;

/*-----------------------------------------------------------------------*/
```

```
%page;
/*********************************************************************/

/* IOP$MAP_X_PAGES - entry to map x pages starting at given physical
                     address for specified acess type */

iop$map_x_pages:     entry (p_log_chan_no, p_physical_address, p_access_info,
                            p_num_of_pages, p_mapped_address, p_code);


/*  initialize automatic, static variables, pointers and return code */

     p_code = 0;
     access_infop = addr (p_access_info);
     iop_map_entry_countsp = iop_map_entry_countsp$;
/*  if access_info version number = 1
    then return with code = e$iop_wrong_version */

     if access_info.version ^= ACCESS_INFO_VERSION_1
     then do;
            p_code = e$iop_wrong_version;
            return;
          end;

/*  check validity of number of pages */

     if p_num_of_pages < 0
     then do;
            p_code = e$iop_invalid_address;
            return;
          end;
     else
          if p_num_of_pages = 0
          then return;

/*  if logical channel number < 0 or > MAX_LOG_CHAN_NO
    then   return with code = e$iop_invalid_log_chan_no */

     if p_log_chan_no < 0 |
        p_log_chan_no > MAX_LOG_CHAN_NO
     then do;
            p_code = e$iop_invalid_log_chan_no;
            return;
          end;

/*  if map table has not enough pages
    then   report error = map table full
      .    return with code = e$iop_map_table_full */

     if iop_map_entry_counts.free_entries < p_num_of_pages
     then do;
            call co_syserr ('iop$map_x_pages : map table full.', SYSERR_WARN);
            p_code = e$iop_map_table_full;
            return;
          end;

/*  if local address
    then if address > 512k
         then return with code = e$iop_invalid_address */

     adr_fb31 = bin(p_physical_address);
     if access_info.flag.local_memory &
        adr_fb31 >= IOP_MAP_LOWER_ADDRESS
     then do;
            p_code = e$iop_invalid_address;
            return;
          end;

/*  map a page for specified access */

     access_flag = string (access_info.flag);
     if bin(access_flag) = 0
     then do;
            p_code = e$iop_invalid_access;
            return;
```

```
          end;

     call iop$map_x_num_pages (p_physical_address, access_flag,
                                  p_num_of_pages, p_mapped_address, p_code);

/*   if any error in mapping
     then return with error code */

     if p_code ^= 0
     then return;

/*   increment number of active entry count for the logical channel */

     iop_map_entry_counts.log_chan_no(p_log_chan_no).active =
       iop_map_entry_counts.log_chan_no(p_log_chan_no).active + p_num_of_pages;

/*   decrement free map entry count */

     iop_map_entry_counts.free_entries =
                    iop_map_entry_counts.free_entries - p_num_of_pages;

/*   return */

     return;

/*----------------------------------------------------------------------*/

%page;
/*----------------------------------------------------------------------*/

/* IOP$FREE_X_MAP_PAGES - entry to free no of contiguous mapped pages for
                          the given virtual address */

iop$free_x_map_pages:     entry (p_log_chan_no, p_virtual_page_address,
                                 p_num_of_pages, p_code);

/*   initialize automatic, static variables, pointers and return code */

     p_code = 0;
     iop_map_entry_countsp = iop_map_entry_countsp$;

/*   if logical channel number < 0 or > MAX_LOG_CHAN_NO
     then   return with code = es$iop_invalid_log_chan_no */

     if p_log_chan_no < 0 |
        p_log_chan_no > MAX_LOG_CHAN_NO
     then do;
             p_code = es$iop_invalid_log_chan_no;
             return;
          end;

/*   if  no active entry for the given logical channel
     then   return with code = es$iop_page_not_mapped */

     if iop_map_entry_counts.log_chan_no(p_log_chan_no).active < p_num_of_pages
     then do;
             p_code = es$iop_page_not_mapped;
             return;
          end;
   | dcl  1 dumn (*--

/*   free the page */

     call iop$unmap_x_num_pages (p_virtual_page_address, p_num_of_pages, code);

/*   if any error
     then    report error = virtual address not mapped
             return with code = es$iop_page_not_mapped */

     if code ^= 0
     then do;
             ft31_1 = bin (p_virtual_page_address);
             call dc_syserr ('iop$free_x_map_pages: virtual address ' ||
```

```
             bin_to_char ((fb31_1)) || ' not mapped.', SYSERR_WARN);
      p_code = e$iop_page_not_mapped;
      return;
    end;

/*  decrement number of active entry count for the logical channel */

     iop_map_entry_counts.log_chan_no(p_log_chan_no).active =
       iop_map_entry_counts.log_chan_no(p_log_chan_no).active - p_num_of_pages;

/*  increment free map entry count */

     iop_map_entry_counts.free_entries =
                iop_map_entry_counts.free_entries + p_num_of_pages;

/*  return */

     return;

/*-------------------------------------------------------------------------*/
%page; •

do_syserr:     procedure (a_msg, a_type);

dcl  a_msg     char (80) varying;
dcl  a_type    fixed bin (15);
dcl  code      fixed bin (15);

     call iop$syserr_code(a_msg, a_type, code);
     if code ^= 0 & a_type = SYSERR_CRASH
       then call iop$panic_syserr(a_msg);
     return;

end do_syserr;
add_dump_pair: procedure (pgn, npg);

dcl (pgn, npg) fixed bin (15);
dcl old_level  fixed bin (15);

/* %include  'iop_dump_list' */;
/* Begin include file iop_dump_list */

%replace DUMP_EXTENSION_SIZE   by 50;
%replace INITIAL_DUMP_LIST_SIZE by 4;

dcl  dump_listp     ptr;
dcl  dump_strp      ptr;
dcl  1 dump_list_str based (dump_strp),
       2 n_entries        fixed bin (15),
       2 last_used        fixed bin (15),
       2 entriesp         ptr;

dcl  1 dump_list (dump_list_str.n_entries) based (dump_listp),
       2 dump_entry like dump_entries;

dcl  1 dump_entries based,
        3 page_num fixed bin (15),
        3 num_pgs  fixed bin (15);

dcl  1 initial_dump_entries (INITIAL_DUMP_LIST_SIZE)  external static,
       2 page_num fixed bin (15) initial (3068,   0, 3066, -1),
       2 num_pgs  fixed bin (15) initial (   4, 128,    1,  0);

/* End include file iop_dump_list */
/* %include  'iop_prom_cfg' */;
/*        Initial boot configuration table.
          --------------------------------
     This structure will remain in the iop just above the iop's stack.
*/

/*   sys_conp = sys_conf$   */
dcl  sys_conp             ptr;

dcl  1 sys_mcr            based( sys_conp ),
```

```
        2 slot              fixed bin(15), /* ICA chassis slot */
        2 flags,
          3 mbz             bit(14),
          3 rd_in_prog      bit(1),        /* START_READ in progress */
          3 cfg             bit(1),        /* Console configured */
        2 com_mbxp          ptr,           /* Pointer to vos comm mailbox */
        2 ioa_mbxp          ptr,           /* Pointer to ioa's mailbox */
        2 f_char            fixed bin(15), /* f_char in data; OLD:Channel state */
        2 count             fixed bin(15), /* number of characters being output */
        2 ucode_rev         fixed bin(15), /* Prom code revision level */
        2 model             char(4),       /* Board id. */
        2 io_lock           ptr,           /* Board interlock pointer. */
        2 io_blockp         ptr;           /* Pointer to vos-bound io_block */

/*   bcb = bcb$; */
/*   bdcbp = boot disk control block pointer    */
dcl  bdcbp                 ptr;
dcl  1 boot_disk           based( bdcbp ),
        2 slot             fixed bin(15),
        2 flags,
          3 mbz            bit(14),
          3 io_in_prog     bit(1),
          3 cfg            bit(1),
        2 disk_mbxp        ptr,
        2 virt_ptr         ptr,
        2 io_lock          fixed bin(31),
        2 state            fixed bin(15),
        2 ucode_rev        fixed bin(15),
        2 model            char(4);

/* ICP ES to PROM interface info. */
dcl  esip                  ptr;      /* Ptr to es interface structure. */
%replace  MIN_INT          by 1;
%replace  MAX_INT          by 16;
%replace  ES_VECX          by 16;

dcl  1 es                  based( esip ),
        2 running          bit(1) aligned,
        2 callback         entry( entry, fixed bin(31), fixed bin(31),
                                  fixed bin(15), fixed bin(31),
                                  fixed bin(15) ) variable,
        2 revoke_call      entry( fixed bin(31), fixed bin(15) ) variable,
        2 reset_list(0:15)     bit(1),
        2 vec(MAX_INT),
          3 number         fixed bin(15),
          3 pending        bit(1) aligned,
        2 next_vec         fixed bin(15),
        2 prom_mbxp        ptr,                /* Pointer to iop_prom_mbx */
        2 dump_listp       ptr,                /* Pointer to iop dump table */
        2 dump_list_ix     fixed bin(15), /* Next dump list entry index */
        2 dump_page_cnt    fixed bin(15), /* Index for multiple dump pages */
        2 last_used        fixed bin(15), /* Last dump list entry used. */
        2 dump_checksum    fixed bin(15), /* Dump list checksum. */
        2 syserr_wrt       entry( fixed bin(31) ),
        2 syserr_rd        entry( fixed bin(31) );
 /* %nolist:  %include  'iop_constants'; */   %list;
 /* Begin include file . . . . . iop_constants.incl.pl1 */

 %replace ICA_CLOCK_CHANNEL_NO by 2;
 %replace TERM_SLOT_1          by 14;
 %replace TERM_SLOT_2          by 15;

 %replace MAX_IOP_INTERRUPT_LEVEL by 6;
 %replace MAX_IOP_BACKGROUND_PRIORITY by 6;

 %replace MASK_ALL_INTS by 7;
 %replace ALLOW_TIMER_INTERRUPTS by 3;
 %replace ALLOW_ICA_INTERRUPTS by 4;

 %replace JIFFIES_PER_SECOND by 65536;

 %replace ES_ENTITY by 0;
 %replace ES_CHANNEL by 0;
 %replace NO_ENTITY by -1;
```

```
%replace NONE by -1;

%replace START_ADAPT_MEM by 12582912;   /* 12M or C00000x */

/* End include file . . . . . iop_constants.incl.pl1 */

/* %nolist;  %include  'iop_transfer_calls';    %l */ist;
/* Begin include file . . . . . iop_transfer_calls.incl.pl1 */

/* virtual address (mapped) calls */

dcl iop$addr_to_ioa entry (ptr, bit (32) aligned, fixed bin(15),
                          fixed bin (31), fixed bin (15), fixed bin (15));

dcl iop$ioa_to_addr entry (ptr, bit (32) aligned, fixed bin(15),
                          fixed bin (31), fixed bin (15), fixed bin (15));

dcl iop$verify_addr entry (ptr, bit (32) aligned, fixed bin(15),
                          fixed bin (31), fixed bin (15), fixed bin (15))
                          returns (bit(1) aligned);

dcl iop$ioa_to_ioa entry (bit (32) aligned, bit (32) aligned, fixed bin(15),
                          fixed bin(15), fixed bin (31), fixed bin (15),
                          fixed bin (15));

/* physical address calls to-from hos */

dcl iop$hos_to_ioa entry (bit (32) aligned, bit (32) aligned, fixed bin (15),
                          fixed bin (31), fixed bin (15), fixed bin (15));

dcl iop$ioa_to_hos entry (bit (32) aligned, bit (32) aligned, fixed bin (15),
                          fixed bin (31), fixed bin (15), fixed bin (15));

dcl iop$verify_hos entry (bit (32) aligned, bit (32) aligned, fixed bin(15),
                          fixed bin (31), fixed bin (15), fixed bin (15))
                          returns (bit(1) aligned);

/* special call for disk sw */

dcl iop$hos_to_both entry (ptr, bit (32) aligned,
                            fixed bin (15), ptr, fixed bin (31), fixed bin (15),
                            fixed bin (15));

/* checksum functions */

dcl iop$combine_checksum entry (fixed bin (15), fixed bin (15))
                          returns (fixed bin (15));

dcl  iop$checksum_bytes    entry (ptr, fixed bin (15), fixed bin (15));

/* End include file . . . . . iop_transfer_calls.incl.pl1 */


dcl  iop$esip             ptr external static;

%page;

     esip = iop$esip;
     if esip = null()
     then do;
          call do_syserr('MAP: No es structure when building dump list.',
               SYSERR_WARN);
          return;
          end;
     old_level = iop$get_level();
     call iop$set_level(MASK_ALL_INTS);
     dump_strp = iop$dump_strp;
     if dump_strp = null()
     then do;
          iop$dump_strp = iop$allocate(size(dump_list_str), 'DL');
          if iop$dump_strp = null()
          then do;
               call do_syserr('MAP: cannot allocate dump structure.',
```

```
                    SYSERR_WARN);
                call iop$set_level(old_level);
                return;
                end;
           dump_strp = iop$dump_strp;
           dump_list_str.n_entries = 0;
           dump_list_str.entriesp = null();
           dump_list_str.last_used = 1;        /* null entry filled in below */
           end;
      dump_listp = dump_list_str.entriesp;
      if dump_listp = null() | dump_list_str.last_used = dump_list_str.n_entries
      then do;
           dump_list_str.n_entries = dump_list_str.n_entries +
                DUMP_EXTENSION_SIZE;
           dump_listp = iop$allocate(size(dump_list), 'DL');
           if dump_listp = null()
           then do;
                call do_syserr('MAP: cannot allocate dump list.', SYSERR_WARN);
                call iop$set_level(old_level);
                return;
                end;
           if dump_list_str.n_entries ^= DUMP_EXTENSION_SIZE /* not first */
           then do;
                dump_list_str.n_entries = dump_list_str.n_entries -
                     DUMP_EXTENSION_SIZE;            /* for copy */
                dump_list = dump_list_str.entriesp -> dump_list;
                dump_list_str.n_entries = dump_list_str.n_entries +
                     DUMP_EXTENSION_SIZE;            /* copy done fix size */
                end;
           dump_list_str.entriesp = dump_listp;  /* new list */
           es.dump_listp = dump_listp;            /* tell IOP PROM */
           end;

/* list is OK. insert new entry */
/* NB. During this the list is BAD for a few secs we could prevent this
     by having a copy of the list out for now ..... */

     es.dump_listp = null();          /* for now... */

     dump_list(dump_list_str.last_used).dump_entry.page_num = pgn;
     dump_list(dump_list_str.last_used).dump_entry.num_pgs = npg;
     dump_list_str.last_used = dump_list_str.last_used + 1;

/* end of list */

     dump_list(dump_list_str.last_used).dump_entry.page_num = -1;
     dump_list(dump_list_str.last_used).dump_entry.num_pgs = 0;

/* update PROMs list */

update_prom_dl:

     es.last_used = dump_list_str.last_used;
     call iop$checksum_bytes(dump_listp,
          bytesize(dump_entries) * dump_list_str.last_used, es.dump_checksum);
     es.dump_listp = dump_listp;

/* structure is now OK */

     call iop$set_level(old_level);
     return;

end add_dump_pair;
end iop_mapper;
```

Having described the invention, what is claimed is:

1. In a fault-tolerant digital data processing system of the type having plural functional units, including any of a central processing unit, a memory unit, a peripheral device, and a peripheral device controller, the improvement comprising A. first and second bus means connected to at least selected ones of said functional units, each said bus means for transferring information-representative signals, including at least one of a data, address, and control signal between said selected functional units, B. each of said selected functional units including, and being associated with, bus interface means for transferring said information-representative signals between the associated functional unit and at least one of said first and second bus means, and C. the bus interface means of a first said selected functional unit including strobe means for normally applying duplicate timing signals synchronously and simultaneously to said first and second bus means for transfer to said other selected functional units, said timing signals being indicative of a timing of said transfer of information-representative signals on said first and second bus means, D. each said other selected functional unit including i. logic means coupled to said first and second bus means for monitoring timing signals received on them and producing tracking signals in response thereto, said logic means including means for producing local strobe signals based on a logical combination of said timing signals and said tracking signals, ii. means for responding to said local strobe signals for at least initiating processing of information-representative signals received by that functional unit on both said first and second bus means.

2. In a fault-tolerant digital data processing system according to claim 1, the further improvement wherein the bus interface means associated with at least one of said selected functional units includes means for normally transferring duplicate ones of said information-representative signal synchronously and simultaneously on said first and second bus means.

3. In a fault-tolerant digital data processing system according to claim 2, the further improvement wherein at least at selecteds ones of said functional units include means for processing, in the absence of selected fault condition, duplicate information-representative signals received on said first and second bus means.

4. In a digital data processing system according to claim 2, the further improvement where said selected bus interface means includes means responsive to fault on one of said bus means for processing signals received only on the other of said bus means.

5. In a processing system according to claim 1, the further improvement wherein at least one of said selected functional units includes first and second processing sections, each said processing section being coupled with said first and second bus means for communicating with others of said functional units, each of said first and second processing sections being responsive to duplicate input signals received substantially synchronously and simultaneously with the other processing section to produce, in the absence of fault, identical resultant signals synchronously and simultaneously with that other processing section.

6. In a digital data processing system according to claim 5, the further improvement comprising a further functional unit, coupled to said first and second bus means, said further functional unit for processing input signals received identically, synchronously and simultaneously with said first selected functional unit to generate, in absence of fault, output signals identically, synchronously, and simultaneously therewith.

7. In a digital data processing system according to claim 5, the further improvement comprising comparison means coupled to said first and second processing sections for comparing resultant signals produced thereby and for generating a fault signal in the event those resultant signals do not match.

8. In a method for operating a fault-tolerant digital data processing system of the type having plural functional units, including any of a central processing unit, a memory unit, a peripheral device, and a first peripheral device controller, the improvement comprising the steps of A. providing first and second buses for transferring information-representative signals, including at least one of a data, address, and control signal between selected ones of said functional units, B. transferring information-representative signals between at least one of said selected functional units and said first and second buses for transfer to at least one other said selected functional unit, C. normally applying duplicate timing signals synchronously and simultaneously to said first and second buses for transfer to said selected functional units, said timing signals being indicative of a timing of said transfer of information representative signals on said first and second bus means, D. within each of said selected functional units, monitoring timing signals received on said first and second buses to produce tracking signals in response thereto, producing a local strobe signal based on a logical combination of said timing signals and said tracking signals, and responding to said local strobe signal to at least initiate processing of information-representative signals received by that functional unit on said first and second buses.

9. In a method according to claim 8, the further improvement comprising the step of providing, within at least one of said selected functional units, first and second processing sections, each said processing section communicating with others of said selected functional units over the first and second buses, and each said section responding to identical input signals received synchronously and simultaneously with the other processing section to produce, in the absence of selected fault, identical resultant signals synchronously and simultaneously with the other processing section.

10. In a method according to claim 9, the further improvement comprising the step of comparing signals produced by the first and second processing sections for generating a fault signal in the event those compared signals do not match.

11. In a method according to claim 9, the further improvement comprising the step of providing a further functional unit coupled to said first and second buses for processing input signals received identically, synchronously and simultaneously with another of said functional units to generate, in absence of fault, resultant signals identically, synchronously, and simultaneously therewith.

12. In a method according to claim 8, the further improvement comprising the step of normally transferring duplicate ones of said information-representative signal synchronously and simultaneously on said first and second bus means.

13. In a method according to claim 8, the further improvement comprising the step of responding to said duplicate timing signals to transfer said information-representative signals between said selected functional units on least one of said first and second buses.

14. In a method according to claim 13, the further improvement comprising the step of processing, in the absence of selected fault condition, duplicative information-representative signals received synchronously and simultaneously on said first and second input/output buses.

15. In a method according to claim 14, the furthe improvement comprising the step of responding to fau on one of said buses for processing signals received onl on the other of said buses.

* * * * *